United States Patent [19]

Holland et al.

[11] 4,434,459

[45] Feb. 28, 1984

[54] DATA PROCESSING SYSTEM HAVING INSTRUCTION RESPONSIVE APPARATUS FOR BOTH A BASIC AND AN EXTENDED INSTRUCTION SET

[75] Inventors: Charles J. Holland, Northboro; Steven Wallach, Framingham; Carl J. Alsing, Hopkington, all of Mass.

[73] Assignee: Data General Corporation, Westboro, Mass.

[21] Appl. No.: 143,982

[22] Filed: Apr. 25, 1980

[51] Int. Cl.[3] .......... G06F 9/00

[52] U.S. Cl. .......... 364/200

[58] Field of Search ... 364/200 MS File, 900 MS File

[56] References Cited

U.S. PATENT DOCUMENTS

| | | | |
|---|---|---|---|
| 3,168,723 | 2/1965 | Foin et al. | 364/200 |
| 4,025,904 | 5/1977 | Adney et al. | 364/200 |
| 4,060,849 | 11/1977 | Bienvenu et al. | 364/200 |
| 4,090,237 | 5/1978 | Dimmick | 364/200 |
| 4,181,933 | 1/1980 | Benysek | 364/200 |

*Primary Examiner*—Raulfe B. Zache

*Attorney, Agent, or Firm*—Robert F. O'Connell

[57] ABSTRACT

A data processing system which handles thirty-two bit logical addresses which can be derived from either sixteen bit logical addresses or thirty-two bit logical addresses, the latter being translated into physical addresses by unique translation means. The system includes means for decoding macro-instructions of both a basic and an extended instruction set, each macro-instruction containing in itself selected bit patterns which uniquely identify which type of instruction is to be decoded. The instruction responsive apparatus thereof responds to unique microinstructions which, for example, provide for the selection of one of a plurality of interrupt routines each corresponding to an interrupt request from a different external device, provide for the sequential loading of a plurality of segment identification registers each pointing to selected memory management tables associated with a segment storage region of main memory, provide for a program counter relative jump operation, provide for zero-extending or sign-extending 16-bit words to 32-bit words having the same value, and provide for the multiplication of the lower 16 bits of two 32-bit accumulators and the sign-extension of the 16-bit result to form a 32-bit word.

8 Claims, 158 Drawing Figures

BANK CONTROLLER 18

SYSTEM CACHE DATA STORE 40

TAG STORE 43

ICACHE TAG STORE COPY

TAG STORE COMPARATOR 52

ICACHE TAG STORE COMPARATOR 45

C PORT AND I PORT ADDRESS REGISTERS 41 AND 42
AND WRITE BACK TAG UNIT

INDEX 5V AND INDEX 5V 2 UNITS

WP 5V 2 UNIT

INDEX MUX AND WP MUX

DATA WRITE REGISTER 40A

MULTIPLEXER 48 AND INDEX DRIVER 48'

WRITE DATA REGISTER 46

TO FIG. 17A

MULTIPLEXOR 47

DRIVER UNITS 50 AND 51 AND DRIVER LOGIC

INDEX/INDEX SV COMPARATOR

CPU BUFFER DATA REGISTER 54, I/O BUFFER DATA REGISTER 55, AND CRD IN REGISTER 53

FROM FIG. 20

TO FIG. 20B

MUX 48 PARITY GENERATION LOGIC

SYSTEM CACHE PARITY LOGIC

SYSTEM CACHE PARITY GENERATION LOGIC

SYSTEM CACHE PARITY GENERATOR LOGIC

SYSTEM CACHE PARITY LOGIC

MAIN MEMORY INTERFACE CONTROL LOGIC

C BUS INTERFACE LOGIC

C BUS INTERFACE LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

SYSTEM CACHE CONTROL LOGIC

MUX STORE UNIT

C-BIT GENERATOR
(ERROR DETECTION/CORRECTION CODE)

(32 BITS) REGISTER AND, (8 BITS) REGISTER

WRITE DATA
BUS DRIVERS

S-BIT GENERATOR

RD SV REGISTER

S-SV REGISTER

PARITY LOGIC

CORRECTION LOGIC

DIRECT READ DRIVER UNIT

R/W MOD SELS UNIT,
RADDR UNIT AND CADDR UNIT

MODSEL LOGIC

ADDRESS UNIT

BANK CONTROLLER TIMING AND CONTROL LOGIC

BANK CONTROLLER TIMING,
REFRESH AND CONTROL LOGIC

PARITY LOGIC CONTROL LOGIC

CONTROL SIGNAL DRIVERS

CBUS INTERFACE LOGIC

CBUS INTERFACE LOGIC

CBUS INTERFACE LOGIC

DATA IN REGISTER 63

DATA IN REGISTER 64

PLANE Ø RAMS

PLANE Ø CONTROL INPUTS

PLANE 1 CONTROL INPUTS

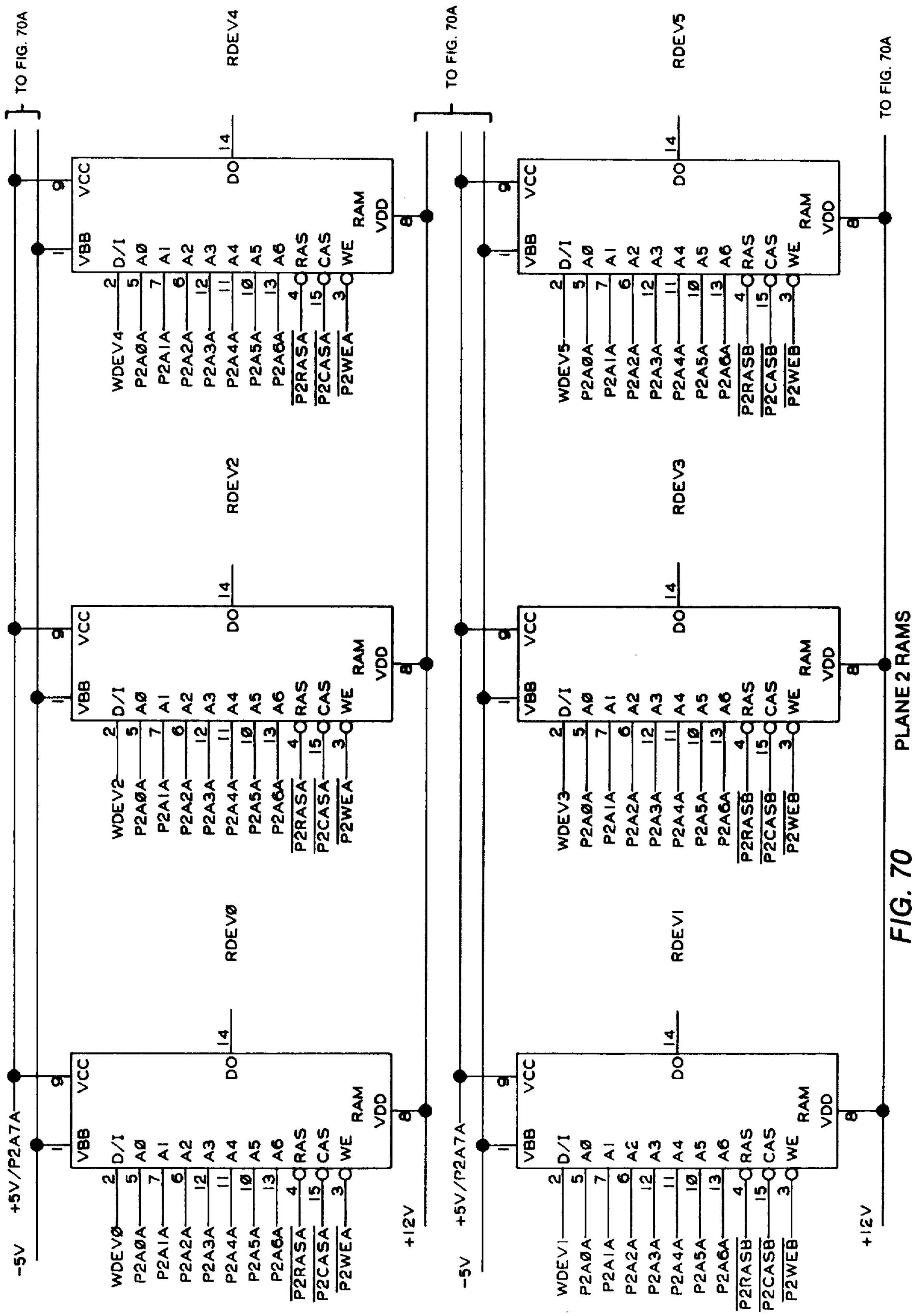
FIG. 70 PLANE 2 RAMS

PLANE 2 CONTROL INPUTS

PLANE 3 RAMS

PLANE 3 CONTROL INPUTS

DATA OUT REGISTER AND MUX UNIT 69

MEMORY ARRAY LATCHES & DRIVERS

RAM SEL LOGIC 68

MODSEL COMPARATOR AND MEMORY MODULE CONTROL LOGIC

MEMORY MODULE TIMING LOGIC

ATU 3

MEMORY DATA REGISTER 106
LMP DATA REGISTER
TRANSLATION STORE 100
PHYSICAL PAGE TABLE MUX 107
PHYSICAL MODE BUFFER 108
LAST BLOCK REGISTER 116

TAG STORE 102 AND PROTECTION STORE 104

TAG COMPARATOR UNIT 105

LOGICAL ADDRESS REGISTER 101

PHYSICAL ADDRESS OFFSET MULTIPLEXOR 109

LAR CPD DRIVER UNIT

PHYSICAL ADDRESS BUS DRIVERS

FLT CD DRIVERS 112

RING PROTECTION LOGIC III

FAULT DETECTION AND CACHE BLOCK CROSSING TRAP LOGIC

FAULT DETECTION TRAP LOGIC

VALIDITY STORE 103 AND PURGE LOGIC

TRANSLATION REGISTER

REFERENCE/MODIFY STORAGE AND CONTROL LOGIC

STATE SAVE DRIVERS

16 BIT MMPU EMULATION CONTROL LOGIC

DDA REGISTER

ATU TIMING LOGIC

SYSTEM CACHE INTERFACE LOGIC

ICACHE DATA STORE 130

ICACHE DATA STORE ADDRESS INPUT

CPM REGISTER 134

ICACHE VALIDITY STORE 132

VALIDITY STORE ADDRESS INPUT

COMPARATOR 133 AND SET IDR VALID

INSTRUCTION DECODE REGISTER (IDR) SHIFTER 143

INSTRUCTION DECODE REGISTER 142

ICACHE POINTER LOGIC

ICP LA DRIVER LOGIC

I. P. PREFETCH REQUEST CONTROL LOGIC

I. P. PHYS. TRANSLATION REGISTER 152

ICACHE CONTROL LOGIC

DRIVER
(FROM CPD BUS)

INSTRUCTION PRE-DECODE LOGIC

DECODE PROMS 140 AND 141

STμAD LOAD CONTROL 145

DISPLACEMENT LOGIC

DISPLACEMENT MUX

SEX LOGIC

ZERO/ONES EXTEND LOGIC

DISPLACEMENT/INCREMENT BUFFER

DISPLACEMENT LATCH AND DRIVERS 153

PC REGISTER 147 AND CPD BUS DRIVERS

ADDER 148

PC AND DISP LATCHES AND DRIVERS 149

PC CLOCK LOGIC

INSTRUCTION PROCESSOR TIMING AND CONTROL LOGIC

SYSTEM CACHE INTERFACE LOGIC

MICRO-SEQUENCER 13

DECODING & CONDITION TEST LOGIC 182
(MICRO-SEQUENCER)

STACK MUX, STACK RAM, STACK POINTER AND TDS U

STOS UNIT 181

ADDRESS MUX 176

ADDR SAVE REGISTER

ADDRESS LOGIC TO μCONTROL STORE

ST μAD DRIVER (MPC + 1) UNIT 177 AND INCREMENT UNIT 178

μCONTROL STORE 170

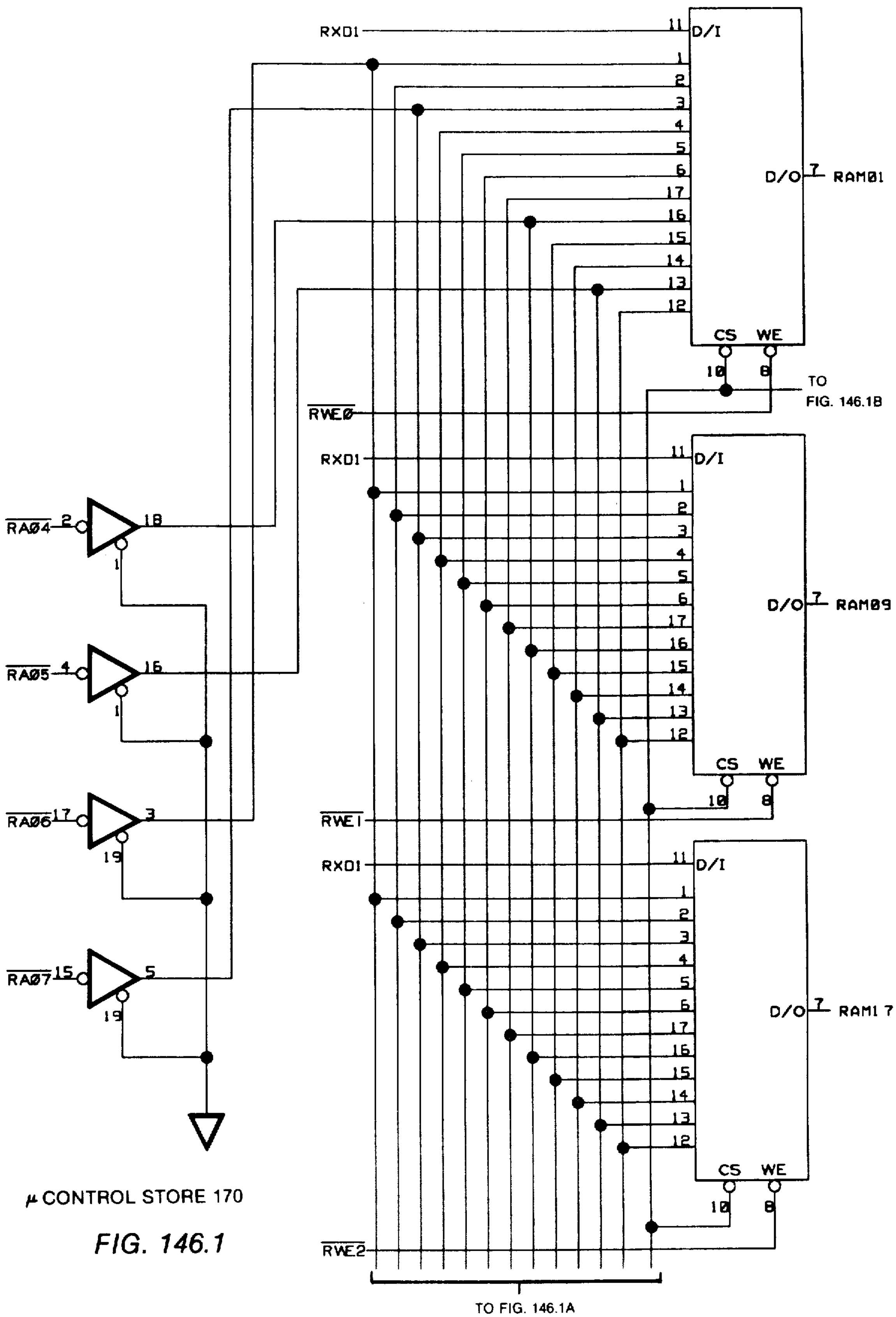
μ CONTROL STORE 170
FIG. 146.1

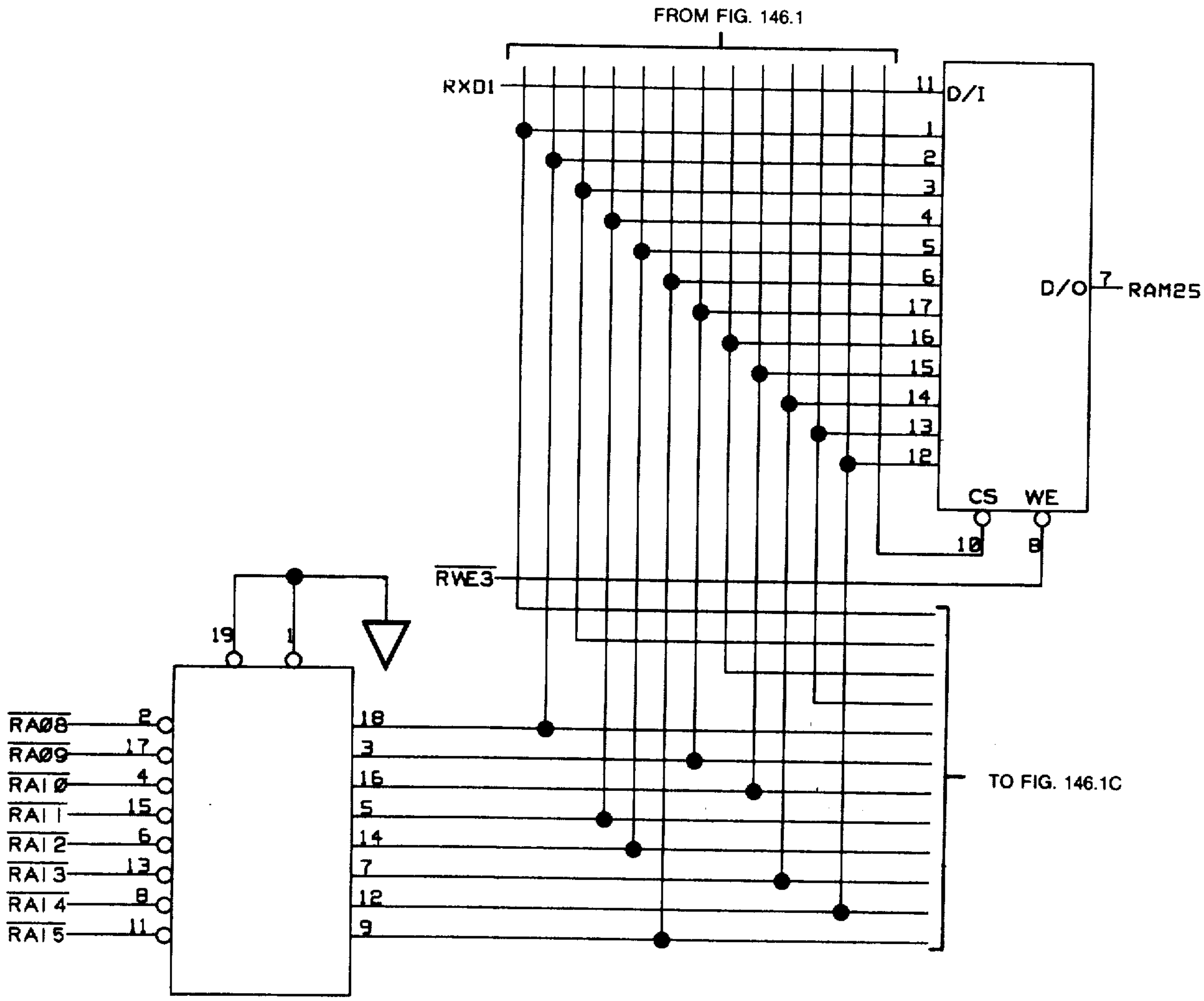
FIG. 146.1A

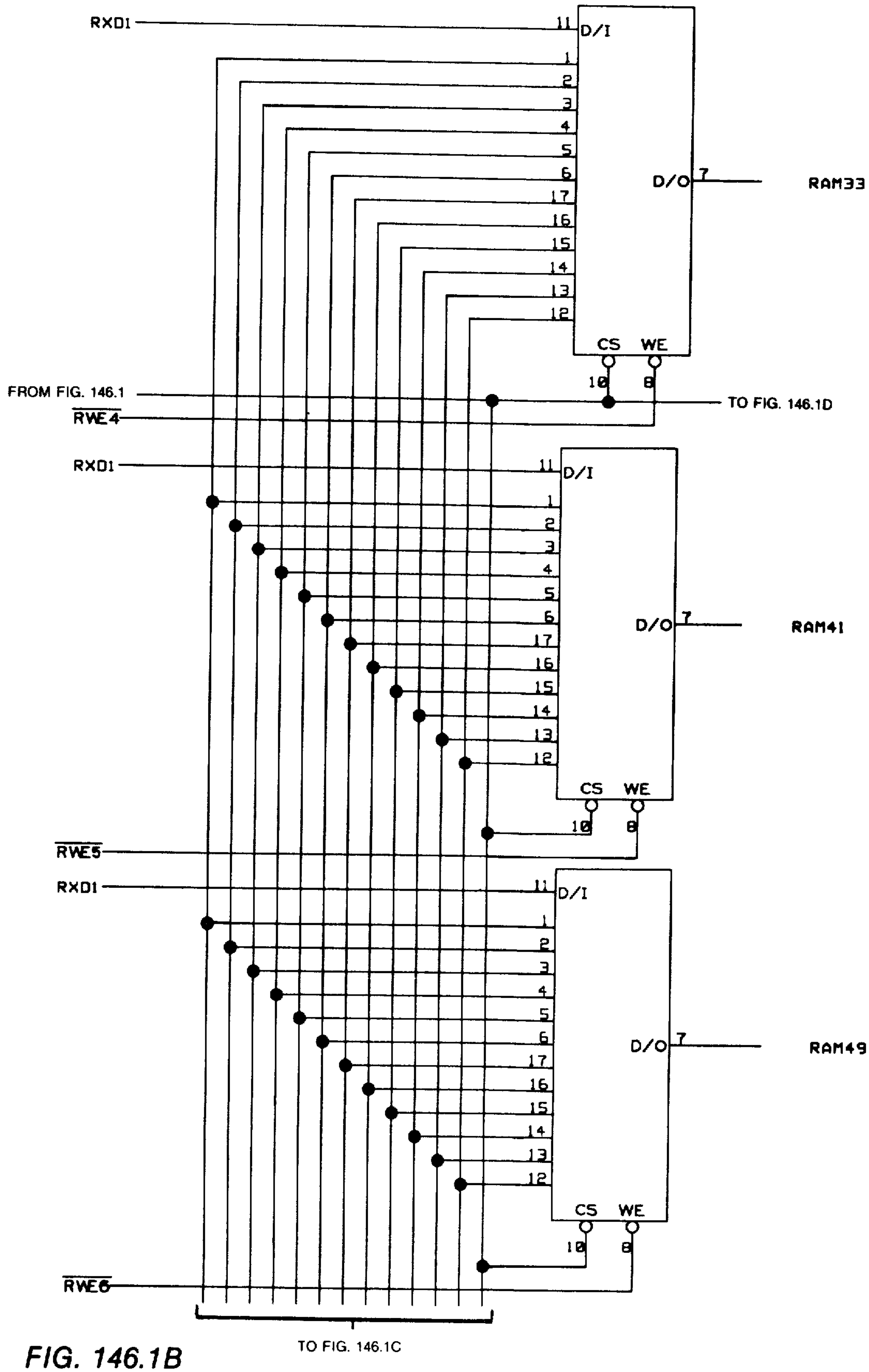
FIG. 146.1B

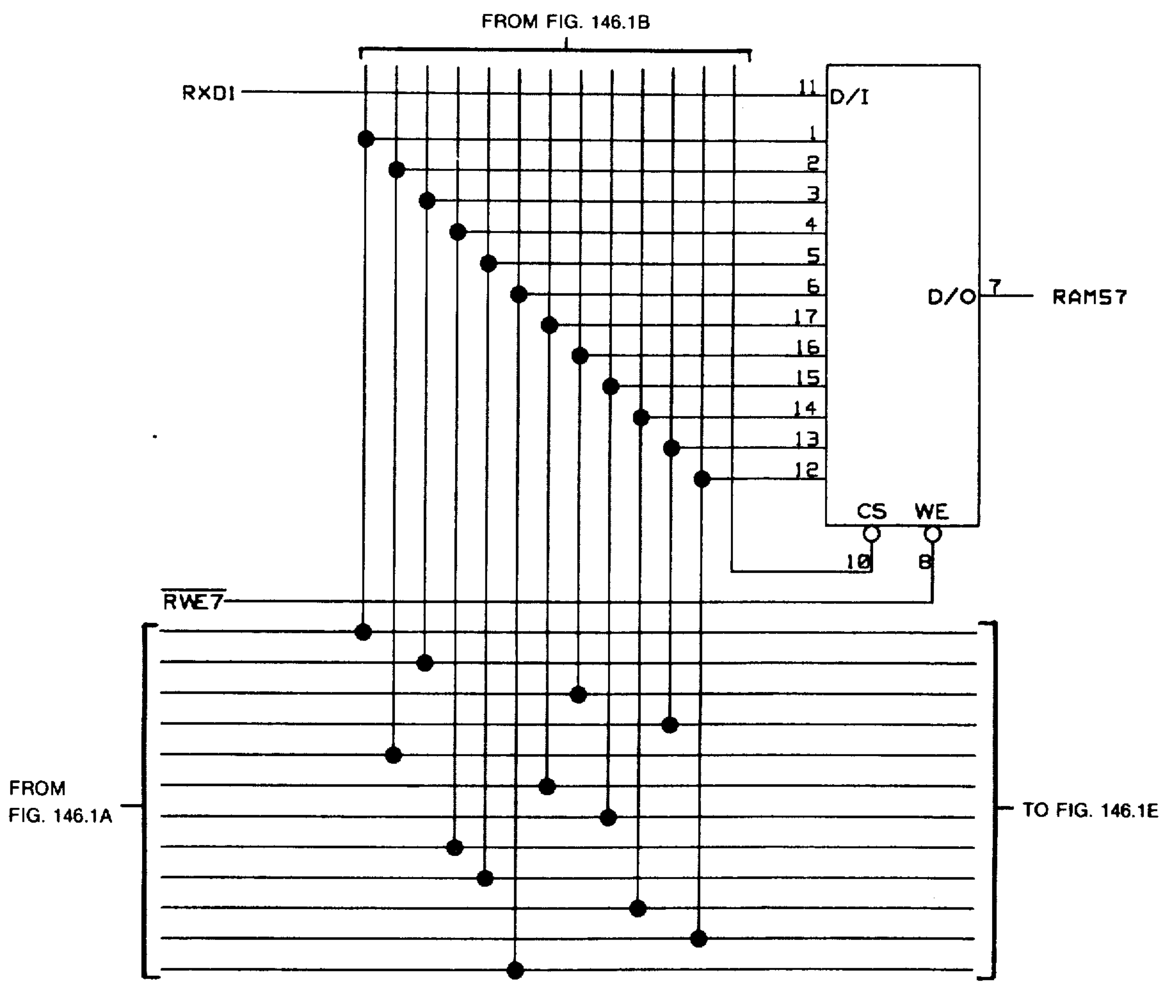
FIG. 146.1C

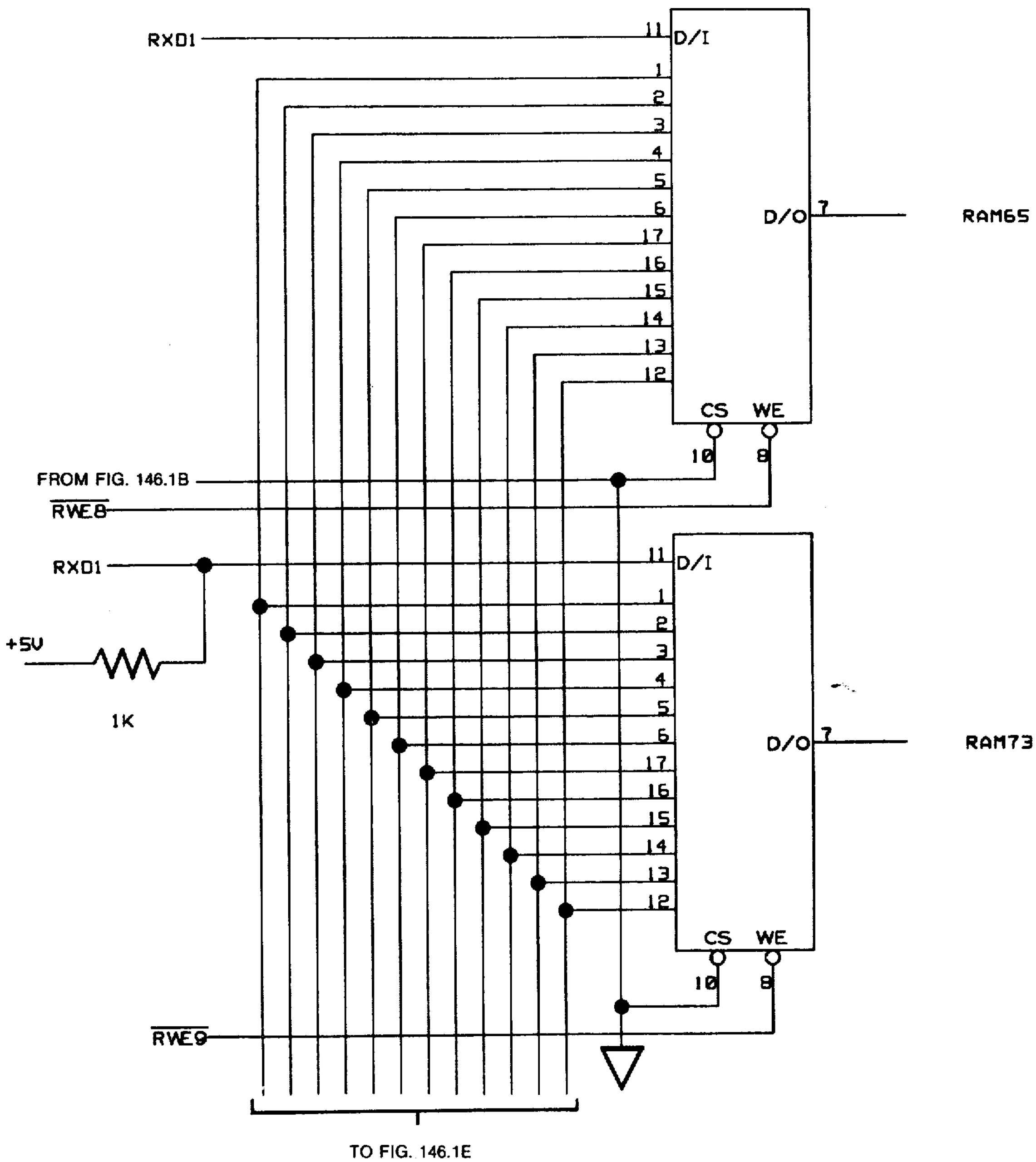
FIG. 146.1D

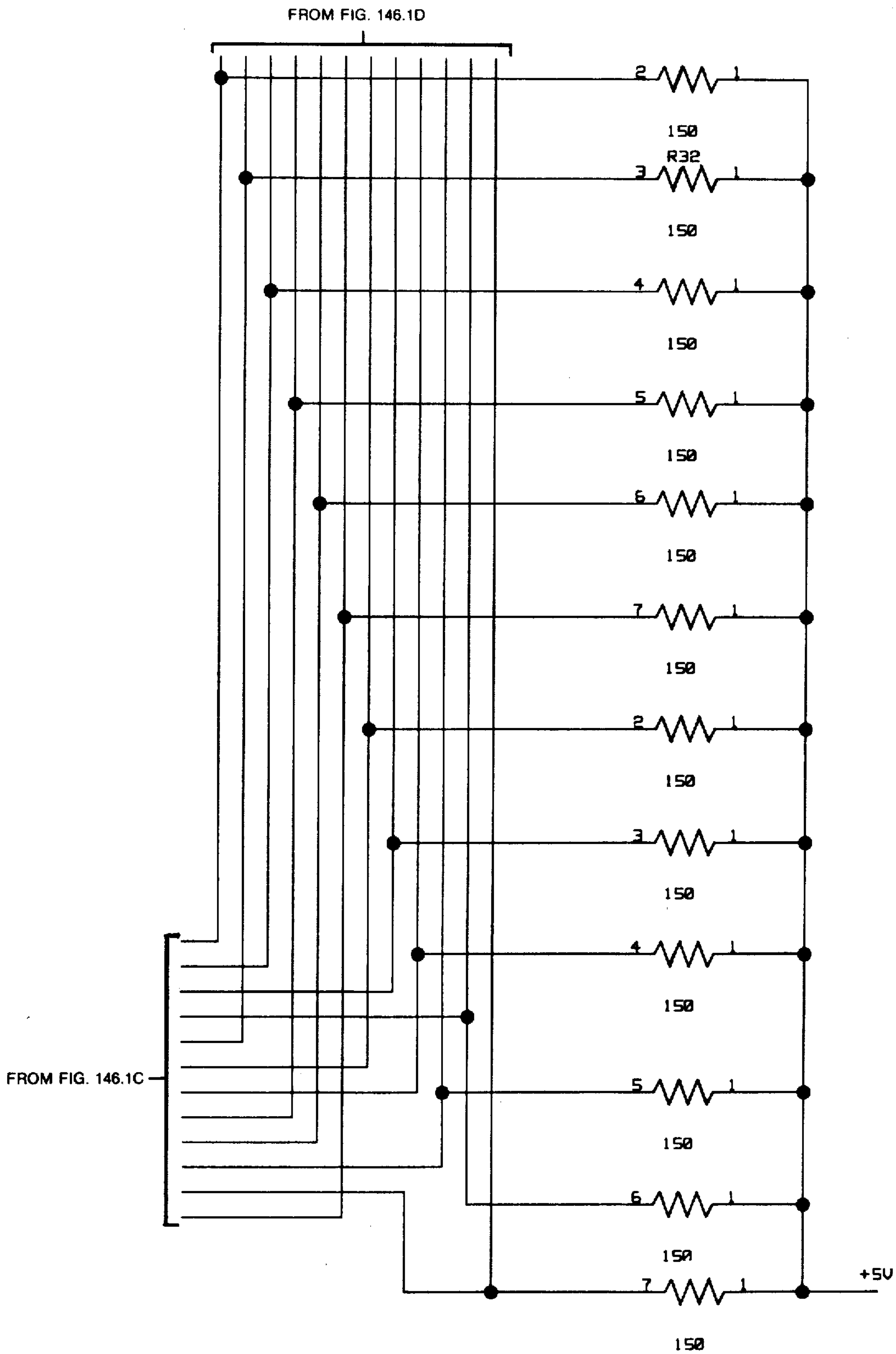
FIG. 146.1E

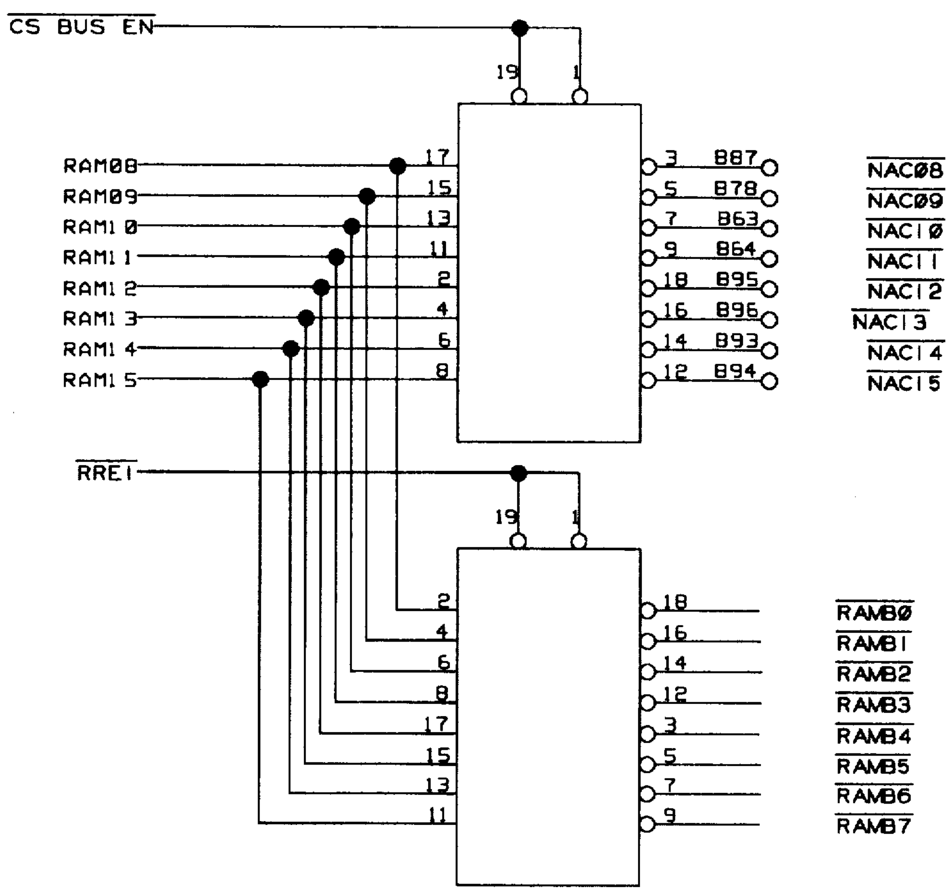
FIG. 146.1F

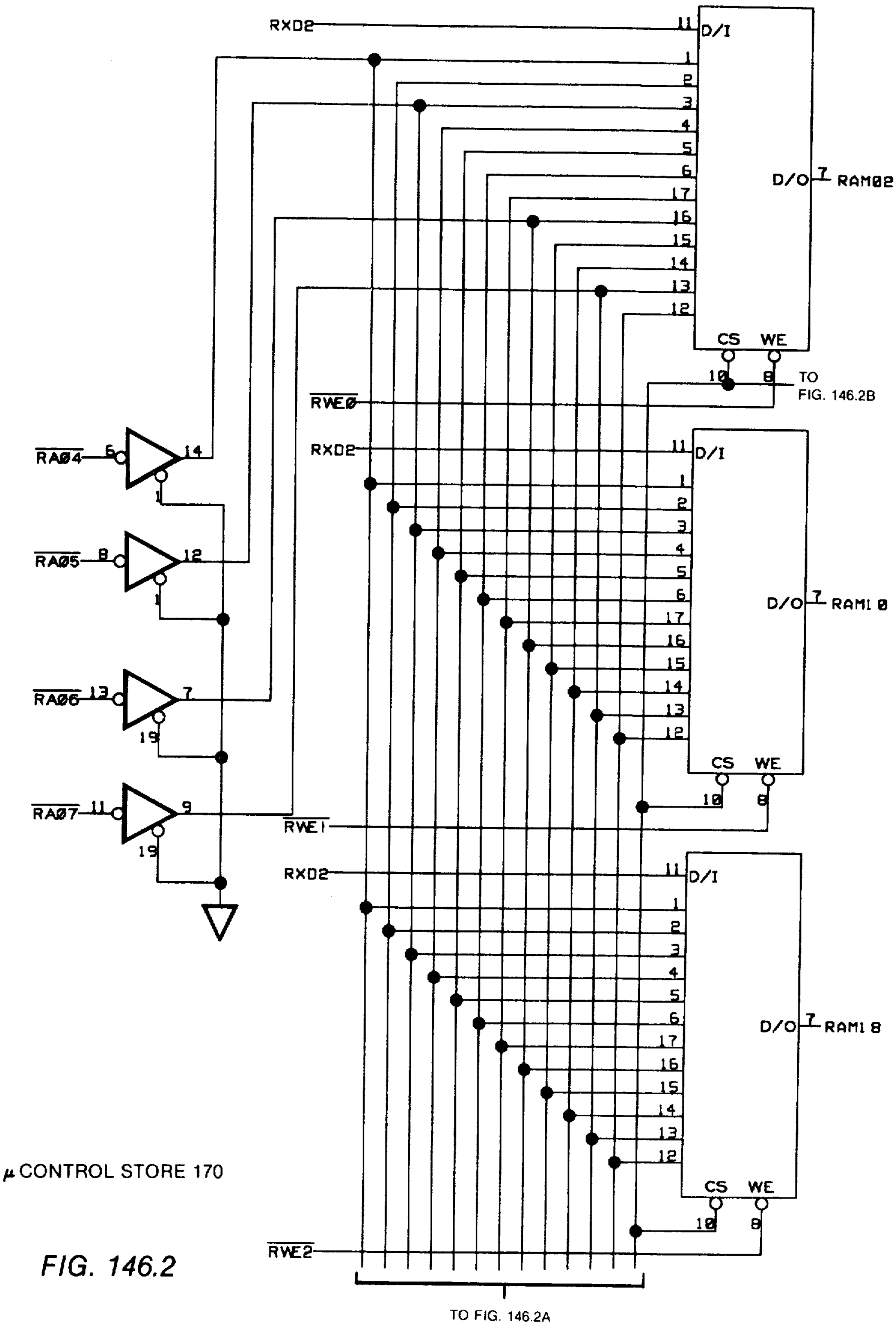
μ CONTROL STORE 170
FIG. 146.2

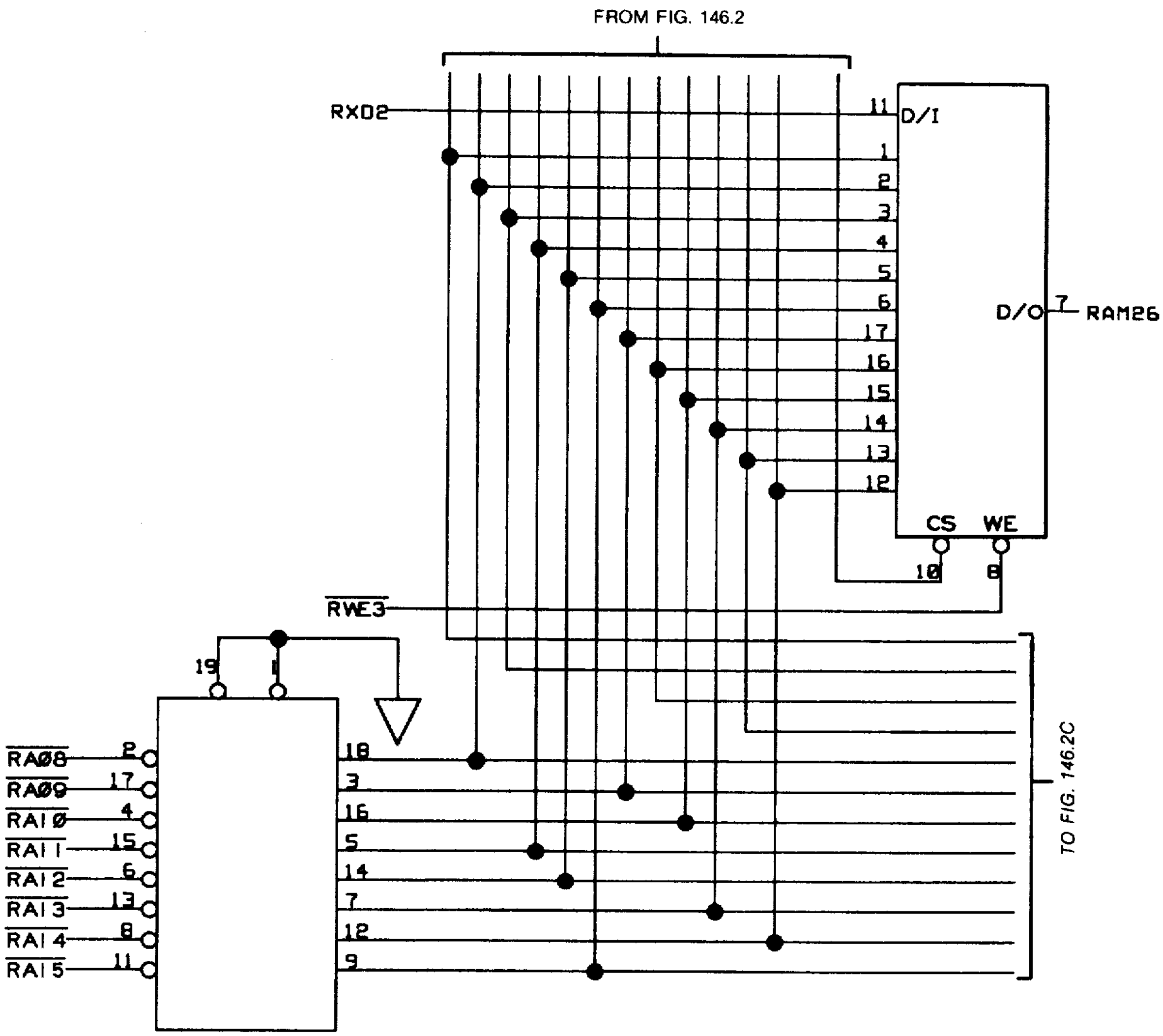
FIG. 146.2A

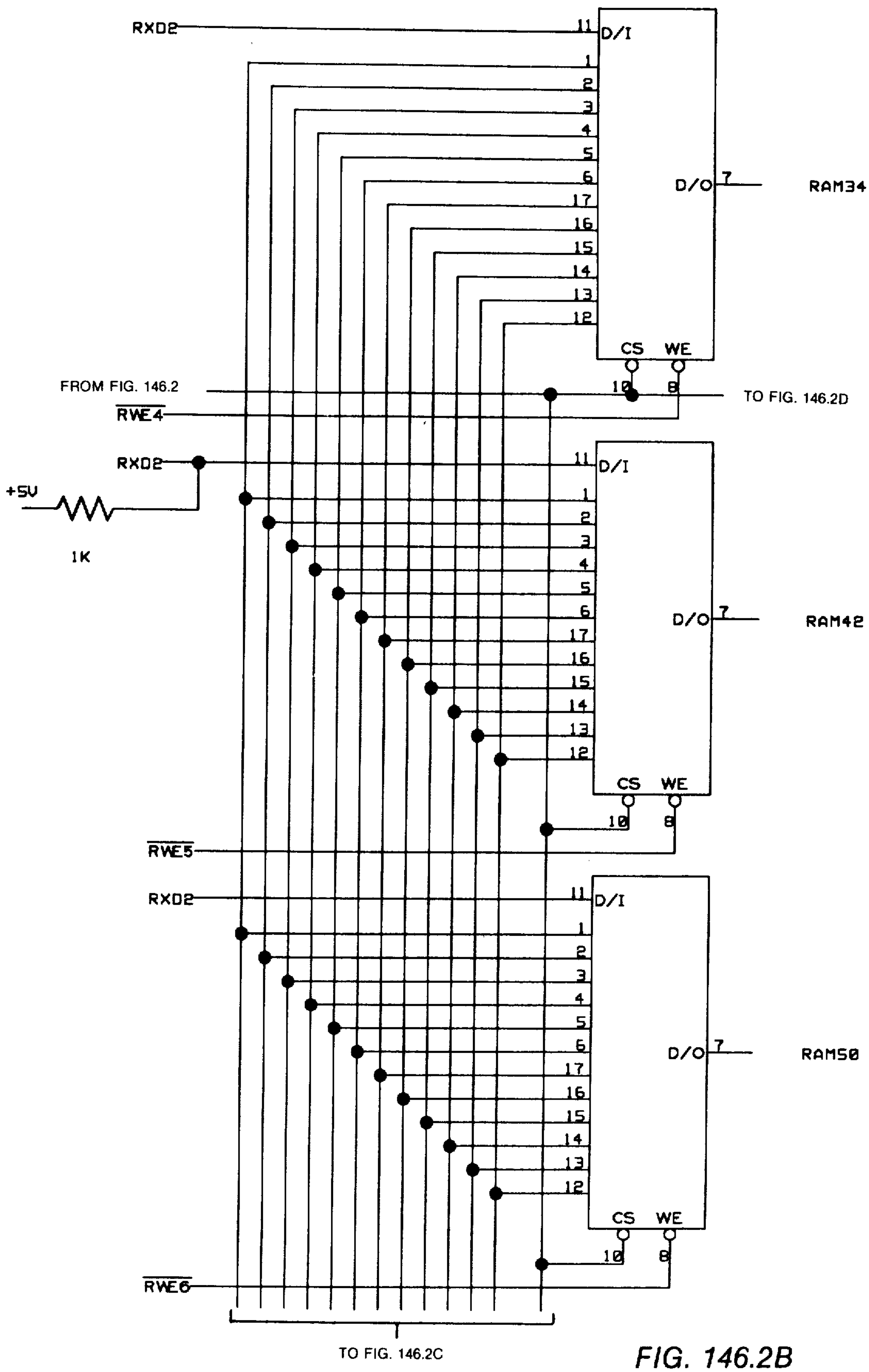
FIG. 146.2B

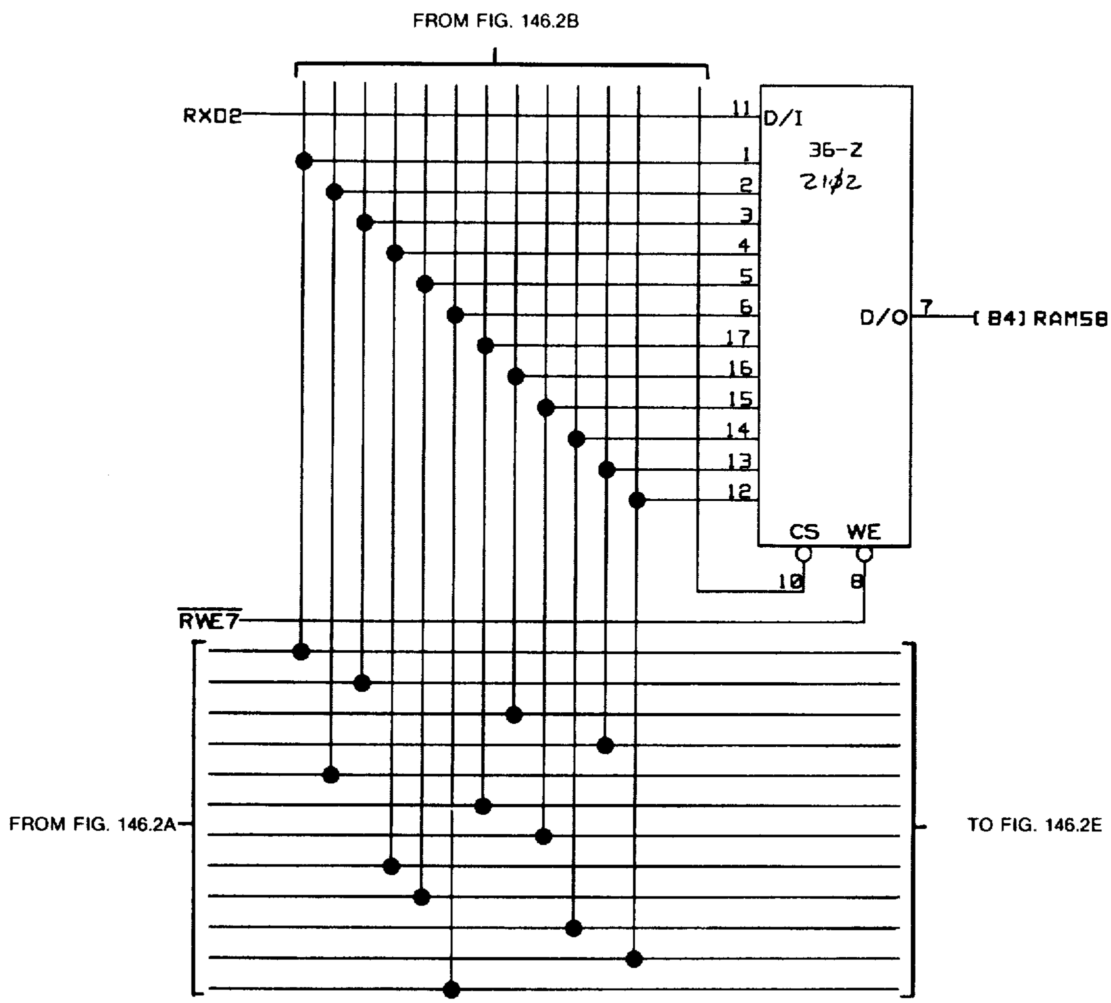
FIG. 146.2C

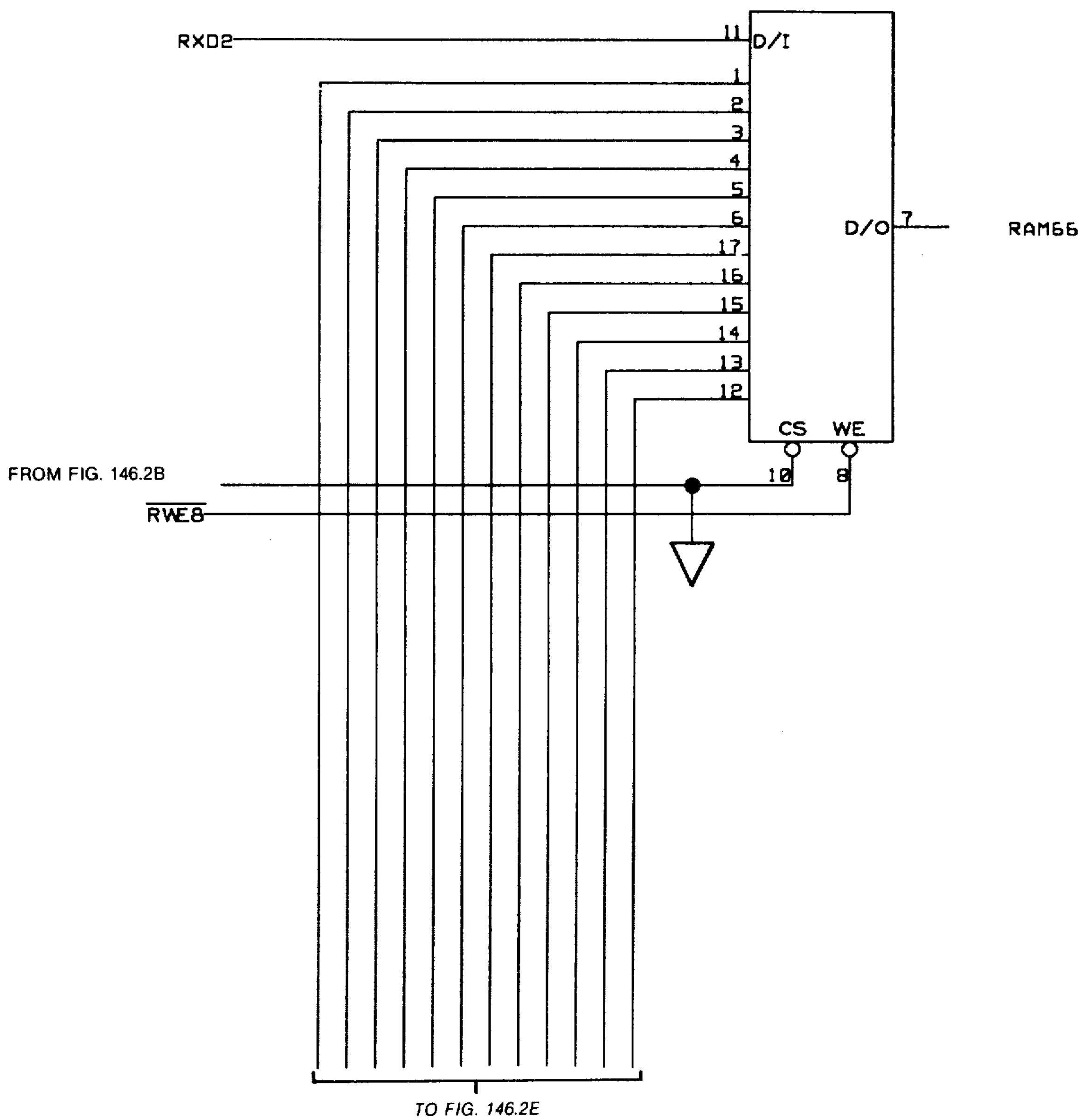
FIG. 146.2D

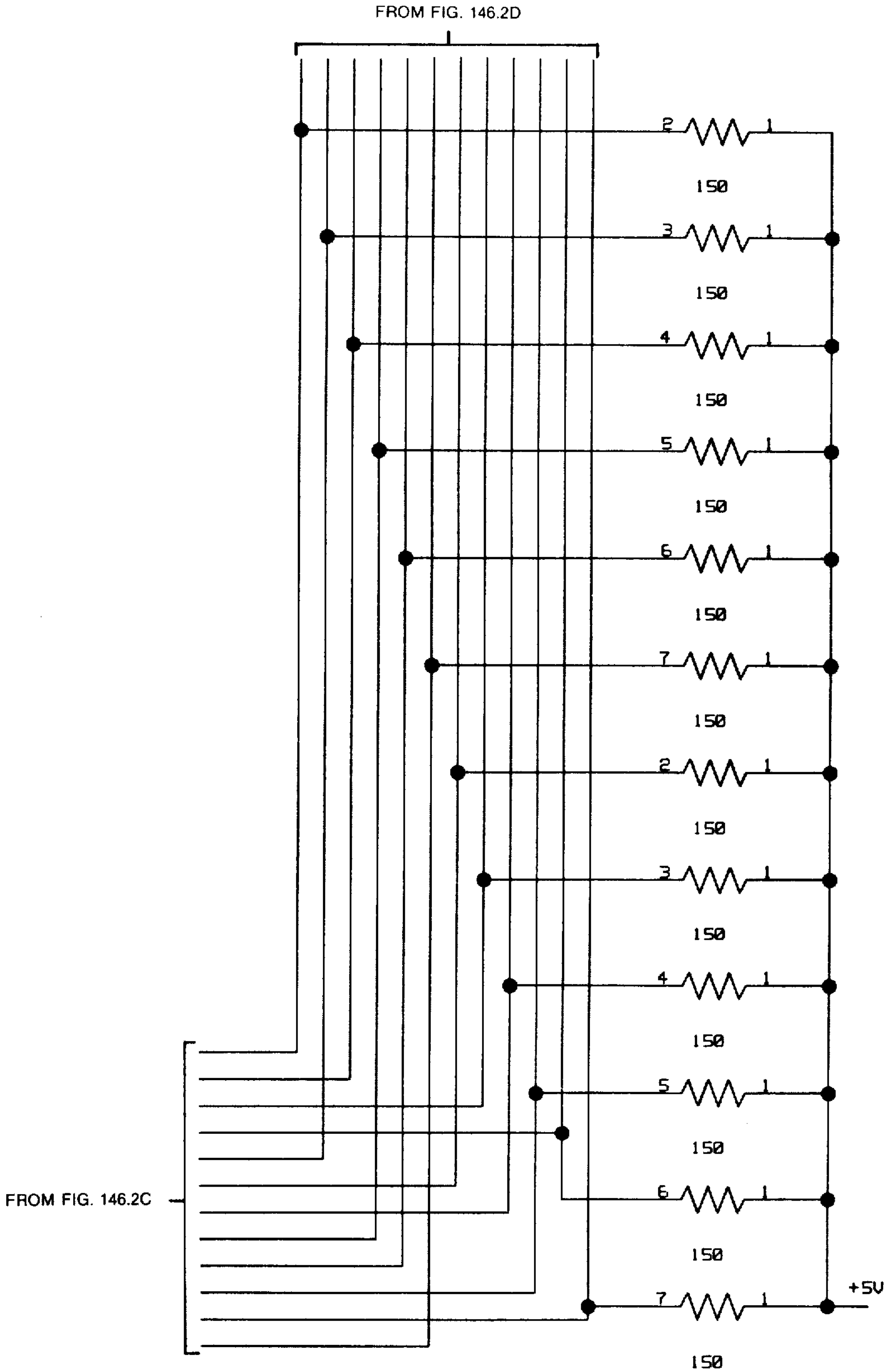
FIG. 146.2E

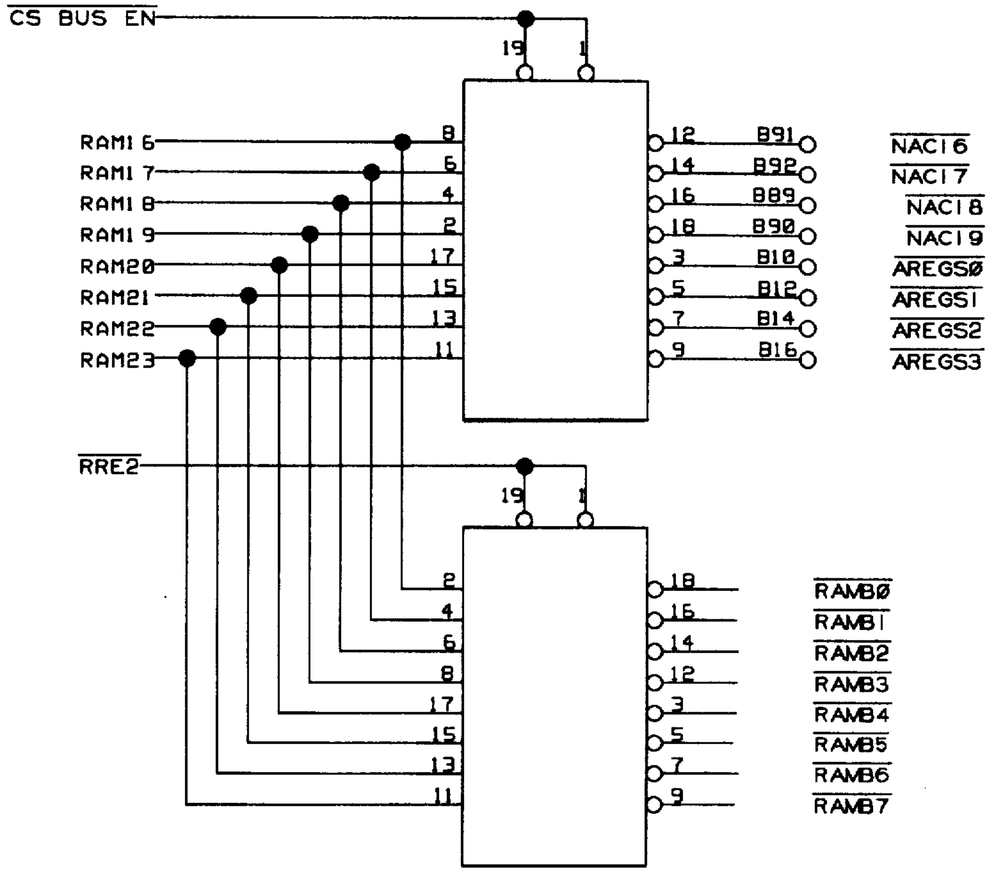
FIG. 146.2F

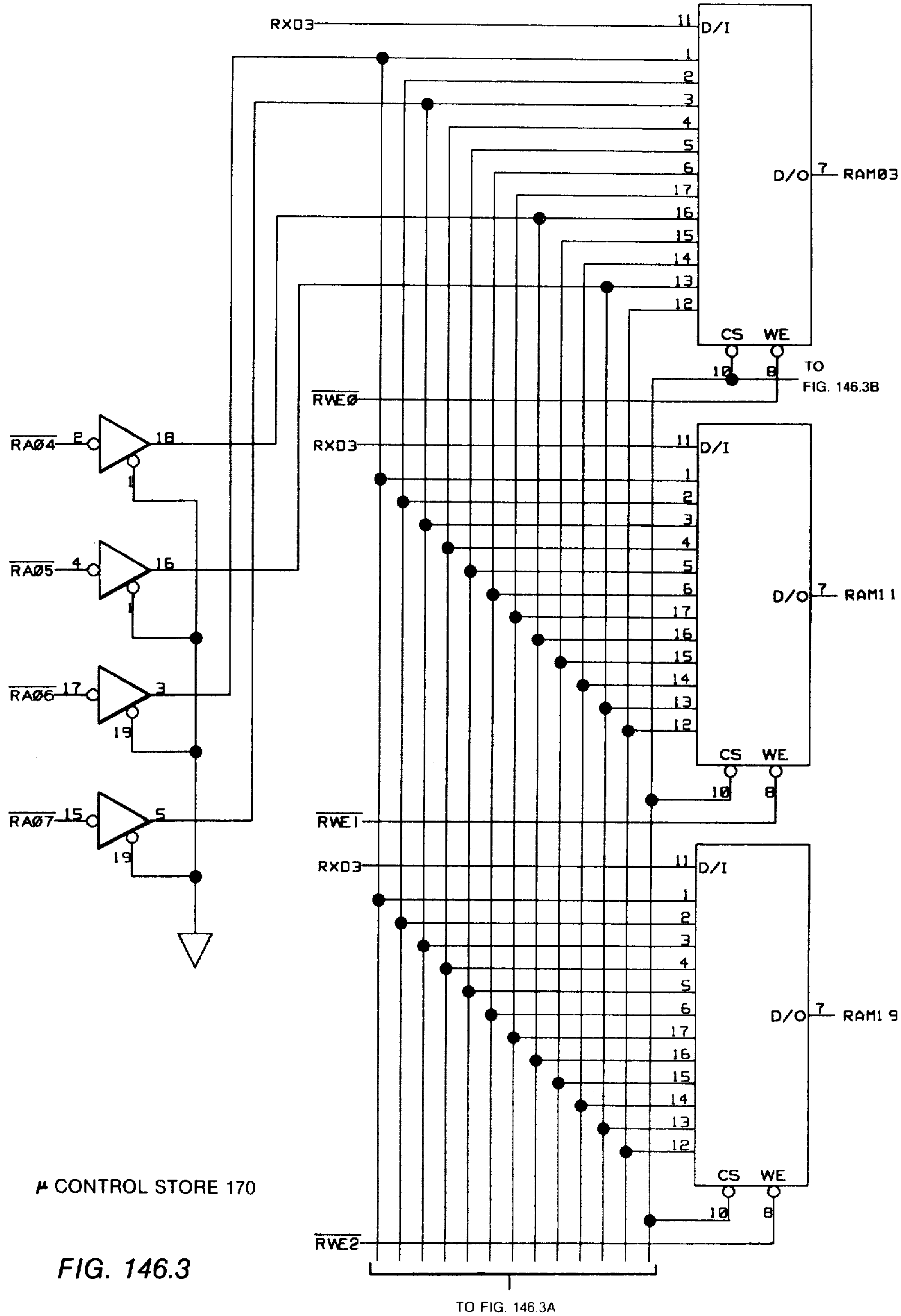
μ CONTROL STORE 170
*FIG. 146.3*

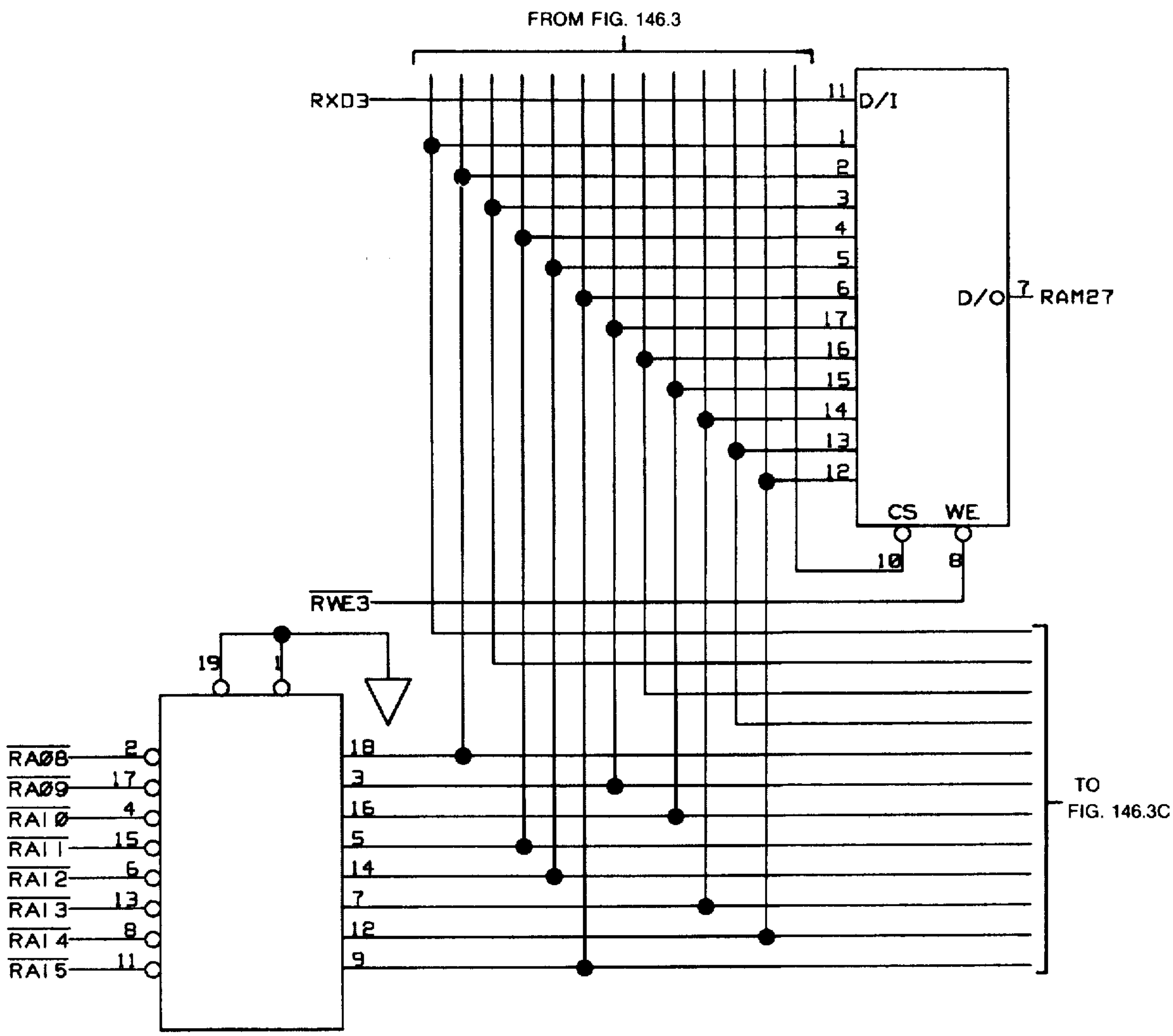
FIG. 146.3A

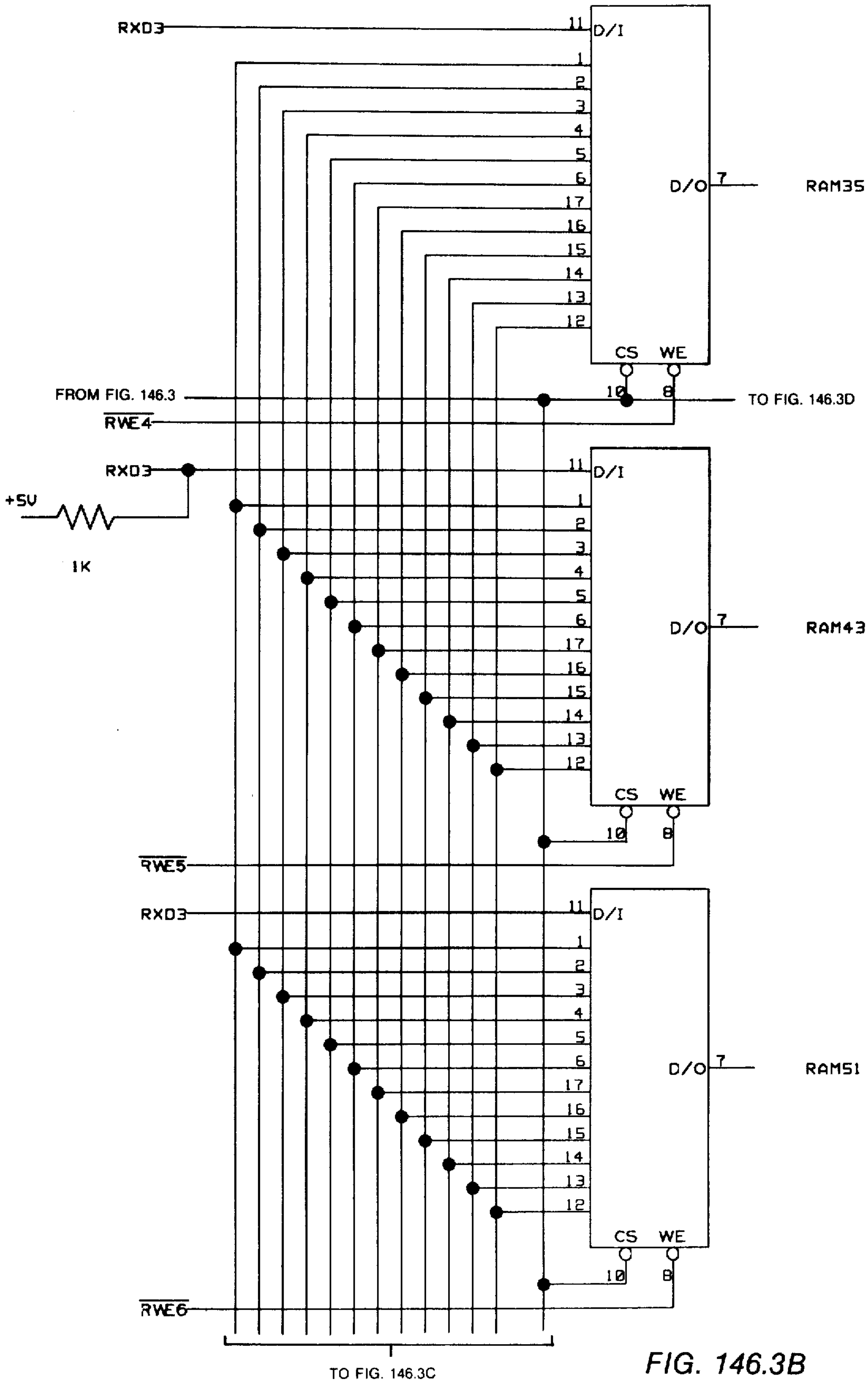
FIG. 146.3B

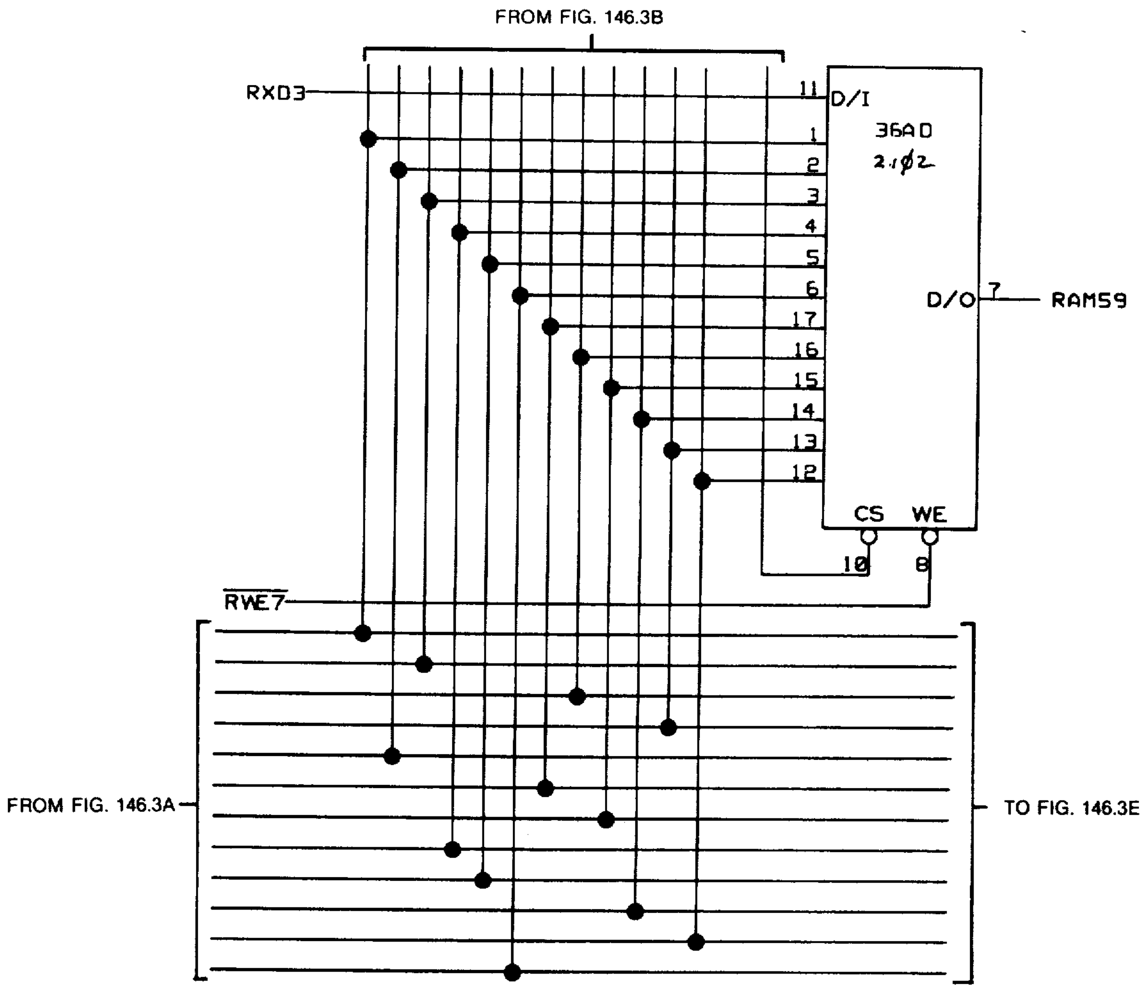
FIG. 146.3C

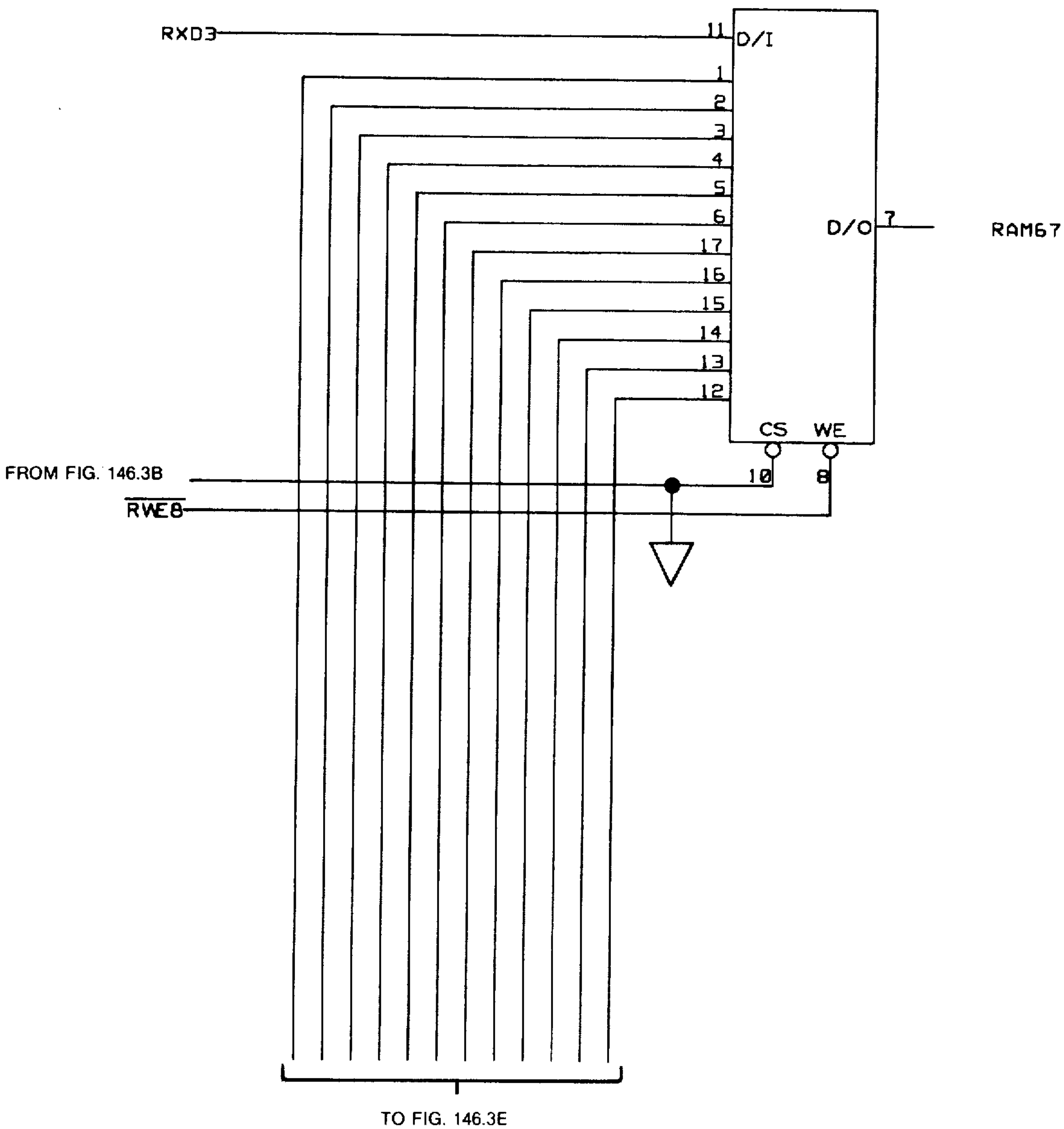
FIG. 146.3D

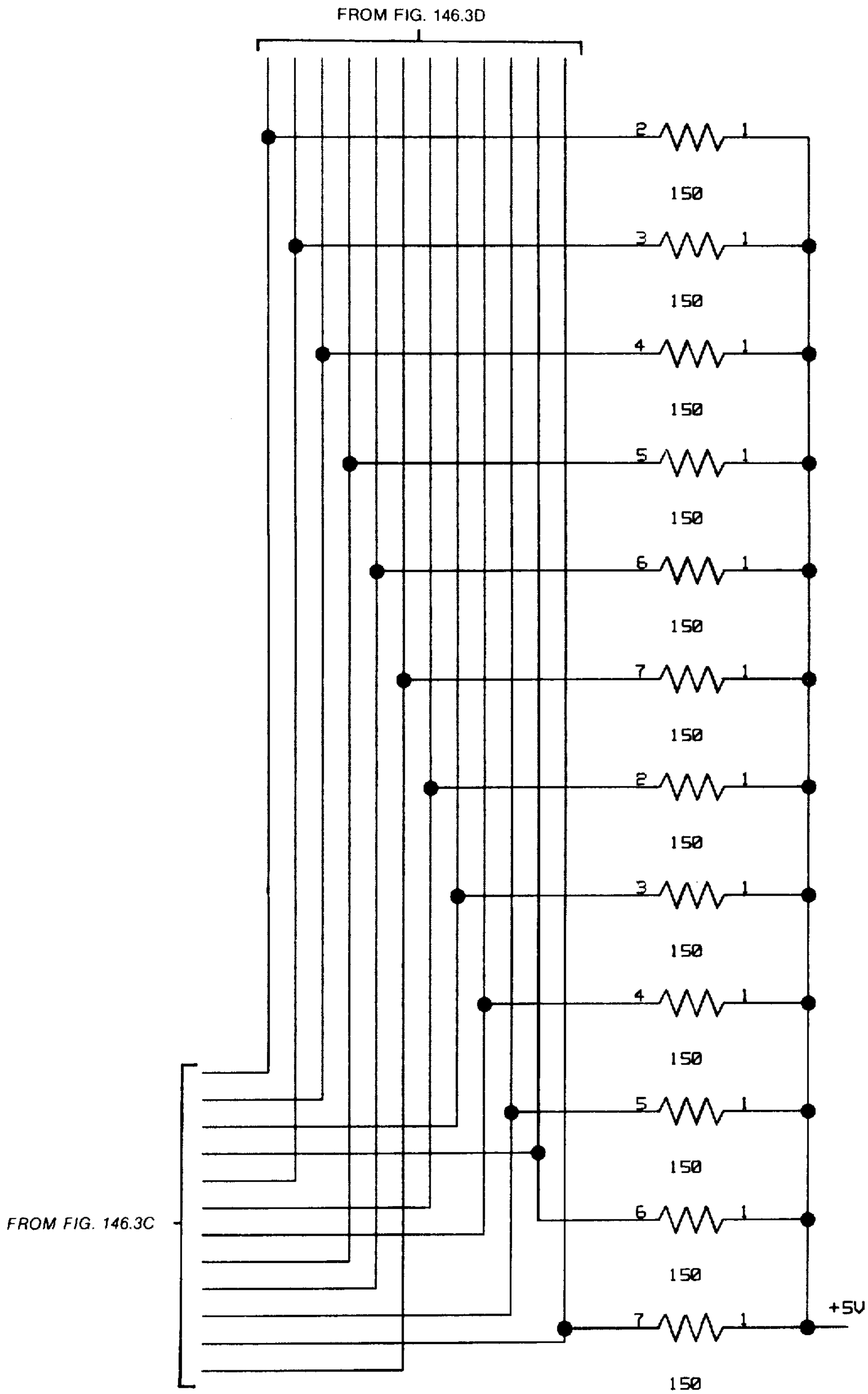
FIG. 146.3E

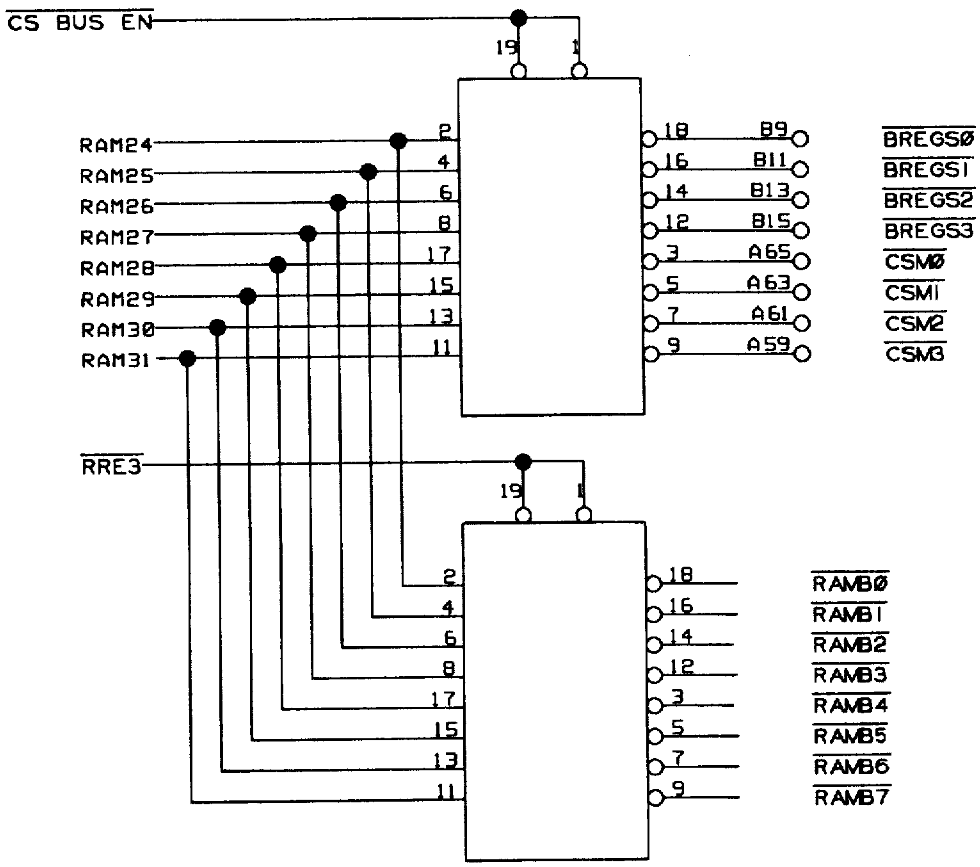
FIG. 146.3F

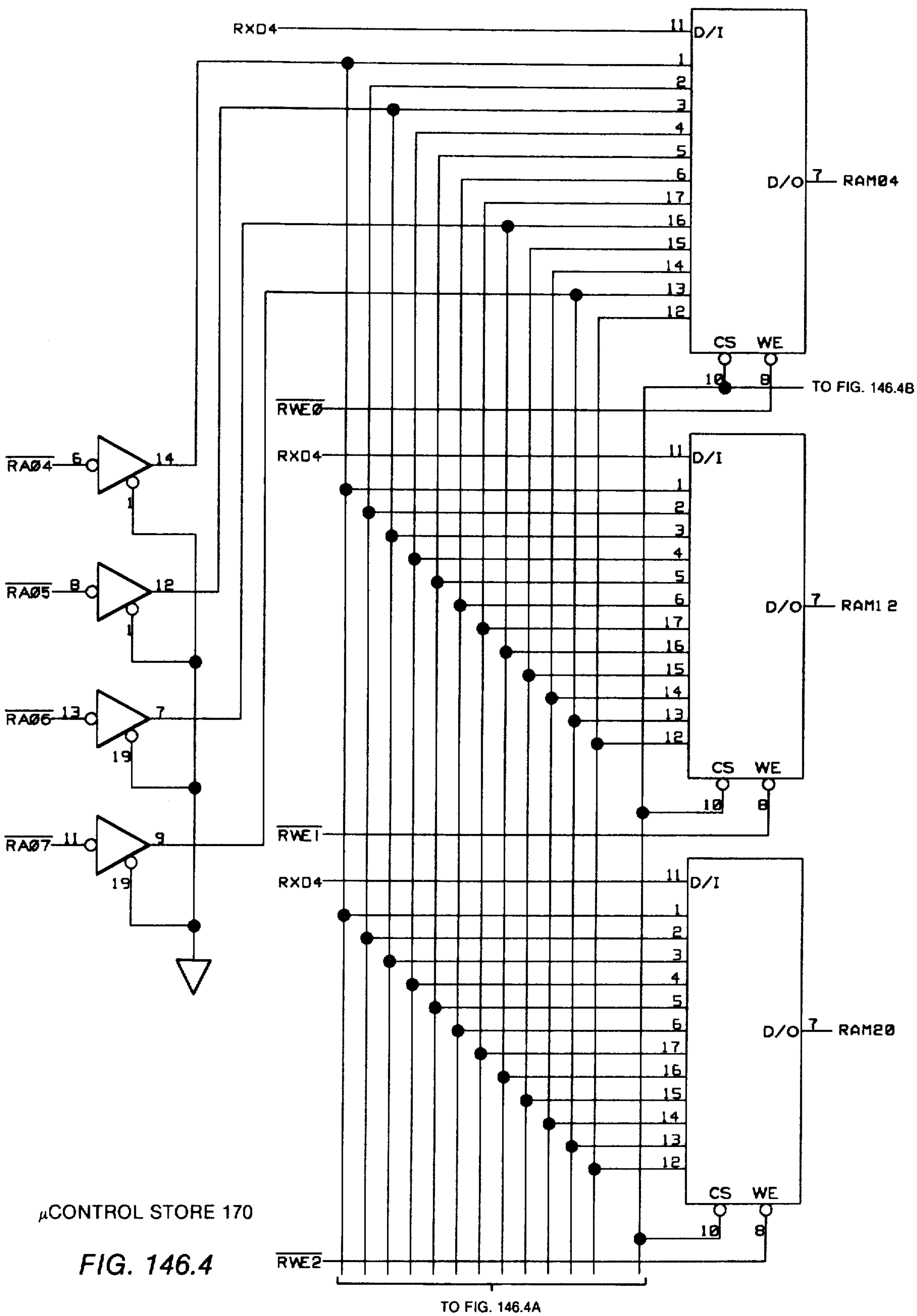
μCONTROL STORE 170
FIG. 146.4

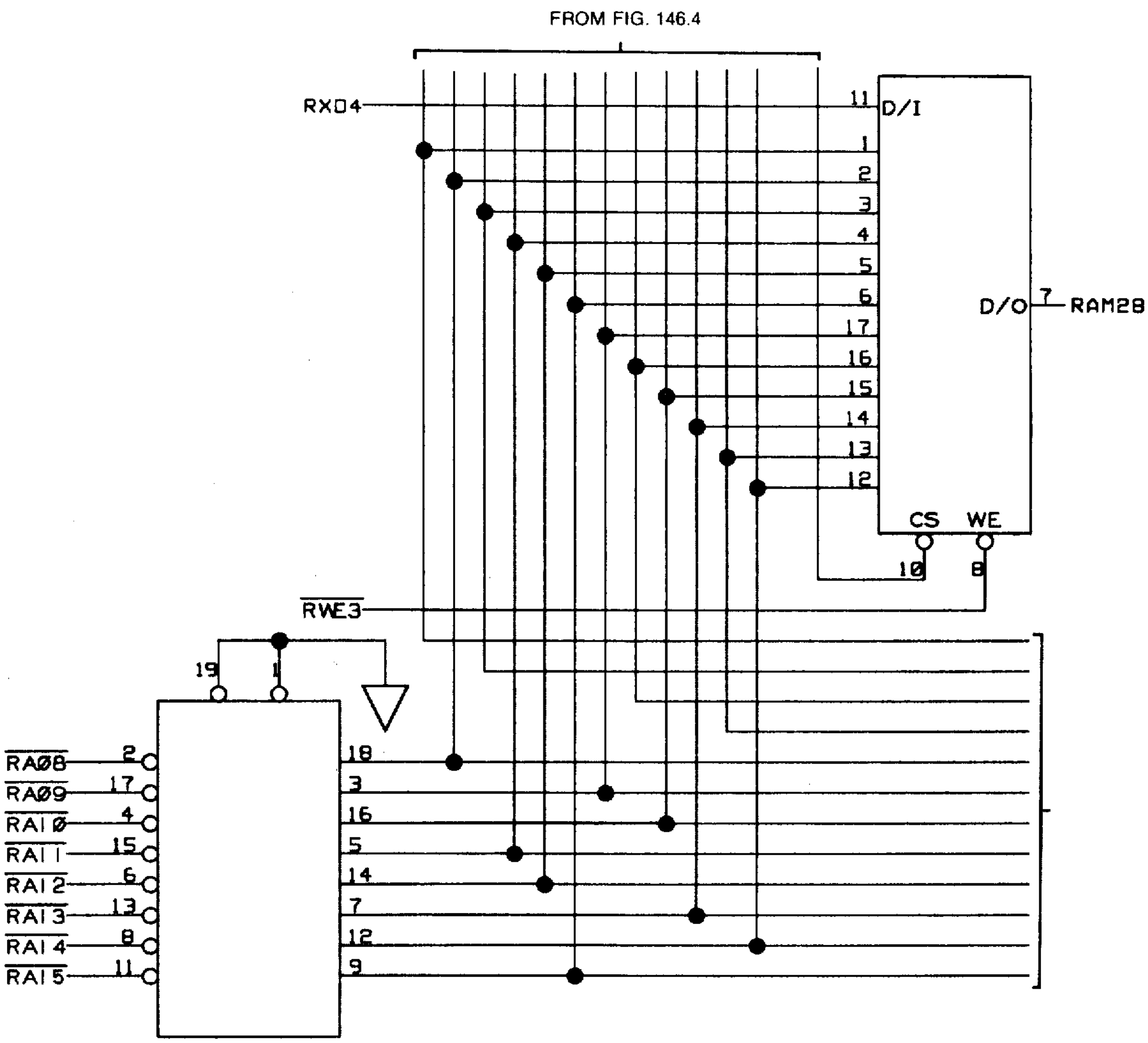
FIG. 146.4A

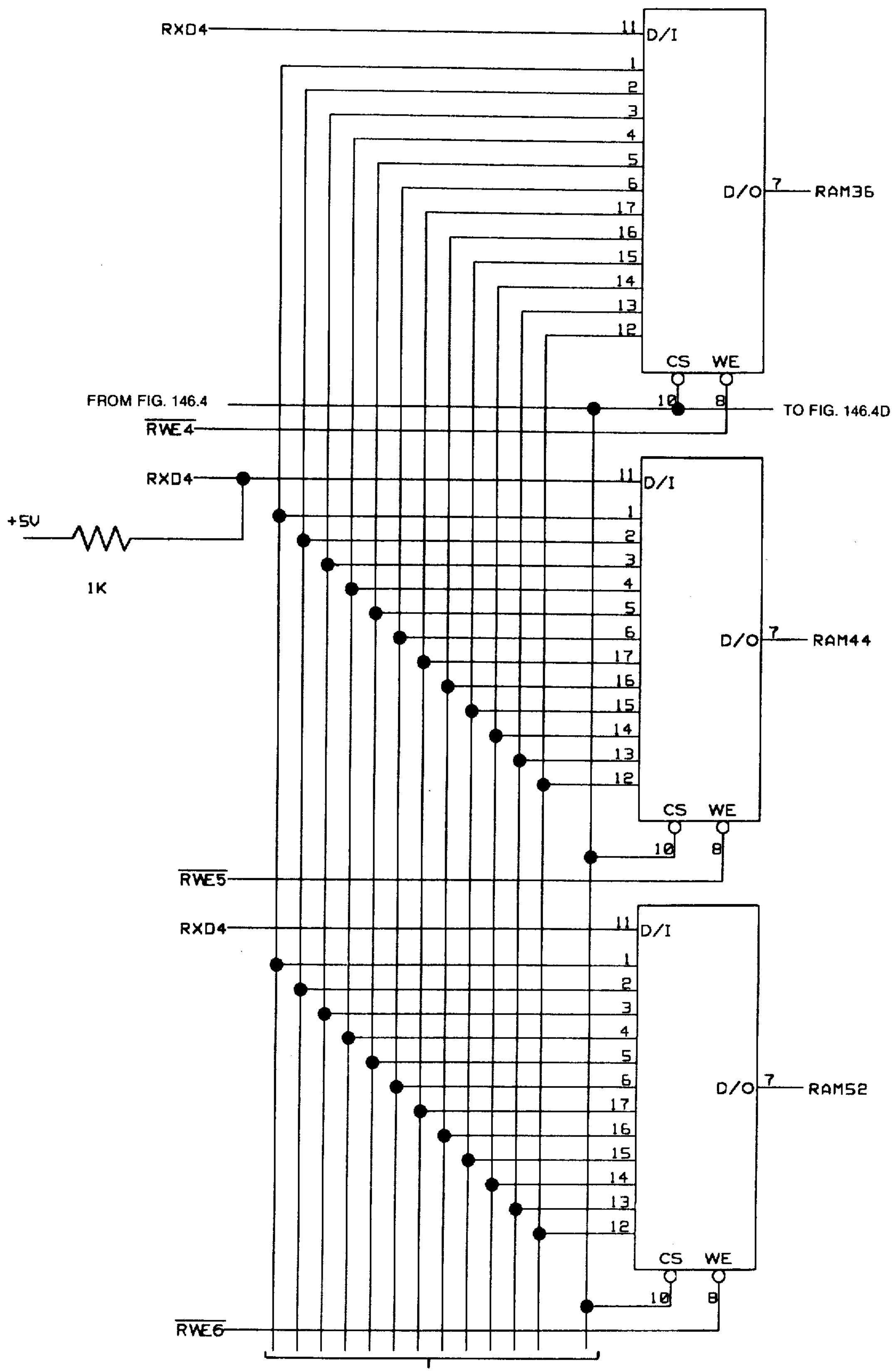
FIG. 146.4B

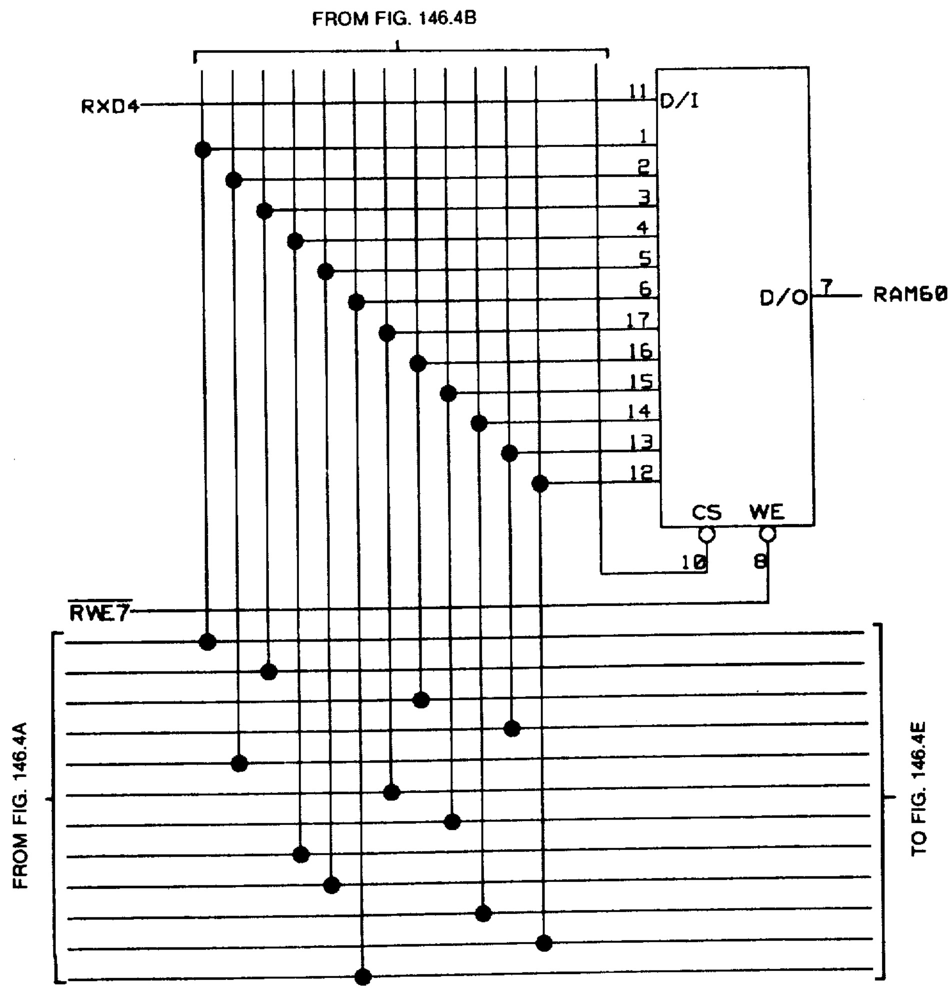
*FIG. 146.4C*

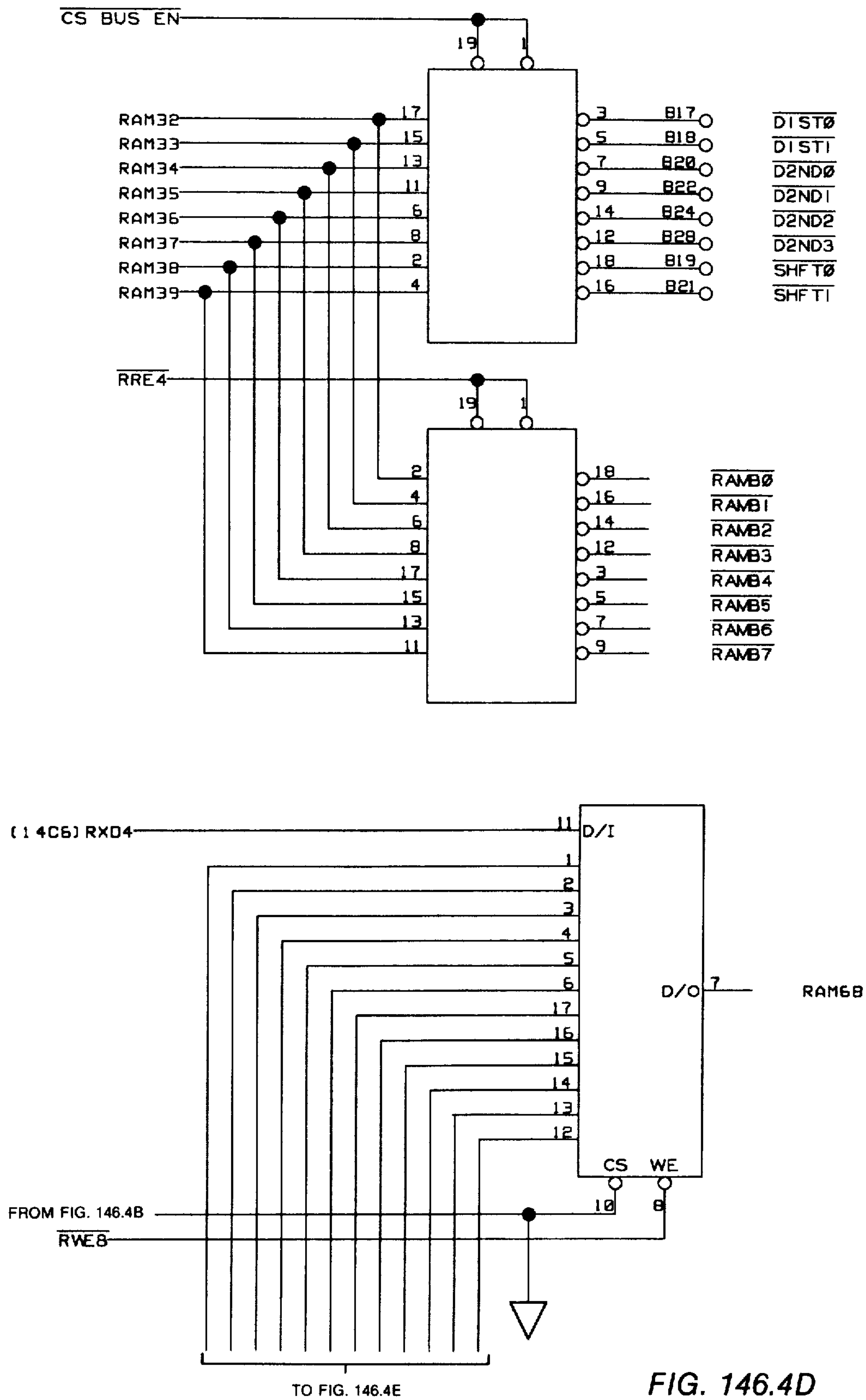
FIG. 146.4D

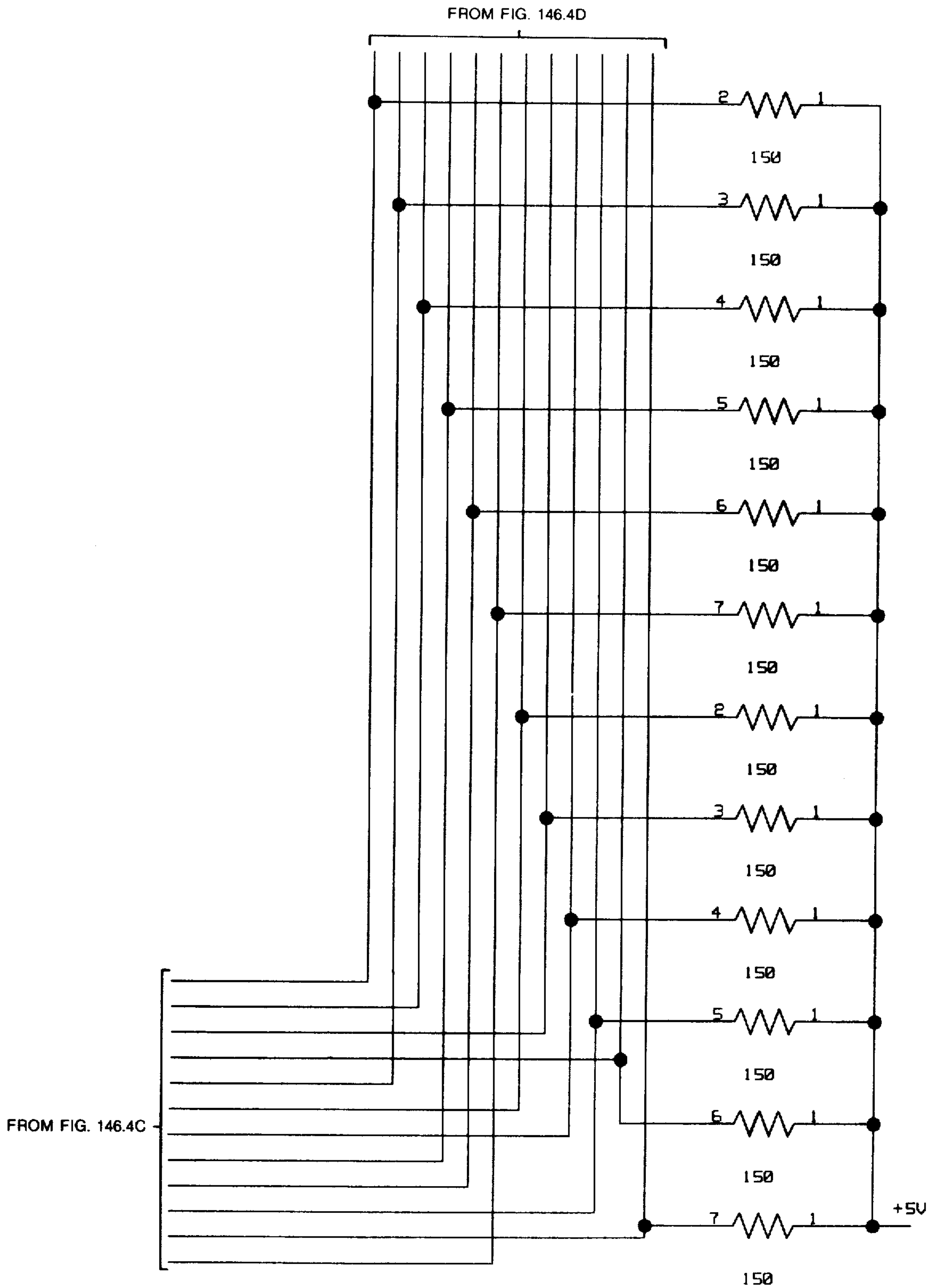
FIG. 146.4E

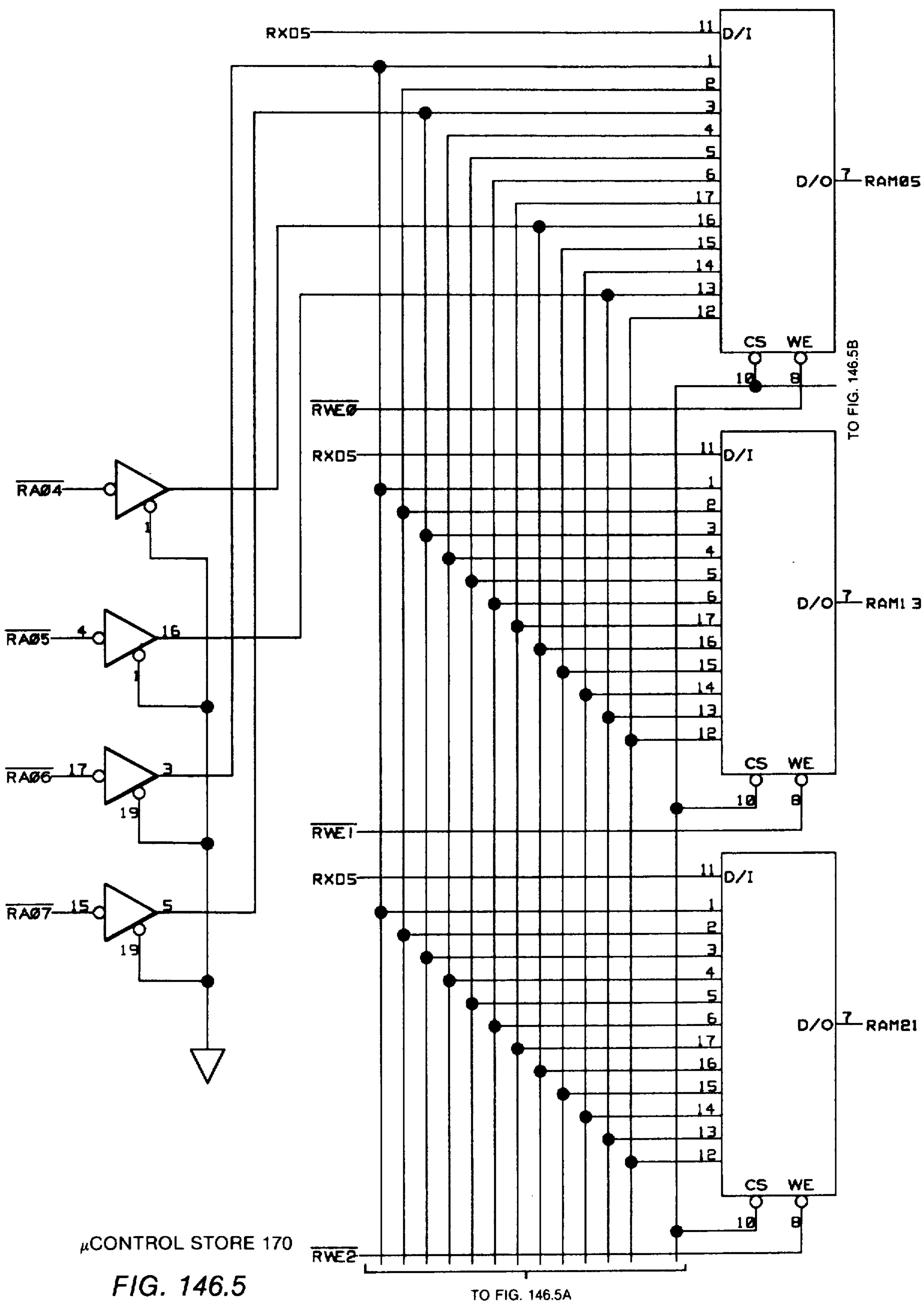
μCONTROL STORE 170
*FIG. 146.5*

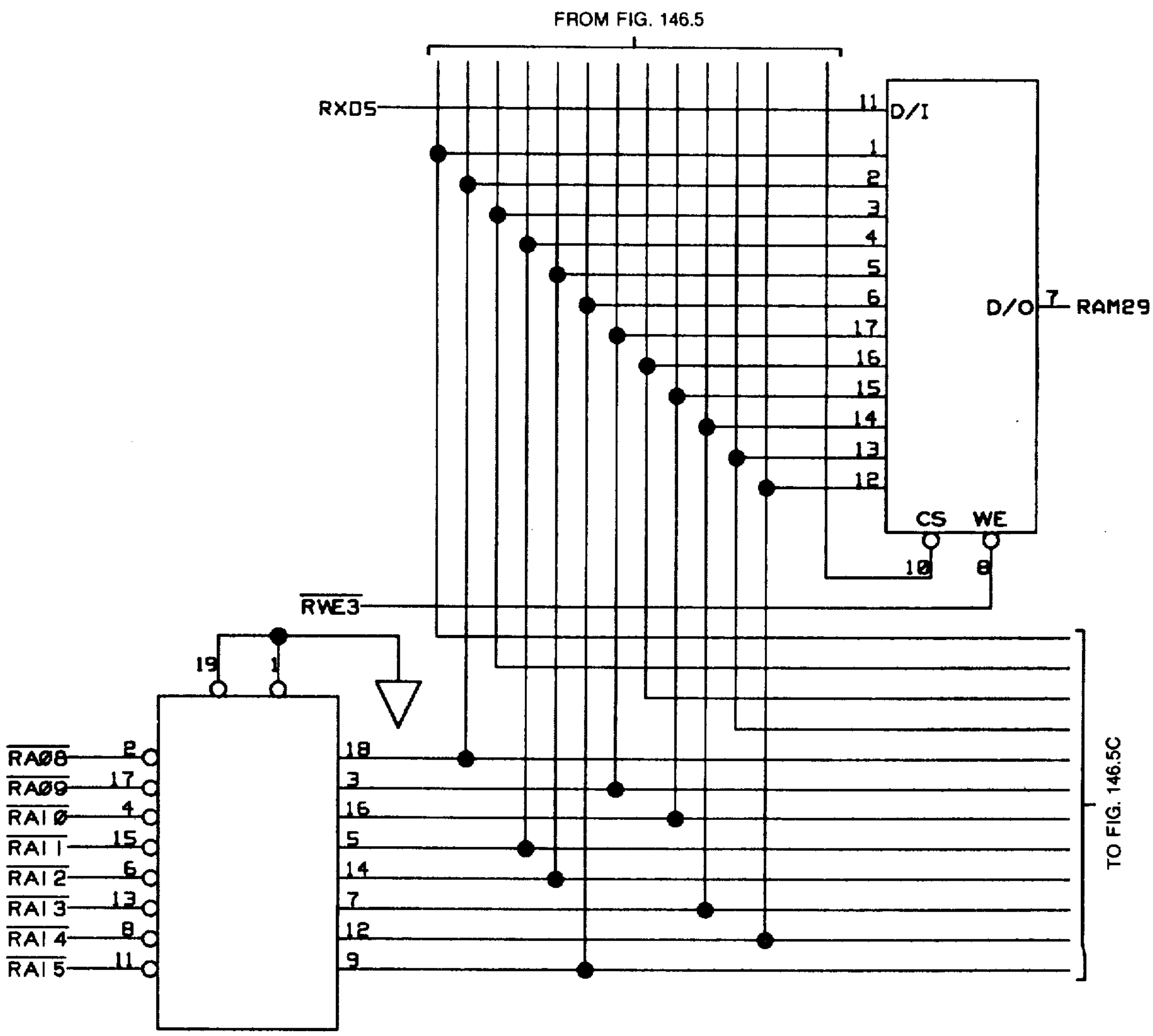
FIG. 146.5A

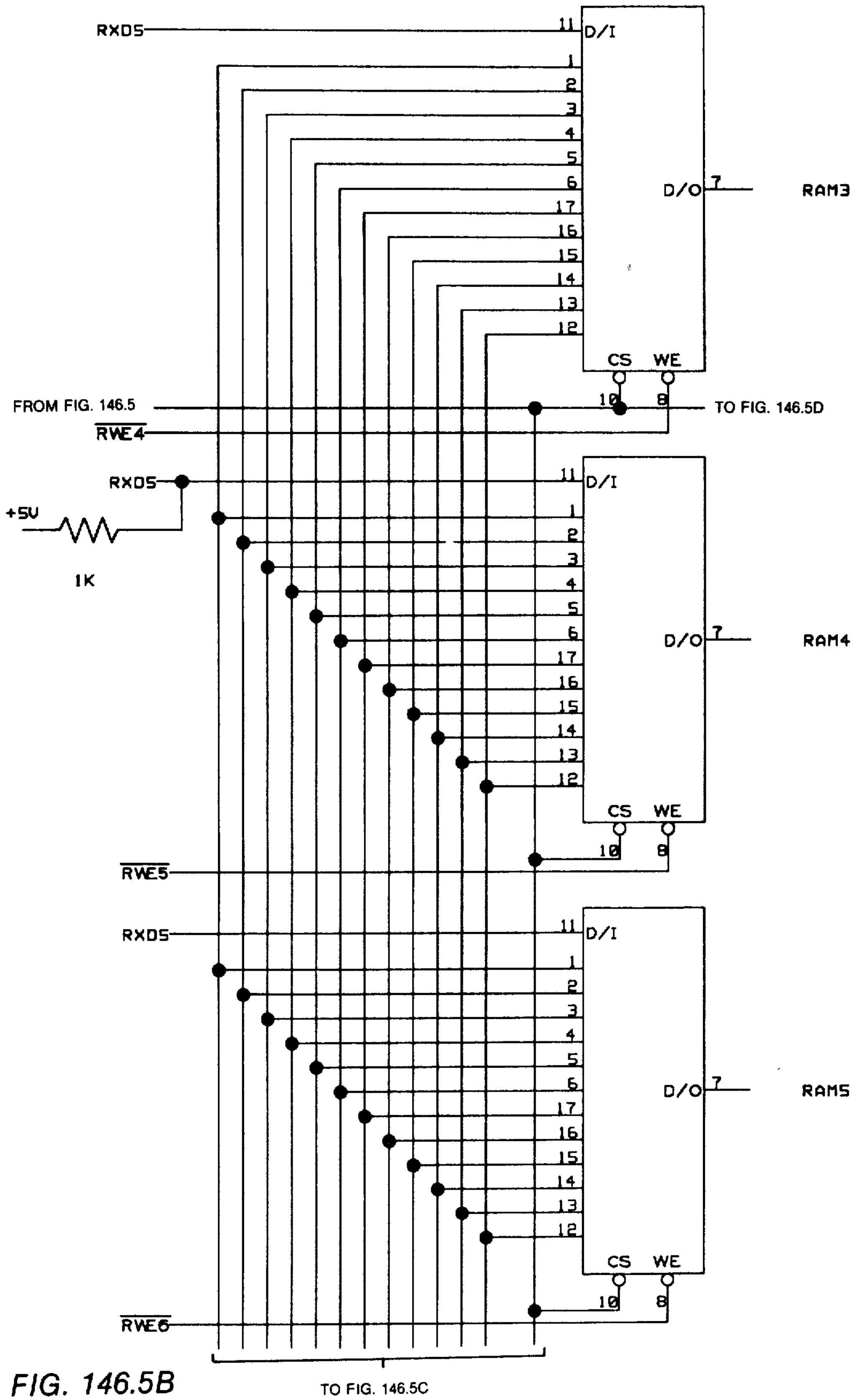
FIG. 146.5B

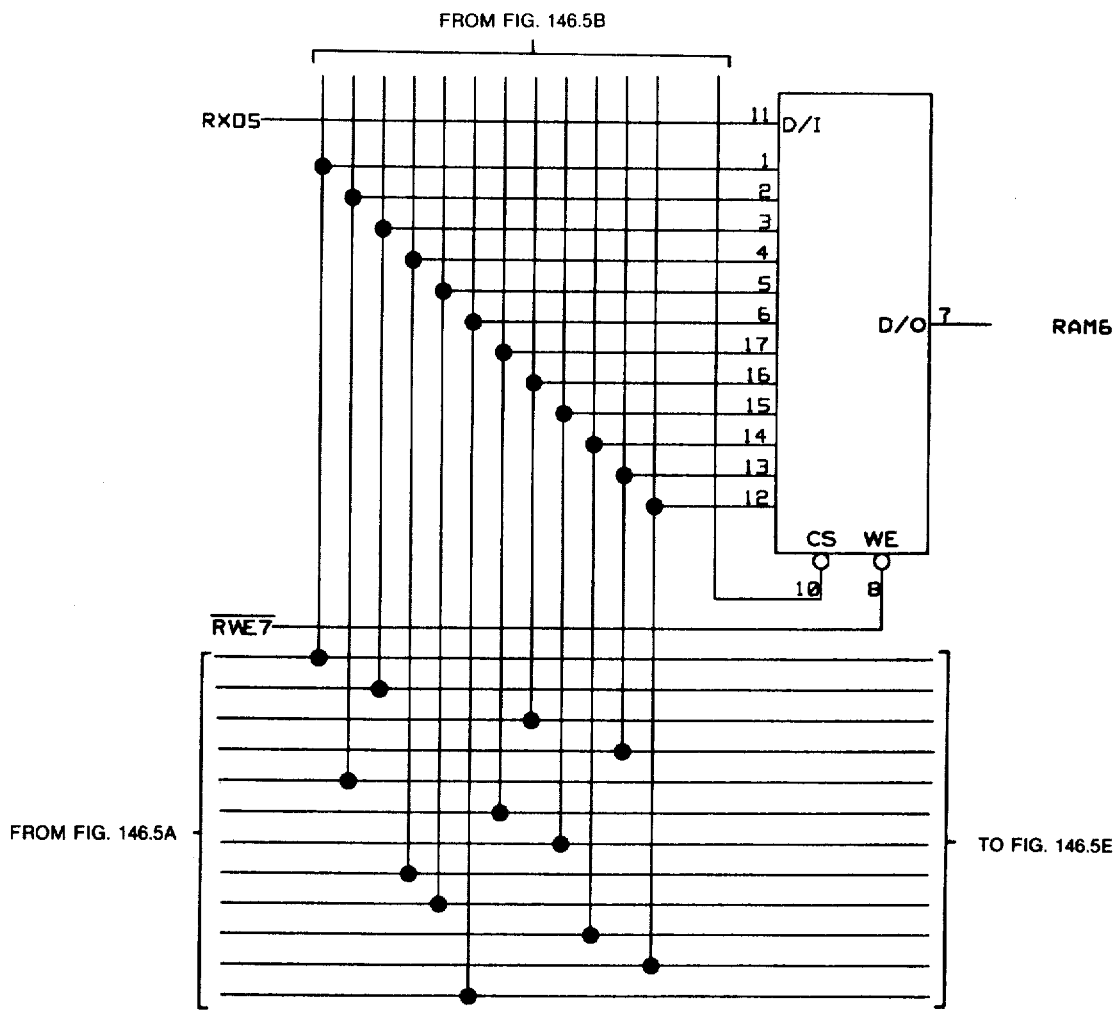
FIG. 146.5C

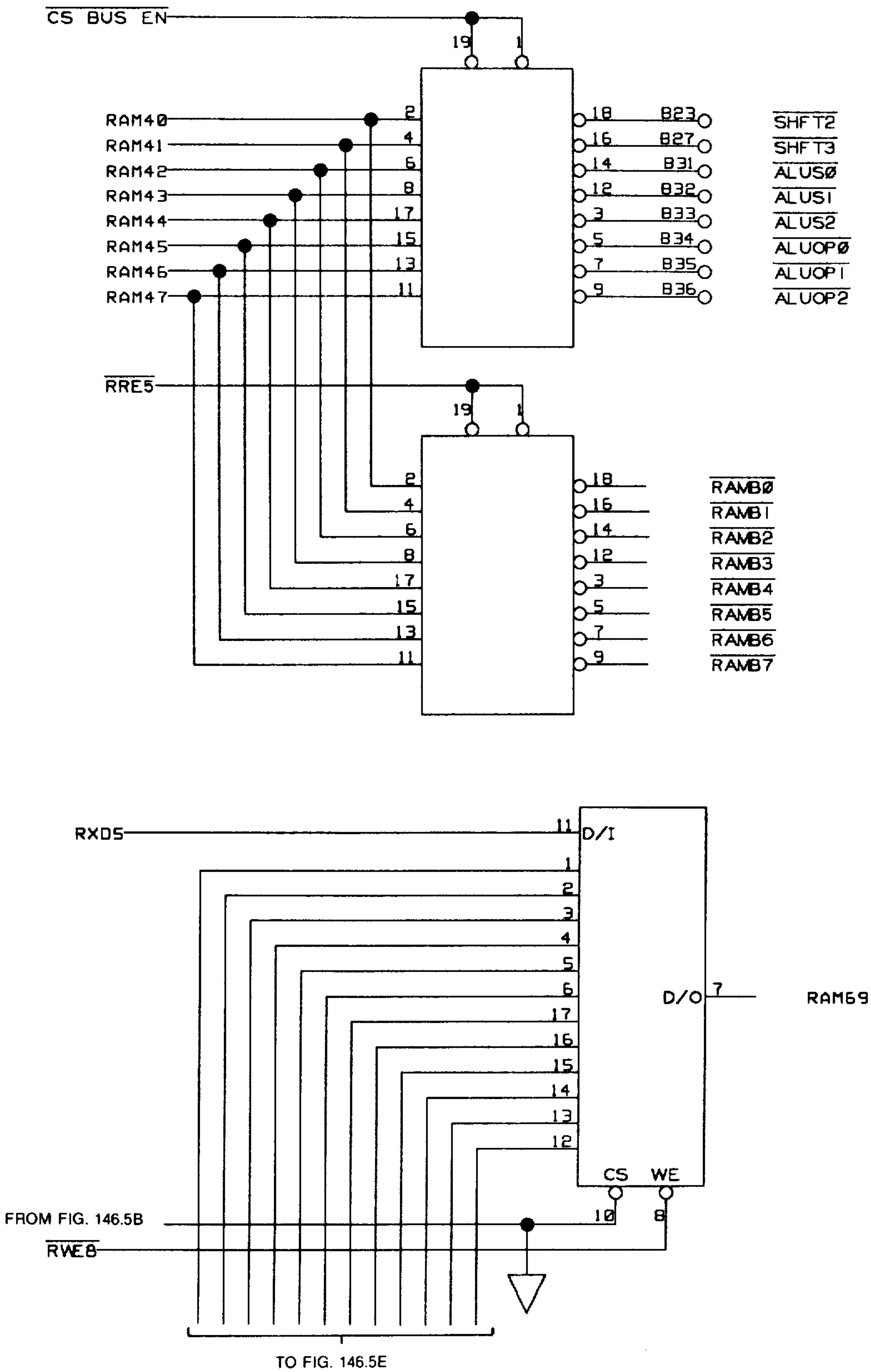
*FIG. 146.5D*

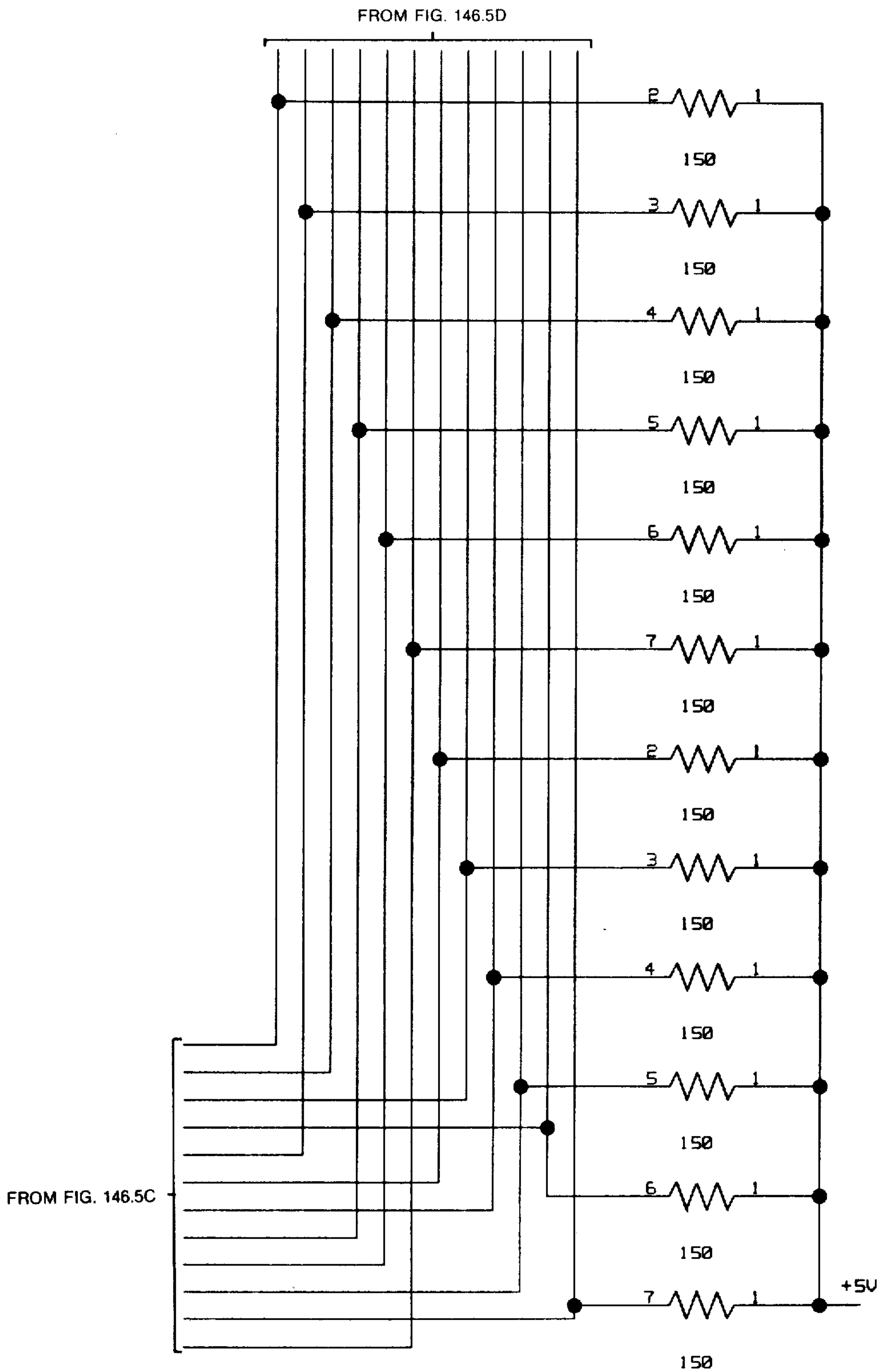
FIG. 146.5E

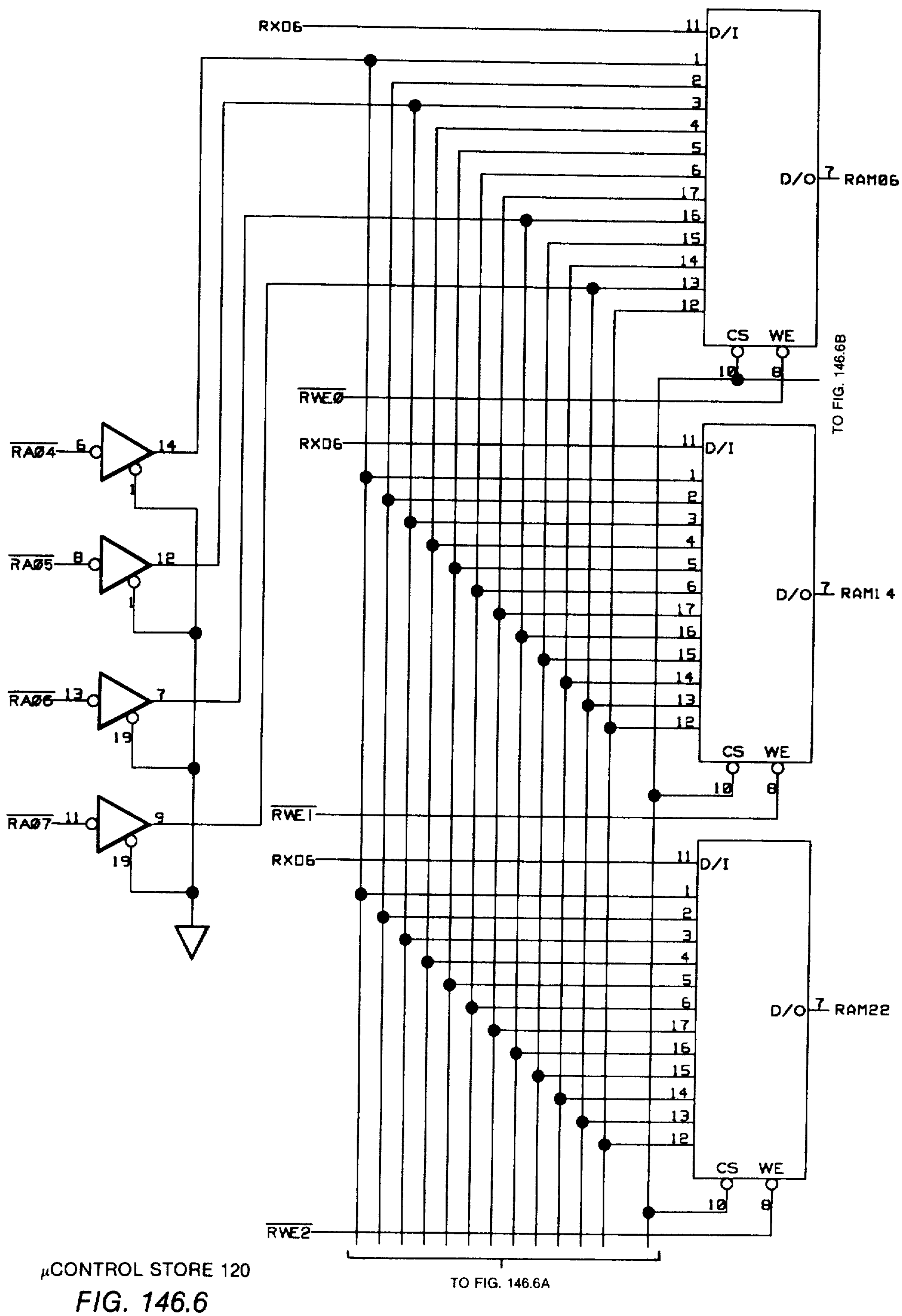
μCONTROL STORE 120
*FIG. 146.6*

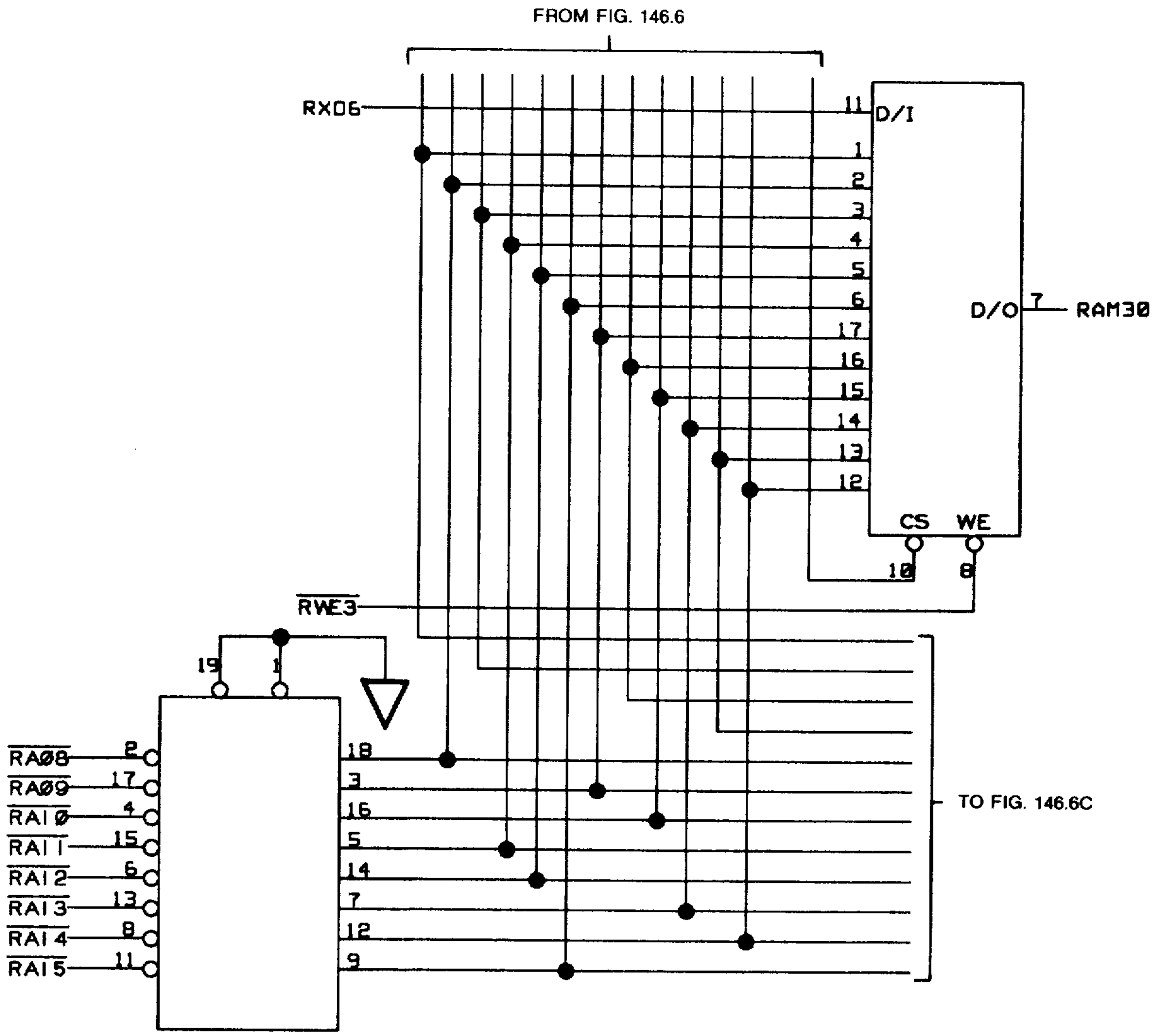
FIG. 146.6A

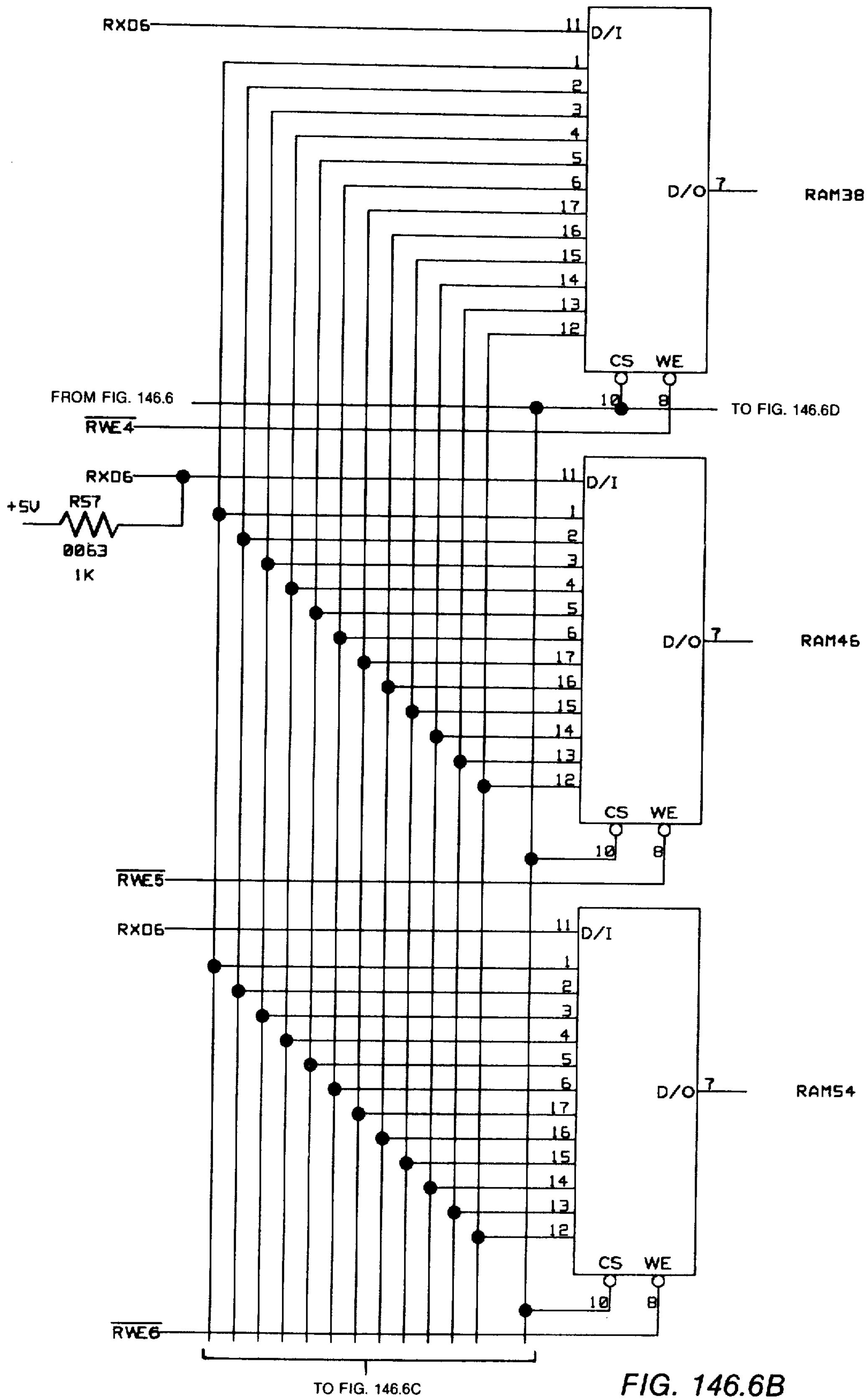
FIG. 146.6B

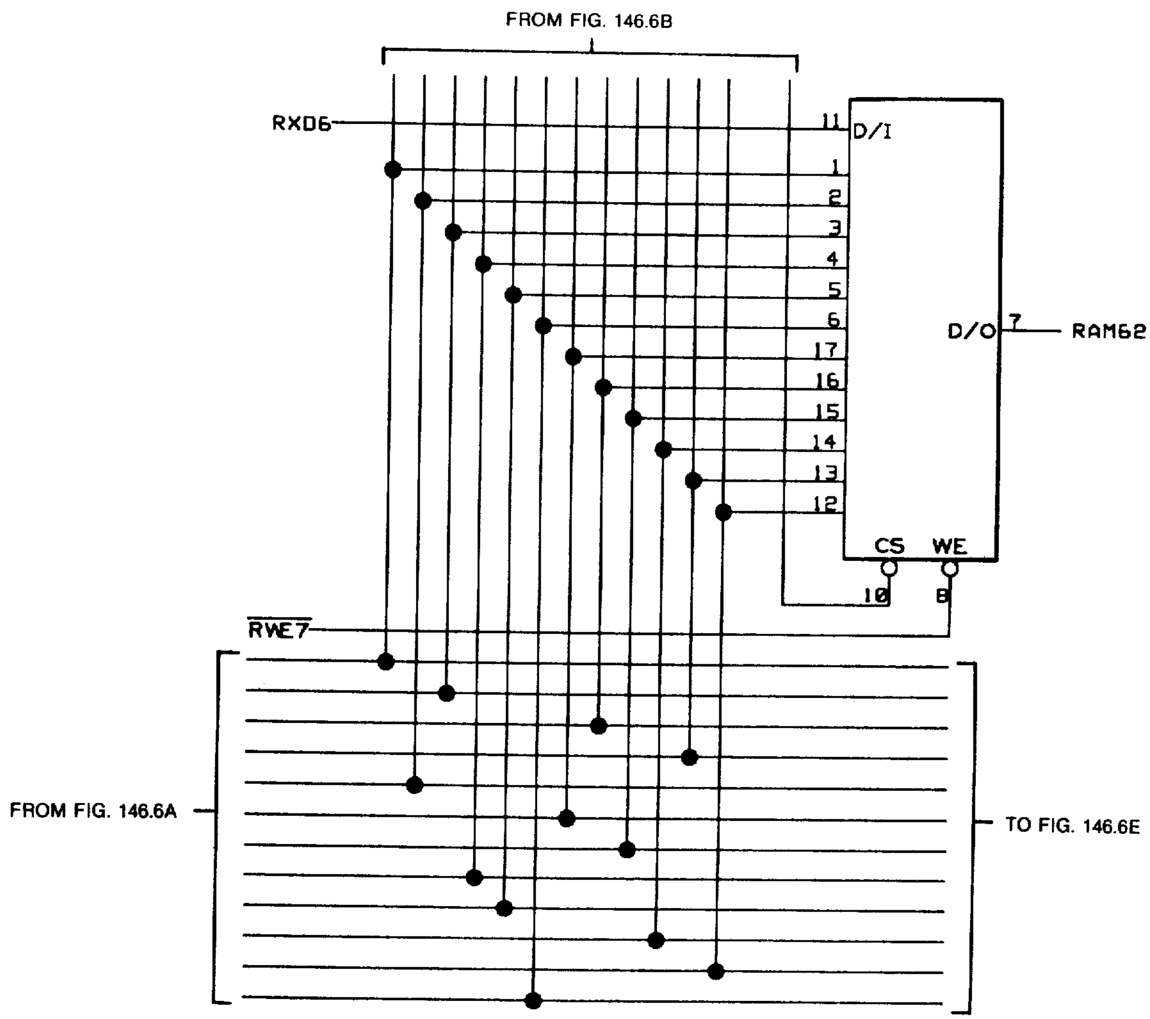
FIG. 146.6C

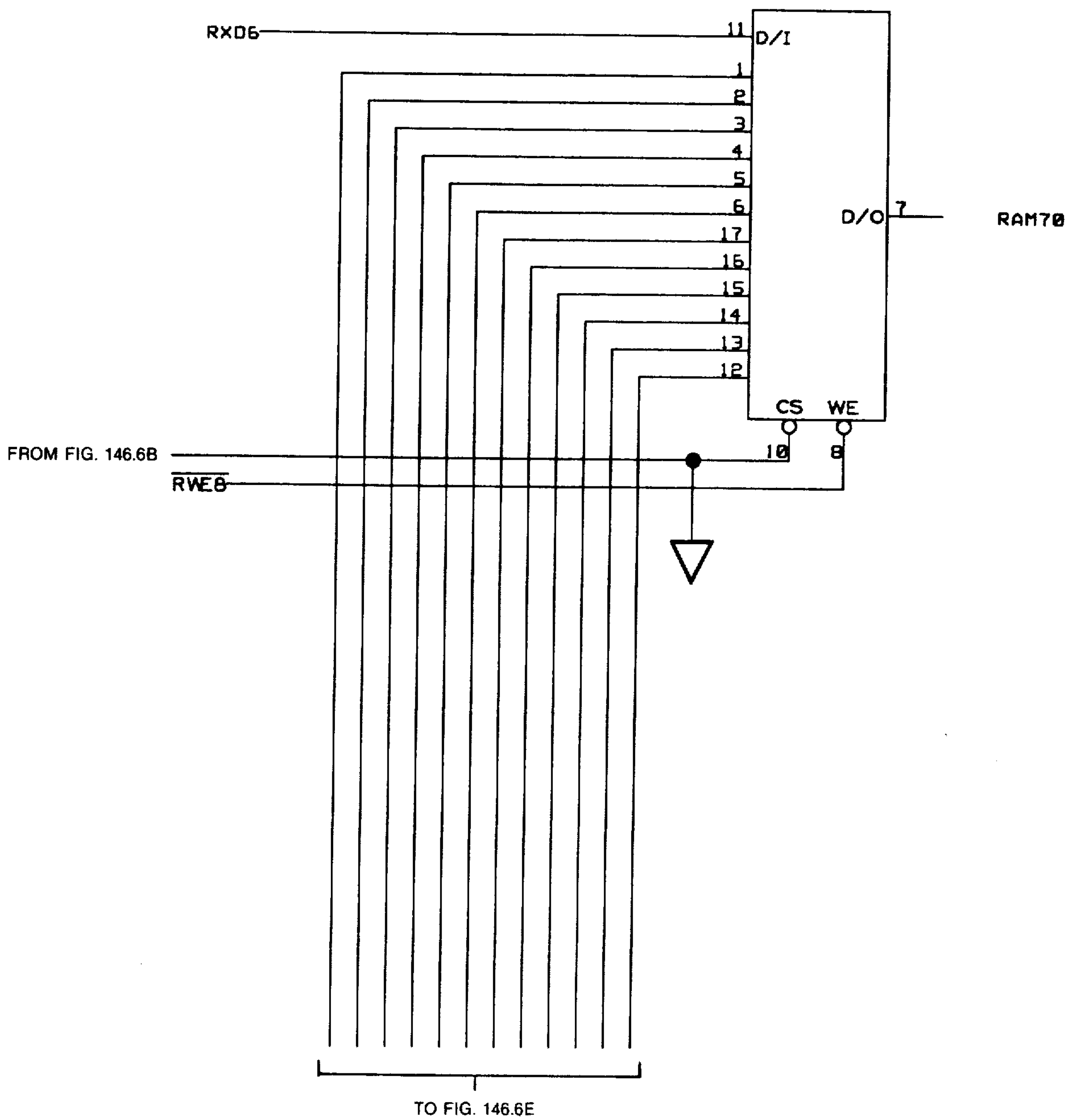
FIG. 146.6D

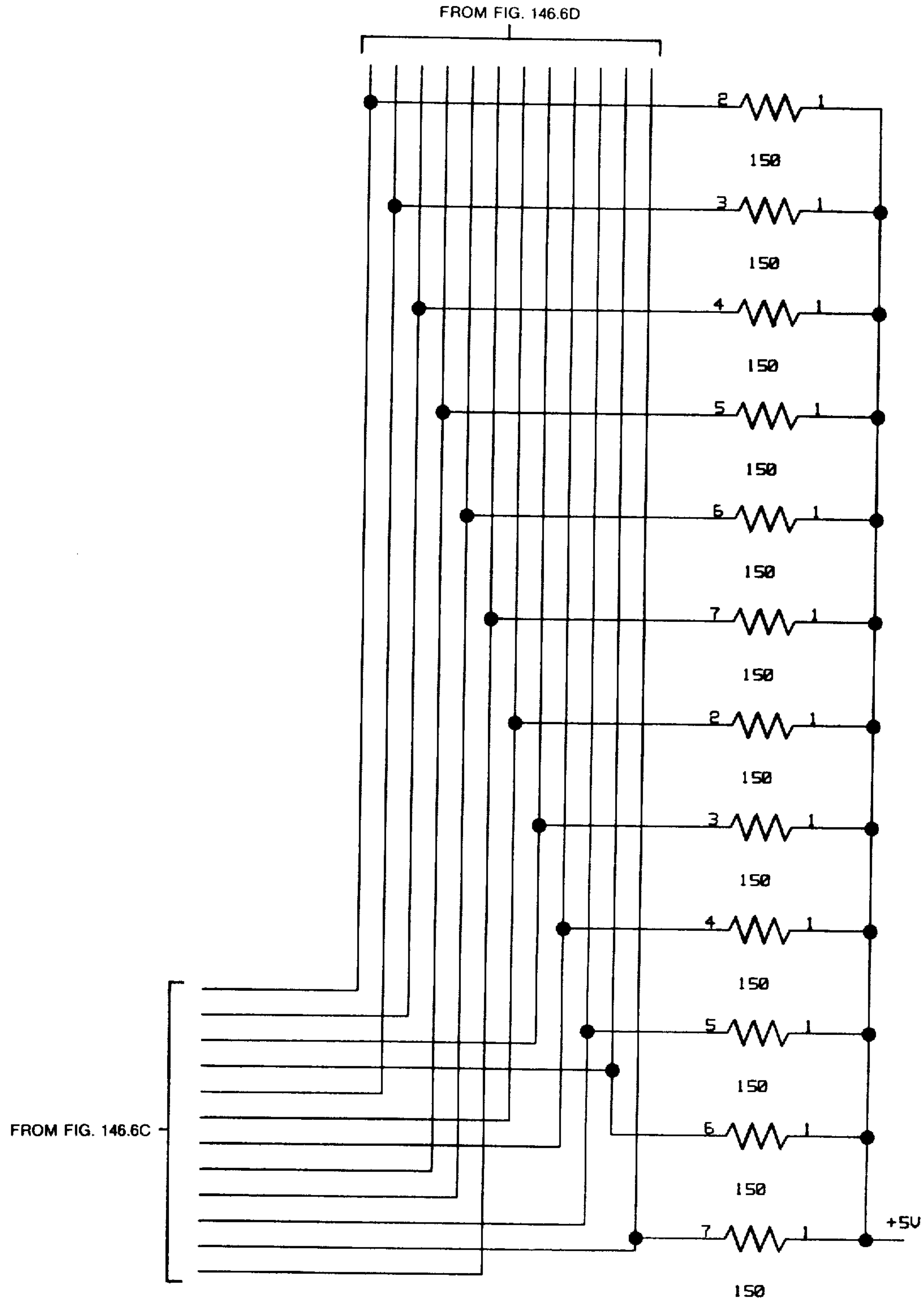
FIG. 146.6E

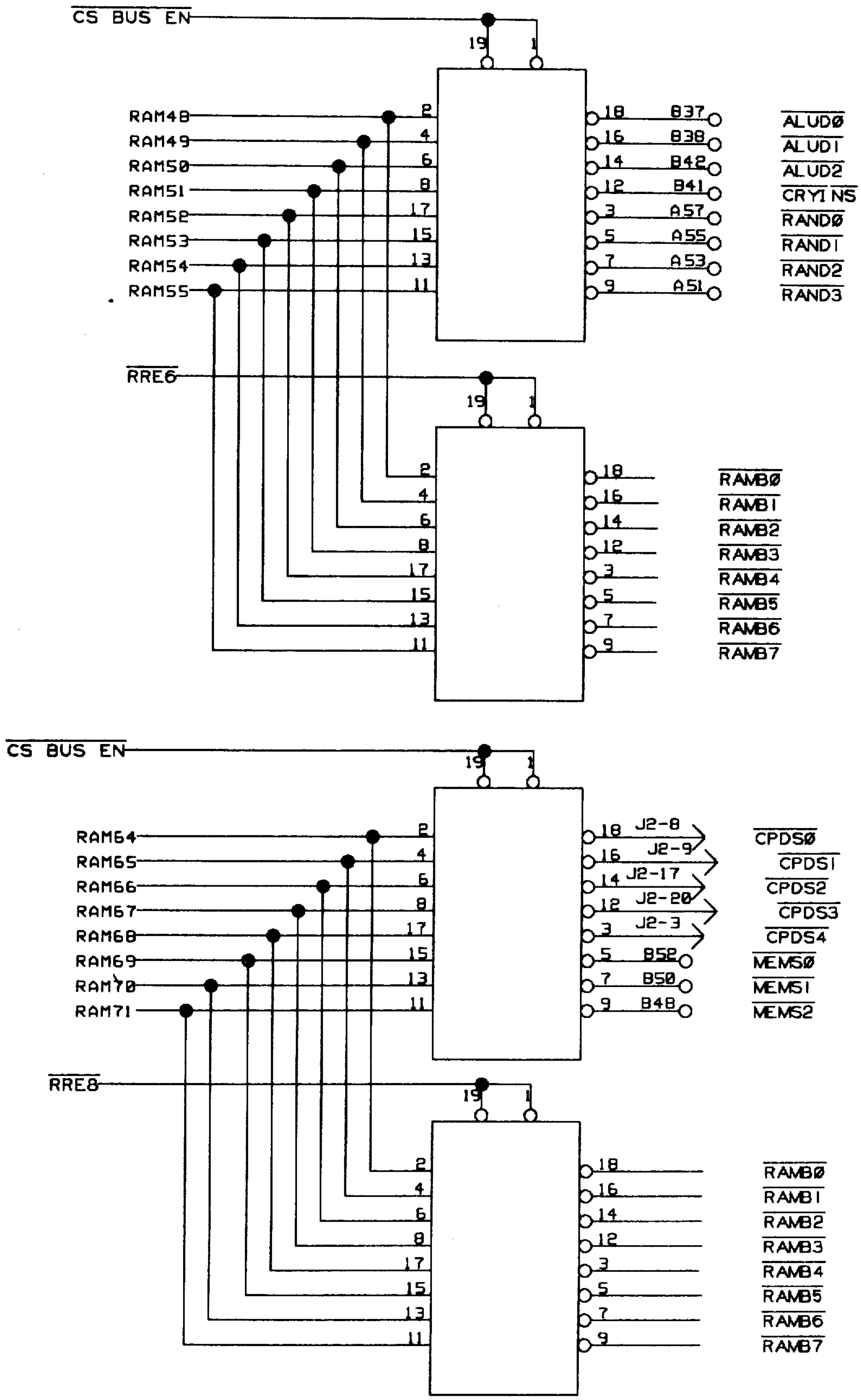
FIG. 146.6F

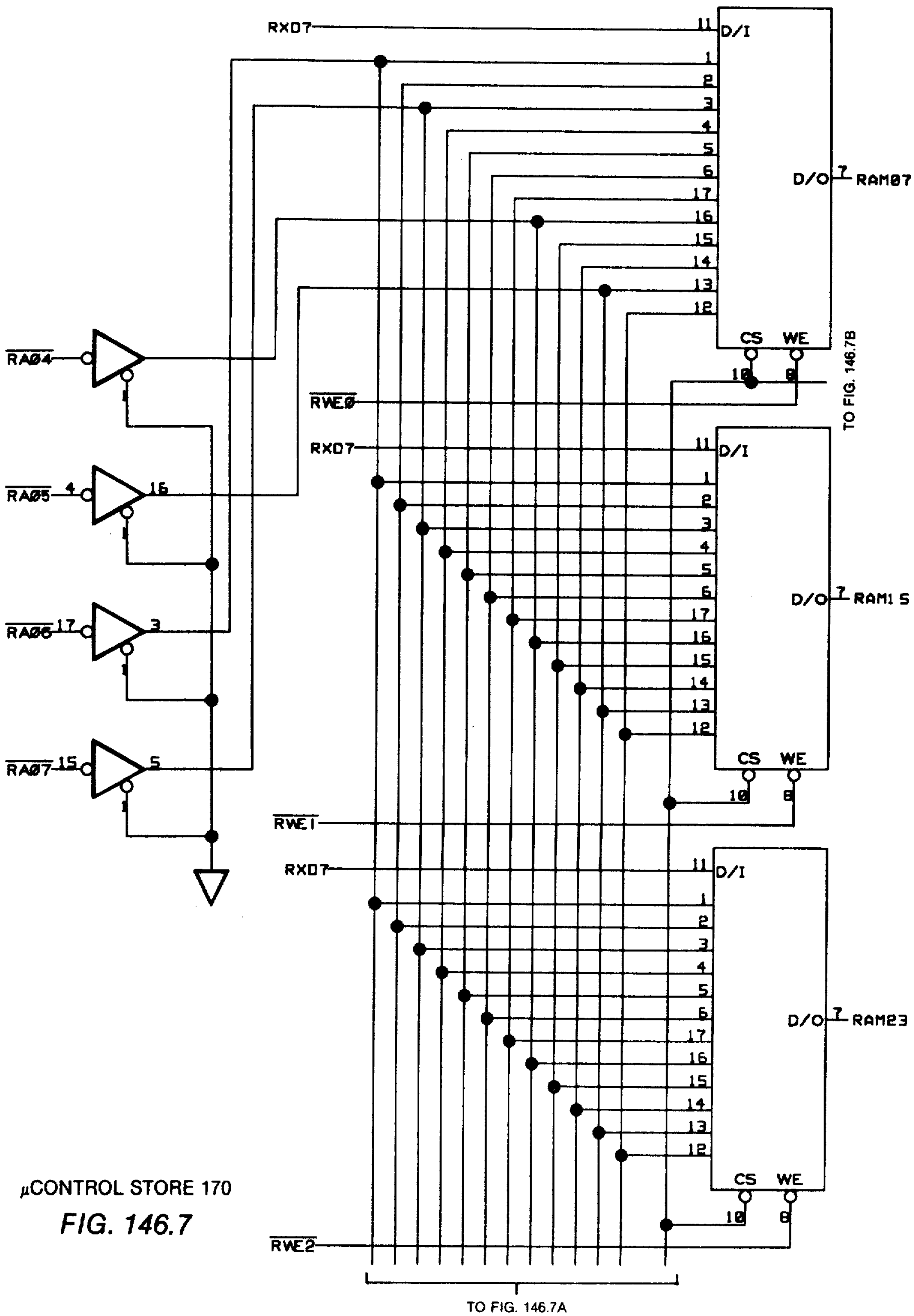
μCONTROL STORE 170
*FIG. 146.7*

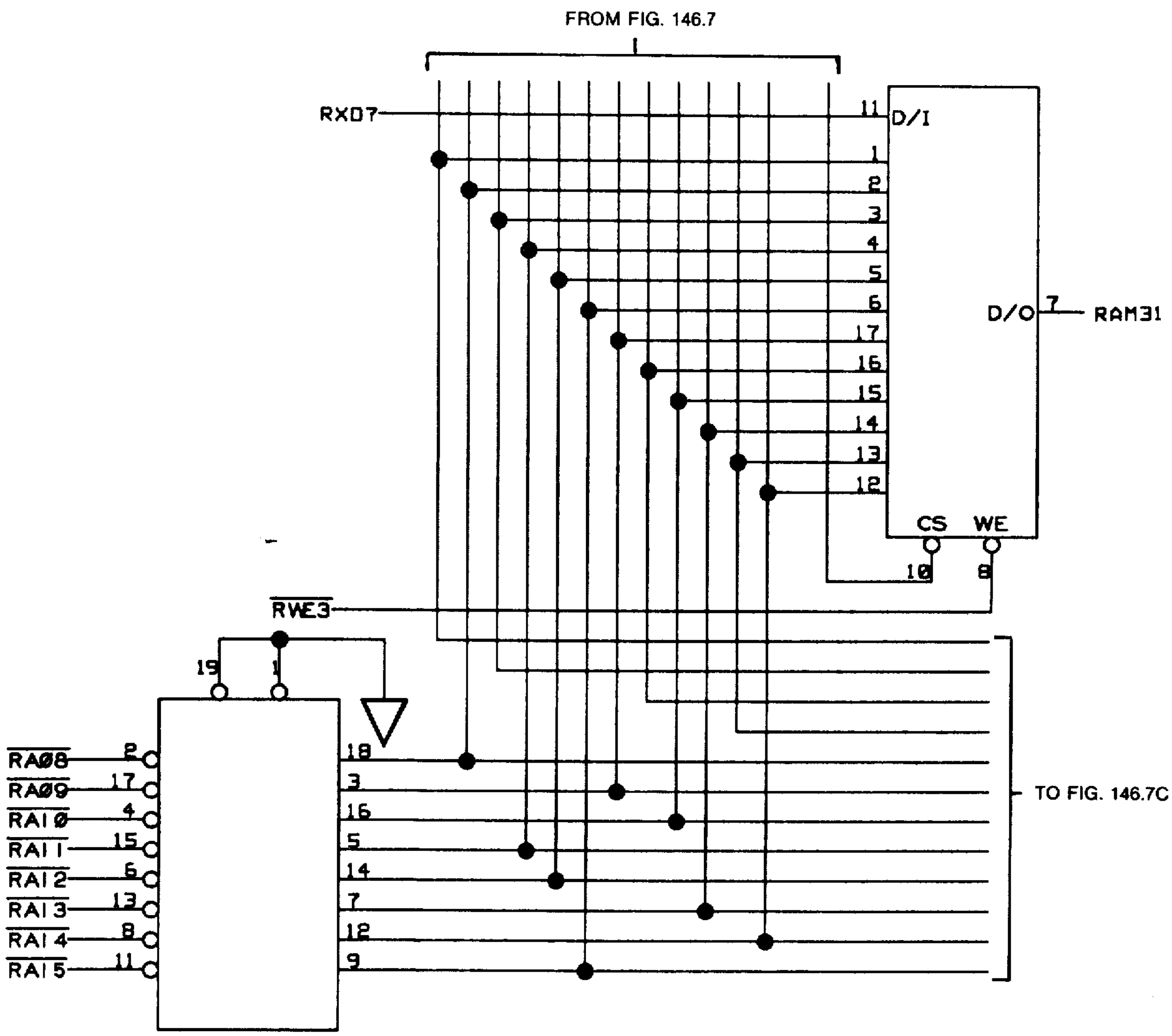
FIG. 146.7A

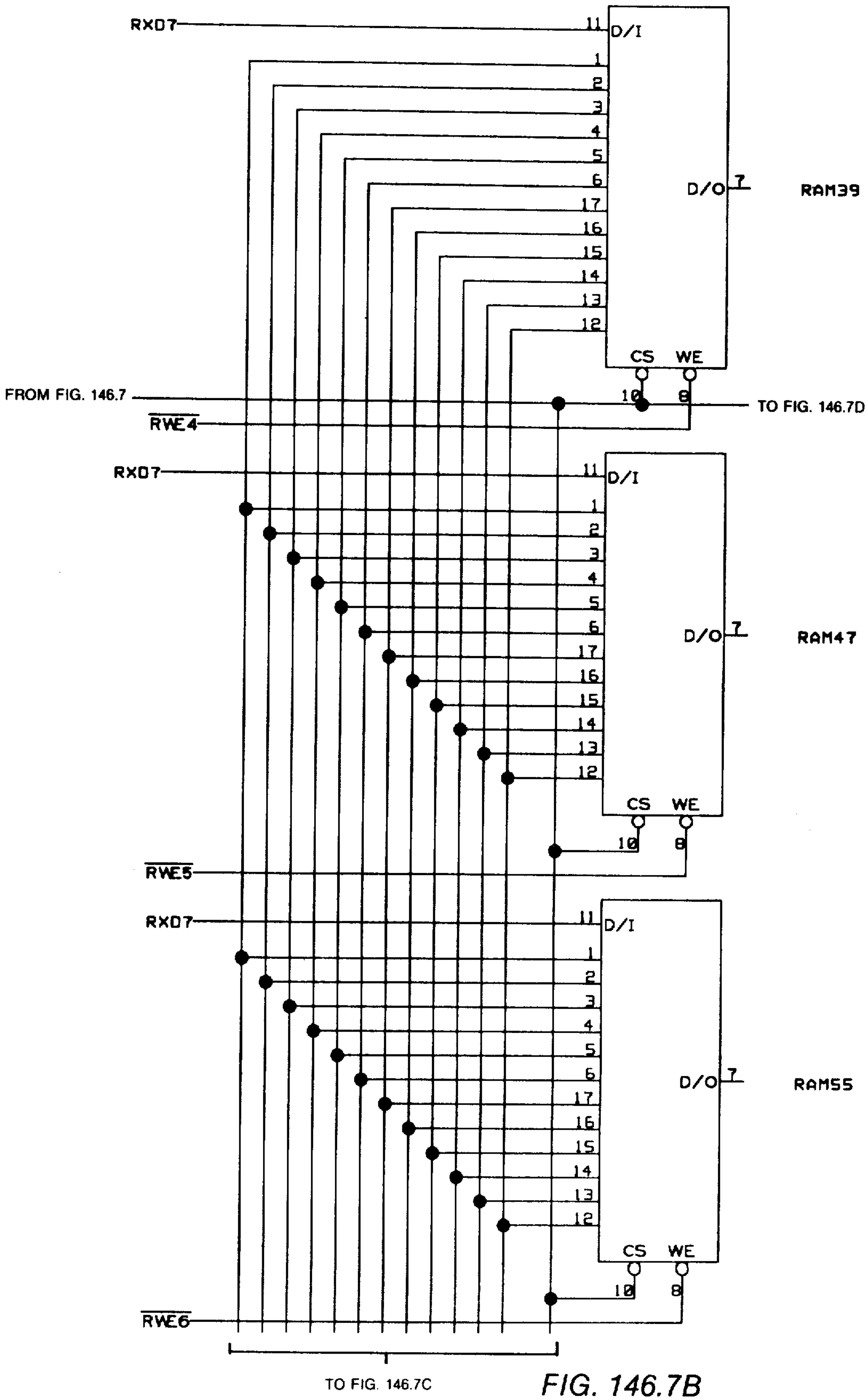
FIG. 146.7B

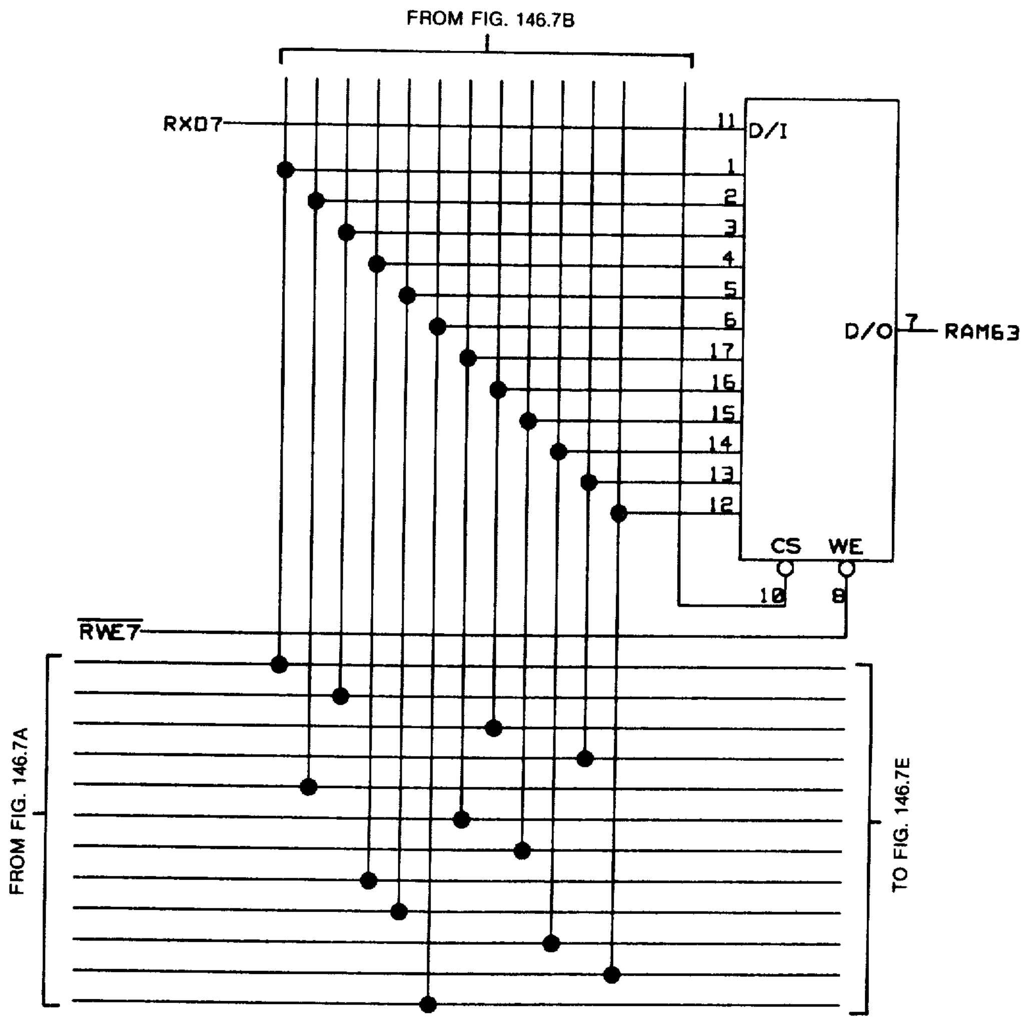
FIG. 146.7C

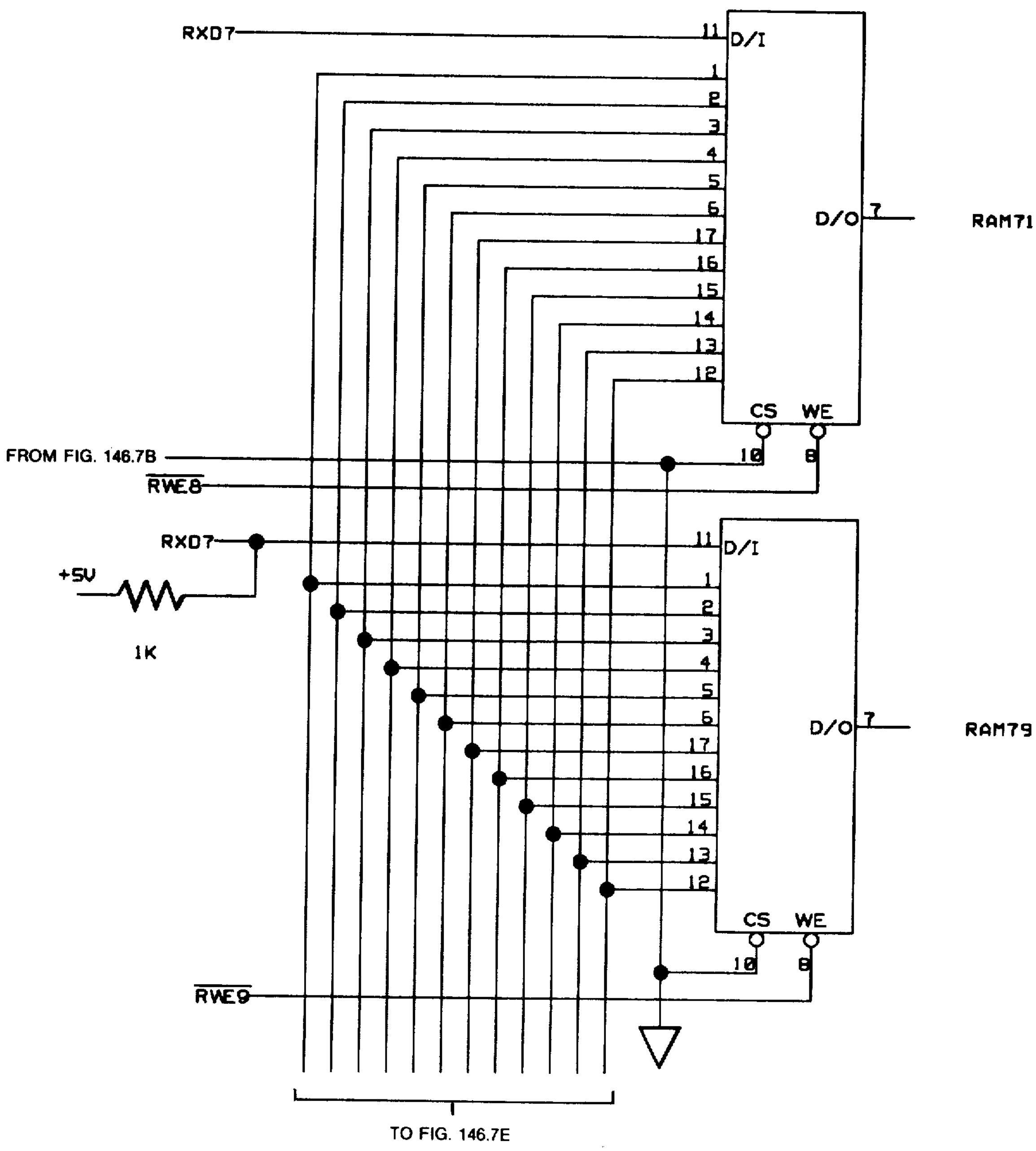
FIG. 146.7D

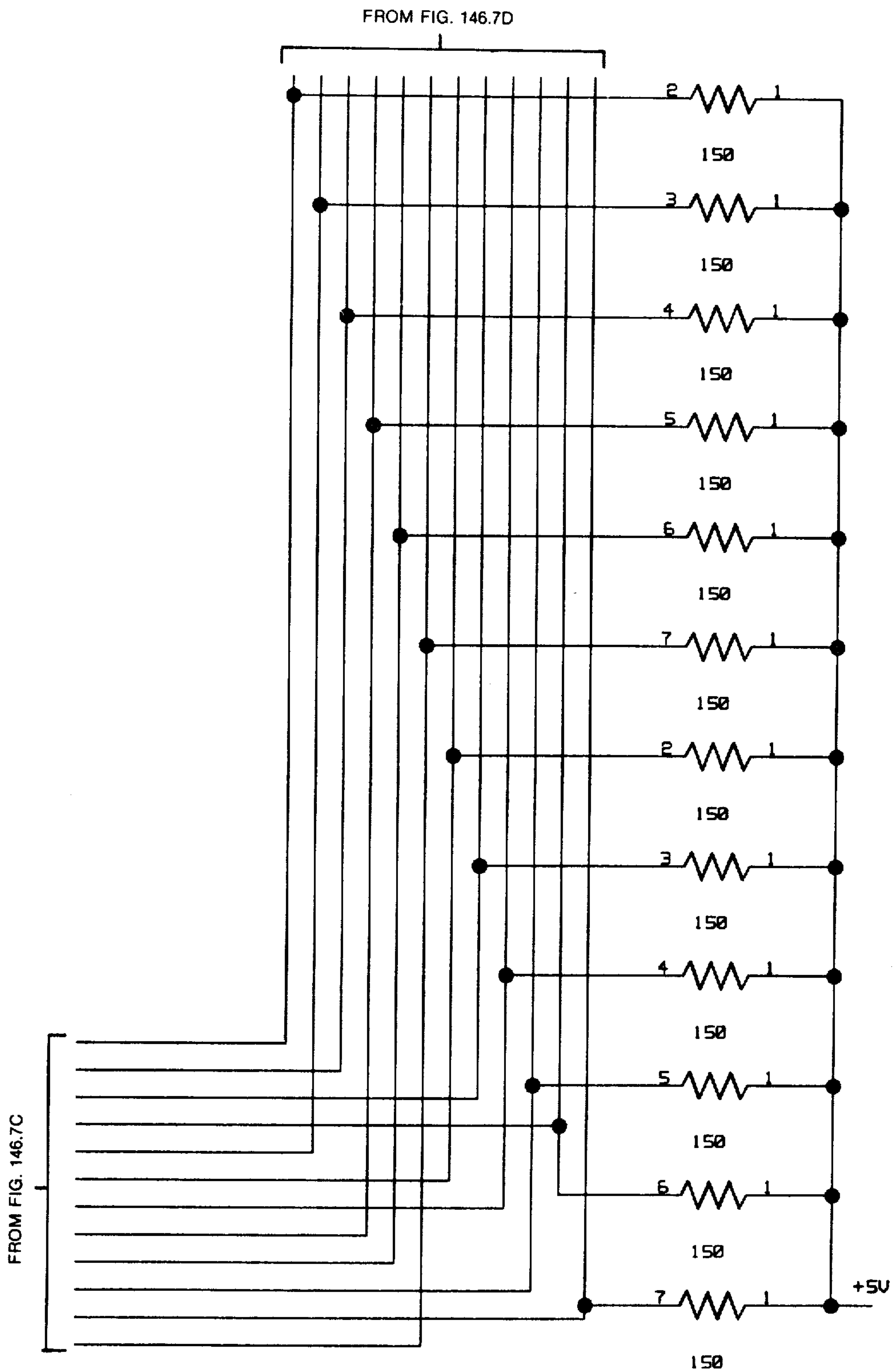
FIG. 146.7E

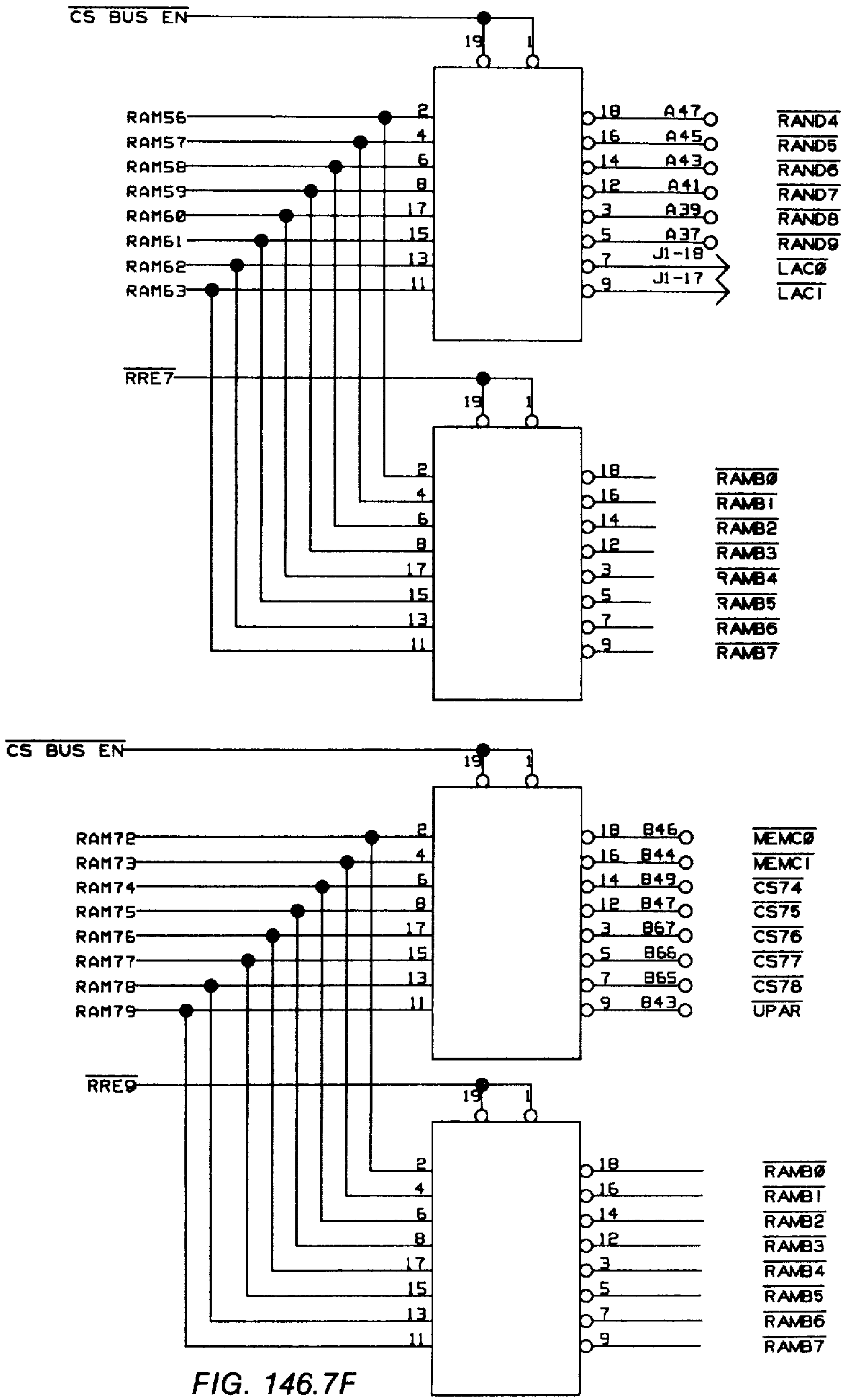
FIG. 146.7F

NAC DECODE LOGIC

CONCATENATION LOGIC 185
AND DISPATCH MUX 186

CPD MUX 197

6-BIT COUNTER 196

8 FLAGS UNIT 153

TEST 0 AND TEST 1 MUXES 194 AND CONDITION MUX 195, COND OUT

DATA PROCESSING SYSTEM HAVING INSTRUCTION RESPONSIVE APPARATUS FOR BOTH A BASIC AND AN EXTENDED INSTRUCTION SET

INTRODUCTION

This invention relates generally to data processing systems and, more particularly, to such systems which can handle 32 bit logical addresses at a size and cost which is not significantly greater than that of systems which presently handle only 16 bit logical addresses.

RELATED APPLICATIONS

This application is one of the following groups of applications, all of which include the same text and drawings which describe an overall data processing system and each of which includes claims directed to a selected aspect of the overall data processing system, as indicated generally by the titles thereof as set forth below. All of such applications are being filed concurrently and, hence, all will have the same filing date.

(1) Data Processing System, Ser. No. 143,561, filed by E. Rasala, S. Wallach, C. Alsing, K. Holberger, C. Holland, T. West, J. Guyer, R. Coyle, M. Ziegler and M. Druke;

(2) Data Processing System Having A Unique Address Translation Unit, Ser. No. 143,681, filed by S. Wallach, K. Holberger, S. Staudener and C. Henry;

(3) Data Processing System Utilizing A Hierarchical Memory Storage System, Ser. No. 143,981, filed by S. Wallach, K. Holberger, D. Keating and S. Staudener;

(4) Data Processing System Having A Unique Memory System, Ser. No. 143,974, filed by M. Ziegler and M. Druke;

(5) Data Processing System Having A Unique Instruction Processor System, Ser. No. 143,651, filed by K. Holberger, J. Veres, M. Ziegler and C. Henry;

(6) Data Processing System Having A Unique Microsequencing System, Ser. No. 143,710, filed by C. Holland, K. Holberger, D. Epstein, P, Reilly and J. Rosen;

(7) Data Processing System Having Unique Instruction Responsive Means, Ser. No. 143,982, filed by C. Holland, S. Wallach and C. Alsing.

BACKGROUND OF THE INVENTION

Presently available data processing systems which are often referred to as belonging to the "mini-computer" class normally handle logical addresses and data words which are 16 bits in length. As used herein, the term "logical" address, sometimes referred to by those in the art as a "virtual" address, is used to denote an address that is programmer visible, an address which the programmer can manipulate. In contrast, a "physical" address is the address of a datum location in the main memory of a data processing system. Operating data processing systems utilize appropriate translation tables for converting logical addresses to physical addresses.

Such mini-computers have been successfully used in many applications and provide a high degree of data processing capability at reasonable cost. Examples of such systems which have found favor in the marketplace are those known as the "Nova" and the "Eclipse" systems designed and developed by Data General Corporation of Westboro, Mass. The Nova and Eclipse family of mini-computers are described in the publications available from Data General Corporation which are listed in Appendix A incorporated as part of this specification.

The Nova system provides a logical address space of 64 kilobytes (the prefix "kilo" more accurately represents 1024, or $2^{10}$) and the Eclipse system also provides a logical address space of 64 kilobytes, both being proven systems for handling many applications at reasonable cost. It is desirable in the development of improved systems to provide for an orderly growth to an even larger logical address space than presently available in Nova and Eclipse systems. Such an extended logical address base permits a larger set of instructions to be utilized by the system, the enlarged instruction set being capable of including substantially all of the basic instructions now presently available in the prior Nova and Eclipse systems as well as a large number of additional, or extended, instructions which take advantage of the increased or expanded logical address space.

Accordingly, such an improved system should be designed to be responsive to software which has been previously designed for use in Nova and Eclipse systems so that those presently having a library of Nova and Eclipse software, representing a substantial investment, can still use such software in the improved, expanded address system. The improved system also would provide for a greater flexibility in performance at a reasonable cost so as to permit more on-line users at a larger number of on-line terminals to utilize the system. The expanded address space would further permit the system to support more extensive and sophisticated programs devised specifically therefor, as well as to support all of the previous programs supported by the unextended Nova or Eclipse systems.

BRIEF SUMMARY OF THE INVENTION

The system of the invention utilizes a unique combination of central processor and memory units, the processor comprising an address translation unit, an instruction processor unit, an arithmetic logic unit and a microsequencing unit, while the memory unit includes a system cache unit, a main memory unit and a bank controller unit for controlling data transfers therebetween. The system handles thirty-two bit logical addresses which can be derived from either sixteen bit or thirty-two bit addresses. Unique means are provided for translating the thirty-two bit logical addresses. The system uses hierarchical memory storage, wherein information is stored in different segment storage regions (rings), access to the rings being controlled in a privileged manner so that access to different rings are governed by different levels of privilege.

The memory system uses a main memory comprising a plurality of memory modules each having a plurality of memory planes. The main memory normally interfaces with the remainder of the system via a dual port system cache memory unit, block data transfers between the main memory and the system cache are controlled by a bank controller unit.

Macro-instructions are decoded using a unique programmable read-only-memory means which is capable of decoding instructions of two types, i.e., instructions from a first basic instruction set or instructions from a second extended instruction set, the instruction which is being decoded containing in itself selected bit patterns which uniquely identify which type of instruction is to be decoded.

The decoded instructions provide the starting address of one or more microinstructions, which starting address is supplied to a unique microinstruction sequencing unit which appropriately decodes a selected field of each microinstruction for determining the address of the next successive microinstruction, such address being suitably selected from a plurality of microaddress sources.

The overall system includes means responding to certain macro-instructions which perform unique operations indigenous to the overall system.

DESCRIPTION OF THE INVENTION

The invention can be described in more detail with the help of the drawings wherein.

Figure 5:
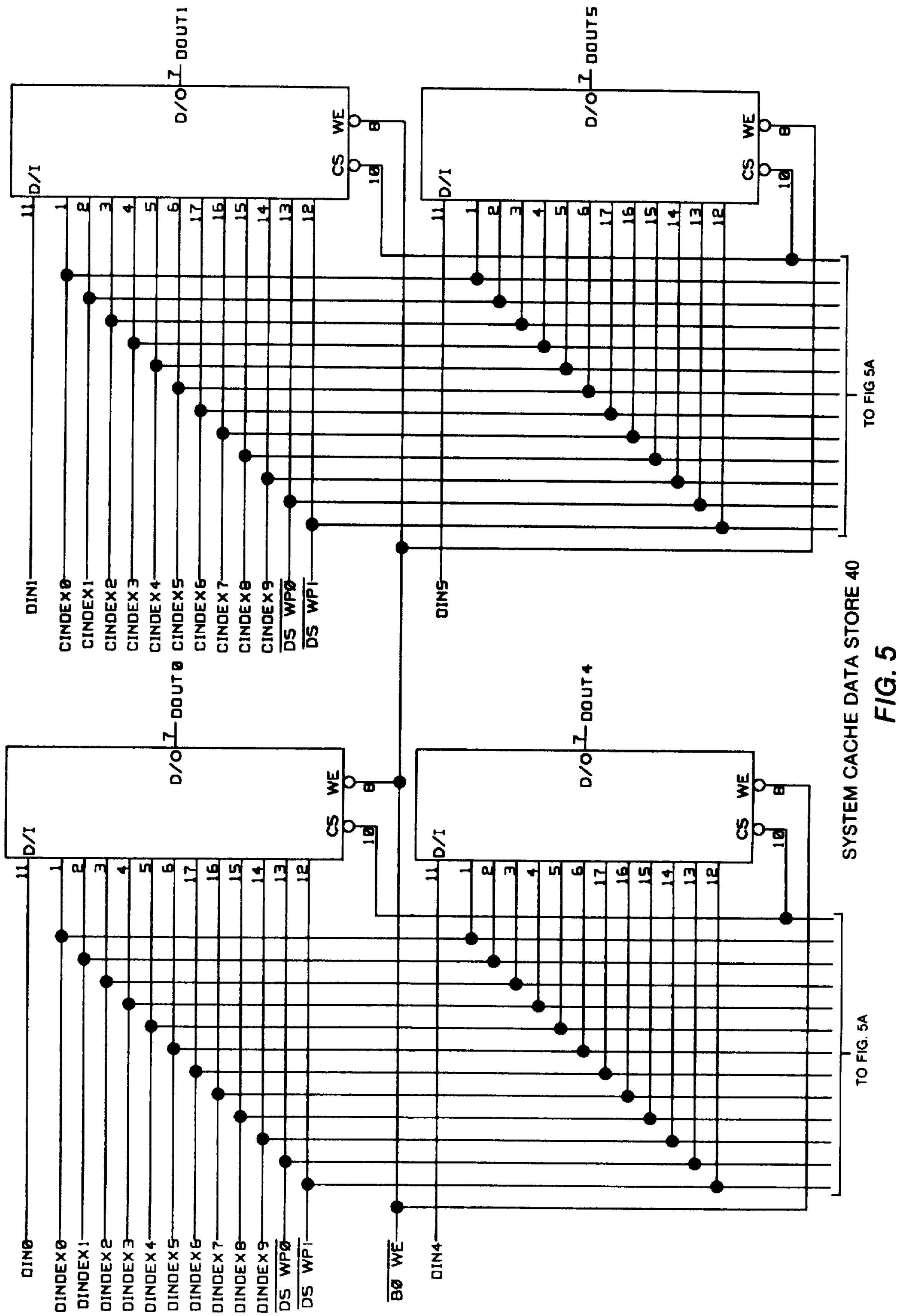
FIGS. 5–44 show specific logic circuitry for implementing the system cache of FIG. 2.
Figure 5A:
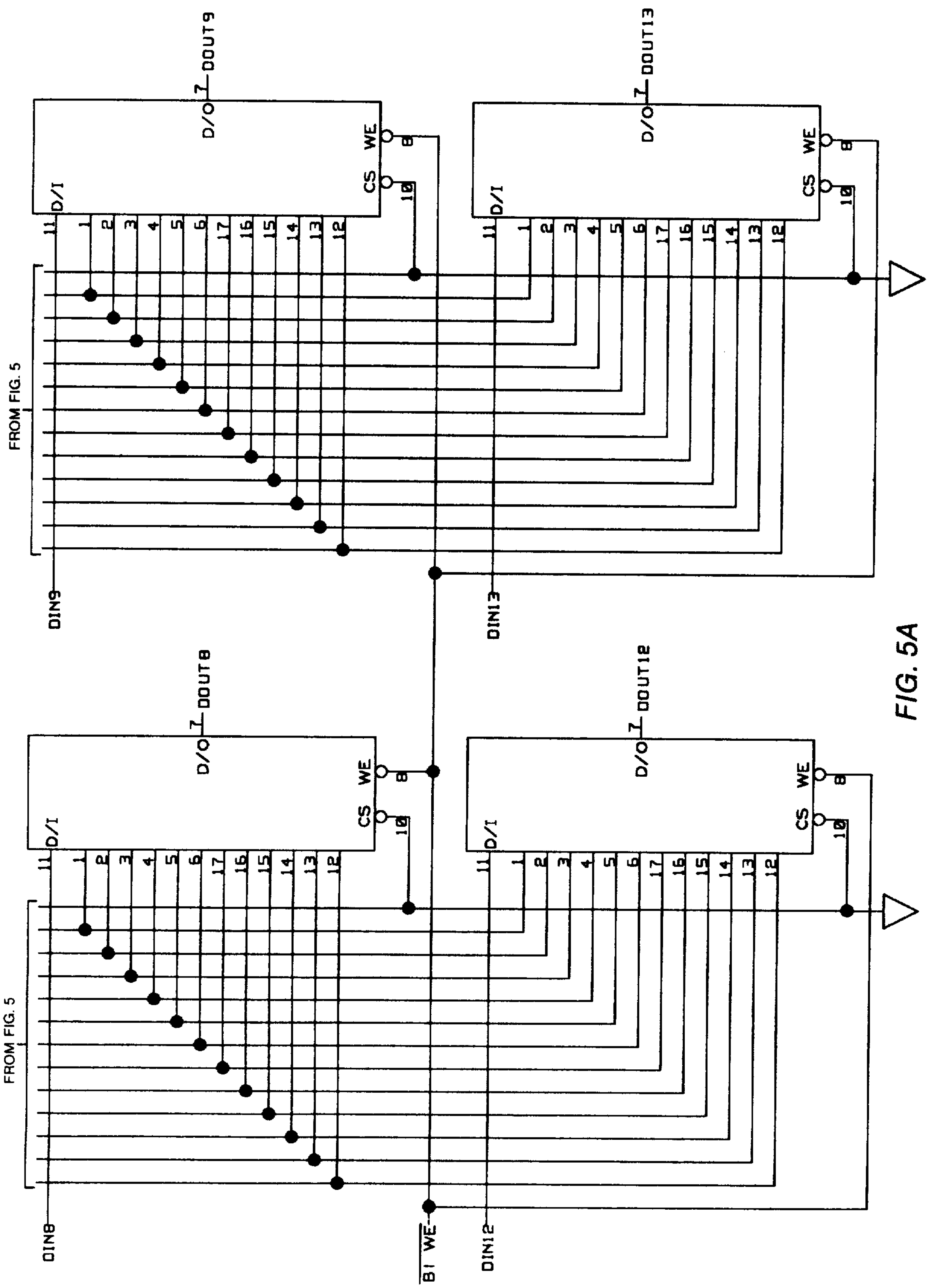
Figure 5B:
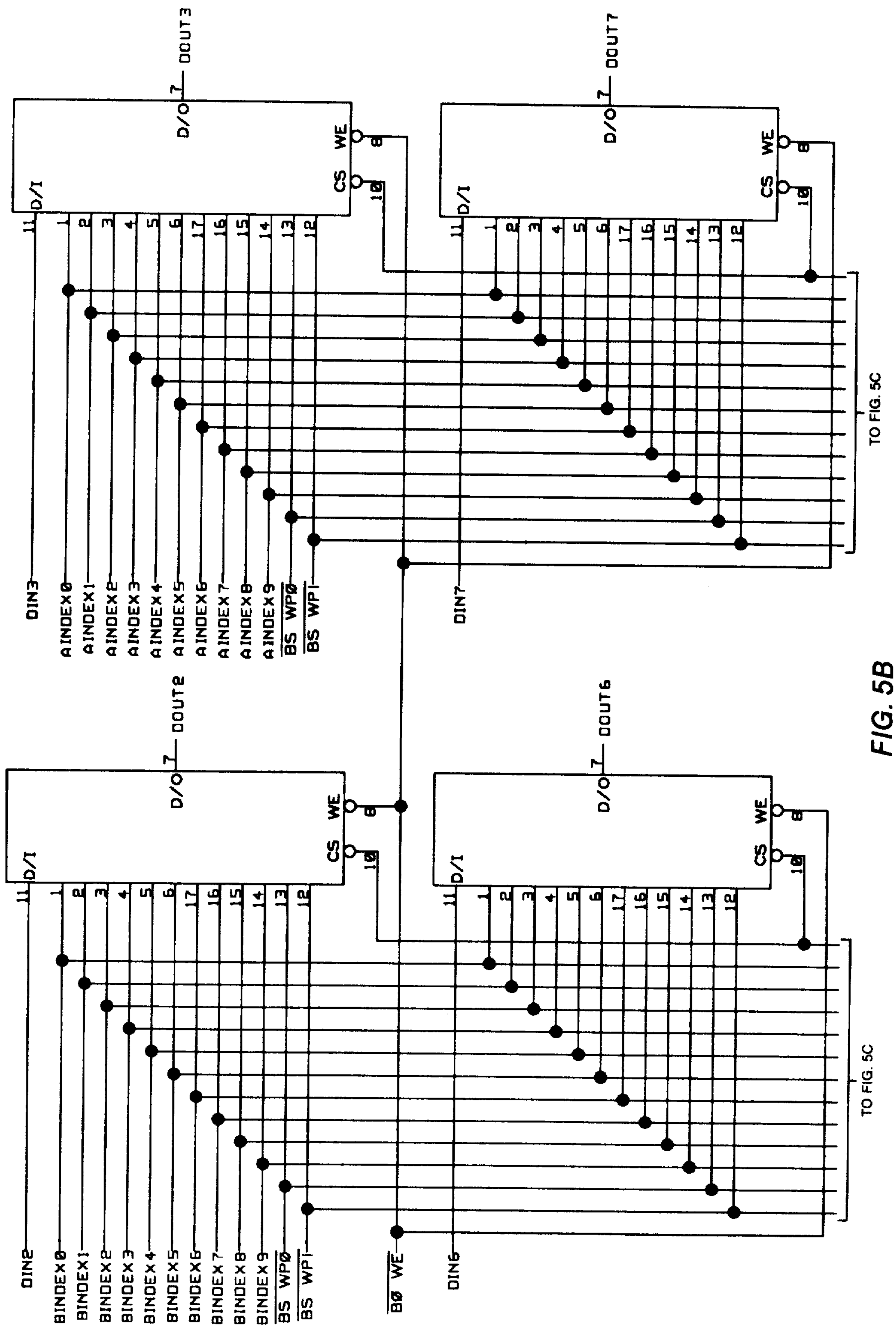
Figure 5C:
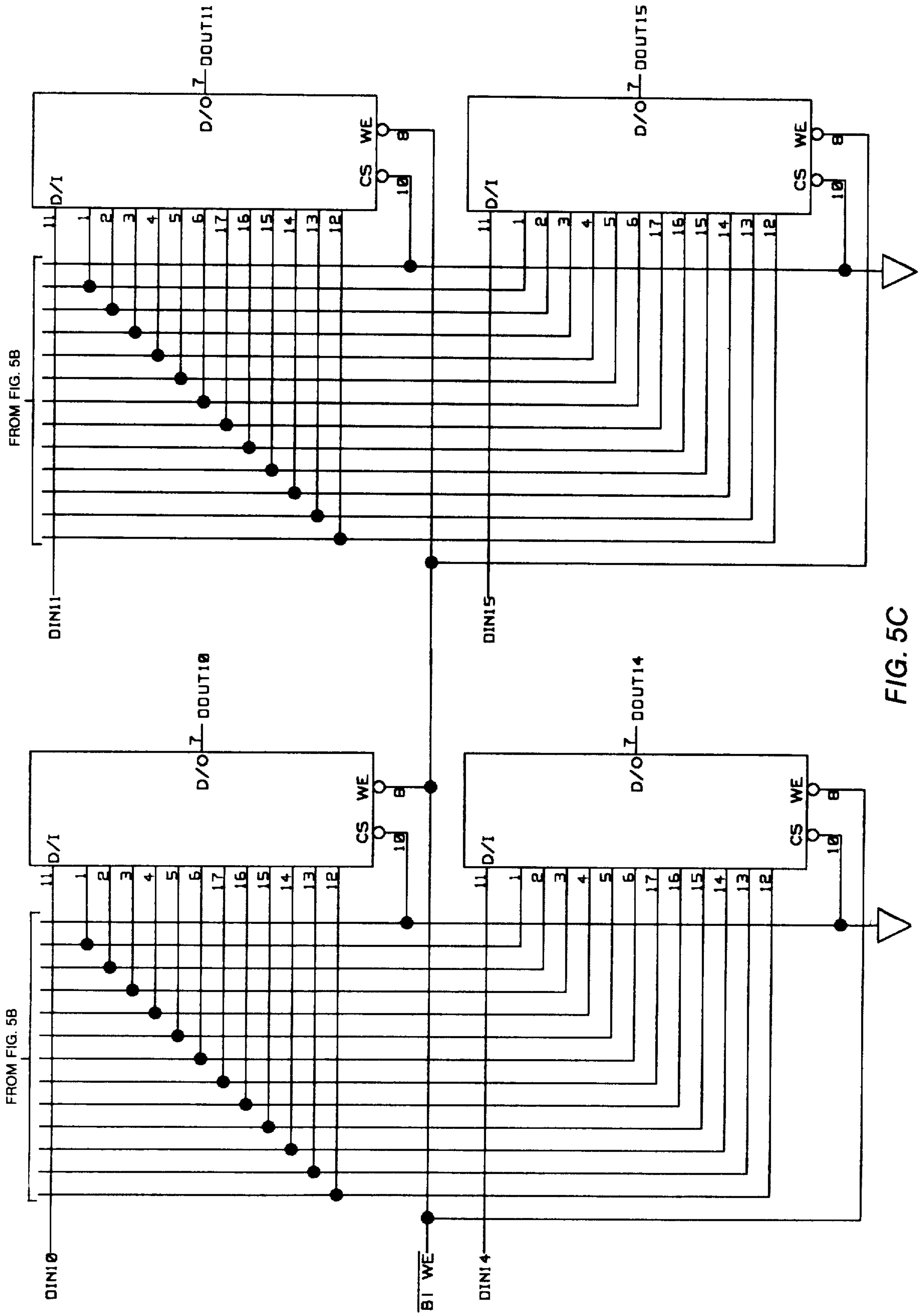
Figure 5D:
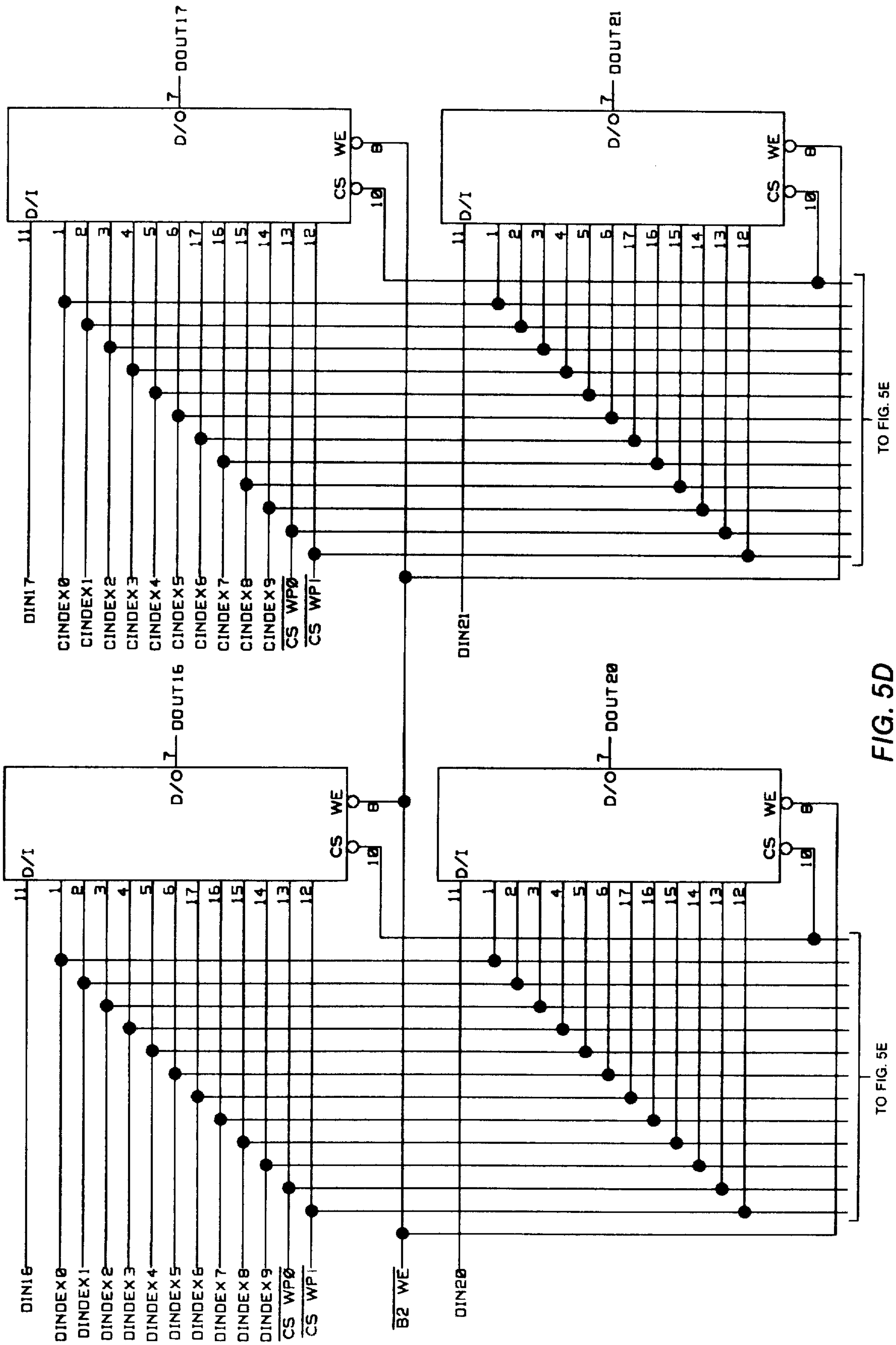
Figure 5E:
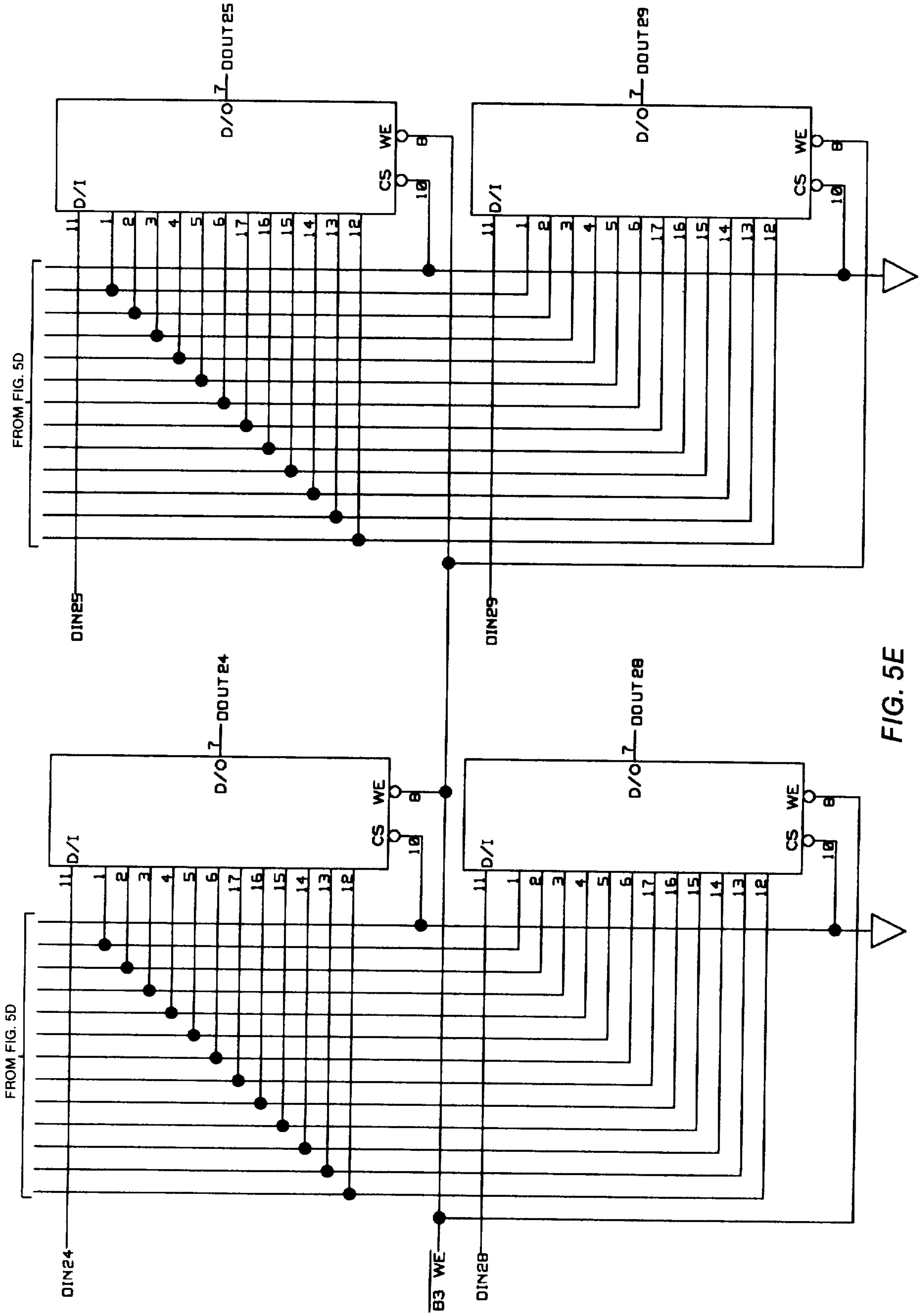
Figure 5F:
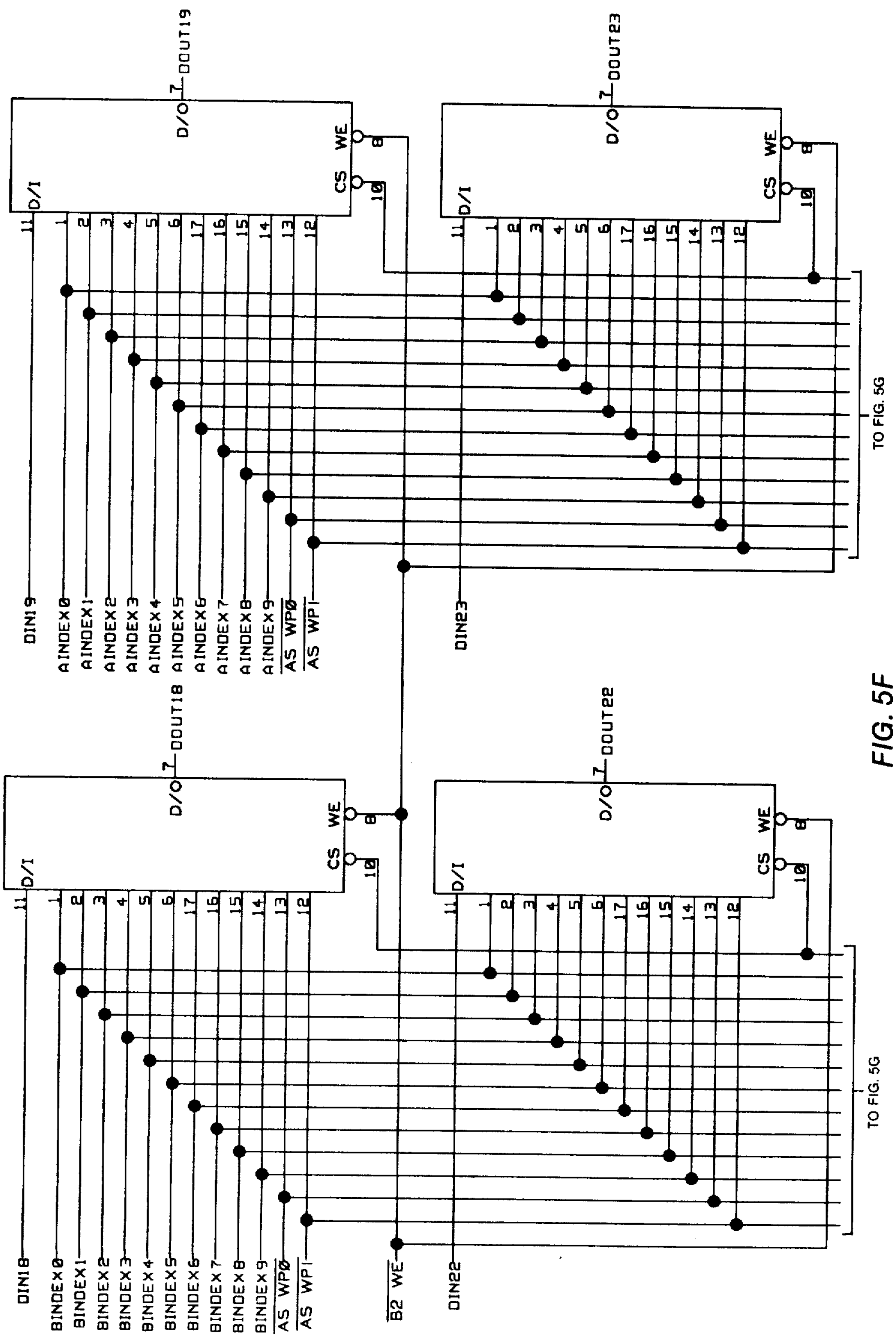
Figure 5G:
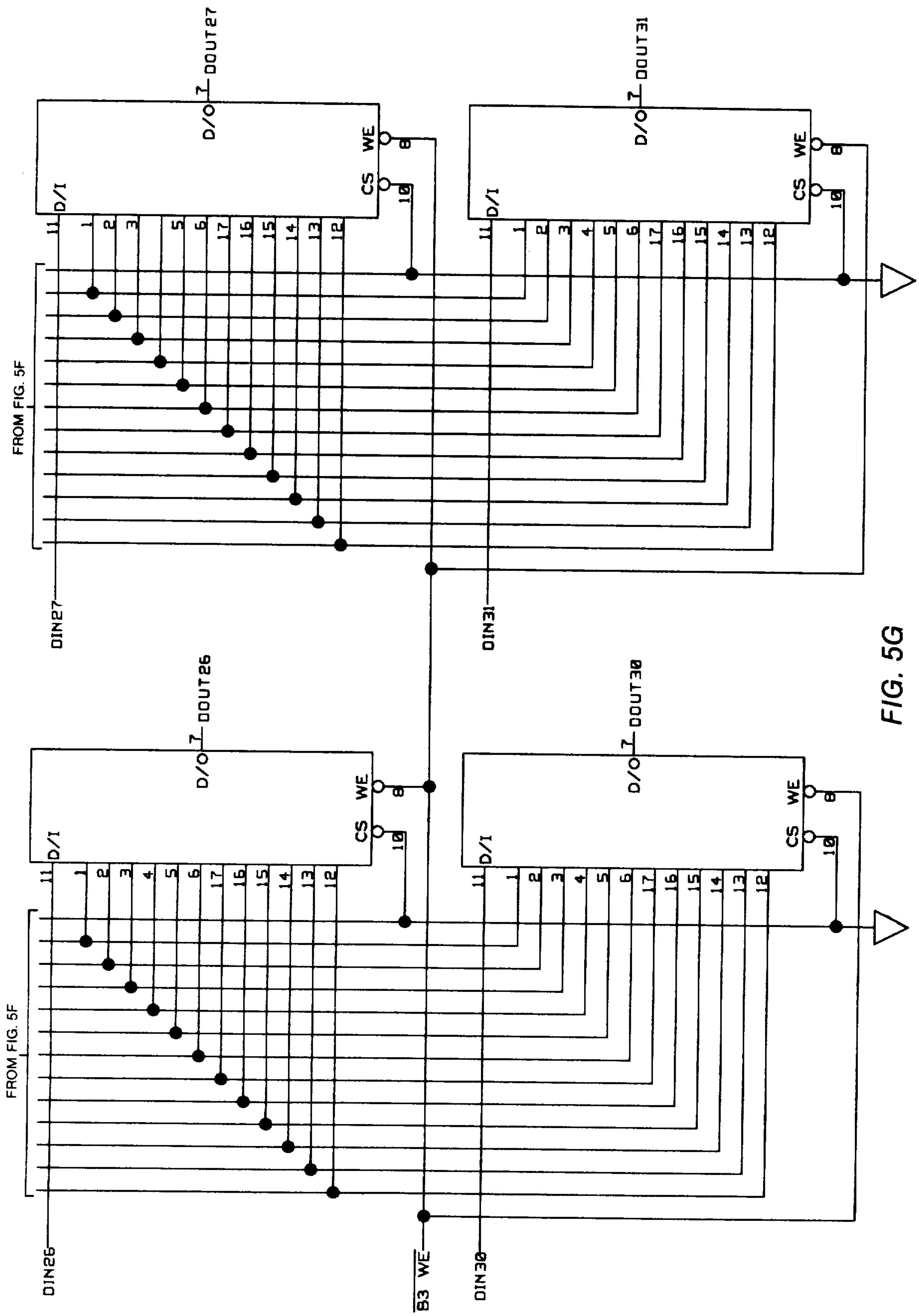

In connection with the above figures, where a particular figure requires more than one sheet of drawings, each subsequent sheet is designated by the same figure number with sequential letters appended thereto (e.g., FIG. 5 (for sheet 1); FIG. 5A (for sheet 2); FIG. 5B (for sheet 3) . . . etc.). With respect to FIG. 146 in particular, which depicts the microcontrol store 170, fifty-six sheets of drawing are used. The sheets are numbered 146, 146A, 146B, 146C, 146D, 146E, 146F; 146.1, 146.1A, 146.1B 146.1C, 146.1D, 146.1E, 146.1F; 146.2, 146.2A, 146.2B . . . etc. to 146.8, 146.8A, 146.8B . . . 146.8F.

GENERAL DESCRIPTION

Before describing a specific implementation of the system of the invention, it is helpful to discuss the overall concept thereof in more general terms so that the characteristics that are desired can be described and the description of a particular implementation can be better understood.

A significant aspect of the system of the invention, as discussed above, is the size of the logical address space which is available. For purposes of convenience in distinguishing between the previous NOVA and Eclipse systems, the extended system as discussed herein will sometimes be referred to as the "Eagle" system. In the Eagle system, for example, the logical address space can be as high as 4 gigabytes (more accurately the prefix "giga" is 1,073,741,824, or $2^{30}$, so that 4 gigabytes is, more accurately, 4,294,967,296) where a byte is defined as having 8 bits of precision. As used hereinafter, a "word" is defined as having 16 bits of precision (i.e., equivalent to 2 bytes) and a "double-word" as having 32 bits of precision (equal to two words, or four bytes). Because of the increased logical address space the overall system is able to support an instruction set which is larger than that supported by a Nova system or an Eclipse system having, for example, a much smaller logical address space. The overall capability of the system can be best understood by those in the art by examination of the set of the extended instructions which are capable of being performed by the system. Such an instruction set in accordance with the invention is set forth in Appendix B incorporated as a part of this specification. Such instruction set includes the extended instruction set (which can be referred to as the Eagle instruction set) and the Eclipse C-350 instruction set, as well as the Nova instruction set, all of which are capable of being handled by the system, the latter two instruction sets being already disclosed as part of the above publications. All Nova and Eclipse instructions are executed according to the principles and specifications presented in the above-referenced publications.

The binary encodings of the extended instructions which are supported by the system of the invention are shown in Appendix B. A significant difference exists between the systems having extended instructions in accordance with the invention and systems having extending instructions which have been suggested by others. In any system in which an extended instruction set effectively represents a "super" set of a previous, or original, set of instructions, all of the instruction must be suitably decoded for machine operations. Normally, such systems utilize a decoding sub-system for decoding both the original instruction set and for decoding the extended instruction set. The decoder operates so as to permit the decoding of only one of the instruction sets at a time, the original instruction set and the extended instruction set being in effect, mutually exclusive. In order to determine which instruction is to be decoded, a unique instruction must be used to set a "mode bit", i.e., a single bit which in one state indicates that the original instruction set is to be decoded and in the other state indicates that the extended instruction set is to be decoded. However, in neither case can the decoding subsystem be made available to decode either of the both sets simultaneously. Such approach inserts a limitation on the overall machine operation since it is never possible to simultaneously decode instructions from different instruction sets of an overall super set thereof.

The system of the invention, however, avoids such mutual exclusivity and is arranged to be capable of decoding instructions from either set or both sets at any one time. A decoder PROM (programmable read-only-memory) system is utilized for decoding both the extended Eagle instruction set and the original or basic instruction sets as, for example, the original Nova and Eclipse instruction set. Each instruction to be decoded includes the information which determines which decoder is to be utilized, such determination thereby being inherently carried in each instruction word which is to be decoded. As seen in Appendix B, for example, the information is contained in bits ø and 12–15.

Thus, in the extended Eagle instruction set, bit ø is always a "1" while bits 12–15 are always "1001" for all instructions of the extended instruction set except for those extended instructions which use a "1" in bit ø and the encoding "011000" in bits 10–15 and a "1" in bit "0", a "0" in bit 5, and the encoding "111000" in bits 10–15. On the other hand, the original Eclipse instructions are such that bit ø is 0 and bits 12–15 are "1000". Further, in cases where the instruction does not carry either the Eagle coded bits or the Eclipse coded bits, such instruction is interpreted as a NOVA instruction.

Because each instruction carries with it an identification as to which instruction set the instruction belongs, the system operates to decode instructions on a non-mutually exclusive basis.

In order to support the extended operations of the system, the configuration thereof requires an augmentation of the registers which were previously available in the original system of which the new system is an extension. The following registers are utilized in the system and are discussed in more detail later with respect to the particular implementation described in connection with specific figures below.

The register set includes fixed point registers, floating point registers, stack management registers and memory management registers.

Fixed Point Registers

The system includes four fixed point accumulators (ACC ø–3), one program counter (PC) and one processor status register (PSR). Each of the accumulators has 32 bit precision which can accomodate (1) a 16 bit operand which can be sign extended to 32 bits; (2) a 15 bit address which can be zero extended to 28 bits, the higher order 3 bits of the program counter being appended thereto together with a zero bit, all of which can be appended for storage in the accumulator; or (3) an 8 bit byte which can be zero extended to 32 bits before storage in the accumulator.

The program counter has 31 bits of precision, bits 1–3 identifying one of 8 current memory rings (discussed in more detail below) and bits 4–31 of which accomodate an address offset for instruction addresses. For Eclipse operation, for example, which normally requires only a 15 bit program counter, the bits 1–3 identify the current memory ring as in a 31 bit extended operation while the 15 least significant bits 17–31 represent the 15 bit Eclipse program counter and bits 4–16 are all zeros.

The processor status register is a 16 bit register which provides an overflow mask bit which if set will result in a fixed point overflow. Additionally the register includes a fixed point overflow indicator bit and a bit which indicates that a micro interrupt has occurred. Other bits in the register are reserved and are thus available for potential future use.

Floating Point Registers

The system includes four floating point accumulators (FPAC ø–3) and one floating point status register (FPSR). Each of the floating point accumulators contains 64 bits of precision which is sufficient to wholly contain a double precision floating point value. The floating point registers of the extended system are identical to the Eclipse floating point accumulators (FPAC) which are discussed in the aforementioned publications.

The floating point status register also has 64 bits of precision, 32 bits of which act as the floating point program counter. In the event of a floating point fault the floating point program counter bits define the address of the floating point instruction that caused the fault. Four other bits are utilized, respectively, to indicate an exponent overflow condition, an exponent underflow condition, a divide-by-zero condition and a mantissa overflow condition. Another counter bit will result in a floating point fault if any of the above latter four bits are also set. The floating point counter also includes a zero vit and negative bit, as are generally used in status registers, as well as bits for indicating a floating point rounding mode of operation and an interrupt resume operations.

Stack Management Registers

The system of the invention utilizes four 32 bit registers to manage the memory stack, which registers include a stack pointer, a stack limit, a stack base, and a frame pointer. The stack pointer register references the double word entry at the top of the stack. When a "push" operation occurs, all the bits of the stack pointer are incremented by 2 and the "pushed" object is placed in the double word addressed by the new pulse of the stack pointer. In a "pop" operation the double word addressed by the current value of the stack pointer is placed in a designated register and all 32 bits of the stack pointer are then decremented by 2.

The frame pointer register references the first available double word minus two in the current frame. The stack limit contains an address that is used to determine stack overflow. After any stack operation pushes objects onto the stack, the stack pointer is compared to the stack limit. If the stack pointer is greater than the stack limit a stack fault is signaled. The stack base contains an address that is used to determine the stack underflow. After any stack operation that pops objects from the stack, the stack pointer is compared to the stack base. If the stack pointer is less than the stack base a stack fault is signaled.

Memory Management Registers

Eight registers are used to manage memory, such registers each being designated as a segment base register (SBR) having 32 bits of precision, the memory being divided into eight segments, or rings, thereof. The SBR's in the system described herein are formed as part of scratch pad registers on an address translation unit (ATU) of the system, as discussed in more detail below. One bit of each SBR indicates whether or not the segment associated therewith can be referenced (i.e. is there a valid or an invalid reference to such segment). Another bit indicates the maximum length of the segment offset field i.e. whether or not the reference is a one level page table or a two level page table, as explained in more detail below. A third bit of each segment base register indicates whether a Nova/Eclipse instruction for loading an effective address of a Nova/Eclipse I/O instruction is being executed. Another bit represents a "protection" bit which indicates whether or not an I/O instruction can be executed or whether the execution thereof would be a violation of the protection granted to such segment. Nineteen of the bits contain a physical address which identifies the physical address in the memory of the indicated page table. Discussions of the addressing of page tables in the memory are presented in more detail below including a discussion of the memory locations in each segment.

Overall System

Figure 1:
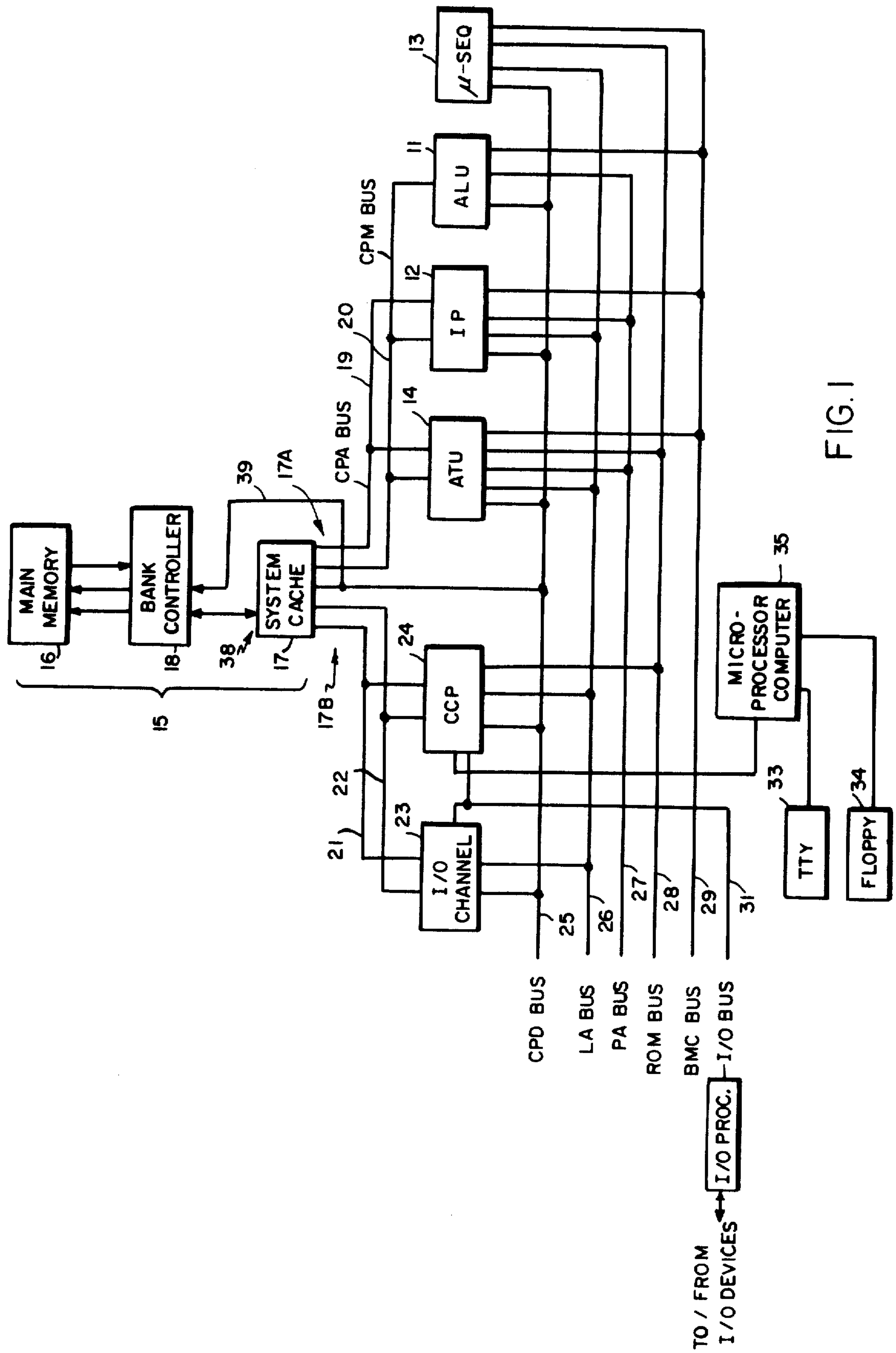
FIG. 1 shows a block diagram of the overall data processing system of the invention as described therein.

A block diagram of a preferred embodiment of the invention is shown in FIG. 1. The central processor portion of the system comprises an arithmetic logic unit (ALU) 11, an instruction processor unit 12, a micro-sequencer unit 13 and an address translation unit (ATU) 14. The memory system includes a main memory unit 16, an auxiliary cache memory unit 17 and a memory control unit identified as bank controller unit 18. A central processor address bus 19 permits the transfer of addresses among the instruction processor unit 12, the address translation unit 14 and the memory system. A control processor, memmory (CPM) bus 20 permits the transfer of instructions and operands among arithmetic logic unit 11, instruction processor unit 12, address translation unit 14 and the memory system 15.

I/O address bus 21 and I/O memory/data bus 22 permit the transfers of addresses and data respectively with respect to I/O devices via I/O channel unit 23, as well as the transfers thereof between the memory system and a console control processor unit 24. Suitable control buses for the transfer of control signals among the various units of the overall system are provided as buses 25–31 described in more detail below. Appropriate teletype and floppy disc systems 33 and 34, respectively, can be utilized with the system, particularly in the diagnostics mode of operation via console control processor unit 24 by way of a suitable micro processor computer 35.

The inventive aspects of the system to be described herein require a more detailed discussion of the memory system, the address translation unit, the instruction processor unit and the micro sequencer unit. The arithmetic logic unit, the console control processor unit and the I/O channel unit with their associated controls need not be described in detail.

Memory System

In accordance with a preferred embodiment of the invention the memory system comprises up to two megabytes of main memory 16 and, if desired, the system can be expanded even further as, for example, to 4 megabytes. It should be noted that sufficient bits are reserved in the physical address fields so as to allow for system expansion to one billion bytes of memory. The interface between the main memory unit 16 and the remainder of the system is via the dual port cache memory unit 17, data being transferred between the main memory and the cache memory unit in blocks of 16 bytes. The cache memory unit herein will usually be referred to as the "system cache" (SYS CACHE) to distinguish it from a separate cache memory in the instruction processor unit which latter memory will normally be referred to as the "instruction cache" (I CACHE) unit. The system cache unit 17 services CPU requests for data transfers on port 17A of its two ports and services requests from the I/O system at port 17B thereof. CPU data transfers can include "byte-aligned-byte" transfers, "word-aligned-word" transfers, and double word transfers. I/O data transfers can include "word-aligned-word" transfers, "double word-aligned-double word" transfers and 16 byte block transfers.

Figure 4:
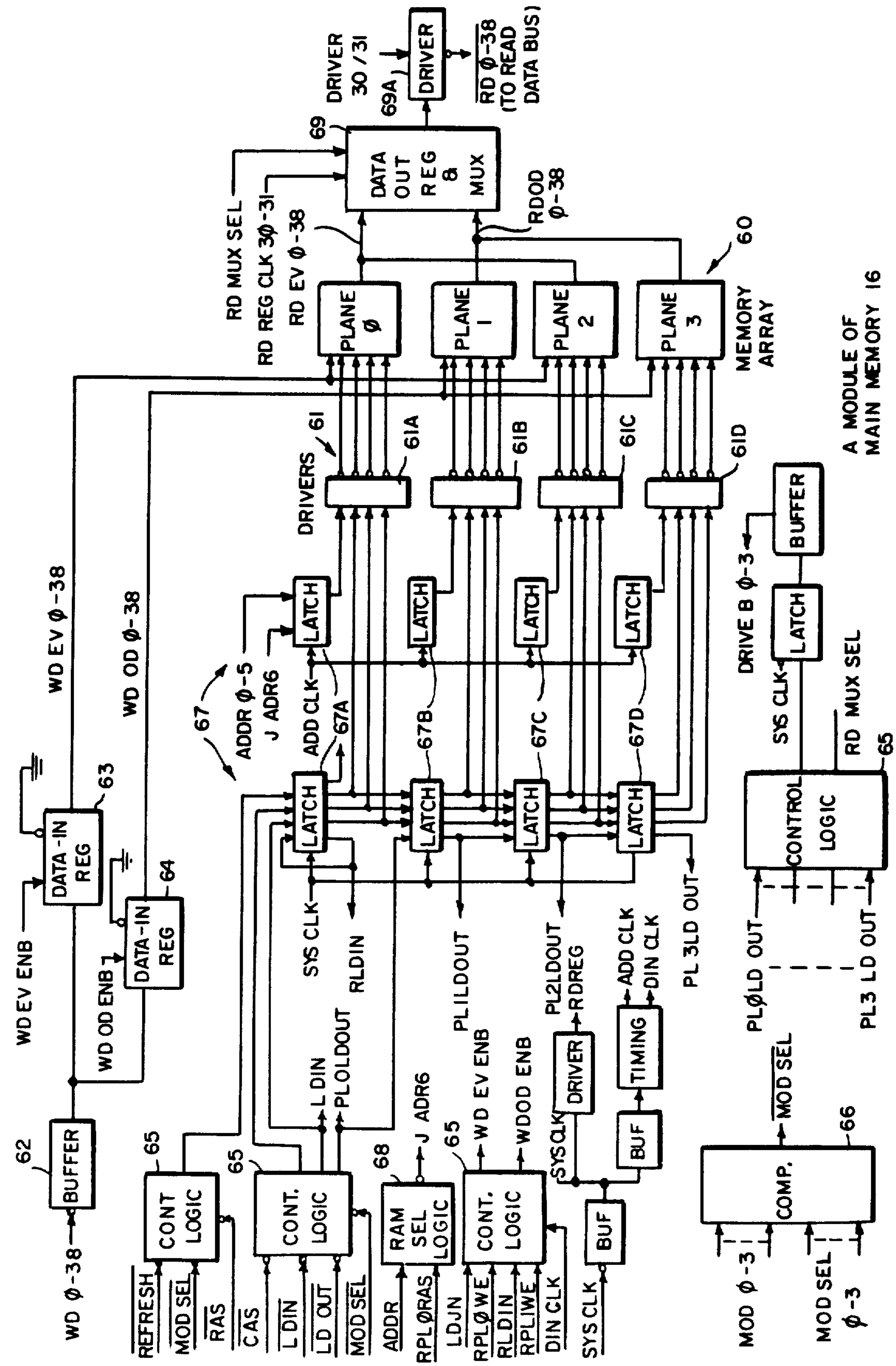
FIG. 4 shows a block diagram of a module of the main memory unit of the system of FIG. 1.

The main memory unit 16 can include from one to eight 256-kilobyte memory modules, as shown in FIG. 4. Each memory module contains a memory array of 156 16K dynamic random access memories (RAMs), organized at each module in the form of four planes Ø-3 of 16K 39-bit words each. Each word comprises 32 bits of data and 7 error correction bits, as discussed in more detail below. Memory timing and control for the RAMs of each memory module is accomplished on the memory bank controller board 18. The control signals from the memory bank controller are clocked into a register on each memory module, the outputs thereof driving the "plane-Ø" RAMs. The outputs from such reigister are clocked a fixed time later into another register which drives the "plane-1" RAMs. Such pipe line operation continues through "plane-2" RAMs and "plane-3" RAMs so that all four planes receive the same control signals at fixed intervals (e.g. 110 nanosecond intervals), resulting in the transfer of a block of four consecutive 39-bit words.

Memory bank controller 18 has three main functions. First of all, it provides an interface between the system cache 17 and the memory modules of the main memory unit 16. Secondly, it performs necessary error checking and correction operation and, thirdly, it controls the refresh operation of the dynamic RAMs on each of the memory modules. The details of the interface between the system cache and the bank controller are discussed in more detail below.

The error checking and correction logic on the bank controller performs single-bit error correction and double-bit error detection using a 7 bit error correction Hamming code as is well known in the art. The 7 check bits generated for each 32 bit data word are stored with such word in the main memory modules. When the word is subsequently read from memory, all 39 bits are decoded to produce a 7 bit pattern of syndrome bits which pattern identifies which, if any, single bit is in error and indicates when more than one bit is in error. When a correctable single-bit occurs, the console control processor 24 is provided with the address and the syndrome bit pattern of the failing bit. The data is thereupon corrected and sent to the system cache after a fixed time delay equal to a system clock period, e.g. 110 nanoseconds in a particular embodiment, in accordance with well-known error correcting operation, the remaining words in the pipe line operation being prevented from transfer until the corrected signal is made available by the use of a suitable inhibit signal identified as the BC ERROR signal.

Substantially immediate correction of single bit errors is desirable so that such errors do not grow into multiple bit errors. A conventional technique can be used in which the corrected data is written back into memory only when it has been read and found to be in error. Two problems arise with such a technique. First of all, the memory locations which are not often read are not often corrected and, secondly, significant time can be wasted in trying to correct a failure if it occurs in a frequently accessed memory location. The system of the invention can avoid such problems by utilizing a separate process for monitoring all of the main memory locations so that each location therein is checked and corrected, if necessary, once every two seconds. Such checking is performed during the memory refresh cycle and does not reduce the availability of the memory to the system. A detailed description of such a technique is disclosed in U.S. Pat. No. 4,380,812, issued Apr. 19, 1983, filed concurrently by M. Ziegler, M. Druke, W. Baxter and J. VanRoeckle, which application is incorporated by reference herein.

The system cache unit 17 represents the sole connection between the main memory unit 16 and the remainder of the system and consists of a memory system port 38 for connection to the main memory and two requestor ports 17A and 17B, as discussed above, one intended primarily for handling CPU requests and one intended primarily for handling I/O requests. The system cache board also provides a direct access path 39 between the I/O port and the memory system port providing for direct block transfers therebetween. Cache board 17 also includes a 16-kilobyte, direct mapped high speed cache data store 40 having a block size of 16 bytes which can be accessed from either the I/O or the CPU requestor port. Block diagrams of the logic utilized in the system cache unit 17, the bank controller unit 18 and a typical memory module of the main memory unit 16 are shown in FIGS. 2,3, and 4.

Figure 2:
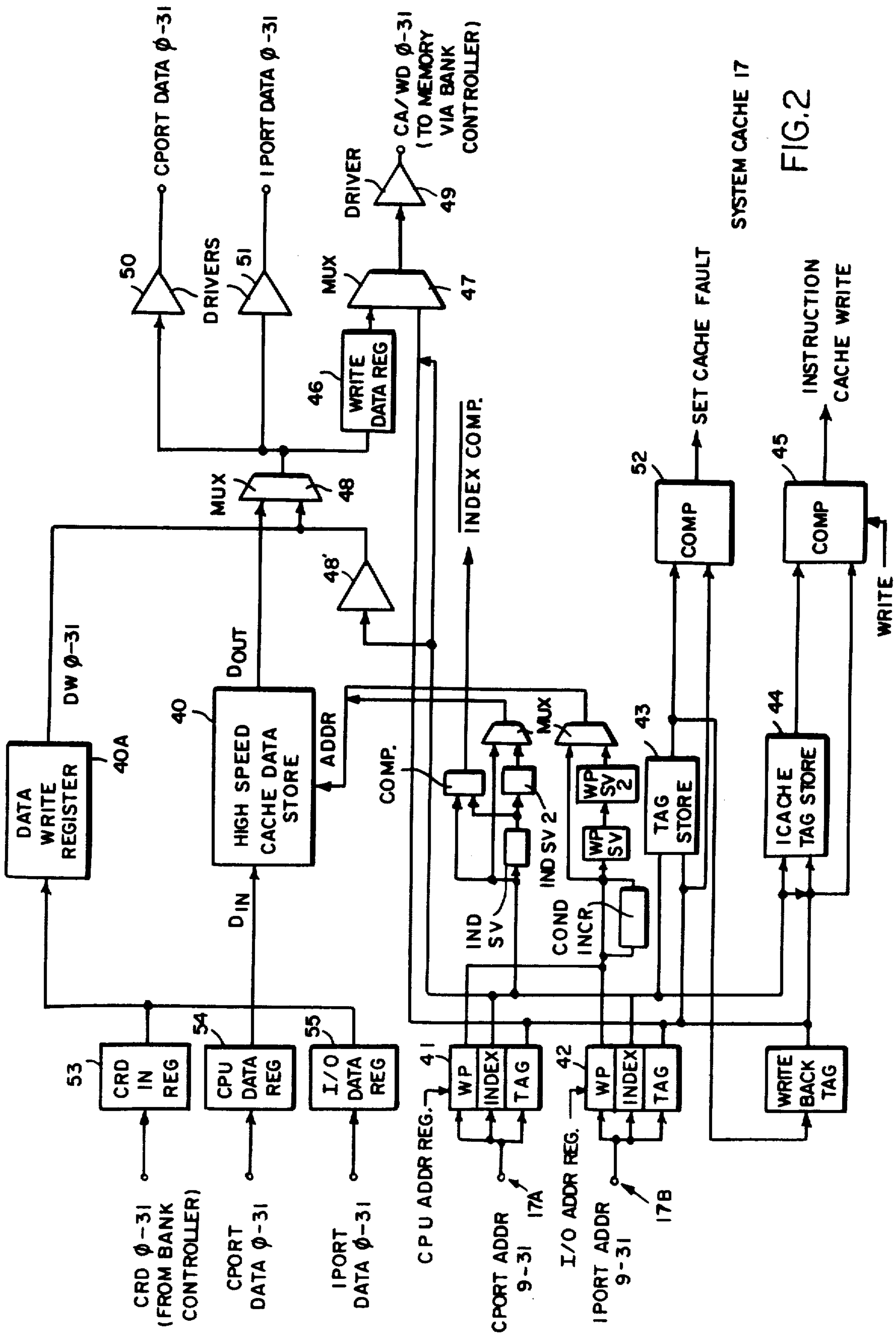
FIG. 2 shows a block diagram of the system cache unit of the system of FIG. 1.
Figure 3:
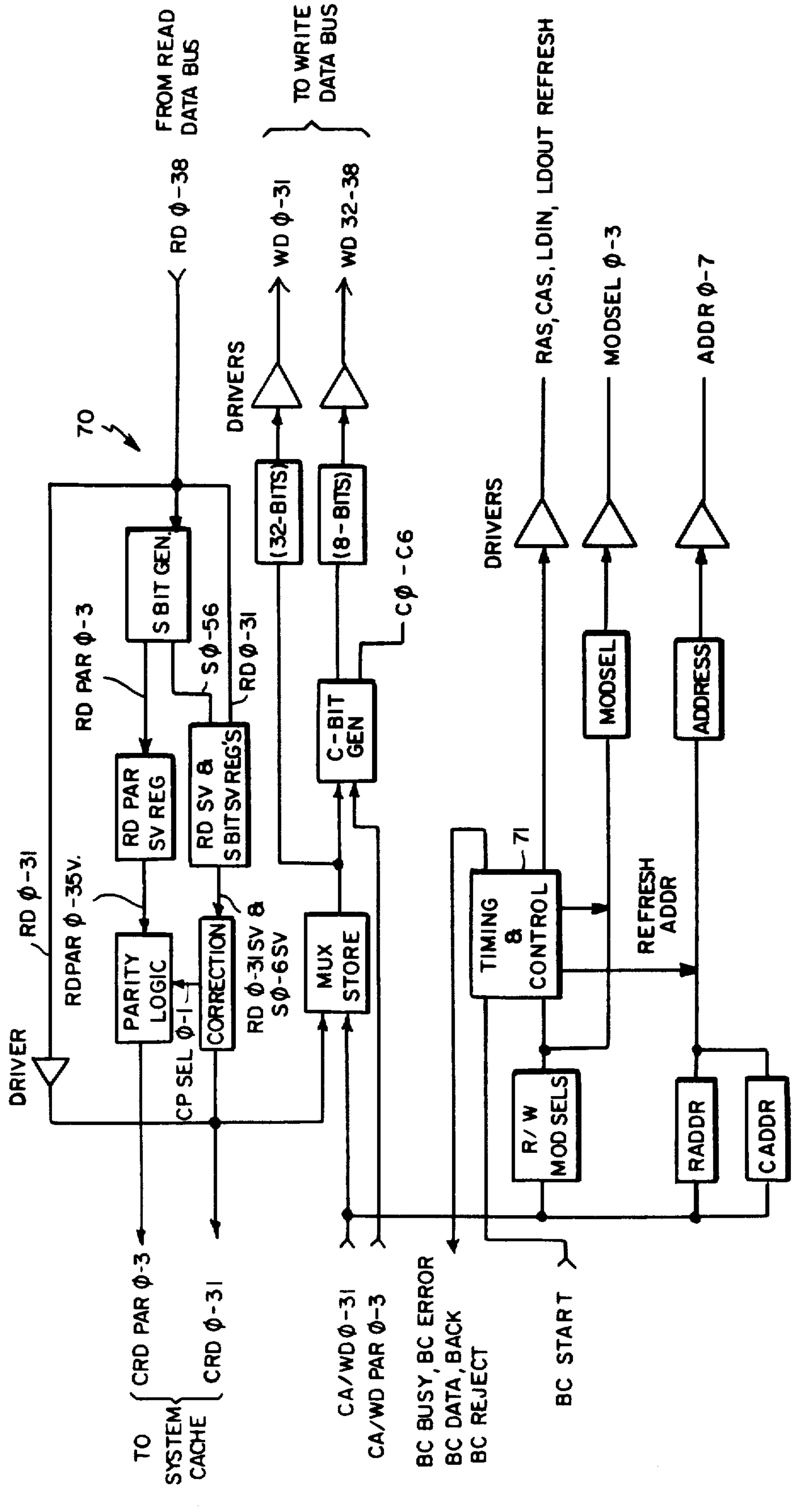
FIG. 3 shows a block diagram of the bank controller unit of the system of FIG. 1.

As can be seen in FIG. 2, the system cache data store 40 receives all requests for data from the memory other than block transfer request from the I/O port which are serviced by the main memory directly. In the particular embodiment described, the cache data store receives the data address at the address input of either CPORT 17A or IPORT 17B which address is placed in either CPORT address register 41 or IPORT address register 42. The incoming address includes a Tag portion, an Index portion and a word pointer portion as follows:

| 9 — 18 | 19 — 28 | 29 — 31 |
|---|---|---|
| TAG | INDEX | WP |

The three least significant bits 29–31 of the cache data store address specify the word pointer, which identifies the desired word within a block of the 16 byte 8 word block of the data store. The remaining bits 9–28 identify the block address which corresponds exactly to the address which would be used to fetch the desired block from the main memory. The latter bits are divided into Tag bits 9–18 and Index bits 19–28 as shown.

The system cache as depicted in FIG. 2 includes a "Tag" Store Unit 43. Data store 40 is a high speed memory array of 4K×32 bit words (i.e. 1K 16-byte blocks) and holds a copy of a block of words from main memory. The data store is addressed by the index and word pointer bits of the cache data store address word, the index being a 10-bit address of a block within the data store 40 and the three word pointer bits pointing to the desired word within the selected block, as mentioned above. A data store block may be used to buffer any data block of main memory which shares the same index.

The function of the Tag store 43 is to identify which of the many possible blocks from the main memory is buffered in each 16 byte block of the data store 40. Tag store 43 is a high speed array of 1K 12-bit words and is addressed by the 10-bit index portion of the memory address. Each 12-bit word contains ten bits which identify the block from the main memory which is buffered in data store 40. When the main memory is 4 megabytes or less, the first two bits of this tag are needed only for future expansion of the main memory capacity and can be zero. Bits 10 and 11 are flags to indicate the status of the data. Thus a "valid" flag V indicates that the identifiable data store block contains valid data. For example, if an I/O port operation were to request a block "write" to main memory which modifies the contents of a block which has already been buffered in the data store 40, the valid flag of that block would be reset to indicate that its data is no longer valid.

A "modify" flag M indicates that the contents of the data store block have been modified. Thus, if a data block is removed from the data store 40 to make room for a new data block from main memory, the removed data block is written back to main memory if the modified data flag is set.

A second tag store unit 44 is shown on the system cache board, which latter tag store is a replica of the instruction cache (ICACHE) tag store which is described later. The ICACHE tag store is used on the system cache board to determine when a write to memory would affect the contents of the instruction cache at the instruction processor. When such an effect would occur, as indicated by a comparison at comparator 45 of the incoming address and the ICACHE address, the system cache alerts the instruction processor by asserting an "instruction cache write" signal, as indicated in FIG. 2, to inform the instruction cache (ICACHE) at the instruction processor board of the location of the block which has been so modified.

In the operation of the system cache all requests are initially assumed to be "read" requests, since even when a "write" request occurs it is possible that the data to be written will need to be read and modified (a "read-modify-write" operation) before the write operation is to be performed. If the system cache is not busy when a request is received at an input port, the data store 40 and the tag store 43 are accessed simultaneously, using the appropriate portions of the received input address as discussed above. The data from the location in the data store 40 which has been addressed is loaded into the cache write data register 46 via multiplexer 48 if the data transfer is a write into memory operation so that in the next cycle the contents of the write data register 46 can be enabled onto the bus via multiplexer 47 and bus driver unit 49. If the data is a read operation the data output from data store 40 is supplied at the CPORT or IPORT, as required, via multiplexer 48 and driver units 50 and 51, respectively.

The data from the tag store 43 is first examined to determine if the requested data, is, in fact, in the data store 40. The tag portion of the word which is read from the tag store is compared at comparator 52 with the tag portion of the address which has been submitted by the requestor and the valid flag checked to see that it is set. If such comparison is successful (a system cache "hit") the data from data store 40 is the desired data and the requestor is permitted to receive it or to write it into memory. If the comparison fails (a system cache "miss") the data block which has been requested is not in the cache data store 40 and must be brought in from the main memory. Such an occurrence is termed a "cache fault" condition and, when such fault occurs, the requestor is prevented from loading in data until after the fault is resolved.

Once the data is available for the requestor the requestor must signal that it wishes to accept the data and, if the requestor does not do so when the data first becomes available, the read operation will be repeated until the requestor indicates its willingness to accept the data.

Because access to the data in data store 40 requires two system clock cycles to complete, the cache addresses as received from requestors can be "pipe-lined" in a manner such that two accesses can be in progress at any one time. Advantage is taken of this ability to pipeline access requests by intertwining the accessors of one of the input ports with those of the other input ports. An appropriate clocking signal, which has a frequency one-half that of the basic system clock, is used to indicate which requestor port is allowed to access the cache data store at any given time. As a result there is no interference between CPU and I/O port accesses except during a cache fault. The only exception is that both I/O and CPU ports are not allowed to be in the process of accessing the same data store block at the same time. An example of the intertwining operation between the ports for a read operation is discussed below. In the particular example described the CPU port requestor does not choose to take the data at the first opportunity so that a read repeat occurs.

| t0 | t1 | t2 | t3 | t4 | t5 |
|---|---|---|---|---|---|
| CPU PORT READ | Address and START Signal on bus. | Tag and Data Stores read. | Data ready. Requestor does not assert RT Signal. | Data Store read again. | Data Ready. Requestor asserts RT Signal and loads data. |
| IO PORT READ | Idle cycle or end of last access. | Address and START Signal on bus. | Tag and Data Stores read. | Data ready. Requestor asserts RT Signal and loads data. | Idle cycle or start of next access. |

For a cache write operation, the cache, at the time the memory write access is initiated, assumes that a read-modify-write operation will be performed and accordingly does a read as described above. However, even if the transfer is to be a simple write operation, the tag store information must be read to determine the location at which the incoming data will be written so that in actuality no time is lost in performing a superfluous data store read operation. For a simple write operation, or for the write portion of a read-modify-write operation, the requestor asserts a write transfer (WT) signal to indicate completion of the transfer. Instead of driving the data from the output register onto the memory port 38 the system cache loads an input register 53 with the data which is to be written from the data bus at the end of the cycle and writes it into the data store 40 during the next cycle. If a cache fault results from such a write request, the system cache accepts the data to be written into the input register but does not write it into the data store 40 until after the fault is resolved. An example of a CPU port write request in a manner similar to that discussed above for a read request is shown below.

| t0 | t1 | t2 | t3 | t4 | t5 |
|---|---|---|---|---|---|
| CPU PORT WRITE | Address and START and WRITE Signal on bus. | Tag and Data Stores read. | Data ready. Requestor asserts WT Signal and sends data. | Data Store written. | Idle cycle. |
| IO PORT READ | Idle cycle or end of last access. | Address and START Signal on bus. | Tag and Data Stores read. | Data ready. Requestor asserts RT Signal and loads data. | Idle cycle or start of next access. |

The examples discussed above show single read or single write operations. It is also possible for a requestor to submit a new address and a START signal along with the read transfer (RT) and/or write transfer (WT) signal, so that consecutive read operations or consecutive write operations from a single port can be performed every two cache cycles (a CPU cycle, for example, is equivalent to two cache cycles) unless a cache fault occurs. However, if a read access is initiated at the same time that a write transfer is performed, the data store 40 cannot be read on the next cycle because it is being written into at that time. When this condition happens, the read operation requires an additional two cache cycles for completion. If the requestor is aware that a read operation is following a write transfer and wishes to avoid a wasted cycle, the requestor can either delay starting the read request until the next cycle or it may start the read request to wait an extra cycle before requesting the data transfer. In either case useful work could be done in the otherwise wasted cycle, although initiation of a read followed by a wait for an extra cycle is usually more desirable because it allows a cache fault to be detected at an earlier point in time.

A read-modify-write operation can be accomplished by asserting a START signal and WRITE signal along with the address, followed by a read transfer at a later cycle and a write transfer at a still later cycle. When a WRITE signal is signaled at the start of an access, the system cache will not consider that the access has been completed until a write transfer is performed. During such operation all other requestors are prohibited from accessing the same data. Thus, requestors utilizing the same input port are prevented from access by the fact that the first requestor controls the bus during the entire read-modify-write operation. Requestors on the other port are prevented from access by the fact that both ports are prohibited from accessing the same data store block at the same time. Such prohibition also prevents requestors at another port from removing a block of data from the cache data store when the system cache is in the middle of an operation.

If the system cache board receives a write transfer request when a write operation has not been previously indicated or, if it receives a read transfer and a write transfer request simultaneously, access to the system cache data store is aborted without the transfer of any data. If such simultaneous read and write transfer requests are asserted at the beginning of the next cycle after the START request, the access may be avoided without even initiating an unnecessary cache fault indication.

In addition to the above transfers, the system cache board has the capability of performing direct write transfers between the input ports and the main memory, the bulk of such data traffic being capable of being handled without affecting the contents of the cache data store 40. If the requested transfer is a block write transfer, the data is written directly into the main memory via data write register 40A, MUX 48 and write data register 46. Data transfers at the I/O port are not allowed when the CPU port is in the process of accessing data which has the same Index as the I/O block which is to be transferred. Data read-modify-write transfers are also not permitted by the system.

In the overall system cache block diagram shown in FIG. 2, the input registers for the CPU request port and the I/O request port are shown as data registers 54 and 55. Addresses associated with the data at such registers are supplied to the CPU address register 41 and the I/O address register 42, each address comprising the Index, Tag and Word Pointer as discussed above.

Specific logic diagrams of the system cache board 17 depicted in FIG. 2 are shown in FIGS. 5–44, which latter figures are appropriately labeled as follows to show more specifically a particular embodiment of the various portions of the system cache 17 depicted therein.

Figure 6:
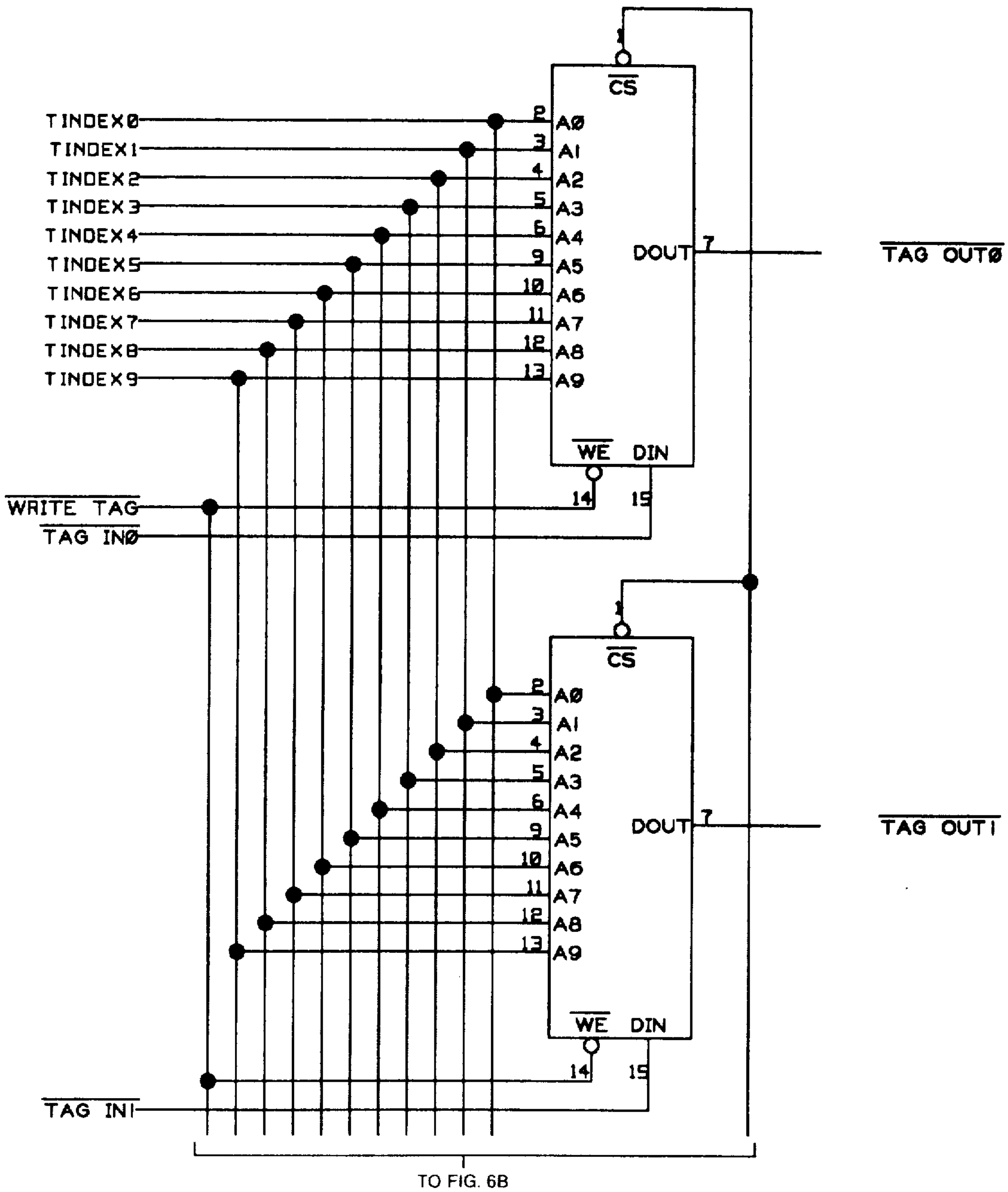
Figure 6A:
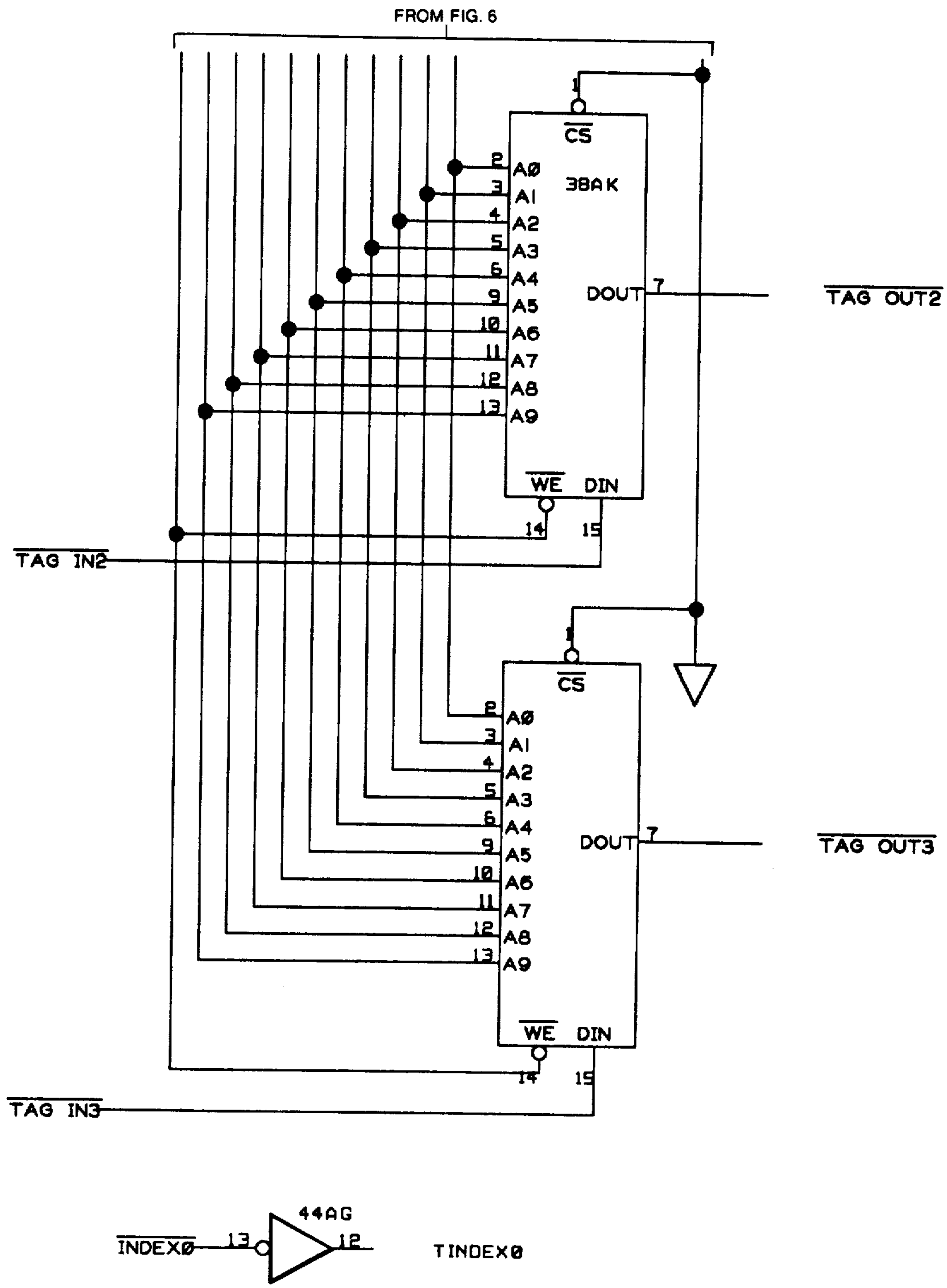
Figure 6B:
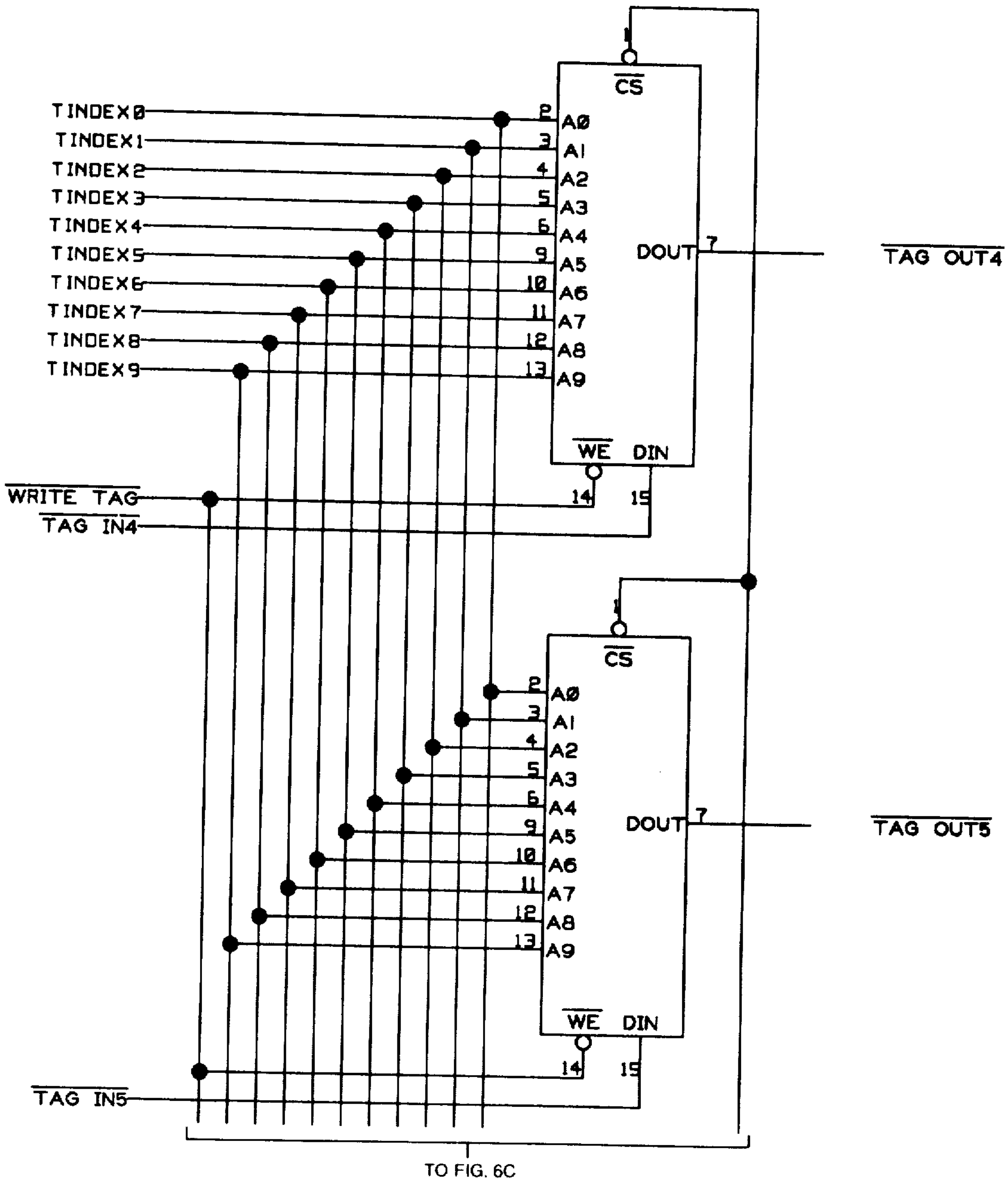
Figure 6C:
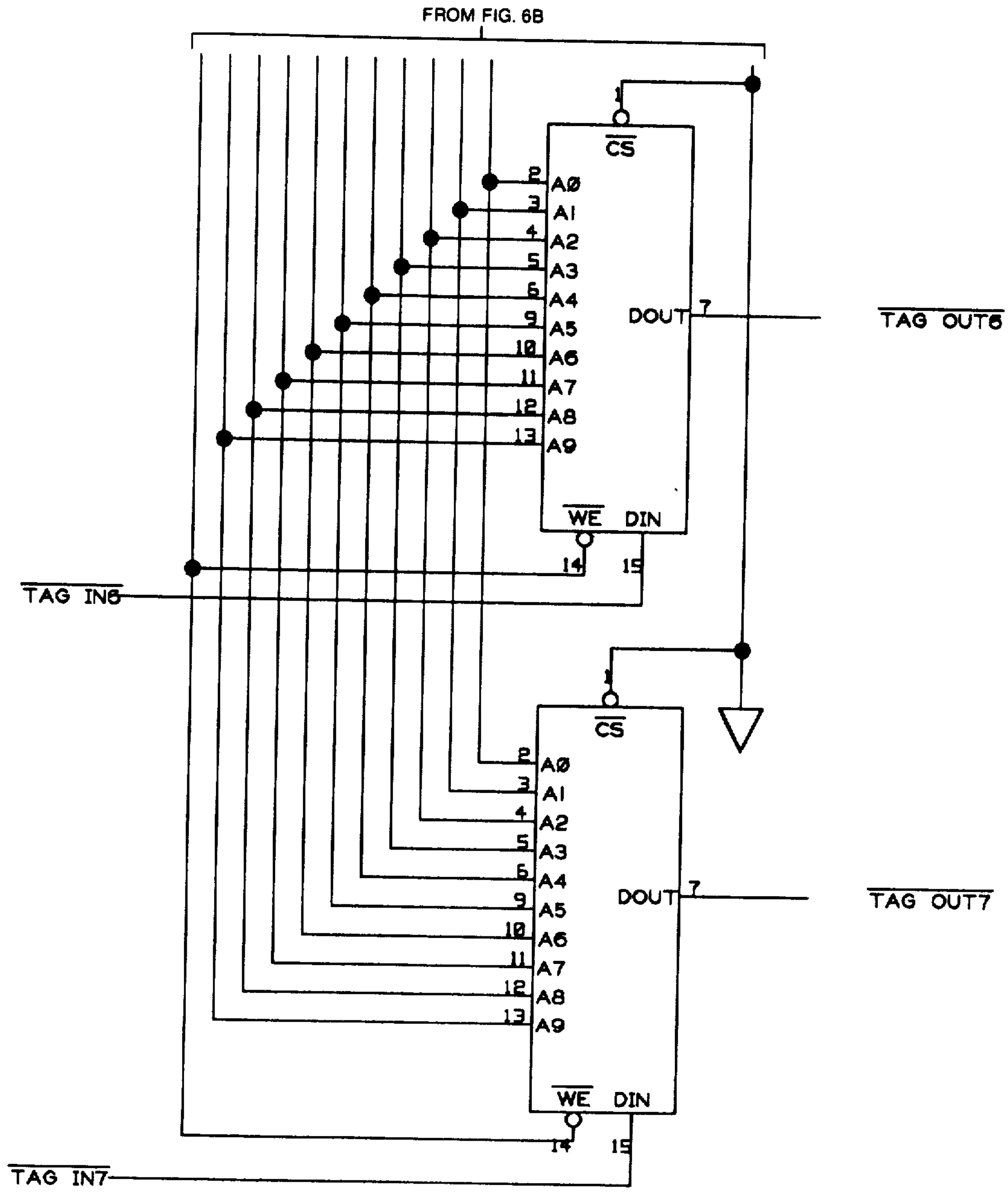
Figure 6D:
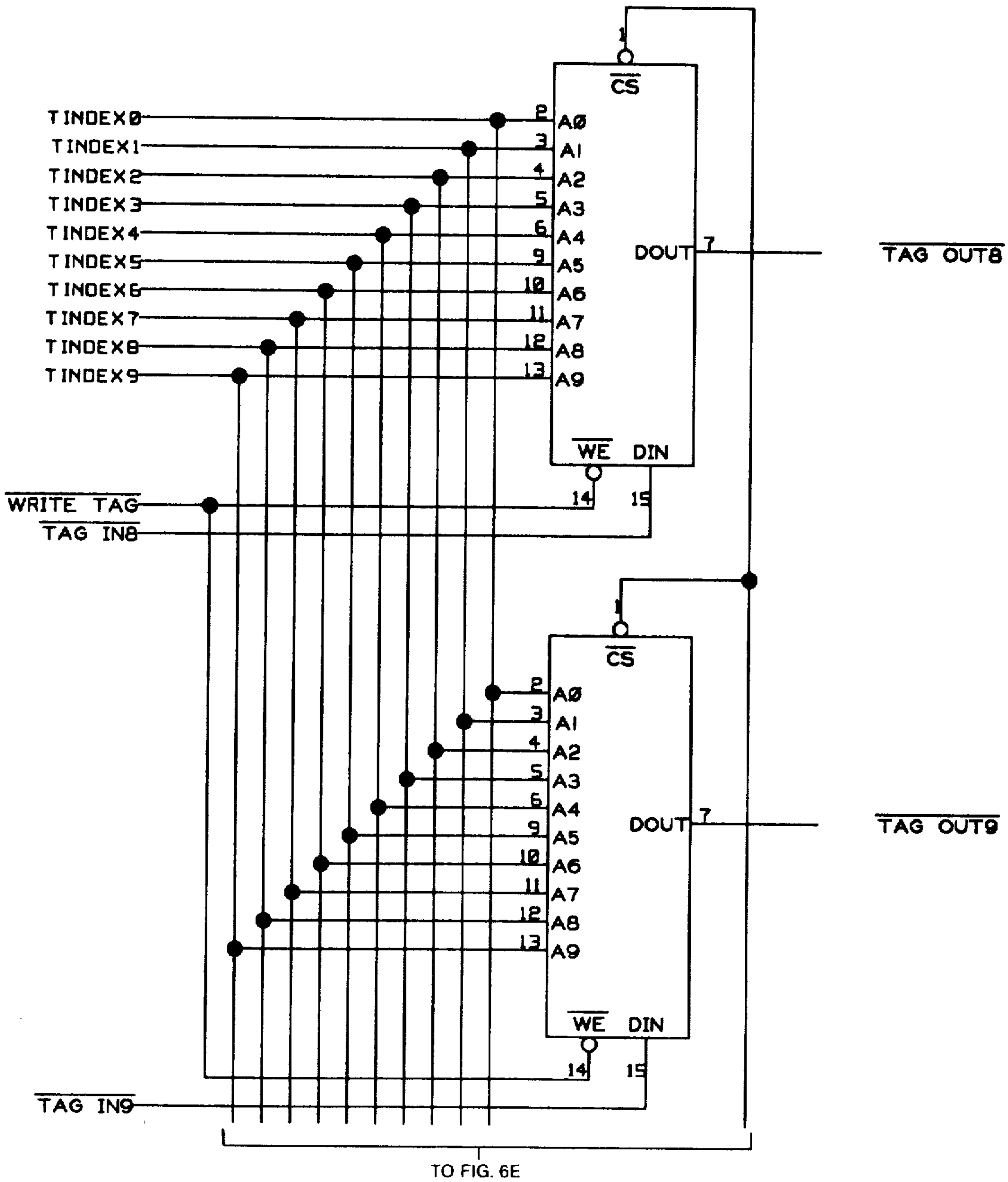
Figure 6E:
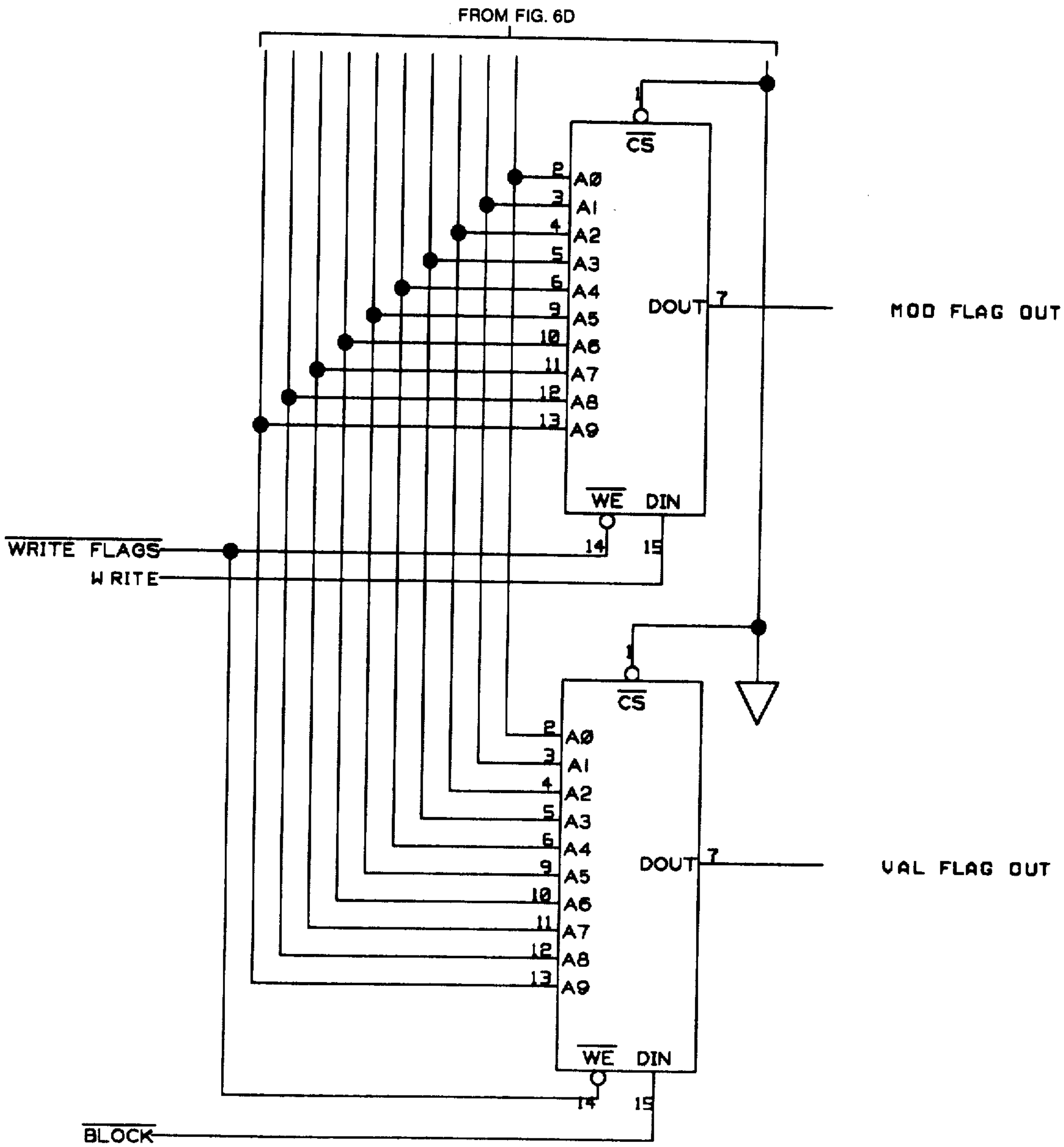
Figure 7:
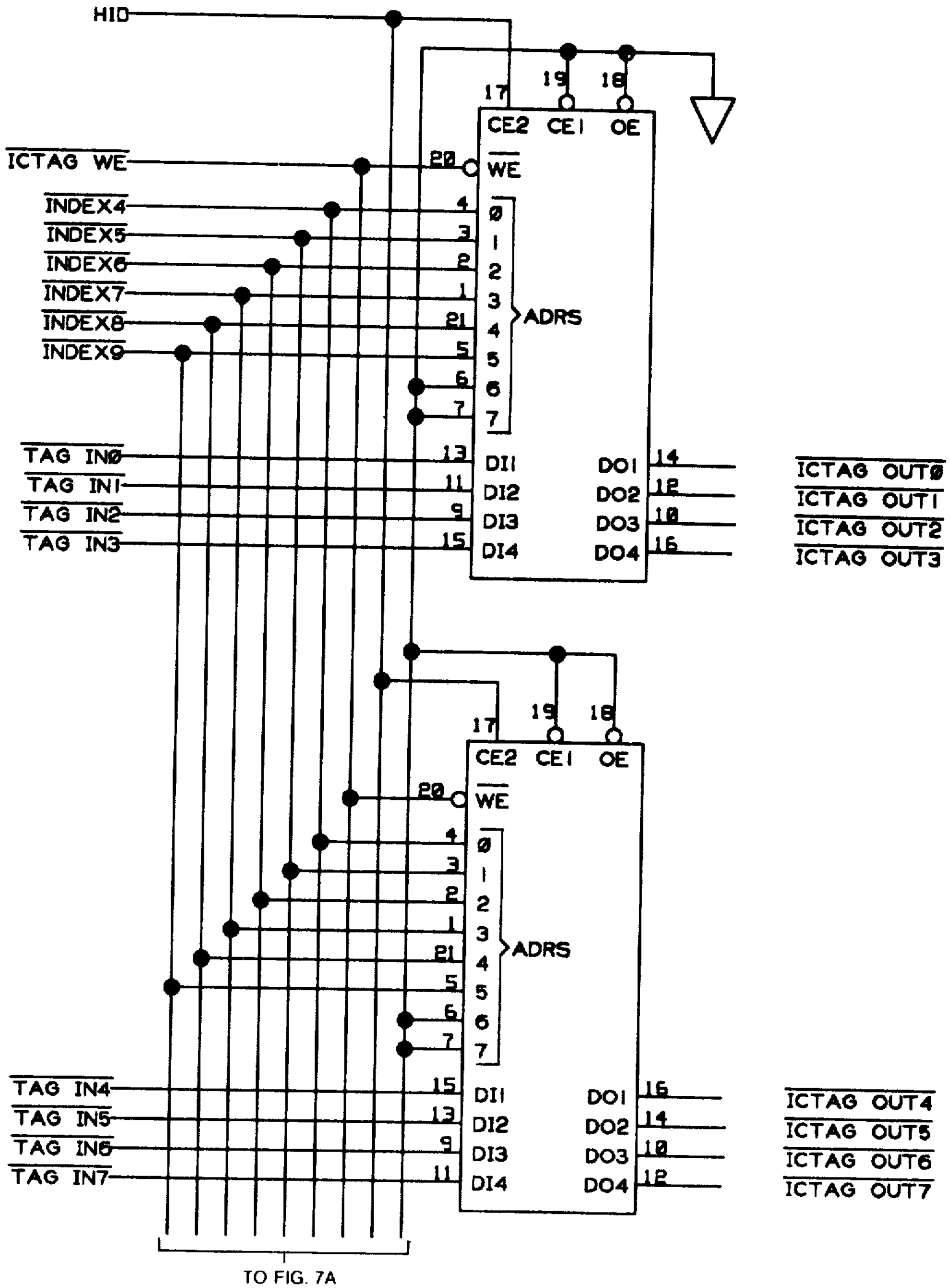
Figure 7A:
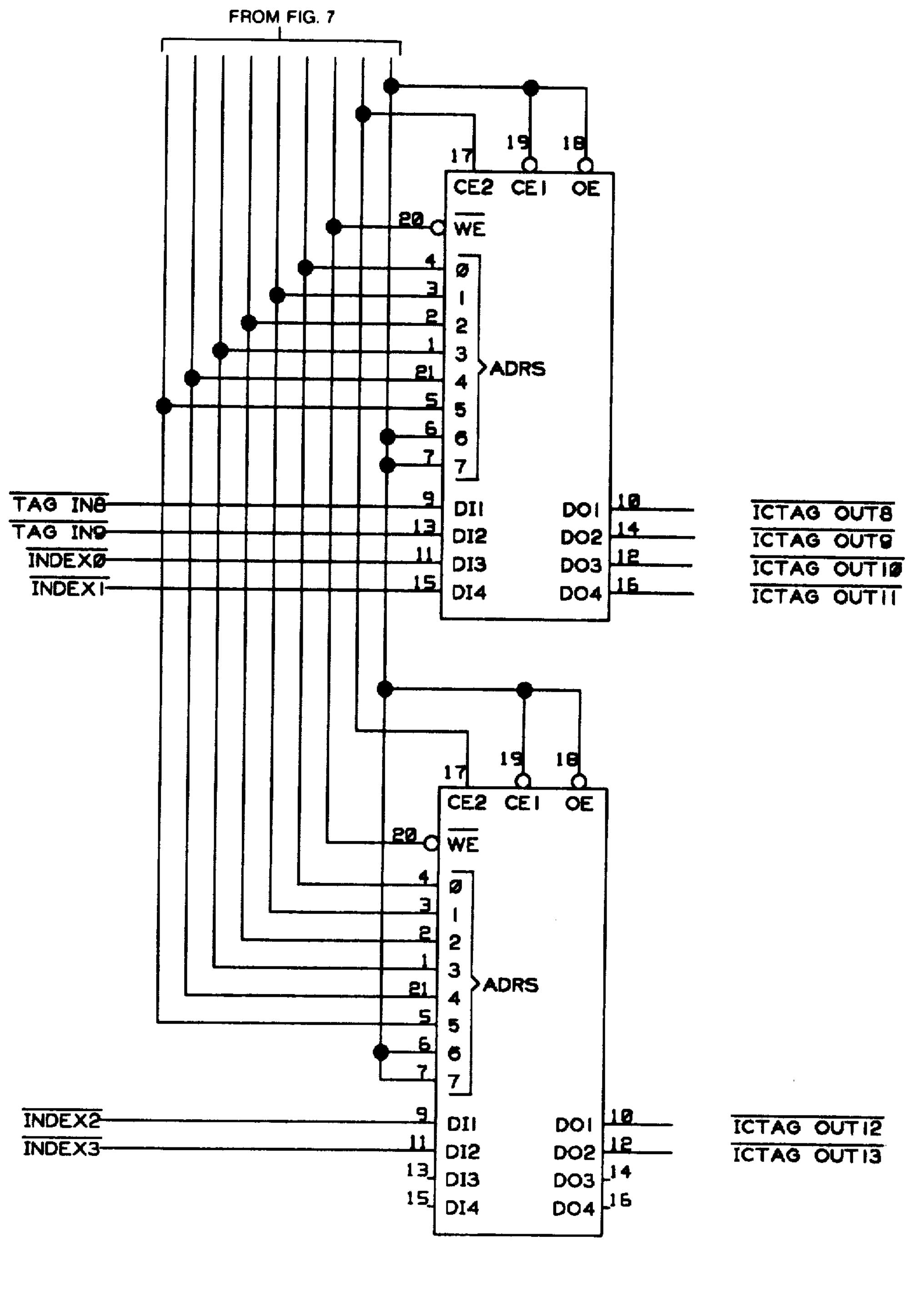
Figure 8:
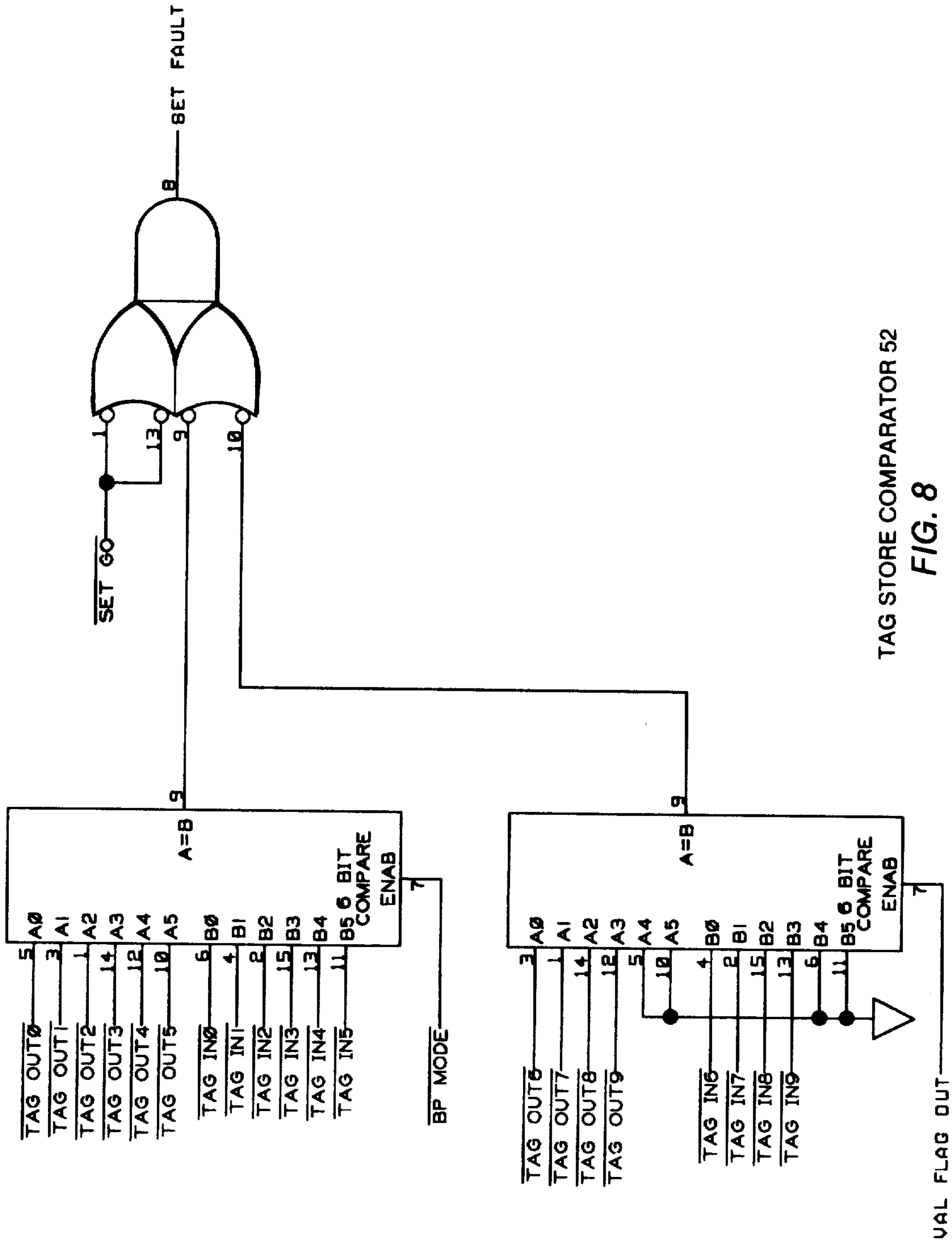
Figure 9:
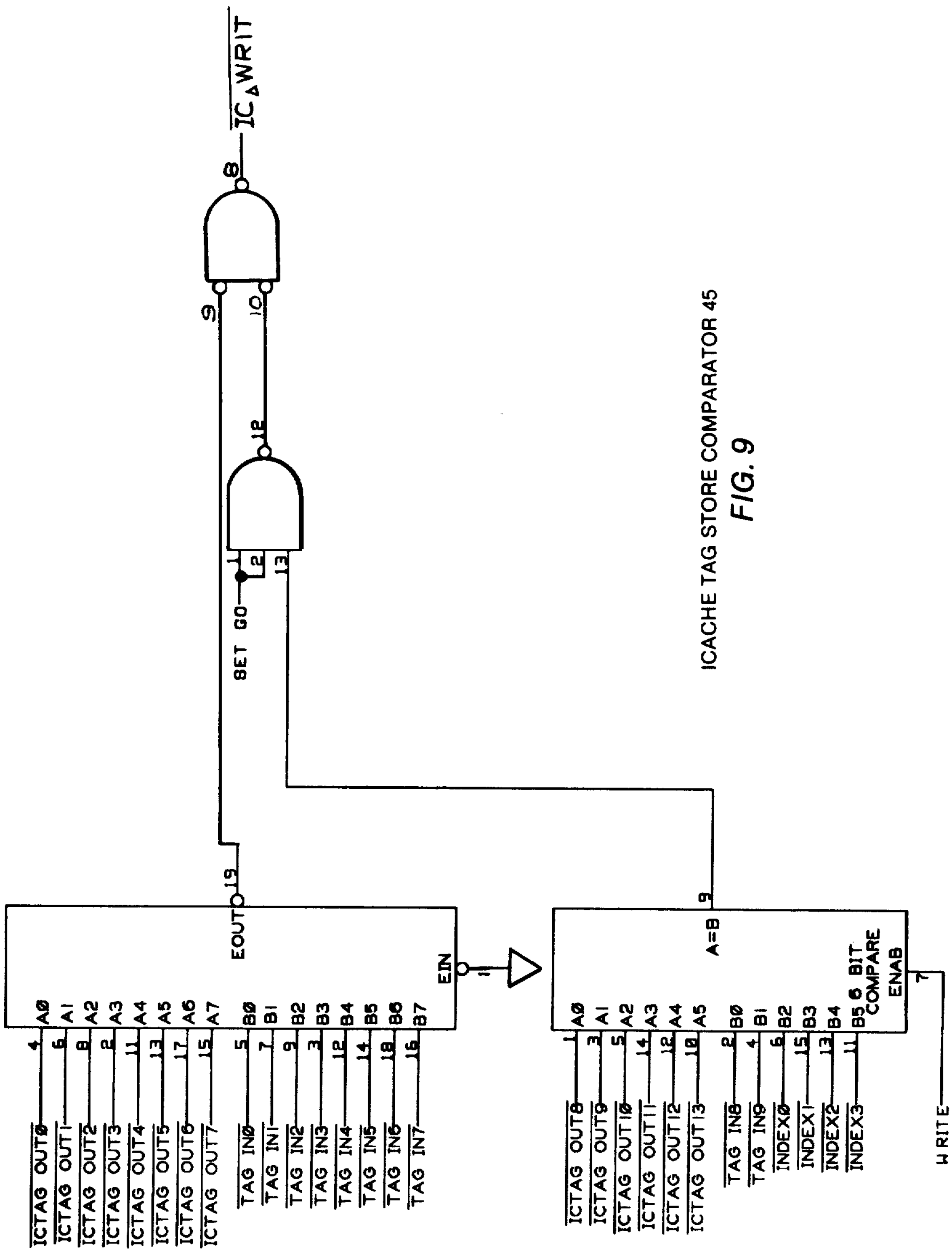
Figure 10:
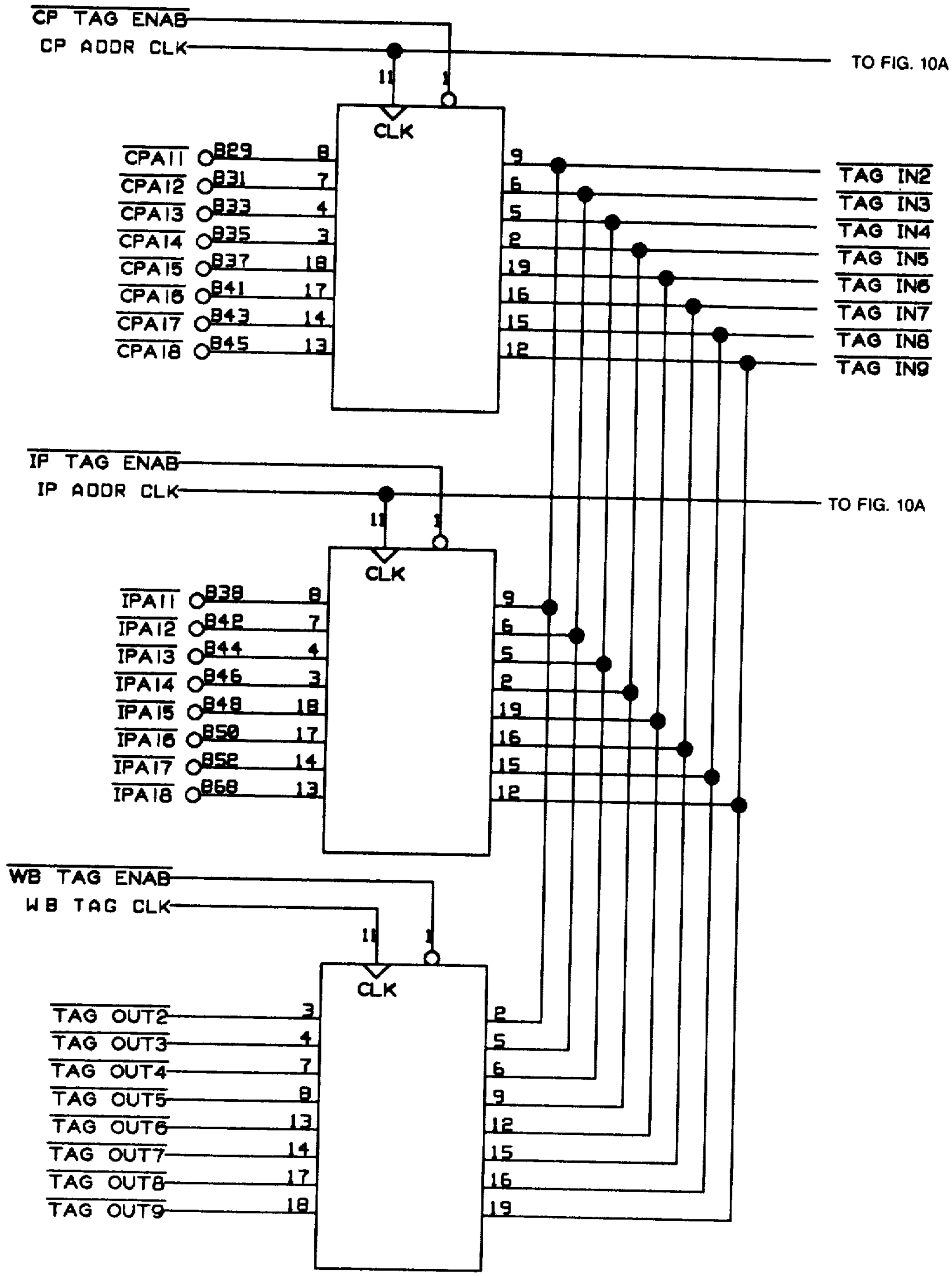
Figure 10A:
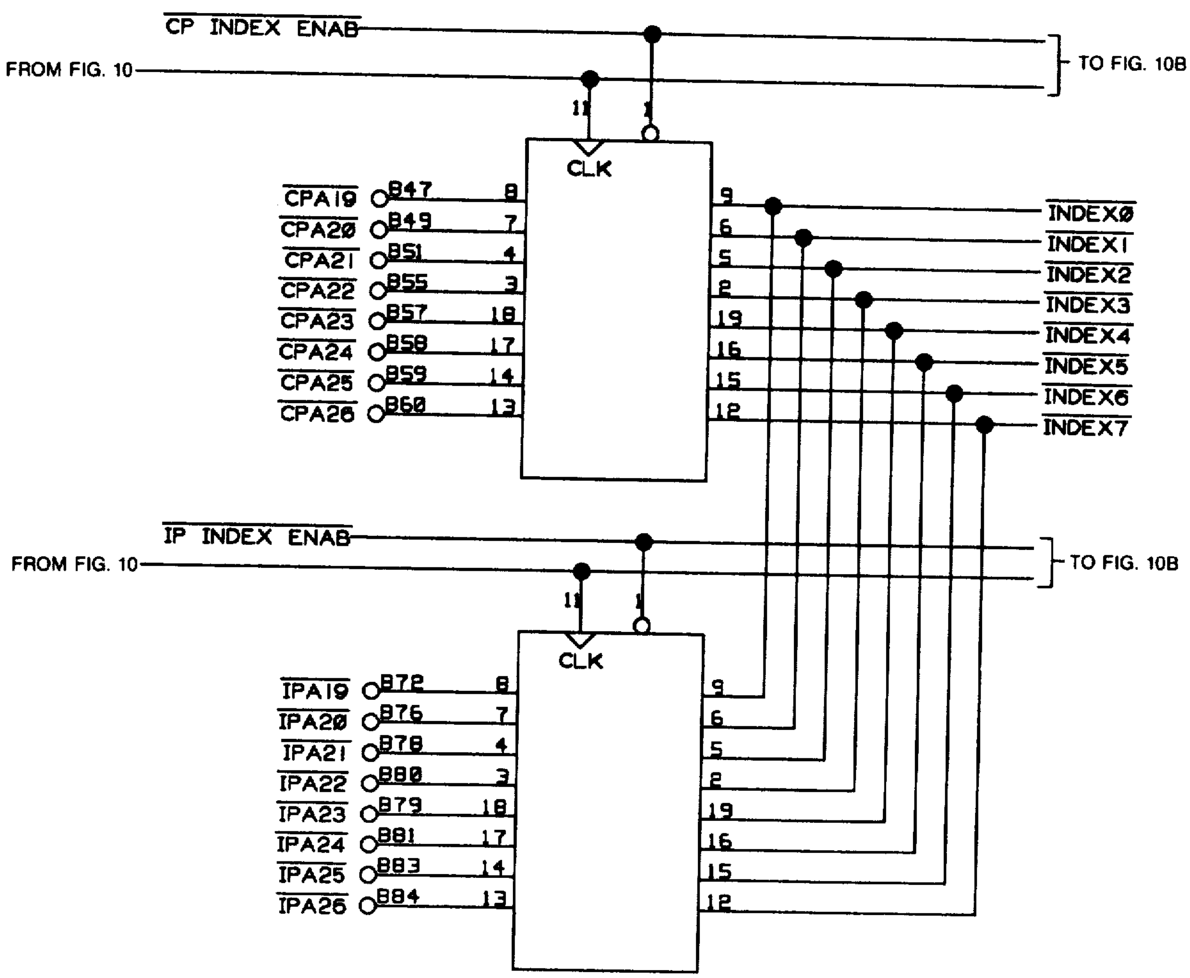
Figure 10B:
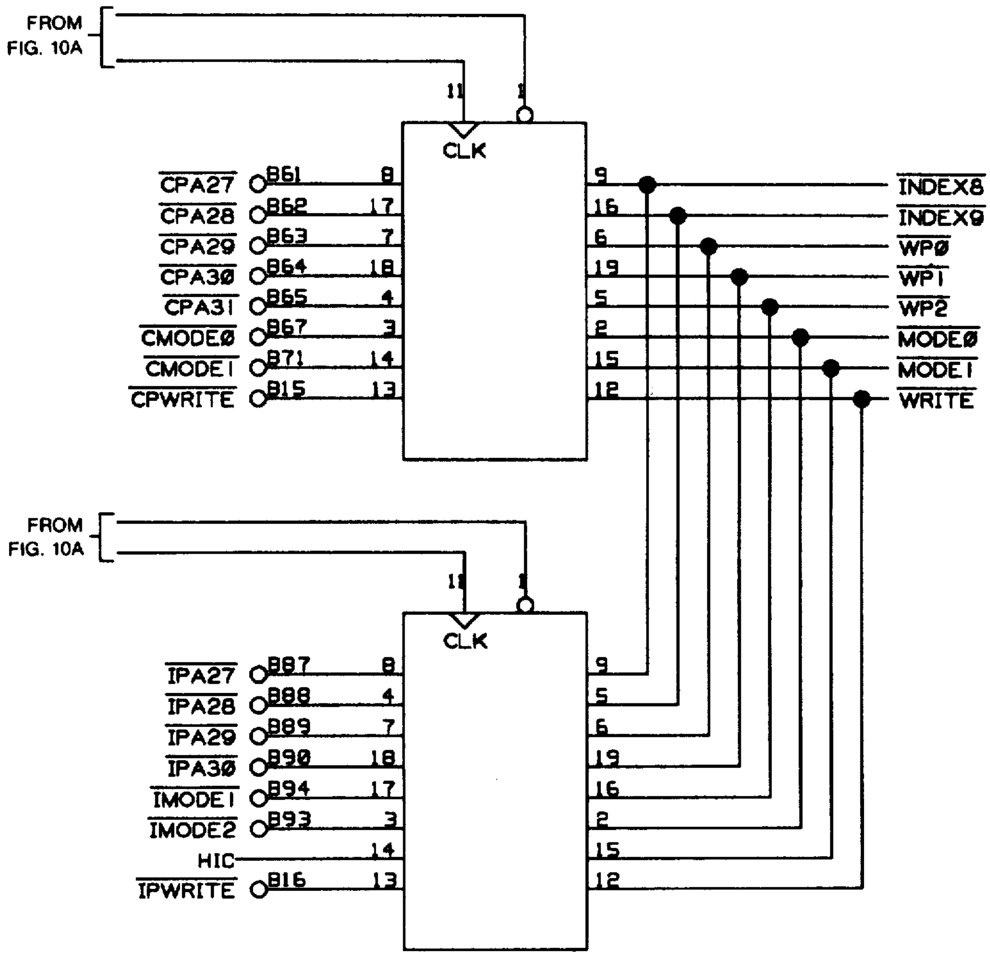
Figure 11:
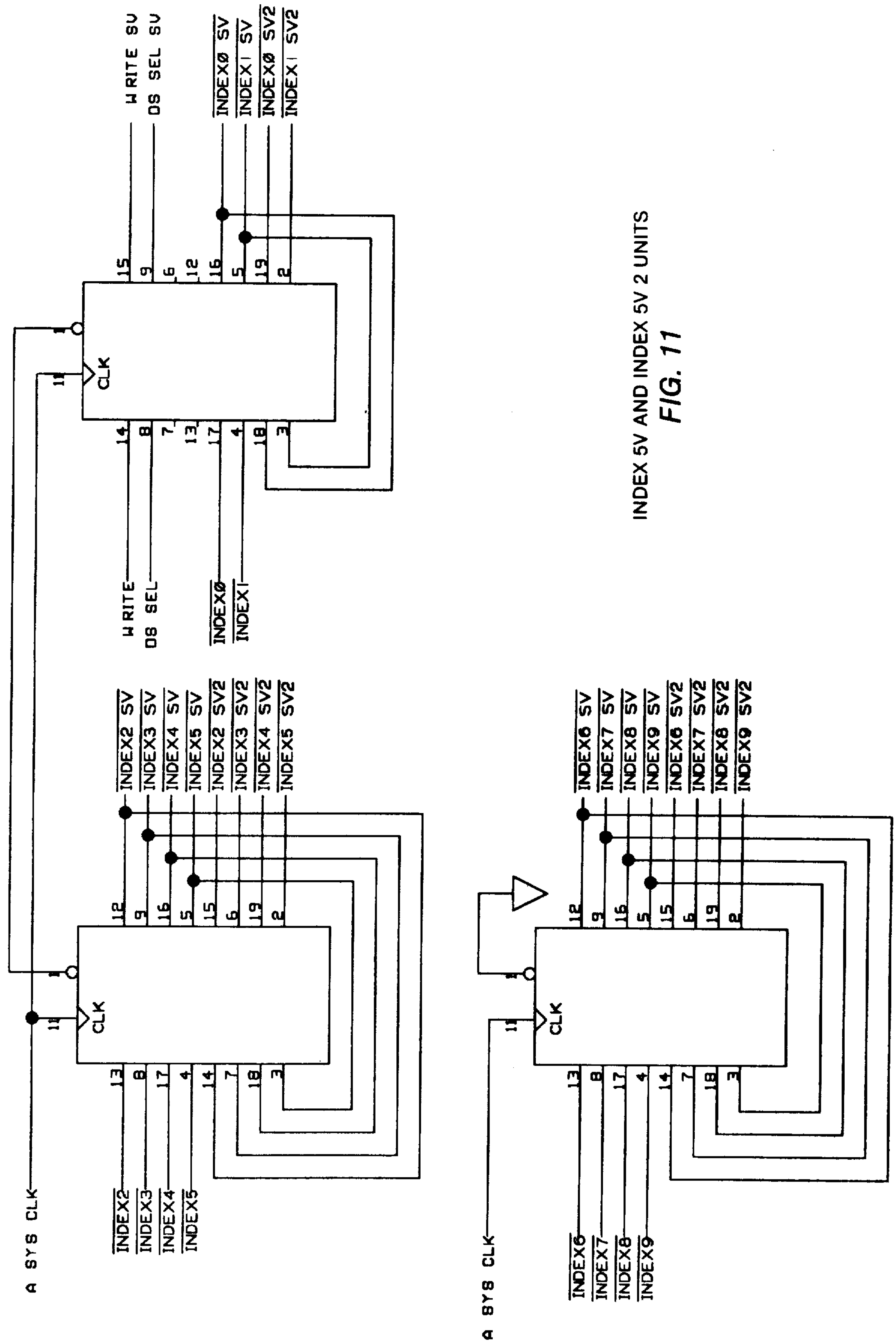
Figure 12:
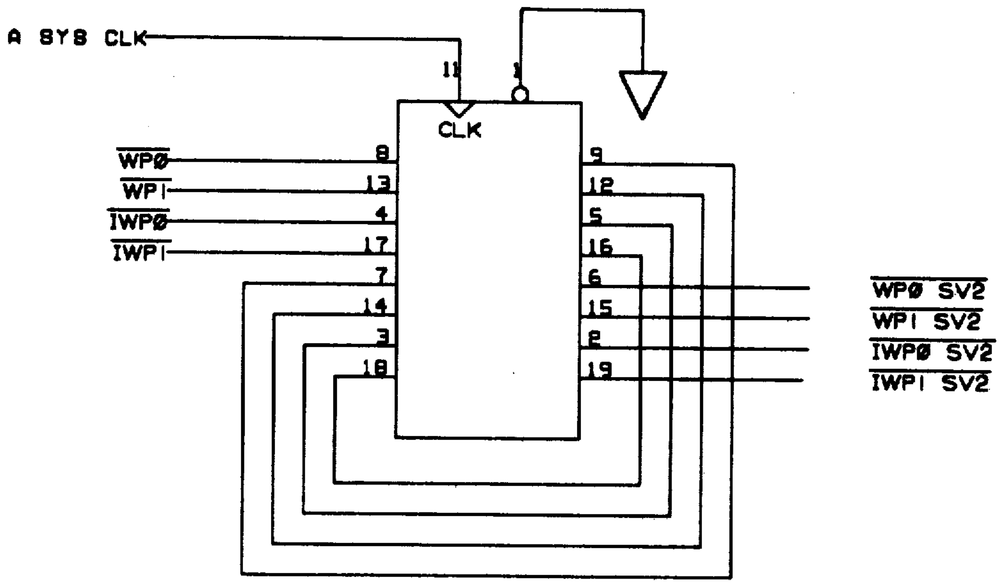
Figure 13:
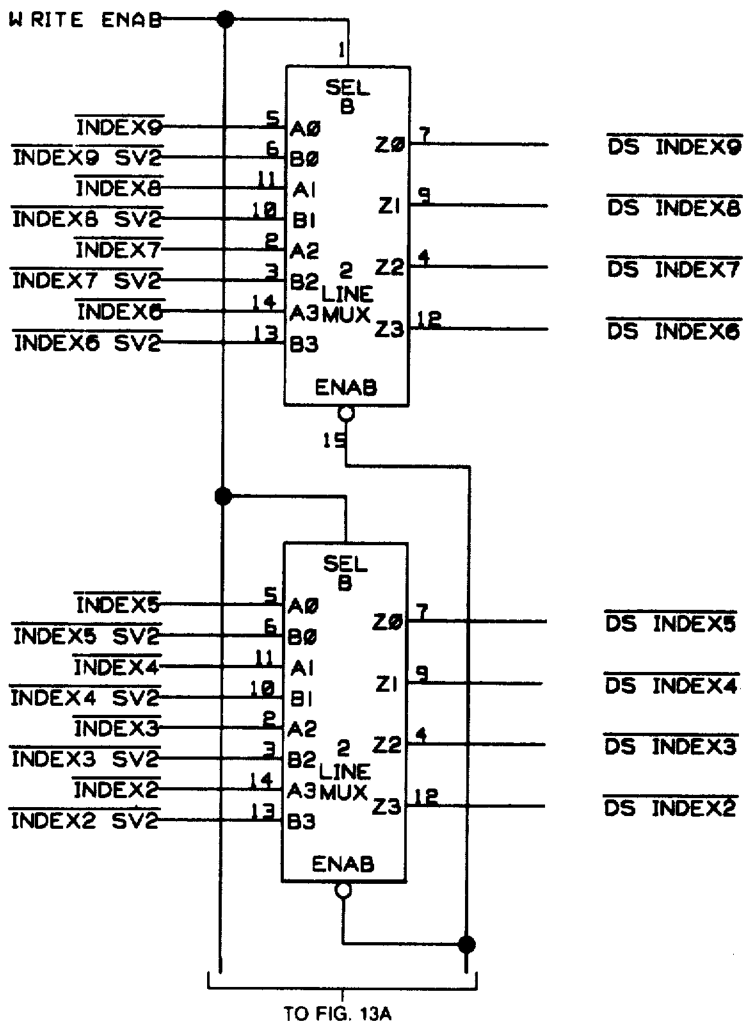
Figure 13A:
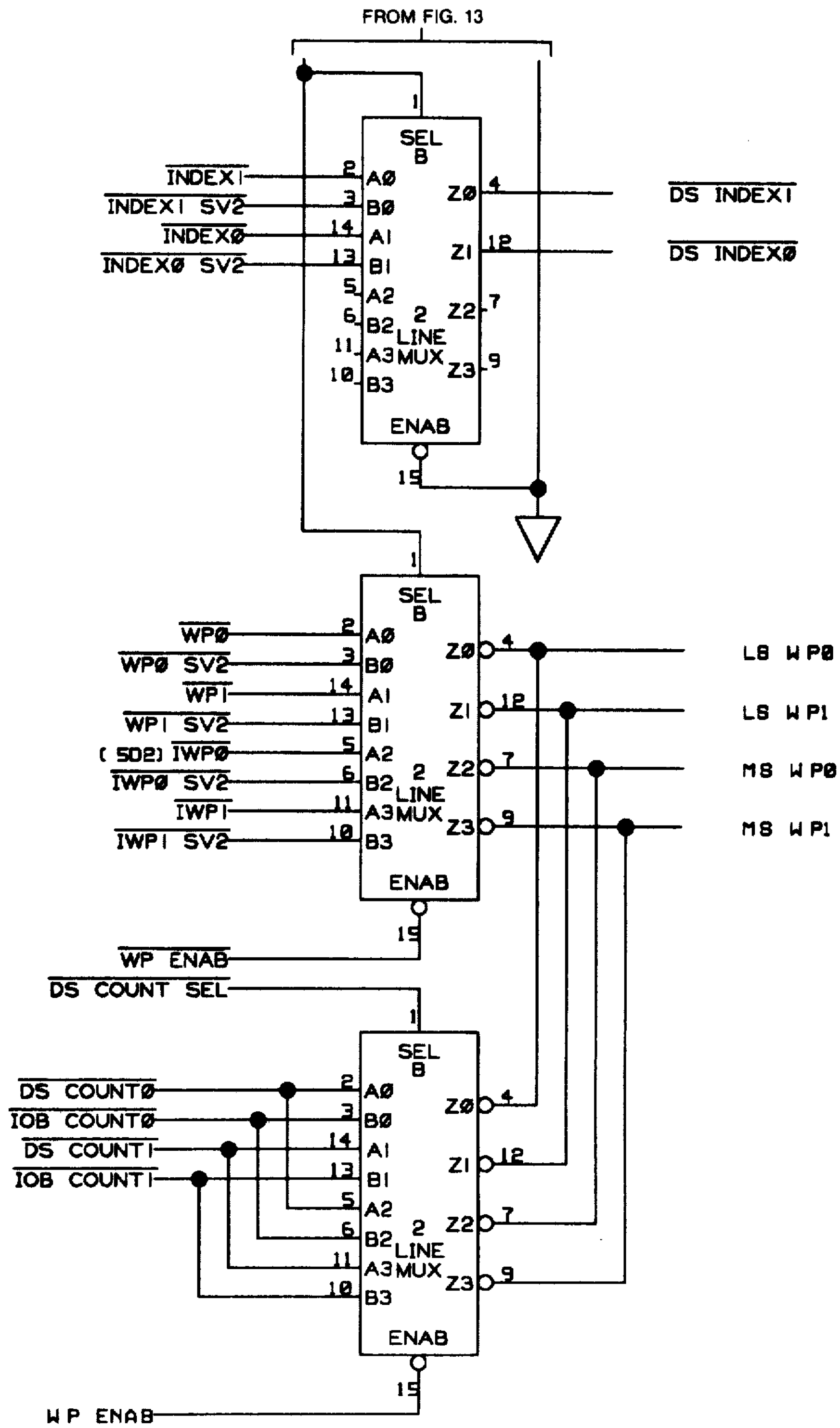
Figure 14:
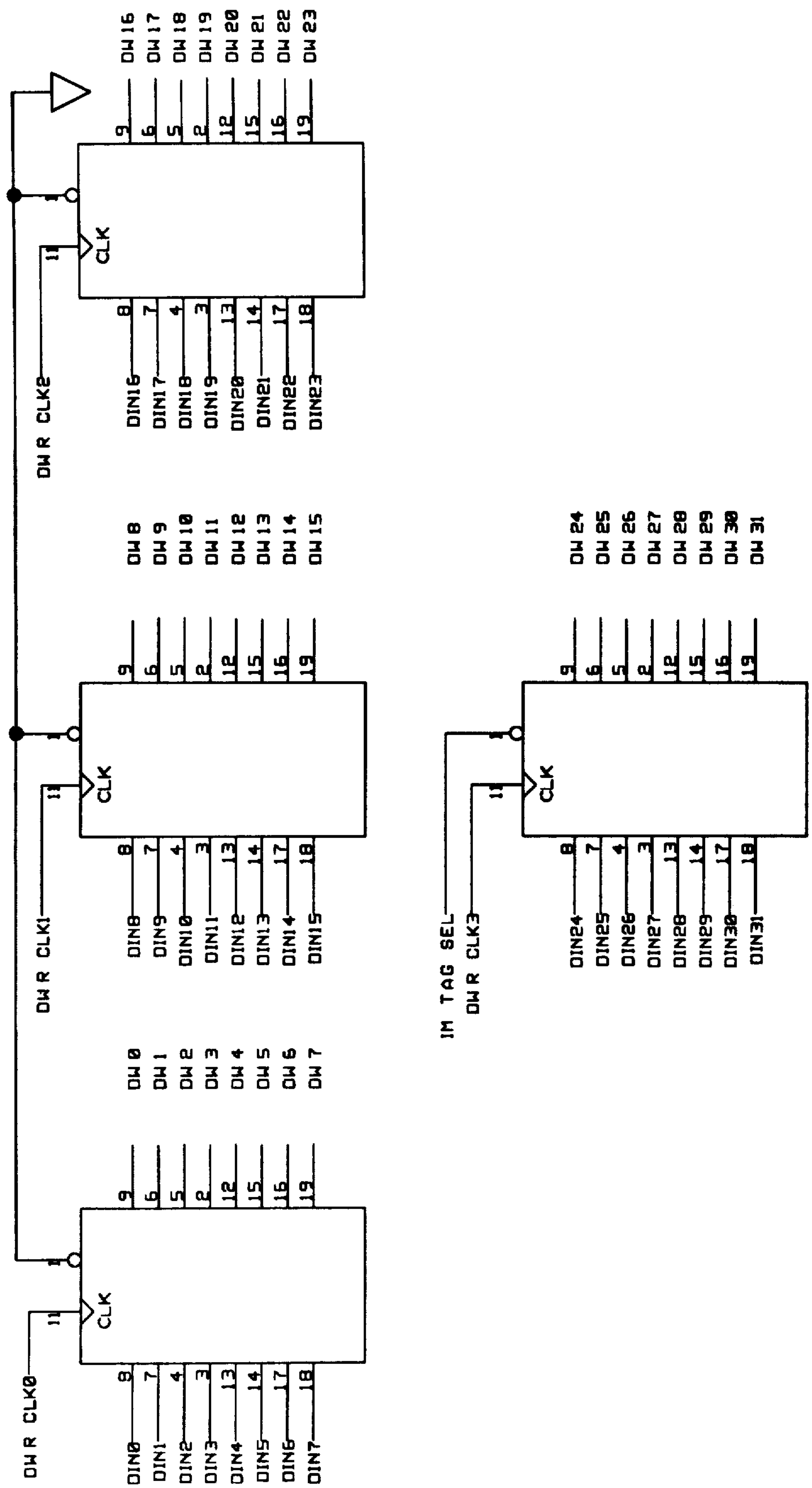
Figure 15:
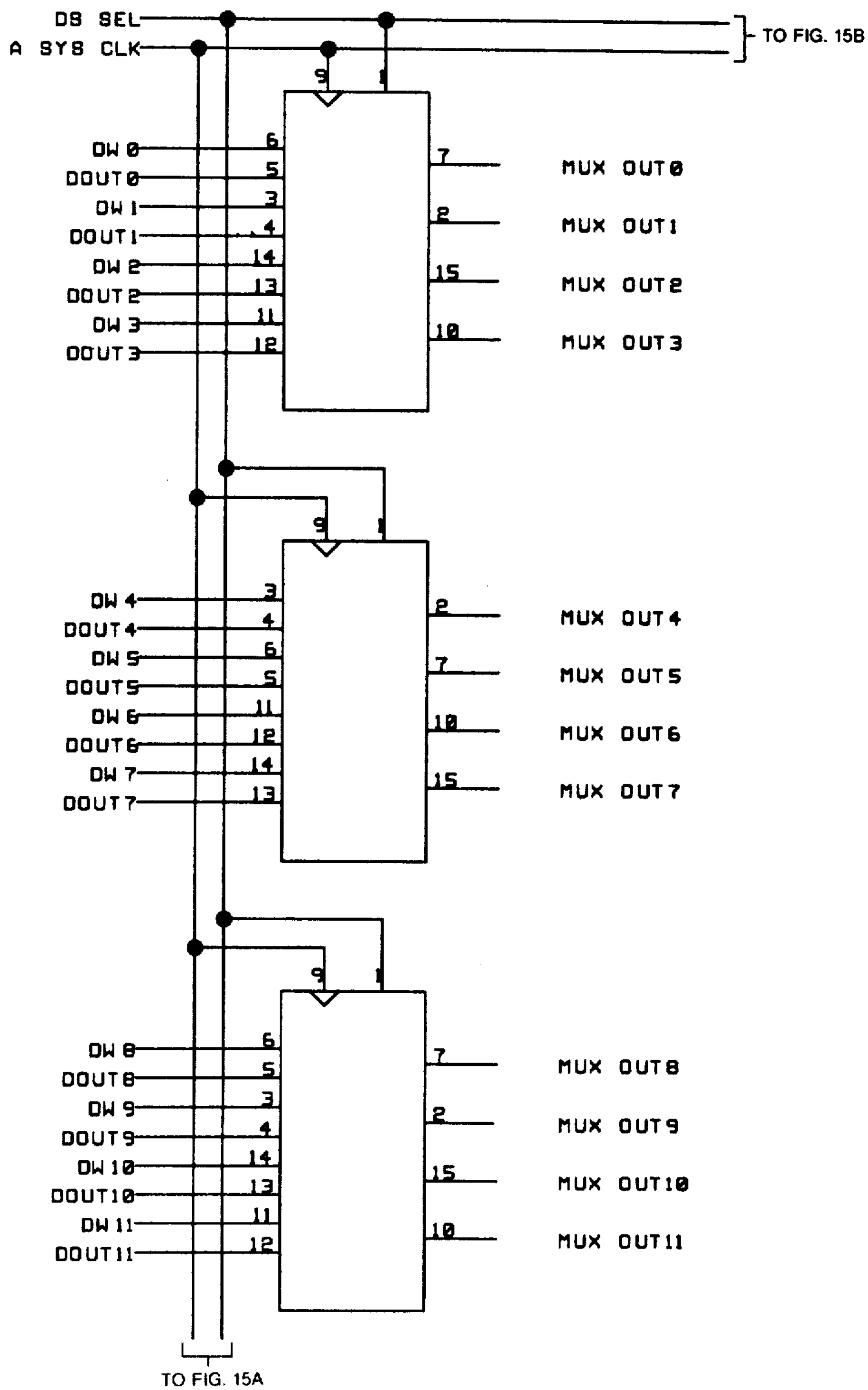
Figure 15A:
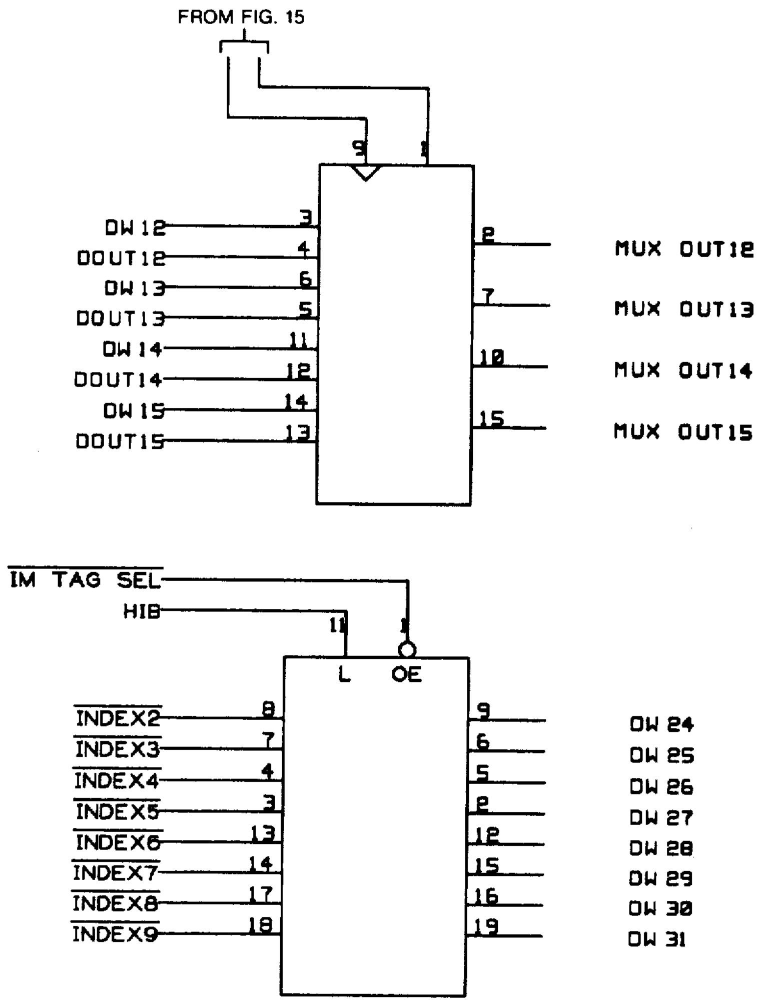
Figure 15B:
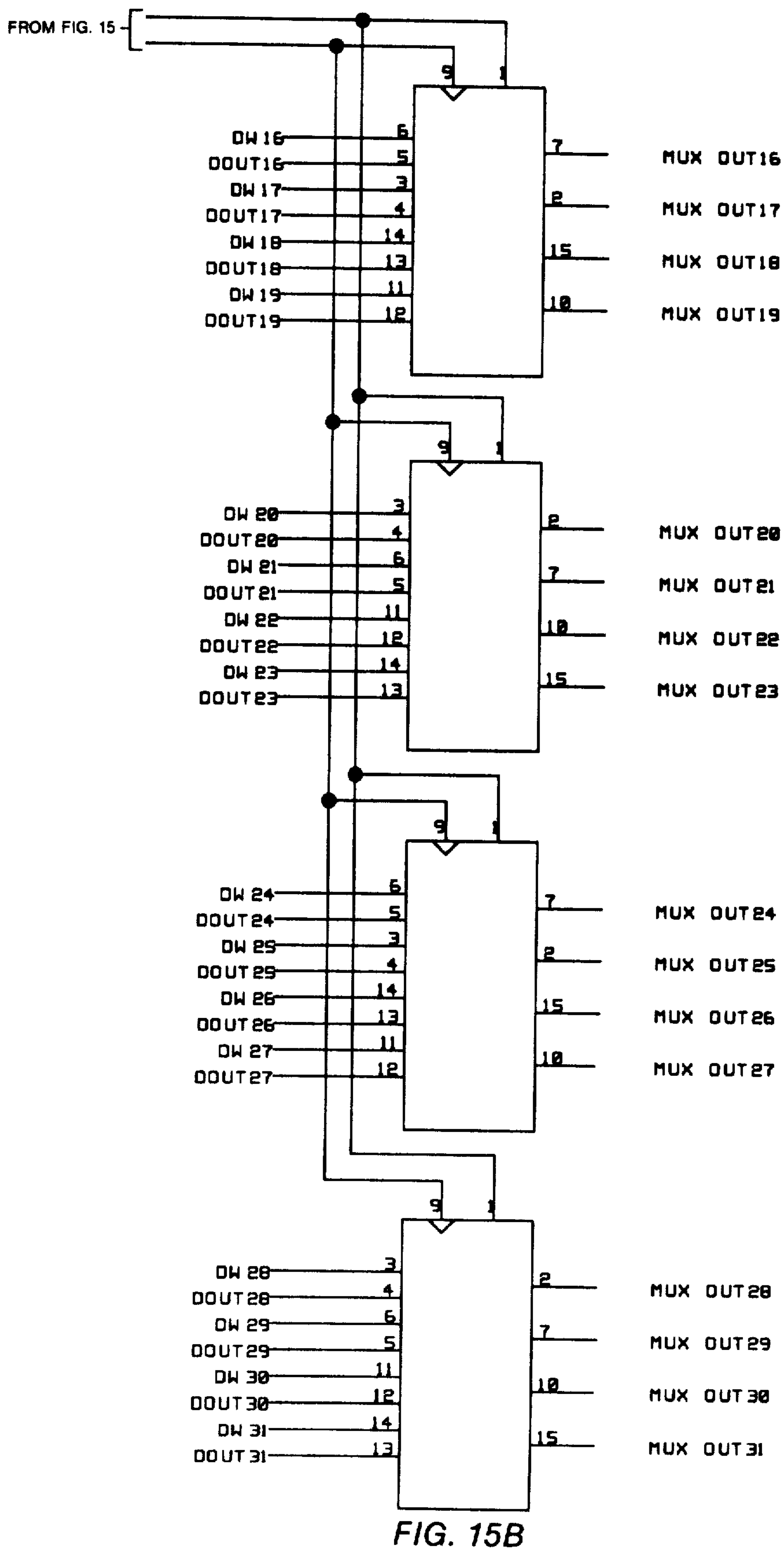
Figure 16:
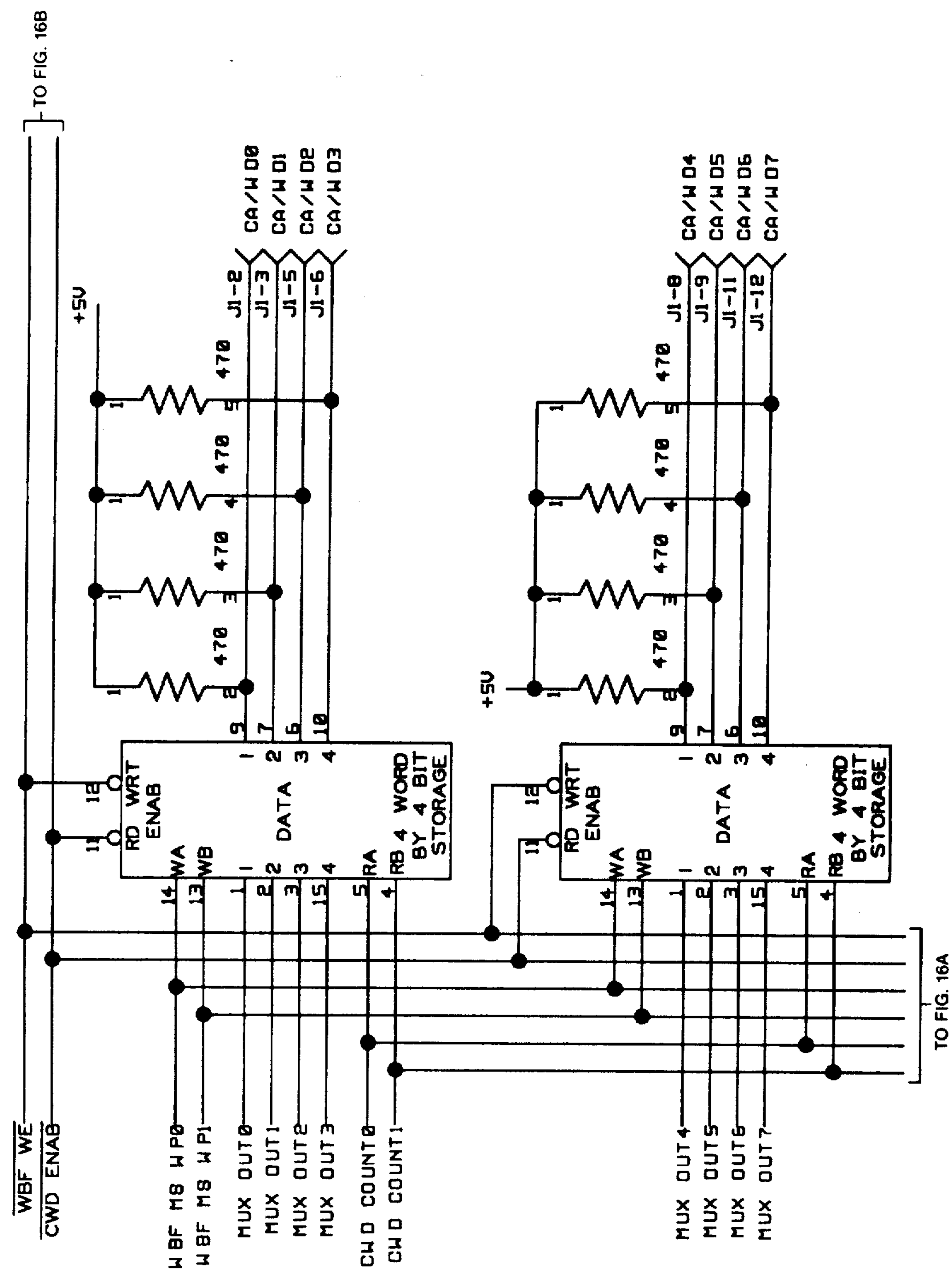
Figure 16A:
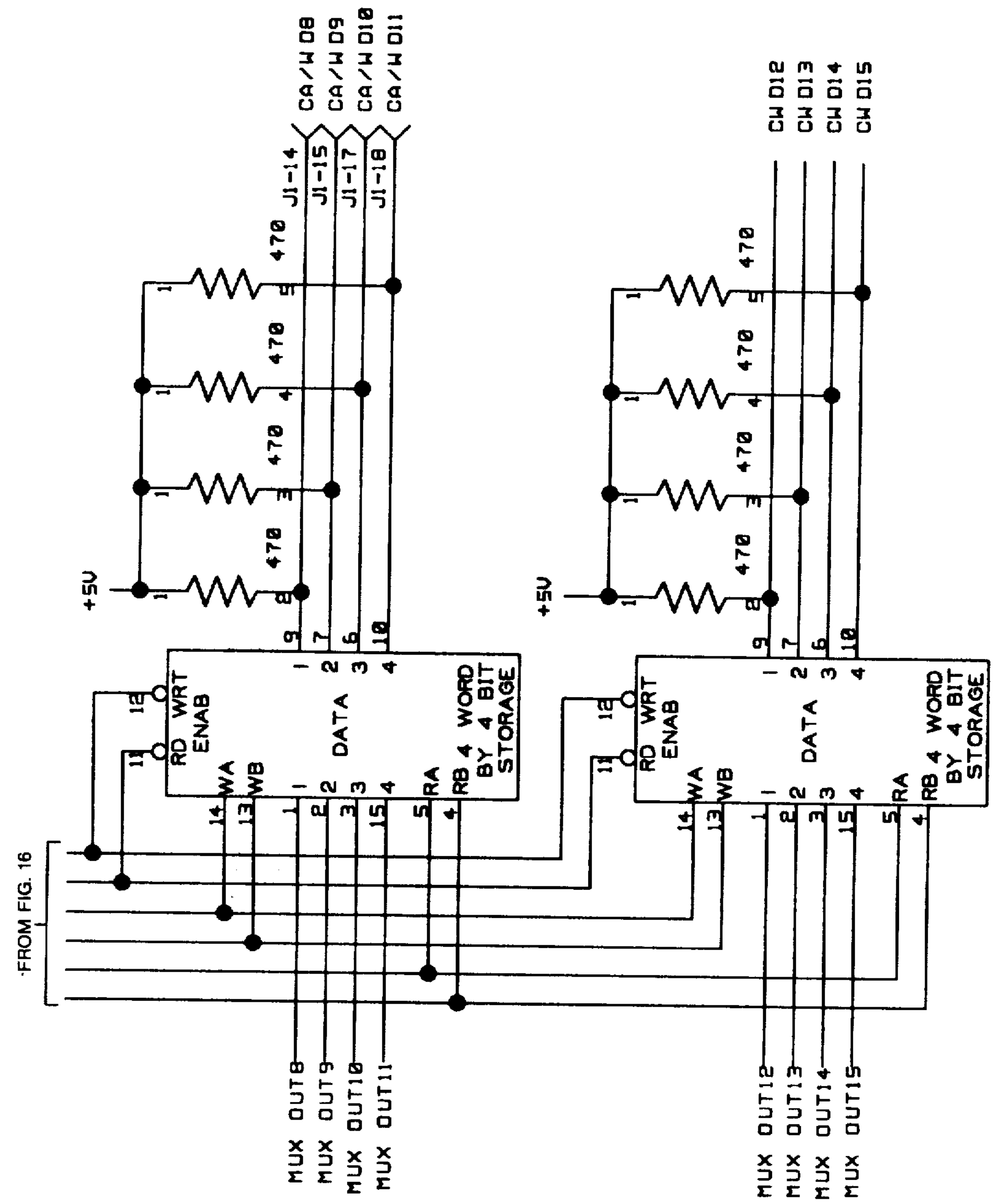
Figure 16B:
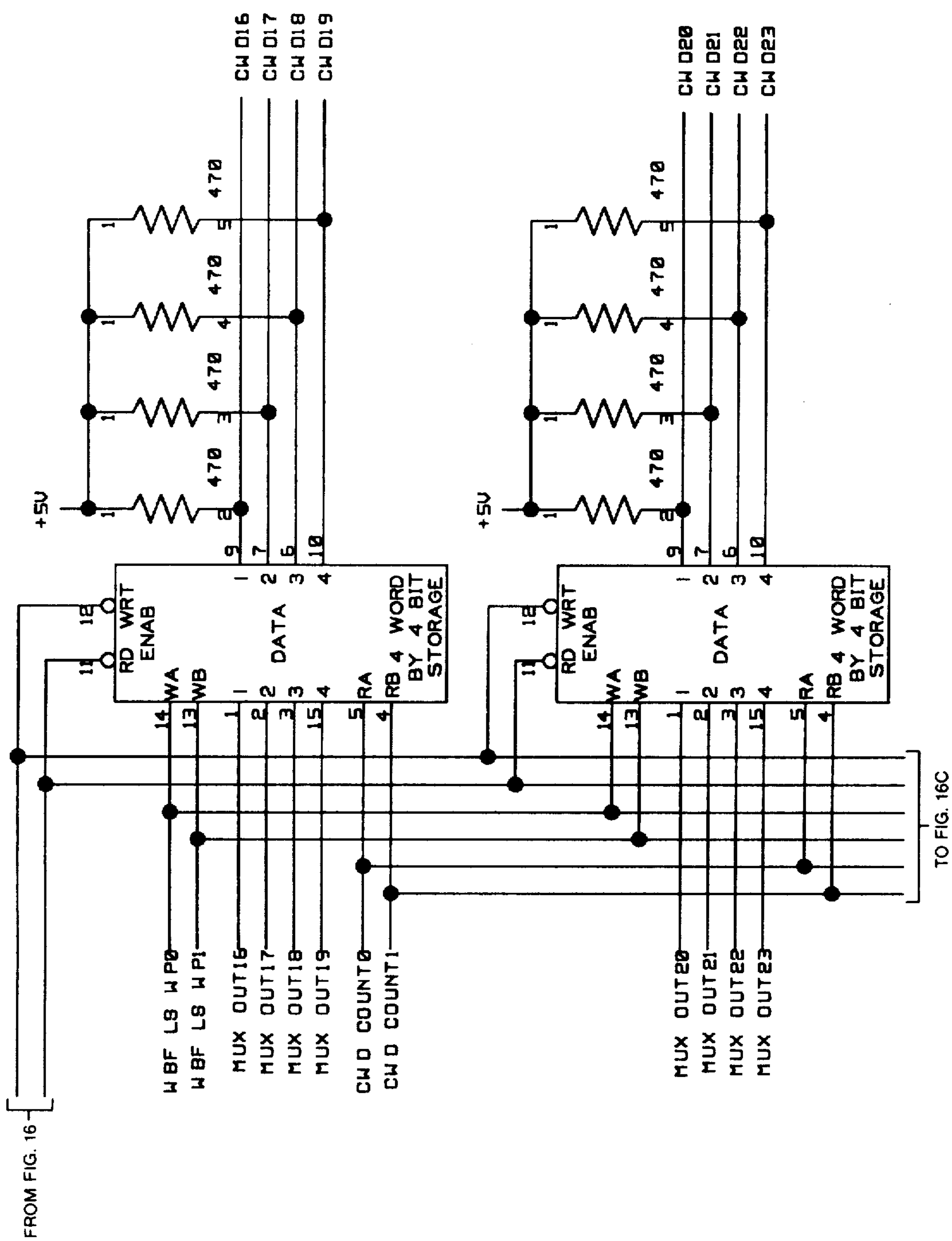
Figure 16C:
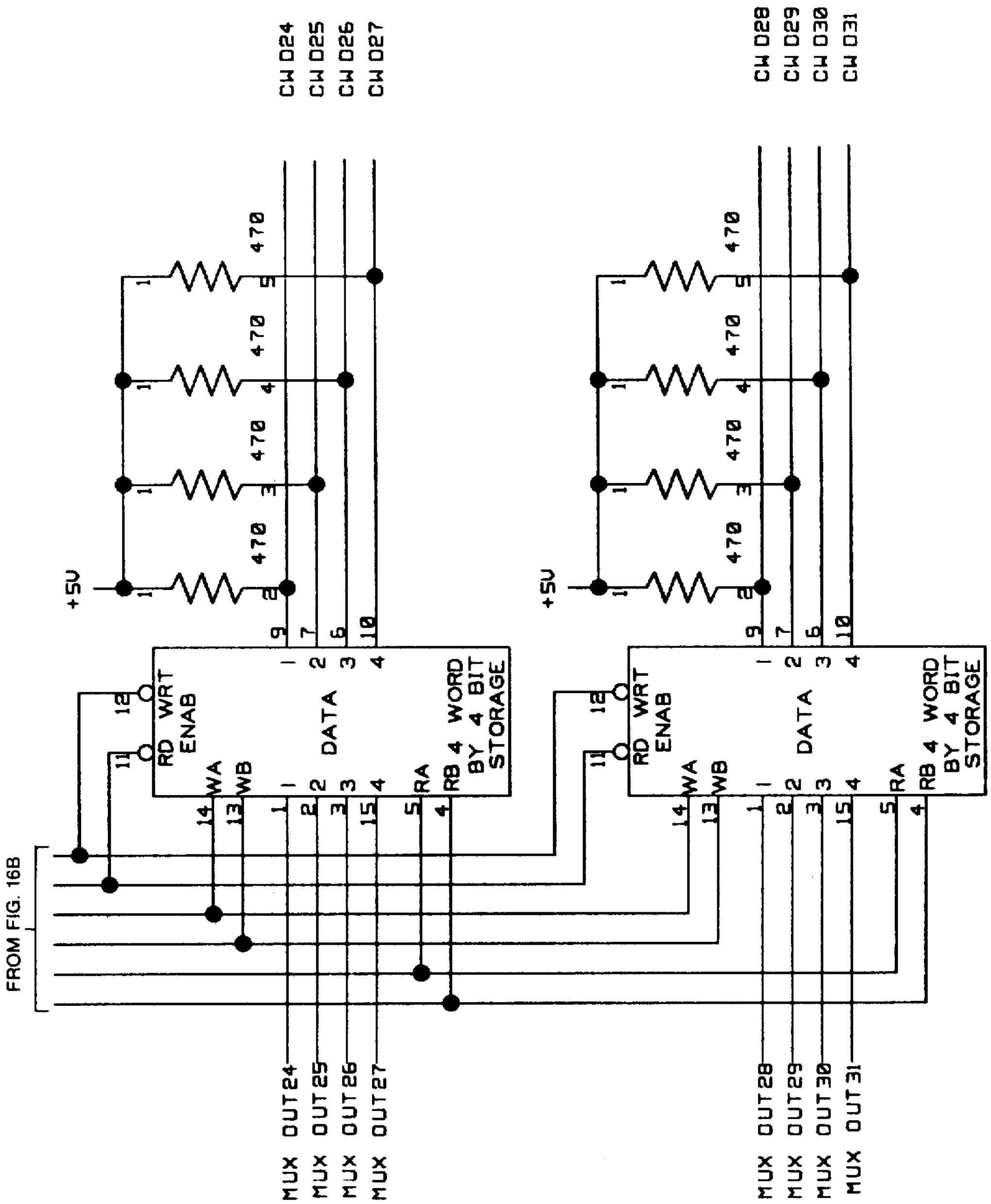
Figure 17:
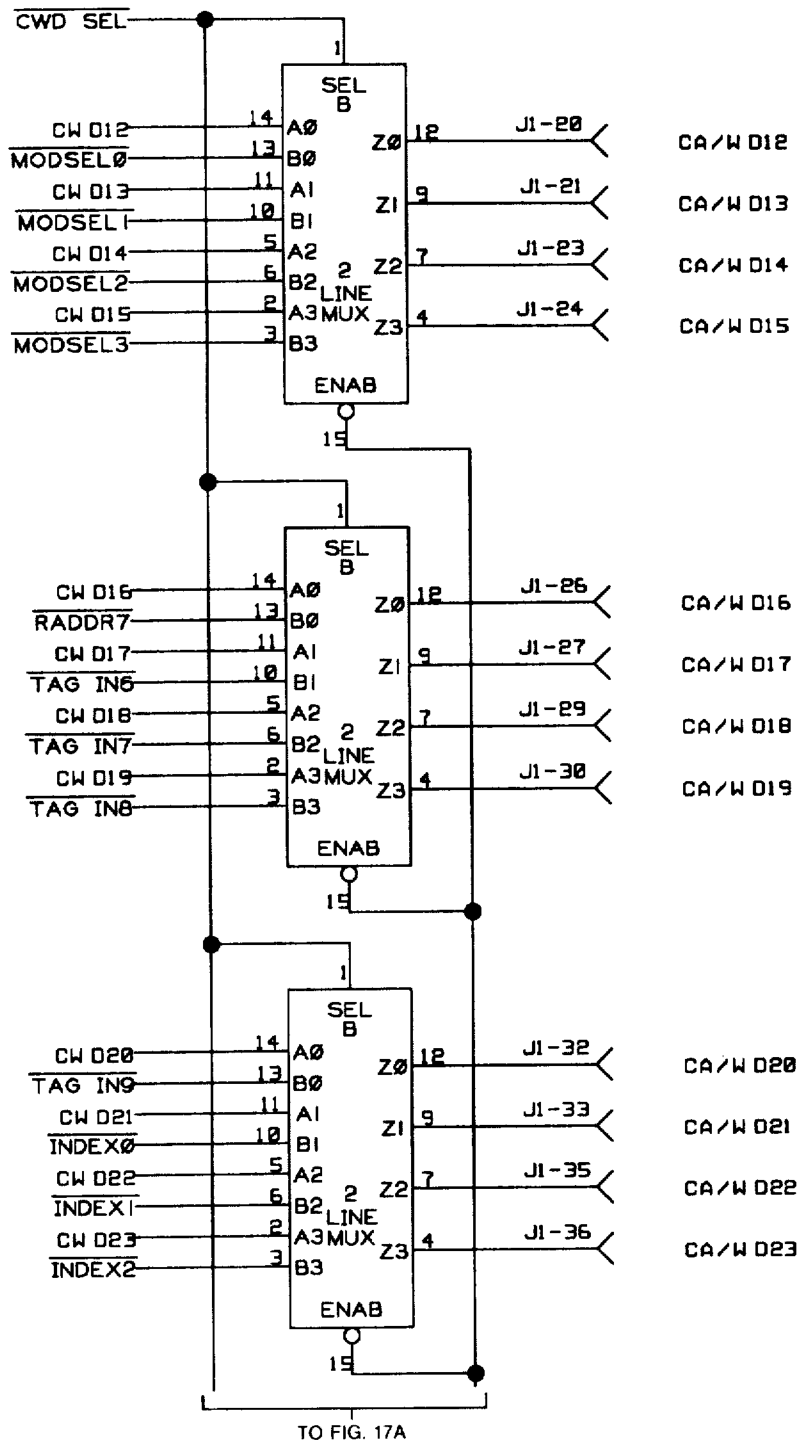
Figure 17A:
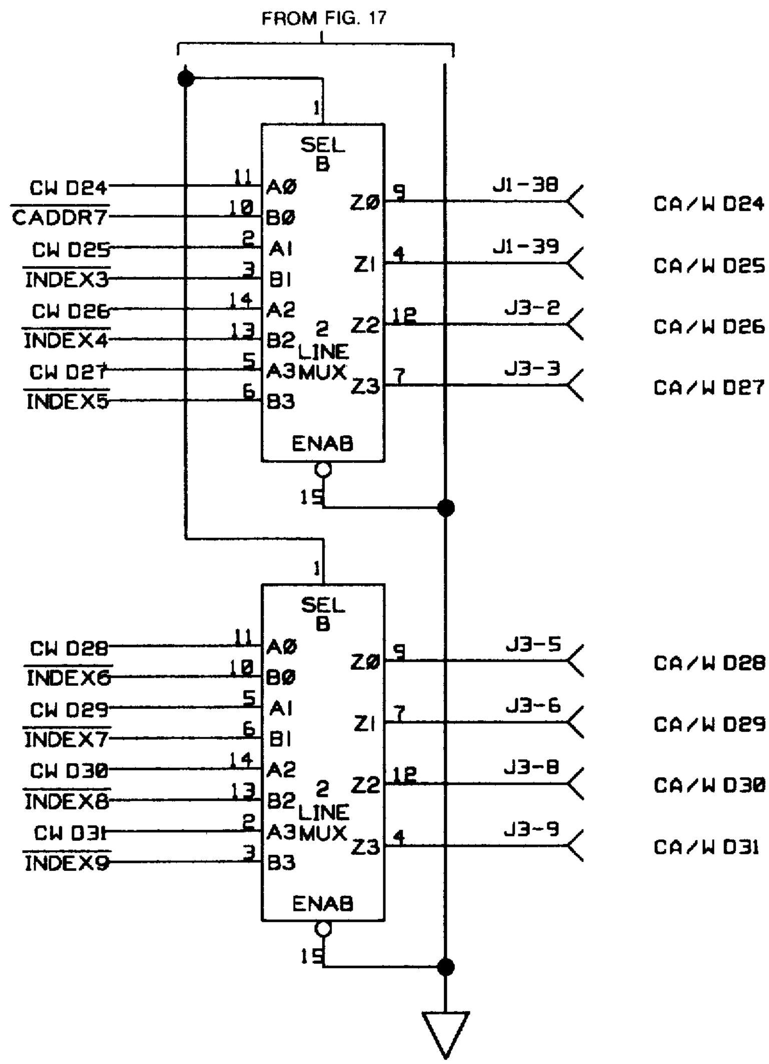
Figure 18:
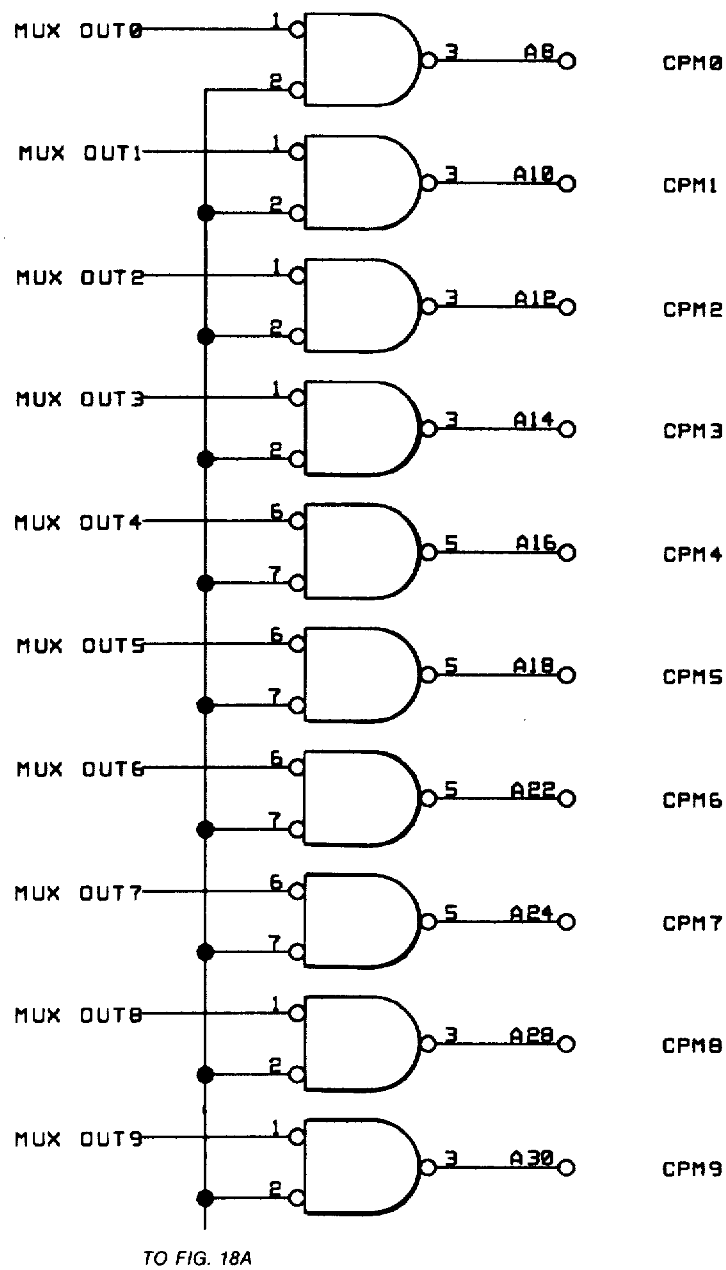
Figure 18A:
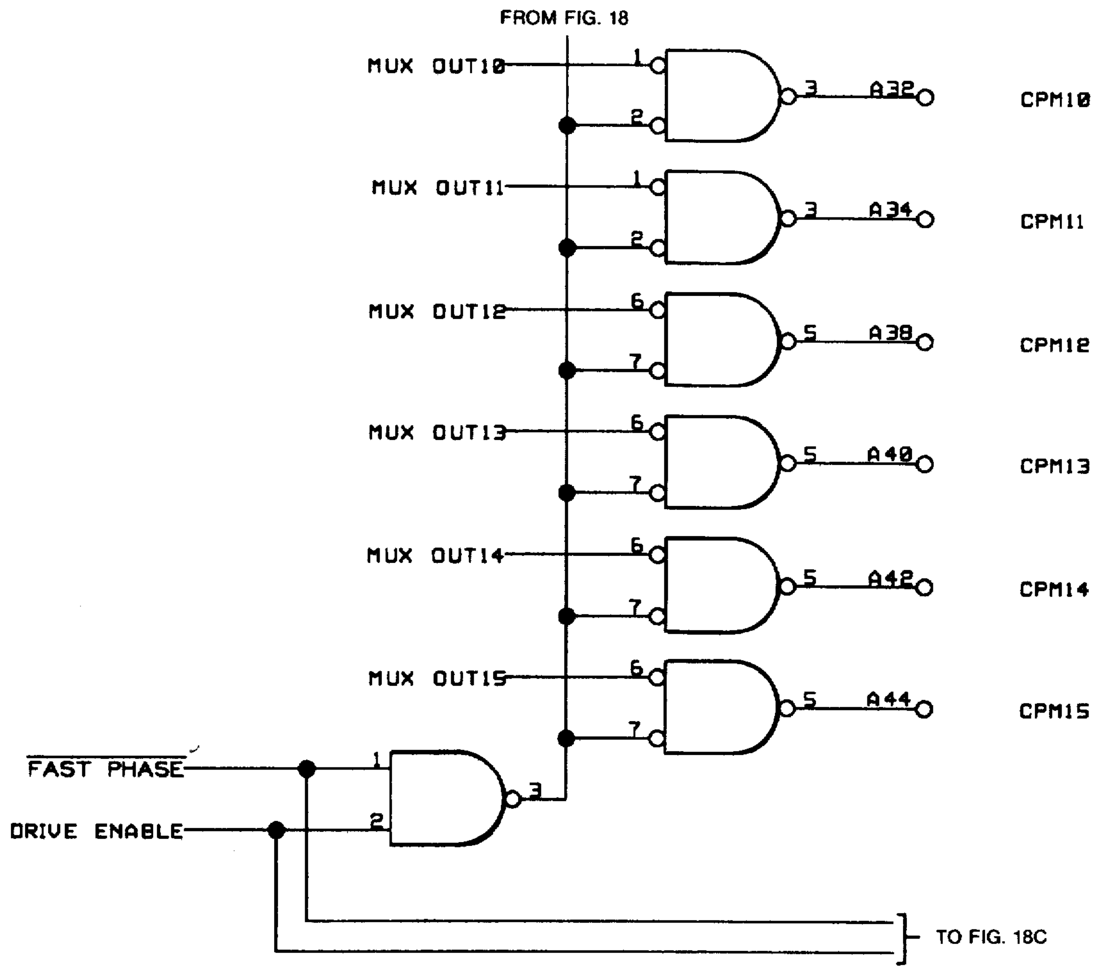
Figure 18B:
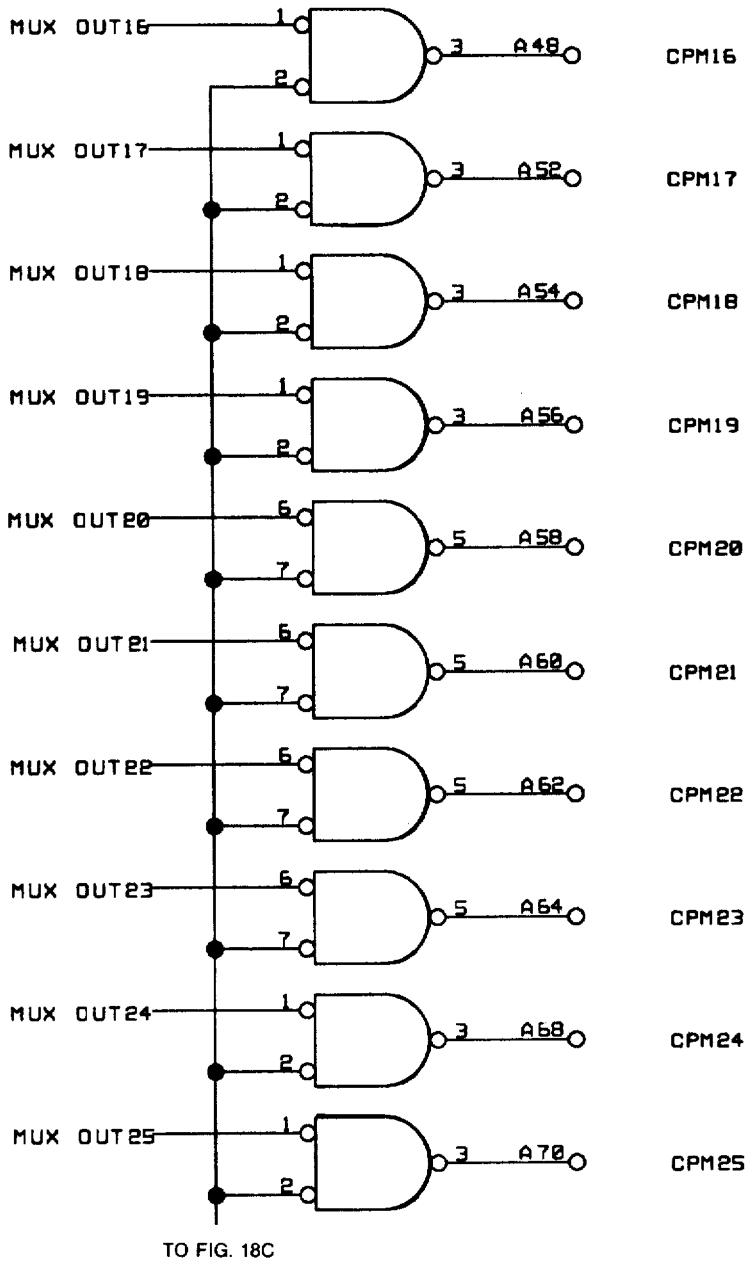
Figure 18C:
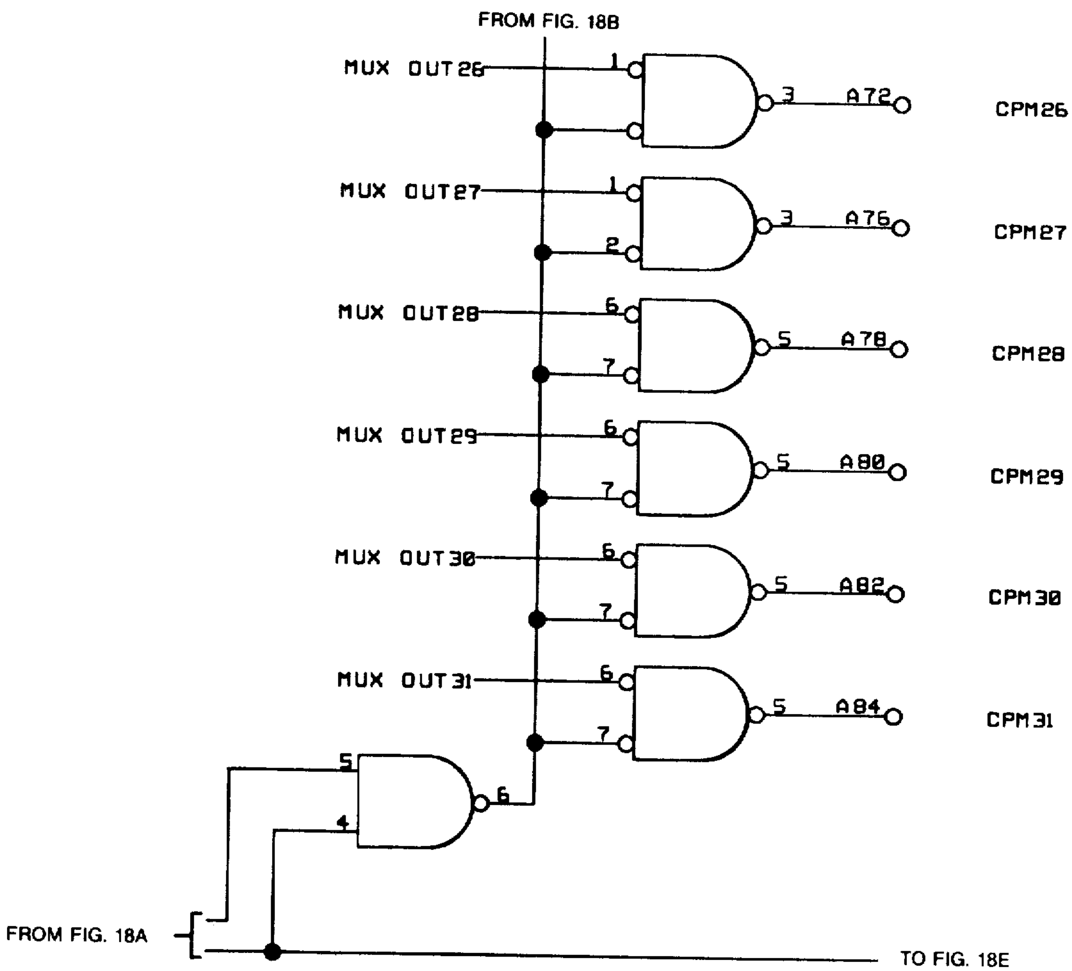
Figure 18D:
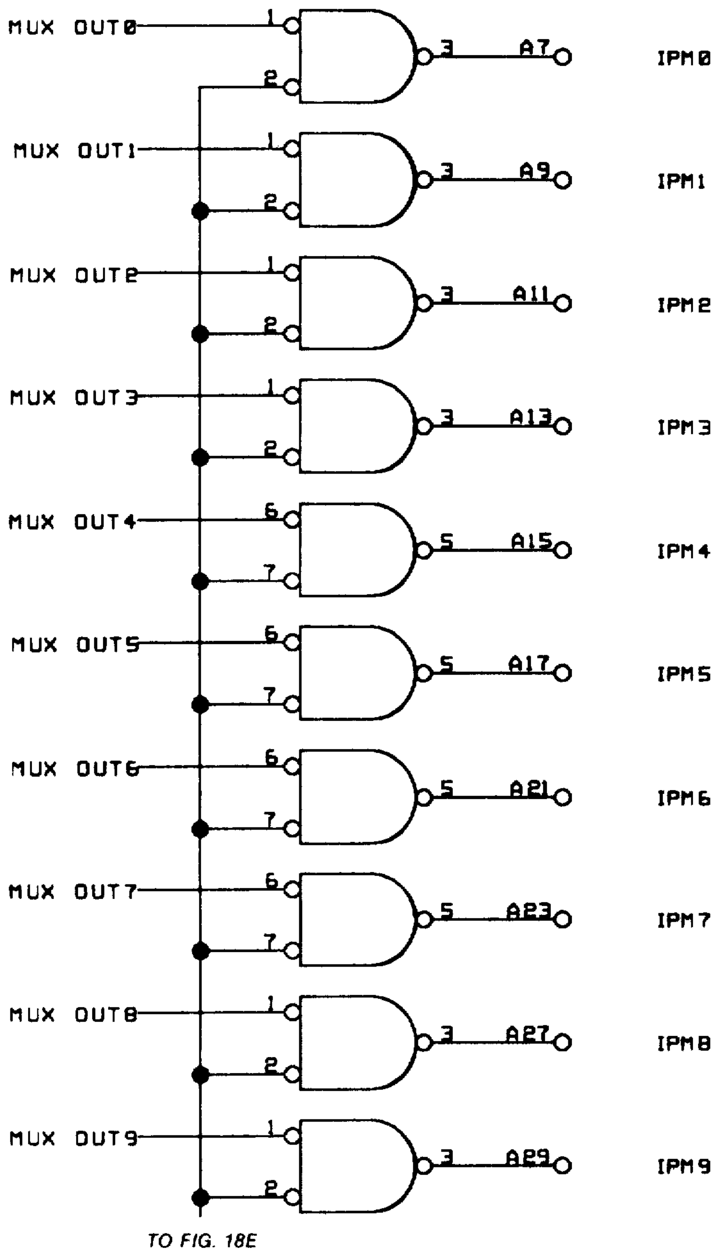
Figure 18E:
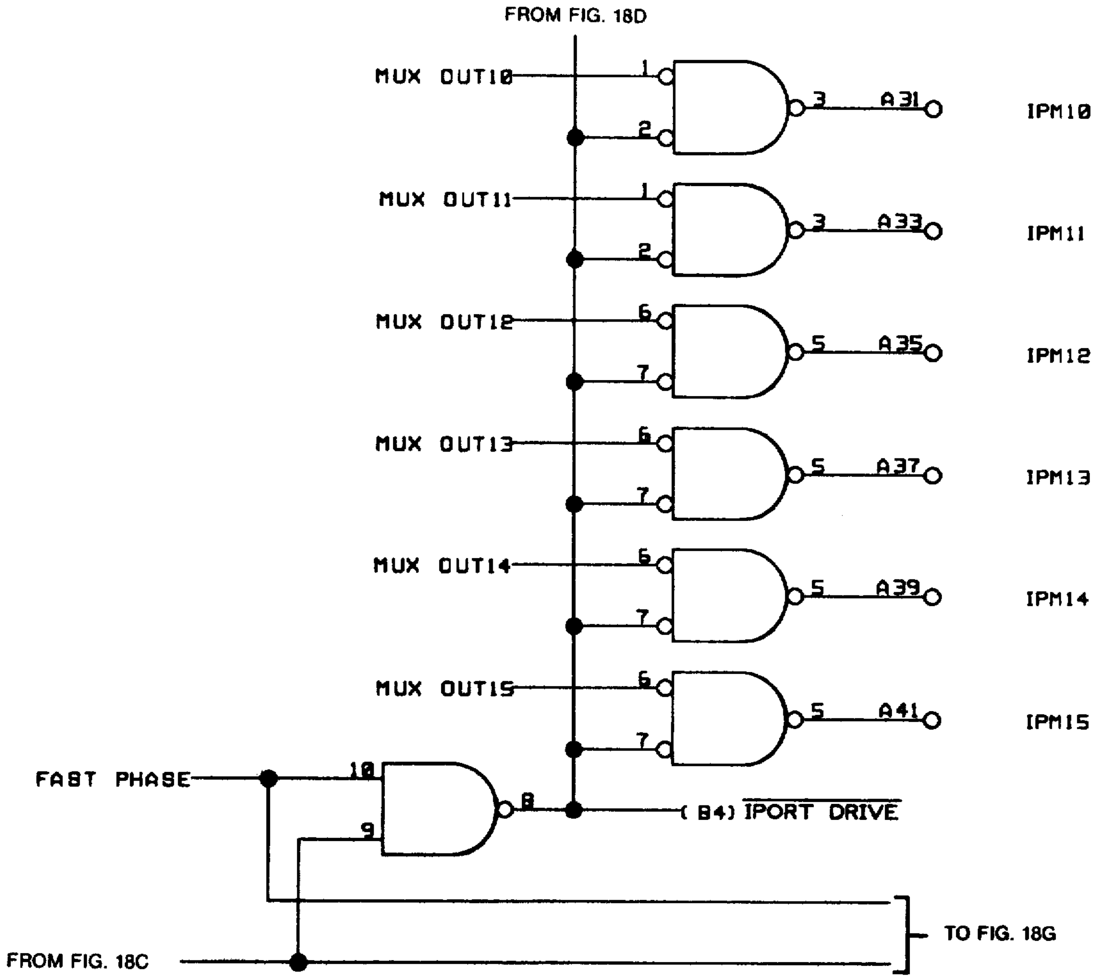
Figure 18E:
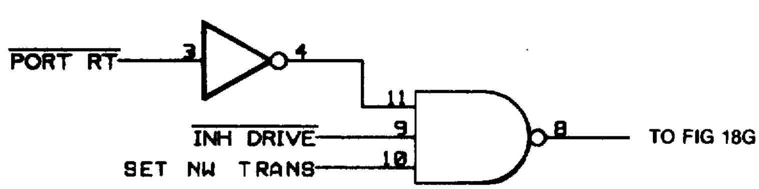
Figure 18F:
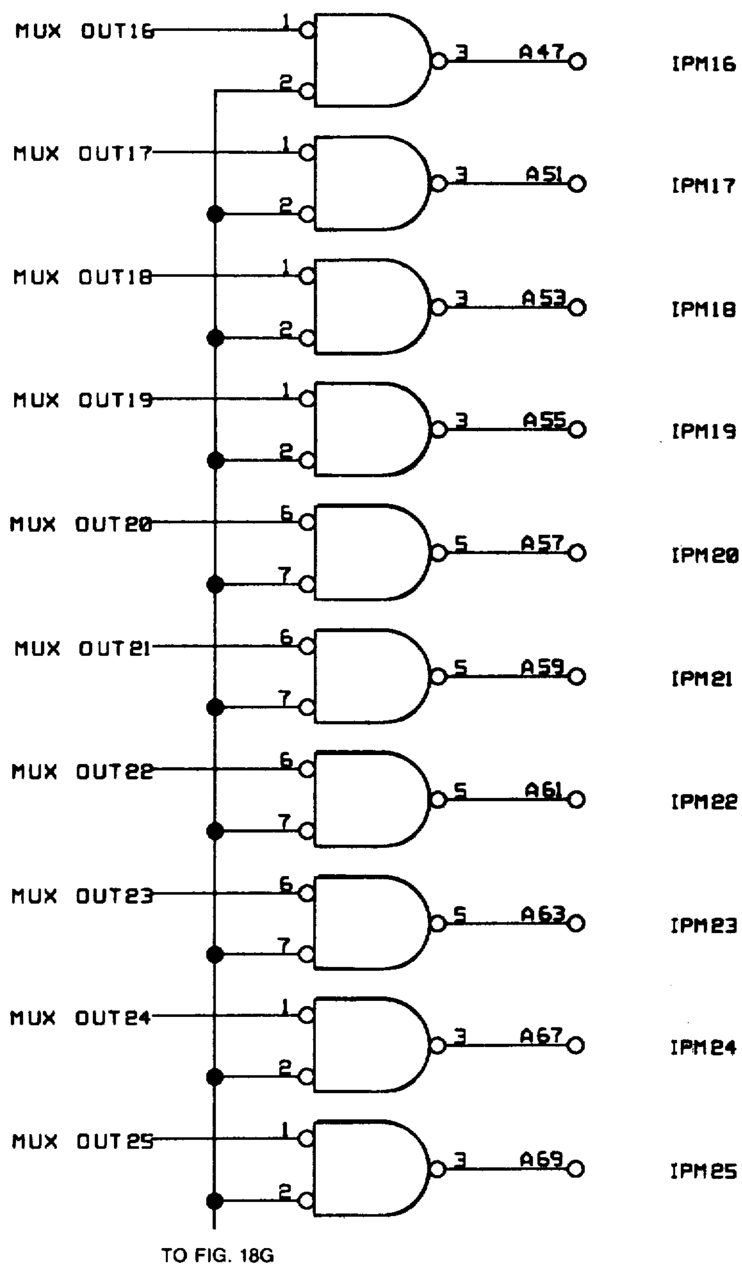
Figure 18G:
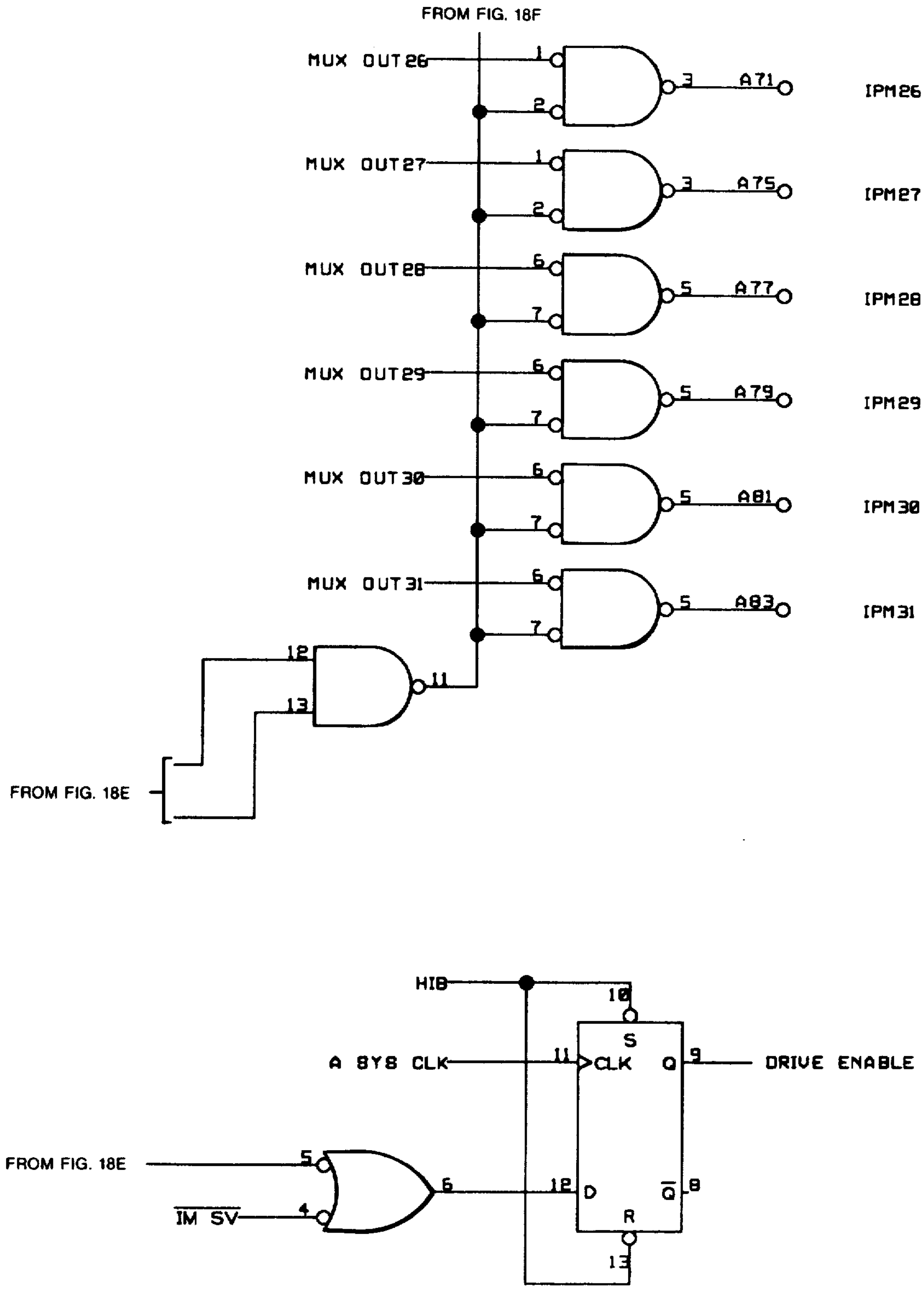
Figure 19:
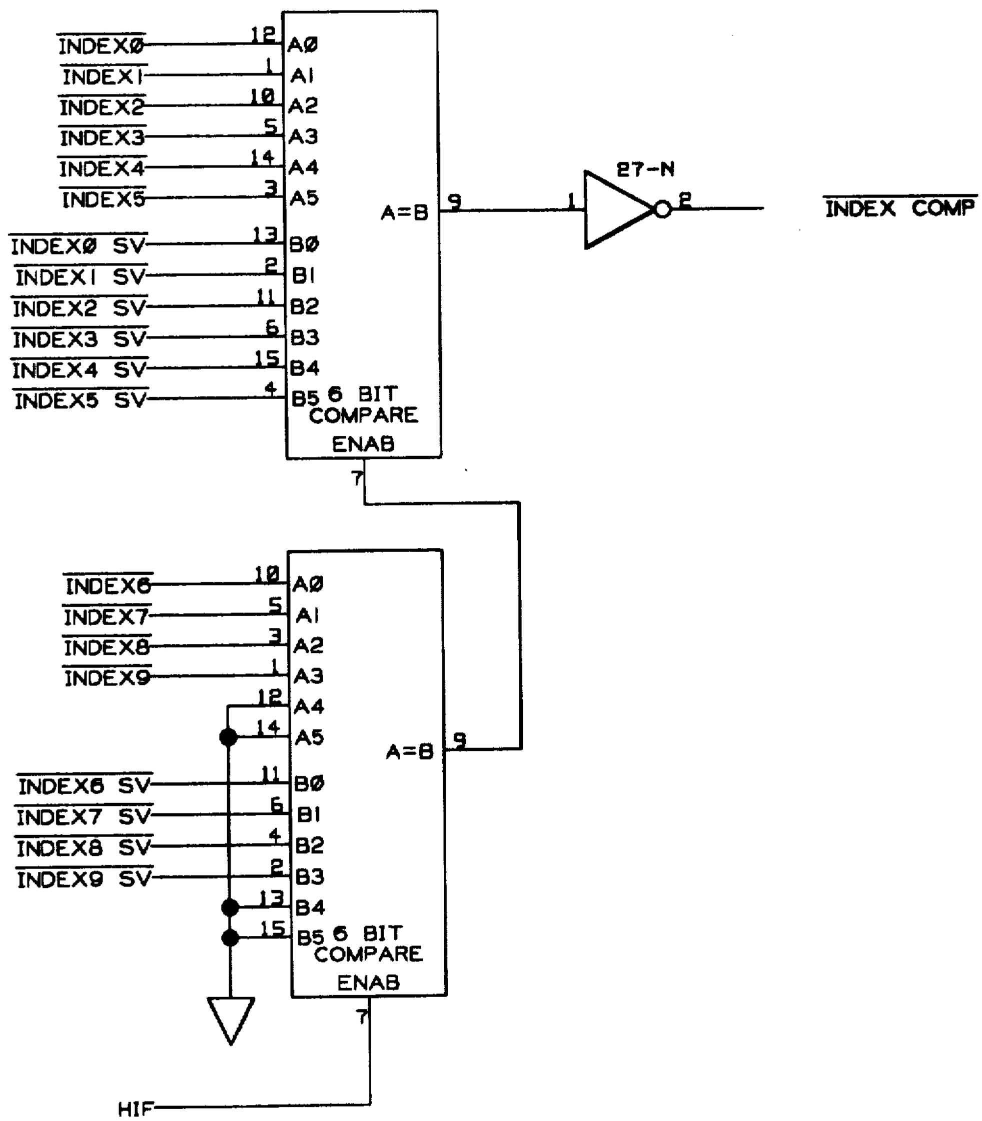
Figure 20:
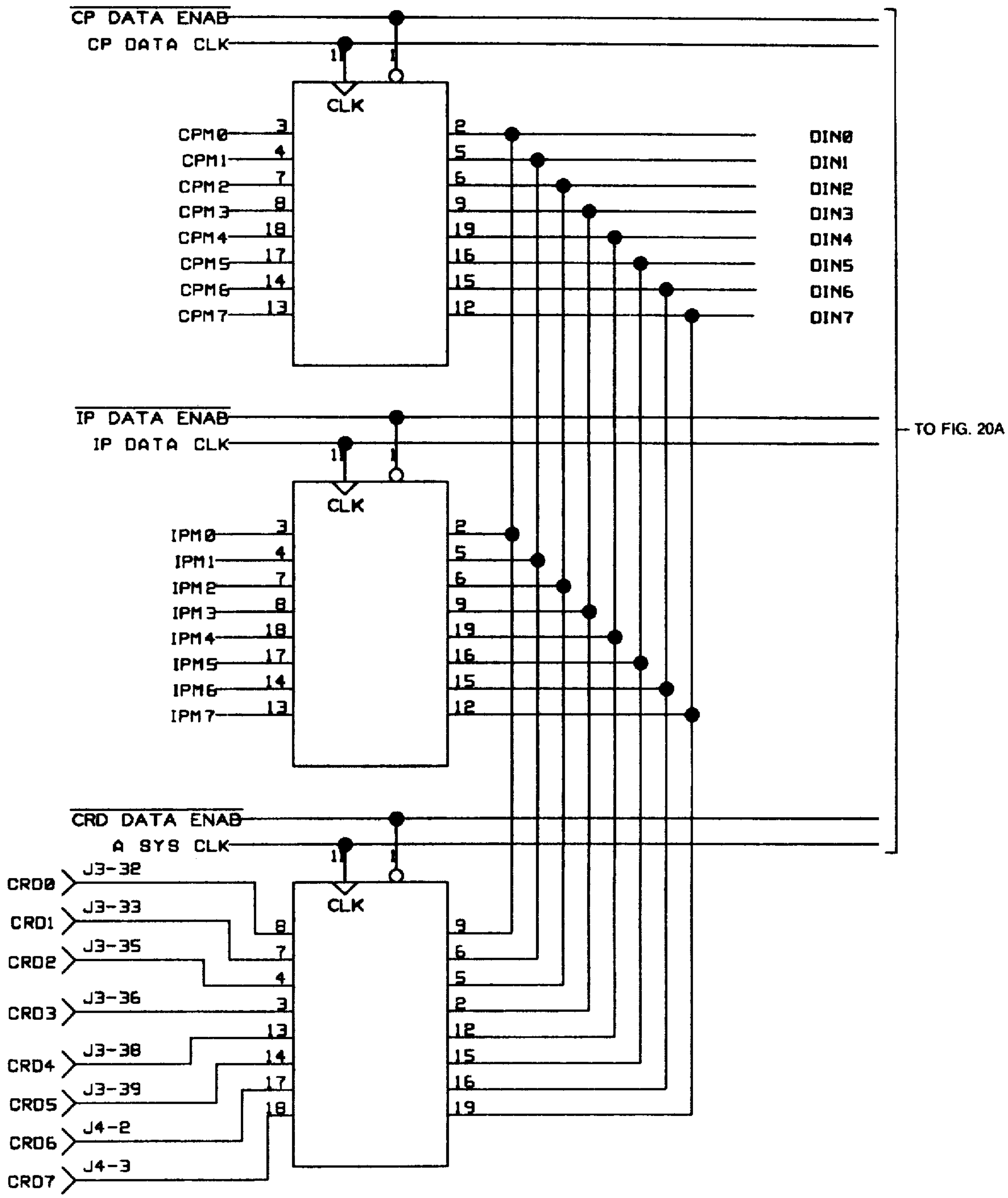
Figure 20A:
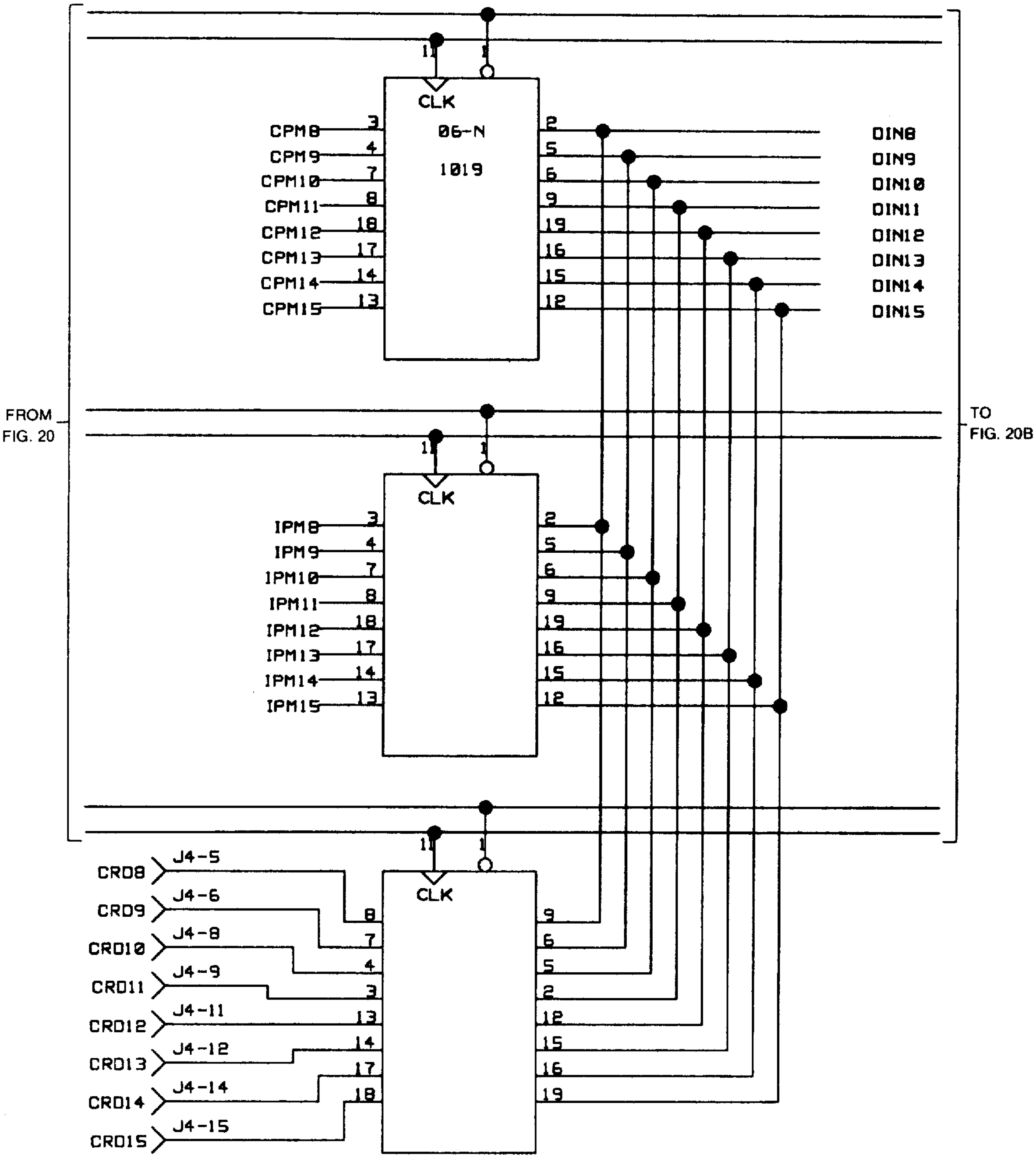
Figure 20B:
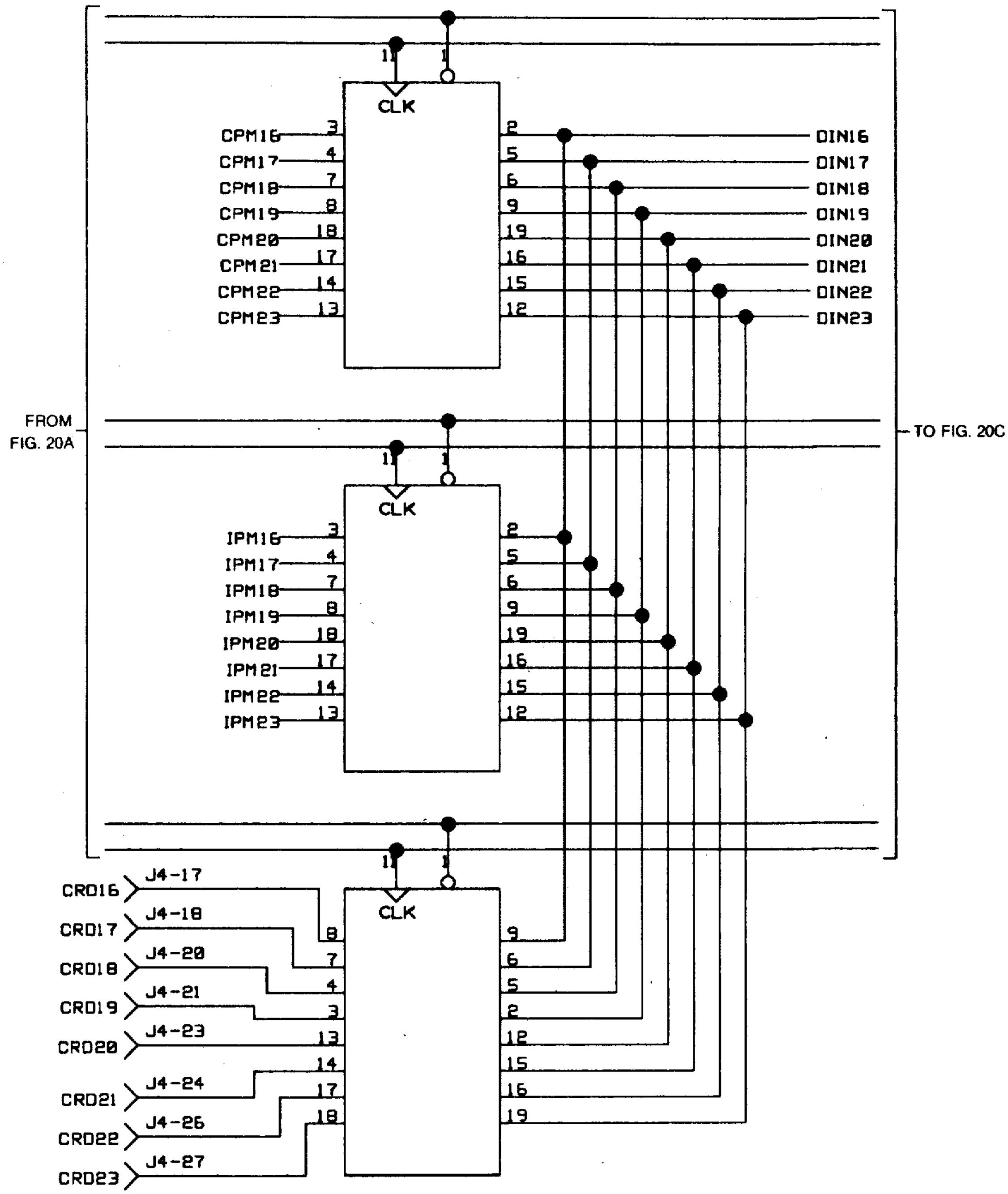
Figure 20C:
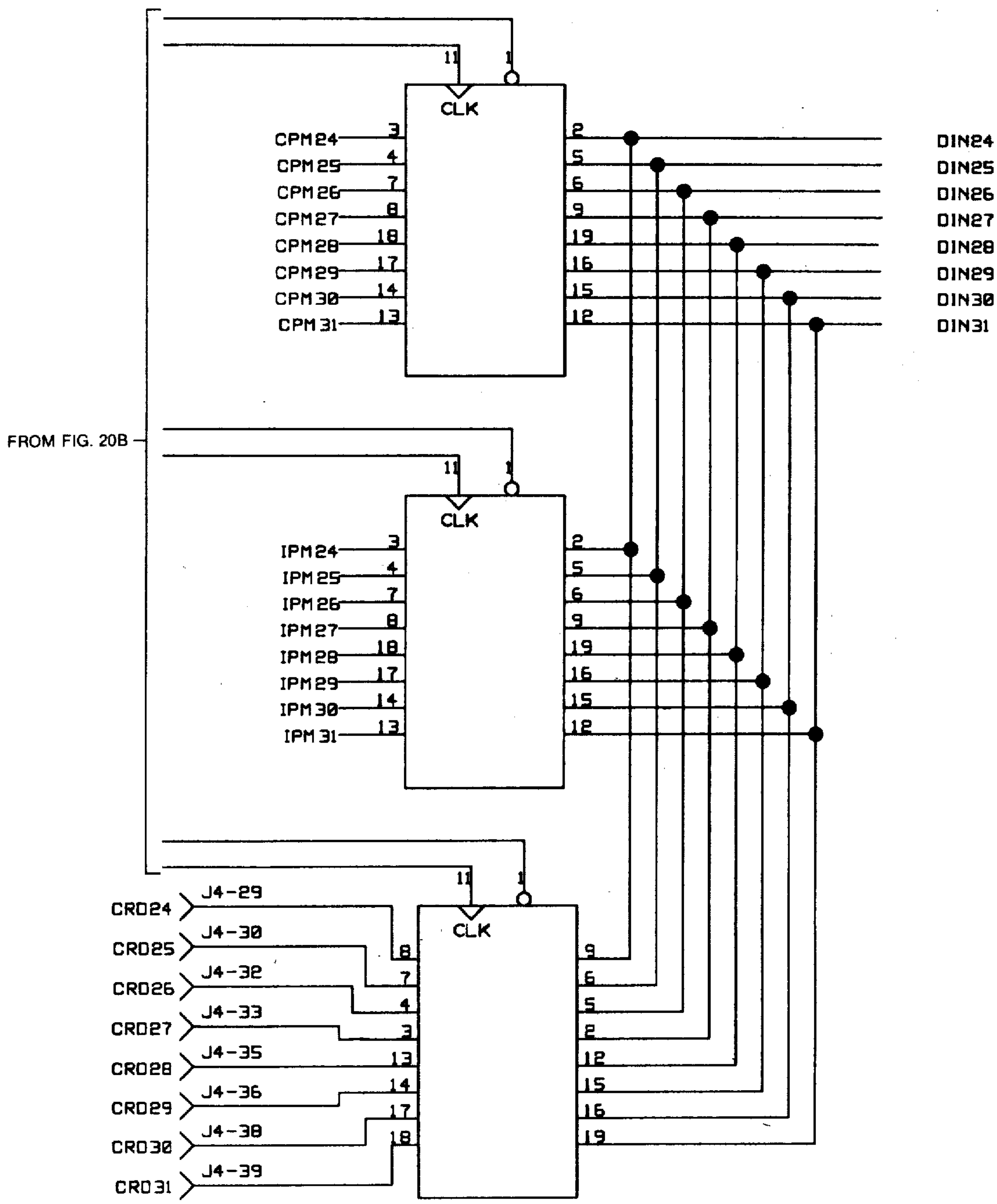
Figure 21:
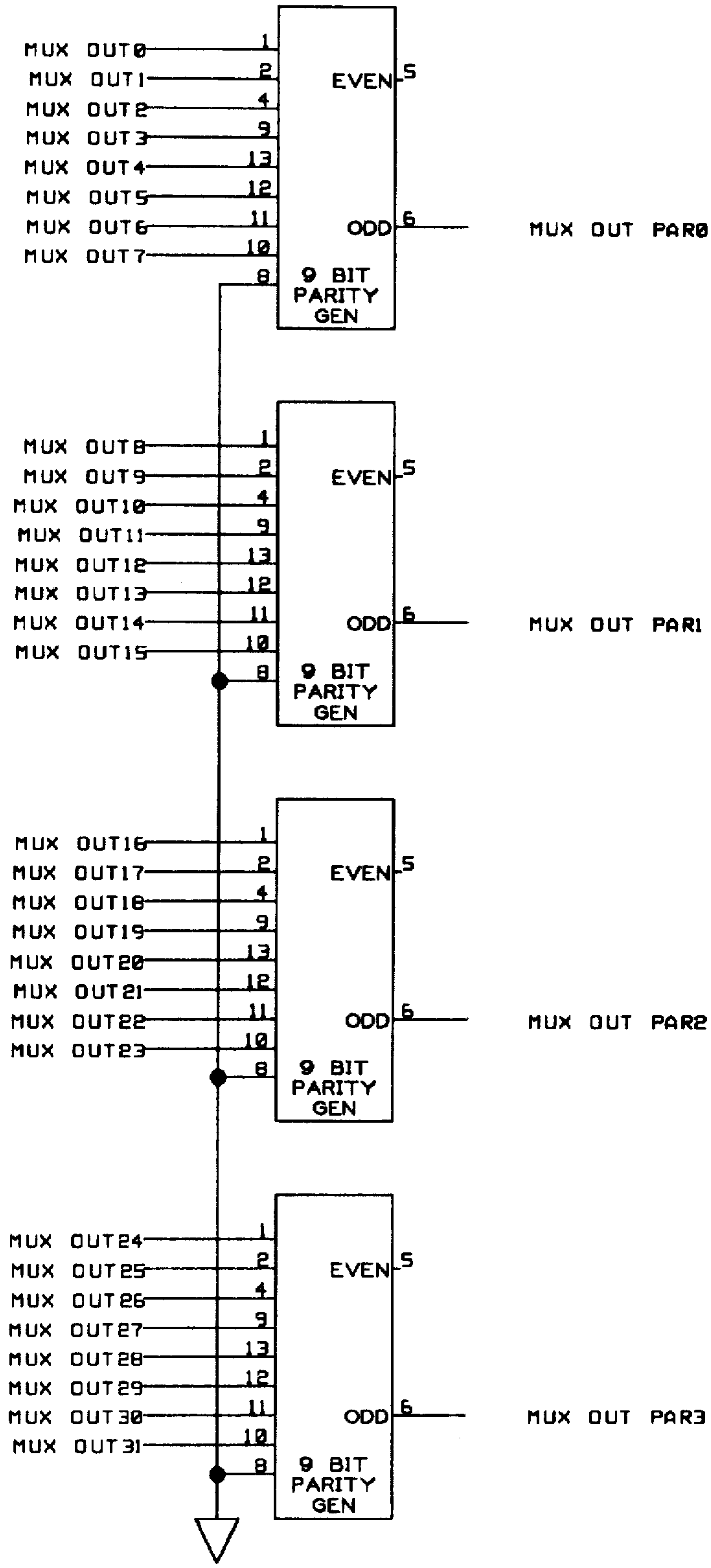
Figure 22:
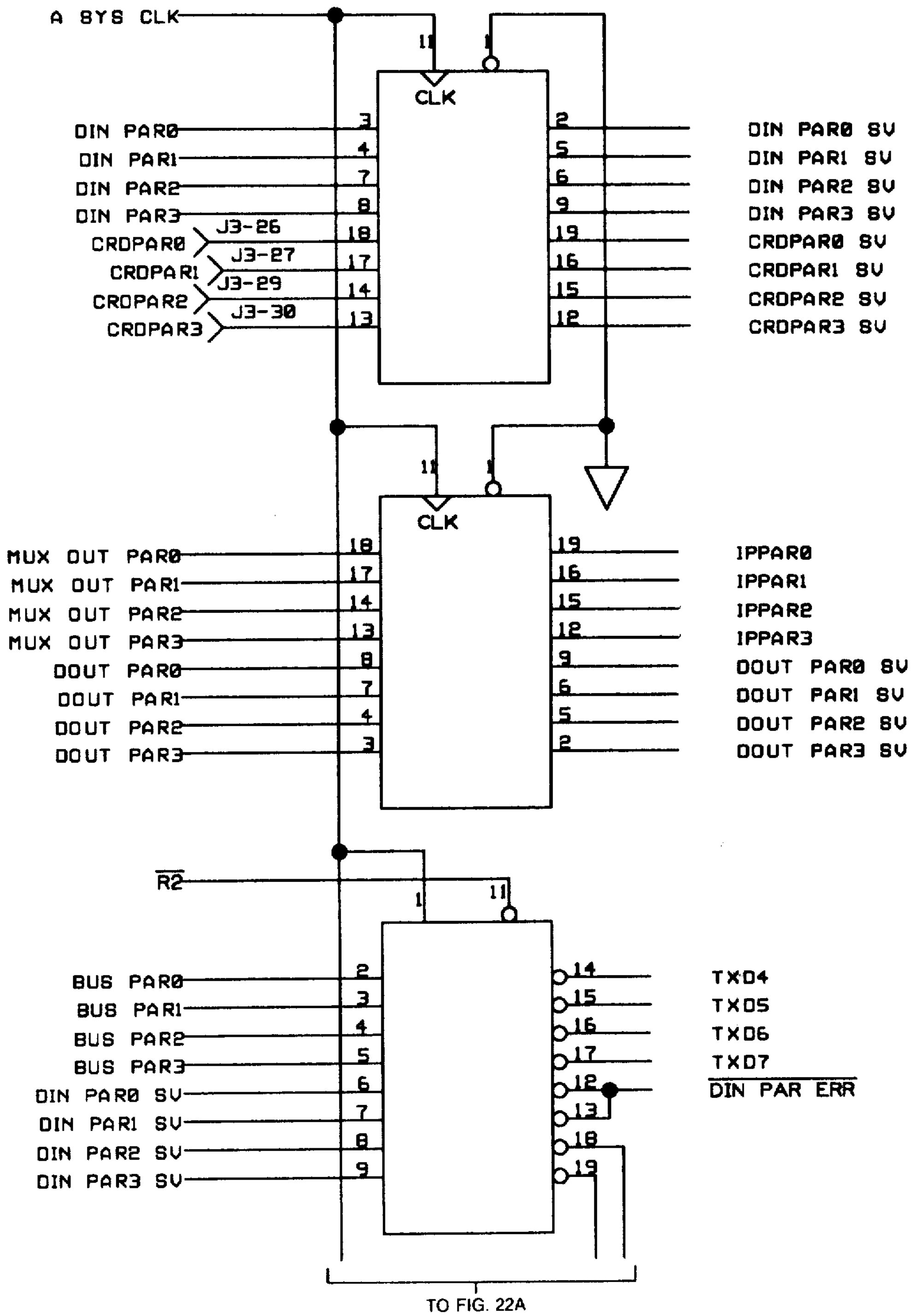
Figure 22A:
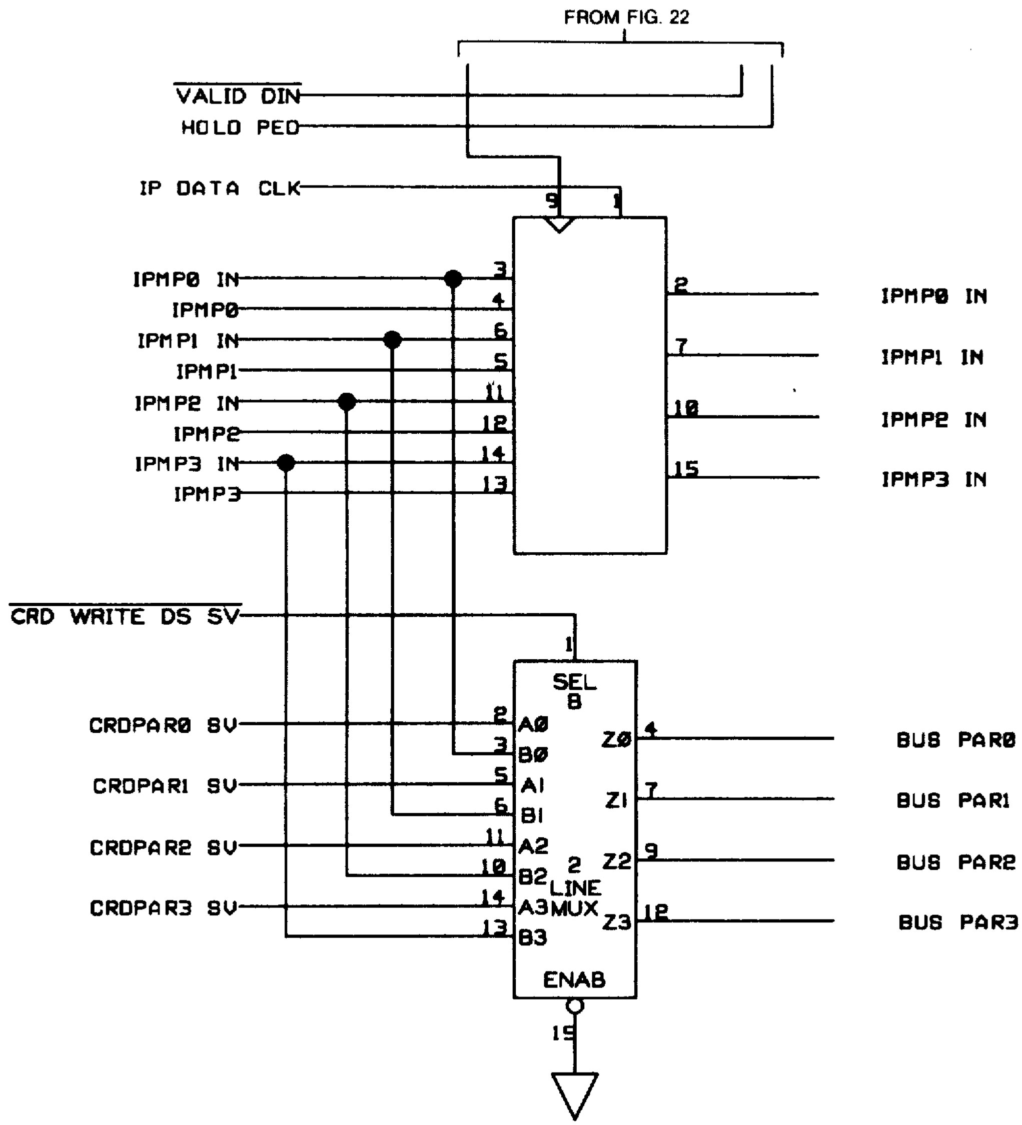
Figure 23:
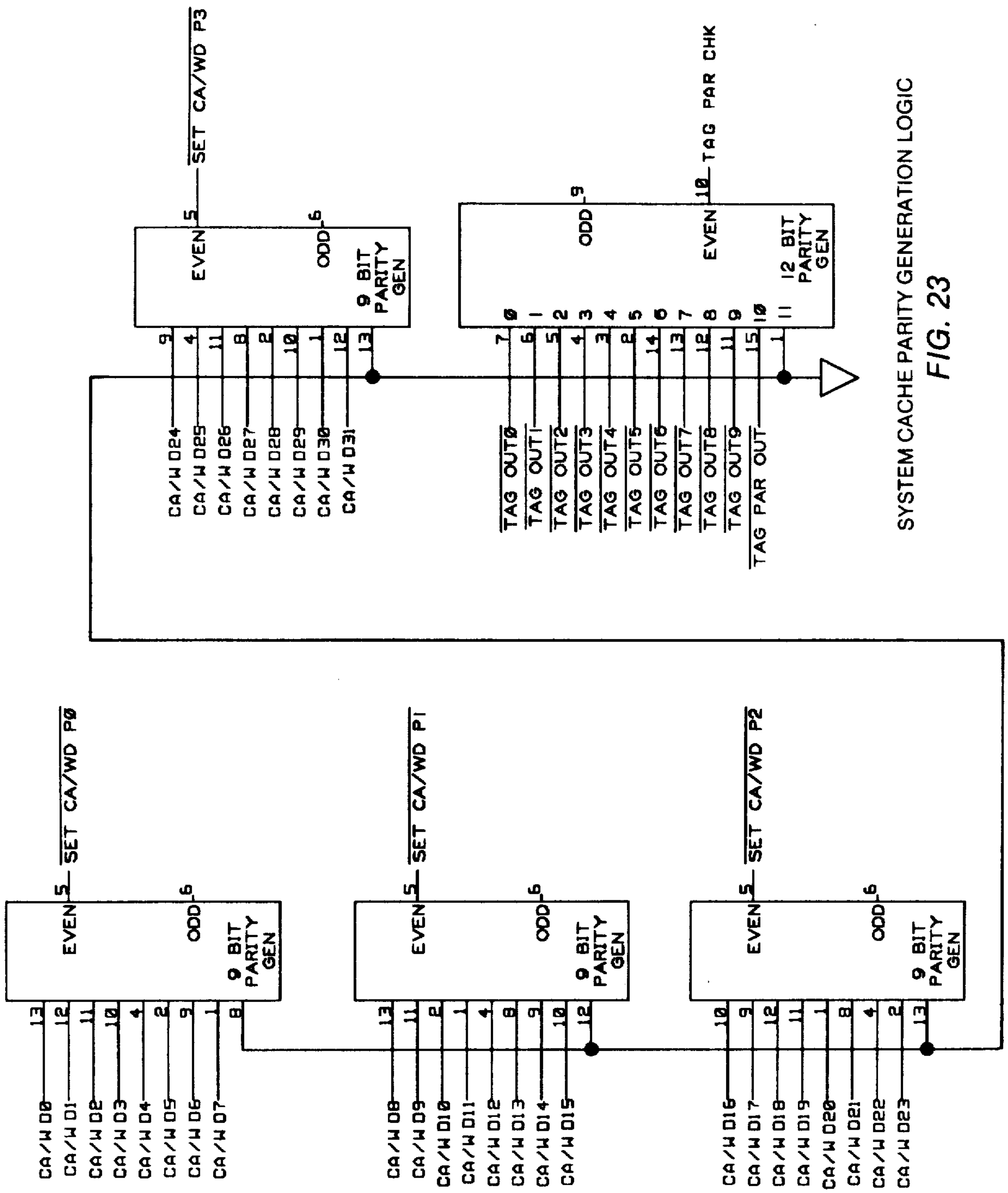
Figure 24:
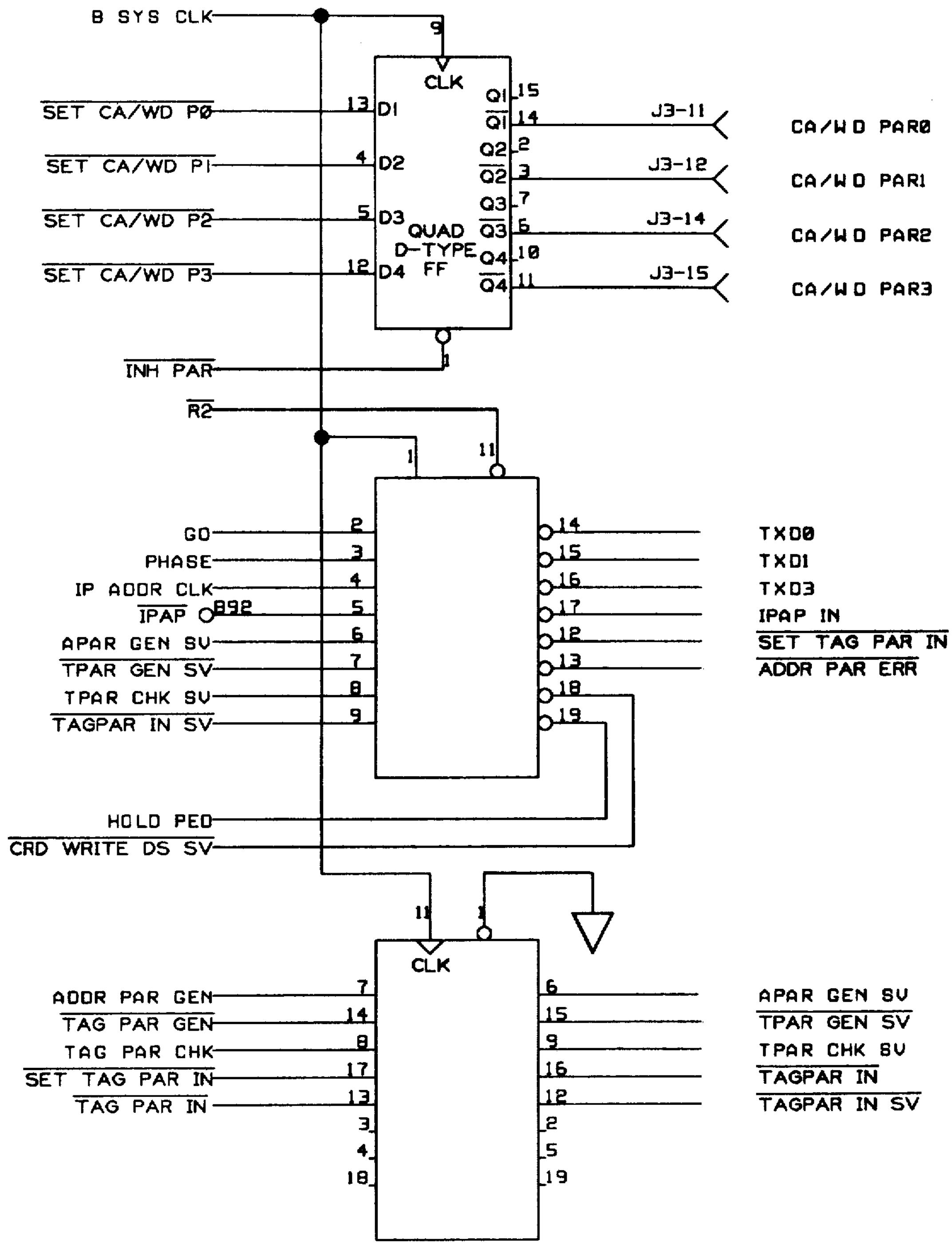
Figure 24A:
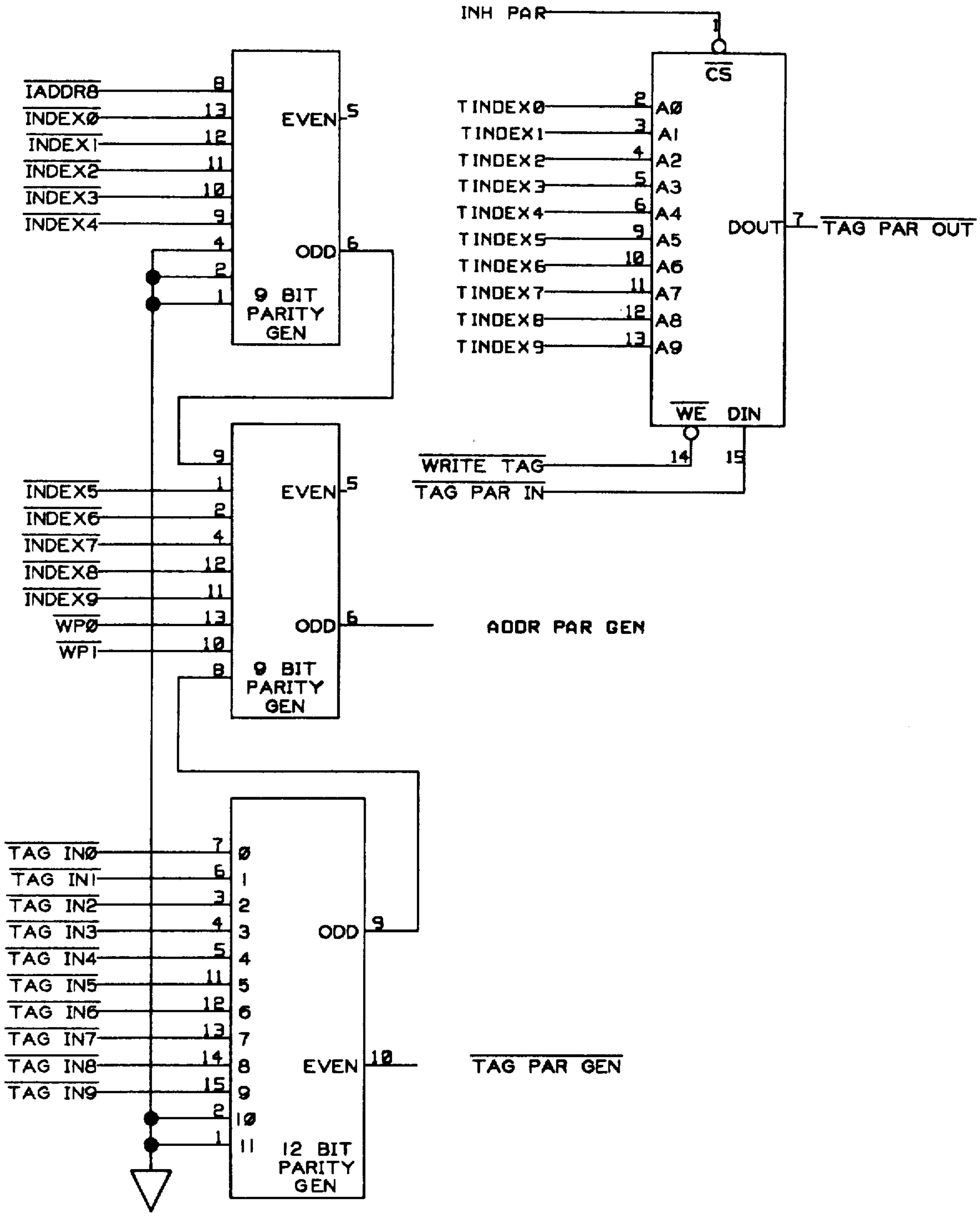
Figure 25:
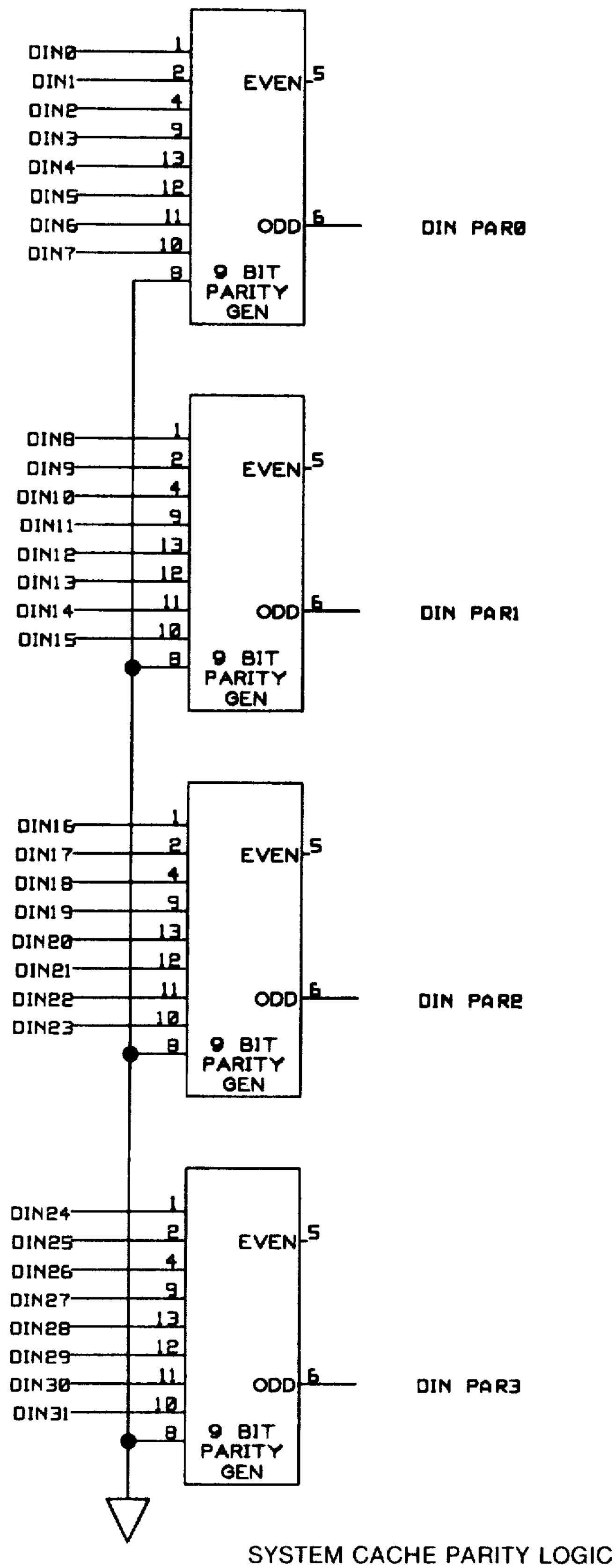
Figure 26:
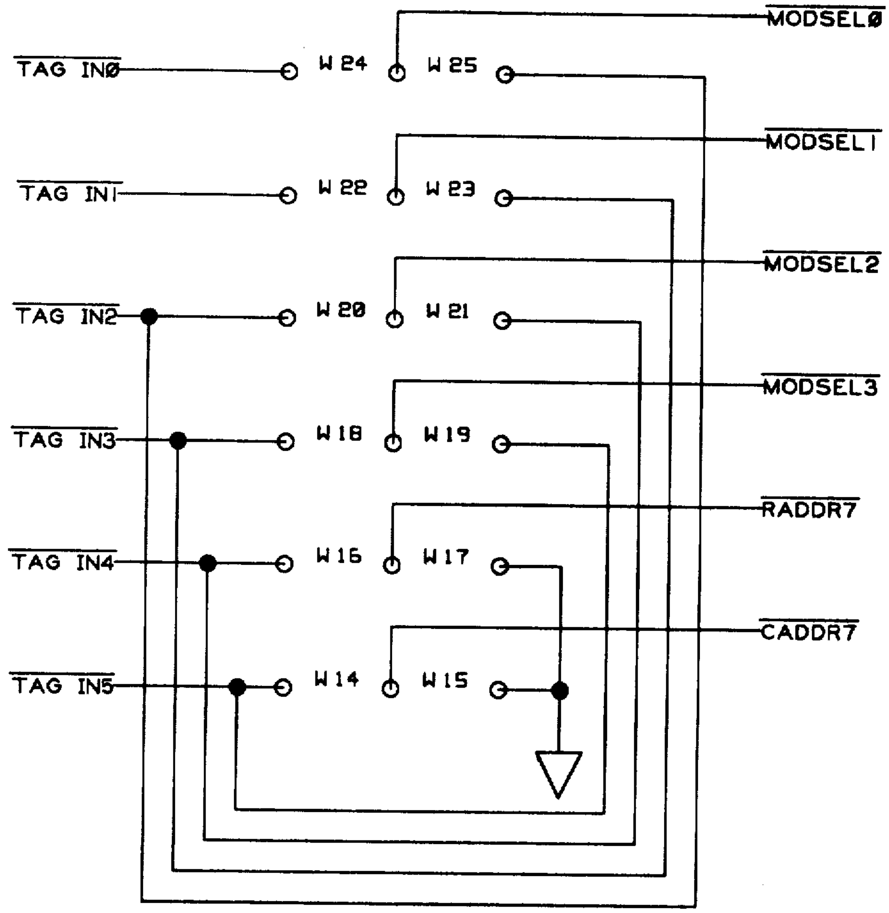
Figure 26:
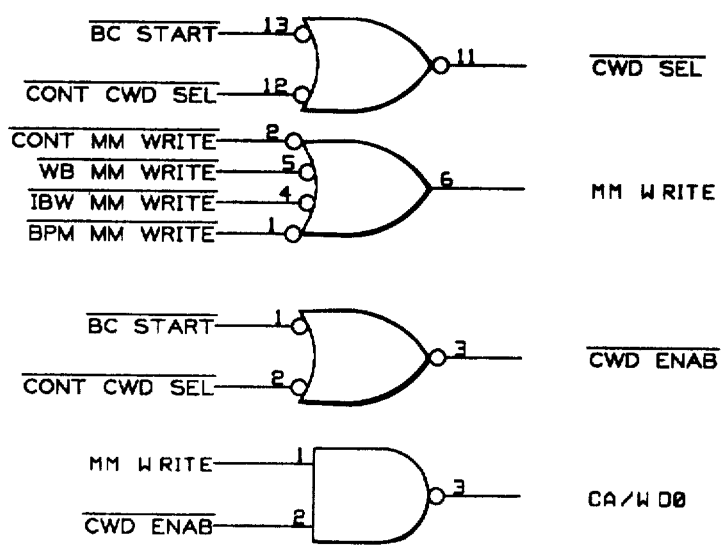
Figure 27:
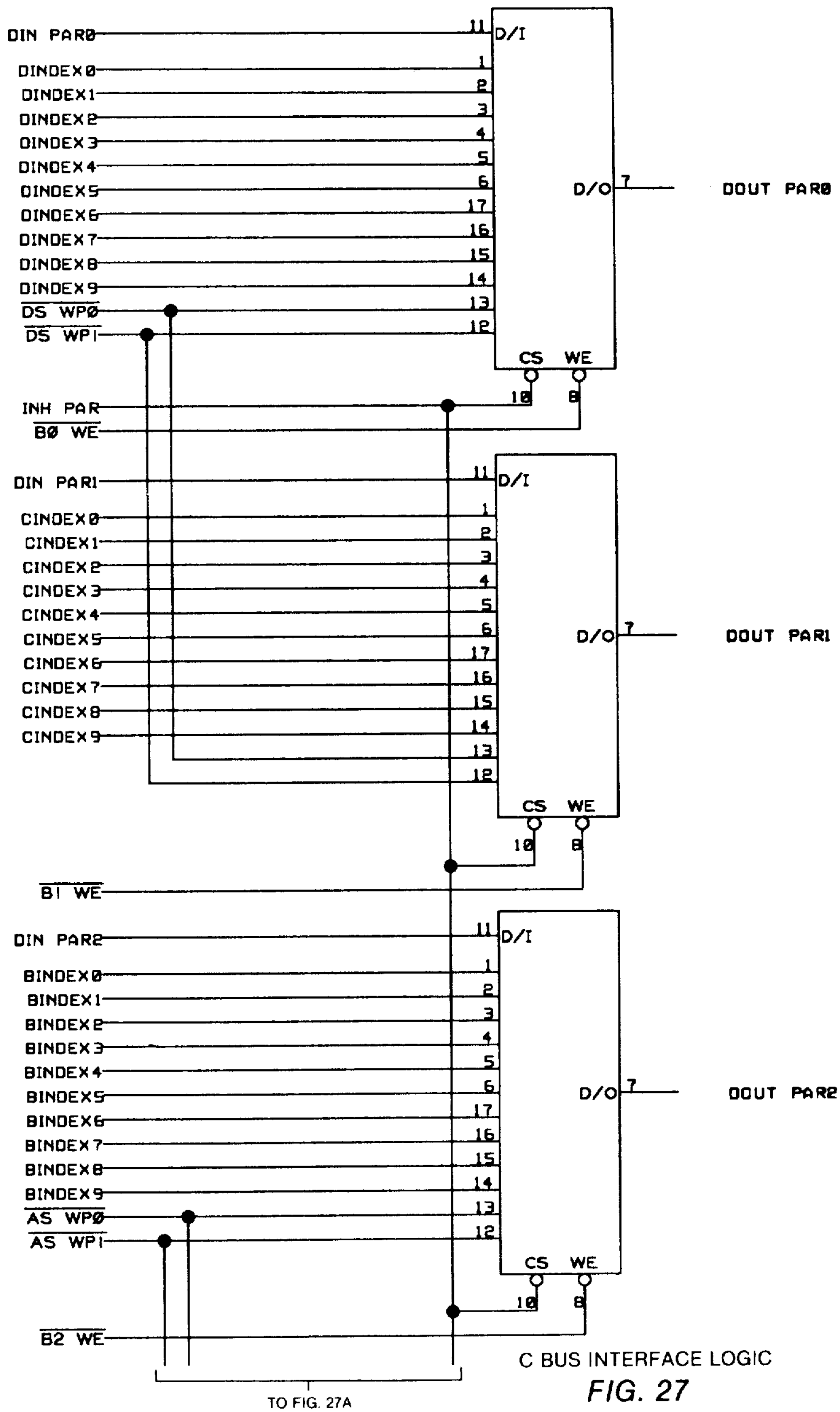
Figure 27A:
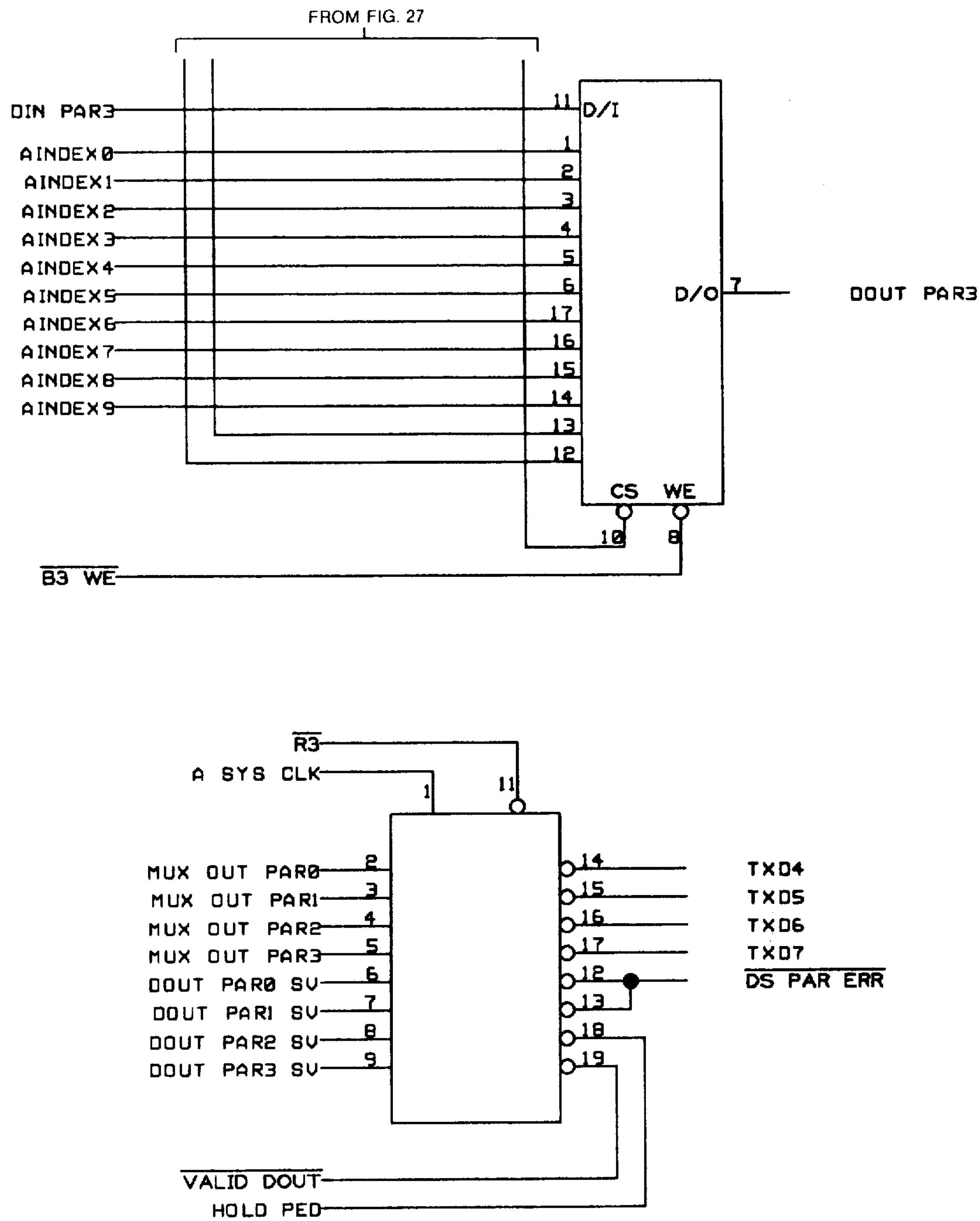
Figure 28:
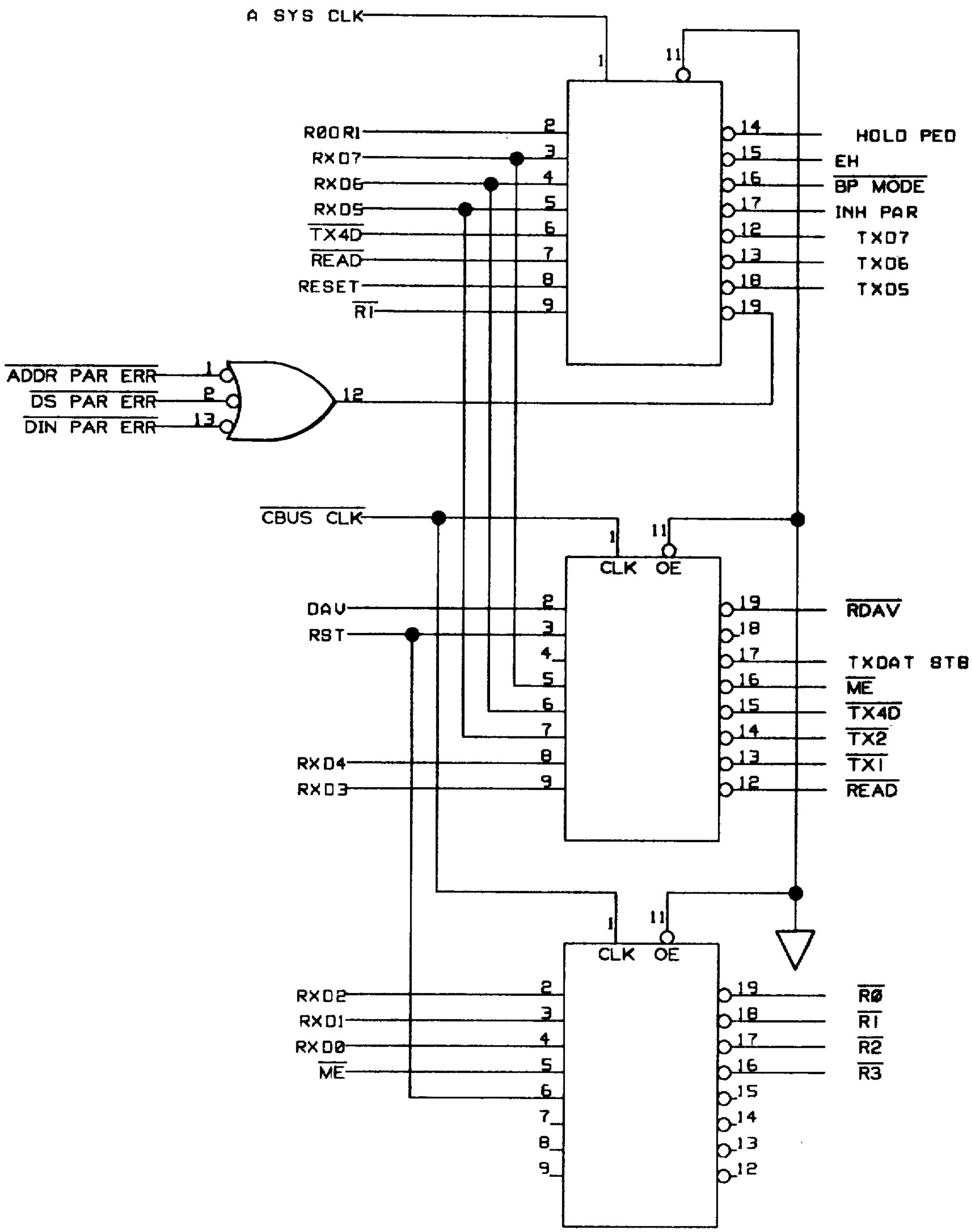
Figure 28A:
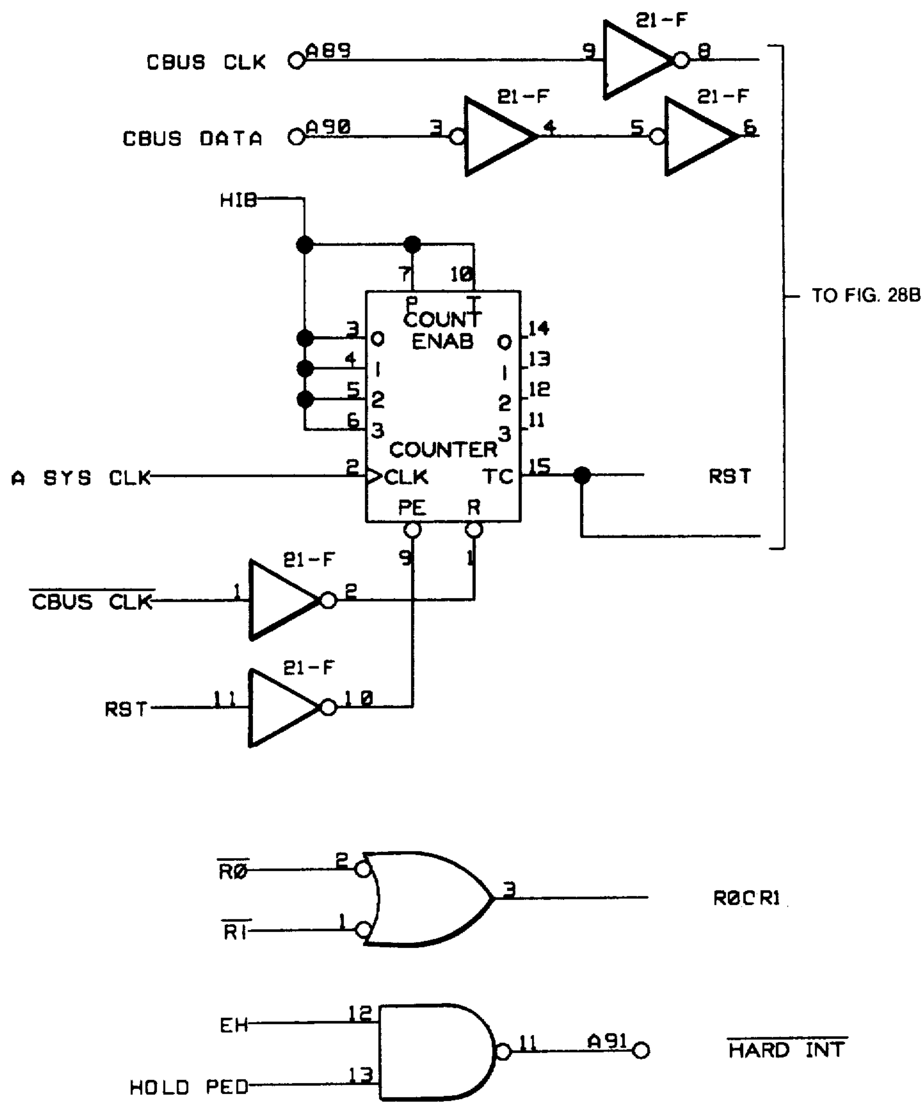
Figure 28B:
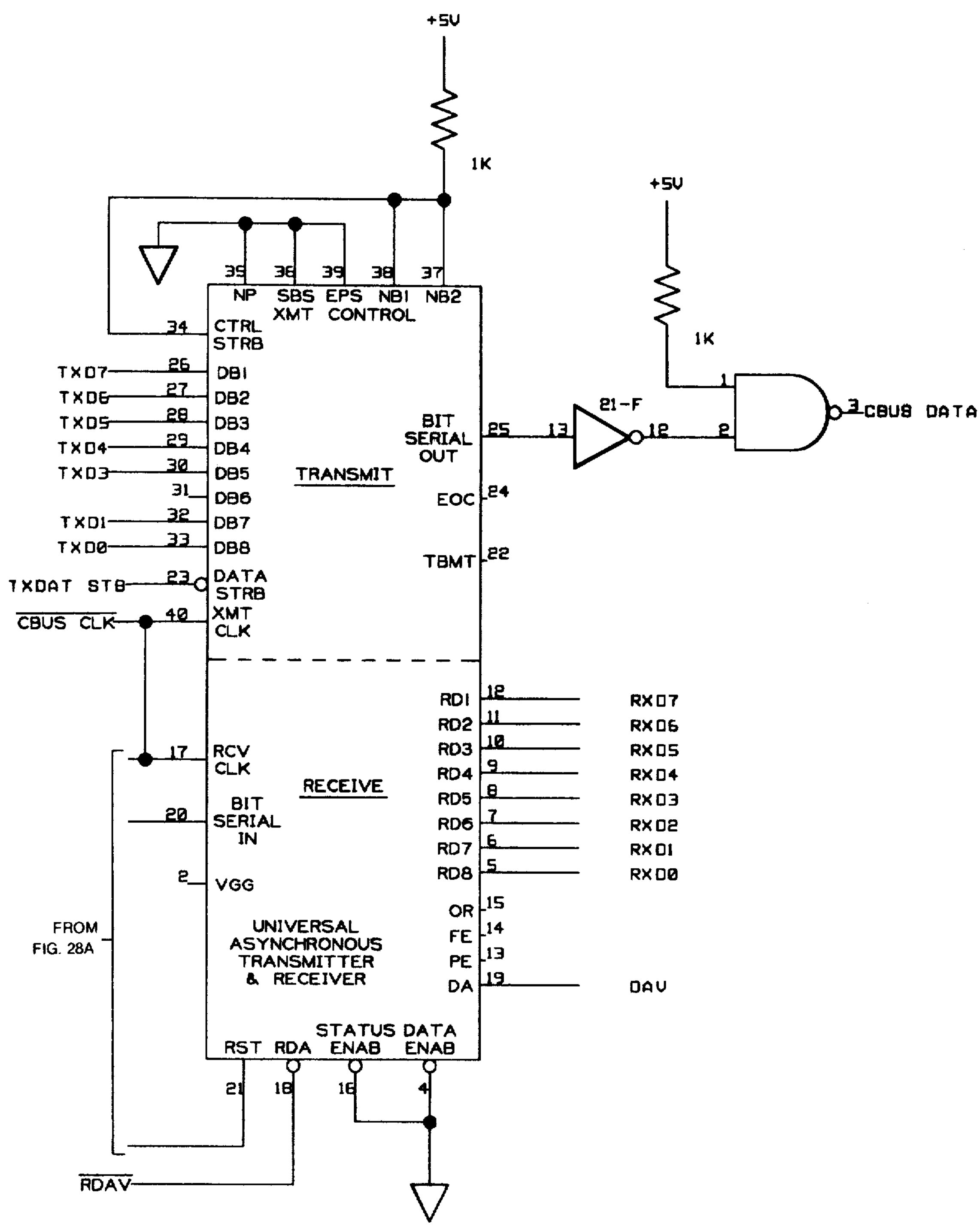
Figure 29:
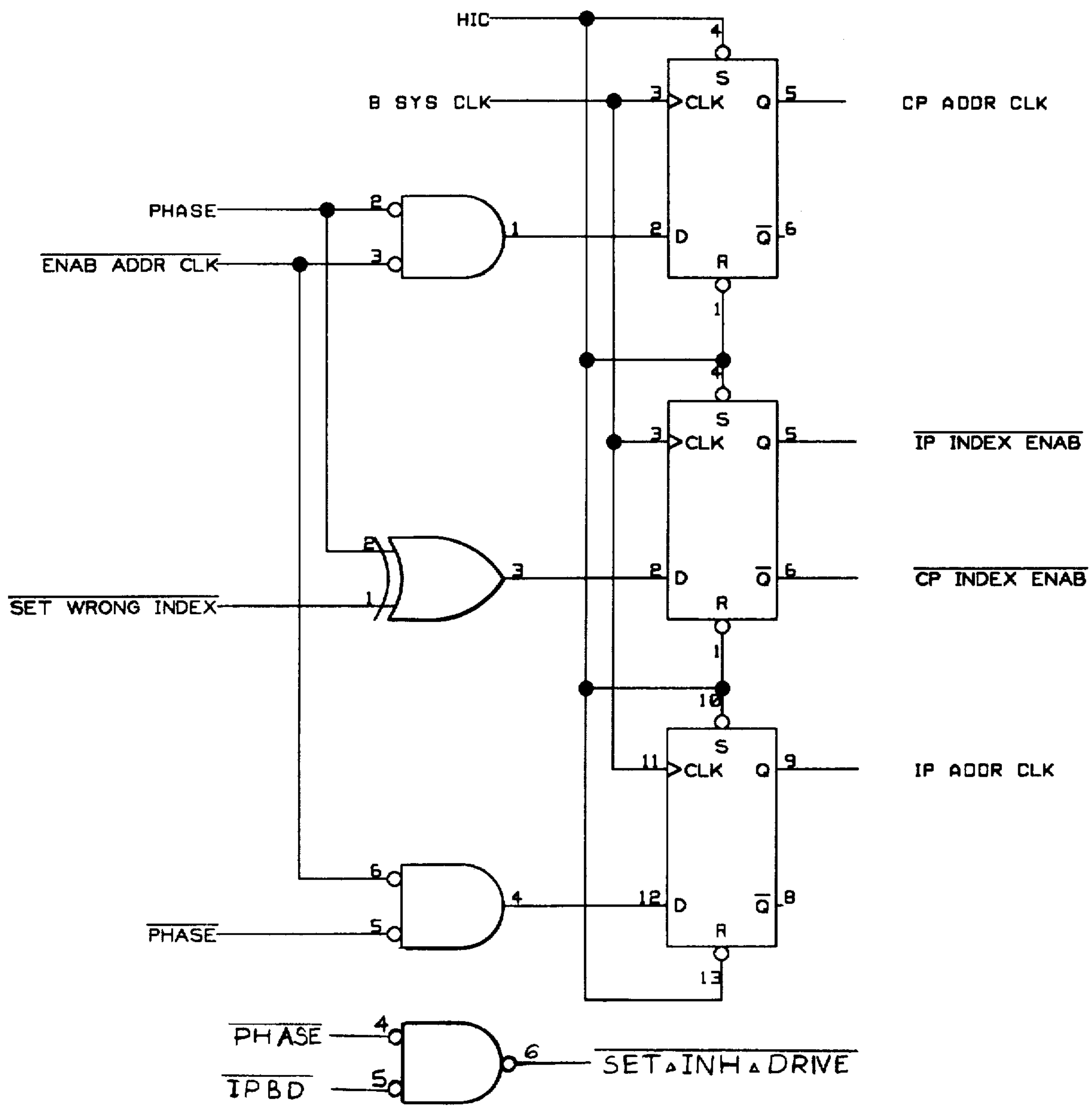
Figure 29A:
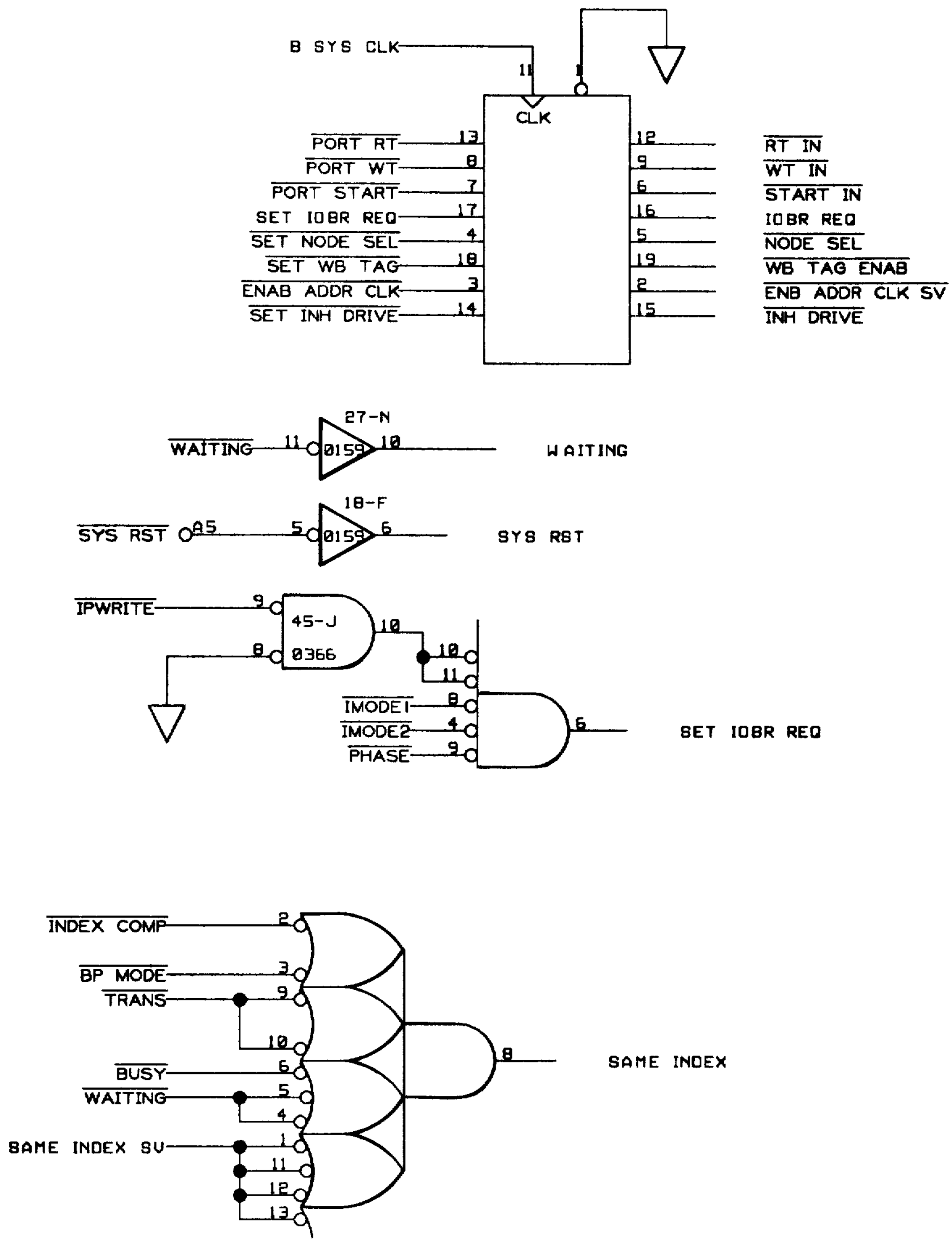
Figure 30:
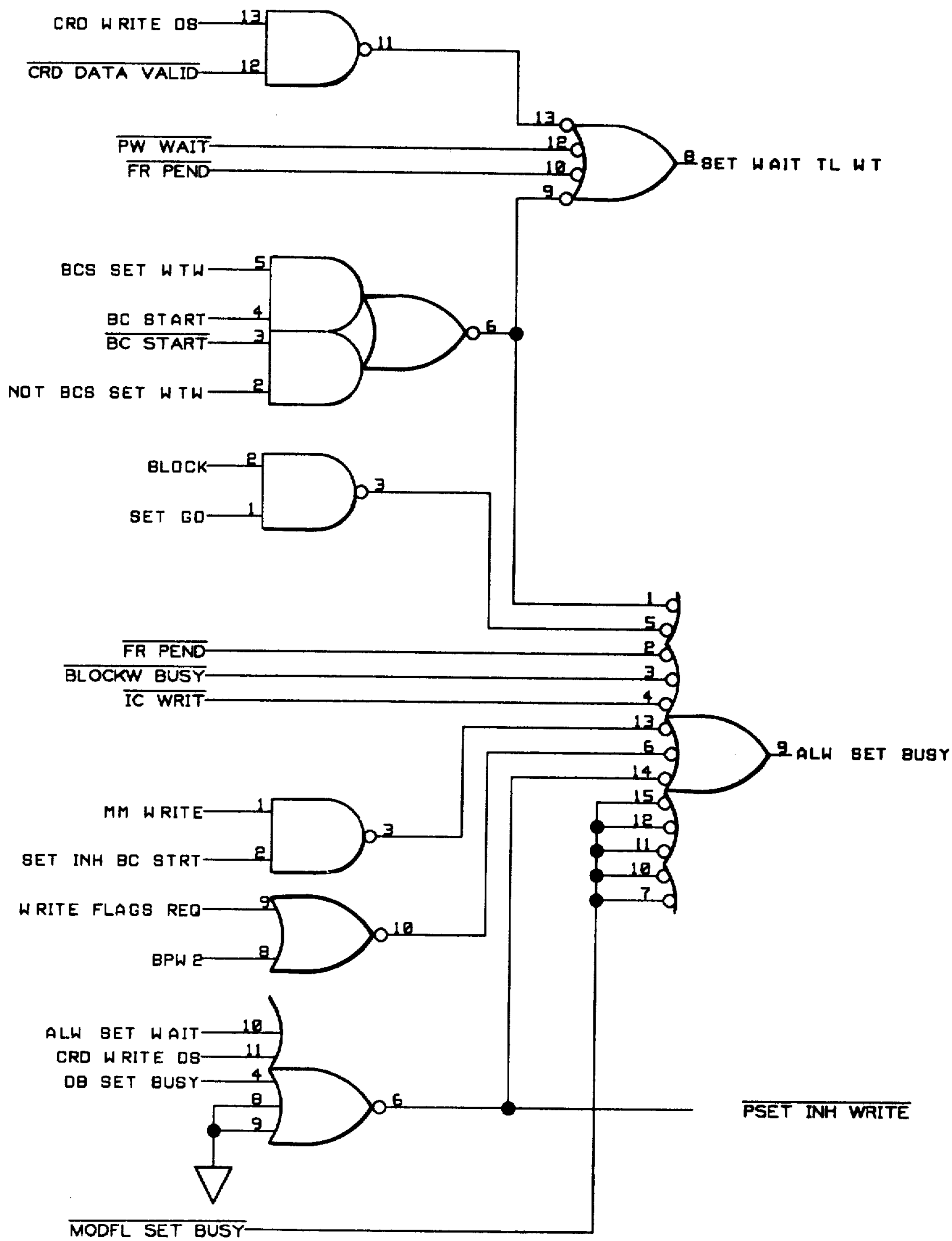
Figure 30A:
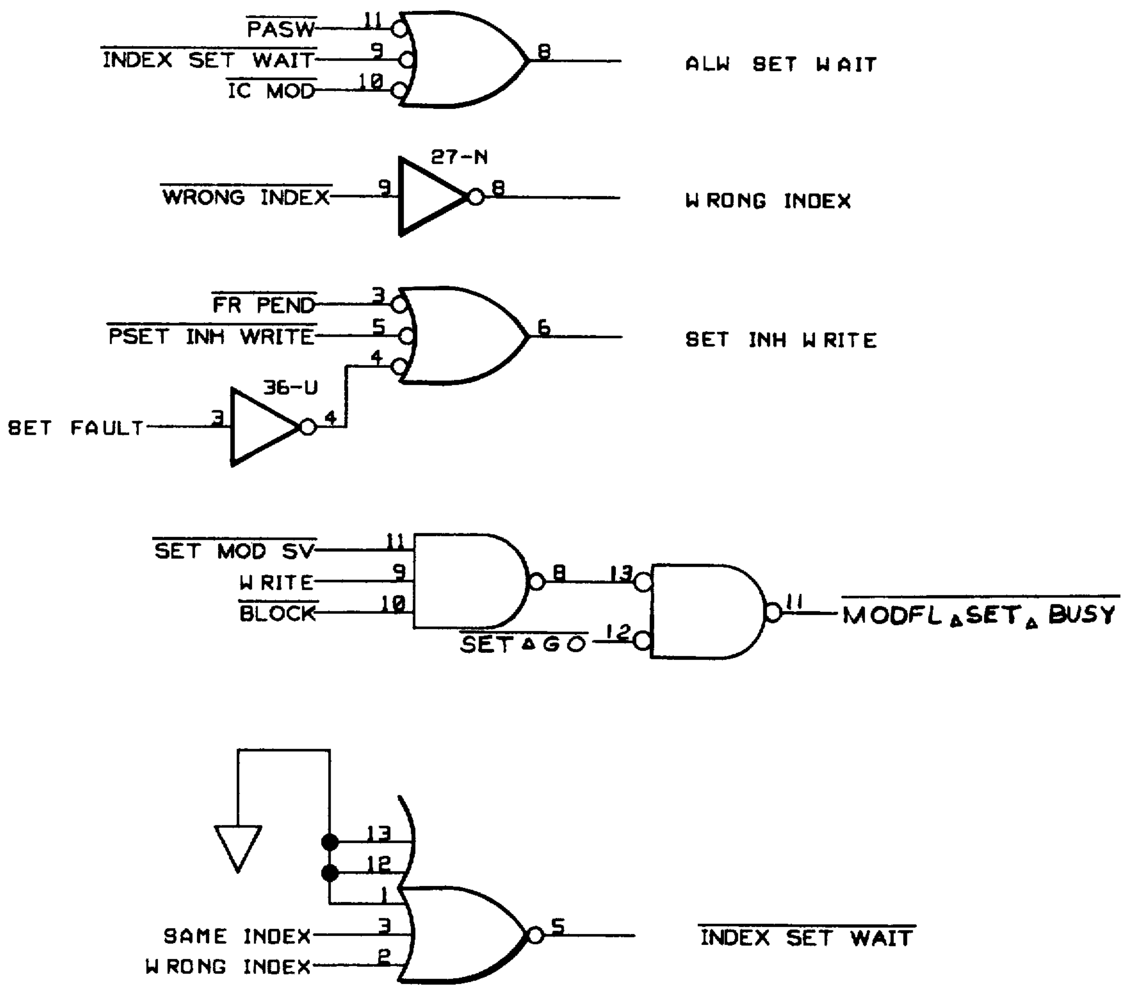
Figure 31:
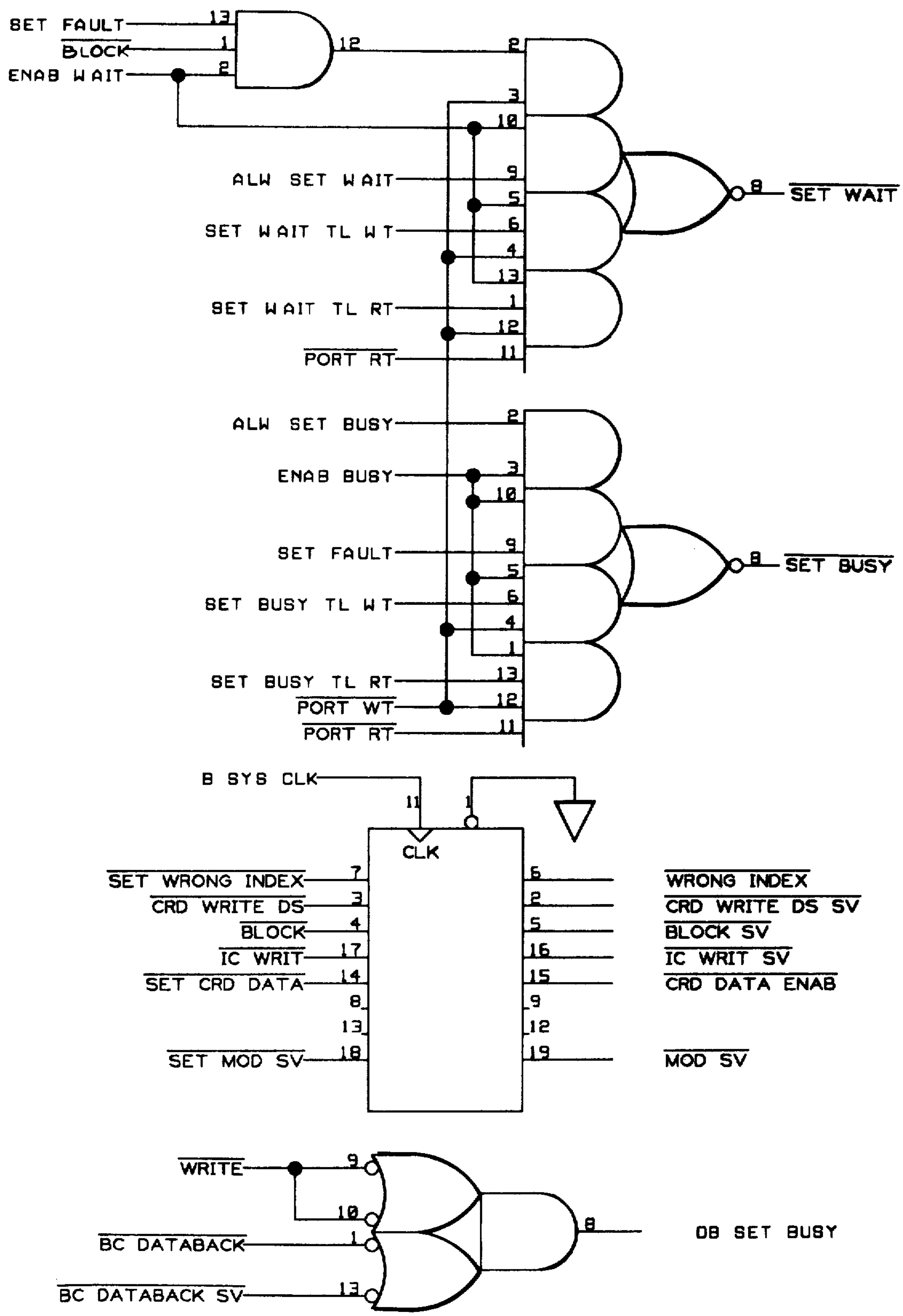
Figure 31A:
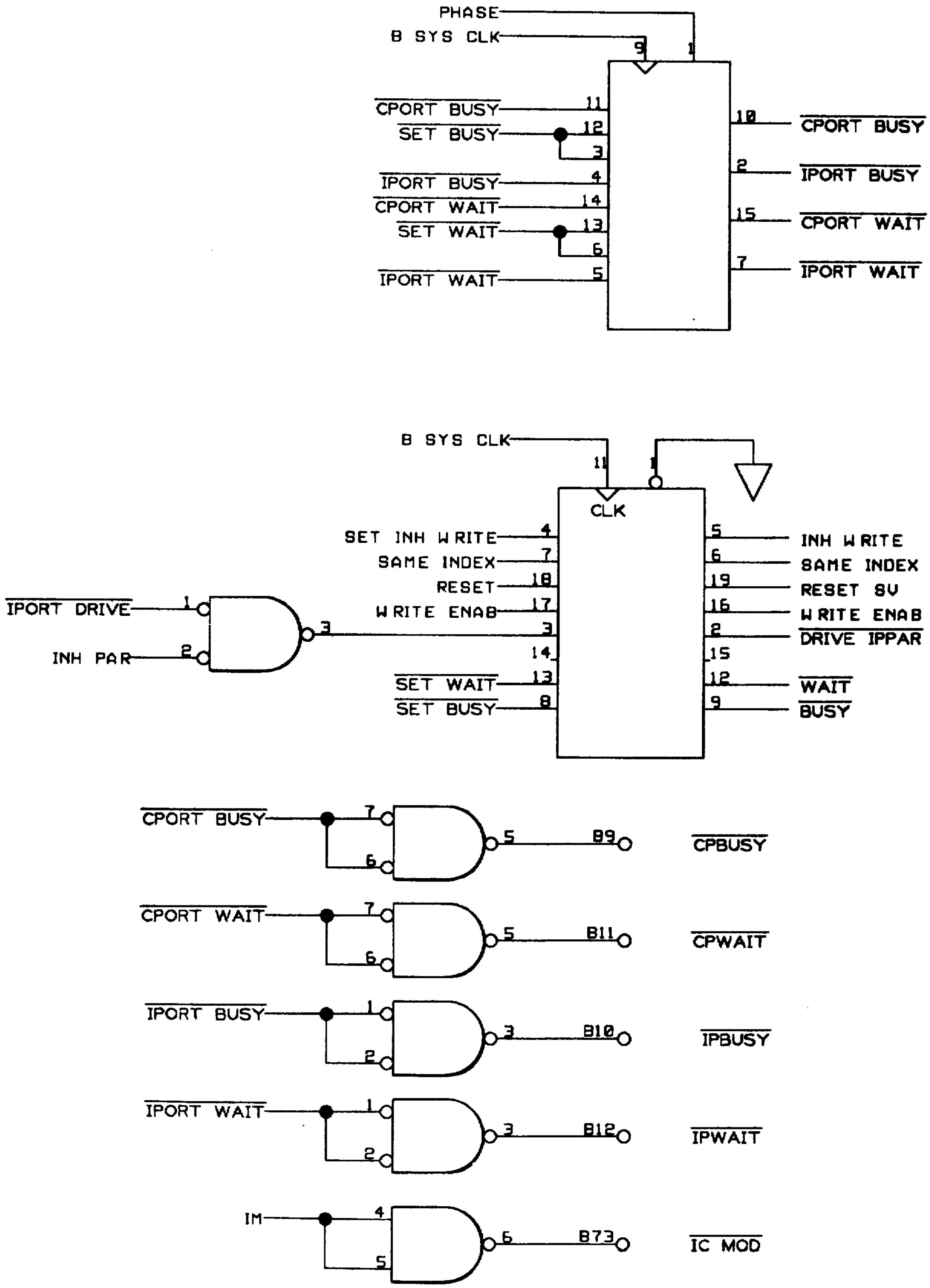
Figure 32:
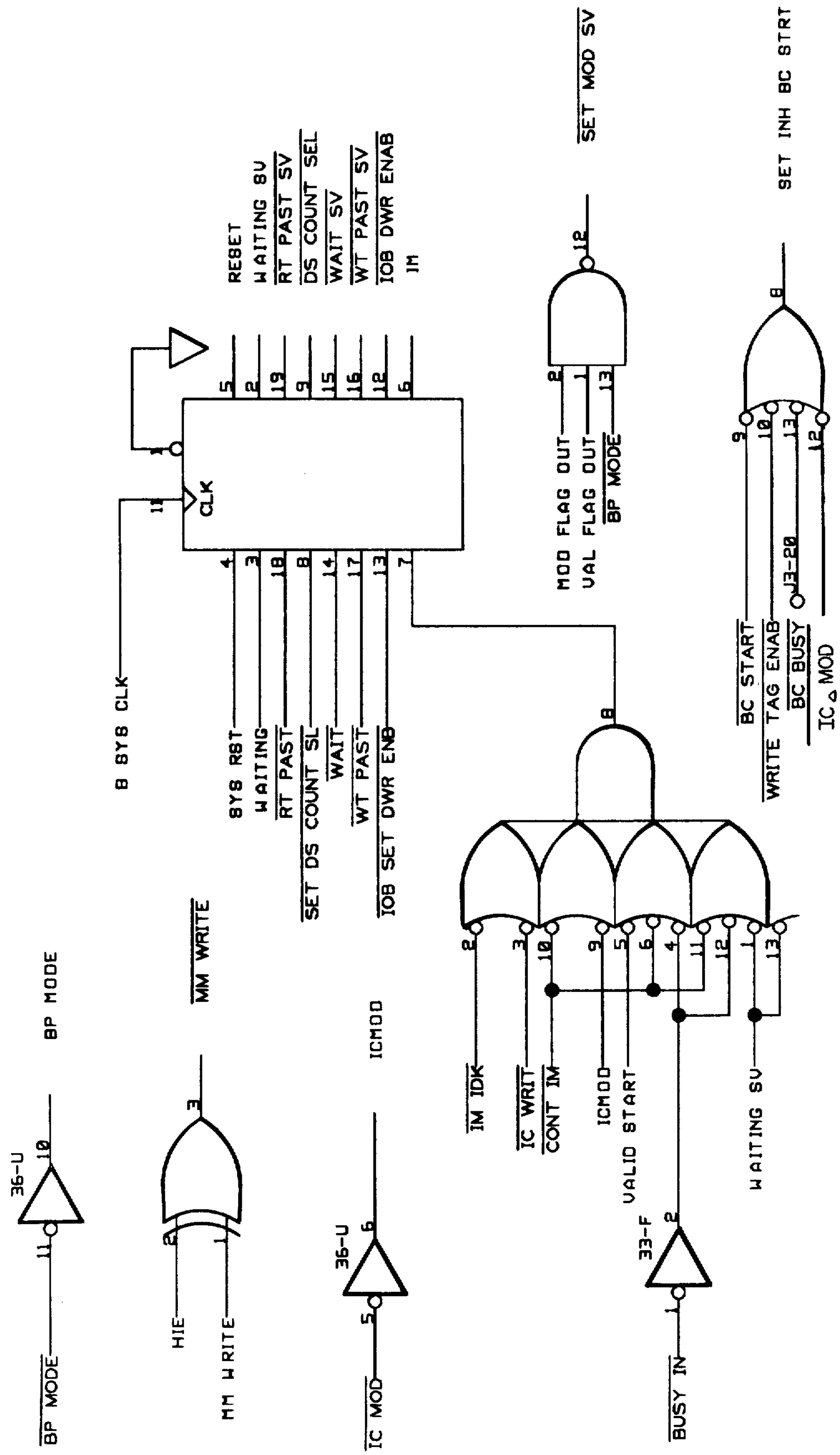
Figure 32A:
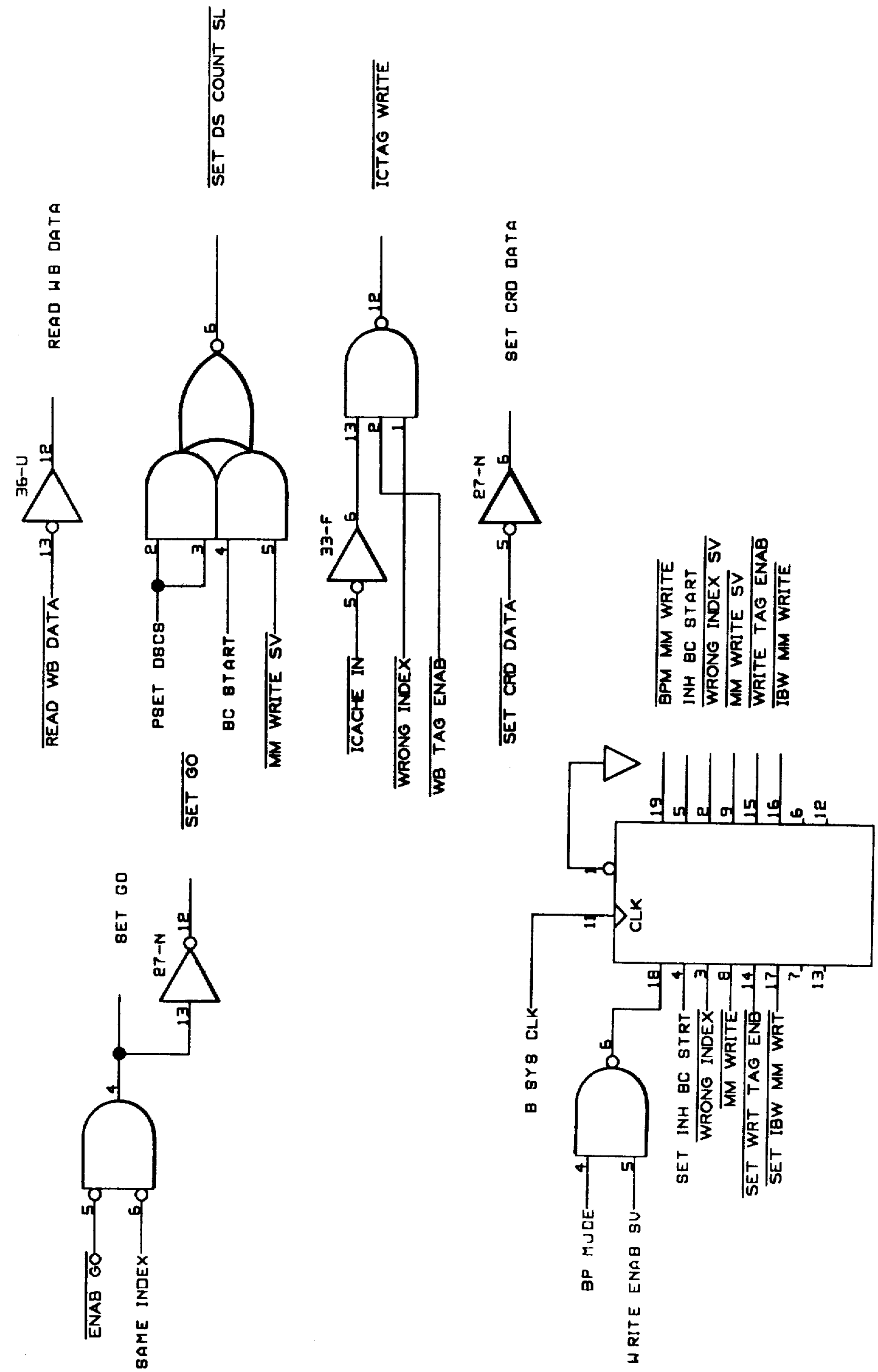

FIG. 5 shows the cache data store 40; FIG. 6 the Tag store 43; FIG. 7 the ICACHE tag store copy unit 44; FIG. 8 the tag store comparator 52; FIG. 9 the ICACHE tag store comparator 45; FIG. 10 the CPORT and IPORT registers 41 and 42 and the write back tag unit; FIGS. 11 and 12 the INDEX SV WP SV unit of FIG. 2; FIG. 13 the INDEX and WP multiplexer units; FIG. 14 data write register 40A; FIG. 15 the multiplexer unit 48 and the index driver unit 48' which supplies an input to multiplexer 48; FIG. 16 the write data register 46; FIG. 17 the multiplexer unit 47; FIG. 18 the driver units 50 and 51 and driver logic associated therewith; FIG. 19 the INDEX/INDEX SV comparator unit; FIG. 20 the CPU buffer data register 54, the I/O buffer data register 55, and the CRD IN register 53. The specific system cache parity logic is shown in FIGS. 21–25. The main memory and other interface control logic is shown in FIGS. 26–28. As in any data processing system board, adequate control signals for the various units thereon must be provided and control logic for the particular embodiments of the system cache board depicted in FIGS. 5–27 are shown in FIGS. 29–43.

FIG. 3 depicts an overall block diagram of the bank controller 18 which interfaces between the system cache at the left hand side of the drawing and the memory modules at the right hand side thereof. Words which are read from the memory modules, identified as RD ∅–38, including 7 parity bits, are supplied to the bank controller for transfer to the system cache, such words being identified as CRD ∅–31 in FIG. 3, via the error correction logic 70 which also supplies four parity bits, idenified as CRD PAR ∅–3. Address and data words which are to be written into the main memory modules are supplied from the system cache such words being identified as CA/WD ∅–31, together with the parity bits therefor, identified as CA/WD PAR ∅–3, the data being supplied to the write data bus for the memory modules as WD ∅–31 and parity bits WD 32–38 via error correction logic 70. The addresses therefor are supplied in the form of information which is required to select the desired memory module (MODSEL ∅–3) (to identify up to 16 modules) and to select the desired RAM within the selected module (ADDR∅–7)

Further, the bank controller supplies the following control signals to the main memory which responds thereto as required. The RAS and CAS signals represent the row address and column address strobe signals for the RAM's of the main memory. The LDOUT signal causes the selected module to load its output register at the end of the current cycle and to enable the register to place the contents of the output register on the read data bus during the next cycle. The LDIN signal causes the selected module to accept data from the write bus during the next cycle and to write such data into the RAMs during the following cycle. The REFRESH signal overrides the module selection for the row address strobe (RAS) signal only. During a refresh operation one module is read normally and all others perform an RAS refresh only.

The bank controller also interfaces the system cache to supply 32-bit words (CRD ∅–31) to the cache along with 4 parity bits (CRD PAR ∅–3) for byte parity and to receive 32 bit address and data words (CA/WD ∅–31) from the cache along with byte parity bits (CA/WD PAR ∅–3). The bank controller also supplies the following control signals to the cache. The BC BUSY signal indicates that the bank controller is not able to accept a BC START (see below) request. The BC ERROR signal indicates that the data word placed on the read data bus during the last cycle contained a correctable error and must be replaced with the corrected word for the data which is on the bus during the current cycle. Once a BC ERROR signal has been asserted all subsequent words of the same block transfer are also passed through the error correction logic. Accordingly, BC ERROR need be asserted only once for each block transfer.

The BC DATABACK signal indicates that the first word of the four word block to be transferred will be at the read data bus in the next cycle. The BC REJECT signal indicates that the bank controller cannot accept the contents of the write data bus at the end of the current cycle. The BC START indicates that a bank controller transfer operation is to commence.

Specific logic diagrams for the particular units of the bank controller board 18 of FIG. 3 are shown in FIGS. 44–63, which latter figures are appropriately labelled as follows to show more specifically a particular embodiment of the various portions of the bank controller 18 depicted therein.

Figure 44:
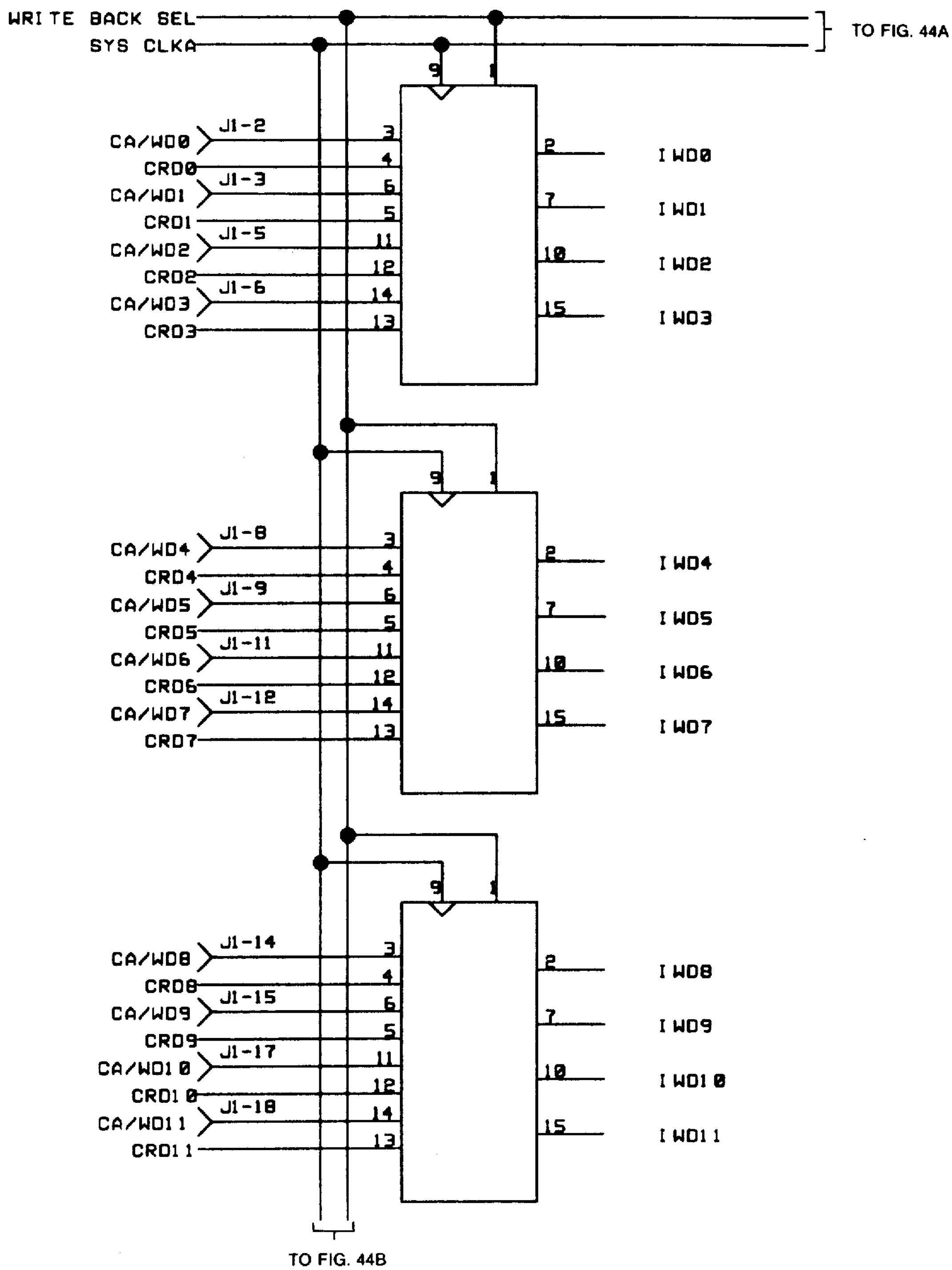
Figure 44A:
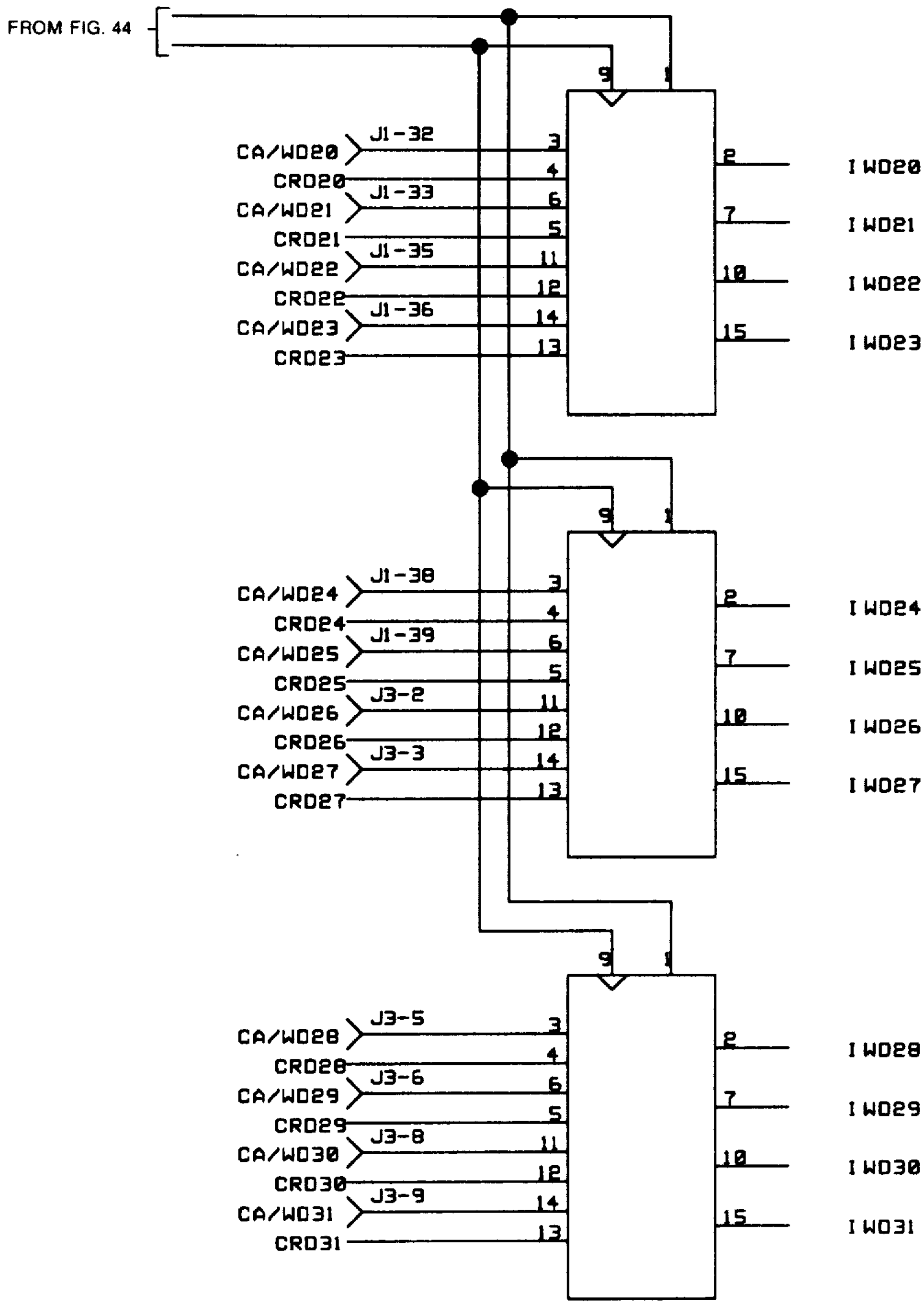
Figure 44B:
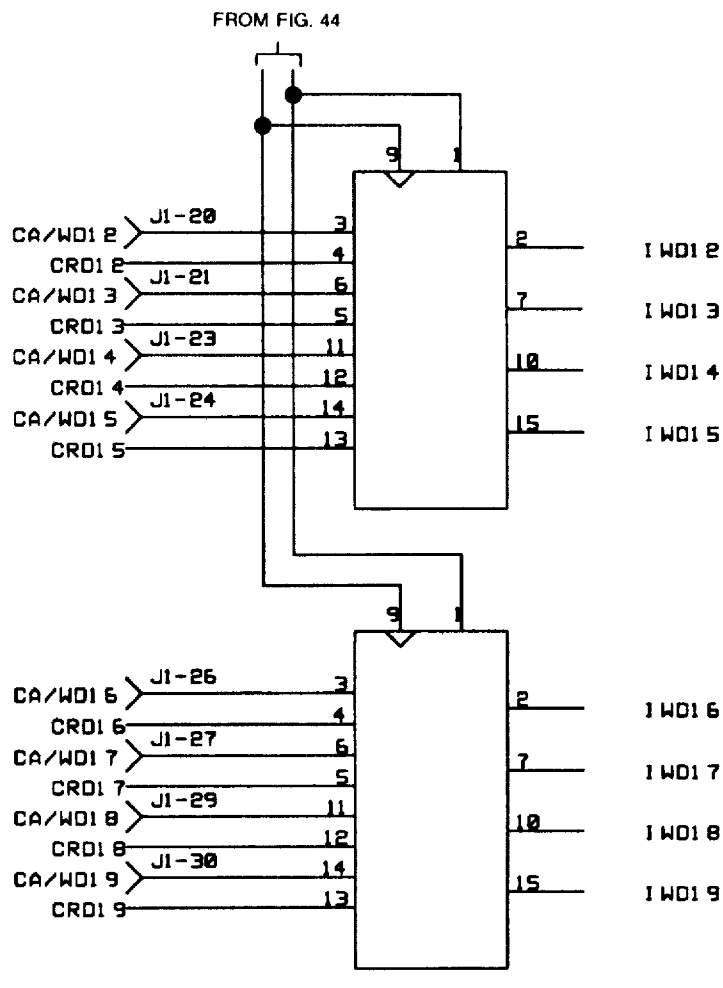
Figure 45:
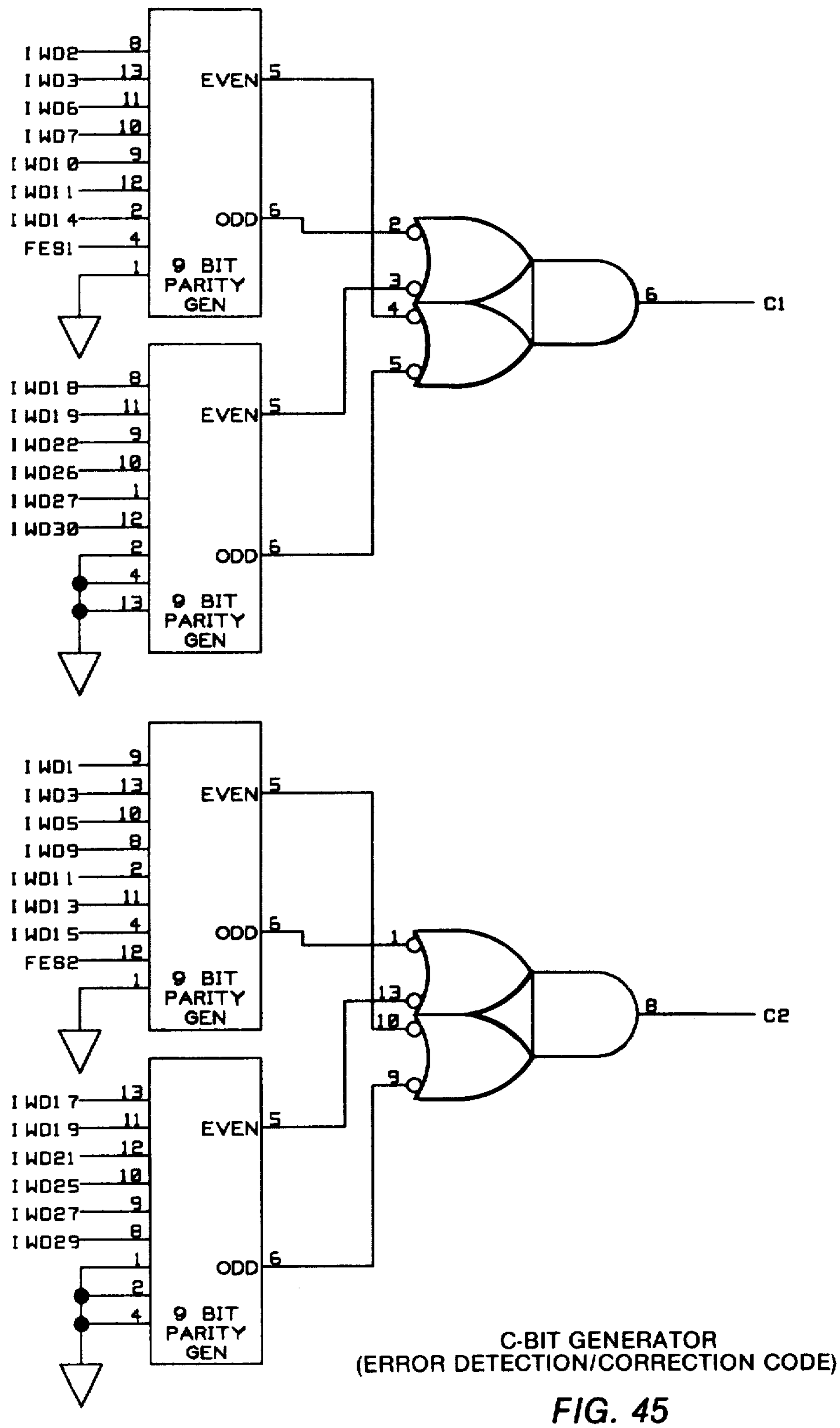
FIGS. 45–63 show specific logic circuitry for implementing the bank controller of FIG. 3.
Figure 45A:
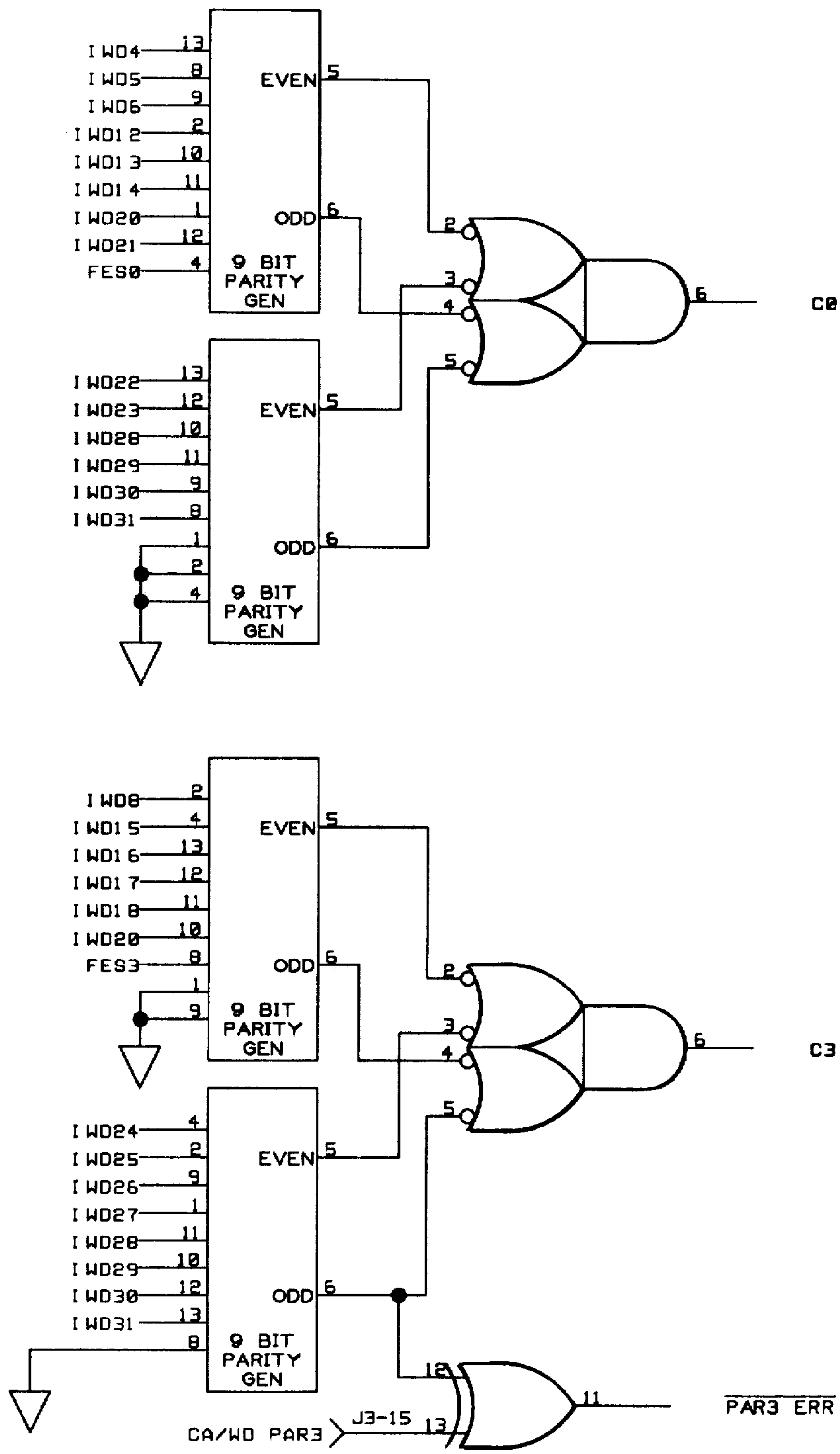
Figure 45B:
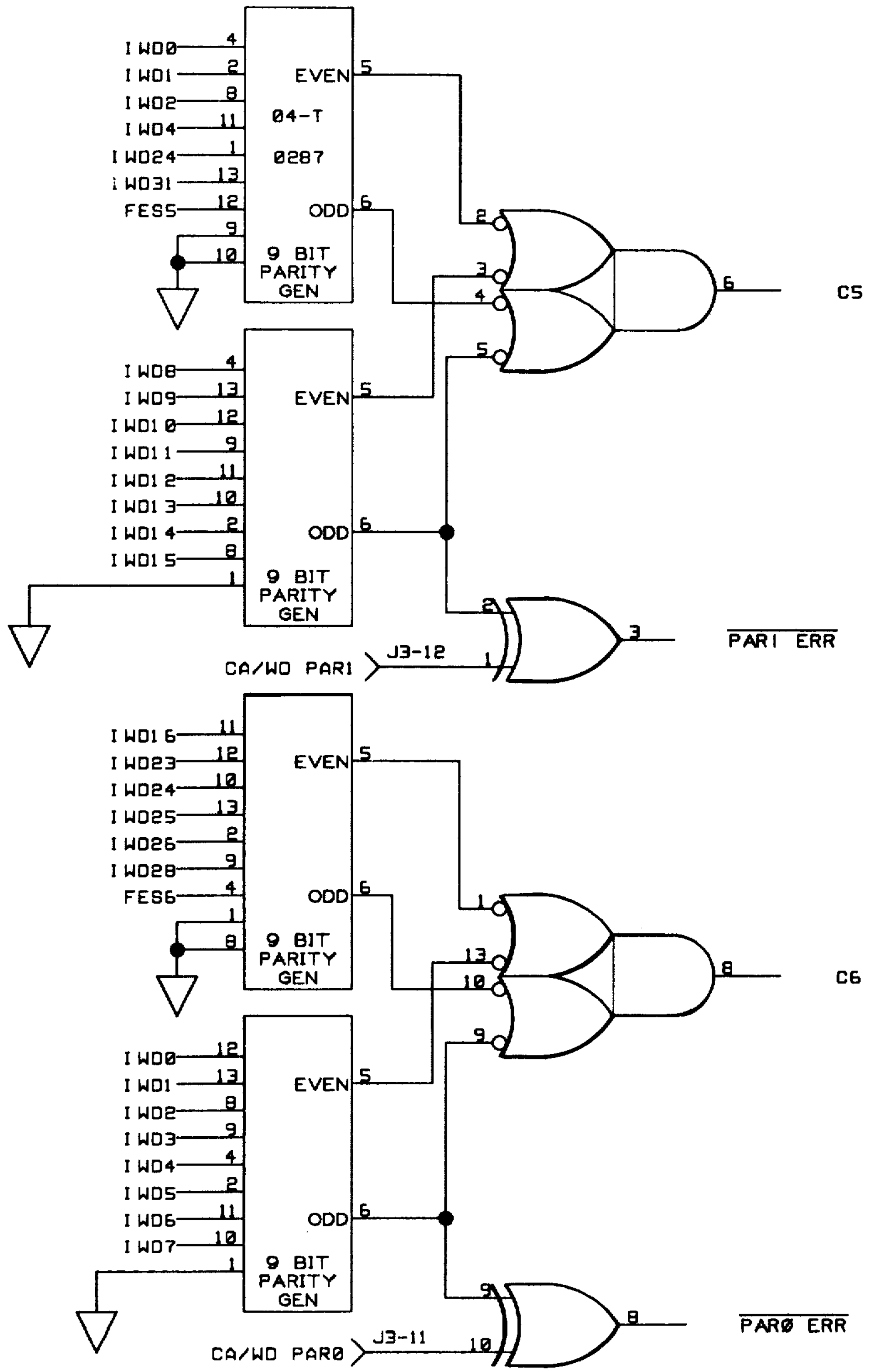
Figure 45C:
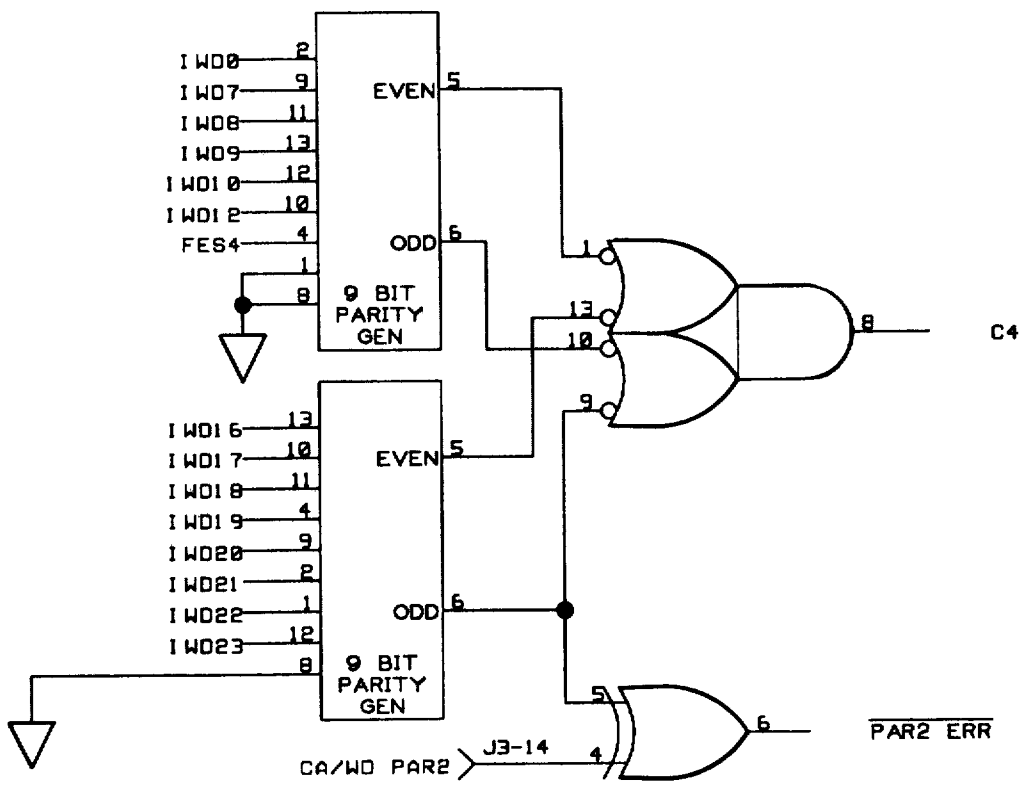
Figure 46:
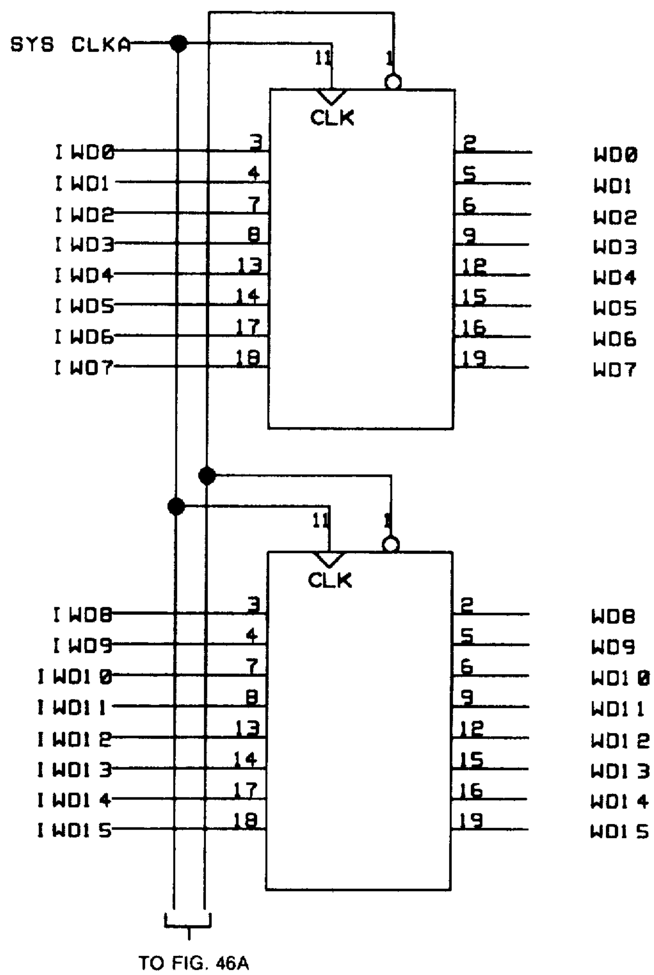
Figure 46A:
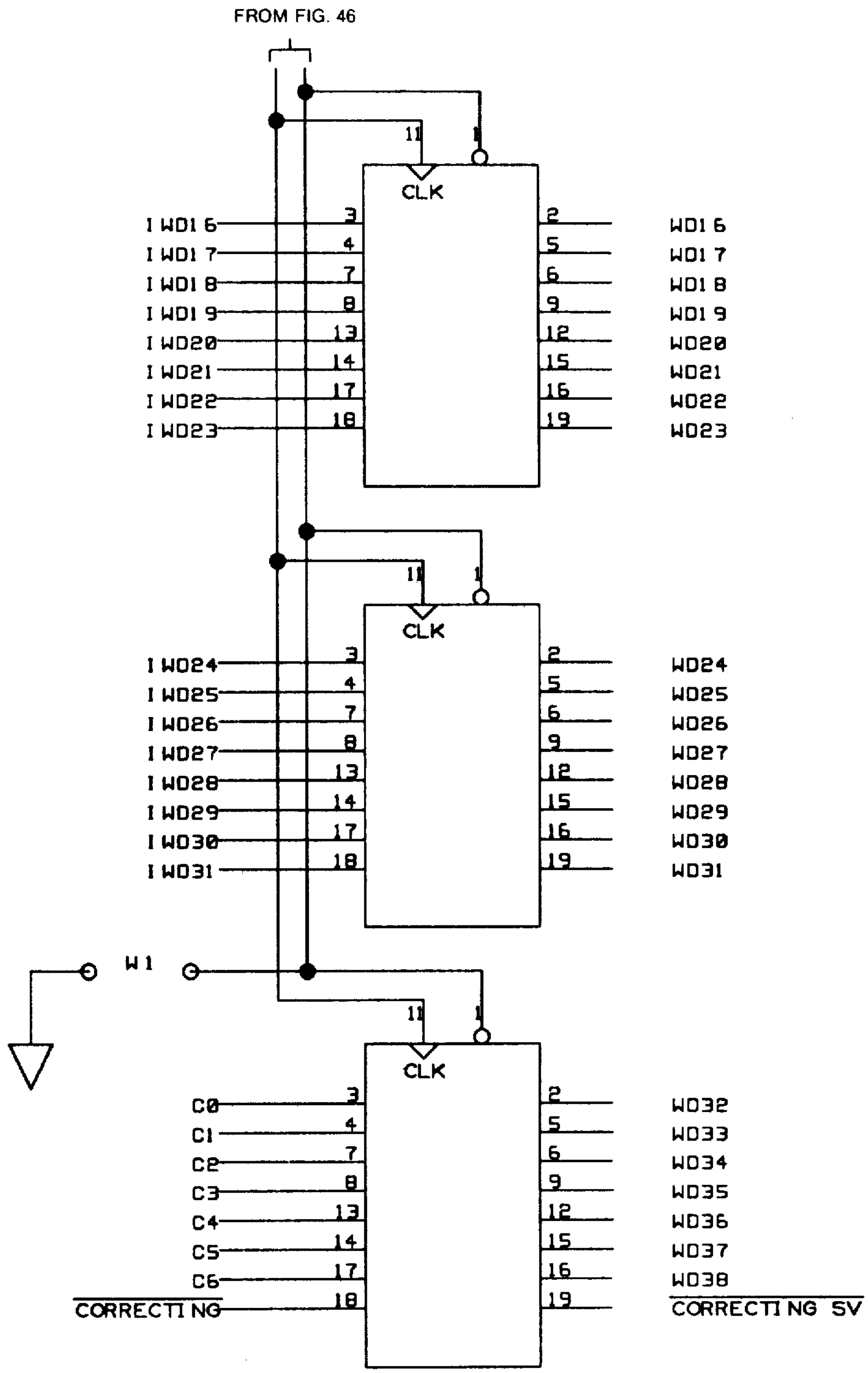
Figure 47:
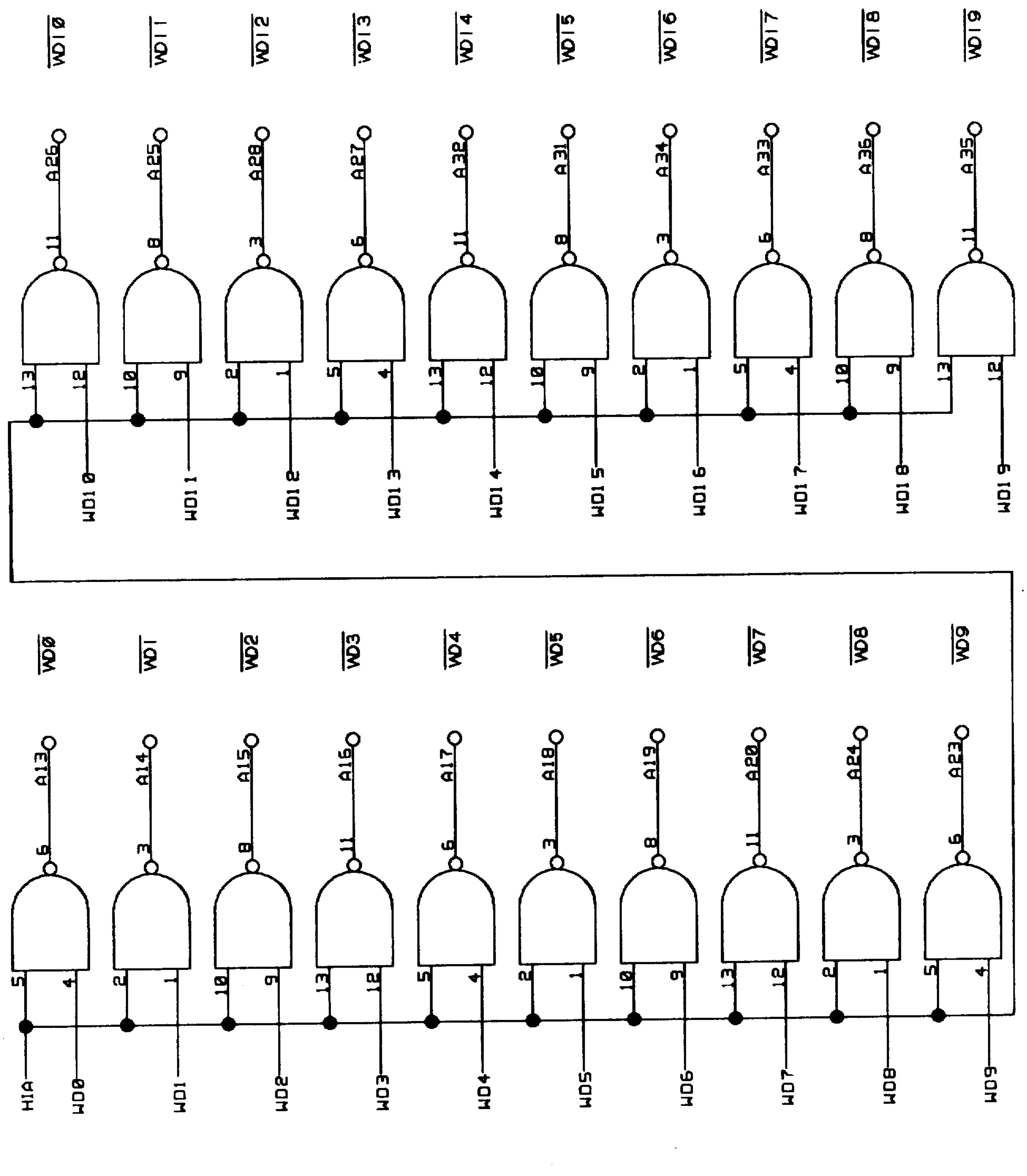
Figure 47A:
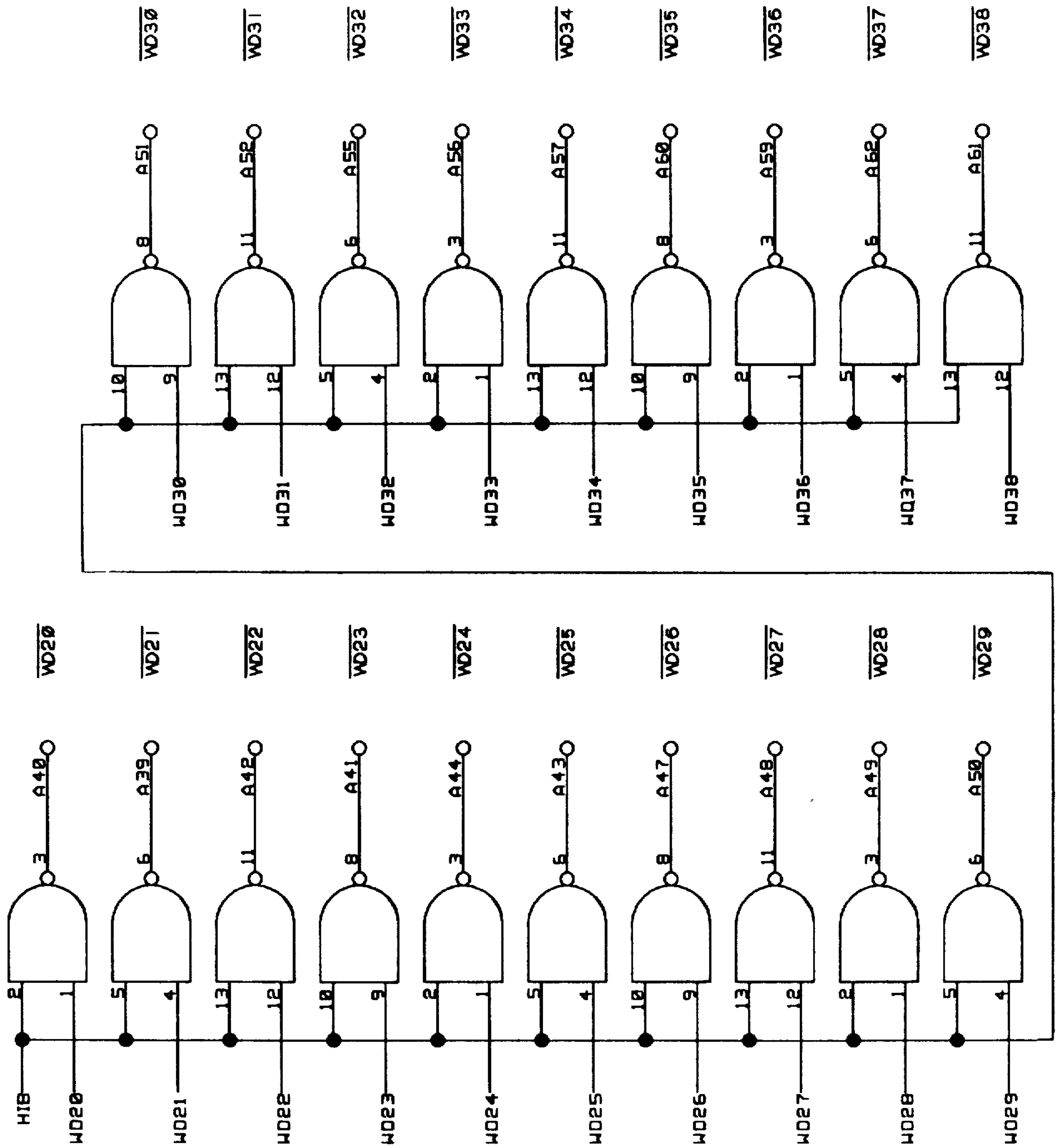
Figure 48:
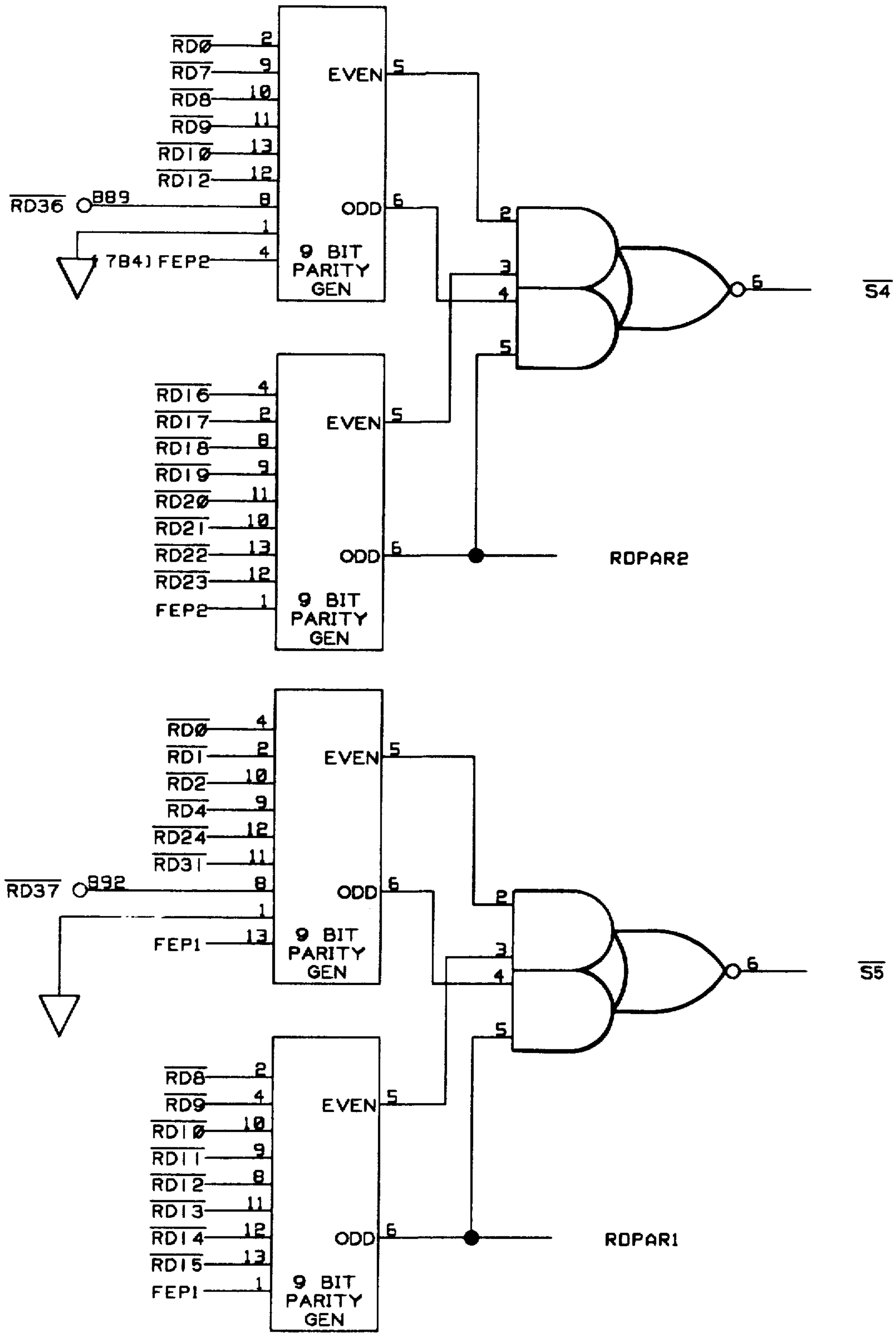
Figure 48A:
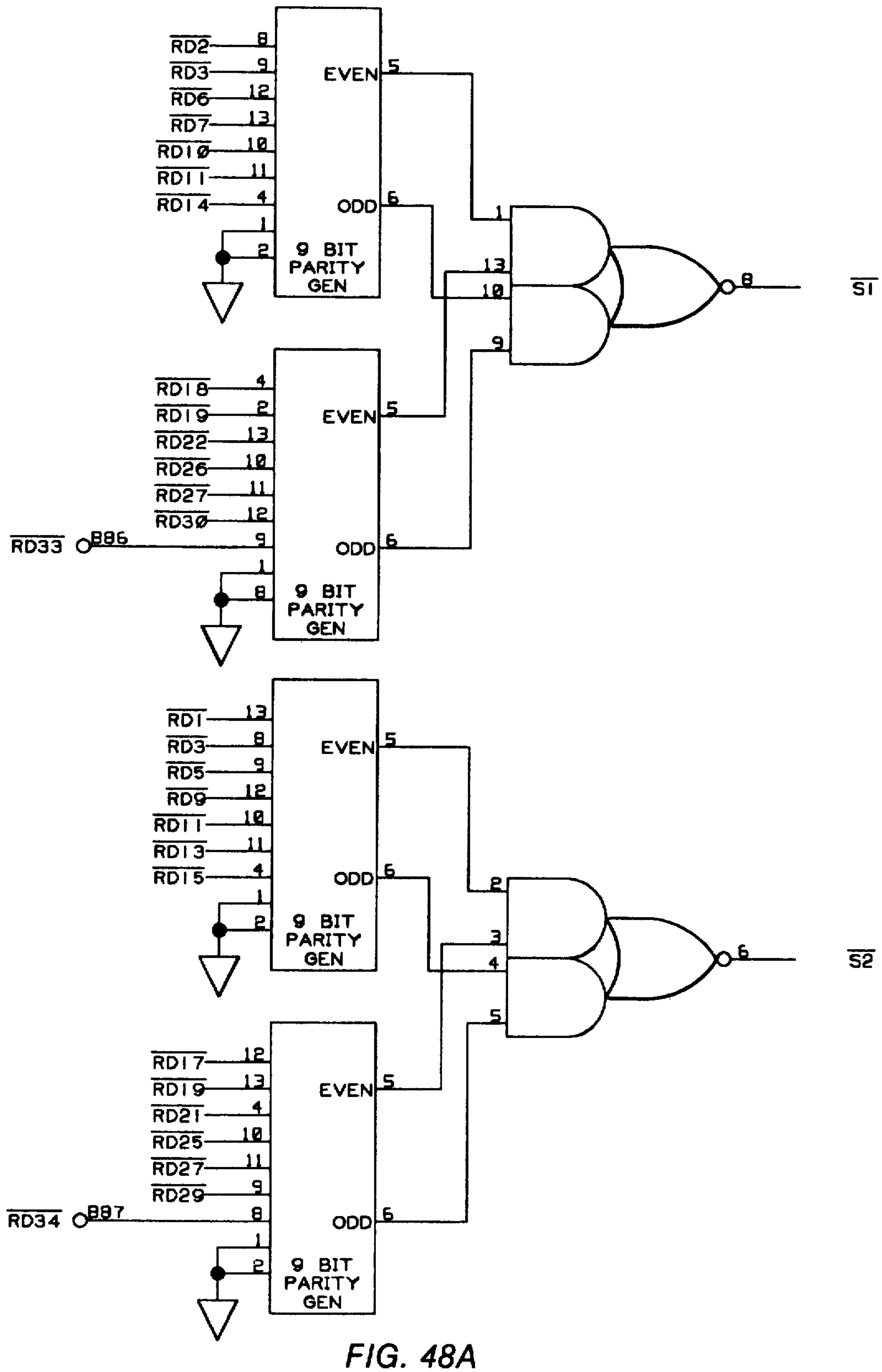
Figure 48B:
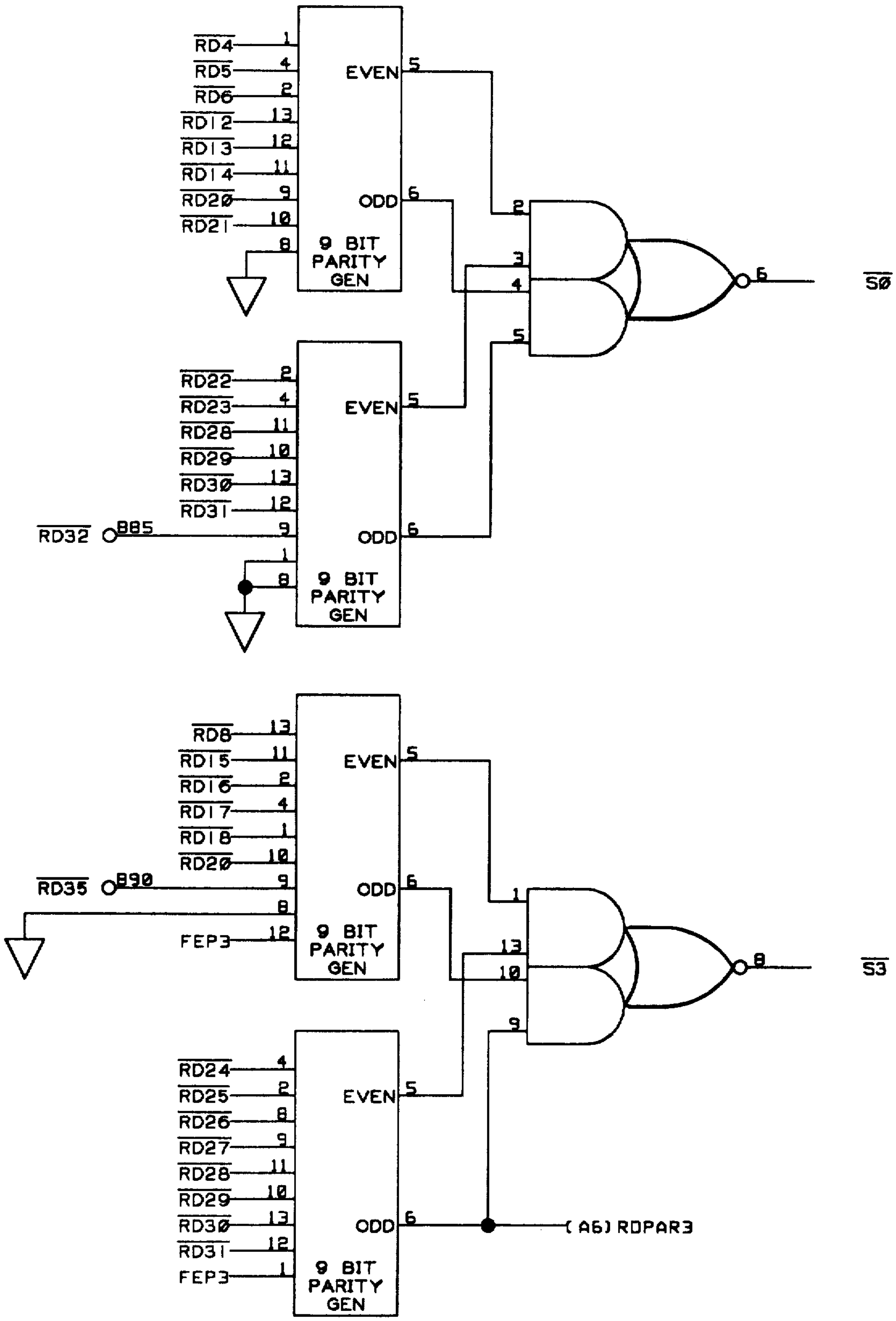
Figure 48C:
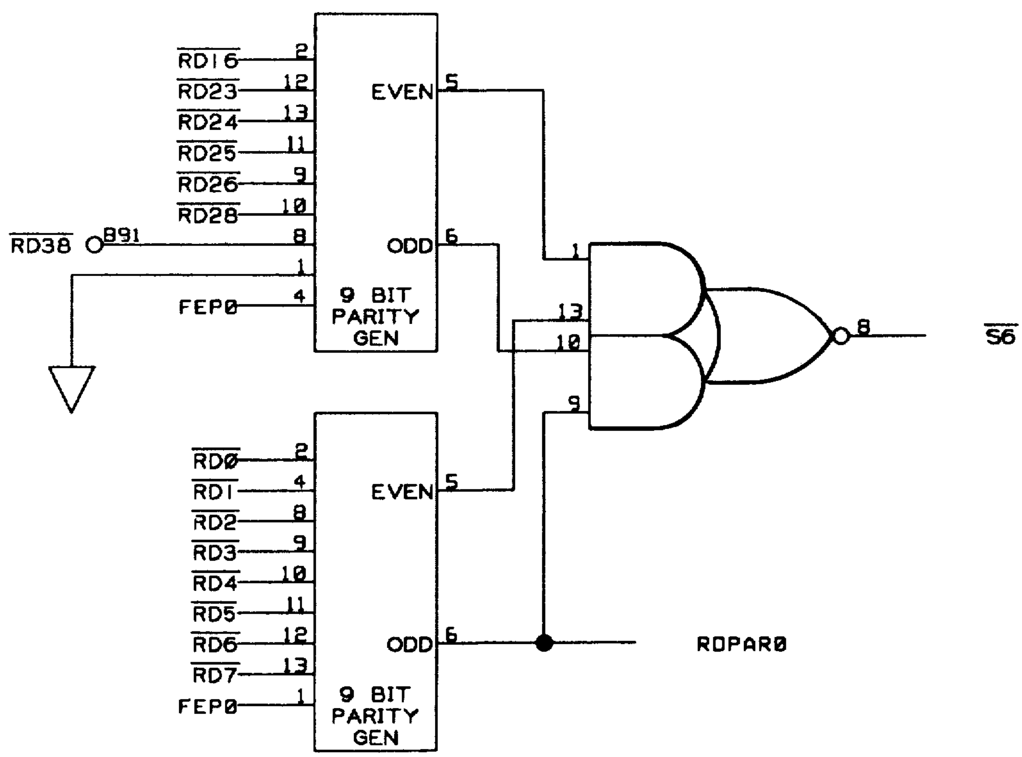
Figure 49:
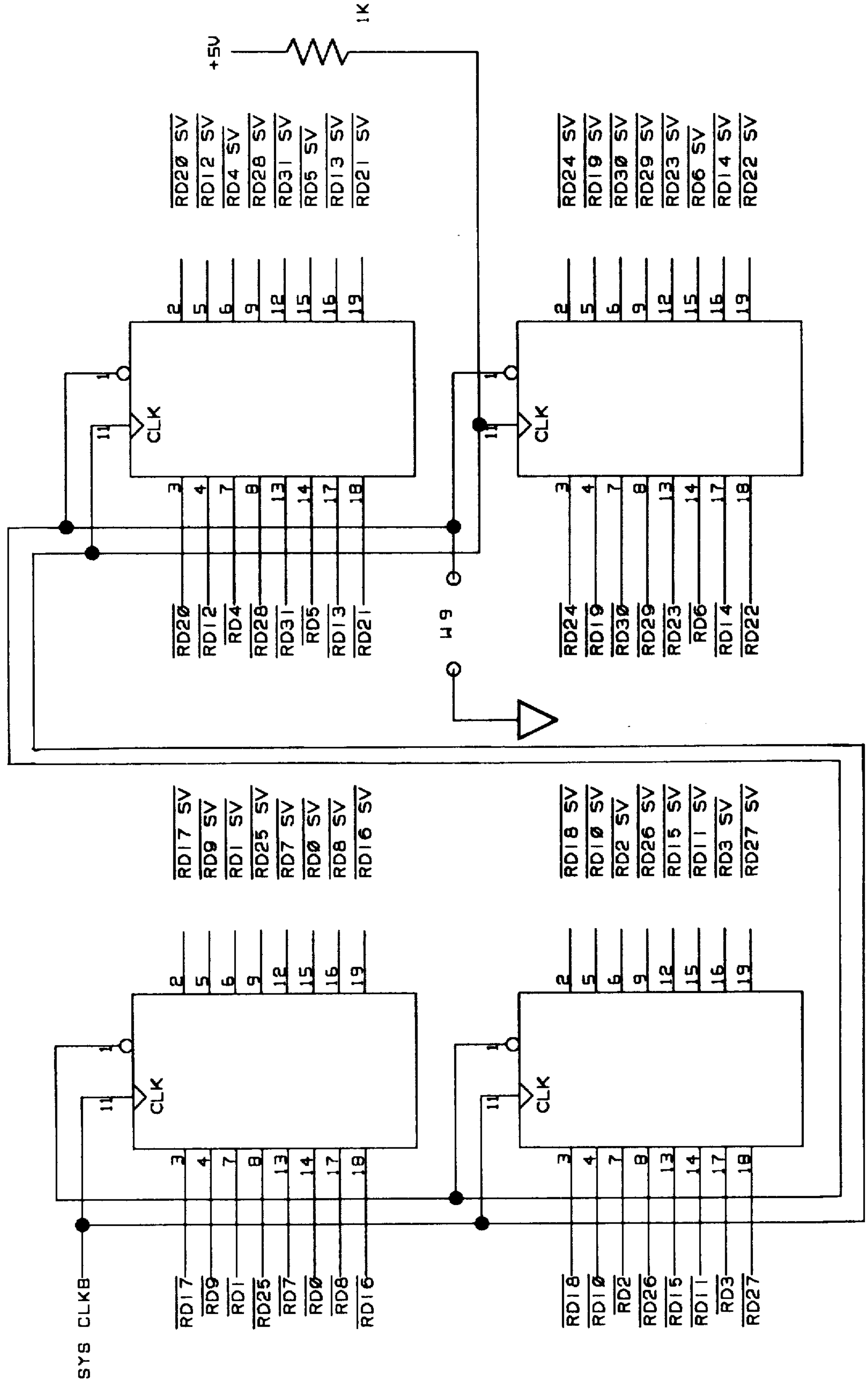
Figure 50:
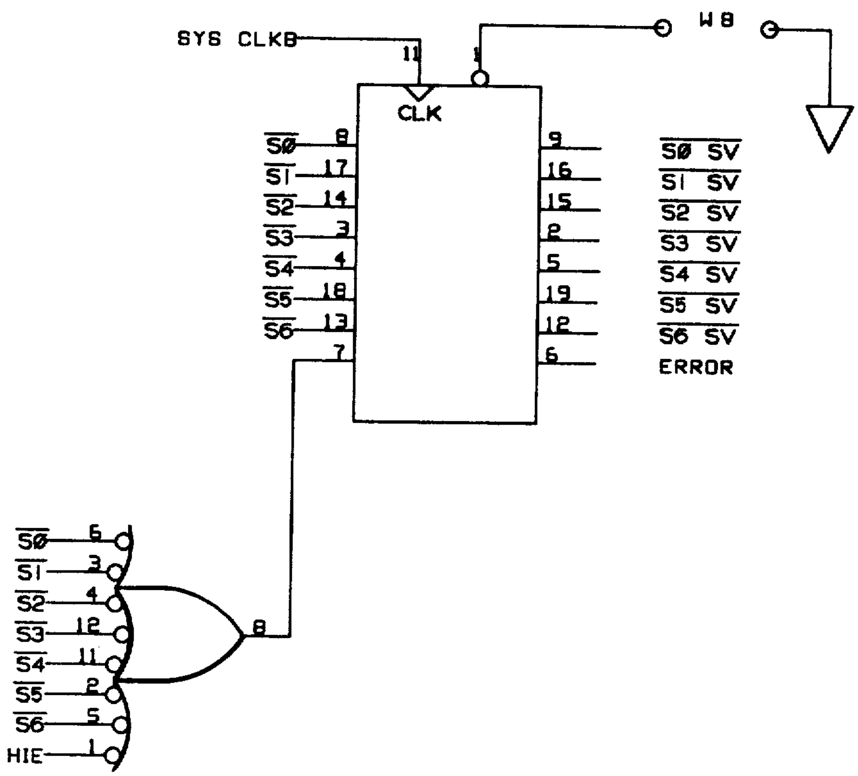
Figure 51:
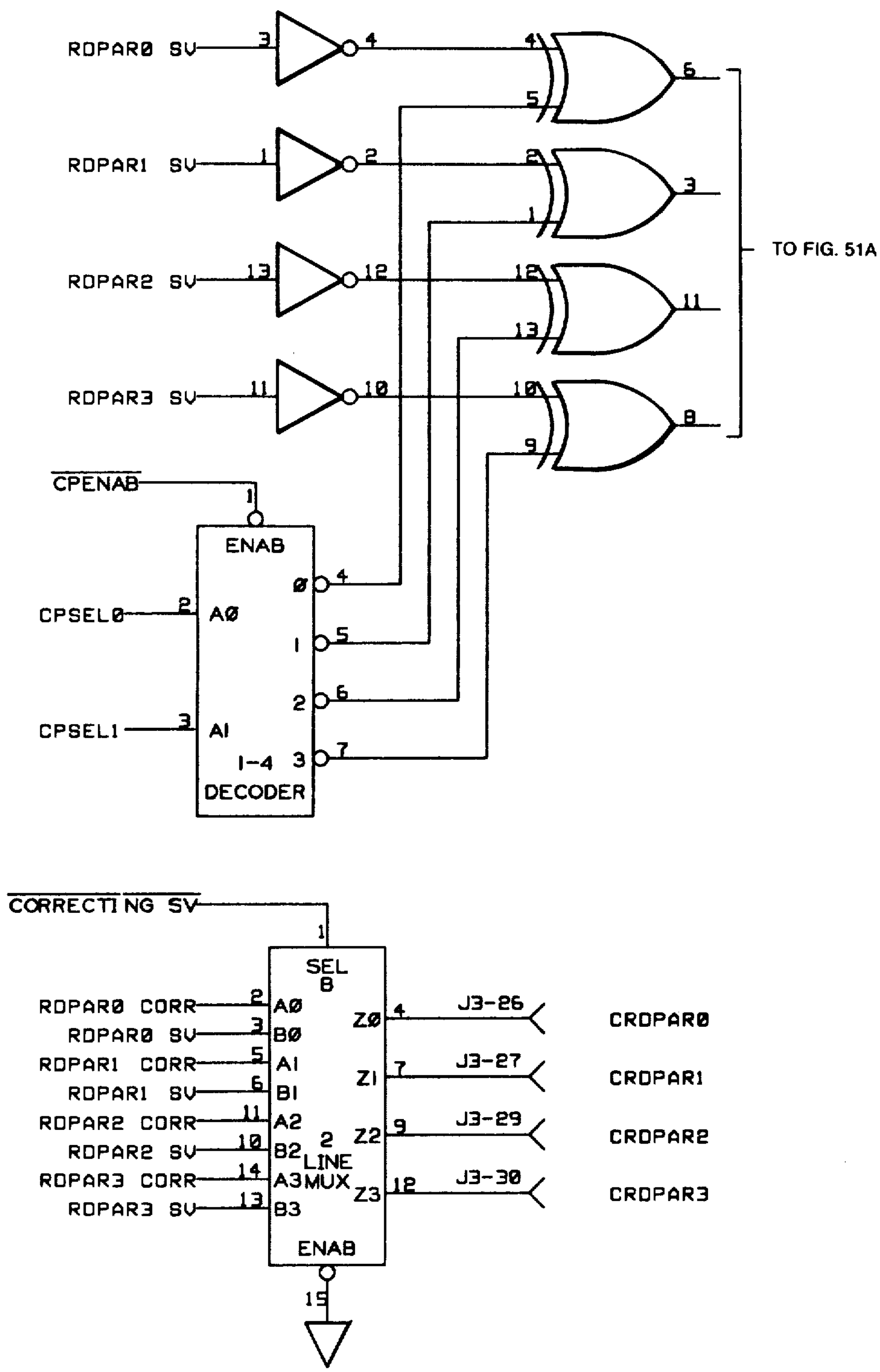
Figure 51A:
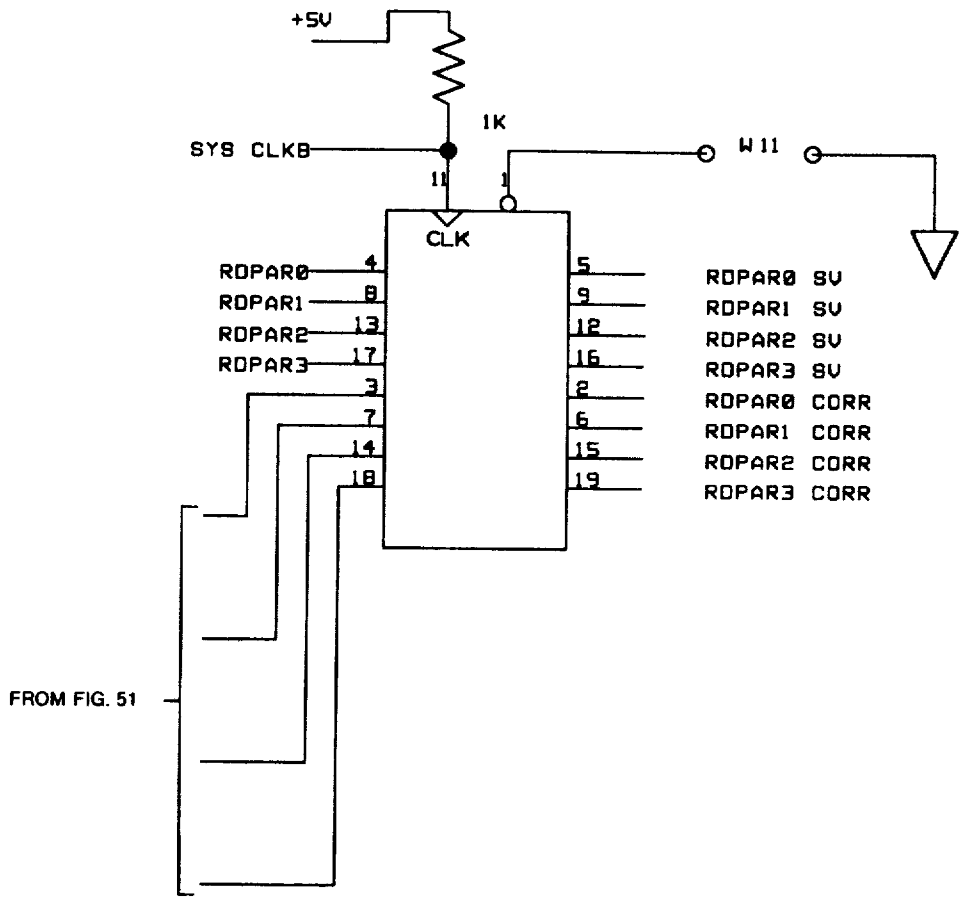
Figure 52:
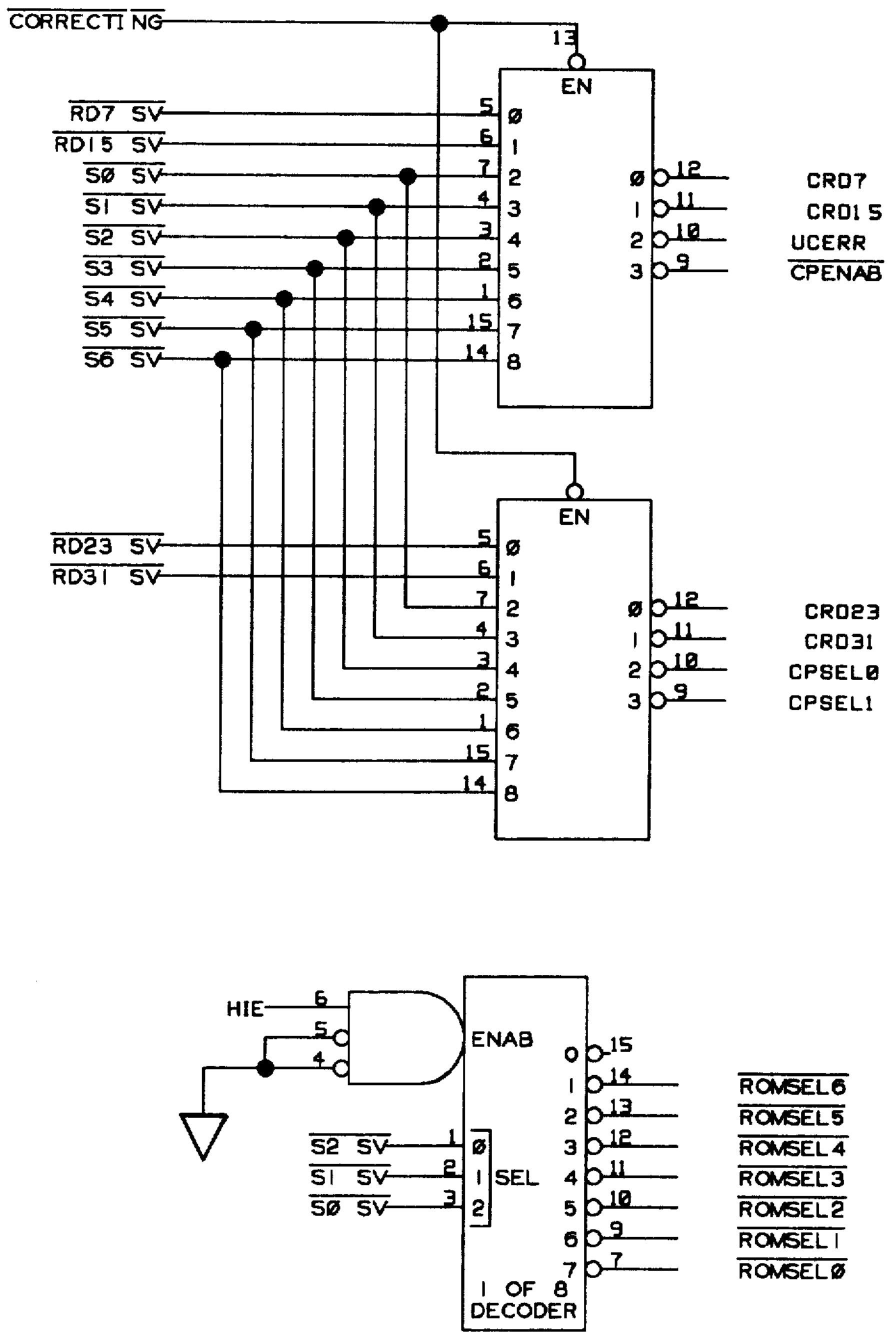
Figure 52A:
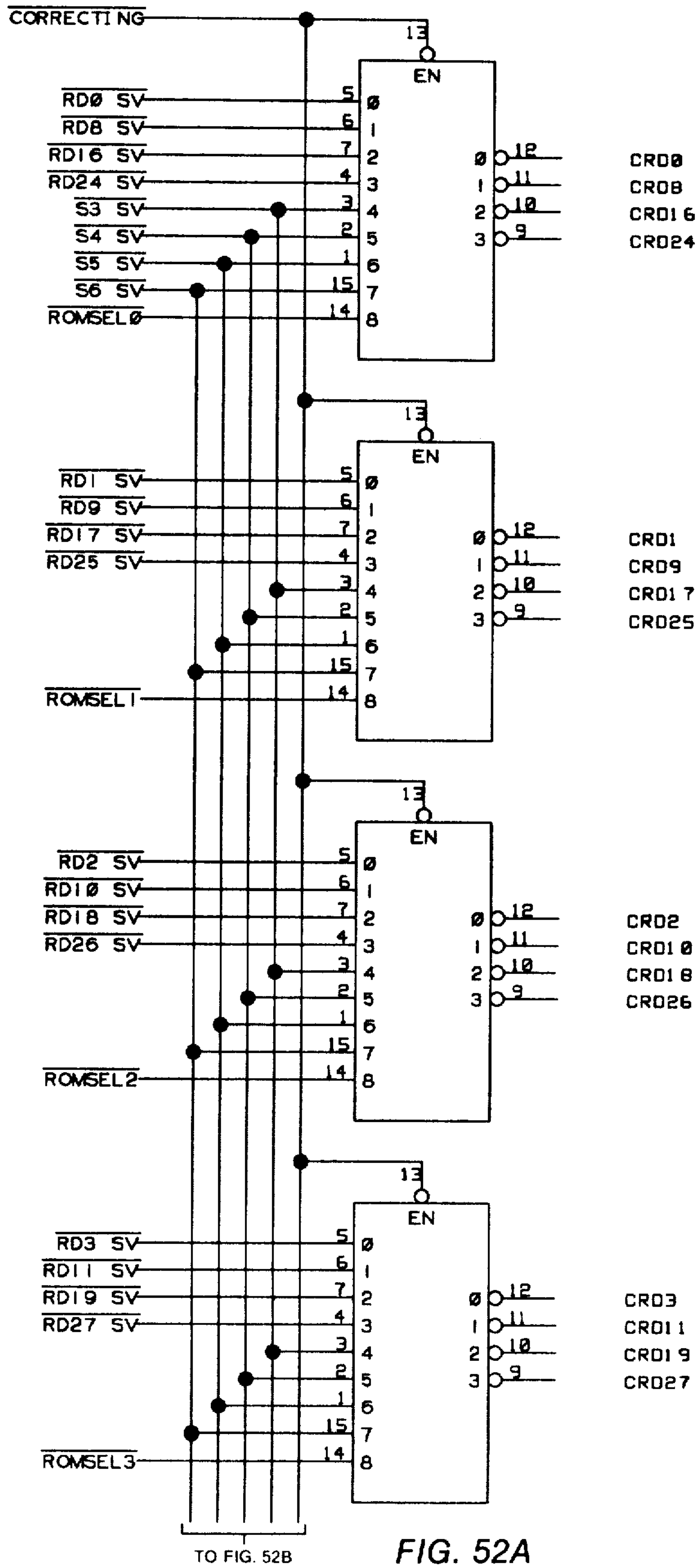
Figure 52B:
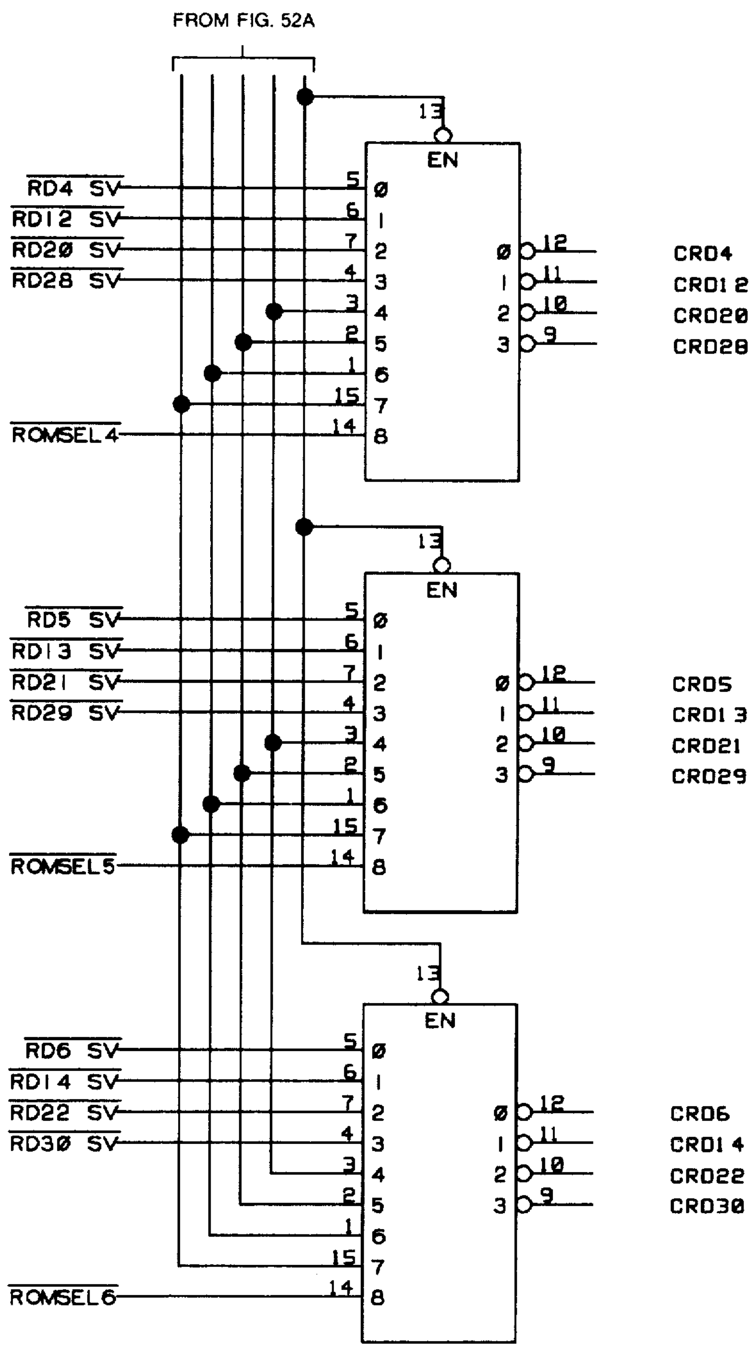
Figure 53:
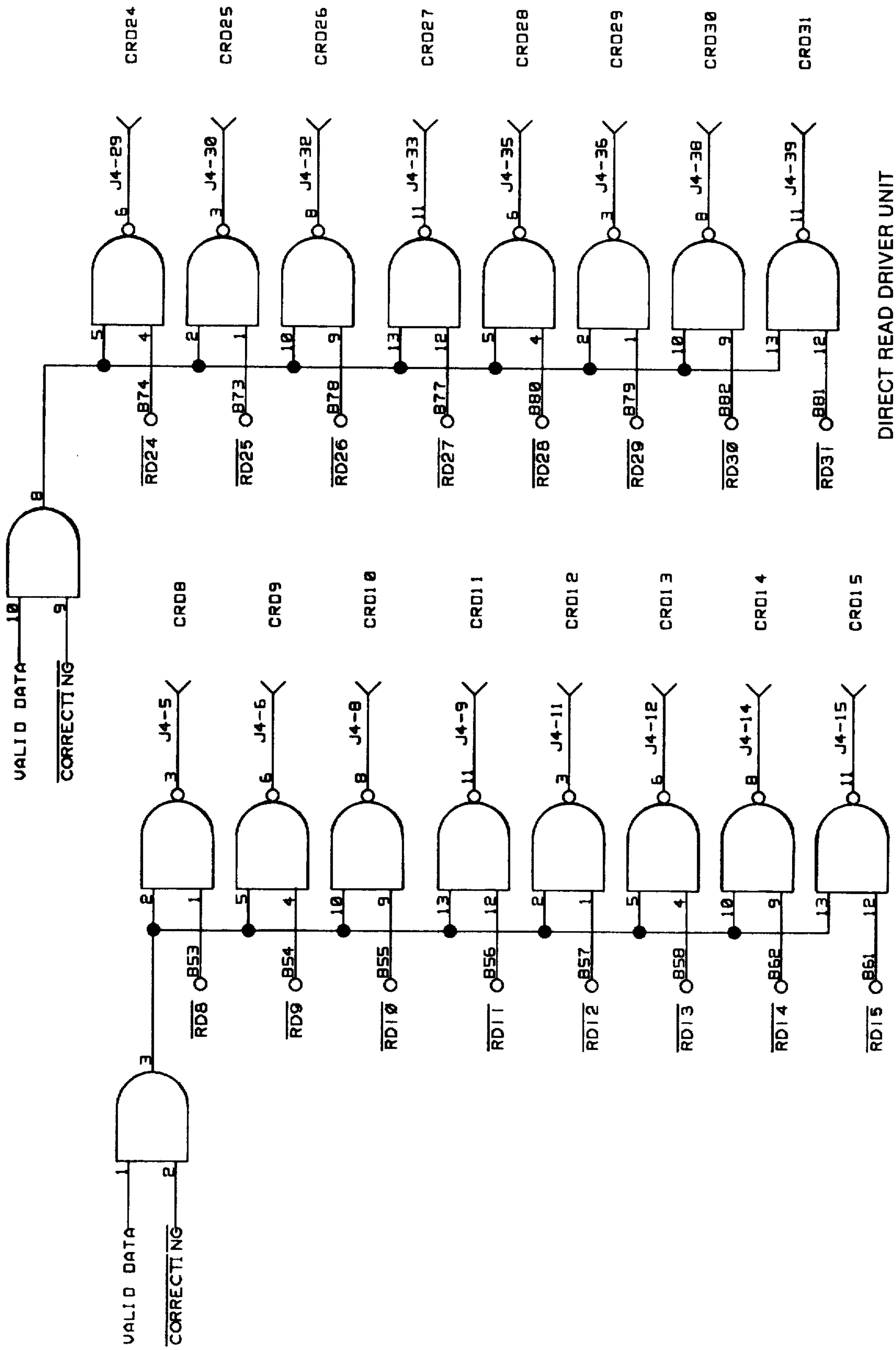
Figure 53A:
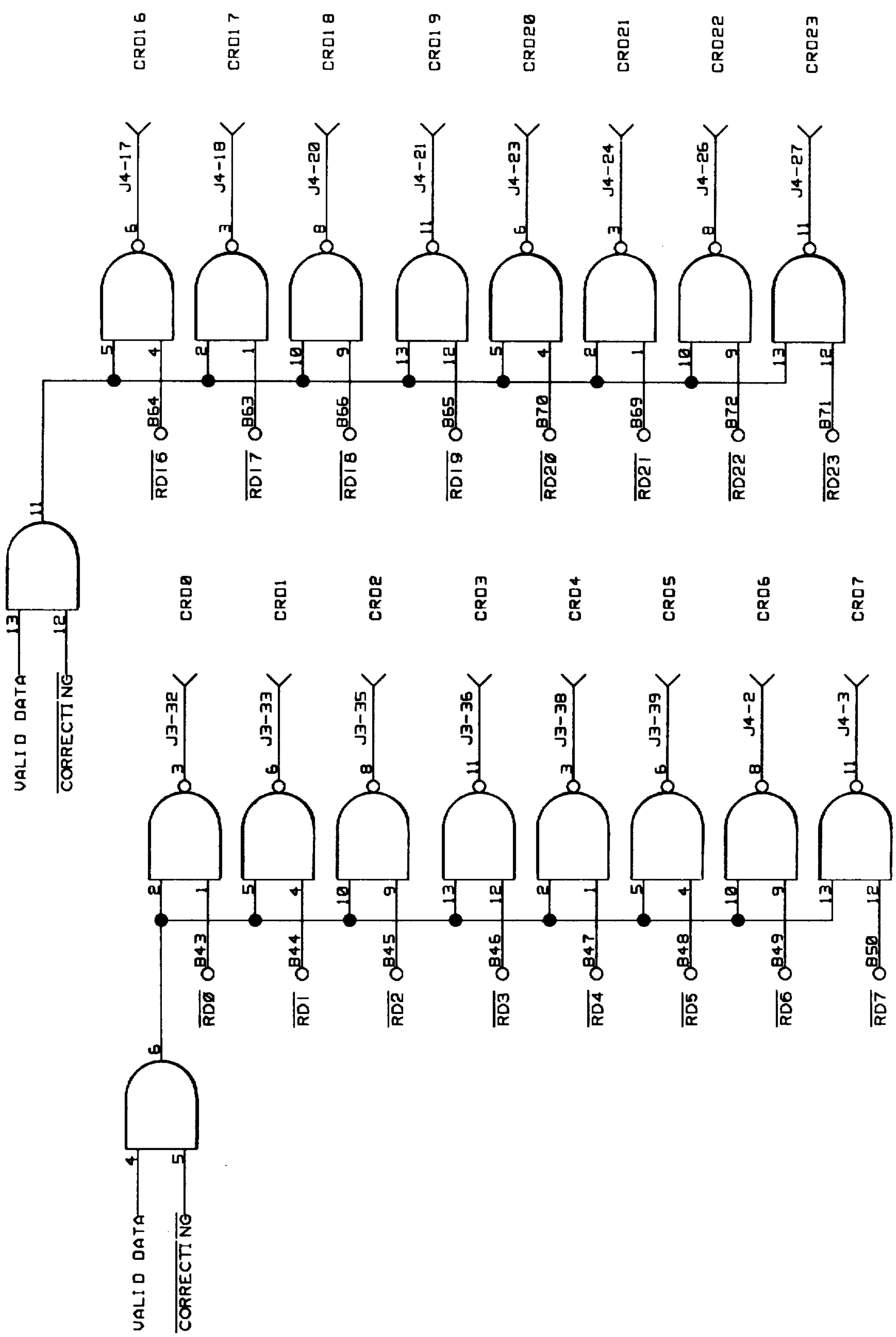

The error correction logic 70 is shown in FIGS. 44–63 and includes the multiplexer store unit shown in FIG. 44; the C-bit generator unit 45; the (32 bits) register and (8 bits) register shown in FIG. 46; the drivers for the write data bus shown in FIG. 47; the S-bit generator shown in FIG. 48. The read save register shown in FIG. 49; the S save register shown in FIG. 50; the read parity save register and parity logic shown in FIG. 51 and the correction logic shown in FIG. 52. The direct read driver unit is shown in FIG. 53.

Figure 54:
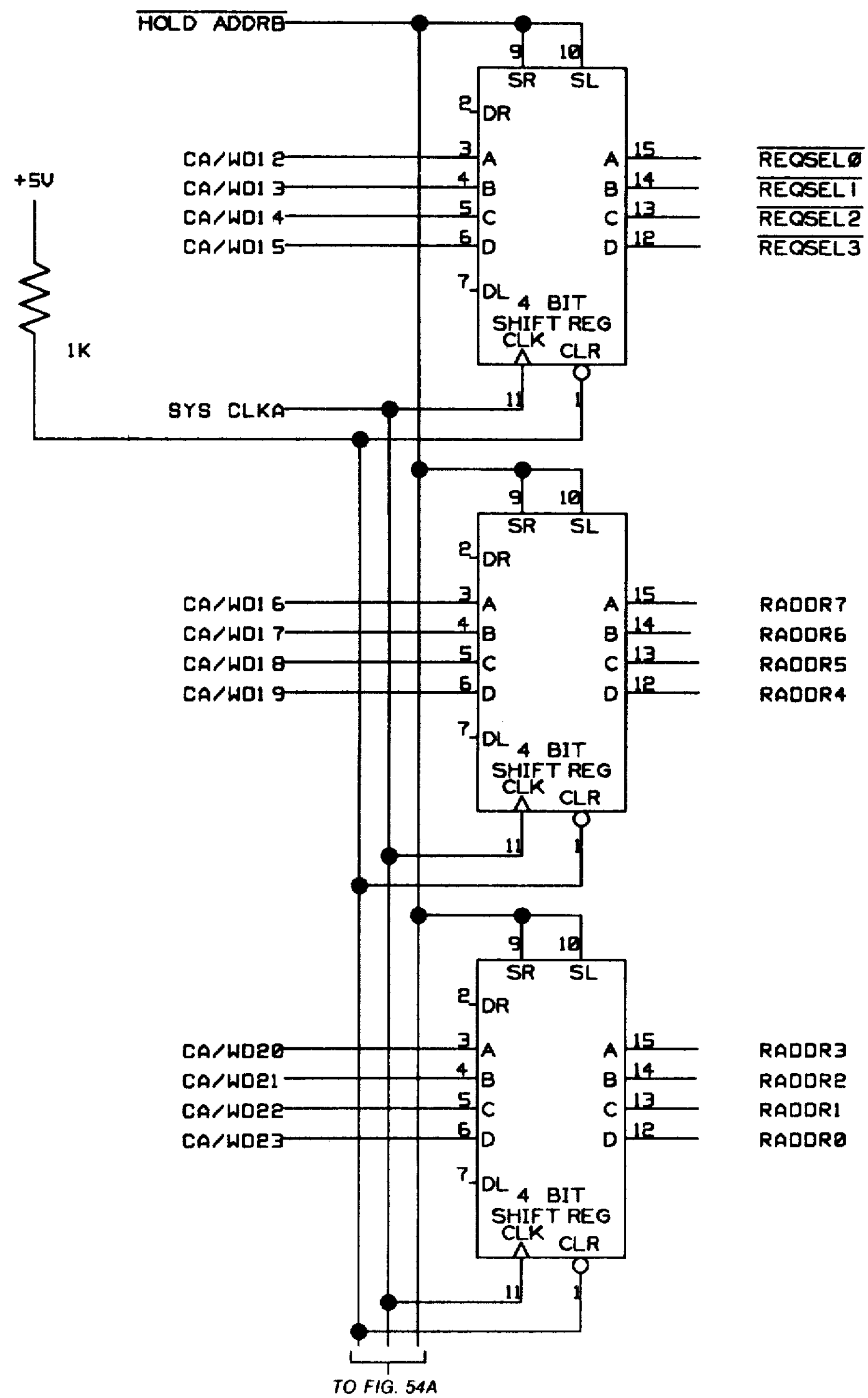
Figure 54A:
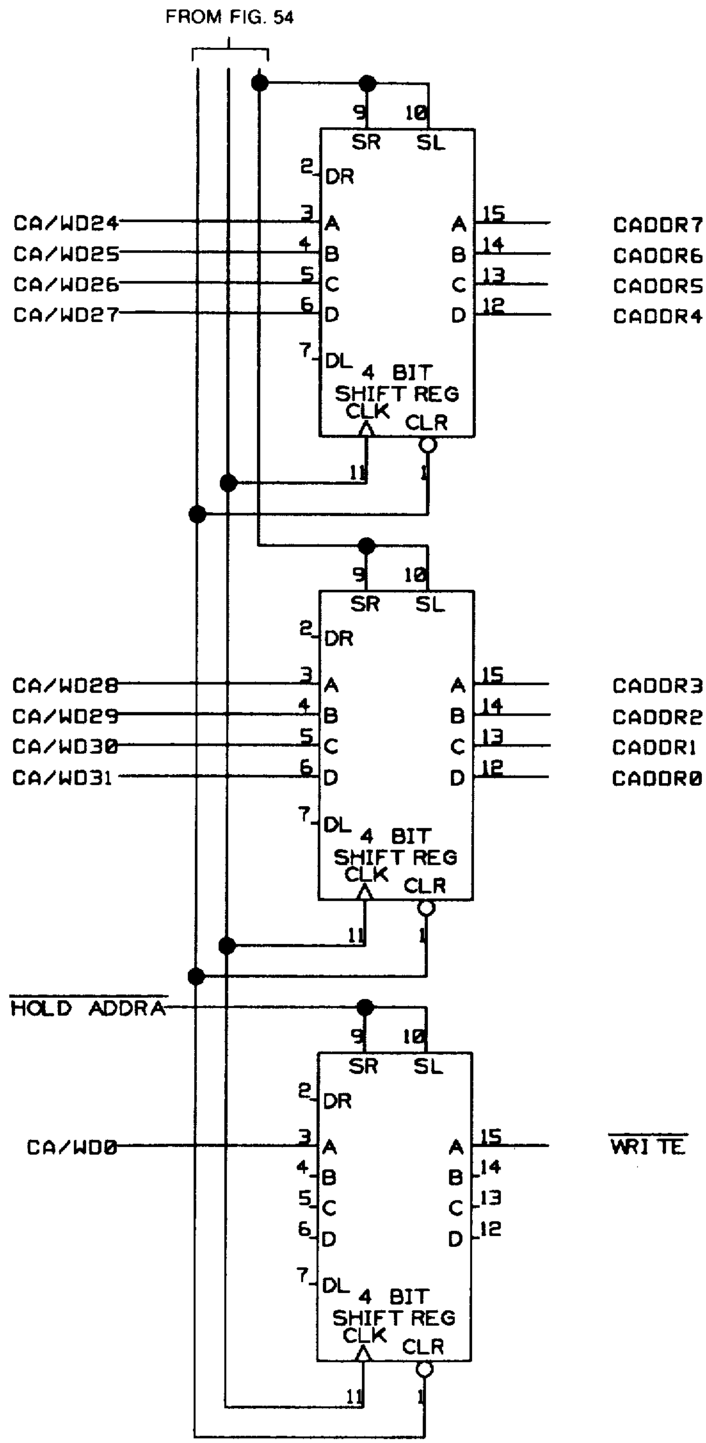
Figure 55:
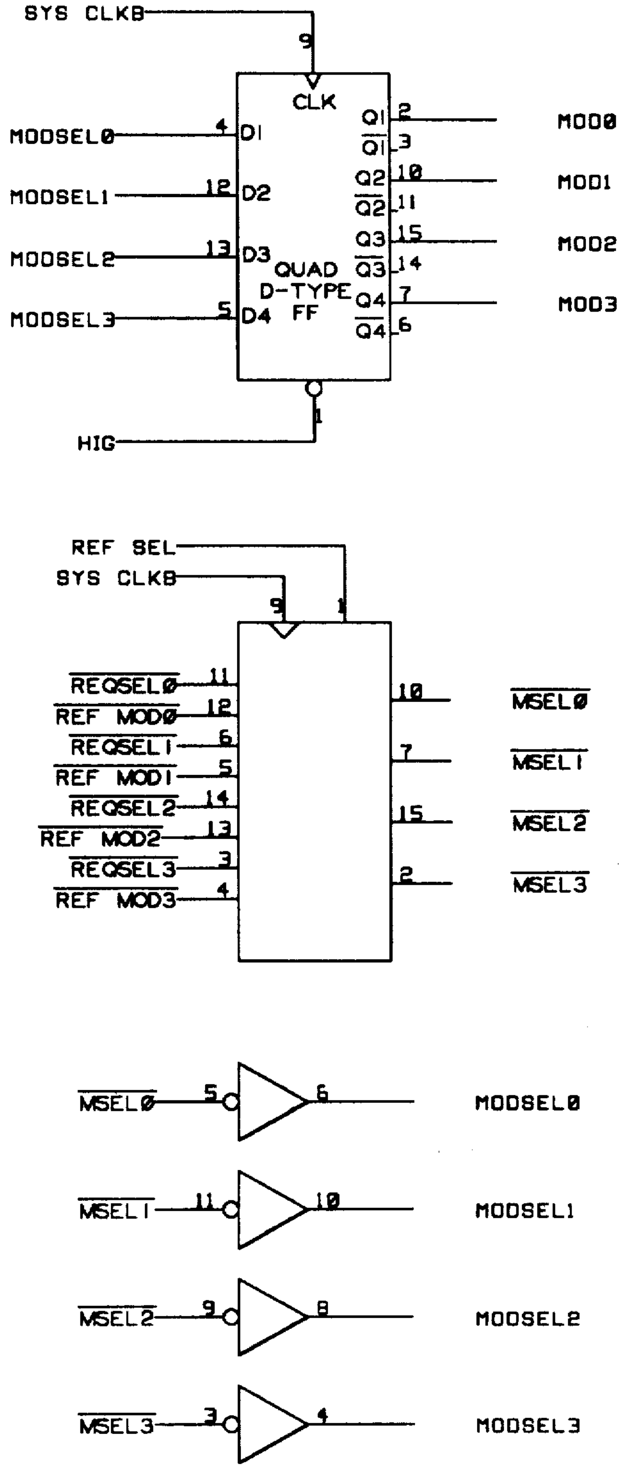
Figure 56:
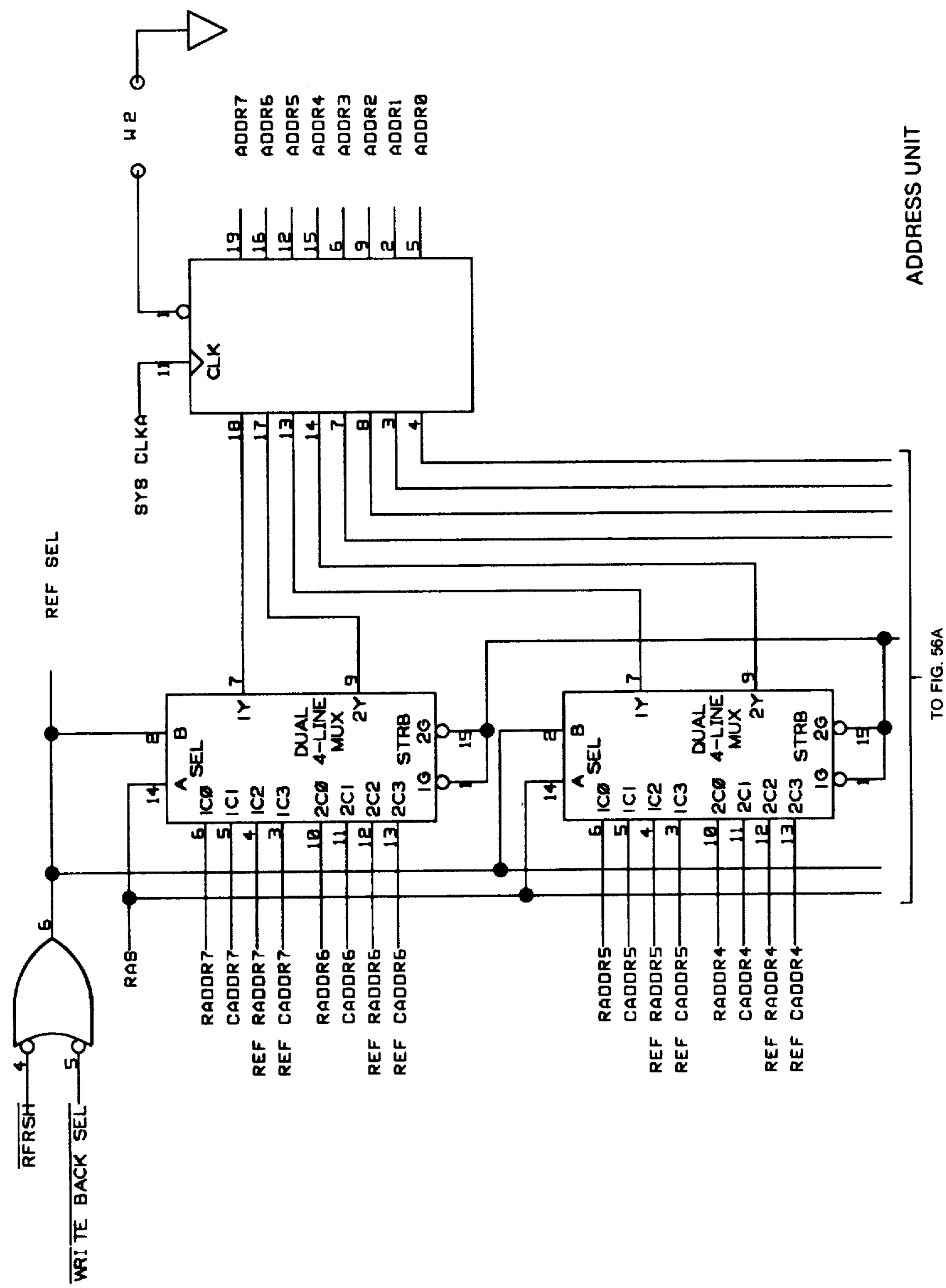
Figure 56A:
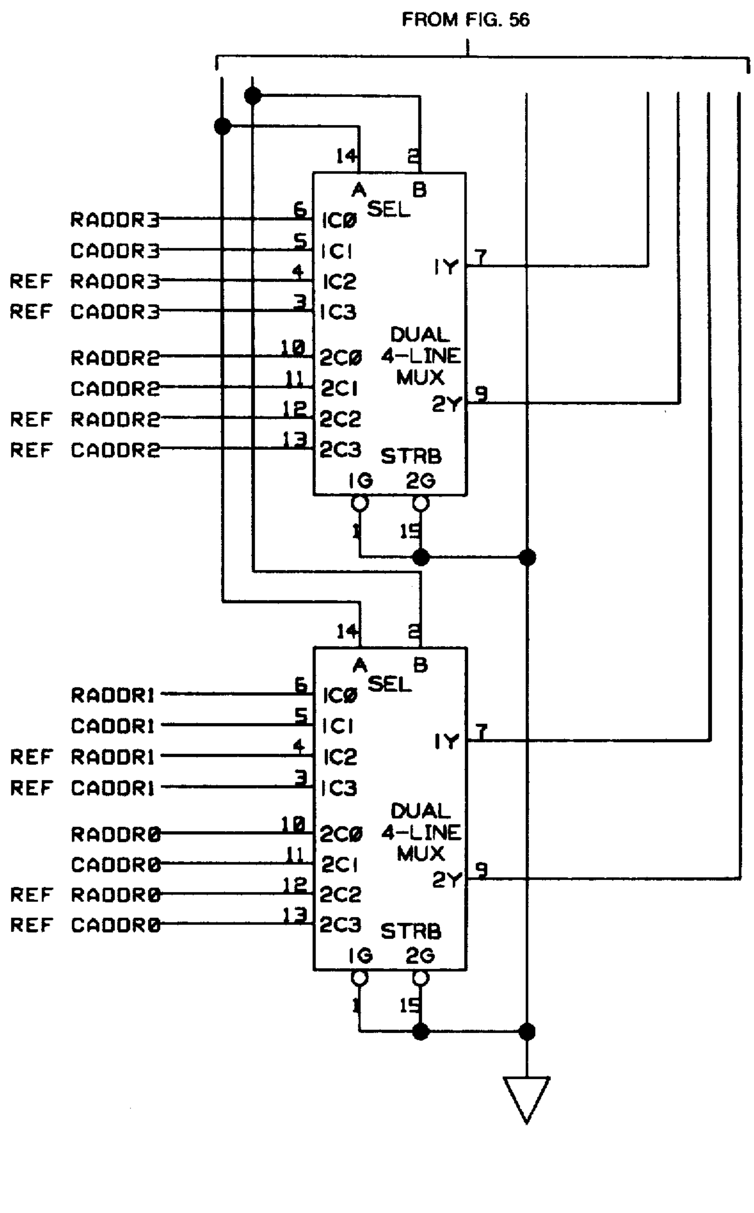

With reference to the control units at the lower part of FIG. 3, the R/W module selection unit and the RADDR and CADDR units are shown in FIG. 54; the MODSEL unit and drivers therefor are shown in FIG. 55; and the ADDRESS unit and driver therefor are shown in FIG. 56.

Figure 57:
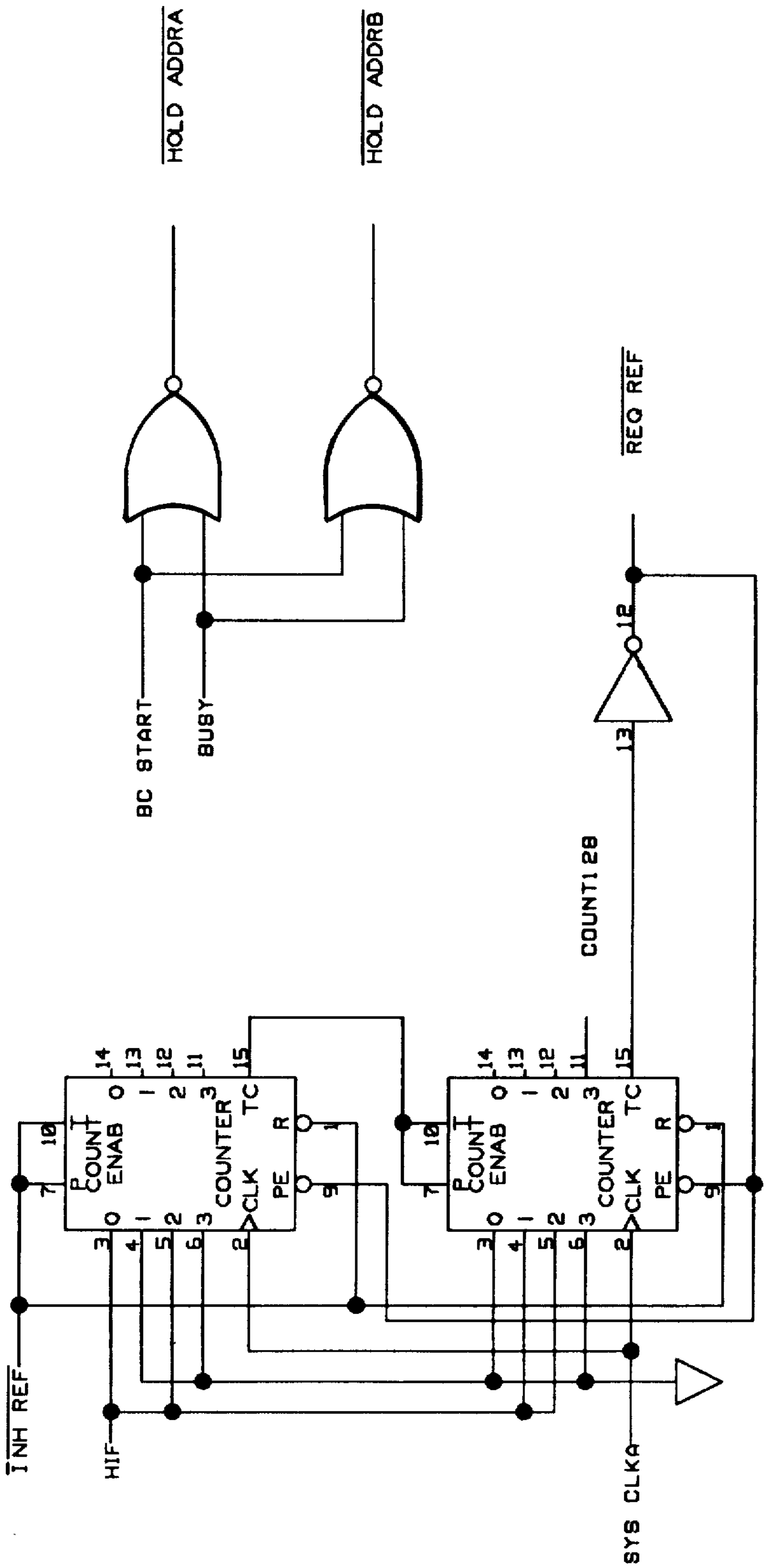
Figure 57A:
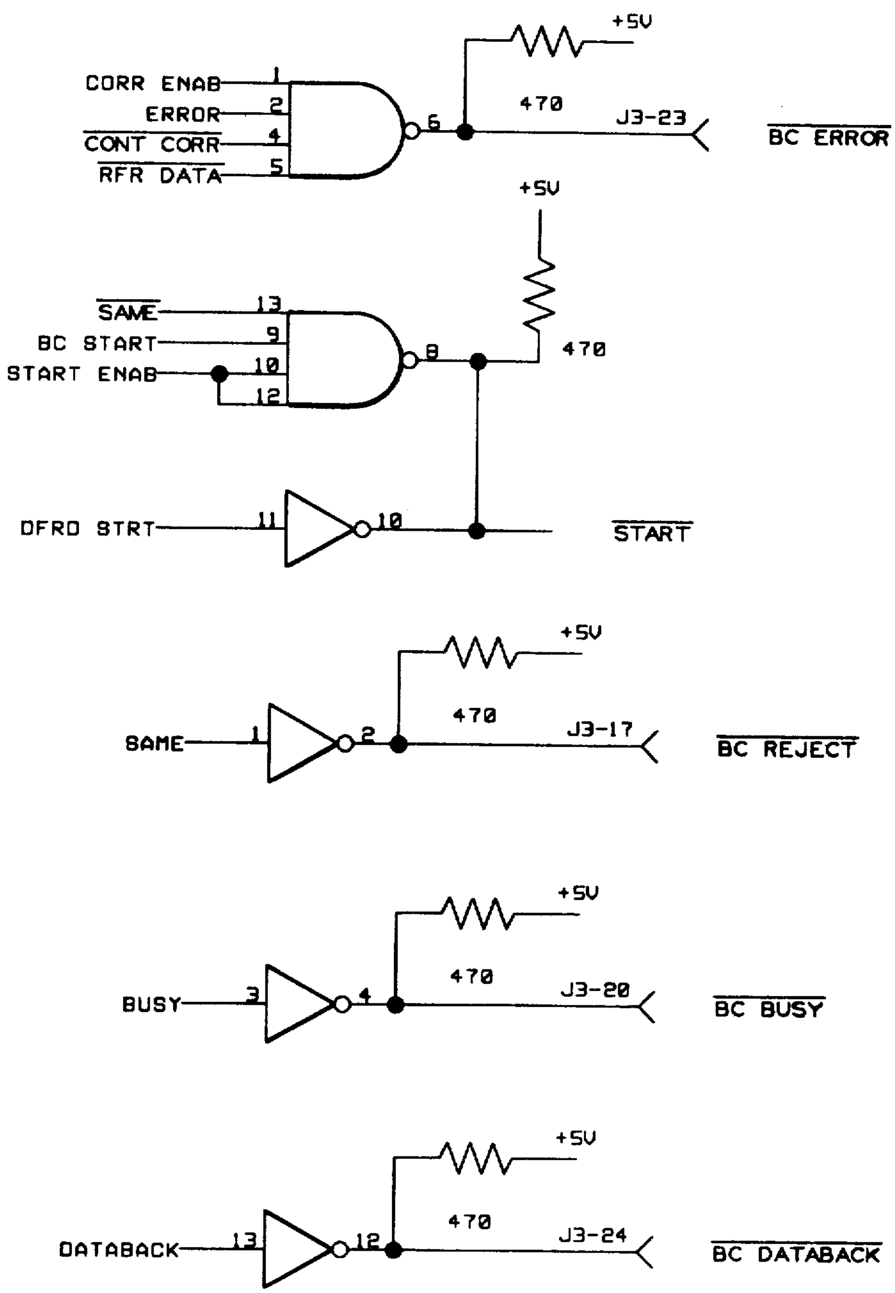
Figure 57B:
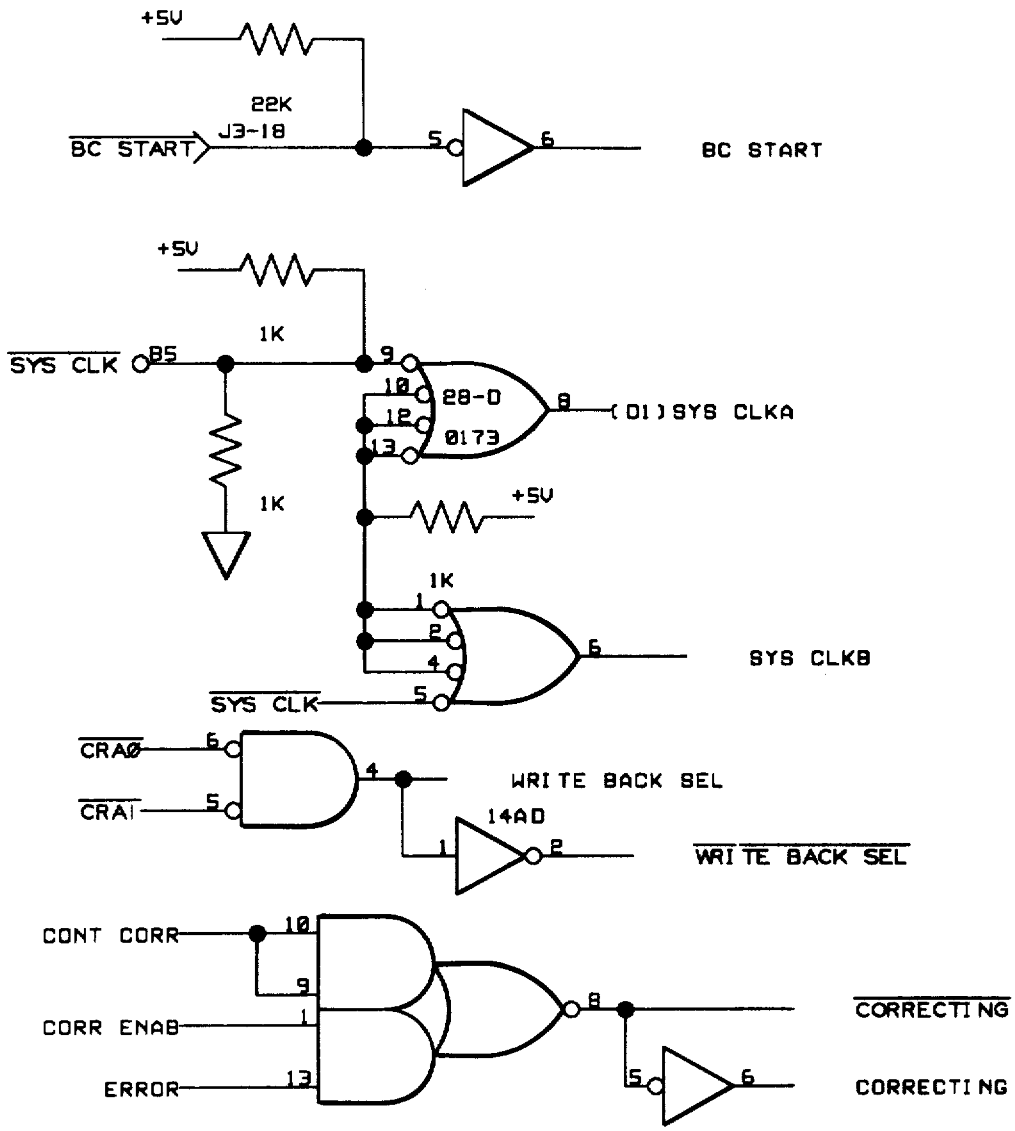
Figure 58:
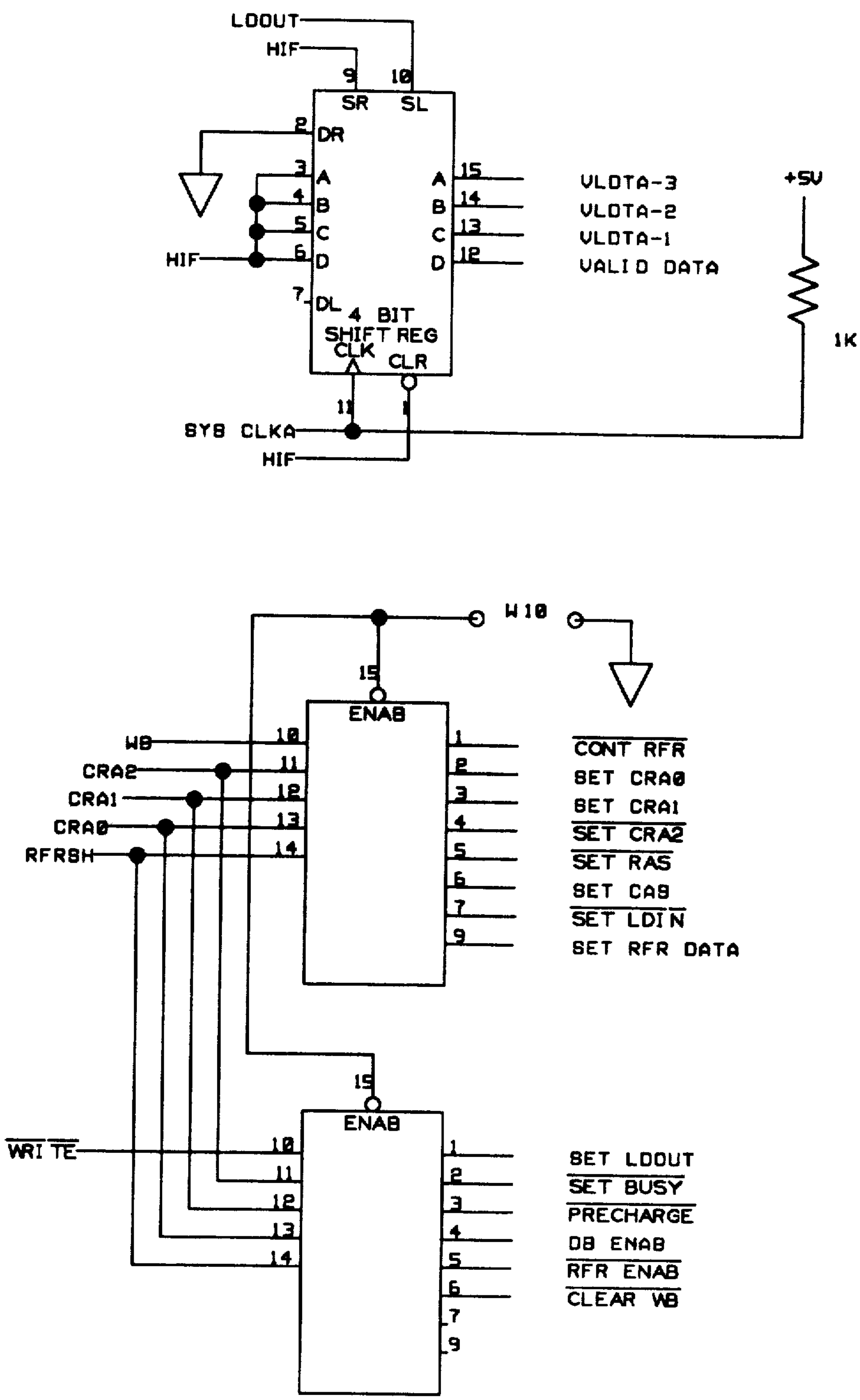
Figure 58A:
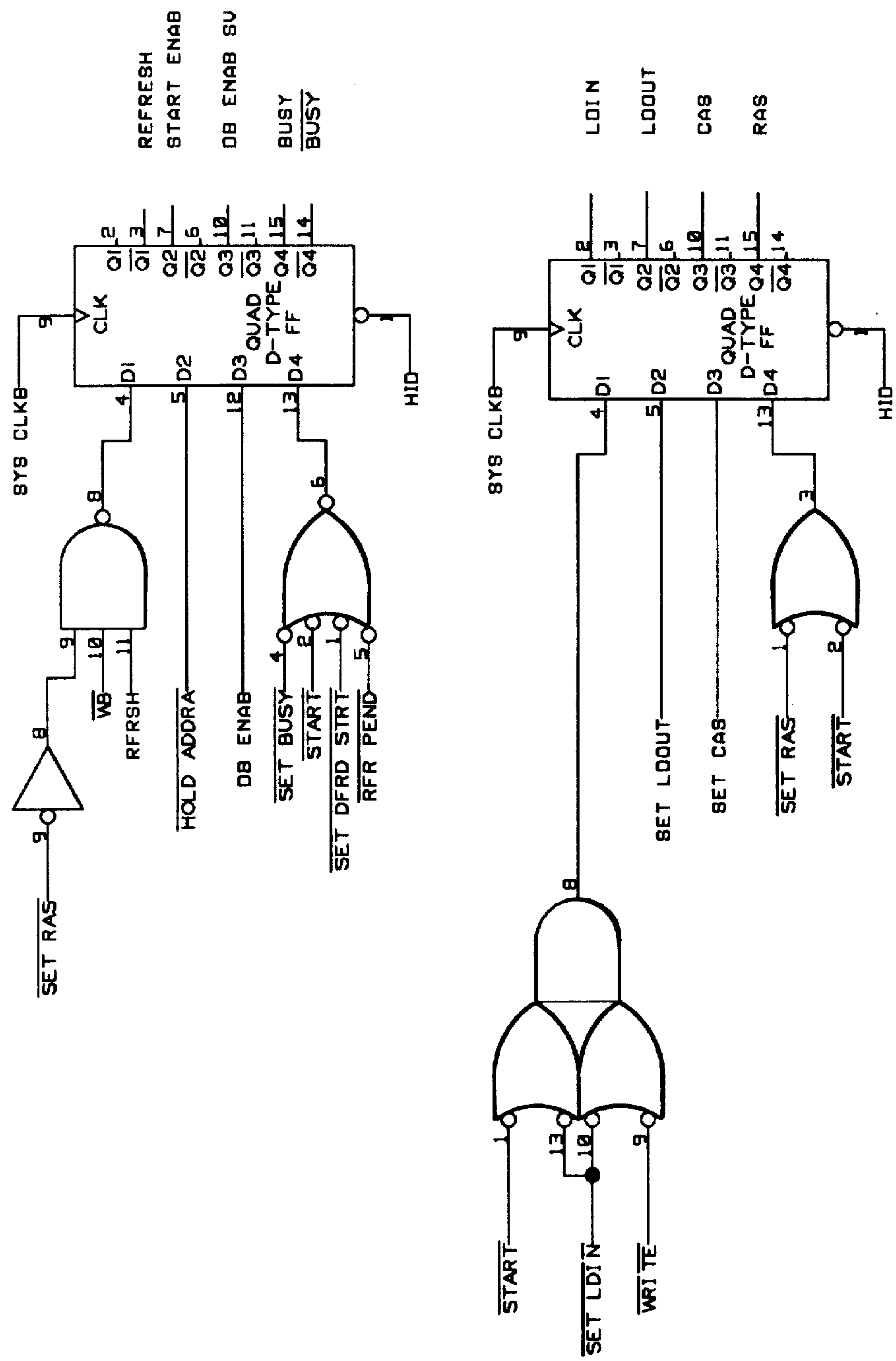
Figure 58B:
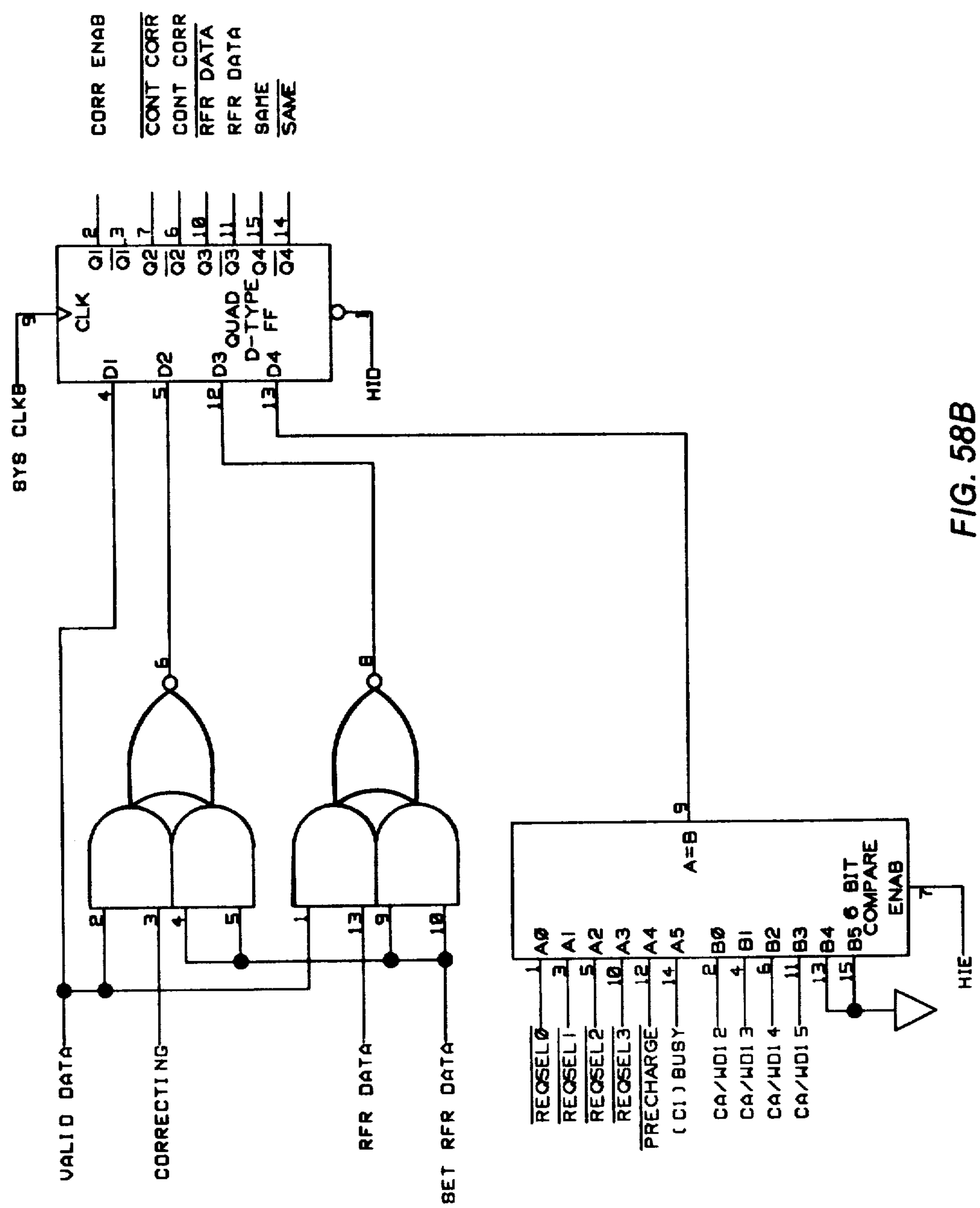
Figure 58C:
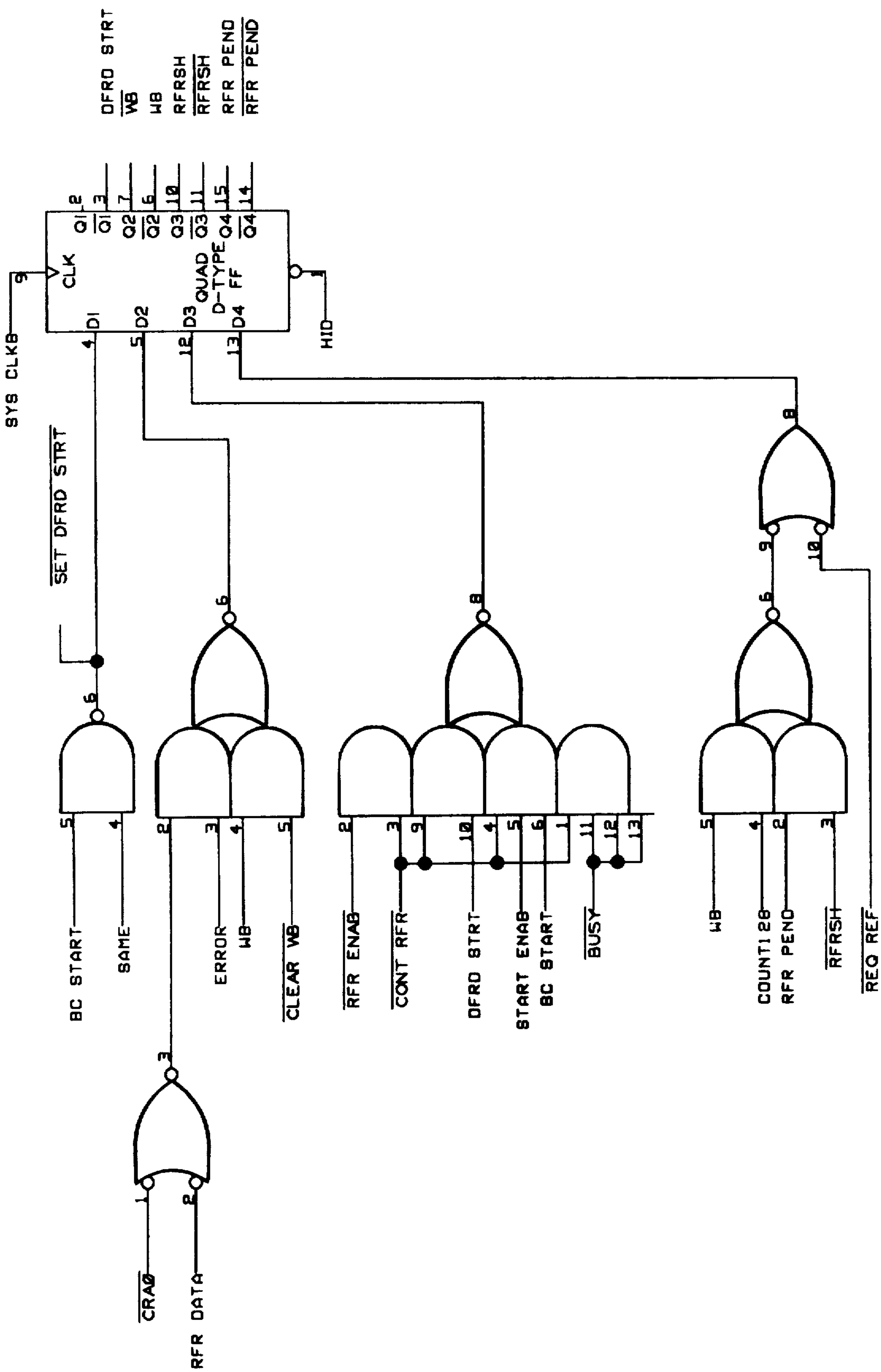
Figure 58D:
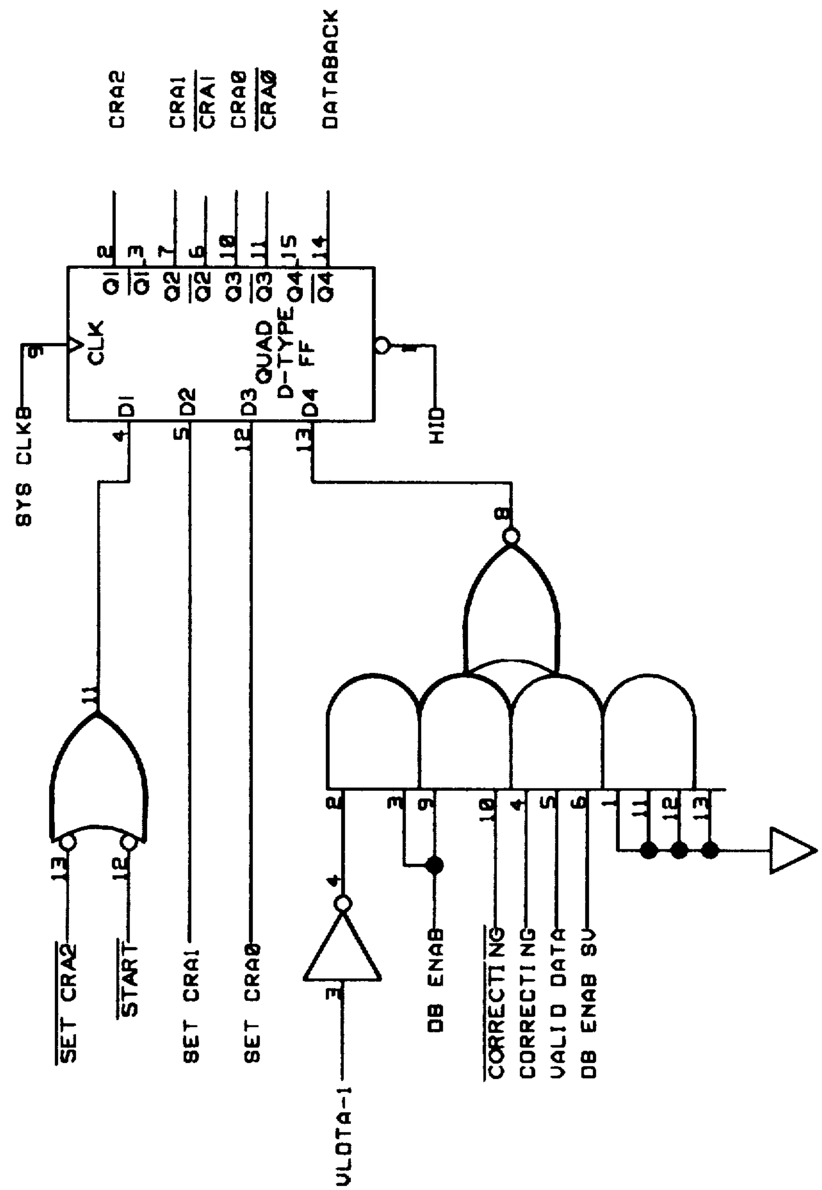
Figure 58E:
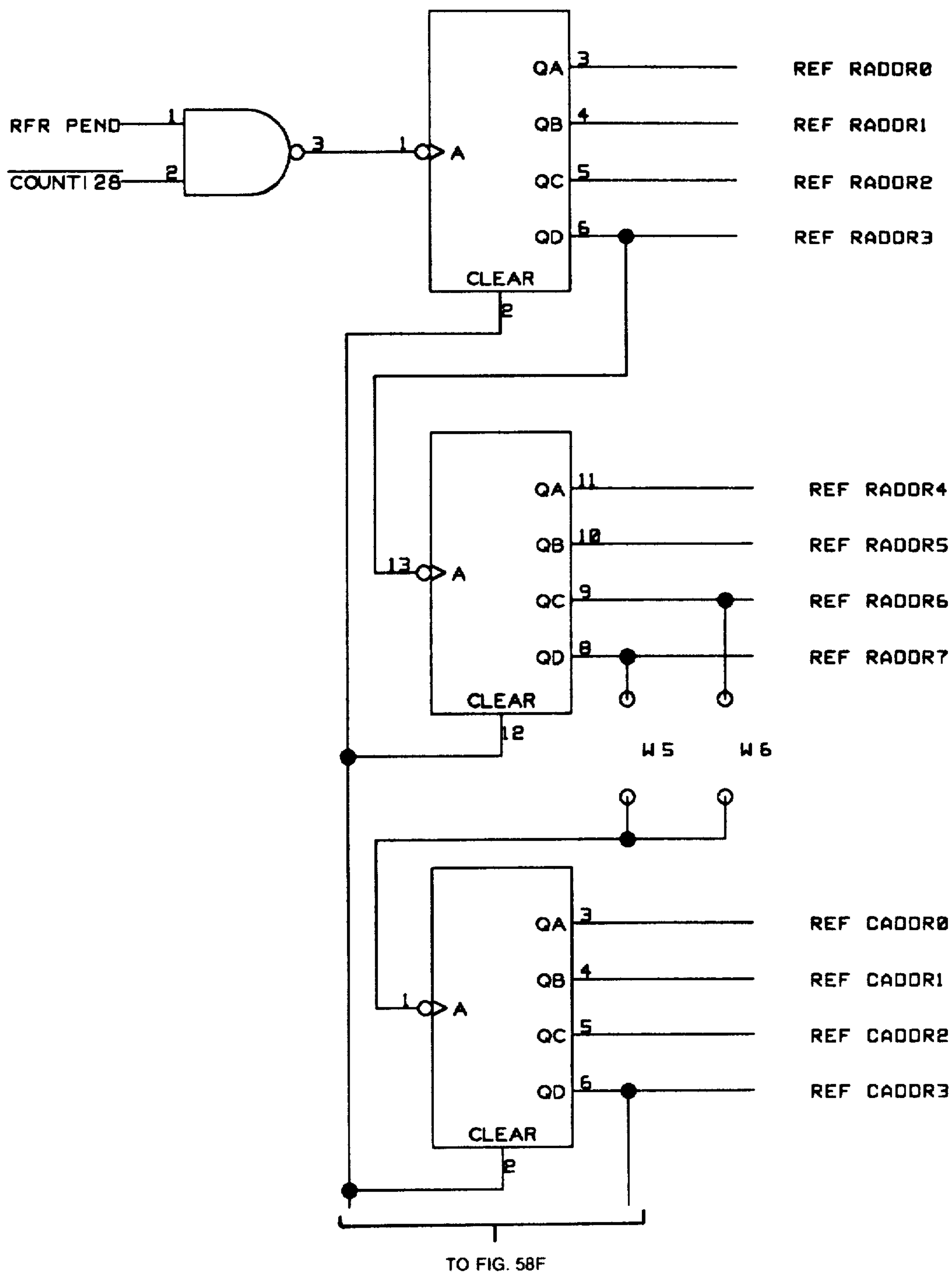
Figure 58F:
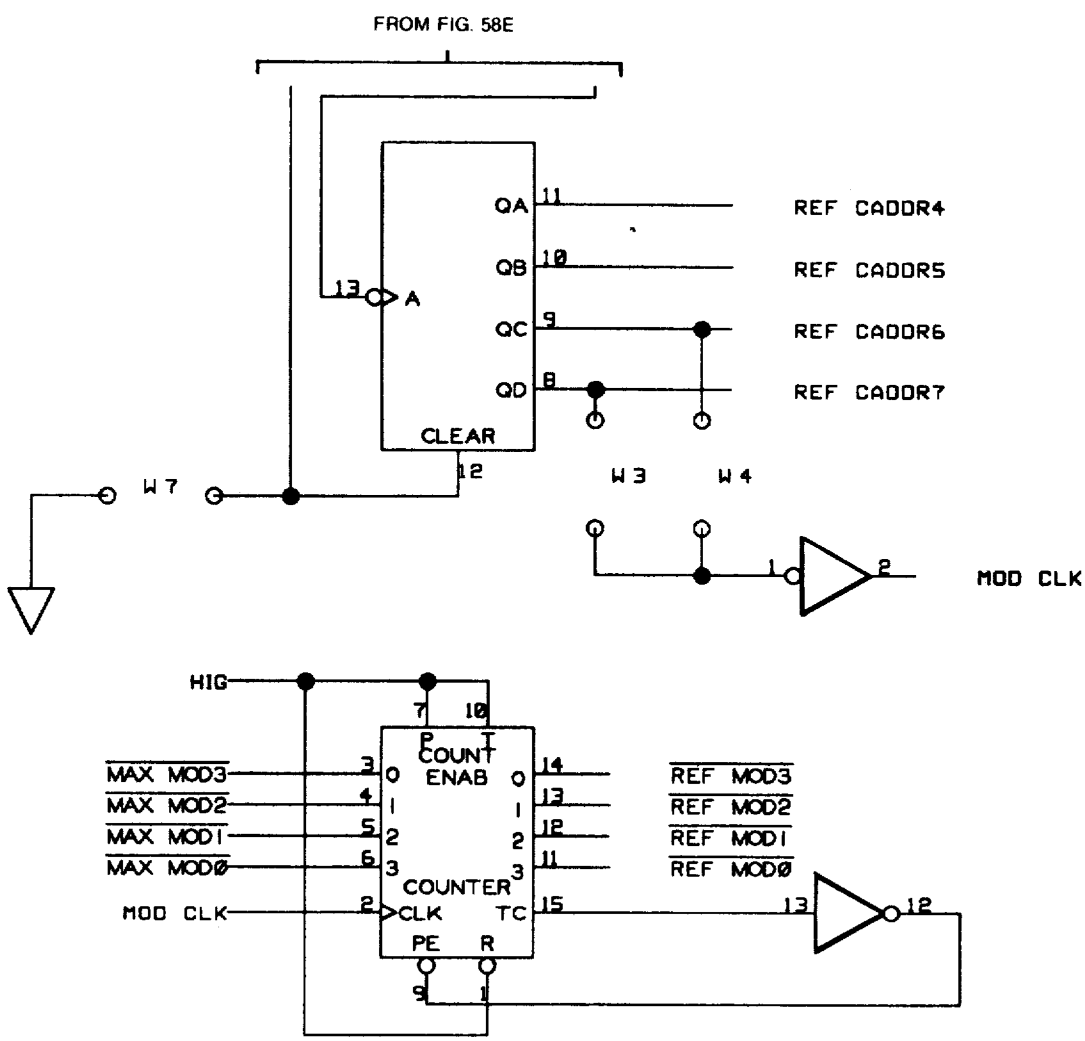
Figure 59:
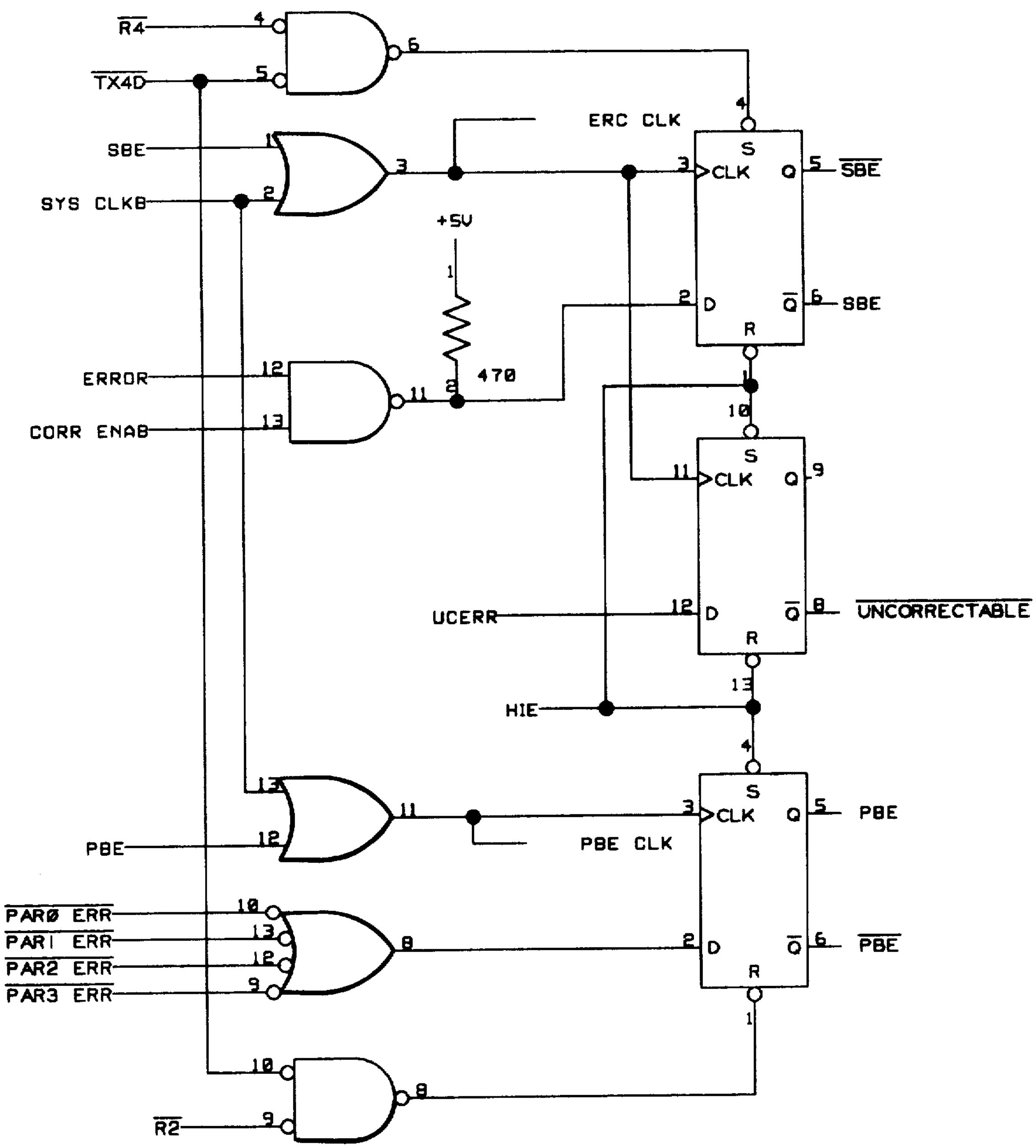
Figure 59A:
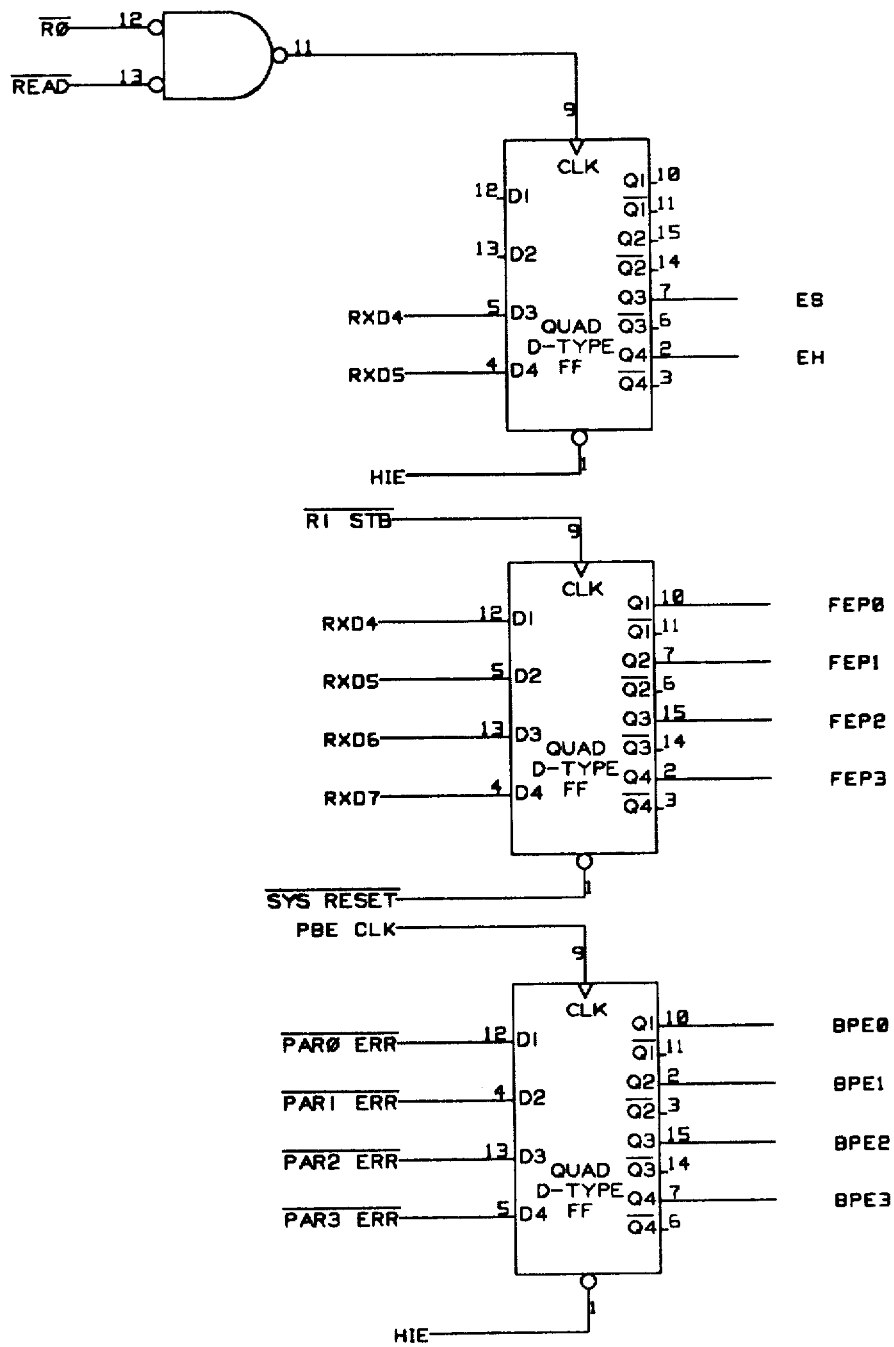
Figure 60:
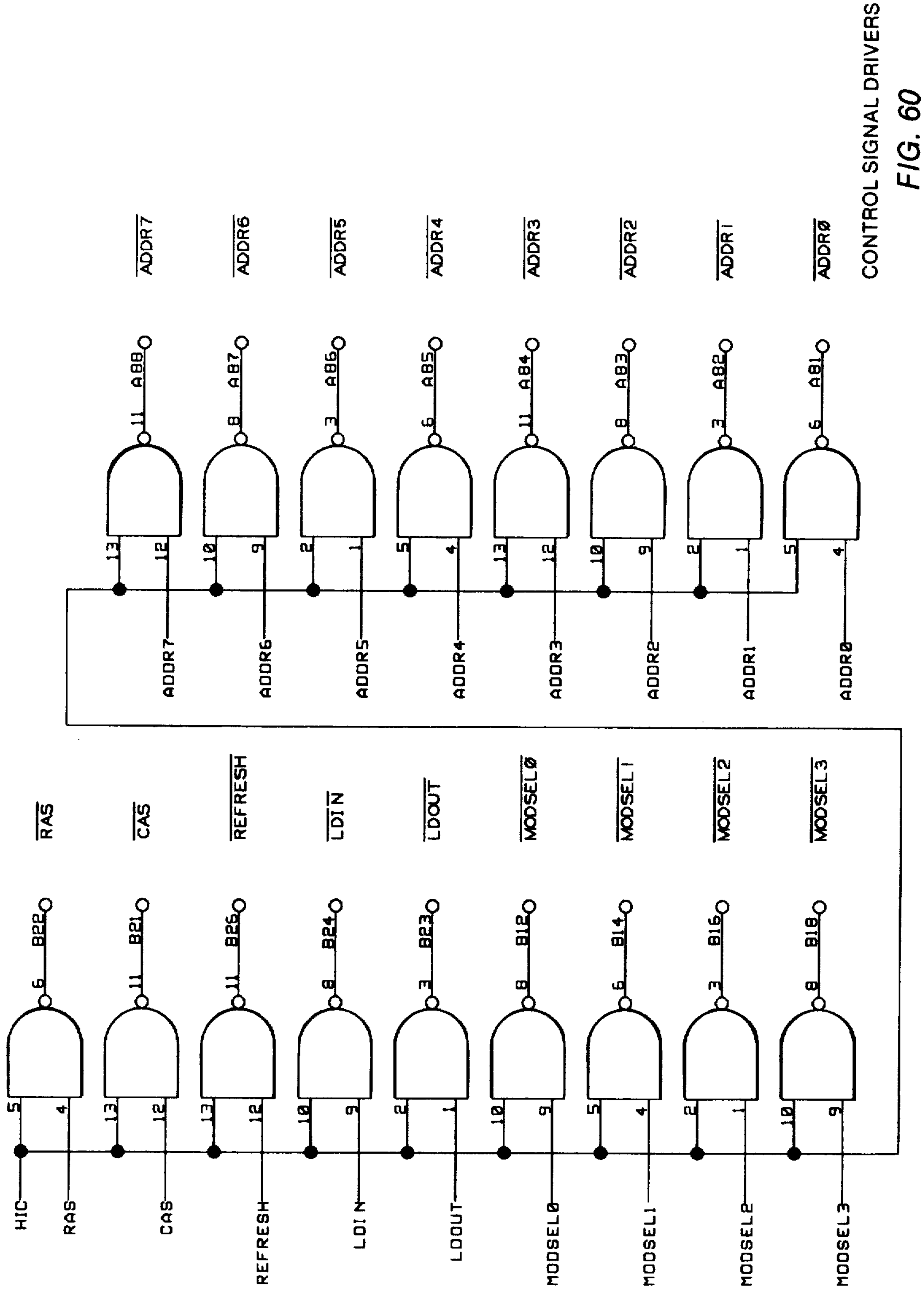
Figure 61:
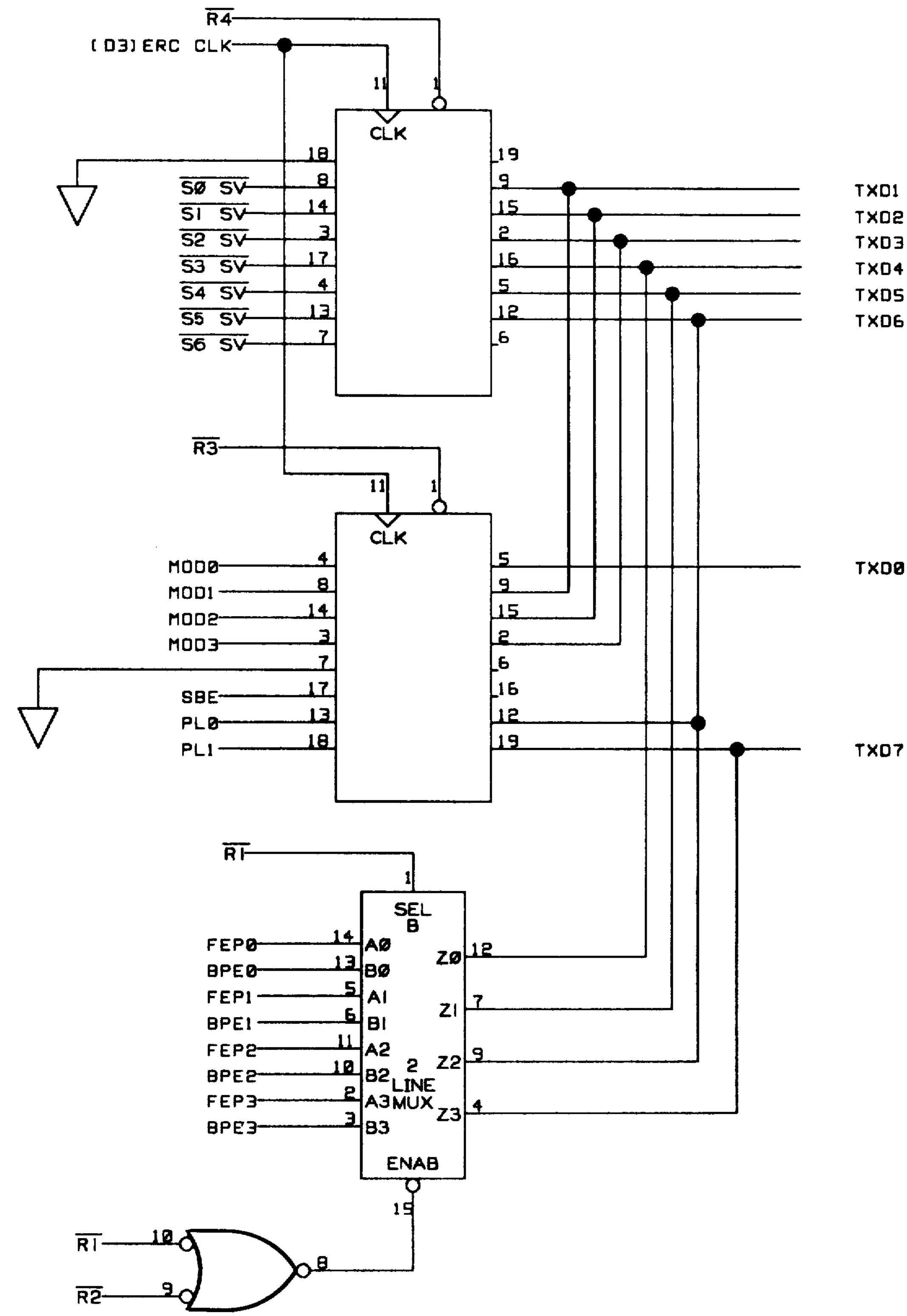
Figure 61A:
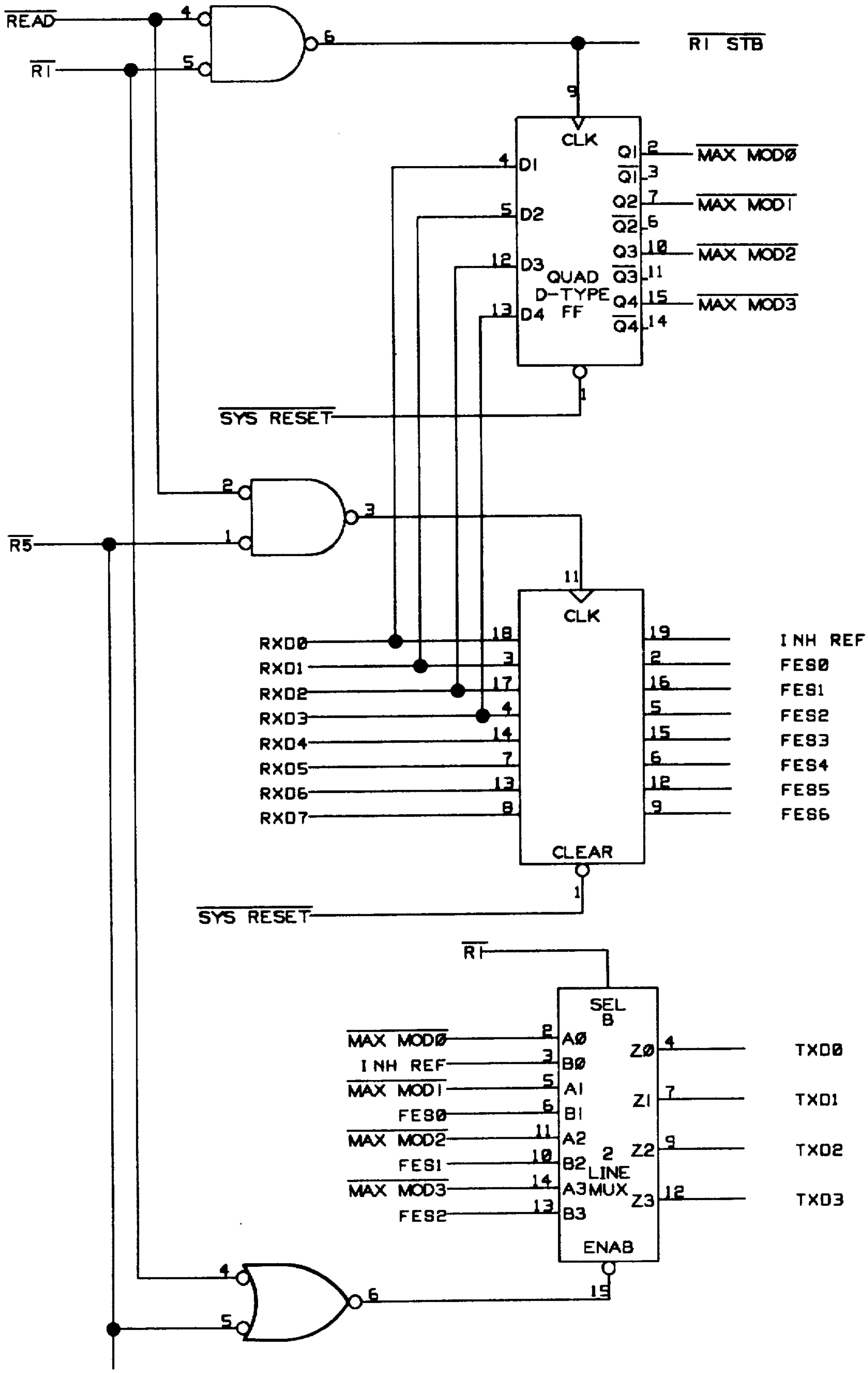
Figure 61B:
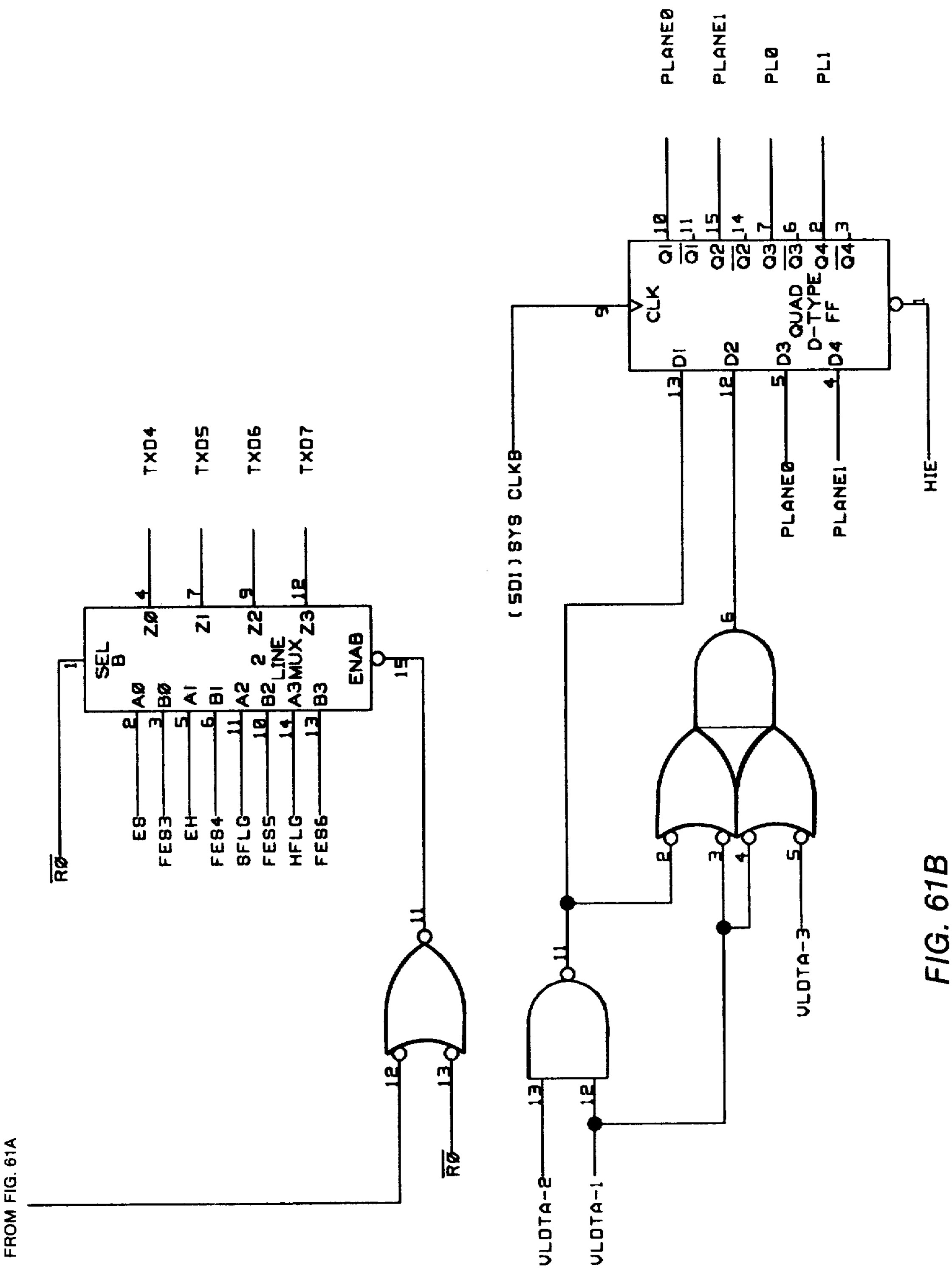
Figure 62:
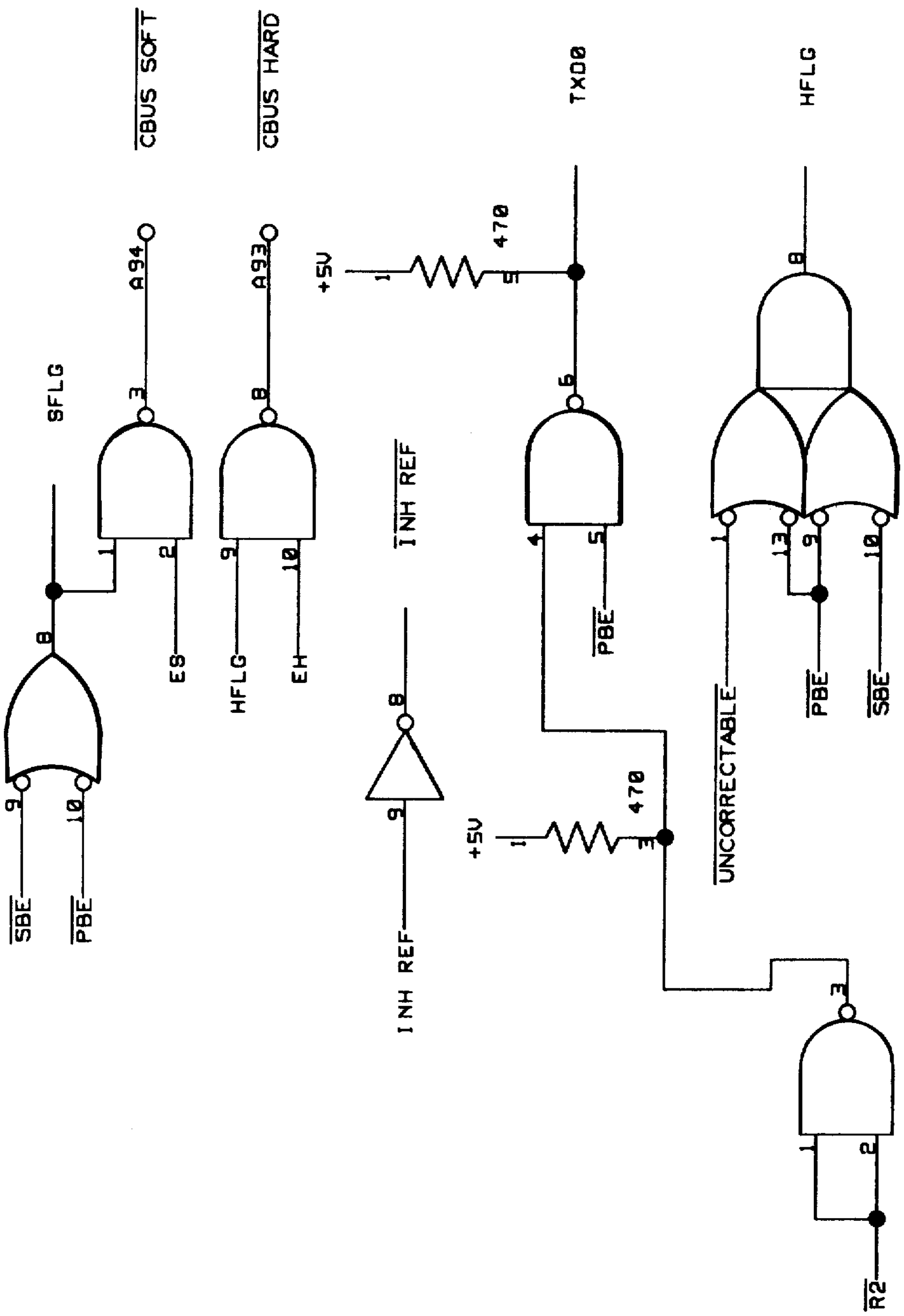
Figure 63:
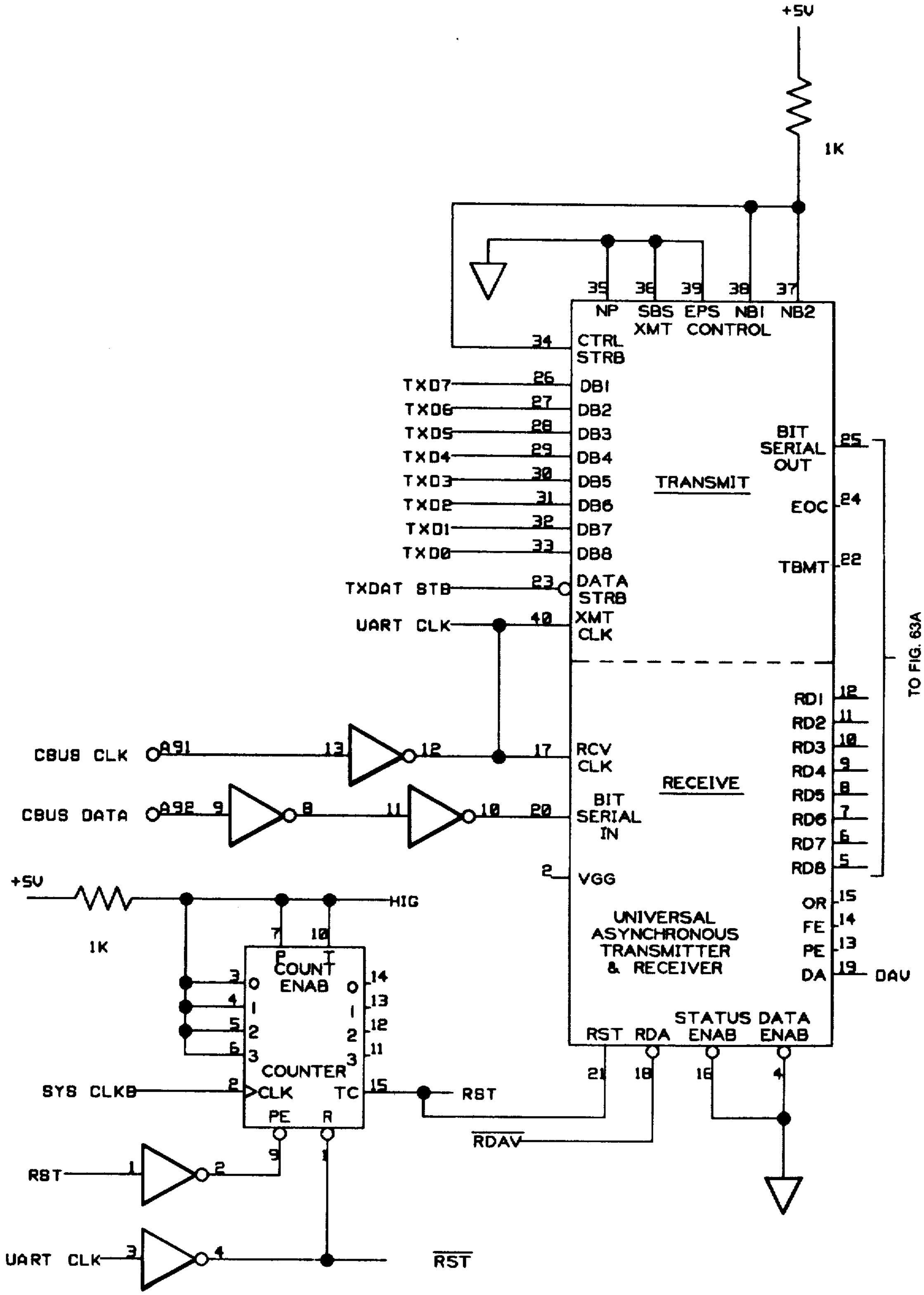
Figure 63A:
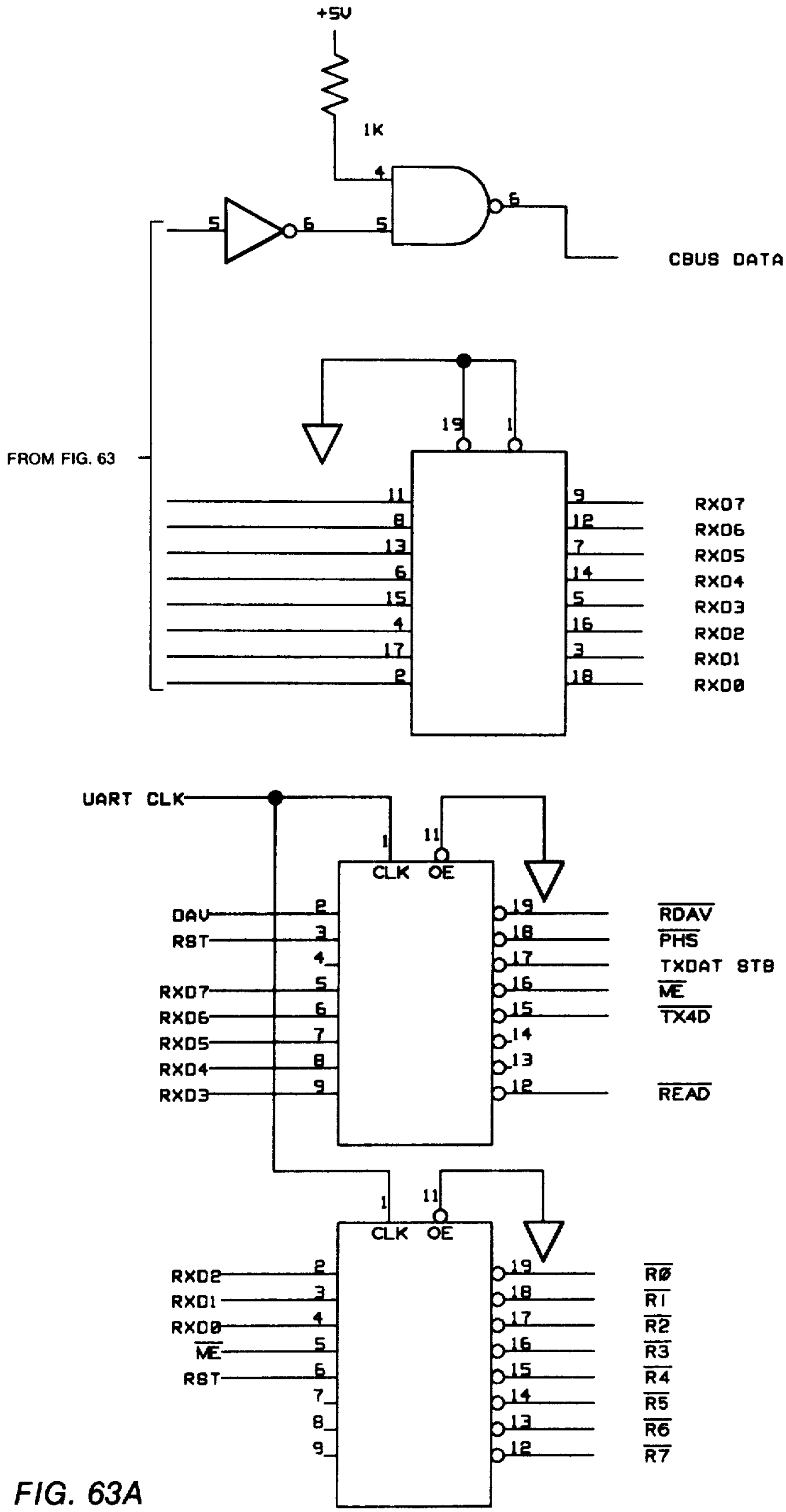

Appropriate timing and control logic both for address and data transfer and for memory refresh operation is shown in FIGS. 57-59, the drivers for the principal control signals supplied to the memory module being shown in FIG. 60; and various bus interface logic as shown in FIGS. 61-63.

FIG. 4 depicts the overall block diagram for a typical memory module of the main memory system of the invention and shows the memory array 60 of dynamic NMOS random access memories (RAM's) organized as four planes of 16K 39-bit words each and identifiable as planes Ø-3. A word which is to be written into the memory array is received from the bank controller as WDØ-38 via buffer 62. Words being stored in even planes Ø and 2 are stored in even plane data register 63 while words to be stored in odd planes 1 and 3 are stored in odd plane data register 64. The control signals are supplied from the bank controller to control logic bits of address are used for the 16K RAMs discussed above, the extra bit allowing for possible future expansion. Thus, addressed bits ADR Ø-5 are clocked at fixed intervals to each of the latches 67A-67D of the planes Ø-3 at fixed intervals. ADR 6 is supplied to RAM selection logic 68 together with the plane Ø latch signal RPL Ø RAS to provide the JADR 6 signal for the plane Ø latch register 67A. The RAS and CAS signals provide the necessary control signals via the control logic 65 and latch registers 67 for driving the row address strobe (RAS) and the column address strobe (CAS) signals for the RAMs.

The LDOUT signal to the input of control logic 65 causes the module to load its output register at the end of the current cycle and enable it onto the read data bus during the next cycle via the data out register and multiplexer logic 69 and read bus driver 69A. The LDIN signal at the input to control logic 65 causes the module to accept data from the write data bus via registers 63 and 64 for writing into the RAM during the following cycle. The following timing diagrams show the status of the various signals for block read and block write operations at each fixed time interval (in the particular embodiment described, for example, each cycle can be 110 ns). As can be seen, the plane Ø-3 data is provided in the read operation in sequence and the input data is written into such planes in sequence.

Block Read

| t0 | t1 | t2 | t3 | t4 | t5 | t6 | t7 |
|---|---|---|---|---|---|---|---|
| Control Signals | RAS MODSELS | RAS,CAS MODSELS | RAS,CAS MODSELS | LDOUT MODSELS | <pre-charge> | <next access> | |
| Address Lines | ROW ADDRESS | COLUMN ADDRESS | COLUMN ADDRESS | | | | |
| Read Data bus | | | | | PLANE DATA | PLANE DATA. | <etc.> <etc.> |
| Write Data Bus | | | | | | | |

Block Write

| t0 | t1 | t2 | t3 | t4 | t5 | t6 | t7 |
|---|---|---|---|---|---|---|---|
| Control Signals | RAS,LDN MODSELS | RAS,CAS MODSELS | RAS,CAS MODSELS | | | <next access> | |
| Address Lines | ROW ADDRESS | COLUMN ADDRESS | COLUMN ADDRESS | | | | |
| Read Data Bus | | | | | | | |
| Write Data Bus | | PLANE 0 DATA | PLANE 1 DATA | PLANE 2 DATA | PLANE 3 DATA | | |

Figure 64:
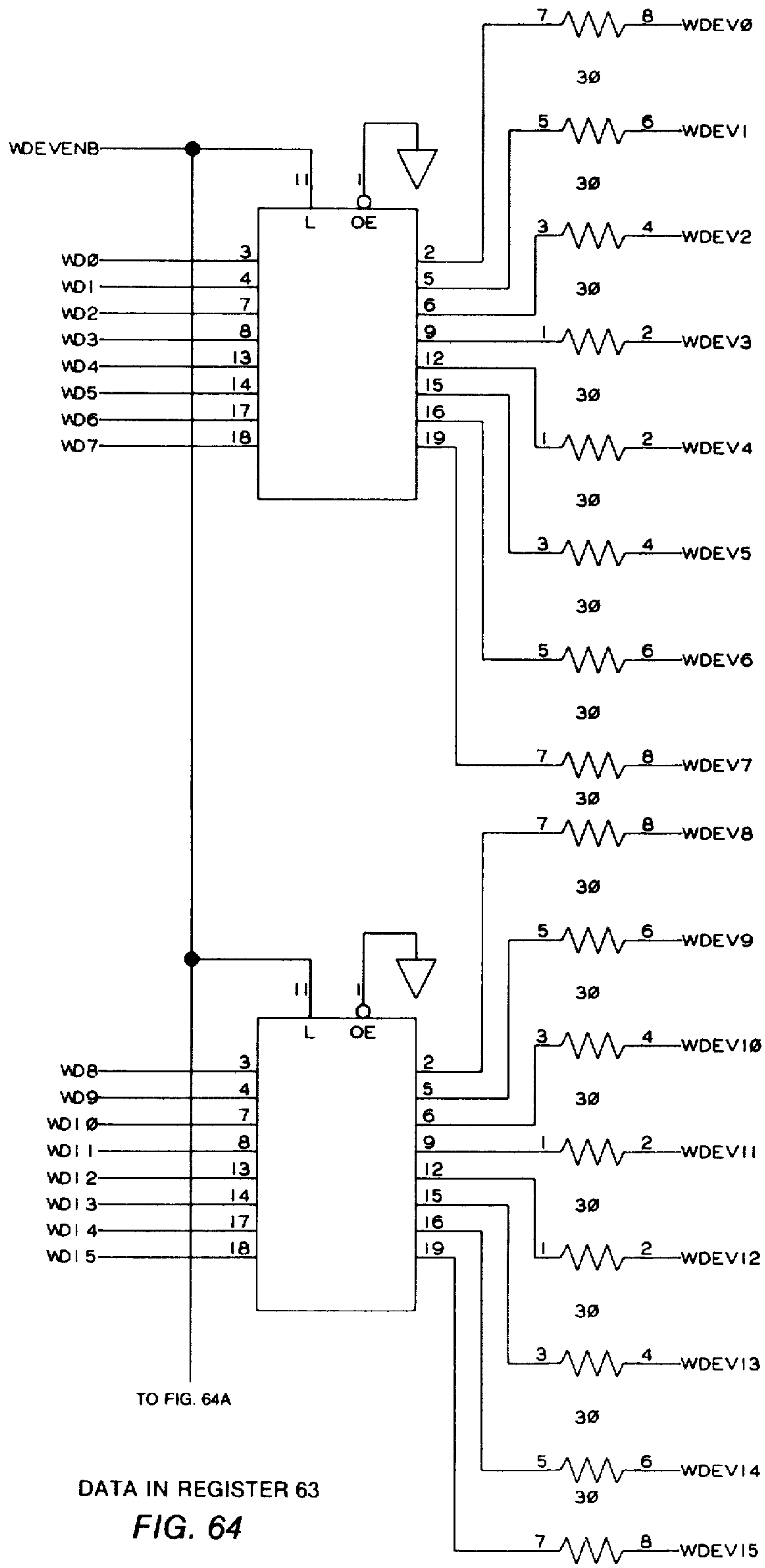
FIGS. 64–78 show specific logic circuitry for implementing the main memory modules of FIG. 4.
Figure 64A:
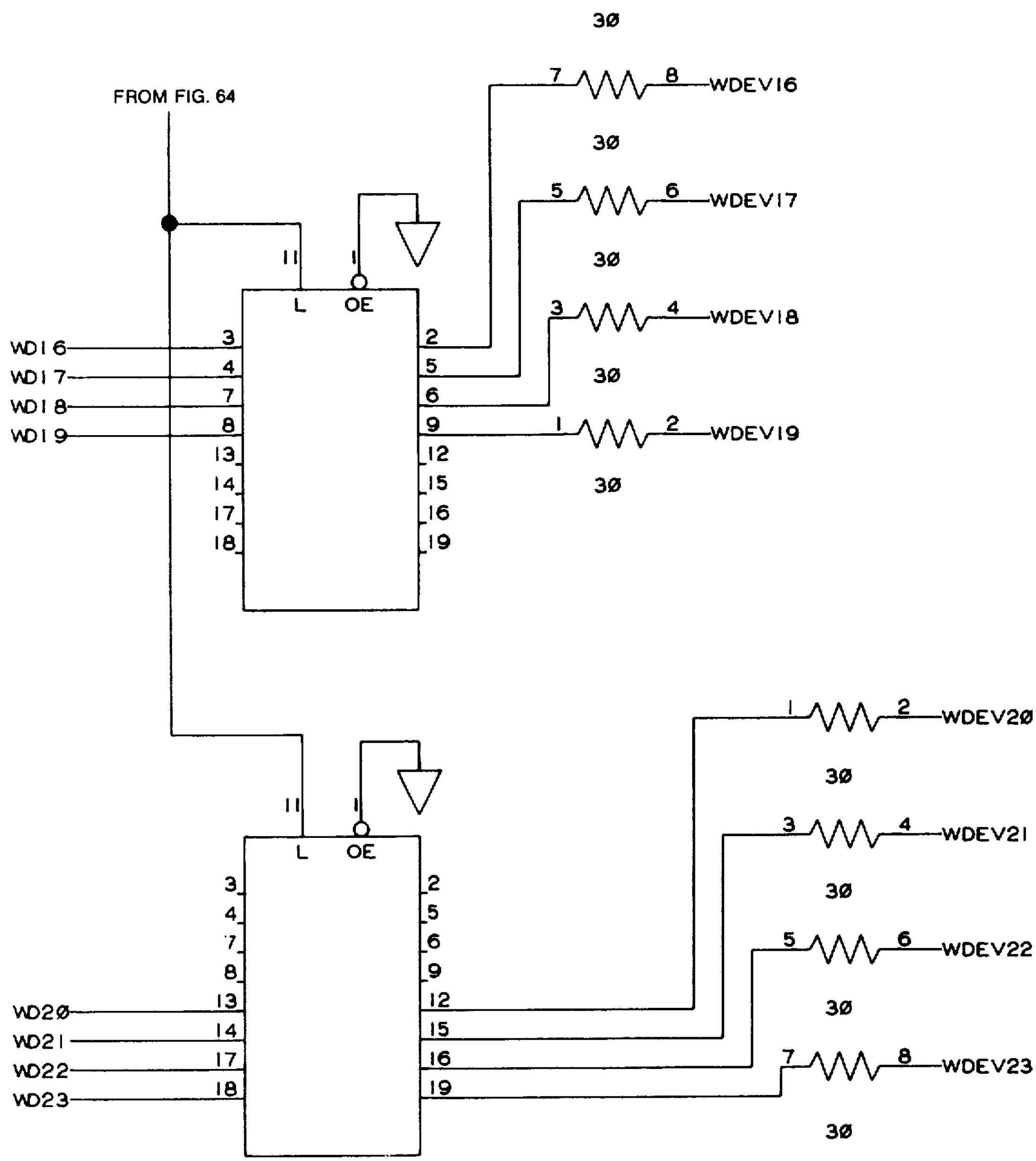
Figure 64B:
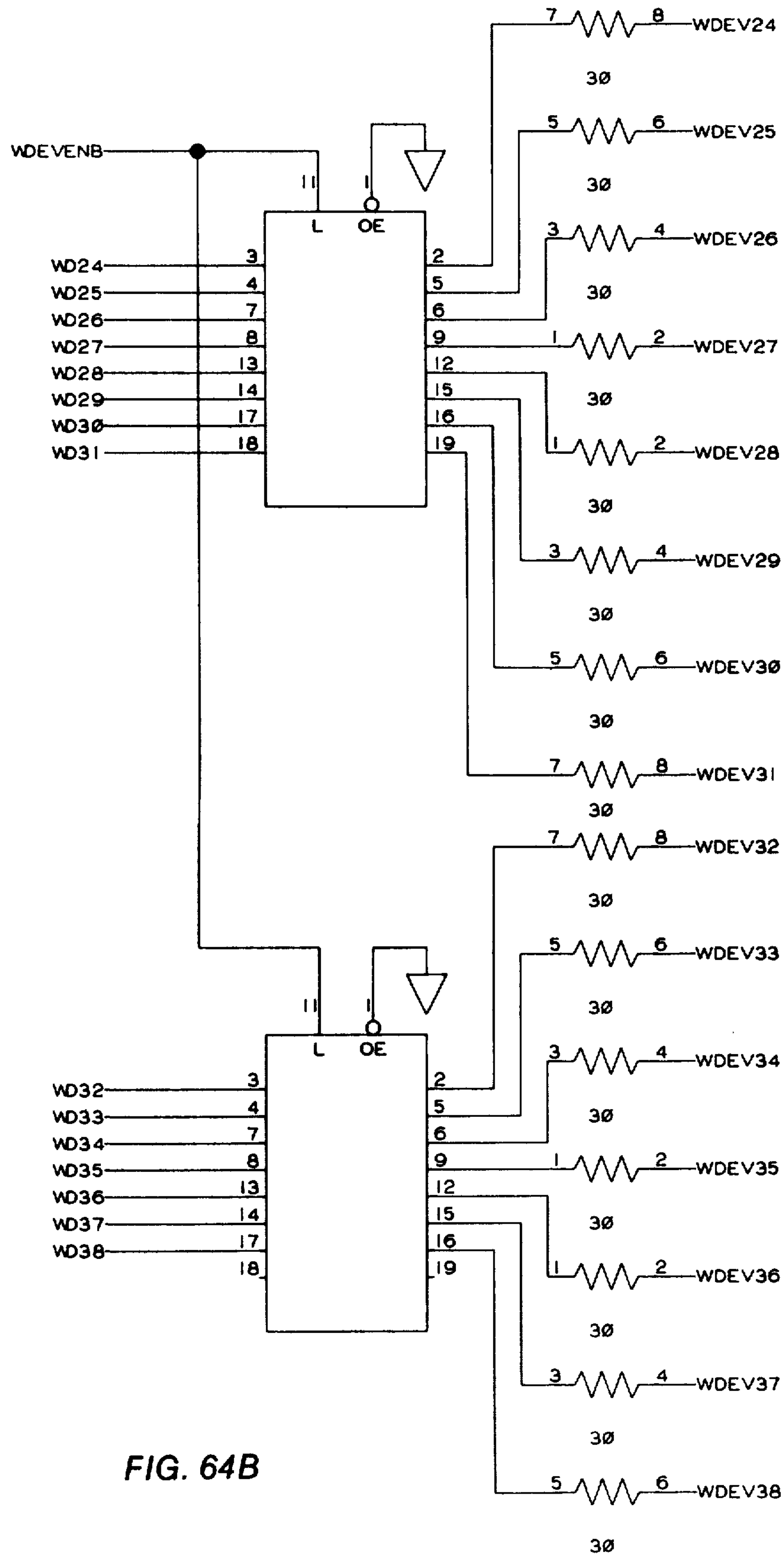
Figure 65:
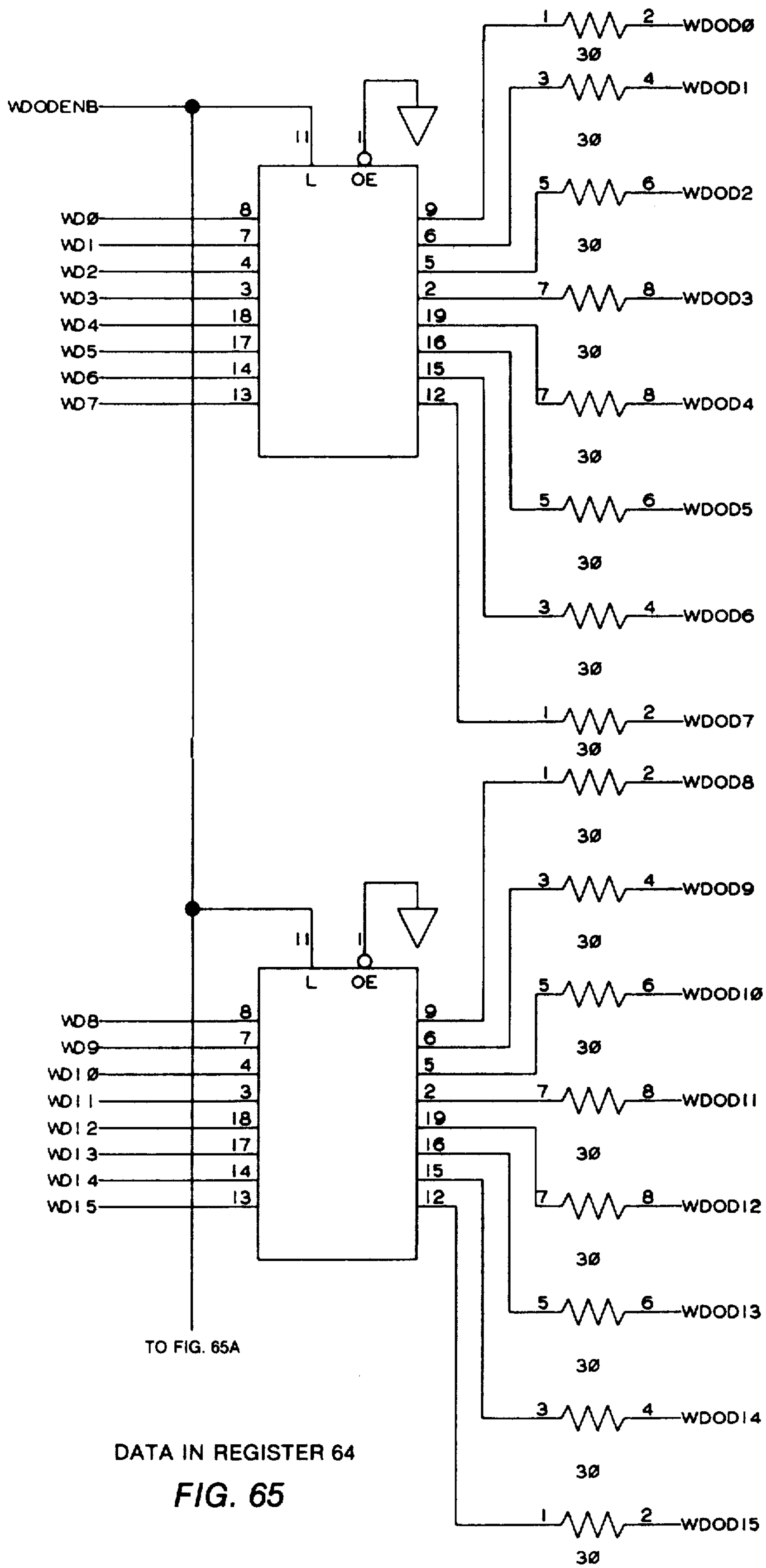
Figure 65A:
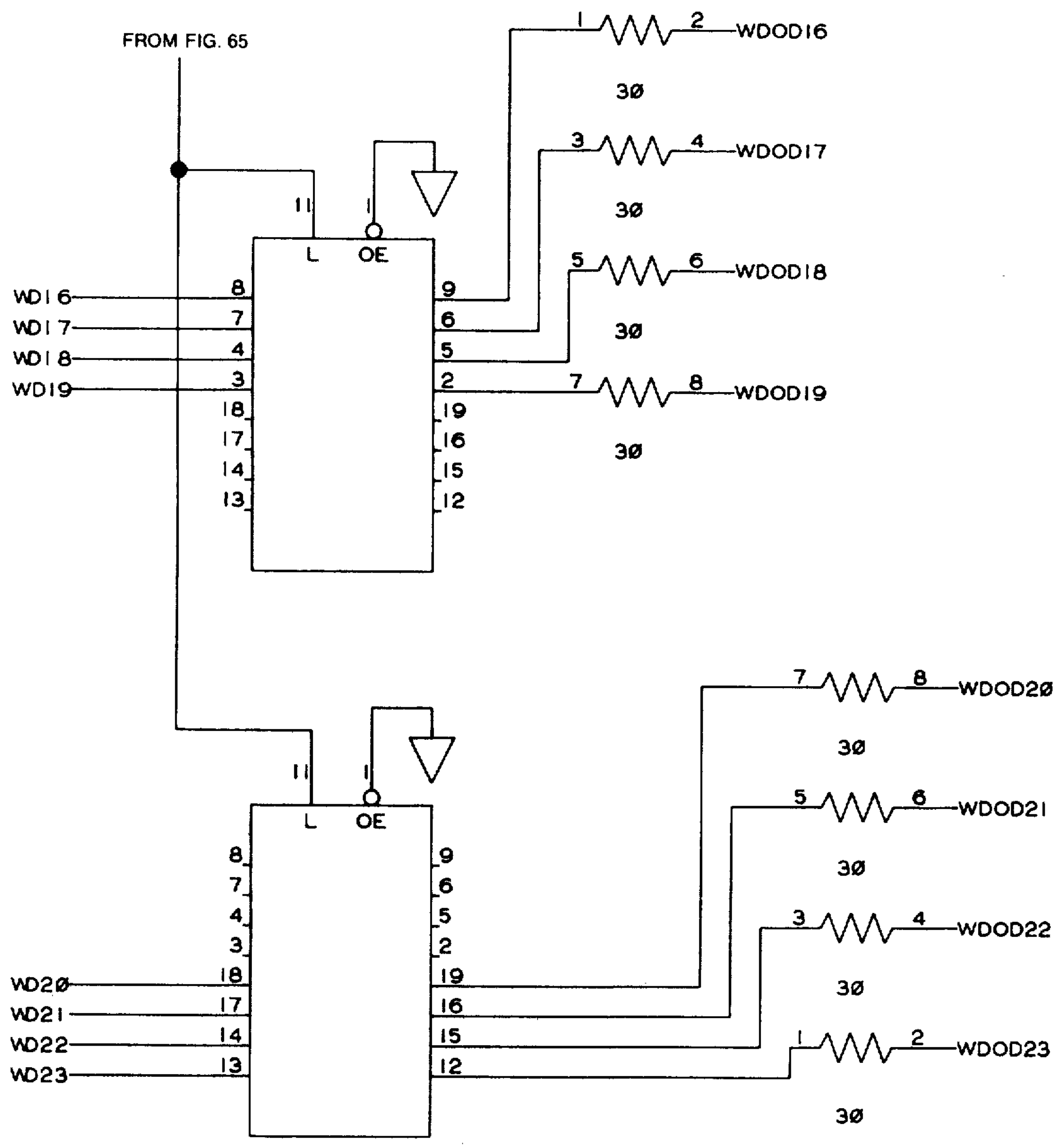
Figure 65B:
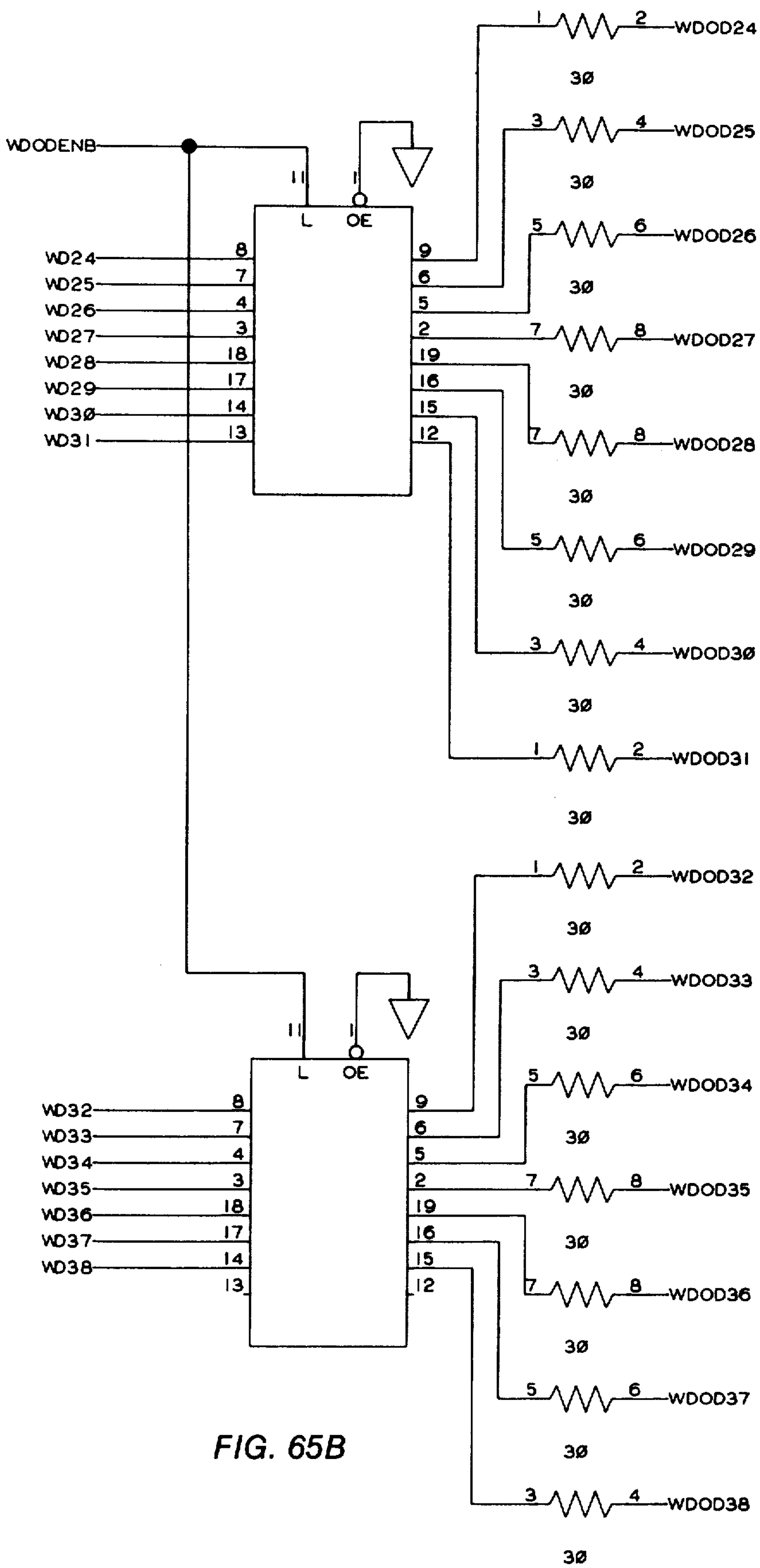
Figure 66:
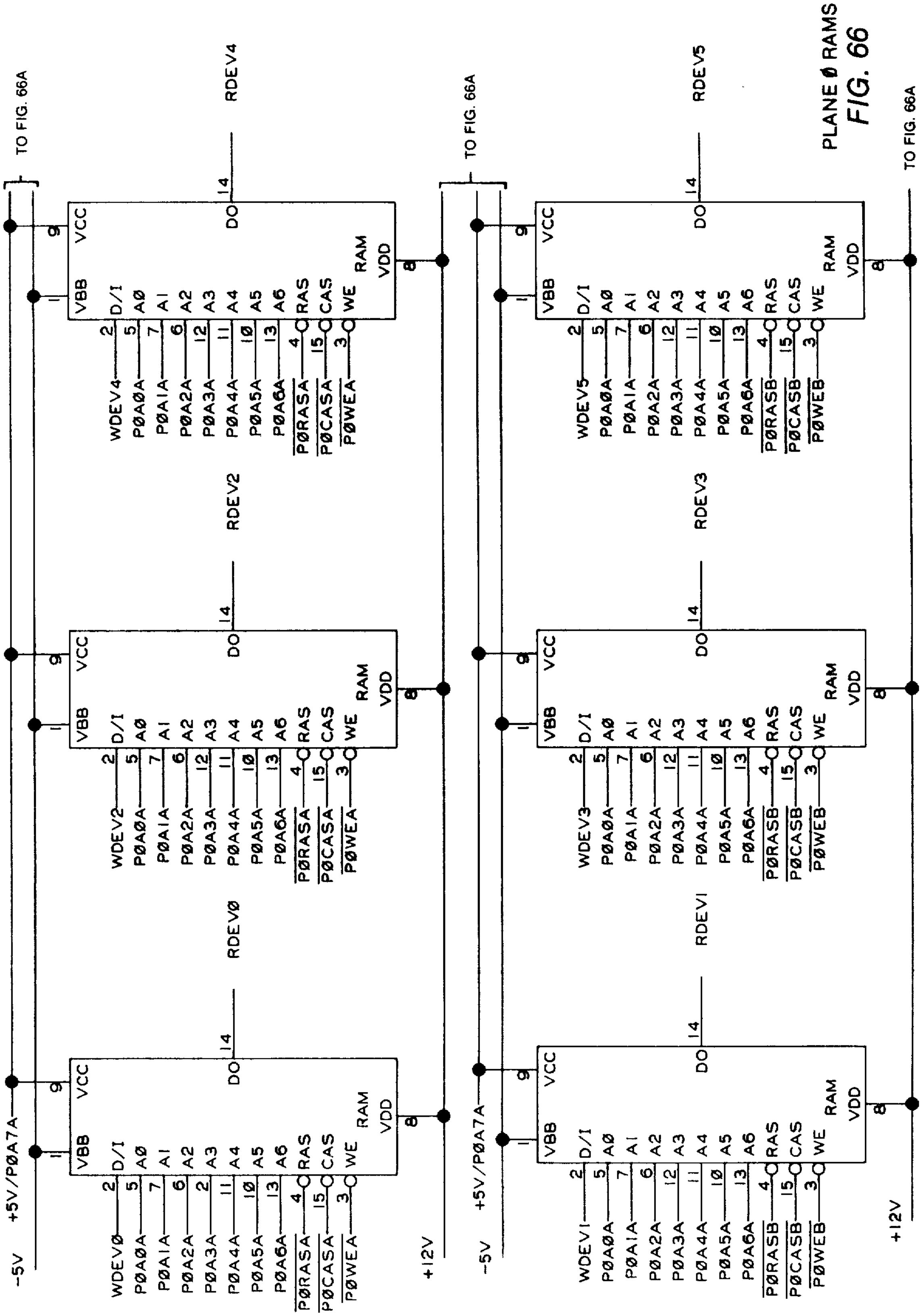
Figure 66A:
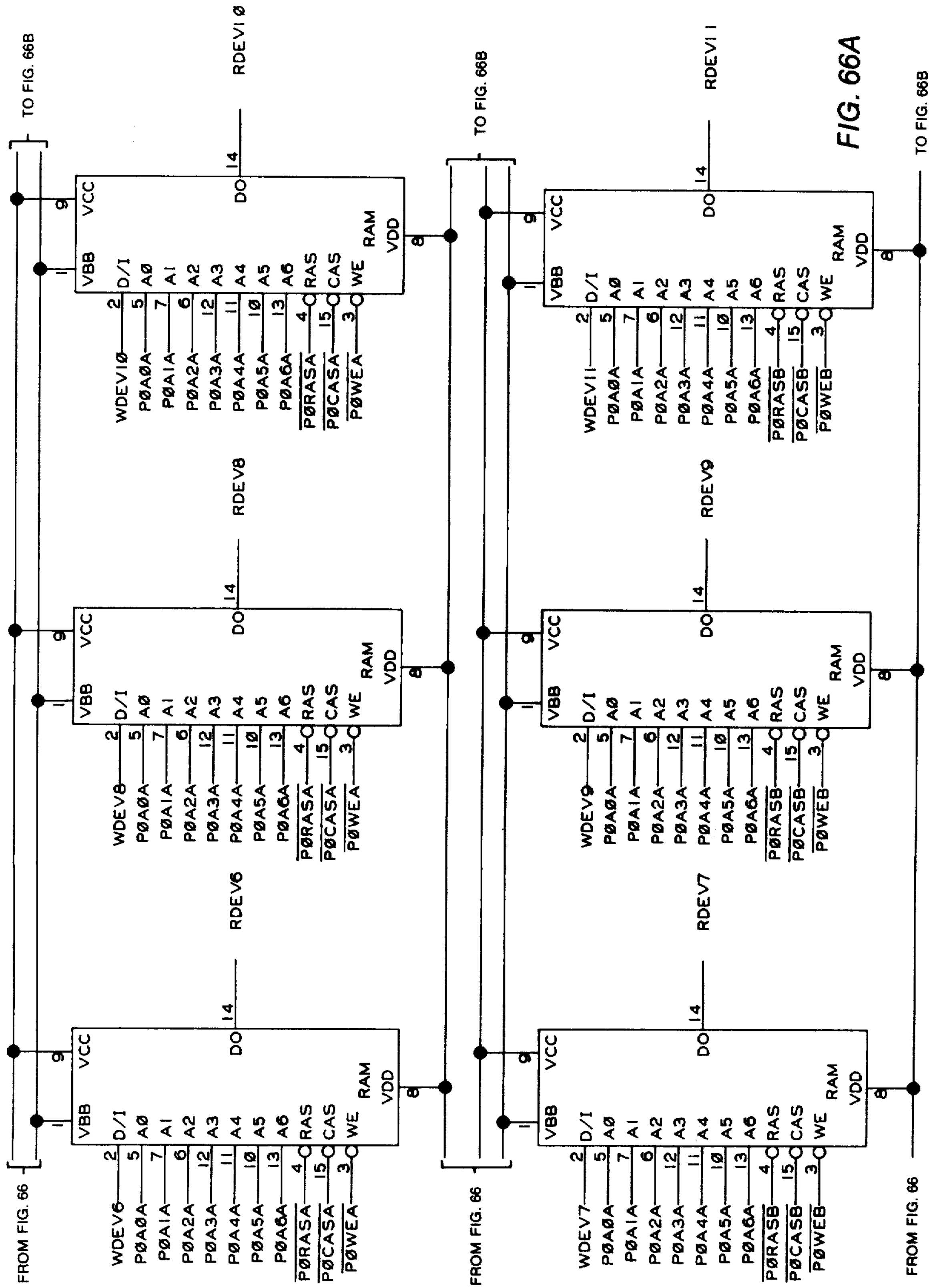
Figure 66B:
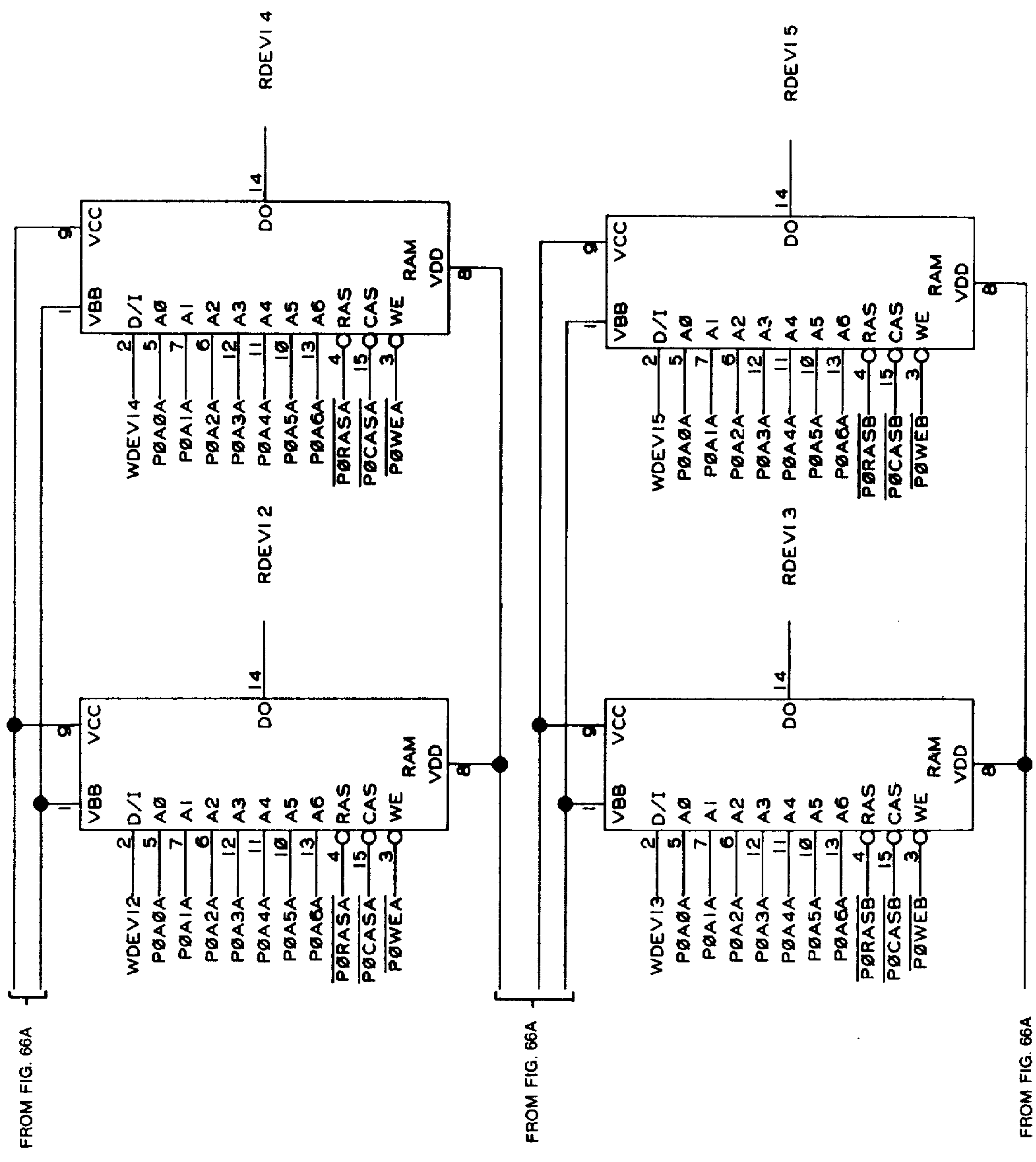
Figure 66C:
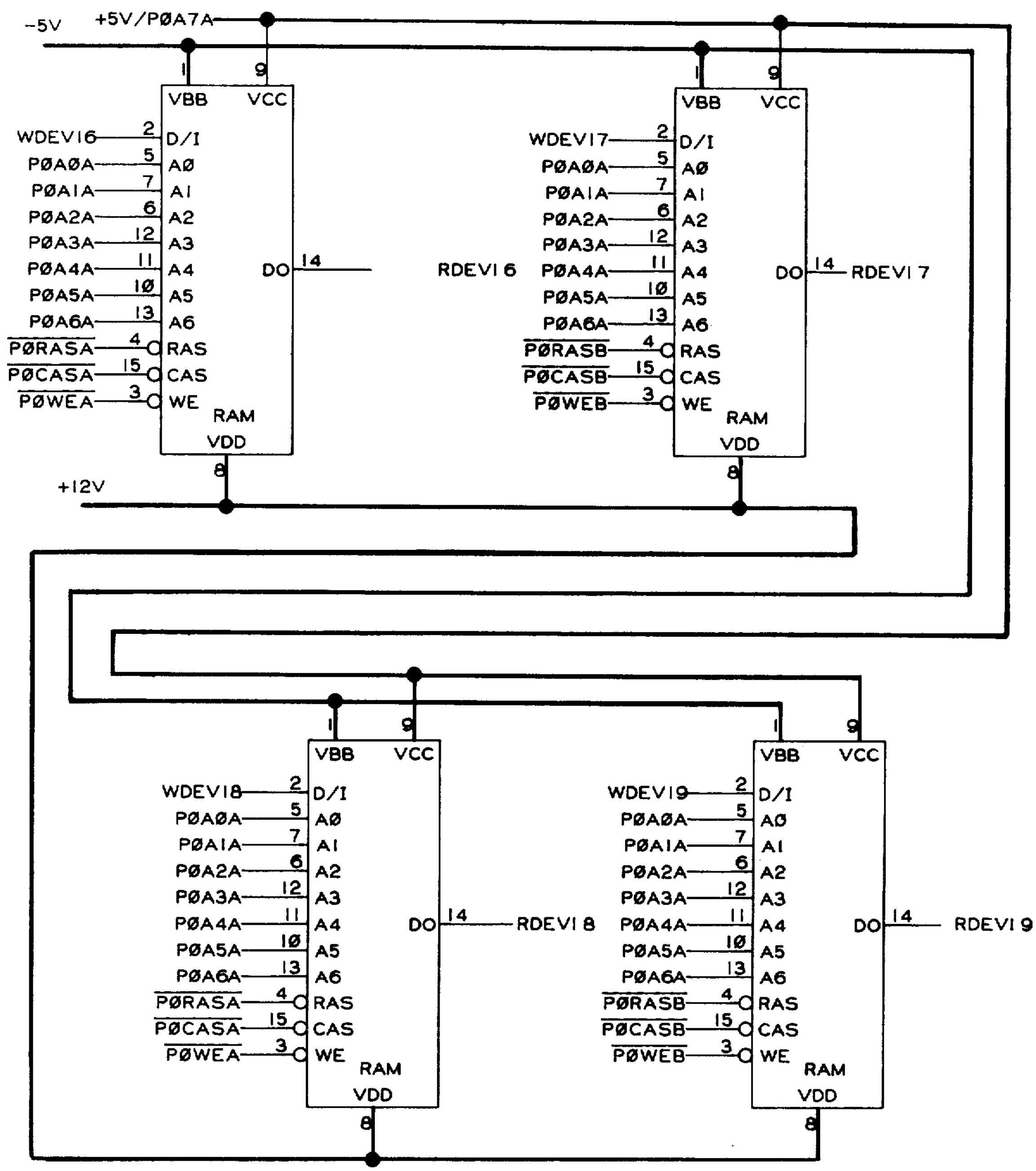
Figure 66D:
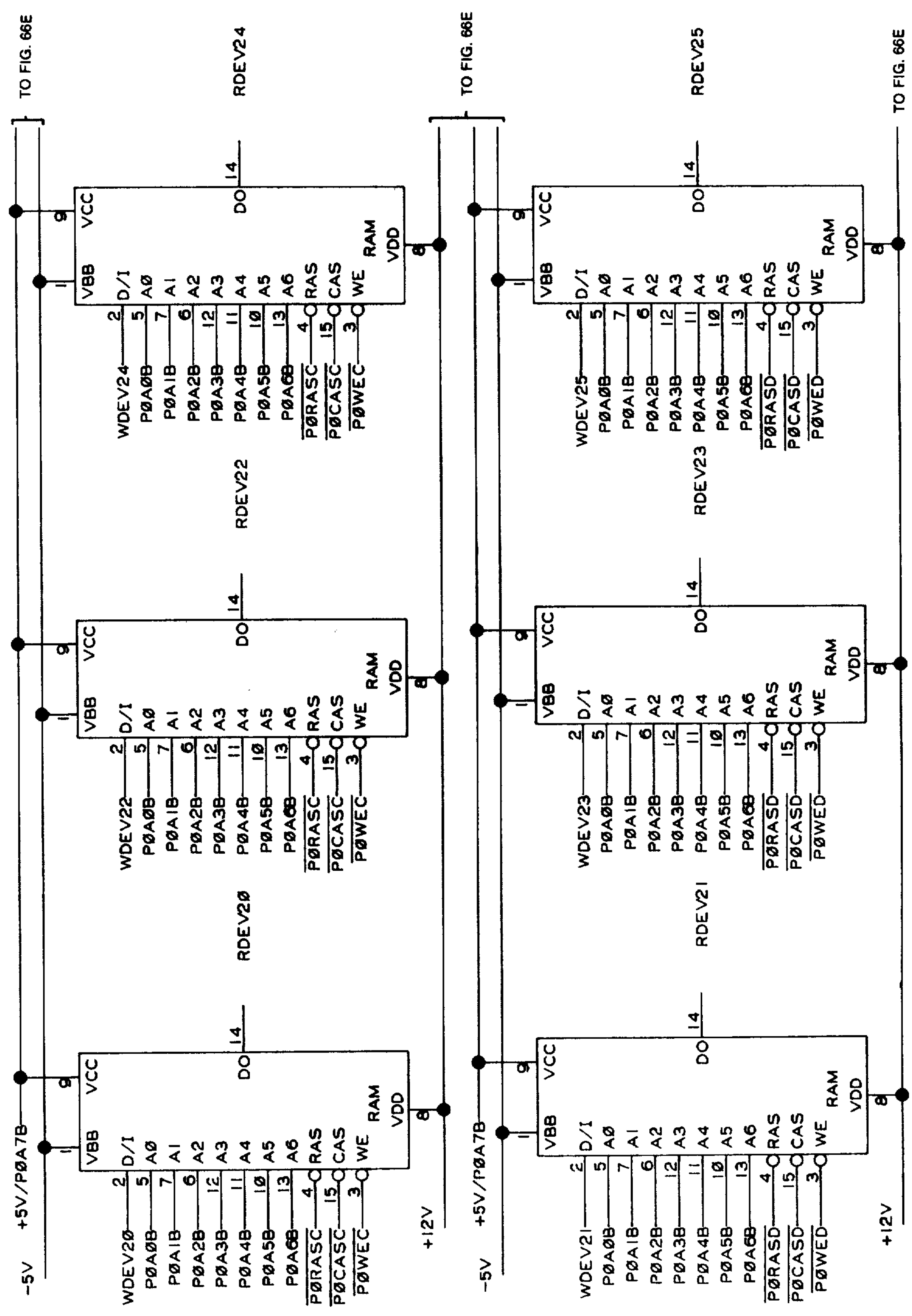
Figure 66E:
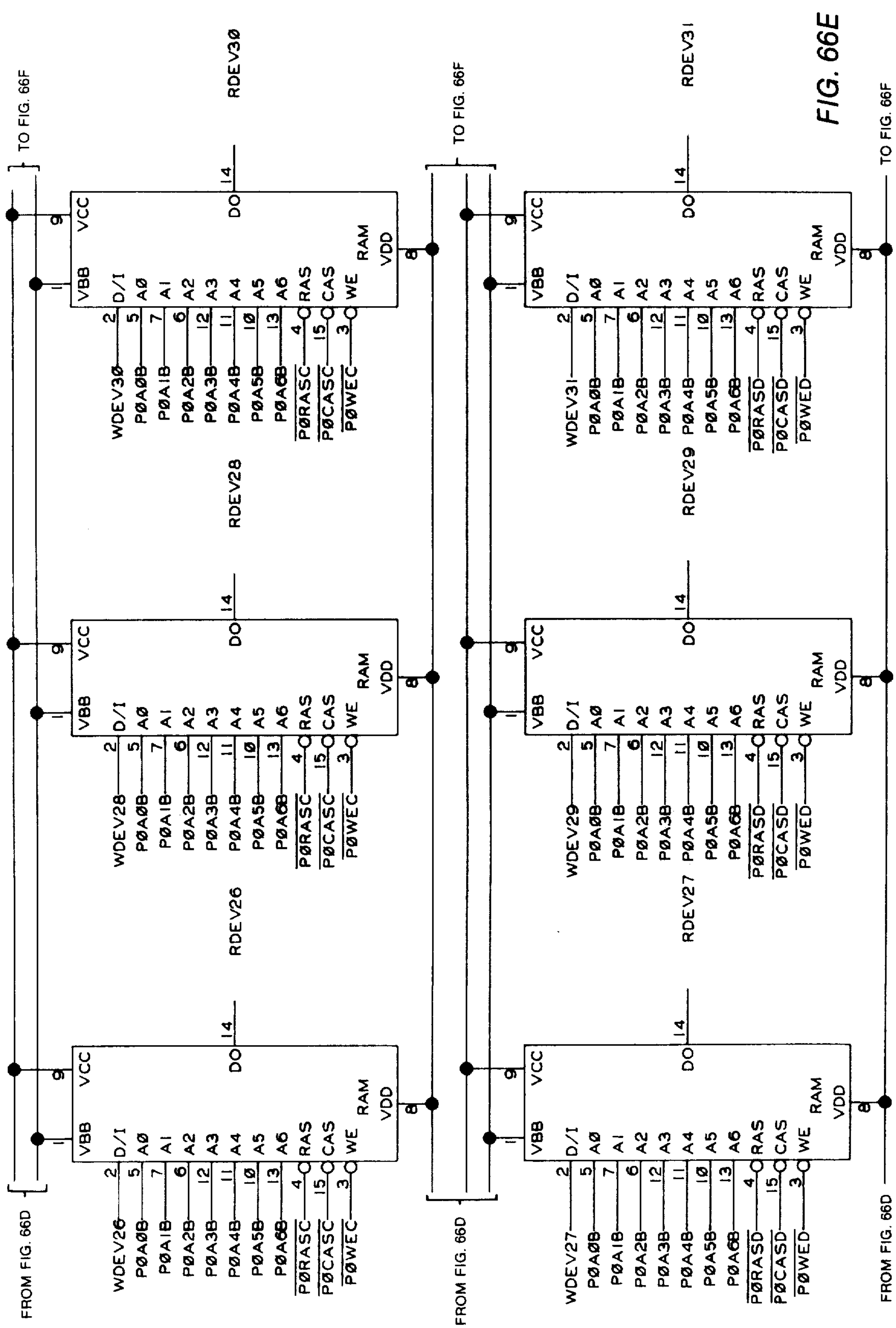
Figure 66F:
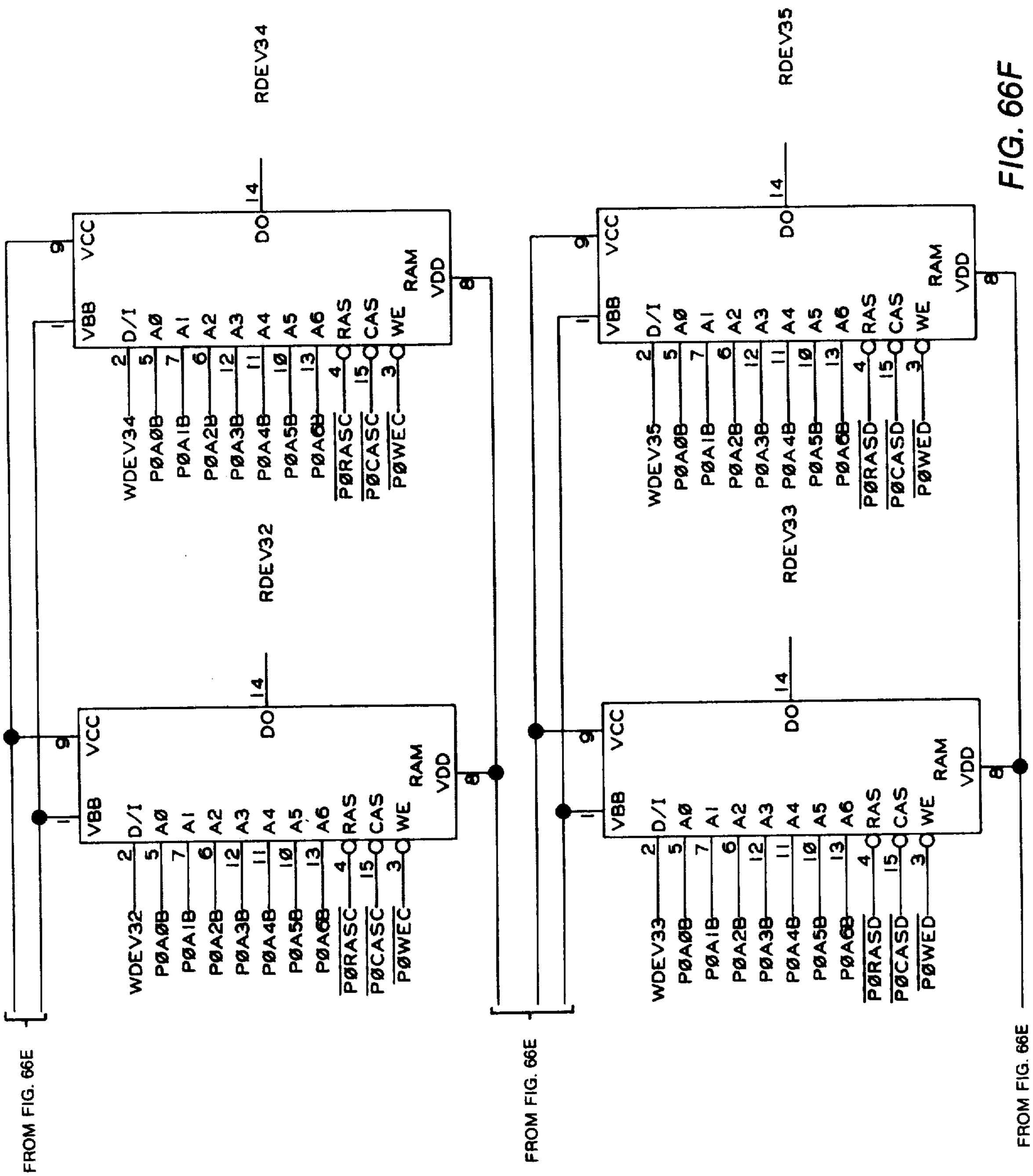
Figure 66G:
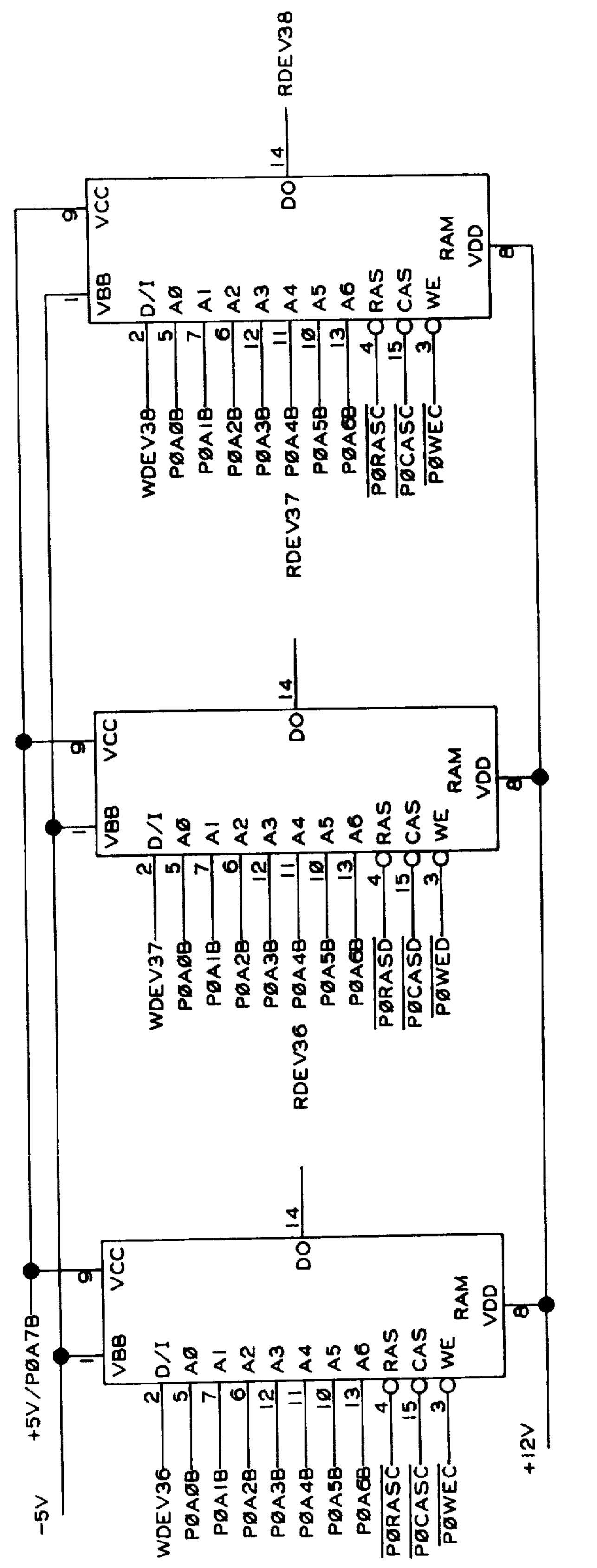
Figure 67:
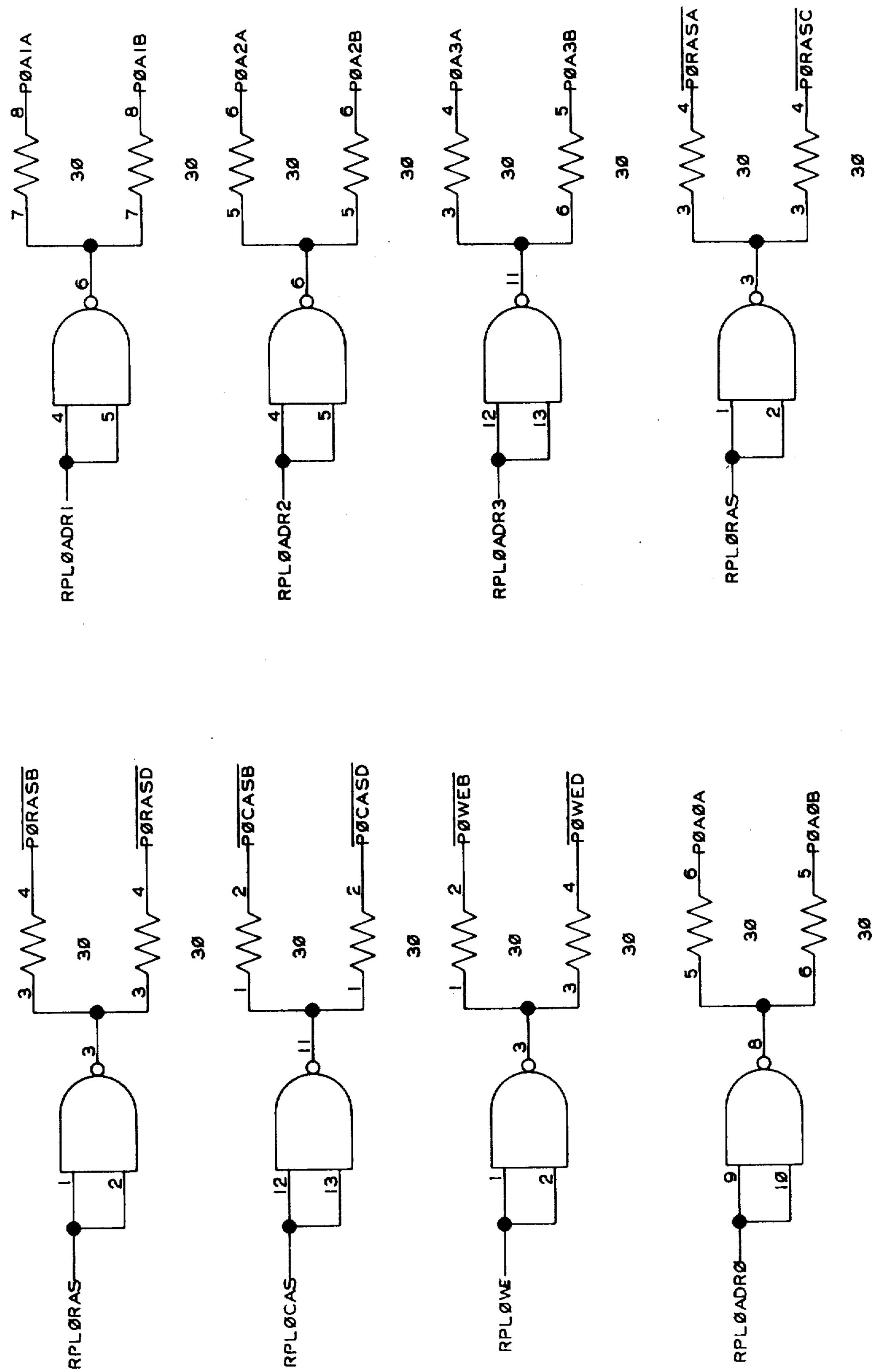
Figure 67A:
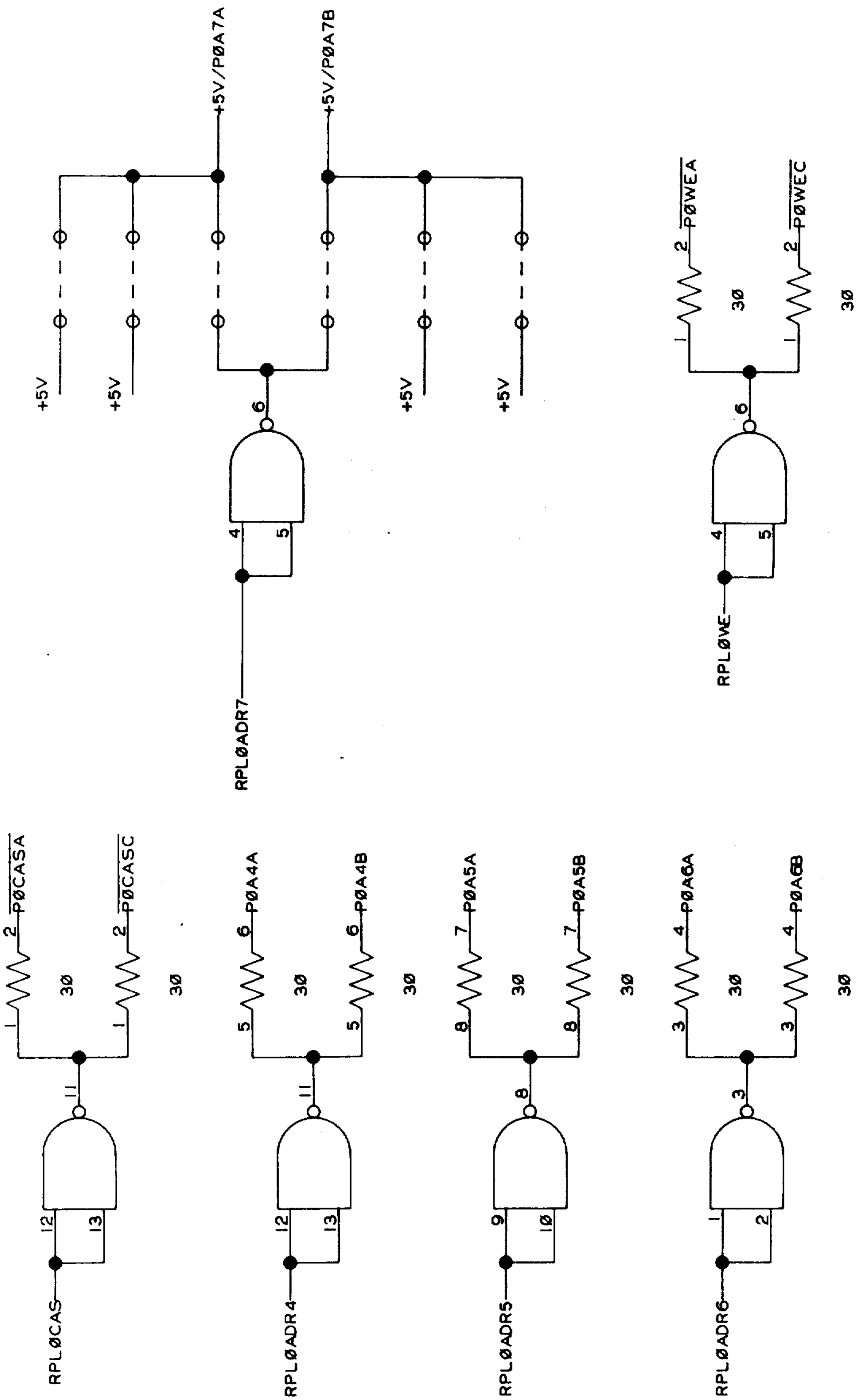
Figure 68:
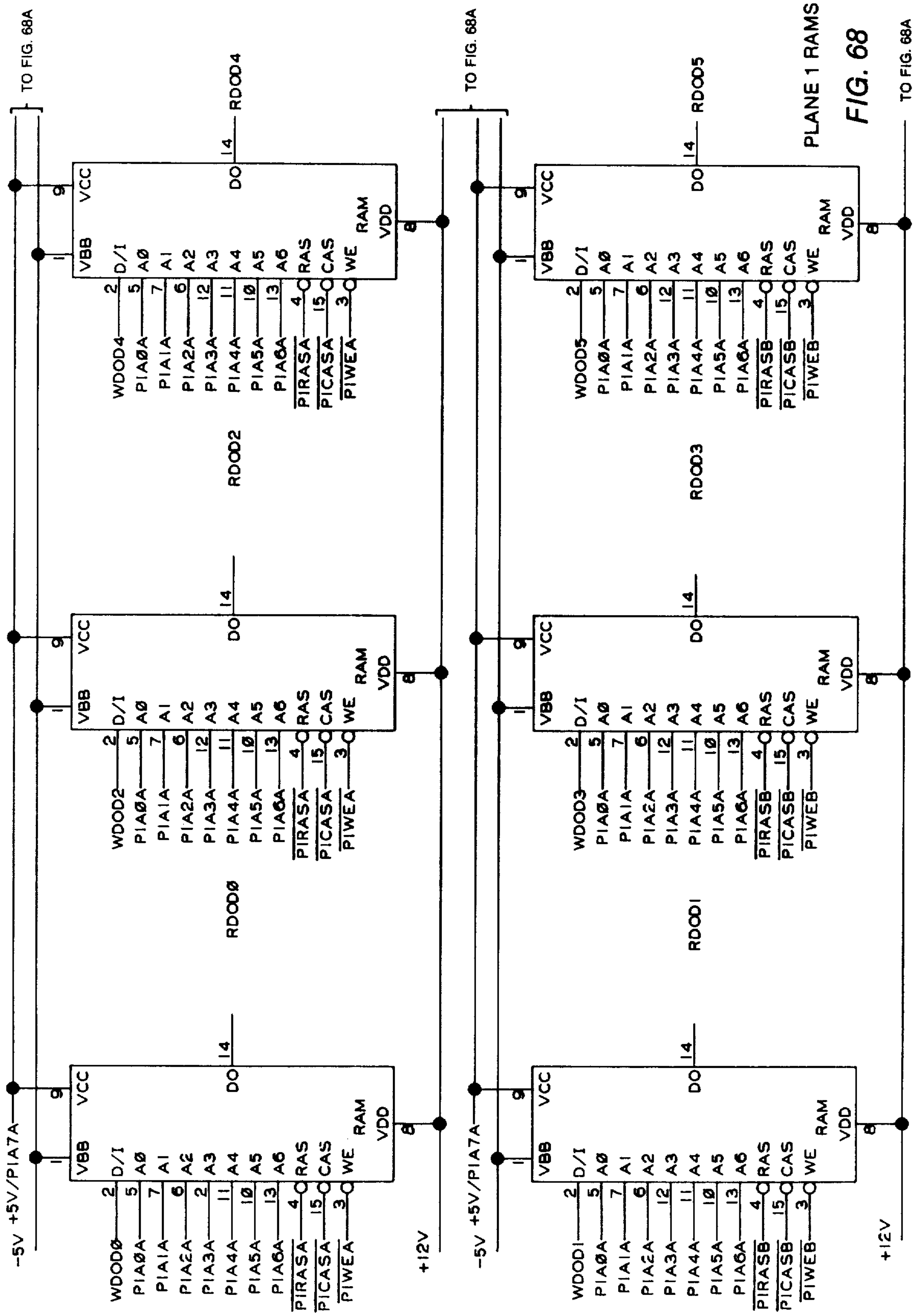
Figure 68A:
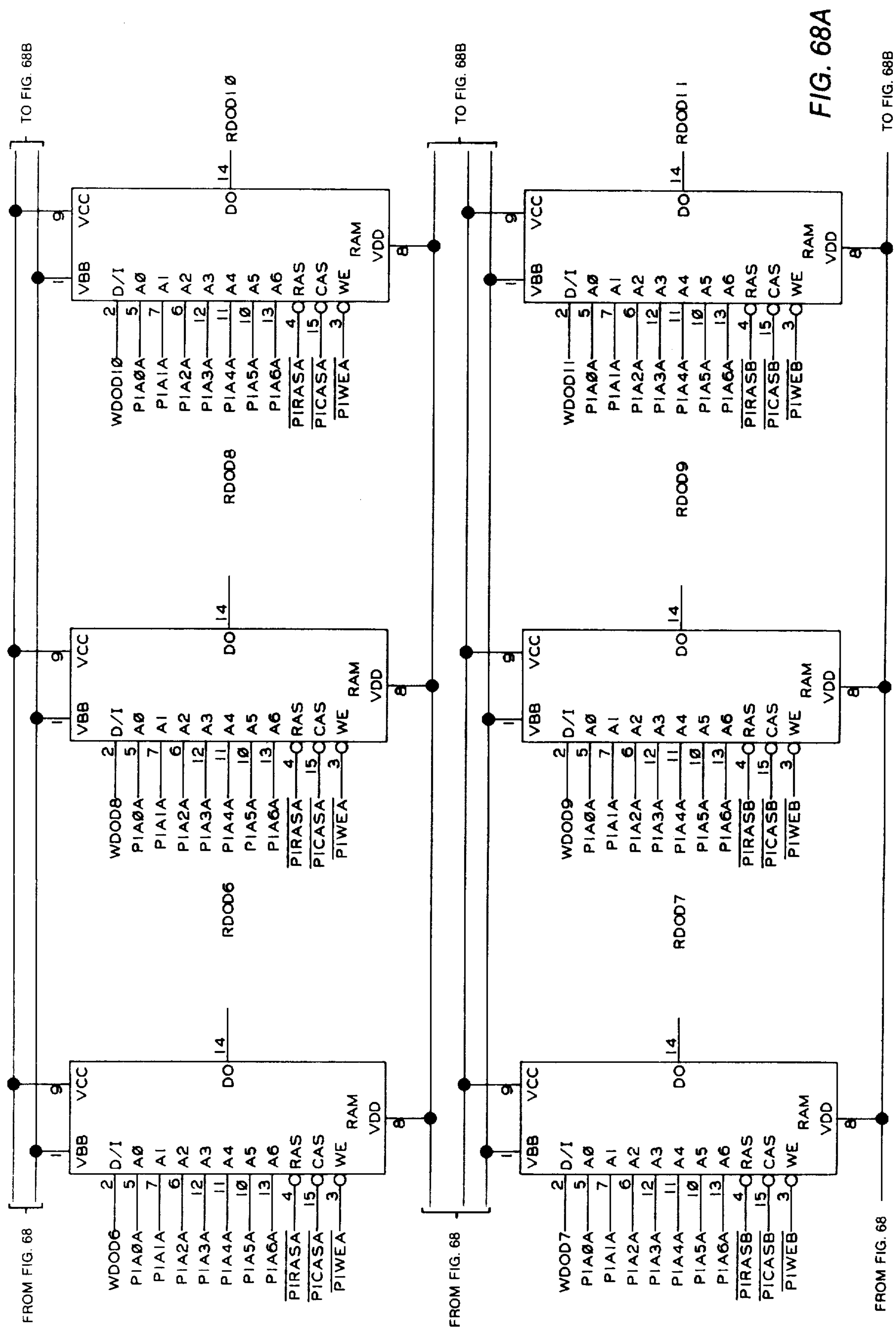
Figure 68B:
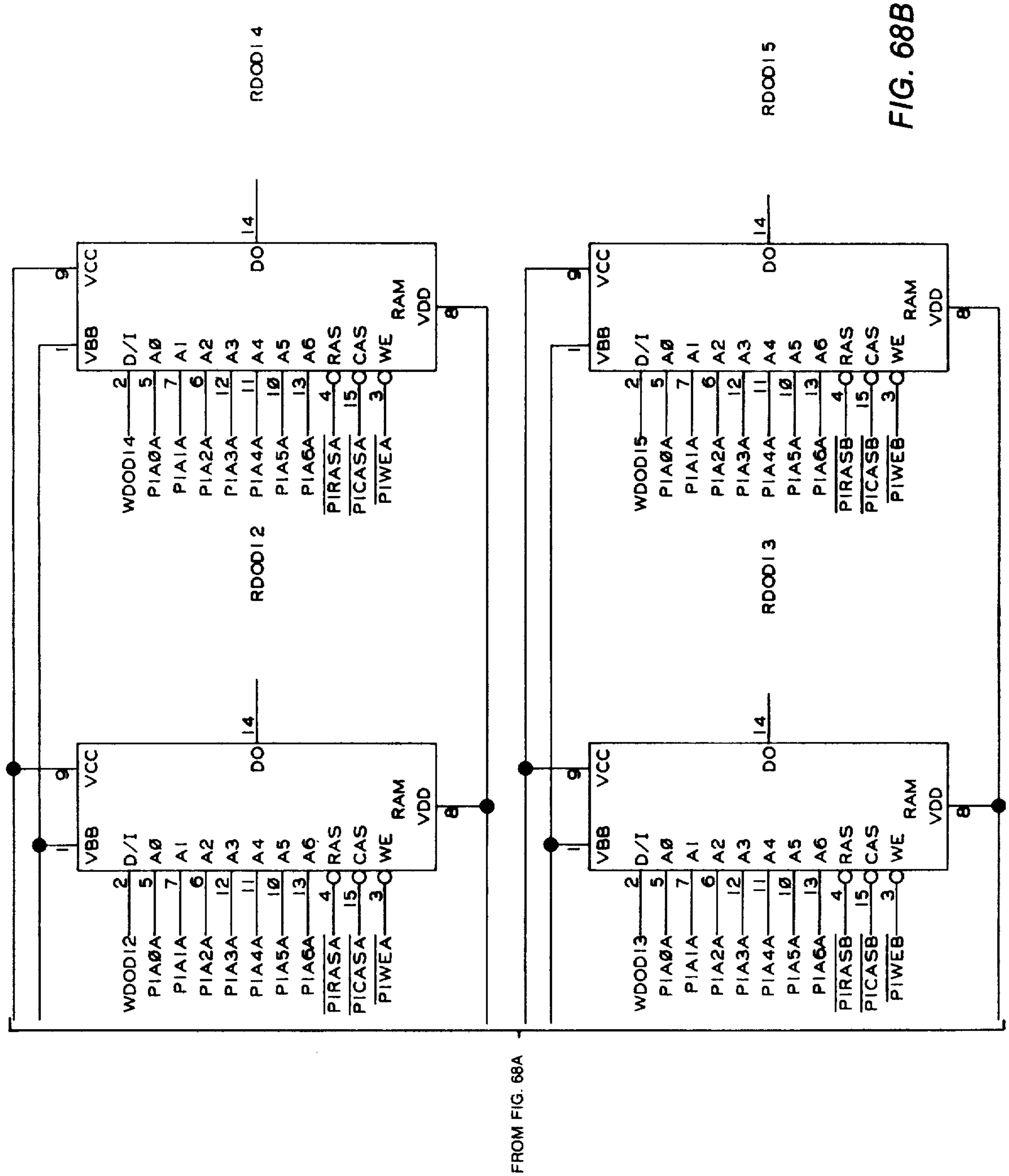
Figure 68C:
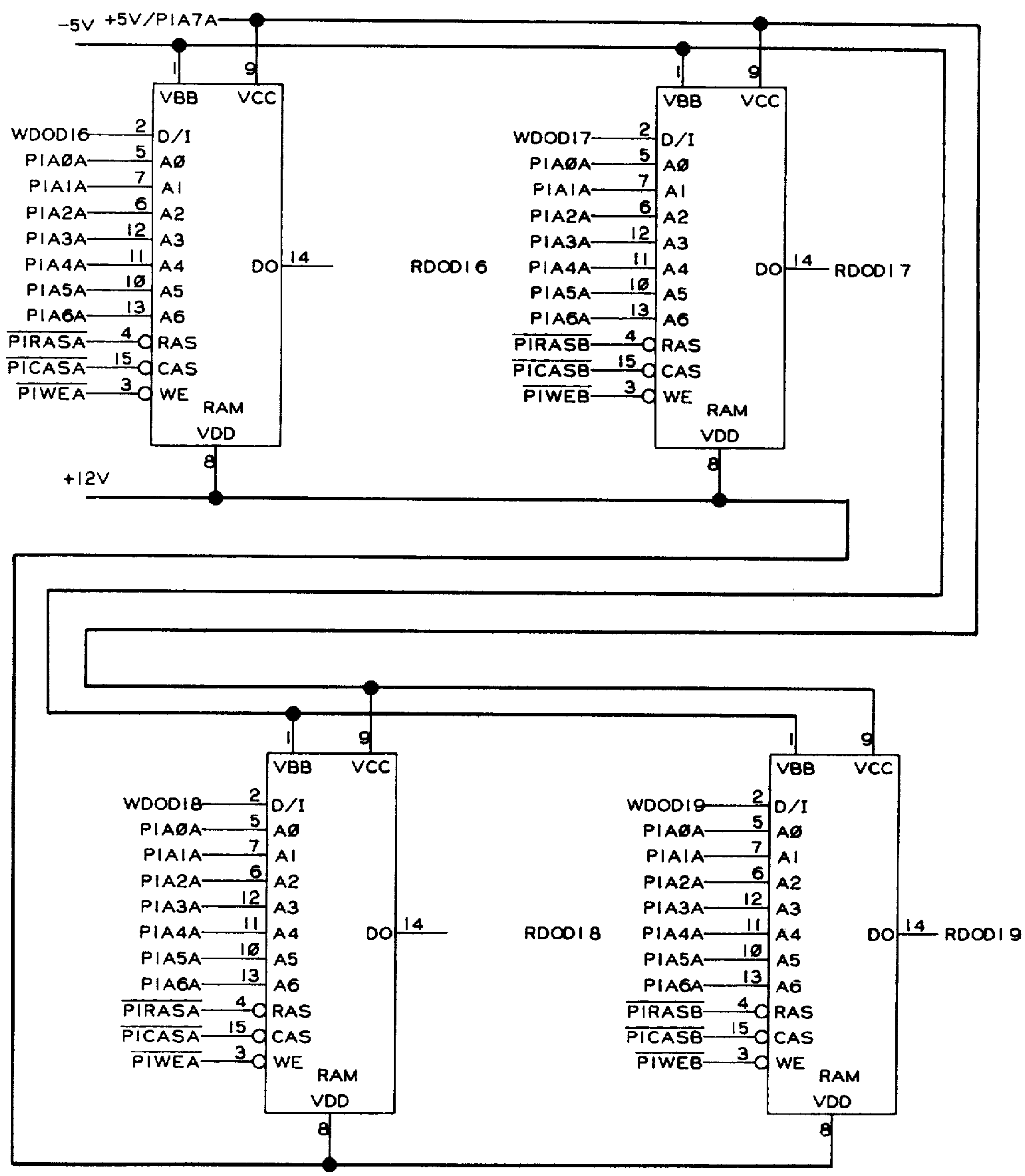
Figure 68D:
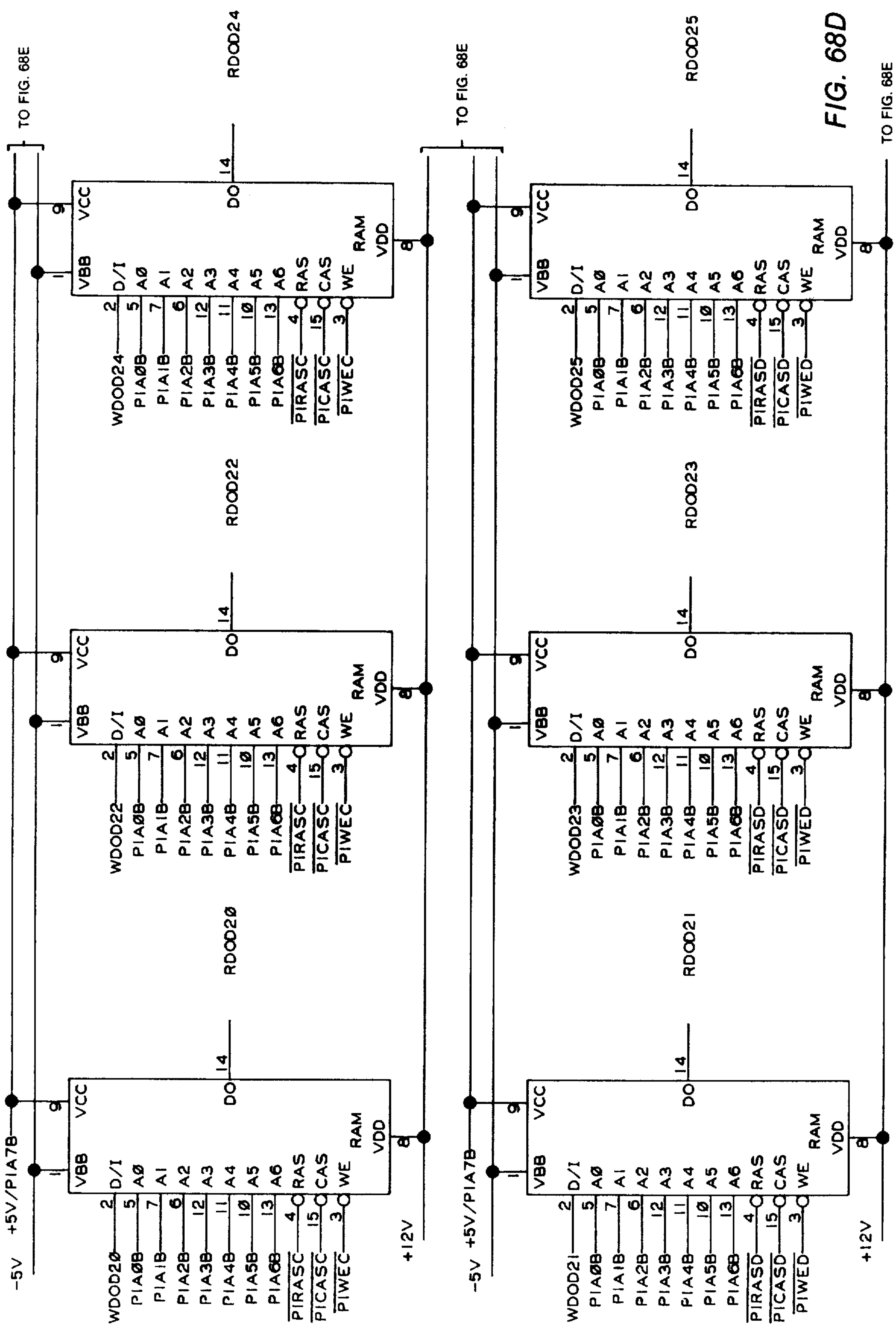
Figure 68E:
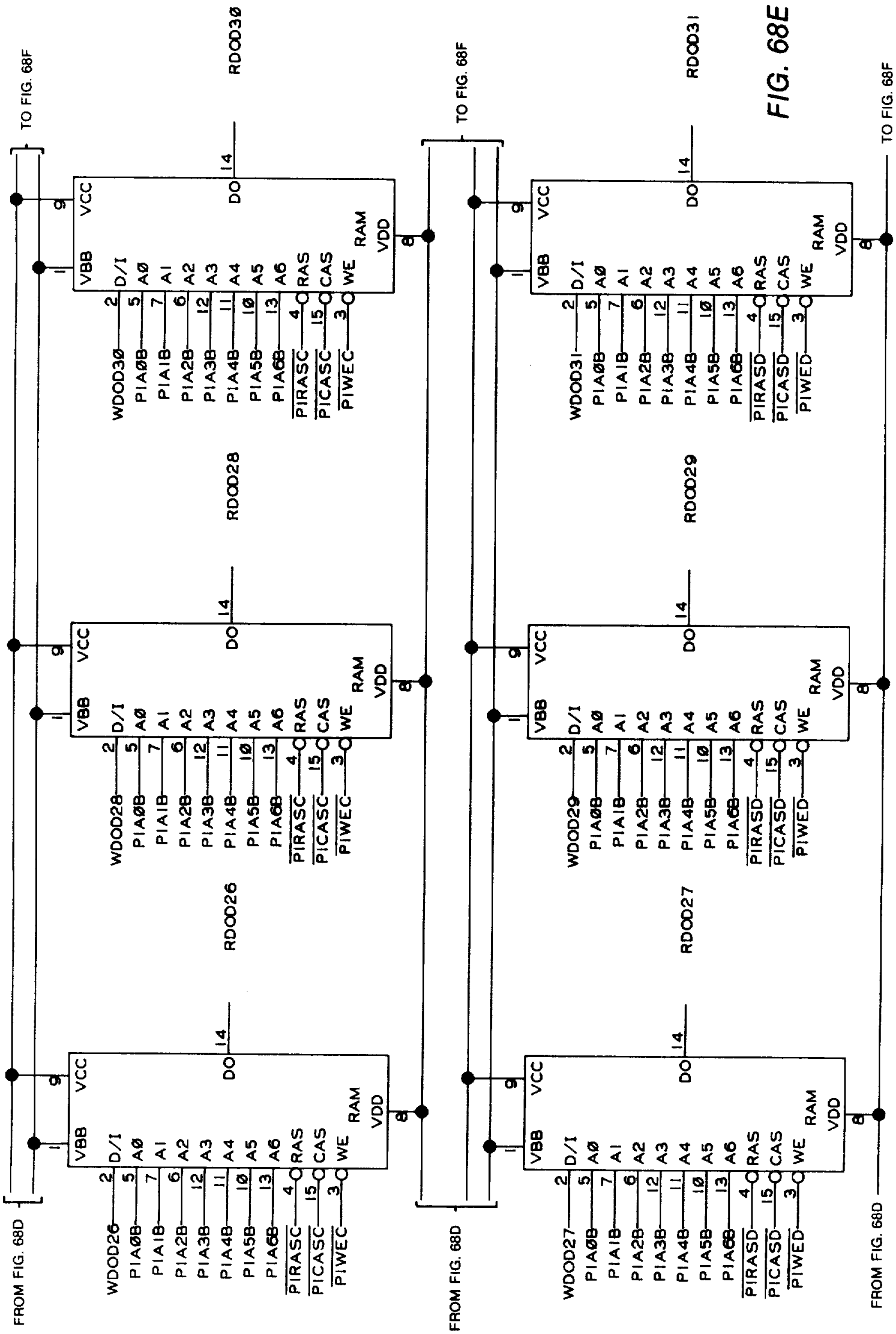
Figure 68F:
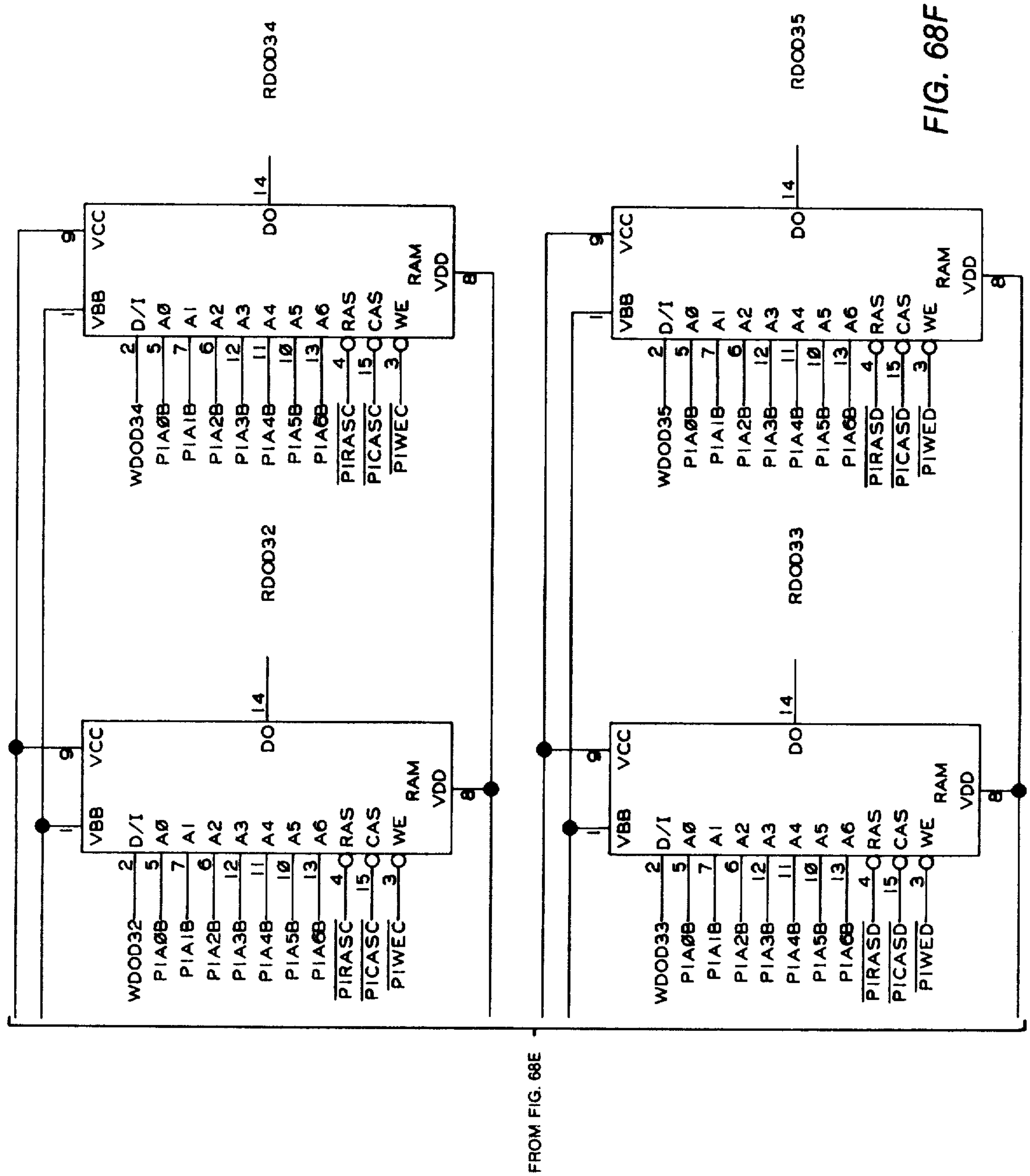
Figure 68G:
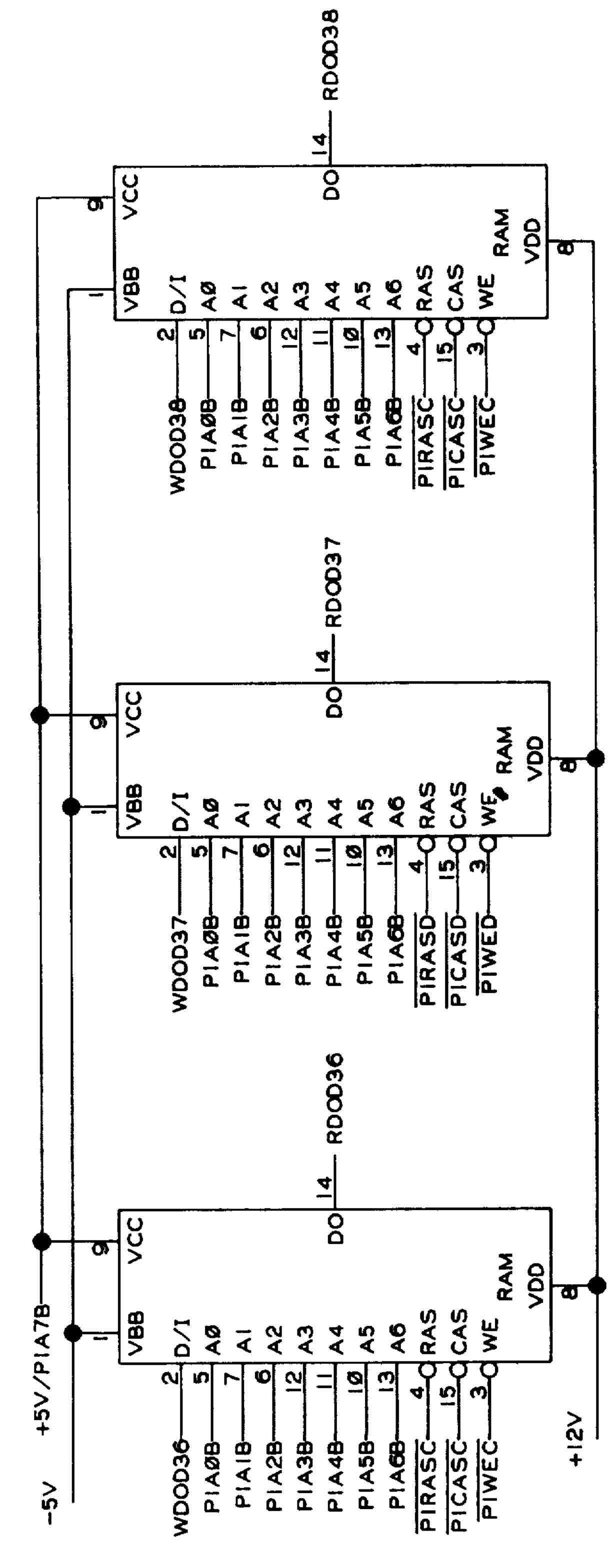
Figure 69:
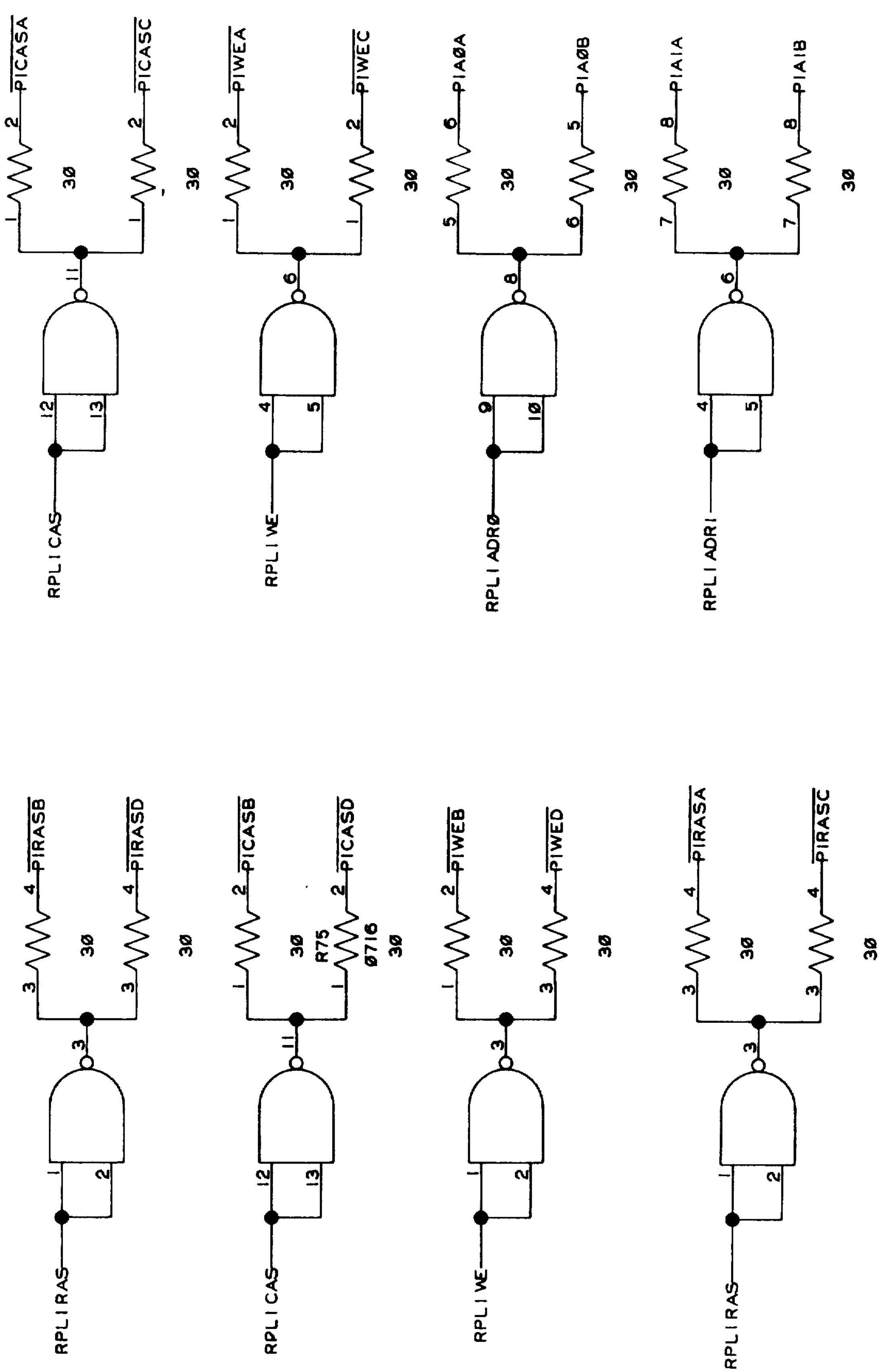
Figure 69A:
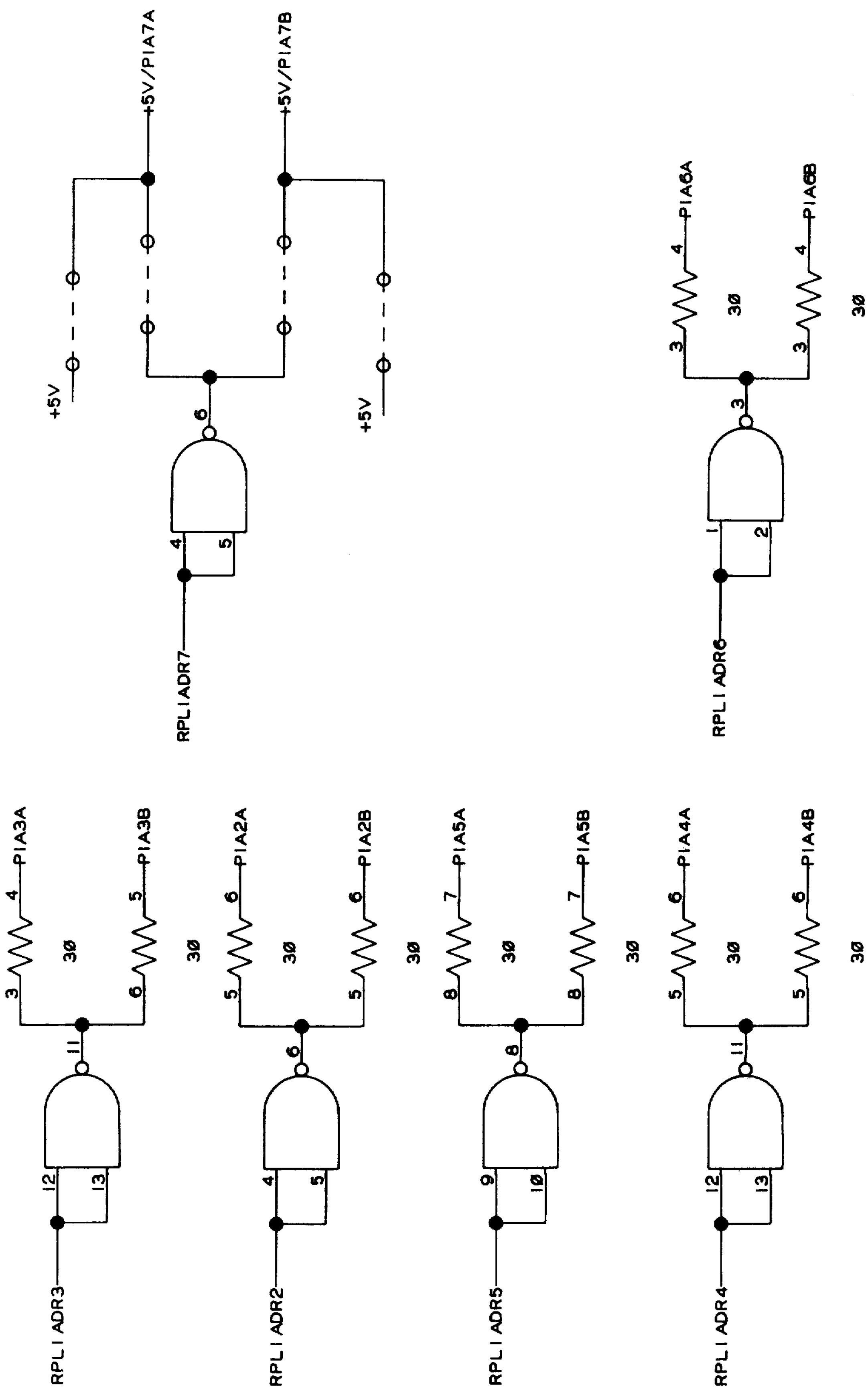
Figure 70A:
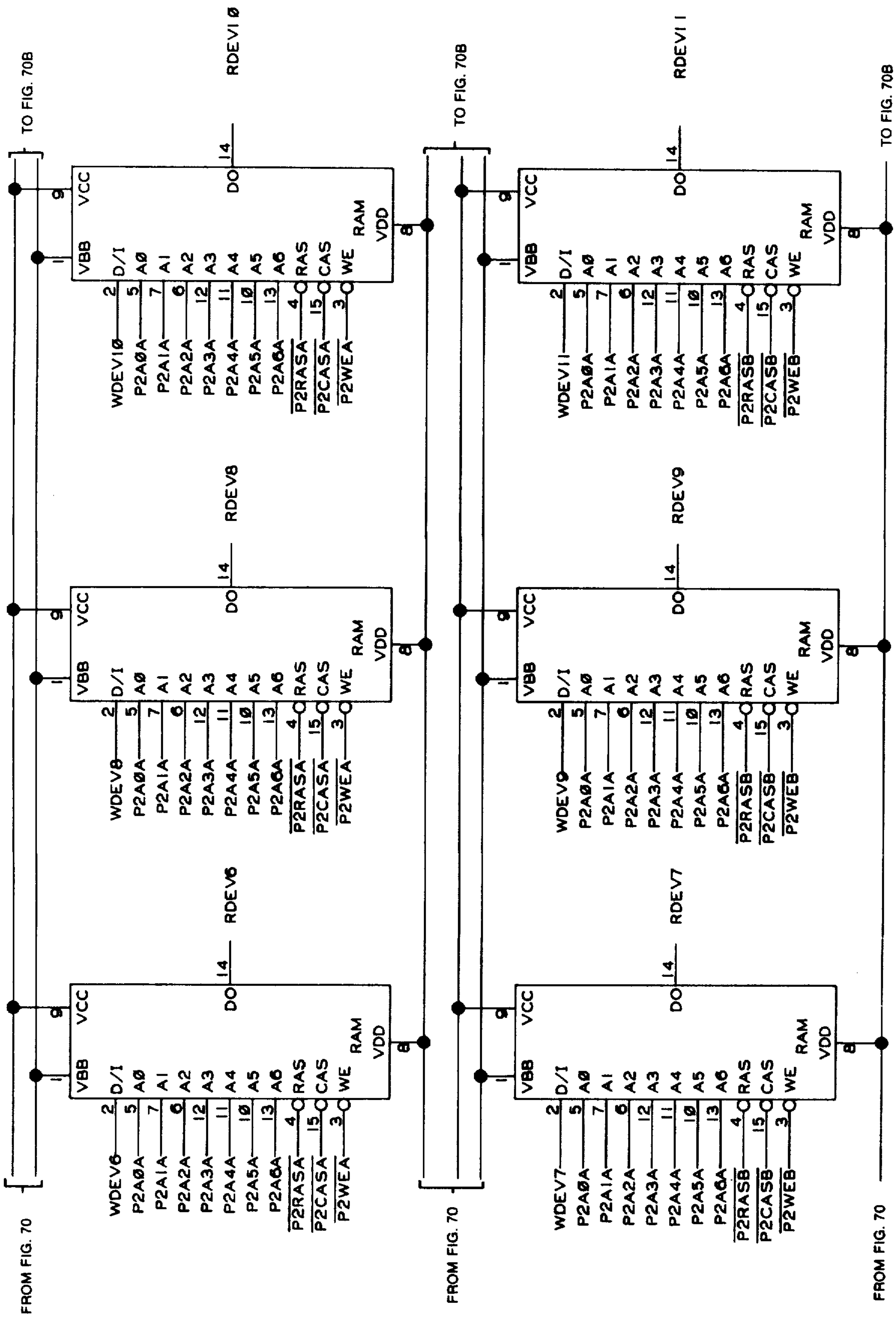
Figure 70B:
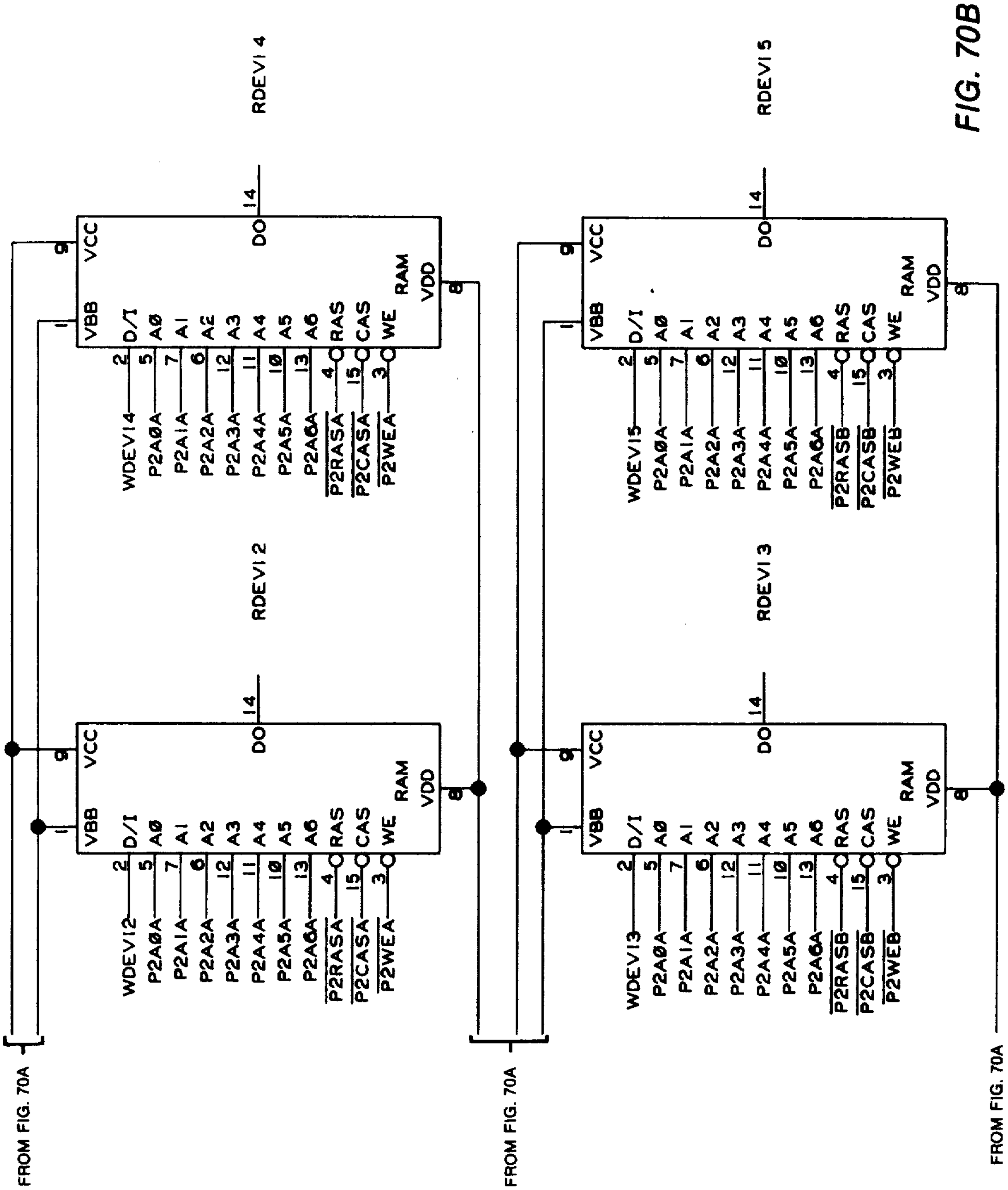
Figure 70C:
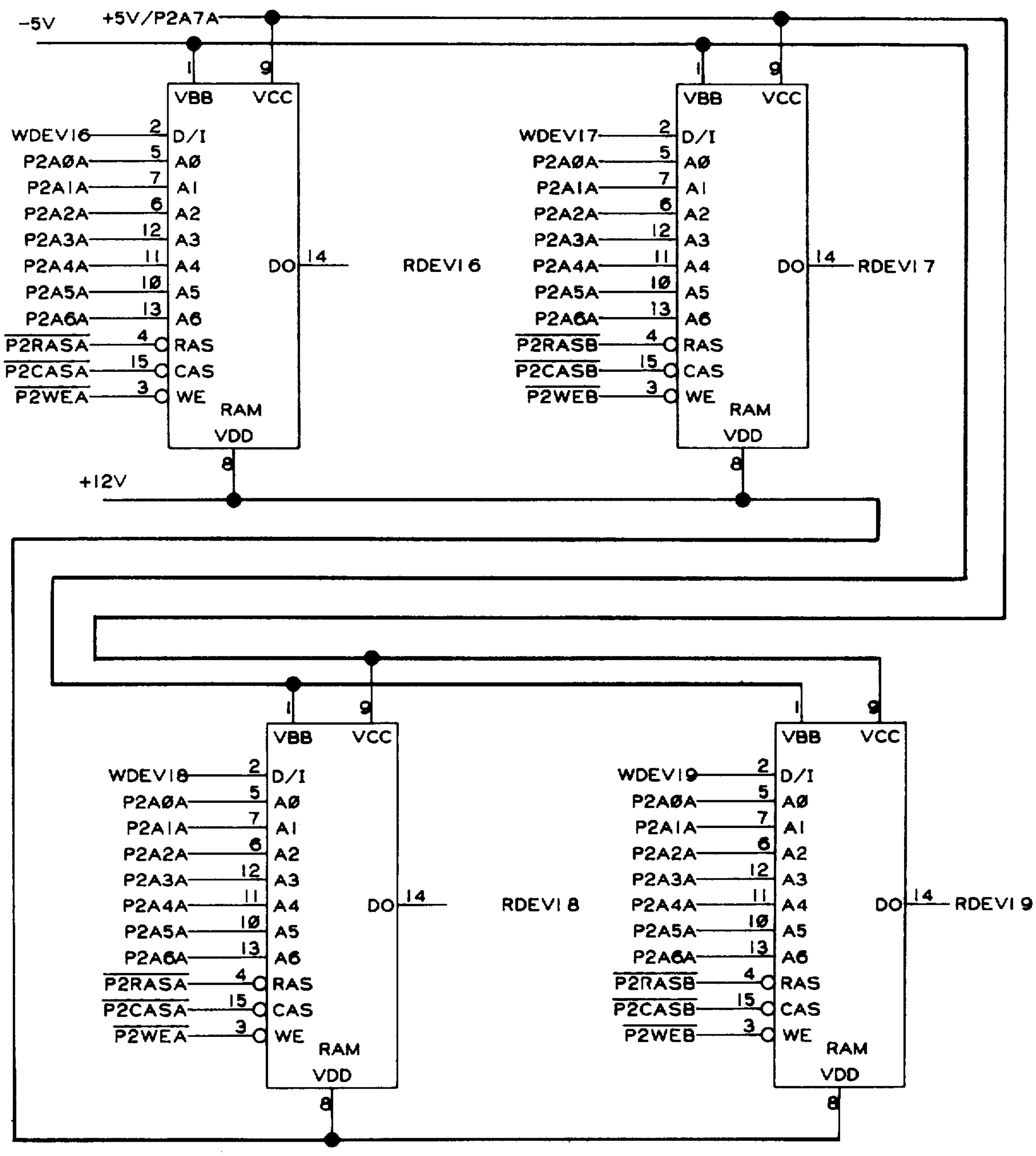
Figure 70D:
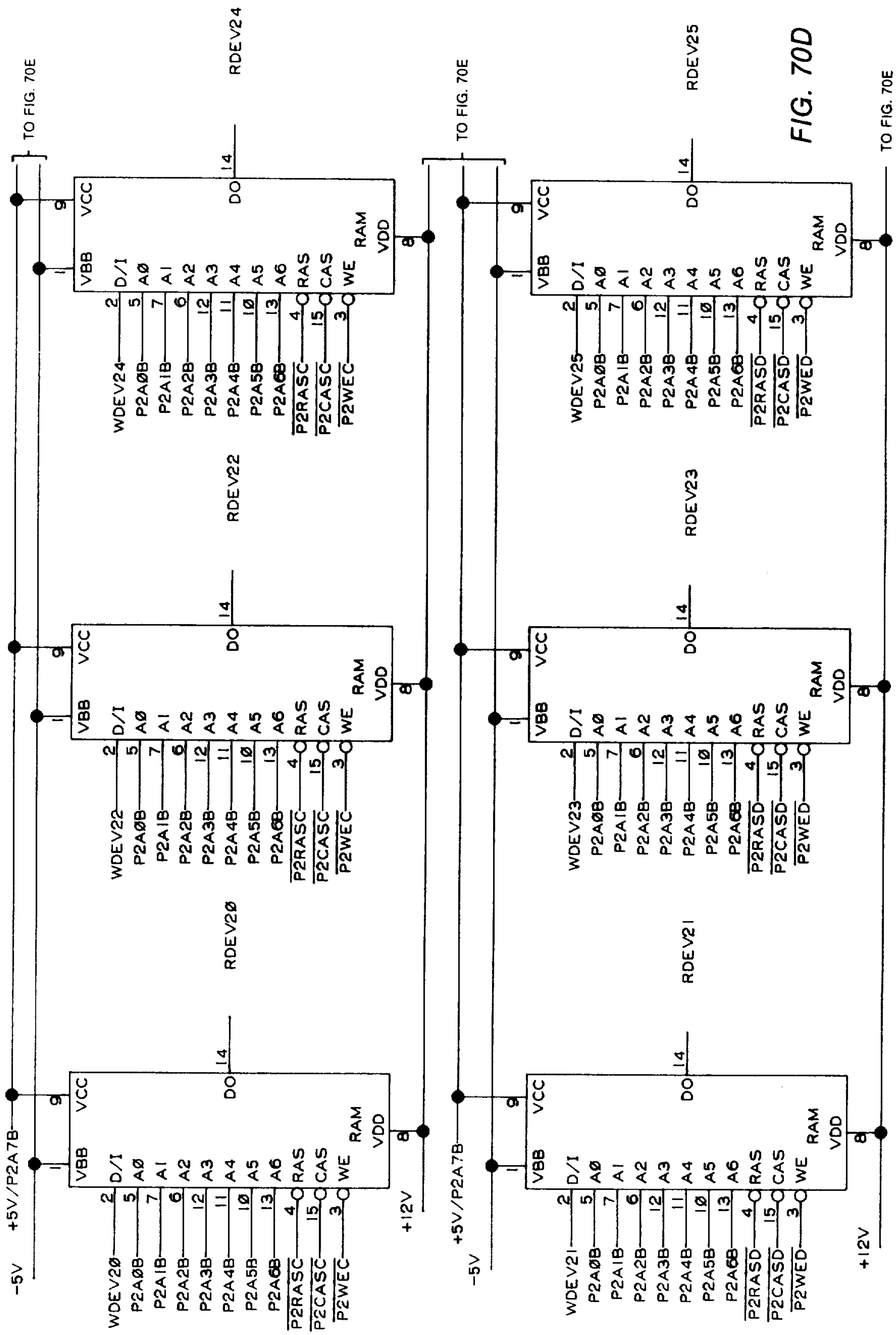
Figure 70E:
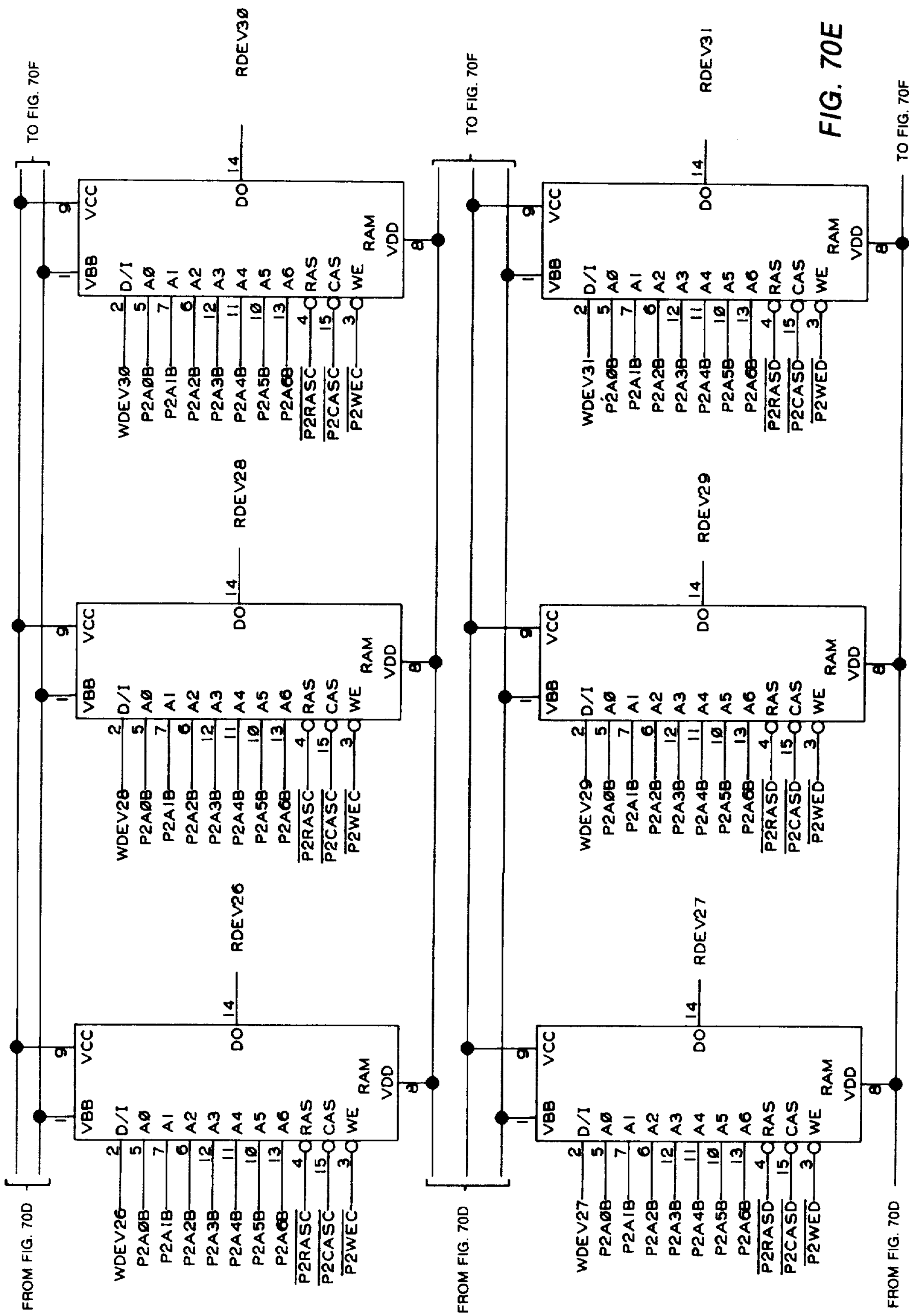
Figure 70F:
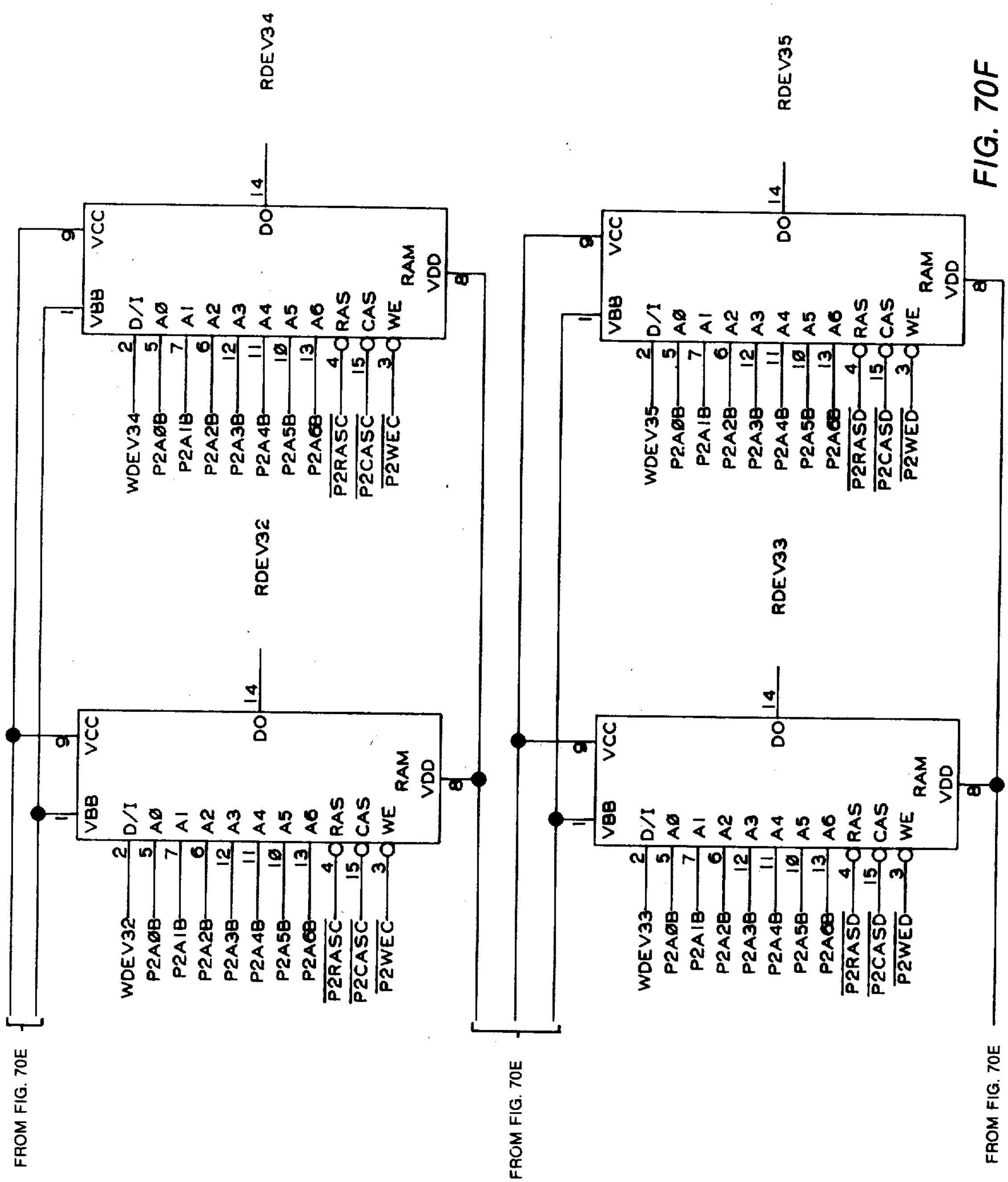
Figure 70G:
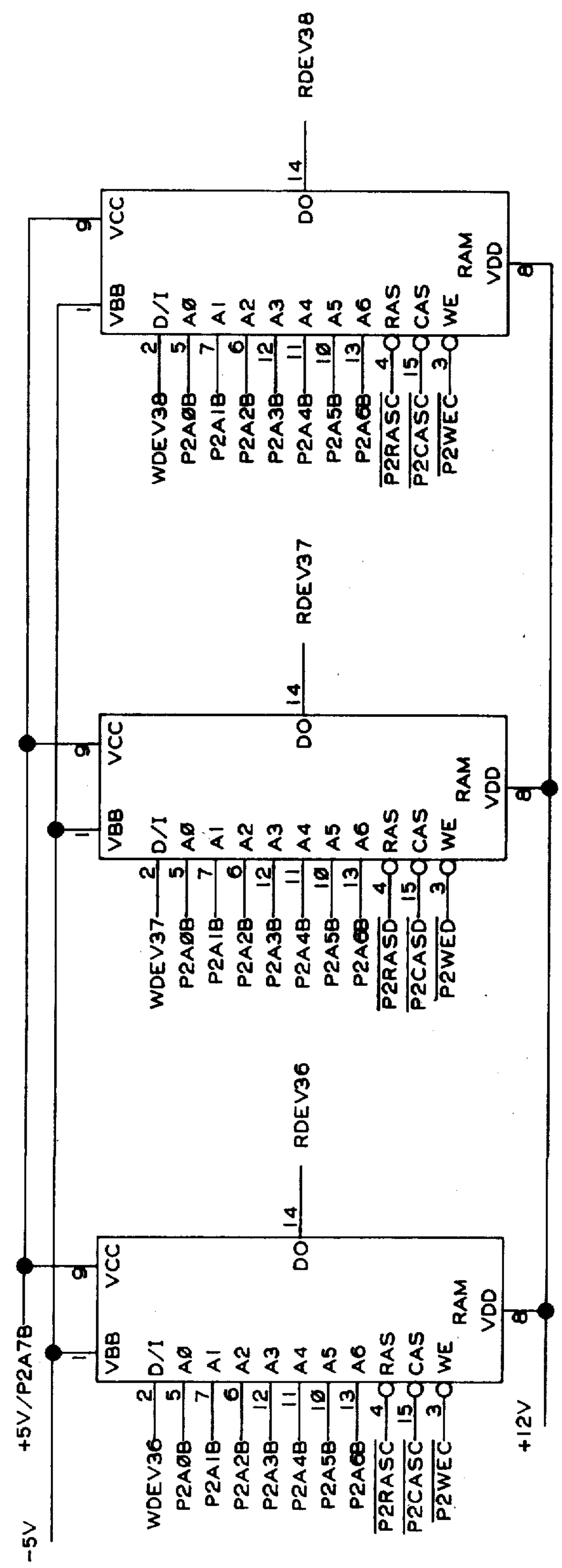
Figure 71:
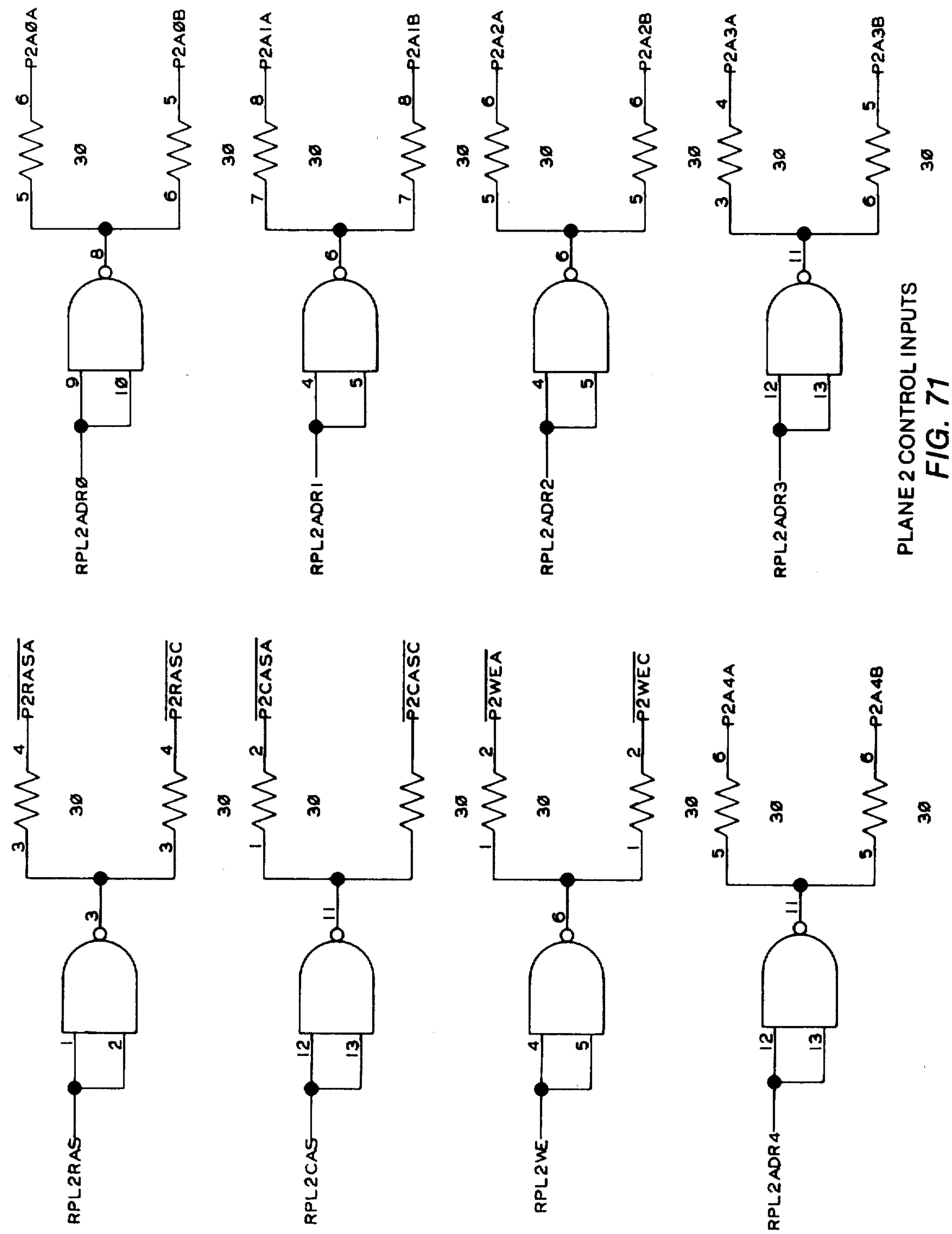
Figure 71A:
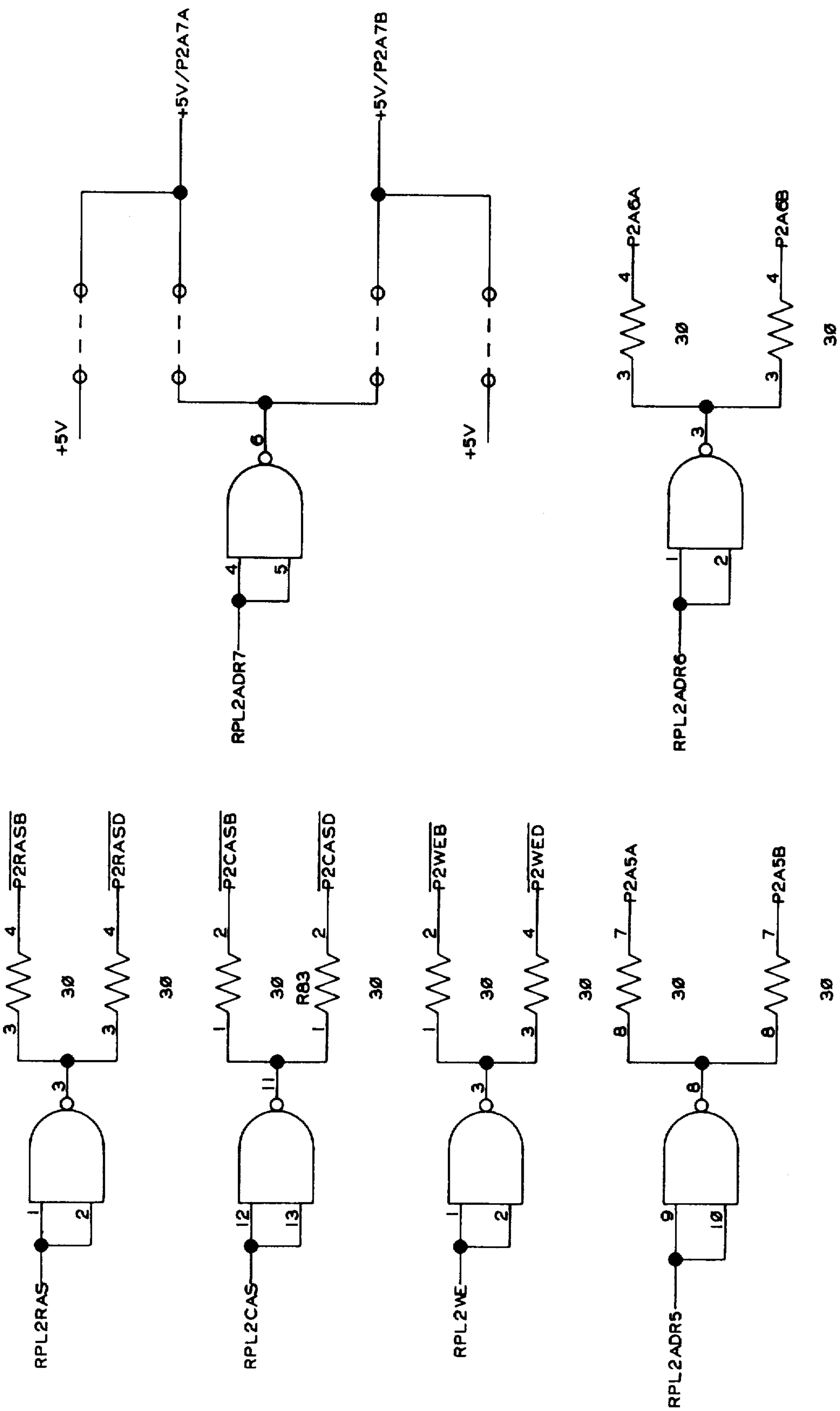
Figure 72:
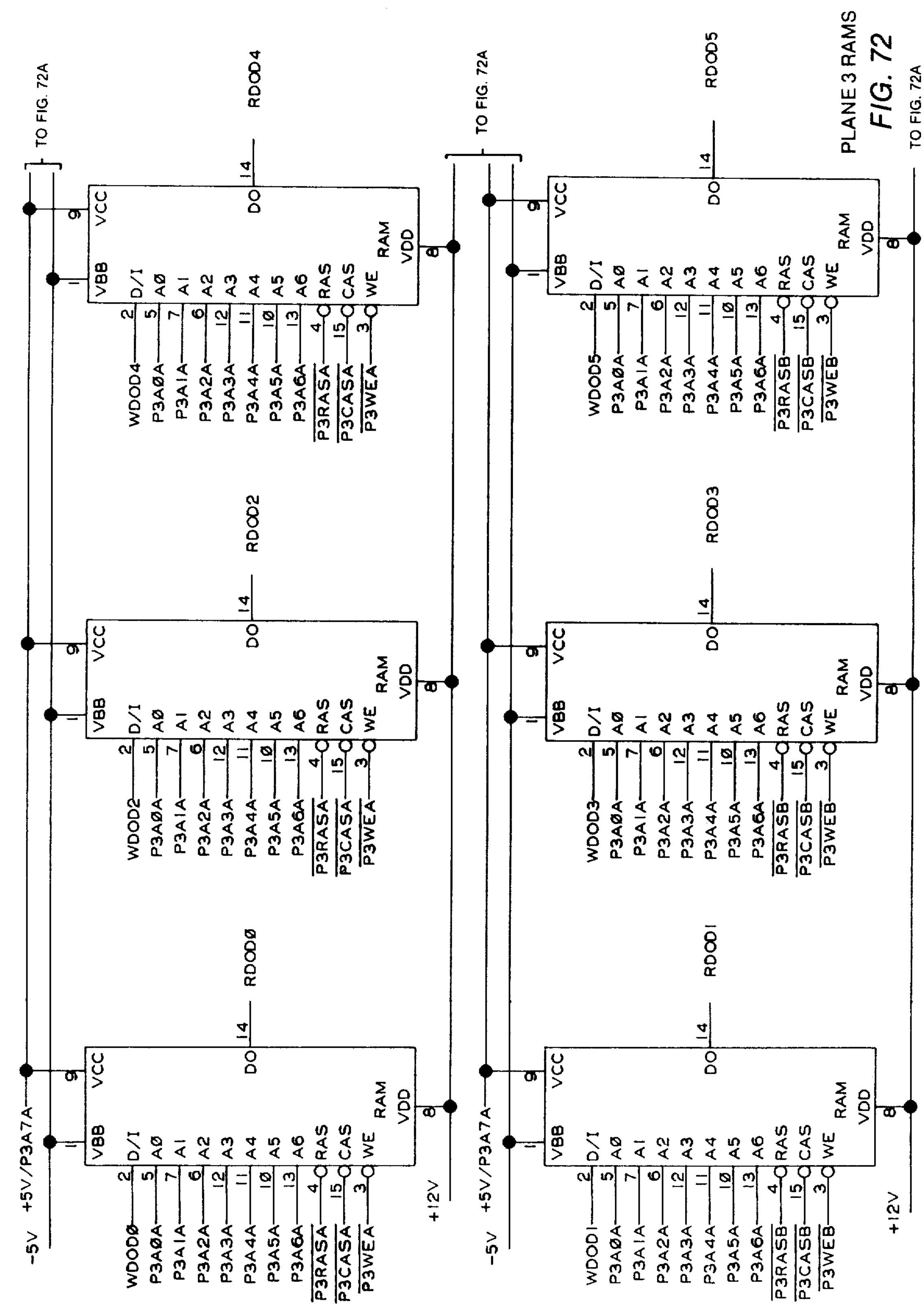
Figure 72A:
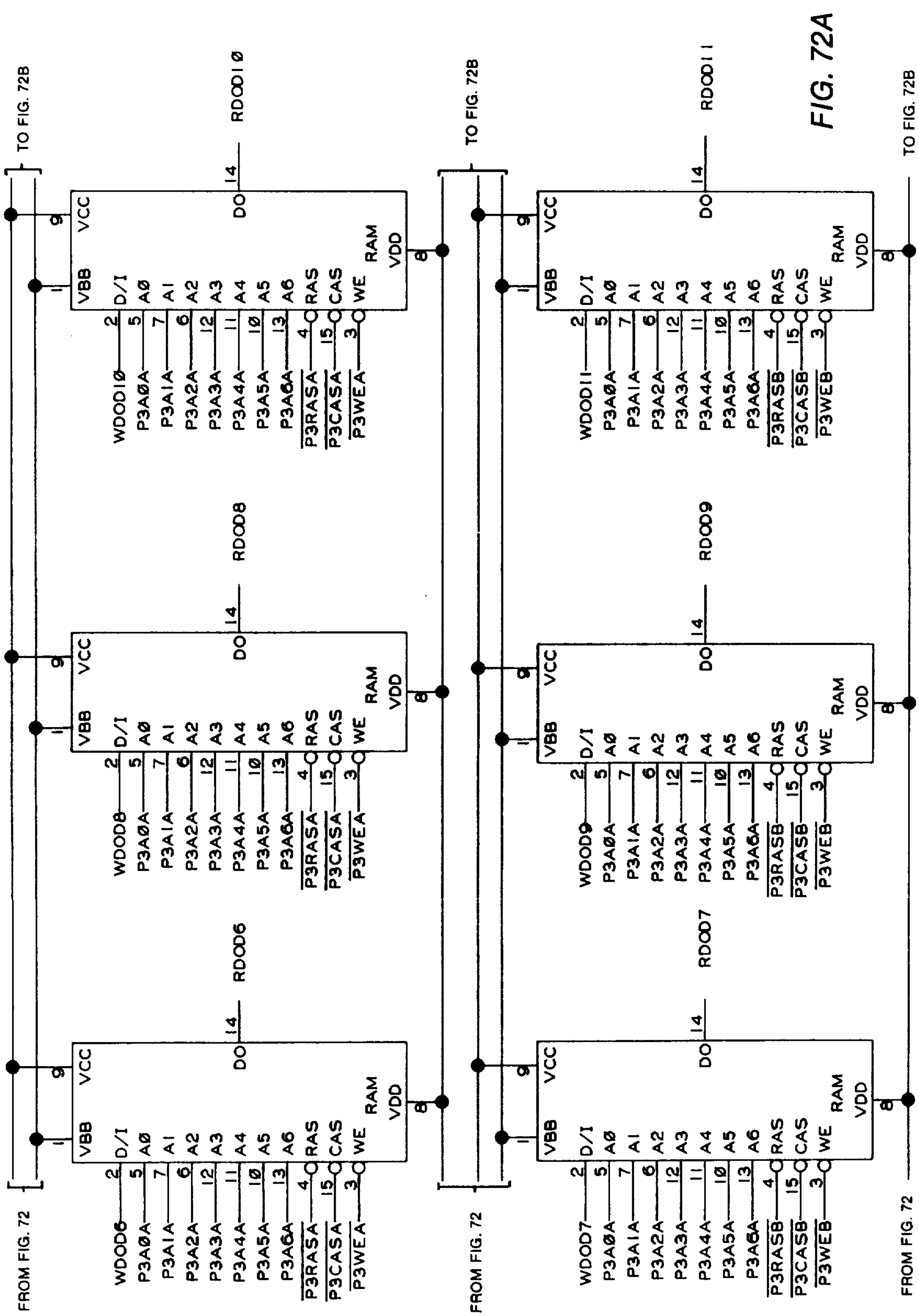
Figure 72B:
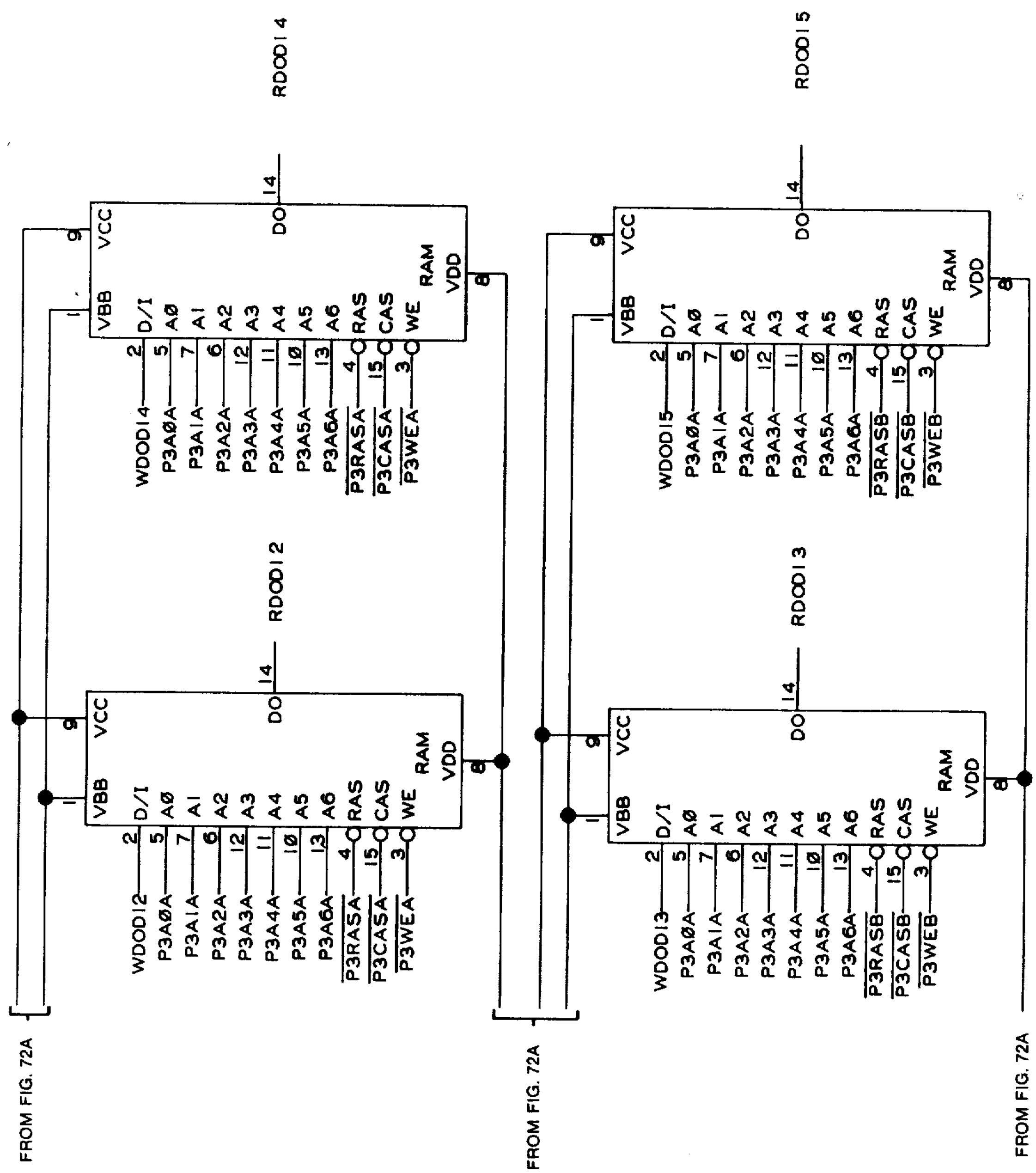
Figure 72C:
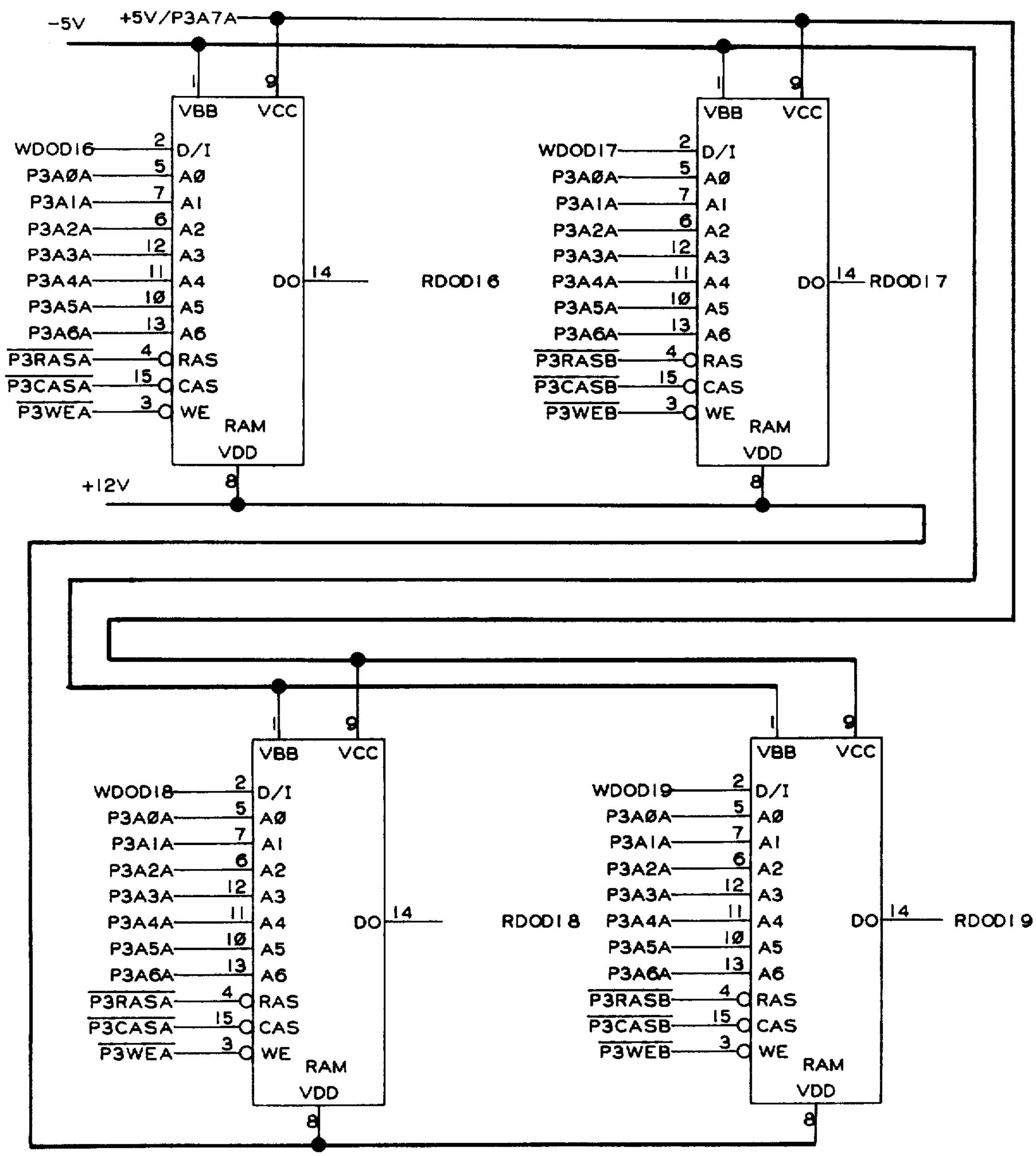
Figure 72D:
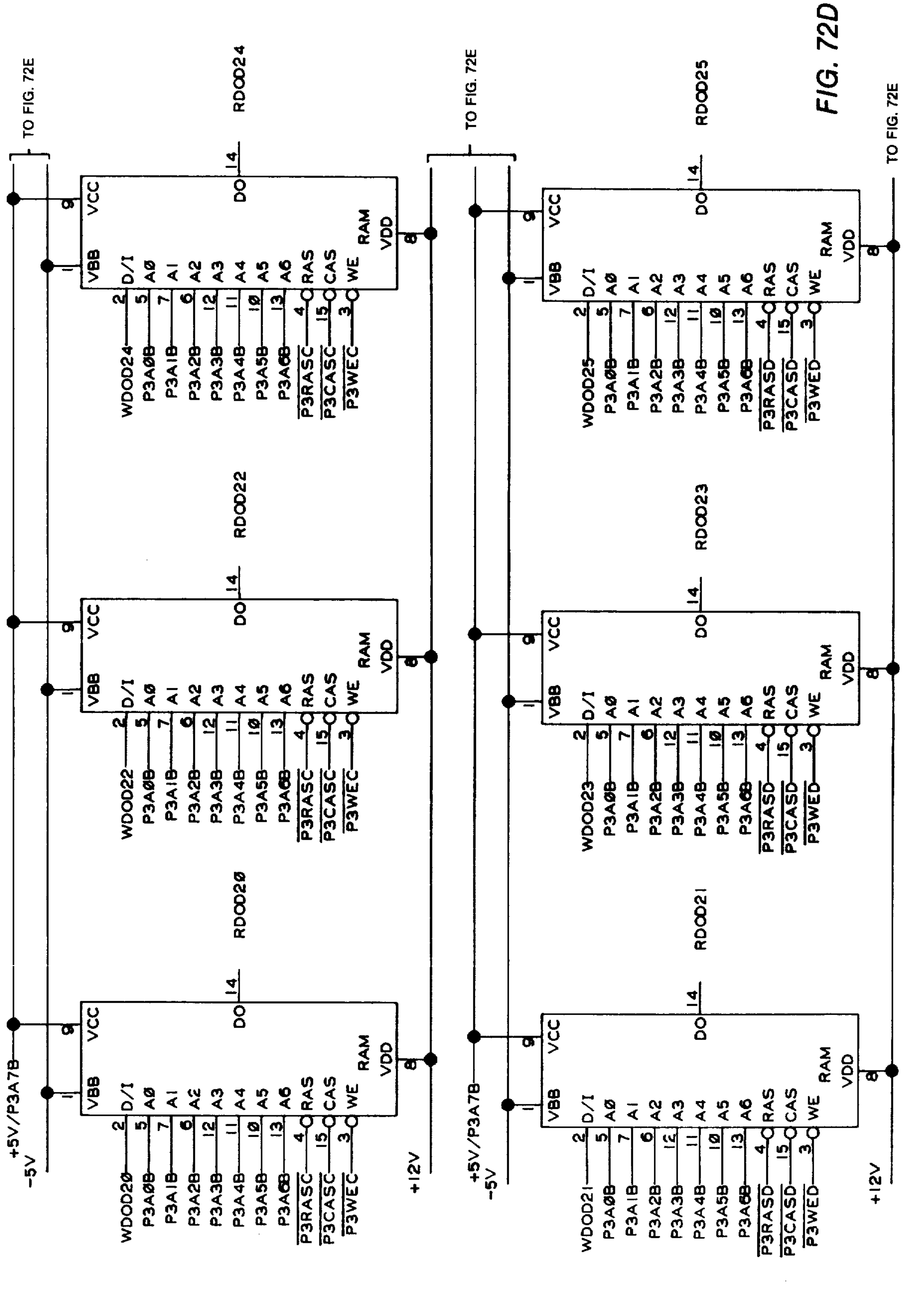
Figure 72E:
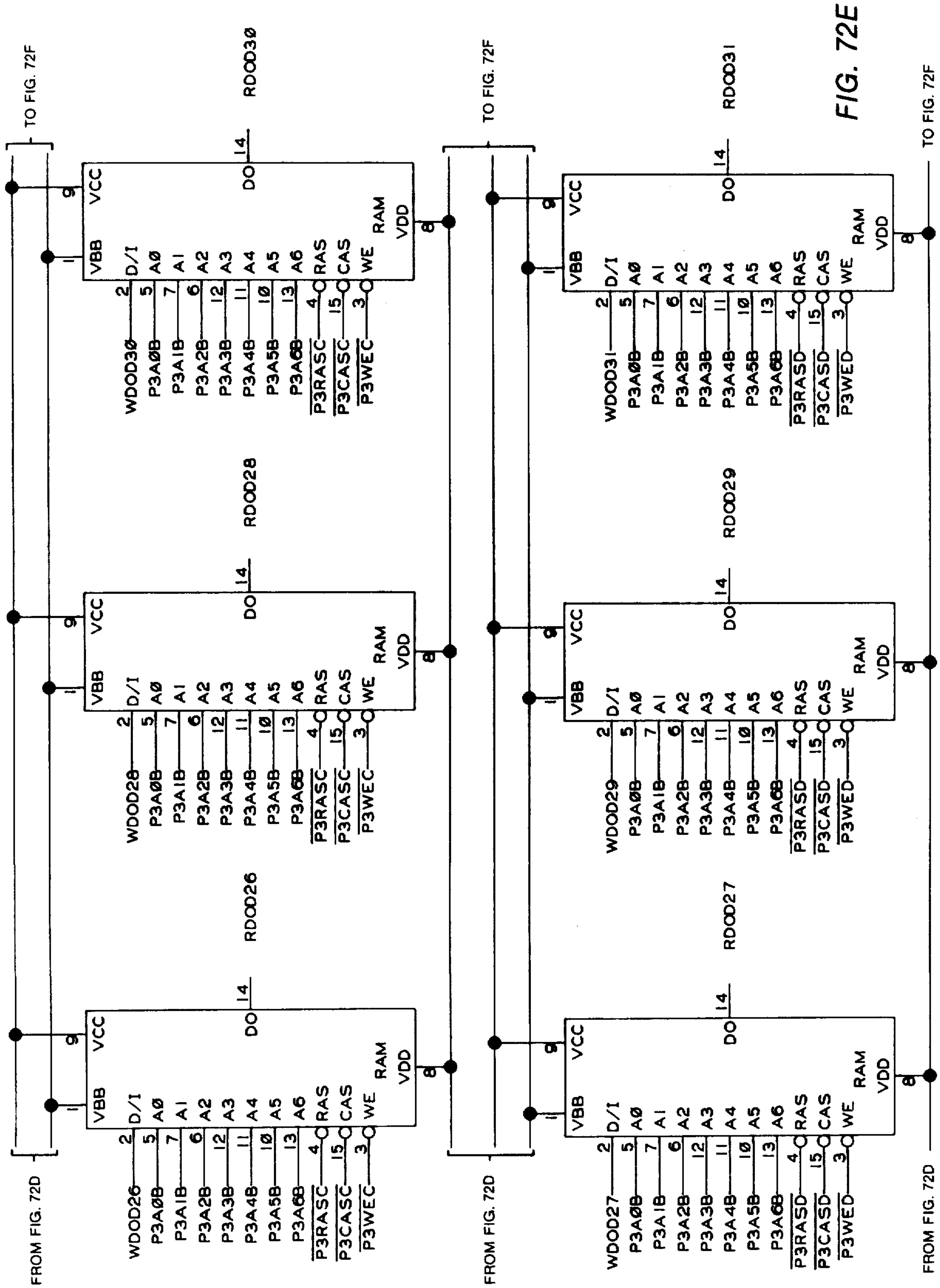
Figure 72F:
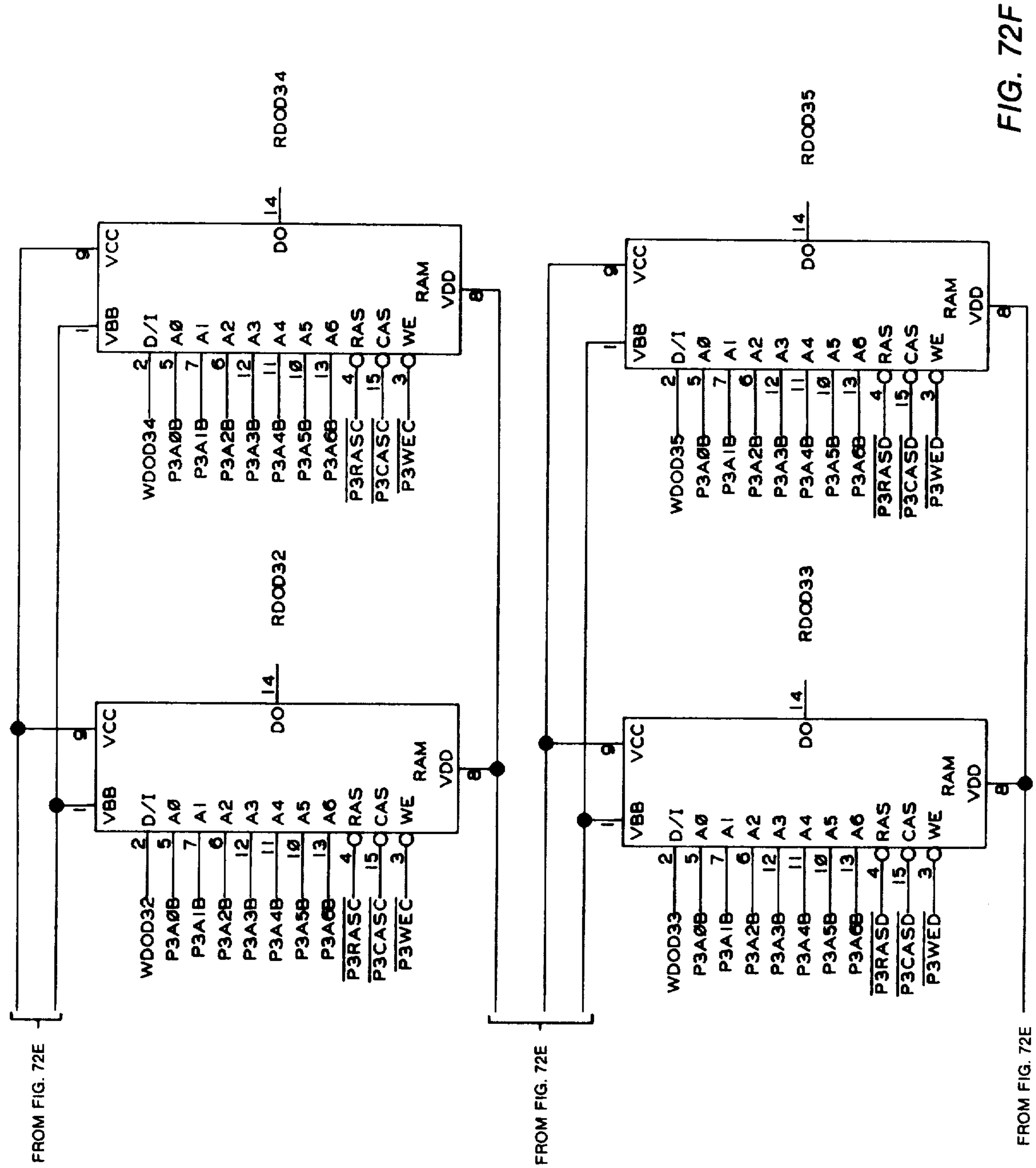
Figure 72G:
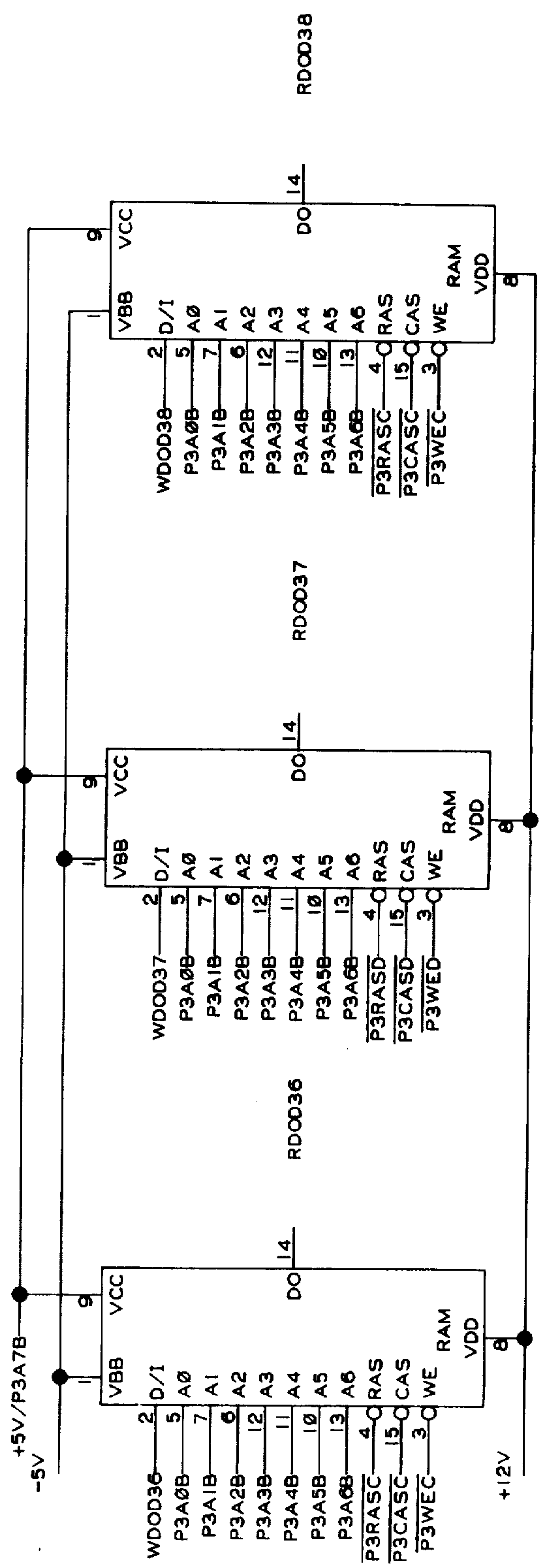
Figure 73:
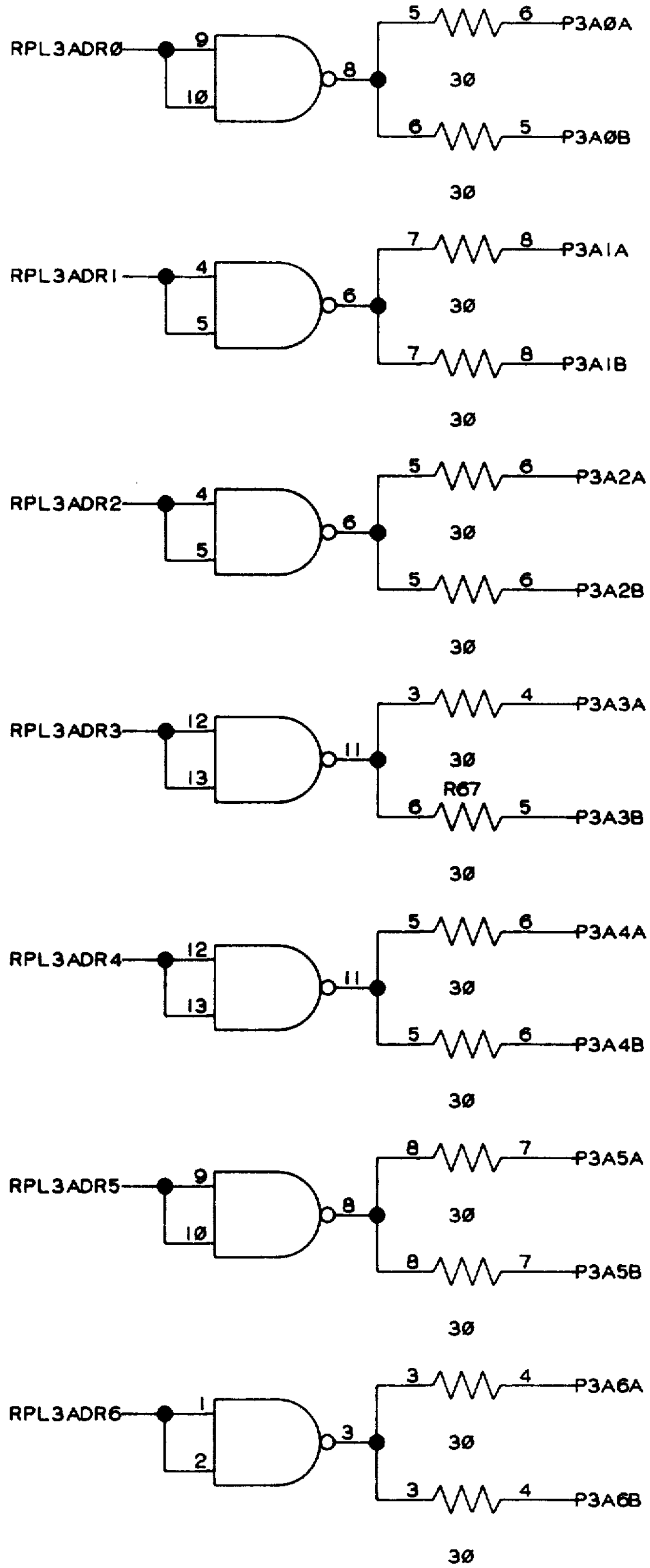
Figure 73A:
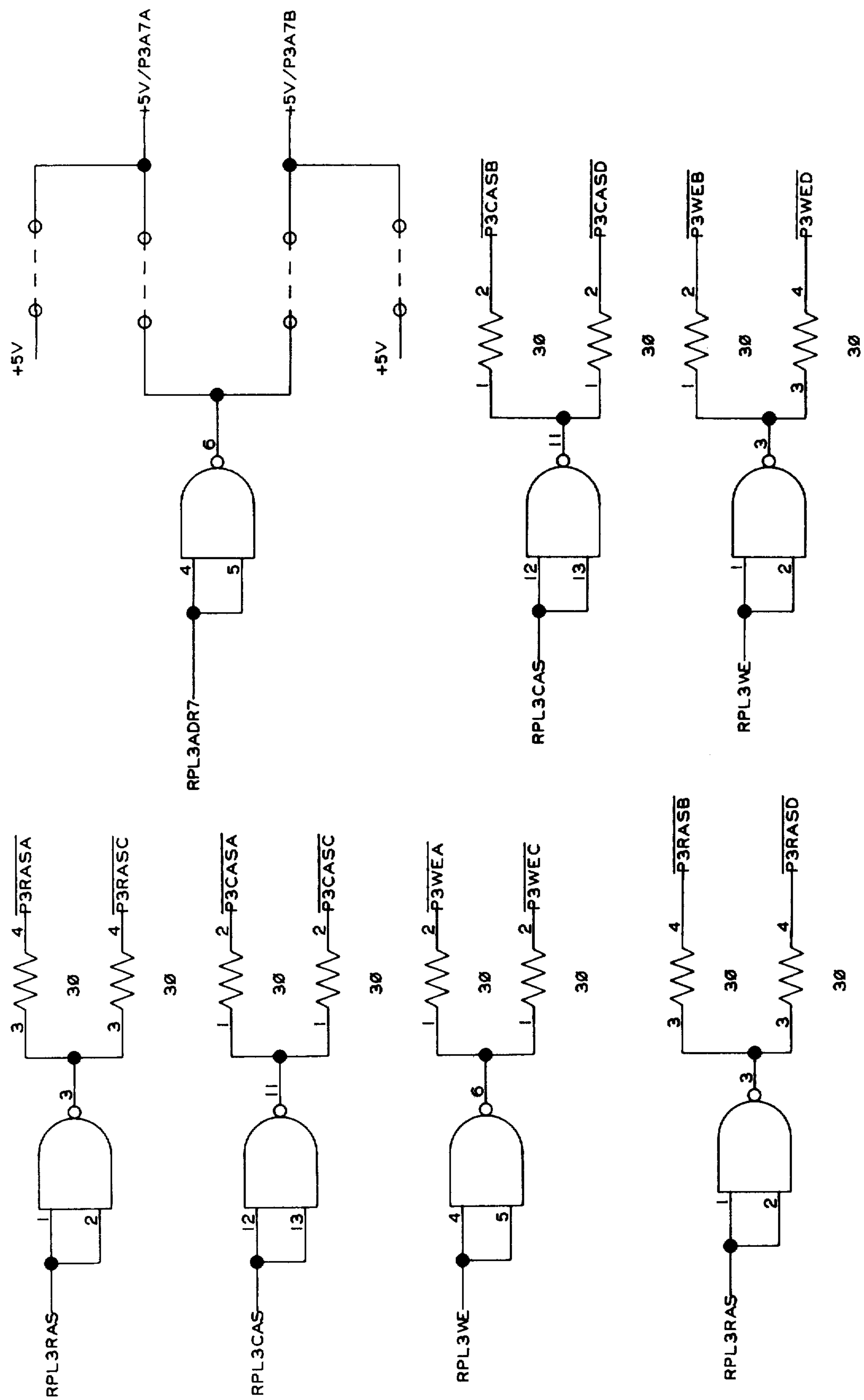
Figure 74:
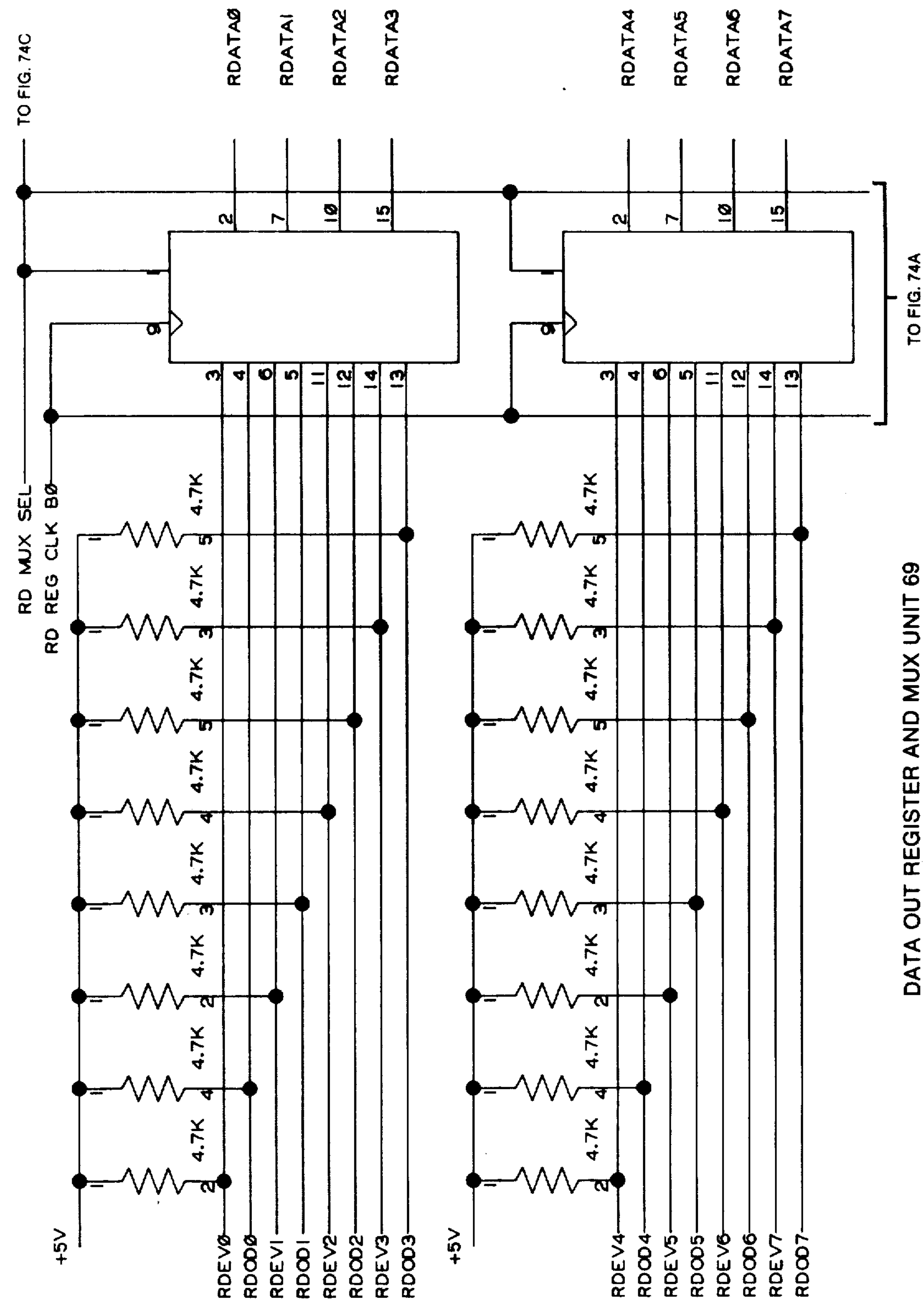
Figure 74A:
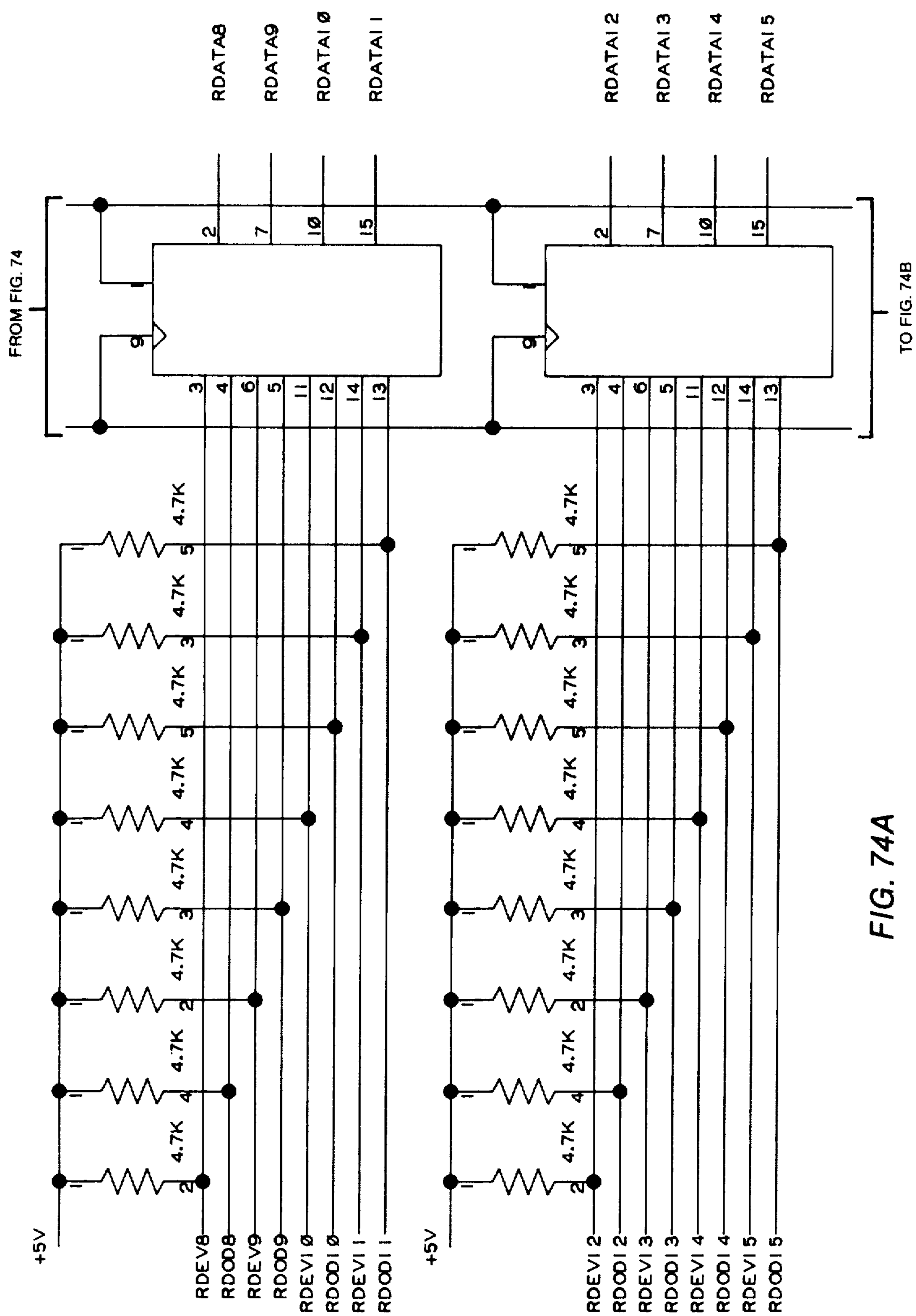
Figure 74B:
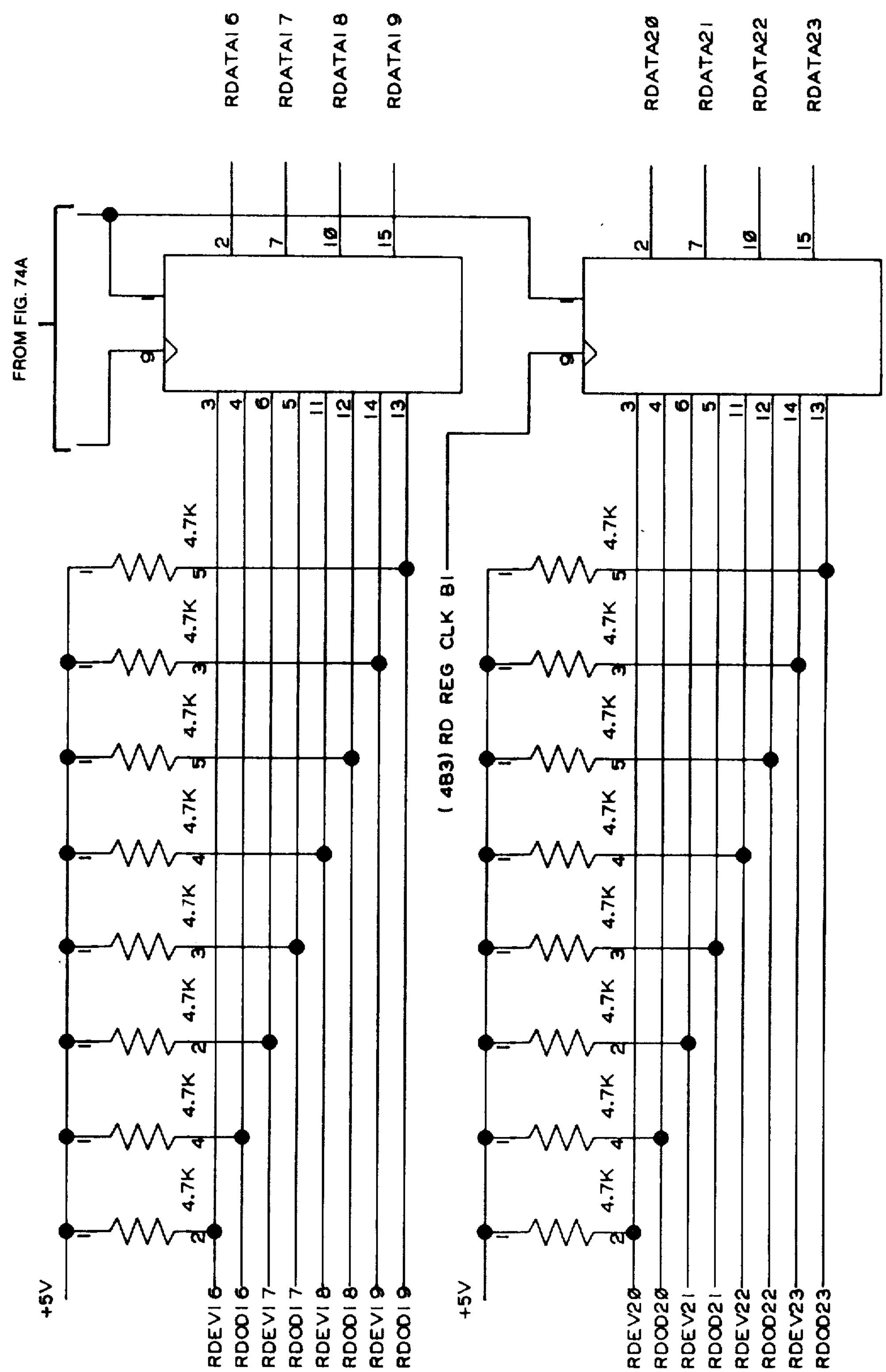
Figure 74C:
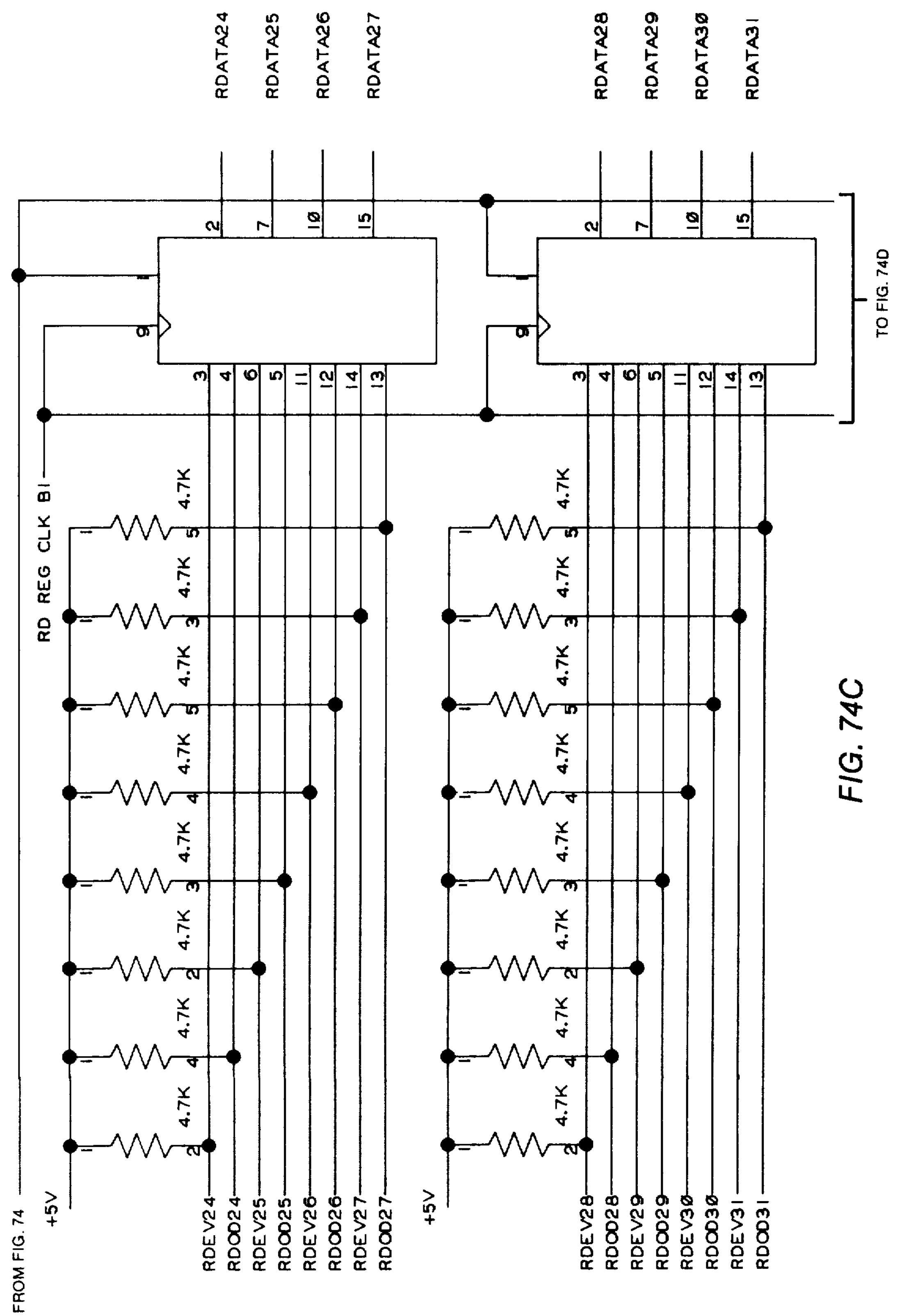
Figure 74D:
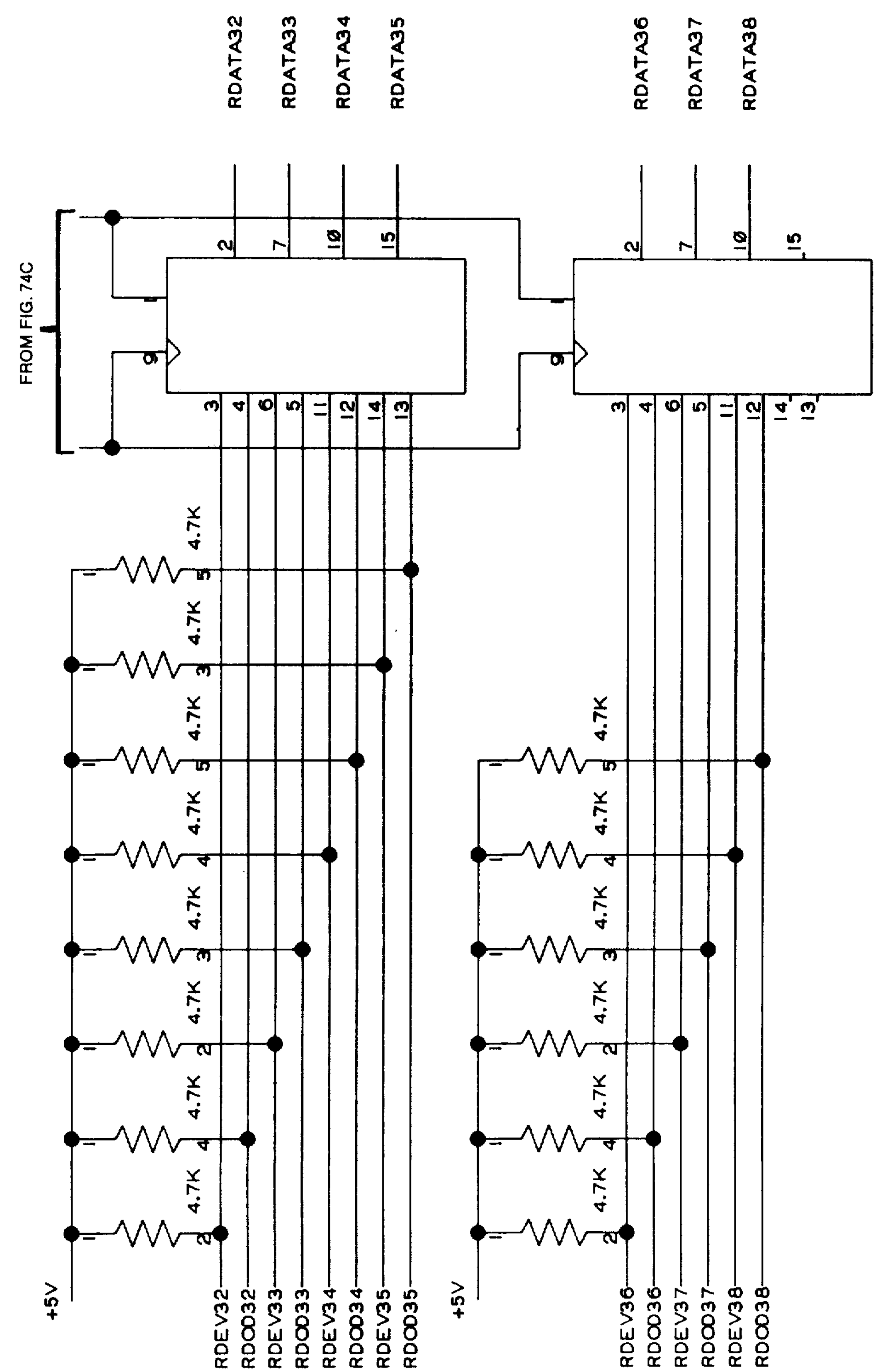
Figure 75:
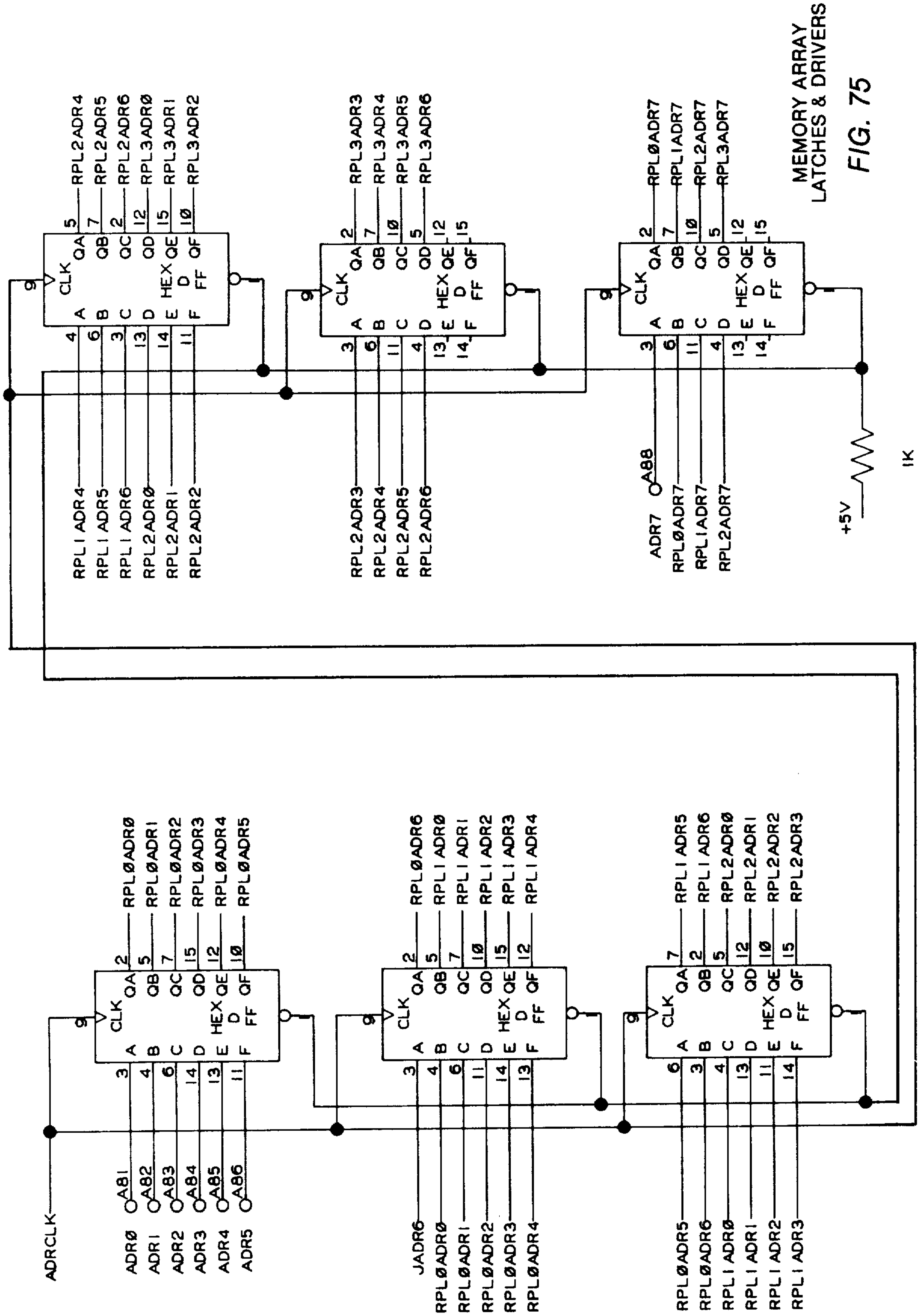
Figure 76:
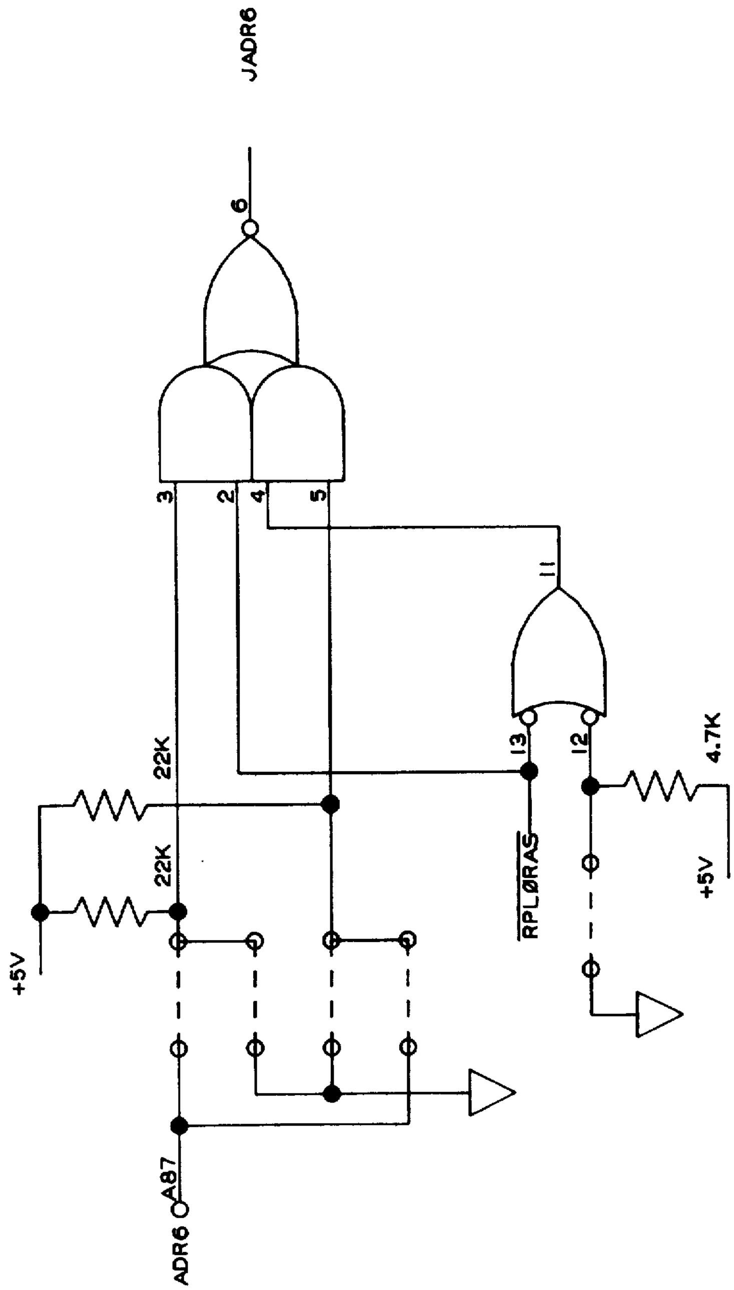
Figure 77:
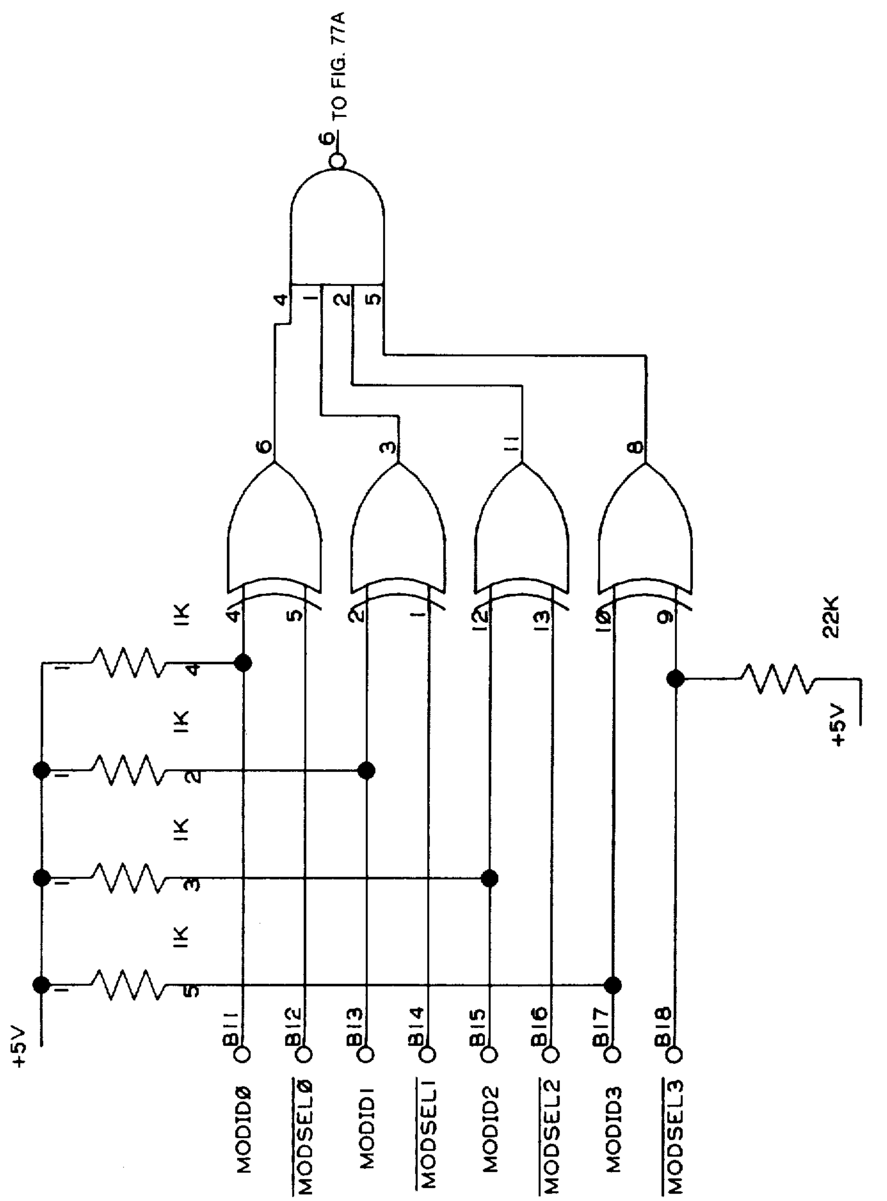
Figure 77A:
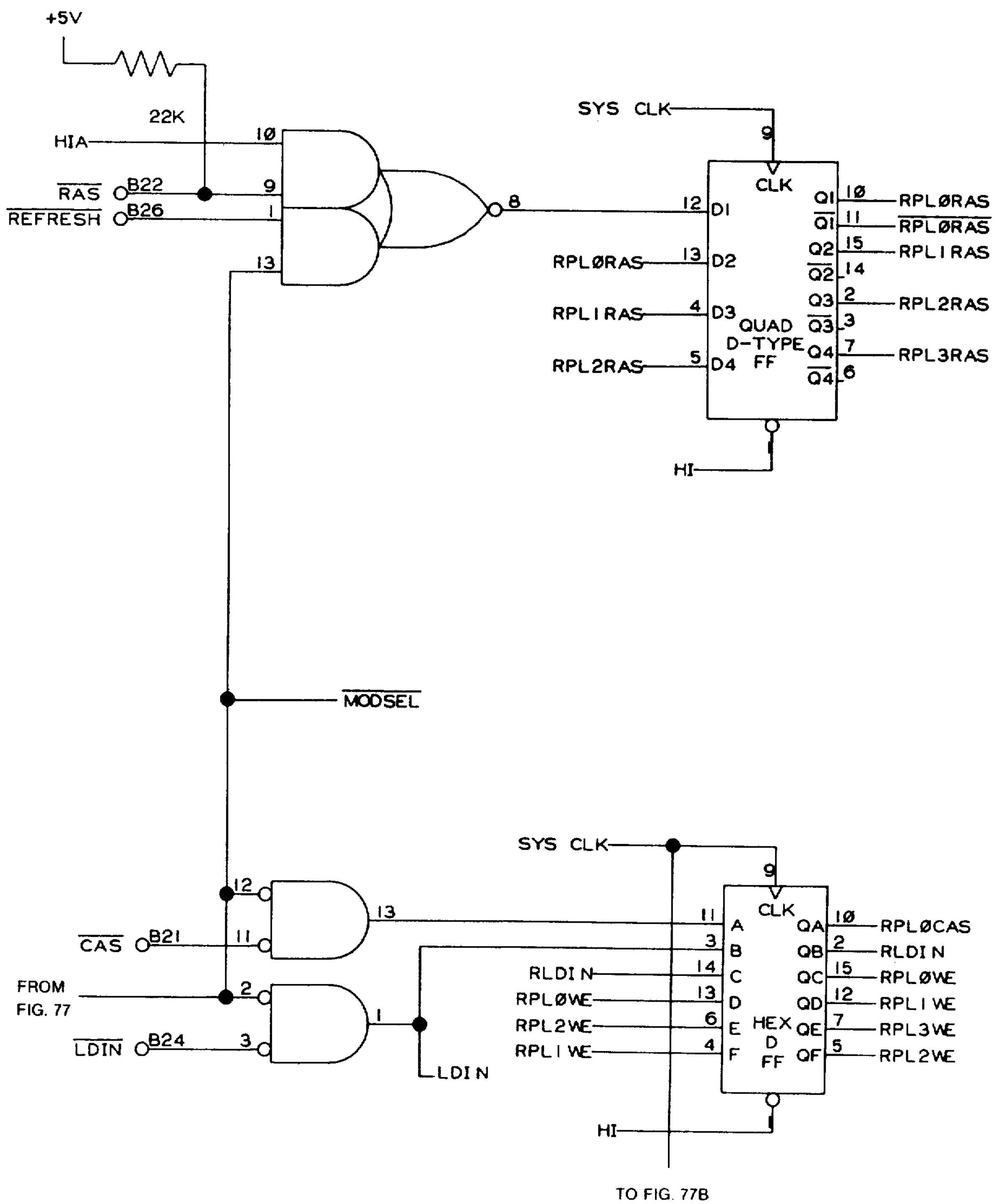
Figure 77B:
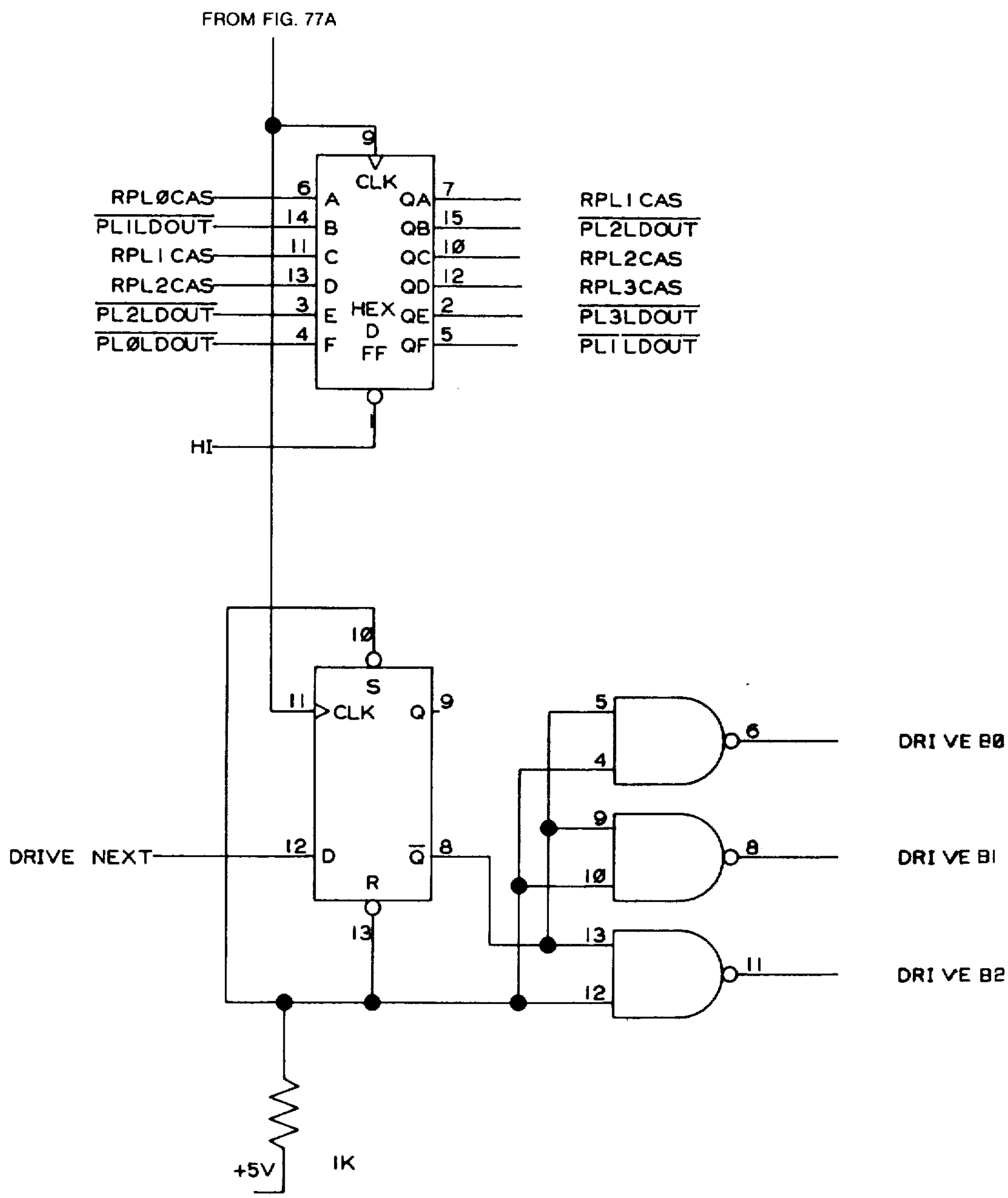
Figure 77C:
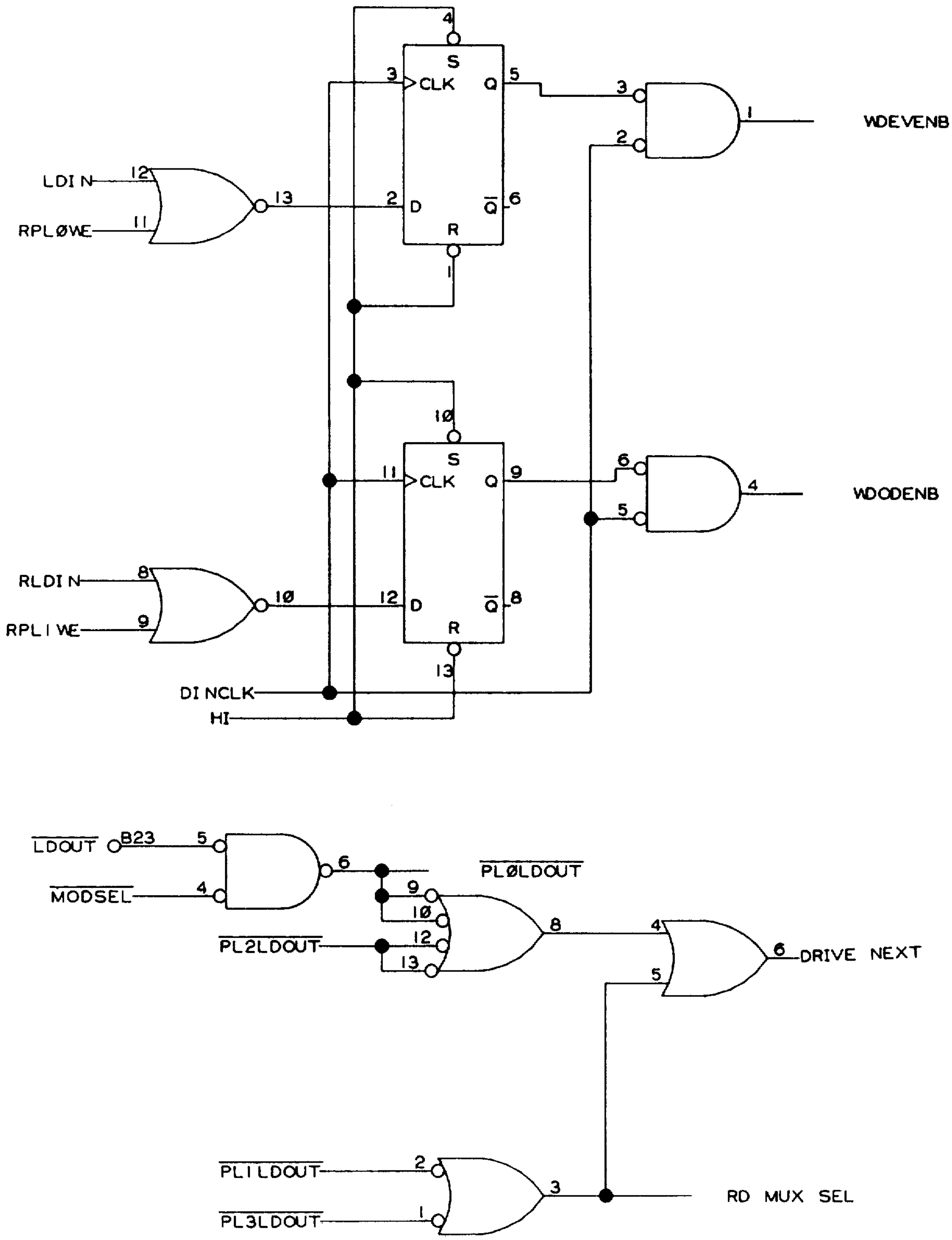
Figure 78:
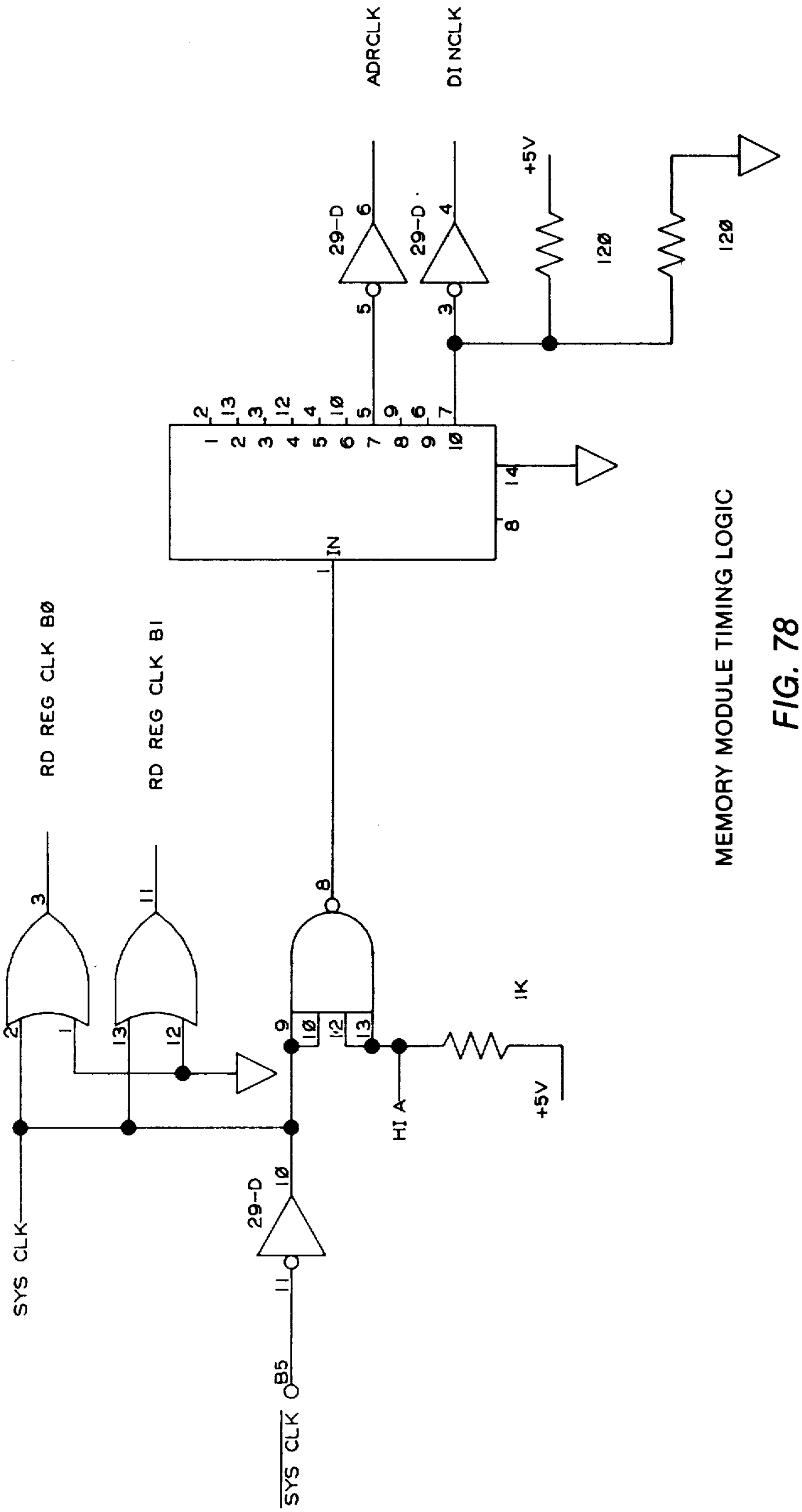

65. The module select code bits MOD SELØ-3 are supplied to a comparator 66 to provide a MODSEL signal if the particular module has been selected. Control signals from control logic 65 are supplied to appropriate latching circuitry 67 to provide appropriate signals for controlling the operation of the memory array via drivers 61. The control signals from the memory bank controllers are first clocked into the plane Ø latching registers 67A and the outputs thereof drive the plane Ø RAMs vis drivers 61A. The outputs of the first latch register are those clocked at a fixed time period later into the next latch register set 67B which drives the plane 1 RAMs. Such pipeline operation continues in order to drive the plane 2 and plane 3 RAMs such that all four RAM planes receive the same control signals at fixed intervals, resulting in the transfer of a block of four consecutive 39-bit words. While the RAM address from the bank controller includes eight bits, only seven More specific detailed logic circuitry for implementing the units shown in the block diagram of FIG. 4 to achieve the desired operation as described above are shown in FIGS. 64-78. Data in registers 63 and 64 are shown in FIGS. 64 and 65, respectively. The memory array 60 is shown in FIGS. 66-73 wherein plane Ø RAMs and the control input circuitry therefor are shown in FIGS. 66 and 67; plane 1 RAMs and the control input circuitry therefor are shown in FIGS. 68 and 69, plane 2 RAMs and the control input circuitry therefor are shown in FIGS. 70 and 71, and plane 3 RAMs and the control input circuitry therefor are shown in FIGS. 72 and 73. The data out register and multiplexer unit 69 are shown in FIG. 74. Latching and driver logic is shown in 75. The RAM select logic unit (RAMSEL LOGIC) is shown in FIG. 76, while the MODSEL comparator unit 66 and the various control logic units and latching circuitry associated therewith and with the input control signals from bank controller unit 18 are shown in FIG. 77. Memory module timing logic is shown in FIG. 78.

ADDRESS TRANSLATION UNIT

Figure 79:
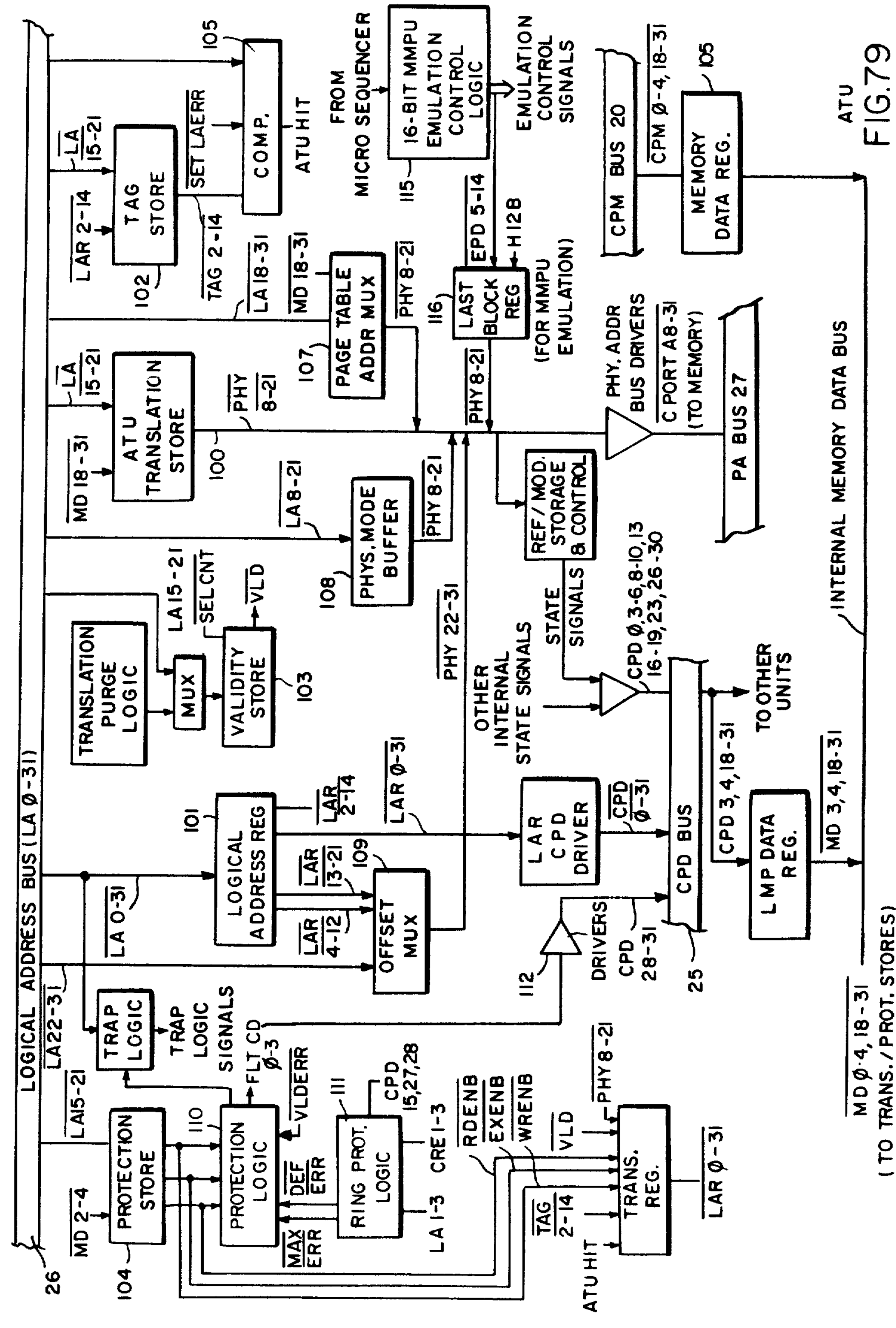
FIGS. 79–81 show block diagrams which represent the address translation unit of the system of FIG. 1.
Figure 80:
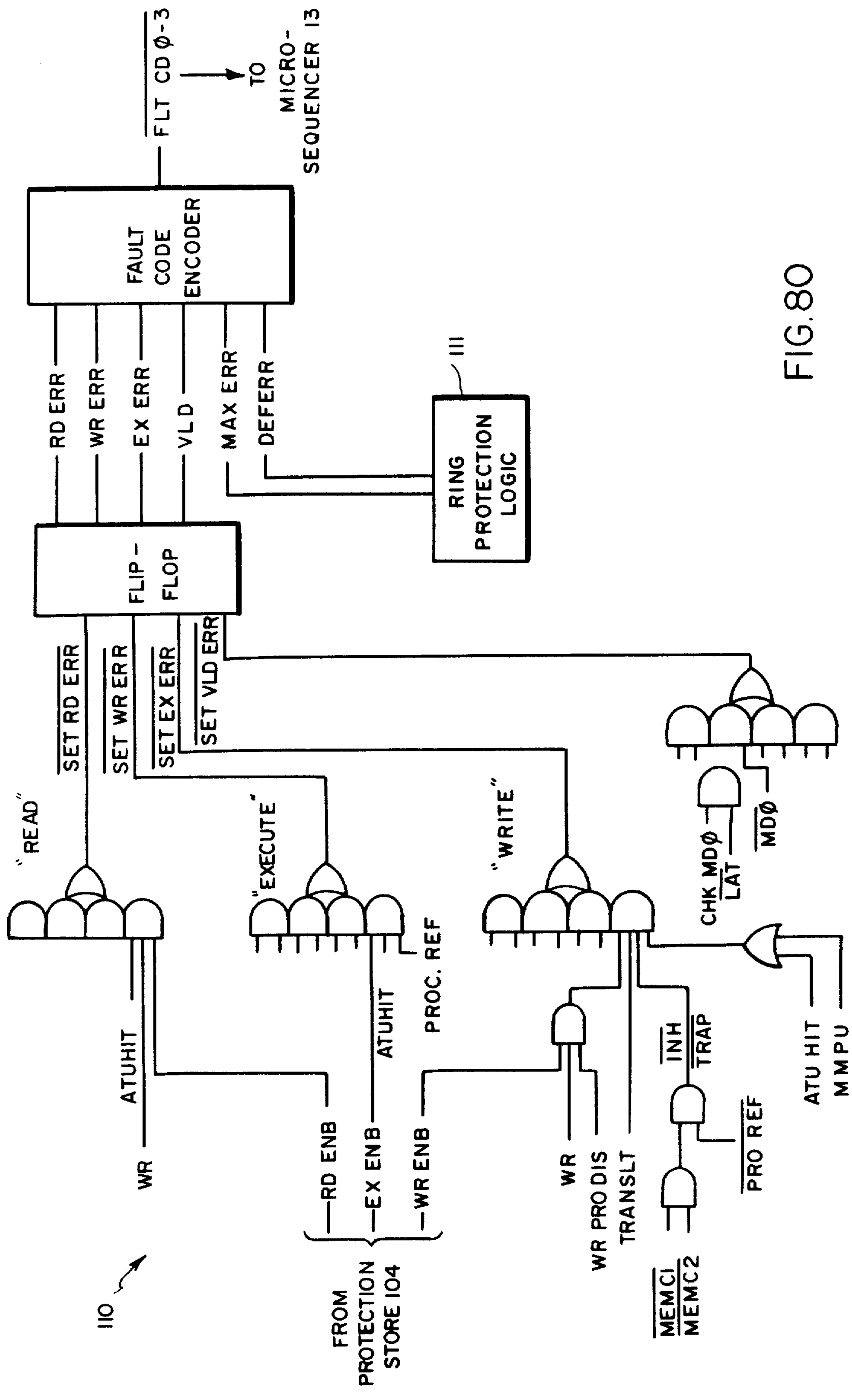
Figure 81:
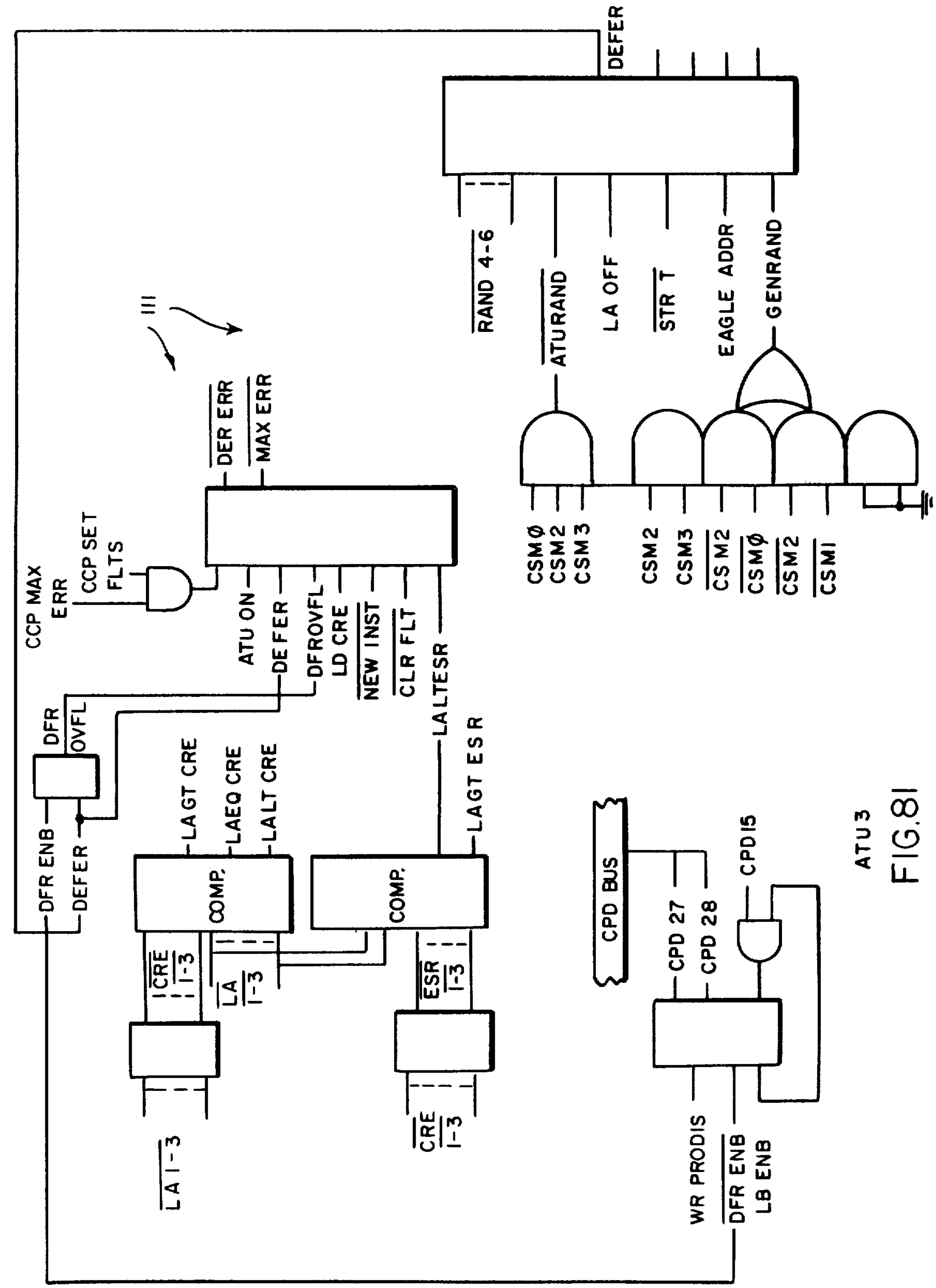

The address translation unit (ATU) 14 is shown broadly in FIGS. 79–81, the primary function of such unit being to translate a user's logical address (LA) into a corresponding physical address (PA) in the physical address space of the processor's memory modules discussed above. Such translation is effectively performed in two ways, one, by accessing a page from the system cache or from main memory at the particular page table entry specified in a field of the logical address and placing the accessed page in a translation store unit for use in performing the address translation, a sequence of operations normally designated as a Long Address Translation (LAT) and, the other, by accessing additional references to a page that has already been selected for access after an LAT has been performed and the page selected by the LAT is already present in the translation store. The latter translation provides an accelerated address reference and can be accomplished by saving, at the end of every Long Address Translation, the address of the physical page which has been accessed. As mentioned, the physical page involved is stored in a high speed random access memory (RAM) file designated in FIG. 79 at ATU translation store 100.

Translations of addresses on the physical page which is stored in the ATU translation store 100 are available to the processor within one operating time cycle of the CPU, while normally the Long Address Translation will take a plurality of such cycles for a reference which requires a single level page table reference (e.g. 3 cycles) or a two-level page table reference (e.g. 5 cycles), where the page in question is available in the system cache memory. Even longer times may be required if the page involved can not be found in the system cache memory and must be accessed from main memory.

A secondary function of the ATU is to emulate all operations of the previous system of which the present system is an extension, e.g., in the system described, to perform all Eclipse memory management processor unit (MMPU1) address translation operations, as described in the above referenced publication for such systems, in an efficient and compatible way, such emulated operations being described in more detail later.

In order to understand more clearly the translation of a logical word address (a byte address when shifted right by one position produces a word address), the logical word address can be defined as shown below:

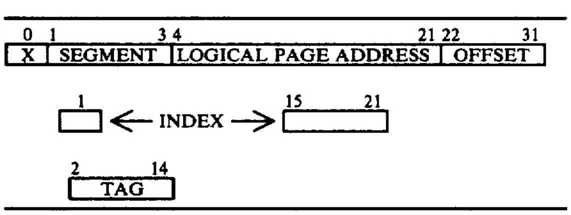

As seen therein, the segment and logical page address is 21 bits long, the segment and logical page address being divided into two fields, the Tag field and the Index field. The Tag field is defined as bits LA 2–14 while the Index field is defined as bit LA 1 plus bits LA 15–21.

As seen in FIG. 79, when a logical word address LAØ–31 is received from the arithmetic logic unit (ALU) on the logical address bus 26 it is latched into a logical address register (LAR) 101. The Index bits LA 15–21 are taken directly from the logical address bus to address four RAM stores, the first being a Tag store 102, which retains the tag portions of the logical addresses corresponding to the physical addresses saved in the ATU physical address (PA) translation store 100. The Index bits LA 15–21 are also supplied to a validity store RAM unit 103 and to a protection store RAM unit 104, as discussed below.

If the physical address translation store 100 contains valid address translations, when a memory access is started the logical address is loaded into the logical address register 101 and the Index (bits LA 15–21) is used to select a location in the store.

In the particular system described, even though there is a valid address translation at such location in translation store 100, it may not be the correct one. Corresponding with each index of the logical address (and each address location in the translation store) there are a selected number of possible "tags", each tag corresponding to a unique physical page address. Only one of such tags and its corresponding physical page address can be saved in the translation store 100 at the location selected by the Index. Therefore the "tag" (TAG 2–14) that corresponds to the Index in question and is currently stored in the tag store 102 is compared at comparator 105 to the "tag" in the logical address register (LA 2–14). If the "tags" correspond, the address translation contained in the translation store 100 is the correct one and can be used to supply the desired physical address (signified by an ATU HIT signal at the output of comparator 105). If they do not match, a Long Address Translation operation must be performed to obtain the desired physical page address from the system cache or main memory. The physical page address which is thereby accessed by such LAT procedure to replace the physical page address previously contained in the ATU translation store 100 is placed on the appropriate transfer bus (CPM bus 20). At the completion of the long address translation, the "tag" taken from the logical address register (LAR 2–14) is written into the tag store 102 at the location selected by the index and the physical page address from the memory data register 106 (MD 18–31) is written into the translation store 100 at the location specified by the index.

The ATU configuration shown in FIG. 79 also contains further components which are used to place the translated physical address of a desired physical page table on the physical page address (PA) bus 27. There are three other possible sources of physical page table addresses, the first of which is bits SBR 18–31 of a segment base register which segment base register can also be located in scratch pad units of the address translation unit. This address is used to reference either a high order page table (HOPT) of a two-level page table or the low order page table (LOPT) of a one-level page table. Since the segment base registers are located at the ATU, such address can be obtained from the logical address bus 26 as LA 18–31.

Figure 157:
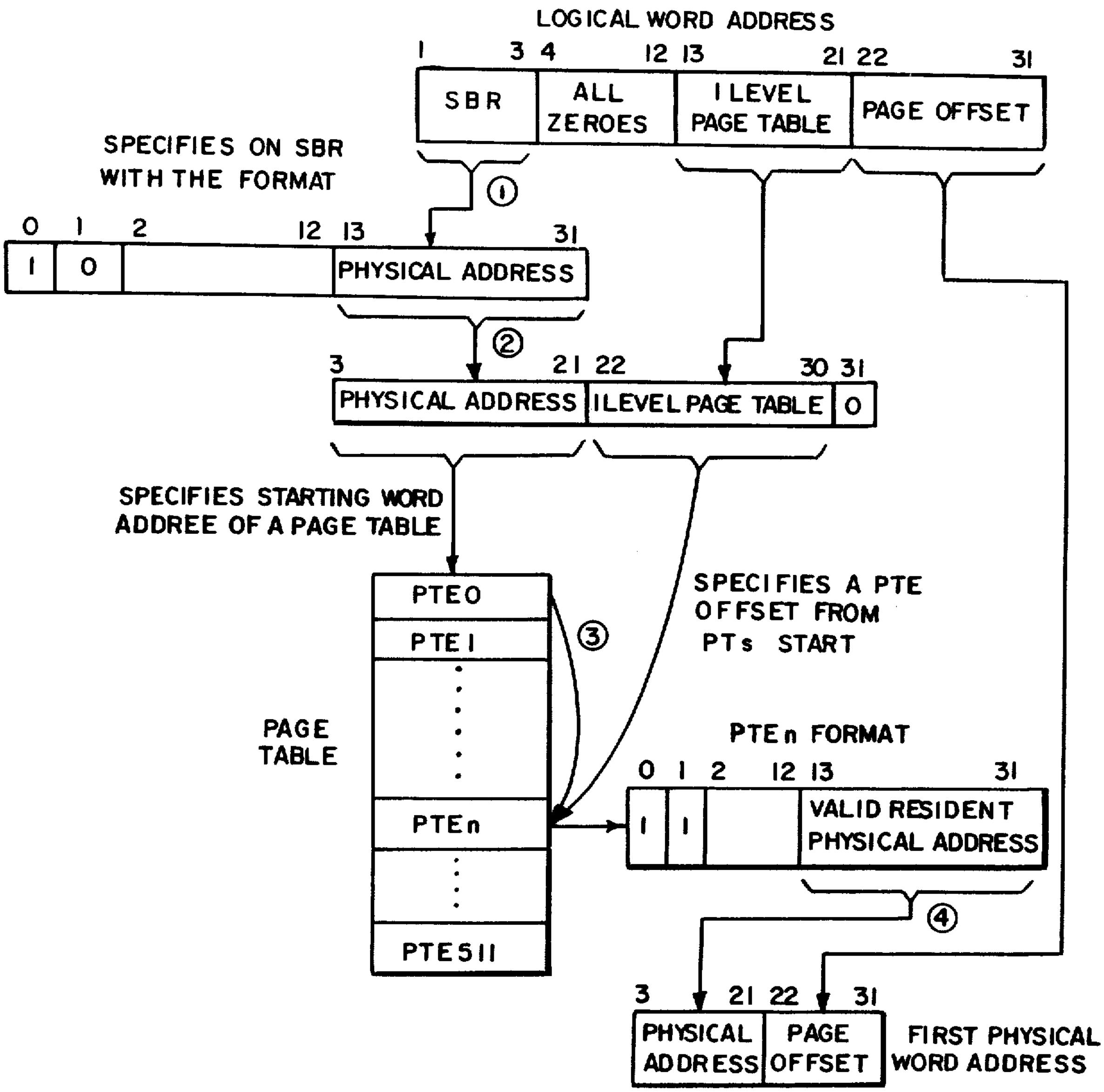
FIG. 157 depicts a one-level page table traversal in a long address translation.
Figure 158:
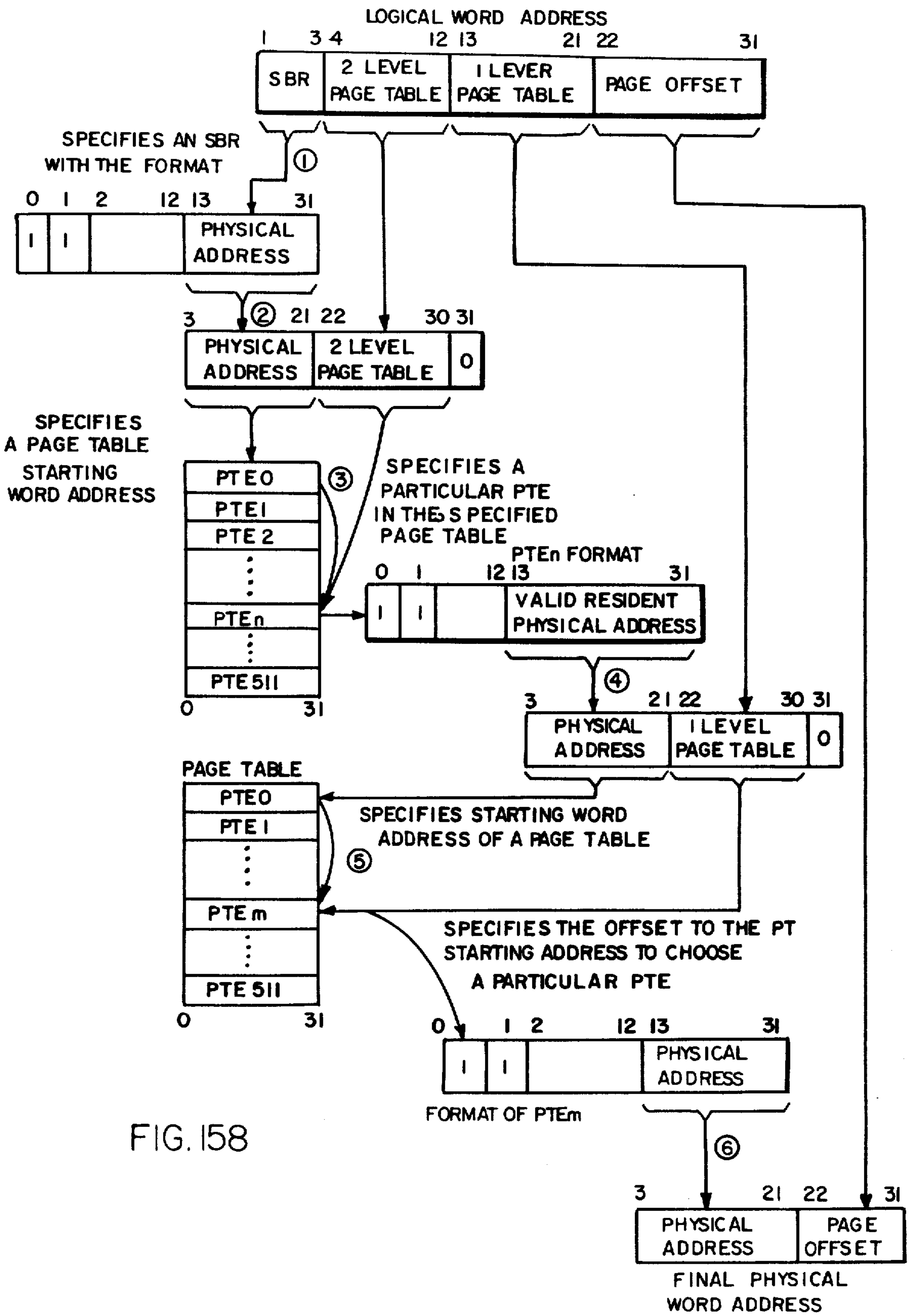
FIG. 158 depicts a two-level page table traversal in a long address translation.

FIGS. 157 and 158 depict the results of the control actions initiated by the arithmetic translation unit (ATU) to perform a long address translation in which a physical address is derived from a logical address by traversing the one- and two-level page tables in the main memory. FIG. 157 depicts a one-level page table traversal, while FIG. 158 depicts a two-level page table traversal, the physical address bits 3–21 of the final physical address (i.e., the desired memory allocation data) being placed in the translation store 100 so that when the corresponding logical address is subsequently requires a translation, the physical address is available (an ATU HIT occurs) and there is no need for subsequent long address translation.

The logical word address to be translated for a one-level page table translation has the format shown in FIG. 157. Bits 1–3 of the word address specify one of the eight segment base registers (SBRs). The ATU uses the contents of this valid SBR to form the physical address of a page table entry (PTE), as shown at point (1) of the FIG. 157.

The selected SBR contains a bit (bit 1) which specifies whether the page table traversal is a one-level (bit 1 is zero) or a two-level (bit 1 is a one) page table. In FIG. 157 a page table entry address comprising the starting address of a selected page table and page table entry offset specifying a page address therein.

To form this physical page address, the ATU begins with the physical address as shown at (2) of the FIG. 157. This address becomes bits 3–21 of the PTE address. Bits 13–21 of the logical word address become bits 22–30 of the PTE address. The ATU appends a zero to the right of the PTE address, making a 29-bit word address.

Bits 3–21 of the PTE address (unchanged in the step above) specify the starting address of a page table. Bits 22–31 of the PTE address specify an offset from the start of the table to some PTE (labelled PTEn in FIG. 157). This PTE specifies the starting address of a page of memory, as shown at (3) of the FIG. 157.

PTEn bits 13–31, the page address, become bits 3–21 of the physical address, as shown at (4) of FIG. 157. The page offset field specified in bits 22–31 of the logical word address becomes bits 22–31 of the physical address. This is the physical word address translated from the original word address. The physical address bits 3–21 are placed in the translation store as the memory allocation data for subsequent use if the same logical word address requires subsequent translation. It should be noted that when using a one-level page table, bits 4–12 of the logical word address must be zero. If they are not zero and bit 1 of the SBR indicates a one-level page table is required, a page fault occurs.

Just as in the one-level page table translation process, in the two-level page table translation depicted in FIG. 158, the processor produces a physical address. The logical word address to be translated has the format shown in the diagram, the steps (1) through (4) being substantially the same as in FIG. 157 except that bits 4–12 of the logical word address become bits 22–30 of the PTE address. The ATU appends a zero to the right of the PTE address, making a 29-bit word address. Bits 1–3 of the word address specify one of the eight segment base registers (SBRs).

Bits 3–21 of the PTE address specify the starting address of a page table. Bits 22–31 of the PTE address specify an offset from the start of the table to some PTE (labelled PTEn). The PTE specifies the starting address of a page table. Thus, the ATU now constructs the address of a second PTE from the address at 4. The physical address specified in bits 13–31 of the first (PTEn) becomes bits 3–21 of the address of the second PTEm. Bits 13–21 of the logical word address become bits 22–30 of the second PTE's address. The ATU appends a zero to the right of the second PTE address to make a 29-bit word address.

Bits 3–21 of the second PTE address specify the starting address of a second page table. Bits 22–31 of the second PTE address specify an offset from the start of the second table to some PTE (labelled PTEm in FIG. 158). The second PTE specifies the starting address of a page, as shown at 5 in FIG. 158.

The second PTEm's bits 13–31, the page address, become bits 3–21 of the physical address and the page offset specified in bits 22–31 of the logical word address becomes bits 22–31 of the physical address, as shown at 6 in FIG. 158. This last value is the final physical word address.

The physical page table address for the low order page table of a two-level page table is in bits 18–31 of the high order page table entry (HOPTE) which must be fetched from the main memory. Thus, the second possible source of the physical page table address is the memory data register (MD) 105 which holds the data that arrives on the physical memory data (CPM) bus 20 as $\overline{\text{MD 18–31}}$. A suitable page table multiplexer 107 is used to select which of the two sources will drive the physical address bus when its outputs are enabled.

The third and final source is to drive the physical page address bus 27 directly through a physical mode buffer 108, such buffer being used to address physical memory directly ($\overline{\text{PHY 8–21}}$) from buts $\overline{\text{LA 8–21}}$ of the logical address bus. Such buffer is enabled while the ATU unit is turned off (i.e., no address translation is required) since the physical address in that mode is the same as the logical address and no translation is necessary.

Bits $\overline{\text{PHY 22–31}}$ of the physical address are offset by displacement bits, there being three possible origins for the offset. The first source of such offset is from bits $\overline{\text{LA 22–31}}$ of the logical address bus which bits are used while in physical mode (no address translation is necessary) as well as the offset in the object page. The second source of the offset is bits $\overline{\text{LAR 4–12}}$ (referred to as two-level page table bits in FIG. 158 above) of the logical address register which is used as an offset within the high order page table during a long address translation. Since this source is only nine bits long and page table entries are double words aligned on even word boundaries, a ten bit offset (to form $\overline{\text{PHY 22–31}}$) is constructed by appending a zero bit to the least significant bit. The final source for the offset is bits $\overline{\text{LAR 13–21}}$ (referred to as one-level page table bits in FIG. 158 above) of the logical address register which is used as an offset within the low order page table during a long address translation. A zero bit is appended to the least significant bit of this source also. Offset multiplexer 109 is used to select the desired one of such three offset sources.

The following discussion summarizes the address bit sources for forming a low order or high order page table entry address in main memory in making a long address translation. The address of the page table entry is formed from address fields in a segment base register (SBR) and from address fields in the logical address register. The address fields of a segment base register can be depicted as follows:

| 0 | 1 | 2 | 3 | 4 | 12 13 | 31 |
|---|---|---|---|---|---|---|
| V | L | LEF | I/O | RESERVED | PHYSICAL ADDRESS | |

SEGMENT BASE REGISTER

Depending on whether a one-level (low order) or a two-level (high order) page table entry is called for, the SBR address field comprising bits 4–12 or the SBR address field comprising bits 13–21 is transferred to the memory data register 105 to form the higher order bits of the page table entry. As mentioned above, the eight SBR registers are located in 8 of the 256 locations of scratch pad registers on the ATU. This use of such scratch pad locations for the segment base registers can be contrasted with prior known systems wherein the segment base register (or registers comparable thereto) in a segment, or ring, protection memory system are all located at specified locations in the main memory. By placing them in a scratch-pad memory located in a processing unit of the system, as in the ATU unit here, the higher order page table entry bits are acquired more rapidly than they would be if it were necessary to fetch them from main memory and, hence, the speed at which page table entries can be made is improved considerably.

One of the bits of an SBR (identified above as "V" bit) is examined to determine whether the SBR contents are valid. Another bit (identified above as "L" bit) is examined to determine whether a 1-level or a 2-level page table entry is required so that the correct field is supplied to the memory data register.

Other bit fields of the SBR are used to determine whether a Load Effective Address (LEF) instruction (such LEF instruction is part of the Eclipse instruction set as explained more fully in the above cited publications therein) or I/O instruction is required. Thus in a selected state the LEF Enable bit will enable an LEF instruction while a selected state of the I/O Protect bit will determine whether an I/O instruction can be permitted. The remaining field of the SBR contains the address offset bits.

As is also seen in FIG. 79 a variety of protection checks are made for each reference to memory, which protection checks are made by the use of protection store unit 104, protection logic unit 110 and ring protection logic unit 111 for providing appropriate fault code bits (FLTCD Ø-3) which are supplied to the microsequencer (described below) via driver 112 on to the CPD bus 25 for initiating appropriate fault micro-code routines depending on which fault has occured.

The following six protection checks can be made:

1. Validity storage protection
2. Read protection
3. Write protection
4. Execute protection
5. Defer protection
6. Ring maximization protection A validity storage protection check determines whether the corresponding block of memory to which a memory reference is made has been allocated and is accessible to the current user of the system. The validity storage field is a one-bit field which is located, for example, at bit zero of each of the segment base registers (located on an ATU board as discussed above) or at bit zero in each of the high order page table entry addresses and low order page table entry addresses. In a particular embodiment, for example, a "1" indicates that the corresponding block has been so allocated and is accessible whereas a "0" indicates that the user cannot use such a memory block.

Generally when a new user enters the system all pages and segments in the logical address space which are allocated to that user, except those containing the operating system, are marked invalid. Validity bits are then set valid as the system begins allocating logical memory to such new user. If a user makes a memory reference to an invalid page, an invalid page table, or an invalid segment, the memory reference is aborted and validity storage protection error is then signaled by the fault code bits on the CPD bus.

The read protection field is a one-bit field normally located at a selected bit (bit 2, for example) in each of the lower order page table entry addresses and a check thereof determines whether the corresponding object page can or cannot be read by the current user. If the page cannot be read, a read error is signaled by the fault code bits on the CPD bus. In a similar manner a check of the write protection error field determines whether the corresponding object page can be written into by the current user, an appropriate write error being signaled by the fault code bits if the user attempts to write into a page to which he is not allowed.

The execute protection field is a one-bit field which is located at a selected bit (e.g. bit 4) in each of the low order page table entry addresses and a check thereof determines whether instructions from a corresponding object page can or cannot be executed by the current user. If such an instruction fetch is not allowed, an execute error is signaled by the fault code bits on the CPD bus. Execute protection is normally checked only during the first fetch within a page and any additional instruction fetches are performed using the physical page address from the first fetch, which for such purpose is retained by the instruction processor.

When a user is attempting to reference a location in memory and is utilizing a chain of indirect addresses to do so, the system will abort the operation if a chain of more than a selected number of said indirect addresses is encountered. For example, in the system under discussion if a chain of more than sixteen indirect addresses is encountered the operation is appropriately aborted and a defer error is signaled by the fault code bits on the CPD bus. Such protection is utilized, for example, normally when the system has performed a loop operation and the system, because of a fault in the operation thereof, continues to repeat the indirect loop addressing process without being able to break free from the loop operation.

Ring maximization protection is utilized when the user is attempting to reference a logical location in memory in a lower ring (segment) than the current ring of execution (CRE 1-3). Since such operation is not permitted by the system, the operation must be aborted if the user attempts to reference a lower ring than currently being used and a ring maximization error is signaled on the CPD bus. Since the logical address space is divided into eight rings, or segments, a ring which the user desires to reference can be indicated by bits 1–3, for example, of the logical address.

The specific logic circuitry utilized for such protection checks (i.e., the protection store 104 and the protection logic 110 and the protection logic 111 associated therewith) is shown in FIGS. 80 and 81. Thus, logic for the generation of the read error, write error, execution error and validity error signals is shown in FIG. 80 and logic for generating the defer error and ring maximization error signals being shown in FIG. 81.

With respect to the protection system, since logical address space is partitioned into eight hierarchical regions (i.e. the "rings" or "segments") the partitioning can be delineated by the segment field of the logical address. Thus, segment number 0 is always assigned to ring 0 (ring 0 being the ring in which only priviledged instructions can be executed), segment 1 is always assigned to ring 1, and so forth. Such approach differs from previous systems using a segmented hierarchical address space in that the ring number is not independent of the logical address space. In contrast, in the system discussed here, each ring is directly bound in the space so that segment 0 is always allocated to ring 0, segment 1 to ring 1, and so forth.

The access field in a page table entry comprises three bits (MD 2-4) is shown in FIG. 79 and indicates the capabilities of the referenced data item in the logical address space, i.e. as to whether the reference data item is to be a read access, a write access, or an execute access, the protection store 104 responding to such bits to produce either a read enable signal (RD ENB), or a write enable (WR ENB) or an execute enable (EX ENB). The ring protection governs the proper interpretation of the access privileges of the user to a particular ring, a user being permitted access only to selected, consecutively numbered rings. Thus, access can only be made to a bracket of rings (an access bracket) if the effective source for such reference is within the appropriate access bracket. For example, the read bracket of a data reference in any ring is the ring number. That is, a data address reference to segment 5 (ring 5), for example, can never legitimately originate from an effective source which is greater than 5. In other words an effective source in segment 5 can never reference a ring lower than ring 5 and, therefore, if a reference from an effective source greater than 5 attempts to access ring 5 a ring maximum error (MAX ERR) will be signaled as shown by the logic in FIG. 13. A table showing such ring protection operation is shown below:

| Effective Source Space | Target Space | | | | |
|---|---|---|---|---|---|
| | RING 0 | RING 1 | Ring 2 | ... | RING 7 |
| RING 0 | Val-R0 | Val-R1 | Val-R2 | ... | Val-R7 |
| RING 1 | Fault | Val-R1 | Val-R2 | ... | Val-R7 |
| RING 2 | Fault | Fault | Val-R2 | ... | Val-R7 |
| . | . | . | . | | . |
| . | . | . | . | | . |
| RING 7 | Fault | Fault | Fault | ... | Val-R7 |

In summary, in order to make a ring access, the ring maximization function is used to determine whether or not the reference is a valid ring reference and, if it is, the page table entry that reference the address datum is examined to see if the page is a valid one. Then, if the read protection bit indicates that such valid page can be read, the read can be performed. If any one of the examinations shows a protection error (i.e., ring maximization error, validity error, or read error) the read is aborted and an appropriate fault code routine is called. Similarly, appropriate examination for protection errors for write access and execute access situations can also be performed.

In an hierachical address space such as discussed above, it is desirable to mediate and authenticate any attempt to switch rings, i.e., to obtain access to a ring (segment) other than the ring which is currently being used (a "ring crossing" operation). The performing of a ring crossing operation is authenticated as follows.

Any ring crossing attempts occur only as a result of an explicit attempt to do so by a program control instruction, and such explicit attempt can occur only if the following conditions are satisfied.

(1) The program control instruction is of the form of a subroutine "call", i.e., where access is desired to a subroutine in another ring (LCALL-see Appendix B), or a subroutine "return", i.e., where a subroutine in another ring has been accessed and it is desired to return to the original ring (WRTN and WPOPB—see Appendix B). All other program control instructions (e.g., JUMP) ignore the ring field of the effective address required for the instruction and such instructions can only transfer to locations within the correct segment.

(2) The direction of a subroutine call crossing must be to a lower ring number (i.e., inwardly toward ring 0) wherein the lower ring has a higher order of protection and the current ring of execution and the direction of a subroutine return crossing must be to a higher ring number (i.e., outwardly away from ring 0) wherein the higher ring has a lower order of protection than the called ring containing the subroutine. Outward calls and inward returns are trapped as protection faults.

(3) The target segment of the effective branch address is not in the segment identified by bits 1-3 of the program counter.

In the above conditions are met the return address for outward returns is merely interpreted as a normal word address. However, if the above conditions are met for an inward call, the branch address is interpreted as follows:

| 0 | 1 3 | 4 15 | 16 31 |
|---|---|---|---|
| X | SBR | NOT USED | GATE NUMBER |

Inward Call Branch Address

Bits 16-31 are interpreted as a "gate" into the specified segment (SBR of bits 1-3) in the target space. The gate number is used to verify that the specified gate is in the called segment and, upon verfication, to associate on instruction address with the specified gate via a "gate array" in the called segment, as discussed below.

The location of the gate array in any called segment is indicated by a pointer contained in particular locations of the called segment (e.g., in a particular embodiment the pointer locations may be specified as locations 34 and 35 in each segment. The structure of the gate array is as follows:

| 0 | 3 4 | 15 16 31 | |
|---|---|---|---|
| NOT USED | | MAX. NO. OF GATES | |
| X | GATE BRACKET | P C OFFSET | GATE 0 |
| . | | . | |
| . | | . | |
| X | GATE BRACKET | P C OFFSET | GATE (MAX-1) |

Gate Array

The gate number of the pointer which referenced the target segment is compared with bits 16–31 of the first 32 bits of the gate array. If the gate number is greater than or equal to the maximum number of gates in the gate array, the ring crossing cell is not permitted and a protection fault occurs (if the maximum number of gares is 0, the segment involved cannot be a valid target of an inward ring crossing call operation).

If the gate number is less than the maximum number of gates, the gate number is then used to index into one of the gates of the gate array which follows the first 32 bits thereof. The contents of the indexed gate are read and are used to control two actions. First, the effective source is compared to the gate bracket bits 1–3 of the indexed gate. The effective source must be less than or equal to the referenced gate bits and, if so, the PC offset bits 4–31 become the least significant 28 bits of the program counter and bits 1–3 of the program counter are set to the segment containing the gate array.

If the gate in a ring crossing operation, as described above, is a permitted entry point to the ring to which the crossing is made, a new stack is constructed. In order to do so a stack switching operation must occur since there is only one stack per ring. Thus, before the new stack can be created, the contents of the current stack management registers must be saved at specified memory locations of the caller's ring. The callee's stack can then be created, the arguments from the caller's stack being coupled onto the newly created callee's stack, the number of such arguments being specified by the X or the LCALL instruction (see Appendix B). An appropriate check is first made to determine whether copying of all of the arguments would created a stack overflow condition. If so, a stack fault is signalled, the ring crossing being permitted and the fault being processed in the called ring.

In order to emulate operation of ECLIPSE address translation operations appropriate emulation control signals for placing the ATU in the ECLIPSE operating mode are required as shown by emulation control logic unit 115 which, in response to coded instructions generated by the microsequencer board 13 produces such signals to permit operation for 16-bit addresses equivalent to the memory management protection unit (MMPU) of ECLIPSE comparators as described in the aforesaid publications thereon.

Figure 82:
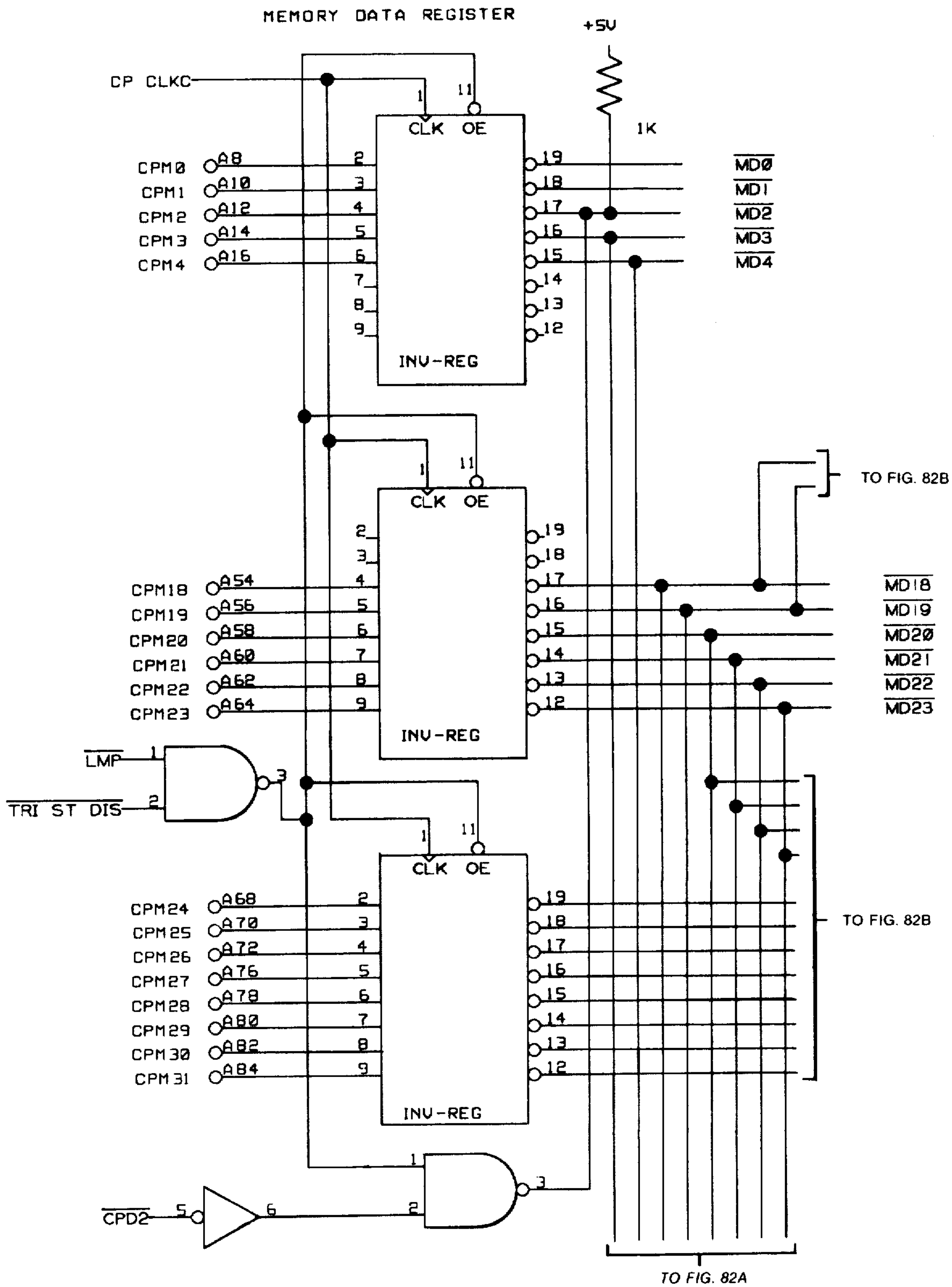
FIGS. 82–100 show specific logic circuitry for implementing the address translation unit of FIGS. 79–81.
Figure 82A:
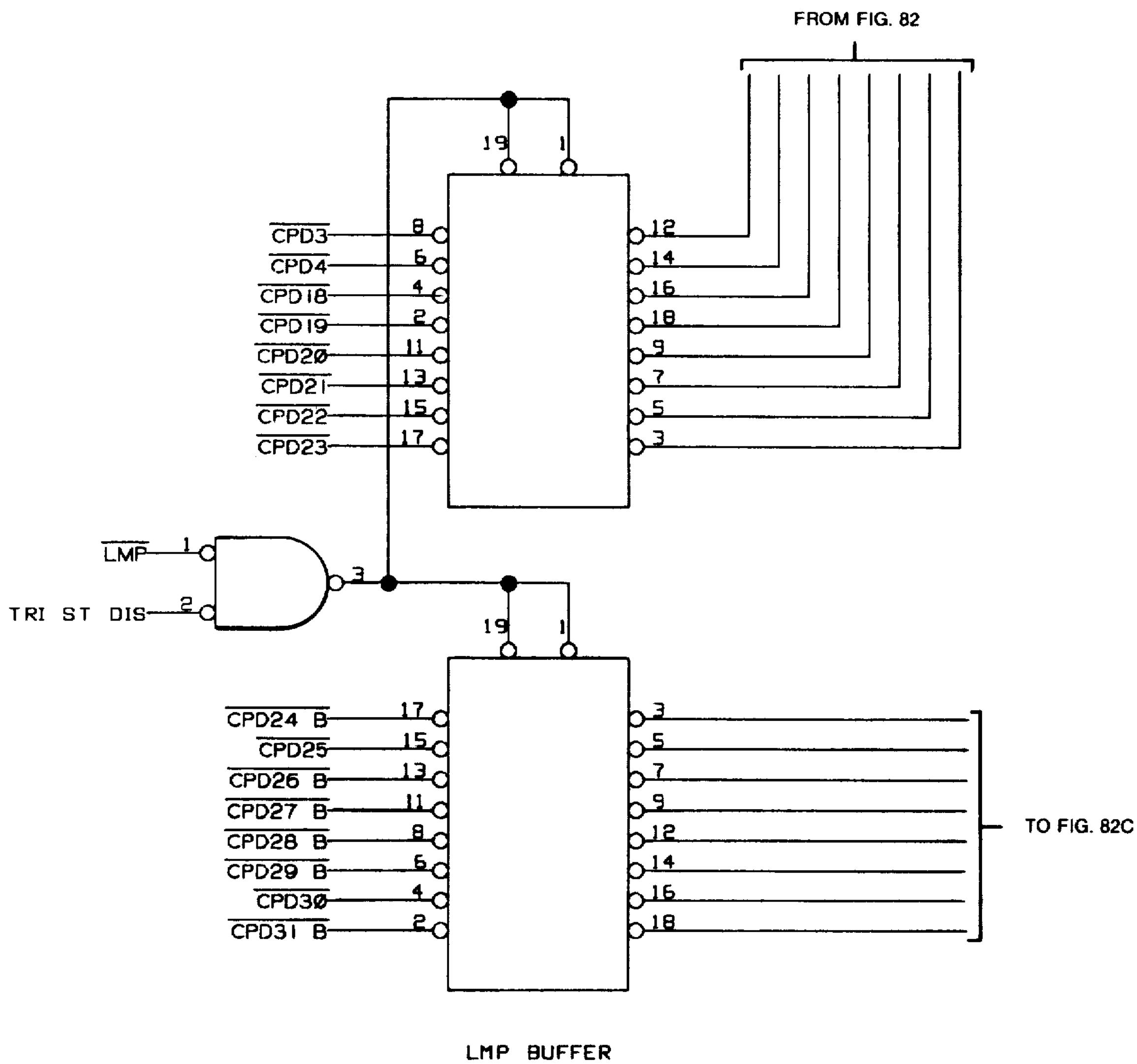
Figure 82B:
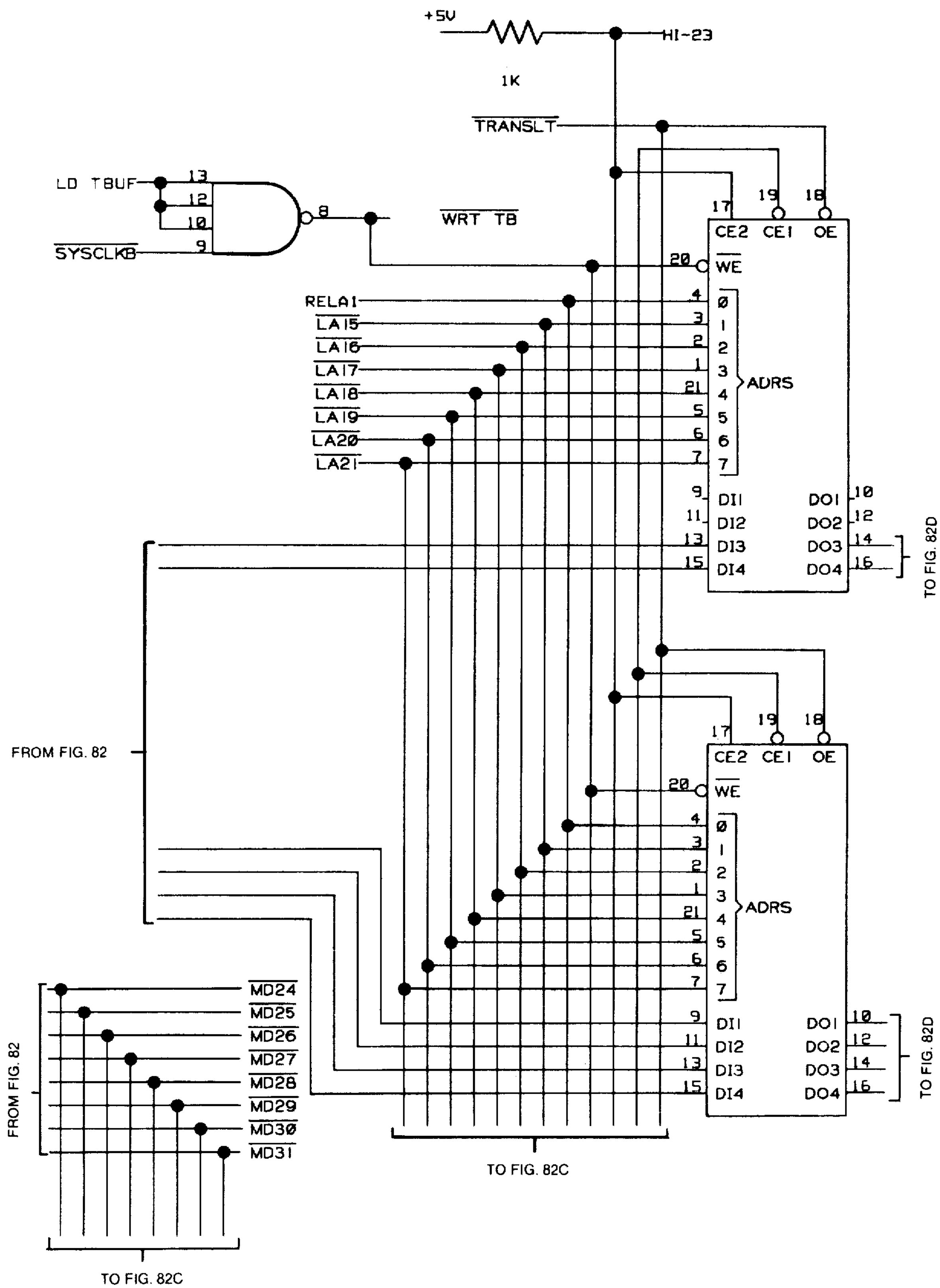
Figure 82C:
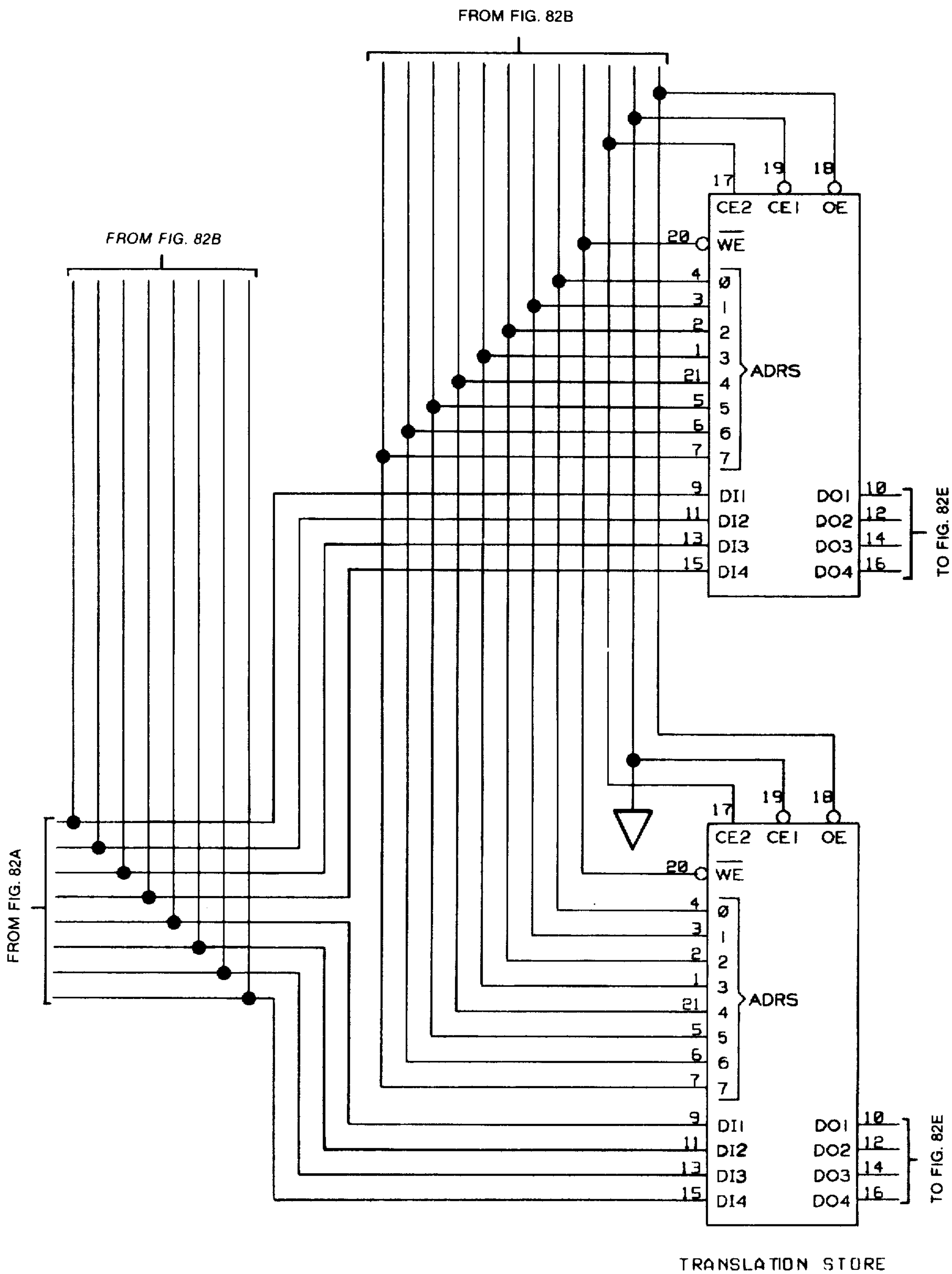
Figure 82D:
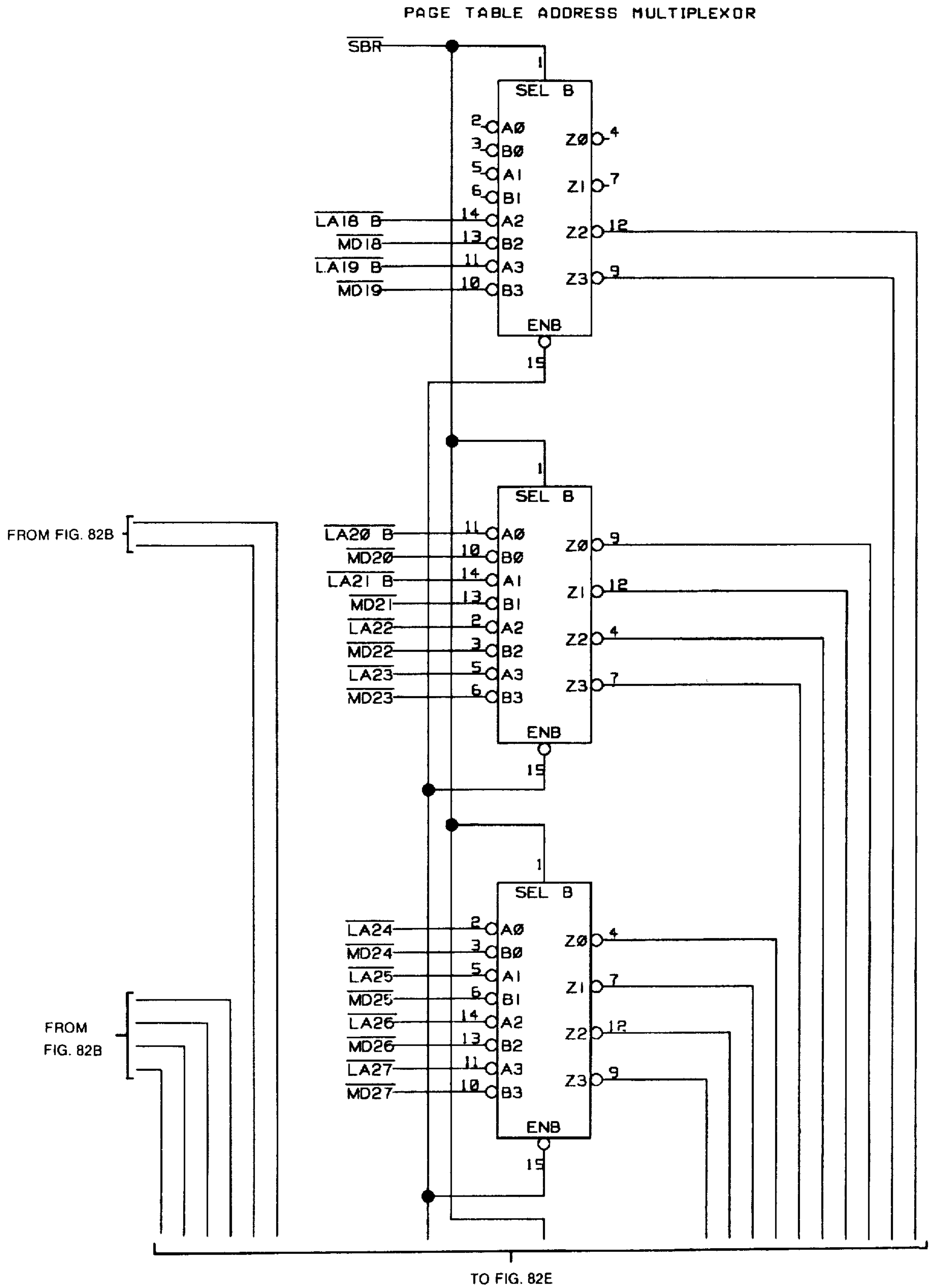
Figure 82E:
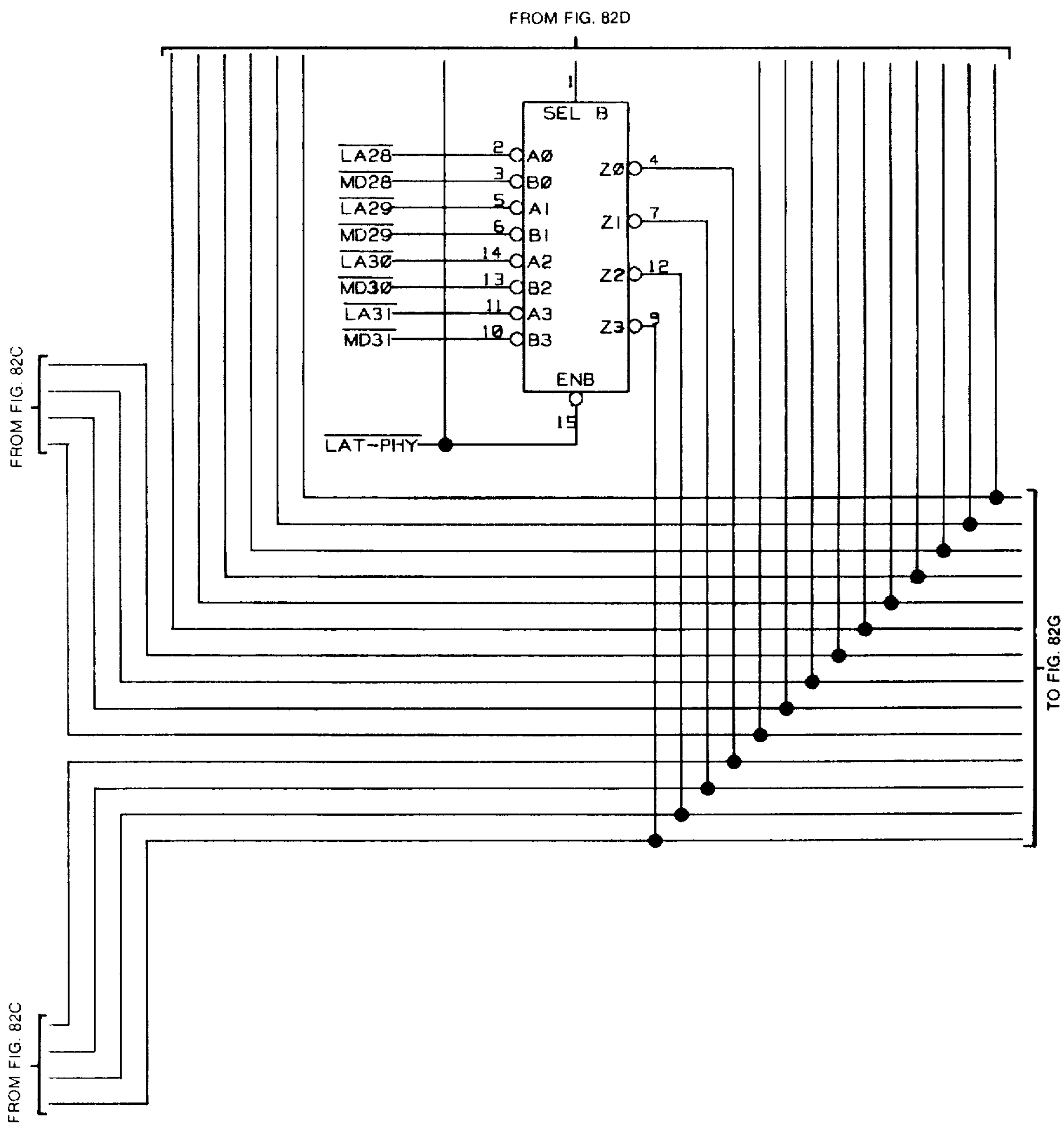
Figure 82F:
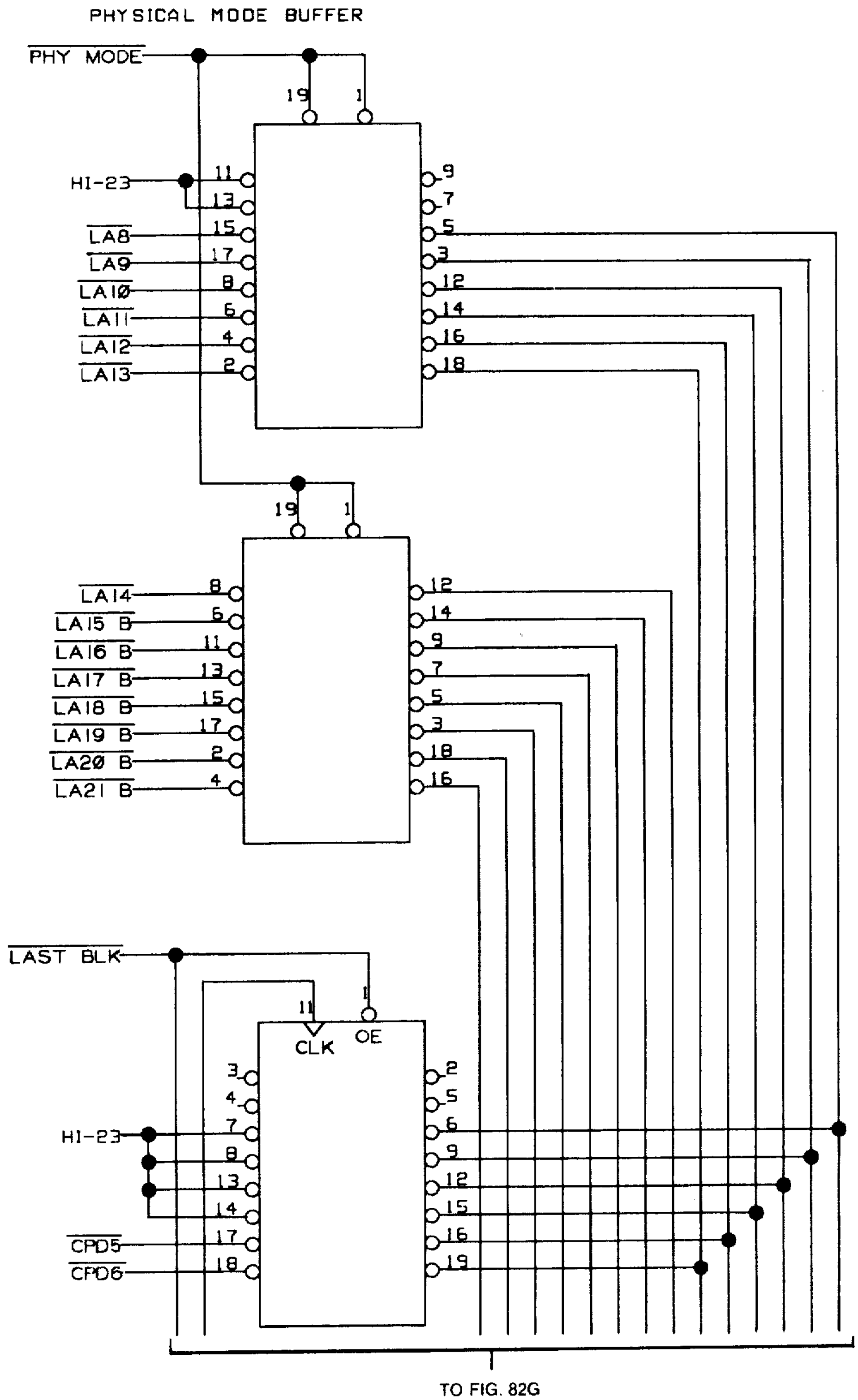
Figure 82G:
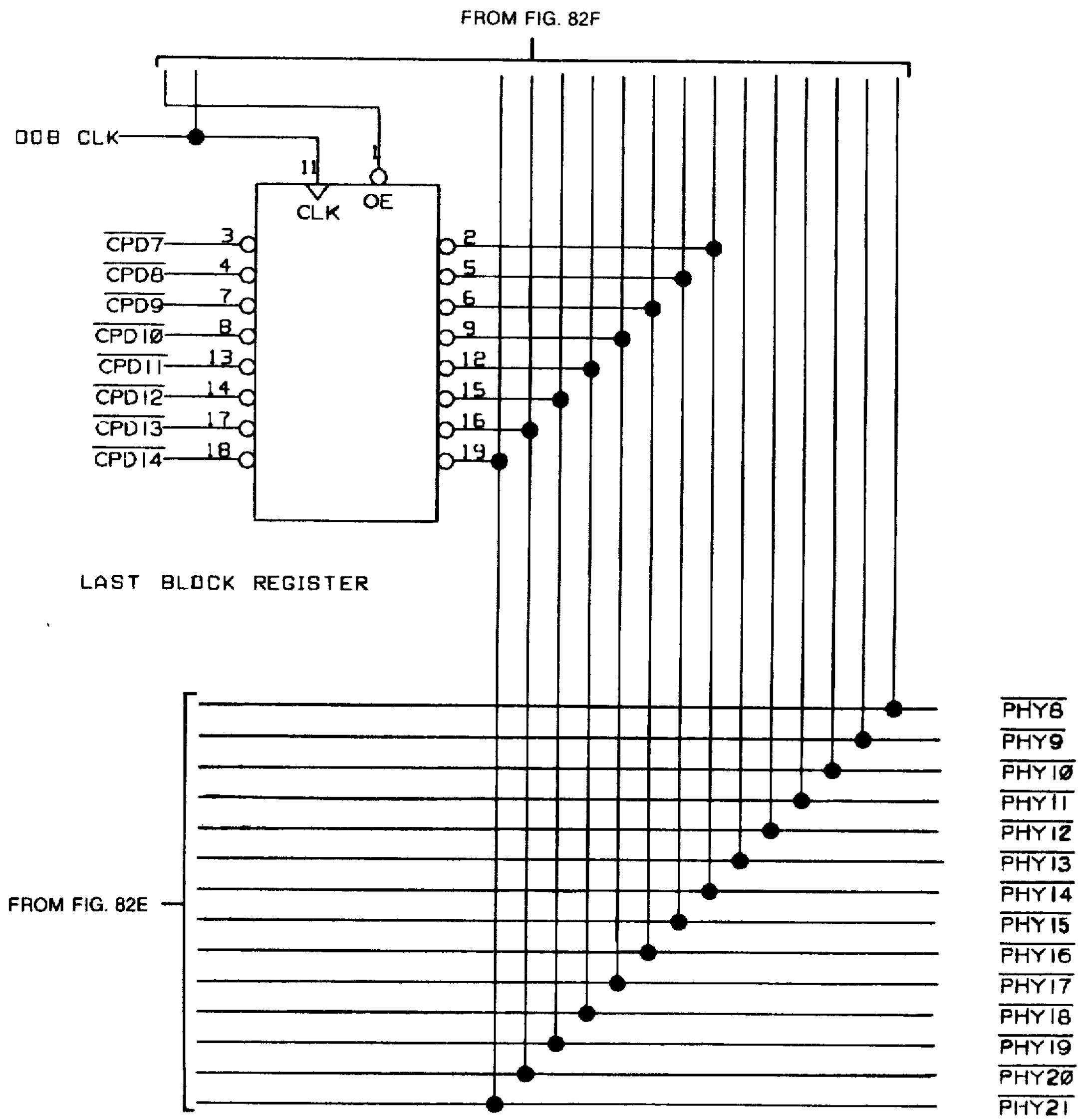
Figure 83:
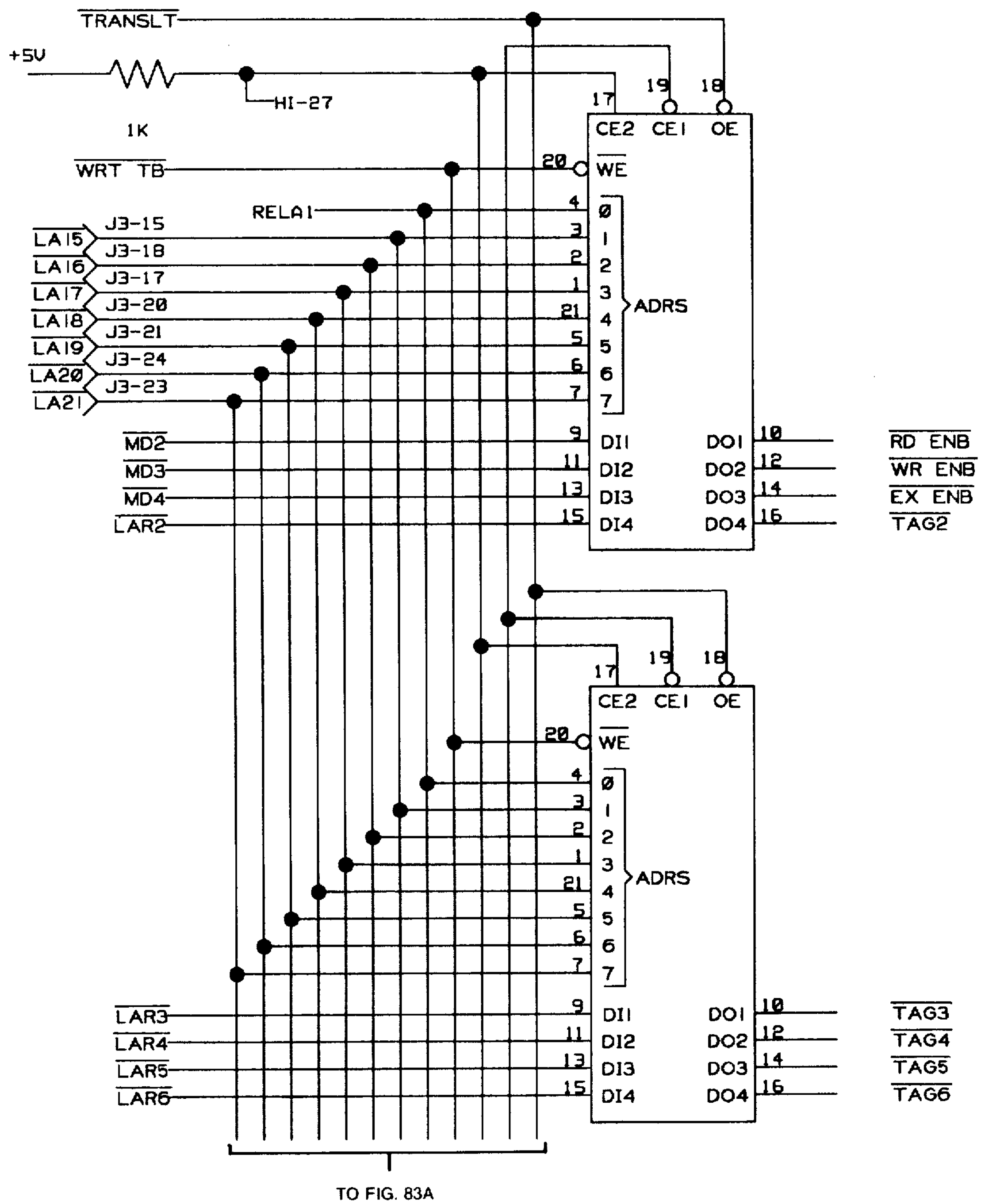
Figure 83A:
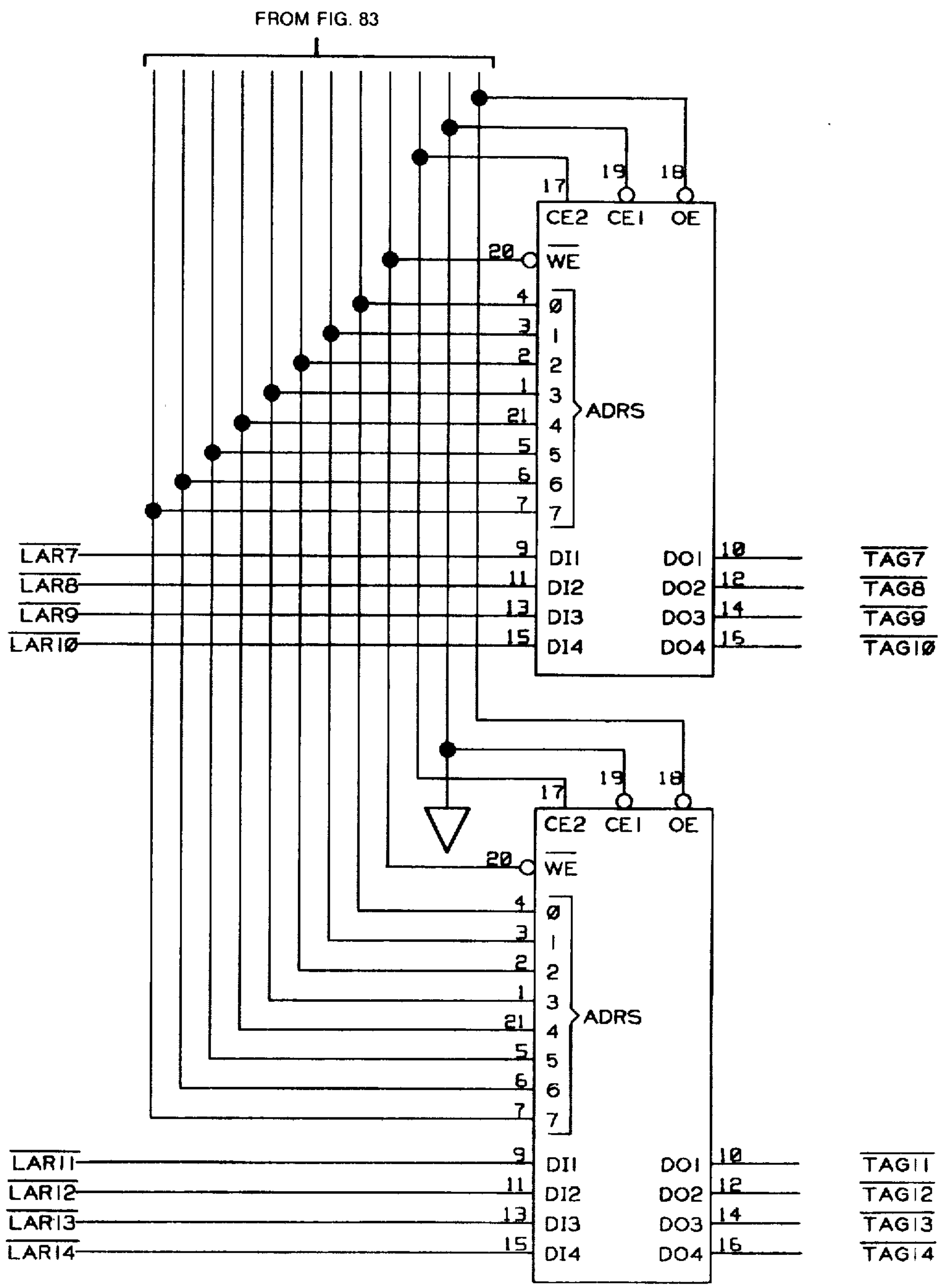
Figure 84:
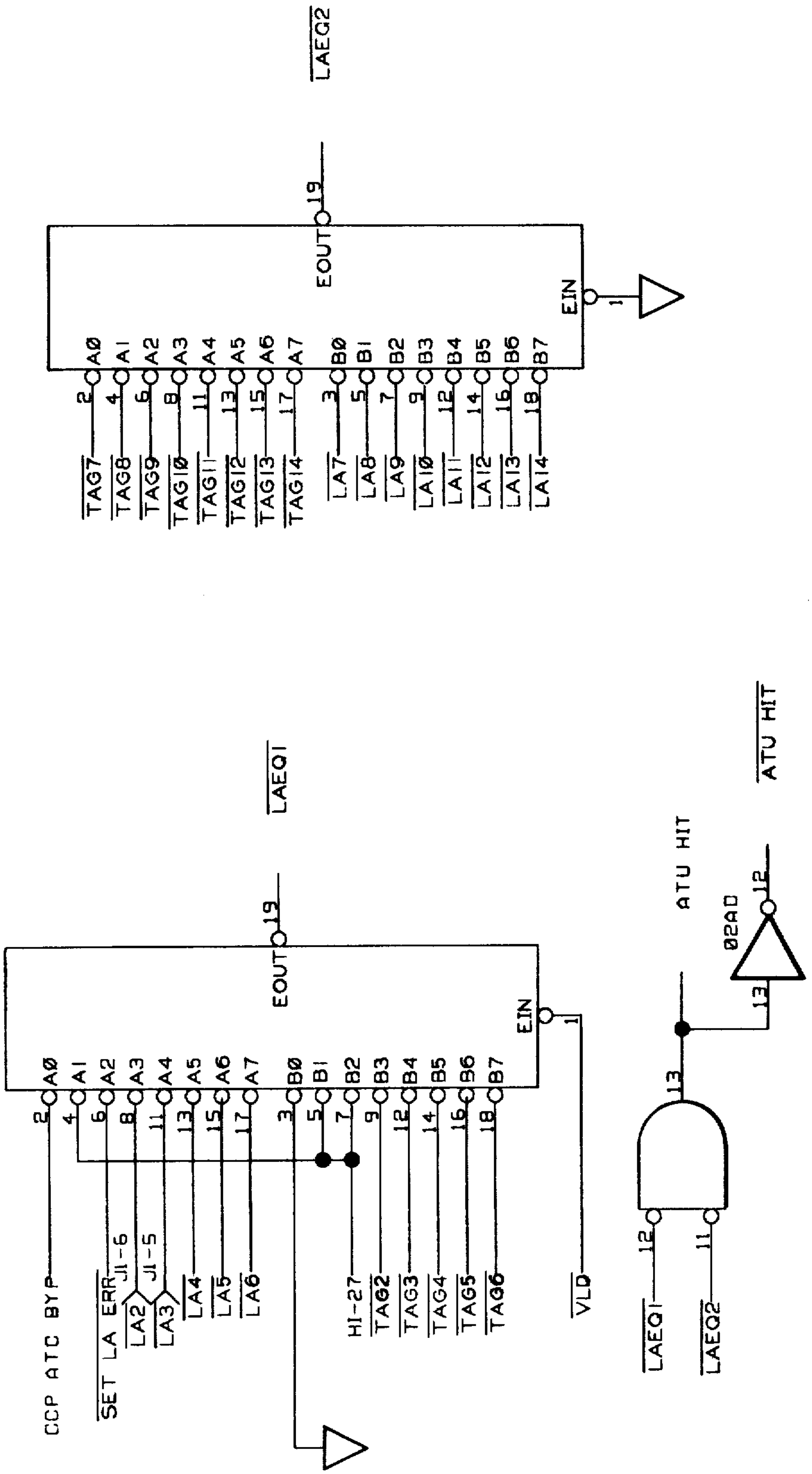
Figure 85:
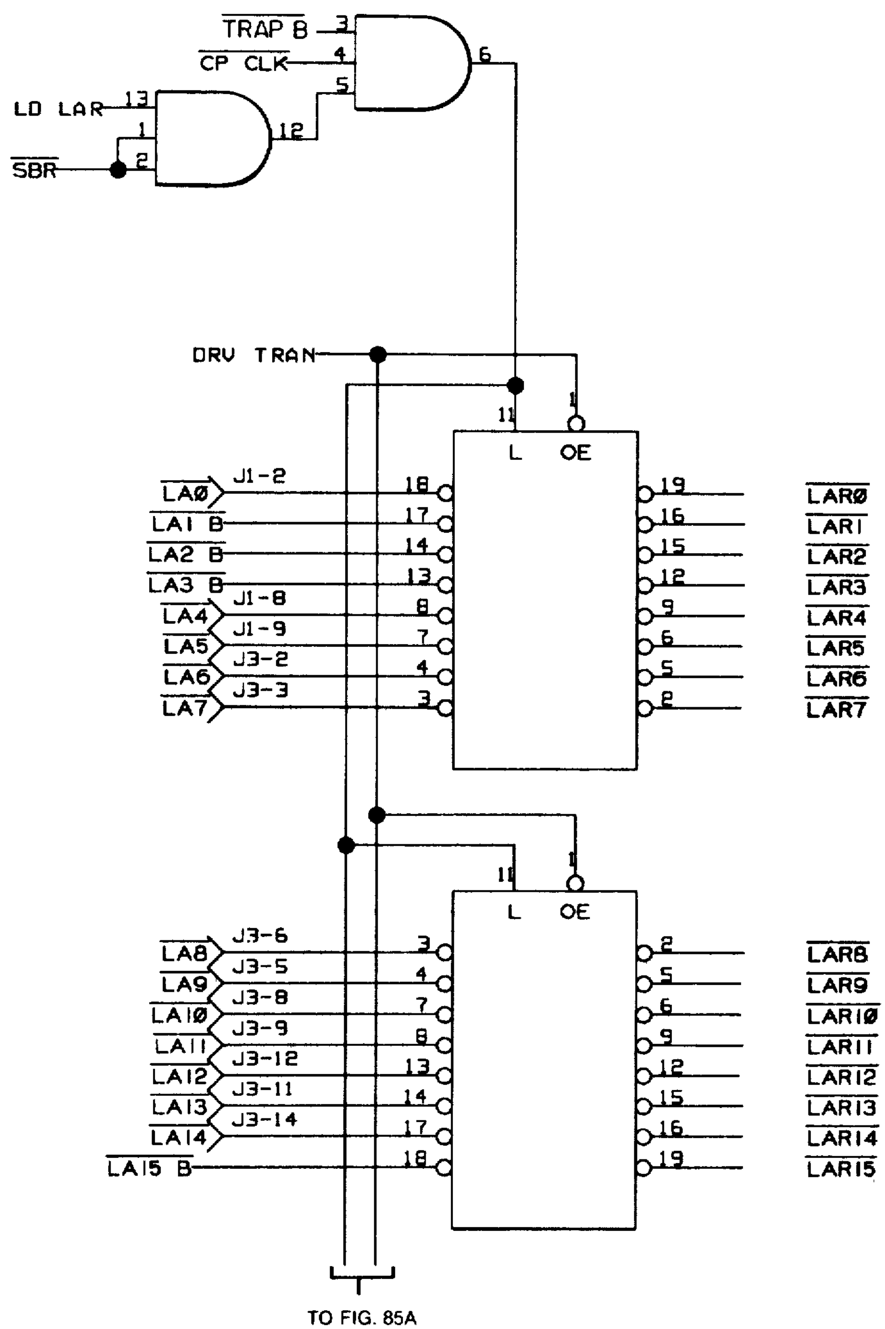
Figure 85A:
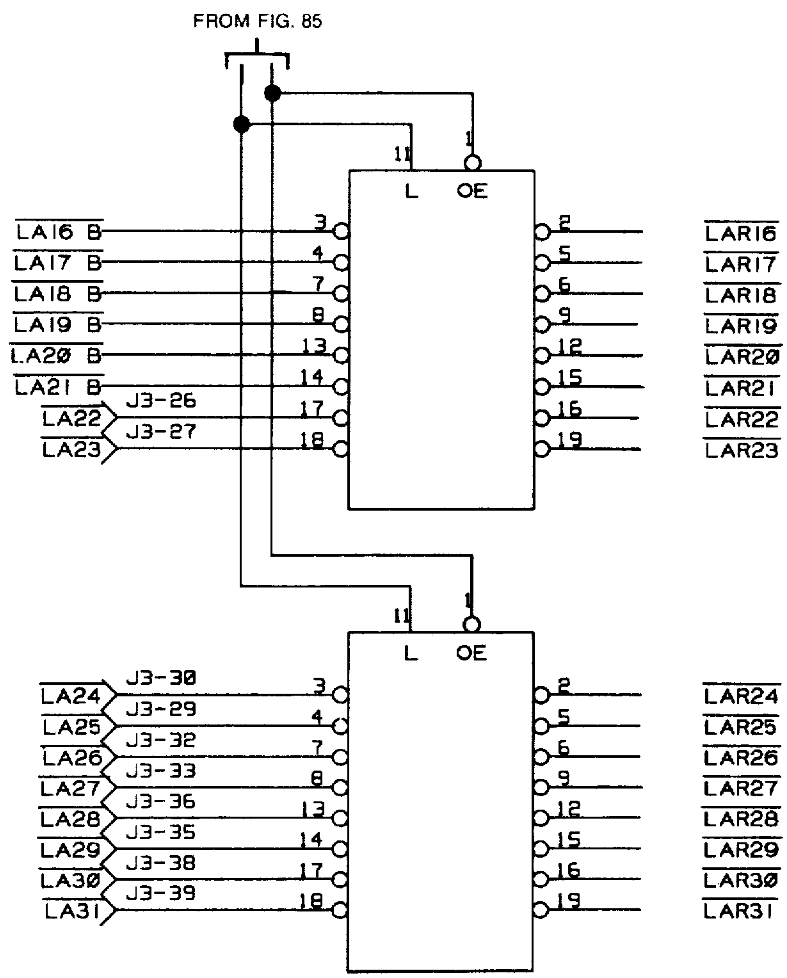
Figure 86:
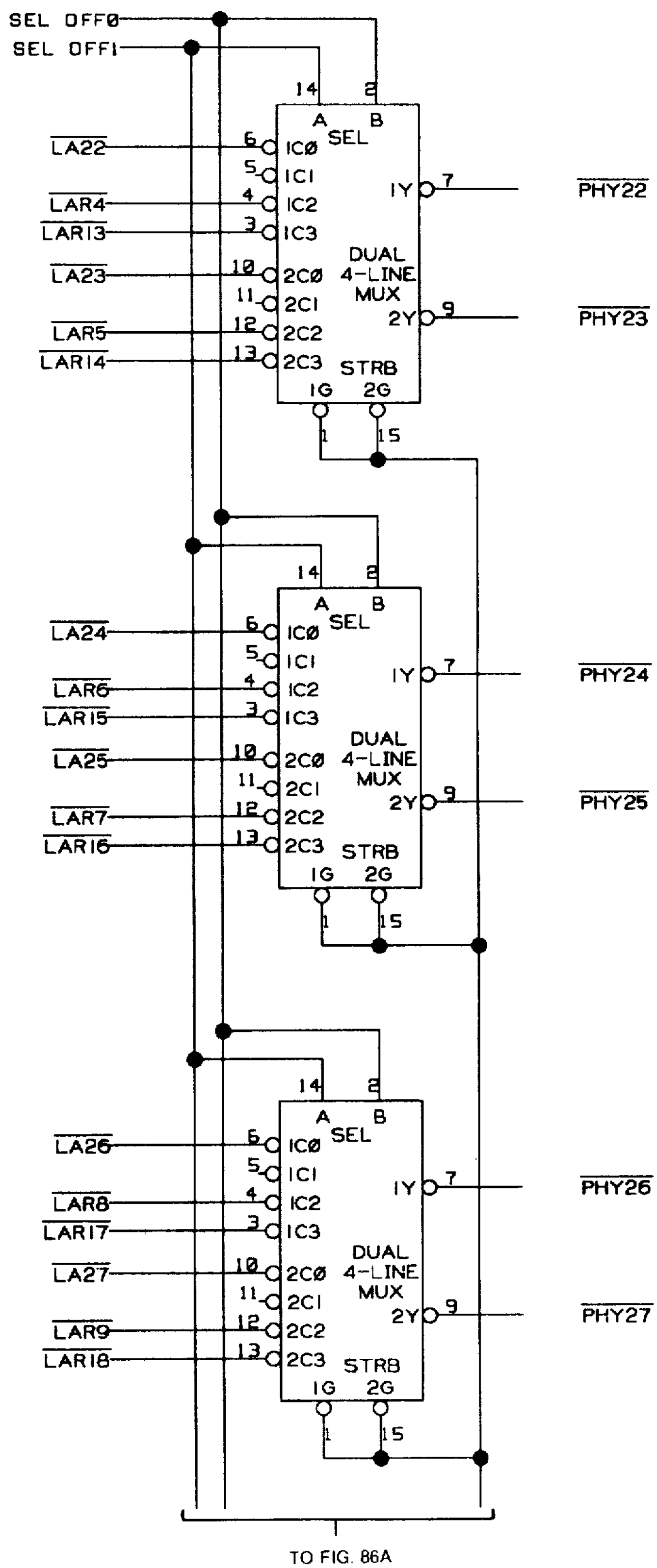
Figure 86A:
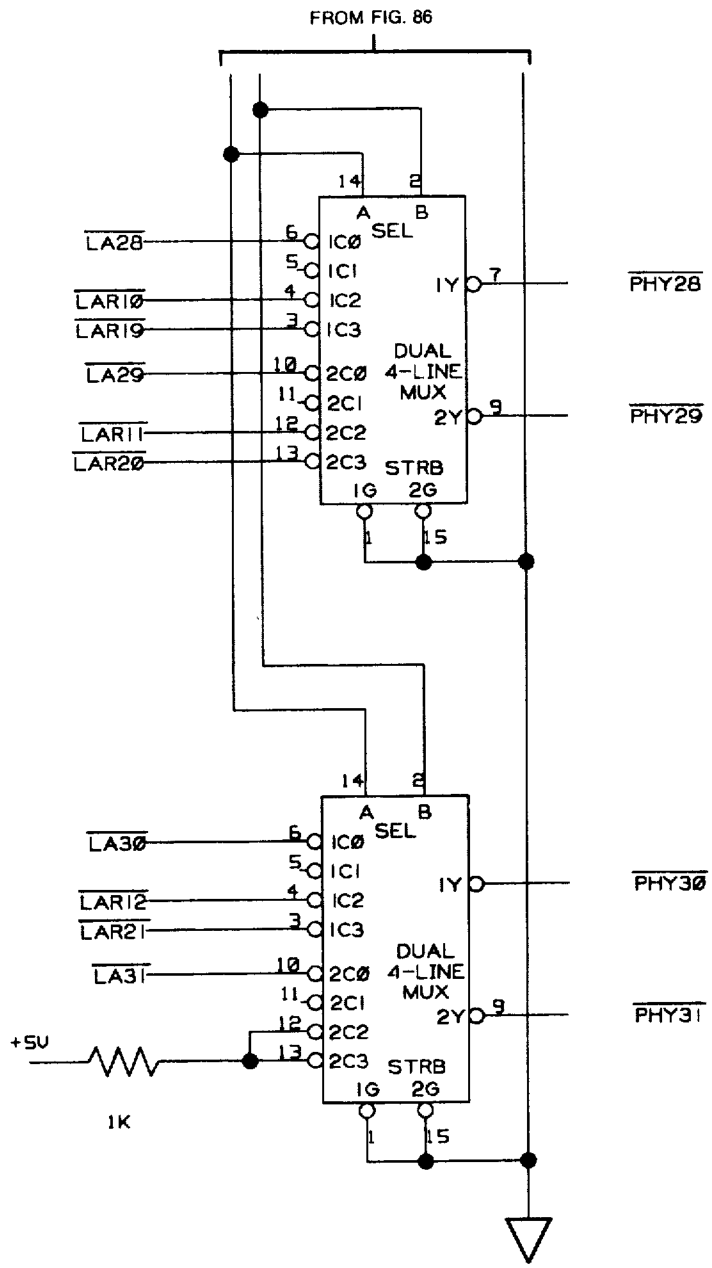
Figure 87:
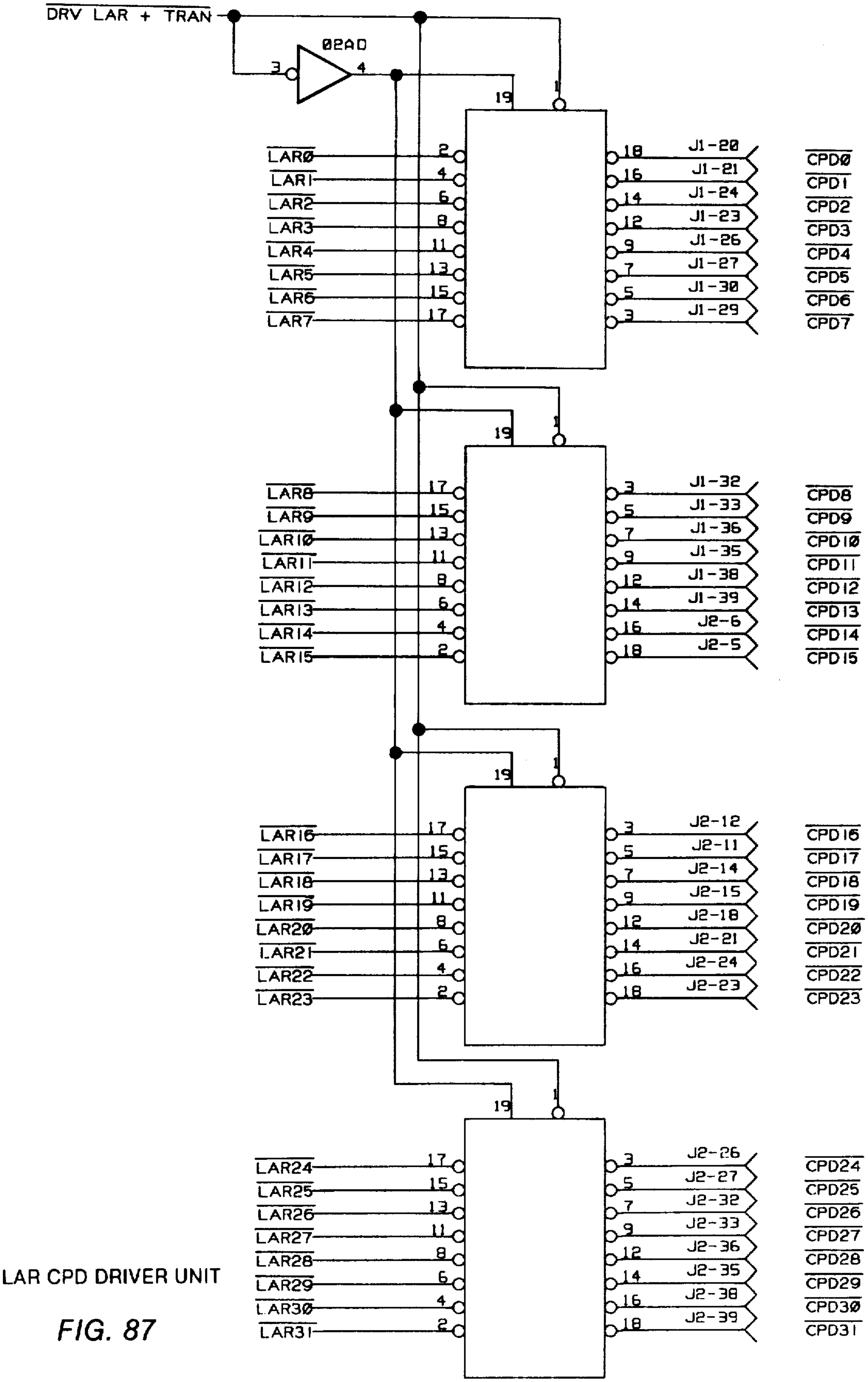
Figure 88:
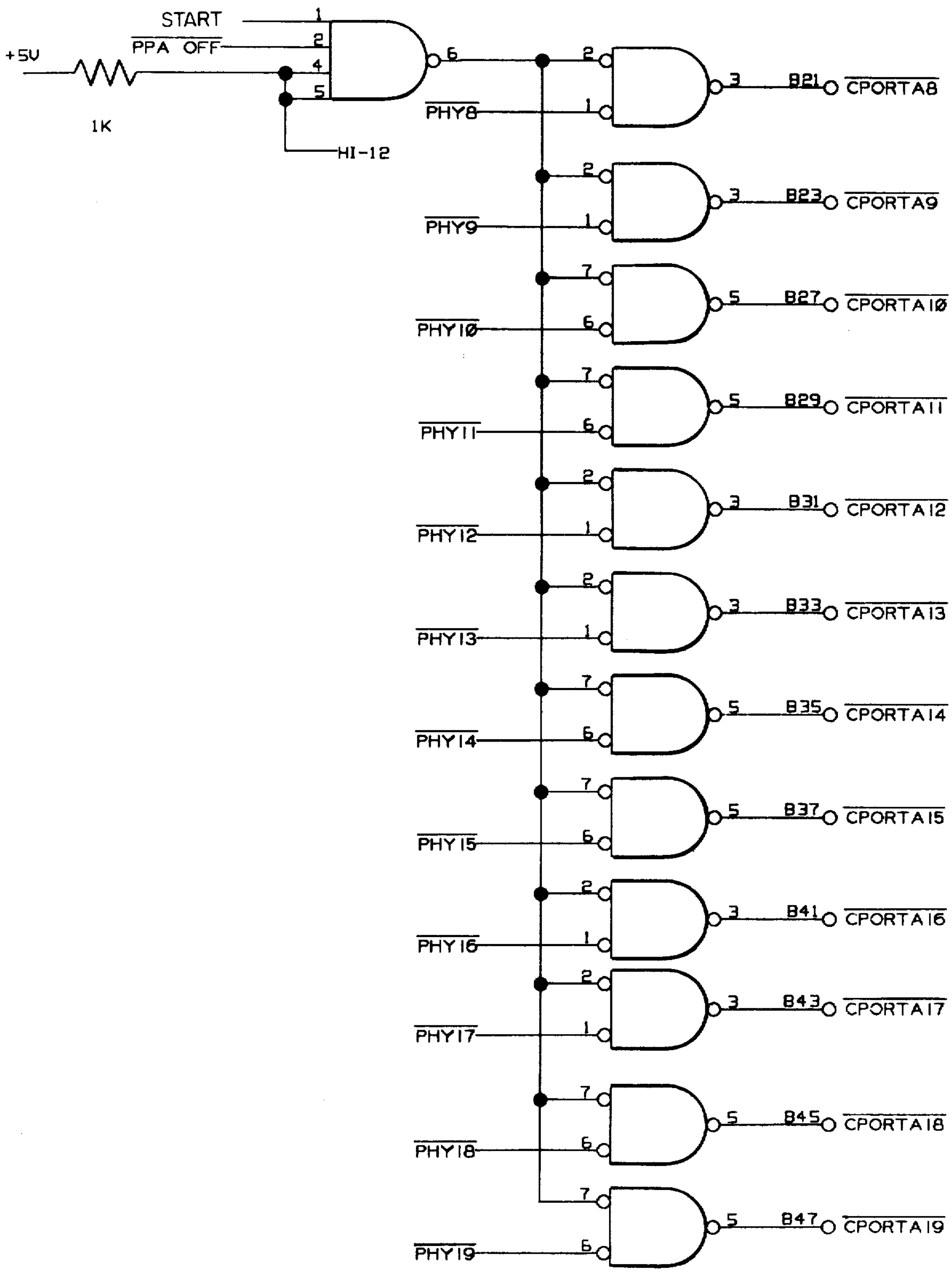
Figure 88A:
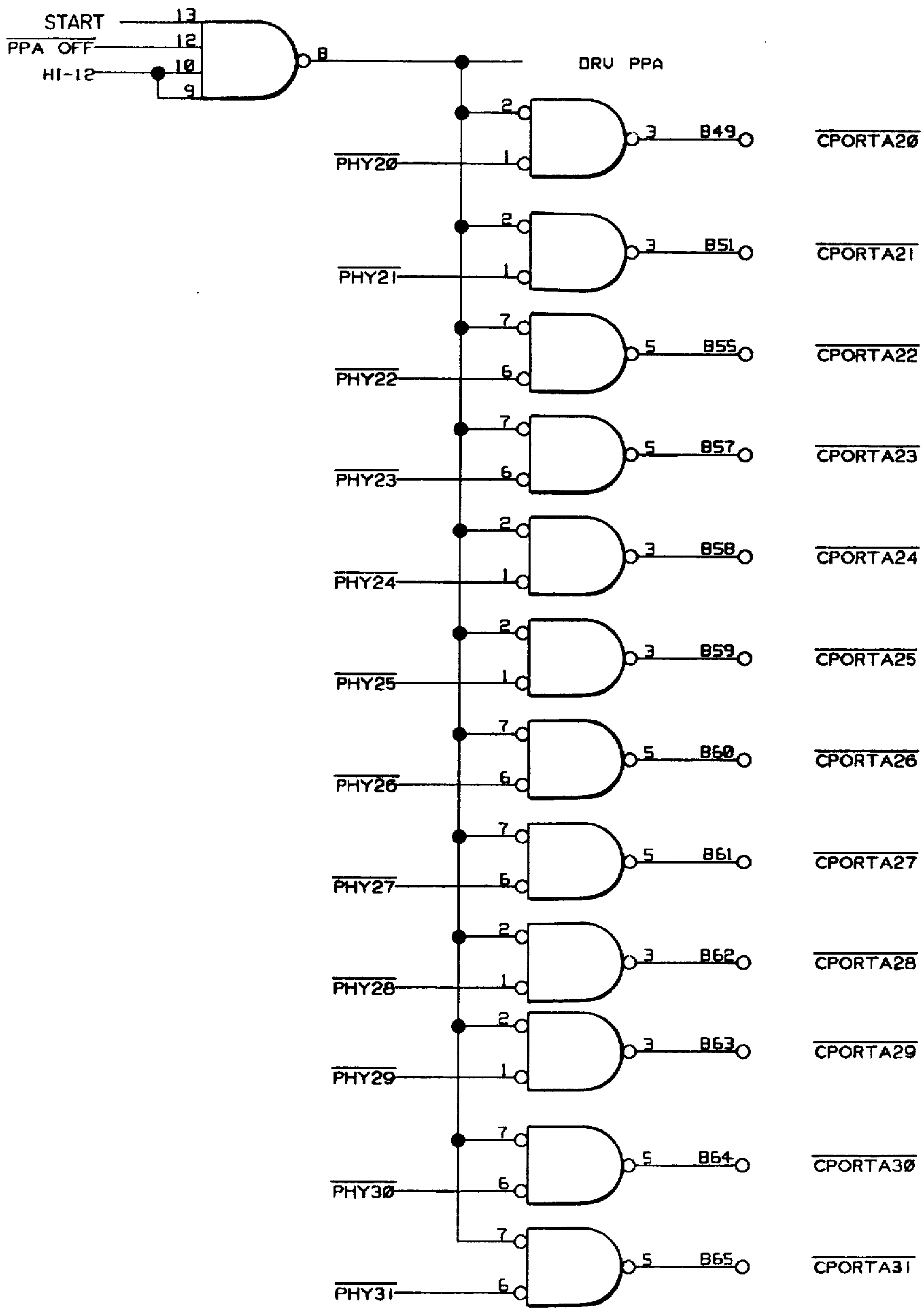

Specific logic circuitry for implementing the various blocks of the address translation unit shown in FIGS. 79–81 are shown in FIGS. 82–100. FIG. 82 depicts the translation store unit 100 supplied with bits $\overline{\text{MD}}$ 18–31 from the memory data register 105 and in turn supplying the translated physical address bits 8–21 which have resulted from a translation of the logical address bits $\overline{\text{LA}}$ 15–21. FIG. 82 also shows the page table address multiplexer unit 107 and physical mode buffer unit 108. In addition, such figure includes the "last block" register unit 116 which during an ECLIPSE MMPU emulation operation provides the physical address bits $\overline{\text{PHY}}$ 8–21. FIG. 82 also shows the LMP Data Register. FIG. 83 shows Tag Store 102 and Protection Store 104. Tag comparator unit 105 is depicted in FIG. 84. FIG. 85 shows the logical address register 101, while physical address offset multiplexer 109 and the logical address register CPD bus driver unit are shown in FIGS. 86 and 87, respectively. The physical address bus driver units for filing the appropriate physical address bit $\overline{\text{PHY}}$ 8–21 are shown in FIG. 88.

Figure 89:
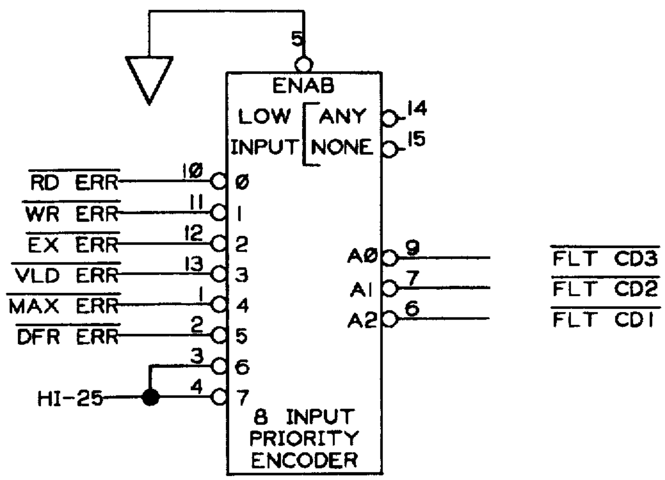
Figure 90:
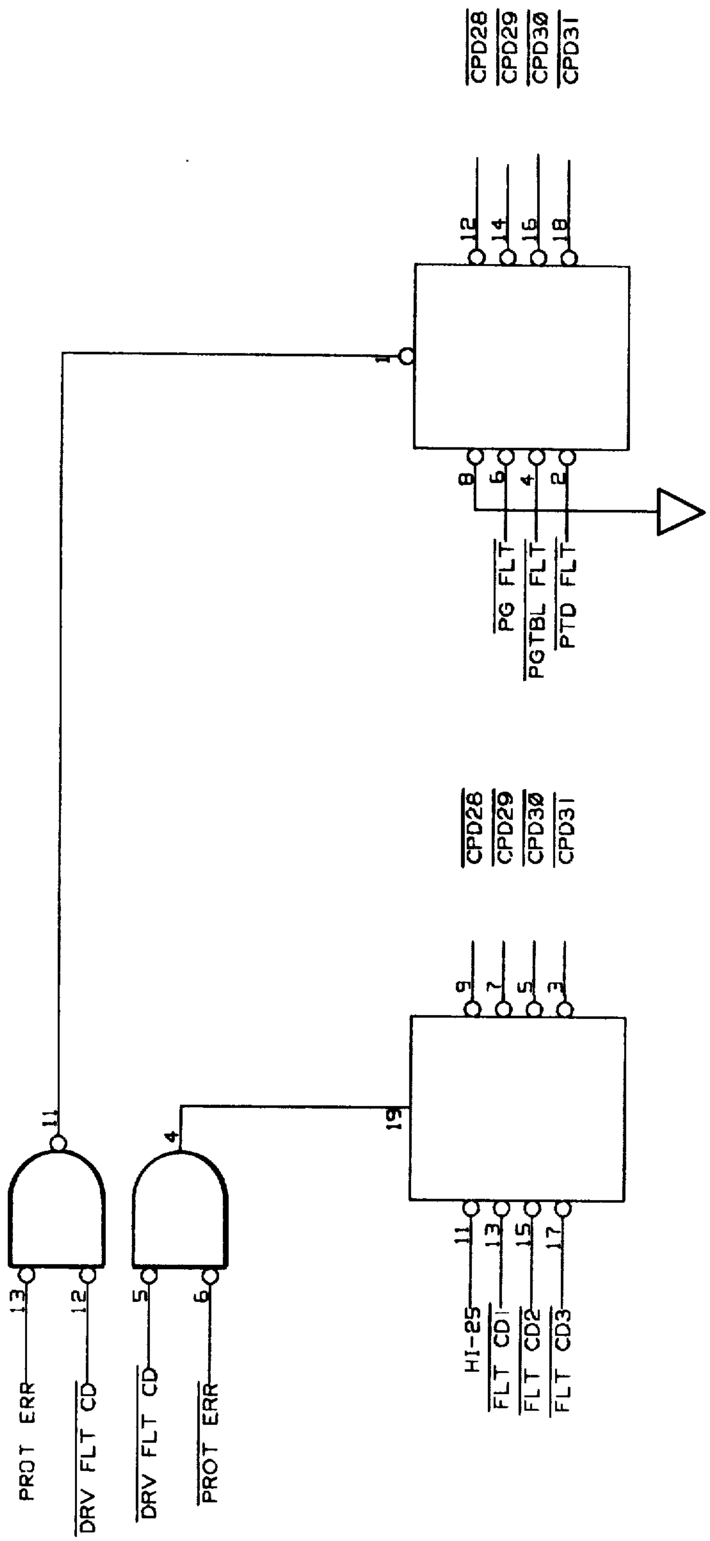
Figure 91:
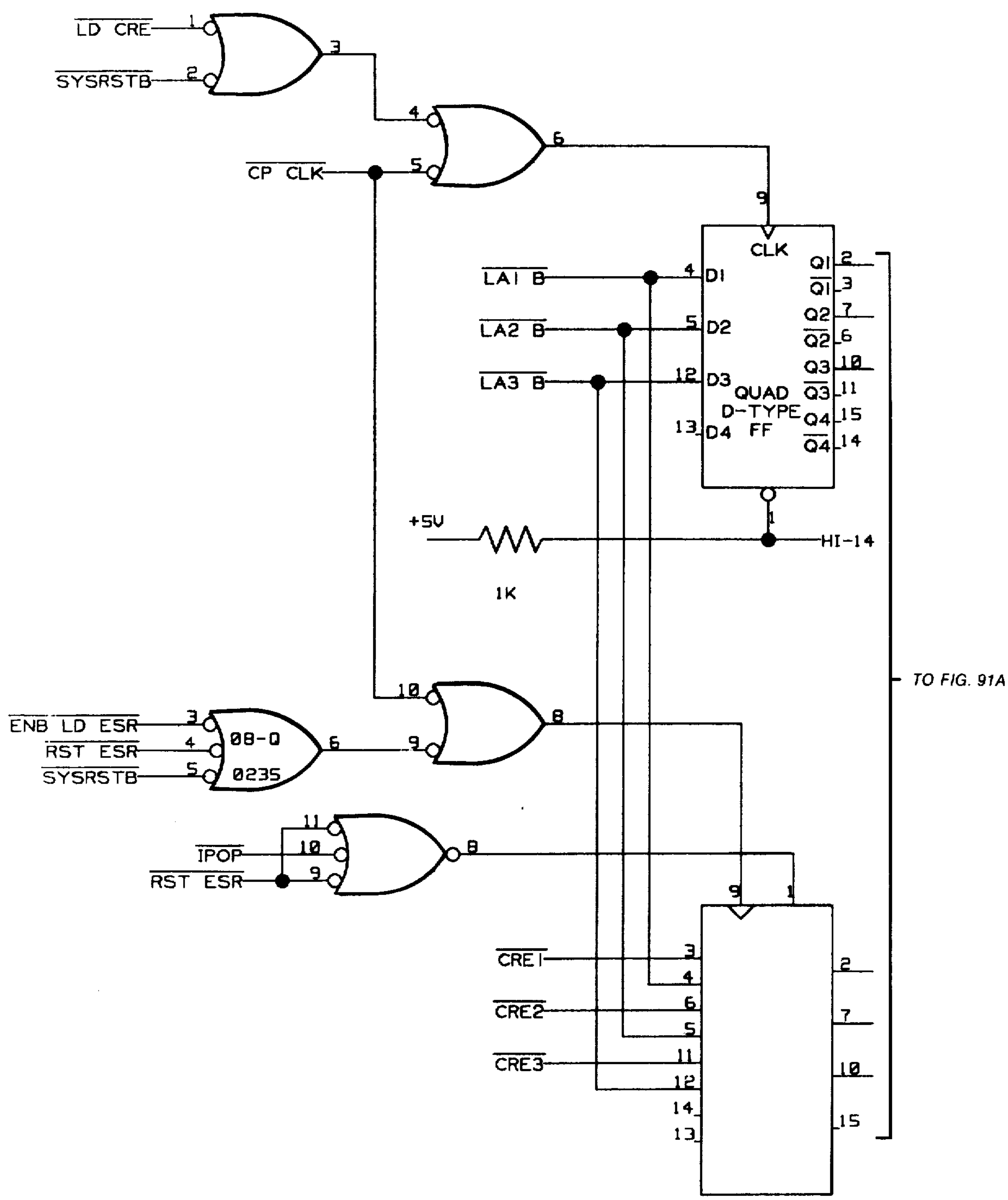
Figure 91A:
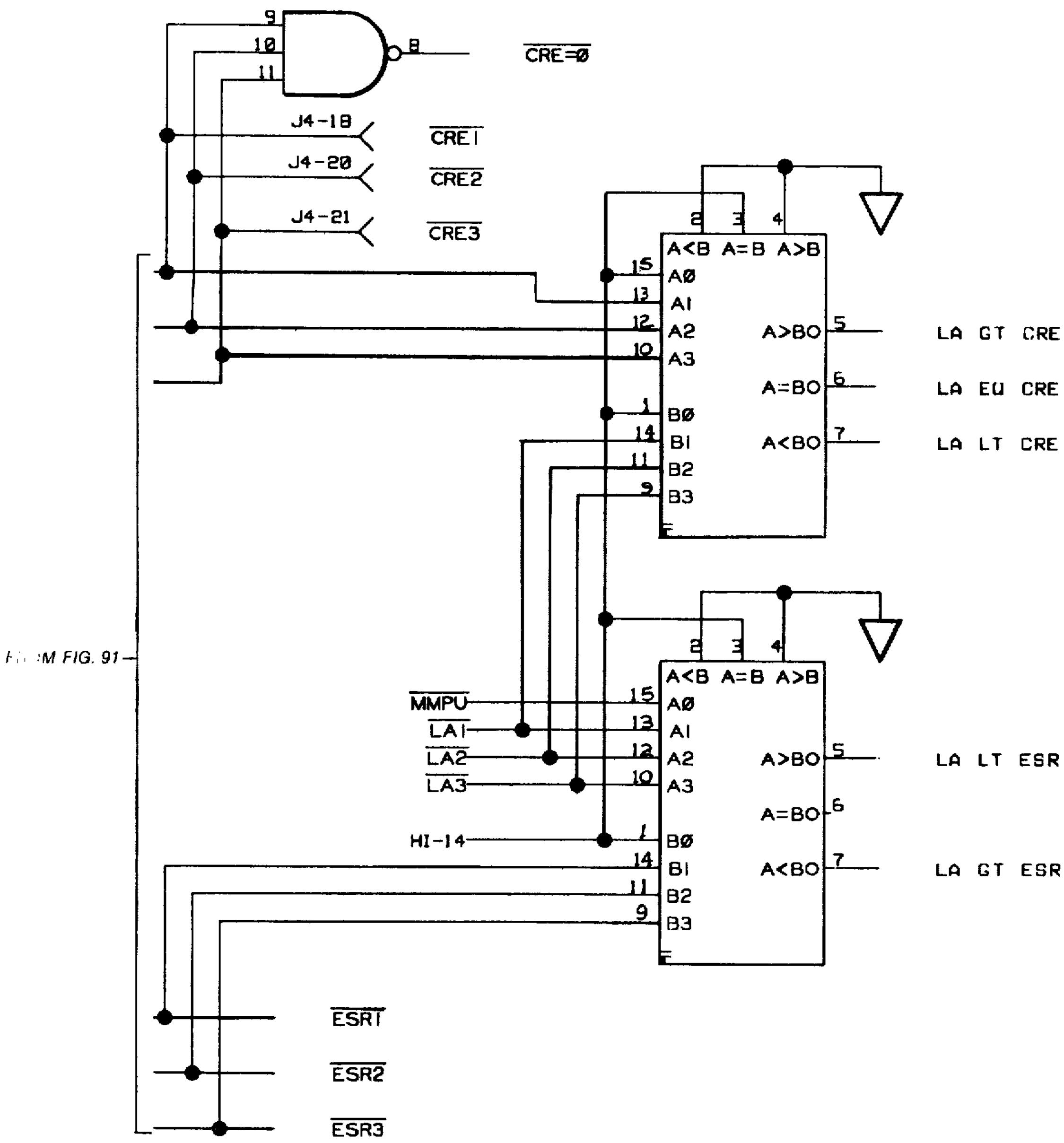
Figure 91B:
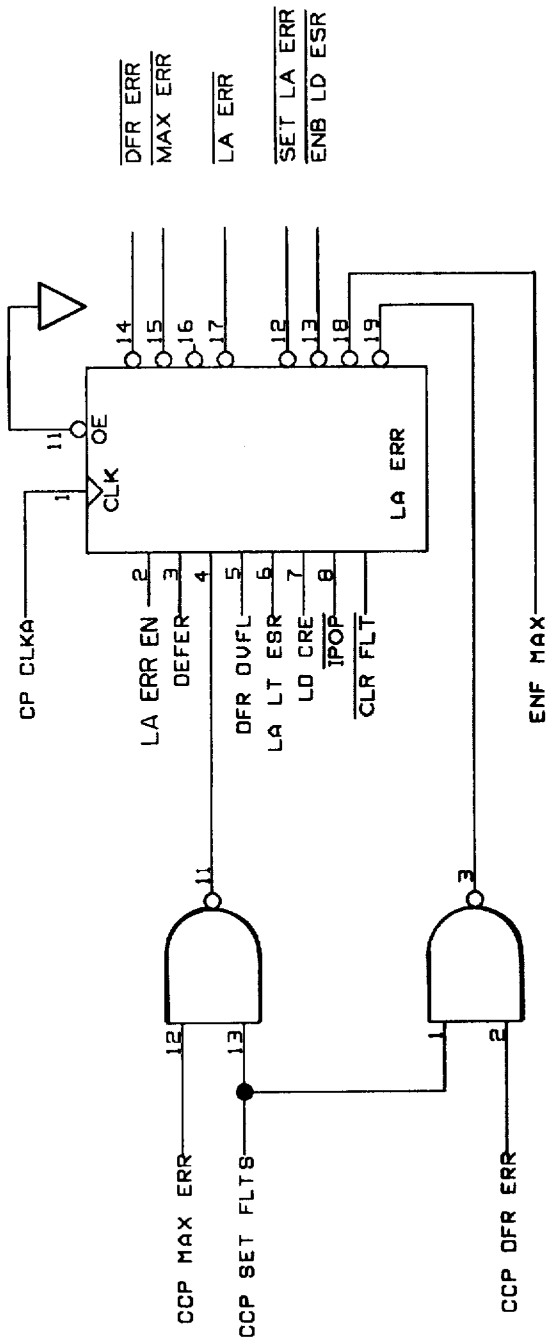
Figure 92:
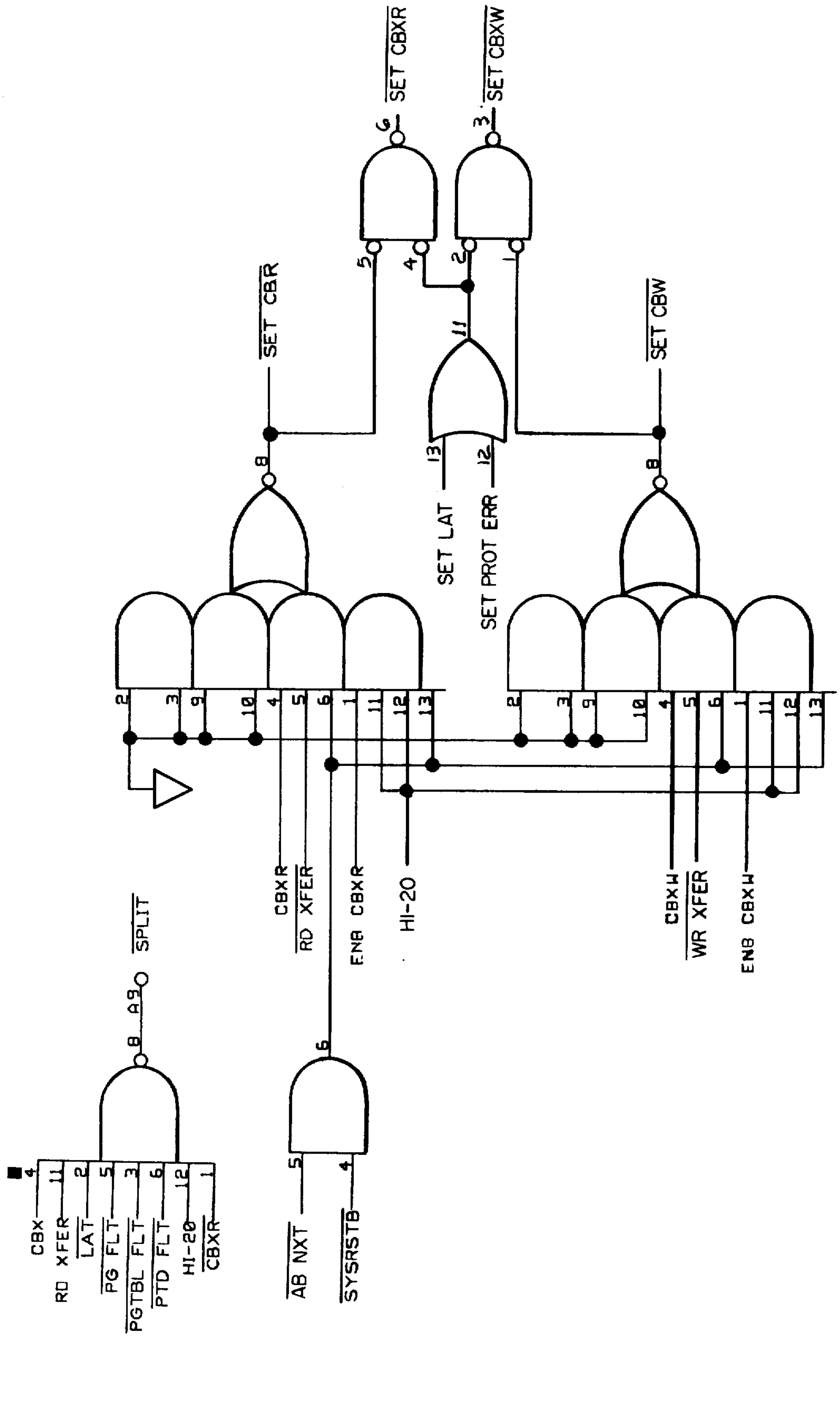
Figure 92A:
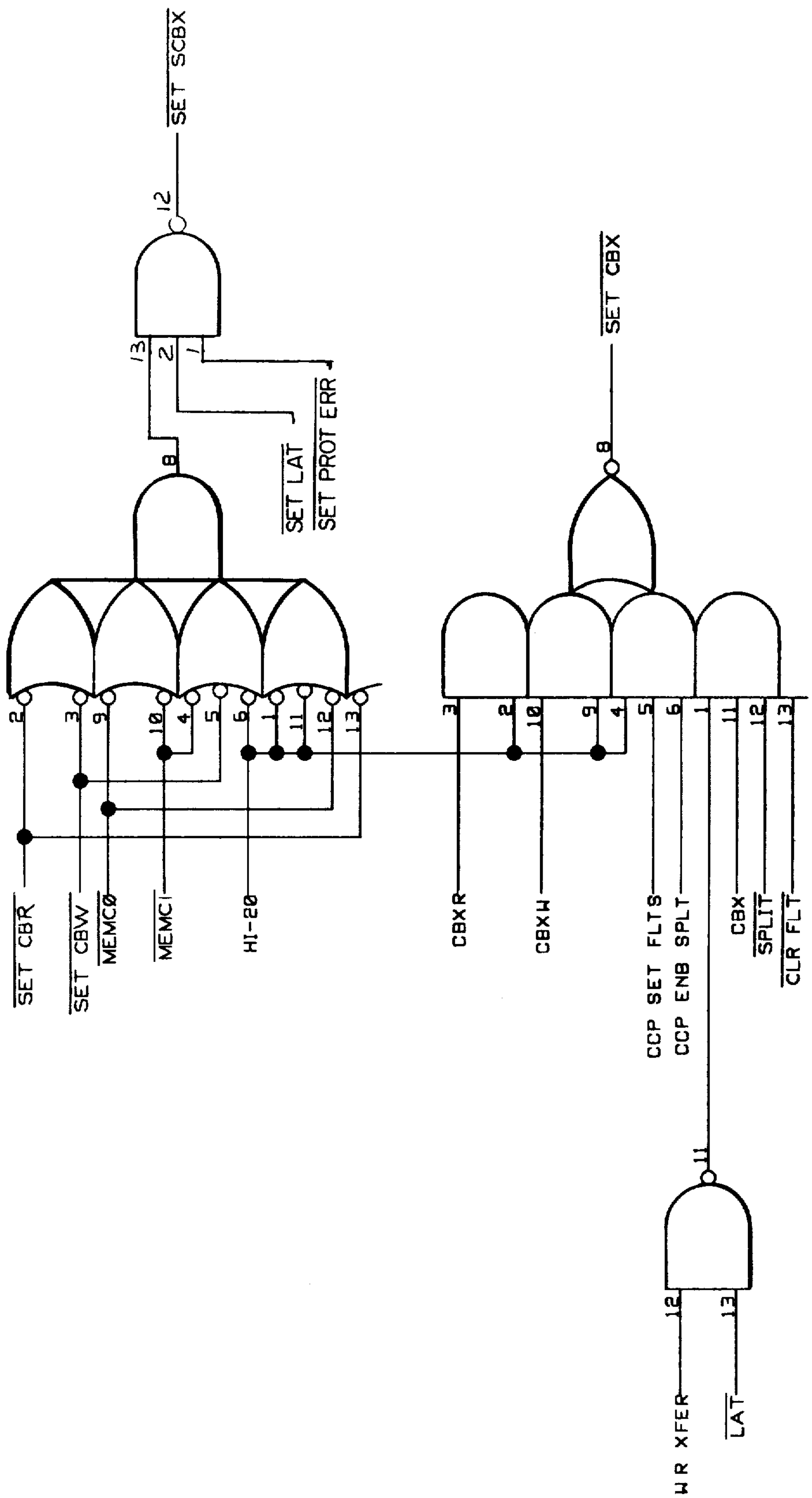
Figure 92B:
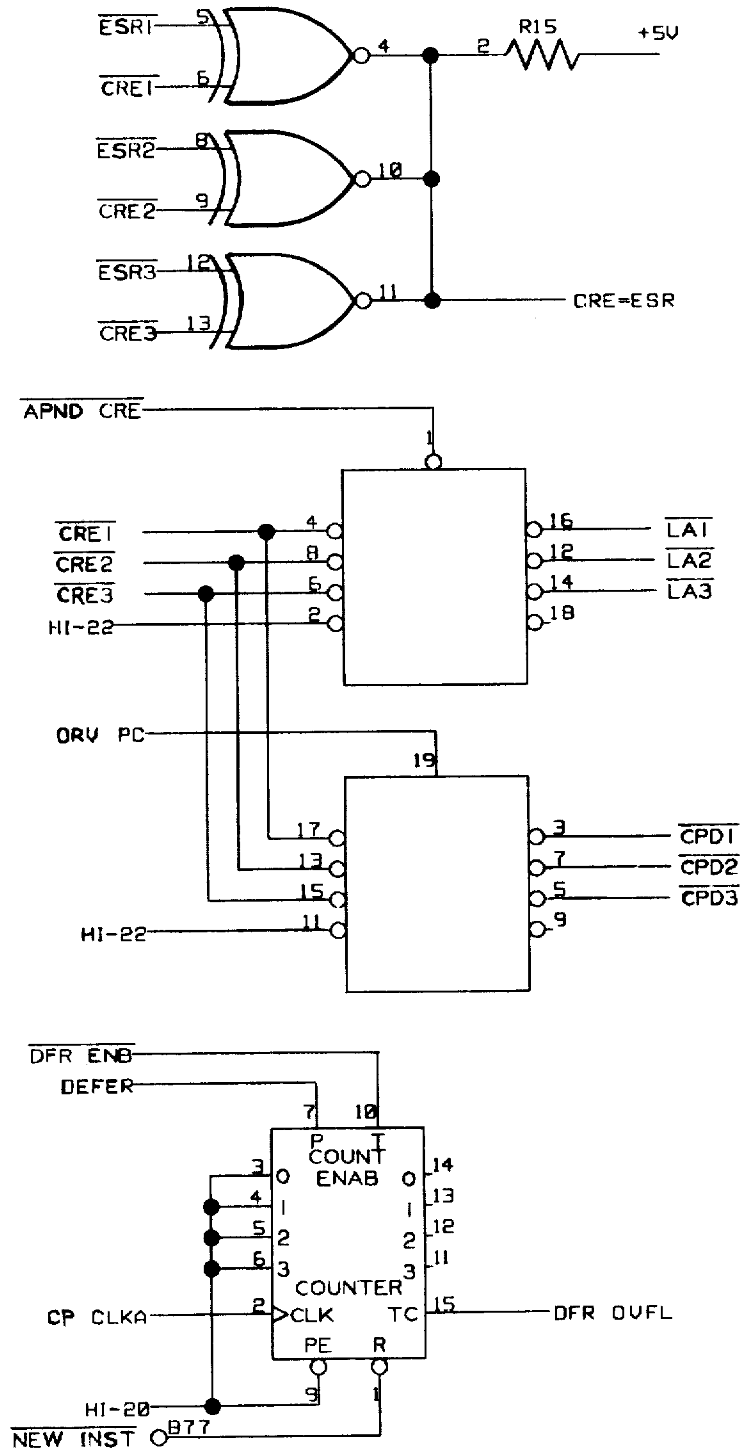
Figure 92C:
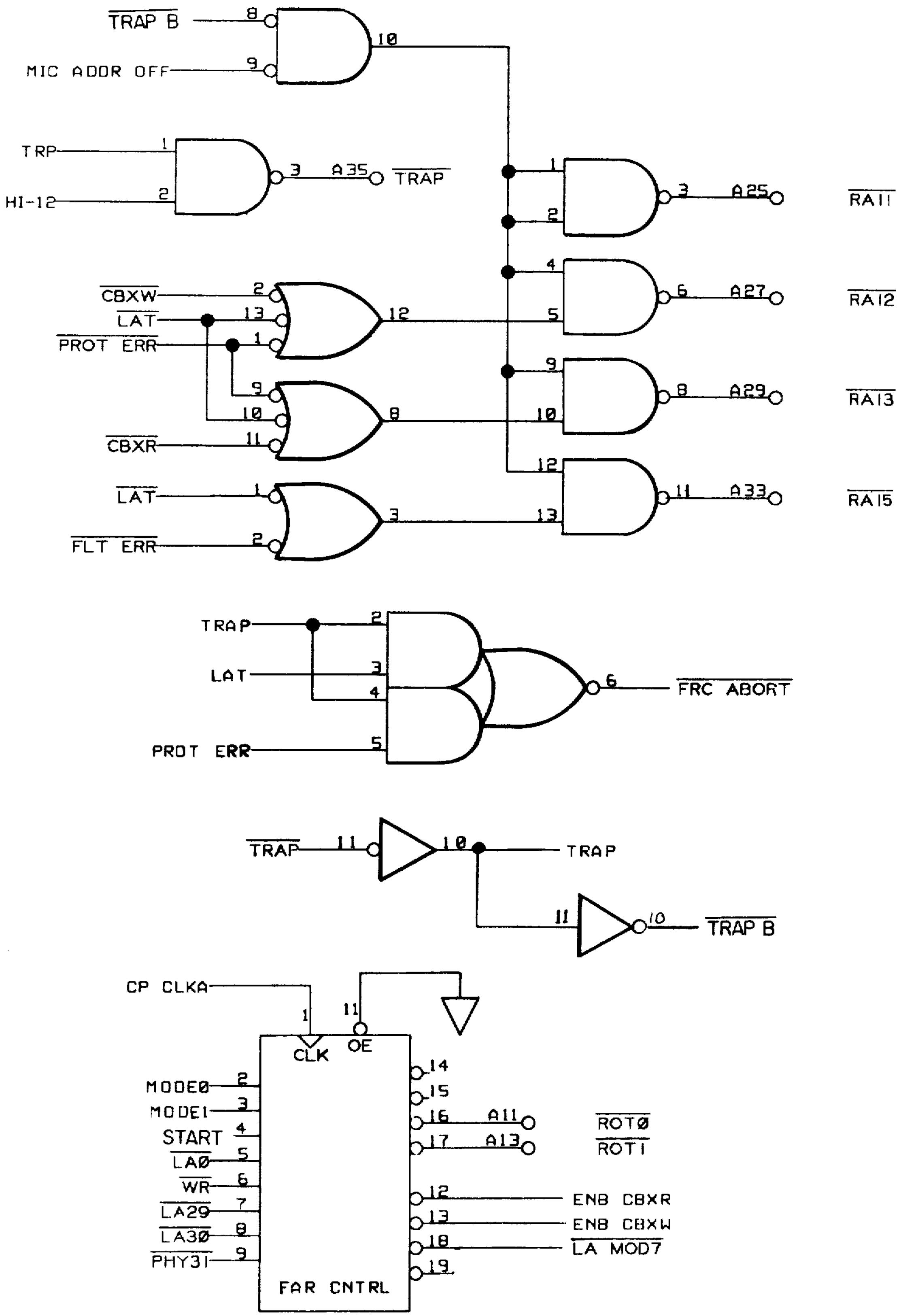
Figure 92D:
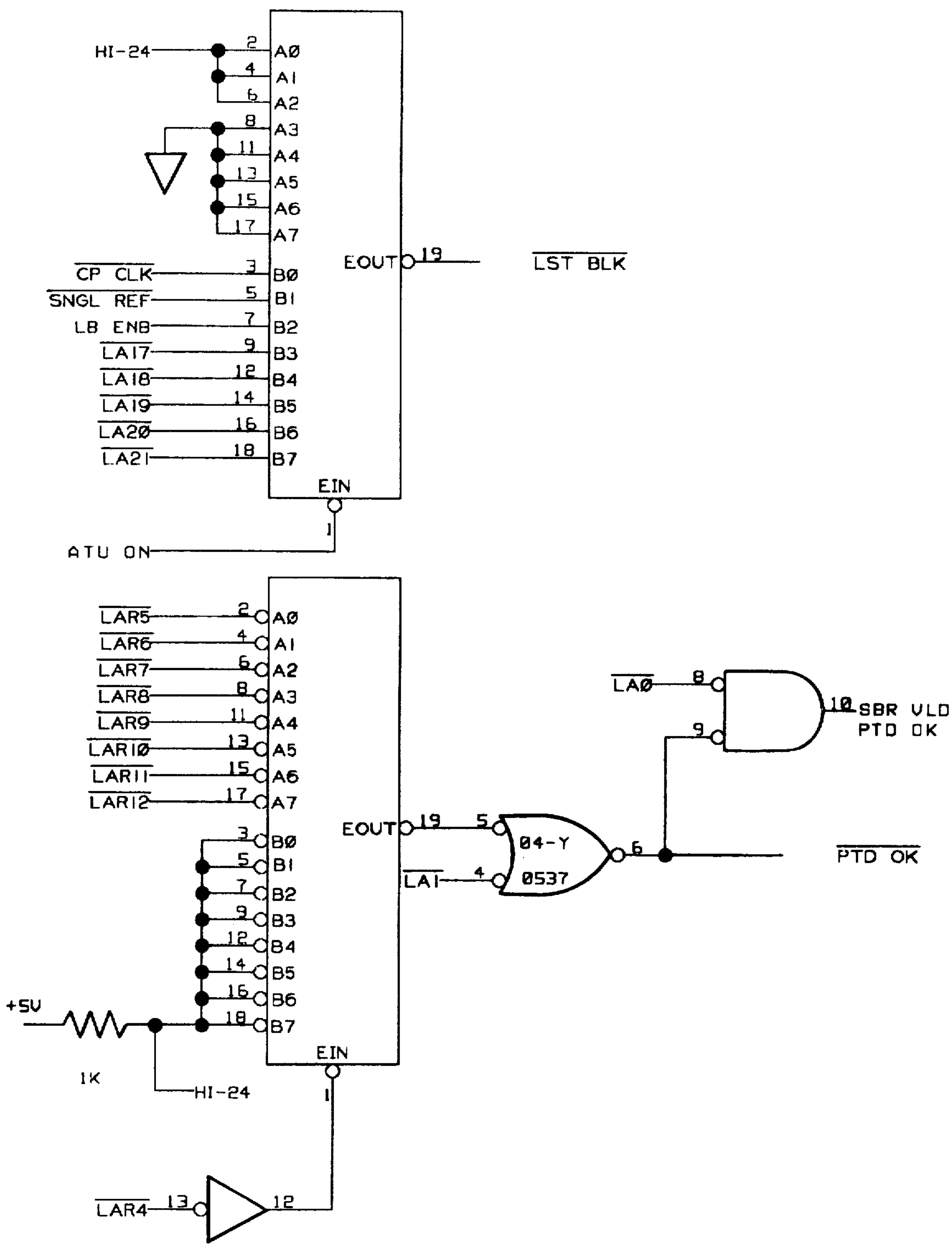
Figure 93:
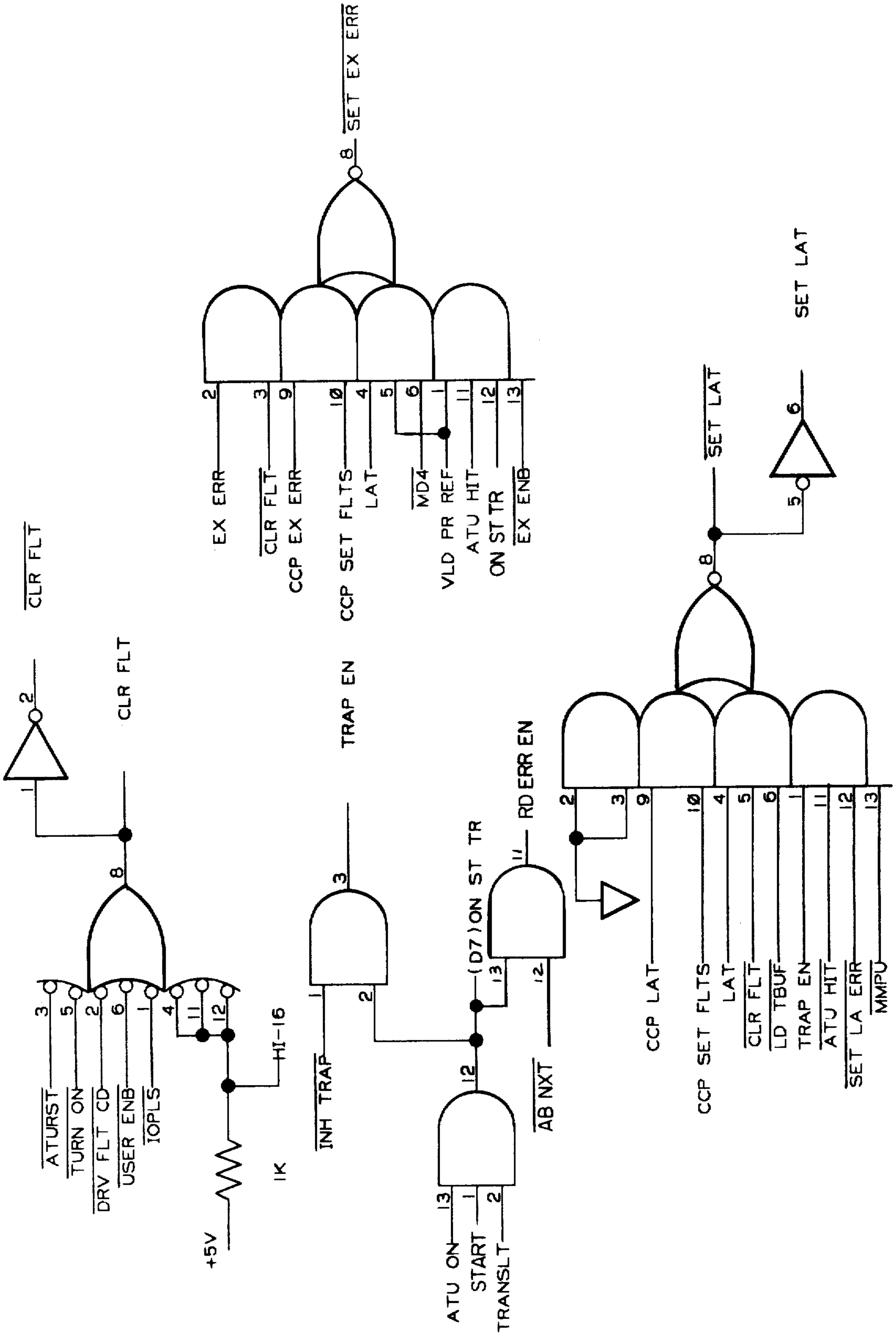
Figure 93A:
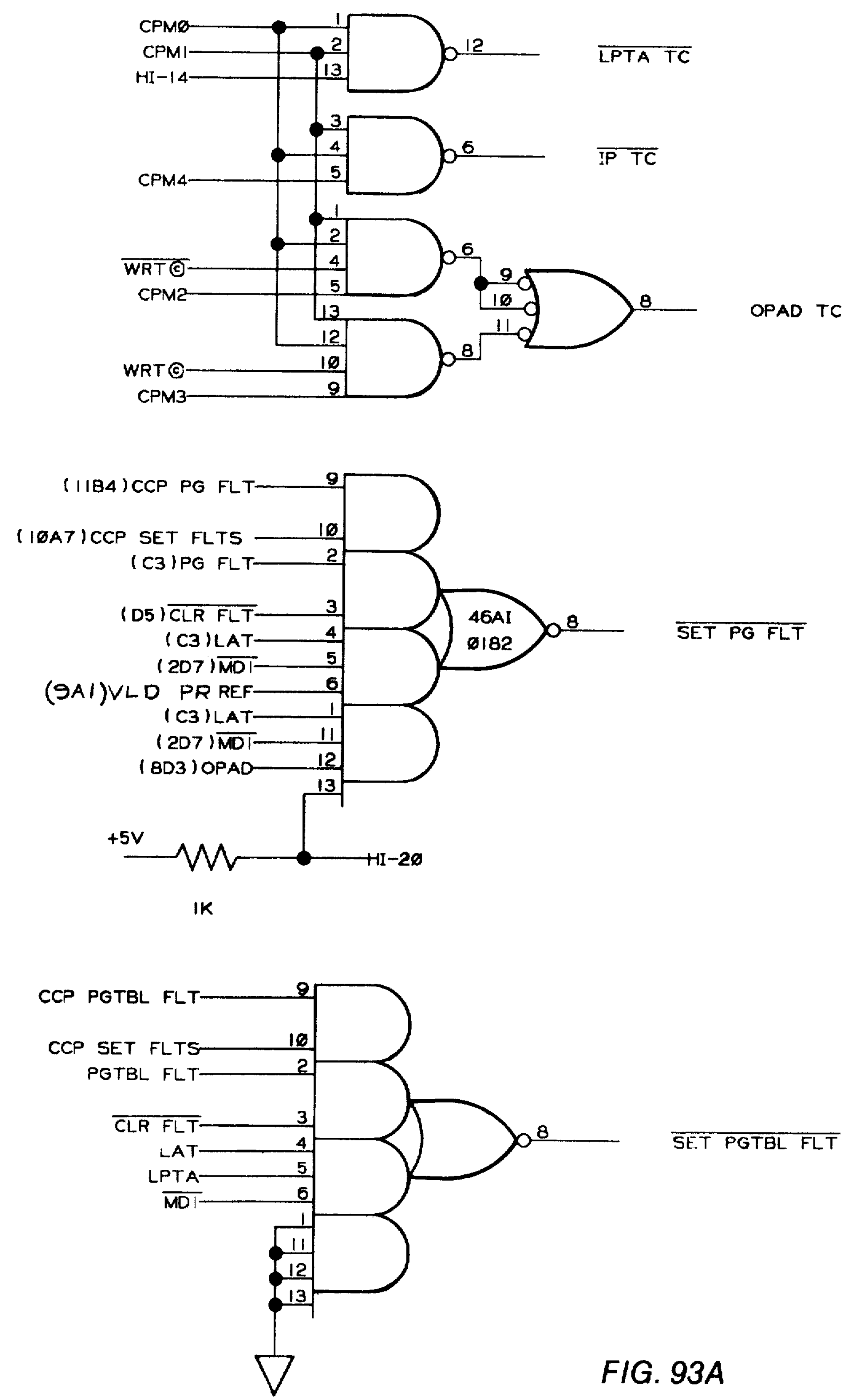
Figure 93B:
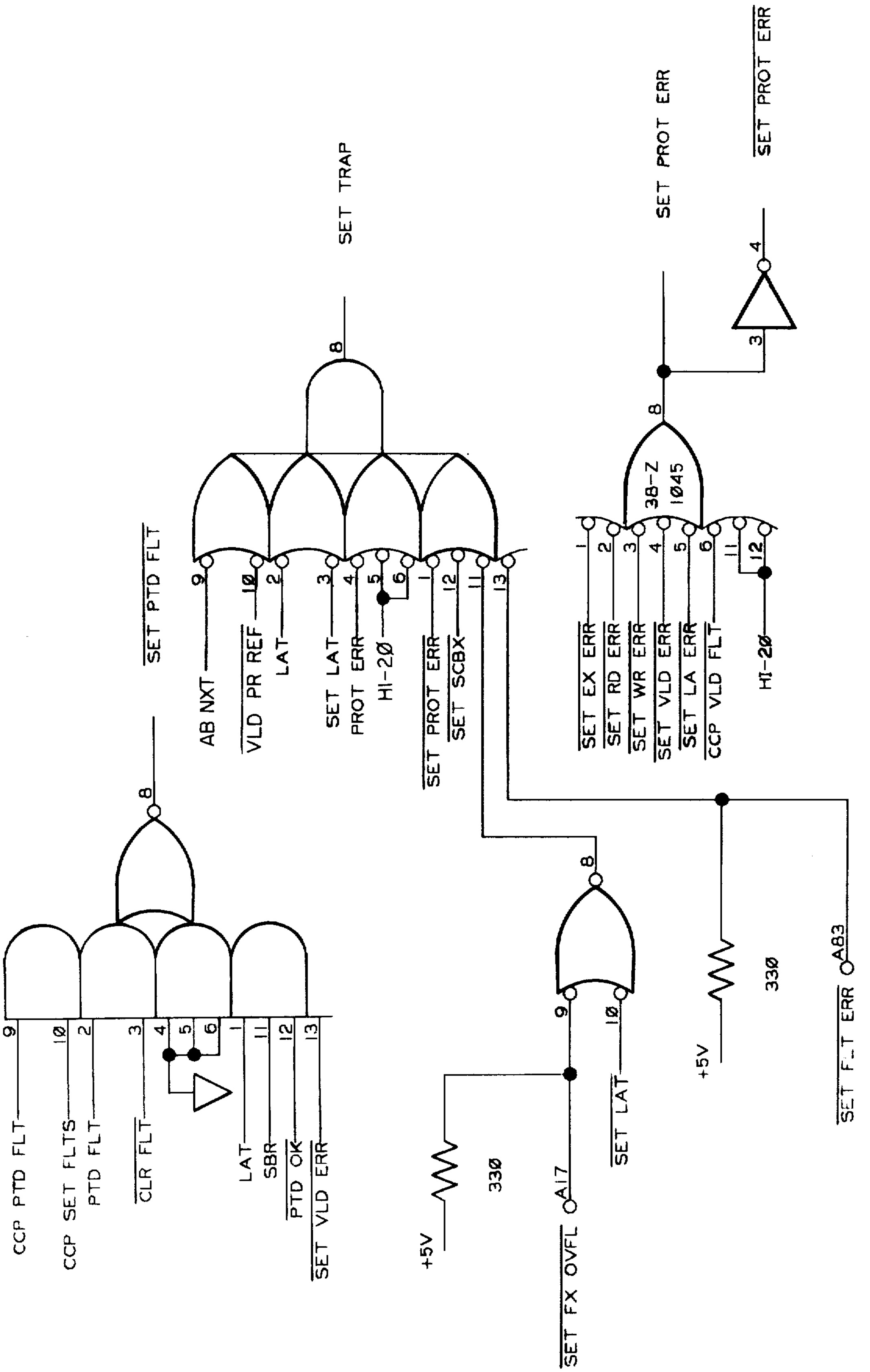
Figure 93C:
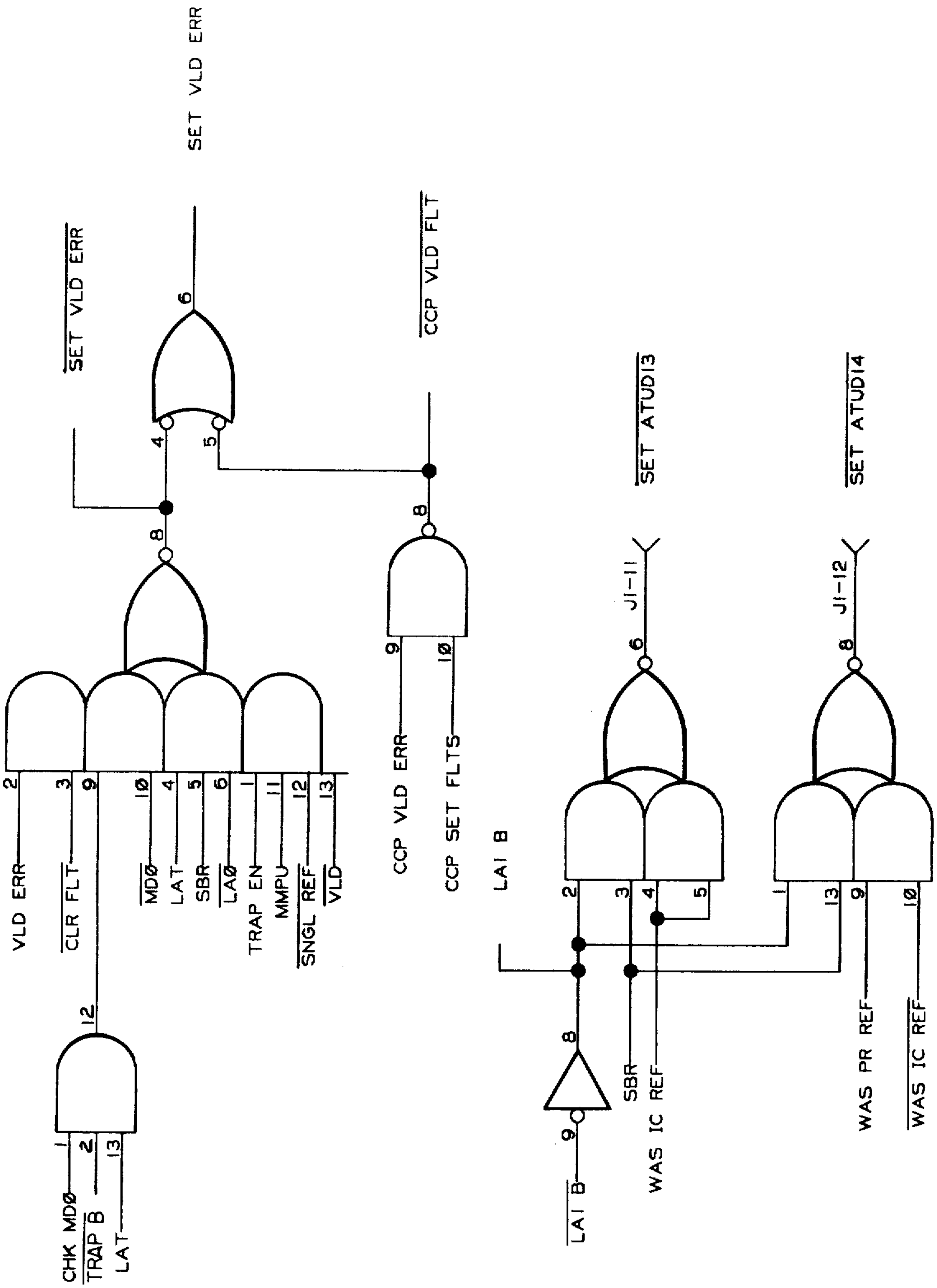
Figure 93D:
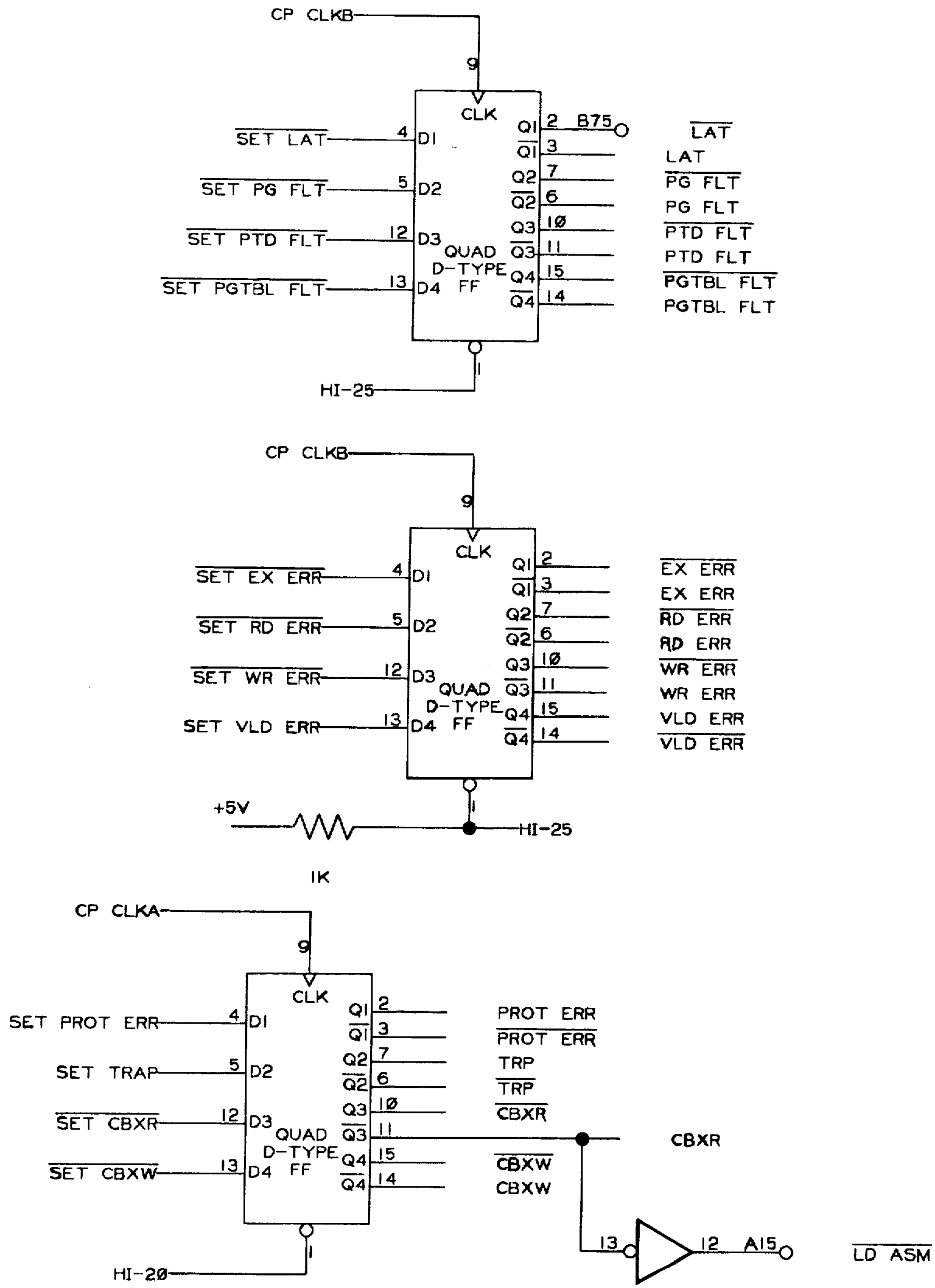
Figure 93E:
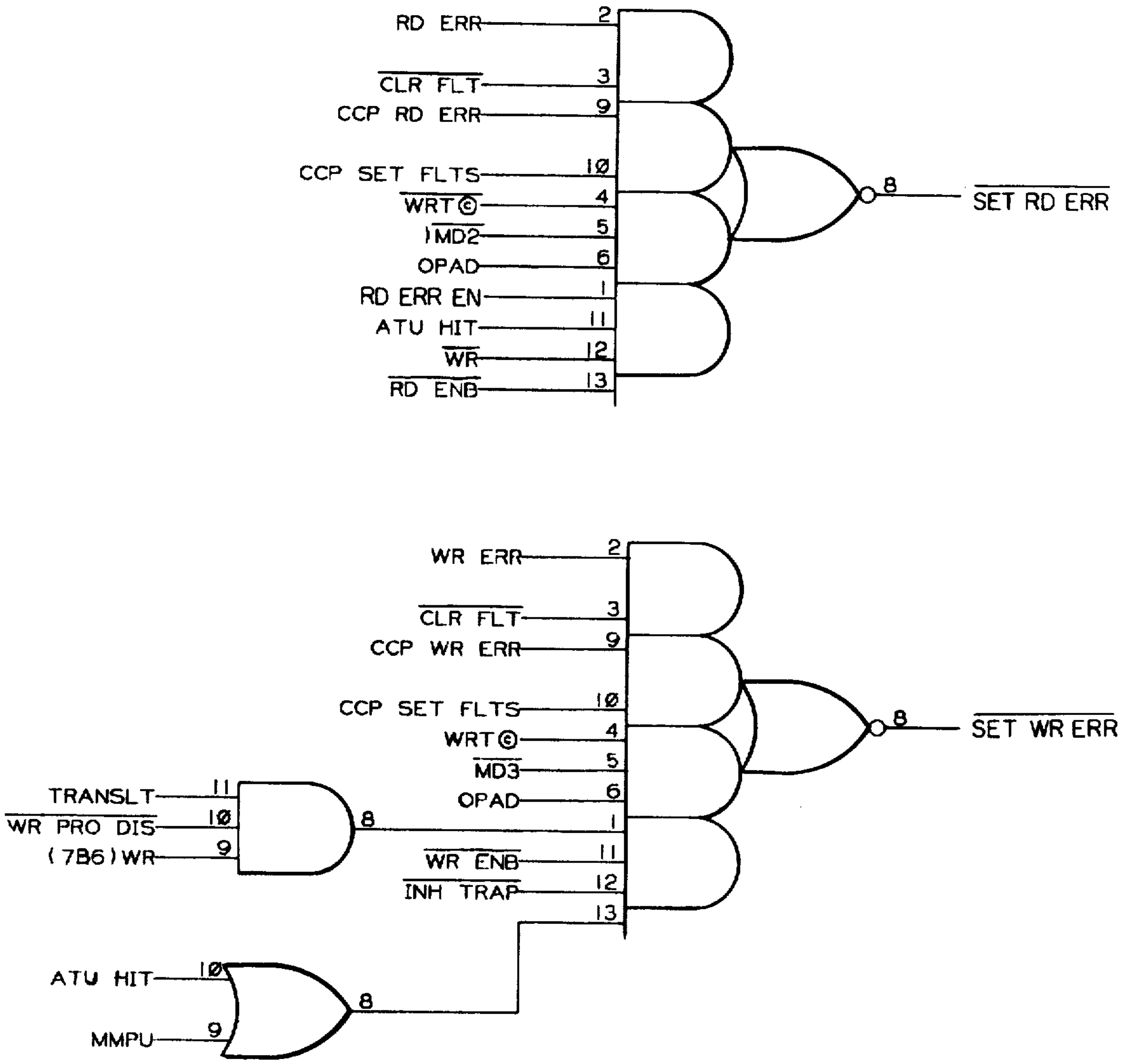

Protection logic including fault detection and cache block crossing trap logic is depicted in FIGS. 89–92, protection logic identification encoder unit 110 being shown in FIG. 89, the fault code bit drive unit 112 being shown in FIG. 90, ring protection logic circuit 111 being shown in FIG. 91 and the fault detection and cache block crossing logic being shown in FIGS. 92 and 93.

Figure 94:
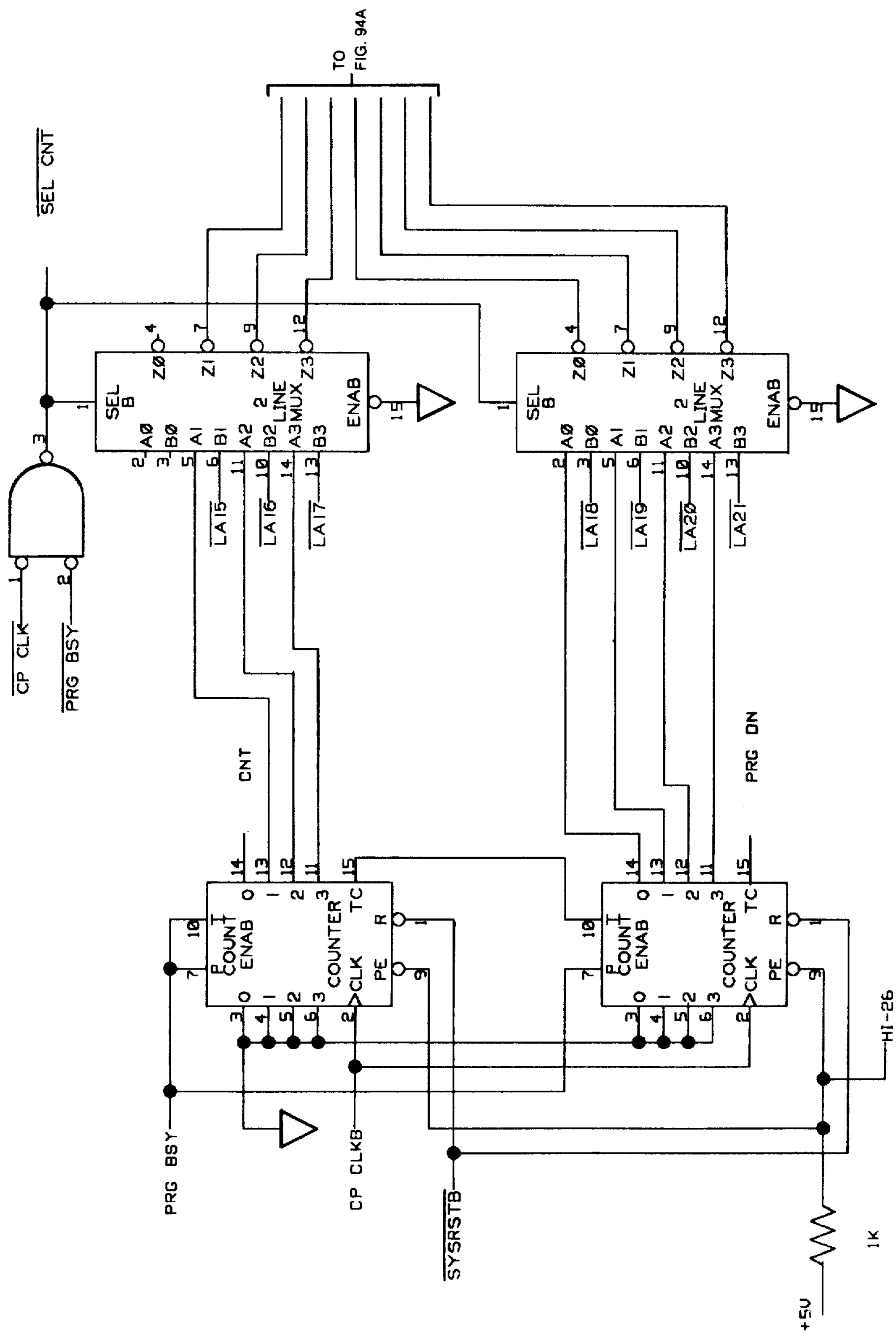
Figure 94A:
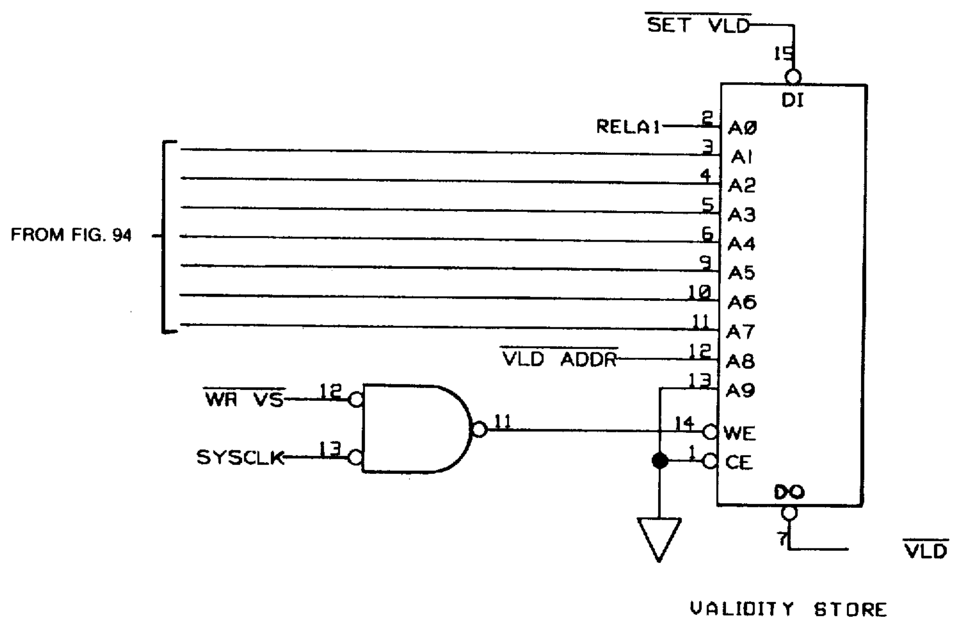
Figure 95:
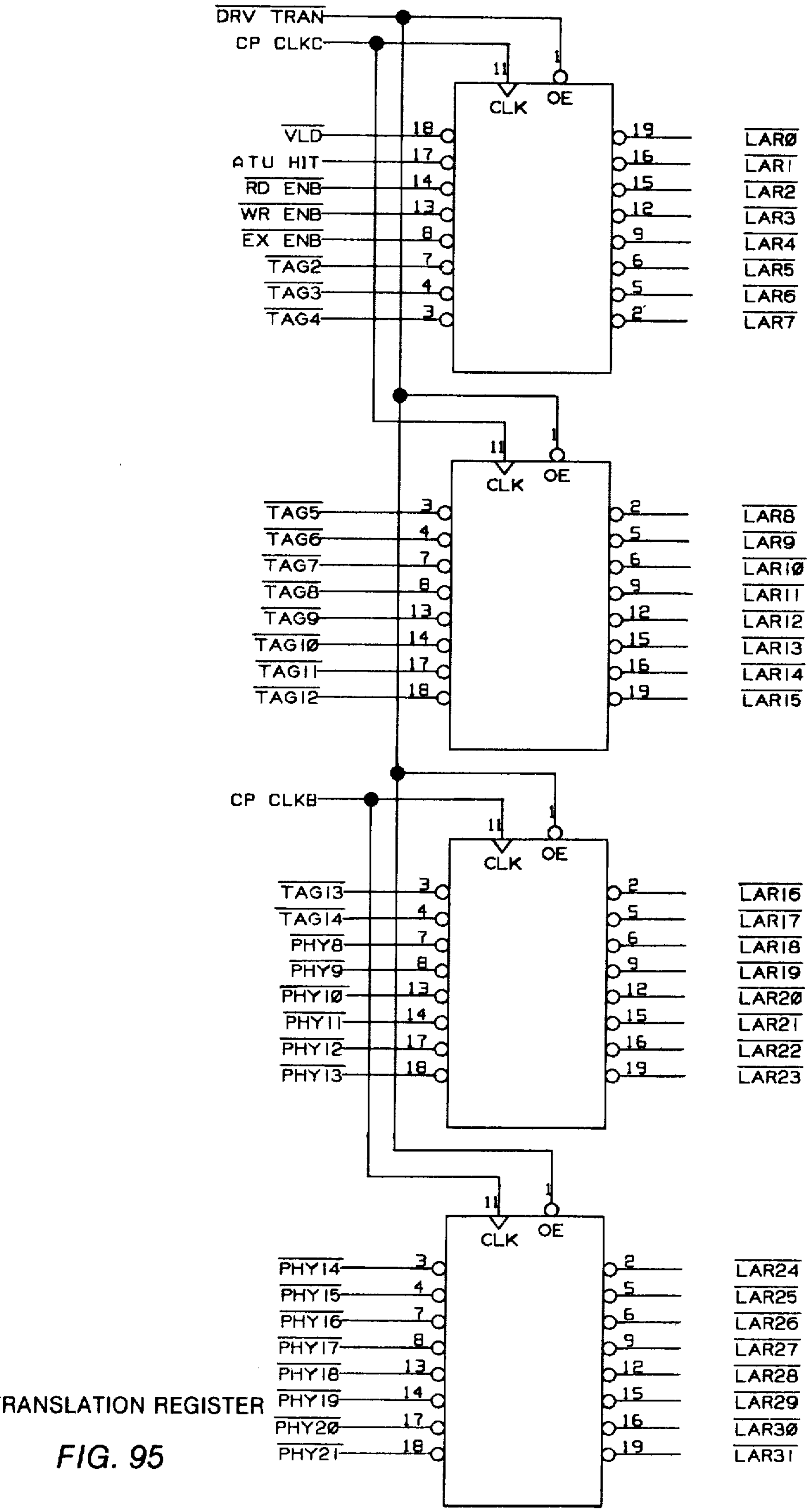
Figure 96:
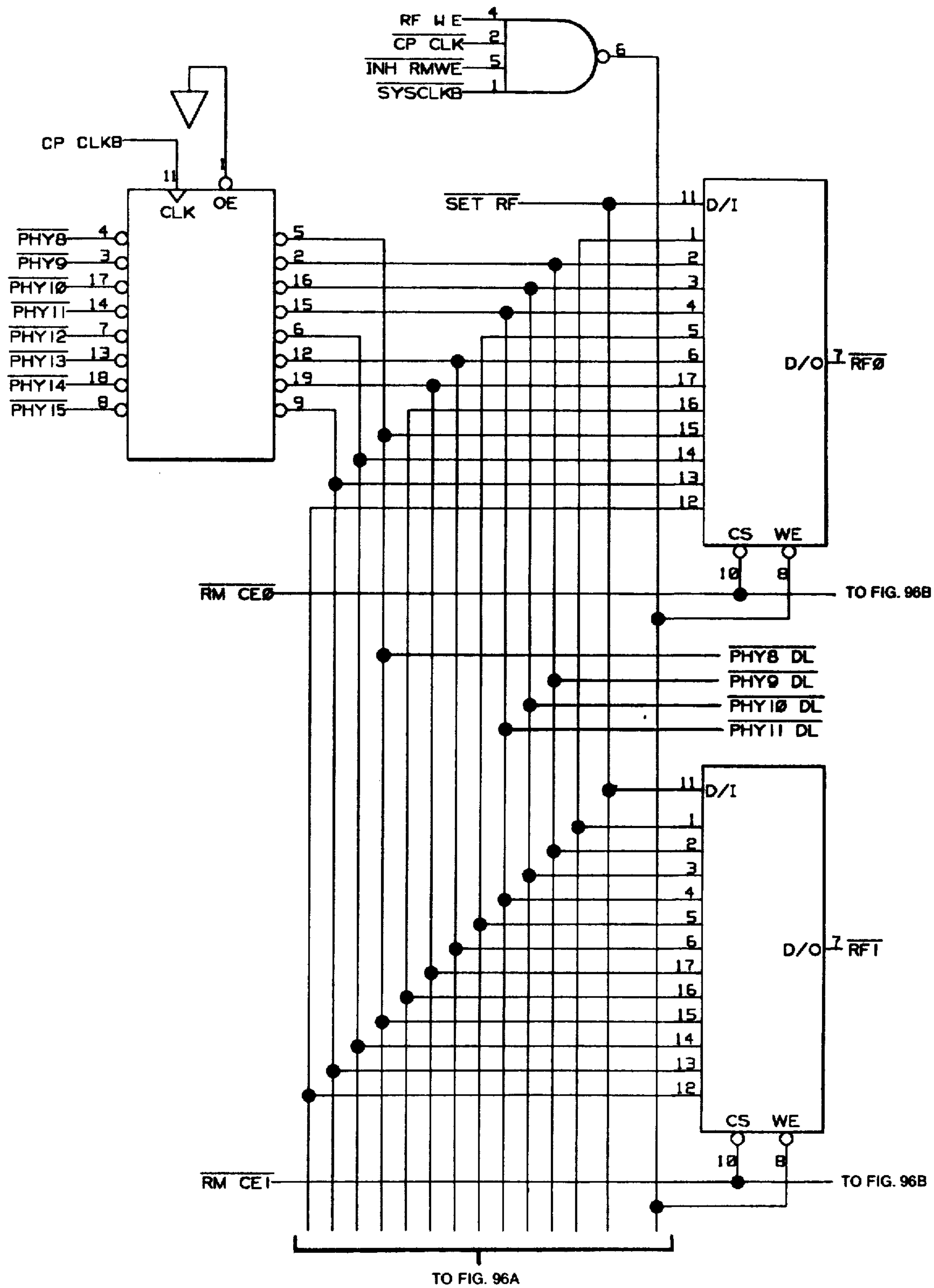
Figure 96A:
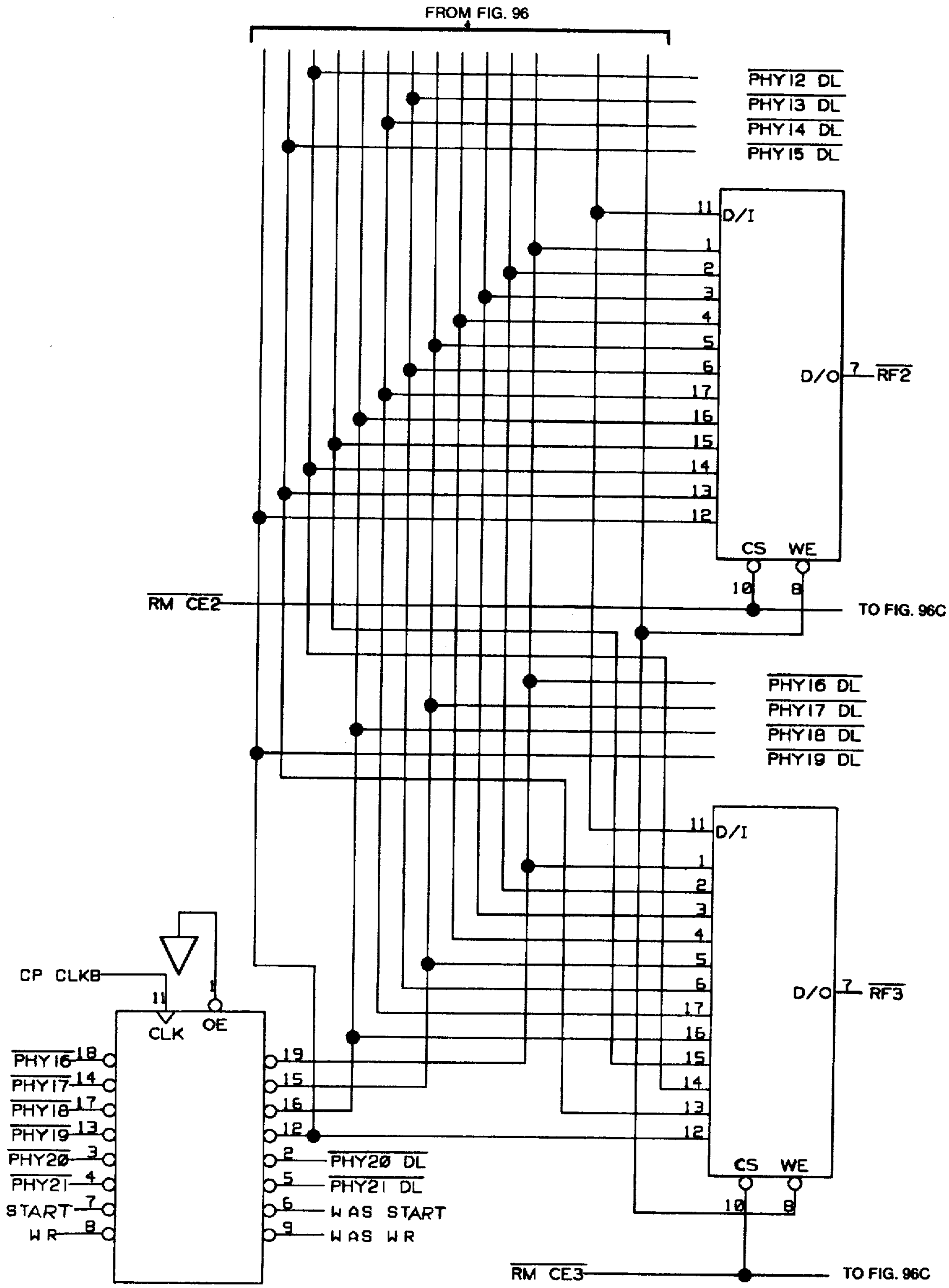
Figure 96B:
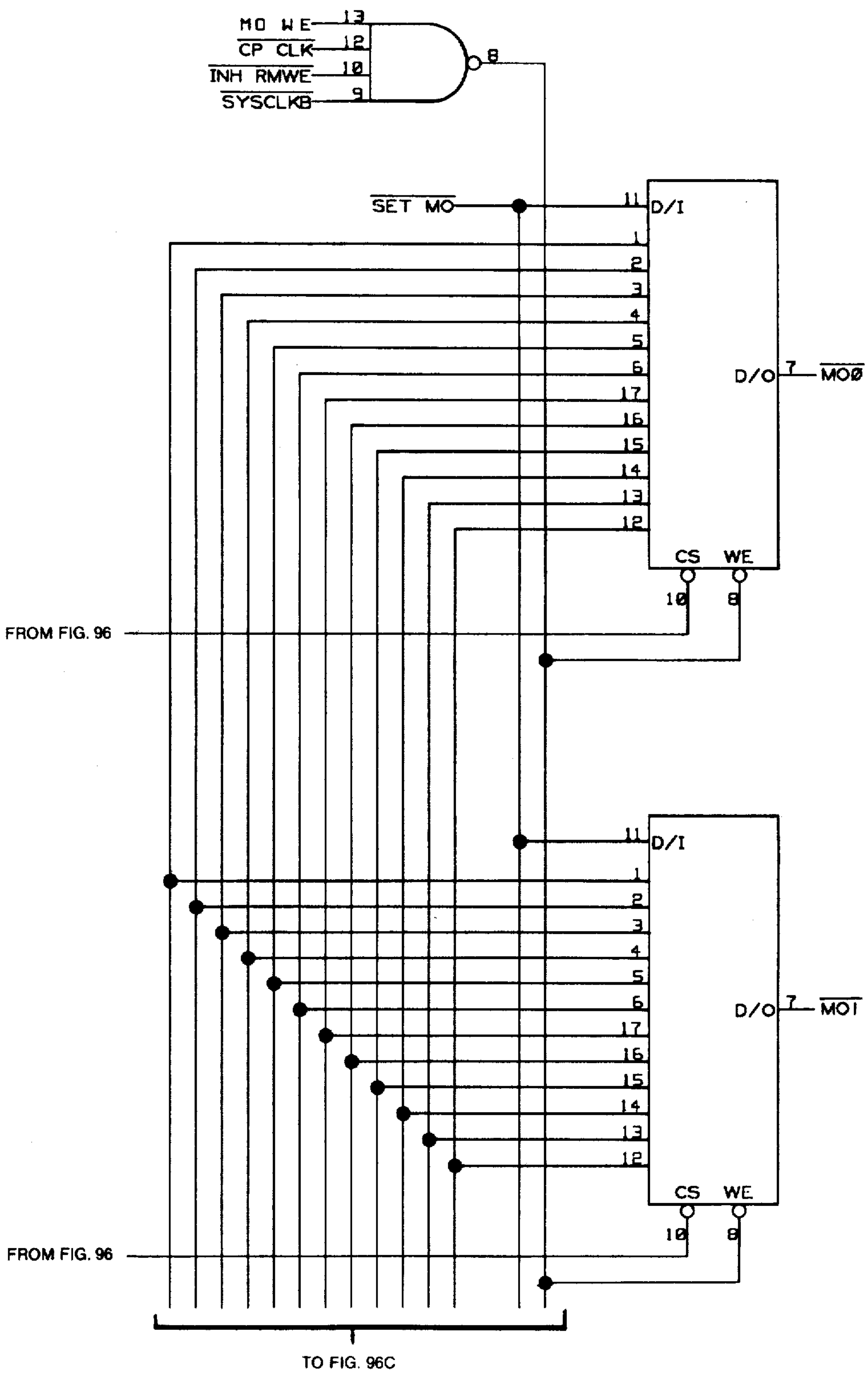
Figure 96C:
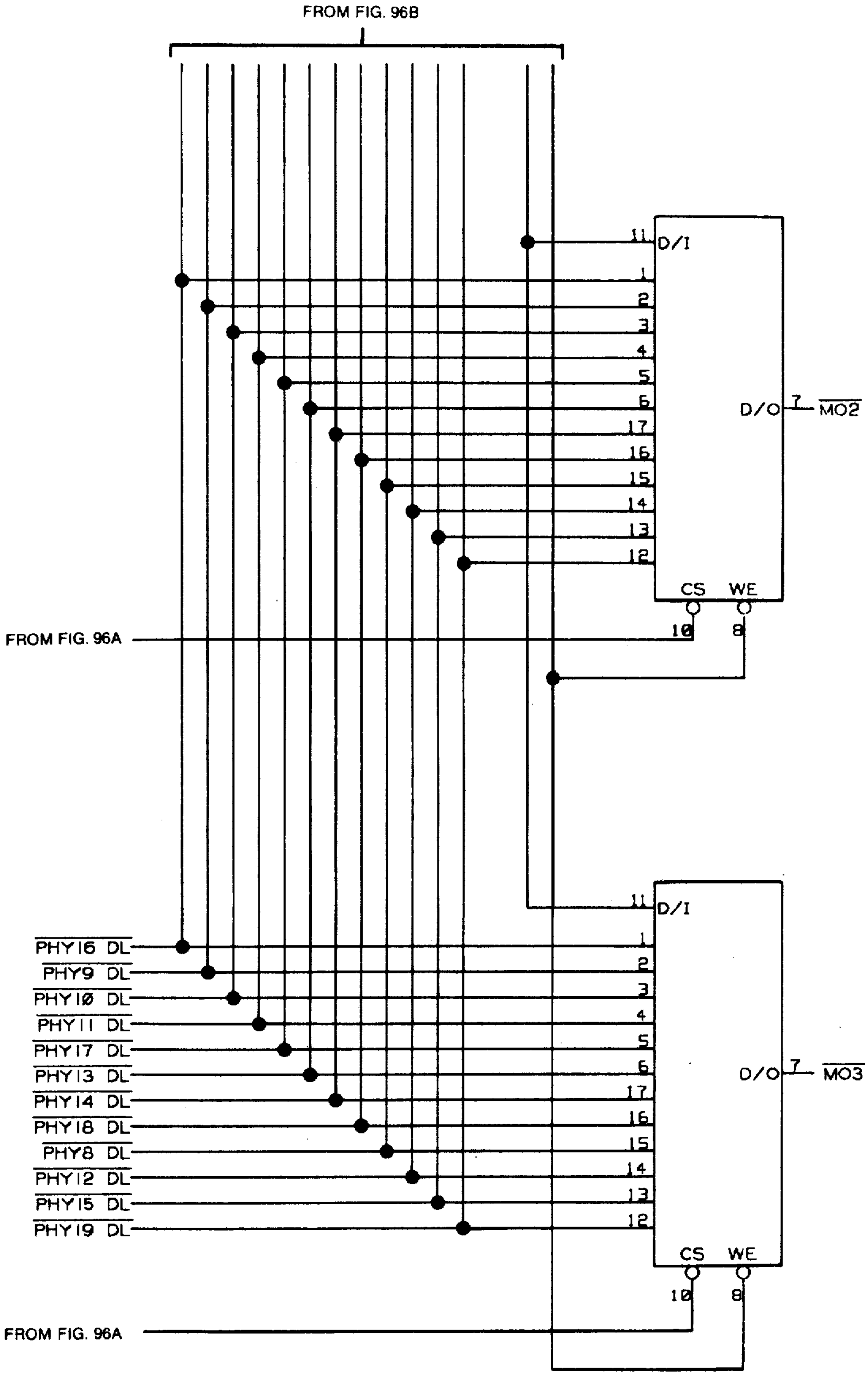
Figure 96D:
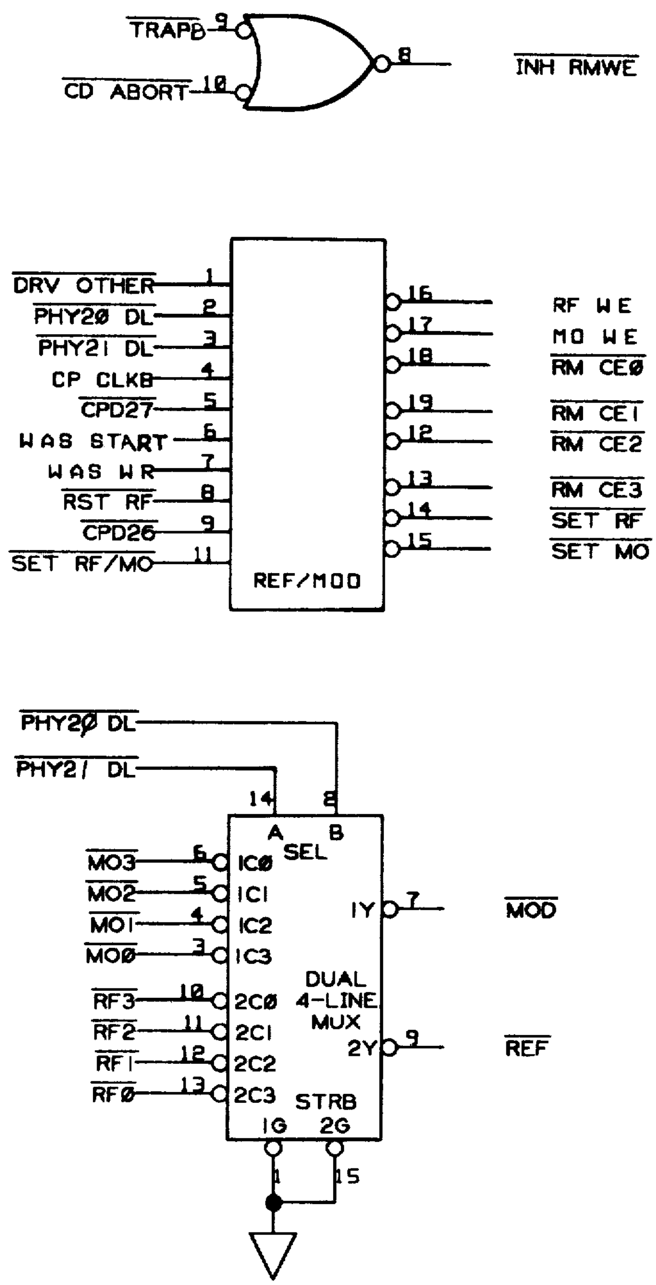
Figure 97:
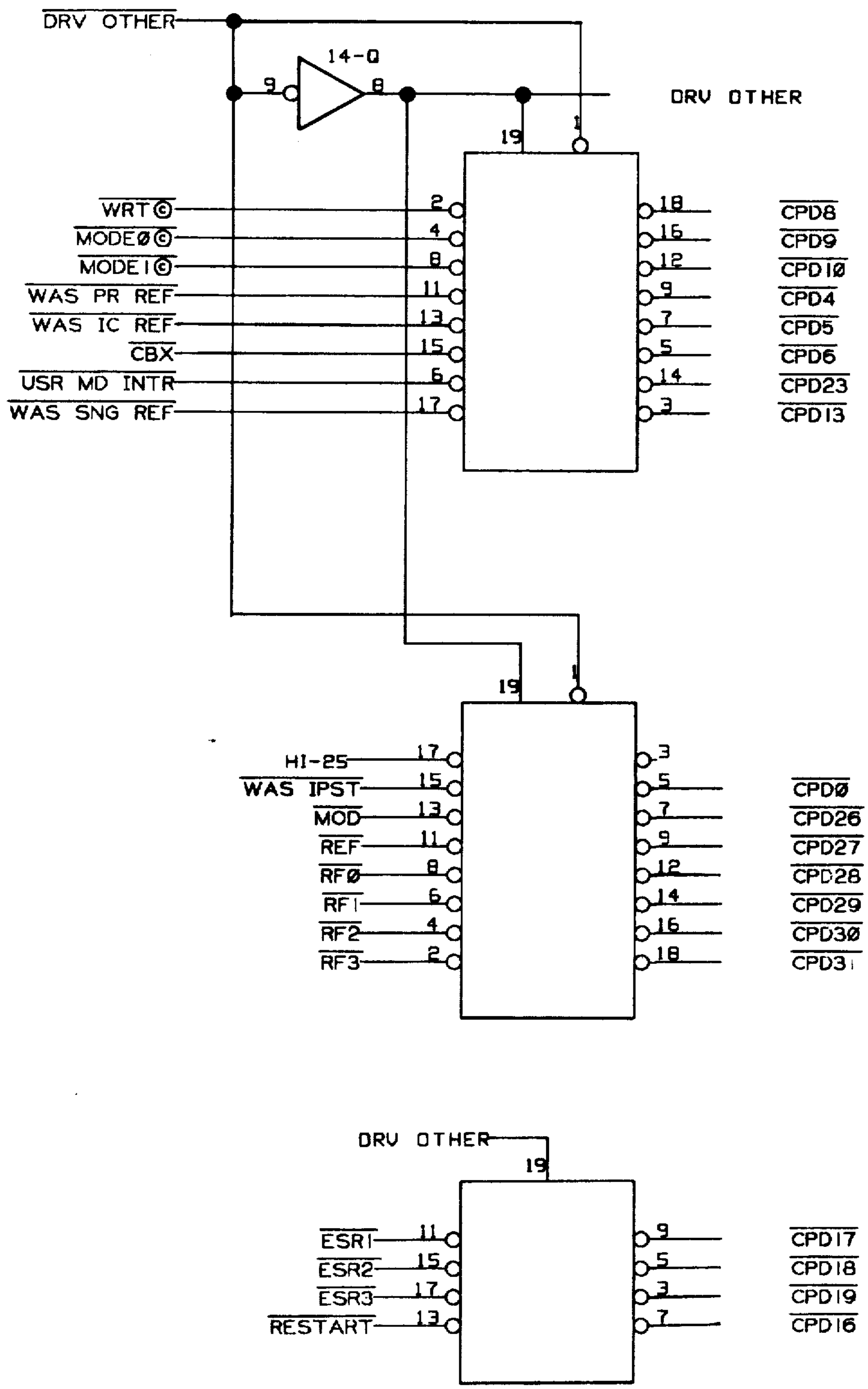
Figure 98:
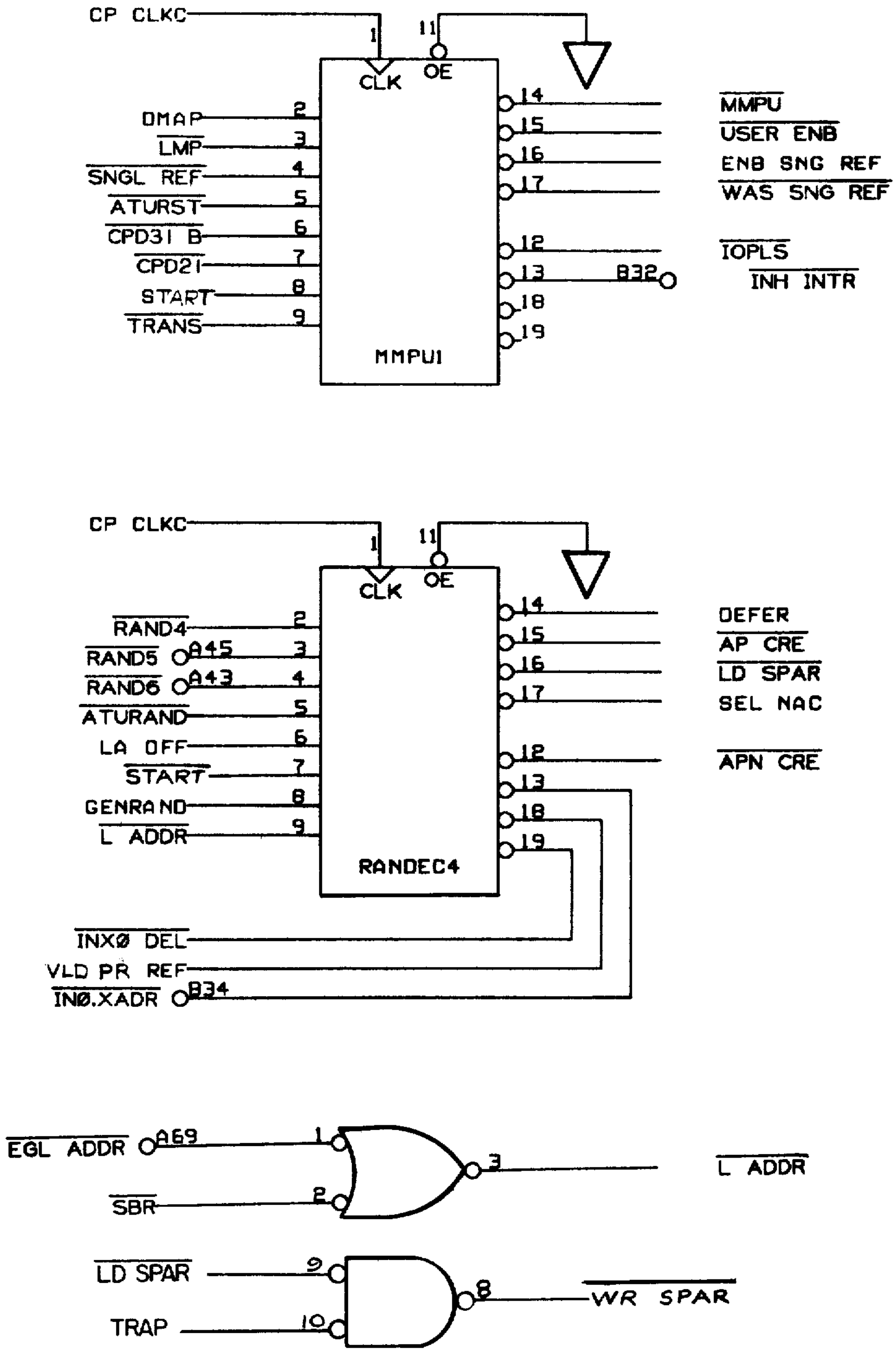
Figure 98A:
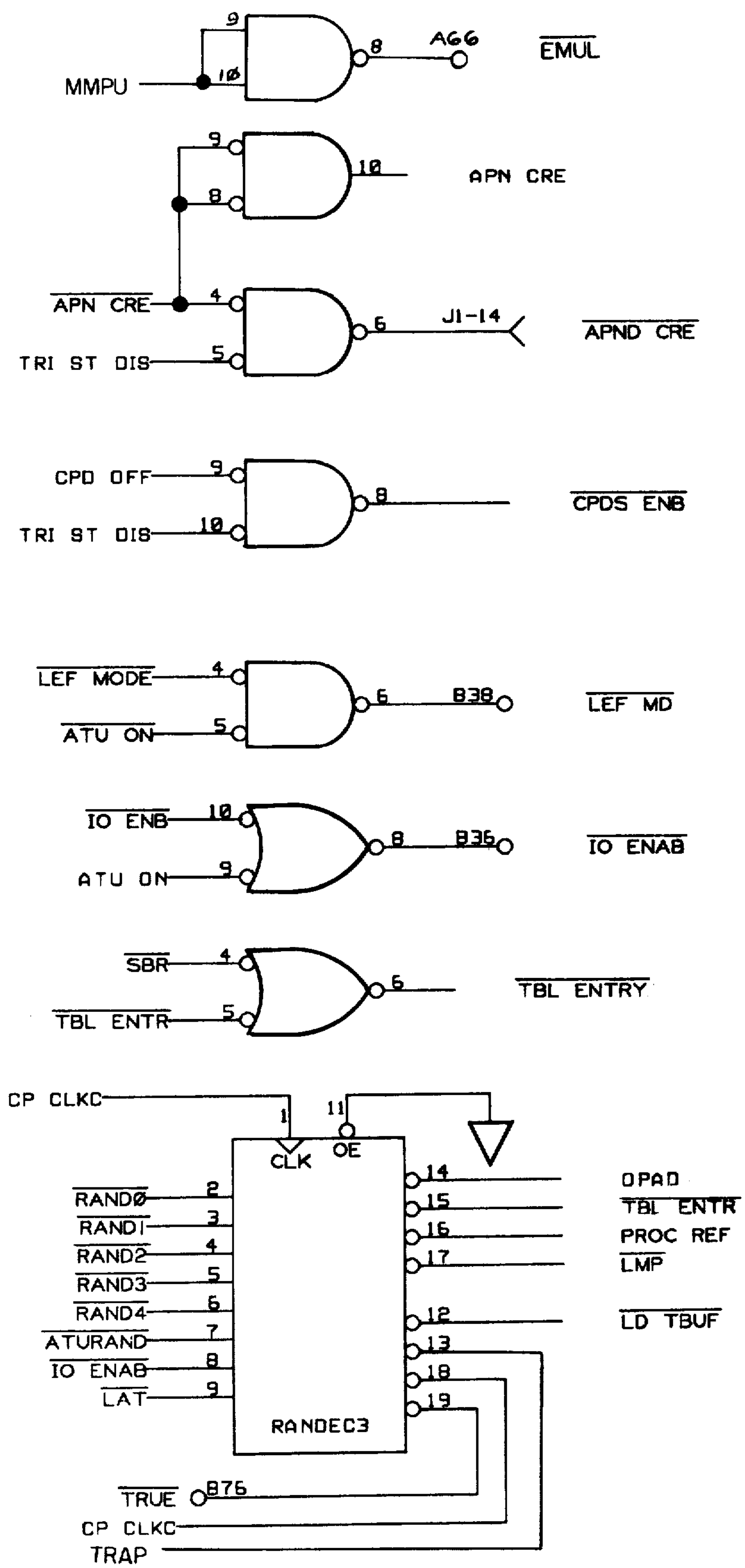
Figure 98B:
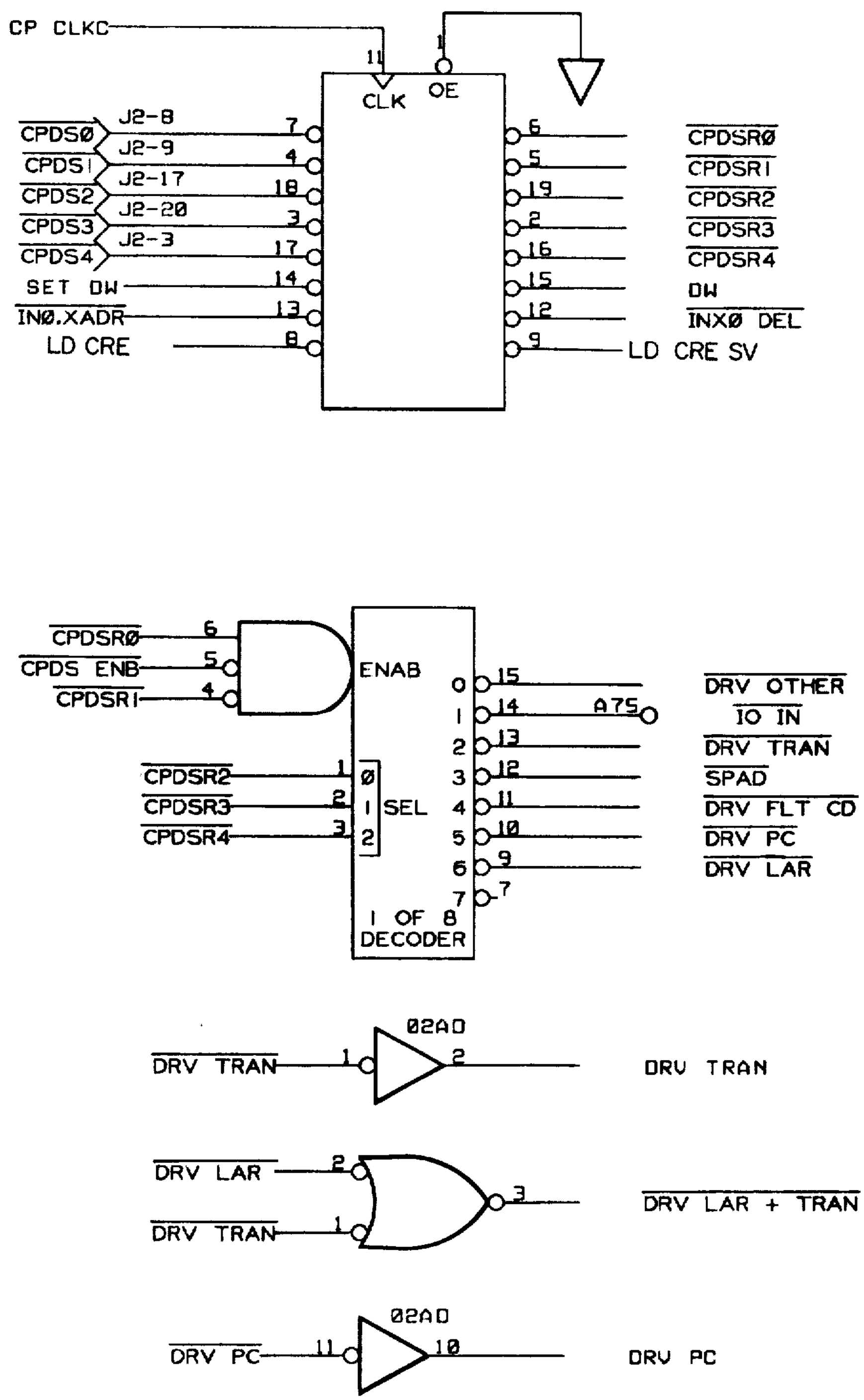
Figure 98C:
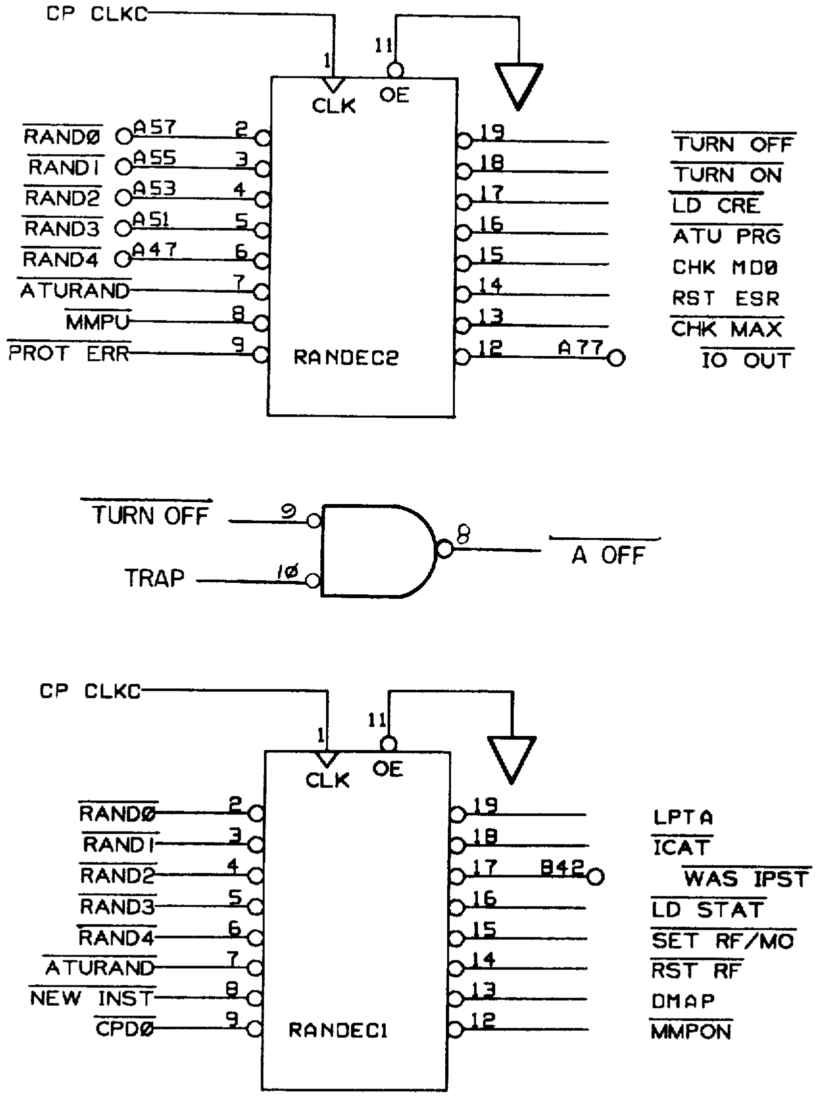
Figure 98D:
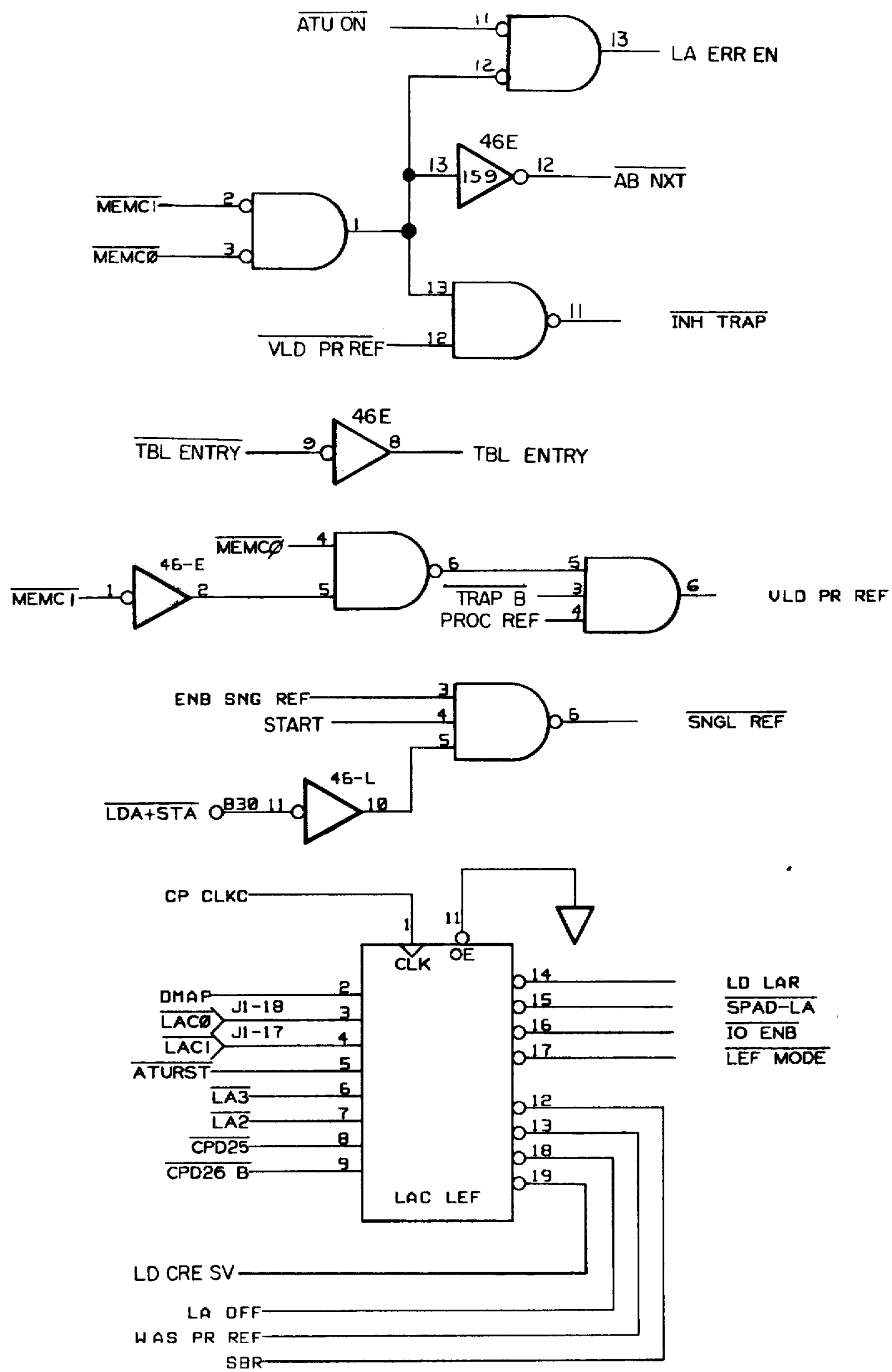
Figure 98E:
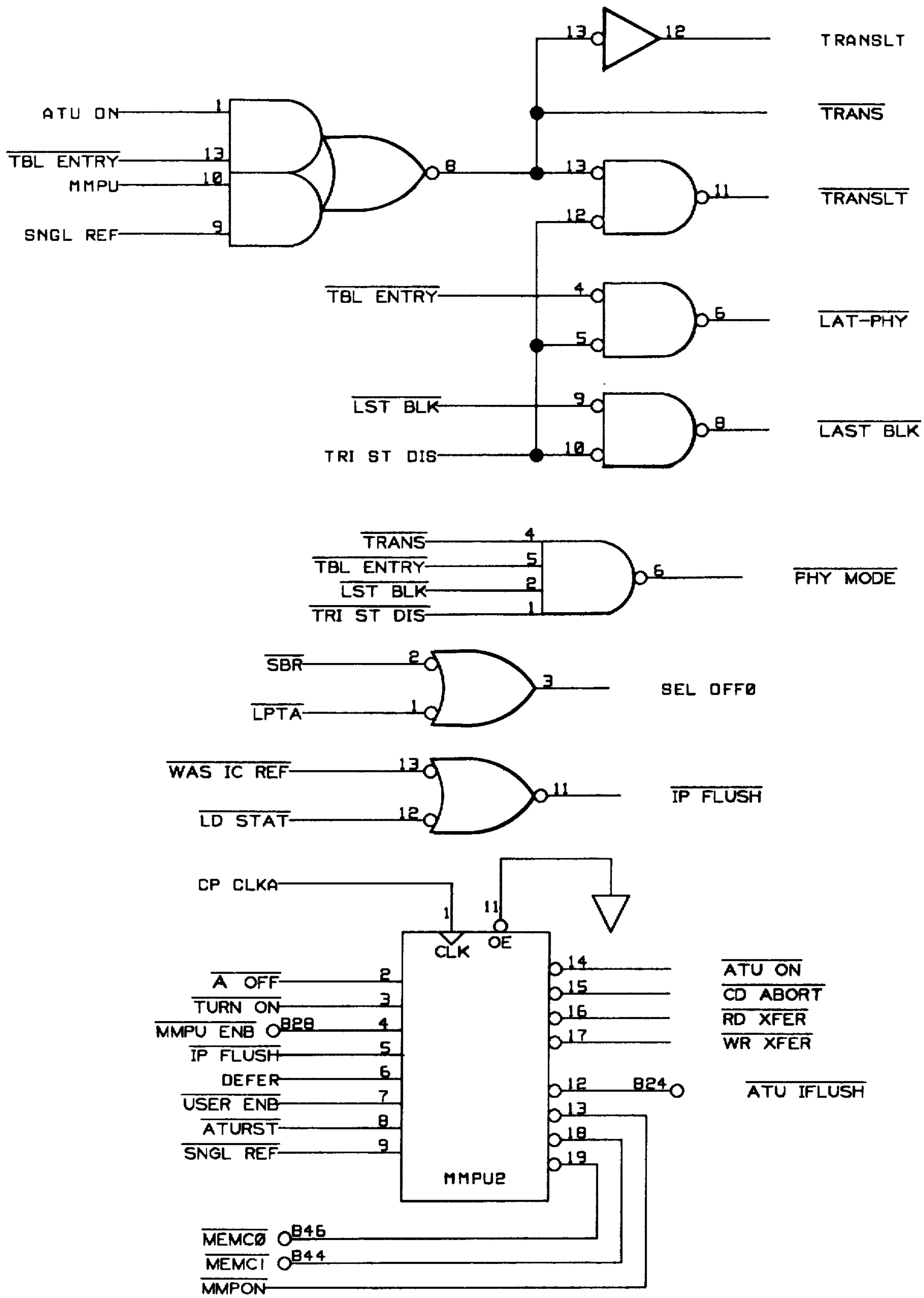
Figure 98F:
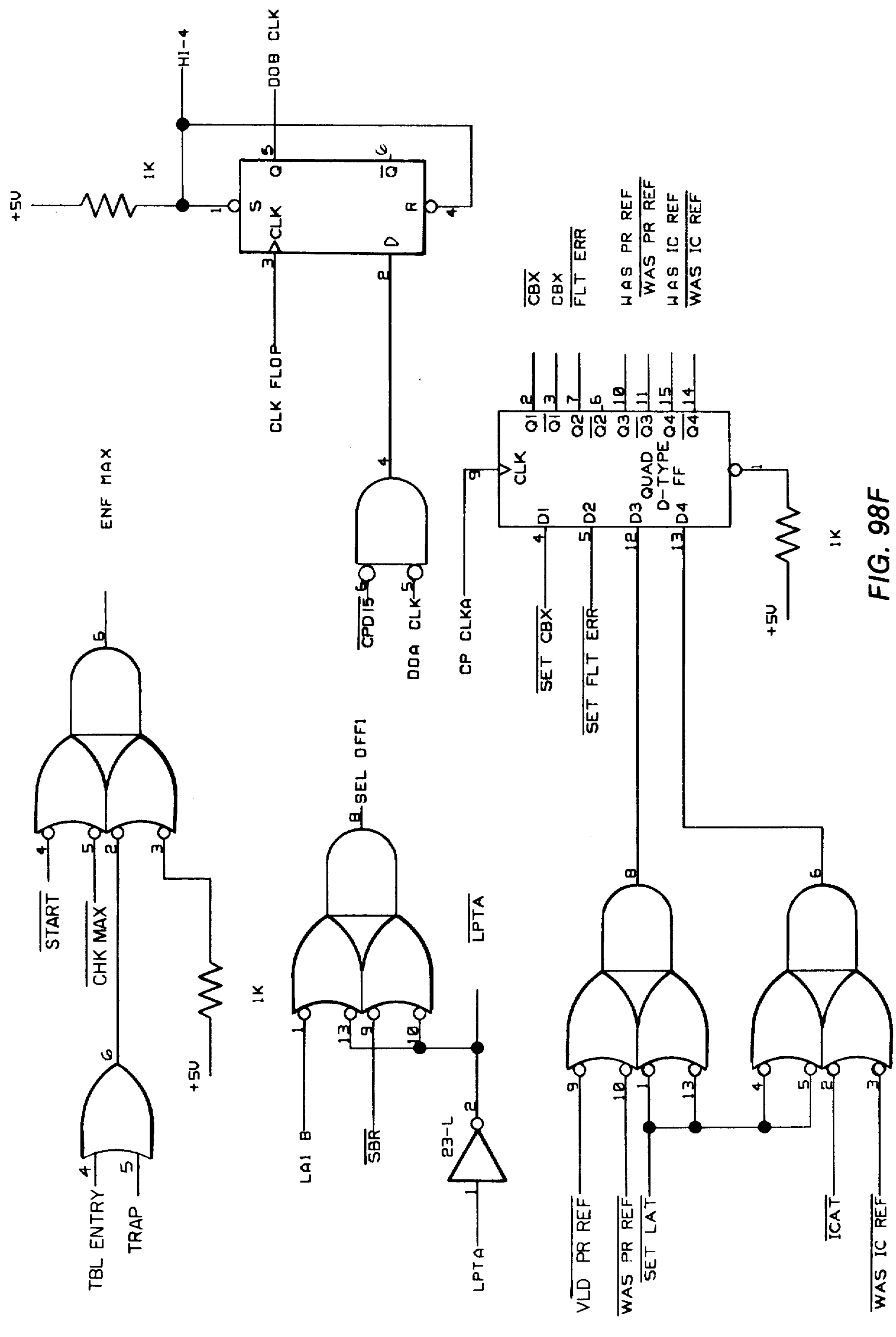
Figure 98G:
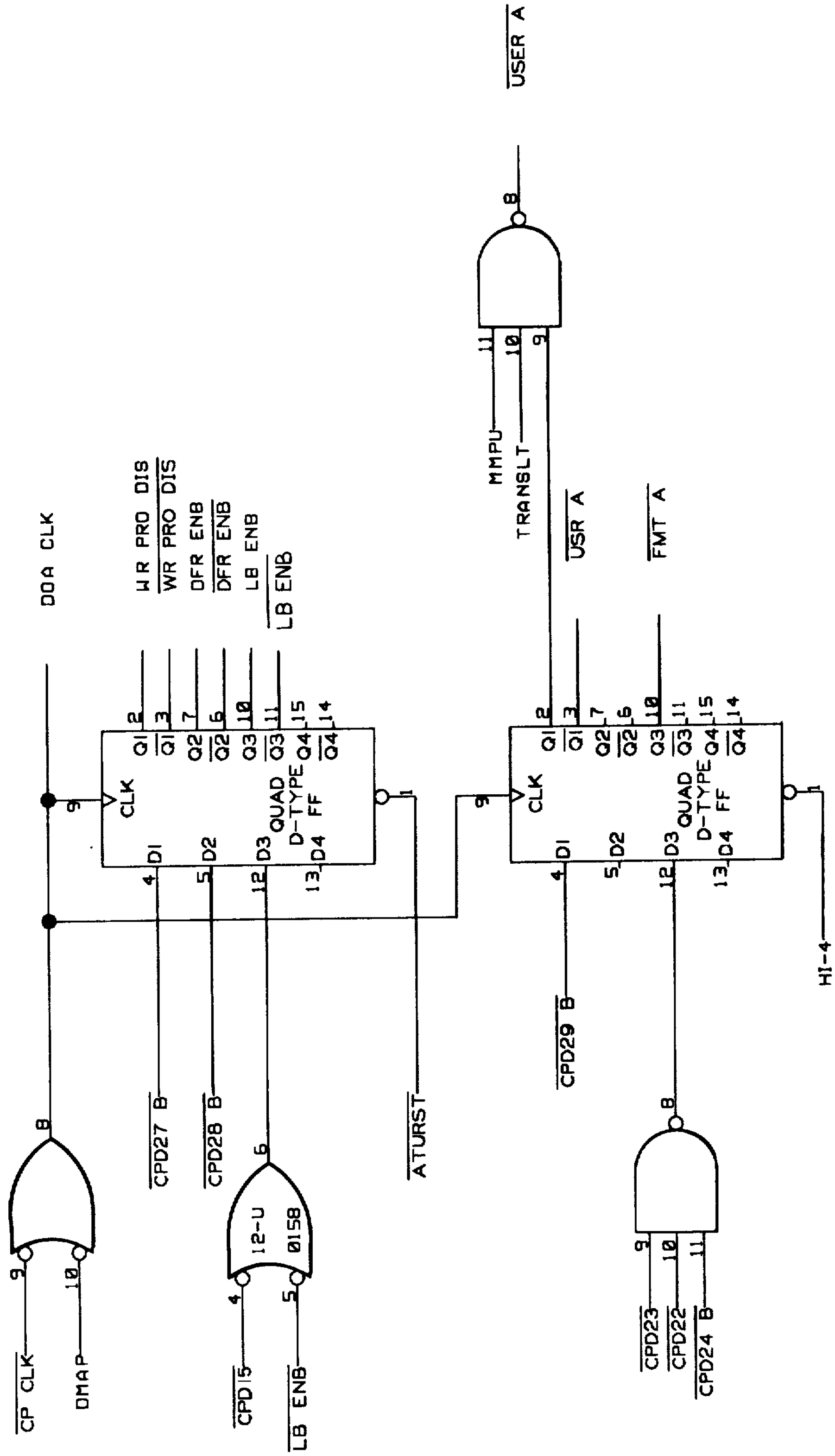

Validity store unit 103 is shown in FIG. 94 together with translation purge logic and the multiplexer associated therewith. The translation register of FIG. 79 is depicted in detail in FIG. 95. The reference/modify storage and control logic unit is shown in FIG. 96, the state save drive unit associated therewith being depicted in FIGS. 97. The 16 bit MMPU emulation control logic is shown in FIG. 98.

Figure 99:
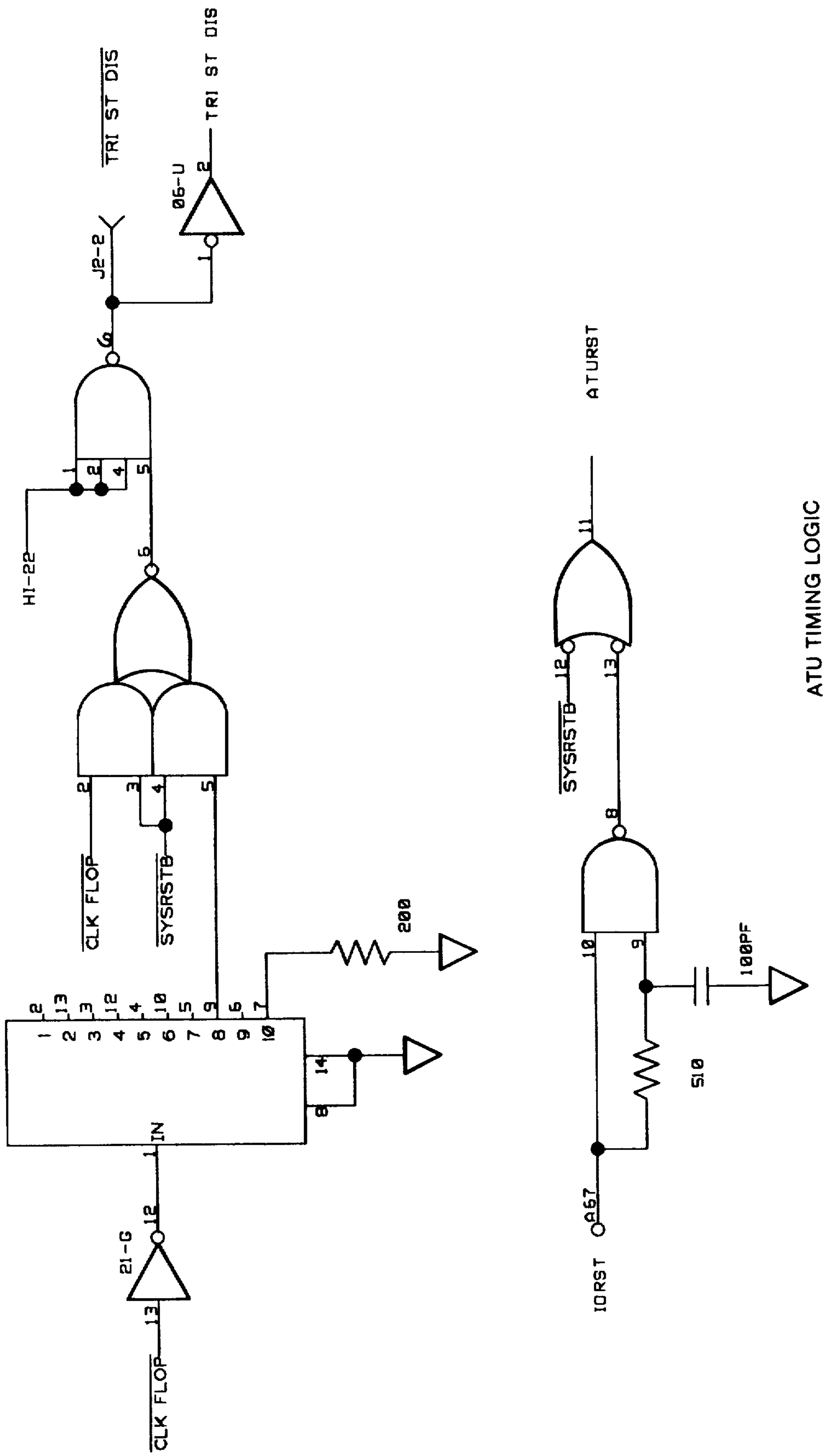
Figure 99A:
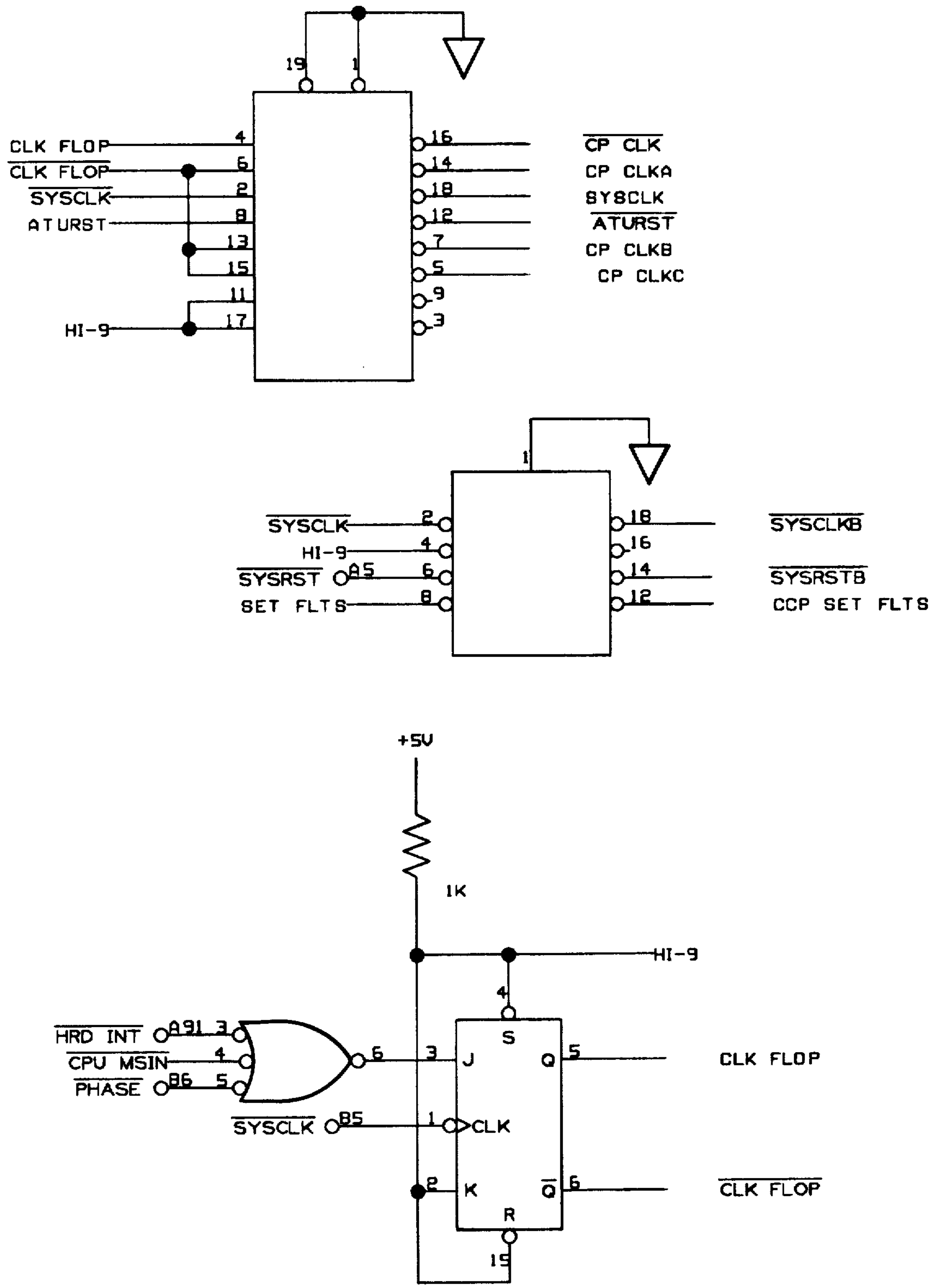
Figure 100:
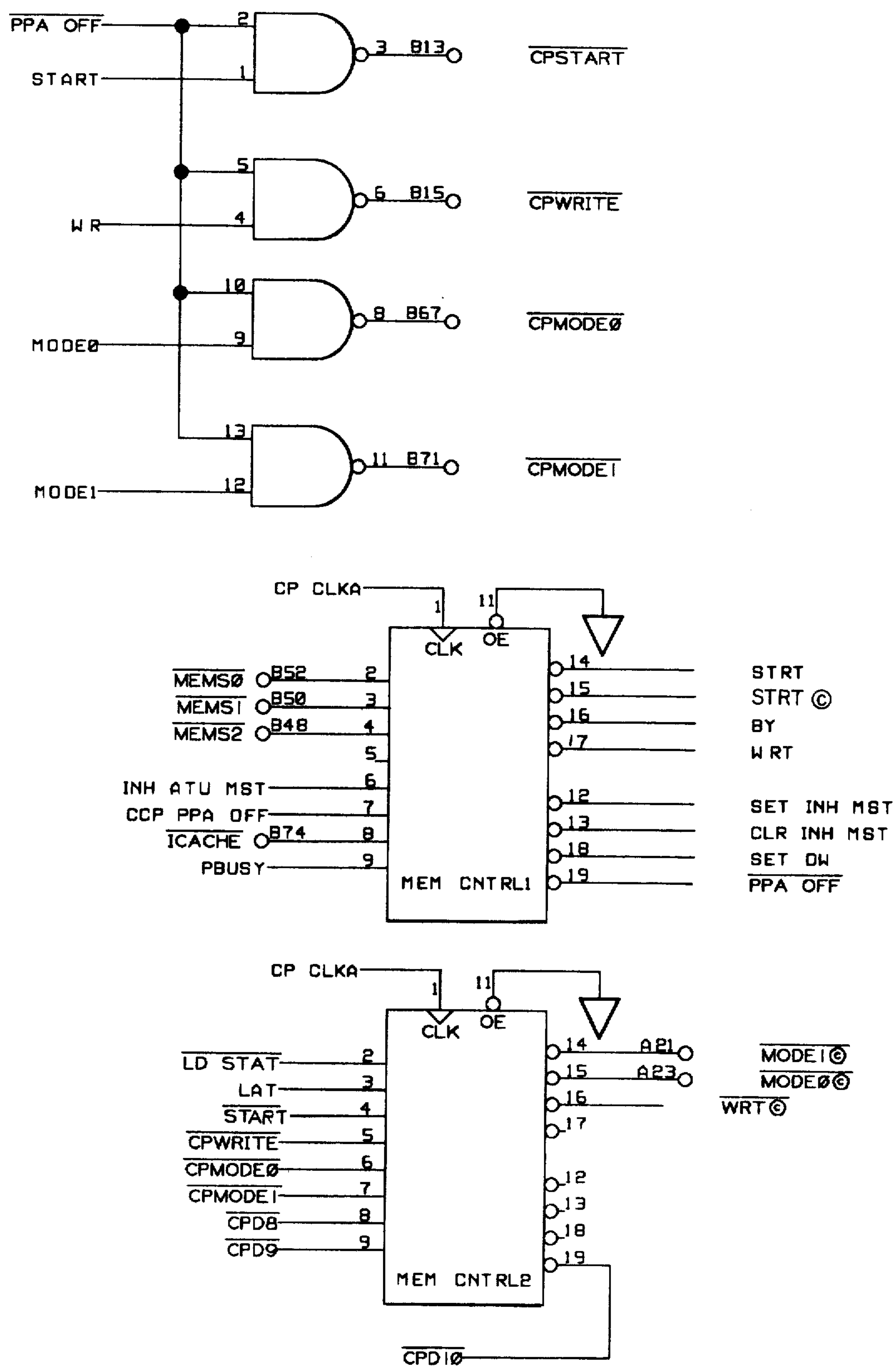
Figure 100A:
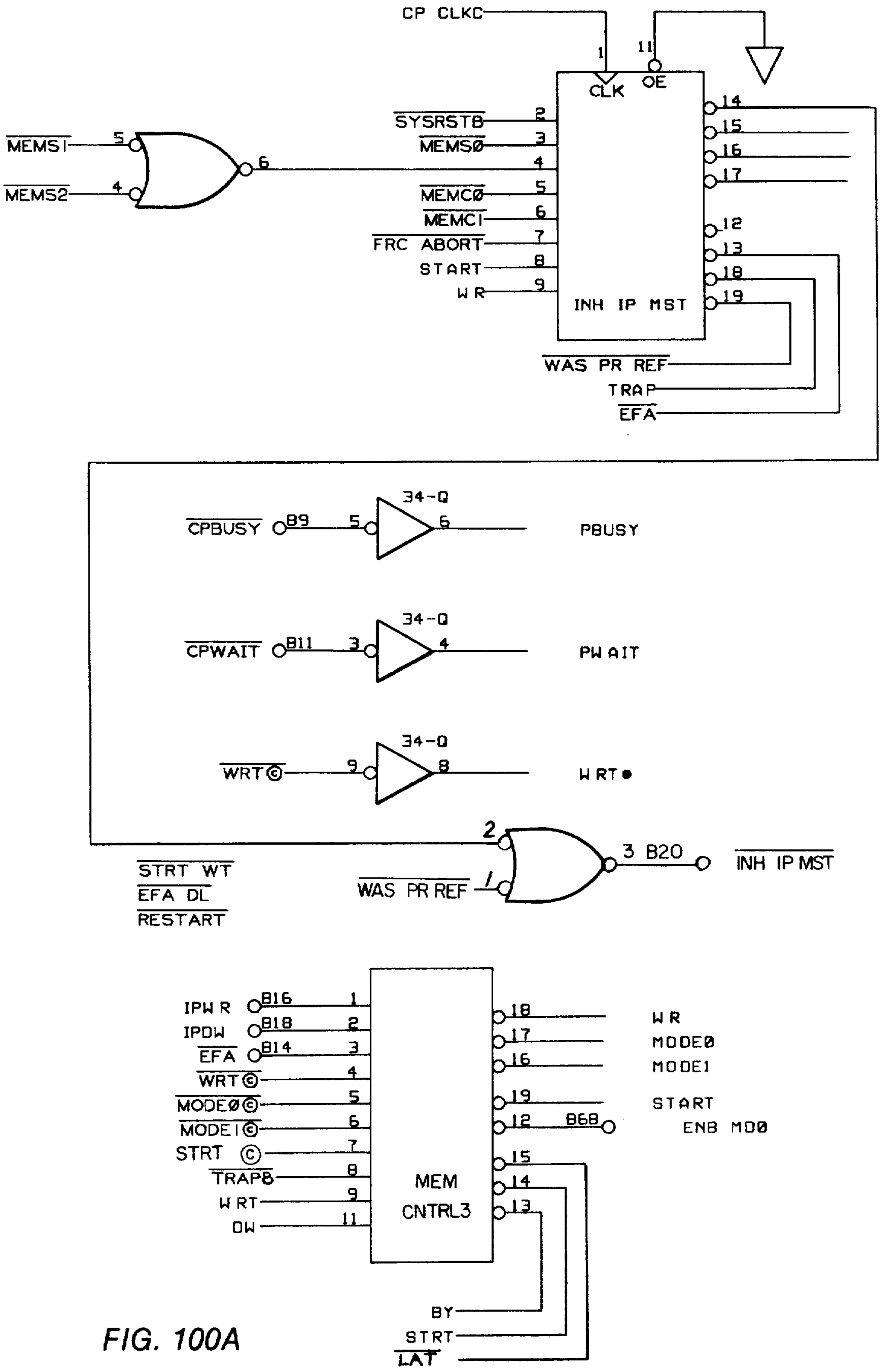
Figure 100B:
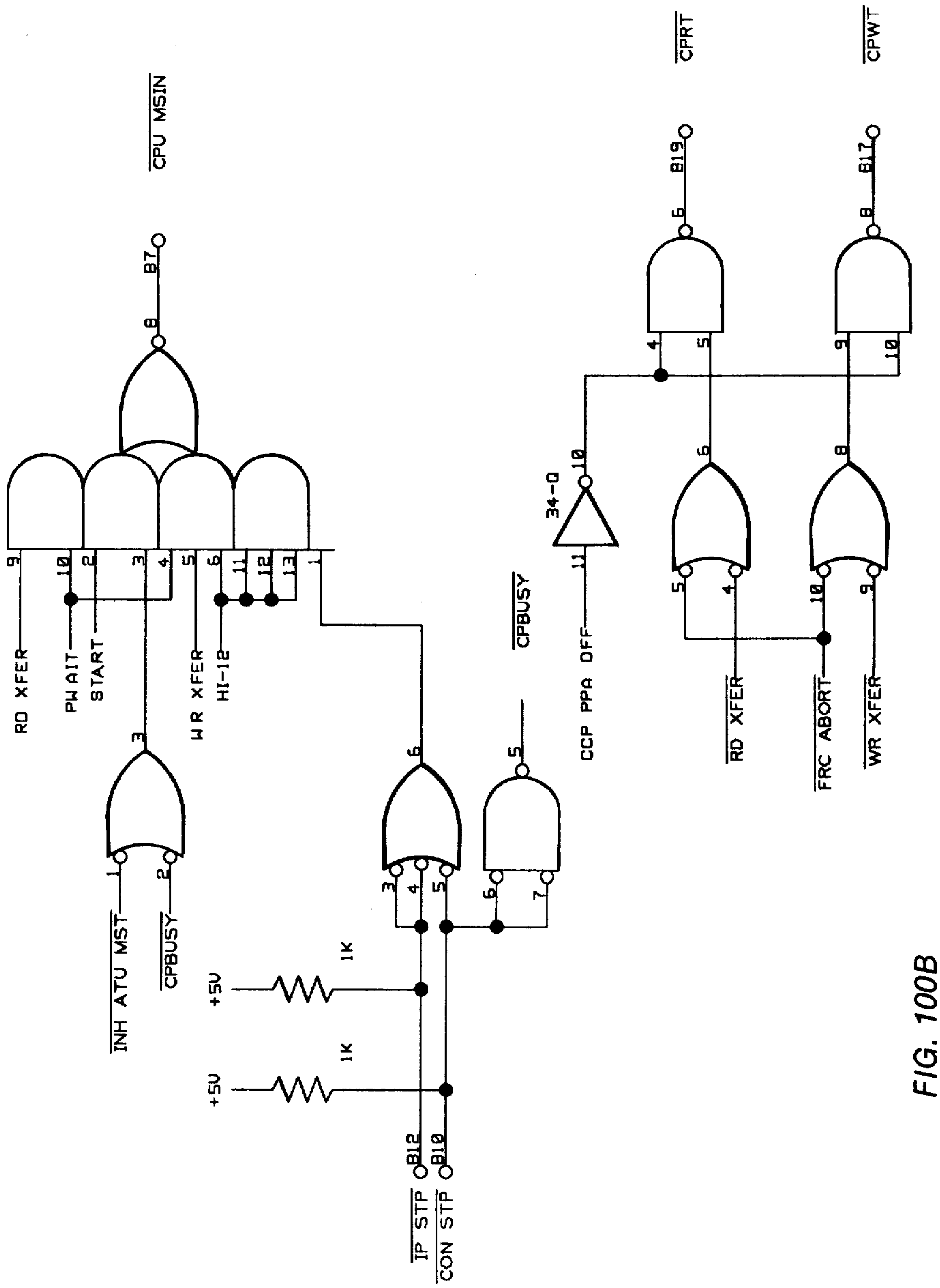
Figure 100C:
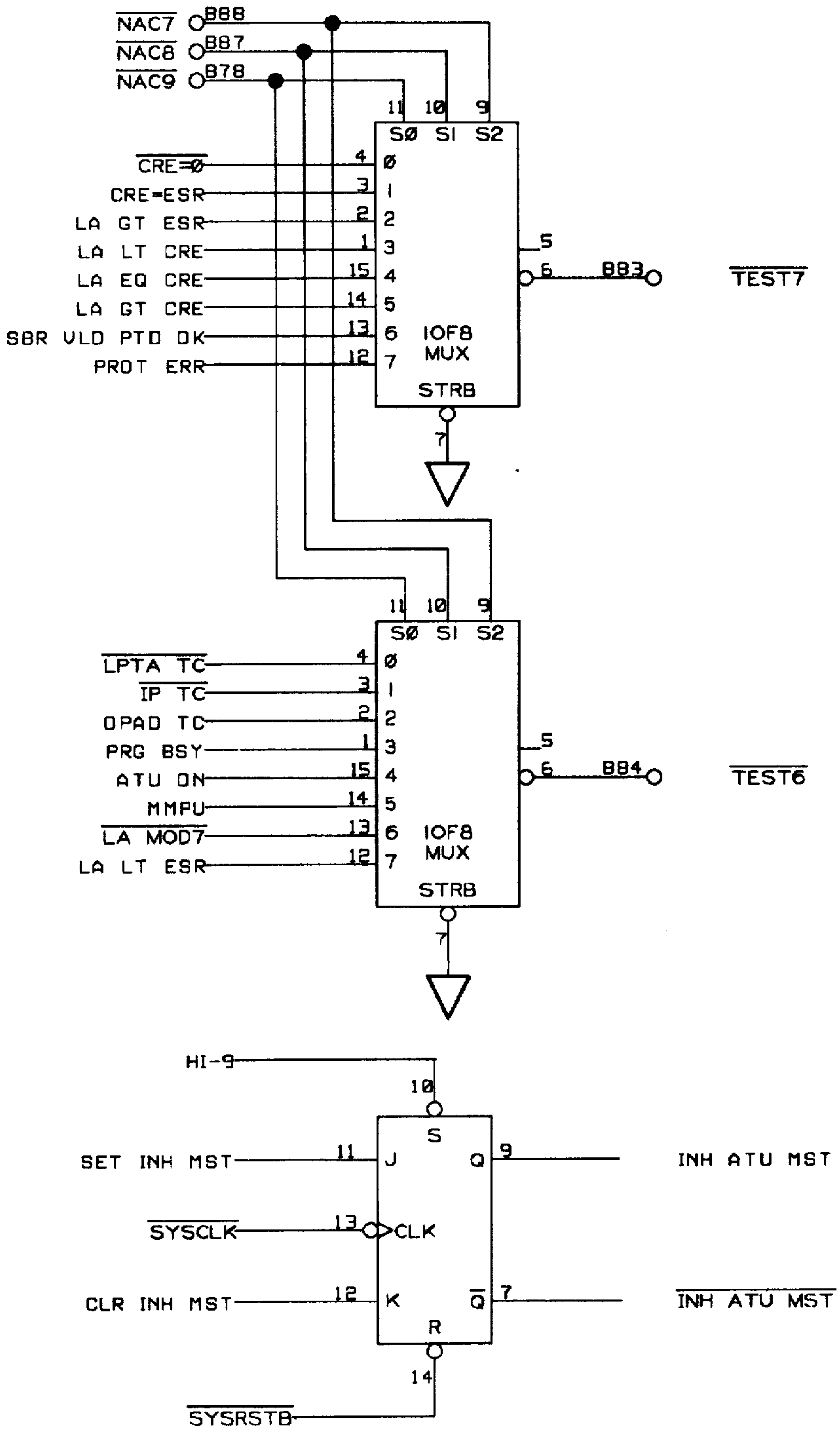

ATU timing logic is shown in FIG. 99 and suitable system code interface logic is shown in FIG. 100.

INSTRUCTION PROCESSOR

The instruction processor (IP) 12 is utilized to handle the fetching and decoding of macro-instructions for the data processing system of the invention. The instruction processor operates both at and ahead of the program counter and its primary function is to provide a starting microaddress (STμAD) for each micro-instruction, which starting microaddress is supplied to the microsequencer unit 13. Subsidiary functions of the instruction processor (1) to provide the source and destination accumulator designations, (2) to provide the effective address calculation parameters for the arithmetic logic unit and (3) to provide sign or zero extended displacements for making memory references or for in-line literals (immediates) to the arithmetic logic unit (ALU).

Figure 101:
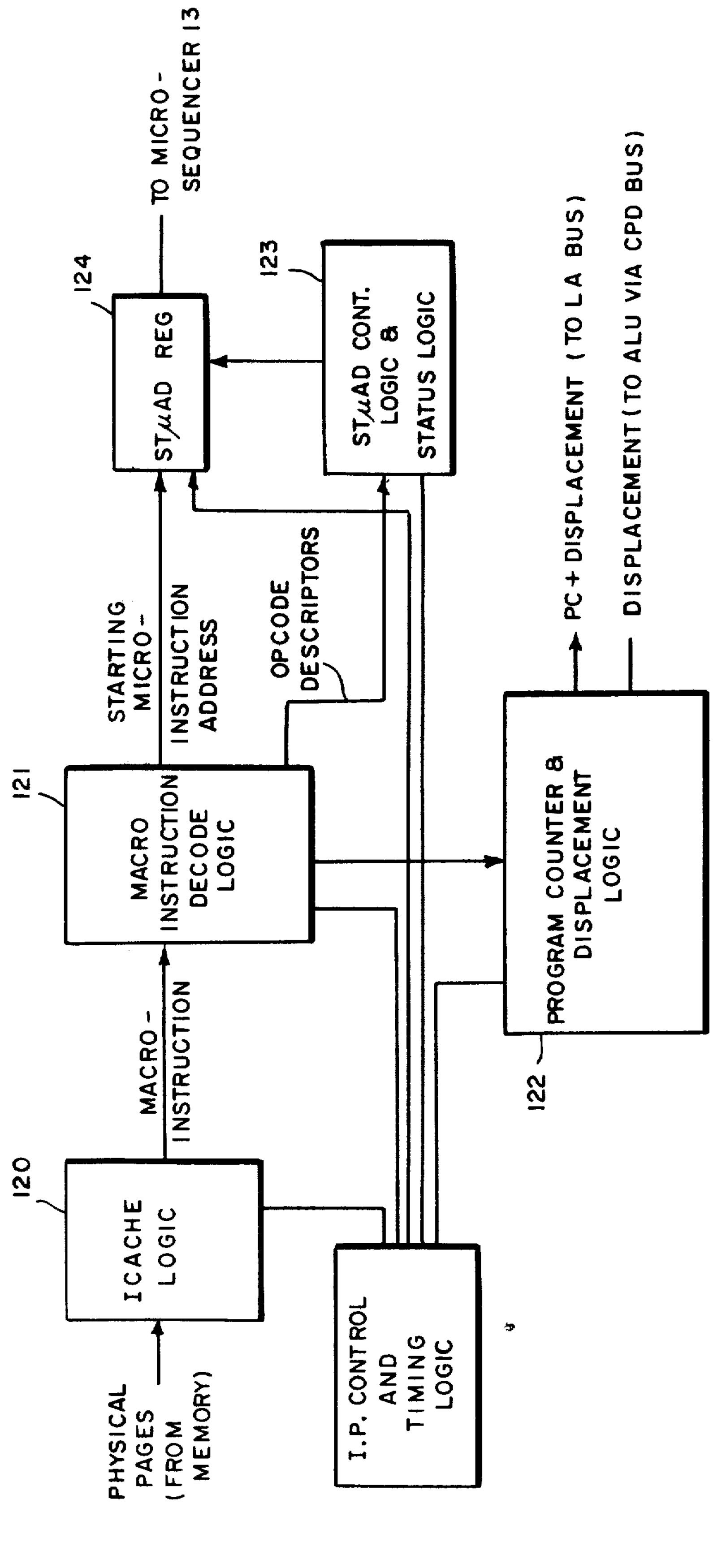
FIGS. 101–106 show block diagrams which represent the instruction processor unit of the system of FIG. 1.
Figure 103:
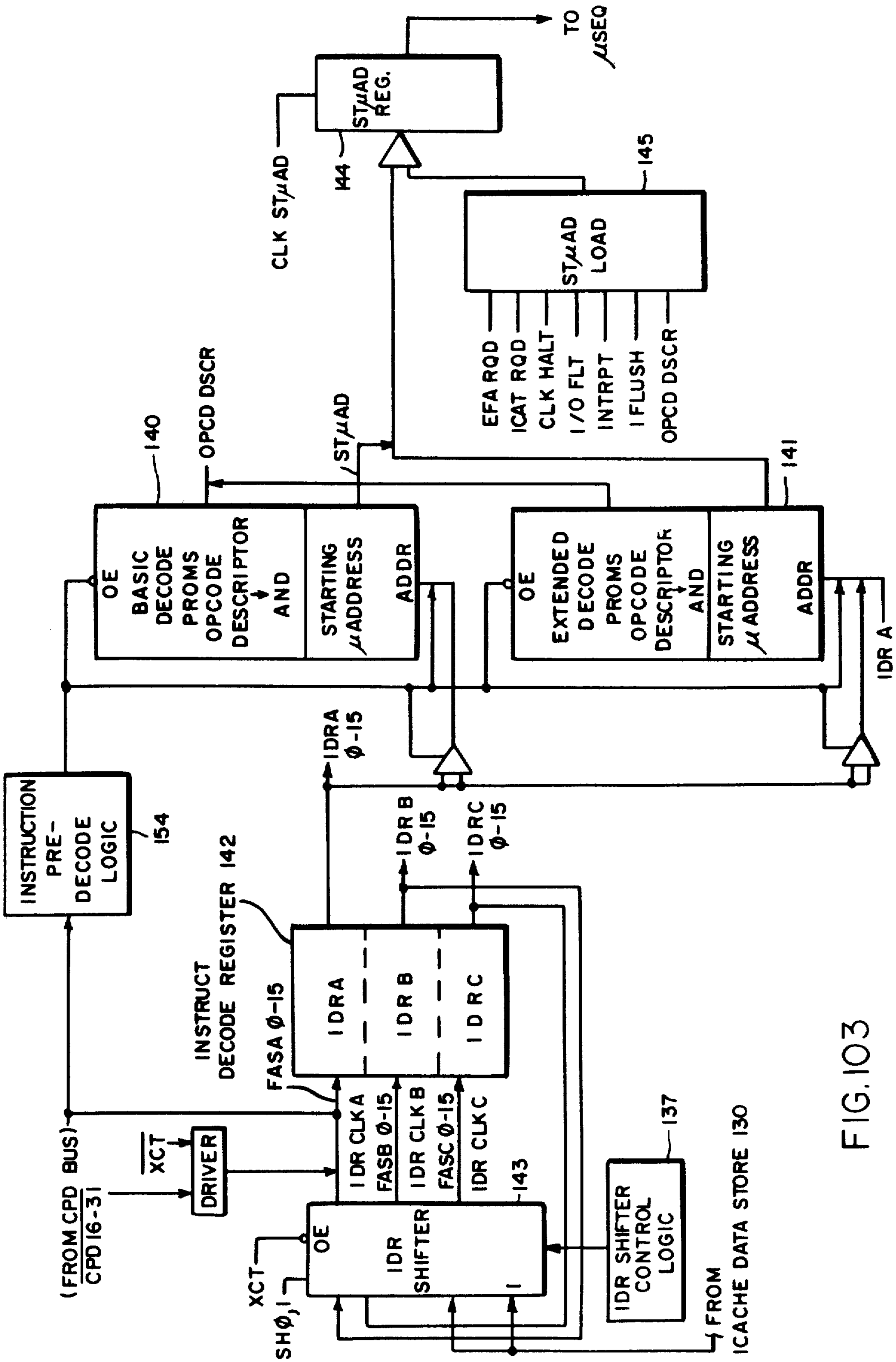

As seen in FIG. 101, the instruction processor includes instruction cache logic 120 (ICACHE), macro-instruction decoding logic 121 (which includes an instruction decode register as shown in FIG. 103) and program counter/displacement logic 122 as described below. The ICACHE logic functions as a pre-fetcher unit, i.e., the instruction cache (ICACHE) thereof obtains a block of subsequent macro-instructions for decoding, which block has been accessed from memory while the previous macro-instructions are being executed. The ICACHE stores the subsequent block of macro-instructions even if such macro-instructions are not immediately going to be used by the microsequencer. The decoding logic 121 of the instruction processor responds to a macro-instruction from ICACHE, decodes the operational code thereof (opcode) to provide the opcode description information for control and status logic 123 and to supply the information needed therefrom to the starting micro-address (STμAD) register 124 (and thence to the microsequencer) to identify the starting micro-address of the required micro-instructions.

The displacement logic 122 supplies the displacement data to the ALU if the index for such displacement is on the ALU board. If the index for the displacement is the IP program counter, the displacement logic combines the displacement information with the program counter information available at the instruction processor to form the logical address for supply to the LA bus.

Thus, in an overall IP operating sequence, a macro-instruction is read from an ICACHE storage unit of the ICACHE logic 120 into the decode logic 121 which thereupon decodes the instruction opcode and generates the starting micro-address for the micro-sequencer. During the decoding and starting micro-address generation process, the instruction processor simultaneously reads the next macro-instruction from the ICACHE into the decode logic. While the micro-sequencer is reading the first micro-instruction, the decode logic is decoding the next macro-instruction for generating the next starting micro-address. When the micro-instruction at the starting micro-address is being executed, the micro-sequencer reads the next micro-instruction from the next starting micro-address. Accordingly, a pipeline decoding and execution process occurs.

Figure 102:
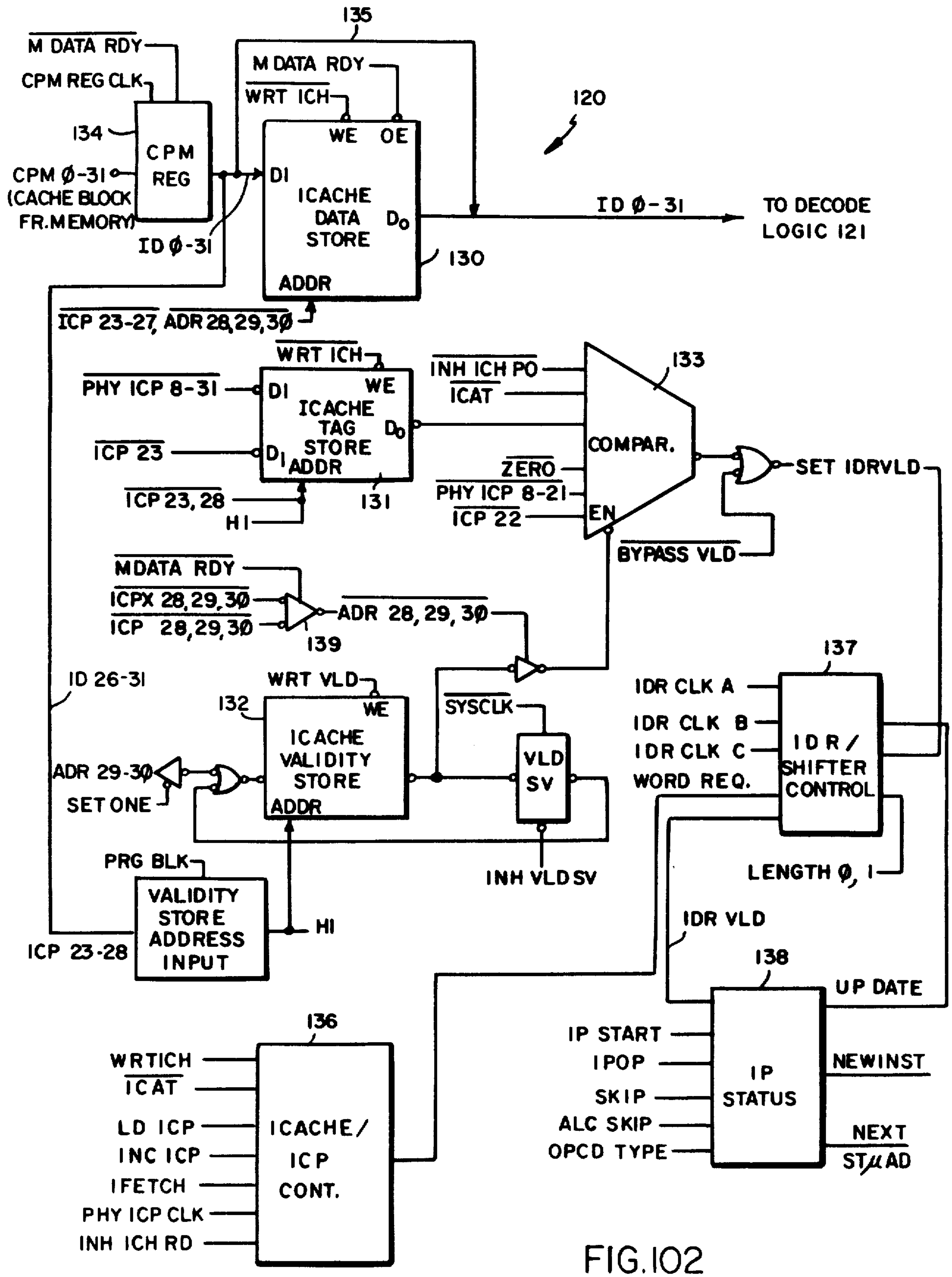

As seen in the more detailed FIG. 102, the ICACHE logic 120 includes an ICACHE data store unit 130, a tag store unit 131 and a validity store unit 132. As discussed with reference to the system cache 17 of the memory system, the operation of the ICACHE is substantially similar in that the tag portion (PHY ICP 8–21) of the address of each desired word of the macro-instruction is compared at comparator 133 with the tag portions of the addresses stored in the TAG store 131 of those words which are stored in the ICACHE data store 130. In addition, the validity store unit demonstrates whether the desired address is a valid one. If the address is valid and if a tag "match" occurs, the 32-bit double word at such address is then supplied from the ICACHE data store 130 to the decode logic 121.

If the required macro-instructions in the appropriate ICACHE block are not present on the current physical page (i.e., the physical page corresponding to the logical page value of the current value of the program counter) which is stored in the ICACHE data store 130 (i.e., a Tag match does not occur) or if the validity bit is not set, an ICACHE "miss" occurs and the cache block containing the macro-instructions must be referenced from memory. Such ICACHE block memory reference may be to the system cache (SYS CACHE) or to the main memory, if the system cache access also misses. When the accessed ICACHE block is fetched, the desired macro instructions thereof are written into the ICACHE data store 130 from CPM register 134 and the block is simultaneously routed directly into the decoding logic through bypass path 135. The ICACHE logic can then continue to prefetch the rest of the macro-instructions from the fetched page as an instruction block thereof, placing each one into the ICACHE data store 130 as they are accessed. The control logic for the ICACHE logic 120 is ICACHE/ICP control logic unit 136.

The decode logic, shown in more detail in FIG. 103, includes instruction decode units 140 and 141 for decoding the opcode portion of the macro-instructions. Decode unit 140 is used for decoding the opcodes of the original basic instructions for the system of which the present system is an extension. Thus, in a specific embodiment as discussed above, such basic instructions may be the NOVA and ECLIPSE instructions for Data General Corporation's previous NOVA and ECLIPSE system. Decode unit 141 is used for decoding the opcodes of the extended instruction set, e.g. the "Eagle" macro-instructions mentioned above.

The opcodes are supplied from an instruction decode register (IDR) 142 having three storage register sections, each capable of storing a word and identified as IDR A, IDR B and IDR C. The opcode of each macro-instruction is stored in the IDR A section while displacements are stored in the IDR B and C sections. An IDR shifter unit 143 is used to shift the desired opcode portion of the instruction accessed from the ICACHE data store 130 into the IDR A section of IDR 142 and to shift the appropriate displacement words of the instruction, if any, to the IDR B and IDR C sections thereof. The control logic for the IDR and the IDR shifter units is IDR/shifter control unit 137, shown in FIG. 102.

When the macro-instruction has been routed to the decode logic, the decode units 140 or 141, as required, decode the opcode portion thereof to provide opcode description (OPCD DSCR) information, including the length of the instruction (i.e., whether the instruction comprises a single, or double or triple word). When the entire instruction has been supplied to the decode logic (from ICACHE data store 130) a SET IDR VLD signal is generated to produce an IDR VLD signal at IDR/-shifter control 137 (FIG. 102). Following the decoding process, the starting micro-address is loaded into the ST$\mu$AD register 144 from either decode PROM 140 or 141 depending on whether the macro-instruction is a basic or an extended instruction. Control of the loading of ST$\mu$AD register 64 resides in ST$\mu$AD load control unit 145.

Figure 104:
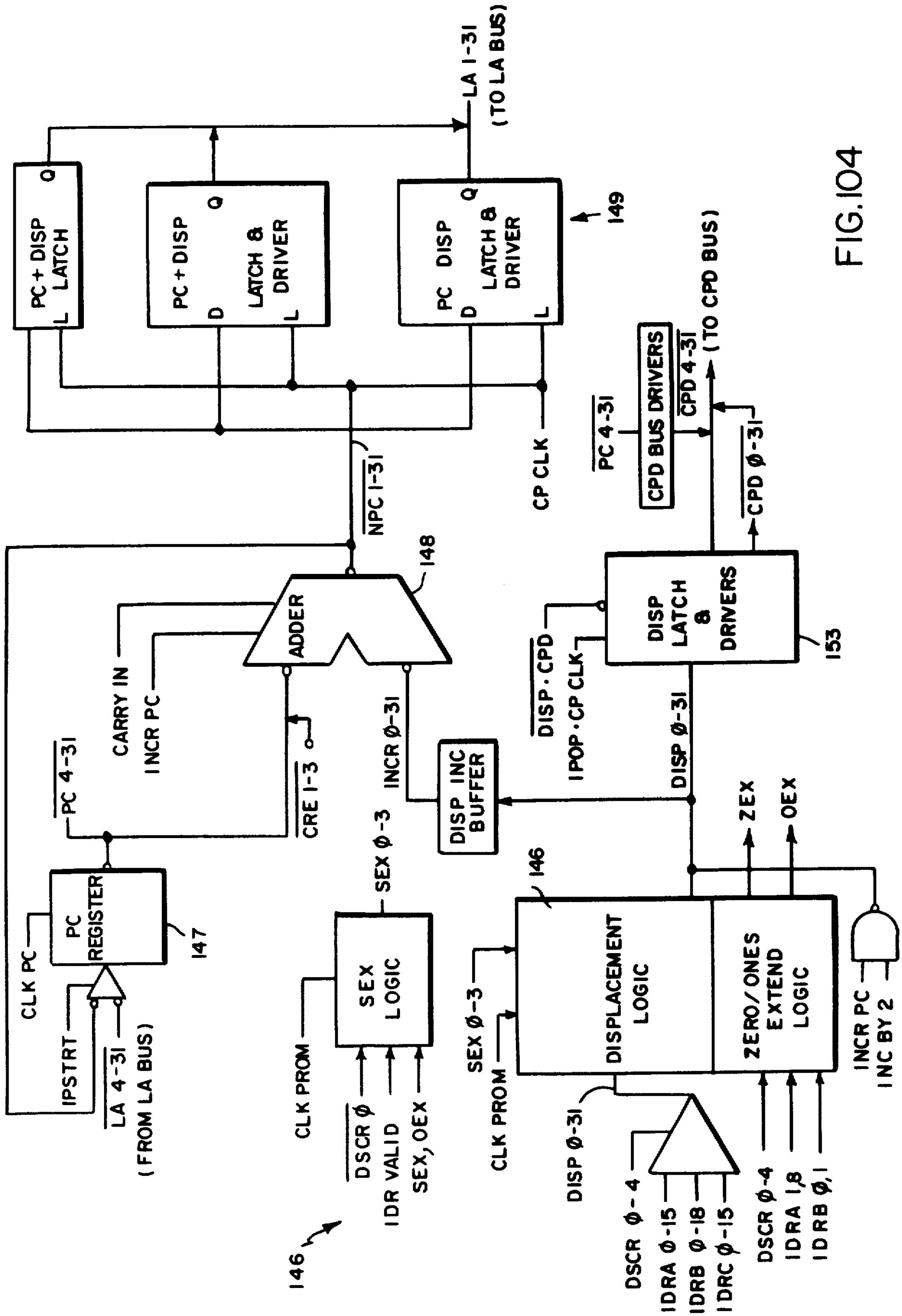

The displacement word or words, if any, are generally present in IDR B or C (for certain NOVA instructions a byte displacement may be extracted from IDRA, although generally for almost all other instructions displacements are extracted from IDRB and IDR), being extracted from the displacement logic 146, as shown in FIG. 104. The displacements are sign or zero extended, as necessary, and are clocked into a displacement register thereof so as to be made available either directly to the logical address (LA) bus or to the CPD bus for use at the ALU unit, as discussed below.

When the starting micro-address has been clocked into ST$\mu$AD register 144, an UPDATE signal is issued by the IP status logic unit 138 (FIG. 102) to inform the IDR/shifter control 143 that the decoded information has been used and can be shifted out of IDR 140/141. The decoding of subsequent macro-instructions continues until a discontinuity in the straight-line decoding operation occurs. When a jump in the straight-line operation occurs the micro-sequencer issues an IPSTRT signal to the program counter register 147 of the instruction processor (FIG. 20) so that a new program counter address (LA 4–31) can be placed in the program counter register from the logical address bus. The starting micro-address register 144 is reset and the starting micro-address of an appropriate wait routine, for example, is placed therein until the decoding process for the instruction associated with the new program counter can begin.

In some situations the sequence of macro-instructions which are being decoded are present on more than one physical page. Under such conditions when the ICACHE control detects the end of the page which is stored in the ICACHE data store 130, a special routine must be invoked in order to fetch the next page into the ICACHE store 130 so as to continue the prefetching operation on the new page. Thus, when the last instruction of a particular page has been decoded and the decode pipeline is effectively empty, the starting micro-address register is loaded with the starting micro-address of a suitable page control routine which accesses the required new page and permits the next page to be loaded into ICACHE store 130 via physical page register 134 so that the instruction processor can continue with the decoding of the macro-instructions thereon.

If a macro-instruction is not on the page contained on the ICACHE store 130, the correct page must be accessed from either the system cache or main memory because of an ICACHE "miss" in the instruction processor. Access to the system cache is provided at the same system cache input port as that used by the address translation unit (ATU). In the system of the invention, however, the ICACHE is given a lower priority than the ATU so that if the ATU wishes to access the system cache the instruction processor must hold its access request until the ATU has completed its access.

The use of ICACHE logic as described herein becomes extremely advantageous in programs which utilize a short branch backwards. If a macro-instruction branch displacement is less than the number of words in the ICACHE data store there is a good chance that the required macro-instructions will still be stored locally in the ICACHE data store and no additional system cache or main memory references are required.

In a particular embodiment, for example, the overall ICACHE logic 120 may comprise a single set, direct mapped array of 256 double words in data store 130 plus Tag and Validity bits in Tag Store 131 and Validity Store 132. Data is entered into the data store as aligned double words and the ICACHE data store is addressed with the eight bits which include bits $\overline{\text{ICP 23–27}}$ from the instruction cache pointer (ICP) unit 150 shown in FIG. 105 and bits ADR 28, 29, 30 from unit 139.

A copy of the Tag store 131 of the instructor processor's ICACHE unit is also kept in the system cache, the latter cache needing such information so that it can inform the instruction processor when data has been written into the ICACHE.

The validity store 132 is arranged, for example, in a particular embodiment, as 64 double words by four validity bits in order to indicate the validity of each double word in the ICACHE data store. Each initial fetch into a new block of instruction words will set the corresponding validity bit for the double words and reset the remaining three validity bits. During a prefetch operation into the same block, the corresponding validity bit for the prefetch double word is set while the remaining three validity bits remain the same. The prefetching operation stops when the last double word in the block has been prefetched in order to avoid unnecessary system cache faults.

If the ICACHE operation is such that the end of a physical page is reached and it is necessary to obtain the next physical page address for the next logical page of the program counter (PC bits 4–21), the ICACHE control logic unit 136 (FIG. 102) asserts a signal (identified as the $\overline{\text{ICAT}}$ signal) which is supplied to the ST$\mu$AD load control logic 145 (FIG. 103). When the last macro-instruction at the end of the current page has been decoded, the ST$\mu$AD control logic 145 supplies the starting micro-address for the $\overline{\text{ICAT}}$ micro-code routine which thereupon performs the necessary address translation operation for a transfer of the next physical page address for the ICACHE data store 130.

The instruction processor utilizes two pointers to the instruction stream. The first pointer is the program counter register 147 (FIG. 104) which holds the logical address of the instruction which is being executed, and the second pointer is the instruction cache pointer (ICP) 150 (FIG. 106) which holds the logical address of the next macro-instruction which is needed for the decode logic. A separate register PICP 152 (physical instruction cache pointer) holds the physical page address of the logical page referred to by bits 4–21 of the instruction cache pointer (ICP). Thus the ICP 150 functions as the prefetch logical address pointer and the PICP functions as the prefetch physical address pointer. The program counter 147 and the ICP 150 are loaded from the logical address bus at the start of an instruction processor operation. The ICP is incremented ahead of the program counter as the decoding pipeline operation is filled. On an ICACHE fault, or miss, the PICP physical address is used to reference the memory and the ICP address is used as a pointer to the next logical page address for address translations when the end of the correct page has been reached.

In accordance with the instruction processor operation the optimum performance is achieved when the instructions are locally available in the ICACHE, such instructions thereby becoming substantially immediately available when the micro-sequencer requests them. Instructions which are not locally available in the ICACHE take an amount of time which is dependent on system cache access operation and page fault routine operations.

The macro-instruction decoding logic utilizes three 16-bit fields identified as the IDR A, IDR B, and IDR C fields, as mentioned above. The "A" field contains the opcode while the "B" and "C" contain either the displacement(s) for the instruction in the "A" field or one or more fields of the macro-instruction which follows in the instruction stream. The instruction decode register, IDR 142, is arranged to keep all three fields full, if possible, by sending word requests to the ICACHE (ICP control unit 136) when any of the three IDR fields is empty. As mentioned above, if the ICACHE word request results in an ICACHE "miss" a system cache fetch is initiated.

The "A" field of the instruction decode register 142 is used by the decode logic PROMs 140 or 141 to decode the opcode of the macro-instruction and, also to provide the starting address of the macro-instruction which is required. The "B" and "C" fields determine the displacements, if any, that are required. Each field is one word in length and therefore the longest instruction that the instruction processor can decode and canonicalize the displacement for has a maximum length of three words.

When the A field of the instruction decode register is full, the decode PROMs 140 or 141 decode the opcode of the instruction. If the entire instruction, including opcode plus displacement, is in the instruction decode register, a signal IDR VLD is asserted by the IDR shifter control logic 137 to inform the IP status logic 138 that an entire instruction is ready to be decoded so as to provide a starting micro-address for ST$\mu$AD register 144. The displacement logic 146 which extracts the displacement, either sign or zero extends it, as necessary, and then loads it into a displacement register. If the displacement index is on the ALU board the displacement is latched onto the CPD bus via latch unit 153 for supply thereto. If the displacement index is the PC register 147, the displacement is added to the PC bits at adder 148 and supplied to the logical address bus via latches 149, as shown in FIG. 104.

During the above loading processes the instruction decode register 142 is shifted by the length of the instruction that has been decoded so as to be ready to receive the next instruction, i.e., a shift of one, two or three words. The IDR shifter unit 143 serves to provide such shift of the contents of the instruction decode register 142. A shift of three words, for example, completely empties the instruction decode register which is then ready to receive the next instruction from the ICACHE (or directly from memory on an ICACHE "miss"). The shifter, for example, allows either word in a double-word instruction which has been accessed from the ICACHE to be directly loaded anywhere into the instruction decode register. The placement in IDR 142 is determined by examination of the validity bits in the IDR. Thus if the "A" field is invalid, the incoming instruction data would be loaded into the "A" field. Whenever any of the three fields in the instruction decode register 142 are empty, a word request is made of the ICACHE via ICACHE control logic 136 for accessing the next instruction as determined by the ICACHE pointer (ICP) 150, bits 23-27 of which uniquely determine which double-word in the ICACHE is to be accessed. If the instruction is a single word instruction, the ICP bits 28-30 and the ICPX bits 28-30 obtained from the fetch request control logic 151 (FIG. 105) uniquely determine which word of the double word is to be used as the instruction as shown at word pointer logic 139 (FIG. 102).

If the instruction decode register 142 has at least two fields empty and a word pointer points to an even double word, then the double word would be loaded into two empty fields of the IDR. After loading, the ICACHE pointer 150 would be incremented so that it points to the next double word. If the IDR has only one empty field and a word pointer points to an even double word, then the first word would be loaded into the IDR and the word pointer would be sent to point to the second word of the double word and the ICACHE pointer remains the same. When the word pointer points to the second word, only one word can be accessed from the ICACHE and loaded into the instruction decode register.

The decode logic utilizes predecode logic 154 (FIG. 103) which is used to select the location in one of the two sets of decode PROMs 140 and 141. As mentioned above, one set of PROMs 140 holds a basic set of instructions (e.g., NOVA/ECLIPSE instructions) while the second set of PROMs 141 holds the extended instructions (e.g., EAGLE instructions). The decoding process for the basic set of decode PROMs 140 is performed in two stages, the first level being performed in the predecode logic 154 at the output of the shifter which is used to place the basic macro-instructions into the correct form so that the decode logic 140 can decode the opcode and be ready with the displacement information in the correct form and sequence. Such logic is shown in more detail in FIG. 122. The instructions for the extended set are already in the desired form and need not be predecoded before being supplied to the decode PROMs 141. In either case each incoming macro-instruction maps into at least one location of a selected one of the decode PROMs 140 or 141 to produce the required opcode descriptors and the required starting micro-address for supply to the micro-sequencer.

The decision to select the output of decode PROM 140 (e.g., NOVA/ECLIPSE) or decode PROM 141 (e.g., EAGLE) is determined by examining selected bits (e.g., bits Ø, 12-15 as discussed above) of IDR A. As described above, the selection of the decode PROM is not determined by a separately designated "mode" bit as in previous systems, which prior process causes the decode operation to be mutually exclusive. In contrast, the present system in selecting the appropriate decode operation performs such operation on an instruction by instruction basis since each instruction inherently carries with it the information required to determine such decode selection.

Figure 107:
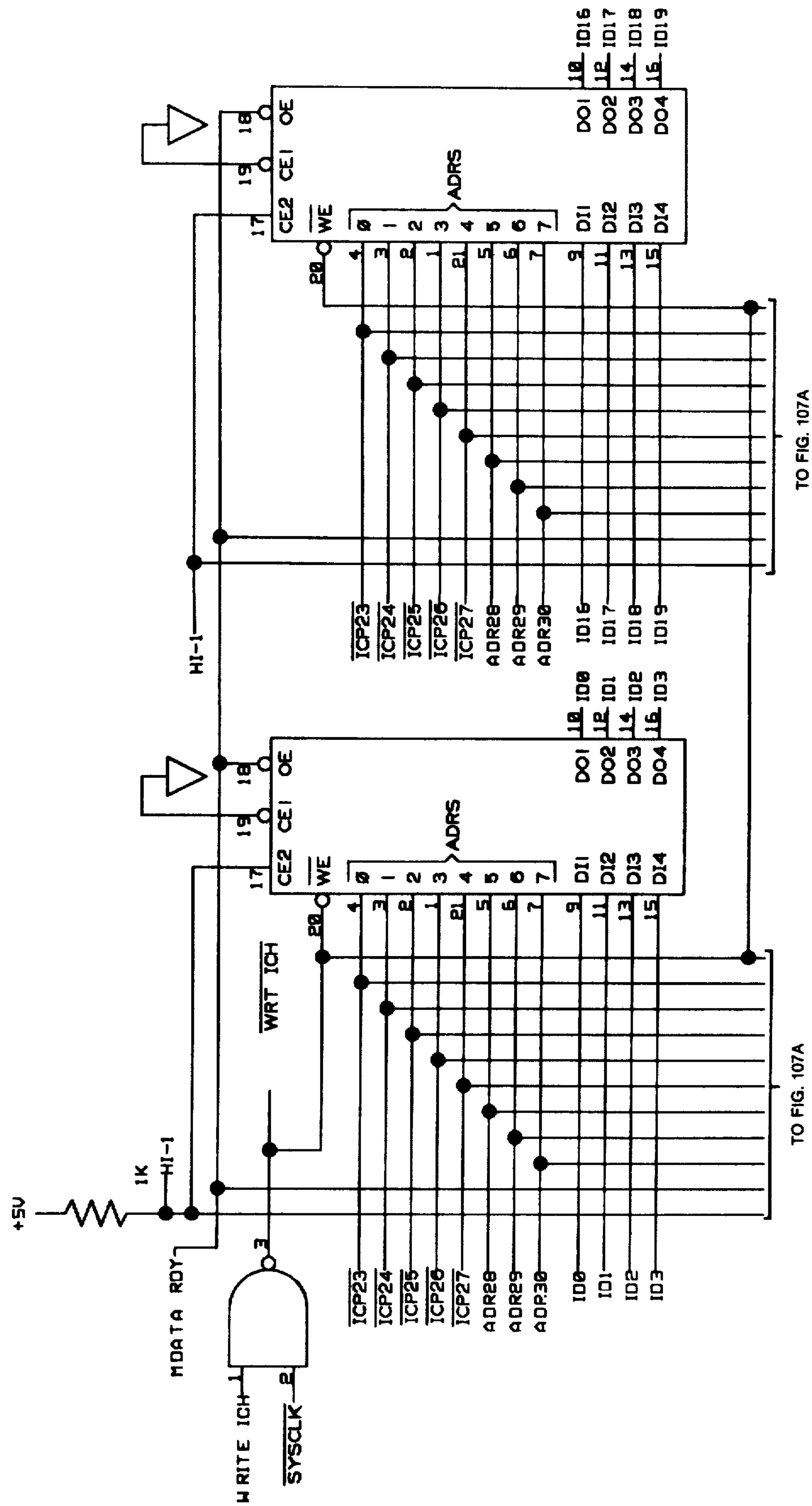
FIGS. 107–136 show specific logic circuitry for implementing the instruction processor unit of FIGS. 101–106.
Figure 107A:
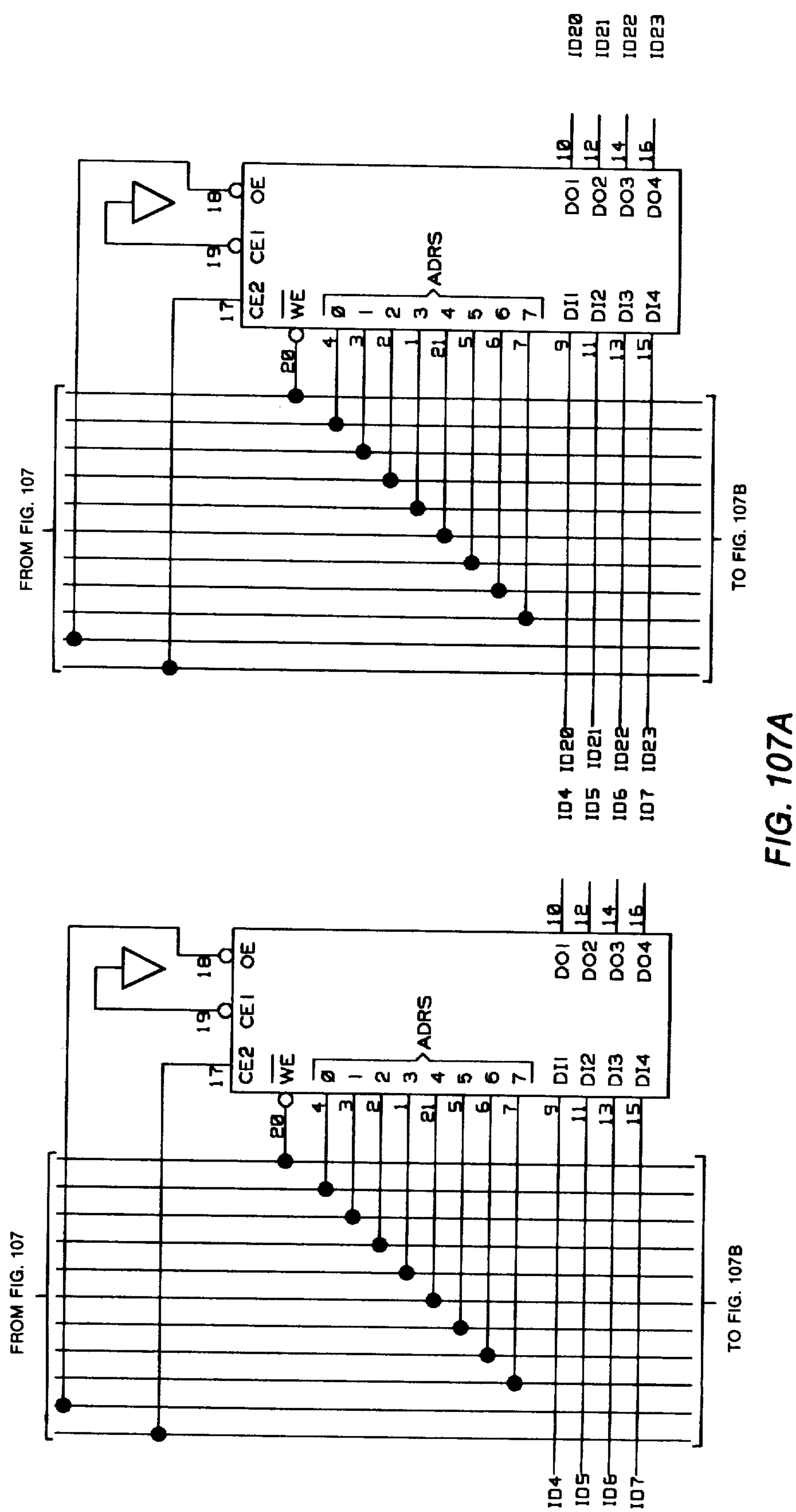
Figure 107B:
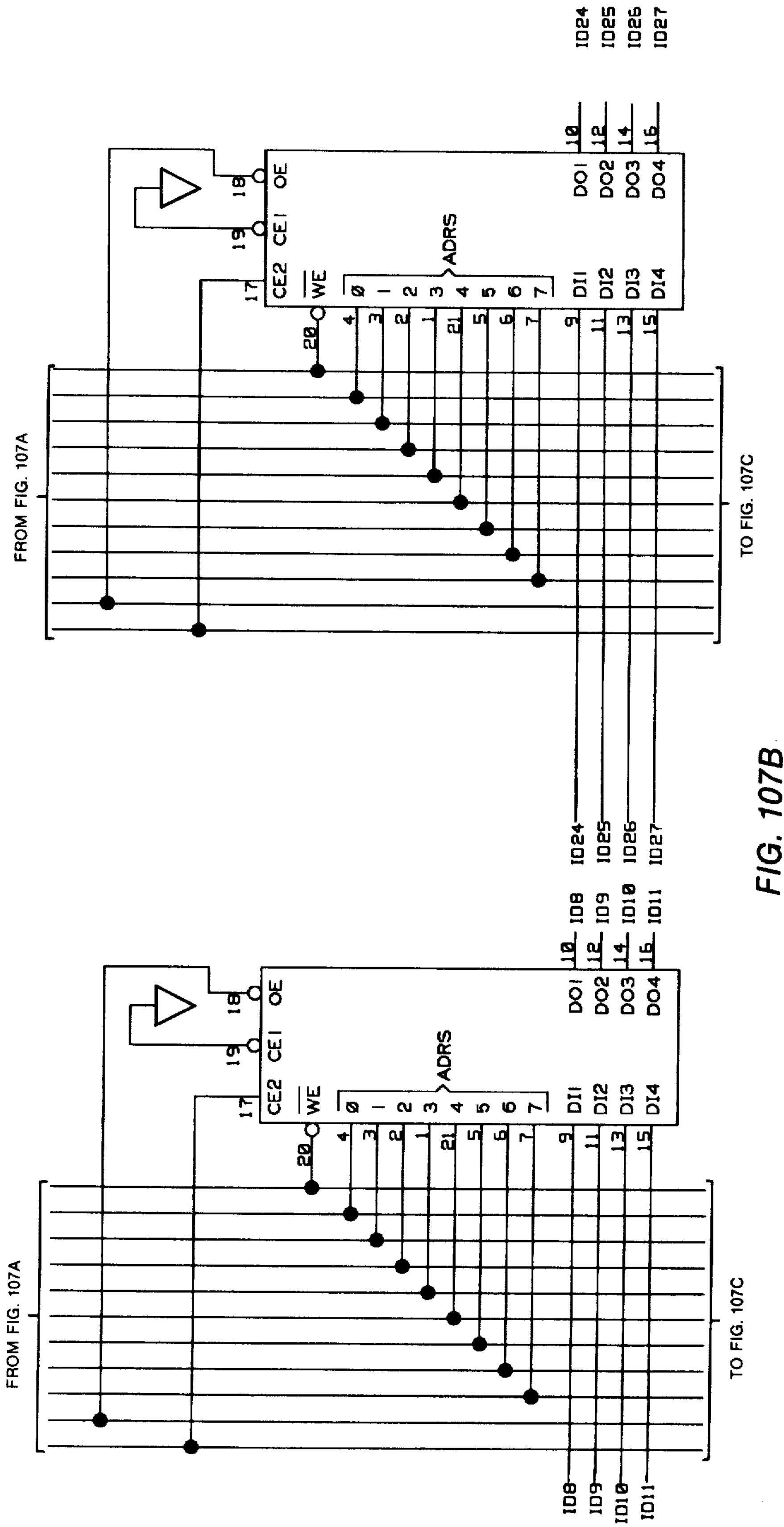
Figure 107C:
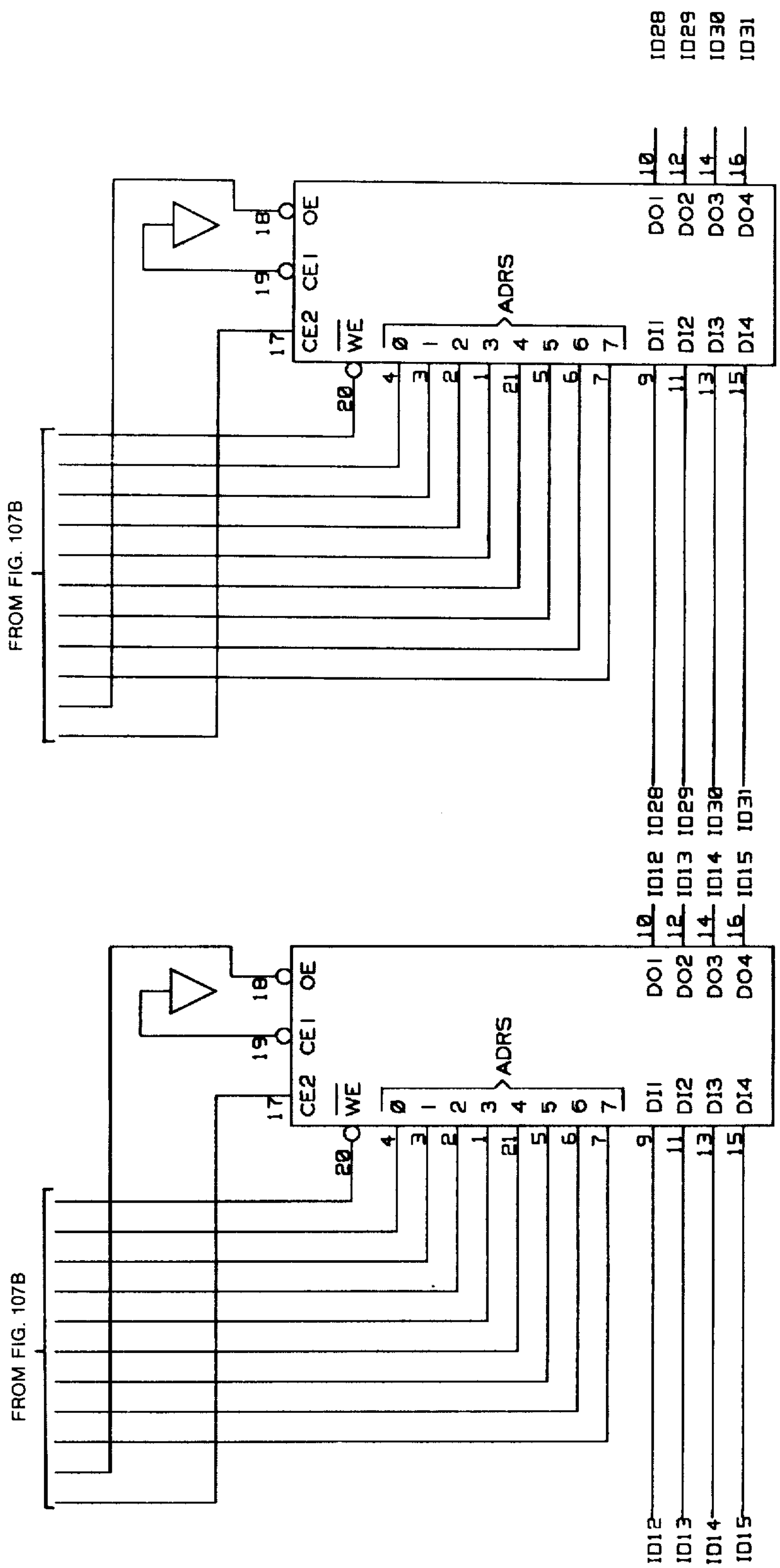
Figure 108:
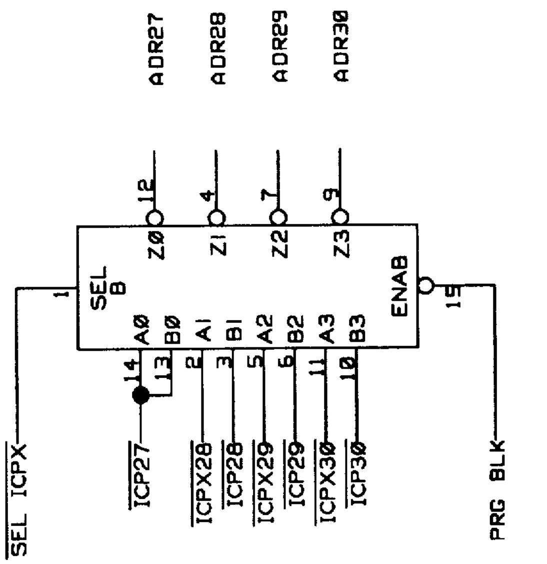
Figure 109:
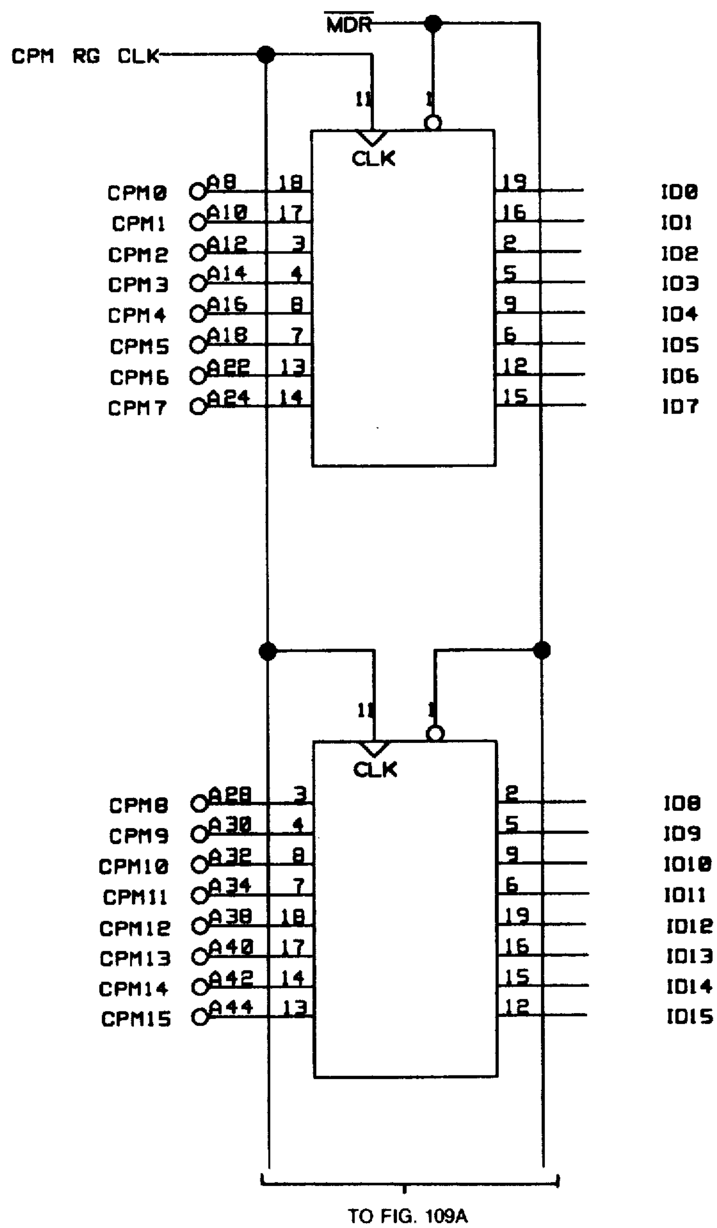
Figure 109A:
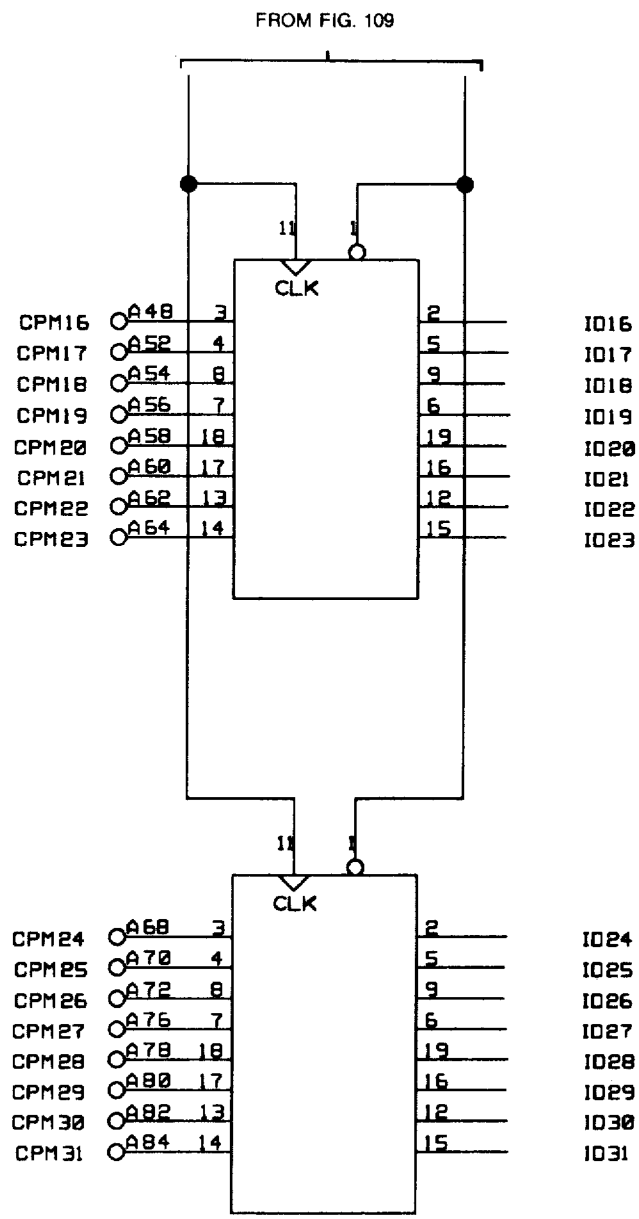
Figure 109B:
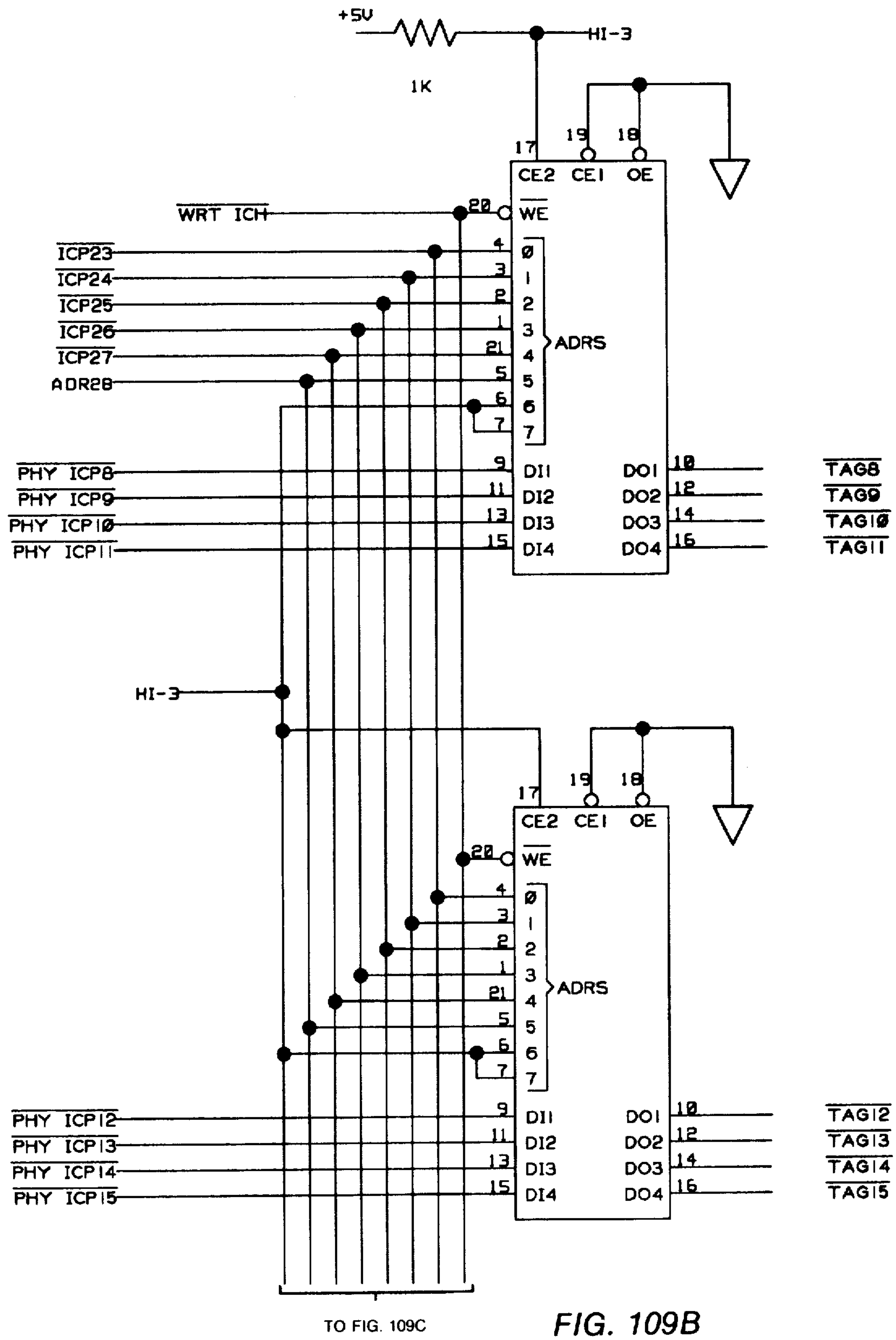
Figure 109C:
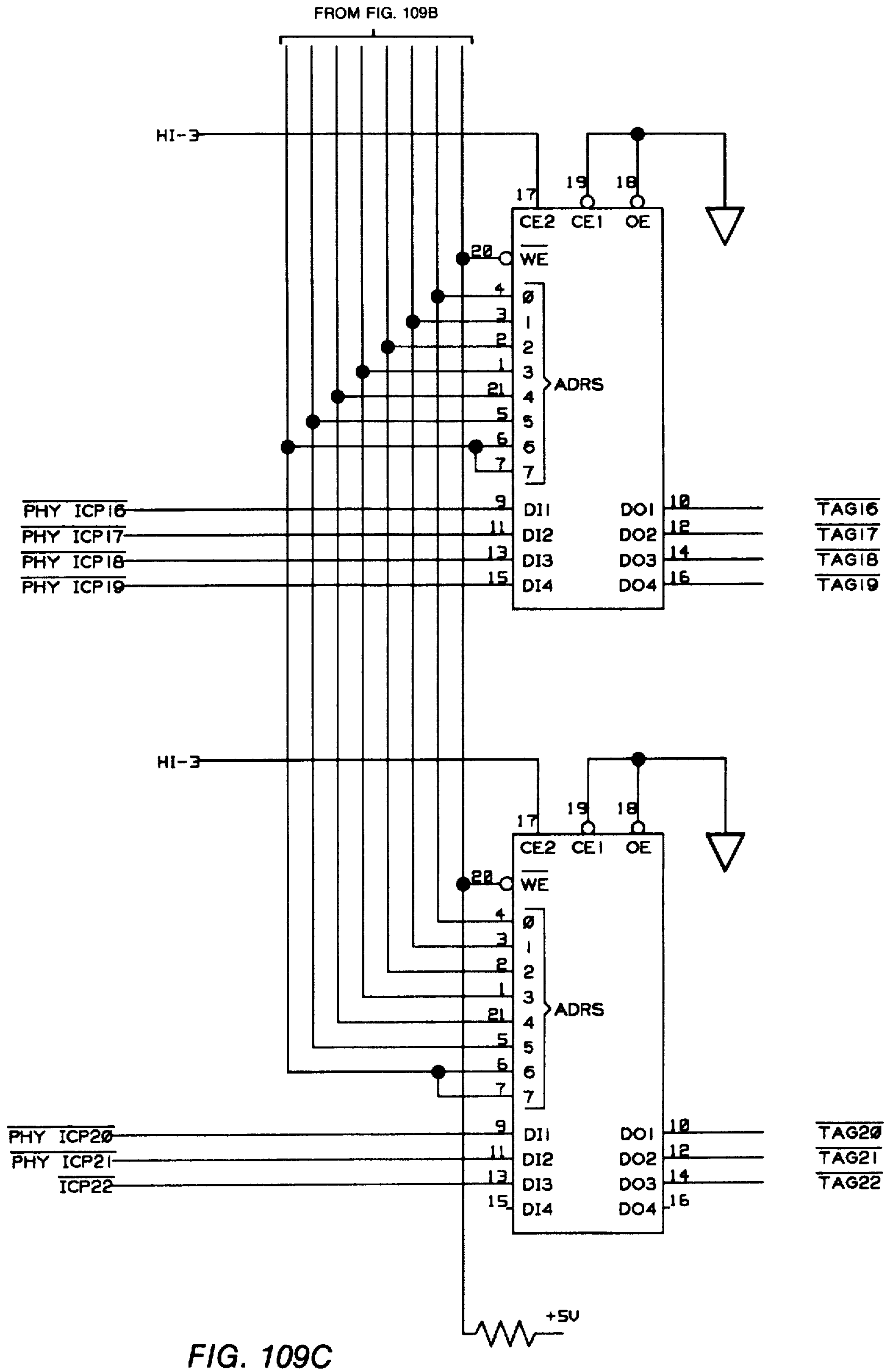
Figure 110:
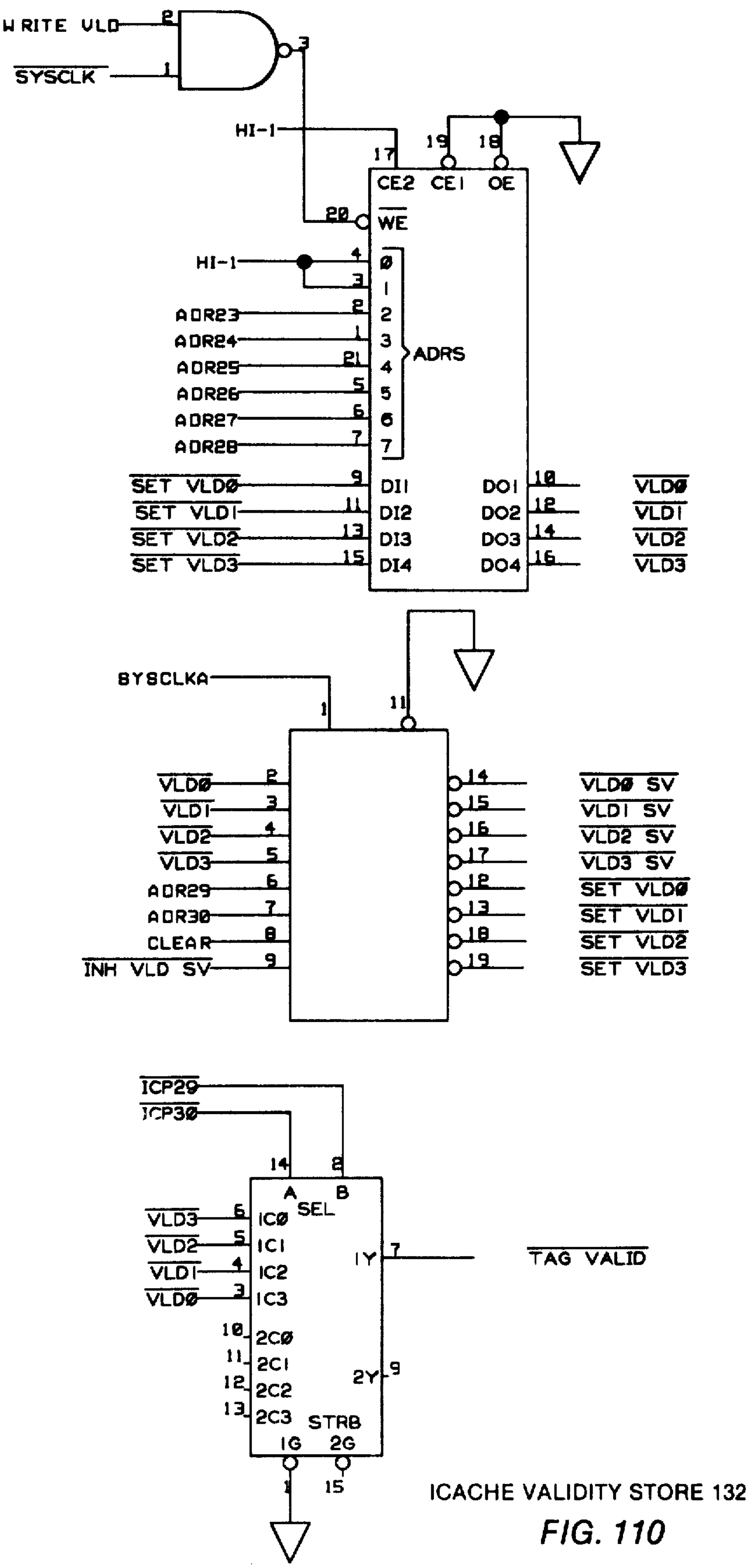
Figure 111:
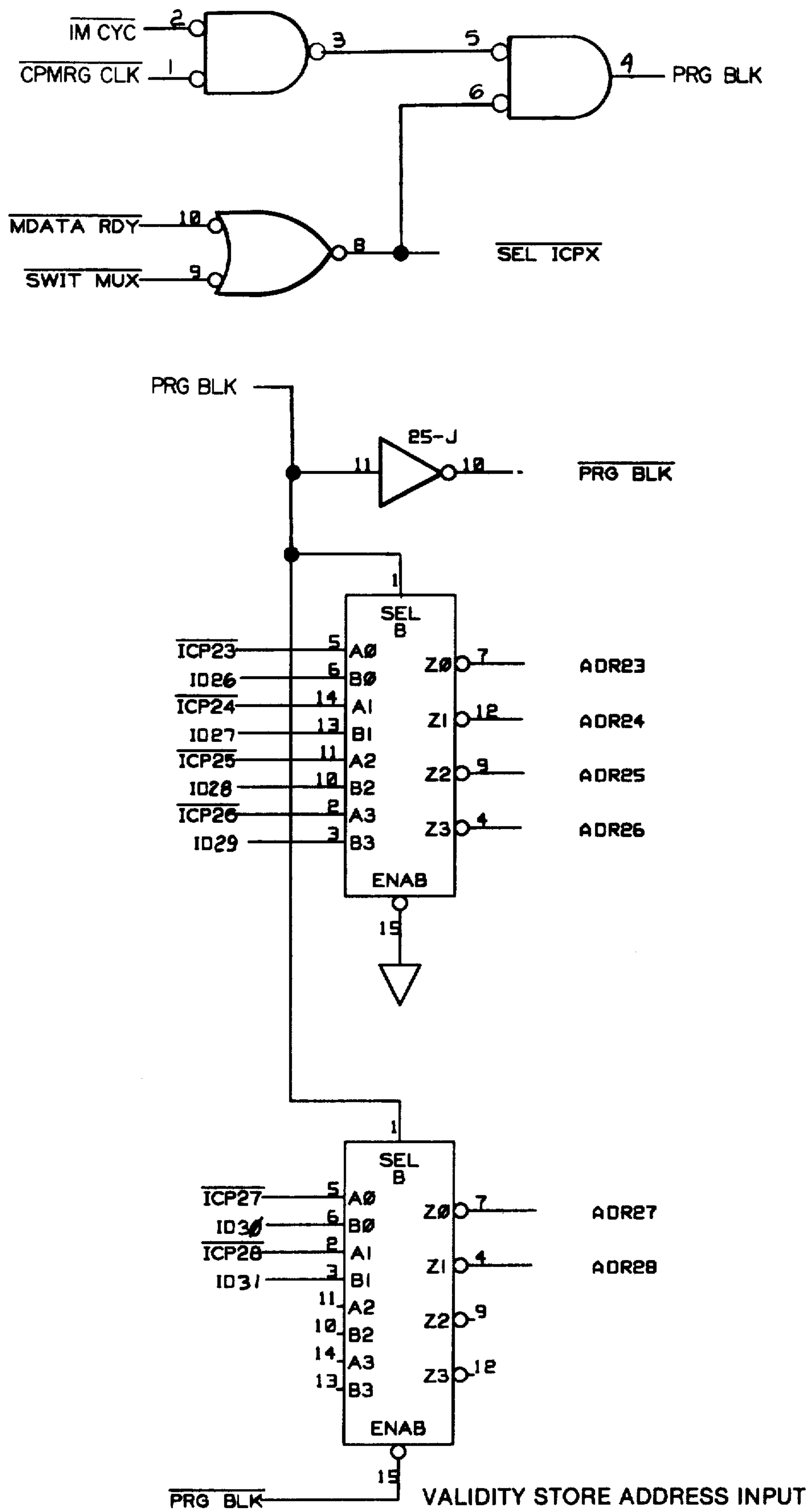
Figure 112:
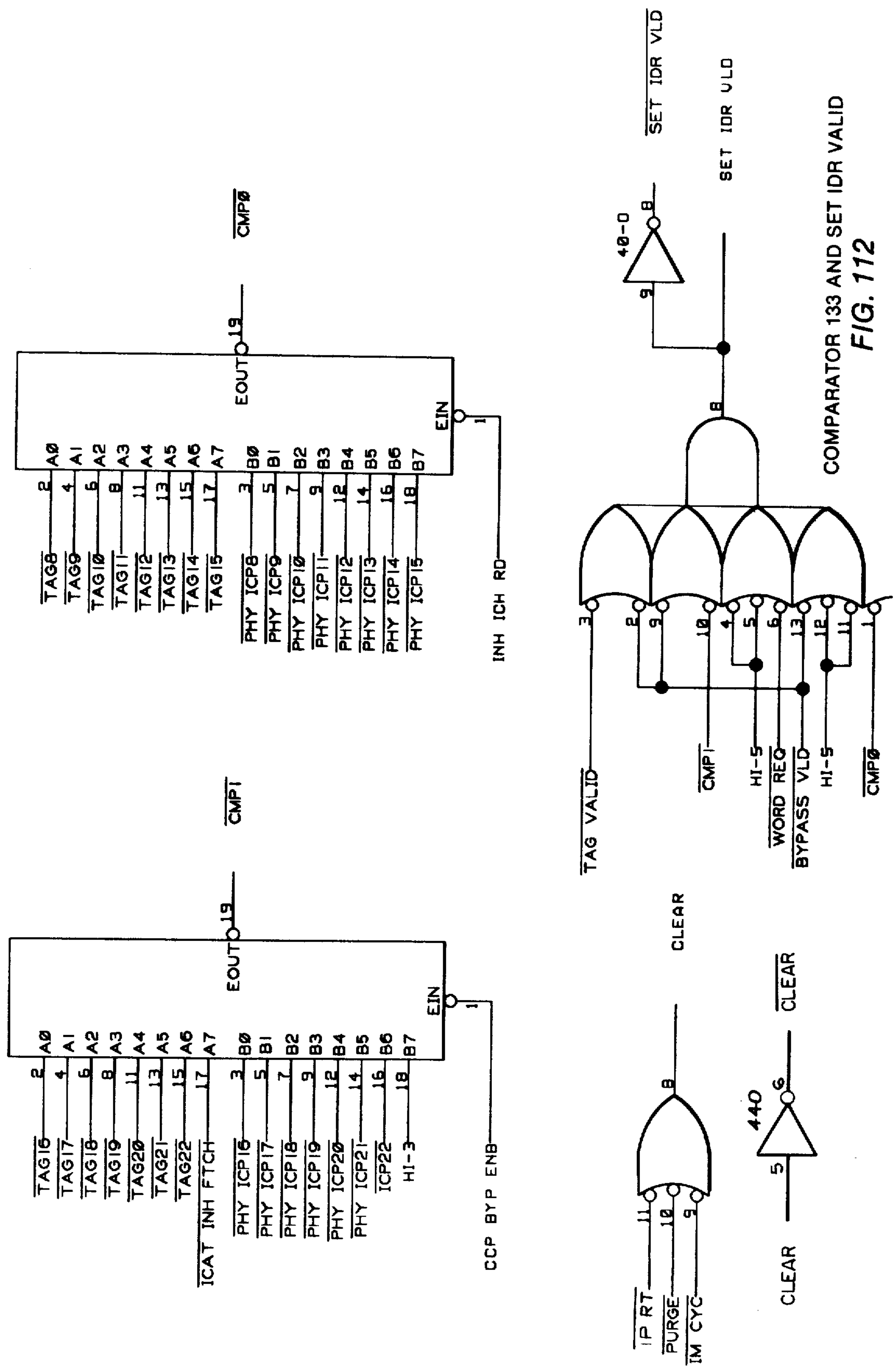

Specific logic circuitry for implementing the block diagram of the instruction processor to provide the operation discussed above with reference to FIGS. 101-106 is shown in FIGS. 107-136. ICACHE data store 130 and the ICACHE data store address input logic are shown in FIGS. 107 and 108, respectively, while CPM register 134 supplying cache block words from memory being shown in FIGS. 109 and 109A. ICACHE tag store 131 is also depicted in FIGS. 109B and 109C and ICACHE validity store 132, together with the validity store address input is shown in FIGS. 110 and 111, respectively. Comparator 133 and logic for providing the SET IDR VLD signal are shown in FIG. 112.

Figure 113:
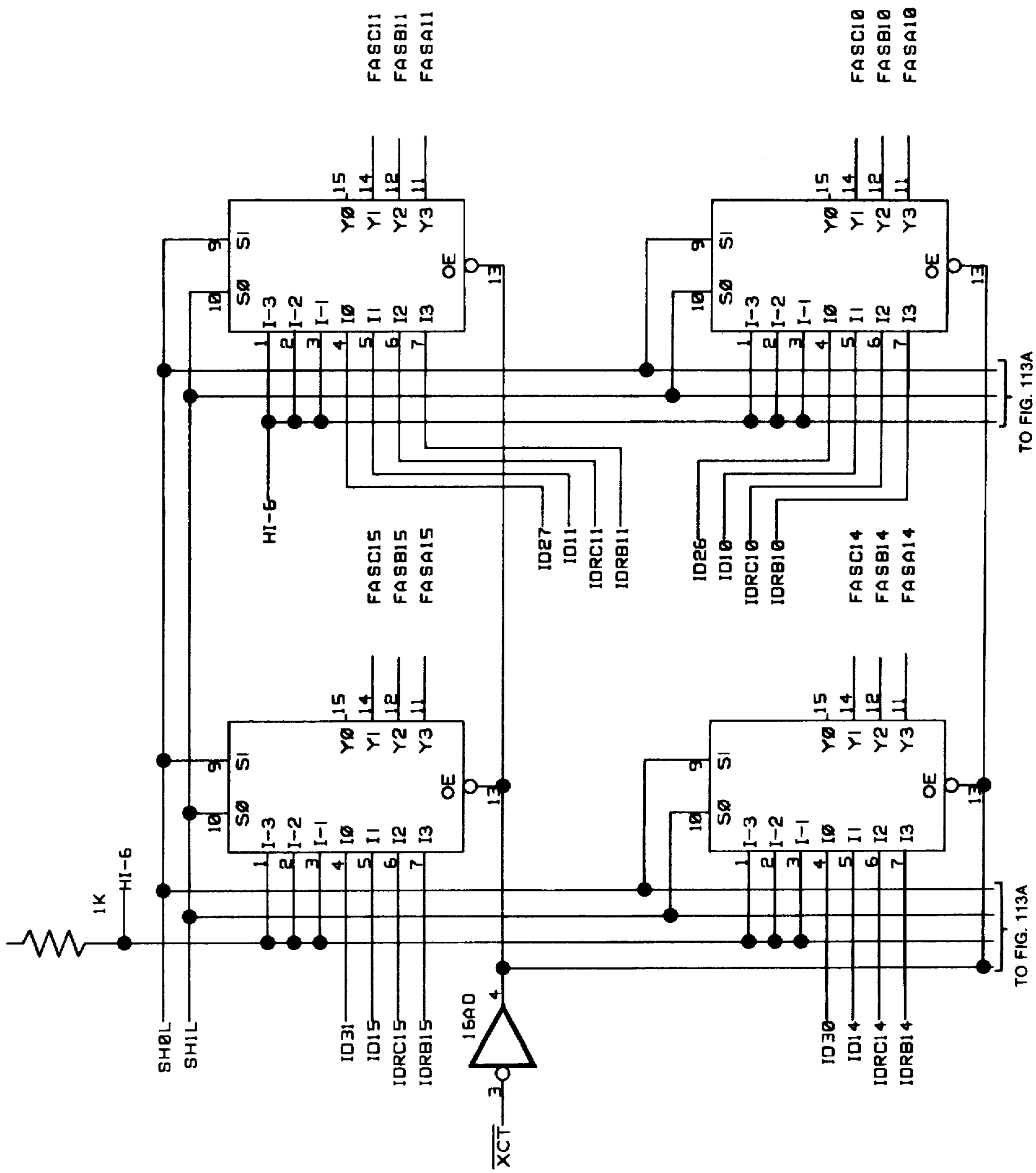
Figure 113A:
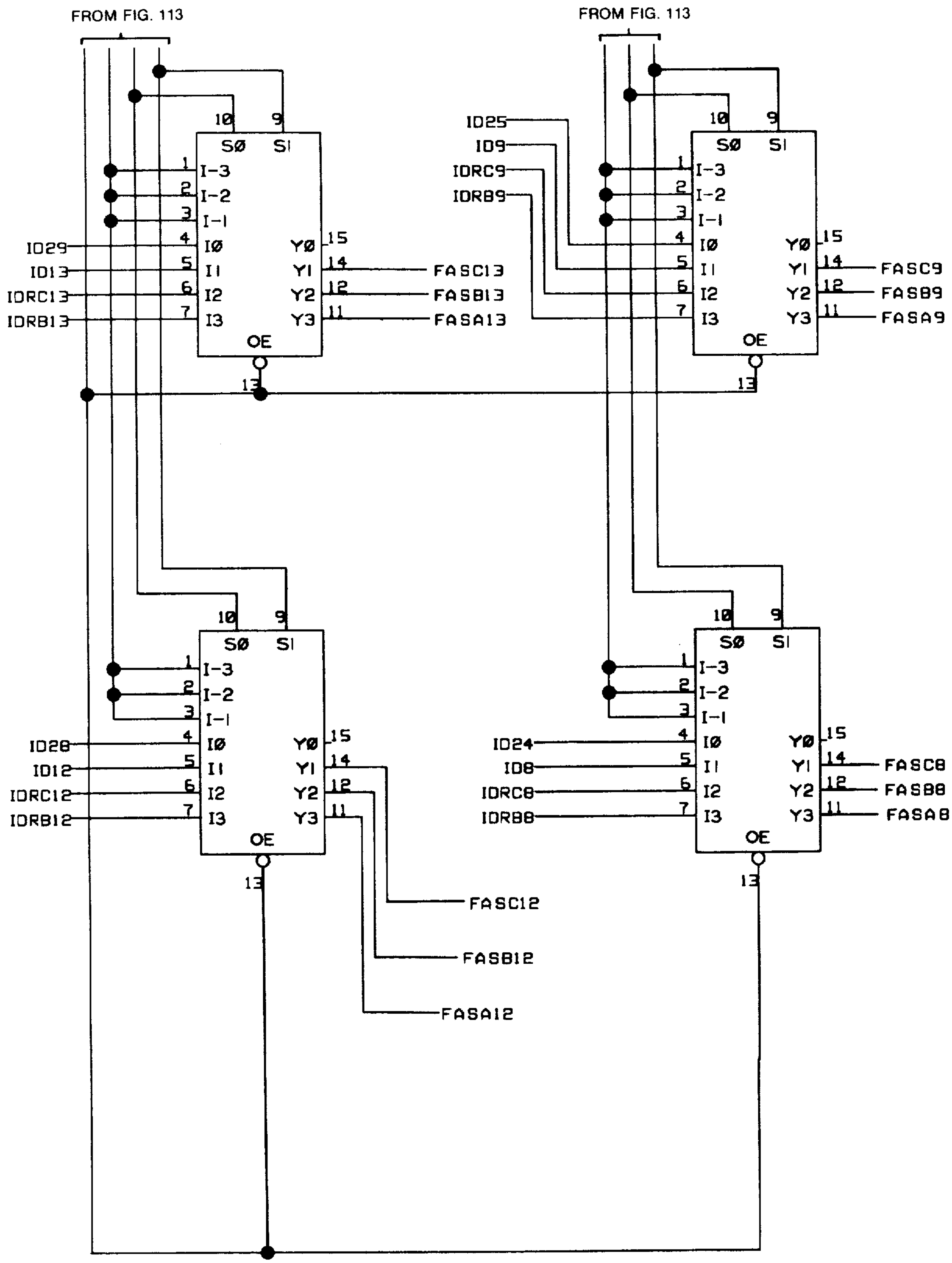
Figure 113B:
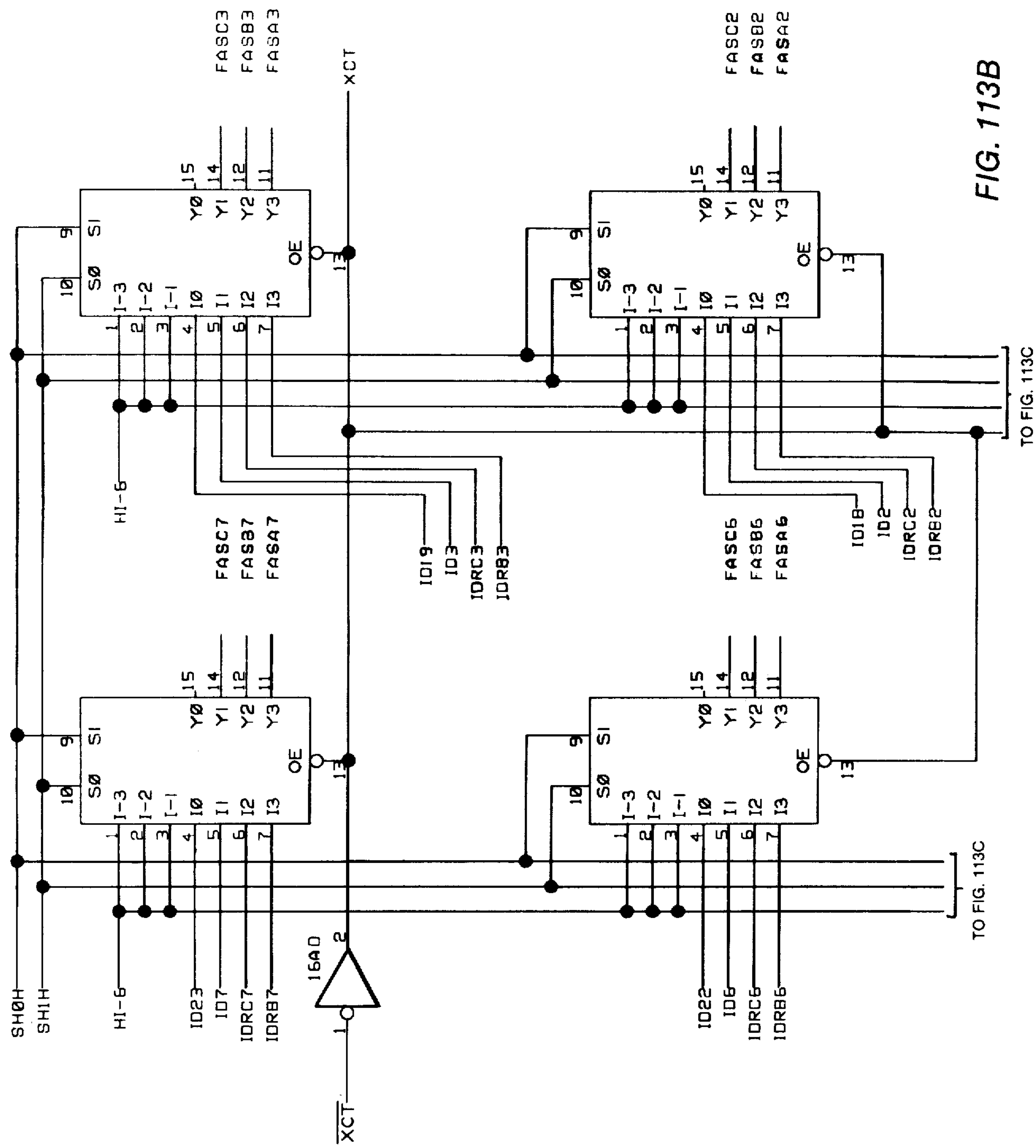
Figure 113C:
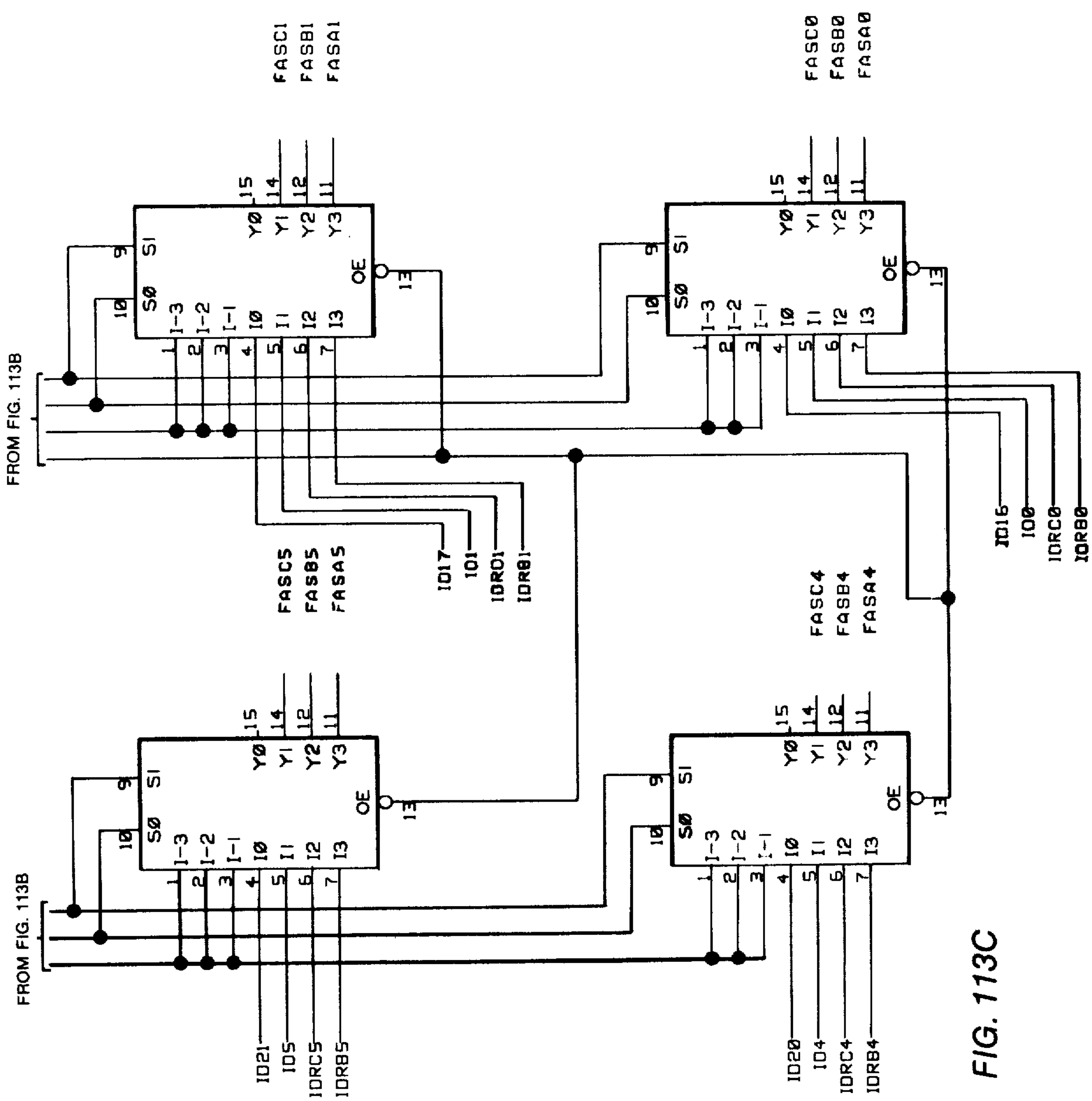
Figure 114:
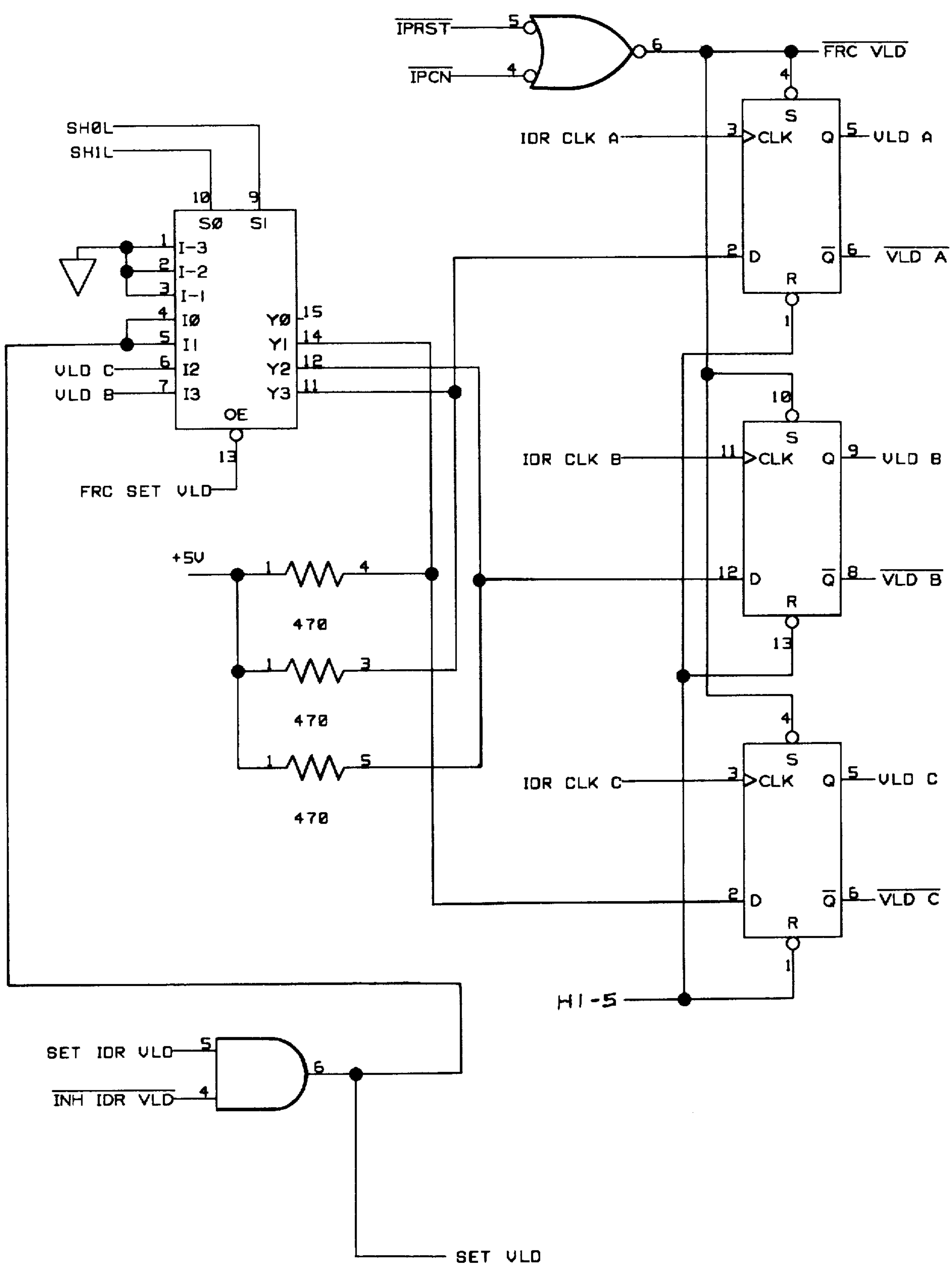
Figure 114A:
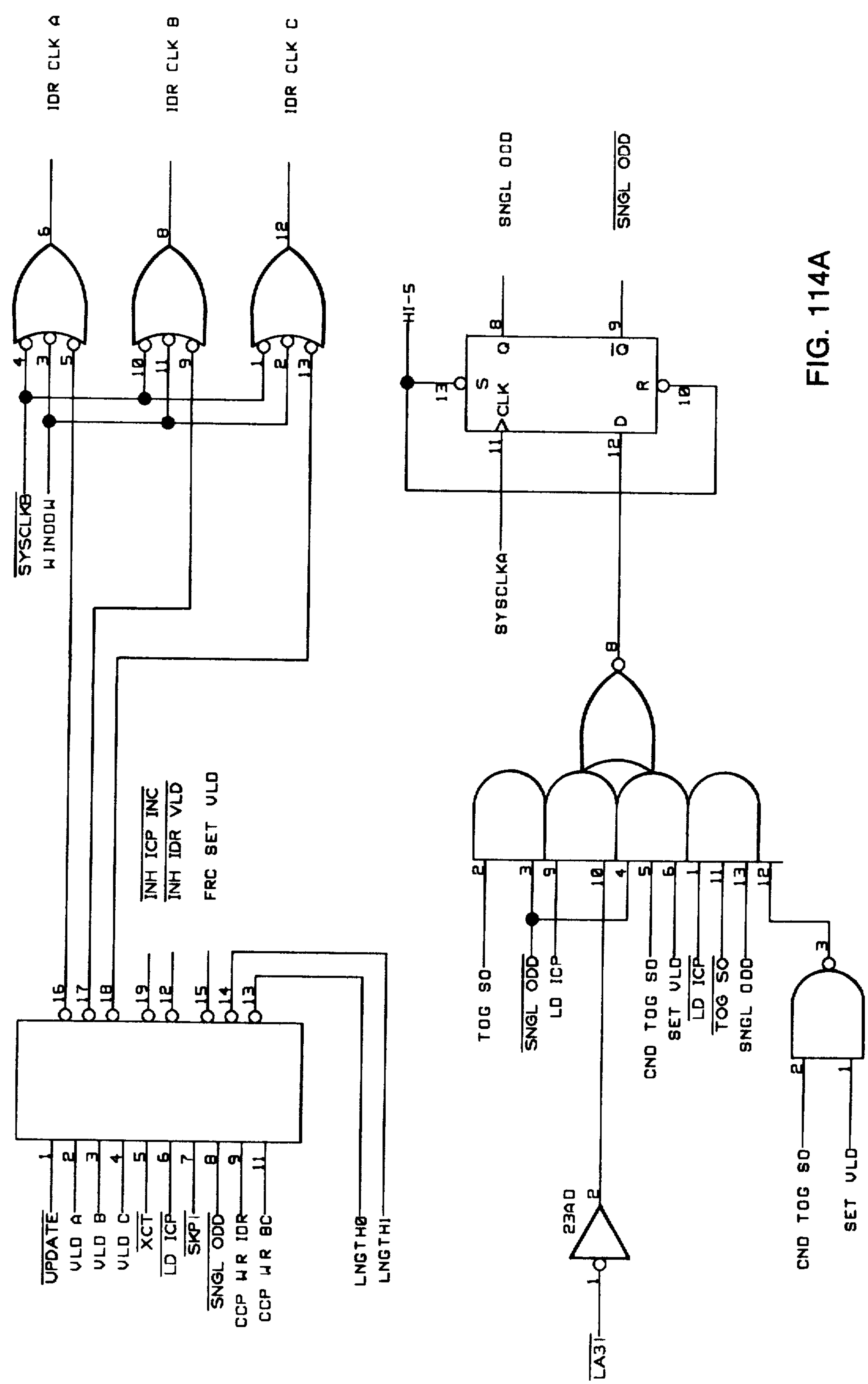
Figure 114B:
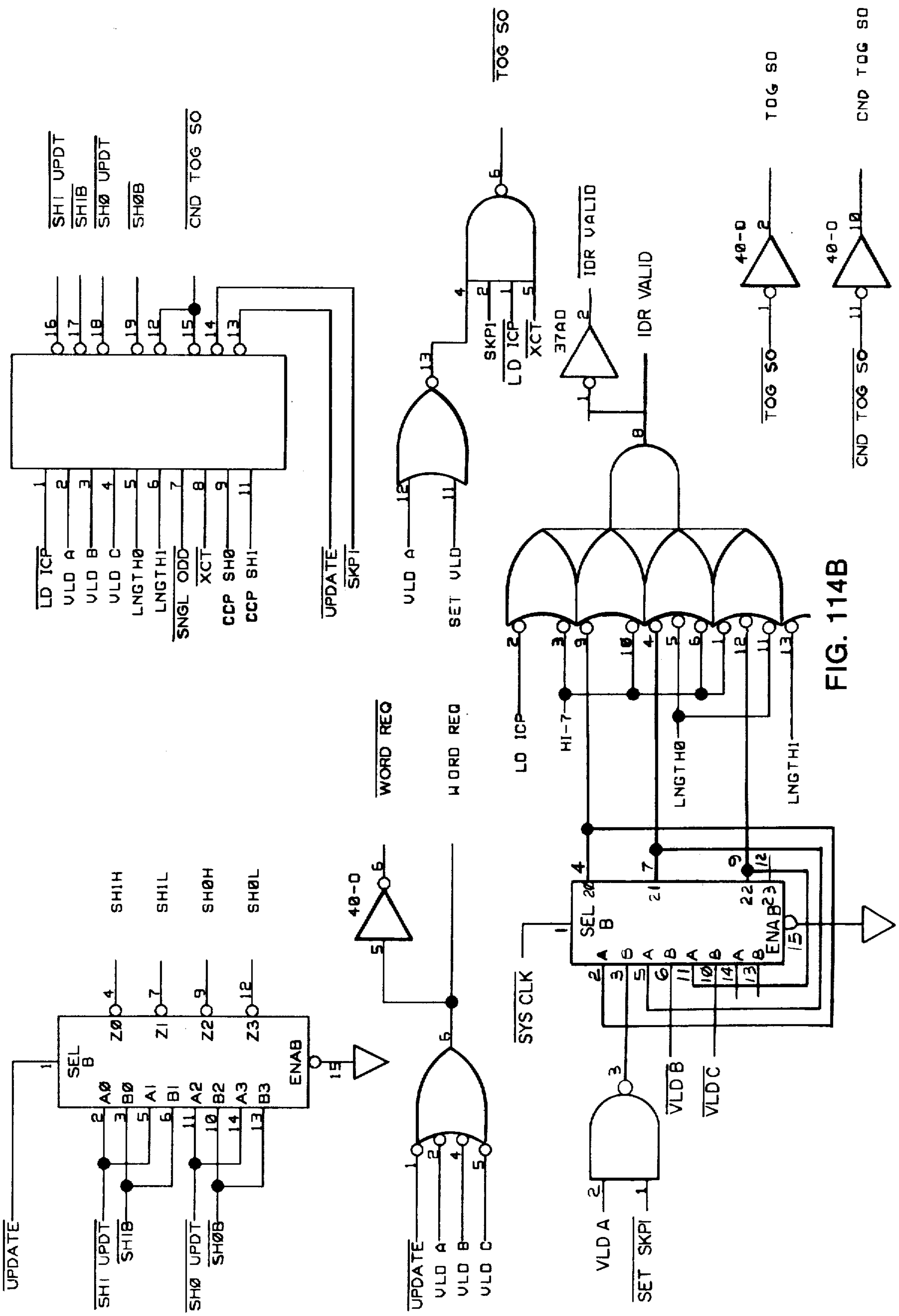
Figure 115:
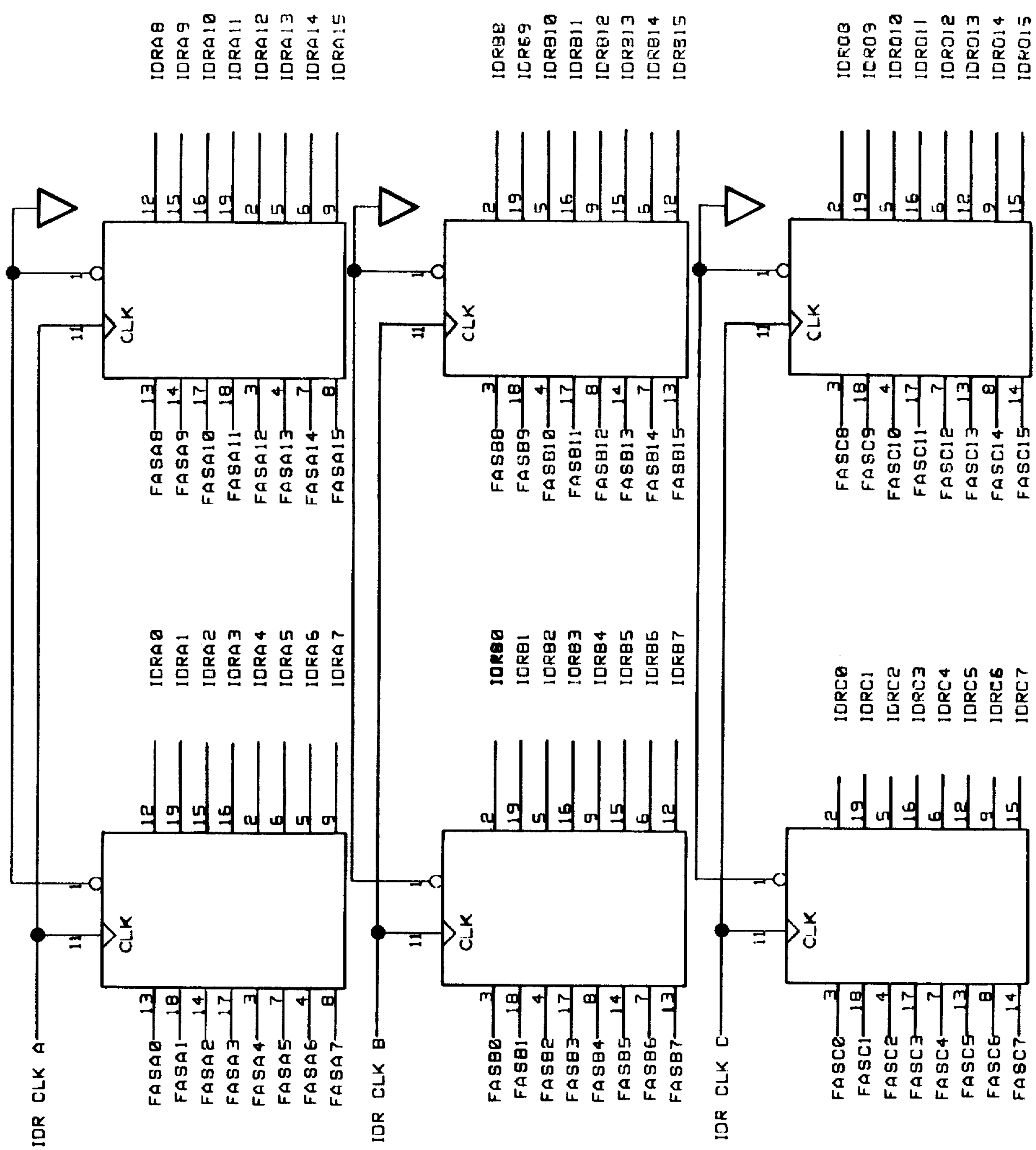

FIG. 113 shows IDR shifter 143, the IDR shifter control logic 137 being shown in FIG. 114. The instruction decode register (IDR) unit 142 is depicted in FIG. 115 and include IDR sections A, B and C as shown.

Figure 105:
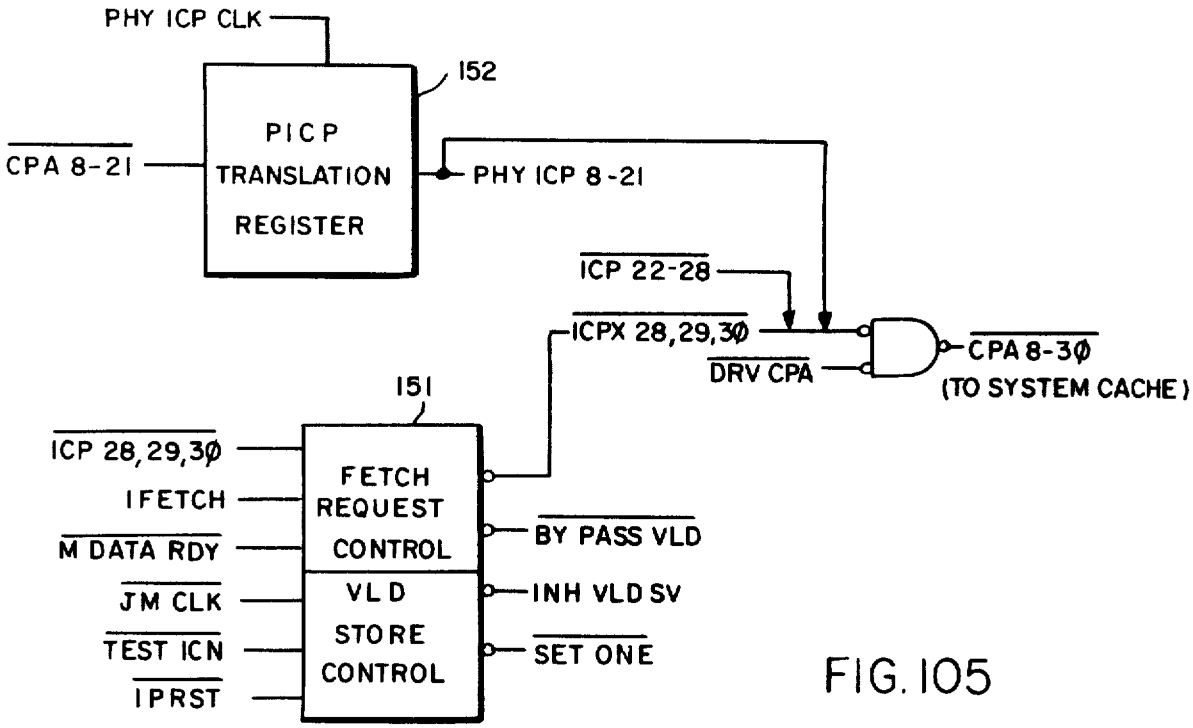
Figure 106:
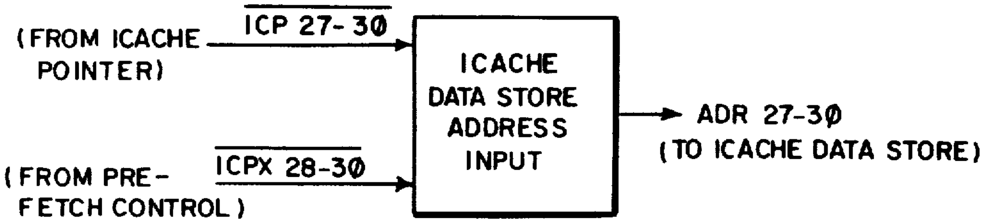
Figure 106:
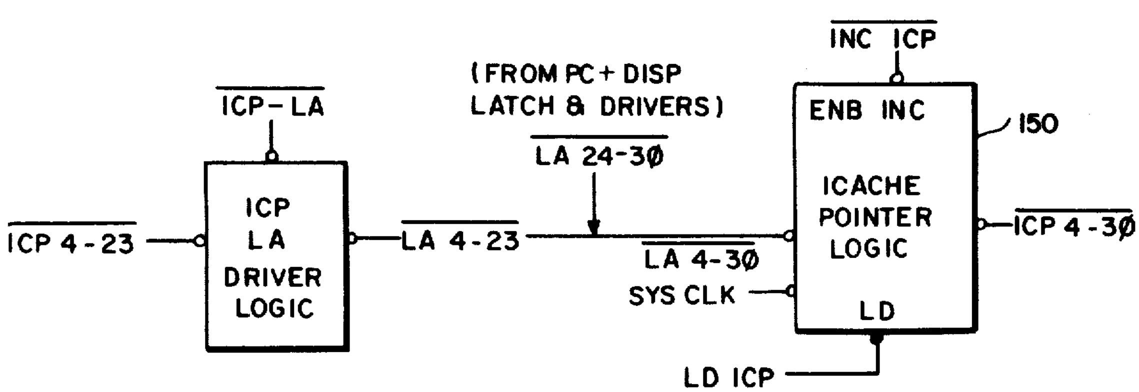
Figure 116:
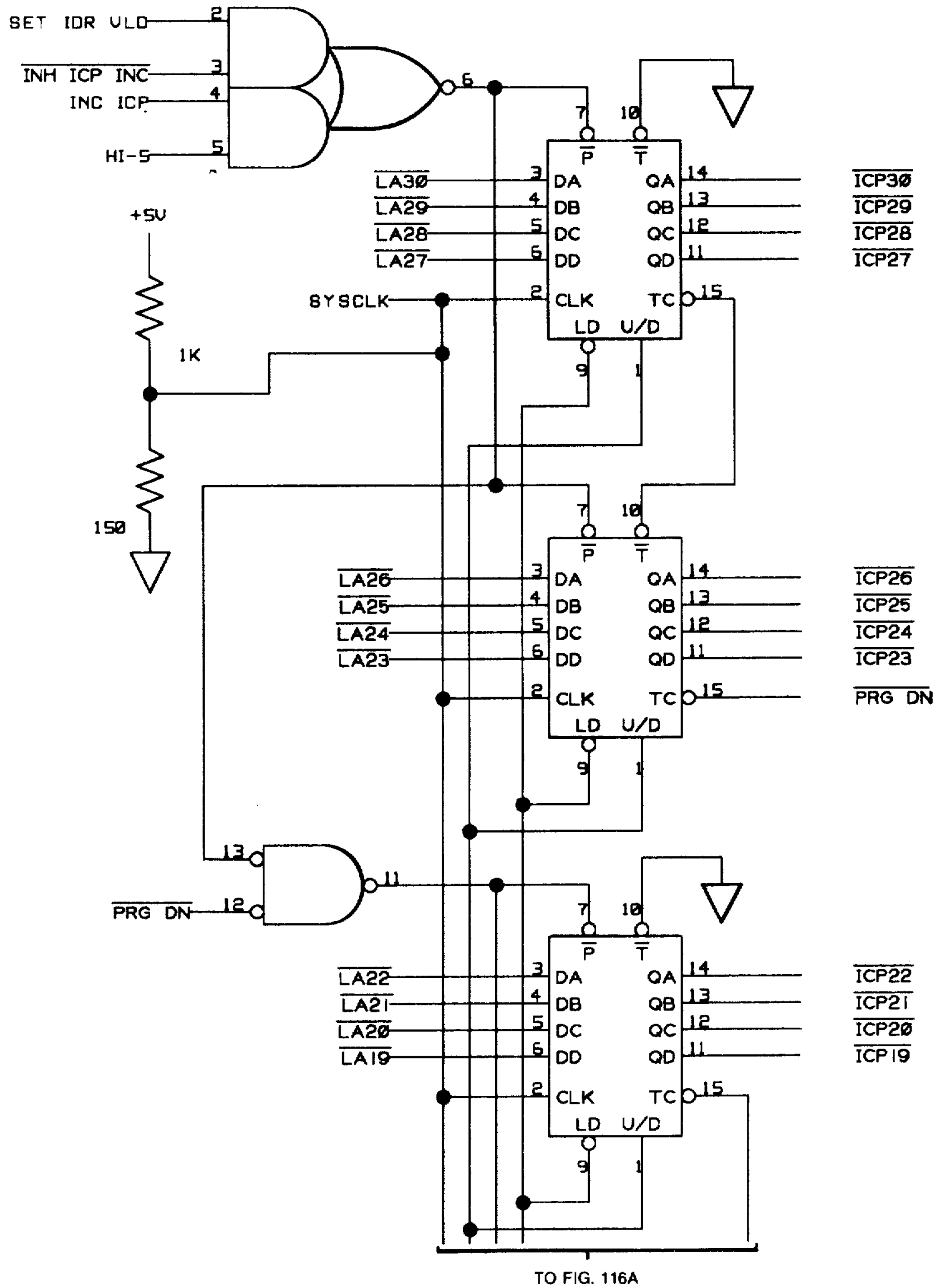
Figure 116A:
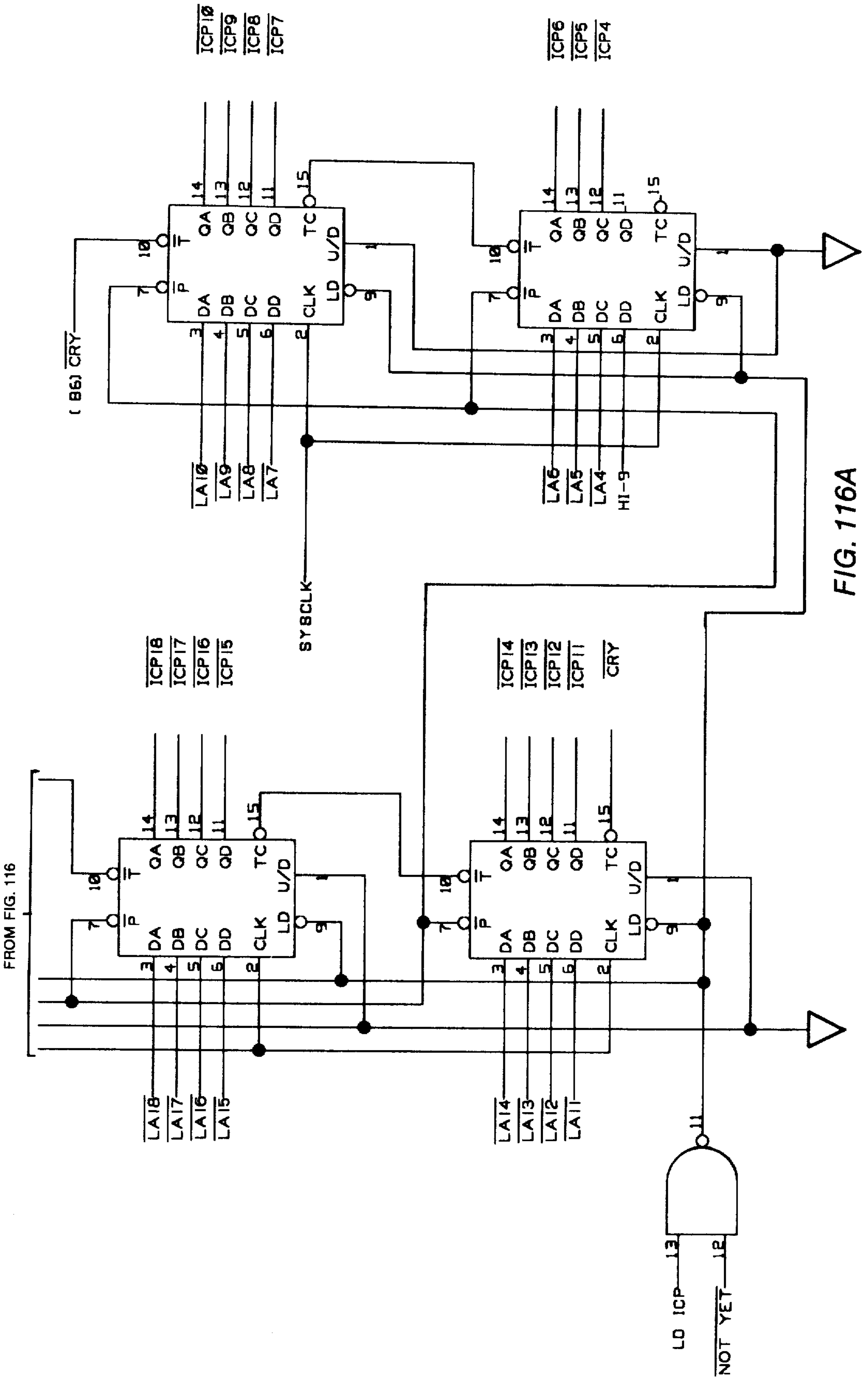
Figure 117:
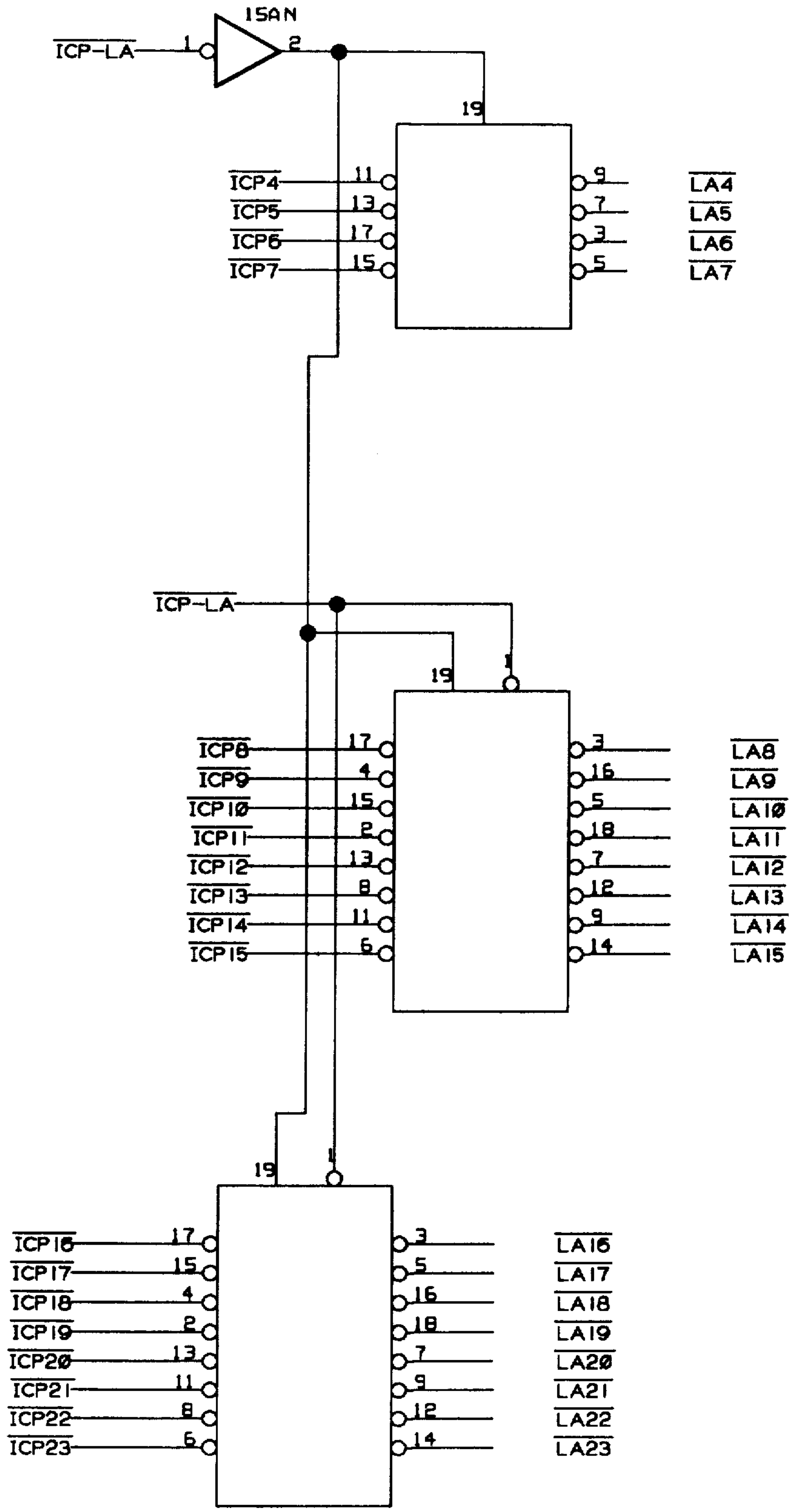
Figure 118:
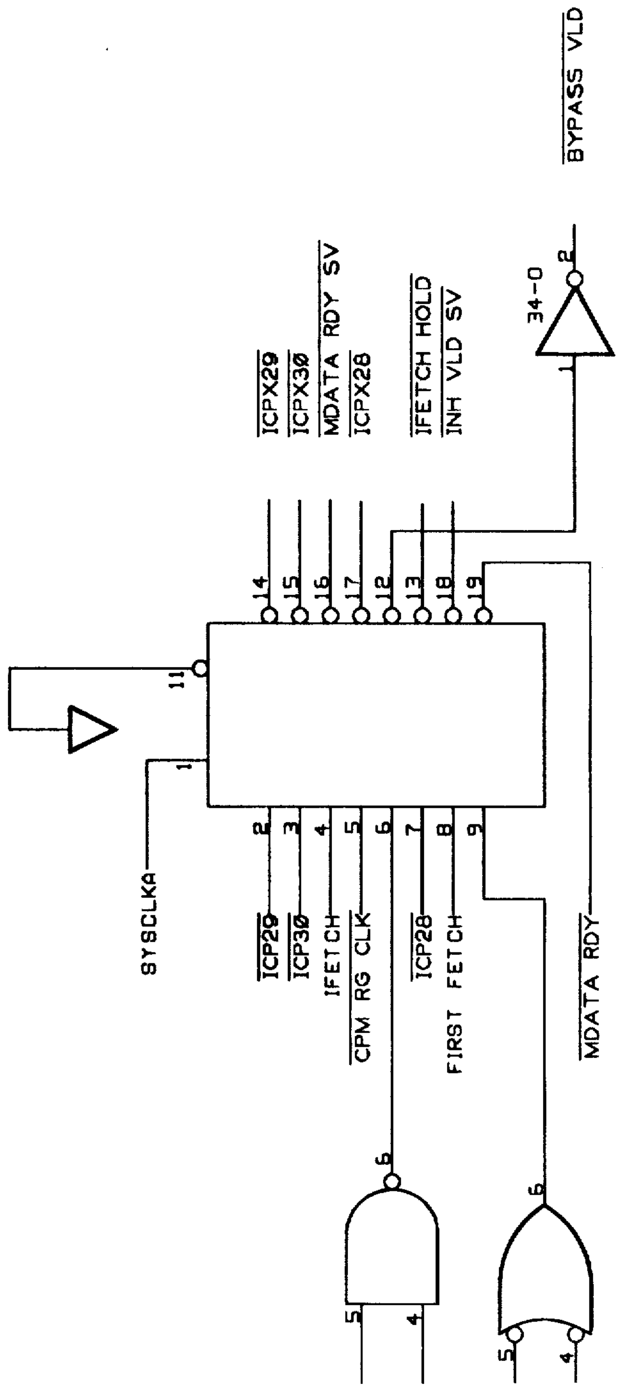
Figure 119:
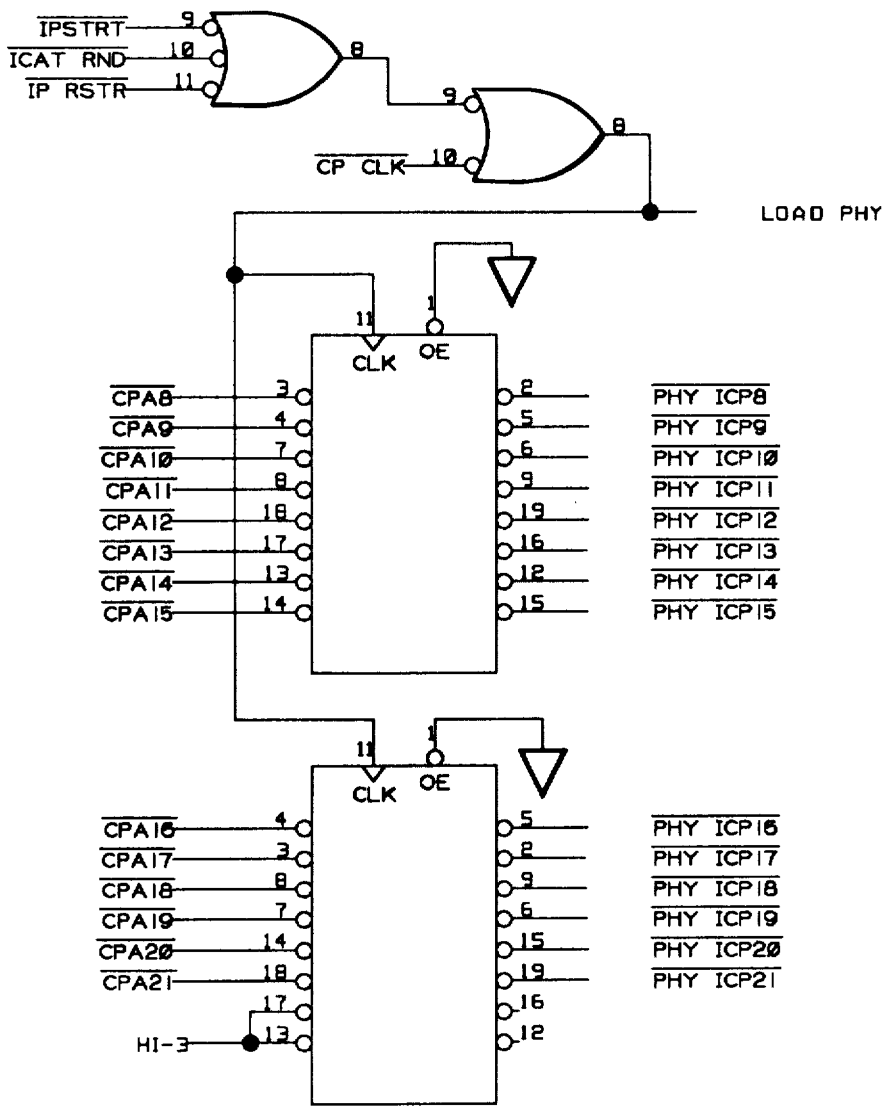
Figure 120:
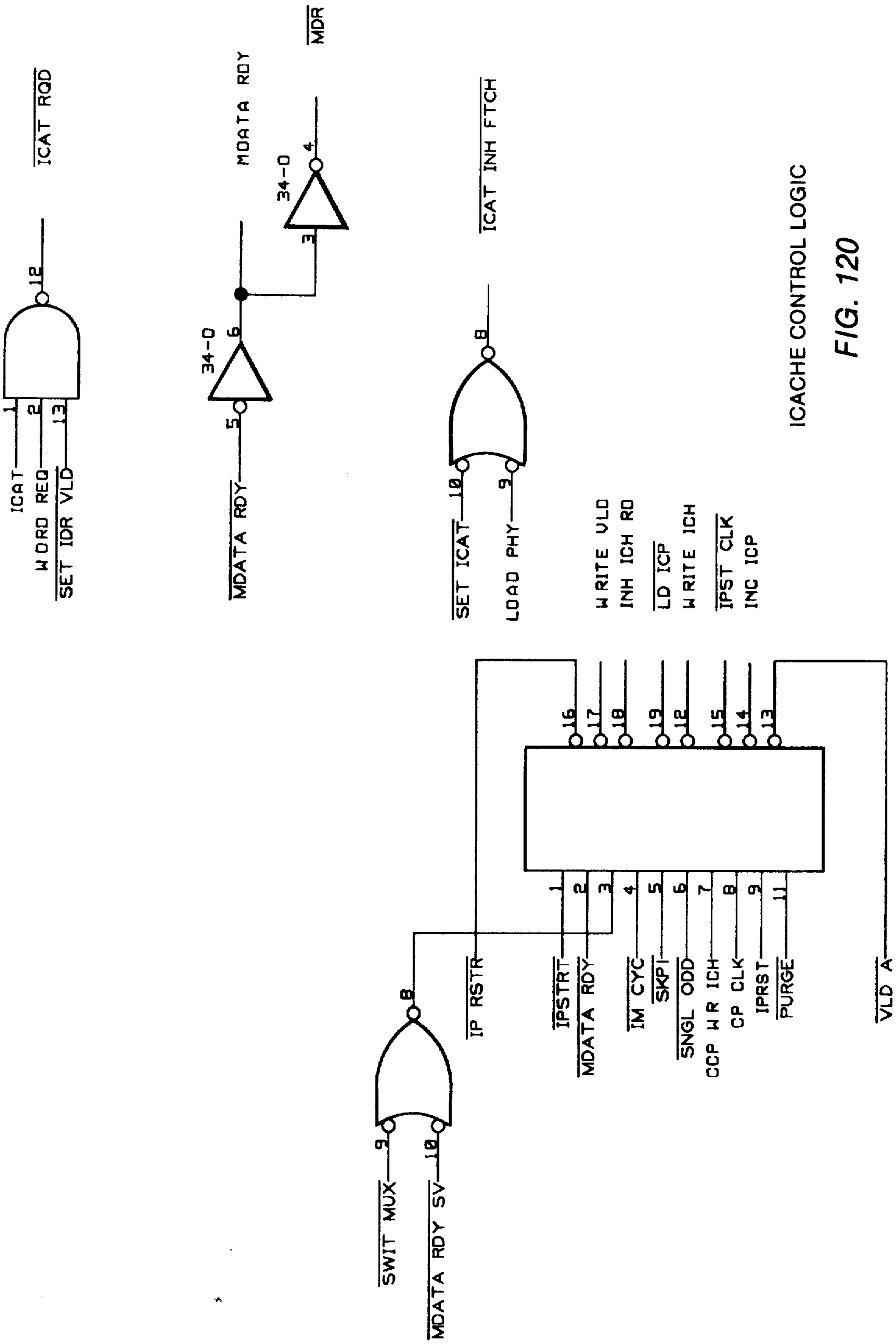
Figure 120A:
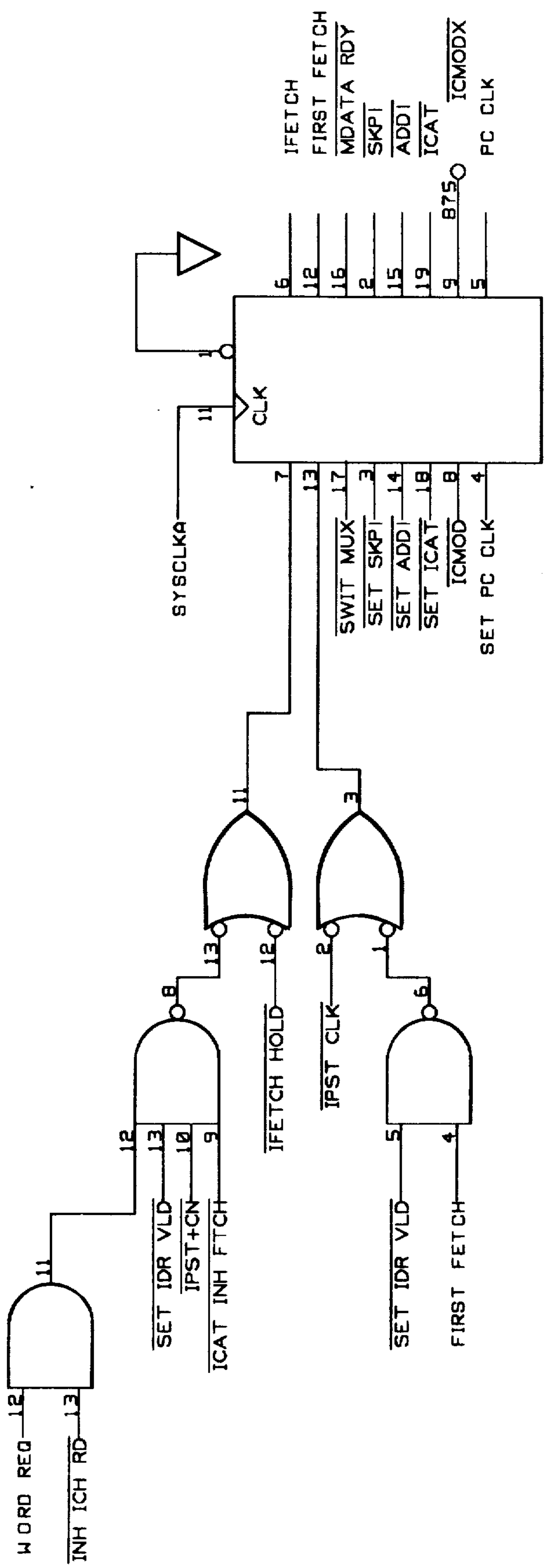

With reference to the ICACHE logic circuitry the ICACHE pointer (ICP) logic 150 and the ICP logical address driver logic of FIG. 106 is shown in more detail in FIGS. 116 and 117, respectively. The ICACHE pointer pre-fetch request control logic 151 and the physical ICP translation register 152 of FIG. 105 is depicted in more detail in FIGS. 118 and 119, respectively. Other general ICACHE control logic is further depicted in FIG. 120.

Figure 121:
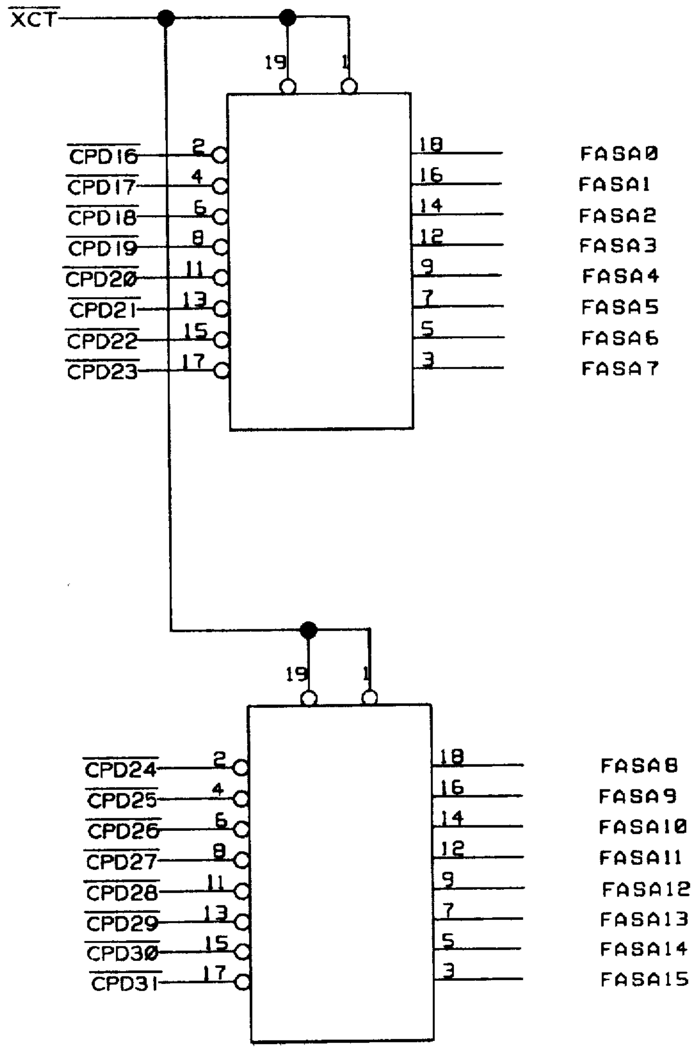
Figure 122:
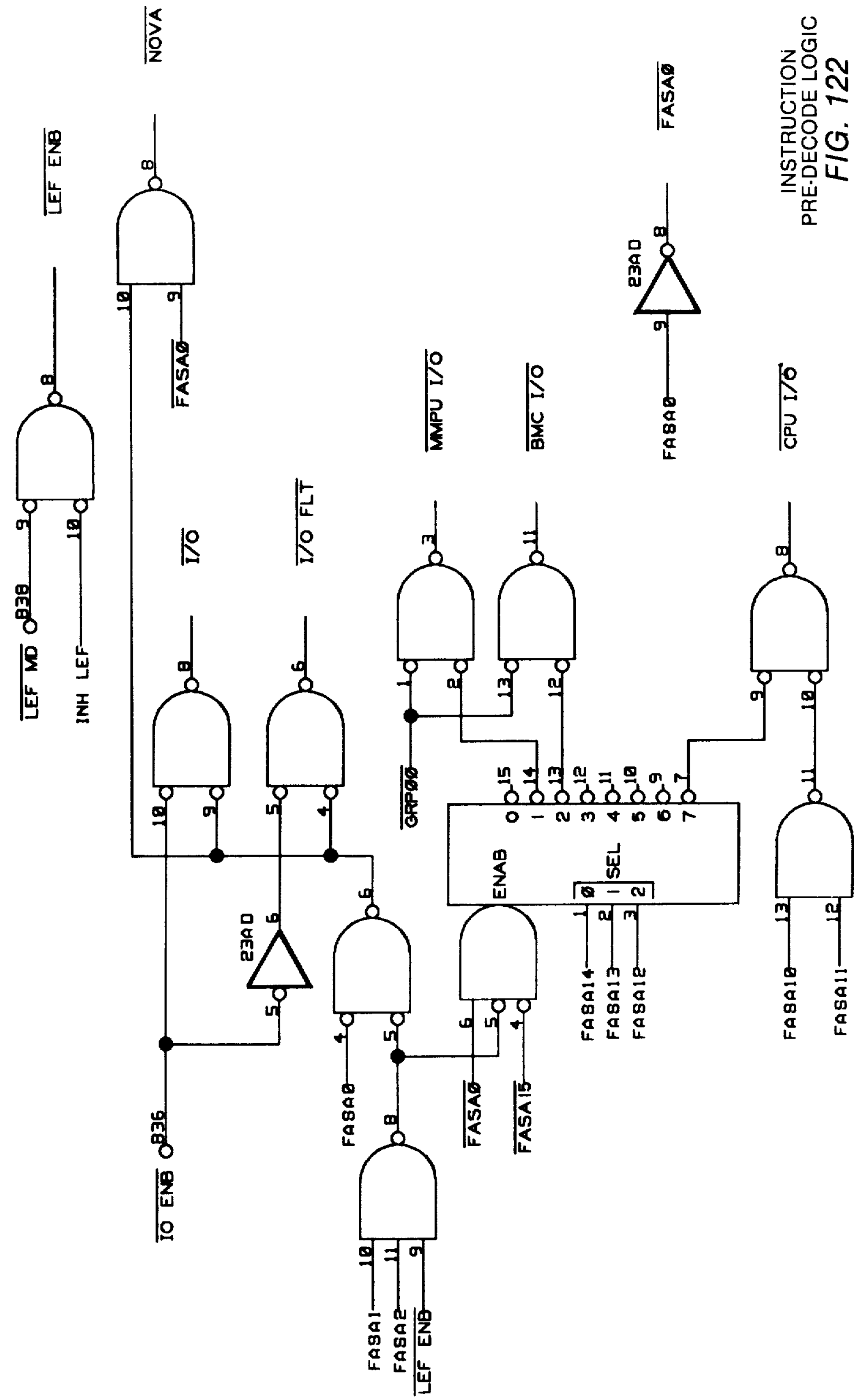
Figure 122A:
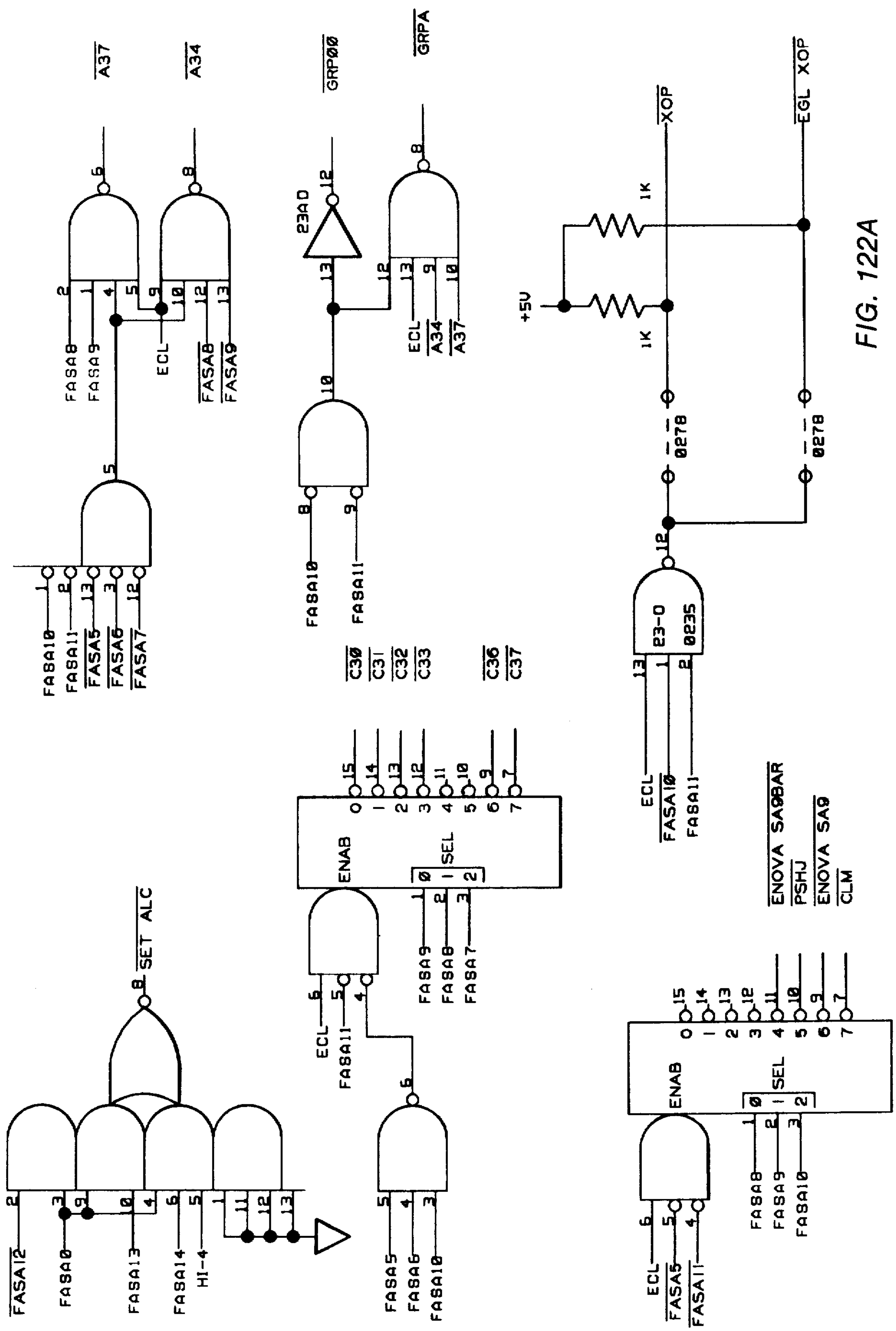
Figure 122B:
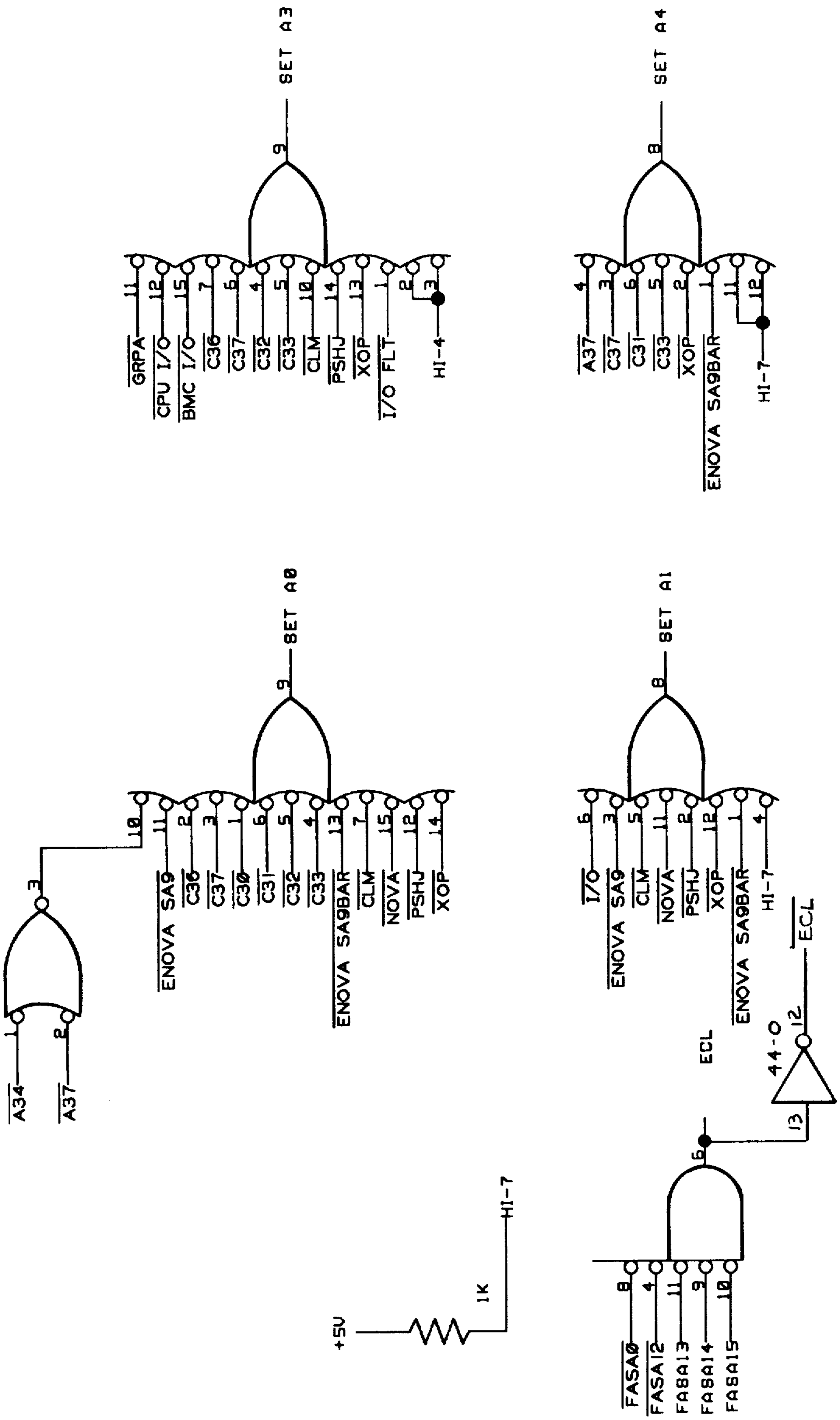
Figure 122C:
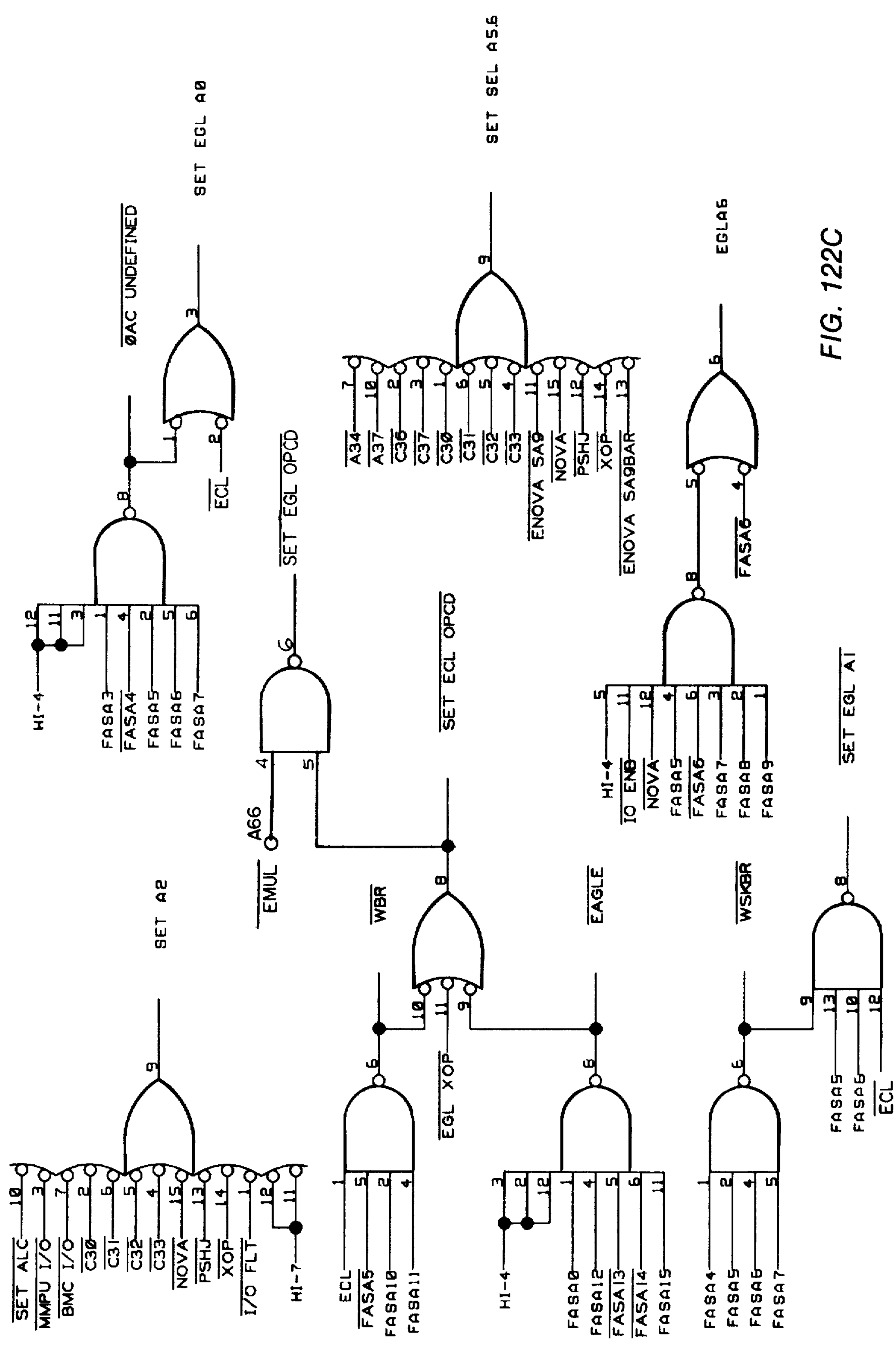
Figure 122D:
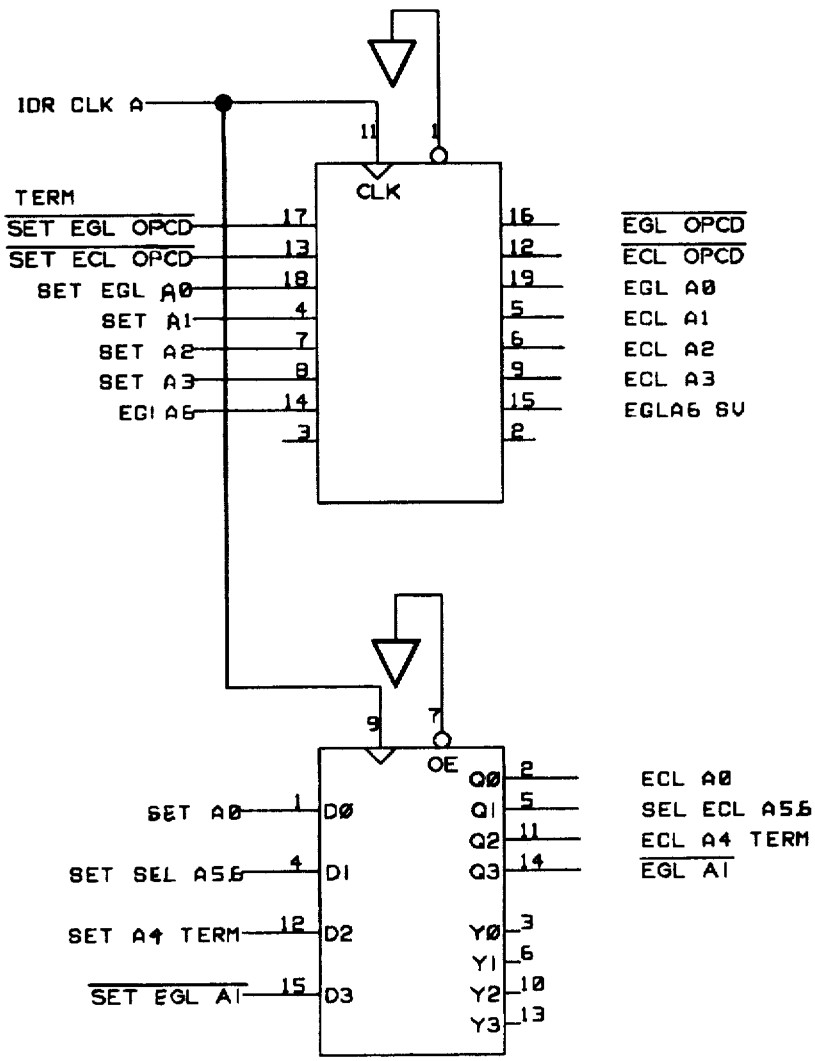
Figure 123:
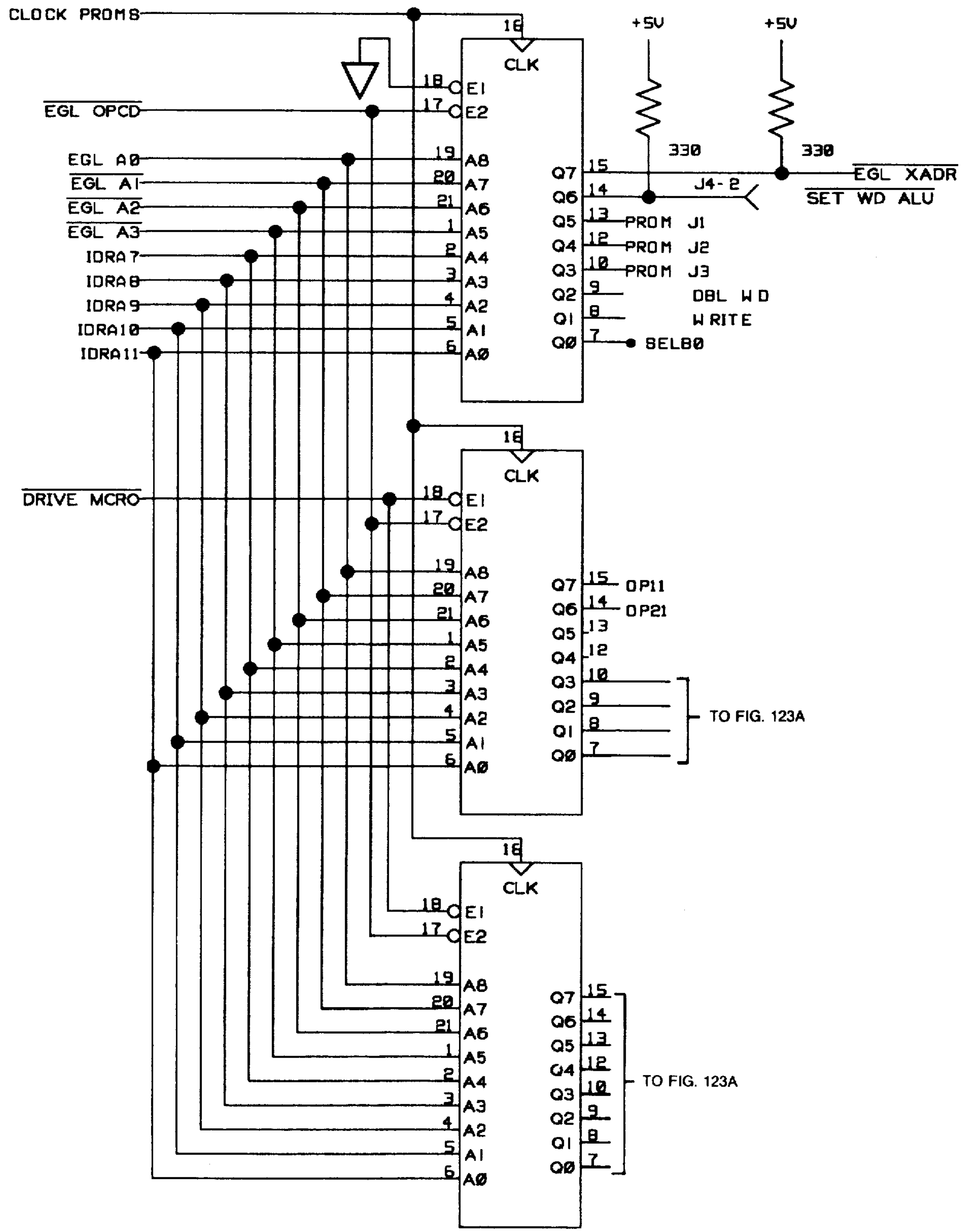
Figure 123A:
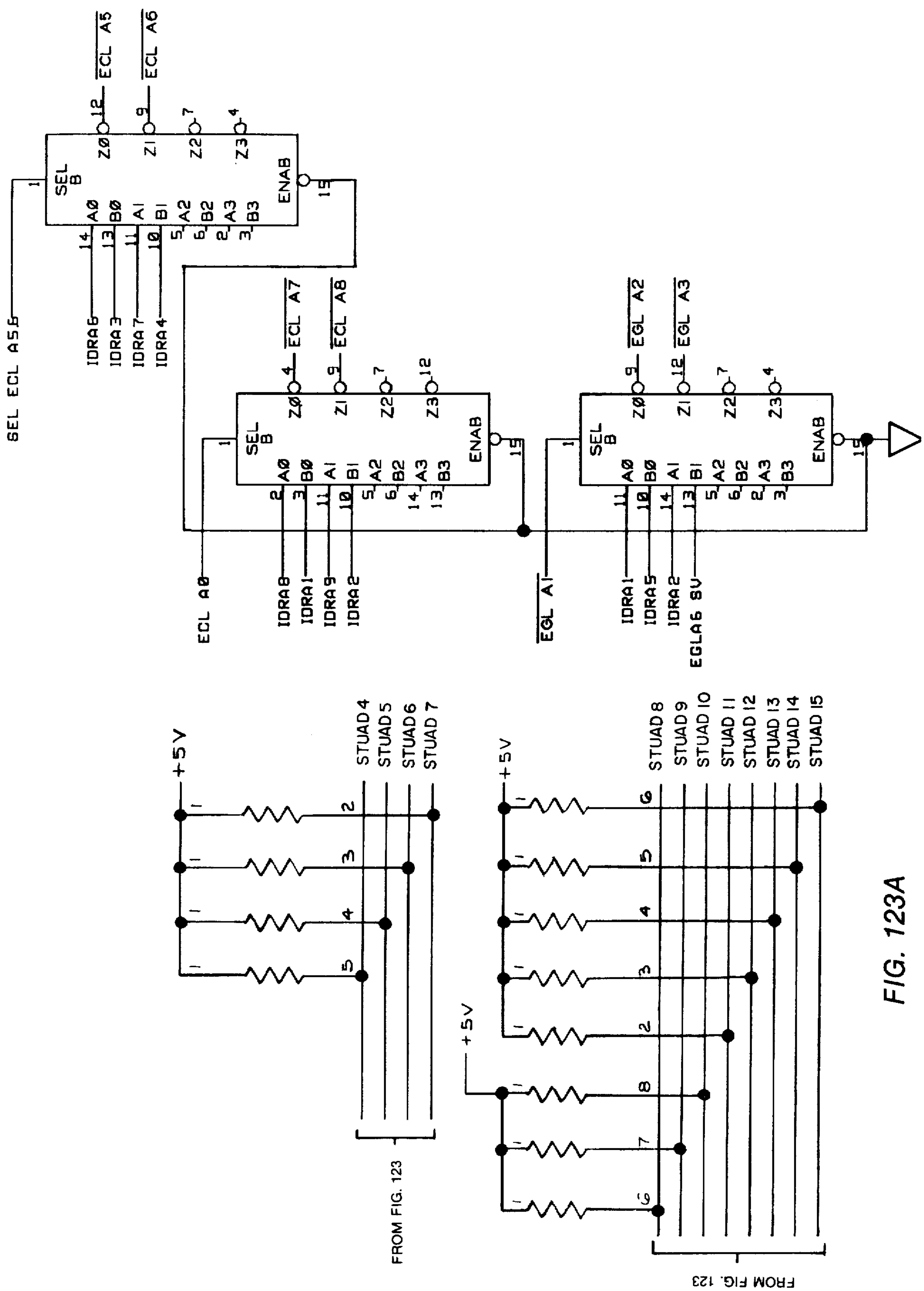
Figure 123B:
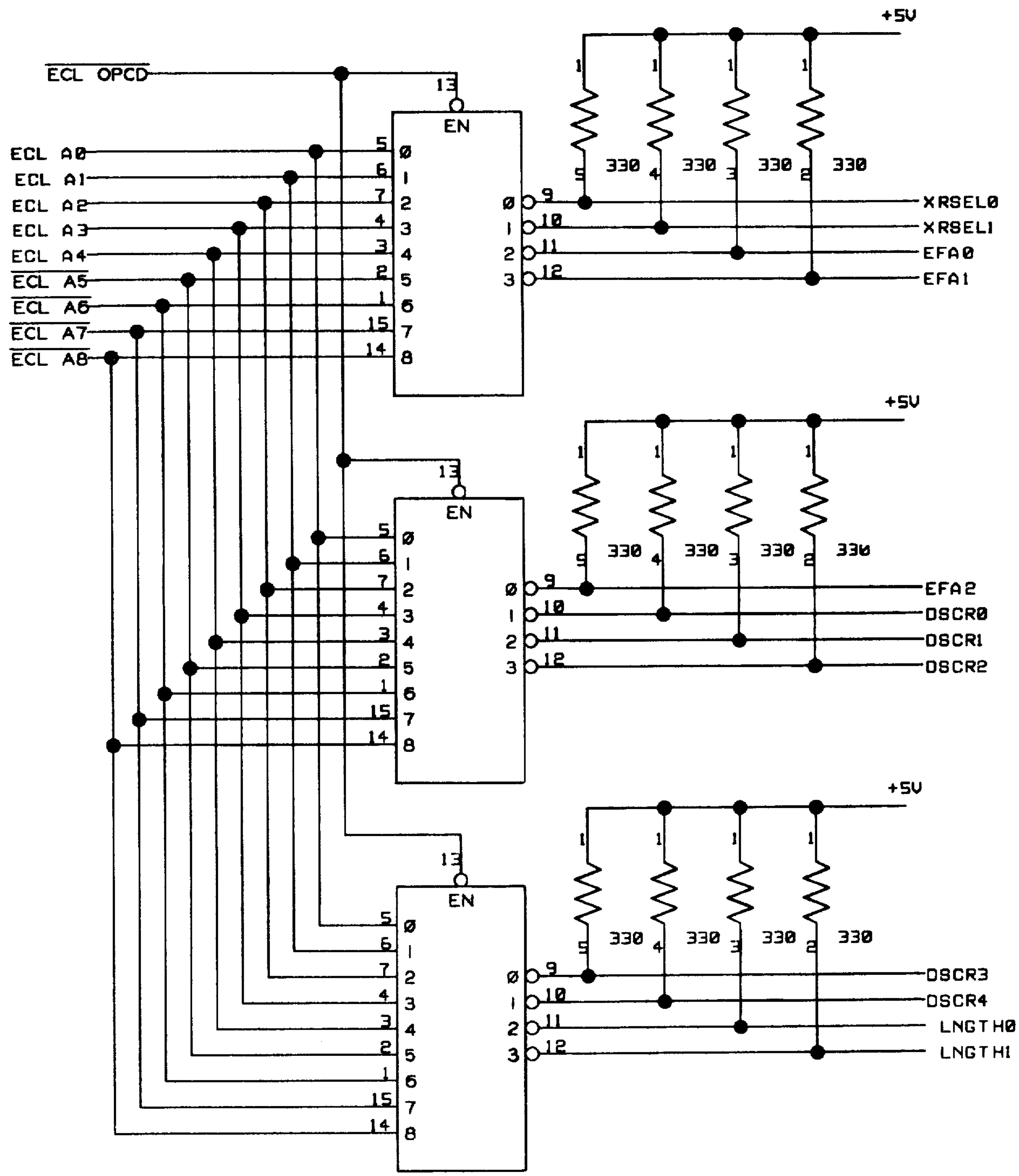
Figure 123C:
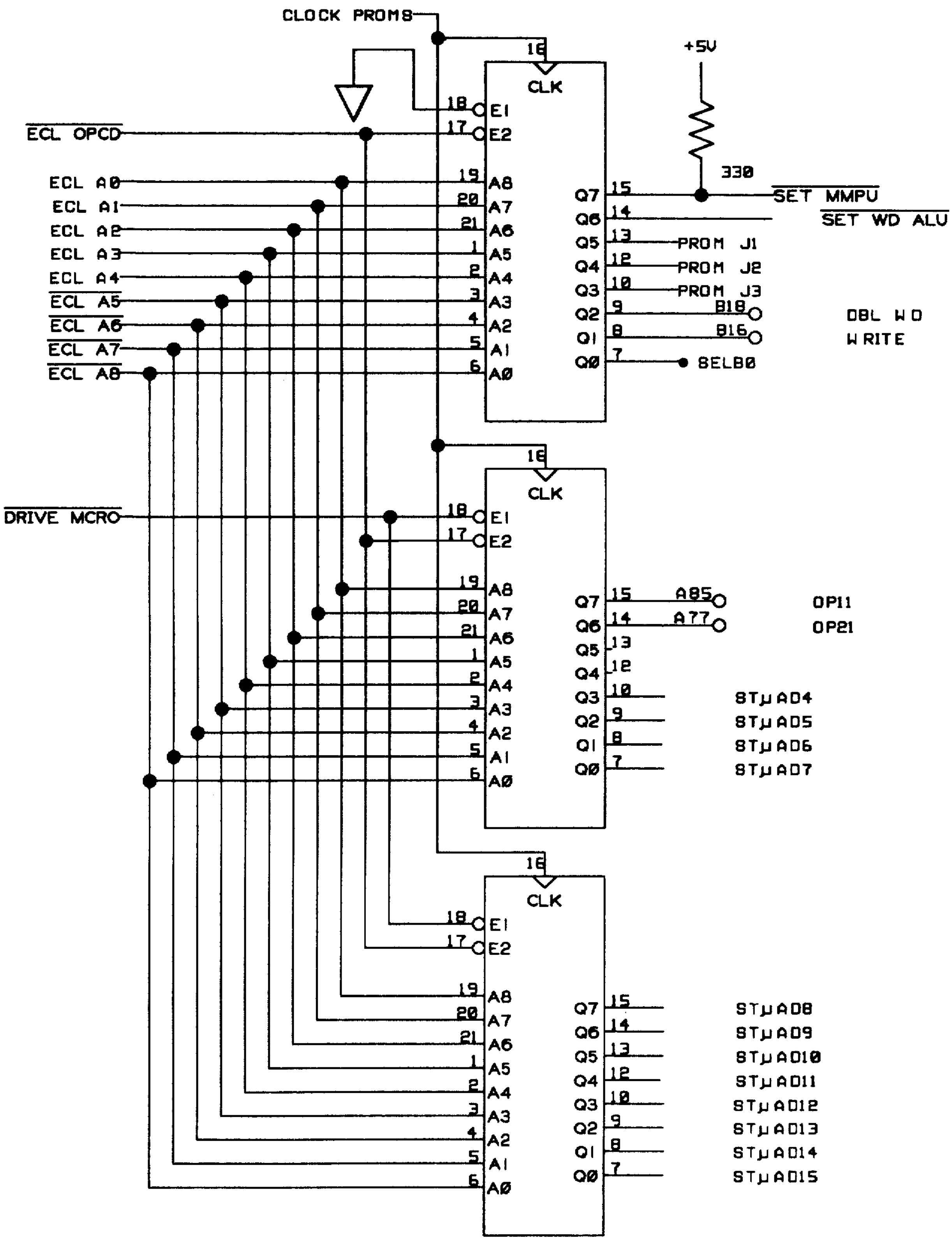
Figure 123D:
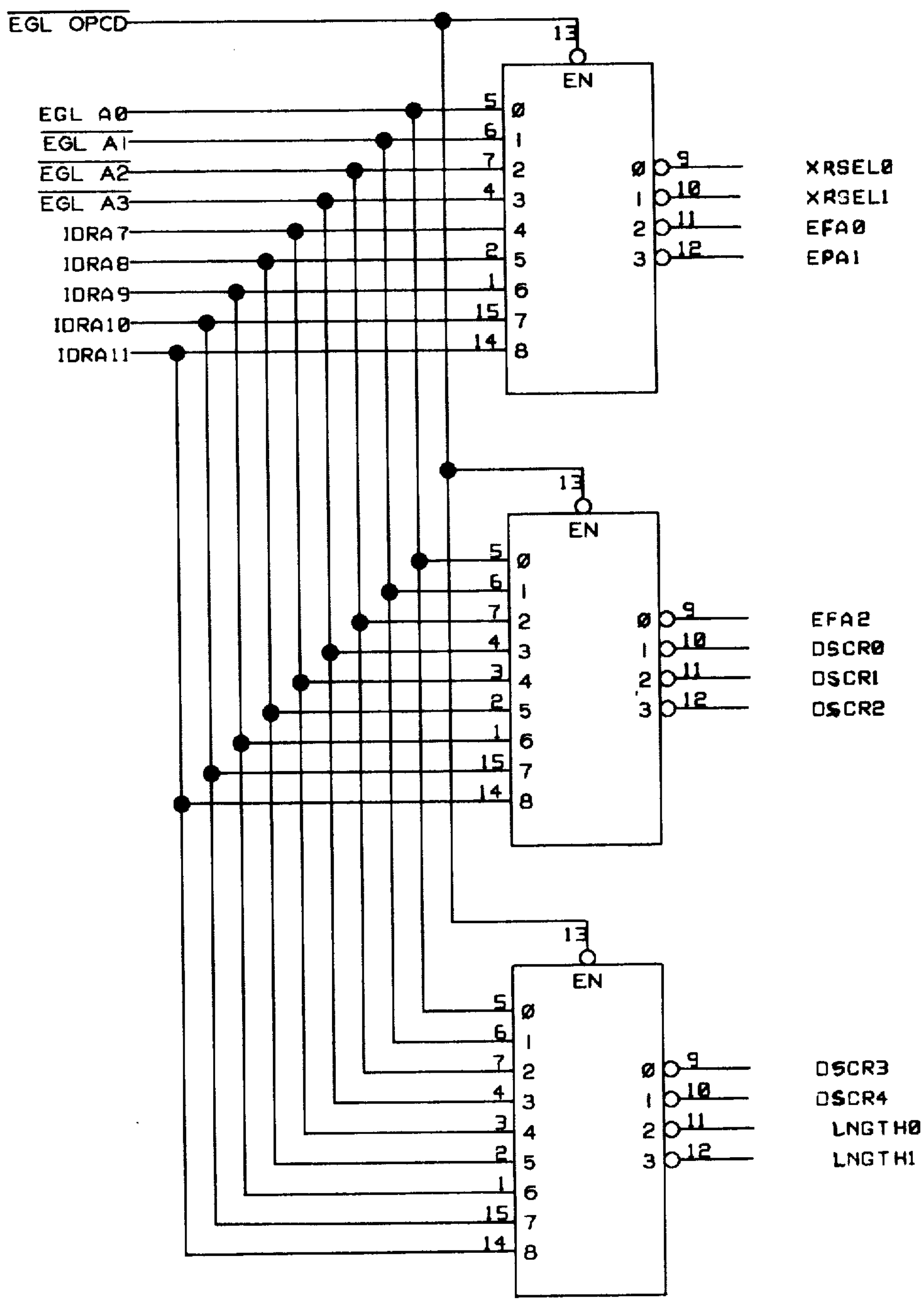
Figure 123E:
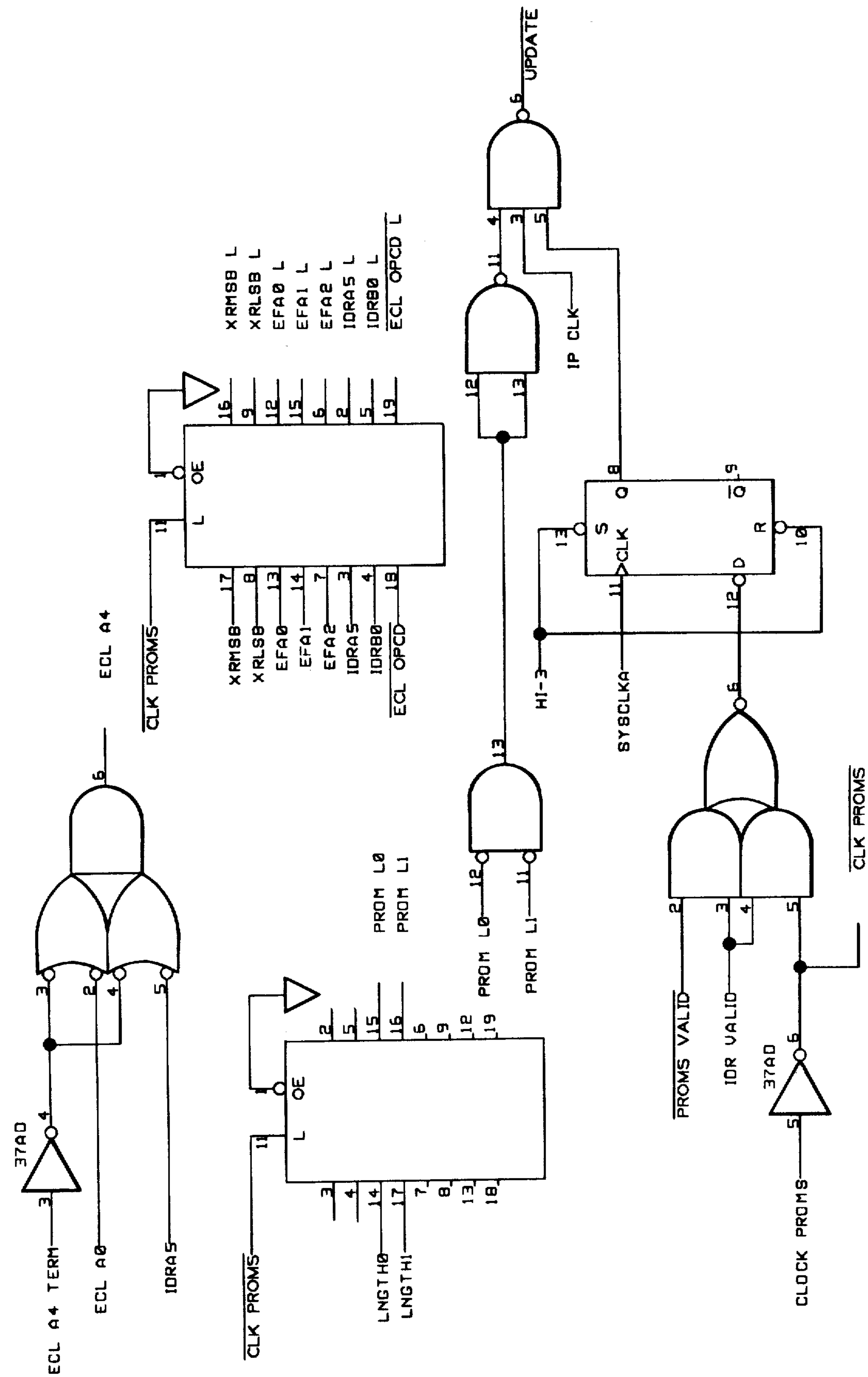
Figure 124:
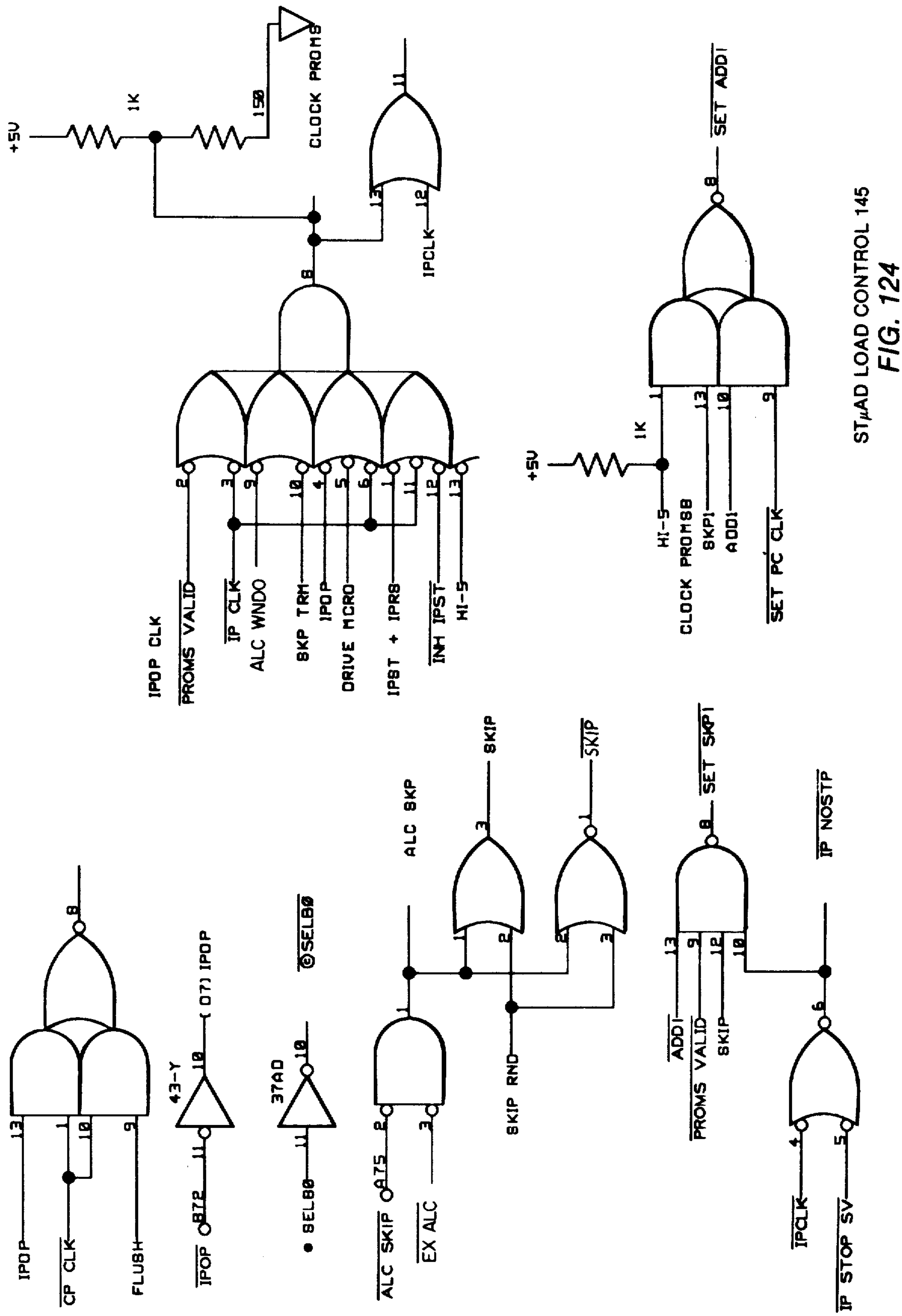
Figure 124A:
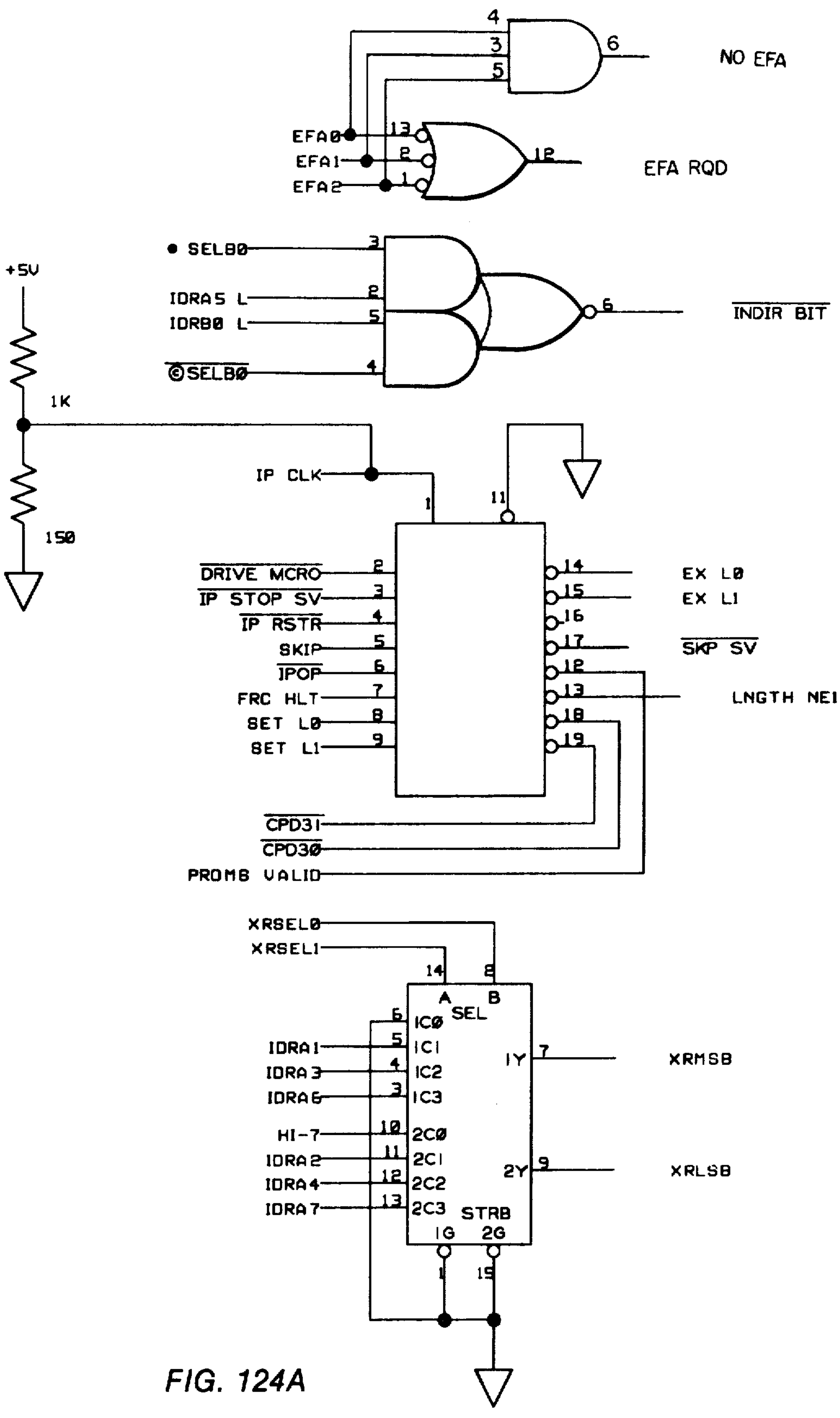
Figure 124B:
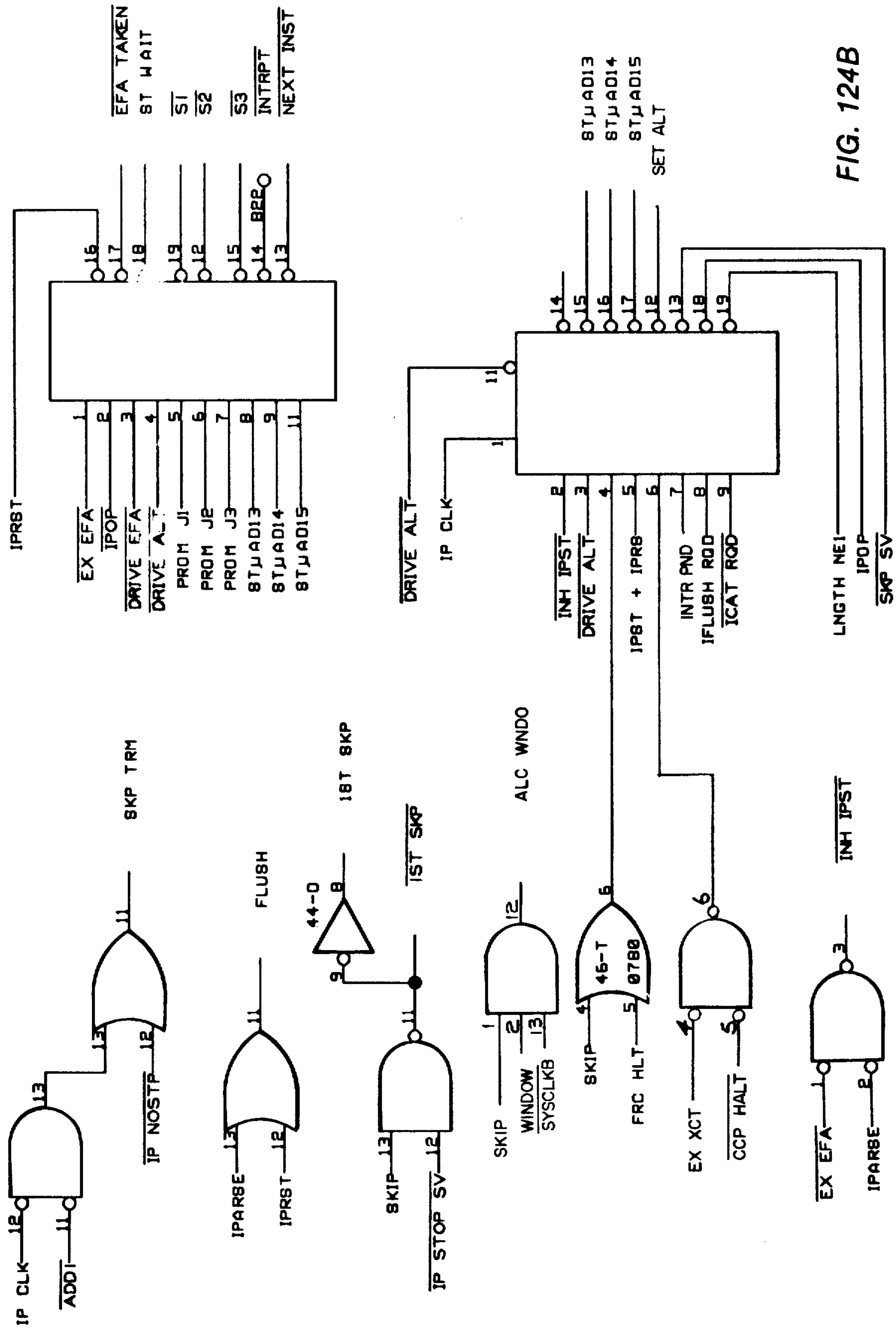
Figure 124C:
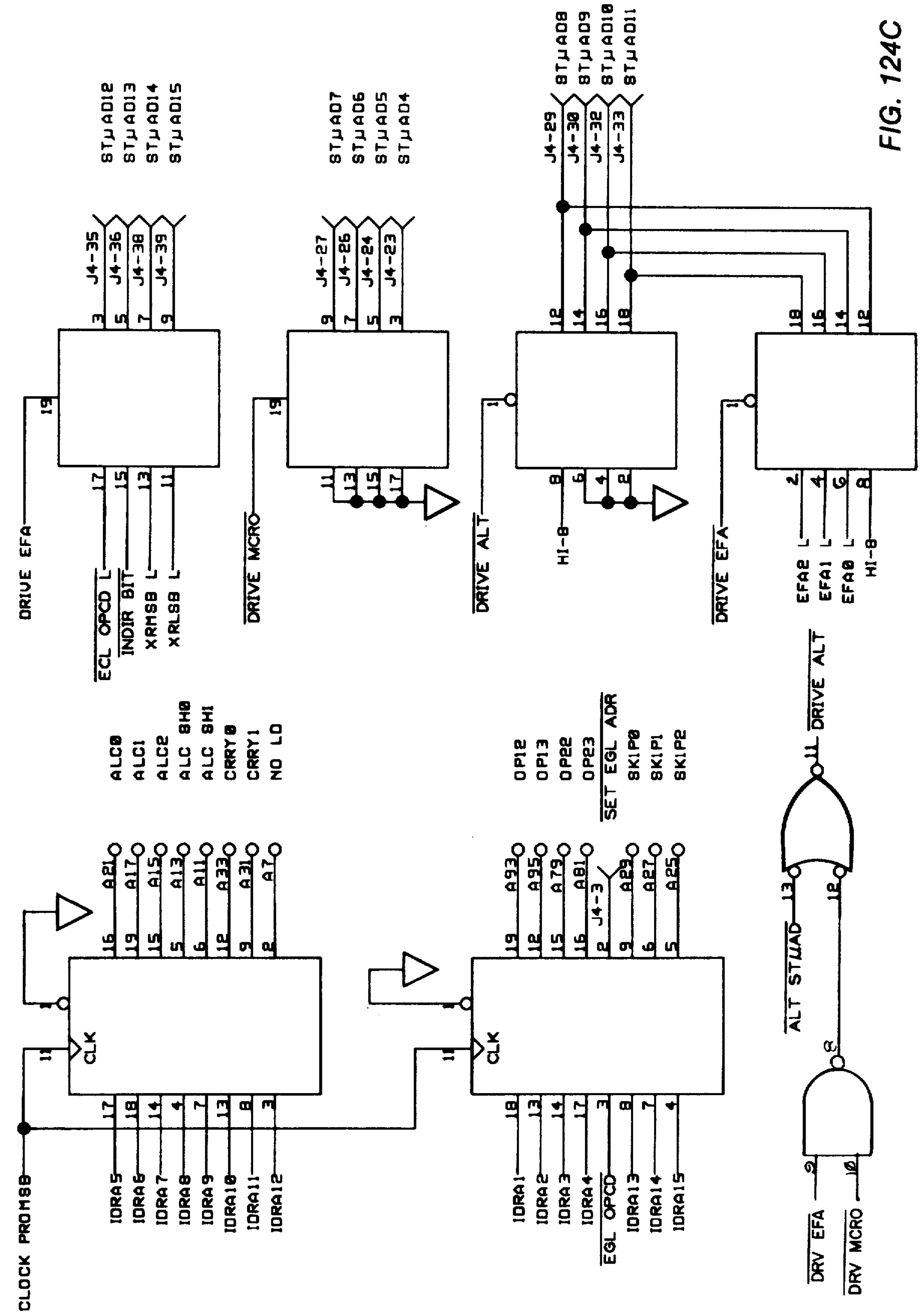
Figure 124D:
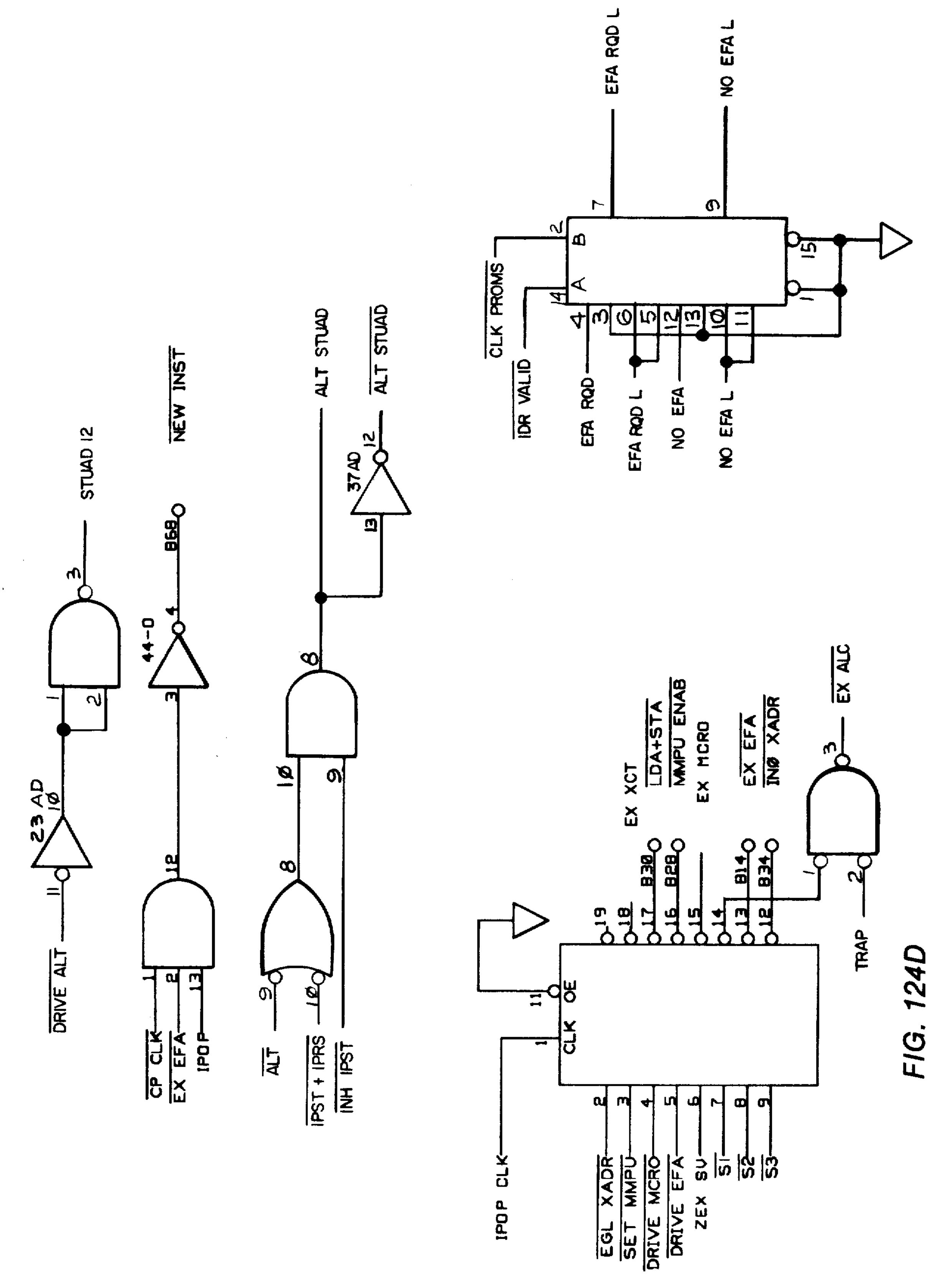
Figure 124E:
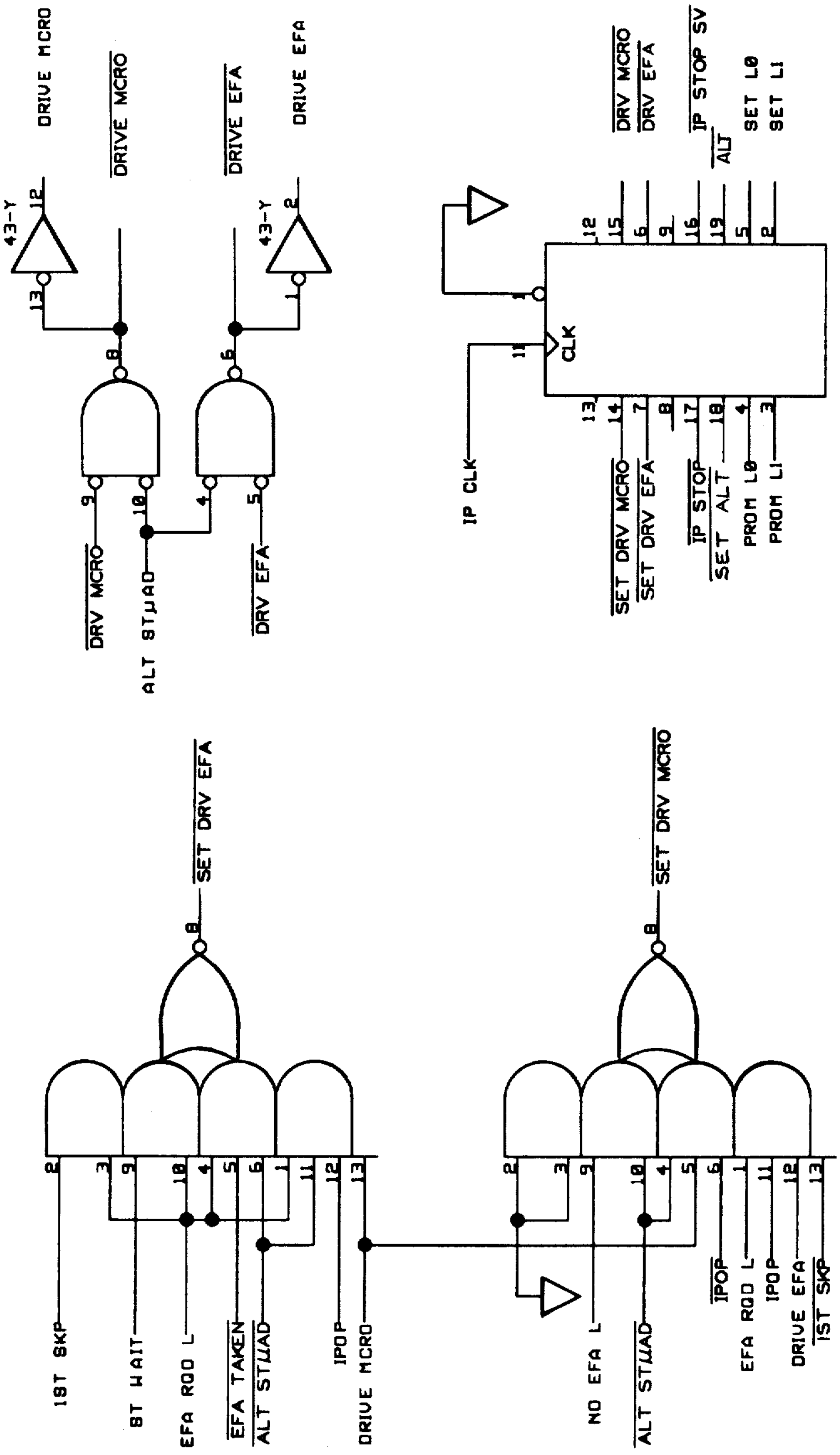

The driver logic which provides inputs FASAØ-15 from the CPD bus to IDR A as shown in FIG. 103 is depicted in FIG. 121, while the instruction pre-decode logic and control therefor is shown in FIG. 122. Decode PROMS 140 and 141 which effectively include the STμAD register 144, together with the IP status logic 138 are shown in FIG. 123. The starting microaddress control logic 145 is depicted in detail in FIG. 124.

Figure 125:
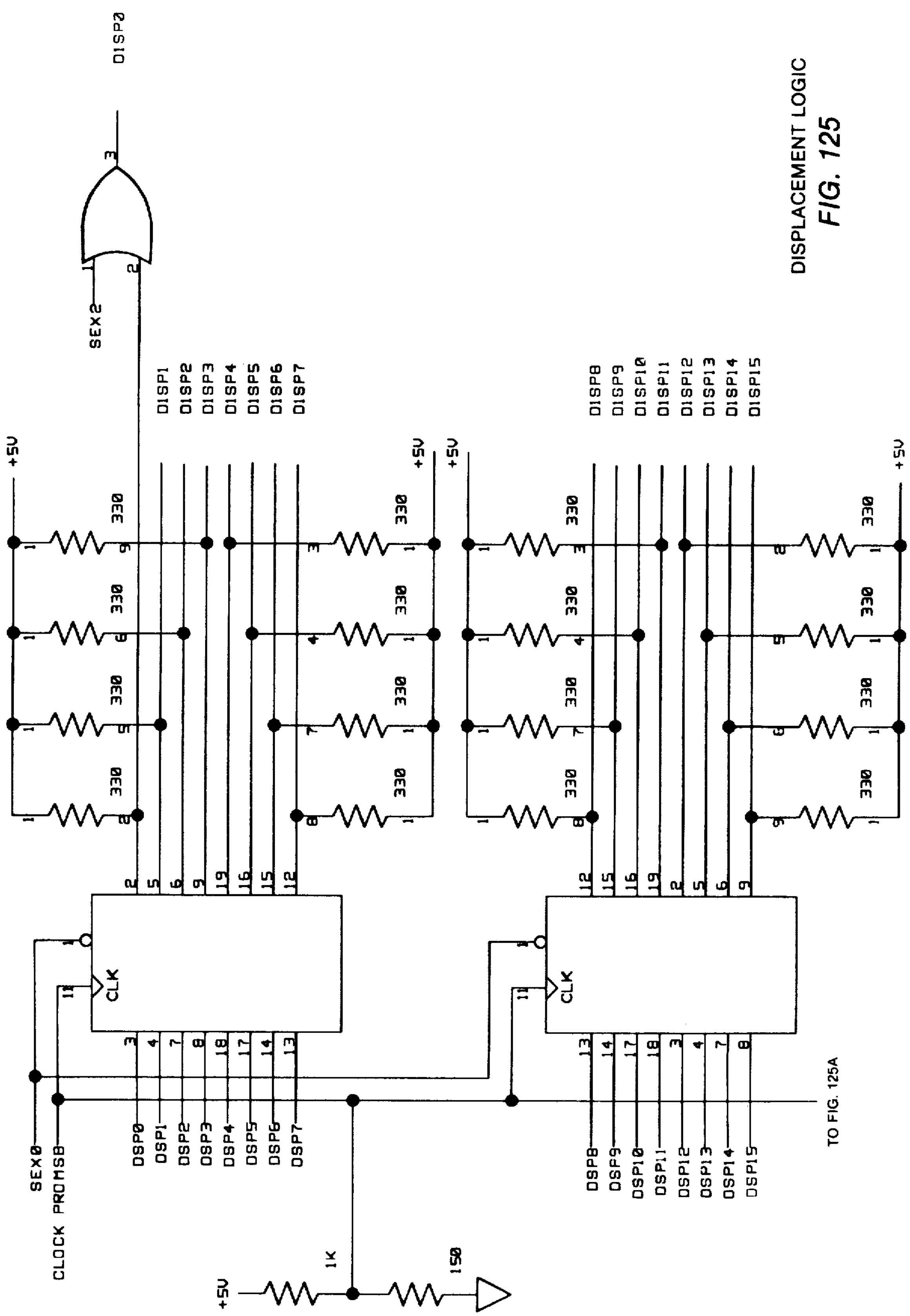
Figure 125A:
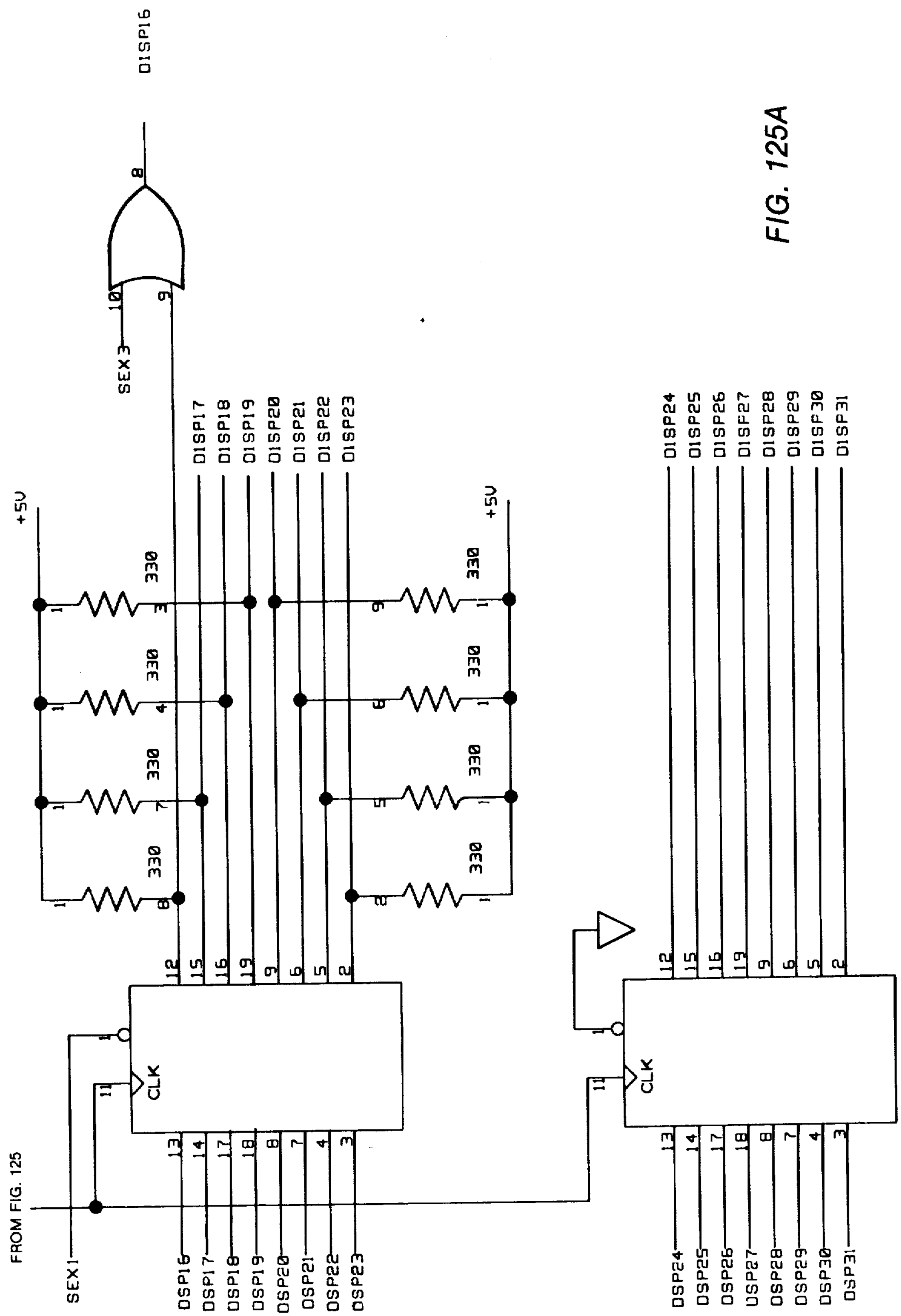
Figure 126:
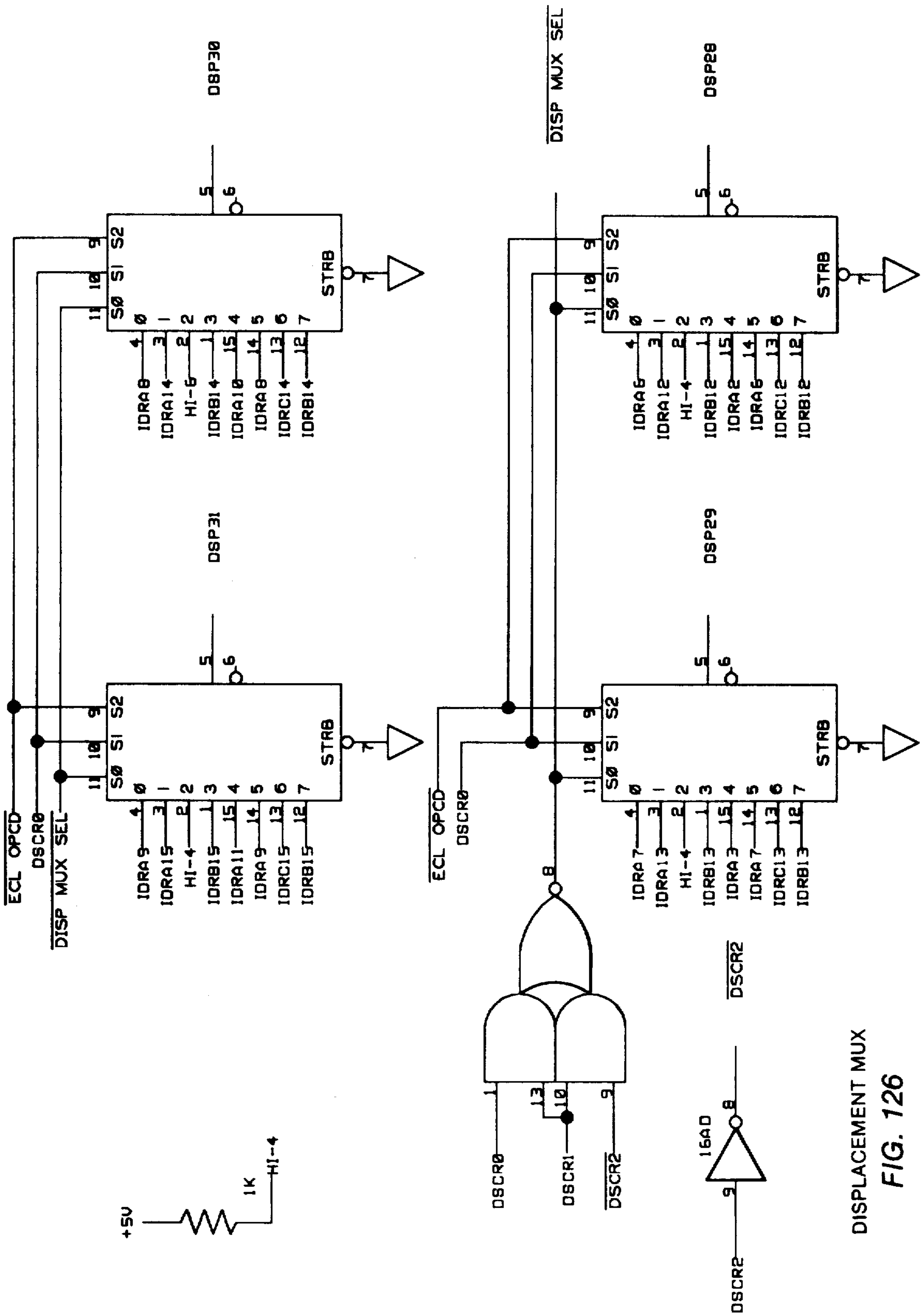
Figure 126A:
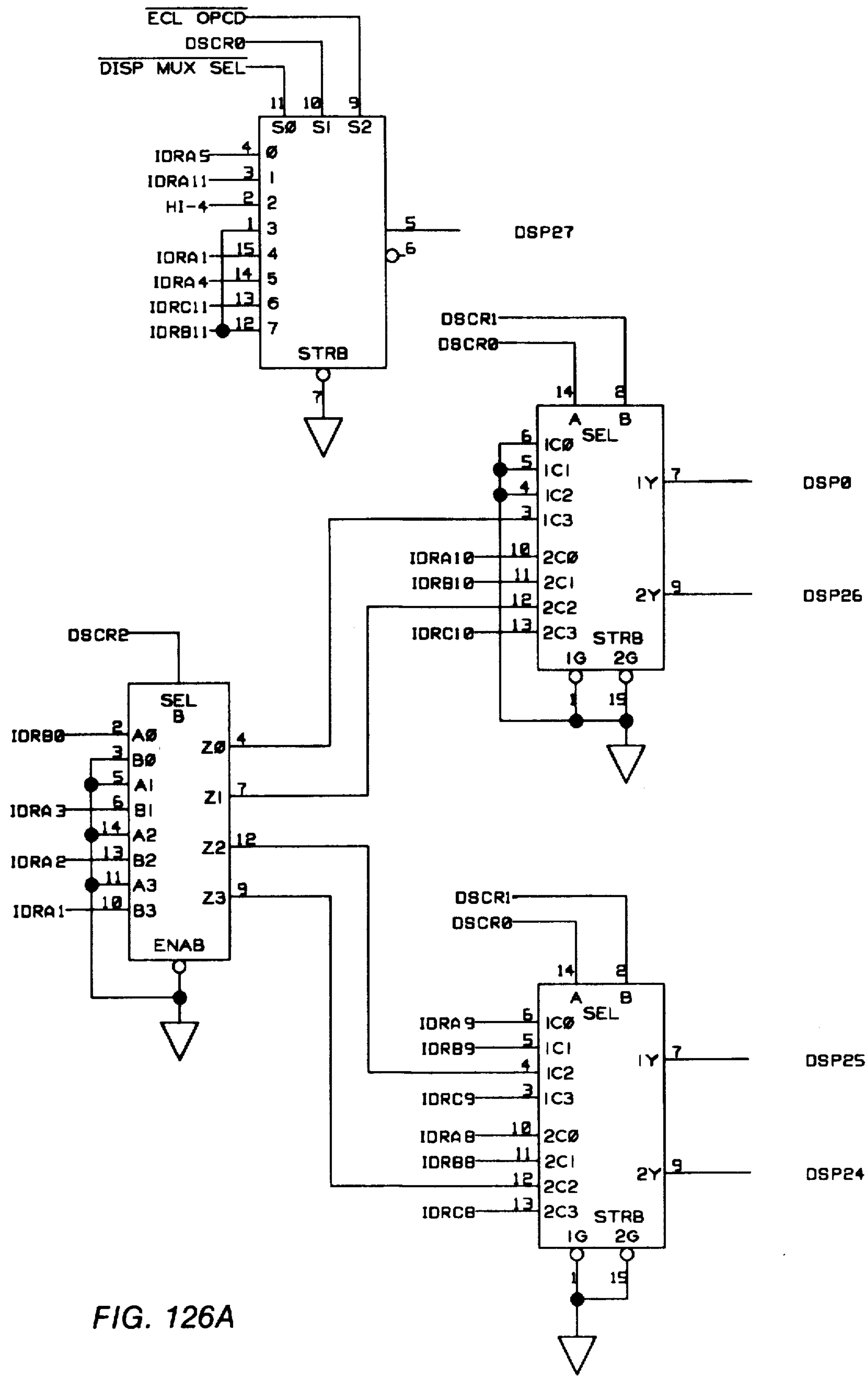
Figure 126B:
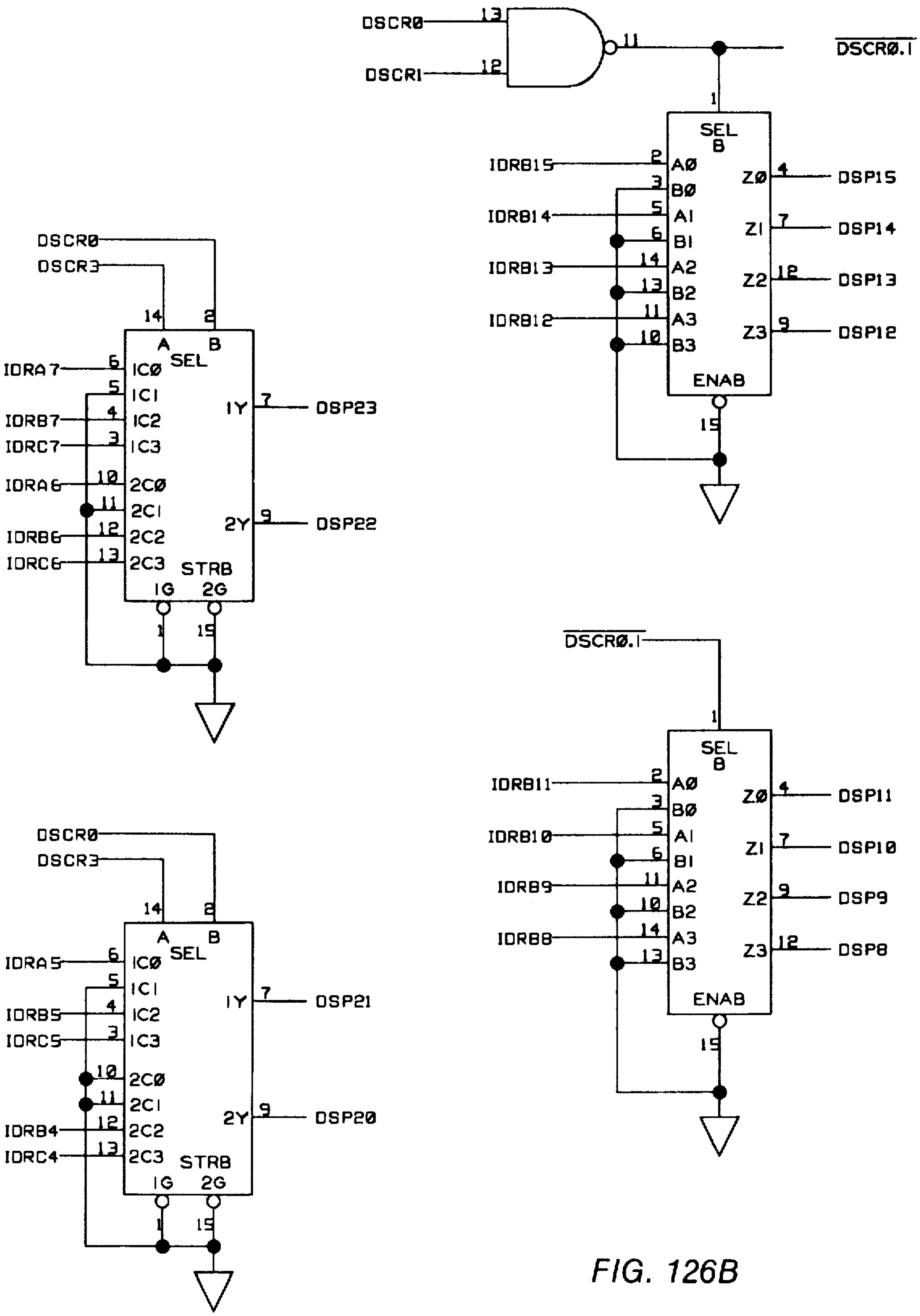
Figure 126C:
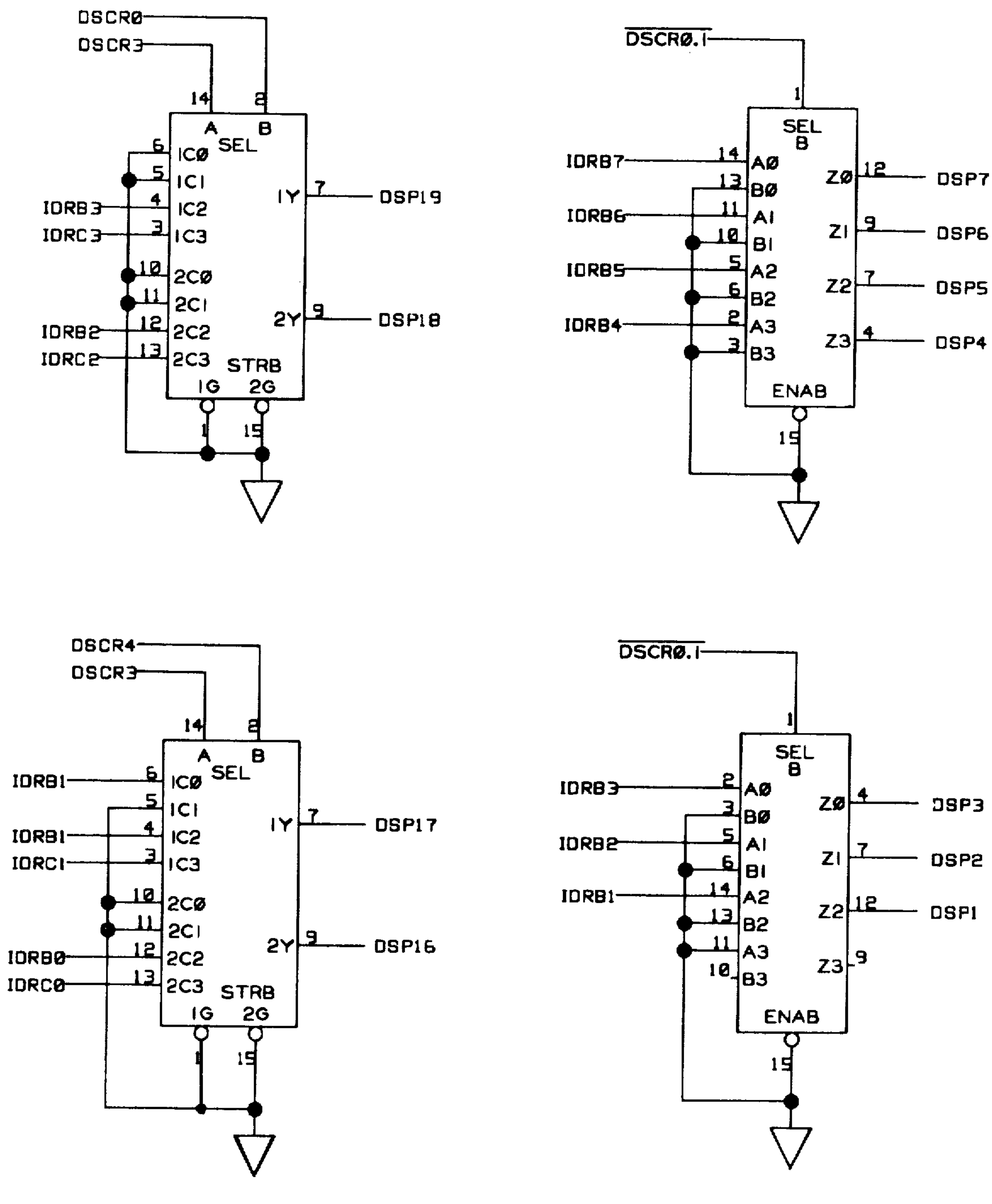
Figure 127:
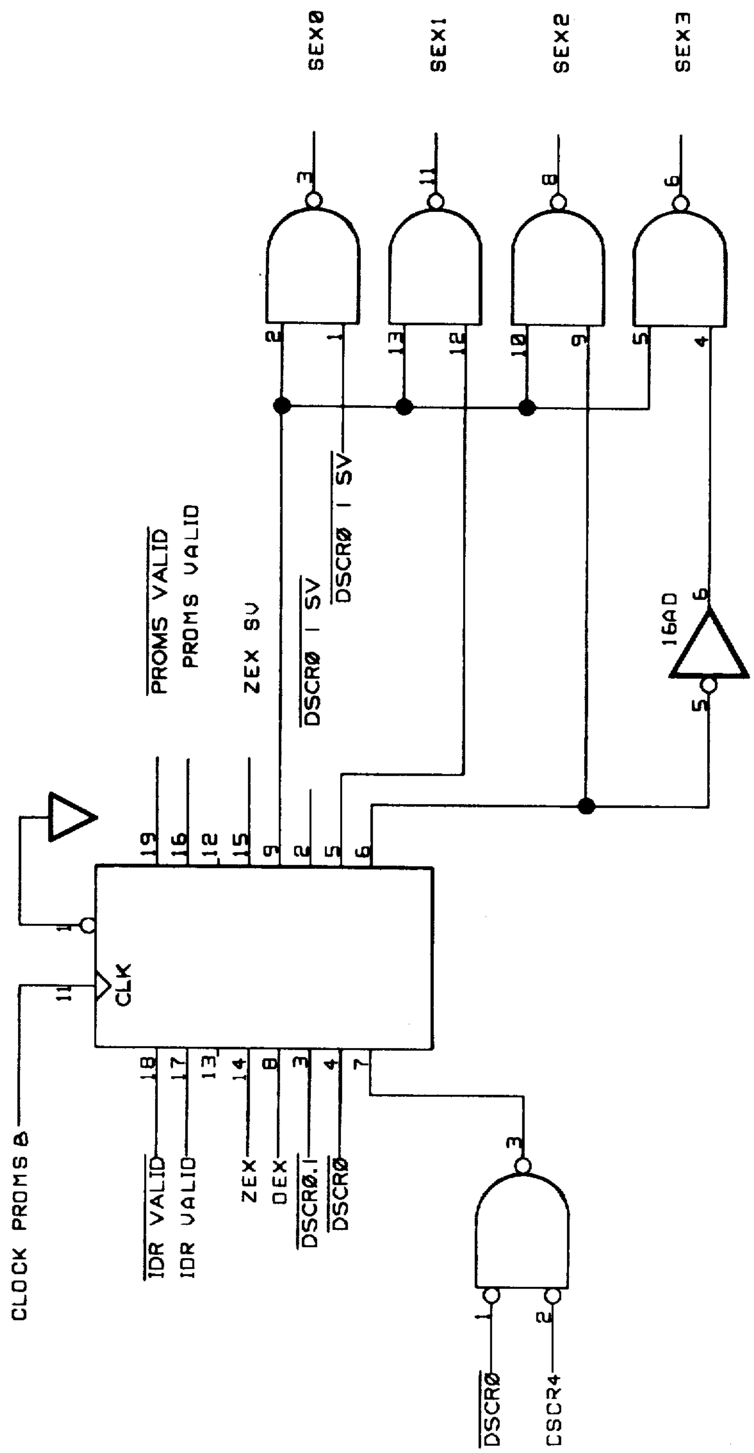
Figure 128:
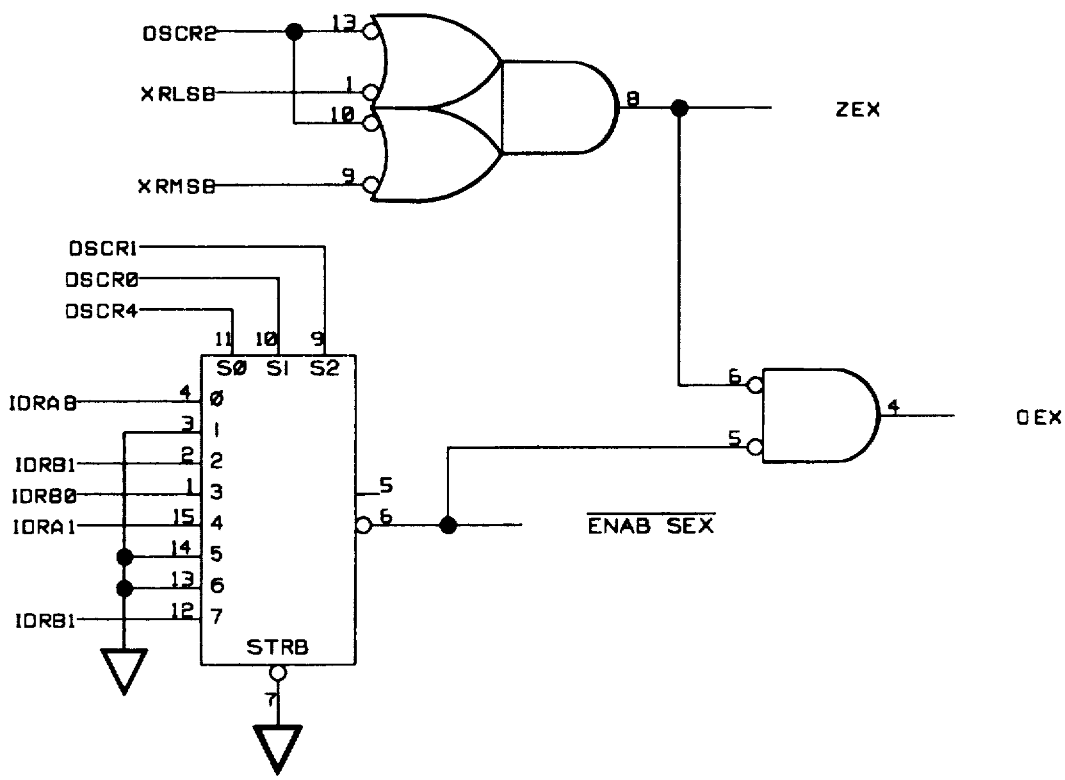
Figure 129:
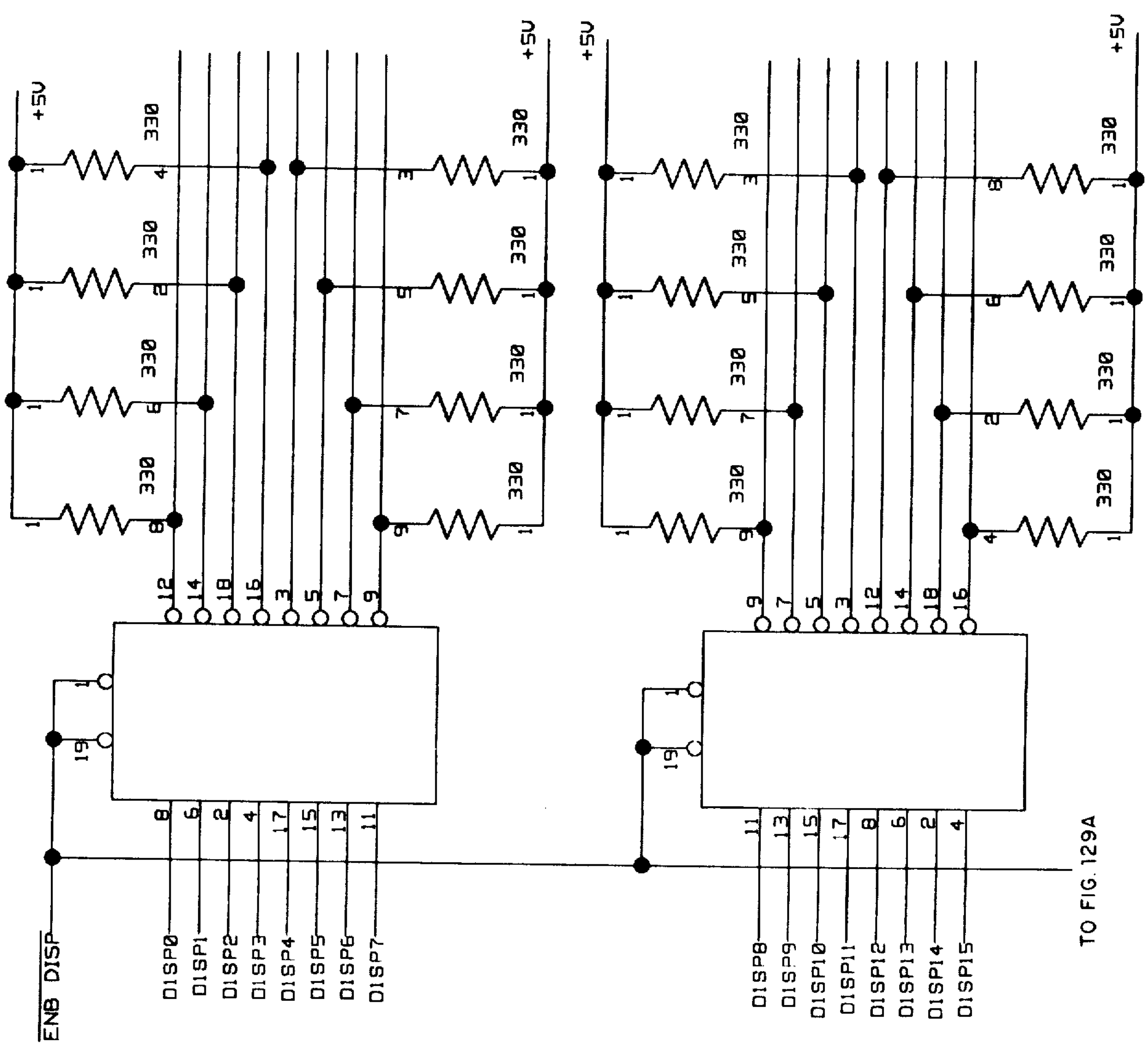
Figure 129A:
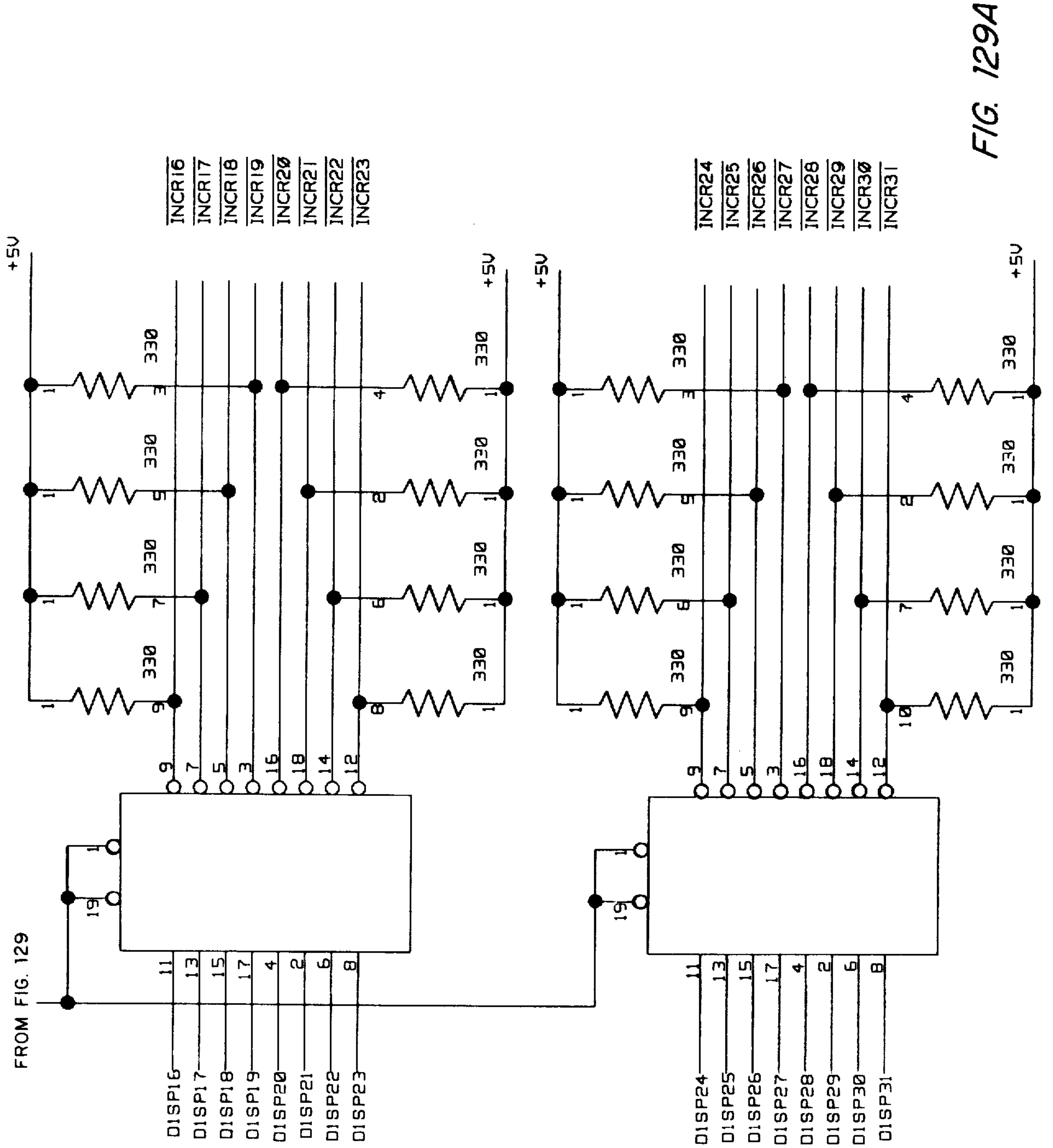
Figure 130:
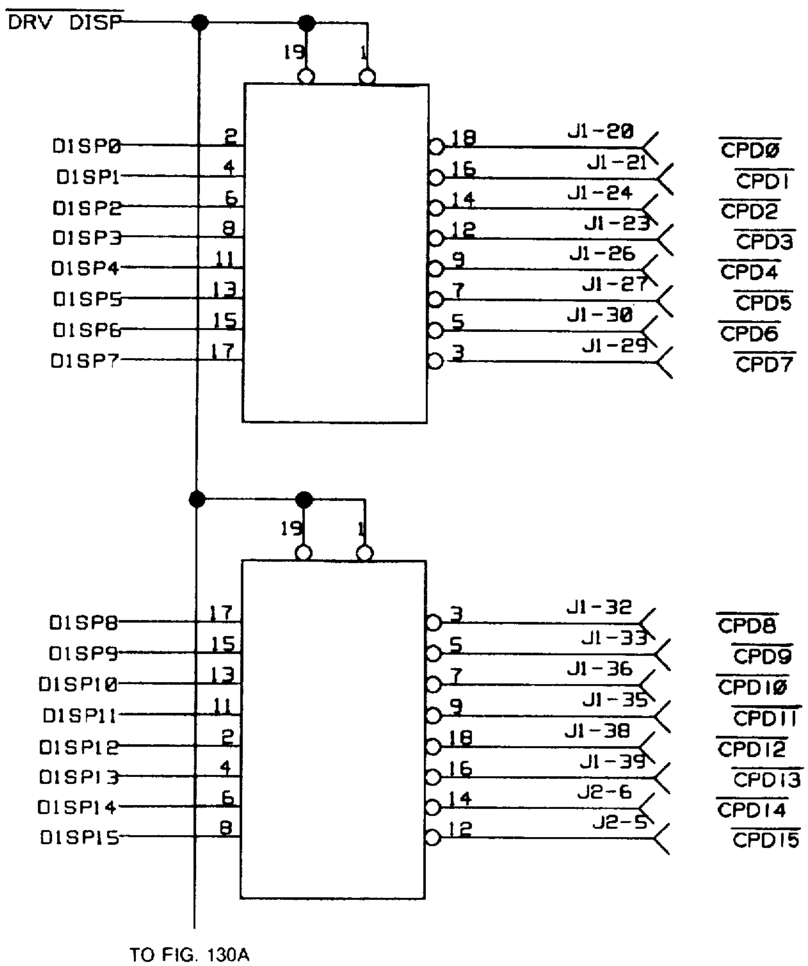
Figure 130A:
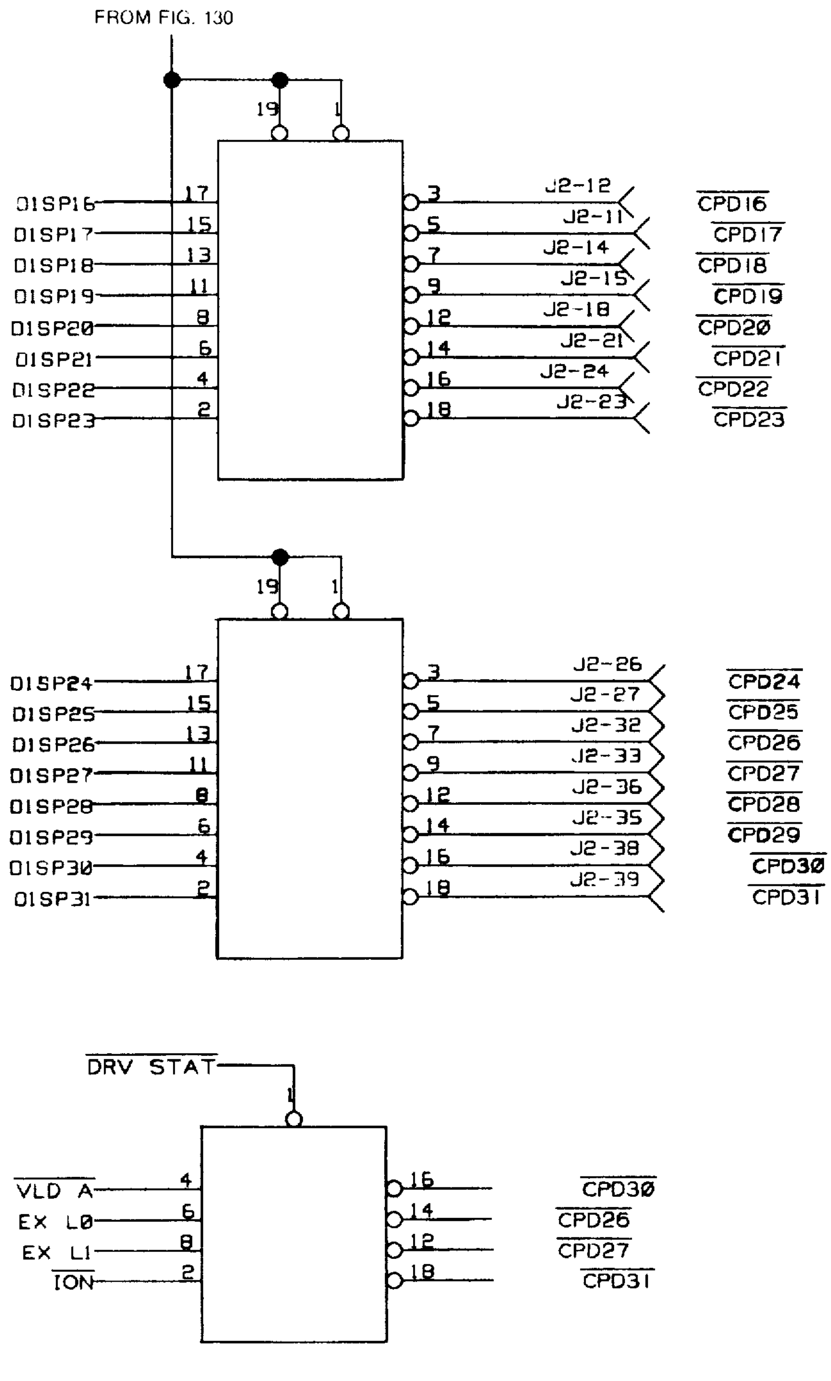
Figure 131:
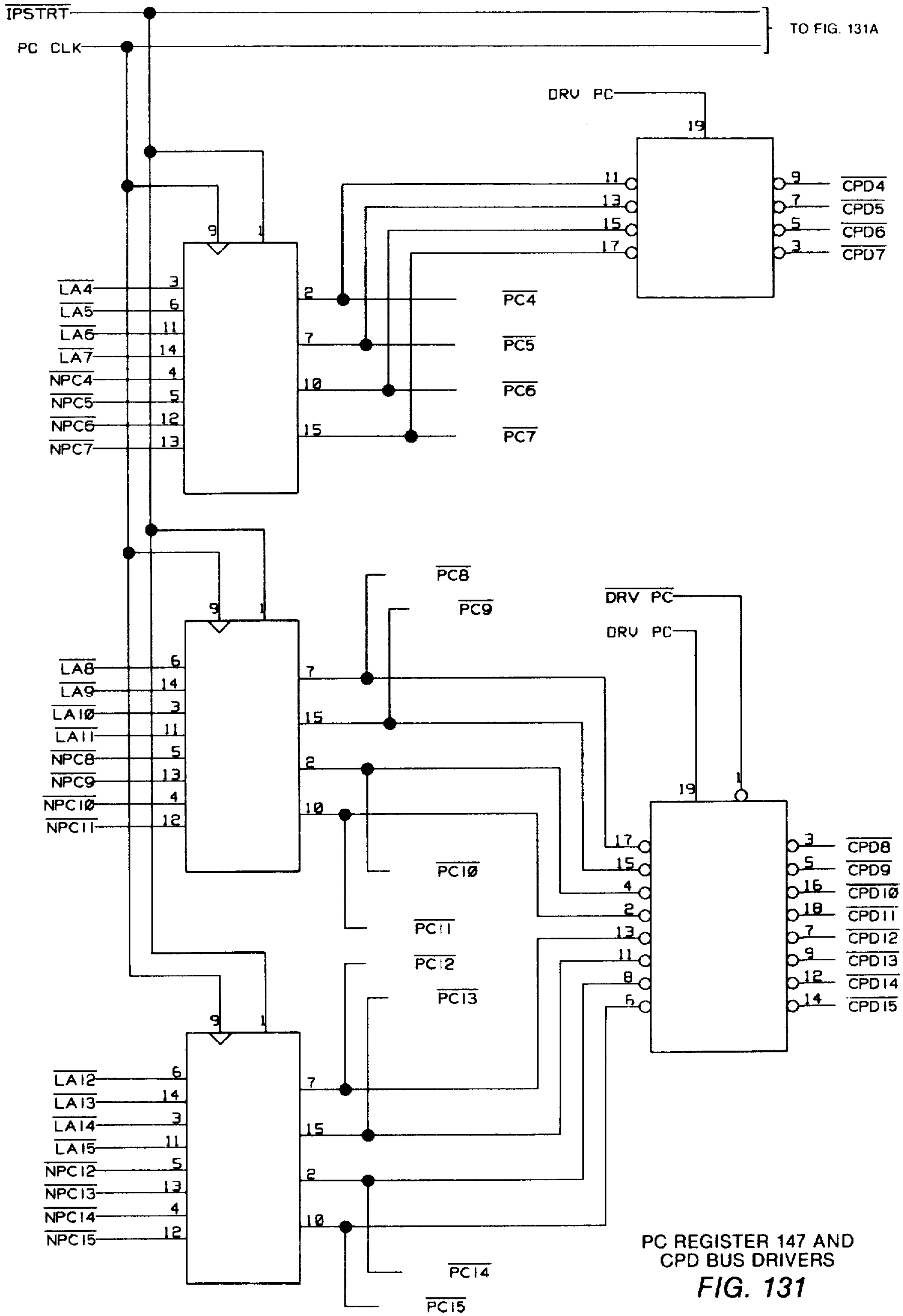
Figure 131A:
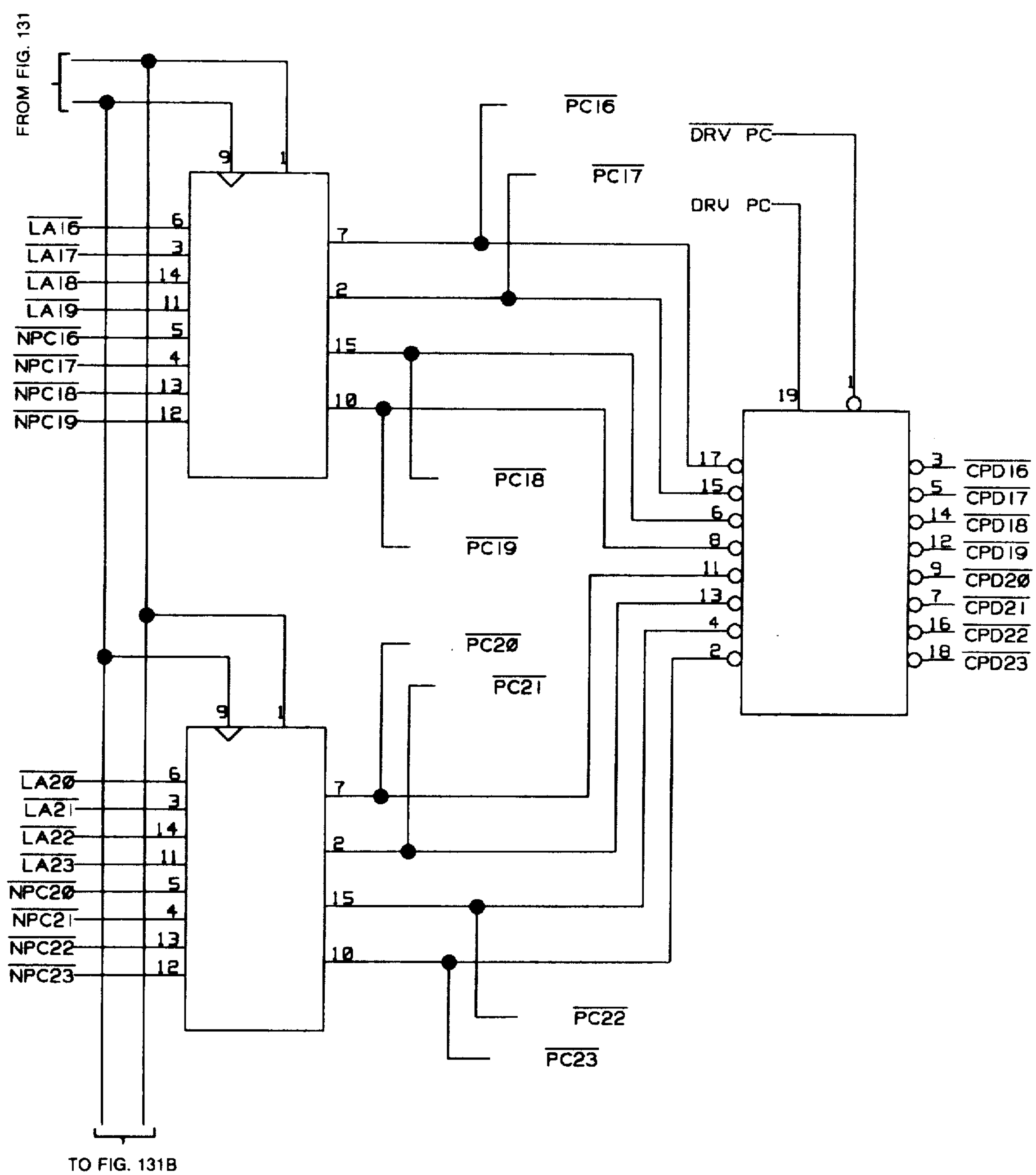
Figure 131B:
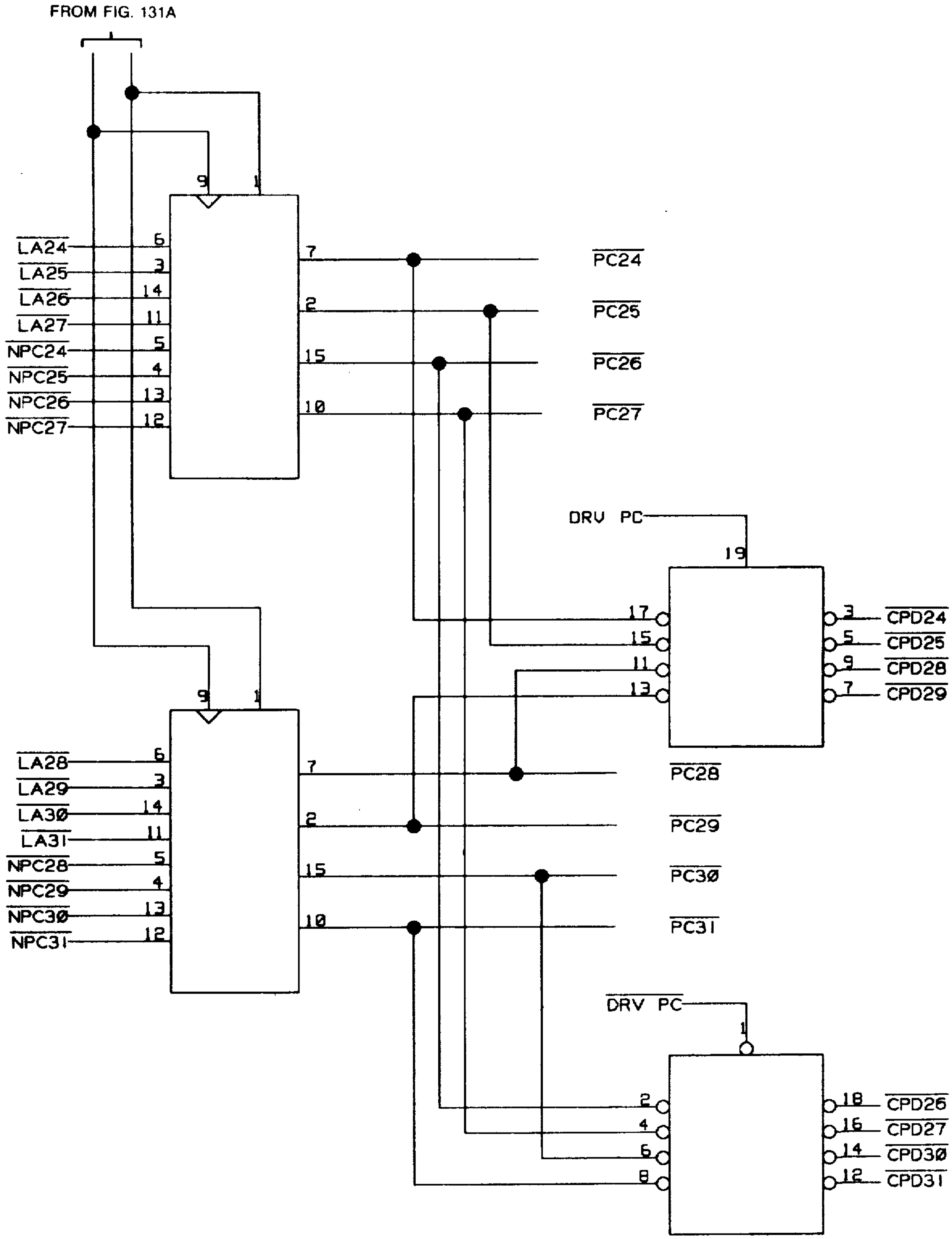
Figure 132:
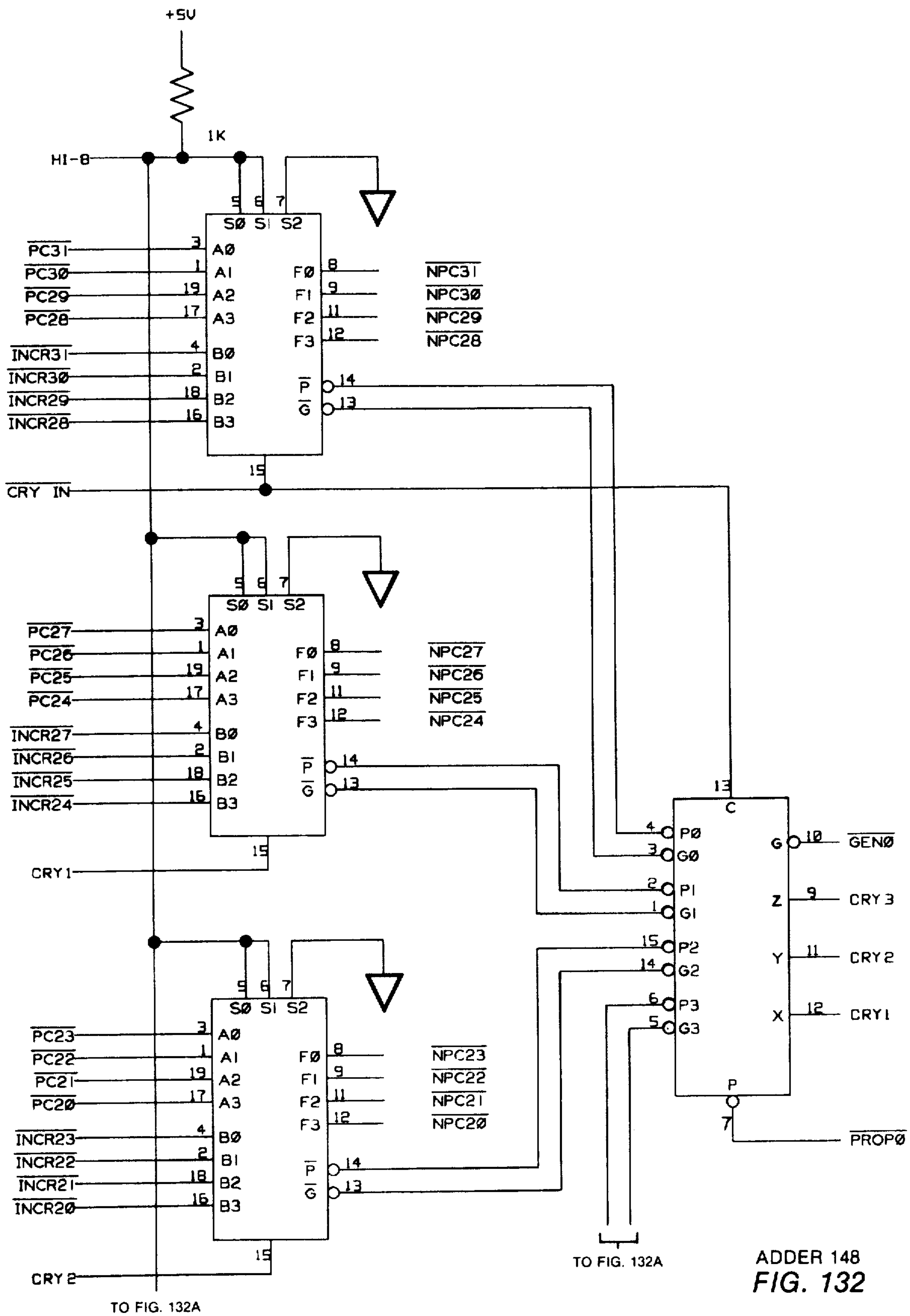
Figure 132A:
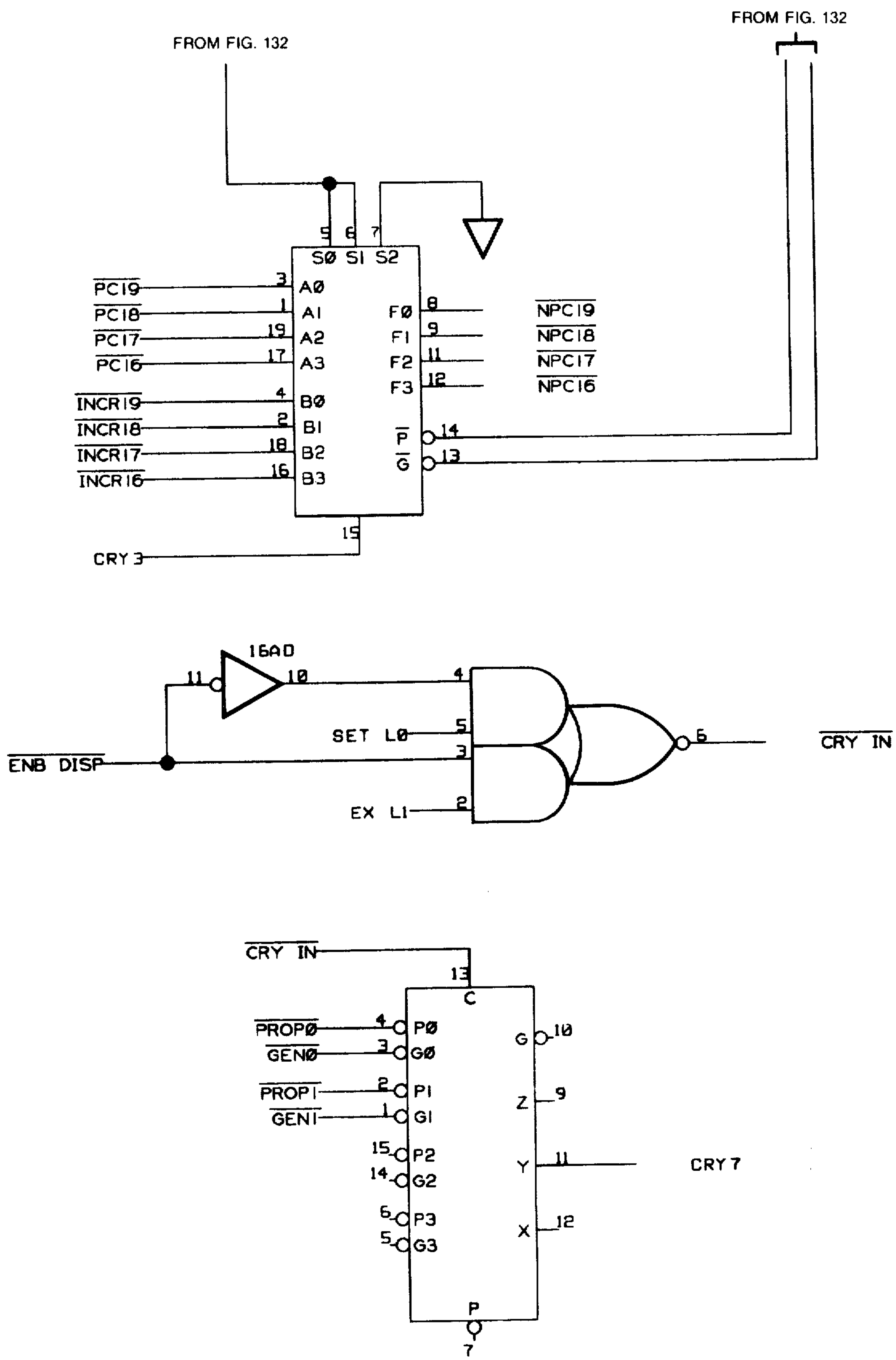
Figure 132B:
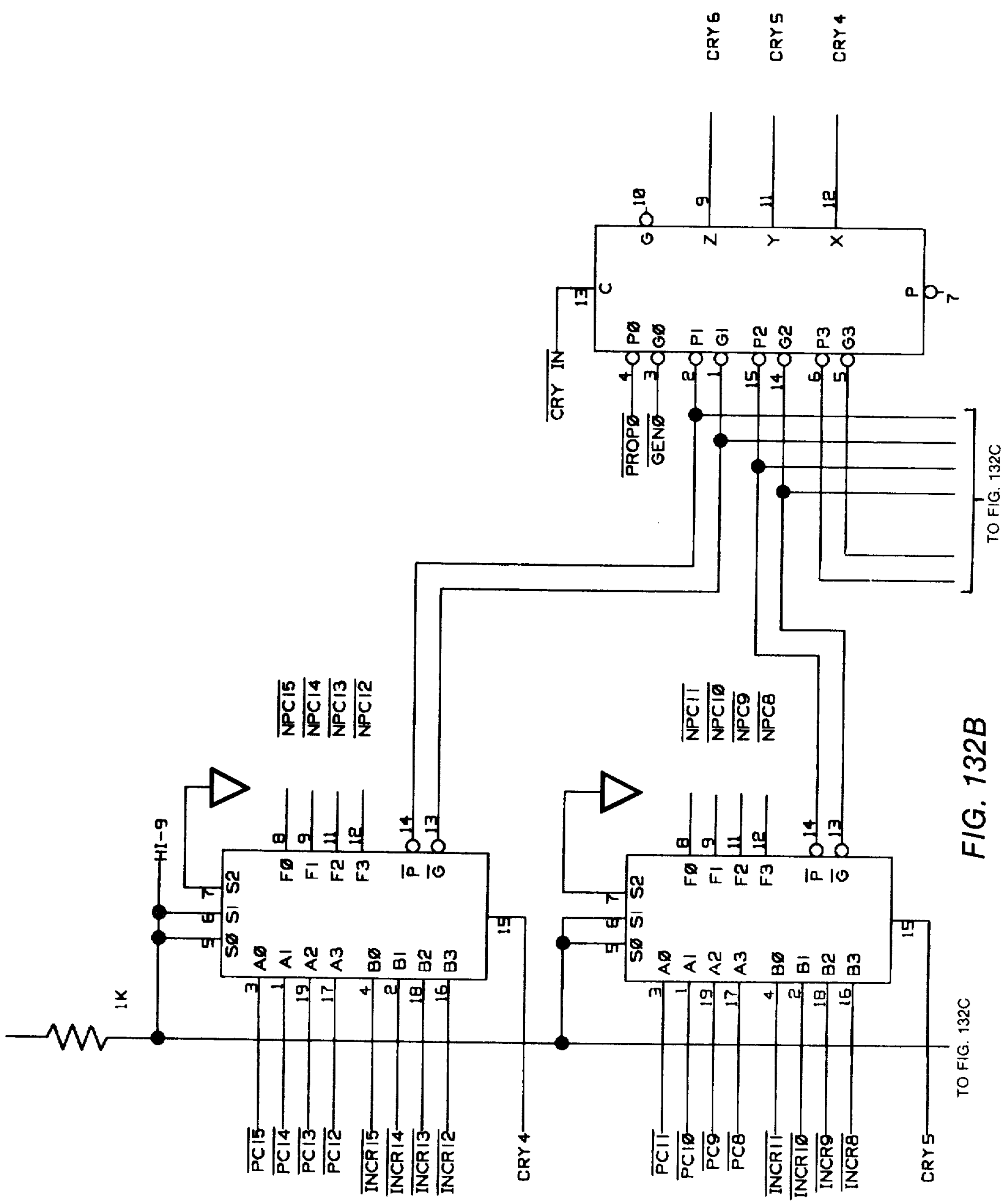
Figure 132C:
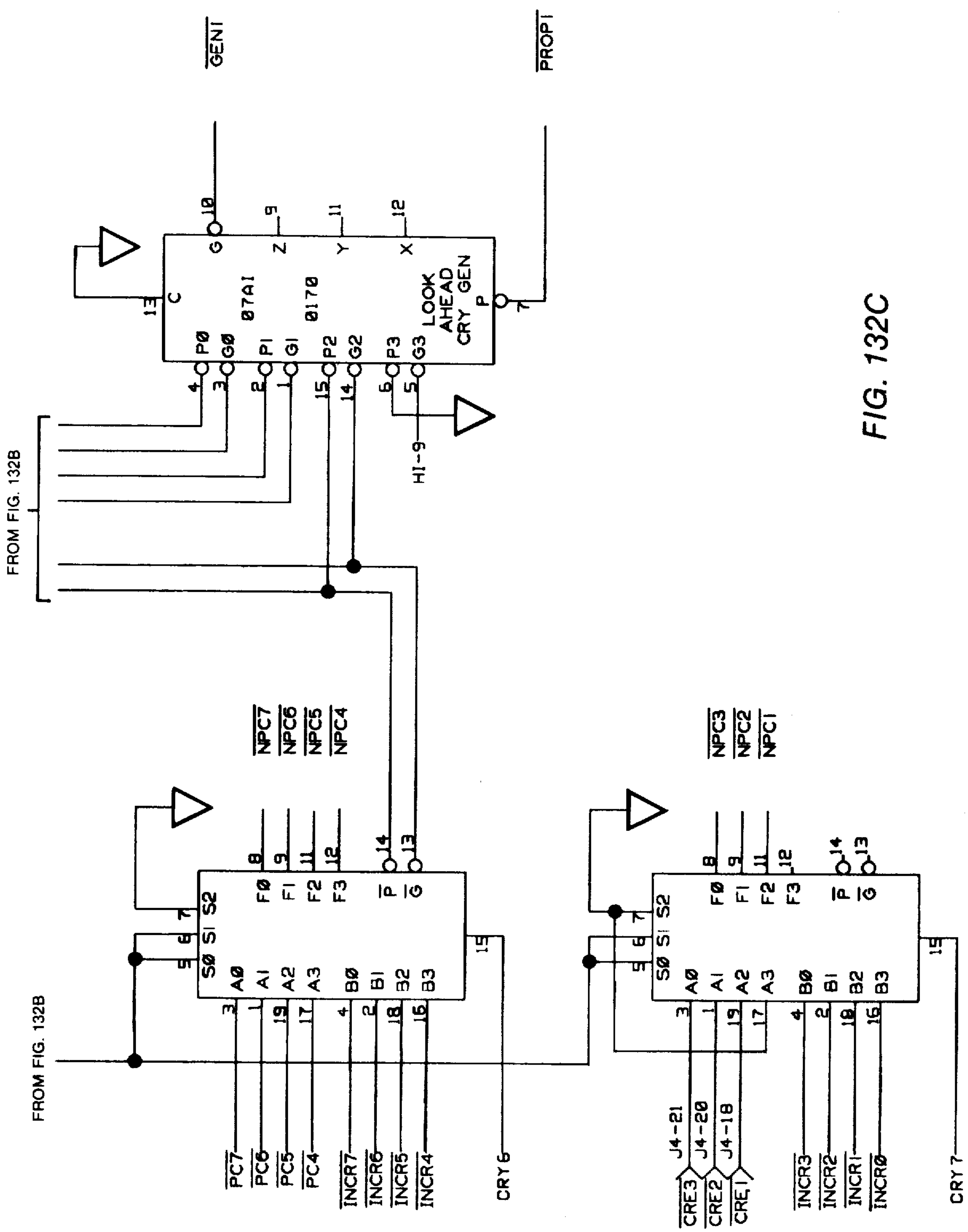
Figure 133:
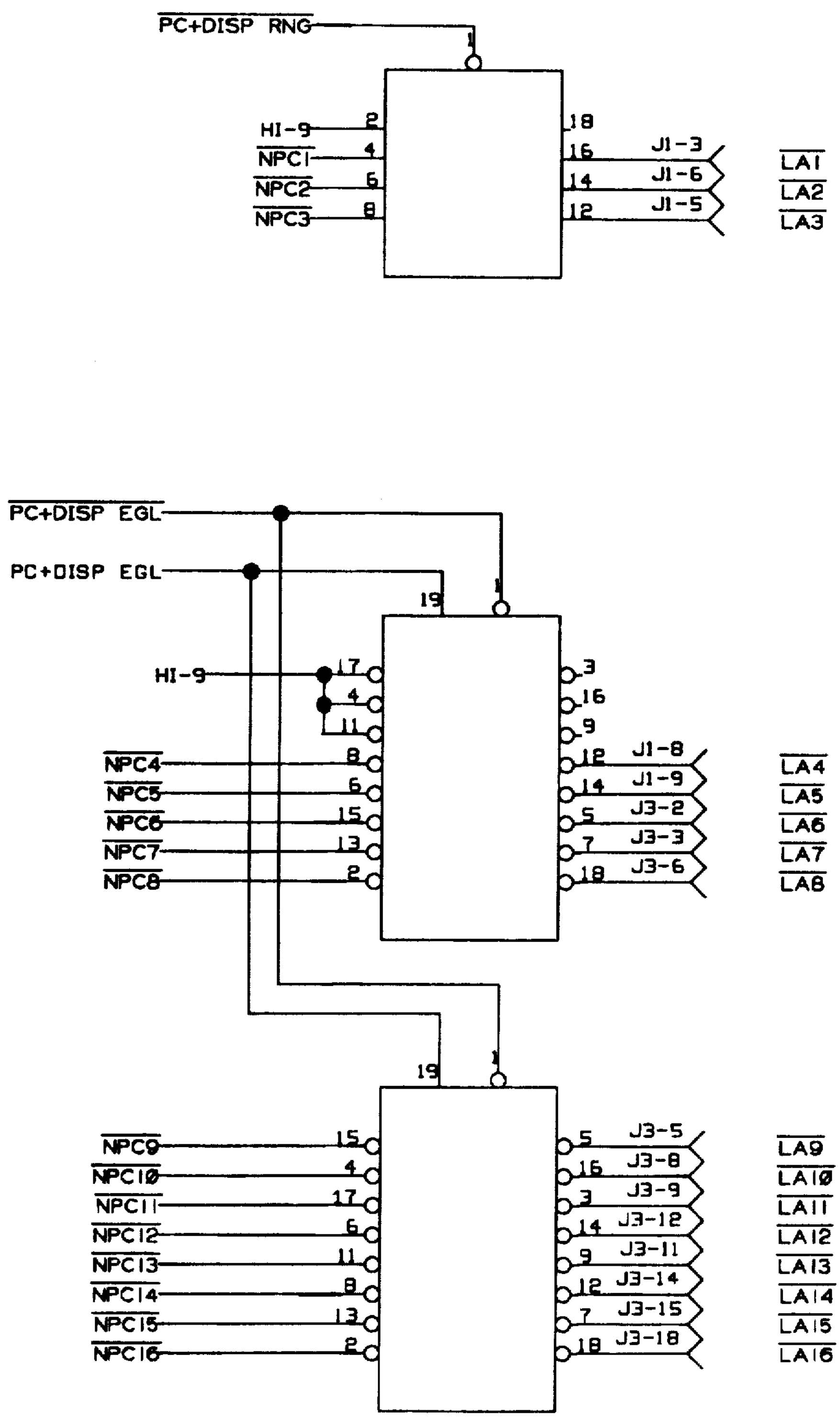
Figure 133A:
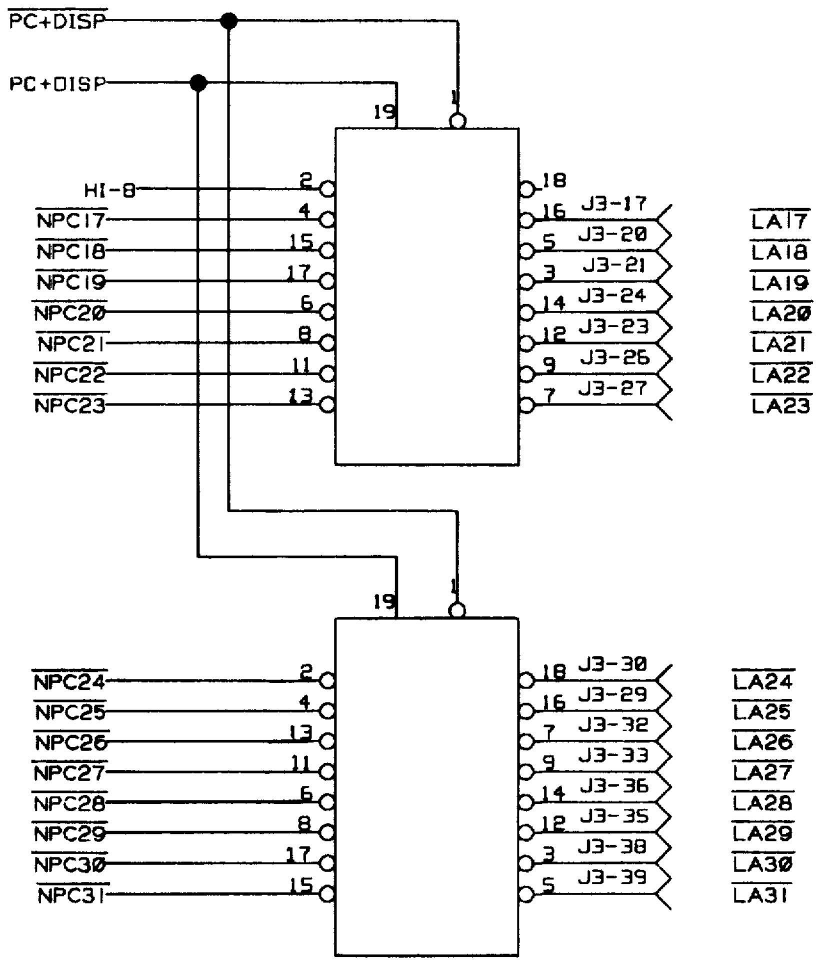
Figure 134:
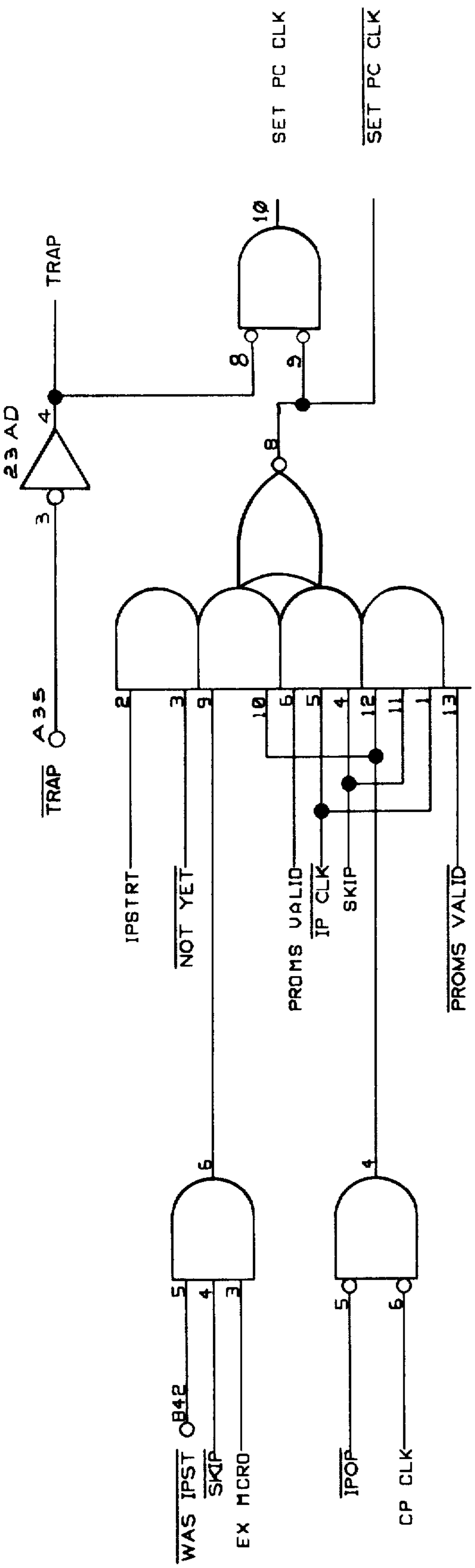

With reference to the displacement and program counter portion of the instruction processor, the displacement logic 146 is shown in FIG. 125, the displacement multiplexer associated therewith being depicted in FIG. 126. The sign extend (SEX) logic is shown in FIG. 127, while the zero/ones extend logic is shown in FIG. 128. FIG. 129 shows the displacement increment buffer of FIG. 104 while the displacement latch and drivers 153 are depicted in FIG. 130. FIG. 131 shows program counter register 147 and the CPD bus driver of FIG. 104, while adder 148 and the PC+DISP latch and driver units 149 are shown in FIGS. 132 and 133, respectively. Program counter clock logic is depicted in FIG. 134.

Figure 135:
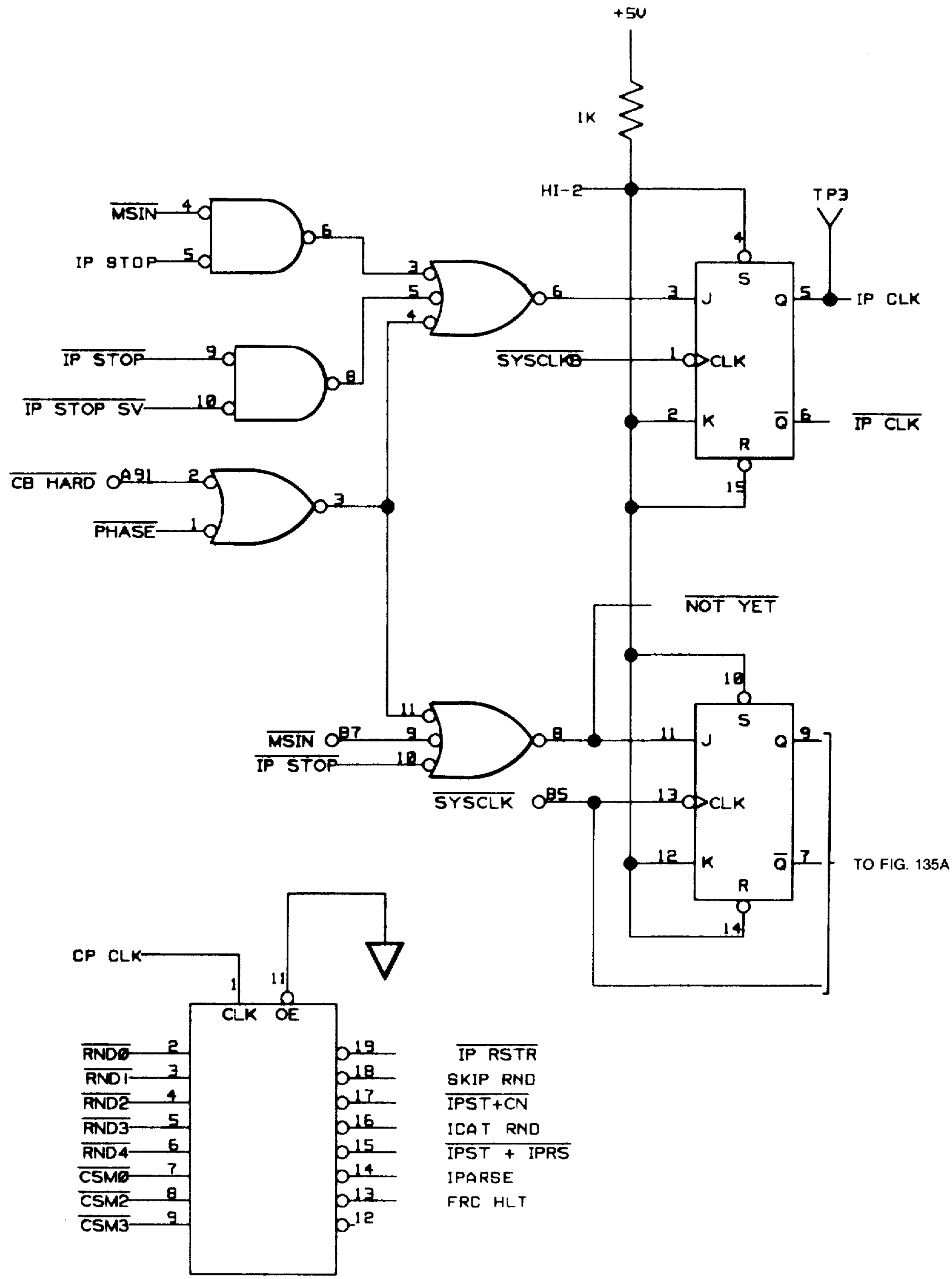
Figure 135A:
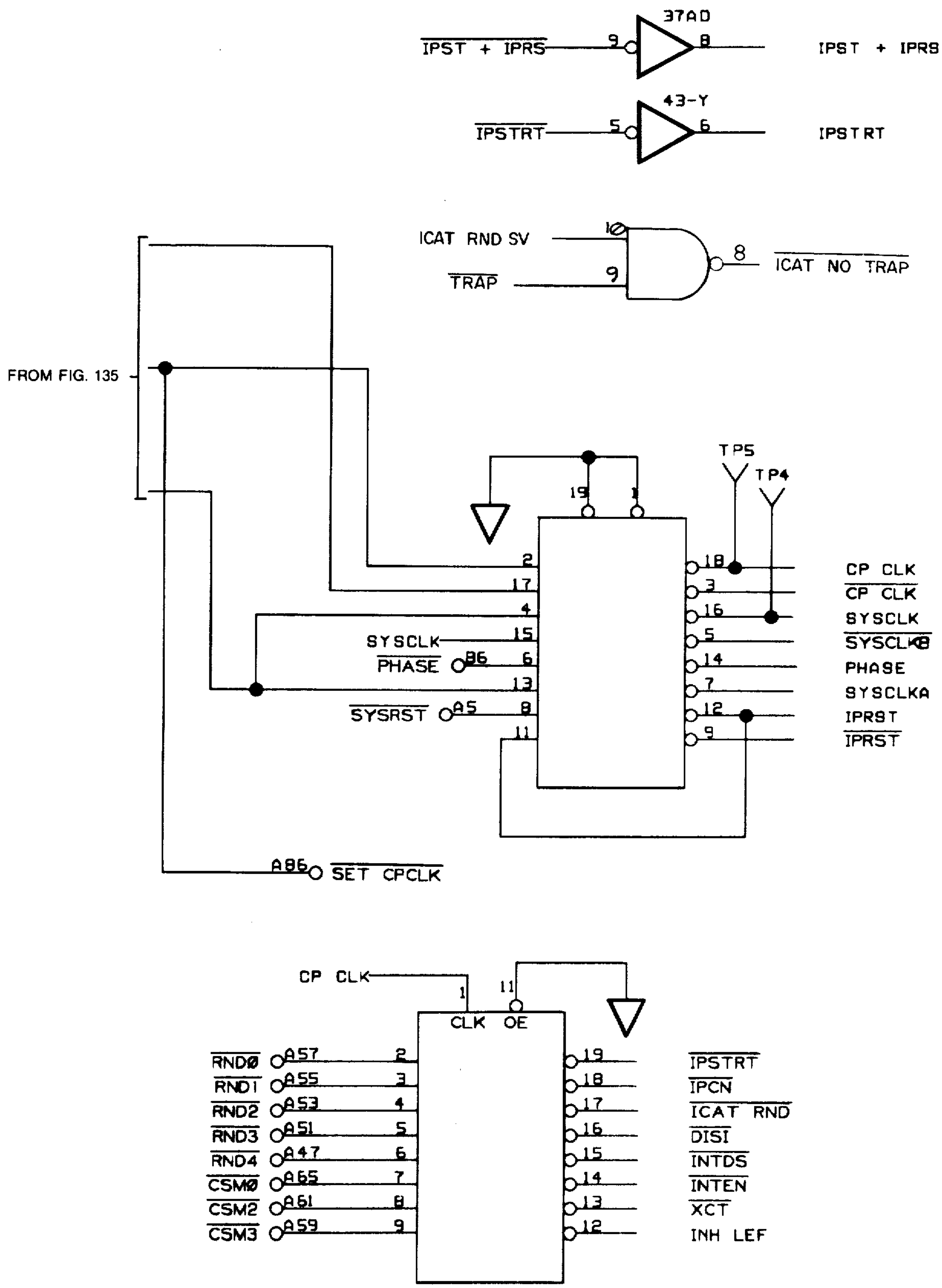
Figure 135B:
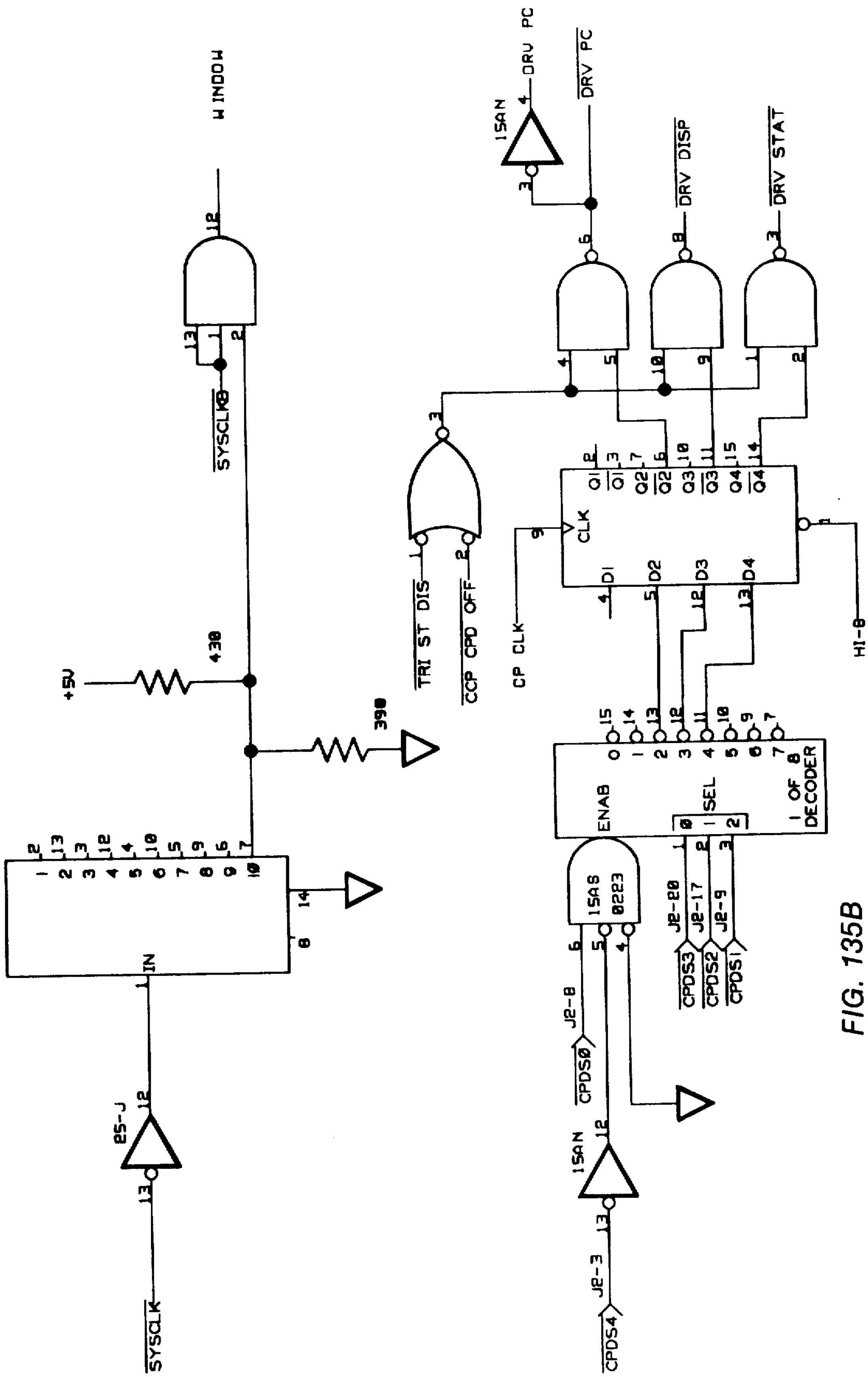
Figure 135C:
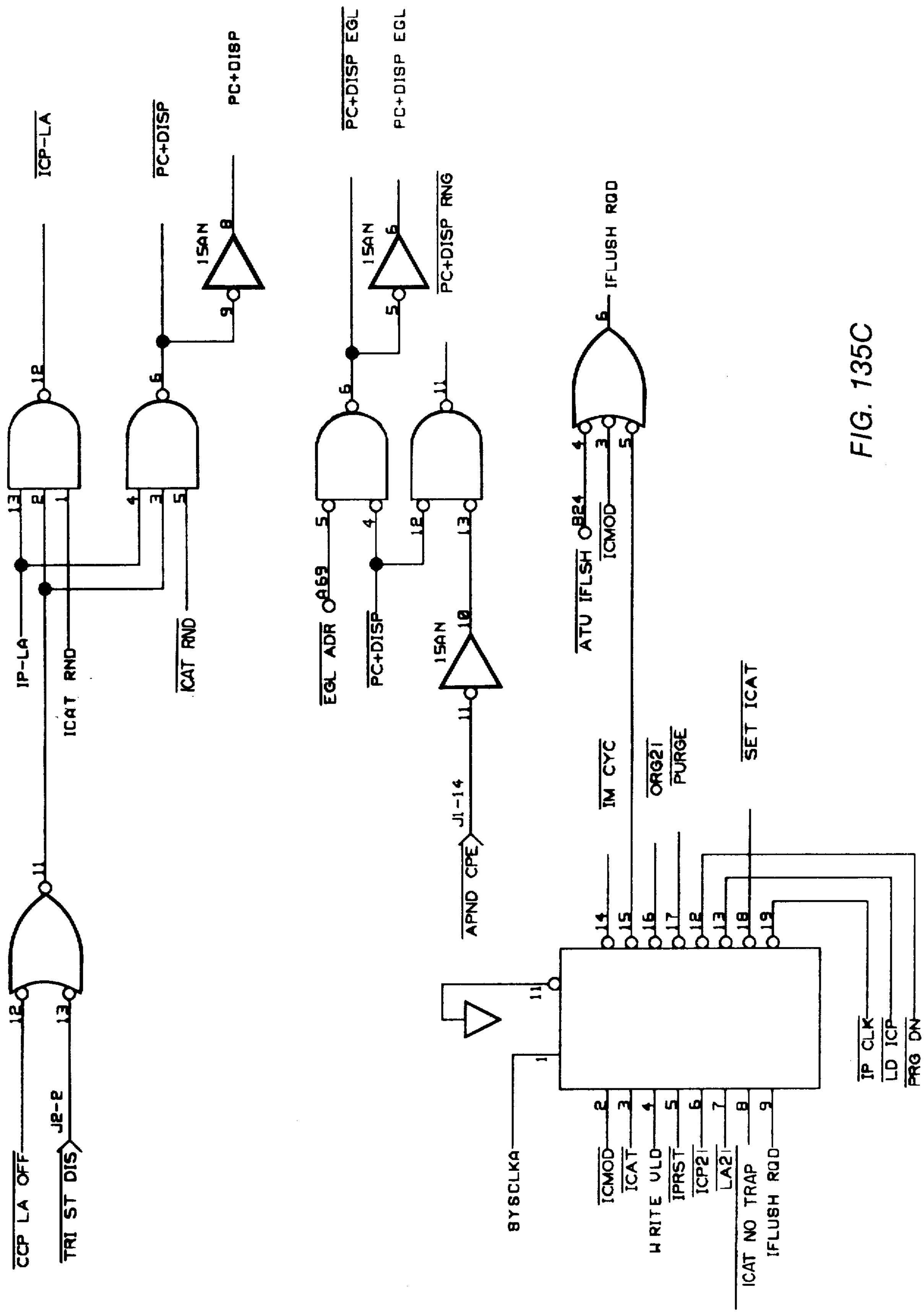
Figure 136:
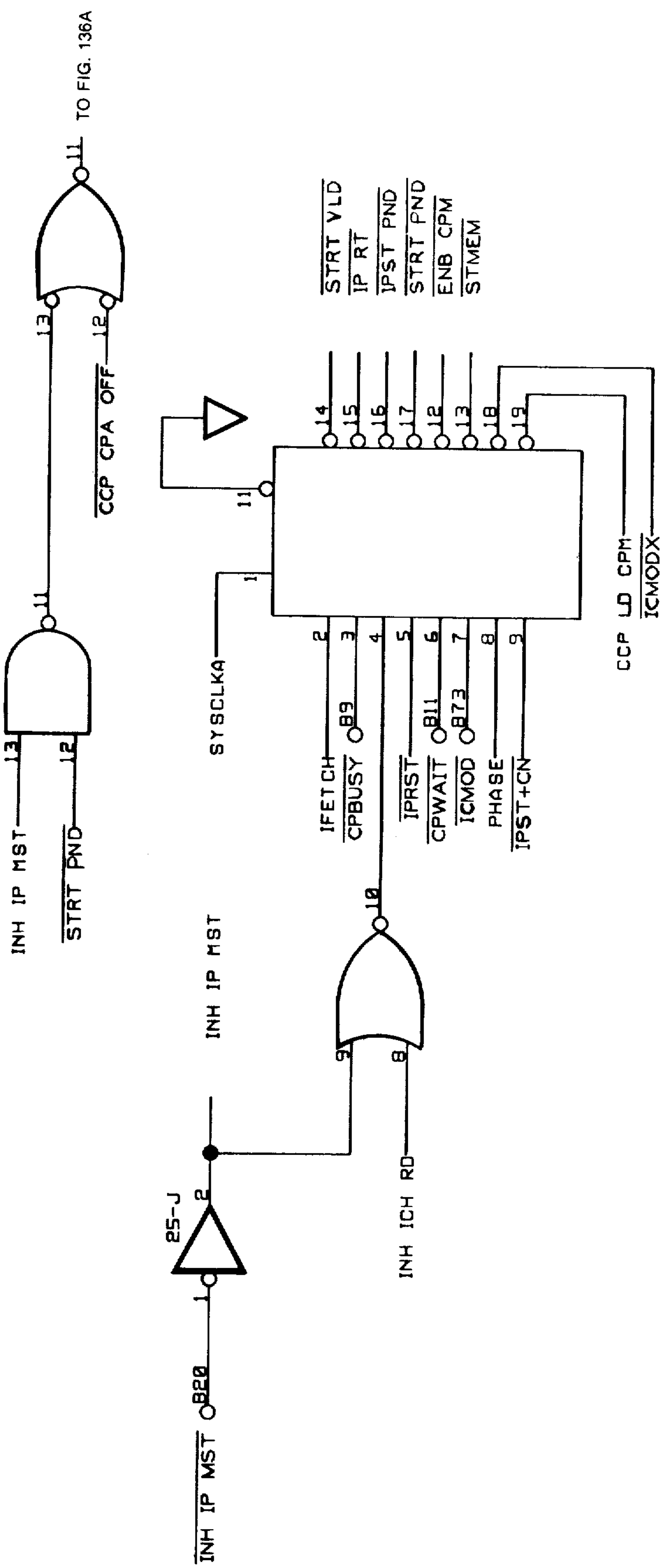
Figure 136A:
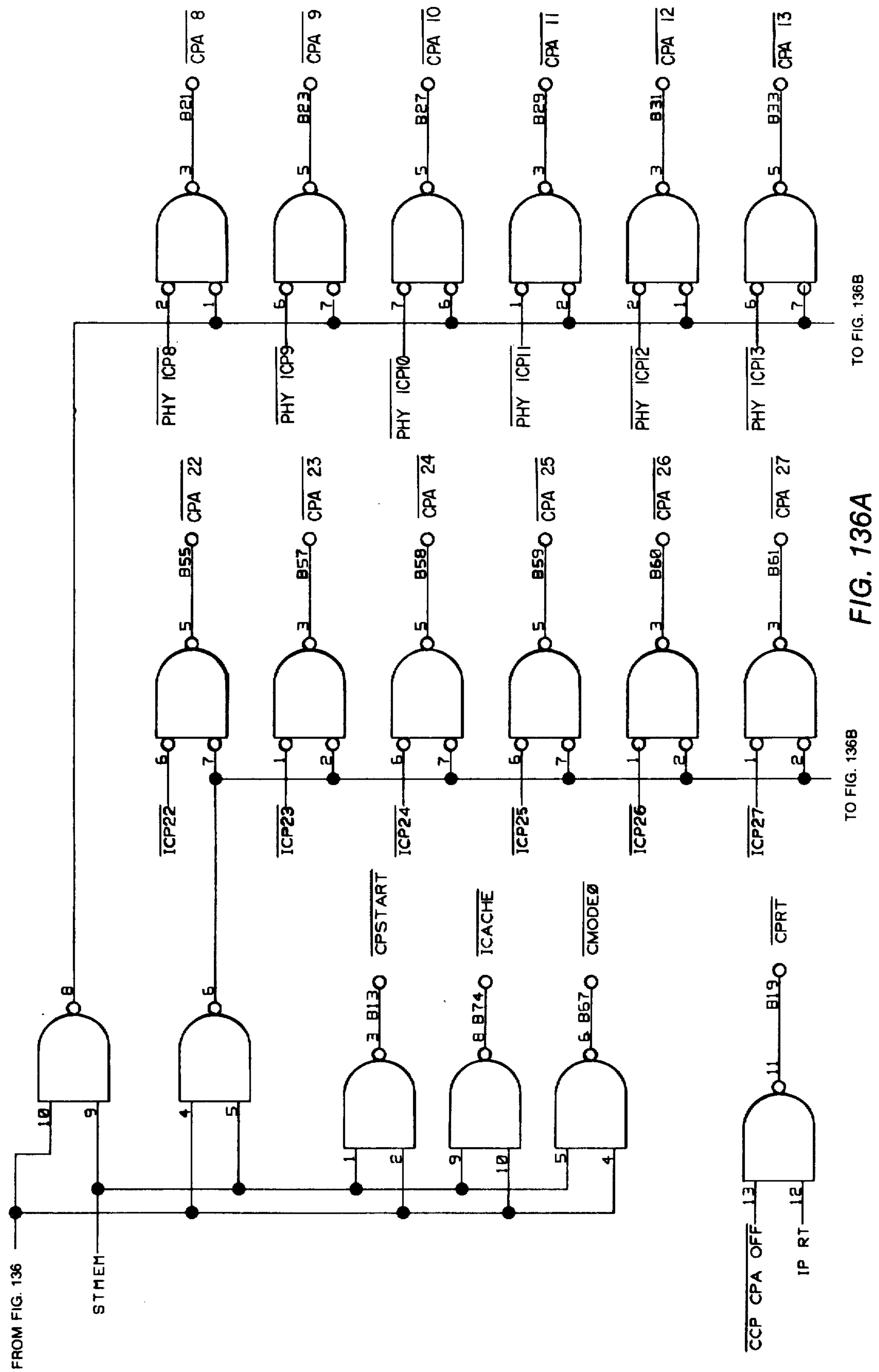
Figure 136B:
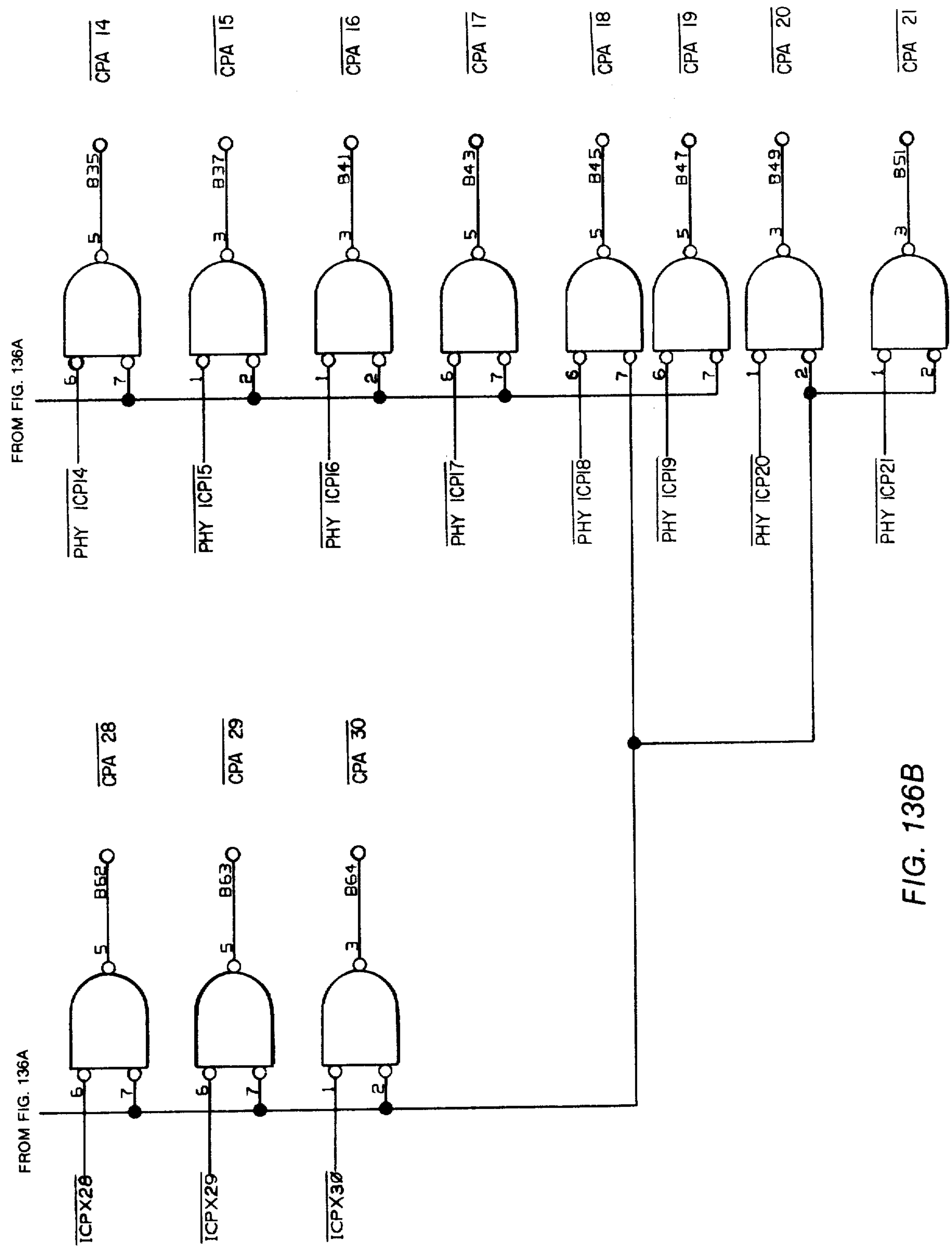
Figure 136C:
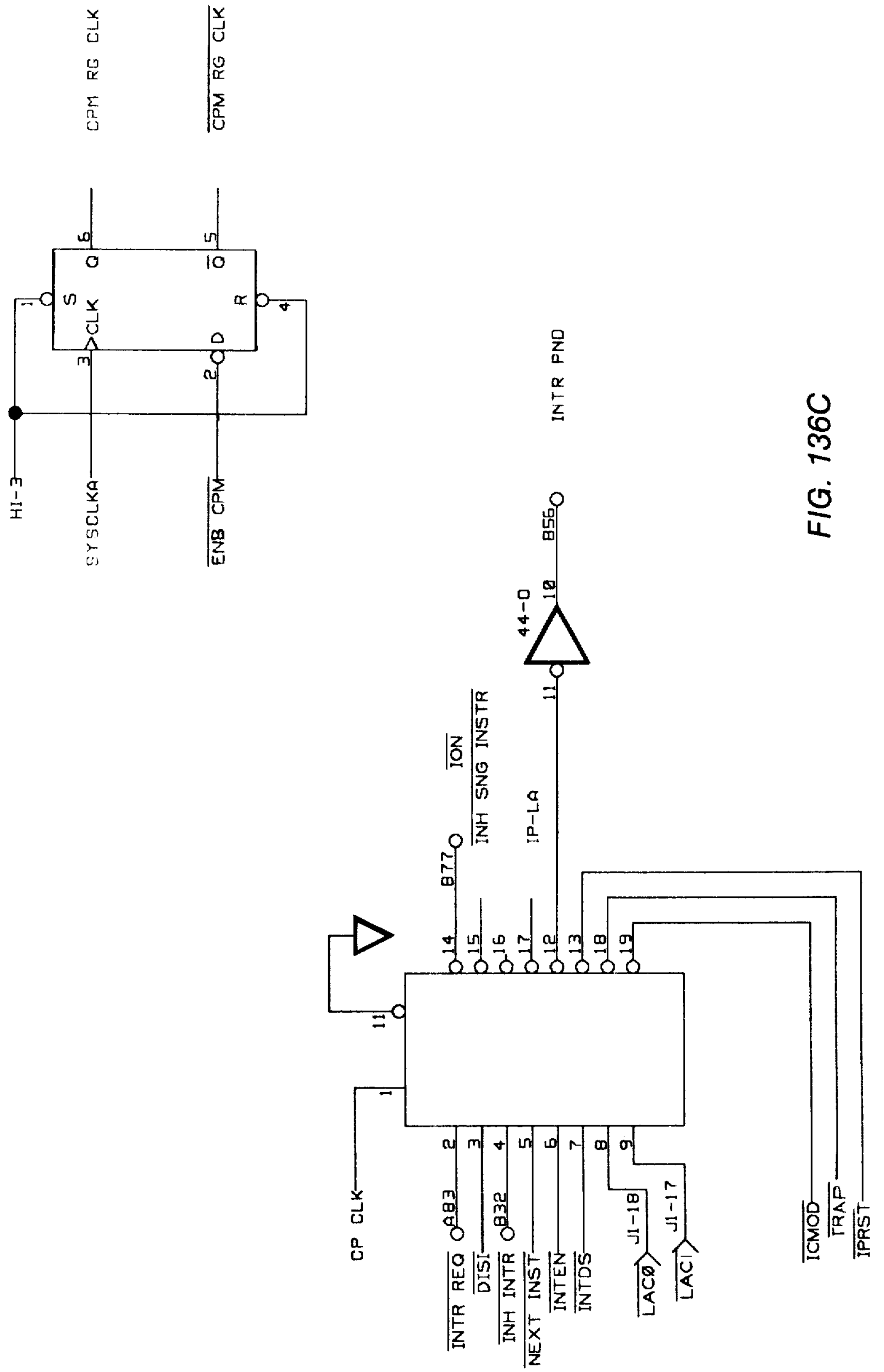
Figure 136D:
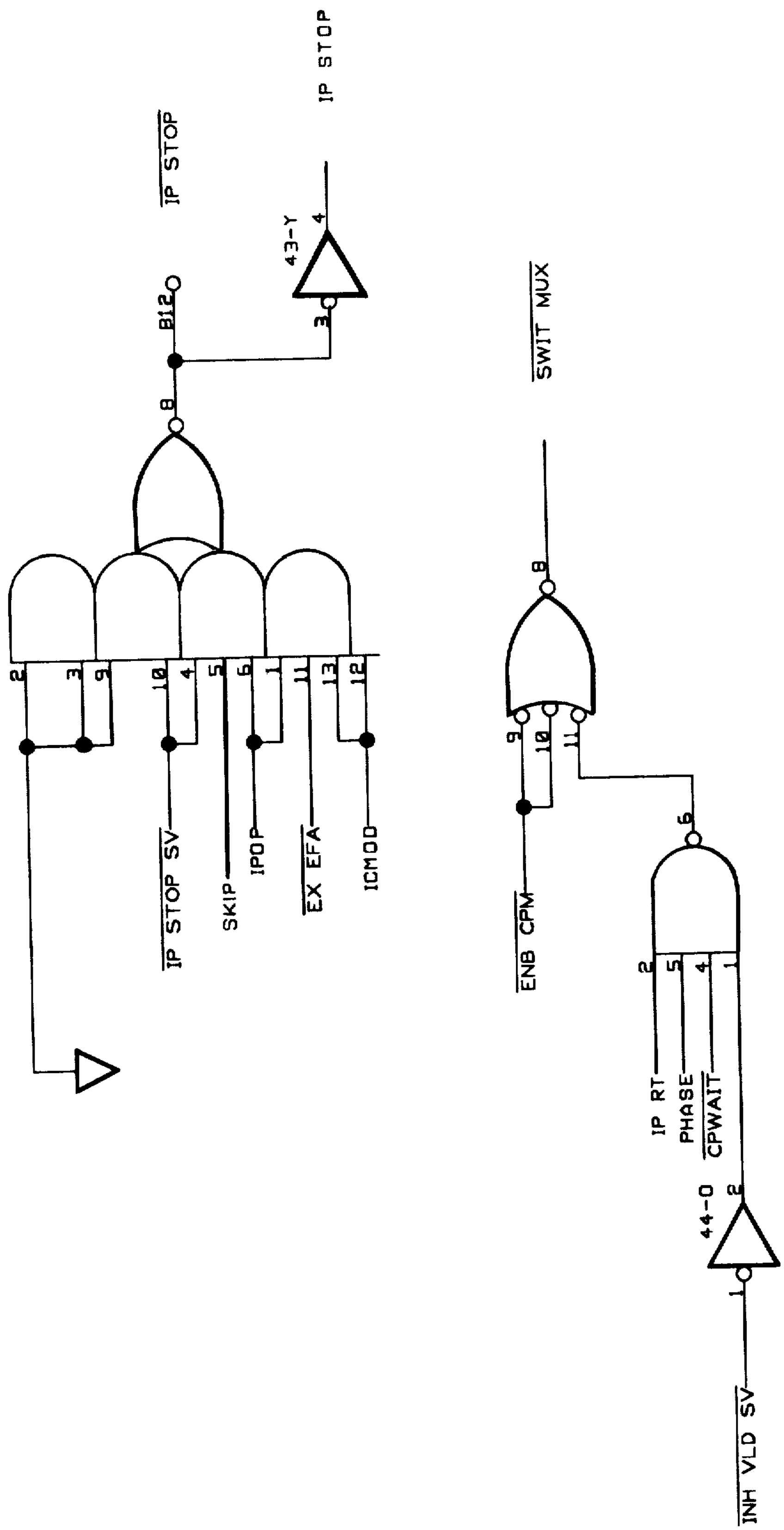

General instruction processor timing and control logic circuitry is shown in FIG. 135, while the system cache interface logic required for the instruction processor 12 to interface the system cache 17 is shown in FIG. 136.

MICRO-SEQUENCER

Figure 137:
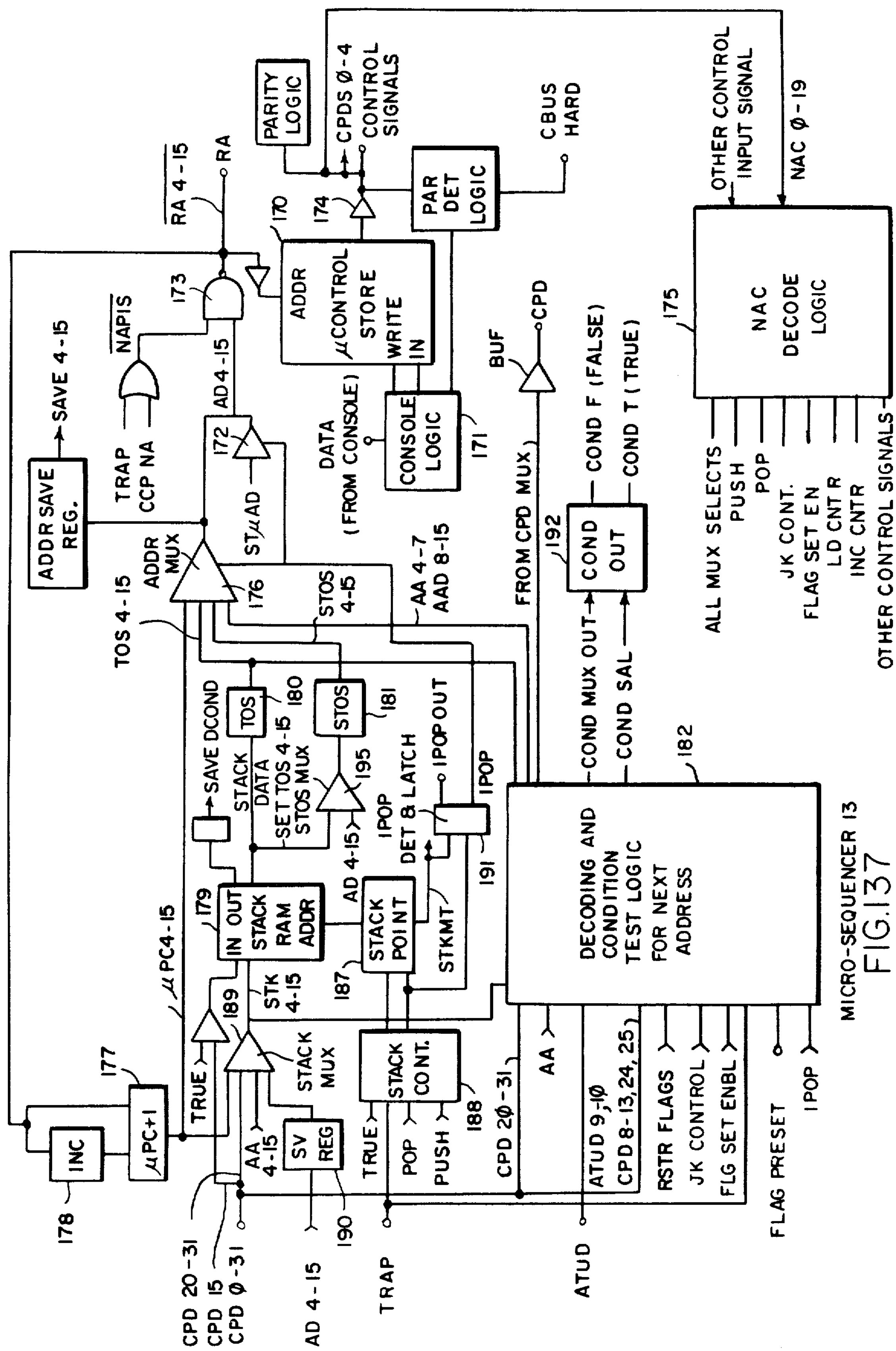
FIGS. 137 and 138 show block diagrams of the microsequencer unit of the system of FIG. 1.
Figure 138:
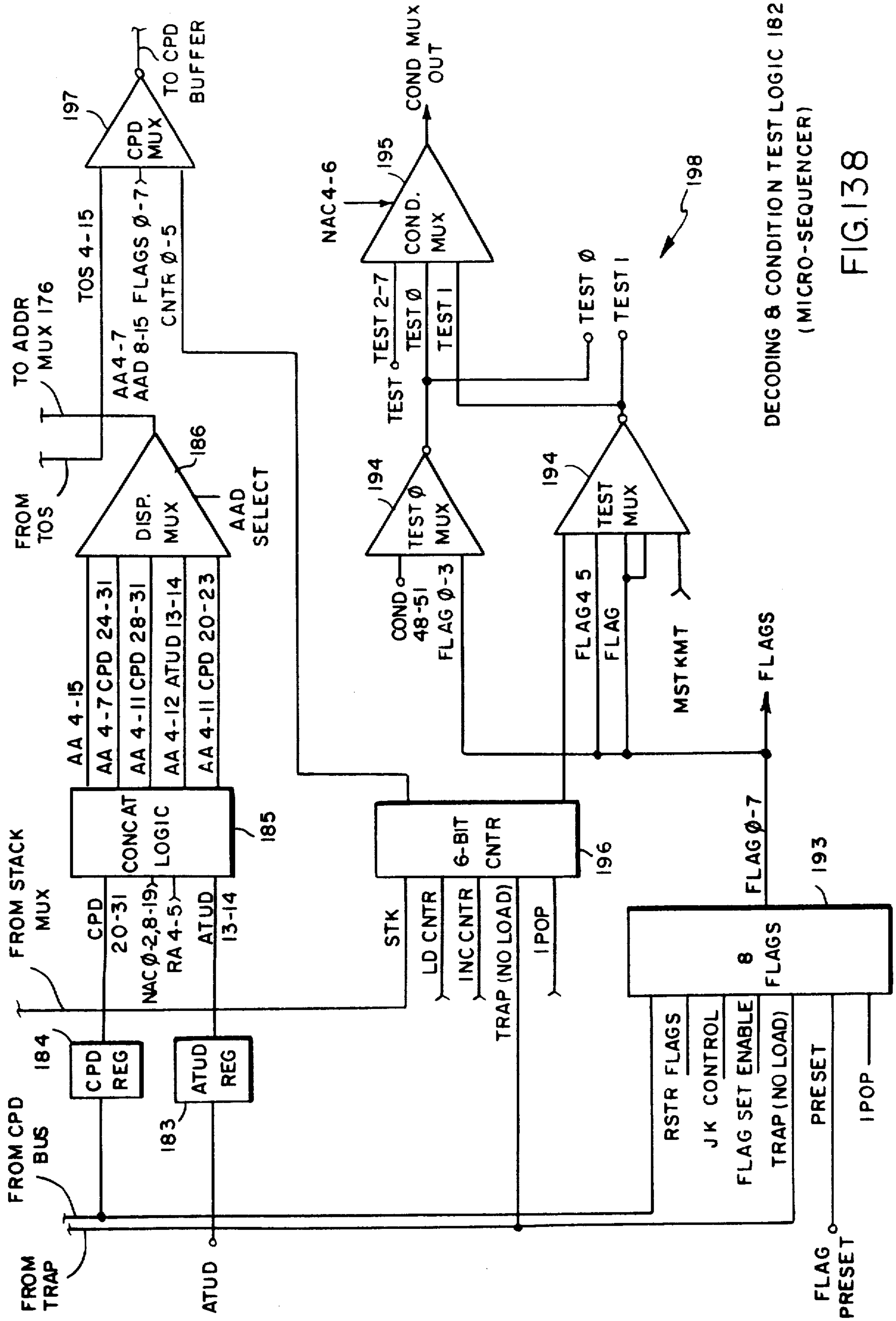

The primary function of the micro-sequencer unit is to generate micro-instructions from the starting microaddress which is supplied to a random-access-memory (RAM) storage unit on the micro-sequencer board. An overall block diagram of the micro-sequencer board for the particular embodiment of the system of the invention described herein is shown in FIGS. 137-138. As can be seen, the RAM storage unit is identified as the micro-control store unit 170 and is capable of storing up to 4-K 80 bit (79 bits plus 1 parity bit) micro instructions and is sufficient to store all of the micro-instructions required for the system being described. The micro-instructions can be appropriately loaded into store unit 170 initially (i.e., prior to the use of the system) through a suitable console via appropriate console interface logic unit 171. Once the entire micro-instruction set has been loaded into the micro-control store unit 170, the console interface logic need no longer be used, unless a micro-instruction is changed or additional micro-instructions are to be stored. Addresses for the micro-instructions are supplied at the RA input to the micro-sequencer board.

Once the entire micro-instruction set has been loaded into the micro-control store 170, the system is ready for performing the micro-instructions, as determined by the instrucion processor unit 12 which, as discussed above, supplies the starting micro-address (ST$\mu$AD) for a micro-instruction routine. As can be seen in FIG. 137, the starting micro-address (ST$\mu$AD) is supplied via buffer 172 and AND circuitry 173 to the address input of the micro-control store 170. The starting micro-address selects the starting micro-instruction at the appropriate location in the micro-control store and supplies the control signals associated with said instruction via buffer 174 to the appropriate locations within the overall data processing system which are involved in the operations required for such instruction in a manner similar to that which would occur in supplying instructions to any data processing system.

The micro-sequencer must then determine the next address required for the next sequential micro-instruction (if any) via appropriate decoding of the "next address control" field (NACØ-19) of the current micro-instruction. This field in the particular embodiment described is a 20-bit field of the 80-bit micro-instruction obtained from the micro-control store. The NAC field is suitably decoded by the NAC decode logic 175 to provide the necessary control signals (some of which are identified) required to obtain the next micro-address. The decoding process can in one mode be a conditional one, i.e., wherein the NAC field decoding is conditioned upon one of a plurality of possible conditions which must be appropriately tested to determine which, if any, condition is TRUE. In the particular embodiment described, for example, there are eight test signals (TEST Ø-7) each test representing 8 conditions, for a total of 64 conditions which can be tested. Alternatively, in another mode the selection of the next micro-address may not be conditioned on any of the 64 conditions involved. After appropriate testing the address is selected from one of four sources, as determined by the decoding and condition test logic 182, for supply to the micro-control store 170 via ADDR multiplexer unit 176. Decoding and condition test logic 182 is shown in further detail in FIG. 138.

Thus, the address multiplexer output can be selected from the next sequential program counter address ($\mu$PC 4-15) which represents the previous micro-address incremented by one as obtained from the ($\mu$PC+1) unit 177 and increment logic 178 which accepts the previous micro-instruction (RA 4-15), increments it by one and supplies it to an input of the address multiplexer unit 176.

Alternatively, the next micro-address may be obtained from a temporary storage of a plurality of micro-addresses for a particular micro-code routine which addresses have been stored in a stack RAM storage unit 179, the next address being supplied directly as the address at the top of the stack (TOS 4-15) via a top of the stack (TOS) register 180. Alternatively, the address at the top of the stack may already have been accessed (popped) from the stack and saved in a previous operation in the Save TOS register 181 (particularly used in restoring the overall context after an interrupt process) so that the next micro-instruction address may alternatively be obtained from the top of the stack data (STOS 4-15) which has previously been saved in the STOS register.

A further sorce of the next micro-address for the address multiplexer may be an absolute address from decode and condition test logic 182, shown more specifically in FIG. 138, which address is specified by the micro-instruction word itself or an absolute address which may be identified by bits from another source external to the micro-sequencer board which other sources dispatch such address to the micro-sequencer, i.e., from the address translation unit (ATU) or from the arithmetic logic unit (ALU) selected bits of which can be suitably concatenated with absolute address bits from the current micro-instruction to form the next micro-address. As see in FIG. 138, the latter bits may be received via suitable registers 183 and 184 (see FIG. 138) from the ATU at the ATU dispatch (ATUD) register 183 or from the ALU on the CPD bus at the CPD register 184. Thus, as seen best in FIG. 138, such bits (ATUD 13-14 and CPD 20-31) can be concatenated with bits from the micro-instruction itself, identified by NAC bits Ø-2, 8-19, to form five possible micro-addresses by concatenation logic unit 185. One of five concatenated addresses is capable of being selected at Dispatch Multiplexer unit 186 and thereupon supplied to Address Multiplexer 176.

In order to obtain the desired stack data for the next possible micro-address (TOS 4-15 or STOS 4-15) suitable stack pointer logic 187 and stack control logic 188 are used with the stack RAM unit 179. The stack addresses which are supplied via stack pointer logic 187 determine the locations of the sequence of micro-instruction addresses which are required for micro-code routines, which sequence has been previously supplied to the stack via stack multiplexer unit 189, the inputs of which are obtained either as absolute addresses (AA 4-15) from the micro-instruction which is currently being processed or as addresses obtained from the micro-program counter 177 ($\mu$PC+1), from a dispatched ALU source (CPD 20-31) via the CPD bus, or from an address which has been previously saved (AD 4-15) in save register 190.

When a micro-code routine which as been stored in the stack RAM is completed, the stack is then empty and a STKMT signal from the stack pointer logic 187 produces an appropriate IPOP OUT signal at the output of IPOP detection and latch logic 191 for supply to the instruction processor to indicate that a new starting micro-address (ST$\mu$AD) is required to provide the next micro-instruction or sequence thereof.

As a simple example of the operation of the micro-sequencer to illustrate the same, in a conditional jump instruction (CJMP), let it be assumed that the address of the next micro-instruction is to be supplied either as an absolute address from the dispatch multiplexer to which the micro-program must jump if the condition is TRUE or as the next sequential program address from the micro-program counter (PC+1) if the condition is not TRUE. For example, if the present micro-address is at a selected location of the μ-control store 170 (e.g. location "100") the next micro-address is to be either the location signified by the next sequential program counter address (e.g., location "101") if the condition is not TRUE, or a jump to specified absolute address (e.g., at location "500") if the condition is TRUE. In order for the micro-sequencer to determine which of the two locations is be be selected, i.e., the absolute address (AAD 4–15) or the micro-program counter address (μPC 4–15), the condition must be tested to determine if it is "TRUE".

If testing of the condition provides a TRUE at the condition out logic 192, the absolute address (AAD 4–15) will be selected as the correct address from address multiplexer 176, while if the condition is not TRUE, the next micro-program counter address (μPC 4–15) will be selected. The testing logic 198 is shown in FIG. 138.

Figure 139:
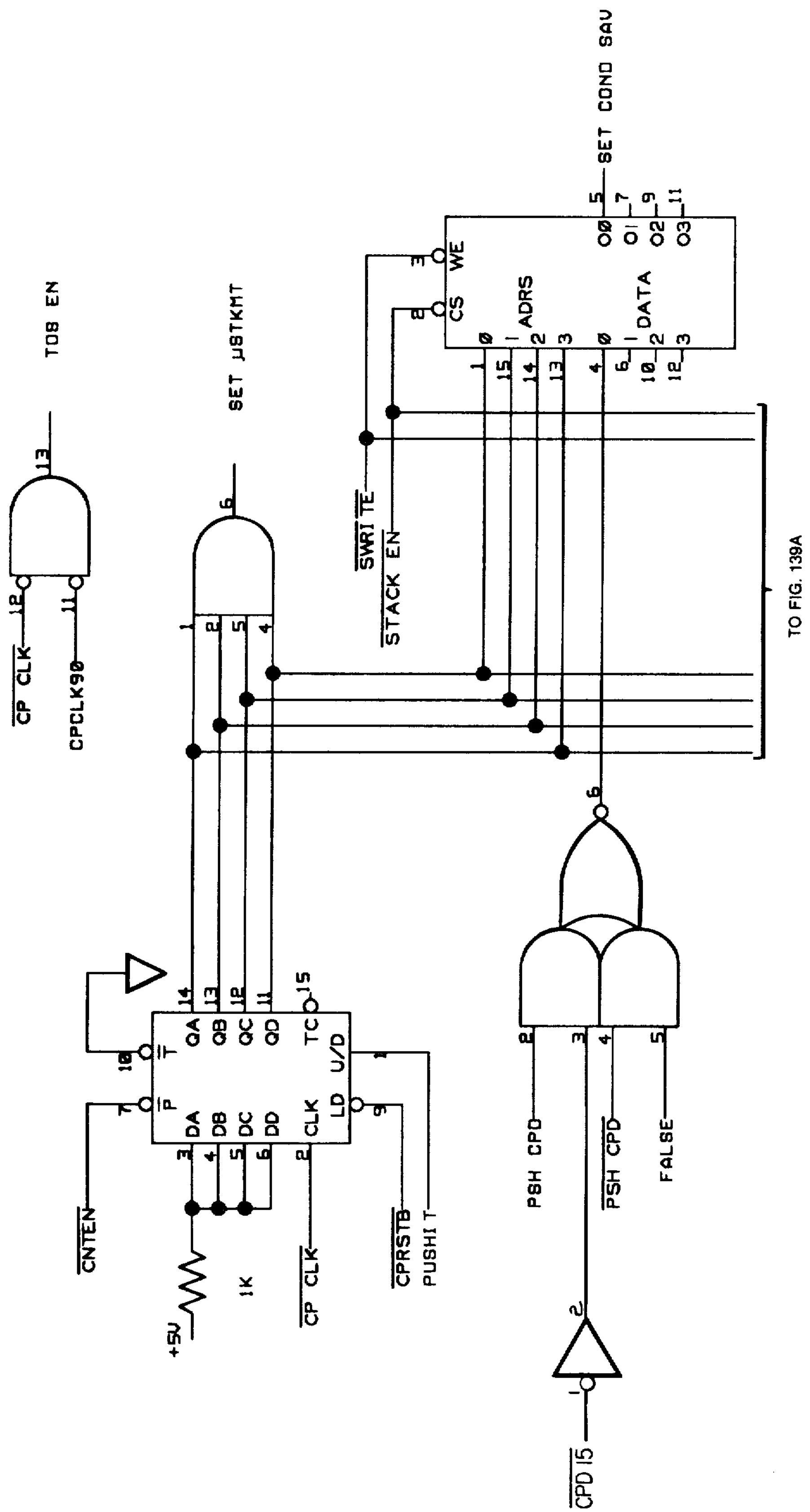
FIGS. 139–153 show specific logic circuitry for implementing the microsequencer unit of FIGS. 137 and 138.
Figure 139A:
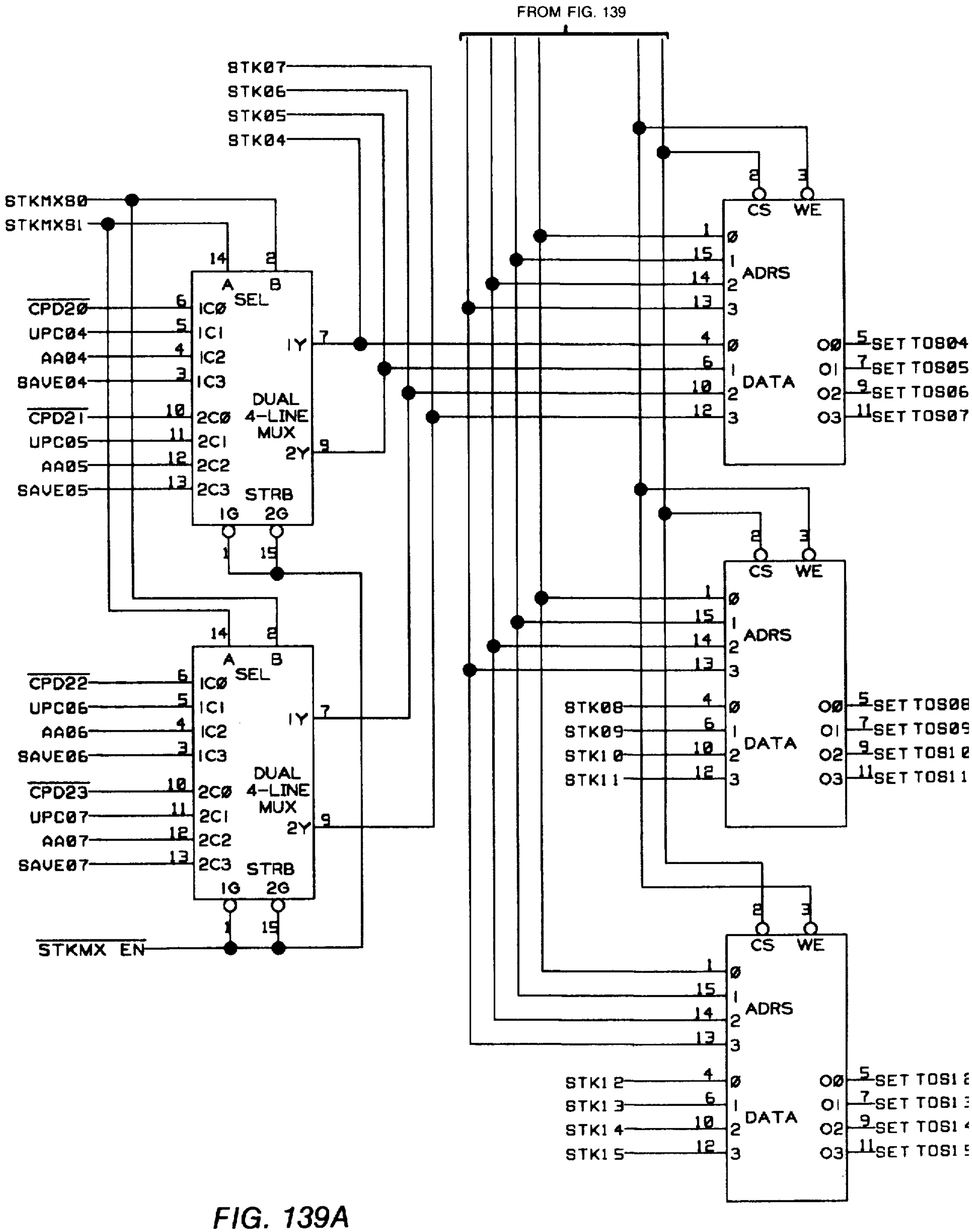
Figure 139B:
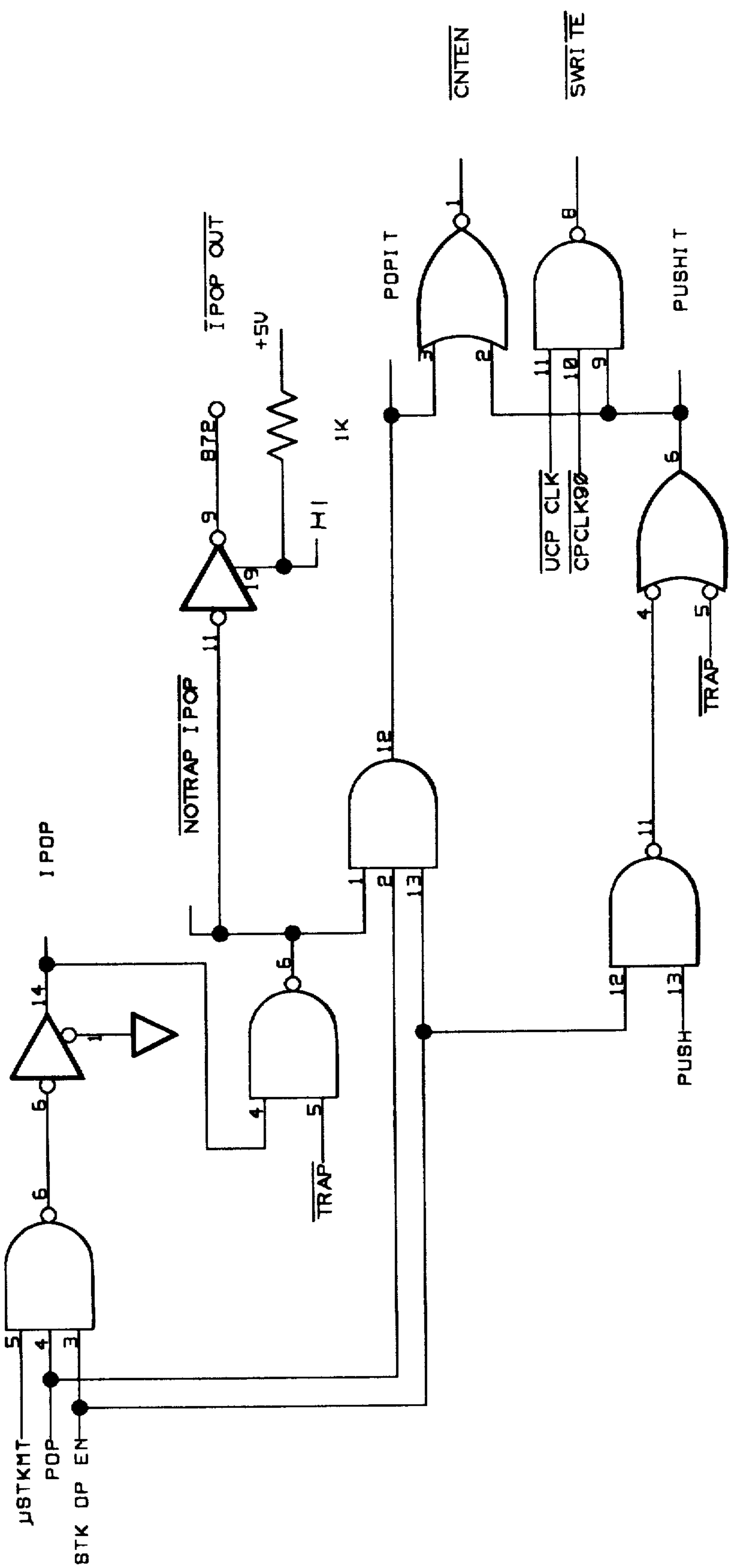
Figure 139C:
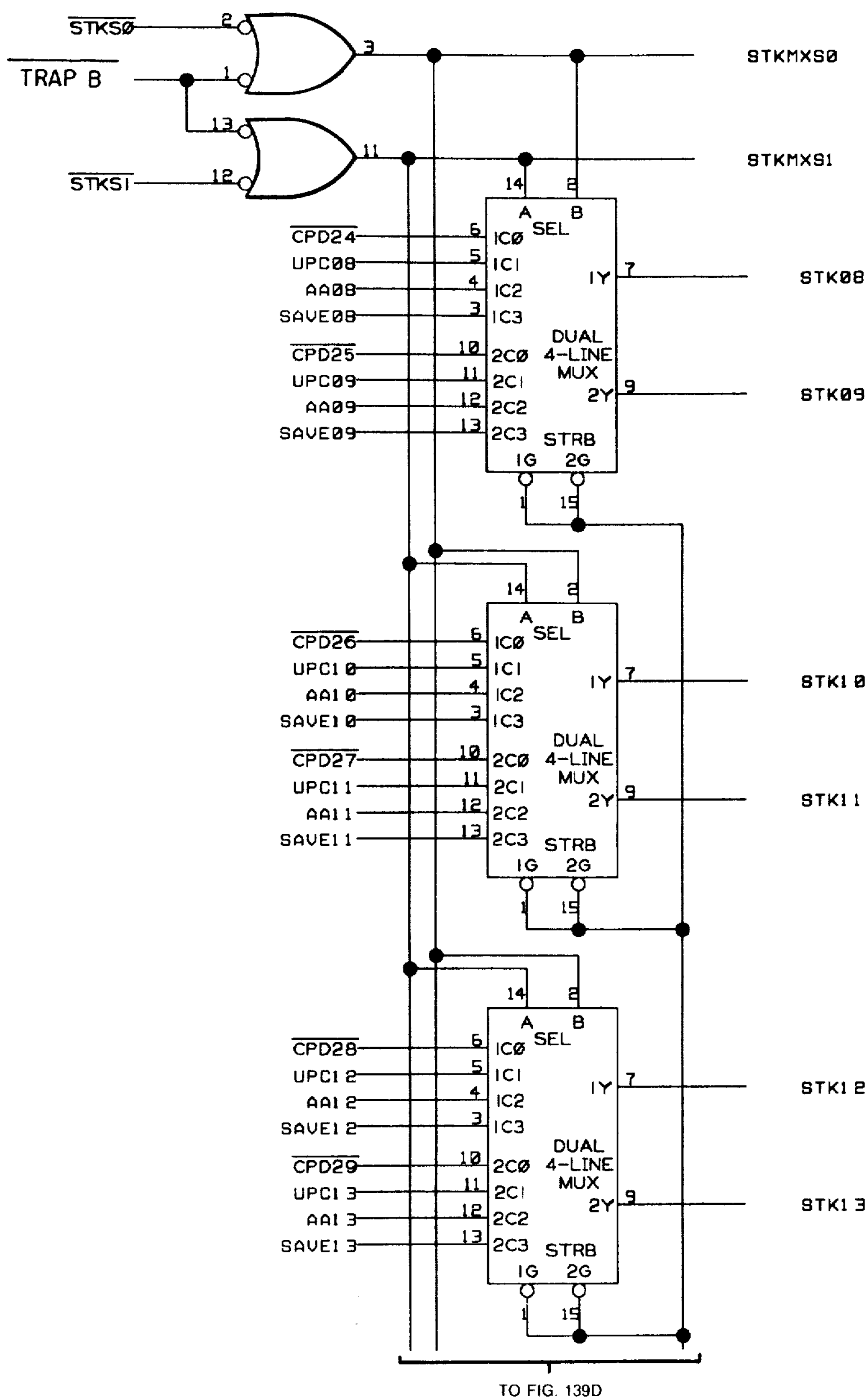
Figure 139D:
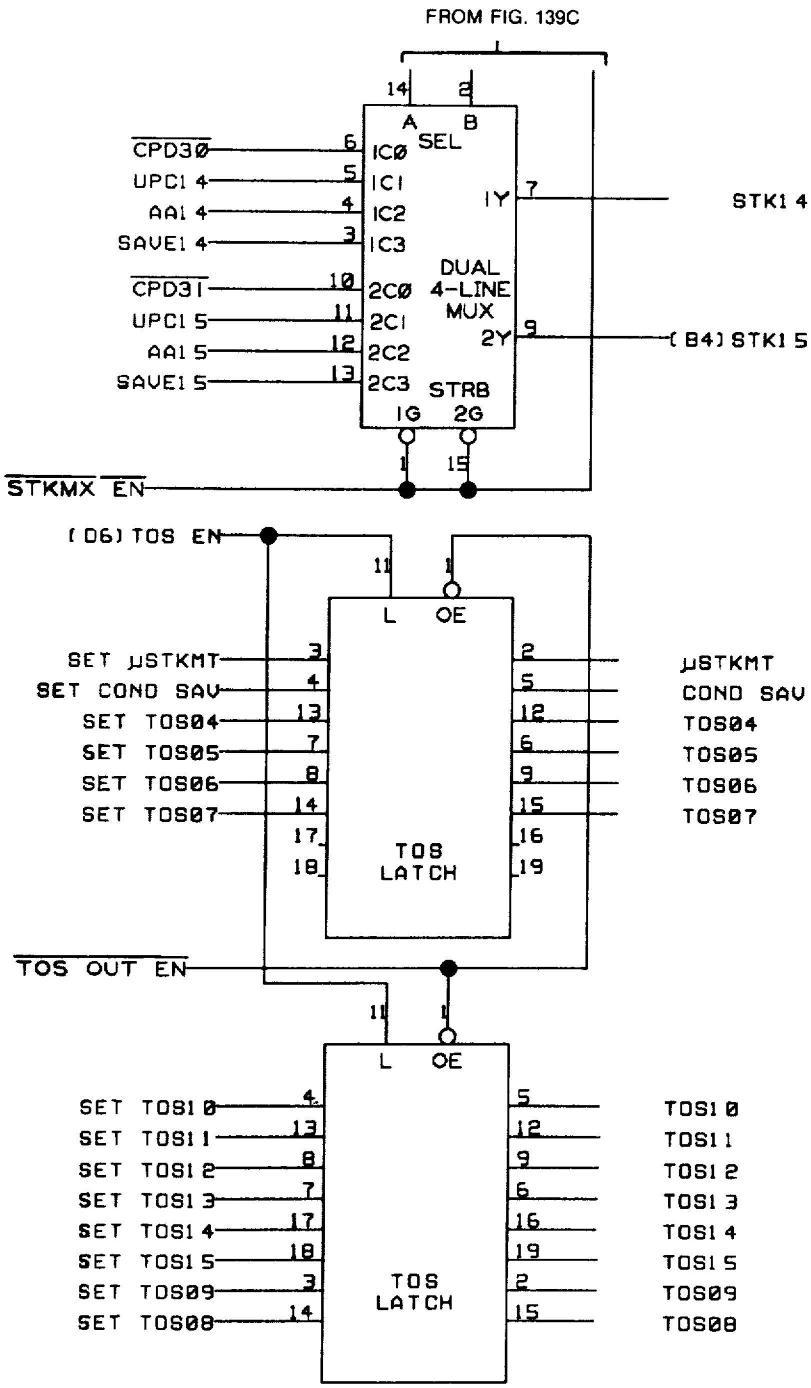
Figure 140:
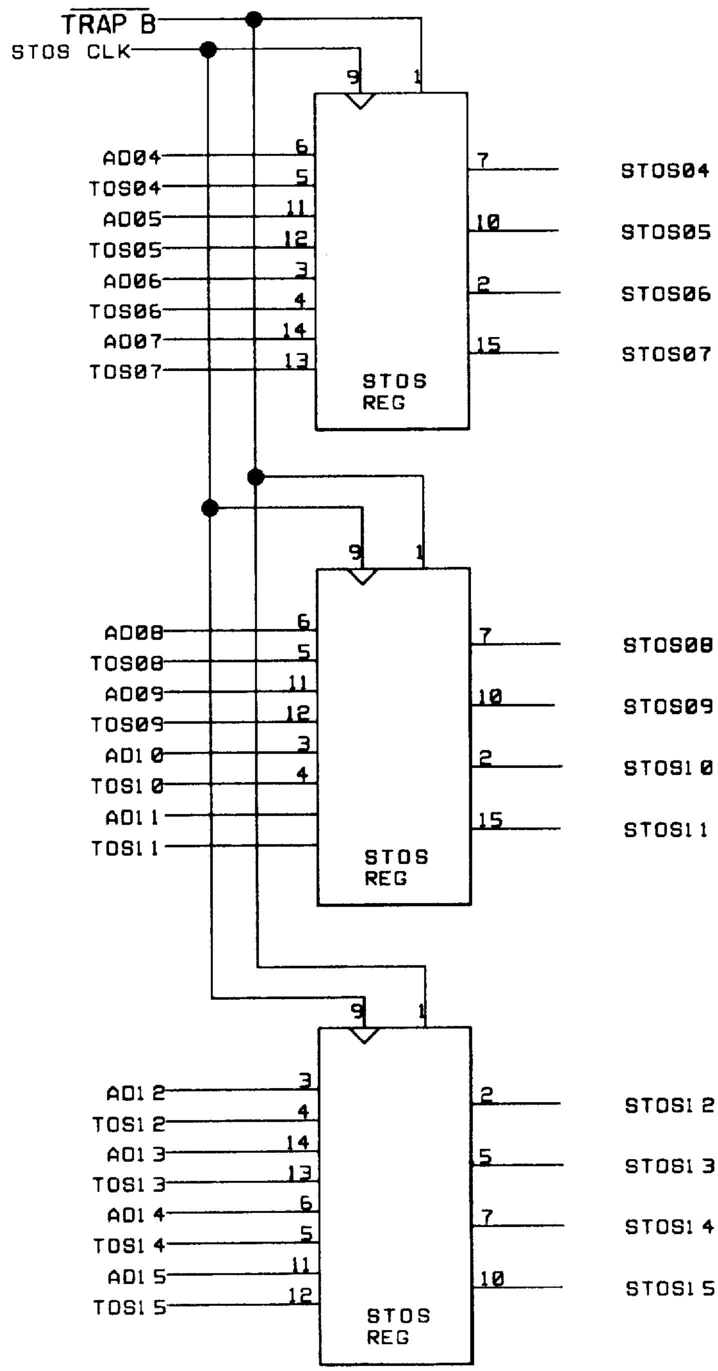
Figure 141:
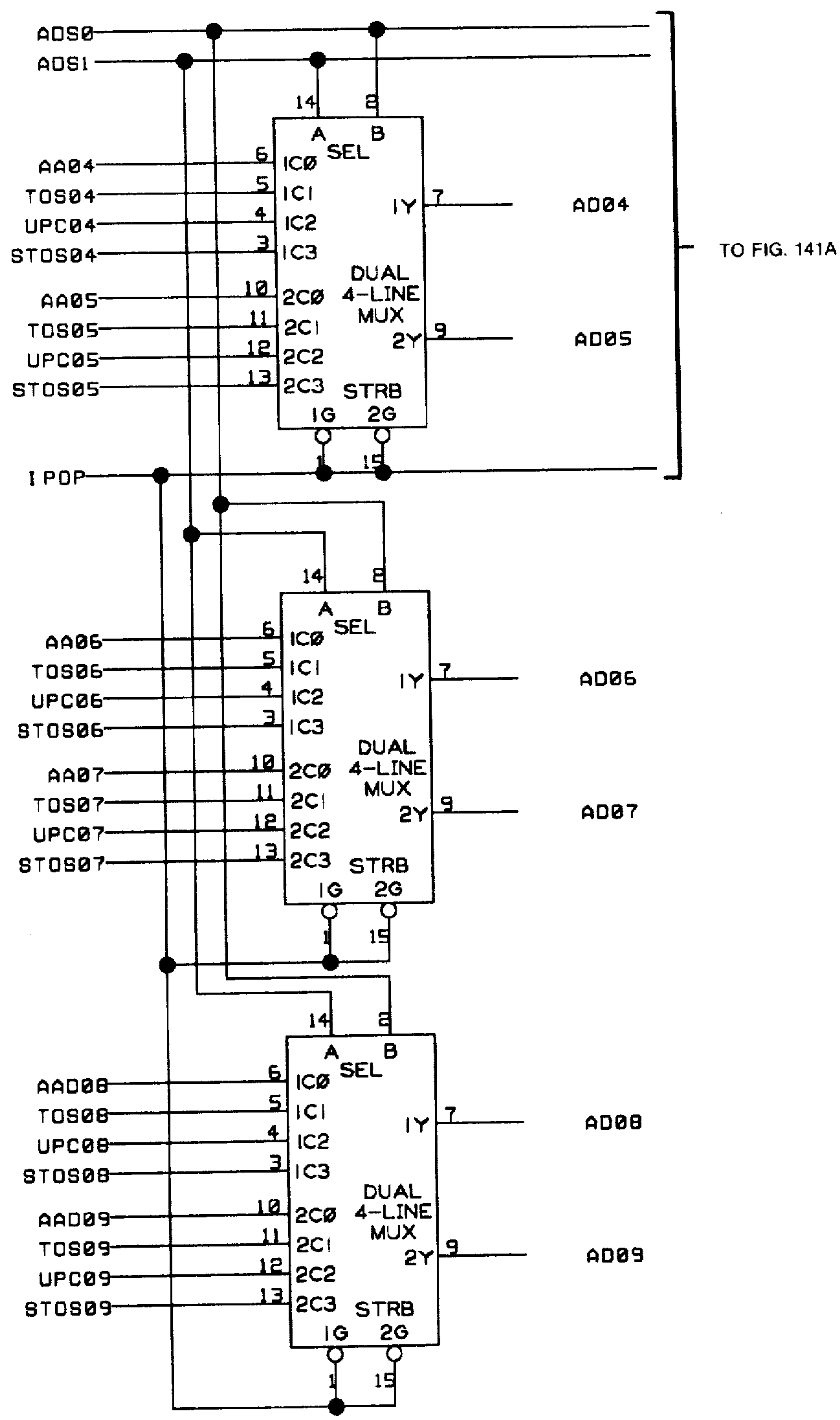
Figure 141A:
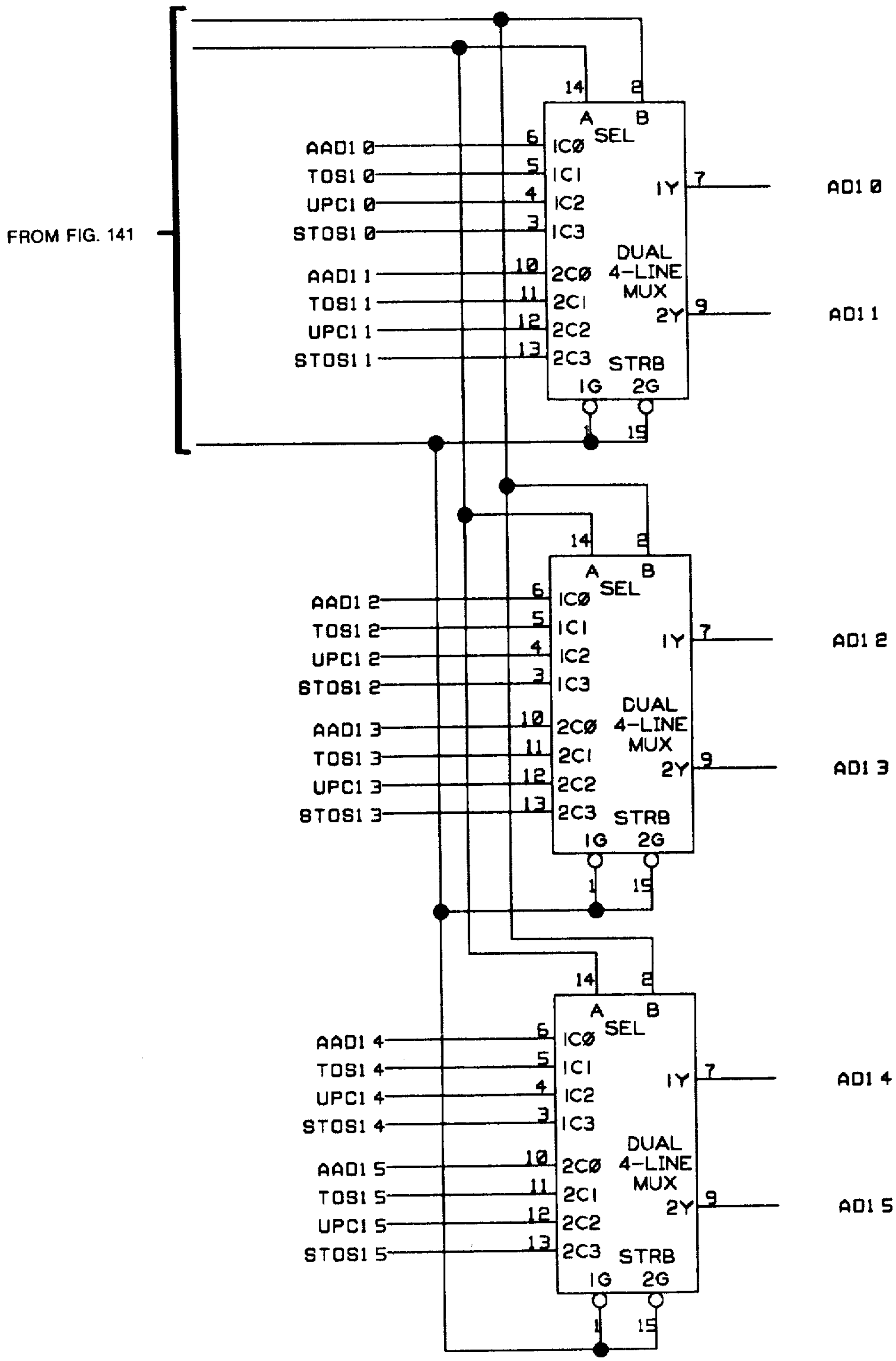
Figure 141B:
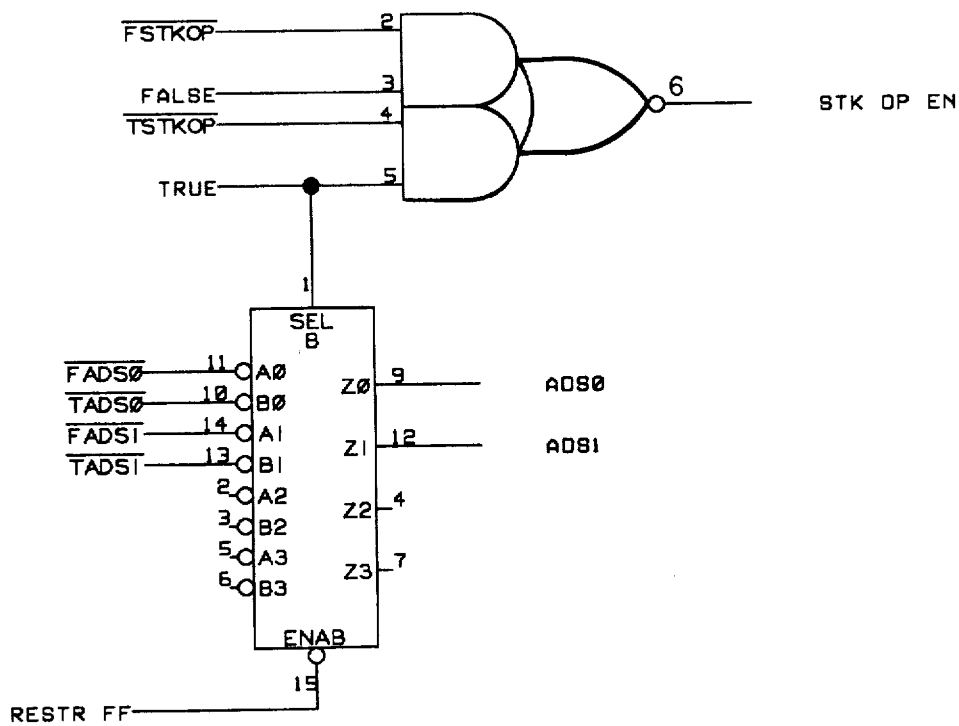
Figure 142:
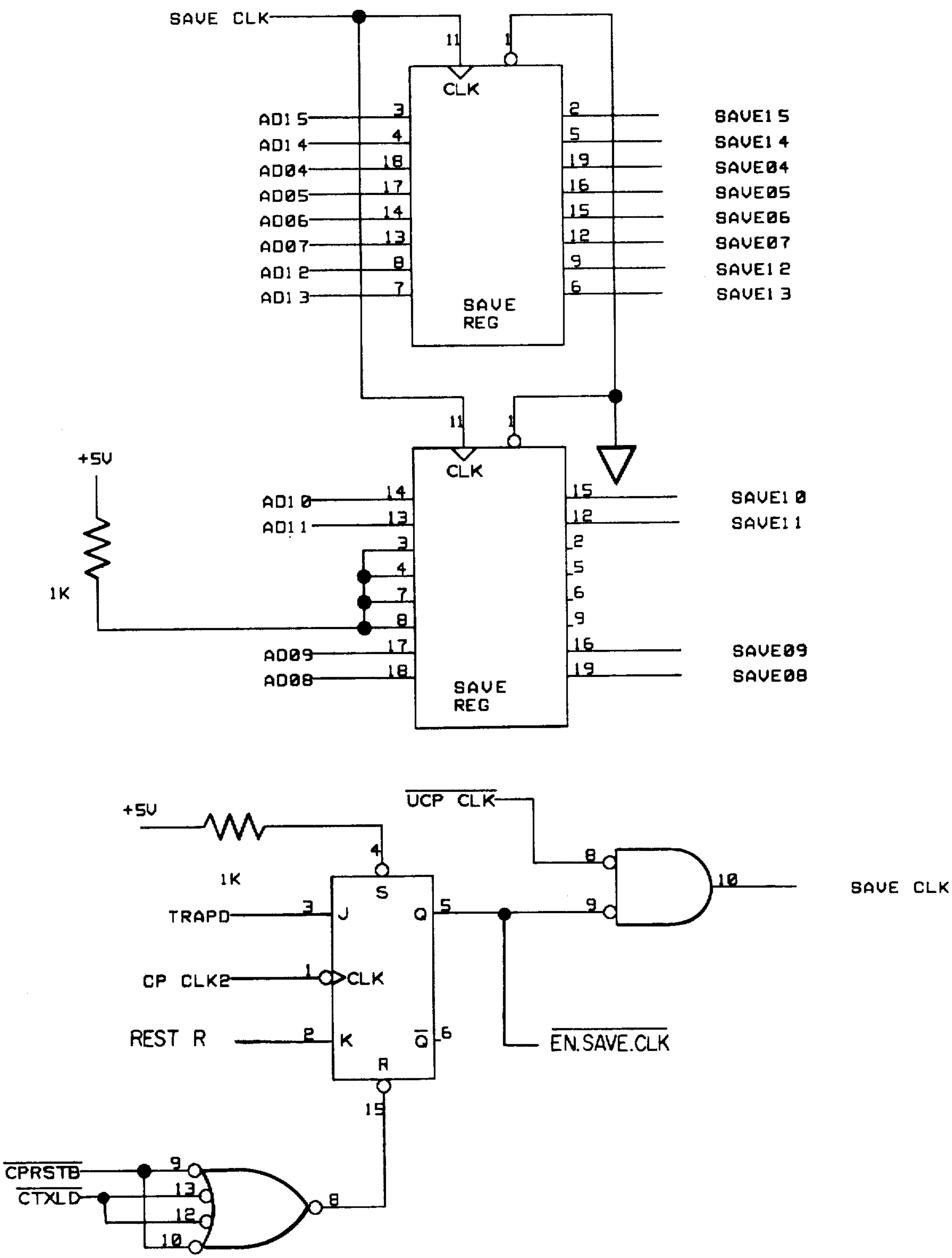
Figure 143:
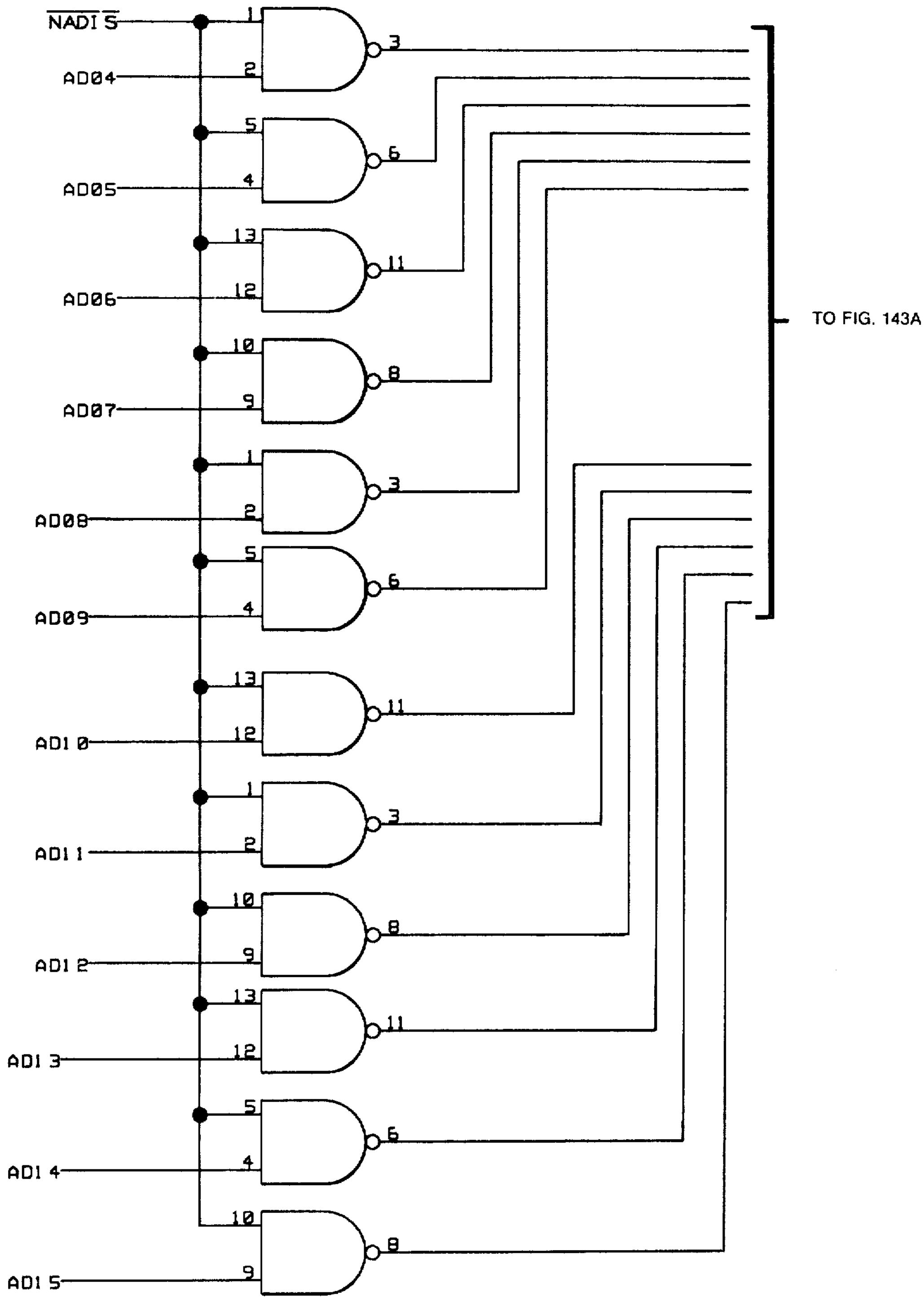
Figure 143A:
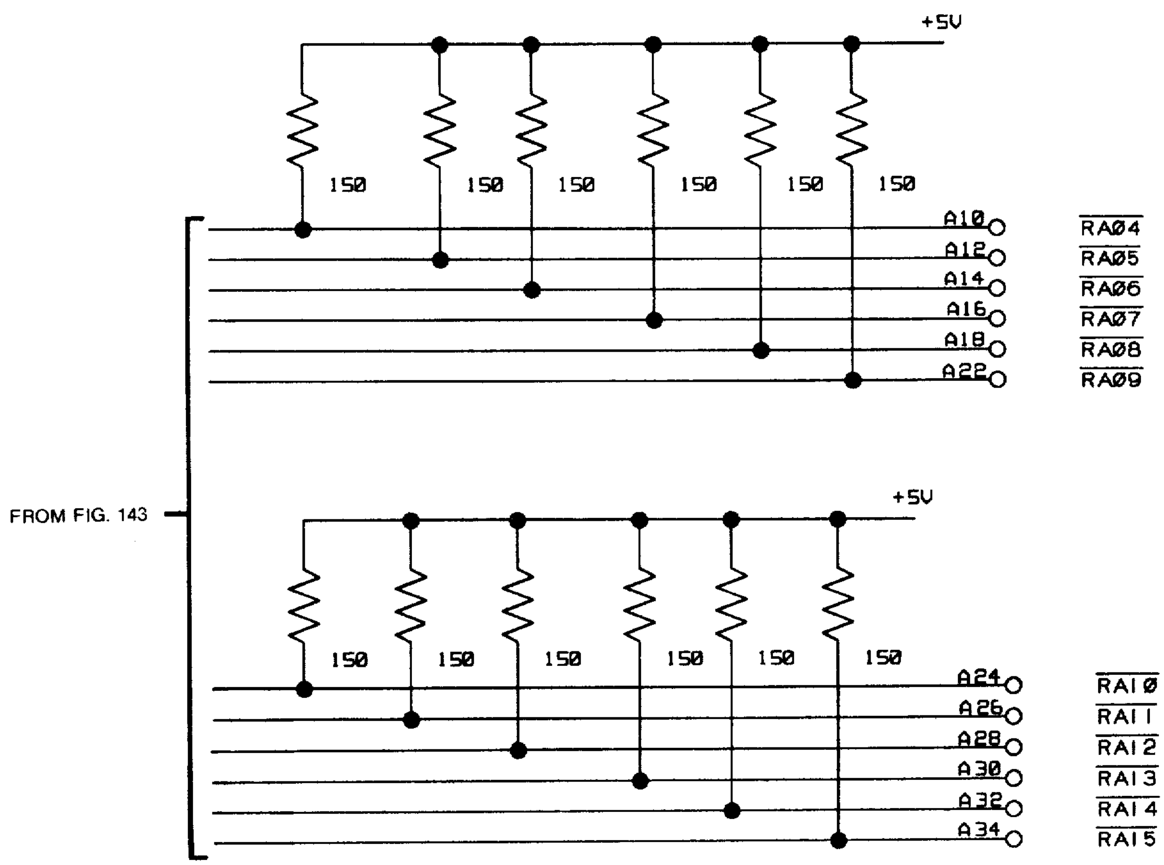
Figure 144:
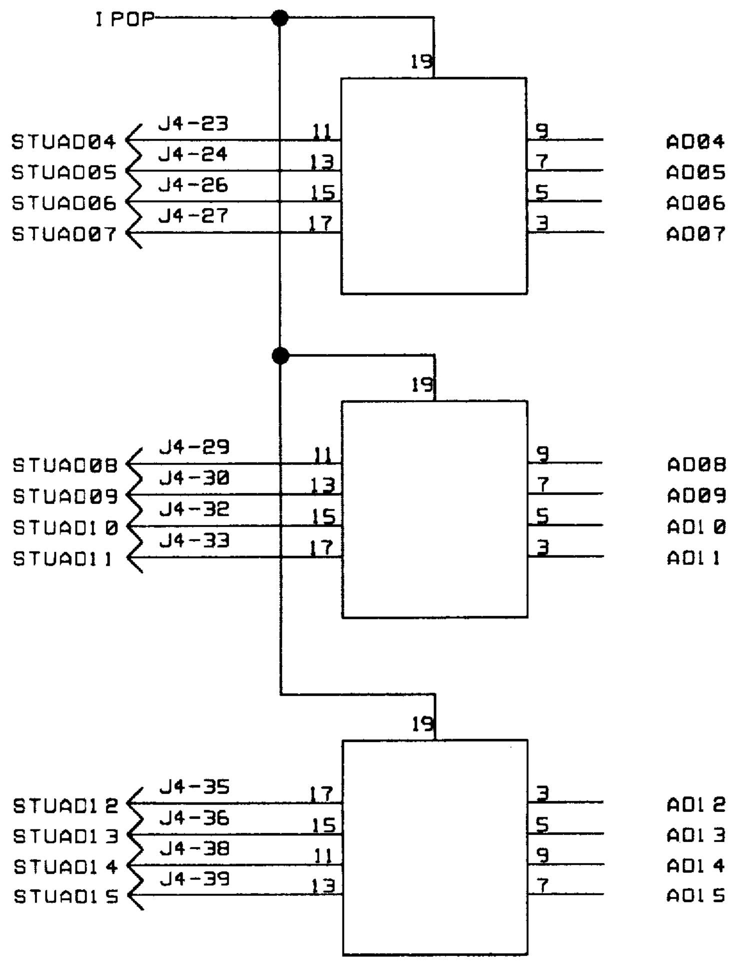
Figure 145:
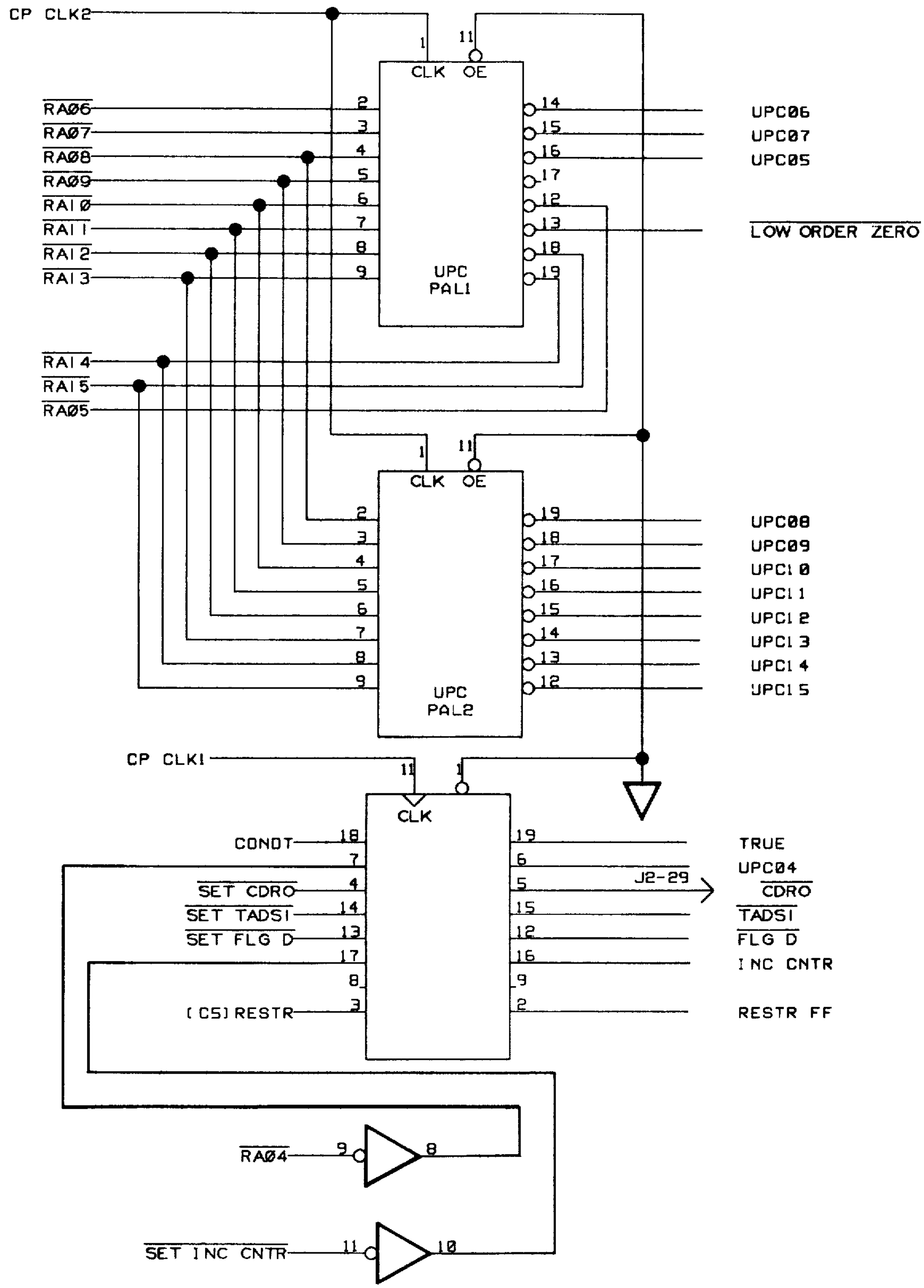

Specific logic circuitry for implementing the micro-sequencer unit 13 as discussed above and shown in the block diagrams of FIGS. 137 and 138 are shown in FIGS. 139–153. Stack logic circuits, including the stack ram 179, the stack multiplexer 189, the stack pointer unit 187 and the top-of-stack unit 180, are specifically shown in FIG. 139. The save-top-of-stack unit 181 is shown in FIG. 140. Address multiplexer 176 is depicted in FIG. 141, while the address save register is shown in FIG. 142 and the address logic 173 for supplying addresses to the microcontrol store 170 is shown in FIG. 143. FIG. 144 depicts the starting microaddress (STμAD) driver unit 172. The imcremented microprogram counter (μPC+1) unit 177 and increment unit 178 are shown in FIG. 145.

Figure 146:
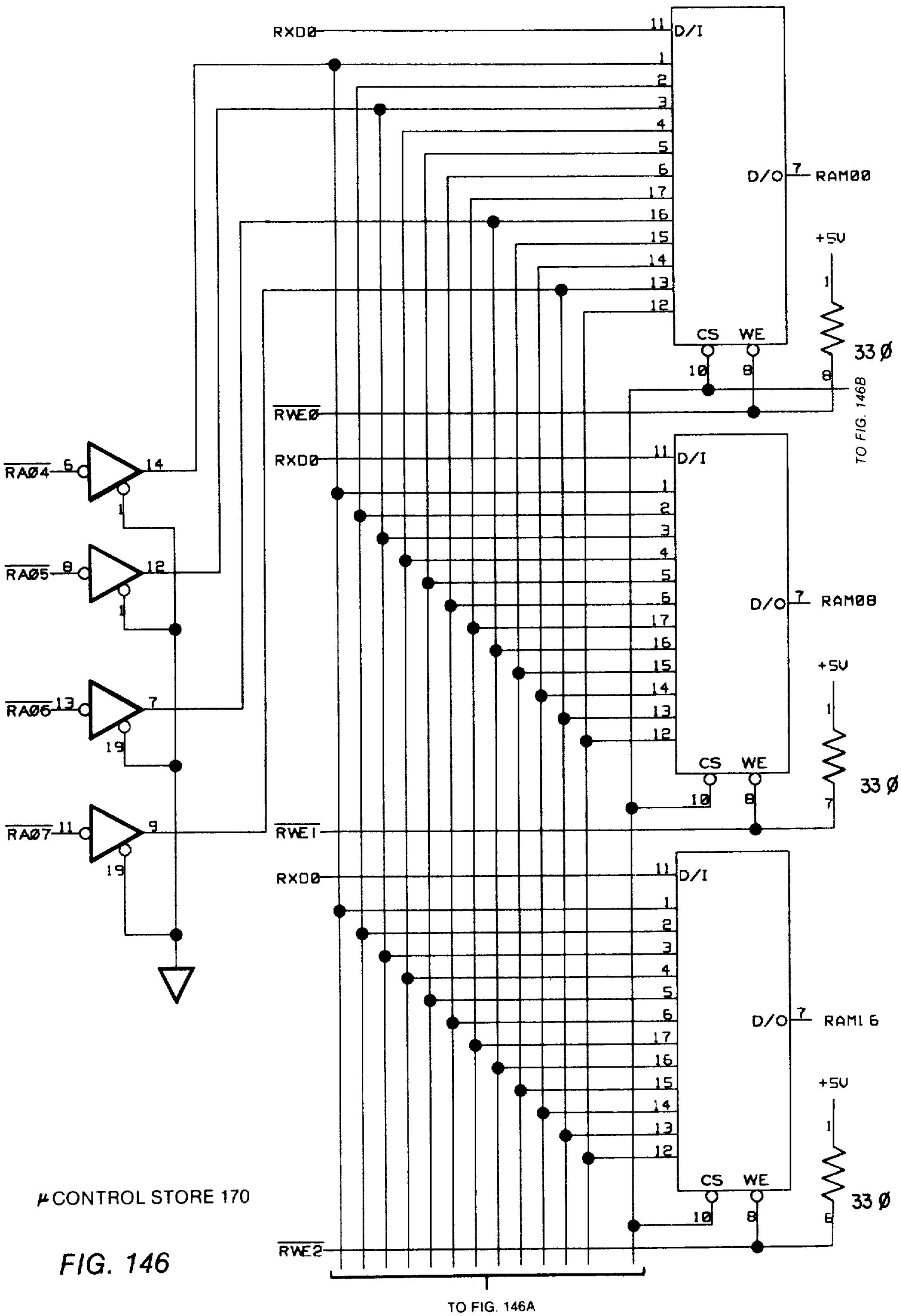
Figure 146A:
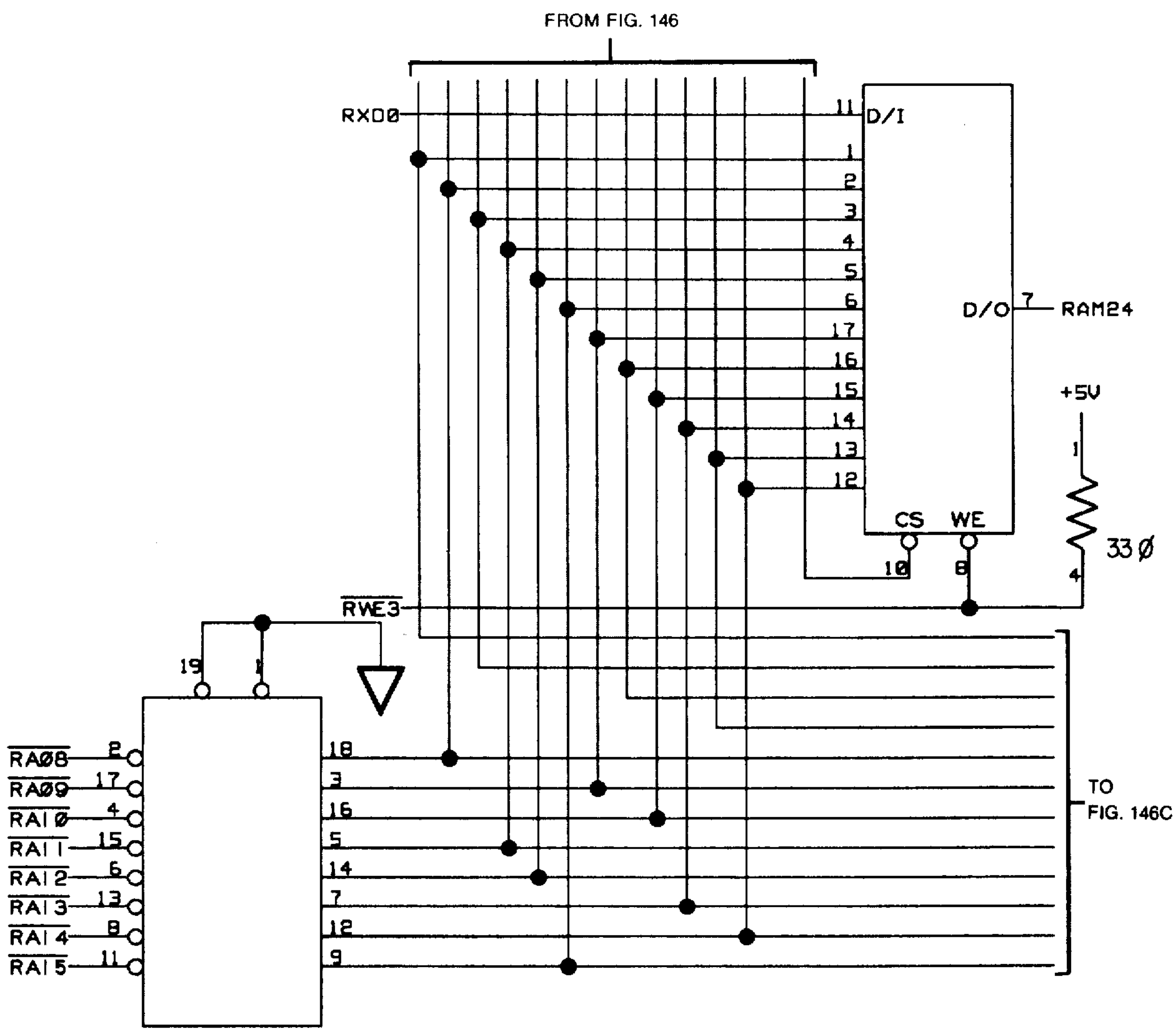
Figure 146B:
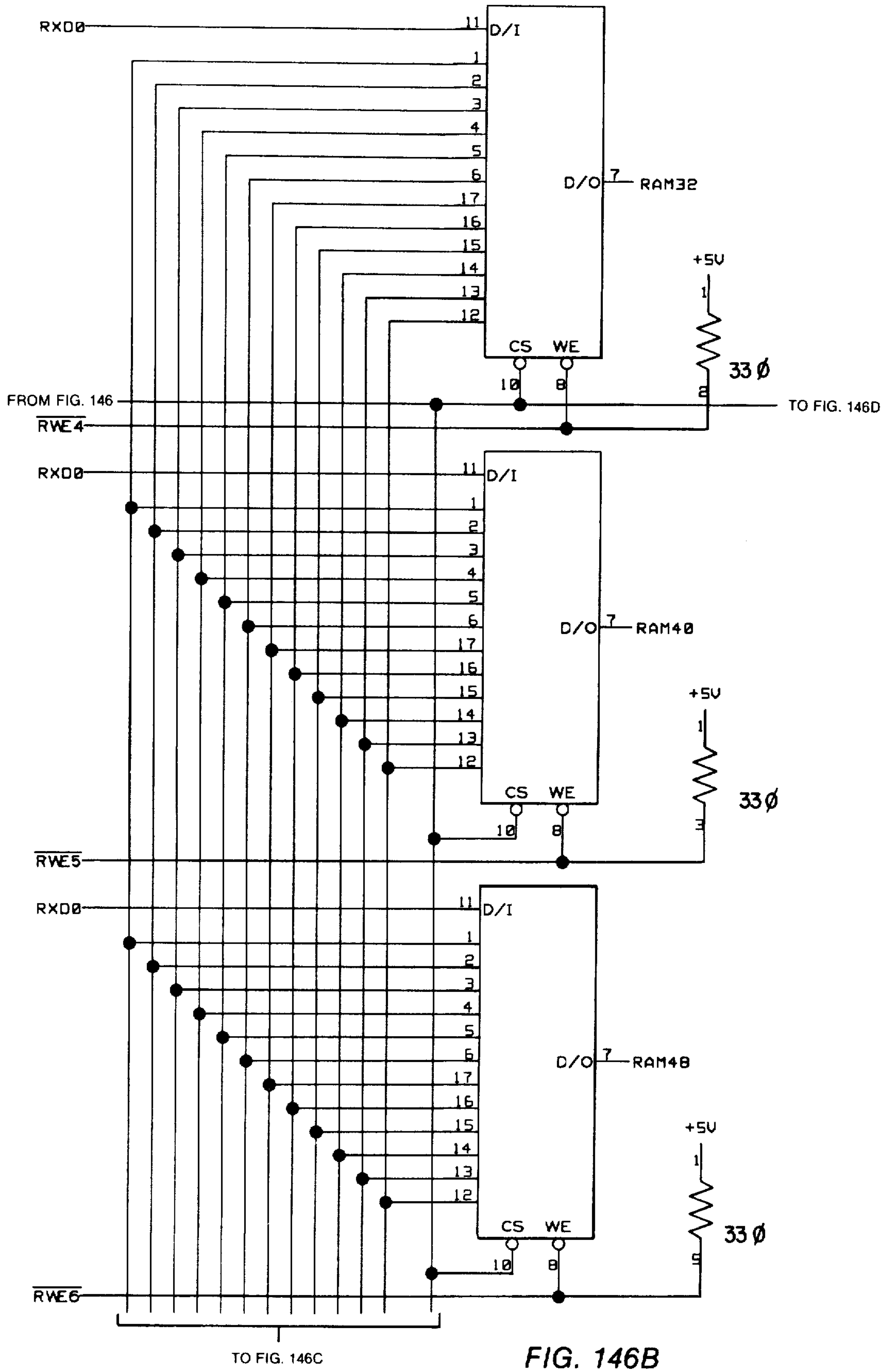
Figure 146C:
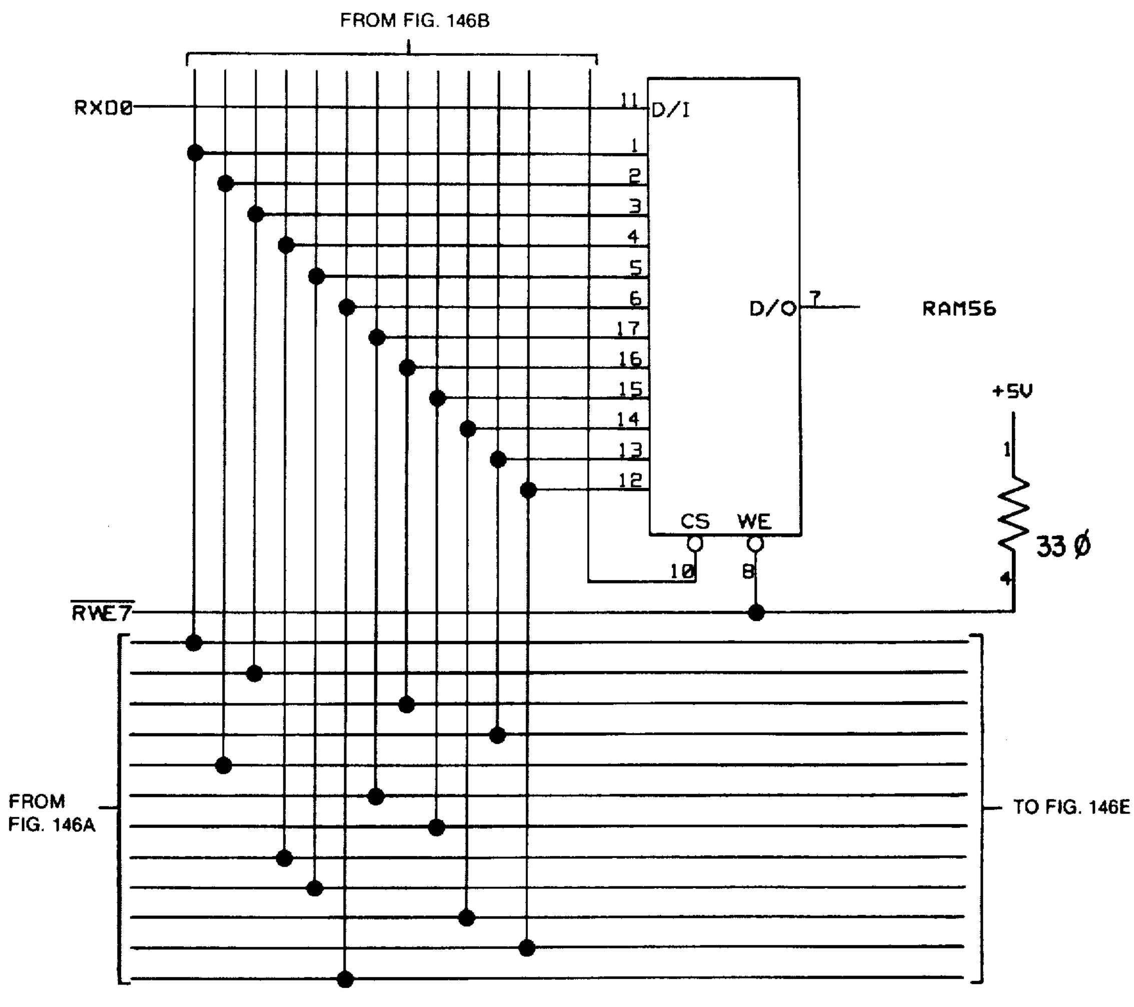
Figure 146D:
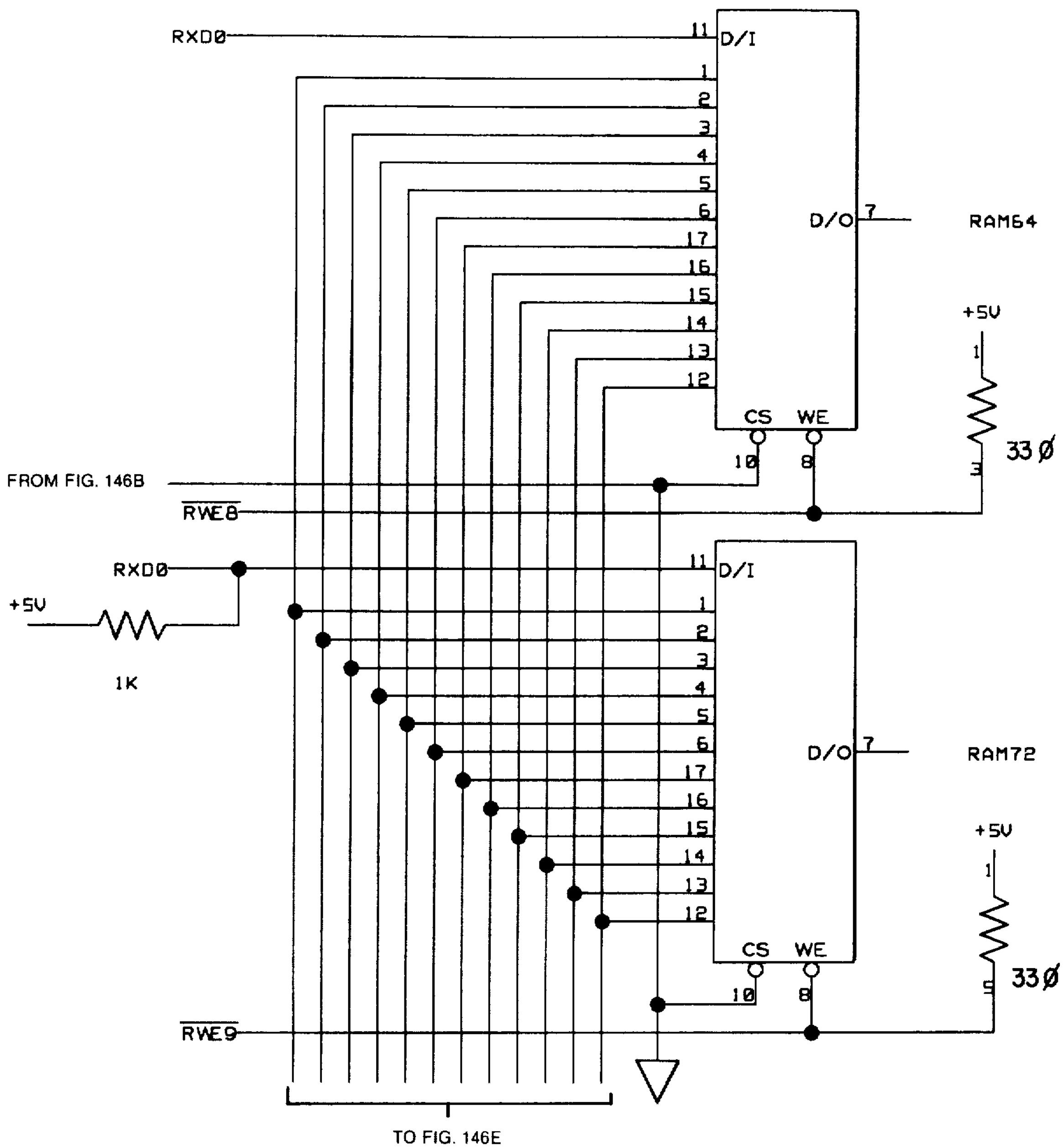
Figure 146E:
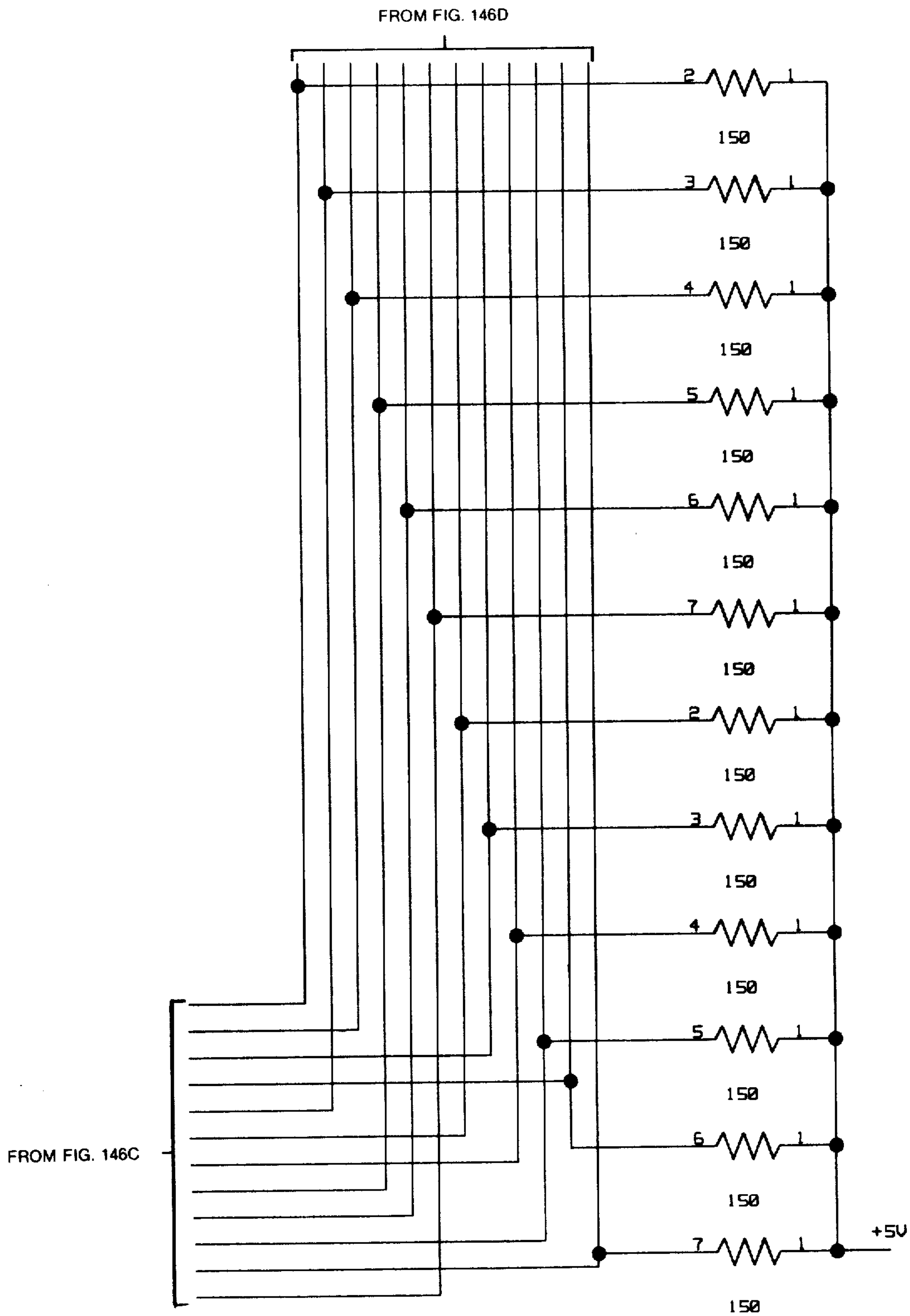
Figure 146F:
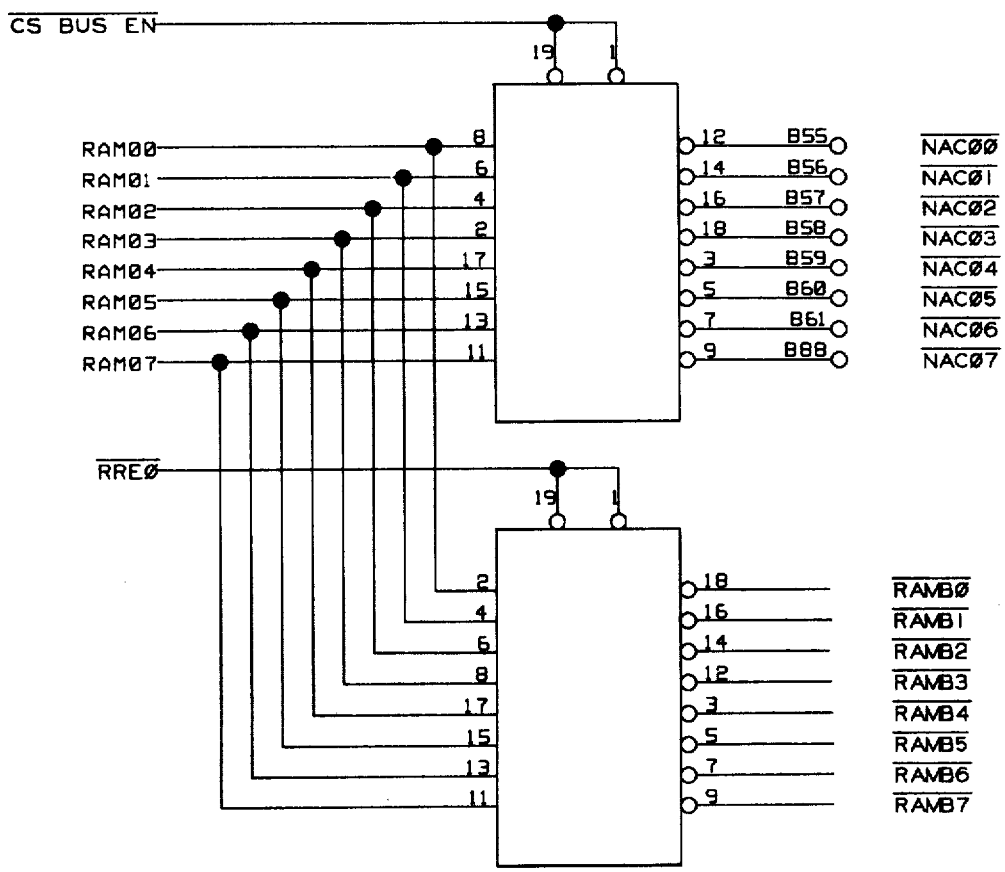
Figure 147:
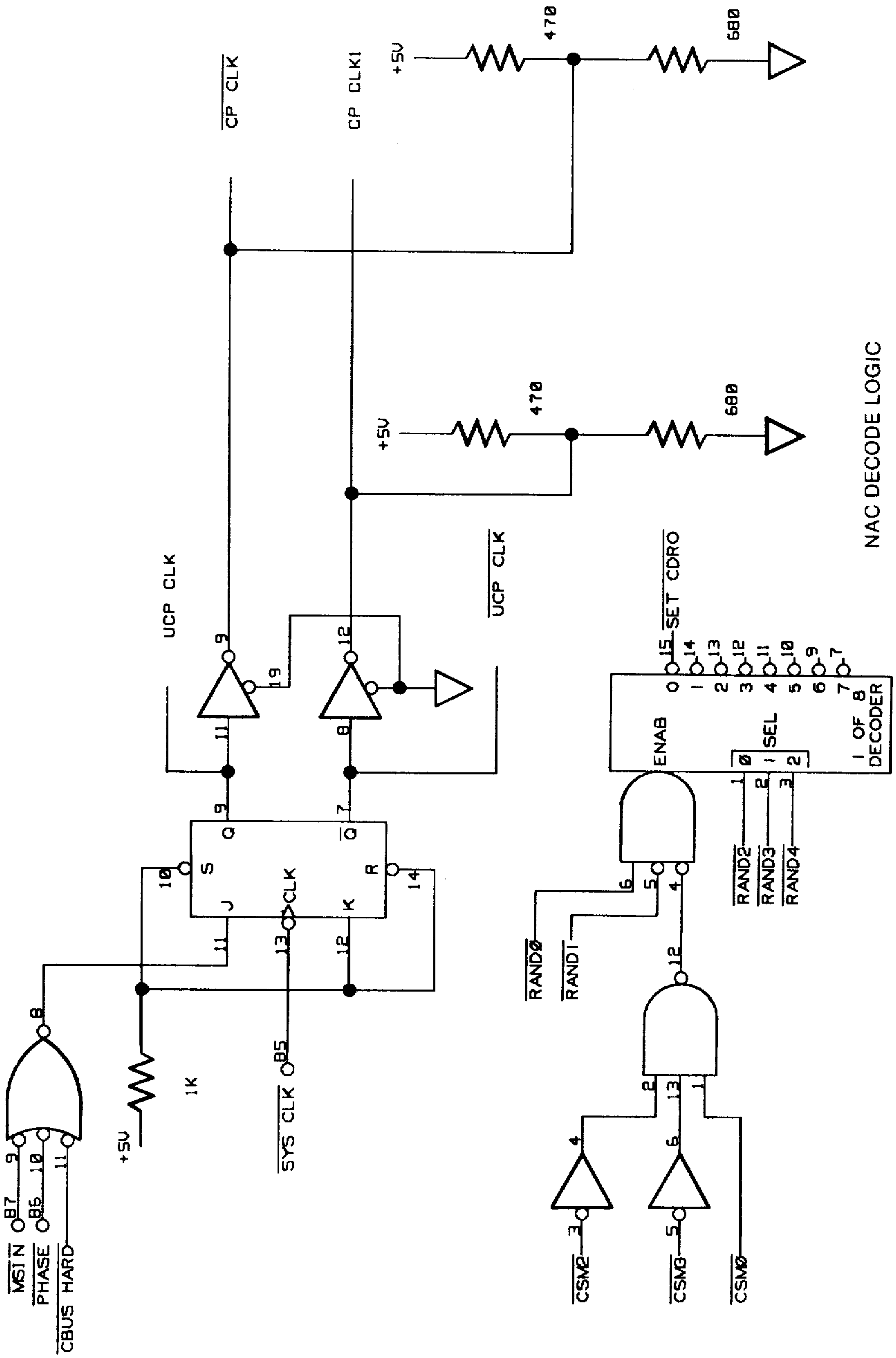
Figure 147A:
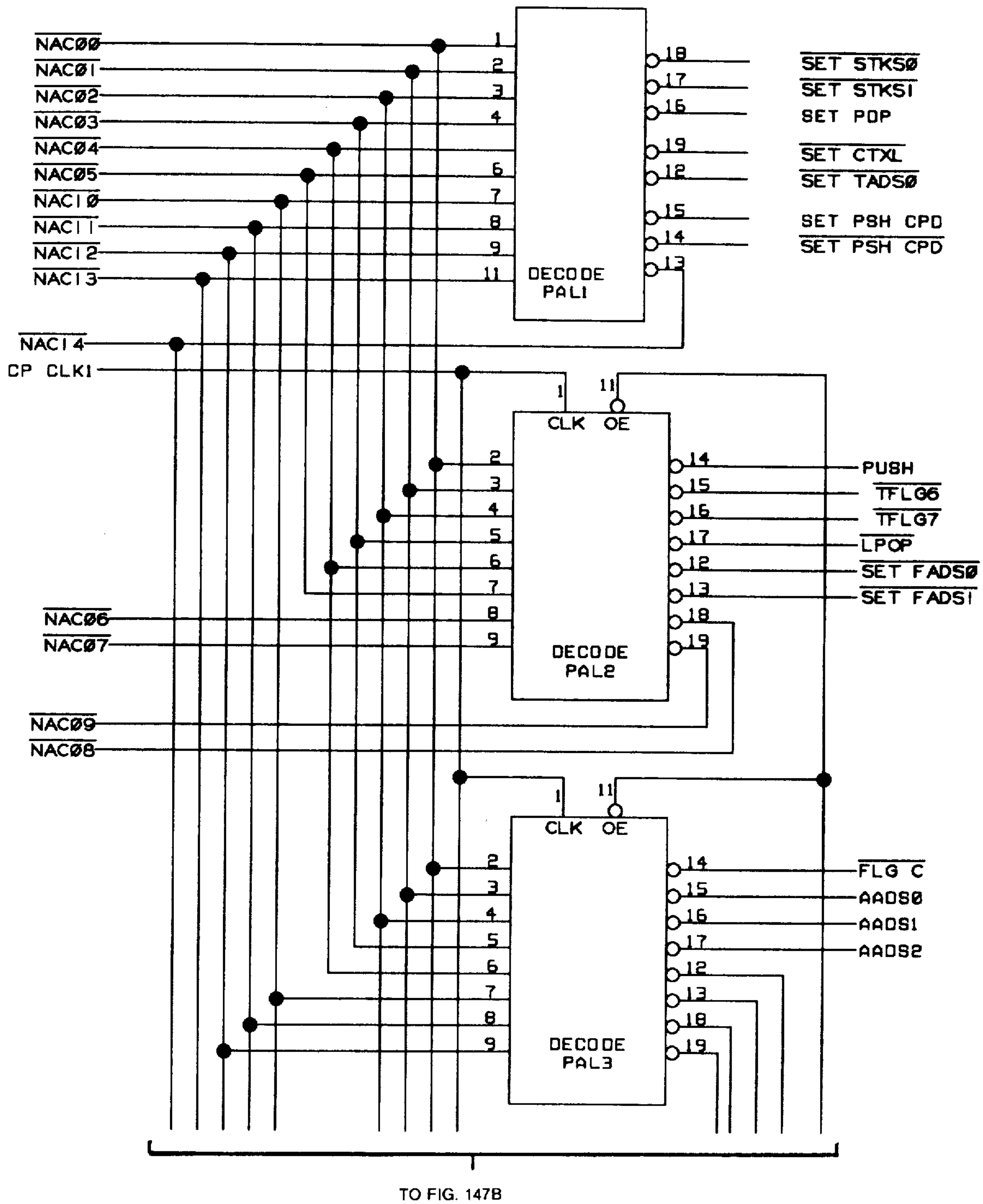
Figure 147B:
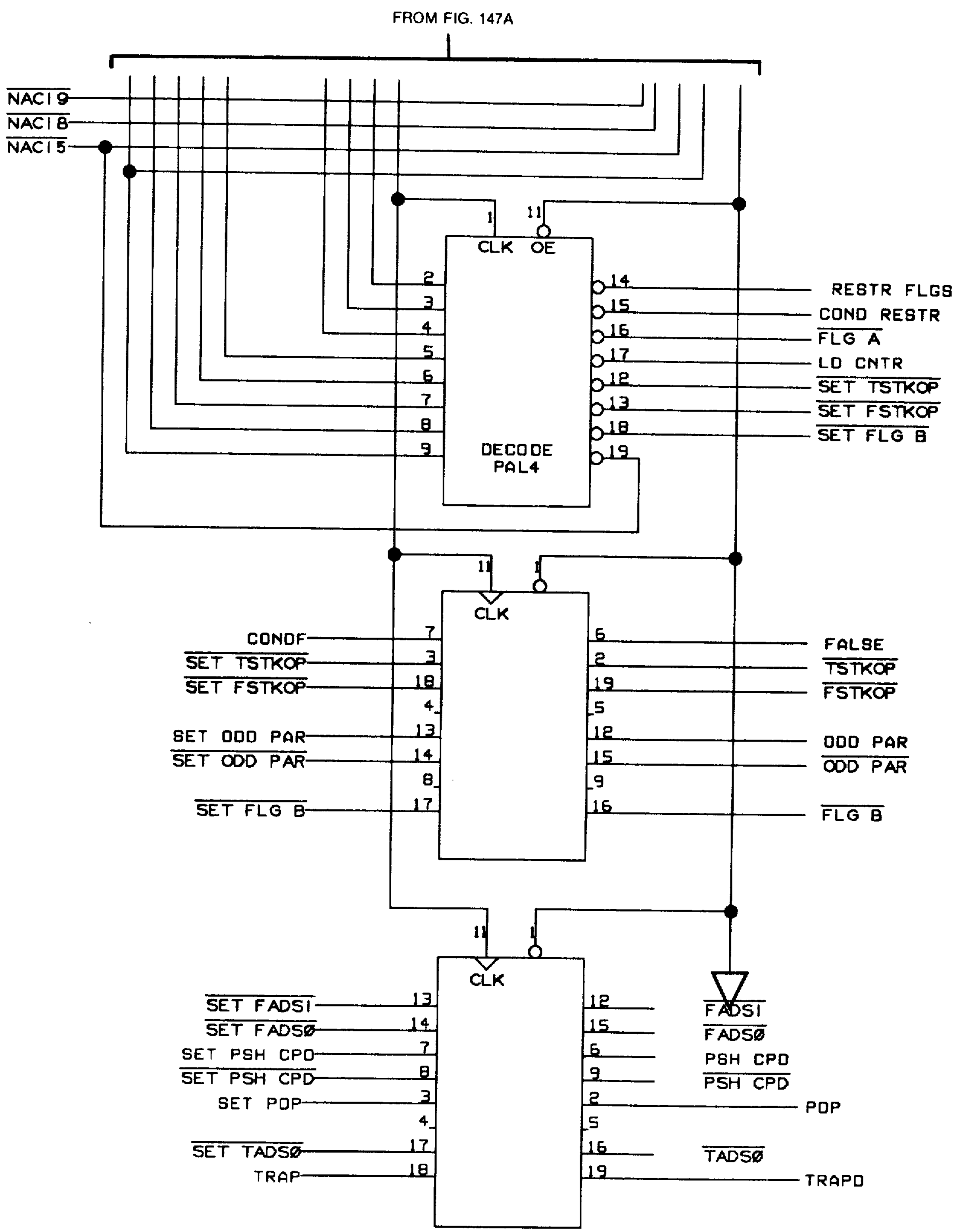
Figure 147C:
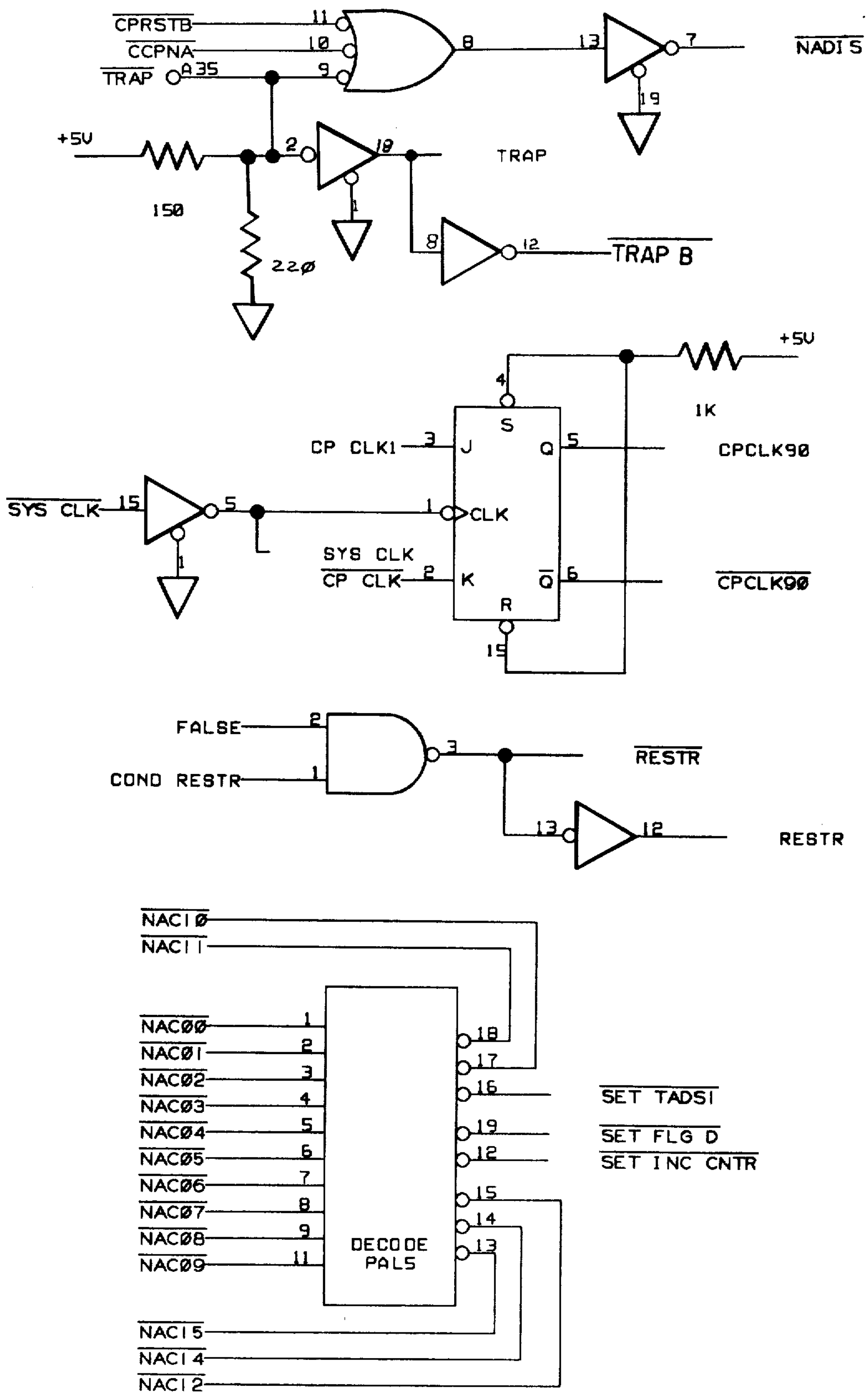
Figure 147D:
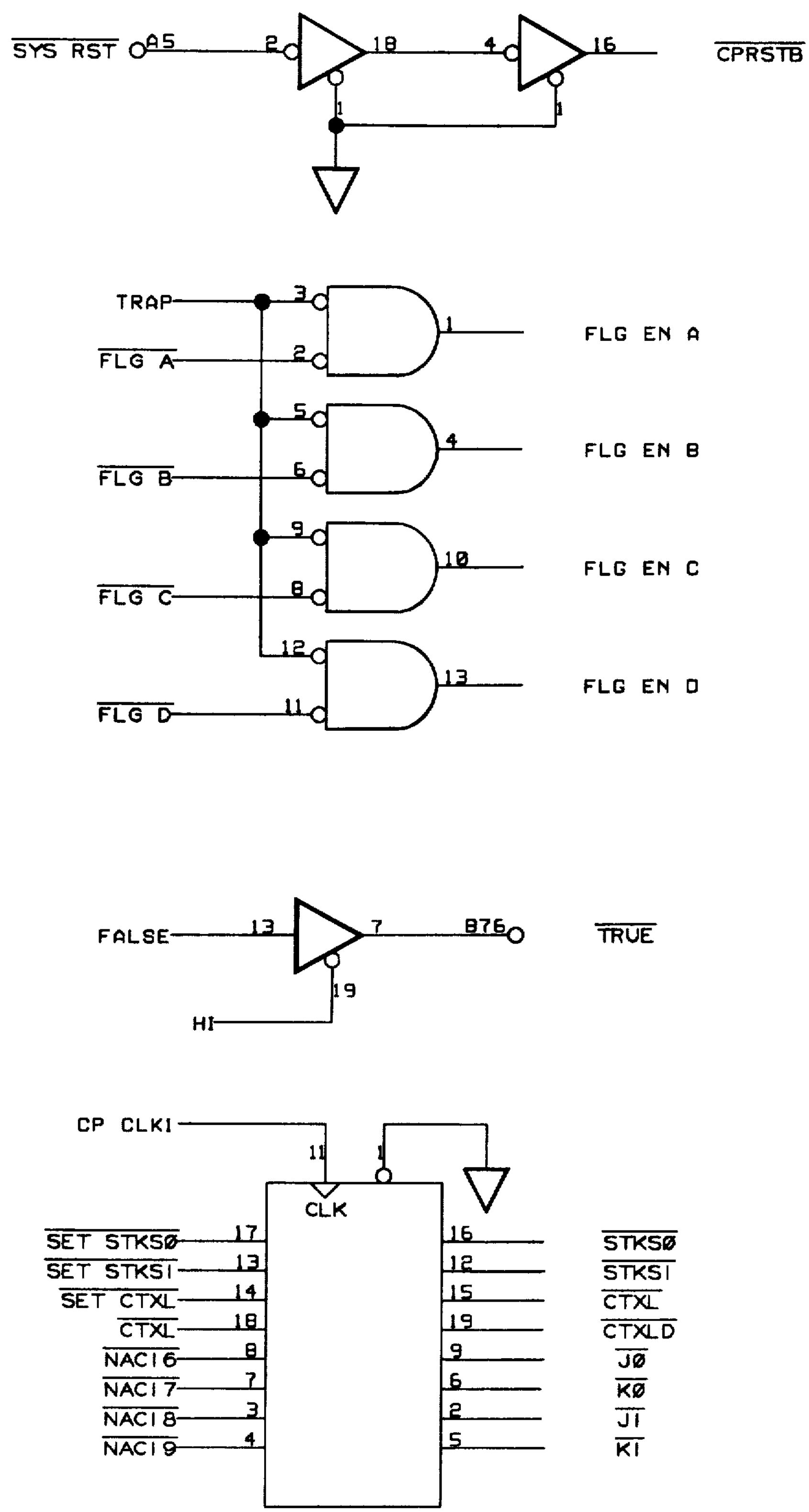
Figure 148:
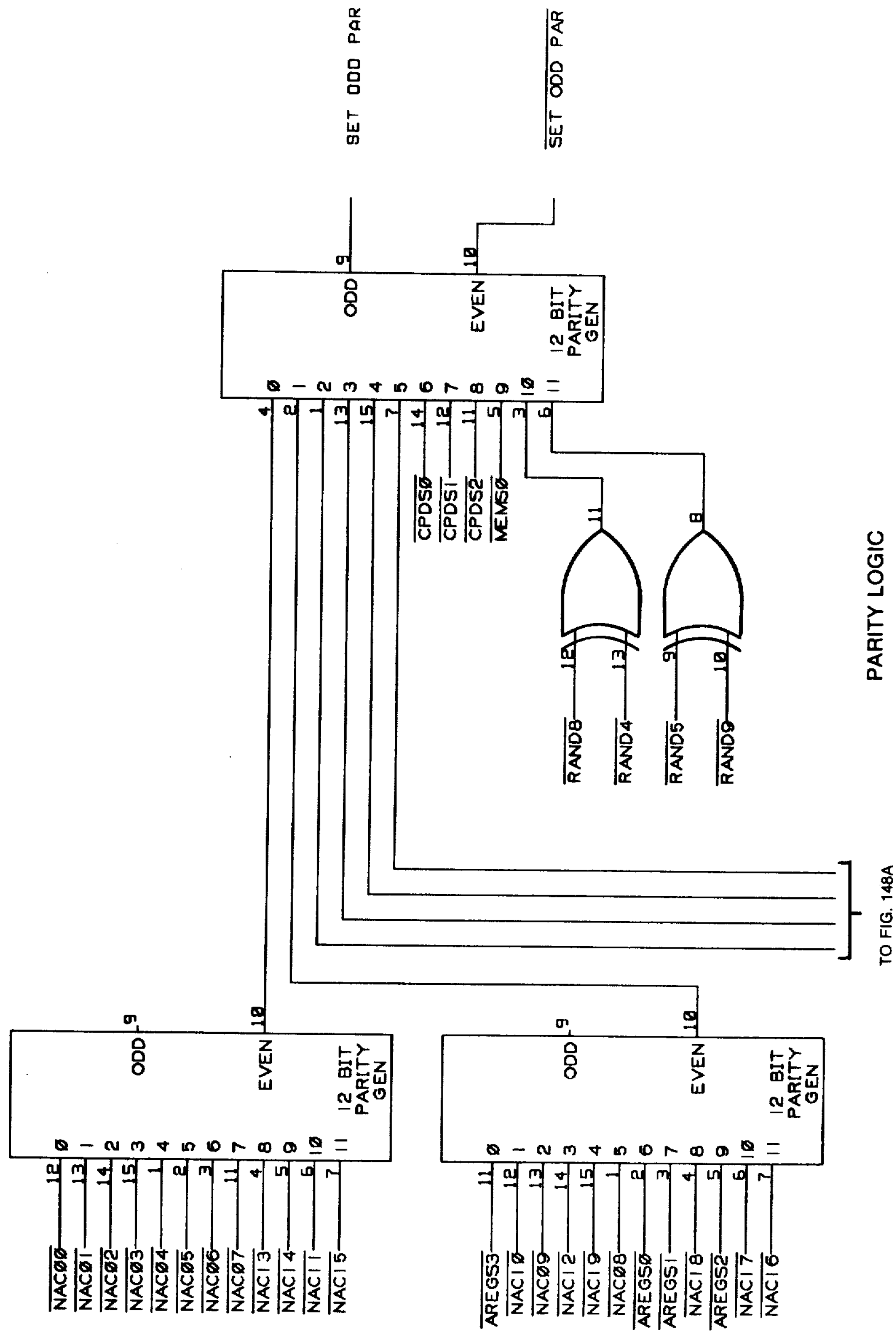
Figure 148A:
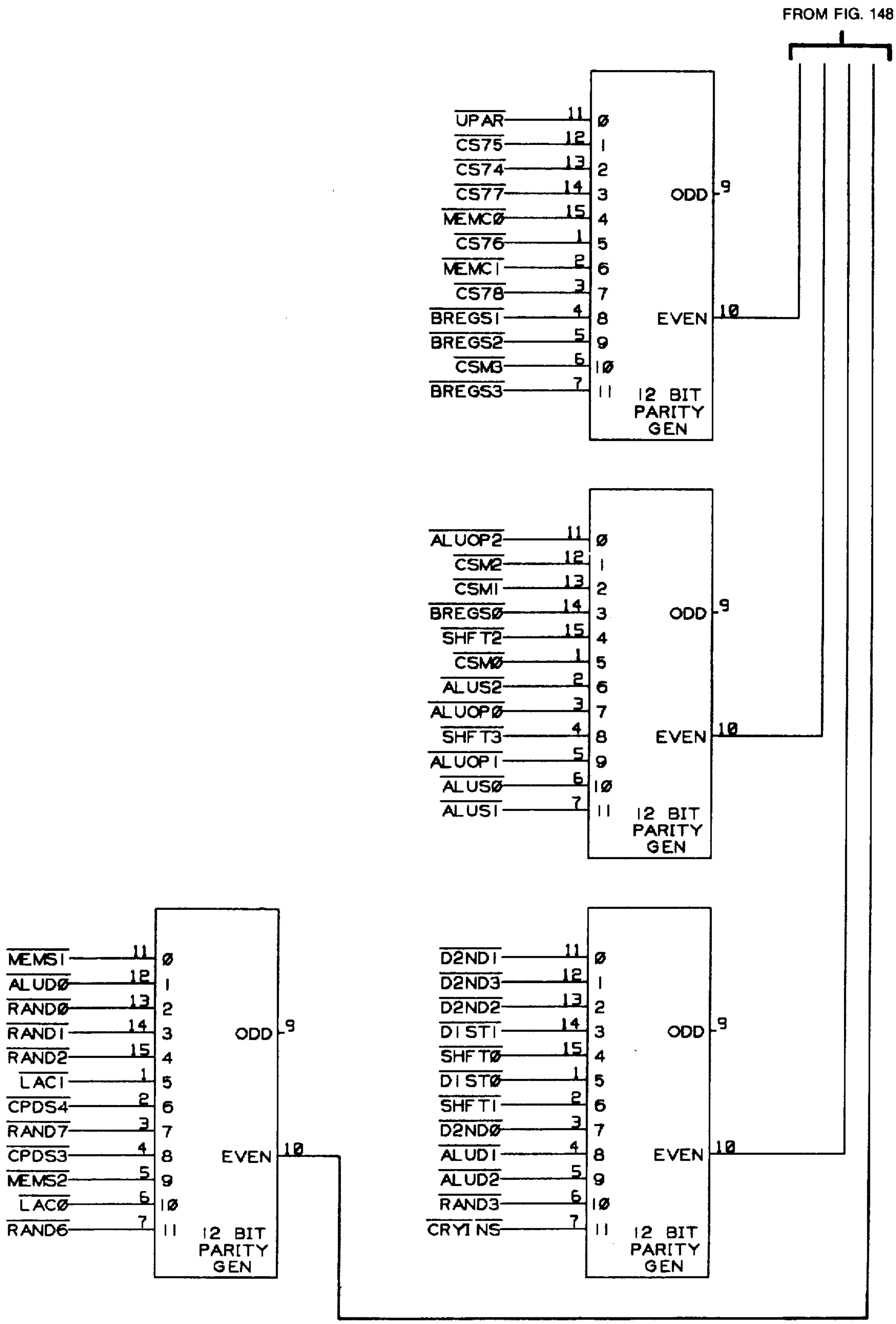

Microcontrol store 170 is specifically depicted in FIG. 146* and the next address control (NAC) decode logic circuitry 175 is specifically shown in FIG. 147. Parity logic is shown in FIG. 148.

*FIGS. 146A–F through FIGS. 146.7A–F

Figure 149:
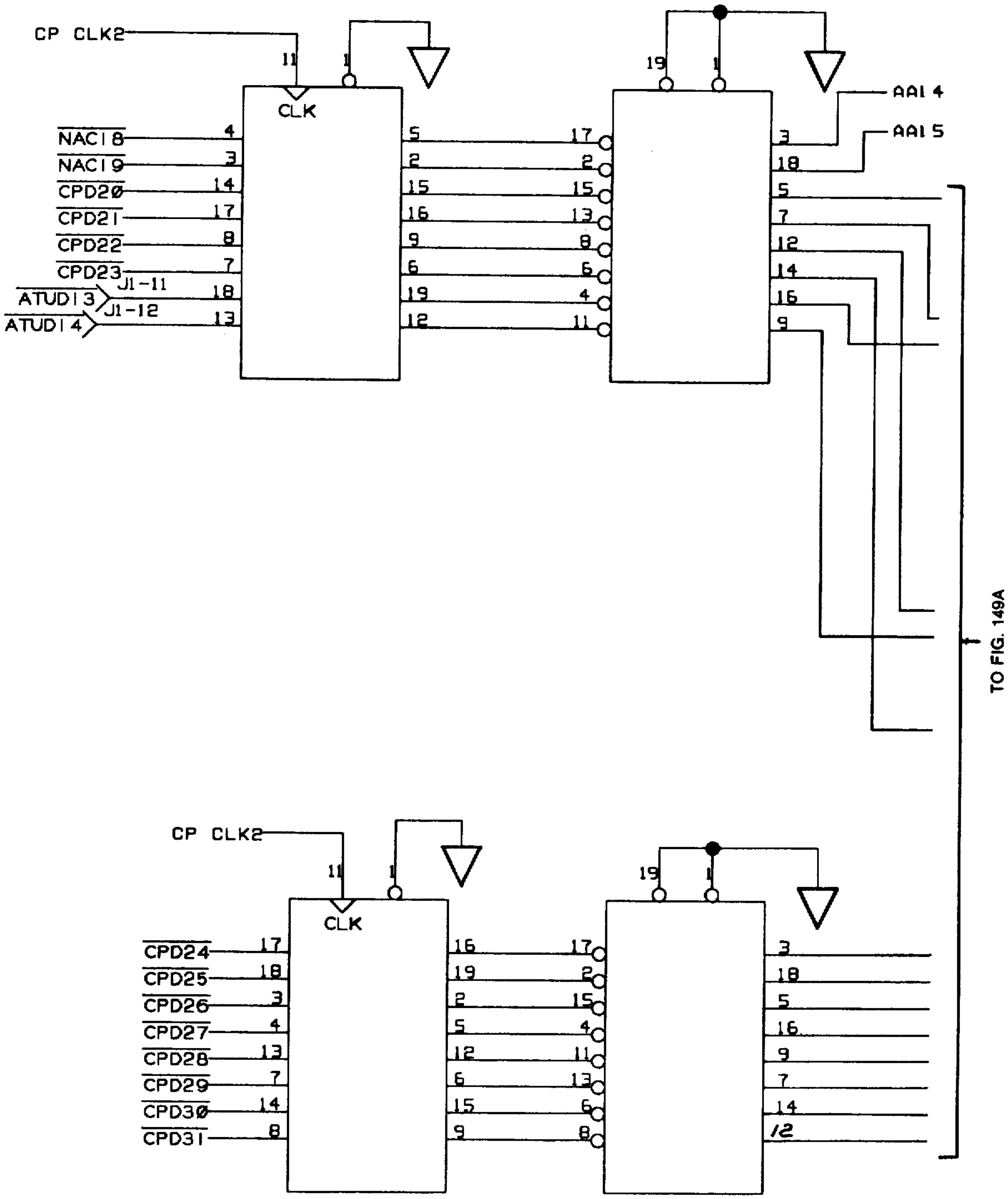
Figure 149A:
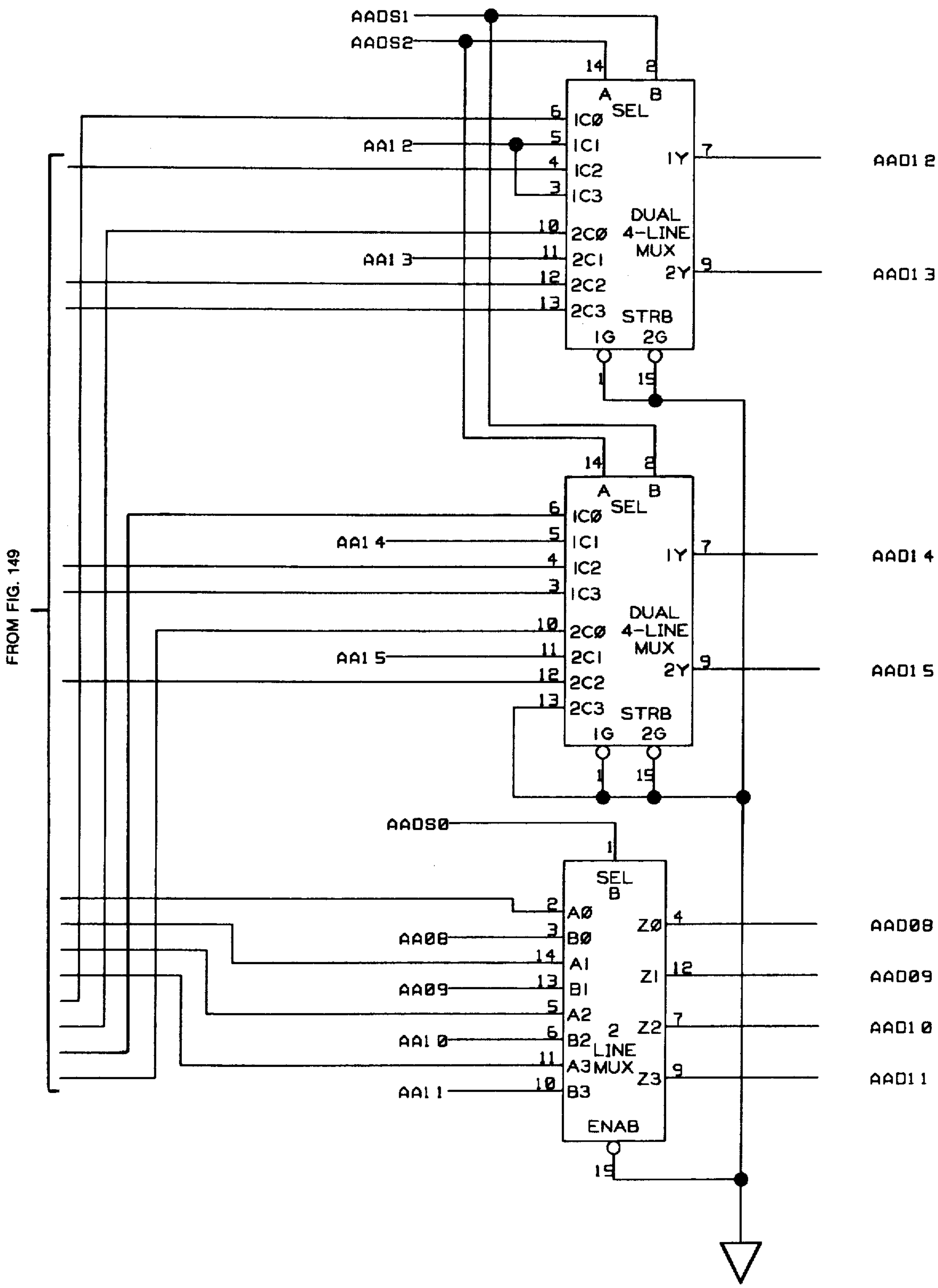
Figure 149B:
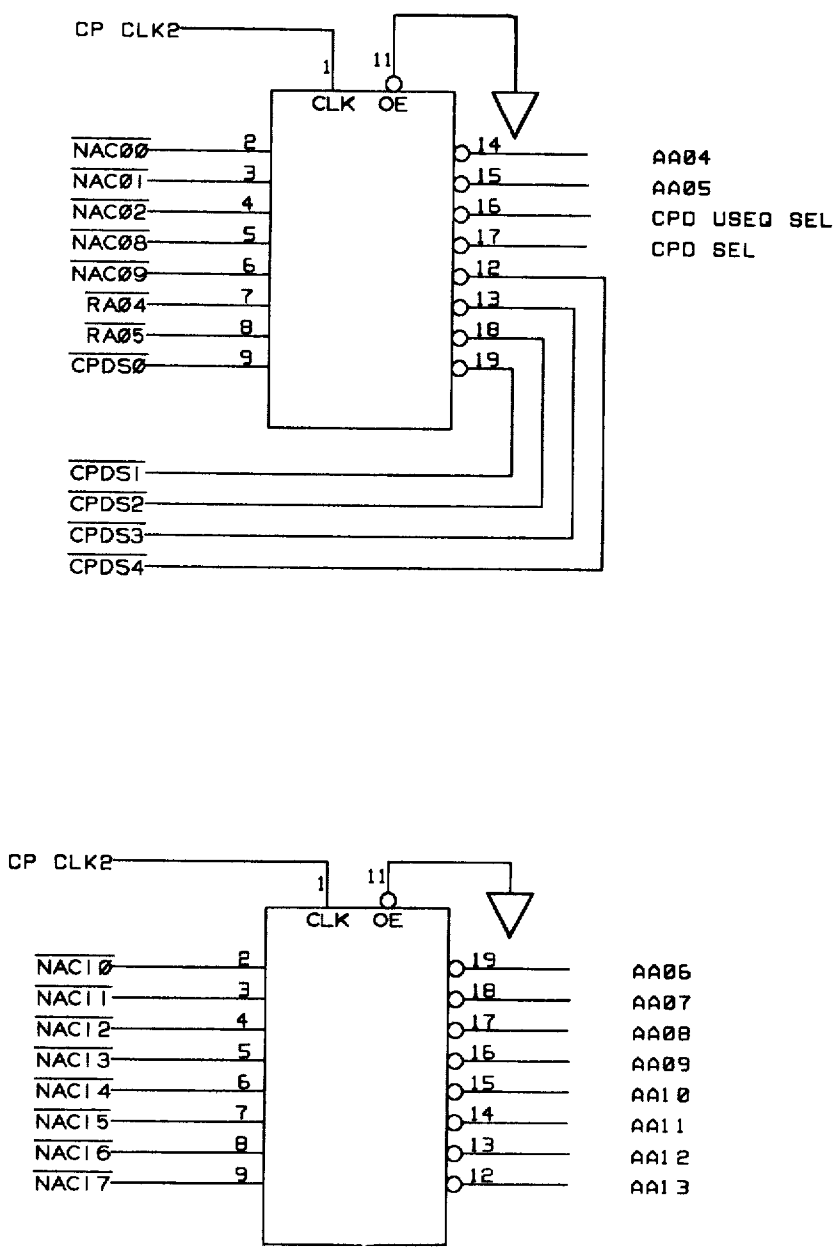
Figure 150:
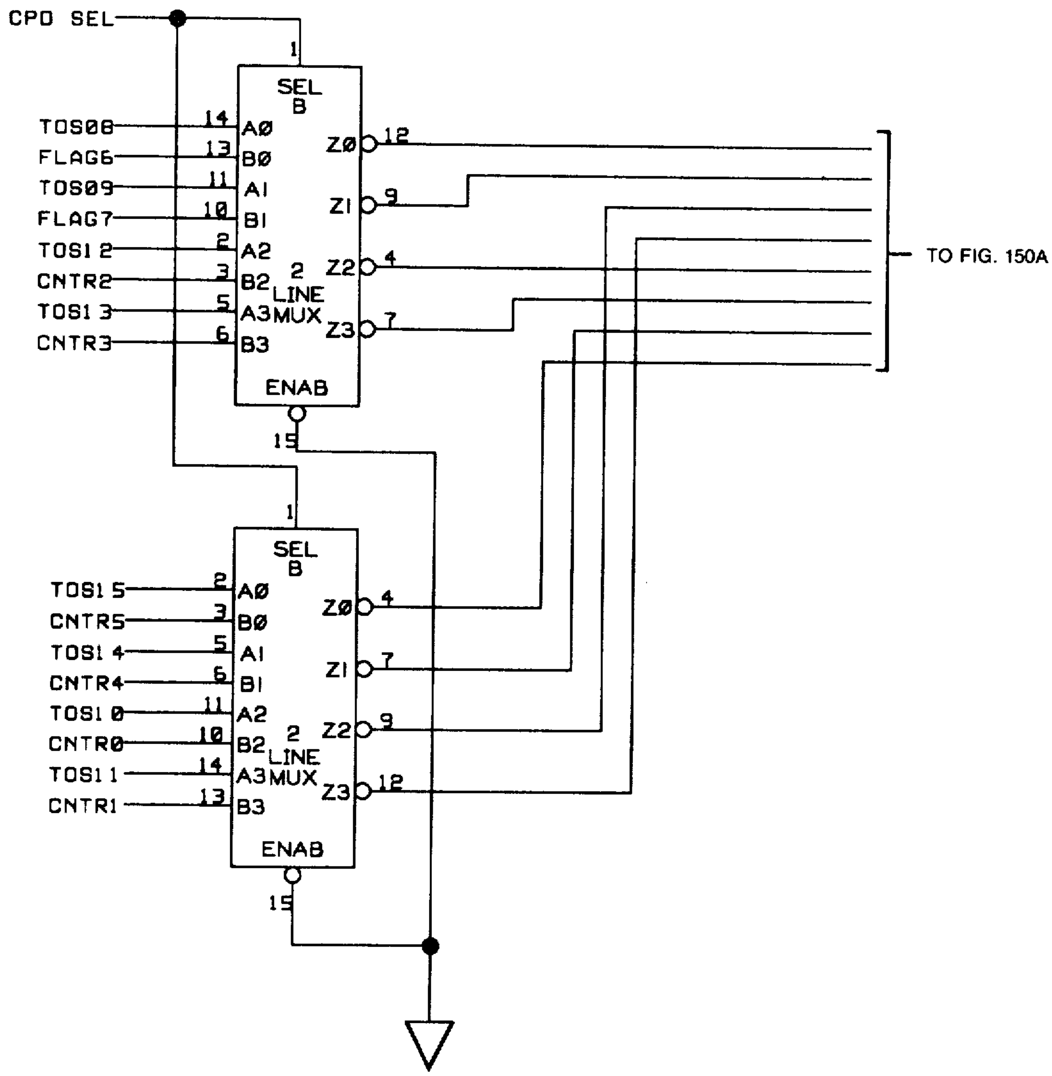
Figure 150A:
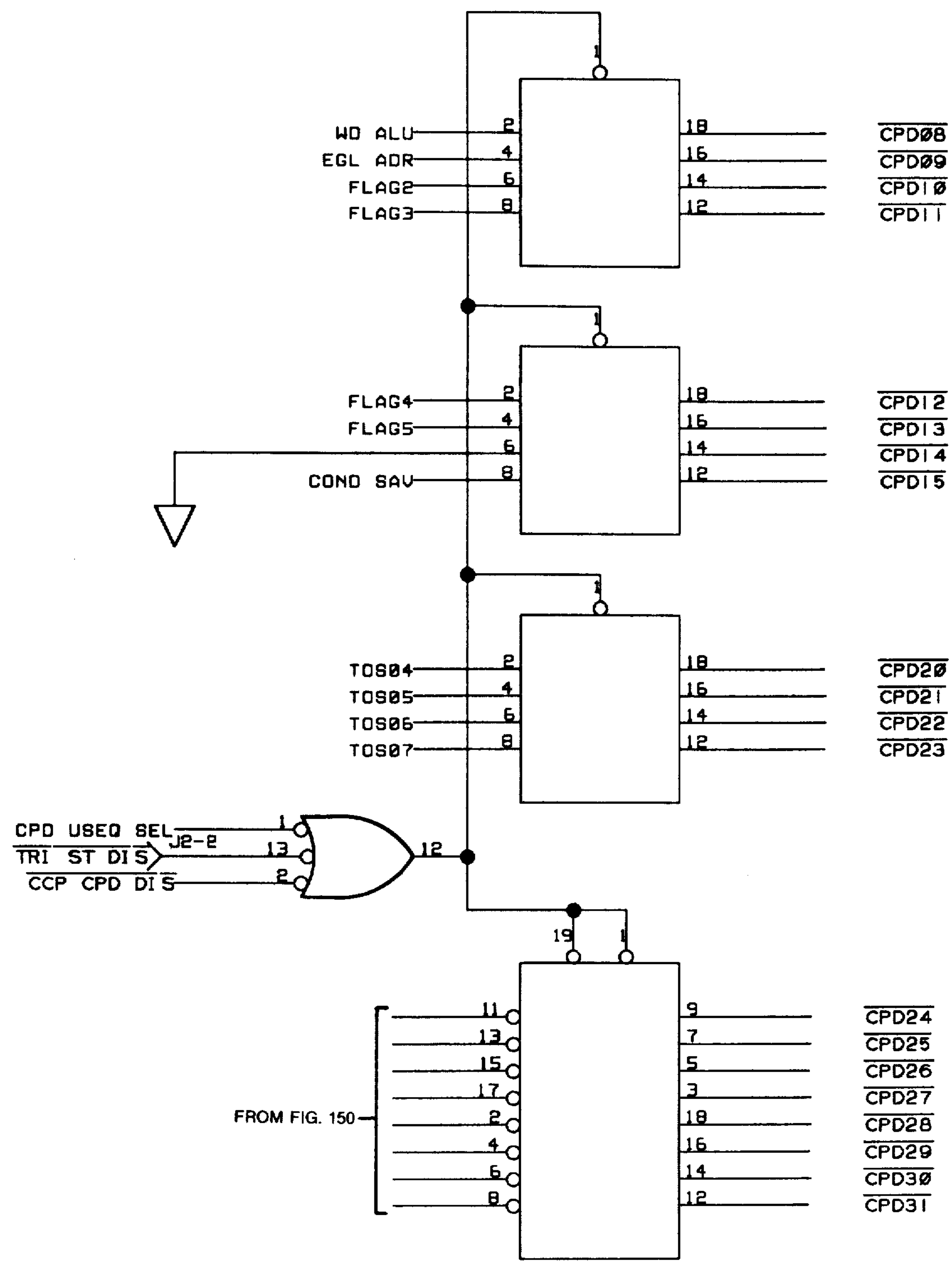
Figure 151:
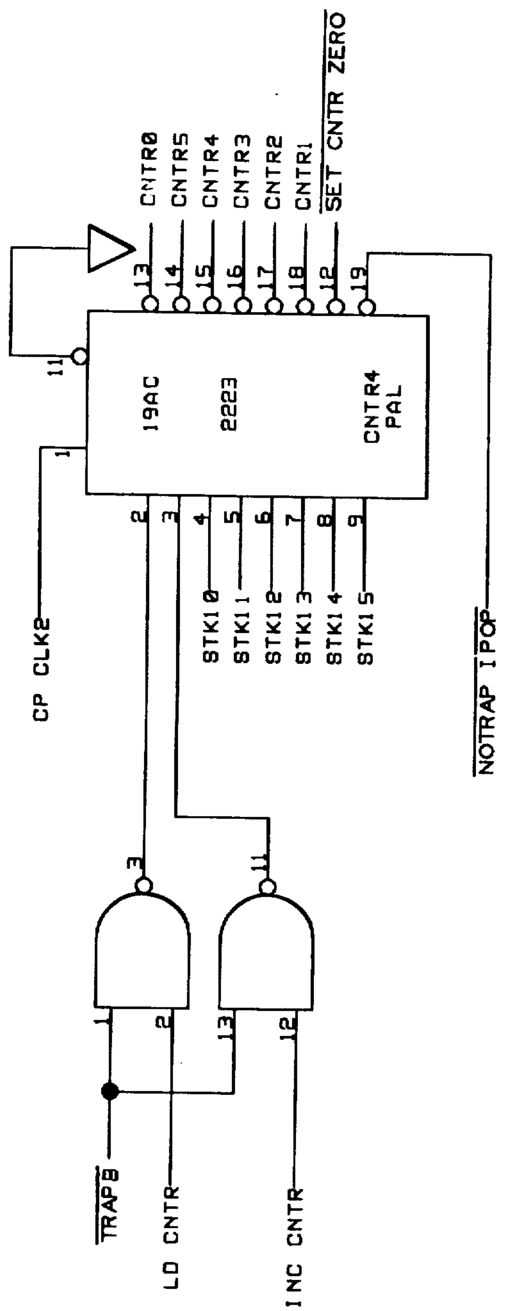
Figure 152:
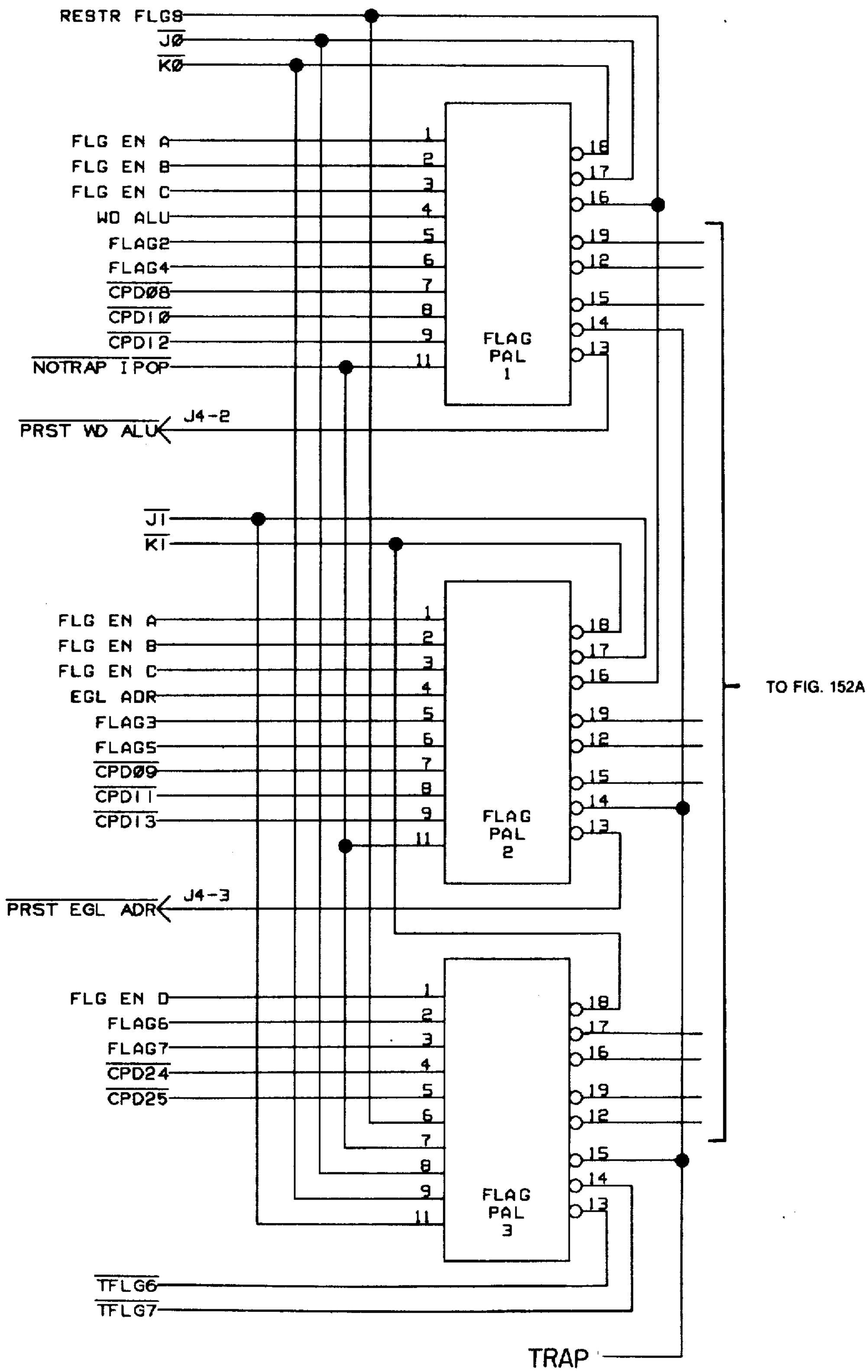
Figure 152A:
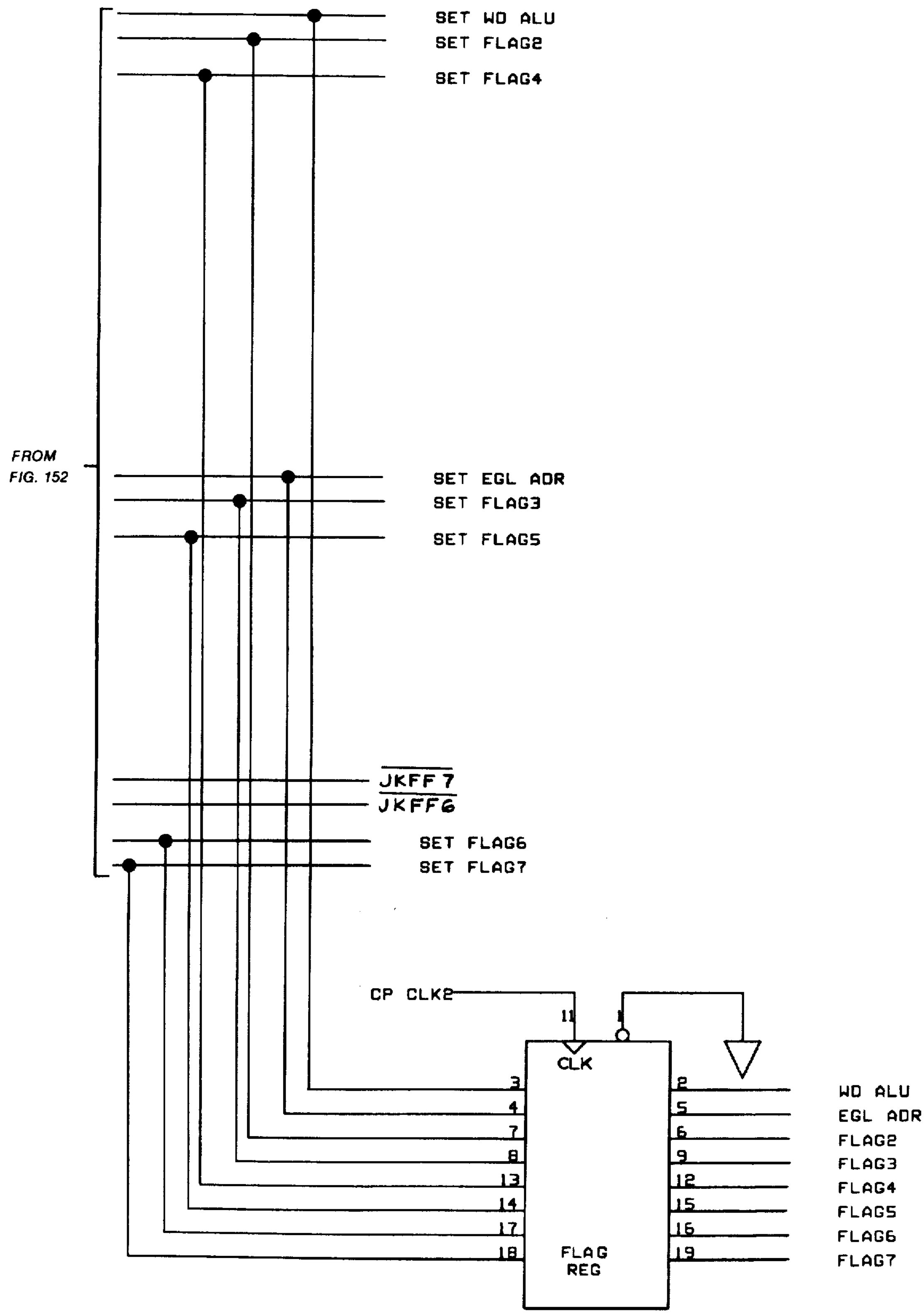

With reference to the decoding and condition test logic circuitry 182, shown particularly in FIG. 138, specific logic circuitry for implementing such circuitry is shown in FIGS. 149–153. Thus, concatenation logic 185 and dispatch multiplexer 186 are depicted in FIG. 149, CPD multiplexer 197 is shown in FIG. 150, 6-bit counter 196 is shown in FIG. 151, 8 flags unit 193 is shown in FIG. 152, and test Ø and test 1 multiplexers 194 together with condition multiplexer 195 and the condition output unit 192 are all shown in FIG. 153.

ARITHMETIC LOGIC UNIT

Figure 153:
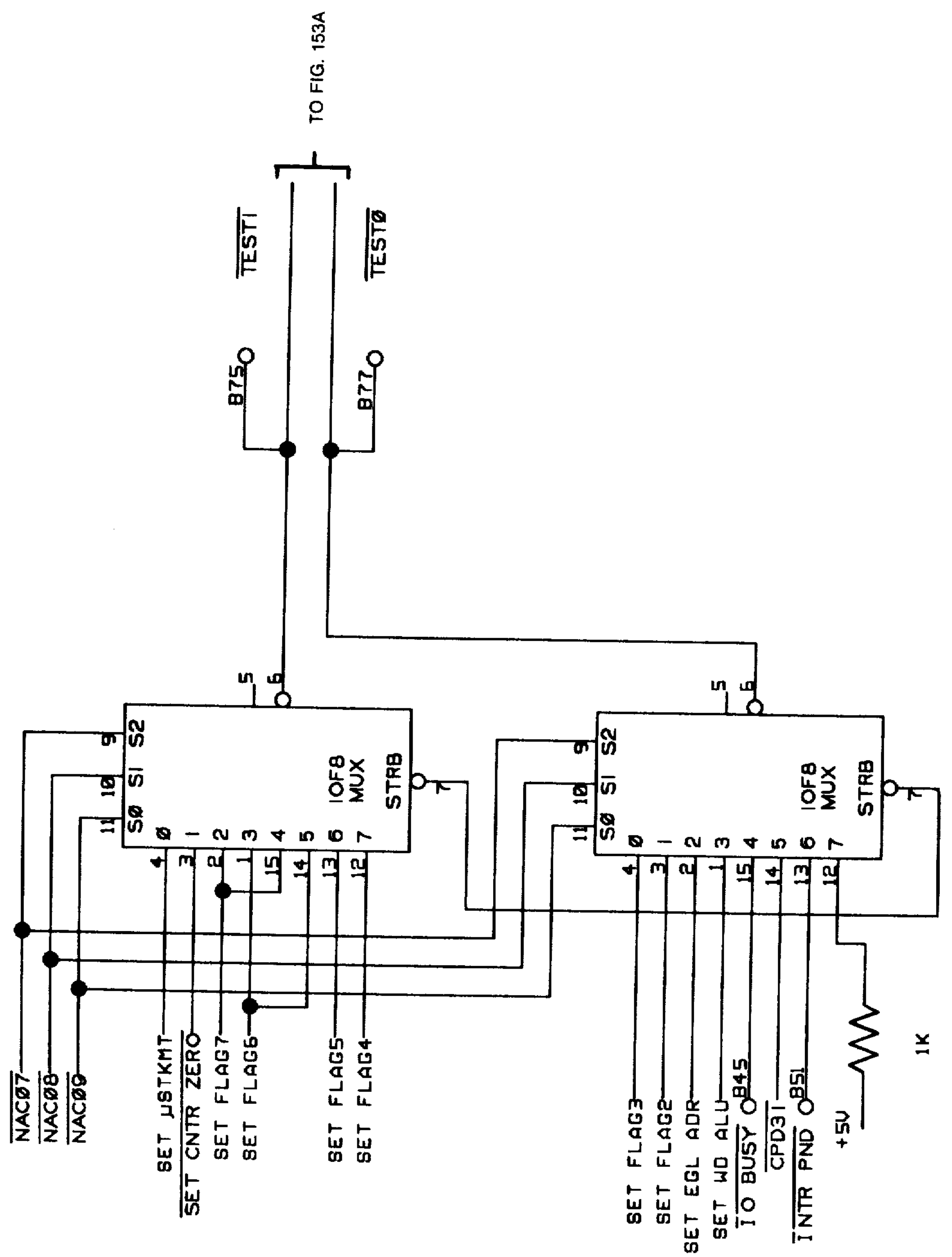
Figure 153A:
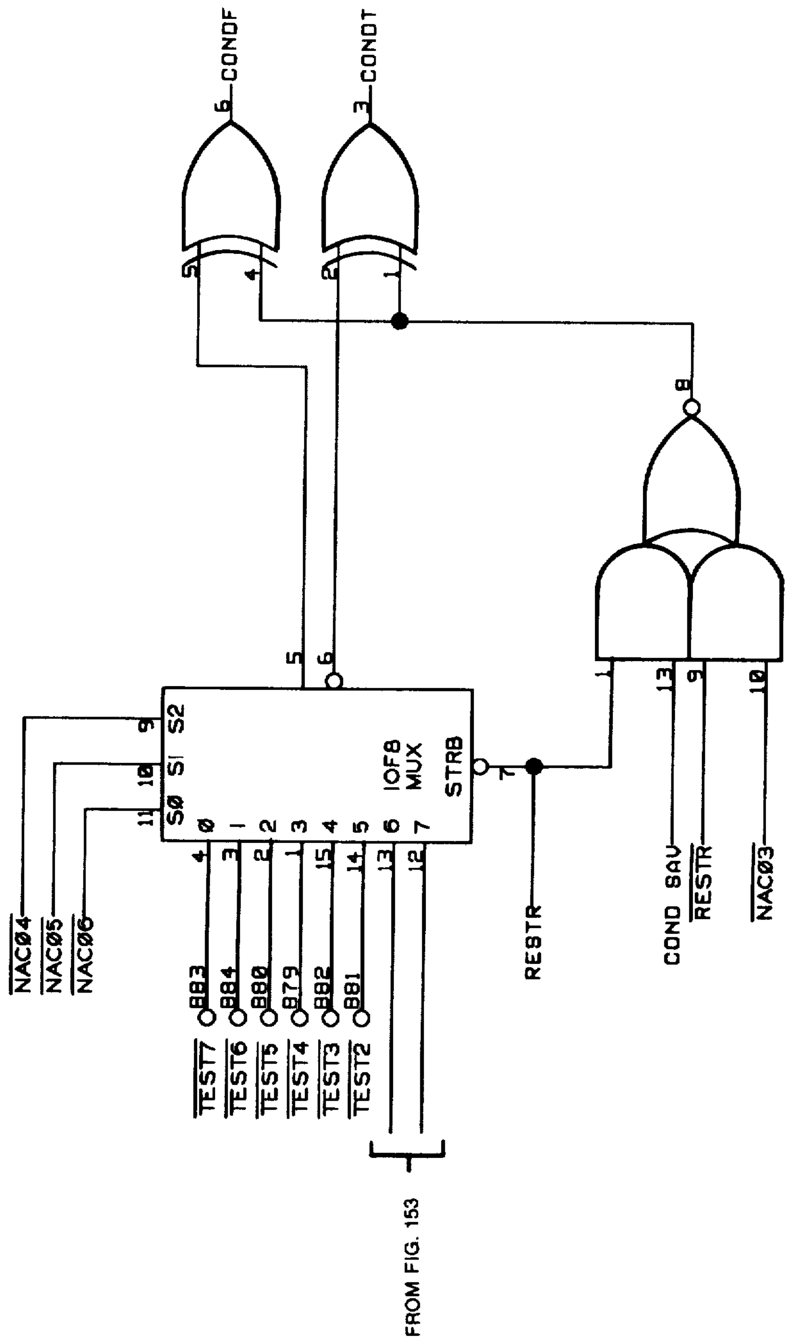

Before discussing in more detail the format of the micro-instruction word, it is helpful to discuss FIG. 153 which shows a block diagram of a typical arithmetic logic unit generally having a configuration known to those in the art. As can be seen therein, the ALU unit 200, which performs the arithmetic and logical operations, has two inputs, identified as inputs R and S, which are supplied from a pair of multiplexers 201 and 202, respectively. The inputs to multiplexer 202 are obtained from the A and B outputs of a register file 203. A third input may be obtained from a source which supplies zeros to the multiplexer at all 31 bit positions (identified as the "Ø" input) and a fourth input may be obtained from Q register 204.

Figure 154:
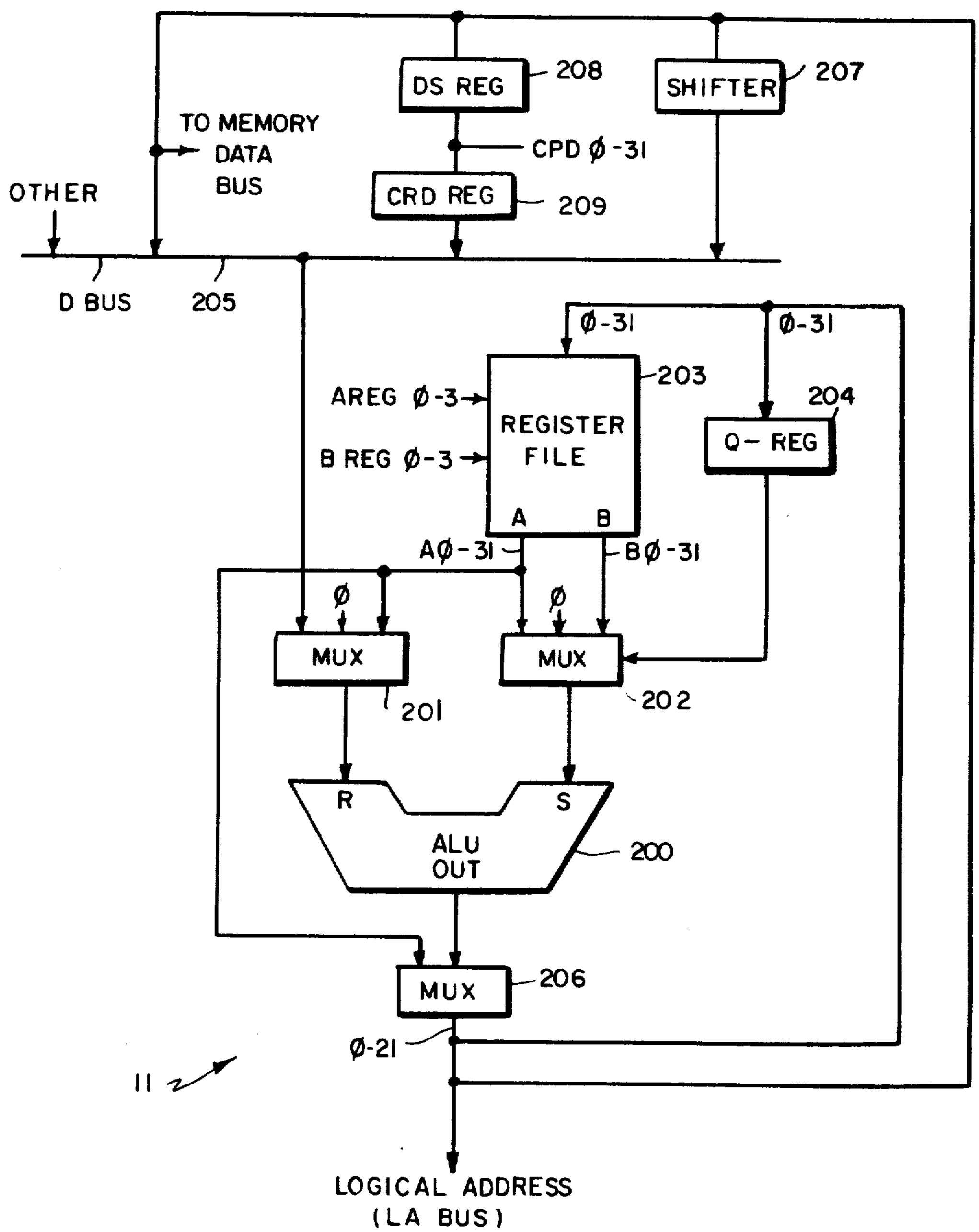
FIG. 154 shows a block diagram of a representative arithmetic logic unit of the system of FIG. 1.

Register file 203 contains 16 and 32 bit registers and includes four fixed point registers (ACCØ–3), four floating point registers (FPACØ–3), and eight general registers (GRØ–7). The selection of the appropriate registers for supplying the A and B inputs to ALU 200 is determined by the AREGØ–3 and BREGØ–3 bits of the micro-instruction field, as discussed in more detail below. The inputs to multiplexer 201 are obtained from the A output of the register file, from the D-bus 205 or from an all zeros input, as discussed with reference to multiplexer 202. The output of ALU 200 is supplied to a multiplexer 206 which selects either the output from ALU 200 or an output directly supplied from the A terminal of register file 203. The output of multiplexer 206 can be supplied to the logical address bus if the calculation is an address calculation, to the register file 203 for writing back into a selected register therein, to Q register 204 or to a plurality of other units on the arithmetic logic board, significant exemplary ones of which are identified as shifter units 207, a data store register 208 or directly to the D-bus 205 or to the memory data bus. The shifter outputs are supplied to the D-bus, while the data store register 208 supplies data to the CPD bus or to the D-bus via CPD register 209. Data supplied to the D-bus can then be used in subsequent arithmetic or logic operations via multiplexer 201. Other sources of the system may also supply data to D-bus 205, if desired. The general configuration of the arithmetic logic unit board 11, as shown in FIG. 154, is helpful in understanding the micro-instructions which are discussed below.

MICRO-INSTRUCTION FORMAT

As discussed above with reference to the micro-sequencer unit 13, the micro-control store 170 thereof supplies a micro-instruction of 80 bits, the format thereof being depicted below.

| | | | | | | | | |
|---|---|---|---|---|---|---|---|---|
| NAC | AREGS | BREGS | CSM | DIST | D2ND | SHFT | ALUS | ALUOP |
| 20 | 4 | 4 | 4 | 2 | 4 | 4 | 3 | 3 |
| ALUD | CRYINS | RAND | LAC | CPDS | MEMS | MEMC | FREE | UPAR |
| 3 | 1 | 10 | 2 | 5 | 3 | 2 | 5 | 1 |

The overall format comprises eighteen fields, one field of which has five bits available as reserve bits for future use. The seventeen fields which are utilized are described below.

The Next Address Control Field (NACØ–19)

As discussed above with reference to the micro-sequencer structure and operation, the first 20 bits of the micro-instruction format comprise the field for controlling the selection of the address for the next micro-instruction which address is either a "conditional" address, i.e. an address the selection of which is dependent on whether a specified condition which is tested is either true or false, or an "unconditional" address, i.e., an address which is selected independently of any conditions.

The NAC field of the micro-instruction for selecting a conditional address carries with it a 6 bit test field which identifies which of up to 64 conditions must be tested to determine whether a specified condition is true or false. The basic format of the NAC field for selecting a conditional address is shown below:

| UP | POL | TEST | PA |
|---|---|---|---|
| 3 | 1 | 6 | 10 |

The conditions which can be tested may relate to conditions with respect to operations of the arithmetic logic unit, the address translation unit, the instruction processor, the micro-sequencer unit itself or input/output (I/O) conditions. As an example of typical conditions, Appendix C lists 53 conditions which can be tested in the particular system design described herein, involving tests relevant to the ALU, ATU, IP and micro-sequencer units, as well as certain I/O tests.

Figure 33:
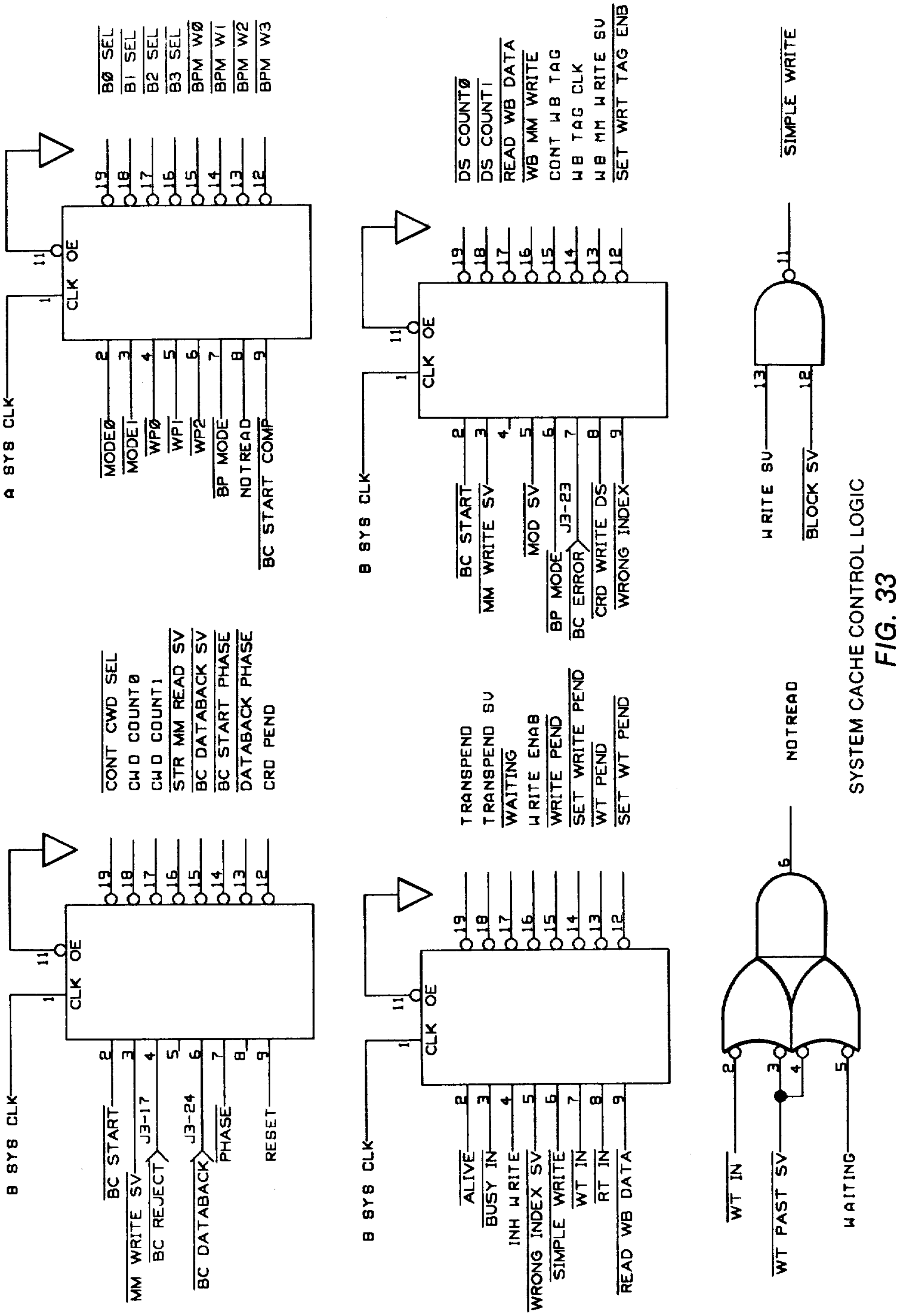
Figure 34:
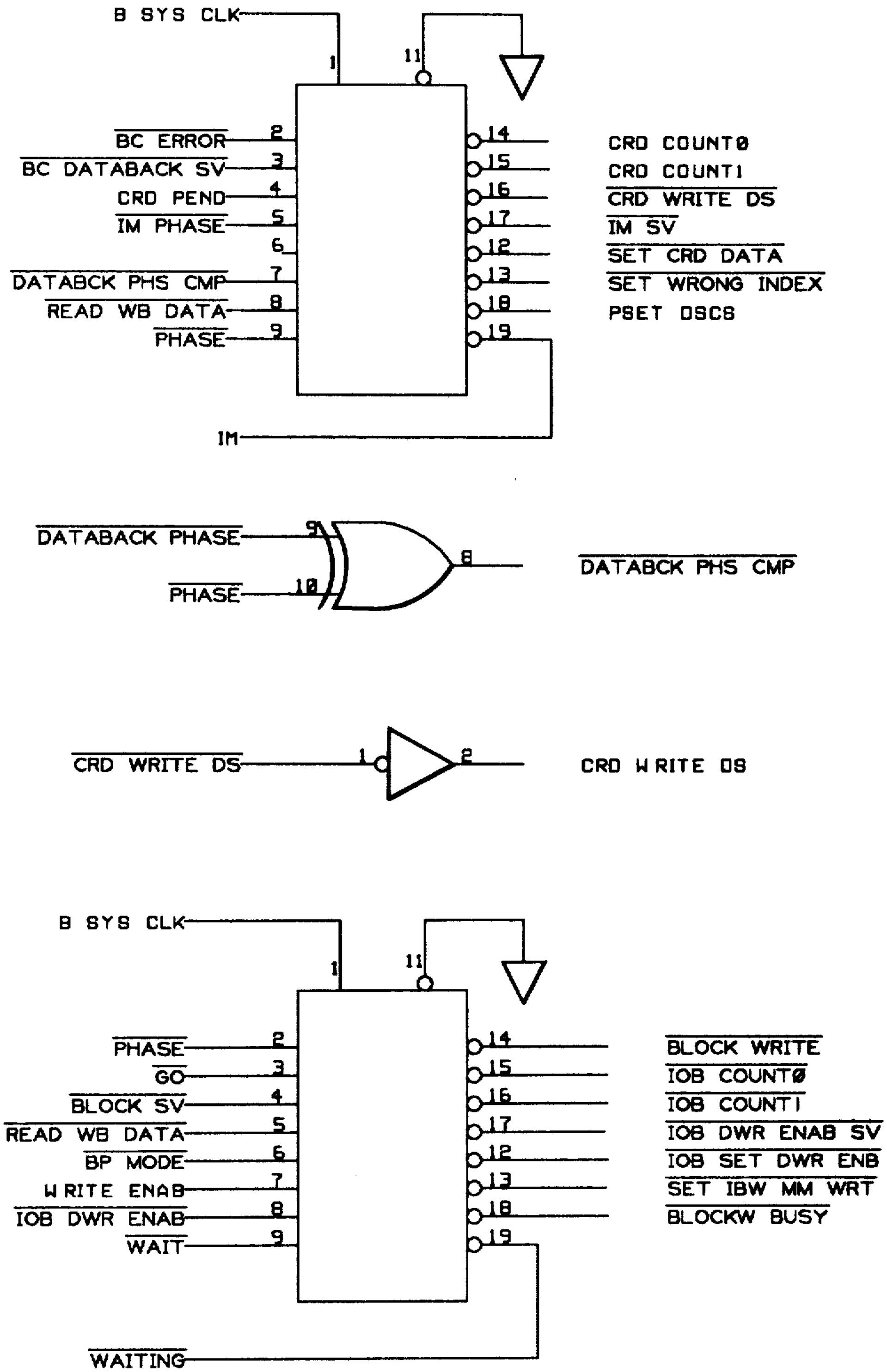
Figure 34A:
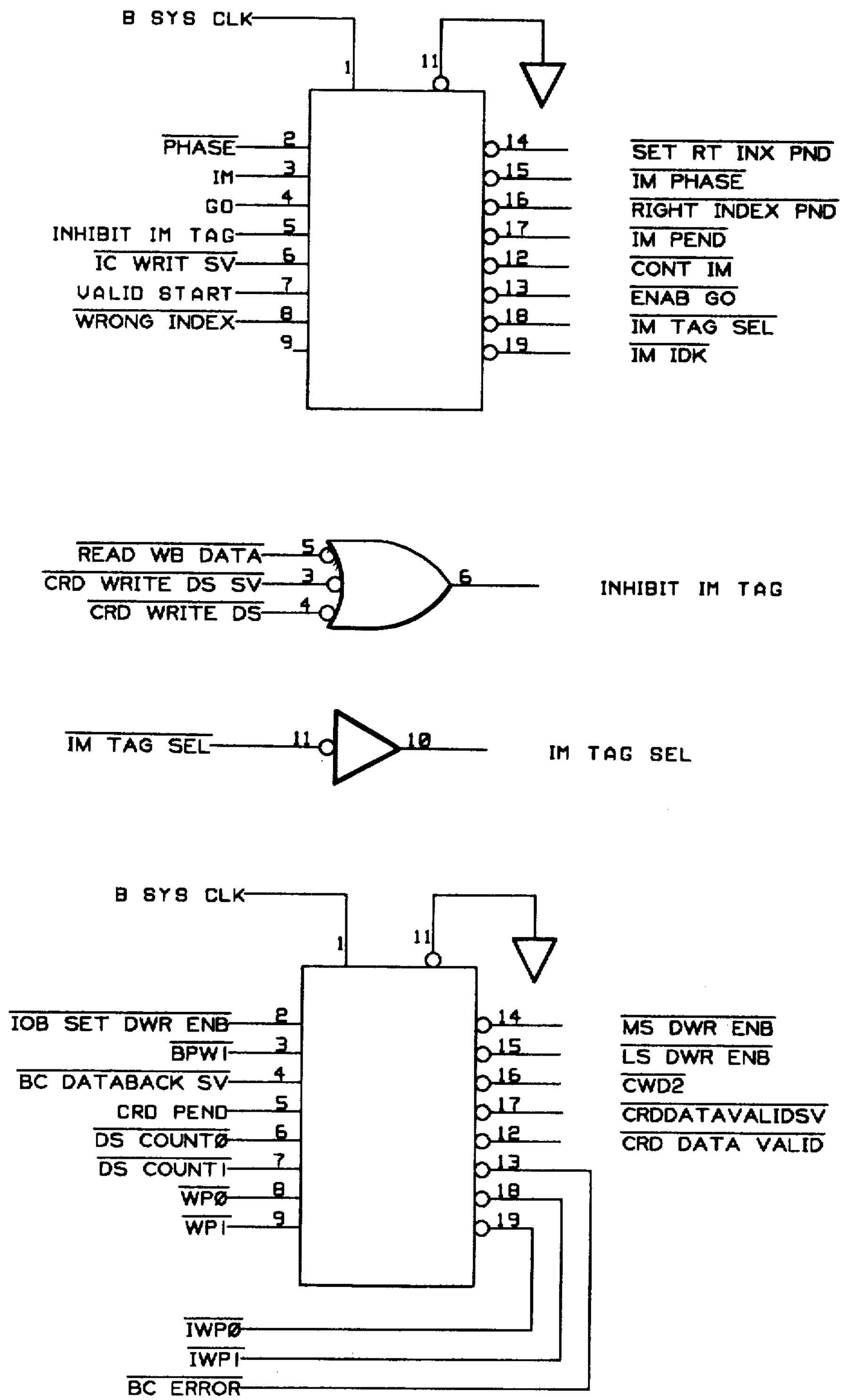
Figure 35:
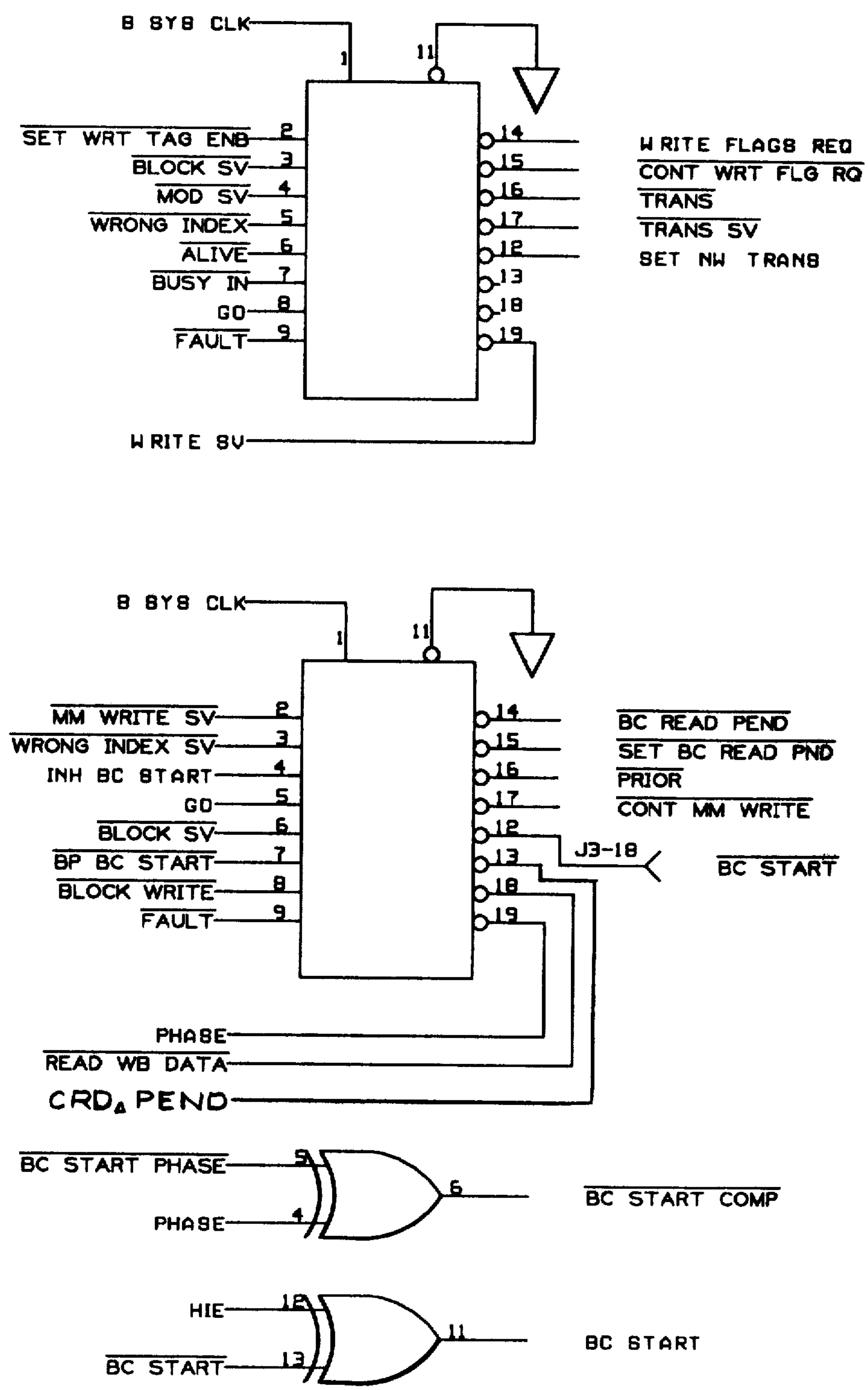
Figure 35A:
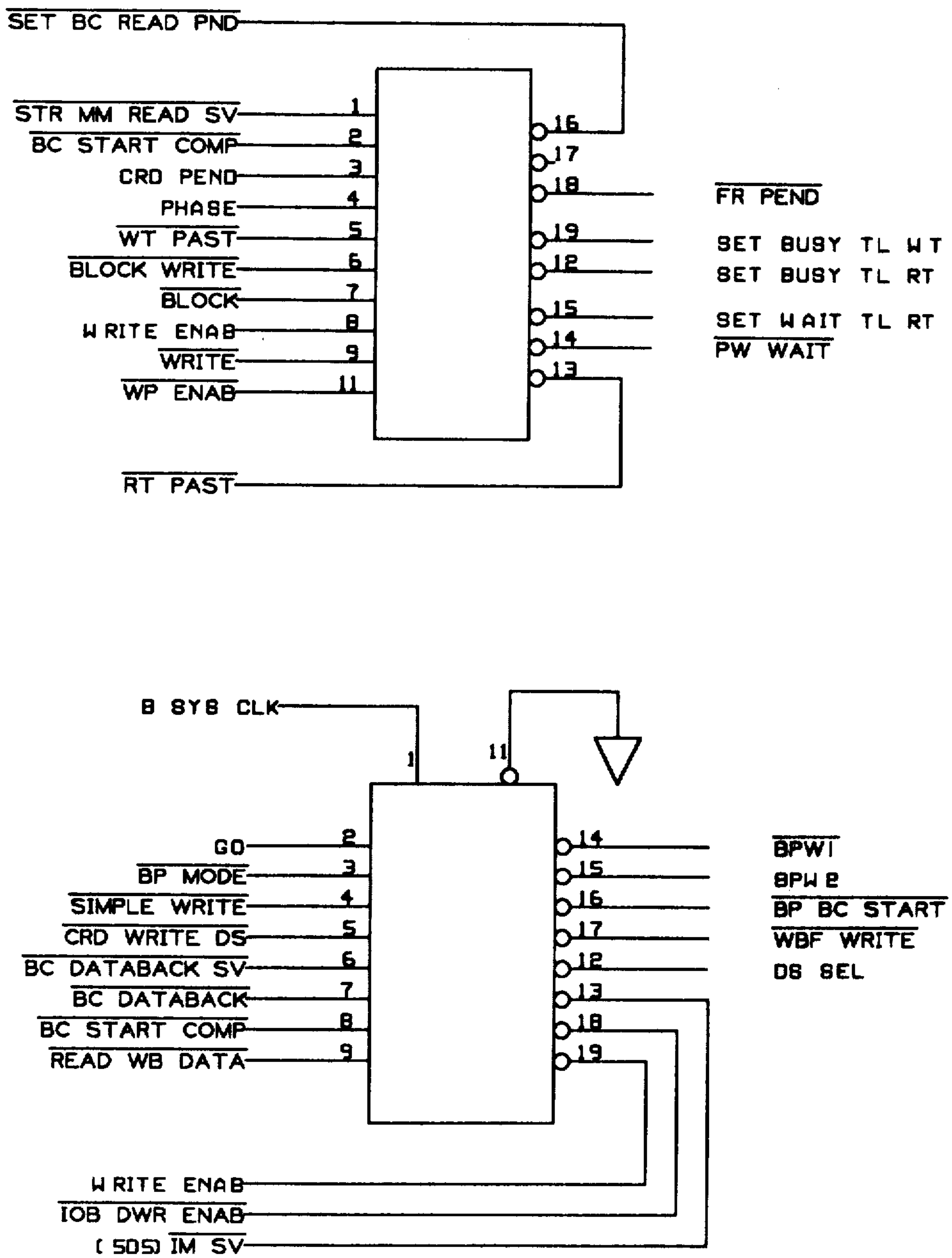
Figure 36:
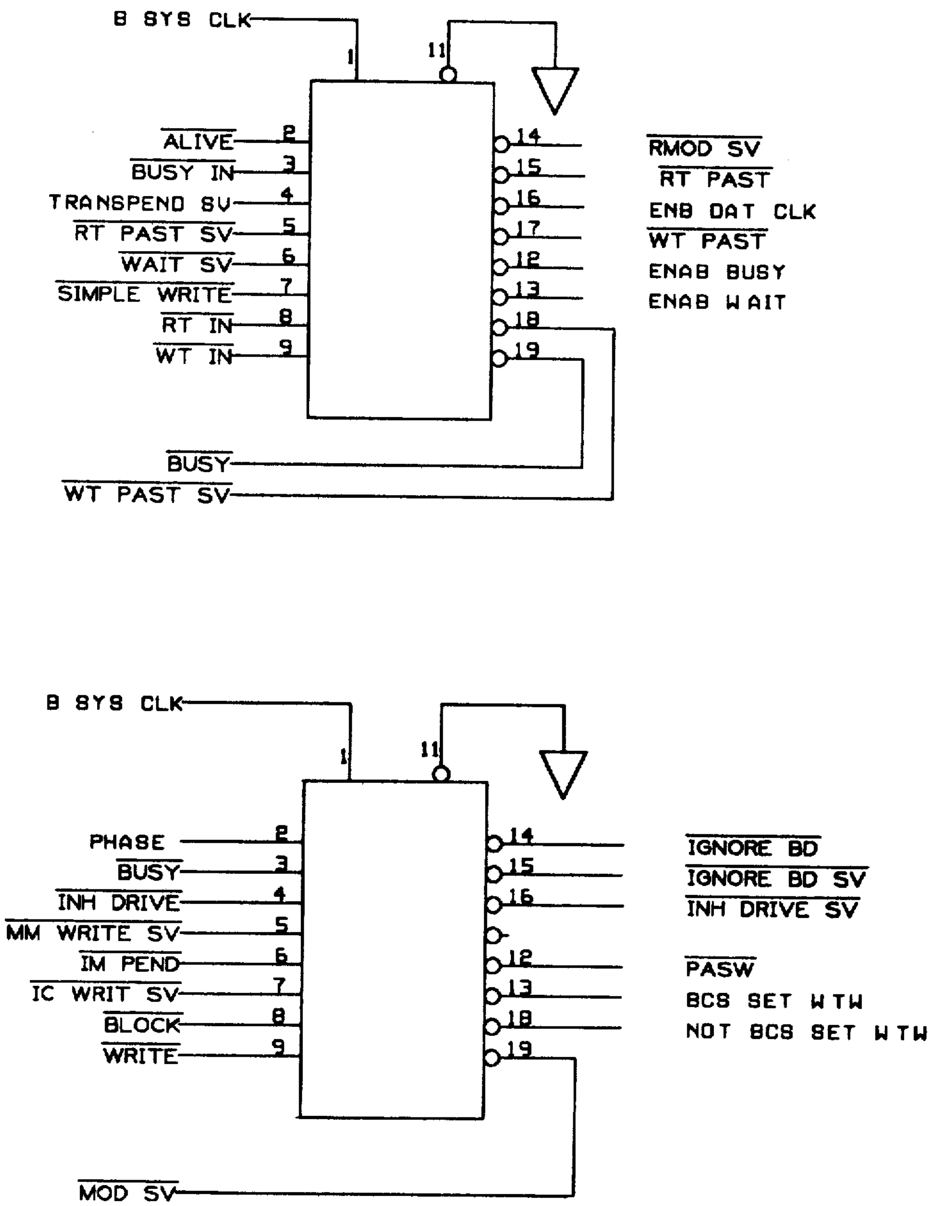
Figure 37:
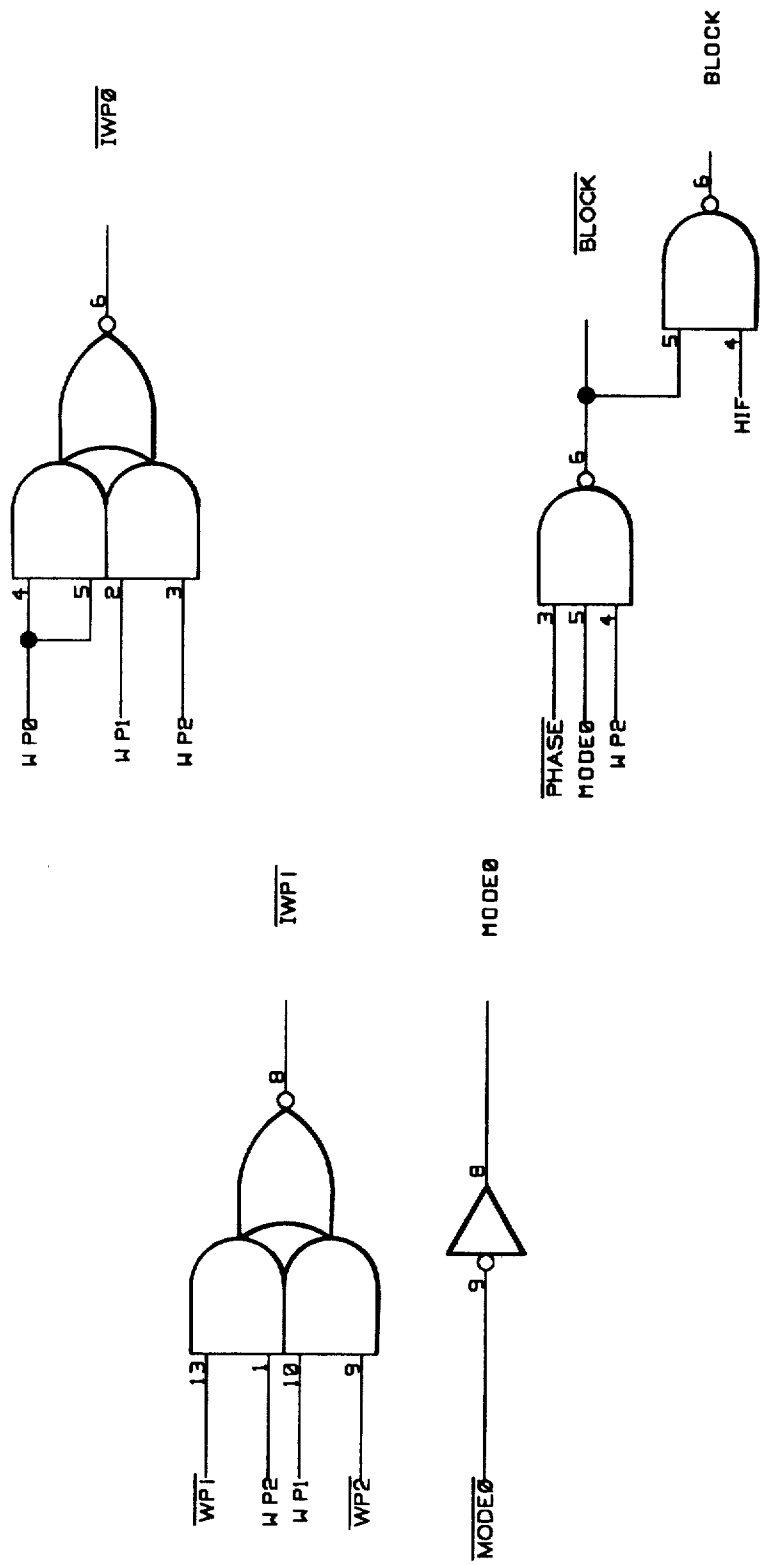
Figure 38:
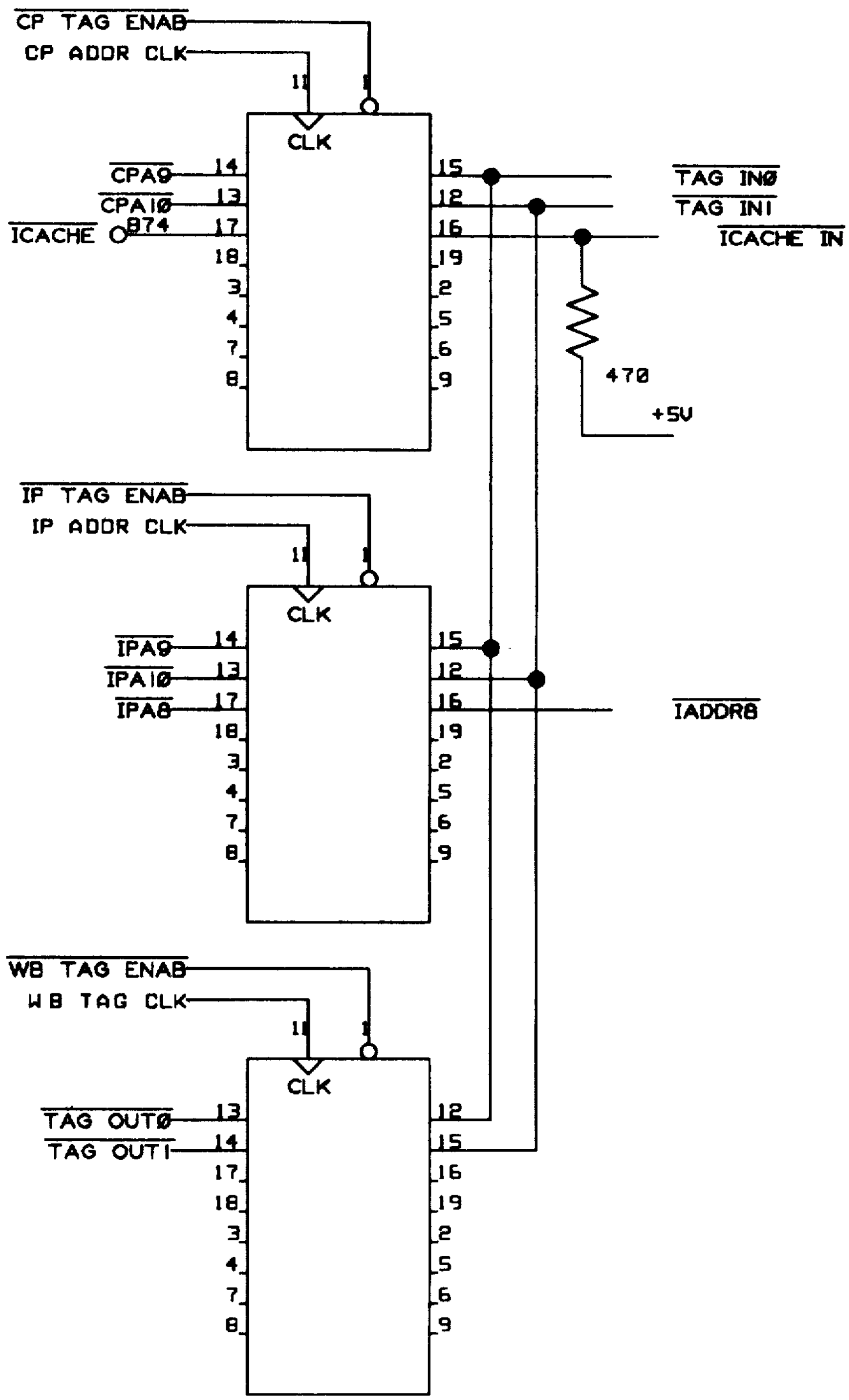
Figure 38A:
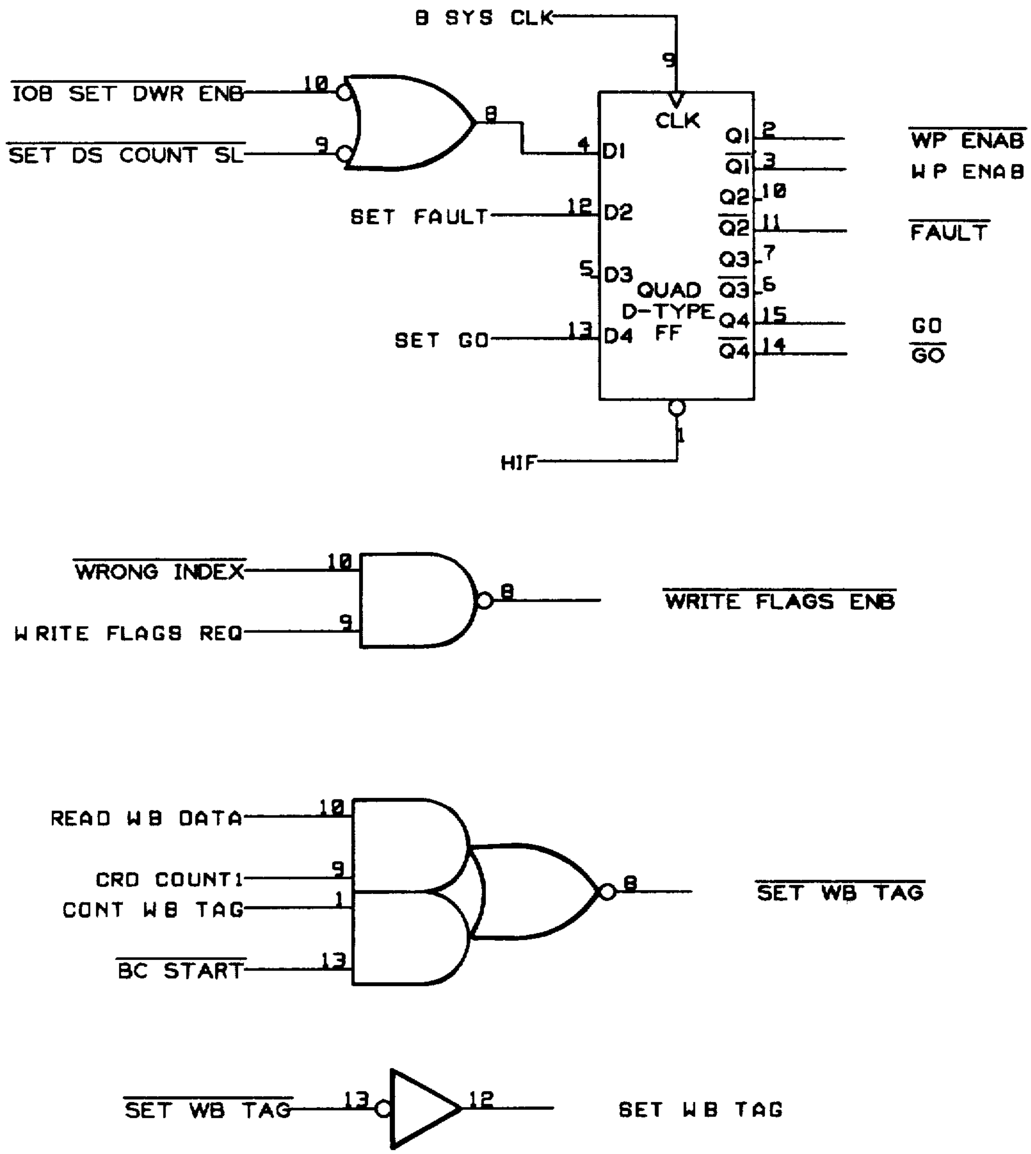
Figure 39:
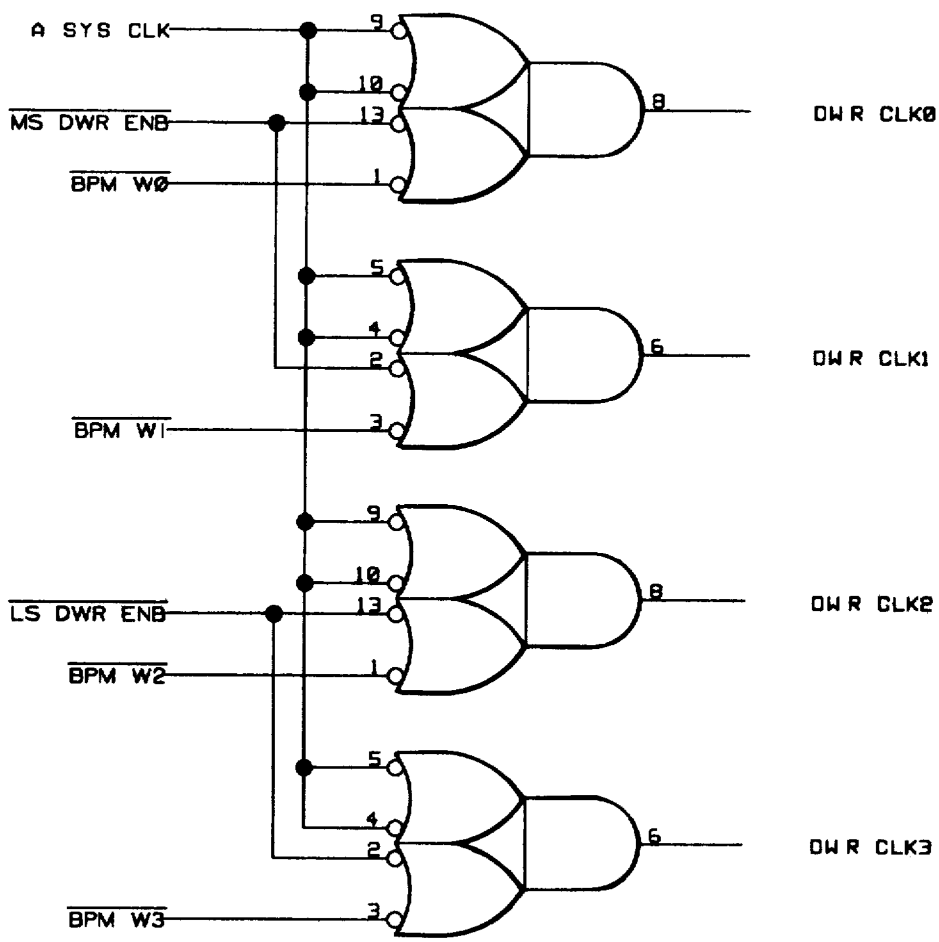
Figure 40:
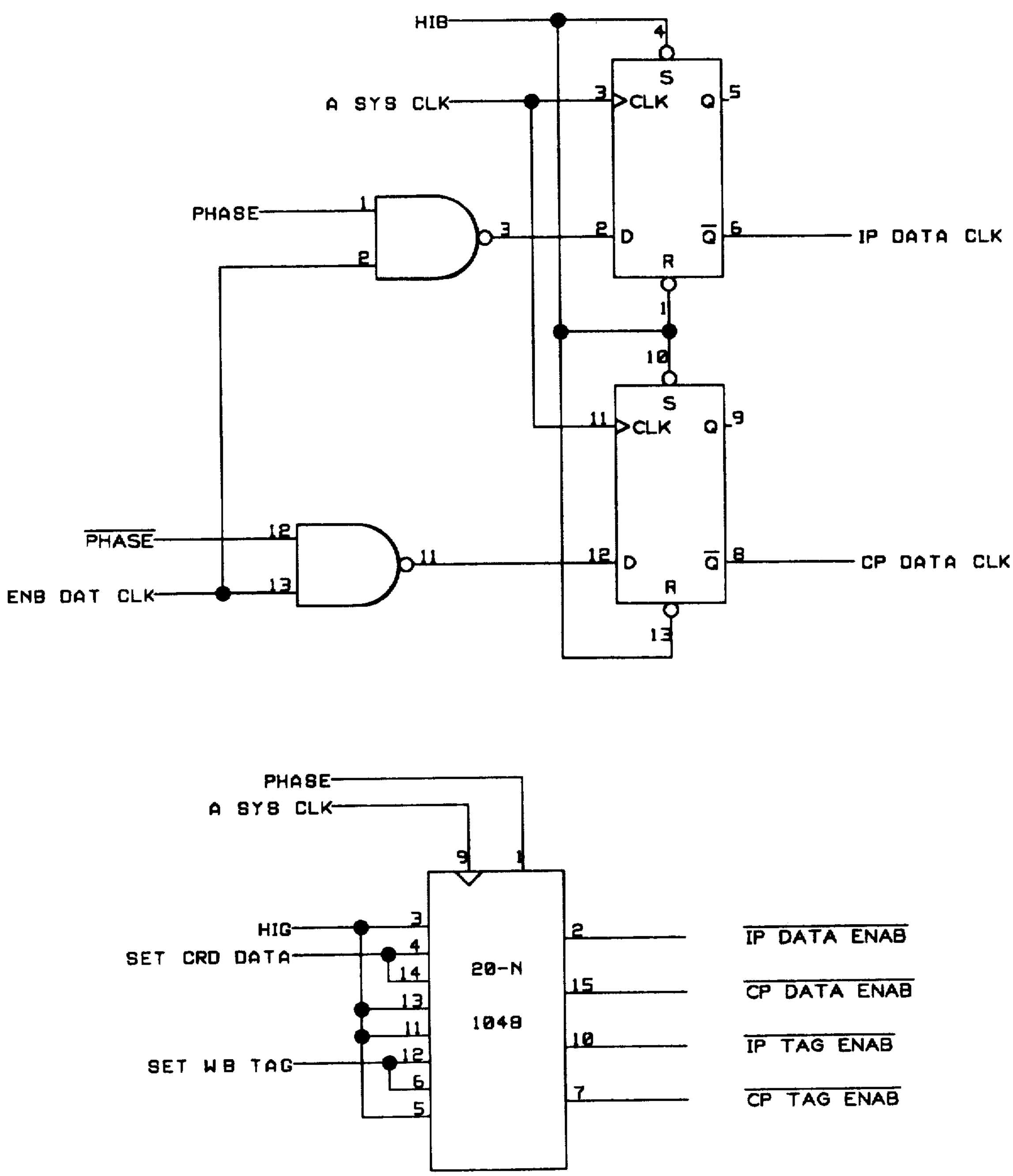
Figure 41:
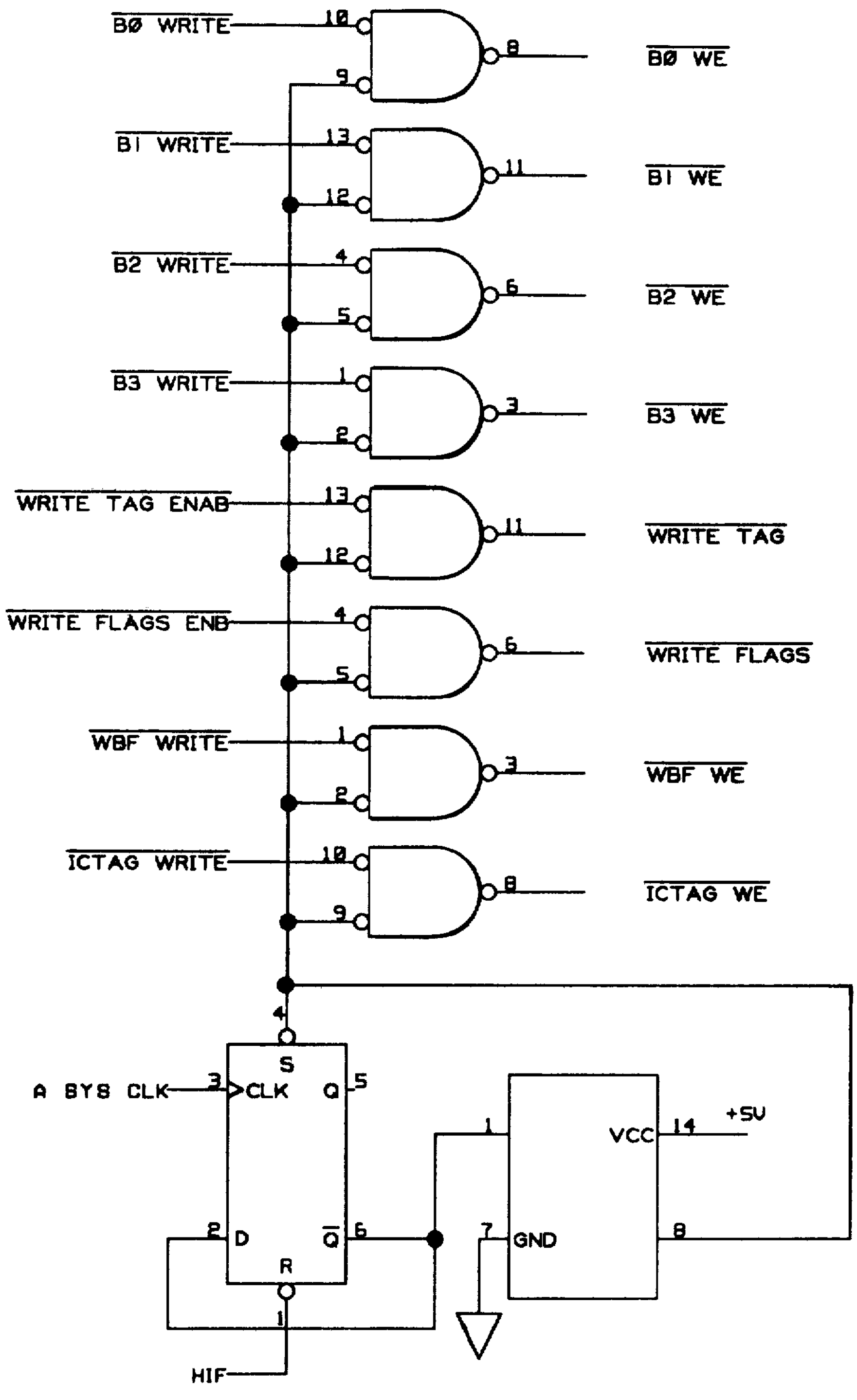
Figure 41A:
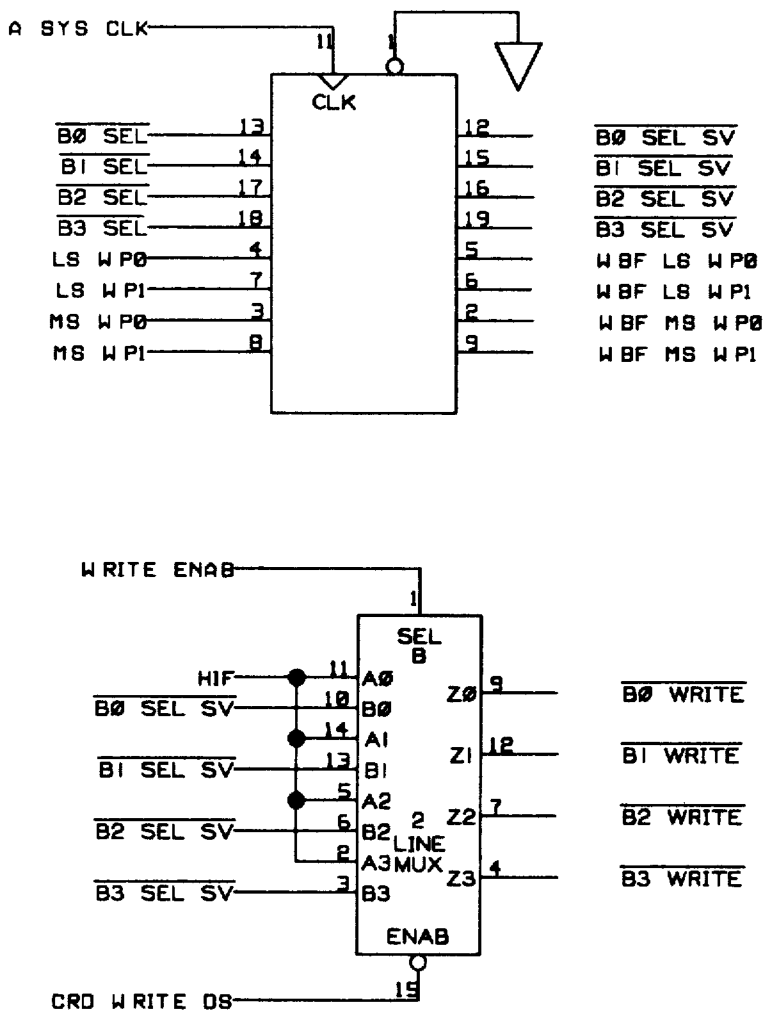
Figure 42:
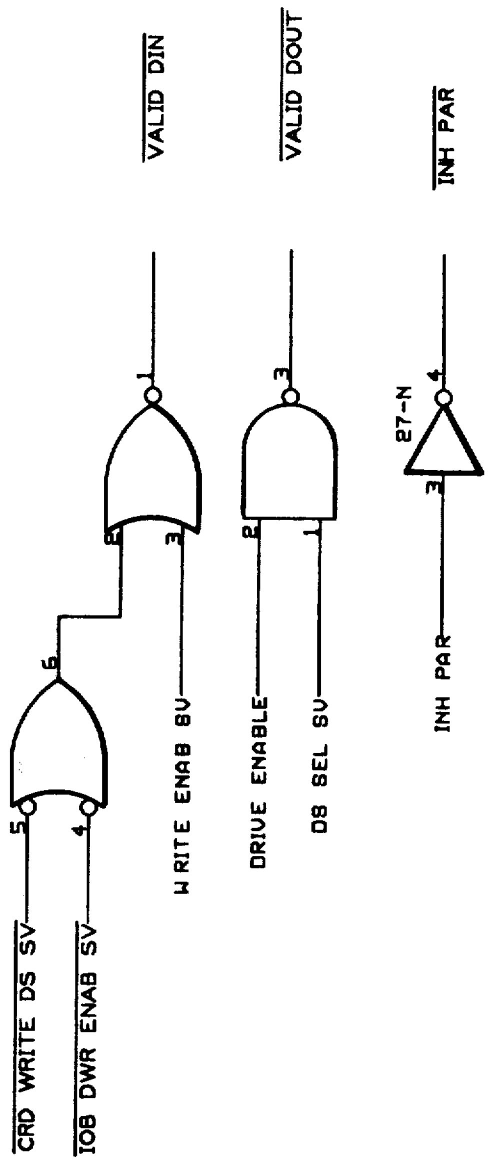
Figure 43:
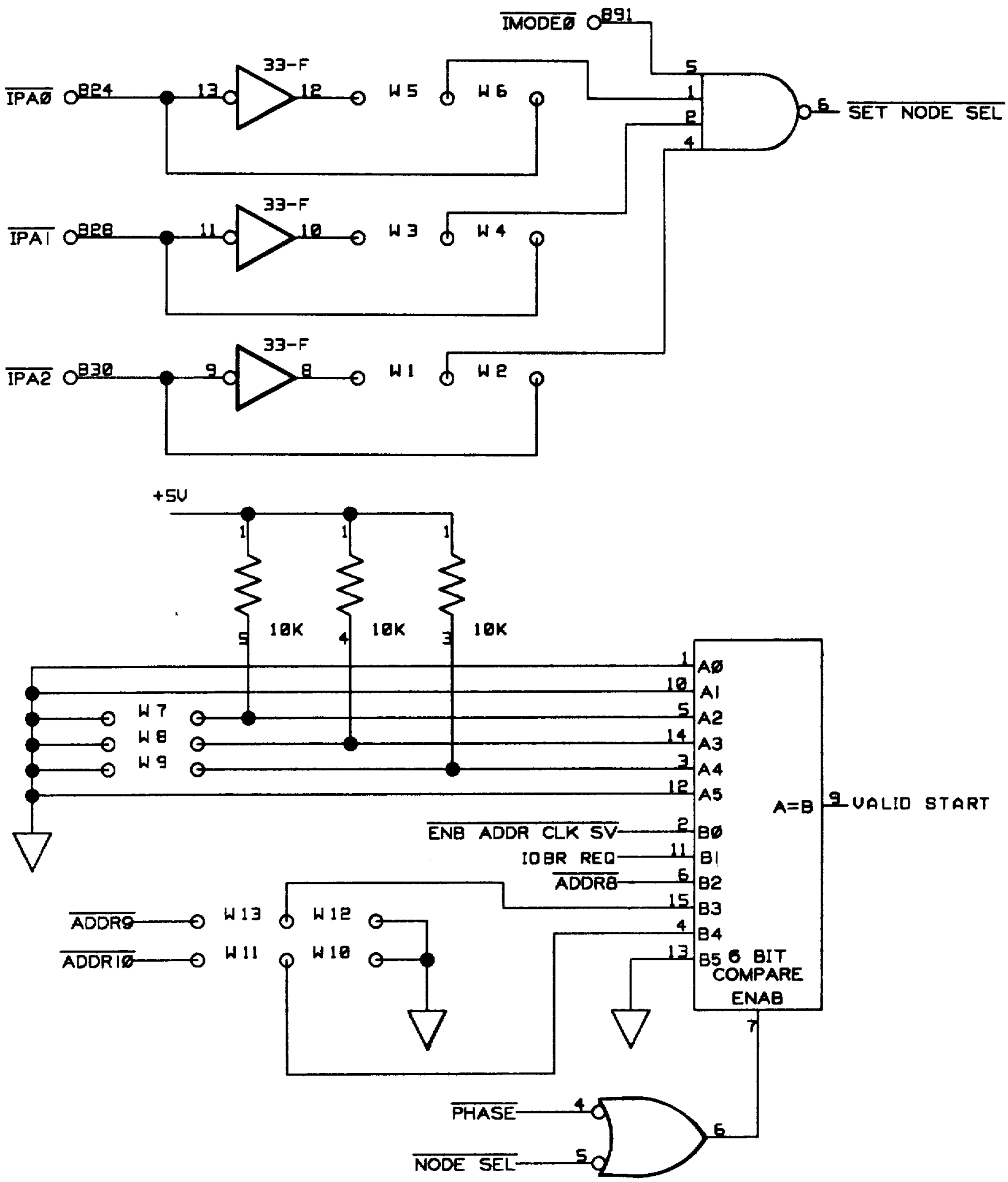
Figure 43A:
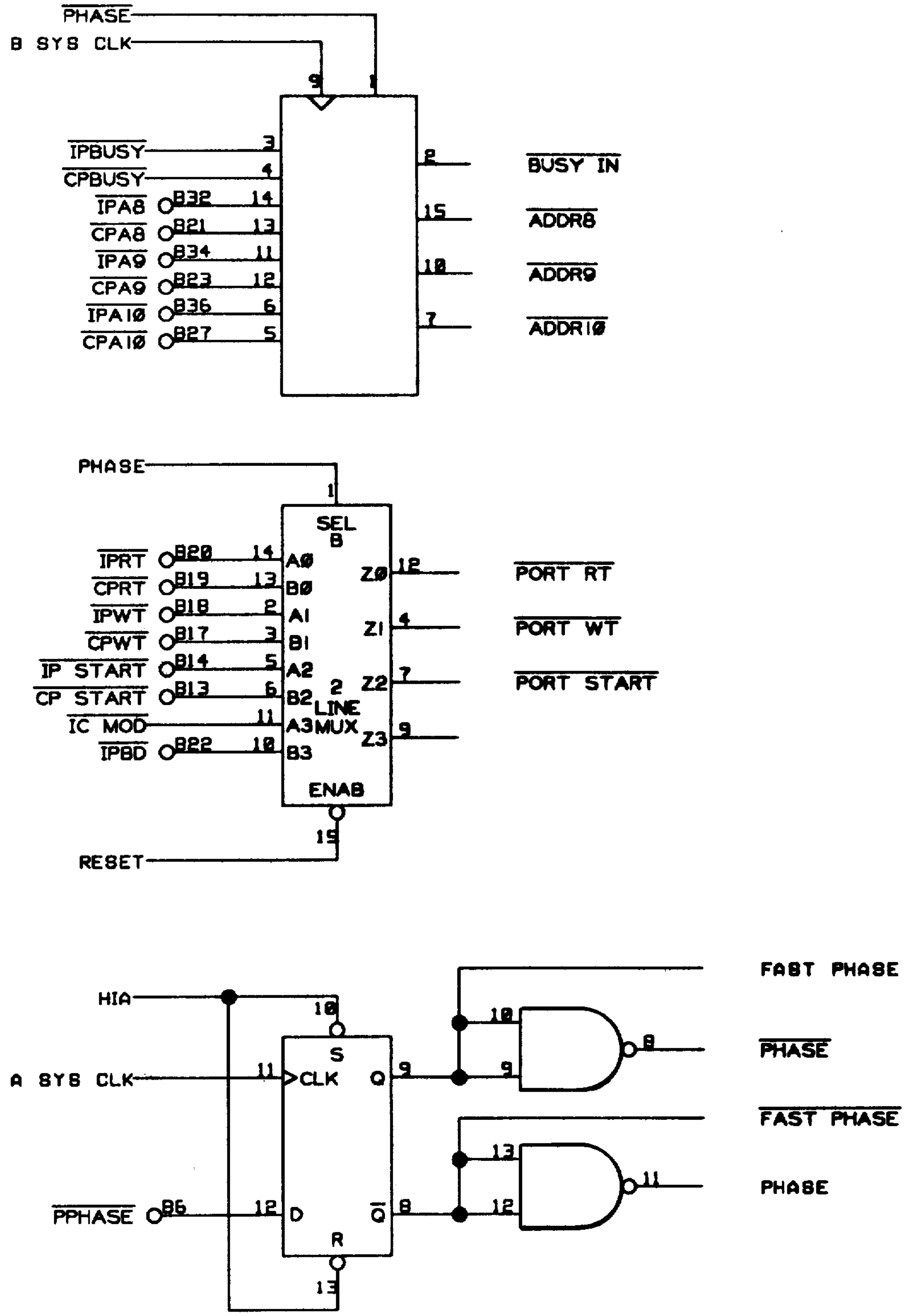
Figure 43B:
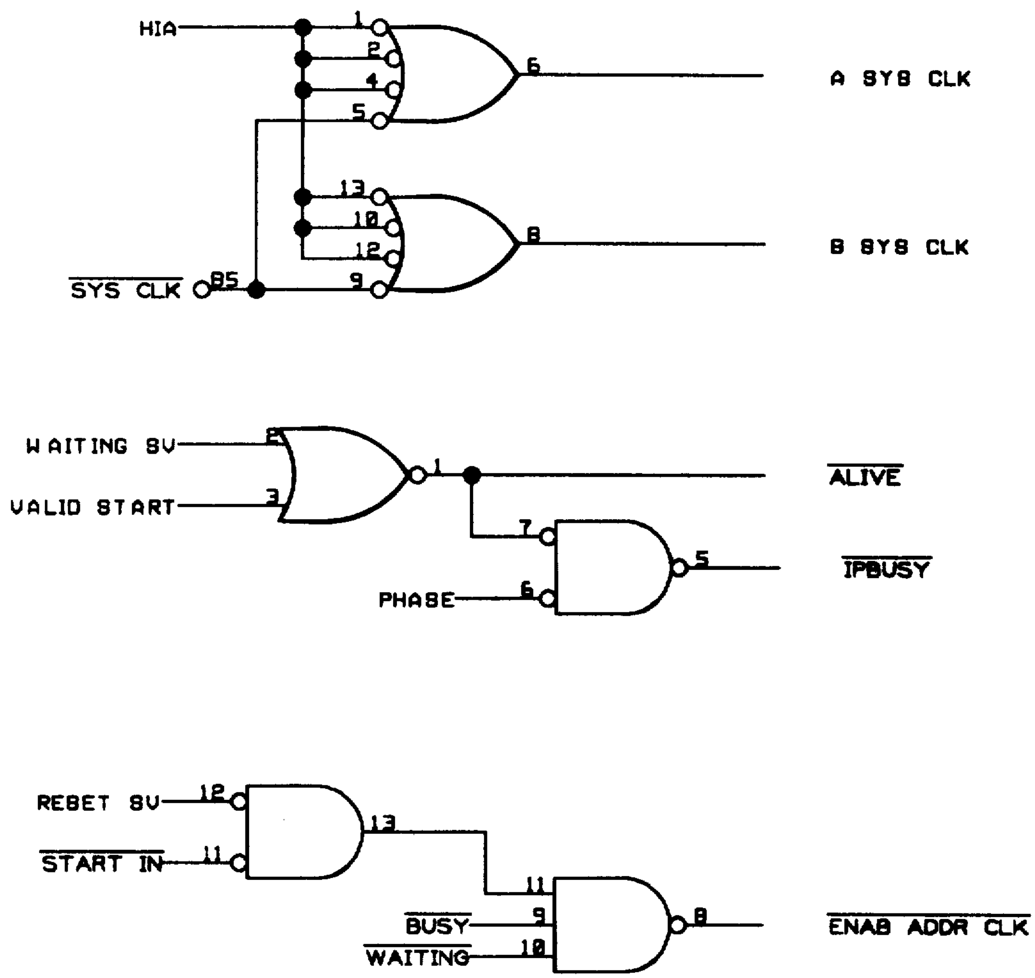

Various types of conditional addresses may be selected as discussed below, it being helpful to consider the following discussion in conjunction with FIGS. 33 and 34 showing broad block designs of the micro-sequencer logic.

A first conditional address may be a conditional absolute address, i.e. an address which uses absolute address bits AA 4–15 appropriately selected and supplied by dispatch multiplexer 186 to the address multiplexer 176, as seen in FIG. 4.

The format for such conditional absolute address utilizes the same format shown above for the mode bits, polarity bit and test bits, with the 10 absolute address bits being extended to a full 12 bits by concatenating the most significant bits of the current micro-program counter as the first two bits thereof (sometimes termed the "page bits"). The conditional absolute address may be utilized in 5 different modes as set forth in Appendix D (see "Absolute Address Conditional" therein). An example of one mode such as a "Conditional Jump Code" (CJMP) can be illustratively summarized below.

| Mode | MneM. | Explanation | True Action | False Action |
|---|---|---|---|---|
| 000 | CJMP | Conditional Jump | PC ← AA(10) | PC ← PC + 1 |

For such conditional jump mode, if the specified test condition is true the 10 absolute address bits concatenated with the 2 page bits forms the absolute address bits AA 4–15, which address is then selected at the address multiplexer 176 (FIGS. 33 and 34). If such specified condition is false, the address which is selected is the current program counter address incremented by 1 (i.e. $\mu PC+1$). Other modes for an "absolute address conditional" format are shown in Appendix D.

Another conditional address is a conditional dispatch address, wherein a portion of the address bits are obtained (or dispatched) from sources external to the micro-sequencer unit (such as the arithmetic logic unit or the address translation unit, for example) which dispatch bits can be concatenated with some or all first eight absolute address bits (AAØ–7) as shown in FIG. 34. For such conditional dispatched addresses the following format is used:

| 0 2 | 3 4 | 9 | 10 16 | 17 18 | 19 |
|---|---|---|---|---|---|
| 101 | POLARITY(1) | TEST(6) | AA(7) | X | DSRC(2) |

The source from which the dispatch bits are obtained are identified by the two DSRC bits for 4 different source identifications.

Thus, the address may be formed by direct replacement of the lower 8 bits of the formed absolute address with the lower 8 bits of the CPD bus as shown below.

| 0 3 | 4 11 |
|---|---|
| Formed AA bits 0–3 | CPD24–CPD31 |

Alternatively, the address may be formed by direct replacement of the lower 4 bits of the formed absolute address with the lower 4 bits of the CPD bus, as shown below:

| 0 7 | 8 11 |
|---|---|
| Formed AA bits 0–7 | CPD28–CPD31 |

As further alternative, the address may be formed by direct replacement of the lower 4 bits of the formed absolute address with a different 4 bits of the CPD bus as shown below:

| 0 7 | 8 11 |
|---|---|
| Formed AA bits 0–7 | CPD20–CPD23 |

And as a final alternative, the address can be formed by direct replacement of the lower 3 bits of the formed absolute address with 2 bits from the address translation unit validity dispatch, with a zero in the least significant bit position, as shown below:

| 0 8 | 9 10 | 11 |
|---|---|---|
| Formed AA bits 0–8 | ATU VAL(2) | 0 |

Certain addresses may require the use either of the incremented program counter address or the top of the stack address (with the top of the stack being appropriately popped, or removed, when the address is used) and for such purposes the lower 12 bits (NAC-19) need not be involved in the address generation process. Accordingly, such 8 bits are available for other purposes as desired. The format therefor is shown below:

| 0 2 | 3 4 | 9 | 10 11 | 12 19 |
|---|---|---|---|---|
| 110 | POLARITY(1) | TEST(6) | Mod2(2) | OTHER(8) |

An explanation of such three special condition address selections are shown in more detail in Appendix D, identified as LCNT, CPOP and LOOP.

Certain addresses may be selected in conjunction with the setting of the 8 flags that are involved and such flag control commands can be identified by the NAC field in accordance with the following format:

| 0 2 | 3 4 | 9 | 10 12 | 13 | 14 15 | 16 17 | 18 19 |
|---|---|---|---|---|---|---|---|
| 110 | POLARITY(1) | TEST(6) | 110 | POP(1) | SET(2) | CNTL1 (2) | CNTL2 (2) |

As seen in Appendix D (see Flag Controls set forth therein) such instructions can be divided into two sets each set being identified by the POP bit and each set having four different instructions identified by the two SET bits. Each instruction involves the setting of two flags, each flag being set in accordance with the CNTL1 or CNTL2 fields as follows:

| CNTL1 or CNTL2 | Action |
|---|---|
| 00 | no change |
| 01 | set it FALSE |
| 10 | set it TRUE |
| 11 | Toggle it |

In each of the above flag control cases if the test condition which is specified is determined to be "True" the incremented micro-program counter address is used ($\mu PC+1$) while if the condition is "false" the top of the stack address is utilized and the stack is appropriately popped. As mentioned above, a summary of the flag controls is set forth in Appendix D.

Two of the instructions of the NAC field allow the conditional use of the stack without popping it (as opposed to the use and popping thereof discussed above) in accordance with the following format:

| 0 2 | 3 4 | 9 | 10 12 | 13 14 | 15 | 16 17 | 18 19 |
|---|---|---|---|---|---|---|---|
| 110 | POLARITY(1) | TEST(6) | 111 | Mod3 (2) | FS(1) | CNTL1 (2) | CNTL2 (2) |

Two instructions are involved, flag control being provided for either the set of flags Ø and 1 or the set of flags 2 and 3. A summary of such instructions, identified as the SPLIT instructions, is shown in Appendix D. As can be seen therein, if the condition is "false" the top of the stack address is utilized but the address remains at the top of the stack (i.e. the top of the stack is not popped). The final conditional instruction is a context restore instruction. Such instruction may be used, for example, after a fault routine has been implemented and it is desired to restore the machine to its previous state. In accordance therewith, not only is the machine state restored but a decision is made as to the next micro-address which should be utilized, depending on whether the condition which is tested is true or false. The context restore instruction format is shown below:

| 0 2 | 3 4 | 9 | 10 12 | 13 14 | 15 19 |
|---|---|---|---|---|---|
| 110 | POLARITY(1) | TEST(6) | 111 | Mod3(2) | XXXXX |

A summary of the two instructions involved is shown in Appendix D identified as Context Restore Instruction.

In addition to the conditional address instructions discussed above, in a particular embodiment of the system discussed, there are also unconditional address instructions (one particular embodiment utilizing eight unconditional instructions are set forth in Appendix D identified as Unconditional Instructions). In accordance with the format thereof there are no conditions to be tested so that for each mode of operation only a single action is specified and no selected choice need be made.

A summary of the unconditional address instructions, which can be divided into unconditional instructions utilizing the 12-bit absolute address or unconditional instructions utilizing the combinations of certain absolute address bits and dispatch source bits (Unconditional Dispatches) is shown in Appendix D.

AREG, BREG Fields

The 8 bits in these two fields identify which register of the register file in the arithmetic logic unit is to be used to provide the A and B inputs of the arithmetic logic unit 200. Thus the register file is capable of selecting one of sixteen registers, namely, the accumulators AC Ø-3, the floating point registers FPAC Ø-3 or other general registers GR Ø-7 in accordance with the following select codes.

| Mnem | Value |
|---|---|
| AC0 | 0 |
| AC1 | 1 |
| AC2 | 2 |
| AC3 | 3 |
| FPAC0 | 4 |
| FPAC1 | 5 |
| FPAC2 | 6 |
| FPAC3 | 7 |
| GR0 | 8 |
| GR1 | 9 |
| GR2 | A |
| GR3 | B |
| GR4 | C |
| GR5 | D |
| αACSR | E |
| αACDR | F |

In the above table the coded value is in hexadecimal notation and in the specific case of coding ACSR or ACDR, the register file control comes from a register that specifies a source accumulator or from a register that specifies a destination accumulator. When the source accumulator ACSR Ø-3 or the destination accumulator ACDR Ø-3 equals hex E the general register GR6 will be selected. When ACSR Ø-3 or ACDR Ø-3 equal hex F then the general register GR7 will be selected.

The Control Store Mode

The control store mode 4-bit field defines the functionality of six of the other micro-instruction fields, namely, the ALUS, ALUOP, ALUD, DIST. CRYIN, and RAND fields. The following table summarizes the 16 control modes for the control store mode field.

| | | Half-cycle 1 | | | Half-cycle 2 | | | DIST | | RAND |
|---|---|---|---|---|---|---|---|---|---|---|
| Mnem | Value | ALUS | ALUPO | # | ALUS | ALUOP | ALUD | Type | CRYIN | Type |
| SMATH | 0 | uI | uI | # | DZ | OR | uI | Math | Type0 | Math |
| SFIXP | 1 | uI | uI | # | DZ | OR | uI | Gen | Type1 | Fixp |
| SGEN | 2 | uI | uI | # | DZ | OR | uI | Gen | Type0 | Gen |
| SATU | 3 | uI | uI | # | DZ | OR | uI | Gen | Type0 | Atu |
| FMATH | 4 | uI | uI | # | uI | uI | uI | Math | Type0 | Math |
| FFIXP | 5 | uI | uI | # | uI | uI | uI | Gen | Type1 | Fixp |
| FGEN | 6 | uI | uI | # | uI | uI | uI | Gen | Type0 | Gen |
| FATU | 7 | uI | uI | # | uI | uI | uI | Gen | Type0 | Atu |
| MPY | 8 | α | α | # | α | α | # | Math | Type2 | Math |
| DIV | 9 | uI | α | uI | uI | α | uI | Math | Type3 | Math |
| BOUT | A | uI | uI | # | ZB | OR | uI | Gen | Type0 | Gen |
| NORM | B | uI | uI | # | DZ | OR | uI | Math | Type0 | Math |
| QDEC | C | ZQ | SUB | GREG | uI | uI | uI | Gen | *Type0 | Gen |
| QINC | D | ZQ | ADD | GREG | uI | uI | uI | Gen | *Type0 | Gen |
| QADD | E | DQ | ADD | GREG | uI | uI | uI | Gen | *Type0 | Gen |
| PRESC | F | α | uI | # | DZ | OR | uI | Math | Type0 | Math |

In the above table the following abbreviations are used:
uI - Represents the u-order from the appropriate field of the specified u-instruction.
- No clock takes place.
α - The u-order will deter to a predecoded or "Forced" value. See notes below for further information.
*The CRYIN is forced to a zero the first half cycle in modes QDEC and QADD, and to a one during the first half of mode QINC.

As can be seen, operations can occur in either half of the operating time cycle of the system, for example, operations with respect to the CPU occurring in one-half of the cycle and operations with respect to I/O devices occurring in the other half of the cycle. The above table shows that the control modes for the control store mode field must be defined in accordance with the half-cycle which is occurring. Thus certain fields in the overall micro-instruction format will change depending on which half of the cycle is occurring and the CSM field defines how each of such fields is affected during each of the half-cycles involved.

The ALU source inputs (R and S), the ALU operation and the ALU destination as determined by their respective fields are discussed below, the above table providing a definition for the functionality thereof as explained by the above noted abbreviations. The source for the D-bus (see ALU in FIG. 53) for the first half cycle is discussed below under the D1ST field. The CRYIN definition determines the type of usage for the carry input select field as discussed below and the random field (RAND) type is also defined as discussed below with respect to such field. A more detailed description of the multiply (MPY), divide (DIV), prescaled mantissa (PRESC) and NORM modes is shown in Appendix E.

The D1ST Field

This 2-bit field defines the source for the 31 bits which are placed on the D-bus 205 of the arithmetic logic unit (see FIG. 53) during the first half cycle. The functionality of this field is dependent on what is coded in the CSM field as discussed above. For the two types (identified as MATH or GEN) the following sources are defined depending on the value of the D1ST field.

| Type Math | | |
|---|---|---|
| Mnem | Value | Description |
| MREG | 0 | D<0-31> = MREG<0-31> |
| MACC | 1 | D<0-31> = MACC<0-31> |
| CPDR | 2 | D<0-31> = CPDR<0-31> |
| AAR | 3 | D<0-23> = zero<br>D<24-31> = AAR<24-31> |

| Type Gen | | |
|---|---|---|
| Mnem | Value | Description |
| MREG | 0 | D<0-31> = MREG<0-31> |
| CPDB | 1 | D<0-31> = CPD<0-31> |
| CPDR | 2 | D<0-31> = CPDR<0-31> |
| AAR | 3 | D<0-23> = zero<br>D<24-31> = AAR<24-31> |

D2ND Field

The four bits for this field define the source of the 31 bits to be placed on the D-bus during the second half cycle in accordance with the following definitions.

| D<0-31> source during second half cycle. | | |
|---|---|---|
| Mnem | Value | Description |
| | 0 | Unassigned |
| CPDB | 1 | D<0-31> = CPDB<0-31> |
| CPDR | 2 | D<0-31> = CPDR<0-31> |
| AAR | 3 | D<0-23> = zero<br>D<24-31> = AAR<24-31> |
| CREG | 4 | D<0-31> = MREG<0-31> |
| MACC | 5 | D<0-31> = MACC<0-31> |
| | 6 | Unassigned |
| | 7 | Unassigned |
| NSHR | 8 | Right Nipple shifts. See SHFT field |
| NSHL | 9 | Left Nipple shifts. See SHFT field |
| PASS | A | D<0-31> = TLCH<0-31> |
| | B | Unassigned |
| PMD | C | Processor memory data. See note below. |
| | D | Unassigned |
| ASR | E | D<0-15> = ASR<0-15> |
| | F | Unassigned |

The SHFT Field

The four bits of the SHFT field define two basic functions, namely, a control of the inputs for bit shifts into the Q-register or the B-register of the arithmetic logic unit (FIG. 53) and a control of a 4-bit shift (a "nibble" shift) at the Shifter 207 of the ALU. The latter shift is controlled by the D2ND field to occur only when such field is coded to produce a right nibble shift (NSHR) or a left nibble shift (NSHL) as indicated above. The bit shift occurs with respect either to the data that is present in the Q-register or to the data which is being placed into the B-register, only if the D2ND field contains something other than a NSHR or NSHL code. The charts in Appendix F explain more completely how the nibble shift and bit shift hardware are controlled by the SHIFT field.

The ALUS Field, The ALUOP Field and The ALUD Field

The 3 bits of the ALUS field determines which bus is supplied to the R and S input of the arithmetic logic circuit 200 (FIG. 53) in accordance with the following chart.

| ALUS FIELD | (R,S) |
|---|---|
| AQ | 0 |
| AB | 1 |
| ZQ | 2 |
| ZB | 3 |
| ZA | 4 |
| DA | 5 |
| DQ | 6 |
| DZ | 7 |

In the above chart, A represents the A output of the register file, B represents the B output of the register file, Q represents the Q output from the Q register, Z is the all zeros input and D is the D-bus in FIG. 53. Thus, for an ALUS field of zero, for example, the R input is from the Q register, and so forth.

The three bits of the ALUOP field define the operation which is to be performed by the arithmetic logic circuit 200 in accordance with the following chart.

| ALUOP FIELD | | |
|---|---|---|
| ADD | 0 | (R + S) |
| SUB | 1 | (S − R) |
| RSB | 2 | (R − S) |
| OR | 3 | (R or S) |
| AND | 4 | (R * S) |
| ANC | 5 | (R' * S) |
| XOR | 6 | (R xor S) |
| XNR | 7 | (R xnr S)' |

The 3 bits of the ALUD field defines the destination for the output of the arithmetic logic circuit 200 (i.e. where the result of the arithmetic or logical operation will be placed) in accordance with the following chart.

| ALUD FIELD Mnem | Value | Description |
|---|---|---|
| NLD | 0 | No load; Y<0-31> = ALU<0-31> |
| GREG | 1 | Load GREG only; Y<0-31> = ALU<0-31> |
| BREG | 2 | Load BREG only; Y<0-31> = ALU<0-31> |
| AOUT | 3 | Load BREG only; Y<0-31> = AREG<0-31><br>If FLAG0=0, Y<0-15>=ALU<0-31>, Y<16-31>=AREG<16-31> |
| RSHB | 4 | Load BREG with ALU shifted right one bit;<br>LINK register: = ALU31; Y<0-31> = ALU<0-31> |
| RSQB | 5 | Load BREG with ALU shifted right one bit;<br>Shift QREG right; Y<0-31> = ALU<0-31><br>LINK register: = ALU31 |
| LSHB | 6 | Load BREG with ALU shifted left one bit;<br>Y<0-31> = ALU<0-31><br>LINK gets ALU16, ALUO for FLAG0 = 0,1 respectively. |
| LSQB | 7 | Load BREG with ALU shifted left one bit;<br>Shift QREG left; Y<0-31> = ALU<0-31><br>LINK gets ALU16, ALUO for FLAG0 = 0,1 respectively. |

The CRYINS Field

This field represents the arithmetic logic unit carry input select field and determines what kind of carry is used. There are 4 types of usage for this field (identified as Types ∅-3), the use thereof being governed by the CSM field discussed above and the RAND field discussed below. The charts in Appendix G for each type summarize the determinations to be made by the CRYINS field.

The Rand Field

The 10-bit random field is a multi-functional field and is controlled as discussed above by the CSM field. There are 4 types of usage thereof, identified as MATH, FIXP, GEN, and ATU.

The MATH type of usage has the following format:

| | ROUND | FPOP | MISC |
|---|---|---|---|
| Type Math | 1 | 4 | 5 |

which includes 1 bit for controlling the rounding off of the floating point computation and the 4 FPOP bits for defining the floating point operation with regard to the exponent, multiplication and truncation utilized. The remaining 5 bits are available for other arithmetic logic unit operations, if desired. The MATH type usage for the random field is specified in the summary set forth in Appendix H.

The fixed point type usage (FIXP) has the following format:

| | CEXT | MISC1 | MISC2 |
|---|---|---|---|
| Type Fixp | 1 | 4 | 5 |

As can be seen the first bit of the field in this type of usage combines wih the CRYINS field Type 1 to form certain micro-orders as set forth below:

| CRYINS Mnem | CRYINS Value | CEXT Mnem | CEST (RAND<O>) Value | Description |
|---|---|---|---|---|
| Z | 0 | N | 0 | CRYIN = 0 |

-continued

| CRYINS Mnem | CRYINS Value | CEXT Mnem | CEST (RAND<O>) Value | Description |
|---|---|---|---|---|
| H | 1 | N | 0 | CRYIN = 0 |
| Z,C | 0 | Carry | 1 | CRYIN = CARRY |
| H,B | 1 | Carry | 1 | CRYIN = CARRY |

The remaining bits relate to miscellaneous operations, the first 4 miscellaneous bits (MISC 1) relating to ALU loading control and the second 5 miscellaneous bits (MISC 2) relating to various random operations with respect to carry, overflow and status operations, and set forth in Appendix I.

The general type of usage (GEN) utilizes the following format:

| Type Gen | REGS | SPAR | SPAC |
|---|---|---|---|
| | 4 | 2 | 4 |

The first 4 bits (REGS) deal with general source and destination accumulator operations set forth in Appendix J. The 2 SPAR scratch pad bits deal with operations set forth in Appendix J. The 4 SPAD scratch pad bits deal with various scratch pad operations specified in Appendix J.

The final usage type for the random field is identified as ATU usage dealing with various address translation unit operations and has the following format.

| Type ATU | ATU0 | ATU1 | ATU2 |
|---|---|---|---|
| | 5 | 2 | 3 |

The first 5 bits (ATU 0) deal with the address translation unit operations, the next 2 ATU bits (ATU 1) define further ATU operations, and the final 3 ATU bits (ATU 2) define general operations, all as set forth in Appendix K.

The LAC Field

This 2 bit logical address control field controls the data that will be placed on the logical address bus, i.e. the field specifies the source for LA bits 1-31, in accordance with the following chart:

Specifies the source of LA<1-31>.

| Mnem | Value | Description |
|---|---|---|
| DSN | 0 | LA<0-31>: = WDLCH<0-31> or BYLCH<0-31> |
| DS | 1 | LA<0-31> & LAR<0-31>: = WDLCH<0-31> or BYLCH<0-31> |
| SP | 2 | LA = Scratch Pad; LAR: = Scratch Pad |
| IP | 3 | LA = PC + DISP; LAR = PC + DISP<br>exception: when ICAT coded in ATUO,<br>LA = ICP; LAR = ICP |

The CPDS Field

This 5-bit CPD source select field determines what is placed on the CPD bus, i.e. the source for the CPD 0-31 bits. This field also controls the loading of the CPDR register on the arithmetic logic unit.

An NCPDR random field (see GEN Type random field) overrides the loading of the CPDR register and prevents such loading. The source select and other control operations for the CPDR field are specified in accordance with the chart shown in Appendix L.

The MEMS Field

This 3-bit field defines the type of operating cycle which will be started for the memory (e.g. read cycle, a write cycle, a read-modify-write cycle) in accordance with the following chart:

| Mnem | Value | Description |
|---|---|---|
| NOP | 0 | |
| RW | 1 | Start a read cycle for a word. |
| RD | 2 | Start a read cycle for a double-word. |
| RB | 3 | Start a read cycle for a byte. |
| Sα | 4 | Start per MEMS field of previous non LAT start. During EFA routines, the IP supplies the control. |
| WW | 5 | Start a write or rmod cycle for a word. |
| WD | 6 | Start a write or rmod cycle for a double word. See below. |
| WB | 7 | Start a write or rmod cycle for a byte. |

The MEMC Field

This 2-bit field defines the completion of a memory operation in accordance with the following chart:

| Mnem | Value | Description |
|---|---|---|
| N | 0 | |
| R | 1 | Read or Rmod operation. |
| W | 2 | Write operation. PMD<0-31> = DS<0-31> |
| A | 3 | Abort operation |

The UPAR Field

This single bit field contains the odd parity of the micro-word. If an even parity error is detected the overall operation will stop at the current micro-location incremented by +1.

The above discussion summarizes each of the fields of the micro-instruction format in accordance with the invention. It is helpful also to describe below the usage of the 8 flags which can be defined.

Flag 0 is the width flag and defines either a narrow (16 bit) arithmetic logic unit operation or a wide (32 bit) arithmetic logic unit operation. Flag 1 is an address flag and defines whether the logical address is to be driven as a basic instruction address (e.g. for NOVA/ECLIPSE operation) in which case only bits 17-31 of the logical address are driven by the logical address latch on the arithmetic logic unit, the address translation unit or the instruction processor unit. If the flag indicates an instruction expended address than all bits 0–31 of the extended logical address are so driven.

Flags 2–7 are general purpose flags and can be used as desired by the general micro-code in sequencing. For example, flag 4 has been used as a "shift indirect" flag and, when NSH is coded in the SHFT field of the micro-instruction format (see the discussion thereof above), a shift is made either to the left or to the right depending on the setting of flag 4. Further, flag 5 has been used to define whether or not a floating point operation requires a double precision operation.

UNIQUE MACRO-INSTRUCTIONS

In accordance with the unique extended processor system of the invention, as described above, certain operations are performed by the system which operations are in themselves uniquely indigenous to the overall operating capabilities of the system. Such operations are described in more detail below and can be best understood in conjunction with the system instruction set reproduced in Appendix B.

The first operation to be considered involves an interruption of a currently executing program by a peripheral device, for example, and the need to transfer control of the system to the appropriate interrupt operating sequence. One such unique interruption operation is related to the instruction designated as "EAGLE Vector on Interrupting Device" (having the abbreviated mnemonic description XVCT) in Appendix B (the instructions in the instruction set of Appendix B are listed in alphabetical order in accordance with their abbreviated mnemonic designations). An understanding of the XVCT interrupt operation can be obtained with the help of the diagrammatic representation of the memory locations shown in FIG. 155.

Interrupt requests are examined and identified in between the decoding of macroinstructions of a currently executing program and, if an interrupt request occurs, the contents of the stack registers for the current program are first saved in selected locations provided for such purpose in the current ring of execution (e.g. selected locations in Page 0 of the current ring).

Since ring 0 is the ring reserved for special operations, e.g., interrupt operations, the systems must then cross to ring 0 (change the CRE bits 1–3 of the SBA's to identify ring 0) and load the now empty stack registers with the contents, relating to interrupt procedures, of selected locations in ring 0. Further, a selected location of ring 0, e.g., location 0, for example, is examined to determine if the interrupt is a "base level" interrupt, i.e., an interrupt condition in which no other prior interrupts are being processed, or as a "higher level" interrupt in which one or more other interrupts are already pending. If pending location 0 indicates that the interrupt is a base level interrupt (e.g., location 0 is a "zero"), as seen, for example, in FIG. 155, then the interrupt code examines a selected location (e.g., location 1) of ring 0 to determine if such location contains the XVCT code (the first 16 bits of such location 1 corresponds to the first 16 bits of the XVCT code specified in Appendix B). If the interrupt is an XVCT interrupt, the stack registers are then loaded with the XVCT information to set up a XVCT stack, i.e., an XVCT stack "PUSH" as seen in FIG. 156.

Figure 155:
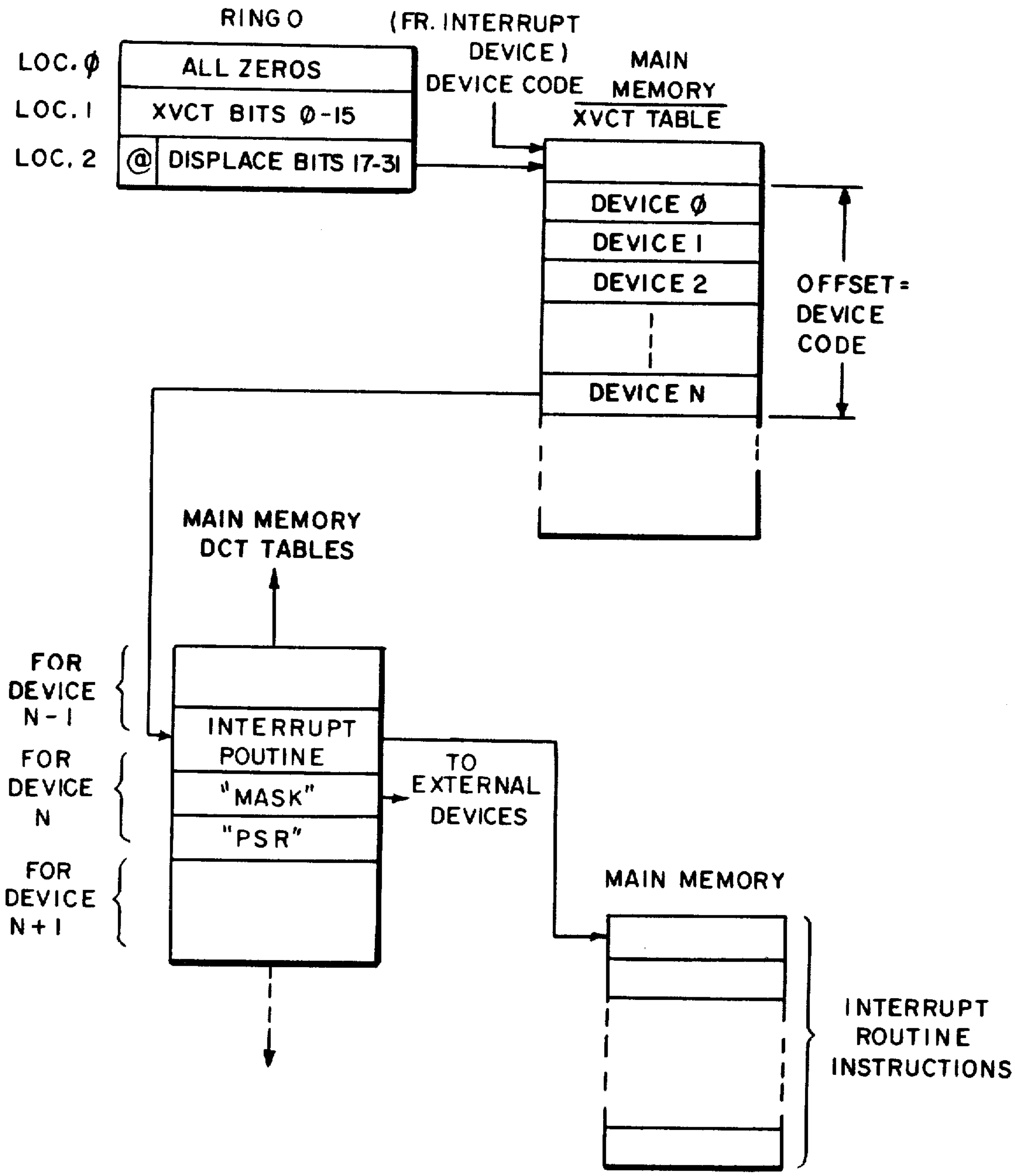
FIG. 155 shows a diagrammatic representation of certain memory locations used to explain the operation of a particular macro-instruction used in the system of FIG. 1.
Figure 156:
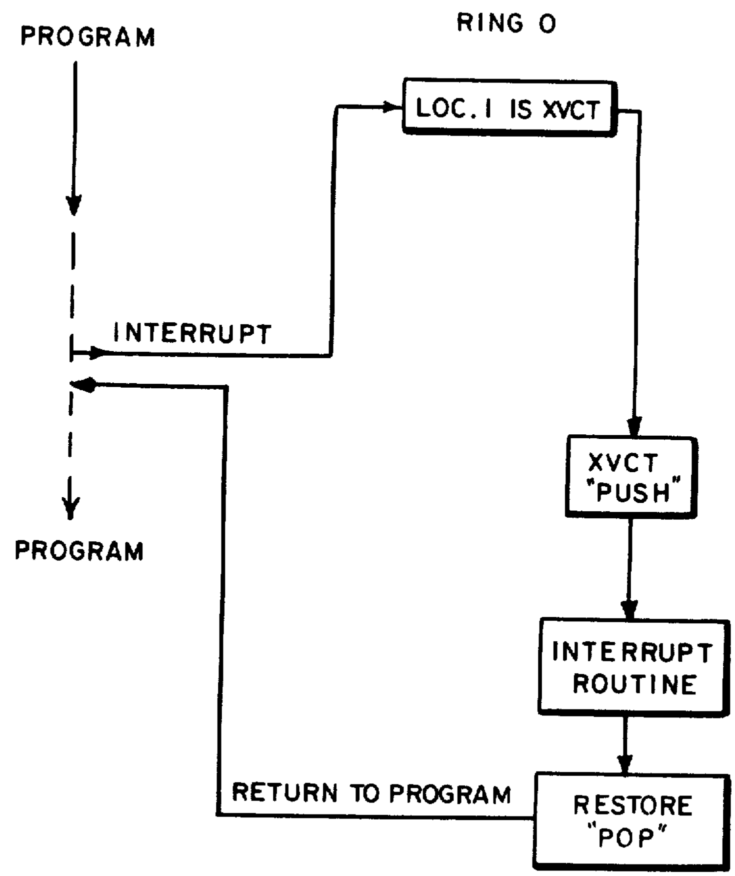
FIG. 156 shows a diagrammatic representation of certain operations performed in the macro-instruction discussed with reference to FIG. 155.

The displacement bits 17–31 of location 1 (corresponding to the displacement bits 17–31 of the XVCT instruction shown in Appendix B) then represent an address which points to a selected location in a preloaded XVCT table in the main memory (see FIG. 155). The "device code" information (a 16 bit offset code unique to each I/O device from which an interrupt request can be received) is received from the particular device which has requested the interrupt and offsets to a selected address which points to a particular device control table (DCT) in main memory associated with that particular device (e.g., DCT associated with device N identified in XVCT table). The device control table contains the address which points to macroinstructions in main memory which are required in order to perform the interrupt routine requested by the interrupting device.

The DCT also contains a coded word ("MASK") which identifies which other device can be "masked out" (i.e., prevented from performing an interrupt while the interrupt is pending for the particular device in question). Certain other devices which have higher interrupt priority than the device in question will not be so masked.

The DCT further defines the state of the system by a PSR (processor status register) word which is loaded into the PSR of the system and determines whether or not a fixed point overflow condition is to be enabled.

Once the macroinstructions for the particular interrupt routine requested by the particular device in question have been performed, the previously stored contents of the system stack registers relating to the program currently being executed by the system prior to the interrupt are restored to the system stack registers and such program continues its execution. The overall operation is shown diagrammatically in FIG. 156.

Another operation unique to the system described herein involves the loading of the segment base registers (SBR) of the system and related to the LSBRA instruction described in the instruction set of Appendix B. As explained above, the SBR's of the systems are not located in main memory but are more readily available on the ATU board of the system. The eight segment base registers of the system each contain a double word of a block of eight double words. The operation described here relates to the loading of such SBR's with an eight double-word block from memory, the starting address of which is contained in a selected accumulator of the system (e.g., ACØ). The LSBRA operation then loads such block into the SBR's in the manner shown by the table designated in connection with the LSBRA instruction in Appendix B.

In another operation indigenous to the system described here the 31-bit value contained in the program counter (PC), as discussed with reference to the instruction processor unit (FIG. 20), is added to the value of the displacement contained in a particular instruction word and the result is placed in the program counter, as shown with reference to address 148 and PC register 147 of FIG. 20. The displacement is contained in the instruction designated as WBR (Wide Branch) in the instruction set in Appendix B. Such operation is in effect a program counter "relative jump" and involves a 16-bit EAGLE address (PC) and an 8-bit offset, the latter contained as bits 1–8 of the WBR instruction.

In connection with EAGLE operation in the extended system of the invention, operations are performed to extend (i.e., to validate) 16-bit data to 32 bits. Such operations will involve either zero-extending (ZEX) or sign-extending (SEX) the 16-bit data, as shown in the ZEX or SEX instruction in Appendix B. Thus, for a zero extend operation the 16-bit integer which is contained in the source accumulator (ACS) identified by bits 1, 2 of the instruction, is zero-extended to 32 bits and the result is loaded into the destination accumulator (ACD), identified by bits 3, 4 of the instruction, with the contents of ACS remaining unchanged, unless such accumulators are the same accumulator. For a sign extend operation the 16-bit integar in the ACS is sign extended and placed in the ACD as above.

A further operation unique to the extended system of the invention involves an operation in which the signed 16-bit integer in bits 16–31 of the ACD is multiplied by the signed 16-bit integer in bits 16–31 of the ACS. Such operation is associated with the Narrow Multiply (NMUL) instruction in Appendix B. Since the system utilizes 32-bit accumulators, when multiplication of 16-bit words (i.e. "narrow" words) is required it is necessary to use only 16 bits of the 32-bit accumulator contents. An overflow occurs if the answer is larger than 16 bits, so that if the overflow bit "OVK" is in a selected state (e.g. OVK is a 1) an overflow indication occurs and the machine operation is stopped (a "trap" occurs) and an overflow handling routine must be invoked.

The above discussed unique operations of the system of the invention are all indigenous to the design and operation thereof and represent operations not required or suggested by other previously known data processing systems.

APPENDIX A

| DATA GENERAL CORPORATION MANUAL NO. | TITLE |
|---|---|
| 015-000 009 | HOW TO USE THE NOVA COMPUTER |
| 014-000 092 | ECLIPSE M/600 PRINCIPLES OF OPERATION |
| 014-000 629 | INTERFACE DESIGN'S REFERENCE NOVA AND ECLIPSE LINE COMPUTERS |
| 014-000 617 | PROGRAMMER'S REFERENCE NOVA 4 |

APPENDIX B

Add Complement

ADC*[c][sh][#]* *acs,acd[,skip]*

| 1 | ACS | ACD | 1 | 0 | 0 | SH | C | # | SKIP |
|---|---|---|---|---|---|---|---|---|---|
| 0 | 1 2 | 3 4 | 5 | 6 | 7 | 8 9 | 10 11 | 12 | 13 15 |

Adds the logical complement of an unsigned integer to another unsigned integer.

Initializes carry to the specified value, adds the logical complement of the unsigned, 16-bit number in bits 16-31 of ACS to the unsigned, 16-bit number in bits 16-31 of ACD, and places the result in the shifter. The instruction then performs the specified shift operation, and loads the result of the shift into bits 16-31 of ACD if the no-load bit is 0. If the skip condition is true, the next sequential word is skipped. For this instruction, *overflow* is 0.

If the load option is specified, bits 0-15 of ACD are undefined.

NOTE: *If the sum of the two numbers being added is greater than 65,535 the instruction complements carry.*

Add

ADD*[c][sh][#]* *acs,acd[,skip]*

| 1 | ACS | ACD | 1 | 1 | 0 | SH | C | # | SKIP |
|---|---|---|---|---|---|---|---|---|---|
| 0 | 1 2 | 3 4 | 5 | 6 | 7 | 8 9 | 10 11 | 12 | 13 15 |

Performs unsigned integer addition and complements carry if appropriate.

Initializes carry to the specified value, adds the unsigned, 16-bit number in bits 16-31 of ACS to the unsigned, 16-bit number in bits 16-31 of ACD, and places the result in the shifter. The instruction then performs the specified shift operation and places the result of the shift in bits 16-31 of ACD if the no-load bit is 0. If the skip condition is true, the next sequential word is skipped. For this instruction, *overflow* is 0.

If the load option is specified, bits 0-15 of ACD are undefined.

NOTE: *If the sum of the two numbers being added is greater than 65,535, the instruction complements carry.*

Extended Add Immediate

ADDI *i,ac*

| 0 | 1 | 2 | 3-4 | 5 | 6 | 7 | 8 | 9 | 10 | 11 | 12 | 13 | 14 | 15 | 16-31 |
|---|---|---|---|---|---|---|---|---|---|---|---|---|---|---|---|
| 1 | 1 | 1 | AC | 1 | 1 | 1 | 1 | 1 | 1 | 1 | 1 | 0 | 0 | 0 | IMMEDIATE FIELD |

Adds a signed integer in the range -32,768 to +32,767 to the contents of an accumulator.

Treats the contents of the immediate field as a signed, 16-bit, two's complement number and adds it to the signed, 16-bit, two's complement number contained in bits 16-31 of the specified accumulator, placing the result in bits 16-31 of the same accumulator. Carry remains unchanged and *overflow* is 0.

Bits 0-15 of the modified accumulator are undefined after completion of this instruction.

Add Immediate

ADI *n,ac*

| 0 | 1-2 | 3-4 | 5 | 6 | 7 | 8 | 9 | 10 | 11 | 12 | 13 | 14 | 15 |
|---|---|---|---|---|---|---|---|---|---|---|---|---|---|
| 1 | N | AC | 0 | 0 | 0 | 0 | 0 | 0 | 0 | 1 | 0 | 0 | 0 |

Adds an unsigned integer in the range 1-4 to the contents of an accumulator.

Adds the contents of the immediate field *N*, plus 1, to the unsigned, 16-bit number contained in bits 16-31 of the specified accumulator, placing the result in bits 16-31 of the same accumulator. Carry remains unchanged and *overflow* is 0.

Bits 0-15 of the modified accumulator are undefined after completion of this instruction.

NOTE: *The assembler takes the coded value of* n *and subtracts 1 from it before placing it in the immediate field. Therefore, the programmer should code the exact value that he wishes to add.*

Example

Assume that AC2 contains $177775_8$. After the instruction ADI 4,2 is executed, AC2 contains $000001_8$ and carry is unchanged.

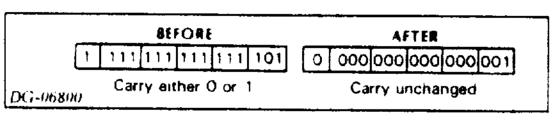

AND With Complemented Source

ANC *acs,acd*

| 0 | 1-2 | 3-4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 0 | 1 | 1 | 0 | 0 | 0 | 1 | 0 | 0 | 0 |

Forms the logical AND of the logical complement of the contents of bits 16-31 of ACS and the contents of bits 16-31 of ACD and places the result in bits 16-31 of ACD. The instruction sets a bit position in the result to 1 if the corresponding bit position in ACS contains 0. The contents of carry and ACS remain unchanged. *Overflow* is 0.

Bits 0-15 of the modified accumulator are undefined after completion of this instruction.

AND

AND*[c][sh][#] acs,acd[,skip]*

| 0 | 1-2 | 3-4 | 5 | 6 | 7 | 8-9 | 10-11 | 12 | 13-15 |
|---|---|---|---|---|---|---|---|---|---|
| 1 | ACS | ACD | 1 | 1 | 1 | SH | C | # | SKIP |

Forms the logical AND of the contents of two accumulators.

Initializes the carry bit to the specified value. Places the logical AND of bits 16-31 of ACS and bits 16-31 of ACD in the shifter. Each bit placed in the shifter is 1 only if the corresponding bit in both ACS and ACD is one; otherwise the resulting bit is 0. The instruction then performs the specified shift operation and places the result in bits 16-31 of ACD if the no-load bit is 0. If the skip condition is true, the next sequential word is skipped. *Overflow* is 0.

If the load option is specified, bits 0-15 of ACD are undefined.

AND Immediate

ANDI *i,ac*

| 0 | 1 | 2 | 3-4 | 5 | 6 | 7 | 8 | 9 | 10 | 11 | 12 | 13 | 14 | 15 | 16-31 |
|---|---|---|---|---|---|---|---|---|---|---|---|---|---|---|---|
| 1 | 1 | 0 | AC | 1 | 1 | 1 | 1 | 1 | 1 | 1 | 1 | 0 | 0 | 0 | IMMEDIATE FIELD |

Places the logical AND of the contents of the immediate field and the contents of bits 16-31 of the specified accumulator in bits 16-31 of the specified accumulator. Carry is unchanged and *overflow* is 0.

Bits 0-15 of the modified accumulator are undefined after completion of this instruction.

Block Add and Move

BAM

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 1 | 0 | 1 | 1 | 1 | 1 | 1 | 0 | 0 | 1 | 0 | 0 | 0 |

Moves memory words from one location to another, adding a constant to each one.

Moves words sequentially from one memory location to another, treating them as unsigned, 16-bit integers. After fetching a word from the source location, the instruction adds the unsigned, 16-bit integer in bits 16-31 of AC0 to it. If the addition produces a carry of 1 out of the high-order bit, no indication is given.

Bits 17–31 of AC2 contain the address of the source location. Bits 17–31 of AC3 contain the address of the destination location. The address in bits 17–31 of AC2 or AC3 is an indirect address if bit 16 of that accumulator is 1. In that case, the instruction follows the indirection chain before placing the resultant effective address in the accumulator.

The unsigned, 16-bit number in bits 16-31 of AC1 is equal to the number of words moved. This number must be greater than 0 and less than or equal to 32,768. If the number in AC1 is outside these bounds, no data is moved and the contents of the accumulators remain unchanged.

| AC | Contents |
|---|---|
| 0 | Addend |
| 1 | Number of words to be moved |
| 2 | Source address |
| 3 | Destination address |

For each word moved, the count in AC1 is decremented by one and the source and destination addresses in AC2 and AC3 are incremented by one. Upon completion of the instruction, AC1 contains zeroes, and AC2 and AC3 point to the word following the last word in their respective fields. The contents of carry and AC0 remain unchanged. *Overflow* is 0.

The 32-bit effectibe address generated by this instruction is constrained to be within the first 32 Kword of the current segment.

Words are moved in consecutive, ascending order according to their addresses. The next address after $77777_8$ is 0 for both fields. The fields may overlap in any way.

> NOTE: *Because of the potentially long time that may be required to perform this instruction it is interruptable. If a* Block Add and Move *instruction is interrupted, the program counter is decremented by one before it is placed in location 0 so that it points to the interrupted instruction. Because the addresses and the word count are updated after every word stored, any interrupt service routine that returns control to the interrupted program via the address stored in memory location 0 will correctly restart the* Block Add and Move *instruction.*

When updating the source and destination addresses, the *Block Add And Move* instruction forces bit 0 of the result to 0. This ensures that upon return from an interrupt, the *Block Add And Move* instruction will not try to resolve an indirect address in either AC2 or AC3.

Breakpoint

BKPT

| 1 | 1 | 0 | 0 | 0 | 1 | 1 | 1 | 1 | 0 | 0 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Pushes a wide return block onto the present stack.

The value of the PC in the return block is the address of this instruction. After pushing the block, the instruction checks for stack overflow. If no overflow occurred, the instruction sets the PSR to zero and performs a wide jump indirect through locations $10–11_8$ in page zero of the current segment. If overflow occurred, a stack fault occurs and AC1 contains the code 0; after the fault is handled, the PSR is set to zero and the jump indirect occurs. Carry remains unchanged by this instruction.

Block Move

BLM

| 1 | 0 | 1 | 1 | 0 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Moves memory words from one location to another.

The *Block Move* instruction is the same as the *Block Add And Move* instruction in all respects except that no addition is performed and AC0 is not used. Carry remains unchanged, and *overflow* is 0.

The 32-bit effective address generated by this instruction is constrained to be within the first 32 Kword of the current segment.

NOTE: *The* Block Move *instruction is interruptable in the same manner as the* Block Add And Move *instruction.*

Set Bit To One

BTO *acs,acd*

| 1 | ACS | ACD | 1 | 0 | 0 | 0 | 0 | 0 | 0 | 1 | 0 | 0 | 0 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Sets the specified bit to 1.

Forms a 32-bit bit pointer from the contents of bits 16-31 of both ACS and ACD. Bits 16-31 of ACS contains the high-order 16 bits and bits 16-31 of ACD contains the low-order 16 bits of the bit pointer. If ACS and ACD are specified as the same accumulator, the instruction treats the accumulator contents as the low-order 16-bits of the bit pointer and assumes the high-order 16 bits are 0. Carry remains unchanged and *overflow* is 0.

The instruction then sets the addressed bit in memory to 1, leaving the contents of ACS and ACD unchanged.

The 32-bit effective address generated by this instruction is constrained to be within the first 32 Kword of the current segment.

NOTE: *The bit pointer contained in ACS and ACD must not make indirect memory references.*

Set Bit To Zero

BTZ *acs,acd*

| 1 | ACS | ACD | 1 | 0 | 0 | 0 | 1 | 0 | 0 | 1 | 0 | 0 | 0 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Sets the addressed bit to 0.

Forms a 32-bit bit pointer from the contents of bits 16-31 of both ACS and ACD. Bits 16-31 of ACS contains the high-order 16 bits and bits 16-31 of ACD contains the low-order 16 bits of the bit pointer. If ACS and ACD are specified as the same accumulator, the instruction treats the accumulator contents as the low-order 16 bits of the bit pointer and assumes the high-order 16 bits are 0. Carry remains unchanged and *overflow* is 0.

The instruction then sets the addressed bit in memory to 0, leaving the contents of ACS and ACD unchanged.

The 32-bit effective address generated by this instruction is constrained to be within the first 32 Kword of the current segment.

NOTE: *The bit pointer contained in ACS and ACD must not make indirect memory references.*

Compare To Limits

CLM *acs,acd*

| 1 | ACS | | ACD | | 1 | 0 | 0 | 1 | 1 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Compares a signed integer with two other integers and skips if the first integer is between the other two. The accumulators determine the location of the three integers.

Compares the 16-bit, signed, two's complement integer in bits 16-31 of ACS to two 16-bit, signed, two's complement limit values, *L* and *H*. If the number in bits 16-31 of ACS is greater than or equal to *L* and less than or equal to *H*, the next sequential word is skipped. If the number in bits 16-31 of ACS is less than *L* or greater than *H*, the next sequential word is executed.

If ACS and ACD are specified as different accumulators, the address of the limit value *L* is contained in bits 16–31 of ACD. The limit value *H* is contained in the word following *L*. Bits 0-15 of ACD are ignored.

The 32-bit effective address generated by this instruction is constrained to be within the first 32 Kword of the current segment.

If ACS and ACD are specified as the same accumulator, then the integer to be compared must be in that accumulator and the limit values *L* and *H* must be in the two words following the instruction. *L* is the first word and *H* is the second word. The next sequential word is the third word following the instruction.

When *L* and *H* are in line, this instruction can be placed anywhere in the 32-bit address space.

This instruction leaves carry unchanged; *overflow* is 0.

Character Compare

CMP

| 1 | 1 | 0 | 1 | 1 | 1 | 1 | 1 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Under control of the four accumulators, compares two strings of bytes and returns a code in AC1 reflecting the results of the comparison.

The instruction compares the strings one byte at a time. Each byte is treated as an unsigned 8-bit binary quantity in the range $0–255_{10}$. If two bytes are not equal, the string whose byte has the smaller numerical value is, by definition, the *lower valued* string. Both strings remain unchanged. The four accumulators contain parameters passed to the instruction. Two accumulators specify the starting address, the number of bytes, and the direction of processing (ascending or descending addressed) for each string.

Bits 16-31 of AC0 specify the length and direction of comparison for string 2. If the string is to be compared from its lowest memory location to the highest, bits 16-31 of AC0 contain the unsigned value of the number of bytes in string 2. If the string is to be compared from its highest memory location to the lowest, bits 16-31 of AC0 contain the two's complement of the number of bytes in string 2.

Bits 16-31 of AC1 specify the length and direction of comparison for string 1. If the string is to be compared from its lowest memory location to the highest, bits 16-31 of AC0 contain the unsigned value of the number of bytes in string 1. If the string is to be compared from its highest memory location to the lowest, bits 16-31 of AC1 contain the two's complement of the number of bytes in string 1.

Bits 16-31 of AC2 contain a byte pointer to the first byte compared in string 2. When the string is compared in ascending order, AC2 points to the lowest byte. When the string is compared in descending order, AC2 points to the highest byte.

Bits 16-31 of AC3 contain a byte pointer to the first byte compared in string 1. When the string is compared in ascending order, AC3 points to the lowest byte. When the string is compared in descending order, AC3 points to the highest byte.

| Code | Comparison Result |
|---|---|
| - 1 | string 1 < string 2 |
| 0 | string 1 = string 2 |
| + 1 | string 1 > string 2 |

The strings may overlap in any way. Overlap will not effect the results of the comparison.

Upon completion, bits 16-31 of AC0 contain the number of bytes left to compare in string 2. AC1 contains the return code as shown in the table above. Bits 16-31 of AC2 contains a byte pointer either to the failing byte in string 2 (if an inequality were found), or to the byte following string 2 (if string 2 were exhausted). Bits 16-31 of AC3 contains a byte pointer either to the failing byte in string 1 (if an inequality were found), or to the byte following string 1 (if string 1 were exhausted). Carry remains unchanged. *Overflow* is 0.

If AC0 and AC1 both contain 0 (both string 1 and string 2 have length zero), the instruction compares no bytes and returns 0 in AC1. If the two strings are of unequal length, the instruction pads the shorter string with space characters $<040_8>$ and continues the comparison.

The 32-bit effective address generated by this instruction is constrained to be within the first 64 Kbyte of the current segment.

NOTE: *The original contents of AC2 and AC3 must be valid byte pointers to an area in the user's address space. If the pointers are invalid a protection fault occurs, even if no bytes are to be compared. AC1 contains the code 2.*

Character Move Until True
CMT

| 1 | 1 | 1 | 0 | 1 | 1 | 1 | 1 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Under control of the four accumulators, moves a string of bytes from one area of memory to another until either a table-specified delimiter character is moved or the source string is exhausted.

The instruction copies the string one byte at a time. Before it moves a byte, the instruction uses that byte's value to determine if it is a delimiter. It treats the byte as an unsigned 8-bit binary integer (in the range $0\text{–}255_{10}$) and uses it as a bit index into a 256-bit delimiter table. If the indexed bit in the delimiter table is zero, the byte pending is not a delimiter, and the instruction copies it from the source string to the destination string. If the indexed bit in the delimiter table is 1, the byte pending is a delimiter; the instruction does not copy it, and the instruction terminates.

The instruction processes both strings in the same direction, either from lowest memory locations to highest (*ascending order*), or from highest memory locations to lowest (*descending order*). Processing continues until there is a delimiter or the source string is exhausted. The four accumulators contain parameters passed to the instruction.

Bits 16-31 of AC0 contain the address (word address), possibly indirect, of the start of the 256-bit (16-word) delimiter table.

Bits 16-31 of AC1 specify the length of the strings and the direction of processing. If the source string is to be moved to the destination field in ascending order, bits 16-31 of AC1 contain the unsigned value of the number of bytes in the source string. If the source string is to be moved to the destination field in descending order, bits 16-31 of AC1 contain the two's complement of the number of bytes in the source string.

Bits 16-31 of AC2 contain a byte pointer to the first byte to be written in the destination field. When the process is performed in ascending order, bits 16-31 of AC2 point to the lowest byte in the destination field. When the process is performed in descending order, bits 16-31 of AC2 point to the highest byte in the destination field.

Bits 16-31 of AC3 contain a byte pointer to the first byte to be processed in the source string. When the process is performed in ascending order, bits 16-31 of AC3 point to the lowest byte in the source string. When the process is performed in descending order, bits 16-31 of AC3 point to the highest byte in the source string.

The fields may overlap in any way. However, the instruction moves bytes one at a time, so certain types of overlap may produce unusual side effects.

Upon completion, bits 16-31 of AC0 contain the resolved address of the translation table and AC1 contain the number of bytes that were not moved. Bits 16-31 of AC2 contain a byte pointer to the byte following the last byte written in the destination field. Bits 16-31 of AC3 contain a byte pointer either to the delimiter or to the first byte following the source string. Carry remains unchanged. *Overflow* is 0.

The 32-bit effective address generated by this instruction is constrained to be within the first 64 Kword of the current segment.

NOTE: *If AC1 contains the number 0 at the beginning of this instruction, no bytes are fetched and none are stored. The instruction becomes a No-Op.*

NOTE: *The original contents of AC0, AC2, and AC3 must be valid pointers to some area in the user's address space. If they are invalid a protection fault occurs, even if no bytes are to be moved. AC1 contains the code 2.*

Character Move
CMV

| 1 | 1 | 0 | 1 | 0 | 1 | 1 | 1 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Under control of the four accumulators, moves a string of bytes from one area of memory to another and returns a value in carry reflecting the relative lengths of source and destination strings.

The instruction copies the source string to the destination field, one byte at a time. The four accumulators contain parameters passed to the instruction. Two accumulators specify the starting address, number of bytes to be copied, and the direction of processing (ascending or descending addresses) for each field.

Bits 16-31 of AC0 specify the length and direction of processing for the destination field. If the field is to be processed from its lowest memory location to the highest, bits 16-31 of AC0 contain the unsigned value of the number of bytes in the destination field. If the field is to be processed from its highest memory location to the lowest, bits 16-31 of AC0 contain the two's complement of the number of bytes in the destination field.

Bits 16-31 of AC1 specify the length and direction of processing for the source string. If the string is to be processed from its lowest memory location to the highest, bits 16-31 of AC1 contain the unsigned value of the number of bytes in the source string. If the field is to be processed from its highest memory location to the lowest, bits 16-31 of AC1 contain the two's complement of the number of bytes in the source string.

Bits 16-31 of AC2 contain a byte pointer to the first byte to be written in the destination field. When the field is written in ascending order, bits 16-31 of AC2 point to the lowest byte. When the field is written in descending order, bits 16-31 of AC2 point to the highest byte.

Bits 16-31 of AC3 contain a byte pointer to the first byte copied in the source string. When the field is copied in ascending order, bits 16-31 of AC3 point to the lowest byte. When the field is copied in descending order, bits 16-31 of AC3 point to the highest byte.

The fields may overlap in any way. However, the instruction moves bytes one at a time, so certain types of overlap may produce unusual side effects.

Upon completion, AC0 contains 0 and bits 16-31 of AC1 contain the number of bytes left to fetch from the source field. Bits 16-31 of AC2 contain a byte pointer to the byte following the destination field; bits 16-31 of AC3 contain a byte pointer to the byte following the last byte fetched from the source field. *Overflow* is 0.

The 32-bit effective address generated by this instruction is constrained to be within the first 64Kbyte of the current segment.

> NOTE: *If AC0 contains the number 0 at the beginning of this instruction, no bytes are fetched and none are stored. If AC1 is 0 at the beginning of this instruction, the destination field is filled with space characters.*

> NOTE: *The original contents of AC2 and AC3 must be valid pointers to some area in the user's address space. If they are invalid a protection fault occurs, even if no bytes are to be moved. AC1 contains the code 2.*

If the source field is longer than the destination field, the instruction terminates when the destination field is filled and sets carry to 1. In any other case, the instruction sets carry to 0.

If the source field is shorter than the destination field, the instruction pads the destination field with space characters $<040_8>$.

Count Bits

COB *acs,acd*

| 1 | ACS | ACD | 1 | 0 | 1 | 1 | 0 | 0 | 0 | 1 | 0 | 0 | 0 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Adds a number equal to the number of ones in bits 16-31 of ACS to the signed, 16-bit, two's complement number in bits 16-31 of ACD. The instruction leaves the contents of ACS and the state of carry unchanged. *Overflow* is 0.

Bits 0-15 of the modified accumulator are undefined after completion of this instruction.

NOTE: *If ACS and ACD are the same accumulator, the instruction functions as described above, except the contents of ACS will be changed.*

Complement

COM*[c][sh][#]* *acs,acd[,skip]*

| 0 | 1-2 | 3-4 | 5 | 6 | 7 | 8-9 | 10-11 | 12 | 13-15 |
|---|---|---|---|---|---|---|---|---|---|
| 1 | ACS | ACD | 0 | 0 | 0 | SH | C | # | SKIP |

Forms the logical complement of the contents of an accumulator.

Initializes carry to the specified value, forms the logical complement of the number in bits 16-31 of ACS, and performs the specified shift operation. The instruction then places the result in bits 16-31 of ACD if the no-load bit is 0. If the skip condition is true, the next sequential word is skipped.

If the load option is specified, bits 0-15 of ACD are undefined.

For this instruction, *overflow* is 0.

Complement Carry

CRYTC

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 0 | 0 | 1 | 1 | 1 | 1 | 1 | 1 | 0 | 1 | 0 | 0 | 1 |

Complements the value of carry. *Overflow* is 0.

Set Carry to One

CRYTO

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 0 | 0 | 1 | 1 | 1 | 1 | 1 | 0 | 0 | 1 | 0 | 0 | 1 |

Unconditionally sets the value of carry to 1. *Overflow* is 0.

Set Carry to Zero

CRYTZ

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 0 | 0 | 1 | 1 | 1 | 1 | 1 | 0 | 1 | 1 | 0 | 0 | 1 |

Unconditionally sets the value of carry to 0. *Overflow* is 0.

Character Translate

CTR

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 1 | 0 | 0 | 1 | 1 | 1 | 1 | 0 | 1 | 0 | 1 | 0 | 0 | 0 |

Under control of the four accumulators, translates a string of bytes from one data representation to another and either moves it to another area of memory or compares it to a second translated string.

The instruction operates in two modes; translate and move, and translate and compare.

When operating in translate and move mode, the instruction translates each byte in string 1, and places it in a corresponding position in string 2. Translation is performed by using each byte as an 8-bit index into a 256-byte translation table. The byte addressed by the index then becomes the translated value.

When operating in translate and compare mode, the instruction translates each byte in string 1 and string 2 as described above, and compares the translated values. Each translated byte is treated as an unsigned 8-bit binary quantity in the range $0\text{-}255_{10}$. If two translated bytes are not equal, the string whose byte has the smaller numerical value is, by definition the *lower valued* string. Both strings remain unchanged.

Bits 16-31 of AC0 specify the address, either direct or indirect, of a word which contains a byte pointer to the first byte in the 256-byte translation table.

Bits 16-31 of AC1 specify the length of the two strings and the mode of processing. If string 1 is to be processed in translate and move mode, bits 16-31 of AC1 contain the two's complement of the number of bytes in the strings. If the strings are to be processed in translate and compare mode, bits 16-31 of AC1 contain the unsigned value of the number of bytes in the strings. Both strings are processed from lowest memory address to highest.

Bits 16-31 of AC2 contain a byte pointer to the first byte in string 2.

Bits 16-31 of AC3 contain a byte pointer to the first byte in string 1.

Upon completion of a translate and move operation, bits 16-31 of AC0 contain the address of the word which contains the byte pointer to the translation table and AC1 contains 0. Bits 16-31 of AC2 contain a byte pointer to the byte following string 2 and bits 16-31 of AC3 contain a byte pointer to the byte following string 1. Carry remains unchanged. *Overflow* is 0.

Upon completion of a translate and compare operation, bits 16-31 of AC0 contain the address of the word which contains the byte pointer to the translation table. AC1 contains a return code as calculated in the table below. Bits 16-31 of AC2 contain a byte pointer to either the failing byte in string 2 (if an inequality was found) or the byte following string 2 if the strings were identical. Bits 16-31 of AC3 contain a byte pointer to either the failing byte in string 1 (if an inequality was found) or the byte following string 1 if the strings were identical. Carry contains an indeterminate value. *Overflow* is 0.

The 32-bit effective address generated by this instruction is constrained to be within the first 64 Kbyte of the current segment.

| Code | Result |
|---|---|
| -1 | Translated value of string 1 < Translated value of string 2 |
| 0 | Translated value of string 1 = Translated value of string 2 |
| +1 | Translated value of string 1 > Translated value of string 2 |

If the length of both string 1 and string 2 is zero, the compare option returns a 0 in AC1.

The fields may overlap in any way. However, processing is done one character at a time, so unusual side effects may be produced by certain types of overlap.

NOTE: *The original contents of AC0, AC2, and AC3 must be valid byte pointers to some area in the user's address space. If they are invalid a protection fault occurs, even if no bytes are to be moved or compared. AC1 contains the code 2.*

Convert to 16-Bit Integer

CVWN *ac*

| 1 | 1 | 1 | AC | | 1 | 1 | 0 | 0 | 1 | 1 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Converts a 32-bit integer to a 16-bit integer.

The instruction converts the 32-bit contents of the specified accumulator to a 16-bit integer by extending bit 17 into bits 0–16. If the 17 most significant bits do not contain the same value (i.e., all 1's or all 0's) before conversion takes place, then this instruction sets *overflow* to 1 before performing the conversion. Carry is unchanged.

Decimal Add

DAD *acs,acd*

| 1 | ACS | | ACD | | 0 | 0 | 0 | 1 | 0 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Performs decimal addition on 4-bit binary coded decimal (BCD) numbers and uses carry for a decimal carry.

Adds the unsigned decimal digit contained in bits 28–31 of ACS to the unsigned decimal digit contained in bits 28–31 of ACD. Carry is added to this result. The instruction then places the decimal units' position of the final result in bits 28–31 of ACD, and the decimal carry in carry. The contents of ACS and bits 0–27 of ACD remain unchanged. *Overflow* is 0.

NOTE: *No validation of the input digits is performed. Therefore, if bits 28–31 of either ACS or ACD contain a number greater than 9, the results will be unpredictable.*

Example

Assume that bits 28–31 of AC2 contain 9; bits 28–31 of AC3 contain 7; and the carry bit is 0. After the instruction DAD 2,3 is executed, AC2 remains the same; bits 28–31 of AC3 contain 6; and carry is 1, indicating a decimal carry from this *Decimal Add*.

| | BEFORE | AFTER |
|---|---|---|
| AC2 | 0 000 000 000 001 001 | 0 000 000 000 001 001 |
| AC3 | 0 000 000 000 000 111 | 0 000 000 000 000 110 |
| | Carry = 0 | Carry = 1 |

DG-06798

Double Hex Shift Left

DHXL *n,ac*

| 1 | N | | AC | | 0 | 1 | 1 | 1 | 0 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Shifts the 32-bit number contained in bits 16-31 of AC and bits 16-31 of AC+1 left a number of hex digits depending upon the immediate field *N*. The number of digits shifted is equal to *N*+1. Bits shifted out are lost and the vacated bit positions are filled with zeroes. Carry remains unchanged and *overflow* is 0.

Bits 0-15 of the modified accumulator are undefined after completion of this instruction.

NOTE: *If AC is specified as AC3, then AC+1 is AC0.*

NOTE: *The assembler takes the coded value of* n *and subtracts one from it before placing it in the immediate field. Therefore, the programmer should code the exact number of hex digits that he wishes to shift.*

*If* N *is equal to 3, the contents of AC+1 are placed in AC and AC+1 is filled with zeroes.*

Double Hex Shift Right
DHXR *n,ac*

| 0 | 1-2 | 3-4 | 5 | 6 | 7 | 8 | 9 | 10 | 11 | 12 | 13 | 14 | 15 |
|---|---|---|---|---|---|---|---|---|---|---|---|---|---|
| 1 | N | AC | 0 | 1 | 1 | 1 | 1 | 0 | 0 | 1 | 0 | 0 | 0 |

Shifts the 32-bit number contained in bits 16-31 of AC and bits 16-31 of AC+1 right a number of hex digits depending upon the immediate field *N*. The number of digits shifted is equal to *N*+1. Bits shifted out are lost and the vacated bit positions are filled with zeroes. Carry remains unchanged and *overflow* is 0.

Bits 0-15 of the modified accumulator are undefined after completion of this instruction.

NOTE: *If AC is specified as AC3, then AC+1 is AC0.*

NOTE: *The assembler takes the coded value of* n *and subtracts one from it before placing it in the immediate field. Therefore, the programmer should code the exact number of hex digits that he wishes to shift.*

*If* N *is equal to 3, the contents of AC are placed in AC+1 and AC is filled with zeroes.*

Unsigned Divide
DIV

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 0 | 1 | 0 | 1 | 1 | 1 | 1 | 1 | 0 | 0 | 1 | 0 | 0 | 0 |

Divides the unsigned 32-bit integer in bits 16-31 of two accumulators by the unsigned contents of a third accumulator. The quotient and remainder each occupy one accumulator.

Divides the unsigned 32-bit number contained in bits 16-31 of AC0 and bits 16-31 of AC1 by the unsigned, 16-bit number in bits 16-31 of AC2. The quotient and remainder are unsigned, 16-bit numbers and are placed in bits 16-31 of AC1 and AC0, respectively. Carry is set to 0. The contents of AC2 remain unchanged. *Overflow* is 0.

Bits 0-15 of the modified accumulator are undefined after completion of this instruction.

NOTE: *Before the divide operation takes place, the number in bits 16-31 of AC0 is compared to the number in bits 16-31 of AC2. If the contents of bits 16-31 of AC0 are greater than or equal to the contents of bits 16-31 of AC2, an overflow condition is indicated. Carry is set to 1, and the operation is terminated. All operands remain unchanged.*

Signed Divide
DIVS

| 1 | 1 | 0 | 1 | 1 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Divides the signed 32-bit integer in bits 16-31 of two accumulators by the signed contents of a third accumulator. The quotient and remainder each occupy one accumulator.

The signed, 32-bit two's complement number contained in bits 16-31 of AC0 and bits 16-31 of AC1 is divided by the signed, 16-bit two's complement number in bits 16-31 of AC2. The quotient and remainder are signed, 16-bit numbers and occupy bits 16-31 of AC1 and AC0, respectively. The sign of the quotient is determined by the rules of algebra. The sign of the remainder is always the same as the sign of the dividend, except that a zero quotient or a zero remainder is always positive. Carry is set to 0. The contents of AC2 remain unchanged. *Overflow* is 0.

Bits 0-15 of the modified accumulator are undefined after completion of this instruction.

> NOTE: *If the magnitude of the quotient is such that it will not fit into bits 16-31 of AC1, an overflow condition is indicated. Carry is set to 1, and the operation is terminated. The contents of AC0 and AC1 are unpredictable.*

Sign Extend and Divide
DIVX

| 1 | 0 | 1 | 1 | 1 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Extends the sign of one accumulator into a second accumulator and performs a *Signed Divide* on the result.

Extends the sign of the 16-bit number in bits 16-31 of AC1 into bits 16-31 of AC0 by placing a copy of bit 16 of AC1 in bits 16-31 of of AC0. After extending the sign, the instruction performs a *Signed Divide* operation. *Overflow* is 0.

Bits 0-15 of the modified accumulator are undefined after completion of this instruction.

Double Logical Shift
DLSH *acs,acd*

| 1 | ACS | | ACD | | 0 | 1 | 0 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Shifts the 32-bit number contained in bits 16-31 of ACD and bits 16-31 of ACD+1 either left or right depending on the number contained in bits 24–31 of ACS. The signed, 8-bit two's complement number contained in bits 24–31 of ACS determines the direction of the shift and the number of bits to be shifted. If the number in bits 24–31 of ACS is positive, shifting is to the left; if the number in bits 24–31 of ACS is negative, shifting is to the right. If the number in bits 24–31 of ACS is zero, no shifting is performed. Bits 0–23 of ACS are ignored.

AC3+1 is AC0. The number of bits shifted is equal to the magnitude of the number in bits 24–31 of ACS. Bits shifted out are lost, and the vacated bit positions are filled with zeroes. Carry and the contents of ACS remain unchanged. *Overflow* is 0.

Bits 0-15 of the modified accumulator are undefined after completion of this instruction.

NOTE: *If the magnitude of the number in bits 24–31 of ACS is greater than* $31_{10}$, *bits 16-31 of ACD are set to 0. Carry and the contents of ACS remain unchanged.*

Decimal Subtract

DSB *acs,acd*

| 1 | ACS | ACD | 0 | 0 | 0 | 1 | 1 | 0 | 0 | 1 | 0 | 0 | 0 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Performs decimal subtraction on 4-bit binary coded decimal (BCD) numbers and uses carry as a decimal borrow.

Subtracts the unsigned decimal digit contained in ACS bits 28–31 from the unsigned decimal digit contained in ACD bits 28–31. Subtracts the complement of carry from this result. Places the decimal units' position of the final result in ACD bits 28–31 and the complement of the decimal borrow in carry. In other words, if the final result is negative, the instruction indicates a borrow and sets carry to 0. If the final result is positive, the instruction indicates no borrow and sets carry to 1. The contents of ACS and bits 0–27 of ACD remain unchanged. *Overflow* is 0.

Example

Assume that bits 28–31 of AC2 contain 9; bits 28–31 of AC3 contain 7; and carry contains 0. After the instruction DSB 3,2 is executed, AC3 remains the same; bits 28–31 of AC2 contain 1; and carry is set to 1, indicating no borrow from this *Decimal Subtract*.

| | BEFORE | AFTER |
|---|---|---|
| AC2 | 0 000 000 000 001 001 | 0 000 000 000 000 001 |
| AC3 | 0 000 000 000 000 111 | 0 000 000 000 000 111 |
| | Carry = 0 | Carry = 1 |

DG-06799

Dispatch

DSPA *ac,[@]displacement[,index]*

| 1 | 1 | 0 | AC | 1 | INDEX | 0 | 1 | 1 | 1 | 1 | 0 | 0 | 0 | @ | DISPLACEMENT |
|---|---|---|---|---|---|---|---|---|---|---|---|---|---|---|---|
| 0 | 1 | 2 | 3 4 | 5 | 6 7 | 8 | 9 | 10 | 11 | 12 | 13 | 14 | 15 | 16 | 17 … 31 |

Conditionally transfers control to an address selected from a table.

Computes the effective address *E* . This is the address of a *dispatch table*. The dispatch table consists of a table of addresses. Immediately before the table are two 16-bit, signed, two's complement limit words, *L* and *H*. The last word of the table is in location $E+H-L$.

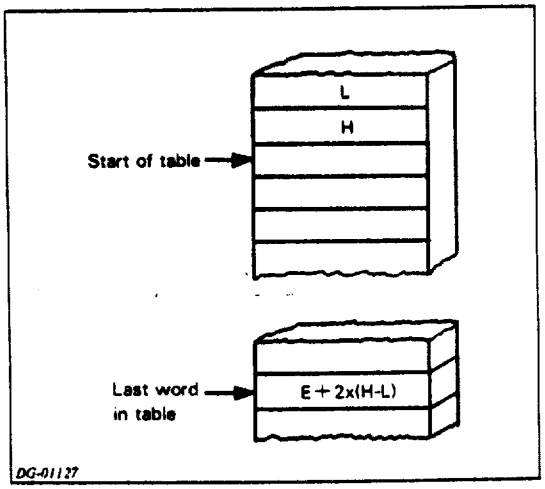

Compares the signed, two's complement number contained in bits 16-31 of the specified accumulator to the limit words. If the number in the accumulator is less than *L* or greater than *H*, sequential operation continues with the instruction immediately after the *Dispatch* instruction.

If the number in bits 16-31 of the specified accumulator is greater than or equal to *L* and less than or equal to *H*, the instruction fetches the word at location *E-L+number*. If the fetched word is equal to $177777_8$, sequential operation continues with the instruction immediately after the *Dispatch* instruction. If the fetched word is not equal to $177777_8$, the instruction treats this word as the intermediate address in the effective address calculation. After the indirection chain, if any, has been followed, the instruction places the effective address in the program counter and sequential operation continues with the word addressed by the updated value of the program counter.

The 32-bit effective address generated by this instruction is constrained to be within the first 32 Kword of the current segment.

This instruction sets *overflow* to 0 and carry to 0.

Decrement And Skip If Zero

DSZ *[@]displacement[,index]*

| 0 | 0 | 0 | 1 | 1 | @ | INDEX | DISPLACEMENT |
|---|---|---|---|---|---|---|---|
| 0 | 1 | 2 | 3 | 4 | 5 | 6 7 | 8 15 |

Decrements the addressed word, then skips if the decremented value is zero. Decrements by one the word addressed by *E* and writes the result back into that location. If the updated value of the location is zero, the instruction skips the next sequential word. *Overflow* is 0 and carry remains unchanged.

The 32-bit effective address generated by this instruction is constrained to be within the first 32 Kword of the current segment.

Decrement the Word Addressed by WSP and Skip if Zero
DSZTS

| 1 | 1 | 0 | 0 | 0 | 1 | 1 | 1 | 1 | 1 | 0 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Uses the contents of WSP (the wide stack pointer) as the address of a double word. Decrements the contents of the word addressed by WSP. If the decremented value is equal to zero, the instruction skips the next word. Carry is unchanged and *overflow* is 0.

NOTE: *The operation performed by this instruction is not indivisible.*

Load CPU Identification
ECLID

| 1 | 1 | 1 | 1 | 1 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Loads a double word into AC0.

The double word has the format:

| MODEL NUMBER | MICROCODE REV | | MEM SIZE |
|---|---|---|---|
| 0–15 | 16–23 | 24–25 | 26–31 |

where

*model #* is the binary representation of the machine's model number,
*microcode rev* indicates the microcode revision currently in use on this machine,
*mem size* indicates the amount of physical memory on this machine. A zero in this field indicates 256 Kbytes of memory; a one indicates 512 Kbytes, and so on.

This instruction leaves carry unchanged. *Overflow* is 0.

NOTE: *When the C/350 MAP is enabled on the MV/8000 this instruction is used to identify the machine. The processor assumes AC0 to be 32 bits long for this instruction. If an interrupt occurs while* ECLID *is executing, however, the processor saves only bits 16–31 of AC0.*

Edit
EDIT

| 1 | 1 | 1 | 1 | 0 | 1 | 1 | 1 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Converts a decimal number from either packed or unpacked form to a string of bytes under the control of an edit sub-program. This sub-program can perform many different operations on the number and its destination field, including leading zero suppression, leading or trailing signs, floating fill characters, punctuation control, and insertion of text into the destination field. The instruction also performs operations on alphanumeric data if data type 4 is specified.

The instruction maintains two flags and three indicators or pointers.

The flags are the significance Trigger (*T*) and the Sign flag (*S*). *T* is set to 1 when the first non-zero digit is processed unless otherwise specified by an edit op-code. At the beginning of an *Edit* instruction, *T* is set to 0. *S* is set to reflect the sign of the number being processed. If the number is positive, *S* is set to 0. If the number is negative, *S* is set to 1.

The three indicators are the Source Indicator (SI), the Destination Indicator (DI), and the op-code Pointer (P). Each is 16 bits wide and contains a byte pointer to the *current* byte in each respective area. At the beginning of an *Edit* instruction, SI is set to the value contained in bits 16-31 of AC3. DI is set to the value contained in bits 16-31 of AC2, and P is set to the value contained in bits 16-31 of AC0. Also at this time the sign of the source number is checked for validity.

The sub-program is made up of 8-bit op-codes followed by one or more 8-bit operands. P, a byte pointer, acts as the *program counter* for the *Edit* sub-program. The sub-program proceeds sequentially until a branching operation occurs - much the same way programs are processed. Unless instructed to do otherwise, the *Edit* instruction updates P after each operation to point to the next sequential op-code. The instruction continues to process 8-bit op-codes until directed to stop by the DEND op-code.

The sub-program can test and modify *S* and *T* as well as modify SI, DI and P.

Upon entry to EDIT bits 16-31 of AC0 contain a byte pointer to the first op-code of the *Edit* sub-program.

Bits 16-31 of AC1 contain the data-type indicator describing the number to be processed.

Bits 16-31 of AC2 contain a byte pointer to the the first byte of the destination field.

Bits 16-31 of AC3 contain a byte pointer to the first byte of the source field.

The fields may overlap in any way. However the instruction processes characters one at a time, so unusual side effects may be produced by certain types of overlap.

Upon successful termination, carry contains the significance Trigger; bits 16-31 of AC0 contain a byte pointer (P) to the next op-code to be processed; AC1 is undefined; bits 16-31 of AC2 contain a byte pointer (DI) to the next destination byte; and bits 16-31 of AC3 contain a byte pointer (SI) to the next source byte. *Overflow* is 0.

The 32-bit effective address generated by this instruction is constrained to be within the first 64 Kbyte of the current segment.

NOTES: *If SI is moved outside the area occupied by the source number, zeros will be supplied for numeric moves, even if SI is later moved back inside the source area.*

*Some op-codes perform movement of characters from one string to another. For those op-codes which move numeric data, special actions may be performed. For those which move non-numeric data, characters are copied exactly to the destination.*

*The* Edit *instruction places information on the stack. Therefore, the stack must be set up and have at least 9 words available for use.*

*If the* Edit *instruction is interrupted, it places restart information on the stack and places $177777_8$ in AC0.*

*If the initial contents of AC0 are equal to $177777_8$ the* Edit *instruction assumes it is restarting from an interrupt; therefore do not allow this to occur under any other circumstances.*

In the description of some of the *Edit* op-codes we use the symbol *j* to denote how many characters a certain operation should process. When the high order bit of *j* is 1, *j* has a different meaning, it is a pointer into the stack to a word that denotes the number of characters the instruction should process. So, in those cases where the high order bit of *j* is 1, the instructions interpret *j* as an 8-bit two's complement number pointing into the stack. The number on the stack is at address:

*stack pointer* + 1 + *j* ).

The operation uses the number at this address as a character count instead of *j*.

An *Edit* operation that processes numeric data (e.g., DMVN) skips a leading or trailing sign code it encounters; similarly, such an operation converts a high-order or low-order sign to its correct numeric equivalent.

The edit operations are as follows.

Add To DI

DADI *p0*

| | | | | | | | | | |
|---|---|---|---|---|---|---|---|---|---|
| 0 | 0 | 0 | 1 | 0 | 0 | 1 | 0 | | p0 |
| 0 | 1 | 2 | 3 | 4 | 5 | 6 | 7 | 8 — 14 | 15 |

Adds the 8-bit two's complement integer specified by *p0* to the Destination Indicator (DI).

Add To P Depending On S

DAPS *p0*

| | | | | | | | | |
|---|---|---|---|---|---|---|---|---|
| 0 | 0 | 0 | 0 | 1 | 1 | 1 | 1 | p0 |
| 0 | 1 | 2 | 3 | 4 | 5 | 6 | 7 | 8 — 15 |

If *S* is 0, the instruction adds the 8-bit two's complement integer specified by *p0* to the op-code Pointer (P). Before the add is performed, P is pointing to the byte containing the DAPS op-code.

Add To P Depending On T

DAPT *p0*

| | | | | | | | | |
|---|---|---|---|---|---|---|---|---|
| 0 | 0 | 0 | 0 | 1 | 0 | 1 | 1 | p0 |
| 0 | 1 | 2 | 3 | 4 | 5 | 6 | 7 | 8 — 15 |

If *T* is one, the instruction adds the 8-bit two's complement integer specified by *p0* to the op-code Pointer (P). Before the add is performed, P is pointing to the byte containing the DAPT op-code.

Add To P

DAPU *p0*

| | | | | | | | | |
|---|---|---|---|---|---|---|---|---|
| 0 | 0 | 0 | 1 | 0 | 1 | 1 | 1 | p0 |
| 0 | 1 | 2 | 3 | 4 | 5 | 6 | 7 | 8 — 15 |

Adds the 8-bit two's complement integer specified by *p0* to the op-code Pointer (P). Before the add is performed, P is pointing to the byte containing the DAPU op-code.

Add To SI

DASI *p0*

| | | | | | | | | |
|---|---|---|---|---|---|---|---|---|
| 0 | 0 | 0 | 1 | 0 | 0 | 1 | 1 | p0 |
| 0 | 1 | 2 | 3 | 4 | 5 | 6 | 7 | 8 — 15 |

Adds the 8-bit two's complement integer specified by *p0* to the Source Indicator (SI).

Decrement and Jump If Non-Zero

DDTK *k,p0*

| 0 | 0 | 0 | 0 | 0 | 0 | 1 | 1 | K | pO |
|---|---|---|---|---|---|---|---|---|---|
| 0 | 1 | 2 | 3 | 4 | 5 | 6 | 7 | 8 – 15 | 16 – 23 |

Decrements a word in the stack by one. If the decremented value of the word is non-zero, the instruction adds the 8-bit two's complement integer specified by *p0* to the op-code Pointer (P). Before the add is performed, P is pointing to the byte containing the DDTK op-code. If the 8-bit two's complement integer specified by *k* is negative, the word decremented is at the address *stack pointer*+1+*k*. If *k* is positive, the word decremented is at the address *frame pointer*+1+*k*.

End Edit

DEND

| 0 | 0 | 0 | 0 | 0 | 0 | 0 | 0 |
|---|---|---|---|---|---|---|---|
| 0 | 1 | 2 | 3 | 4 | 5 | 6 | 7 |

Terminates the EDIT sub-program.

Insert Characters Immediate

DICI *j,p0,p1,...,p(j-1)*

| 0 | 0 | 0 | 1 | 0 | 0 | 0 | 1 | j | pO | p1 | p(j-1) |
|---|---|---|---|---|---|---|---|---|---|---|---|
| 0 | 1 | 2 | 3 | 4 | 5 | 6 | 7 | 8 – 15 | 16 – 23 | 24 – 31 | 40 – 47 |

Inserts *j* characters from the op-code stream into the destination field beginning at the position specified by DI. Increases P by *j*+2, and increases DI by *j*.

Insert Character J Times

DIMC *j,p0*

| 0 | 0 | 0 | 1 | 0 | 1 | 0 | 1 | j | pO |
|---|---|---|---|---|---|---|---|---|---|
| 0 | 1 | 2 | 3 | 4 | 5 | 6 | 7 | 8 – 15 | 16 – 23 |

Inserts the character specified by *p0* into the destination field a number of times equal to *j* beginning at the position specified by DI. Increases DI by *j*.

Insert Character Once

DINC *p0*

| 0 | 0 | 0 | 1 | 0 | 0 | 0 | 0 | pO |
|---|---|---|---|---|---|---|---|---|
| 0 | 1 | 2 | 3 | 4 | 5 | 6 | 7 | 8 – 15 |

Inserts the character specified by *p0* in the destination field at the position specified by DI. Increments DI by 1.

Insert Sign

DINS *p0,p1*

| | | | | | | | | | |
|---|---|---|---|---|---|---|---|---|---|
| 0 | 0 | 0 | 0 | 1 | 1 | 1 | 0 | p0 | p1 |
| 0 | 1 | 2 | 3 | 4 | 5 | 6 | 7 | 8–15 | 16–23 |

If the Sign flag (*S*) is 0, the instruction inserts the character specified by *p0* in the destination field at the position specified by DI. If *S* is 1, the instruction inserts the character specified by *p1* in the destination field at the position specified by DI. Increments DI by one.

Insert Character Suppress

DINT *p0,p1*

| | | | | | | | | | |
|---|---|---|---|---|---|---|---|---|---|
| 0 | 0 | 0 | 0 | 1 | 0 | 1 | 0 | p0 | p1 |
| 0 | 1 | 2 | 3 | 4 | 5 | 6 | 7 | 8–15 | 16–23 |

If the significance Trigger (*T*) is 0, the instruction inserts the character specified by *p0* in the destination field at the position specified by DI. If *T* is 1, the instruction inserts the character specified by *p1* in the destination field at the position specified by DI. Increments DI by one.

Move Alphabetics

DMVA *j*

| | | | | | | | | |
|---|---|---|---|---|---|---|---|---|
| 0 | 0 | 0 | 0 | 1 | 1 | 0 | 1 | j |
| 0 | 1 | 2 | 3 | 4 | 5 | 6 | 7 | 8–15 |

Moves *j* characters from the source field (beginning at the position specified by SI) to the destination field (beginning at the position specified by DI). Increases both SI and DI by *j*. Sets *T* to 1.

Initiates a commercial fault if the attribute specifier word indicates that the source field is data type 5 (packed). Initiates a commercial fault if any of the characters moved is not an alphabetic (A-Z, a-z, or space).

Move Characters

DMVC *j*

| | | | | | | | | |
|---|---|---|---|---|---|---|---|---|
| 0 | 0 | 0 | 0 | 1 | 1 | 0 | 0 | j |
| 0 | 1 | 2 | 3 | 4 | 5 | 6 | 7 | 8–15 |

Increments SI if the source data type is 3 and $j>0$. The instruction then moves *j* characters from the source field beginning at the position specified by SI to the destination field beginning at the position specified by DI. Increases both SI and DI by *j*. Sets *T* to 1.

Initiates a commercial fault if the attribute specifier word indicates that the source is data type 5 (packed). Performs no validation of the characters.

Move Float

DMVF *j,p0,p1,p2*

| 0 | 0 | 0 | 1 | 0 | 1 | 0 | 0 | j | p0 | p1 | p2 |
|---|---|---|---|---|---|---|---|---|---|---|---|
| 0 | 1 | 2 | 3 | 4 | 5 | 6 | 7 | 8–15 | 16–23 | 24–31 | 32–39 |

If the source data type is 3, $j>0$, and SI points to the sign of the source number, the instruction increments SI. Then for *j* characters, the instruction either places a digit substitute in the destination field beginning at the position specified by DI, or it moves a digit from the source field beginning at the position specified by SI to the destination field beginning at the position specified by DI. When *T* changes from 0 to 1, the instruction places both the digit substitute and the digit in the destination field, and increases SI by *j*. If *T* does not change from 0 to 1, the instruction increases DI by *j*. If *T* does change from 0 to 1, the instruction increases DI by $j+1$.

If the source data type is 2, the state of SI is undefined after the least significant digit has been processed.

If *T* is 1, the instruction moves each digit processed from the source field to the destination field. If *T* is 0 and the digit is a zero or space, the instruction places *p0* in the destination field. If *T* is 0 and the digit is a non-zero, the instruction sets *T* to 1 and the characters placed in the destination field depend on *S*. If *S* is 0, the instruction places *p1* in the destination field followed by the digit. If *S* is 1, the instruction places *p2* in the destination field followed by the digit.

The instruction initiates a commercial fault if any of the digits processed is not valid for the specified data type.

Move Numerics

DMVN *j*

| 0 | 0 | 0 | 0 | 1 | 0 | 0 | 0 | j |
|---|---|---|---|---|---|---|---|---|
| 0 | 1 | 2 | 3 | 4 | 5 | 6 | 7 | 8–15 |

Increments SI if the source data type is 3 and $j>0$. The instruction then moves *j* characters from the source field beginning at the position specified by SI to the destination field beginning at the position specifed by DI. Increases both SI and DI by *j*. Sets *T* to 1.

Initiates a commercial fault if any of the characters moved is not valid for the specified data type.

For data type 2, the state of SI is undefined after the least significant digit has been processed.

Move Digit With Overpunch

DMVO *p0,p1,p2,p3*

| 0 | 0 | 0 | 0 | 0 | 1 | 1 | 1 | p0 | p1 | p2 | p3 |
|---|---|---|---|---|---|---|---|---|---|---|---|
| 0 | 1 | 2 | 3 | 4 | 5 | 6 | 7 | 8–15 | 16–23 | 24–31 | 32–39 |

Increments SI if the source data type is 3 and SI points to the sign of the source number. The instruction then either places a digit substitute in the destination field (at the position specified by DI), or it moves a digit plus overpunch from the source field (at the position specified by SI) to the destination field (at the position specified by DI). Increases both SI and DI by 1.

If the source data type is 2, the state of the SI is undefined after the least significant digit has been processed.

If the digit is a zero or space and $S$ is 0, then the instruction places *p0* in the destination field. If the digit is a zero or space and $S$ is 1, then the instruction places *pl* in the destination field. If the digit is a non-zero and $S$ is 0, the instruction adds *p2* to the digit and places the result in the destination field. If the digit is a non-zero and $S$ is 1, the instruction adds *p3* to the digit and places the result in the destination field. If the digit is a non-zero, the instruction sets $T$ to 1. The instructions assumes *p2* and *p3* are ASCII characters.

The instruction initiates a commercial fault if the character is not valid for the specified data type.

Move Numeric With Zero Suppression

DMVS *j,p0*

| 0 | 0 | 0 | 1 | 0 | 1 | 1 | 0 | j | p0 |
|---|---|---|---|---|---|---|---|---|---|
| 0 | 1 | 2 | 3 | 4 | 5 | 6 | 7 | 8–15 | 16–23 |

Increments SI if the source data type is 3, $j>0$, and SI points to the sign of the source number. The instruction then moves $j$ characters from the source field (beginning at the position specified by SI) to the destination field (beginning at the position specified by DI). Moves the digit from the source to the destination if $T$ is 1. Replaces all zeros and spaces with *p0* as long as $T$ is 0. Sets $T$ to 1 when the first non-zero digit is encountered. Increases both SI and DI by $j$.

If the source data type is 2, the state of the SI is undefined after the least significant digit has been processed.

This op-code destroys the data type specifier.

Initiates a commercial fault if any of the characters moved is not a numeric (0-9 or space).

End Float

DNDF *p0,pl*

| 0 | 0 | 0 | 0 | 0 | 0 | 0 | 1 | p0 | p1 |
|---|---|---|---|---|---|---|---|---|---|
| 0 | 1 | 2 | 3 | 4 | 5 | 6 | 7 | 8–15 | 16–23 |

If $T$ is 1, the instruction places nothing in the destination field and leaves DI unchanged. If $T$ is 0 and $S$ is 0, the instruction places *p0* in the destination field at the position specified by DI. If $T$ is 0 and $S$ is 1, the instruction places *pl* in the destination field at the position specified by DI. It increases DI by 1, and sets $T$ to one.

Set S To One

DSSO

| 0 | 0 | 0 | 0 | 0 | 1 | 0 | 1 |
|---|---|---|---|---|---|---|---|
| 0 | 1 | 2 | 3 | 4 | 5 | 6 | 7 |

Sets the Sign flag ($S$) to 1.

Set S To Zero

DSSZ

| 0 | 0 | 0 | 0 | 0 | 1 | 0 | 0 |
|---|---|---|---|---|---|---|---|
| 0 | 1 | 2 | 3 | 4 | 5 | 6 | 7 |

Sets the Sign flag ($S$) to 0.

Store In Stack

DSTK *k,p0*

| 0 | 0 | 0 | 0 | 0 | 0 | 1 | 0 | k | p0 |
|---|---|---|---|---|---|---|---|---|---|
| 0 | 1 | 2 | 3 | 4 | 5 | 6 | 7 | 8–15 | 16–23 |

Stores the byte specified by *p0* in bits 8–15 of a word in the stack. Sets bits 0–7 of the word that receives *p0* to 0. If the 8-bit two's complement integer specified by $k$ is negative, the instruction addresses the word receiving *p0* by *stack pointer*$+1+k$. If $k$ is positive, then the instruction stores *p0* at the address *frame pointer*$+1+k$.

Set T To One

DSTO

| 0 | 0 | 0 | 0 | 1 | 0 | 0 | 1 |
|---|---|---|---|---|---|---|---|
| 0 | 1 | 2 | 3 | 4 | 5 | 6 | 7 |

Sets the significance Trigger ($T$) to 1.

Set T To Zero

DSTZ

| 0 | 0 | 0 | 0 | 0 | 1 | 1 | 0 |
|---|---|---|---|---|---|---|---|
| 0 | 1 | 2 | 3 | 4 | 5 | 6 | 7 |

Sets the significance Trigger ($T$) to 0.

Extended Decrement and Skip if Zero

EDSZ *[@]displacement[,index]*

| 1 | 0 | 0 | 1 | 1 | 1 | INDEX | 0 | 0 | 1 | 1 | 1 | 0 | 0 | 0 | @ | DISPLACEMENT |
|---|---|---|---|---|---|---|---|---|---|---|---|---|---|---|---|---|
| 0 | 1 | 2 | 3 | 4 | 5 | 6–7 | 8 | 9 | 10 | 11 | 12 | 13 | 14 | 15 | 16 | 17–31 |

Decrements the addressed word, then skips if the decremented value is zero.

Computes the effective address, *E*. Decrements by one the contents of the location addressed by *E* and writes the result back into that location. If the updated value of the word is zero, the instruction skips the next sequential word.

The 32-bit effective address generated by this instruction is constrained to be within the first 32 Kword of the current segment.

This instruction leaves carry unchanged. *Overflow* is 0.

Extended Increment And Skip If Zero

EISZ *[@]displacement[,index]*

| | | | | | | | | | | | | | | | | |
|---|---|---|---|---|---|---|---|---|---|---|---|---|---|---|---|---|
| 1 | 0 | 0 | 1 | 0 | 1 | INDEX | 0 | 0 | 1 | 1 | 1 | 0 | 0 | 0 | @ | DISPLACEMENT |
| 0 | 1 | 2 | 3 | 4 | 5 | 6 7 | 8 | 9 | 10 | 11 | 12 | 13 | 14 | 15 | 16 | 17 31 |

Increments the addressed word, then skips if the incremented value is zero.

Computes the effective address, *E* . Increments by one the contents of the location specified by *E*, and writes the new value back into memory at the same address. If the updated value of the location is zero, the instruction skips the next sequential word.

The 32-bit effective address generated by this instruction is constrained to be within the first 32 Kword of the current segment.

This instruction leaves carry unchanged. *Overflow* is 0.

Extended Jump

EJMP *[@]displacement[,index]*

| | | | | | | | | | | | | | | | | |
|---|---|---|---|---|---|---|---|---|---|---|---|---|---|---|---|---|
| 1 | 0 | 0 | 0 | 0 | 1 | INDEX | 0 | 0 | 1 | 1 | 1 | 0 | 0 | 0 | @ | DISPLACEMENT |
| 0 | 1 | 2 | 3 | 4 | 5 | 6 7 | 8 | 9 | 10 | 11 | 12 | 13 | 14 | 15 | 16 | 17 31 |

Computes the effective address, *E*, and places it in the program counter. Sequential operation continues with the word addressed by the updated value of the program counter.

The 32-bit effective address generated by this instruction is constrained to be within the first 32 Kword of the current segment.

Carry is unchanged and *overflow* is 0.

Extended Jump To Subroutine

EJSR *[@]displacement[,index]*

| | | | | | | | | | | | | | | | | |
|---|---|---|---|---|---|---|---|---|---|---|---|---|---|---|---|---|
| 1 | 0 | 0 | 0 | 1 | 1 | INDEX | 0 | 0 | 1 | 1 | 1 | 0 | 0 | 0 | @ | DISPLACEMENT |
| 0 | 1 | 2 | 3 | 4 | 5 | 6 7 | 8 | 9 | 10 | 11 | 12 | 13 | 14 | 15 | 16 | 17 31 |

Increments and stores the value of the program counter in AC3, then places a new address in the program counter.

Computes the effective address, *E*. The instruction then places the address of the next sequential instruction (the instruction following the EJSR instruction) in AC3. Places *E* in the program counter. Sequential operation continues with the word addressed by the updated value of the program counter.

The 32-bit effective address generated by this instruction is constrained to be within the first 32 Kword of the current segment.

*Overflow* is 0 and carry is unchanged.

NOTE: *The instruction computes* E *before it places the incremented program counter in AC3.*

Extended Load Accumulator

ELDA *ac,[@]displacement[,index]*

| | | | | | | | | | | | | | | | |
|---|---|---|---|---|---|---|---|---|---|---|---|---|---|---|---|
| 1 | 0 | 1 | AC | 1 | INDEX | 0 | 0 | 1 | 1 | 1 | 0 | 0 | 0 | @ | DISPLACEMENT |
| 0 | 1 | 2 | 3 4 | 5 | 6 7 | 8 | 9 | 10 | 11 | 12 | 13 | 14 | 15 | 16 | 17 … 31 |

Moves a copy of the contents of a memory word into bits 16-31 of the specified accumulator.

Calculates the effective address, *E*. Places the contents of the location addressed by *E* in bits 16-31 of the specified accumulator. The contents of the location addressed by *E* remain unchanged.

The 32-bit effective address generated by this instruction is constrained to be within the first 32 Kword of the current segment.

Carry remains unchanged and *overflow* is 0.

Extended Load Byte

ELDB *ac,displacement[,index]*

| | | | | | | | | | | | | | | | |
|---|---|---|---|---|---|---|---|---|---|---|---|---|---|---|---|
| 1 | 0 | 0 | AC | 1 | INDEX | 0 | 1 | 1 | 1 | 1 | 0 | 0 | 0 | | DISPLACEMENT |
| 0 | 1 | 2 | 3 4 | 5 | 6 7 | 8 | 9 | 10 | 11 | 12 | 13 | 14 | 15 | 16 | 17 … 31 |

Copies a byte from memory into an accumulator.

Forms a byte pointer from the displacement in the following way: shifts the 16-bit number contained in the displacement field to the right one bit, producing a 15-bit address and a 1-bit byte indicator. Uses the value of the index bits to determine an offset value. Adds the offset value to the 15-bit address produced from the displacement to give a memory address. The byte indicator designates which byte of the addressed word will be loaded into bits 24–31 of the specified accumulator. The instruction sets bits 16–23 of the specified accumulator to 0.

The 32-bit effective address generated by this instruction is constrained to be within the first 64 Kbyte of the current segment.

Carry is unchanged and *overflow* is 0.

The instruction destroys the previous contents of bits 16-31 of the specified accumulator, but it does not alter either the index value or the displacement.

The argument *index* selects the source of the index value. It may have values in the range of 0–3. The meaning of each value is shown below:

| Index Bits | Index Value |
|---|---|
| 00 | 0 |
| 01 | Address of the displacement field (Word 2 of this instruction) |
| 10 | Contents of bits 16-31 of AC2 |
| 11 | Contents of bits 16-31 of AC3 |

This instruction sets *overflow* to 0 and carry to 0.

Load Effective Address

ELEF *ac,[@]displacement[,index]*

| 1 | 1 | 1 | AC | 1 | INDEX | C | 0 | 1 | 1 | 1 | 0 | 0 | 0 | @ | DISPLACEMENT |
|---|---|---|---|---|---|---|---|---|---|---|---|---|---|---|---|
| 0 | 1 | 2 | 3–4 | 5 | 6–7 | 8 | 9 | 10 | 11 | 12 | 13 | 14 | 15 | 16 | 17–31 |

Places a 32-bit effective address constrained to be with the first 32 Kword of the current segment in an accumulator.

Sets bit 0 of the accumulator to 0. *Overflow* is 0 and carry is unchanged.

Enqueue Towards the Head

ENQH

| 1 | 1 | 0 | 0 | 0 | 1 | 1 | 1 | 1 | 1 | 1 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Enqueues a data element.

AC0 contains the effective address of a queue descriptor.

AC1 contains an effective address of a data element in the queue defined by AC0.

AC2 contains the effective address of the data element to be added to the queue.

The instruction checks the page or pages that contain the element for valid read and write access privileges. If the privileges are invalid, the appropriate protection fault occurs and the queue remains unchanged.

If the privileges are valid, the instruction checks the queue descriptor addressed by AC0. If the queue descriptor indicates an empty queue, the instruction ignores the contents of AC1, places the data element addressed by AC2 in the queue, and updates the queue descriptor. The next sequential word is executed.

If the descriptor indicates a queue that contains data elements, the instruction prepares to enqueue a new data element; the instruction enqueues the data element addressed by AC2 *before* the data element addressed by AC1. If the new data element becomes the head of the queue, the instruction updates the queue descriptor appropriately. The next sequential word is skipped.

NOTE: *If the processor references a page containing a link, the instruction completely updates that link before the processor references another link or descriptor. This means the instruction executes correctly even if only one page is resident in memory.*

The instruction checks all reads and writes of links in data elements and queue descriptors against the current ring. Ring numbers of the link addresses must be greater than or equal to the current ring.

The enqueue operation is not interruptable. The entire operation completes before any interrupts are enabled.

The instruction leaves the contents of AC0, AC1, AC2, and AC3 unchanged. Carry is unchanged and *overflow* is 0.

Enqueue Towards the Tail

ENQT

| 1 | 1 | 0 | 0 | 0 | 1 | 1 | 1 | 1 | 1 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Enqueues a data element.

AC0 contains the effective address of a queue descriptor.

AC1 contains an effective address of a data element in the queue defined by AC0.

AC2 contains the effective address of the data element to be added to the queue.

The instruction checks the page or pages that contain the element for valid read and write access privileges. If the privileges are invalid, the appropriate protection fault occurs and the queue remains unchanged.

If the privileges are valid, the instruction checks the queue descriptor addressed by AC0. If the queue descriptor indicates an empty queue, the instruction ignores the contents of AC1 and enqueues the data element addressed by AC2. The instruction updates the queue descriptor if necessary, then the next sequential word is executed.

If the descriptor indicates a queue that contains data elements, the instruction prepares to enqueue a new data element; the instruction enqueues the data element addressed by AC2 *after* the data element addressed by AC1. If the new data element becomes the tail of the queue, then the instruction updates the queue descriptor appropriately. The next sequential word is skipped.

NOTE: *If the processor references a page containing a link, the instruction completely updates that link before the processor references another link or descriptor. This means that this instruction will execute correctly even if only one page is resident in memory.*

Extended Store Accumulator

ESTA *ac,[@]displacement[,index]*

| 1 | 1 | 0 | AC | 1 | INDEX | 0 | 0 | 1 | 1 | 1 | 0 | 0 | 0 | @ | DISPLACEMENT |
|---|---|---|---|---|---|---|---|---|---|---|---|---|---|---|---|
| 0 | 1 | 2 | 3 4 | 5 | 6 7 | 8 | 9 | 10 | 11 | 12 | 13 | 14 | 15 | 16 | 17 … 31 |

Stores the contents of bits 16-31 of an accumulator into a memory location.

The contents of bits 16-31 of the specified accumulator are placed in the word addressed by the effective address, *E*. The previous contents of the location addressed by *E* are lost. The contents of the specified accumulator and carry remain unchanged.

The 32-bit effective address generated by this instruction is constrained to be within the first 32 Kwords of the current segment.

*Overflow* is 0.

Extended Store Byte

ESTB *ac,displacement[,index]*

| 1 | 0 | 1 | AC | 1 | INDEX | 0 | 1 | 1 | 1 | 1 | 0 | 0 | 0 | | DISPLACEMENT |
|---|---|---|---|---|---|---|---|---|---|---|---|---|---|---|---|
| 0 | 1 | 2 | 3 4 | 5 | 6 7 | 8 | 9 | 10 | 11 | 12 | 13 | 14 | 15 | 16 | 17 31 |

Copies into memory the byte contained in bits 24-31 of an accumulator.

Forms a byte pointer from the displacement as follows: shifts the 16-bit number contained in the displacement field to the right one bit, producing a 15-bit address and a 1-bit byte indicator. Uses the value of the index bits to determine an offset value. Adds the offset value to the 15-bit address produced from the displacement field to give a memory address. The byte indicator determines which byte of the addressed location will receive bits 24–31 of the specified accumulator.

The 32-bit effective address generated by this instruction is constrained to be within the first 64 Kbyte of the current segment.

The argument *index* selects the source of the index value. It may have values in the range of 0–3; the meaning of each value is shown below:

| Index Bits | Index Value |
|---|---|
| 00 | 0 |
| 01 | Address of the displacement field (Word 2 of this instruction) |
| 10 | Contents of bits 16-31 of AC2 |
| 11 | Contents of bits 16-31 of AC3 |

This instruction leaves carry unchanged; *overflow* is 0.

Absolute Value

FAB *fpac*

| 1 | 1 | 0 | FPAC | 1 | 1 | 0 | 0 | 0 | 1 | 0 | 1 | 0 | 0 | 0 |
|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 |

Sets the sign bit of FPAC to 0. Updates the *Z* and *N* flags in the floating point status register to reflect the new contents of FPAC.

Add Double (FPAC to FPAC)

FAD *facs,facd*

| 1 | FACS | FACD | 0 | 0 | 0 | 0 | 1 | 1 | 0 | 1 | 0 | 0 | 0 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Adds the 64-bit floating point number in FACS to the 64-bit floating point number in FACD.

Adds the 64-bit floating point number in FACS to the 64-bit floating point number in FACD. Places the normalized result in FACD. Leaves the contents of FACS unchanged and updates the *Z* and *N* flags in the floating point status register to reflect the new contents of FACD.

See Chapter 8 and Appendix G for more information about floating point manipulation.

Add Double (Memory to FPAC)

FAMD *fpac,[@]displacement[,index]*

| 1 | INDEX | FPAC | 0 | 1 | 0 | 0 | 1 | 1 | 0 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Adds the 64-bit floating point number in the source location to the 64-bit floating point number in FPAC and places the normalized result in FPAC.

Computes the effective address, *E*. Uses *E* to address a double precision (four word) operand. Adds this 64-bit floating point number to the floating point number in the specified FPAC. Places the normalized result in the specified FPAC. Leaves the contents of the source location unchanged and updates the *Z* and *N* flags in the floating point status register to reflect the new contents of FPAC.

The 32-bit effective address generated by this instruction is constrained to be within the first 32 Kwords of the current segment.

See Chapter 8 and Appendix G for more information about floating point manipulation.

Add Single (Memory to FPAC)

FAMS *fpac,[@]displacement[,index]*

| 1 | INDEX | FPAC | 0 | 1 | 0 | 0 | 0 | 1 | 0 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Adds the 32-bit floating point number in the source location to the 32-bit floating point number in FPAC and places the normalized result in FPAC.

Computes the effective address, *E*. Uses *E* to address a single precision (double word) operand. Adds this 32-bit floating point number to the floating point number in bits 0-31 of the specified FPAC. Places the normalized result in the specified FPAC. Leaves the contents of the source location unchanged and updates the *Z* and *N* flags in the floating point status register to reflect the new contents of FPAC.

The 32-bit effective address generated by this instruction is constrained to be within the first 32 Kwords of the current segment.

See Chapter 8 and Appendix G for more information about floating point manipulation.

Add Single (FPAC to FPAC)

FAS *facs,facd*

| 1 | FACS | FACD | 0 | 0 | 0 | 0 | 0 | 1 | 0 | 1 | 0 | 0 | 0 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Adds the 32-bit floating point number in bits 0-31 of FACS to the 32-bit floating point number in bits 0-31 of FACD.

Adds the 32-bit floating point number in bits 0-31 of ACS to the 32-bit floating point number in bits 0-31 of FACD. Places the normalized result in FACD. Leaves the contents of FACS unchanged. Sets bits 32-63 of FACD to 0 and updates the *Z* and *N* flags in the floating point status register to reflect the new contents of FACD.

See Chapter 8 and Appendix G for more information about floating point manipulation.

Clear Errors

FCLE

| 1 | 1 | 0 | 1 | 0 | 1 | 1 | 0 | 1 | 1 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Sets bits 0–4 of the floating point status register to 0.

NOTES: *Since this instruction sets the* ANY *bit of the FPSR to 0, the FPPC field is undefined.*

*The* IORST *instruction and the system reset function will also set these bits to 0.*

Compare Floating Point

FCMP *facs,facd*

| 1 | FACS | FACD | 1 | 1 | 1 | 0 | 0 | 1 | 0 | 1 | 0 | 0 | 0 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Compares two floating point numbers and sets the *Z* and *N* flags in the floating point status register accordingly.

Algebraically compares the floating point numbers in FACS and FACD to each other. Updates the *Z* and *N* flags in the floating point status register to reflect the result. The contents of FACS and FACD remain unchanged. The results of the compare and the corresponding flag settings are shown in the table below.

| Z | N | Result |
|---|---|---|
| 1 | 0 | FACS=FACD |
| 0 | 1 | FACS>FACD |
| 0 | 0 | FACS<FACD |

Divide Double (FPAC by FPAC)

FDD *facs,facd*

| 1 | FACS | FACD | 0 | 0 | 1 | 1 | 1 | 1 | 0 | 1 | 0 | 0 | 0 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Divides the floating point number in FACD by the floating point number in FACS and places the normalized result in FACD. Destroys the previous contents of FACD. Updates the *Z* and *N* flags in the floating point status register to reflect the new contents of FACD. The contents of FACS remain unchanged.

Checks the floating point number contained in FACS for a zero mantissa. If the mantissa is zero, sets the *DVZ* bit in the floating point status register and terminates. The number in FACD remains unchanged.

If the mantissa is nonzero, compares the mantissas of the numbers contained in FACS and FACD. If the mantissa of the number in FACD is greater than or equal to the mantissa of the number in FACS, the instruction shifts the mantissa of the number in FACD right one hex digit and adds one to the exponent of the number in FACD.

After aligning the mantissas, the instruction divides the mantissa in FACD by the mantissa in FACS. The mantissa of the quotient becomes the mantissa of the intermediate result. The two operands and the rules of algebra determine the sign of the intermediate result. To calculate the exponent of the intermediate result in excess 64 representation, the instruction subtracts the exponent in FACS from the exponent in FACD and adds 64 to this result. The result is already normalized by the shifting algorithm described in the paragraph above, so the instruction places the result in FACD unaltered. Updates the *Z* and *N* flags to reflect the new contents of FACD.

If the exponent processing produces either overflow or underflow, the instruction sets the corresponding bit in the floating point status register. If overflow occurs, the sign and the mantissa in FACD are correct but the exponent is 128 too small. If underflow occurs, the sign and the mantissa in FACD are correct but the exponent is 128 too large.

See Chapter 8 and Appendix G for more information about floating point manipulation.

Divide Double (FPAC by Memory)

FDMD *fpac,[@]displacement[,index]*

| 1 | INDEX | FPAC | 0 | 1 | 1 | 1 | 1 | 1 | 0 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Divides the 64-bit floating point number in FPAC by the 64-bit floating point number in the source location and places the normalized result in FPAC.

Computes the effective address, *E*. Uses *E* to address a double precision (four word) operand. Divides the floating point number in the specified FPAC by this 64-bit floating point number. Places the normalized result in the specified FPAC. Leaves the contents of the source location unchanged and updates the *Z* and *N* flags in the floating point status register to reflect the new contents of FPAC.

The 32-bit effective address generated by this instruction is constrained to be within the first 32 Kword of the current segment.

See Chapter 8 and Appendix G for more information about floating point manipulation.

Divide Single (FPAC by Memory)

FDMS *fpac,[@]displacement[,index]*

| 1 | INDEX | FPAC | 0 | 1 | 1 | 1 | 0 | 1 | 0 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Divides the 32-bit floating point number in bits 0-31 of FPAC by the 32-bit floating point number in the source location and places the normalized result in FPAC.

Computes the effective address, *E*. Uses *E* to address a single precision (double word) operand. Divides the floating point number in bits 0-31 of the specified FPAC by this 32-bit floating point number. Places the normalized result in the specified FPAC. Leaves the contents of the source location unchanged and updates the *Z* and *N* flags in the floating point status register to reflect the new contents of FPAC.

The 32-bit effective address generated by this instruction is constrained to be within the first 32 Kword of the current segment.

See Chapter 8 and Appendix G for more information about floating point manipulation.

Divide Single (FPAC by FPAC)

FDS *facs,facd*

| 1 | FACS | FACD | 0 | 0 | 1 | 1 | 0 | 1 | 0 | 1 | 0 | 0 | 0 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Divides the floating point number in bits 0–31 of FACD by the floating point number in bits 0–31 of FACS and places the normalized result in FACD. Destroys the previous contents of FACD. Updates the *Z* and *N* flags in the floating point status register to reflect the new contents of FACD. The contents of FACS remain unchanged.

Checks the floating point number contained in FACS for a zero mantissa. If the mantissa is zero, sets the *DVZ* bit in the floating point status register and terminates. The number in FACD remains unchanged.

If the mantissa is nonzero, compares the mantissas of the numbers contained in FACS and FACD. If the mantissa of the number in FACD is greater than or equal to the mantissa of the number in FACS, the instruction shifts the mantissa of the number in FACD right one hex digit and adds one to the exponent of the number in FACD.

After aligning the mantissas, the instruction divides the mantissa in FACD by the mantissa in FACS. The mantissa of the quotient becomes the mantissa of the intermediate result. The two operands and the rules of algebra determine the sign of the intermediate result. To calculate the exponent of the intermediate result in excess 64 representation, the instruction subtracts the exponent in FACS from the exponent in FACD and adds 64 to this result. The result is already normalized by the shifting algorithm described in the paragraph above, so the instruction places the result in FACD unaltered. Updates the *Z* and *N* flags to reflect the new contents of FACD.

If the exponent processing produces either overflow or underflow, the instruction sets the corresponding bit in the floating point status register. If overflow occurs, the sign and the mantissa in FACD are correct but the exponent is 128 too small. If underflow occurs, the sign and the mantissa in FACD are correct but the exponent is 128 too large.

See Chapter 8 and Appendix G for more information about floating point manipulation.

Load Exponent

FEXP *fpac*

| 0 | 1 | 2 | 3–4 | 5 | 6 | 7 | 8 | 9 | 10 | 11 | 12 | 13 | 14 | 15 |
|---|---|---|---|---|---|---|---|---|---|---|---|---|---|---|
| 1 | 0 | 1 | FPAC | 1 | 1 | 0 | 0 | 1 | 1 | 0 | 1 | 0 | 0 | 0 |

Loads an exponent into bits 1–7 of an accumulator.

The instruction places bits 17–23 of AC0 in bits 1–7 of the specified FPAC. Ignores bits 0–16 and 24–31 of AC0. Changes the *Z* and *N* flags in the floating point status register to reflect the contents of FPAC. AC0 and bits 0 and 8–63 of FPAC remain unchanged. If FPAC contains true zero, the instruction does not load bits 1–7 of FPAC.

Fix To AC

FFAS *ac,fpac*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | AC | FPAC | 1 | 0 | 1 | 1 | 0 | 1 | 0 | 1 | 0 | 0 | 0 |

Converts the integer portion of the floating point number contained in the specified FPAC to a signed two's complement integer. Places the result in the specified accumulator.

If the integer portion of the number contained in FPAC is less than -32,769 or greater than +32,768, the instruction sets *MOF* in the FPSR to 1. Takes the absolute value of the integer portion of the number contained in the FPAC. Takes the 15 least significant bits of the absolute value and appends a 0 onto the leftmost bit to giver a 16-bit number. If the sign of the number is negative, formes the two's complement of the 16-bit result. Places the 16-bit integer in bits 16-31 of the specified accumulator.

If the integer portion is within the range of -32,768 to +32,767 inclusive, the instruction places the 16-bit, two's complement of the integer portion of the number contained in the FPAC in bits 16-31 of the specified accumulator.

The instruction leaves the FPAC and the *Z* and *N* flags of the FPSR unchanged.

Fix To Memory

FFMD *fpac,[@]displacement[,index]*

| 0 | 1–2 | 3–4 | 5 | 6 | 7 | 8 | 9 | 10 | 11 | 12 | 13 | 14 | 15 | 16 | 17–31 |
|---|---|---|---|---|---|---|---|---|---|---|---|---|---|---|---|
| 1 | INDEX | FPAC | 1 | 0 | 1 | 1 | 1 | 1 | 0 | 1 | 0 | 0 | 0 | @ | DISPLACEMENT |

Converts the integer portion of the floating point number contained in the specified FPAC to a signed two's complement integer. Places the result in a memory location.

Calculates the effective address, *E*. If the integer portion of the number contained in FPAC is less than -2,147,483,649 or greater than +2,147,483,648, the instruction sets *MOF* in the FPSR to 1. Takes the absolute value of the integer portion of the number contained in the FPAC. Takes the 31 least significant bits of the absolute value and appends a 0 onto the leftmost bit to give a 32-bit number. If the sign of the number is negative, forms the two's complement of the 32-bit result. Places the 32-bit integer in the memory locations specified by *E*.

If the integer portion is within the range of -2,147,483,648 to +2,147,483,647 inclusive, the instruction places the 32-bit, two's complement of the integer portion of the number contained in the FPAC in the memory locations specified by *E*.

The 32-bit effective address generated by this instruction is constrained to be within the first 32 Kword of the current segment.

The instruction leaves the FPAC and the *Z* and *N* flags of the FPSR unchanged.

Halve

FHLV *fpac*

| 0 | 1 | 2 | 3–4 | 5 | 6 | 7 | 8 | 9 | 10 | 11 | 12 | 13 | 14 | 15 |
|---|---|---|---|---|---|---|---|---|---|---|---|---|---|---|
| 1 | 1 | 1 | FPAC | 1 | 1 | 0 | 0 | 1 | 1 | 0 | 1 | 0 | 0 | 0 |

Divides the floating point number in FPAC by 2.

Shifts the mantissa contained in FPAC right one bit position. Fills the vacated bit position with a zero and places the bit shifted out in the guard digit. Normalizes the number and places the result in FPAC. Updates the *Z* and *N* flags in the floating point status register to reflect the new contents of FPAC.

If underflow occurs, sets the *UNF* flag in the floating point status register to 1. In this case, the mantissa and sign in FPAC are correct, but the exponent is 128 too large.

This instruction does rounding.

See Chapter 8 and Appendix G for more information about floating point manipulation.

Integerize

FINT

| 0 | 1 | 2 | 3–4 | 5 | 6 | 7 | 8 | 9 | 10 | 11 | 12 | 13 | 14 | 15 |
|---|---|---|---|---|---|---|---|---|---|---|---|---|---|---|
| 1 | 1 | 0 | FPAC | 1 | 1 | 0 | 0 | 1 | 1 | 0 | 1 | 0 | 0 | 0 |

Zeros the fractional portion (if any) of the number contained in the specified FPAC. Normalizes the result. Updates the *Z* and *N* flags in the floating point status register to reflect the new contents of the specified FPAC.

NOTE: *If the absolute value of the number contained in the specified FPAC is less than 1, the specified FPAC is set to true zero.*

*This instruction truncates towards zero, and does not do rounding.*

See Chapter 8 and Appendix G for more information about floating point manipulation.

Float From AC

FLAS *ac,fpac*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | AC | FPAC | 1 | 0 | 1 | 0 | 0 | 1 | 0 | 1 | 0 | 0 | 0 |

Converts a two's complement number in the range of -32,768 to +32,767 inclusive to floating point format.

Converts the signed two's complement number contained in bits 16–31 of the specified accumulator to a single precision floating point number. Places the result in the high-order 32 bits of the specified FPAC. Sets the low-order 32 bits of the FPAC to 0. Updates the *Z* and *N* flags in the floating point status register to reflect the new contents of FPAC. The contents of the specified accumulator remain unchanged.

Load Floating Point Double

FLDD *fpac,[@]displacement[,index]*

| | | | | | | | | | | | | | | | |
|---|---|---|---|---|---|---|---|---|---|---|---|---|---|---|---|
| 1 | INDEX | FPAC | 1 | 0 | 0 | 0 | 1 | 1 | 0 | 1 | 0 | 0 | 0 | @ | DISPLACEMENT |
| 0 | 1–2 | 3–4 | 5 | 6 | 7 | 8 | 9 | 10 | 11 | 12 | 13 | 14 | 15 | 16 | 17–31 |

Moves four words out of memory and into a specified FPAC.

Computes the effective address, *E*. Fetches the double precision floating point number at the address specified by *E* and places it in FPAC. Updates the *Z* and *N* flags in the FPSR to reflect the new contents of FPAC.

The 32-bit effective address generated by this instruction is contrained to be within the first 32 Kword of the current segment.

NOTE: *This instruction will move unnormalized data without change.*

Load Floating Point Single

FLDS *fpac,[@]displacement[,index]*

| | | | | | | | | | | | | | | | |
|---|---|---|---|---|---|---|---|---|---|---|---|---|---|---|---|
| 1 | INDEX | FPAC | 1 | 0 | 0 | 0 | 0 | 1 | 0 | 1 | 0 | 0 | 0 | @ | DISPLACEMENT |
| 0 | 1–2 | 3–4 | 5 | 6 | 7 | 8 | 9 | 10 | 11 | 12 | 13 | 14 | 15 | 16 | 17–31 |

Moves two words out of memory into a specified FPAC.

Computes the effective address, *E*. Fetches the single precision floating point number at the address specified by *E*. Places the number in the high-order bits of FPAC. Sets the low-order 32 bits of FPAC to 0. Updates the *Z* and *N* flags in the floating point status register to reflect the new contents of FPAC.

The 32-bit effective address generated by this instruction is constrained to be within the first 32 Kword of the current segment.

NOTE: *This instruction will move unnormalized or illegal data without change.*

Float From Memory

FLMD *fpac,[@]displacement[,index]*

| | | | | | | | | | | | | | | | |
|---|---|---|---|---|---|---|---|---|---|---|---|---|---|---|---|
| 1 | INDEX | FPAC | 1 | 0 | 1 | 0 | 1 | 1 | 0 | 1 | 0 | 0 | 0 | @ | DISPLACEMENT |
| 0 | 1–2 | 3–4 | 5 | 6 | 7 | 8 | 9 | 10 | 11 | 12 | 13 | 14 | 15 | 16 | 17–31 |

Converts the contents of two 16-bit memory locations to floating point format and places the result in a specified FPAC.

Computes the effective address, *E*. Converts the 32-bit, signed, two's complement number addressed by *E* to a double precision floating point number. Places the result in the specified FPAC. Updates the *Z* and *N* flags in the floating point status register to reflect the new contents of the FPAC.

The 32-bit effective address generated by this instruction is constrained to be within the first 32 Kword of the current segment.

The range of numbers that you can convert is -2,147,483,648 to +2,147,483,647 inclusive.

Load Floating Point Status

FLST *[@]displacement[,index]*

| 0 | 1 | 2 | 3-4 | 5 | 6 | 7 | 8 | 9 | 10 | 11 | 12 | 13 | 14 | 15 | 16 | 17-31 |
|---|---|---|---|---|---|---|---|---|---|---|---|---|---|---|---|---|
| 1 | 0 | 1 | INDEX | 1 | 1 | 0 | 1 | 1 | 1 | 0 | 1 | 0 | 0 | 0 | @ | DISPLACEMENT |

Moves two words out of memory into the floating point status register.

Computes the effective address, *E*. Places the 32-bit operand addressed by *E* in the floating point status register as follows:

- Places bits 0-15 of the operand in bits 0-15 of the FPSR. Sets bits 16-32 of the FPSR to 0.
- If *ANY* is 0, bits 33-63 of the FPSR (the FPPC) are undefined.
- If *ANY* is 1, the instruction places the value of the current segment in bits 33-35 of the FPSR, zeroes in bits 36-48, and bits 17-31 of the operand in bits 49-63 of the FPSR.

The 32-bit effective address generated by this instruction is constrained to be within the first 32 Kword of the current segment.

NOTES: *This instruction does not set the* ANY *flag from memory. If any of bits 1-4 are loaded as 1,* ANY *is set to 1; otherwise,* ANY *is 0.*

*Bits 12-15 of the FPSR are not set from memory. These bits are the floating point identification code an are read protected. In the MV/8000 they are set to 0111.*

*This instruction initiates a floating point trap if* ANY *and* TE *are both 1 after the FPPC is loaded.*

See Chapter 8 and Appendix G for more information about floating point manipulation.

Multiply Double (FPAC by FPAC)

FMD *facs,facd*

| 0 | 1-2 | 3-4 | 5 | 6 | 7 | 8 | 9 | 10 | 11 | 12 | 13 | 14 | 15 |
|---|---|---|---|---|---|---|---|---|---|---|---|---|---|
| 1 | FACS | FACD | 0 | 0 | 1 | 0 | 1 | 1 | 0 | 1 | 0 | 0 | 0 |

Multiplies the floating point number in FACD by the floating point number in FACS and places the normalized result in FACD. Updates the *Z* and *N* flags in the floating point status register to reflect the new contents of FACD. The contents of FACS remain unchanged.

The instruction multiplies the mantissas of the two numbers together. The result is the mantissa of the intermediate result. The two operands and the rules of algebra determine the sign of the intermediate result. Adds the exponents of the two numbers together and subtracts 64 from the result to maintain excess 64 notation. This value becomes the exponent of the intermediate result. Normalizes the intermediate result if necessary and loads the result into FACD. Updates the *Z* and *N* flags in the floating point status register.
If the exponent processing produces either overflow or underflow, the result is held until normalization, as that procedure may correct the condition. If normalization does not correct the condition, the instruction sets the corresponding flag in the floating point status register to 1. The mantissa and sign of the number will be correct, but the exponent will be 128 too small if overflow occurred, or 128 too large if underflow occurred.

See Chapter 8 and Appendix G for more information about floating point manipulation.

Multiply Double (FPAC by Memory)

FMMD *fpac,[@]displacement[,index]*

| | | | | | | | | | | | | | | | |
|---|---|---|---|---|---|---|---|---|---|---|---|---|---|---|---|
| 1 | INDEX | FPAC | 0 | 1 | 1 | 0 | 1 | 1 | 0 | 1 | 0 | 0 | 0 | @ | DISPLACEMENT |
| 0 | 1-2 | 3-4 | 5 | 6 | 7 | 8 | 9 | 10 | 11 | 12 | 13 | 14 | 15 | 16 | 17-31 |

Multiplies the 64-bit floating point number in the source location by the 64-bit floating point number in FPAC and places the normalized result in FPAC.

Computes the effective address, *E*. Uses *E* to address a double precision (four word) operand. Multiplies this 64-bit floating point number by the floating point number in the specified FPAC. Places the normalized result in the specified FPAC. Leaves the contents of the source location unchanged and updates the *Z* and *N* flags in the floating point status register to reflect the new contents of FPAC.

The 32-bit effective address generated by this instruction is constrained to be within the first 64 Kword of the current segment.

See Chapter 8 and Appendix G for more information about floating point manipulation.

Multiply Single (FPAC by Memory)

FMMS *fpac,[@]displacement[,index]*

| | | | | | | | | | | | | | | | |
|---|---|---|---|---|---|---|---|---|---|---|---|---|---|---|---|
| 1 | INDEX | FPAC | 0 | 1 | 1 | 0 | 0 | 1 | 0 | 1 | 0 | 0 | 0 | @ | DISPLACEMENT |
| 0 | 1-2 | 3-4 | 5 | 6 | 7 | 8 | 9 | 10 | 11 | 12 | 13 | 14 | 15 | 16 | 17-31 |

Multiplies the 32-bit floating point number in the source location by the 32-bit floating point number in bits 0-31 of FPAC and places the normalized result in FPAC.

Computes the effective address, *E*. Uses *E* to address a single precision (double word) operand. Multiplies this 32-bit floating point number by the floating point number in bits 0-31 of the specified FPAC. Places the normalized result in bits 0-31 of the specified FPAC. Sets bits 32-63 of FPAC to 0. Leaves the contents of the source location unchanged and updates the *Z* and *N* flags in the floating point status register to reflect the new contents of FPAC.

The 32-bit effective address generated by this instruction is constrained to be within the first 32 Kword of the current segment.

See Chapter 8 and Appendix G for more information about floating point manipulation.

Move Floating Point

FMOV *facs,facd*

| | | | | | | | | | | | | | |
|---|---|---|---|---|---|---|---|---|---|---|---|---|---|
| 1 | FACS | FACD | 1 | 1 | 1 | 0 | 1 | 1 | 0 | 1 | 0 | 0 | 0 |
| 0 | 1-2 | 3-4 | 5 | 6 | 7 | 8 | 9 | 10 | 11 | 12 | 13 | 14 | 15 |

Moves the contents of one FPAC to another FPAC.

Places the contents of FACS in FACD. Updates the *Z* and *N* flags in the floating point status register to reflect the new contents of FACD. The contents of FACS remain unchanged.

Multiply Single (FPAC by FPAC)

FMS *facs,facd*

| | | | | | | | | | | | | | |
|---|---|---|---|---|---|---|---|---|---|---|---|---|---|
| 1 | FACS | FACD | 0 | 0 | 1 | 0 | 0 | 1 | 0 | 1 | 0 | 0 | 0 |
| 0 | 1 2 | 3 4 | 5 | 6 | 7 | 8 | 9 | 10 | 11 | 12 | 13 | 14 | 15 |

Multiplies the 32-bit floating point number in bits 0-31 of FACS by the 32-bit floating point number in bits 0-31 of FACD.

Multiplies the 32-bit floating point number in bits 0-31 of ACS by the 32-bit floating point number in bits 0-31 of FACD. Places the normalized result in FACD. Leaves the contents of FACS unchanged. Sets bits 32-63 of FACD to 0 and updates the *Z* and *N* flags in the floating point status register to reflect the new contents of FACD.

See Chapter 8 and Appendix G for more information about floating point manipulation.

Negate

FNEG *fpac*

| | | | | | | | | | | | | | |
|---|---|---|---|---|---|---|---|---|---|---|---|---|---|
| 1 | 1 | 1 | FPAC | 1 | 1 | 0 | 0 | 0 | 1 | 0 | 1 | 0 | 0 | 0 |
| 0 | 1 | 2 | 3 4 | 5 | 6 | 7 | 8 | 9 | 10 | 11 | 12 | 13 | 14 | 15 |

Inverts the sign bit of FPAC. Leaves bits 1-63 of FPAC unchanged. Updates the *Z* and *N* flags in the floating point status register to reflect the new contents of FPAC.

If FPAC contains true zero, leaves the sign bit unchanged.

Normalize

FNOM *fpac*

| | | | | | | | | | | | | | | |
|---|---|---|---|---|---|---|---|---|---|---|---|---|---|---|
| 1 | 0 | 0 | FPAC | 1 | 1 | 0 | 0 | 0 | 1 | 0 | 1 | 0 | 0 | 0 |
| 0 | 1 | 2 | 3 4 | 5 | 6 | 7 | 8 | 9 | 10 | 11 | 12 | 13 | 14 | 15 |

Normalizes the floating point numbers in FPAC. Sets a true zero in FPAC if all the bits of the mantissa are zero. Updates the *Z* and *N* flags in the floating point status register to reflect the new contents of FPAC.

If an exponent underflow occurs, sets the *UNF* flag in the floating point status register. In this case, the mantissa and the sign of the number in FPAC are correct, but the exponent is 128 too large.

NOTE: *This instruction does not do rounding.*

See Chapter 8 and Appendix G for more information about floating point manipulation.

No Skip

FNS

| | | | | | | | | | | | | | | | |
|---|---|---|---|---|---|---|---|---|---|---|---|---|---|---|---|
| 1 | 0 | 0 | 0 | 0 | 1 | 1 | 0 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

The next sequential word is executed.

Pop Floating Point State

FPOP

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 1 | 0 | 1 | 1 | 1 | 0 | 1 | 1 | 1 | 0 | 1 | 0 | 0 | 0 |

Pops the state of the floating point unit off the narrow stack.

Pops an 18-word block off the narrow stack and loads the contents into the FPSR and the four FPACs. The format of the 18-word block is shown below.

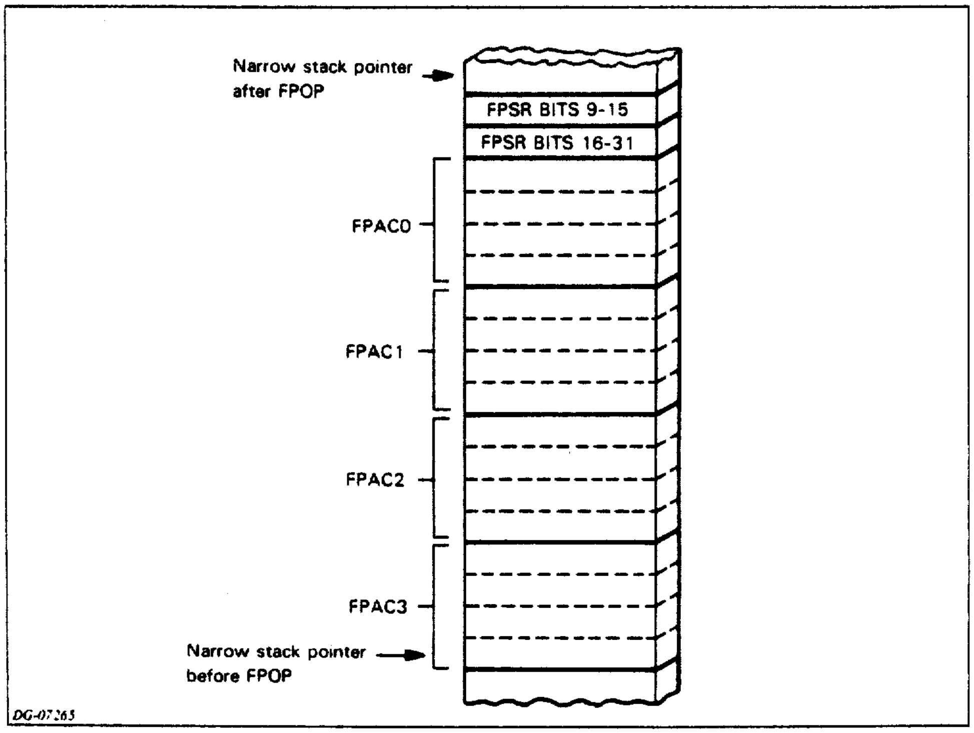

The instruction pops the first 32-bit operand on the stack and places it in the FPSR as follows:

- Places bits 0-15 of the operand in bits 0-15 of the FPSR.
- If *ANY* is 0, bits 16-31 of the FPSR are undefined.
- If *ANY* is 1, the instruction places bits 16-31 of the popped operand into bits 16-31 of the FPSR.

The rest of the stack words are popped in the usual way. See Chapter 8 for more information.

The 32-bit effective address generated by this instruction is constrainted to be within the first 32 Kword of the current segment.

NOTES: *This instruction moves unnormalized data without change.*

*This instruction does not set the* ANY *flag from memory. If any of bits 1-4 are loaded as 1,* ANY *is set to 1; otherwise,* ANY *is 0.*

*Bits 12-15 of the FPSR are not set from memory. These bits are the floating point identification code an are read protected. In the EAGLE they are set to 0111.*

*This instruction does not initiates a floating point trap under any conditions of the FPSR.*

See Chapter 8 and Appendix G for more information about floating point manipulation.

Push Floating Point State
FPSH

| 1 | 1 | 1 | 0 | 0 | 1 | 1 | 0 | 1 | 1 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Pushes an 18-word floating point return block onto the narrow stack, leaving the contents of the floating point accumulators and the floating point status register unchanged. The format of the 18 words pushed is as follows:

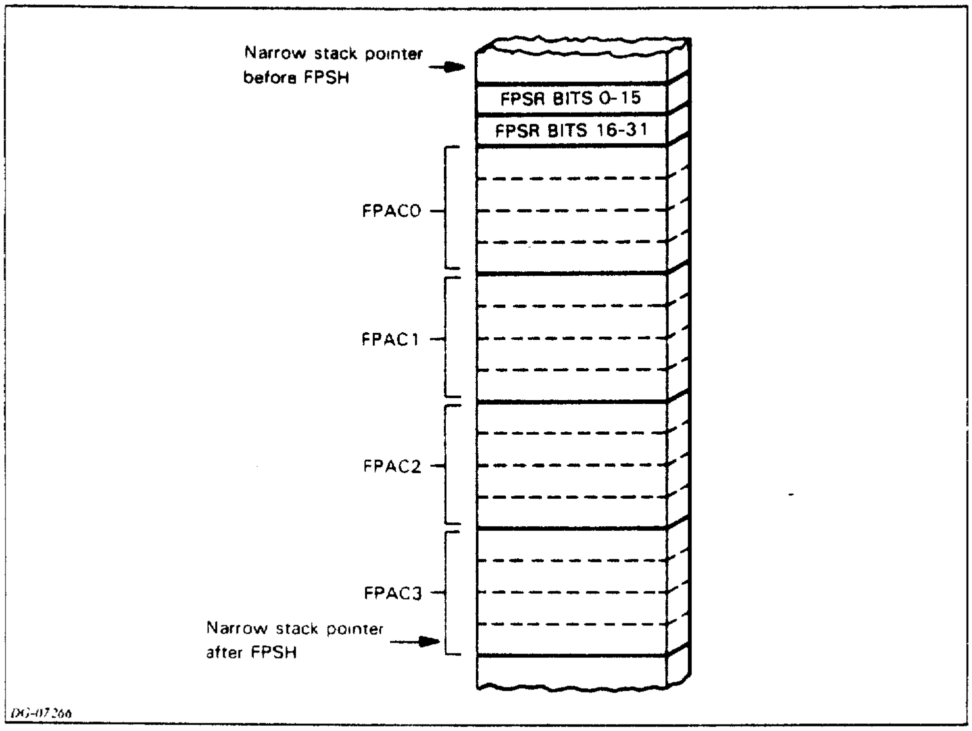

The instruction pushes the contents of the FPSR as follows:

- Stores bits 0-15 of the FPSR in the first memory word.
- If *ANY* is 0, the contents of the second memory word are undefined.
- If *ANY* is 1, the instruction stores bits 16-31 of the FPSR into the second memory word.

The rest of the block is pushed after the FPSR has been pushed.

The 32-bit effective address generated by this instruction is constrained to be within the first 32 Kword of the current segment.

NOTES: *This instruction moves unnormalized data without change.*

*This instruction does not initiate a floating point trap under any conditions of the FPSR.*

See Chapter 8 and Appendix G for more information about floating point manipulation.

Read High Word
FRH *fpac*

| 1 | 0 | 1 | FPAC | | 1 | 1 | 0 | 0 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Places the high-order 16 bits of FPAC in bits 16–31 of AC0. FPAC and the *Z* and *N* flags in the floating point status register remain unchanged.

NOTE: *This instruction moves unnormalized data without change.*

Skip Always

FSA

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 0 | 1 | 1 | 1 | 0 | 1 | 0 | 1 | 0 | 1 | 0 | 0 | 0 |

Skips the next sequential word.

Scale

FSCAL *fpac*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | FPAC | | 1 | 1 | 0 | 0 | 1 | 1 | 0 | 1 | 0 | 0 | 0 |

Shifts the mantissa of the floating point number in FPAC either right or left, depending upon the contents of bits 17–23 of AC0. Leaves the contents of AC0 unchanged.

Bits 17–23 of AC0 contain an exponent.

The instruction subtracts the exponent of the number contained in FPAC from the exponent in AC0. The difference between the exponents specifies *D*, a number of hex digits.

If *D* is zero, the instruction updates the *Z* and *N* flags, and stops.

If *D* is positive, the instruction shifts the mantissa of the number contained in FPAC to the right by *D* digits.

If *D* is negative, the instruction shifts the mantissa of the number contained in FPAC to the left by *D* digits. Sets the *MOF* flag in the floating point status register.

After the right or left shift, the instruction loads the contents of bits 17–23 of AC0 into the exponent field of FPAC. Bits shifted out of either end of the mantissa are lost. Updates the *Z* and *N* flags in the floating point status register to reflect the new contents of FPAC.

NOTE: *This instruction does not do rounding.*

See Chapter 8 and Appendix G for more information about floating point manipulation.

Subtract Double (FPAC from FPAC)

FSD *facs,facd*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | FACS | | FACD | | 0 | 0 | 0 | 1 | 1 | 1 | 0 | 1 | 0 | 0* | 0 |

Subtracts the 64-bit floating point number in FACS from the 64-bit floating point number in FACD. Places the normalized result in FACD. Updates the *Z* and *N* flags in the floating point status register to reflect the new contents of FACD. The contents of FACS remain unchanged.

Refer to Chapter 8 and Appendix G for more information about floating point manipulation.

Skip On Zero

FSEQ

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 1 | 0 | 1 | 1 | 0 | 1 | 0 | 1 | 0 | 1 | 0 | 0 | 0 |

Skips the next sequential word if the *Z* flag of the floating point status register is 1.

Skip On Greater Than Or Equal To Zero

FSGE

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 0 | 1 | 1 | 1 | 0 | 1 | 0 | 1 | 0 | 1 | 0 | 0 | 0 |

Skips the next sequential word if the *N* flag of the floating point status register is 0.

Skip On Greater Than Zero

FSGT

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 1 | 1 | 1 | 1 | 0 | 1 | 0 | 1 | 0 | 1 | 0 | 0 | 0 |

Skips the next sequential word if both the *Z* and *N* flags of the floating point status register are 0.

Skip On Less Than Or Equal To Zero

FSLE

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 1 | 0 | 1 | 1 | 0 | 1 | 0 | 1 | 0 | 1 | 0 | 0 | 0 |

Skips the next sequential instruction if either the *Z* flag or the *N* flag of the floating point status register is 1.

Skip On Less Than Zero

FSLT

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 0 | 0 | 1 | 1 | 0 | 1 | 0 | 1 | 0 | 1 | 0 | 0 | 0 |

Skips the next sequential word if the *N* flag of the floating point status register is 1.

Subtract Double (Memory from FPAC)

FSMD *fpac,[@]displacement[,index]*

| 0 | 1–2 | 3–4 | 5 | 6 | 7 | 8 | 9 | 10 | 11 | 12 | 13 | 14 | 15 | 16 | 17–31 |
|---|---|---|---|---|---|---|---|---|---|---|---|---|---|---|---|
| 1 | INDEX | FPAC | 0 | 1 | 0 | 1 | 1 | 1 | 0 | 1 | 0 | 0 | 0 | @ | DISPLACEMENT |

Subtracts the 64-bit floating point number in the source location from the 64-bit floating point number in FPAC and places the normalized result in FPAC.

Computes the effective address, *E*. Uses *E* to address a double precision (four word) operand. Subtracts this 64-bit floating point number from the floating point number in the specified FPAC. Places the normalized result in the specified FPAC. Leaves the contents of the source location unchanged and updates the *Z* and *N* flags in the floating point status register to reflect the new contents of FPAC.

The 32-bit effective address generated by this instruction is constrained to be within the first 32 Kword of the current segment.

See Chapter 8 and Appendix G for more information about floating point manipulation.

Subtract Single (Memory from FPAC)

FSMS *fpac,[@]displacement[,index]*

| 1 | INDEX | FPAC | 0 | 1 | 0 | 1 | 0 | 1 | 0 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Subtracts the 32-bit floating point number in the source location from the 32-bit floating point number in bits 0-31 of FPAC and places the normalized result in FPAC.

Computes the effective address, *E*. Uses *E* to address a single precision (double word) operand. Subtracts this 32-bit floating point number from the floating point number in bits 0-31 of the specified FPAC. Places the normalized result in the specified FPAC. Sets bits 32-63 of FPAC to 0. Leaves the contents of the source location unchanged and updates the *Z* and *N* flags in the floating point status register to reflect the new contents of FPAC.

The 32-bit effective address generated by this instruction is constrained to be within the first 32 Kword of the current segment.

See Chapter 8 and Appendix G for more information about floating point manipulation.

Skip On No Zero Divide

FSND

| 1 | 1 | 0 | 0 | 1 | 1 | 1 | 0 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Skips the next sequential word if the *DVZ* flag of the floating point status register is 0.

Skip On Non-Zero

FSNE

| 1 | 0 | 0 | 1 | 1 | 1 | 1 | 0 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Skips the next sequential word if the *Z* flag of the floating point status register is 0.

Skip On No Error

FSNER

| 1 | 1 | 1 | 1 | 1 | 1 | 1 | 0 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Skips the next sequential word if bits 1–4 of the floating point status register are all 0.

Skip On No Mantissa Overflow

FSNM

| | | | | | | | | | | | | | | | |
|---|---|---|---|---|---|---|---|---|---|---|---|---|---|---|---|
| 1 | 1 | 0 | 0 | 0 | 1 | 1 | 0 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

Skips the next sequential word if the *MOF* flag of the floating point status register is 0.

Skip On No Overflow

FSNO

| | | | | | | | | | | | | | | | |
|---|---|---|---|---|---|---|---|---|---|---|---|---|---|---|---|
| 1 | 1 | 1 | 0 | 0 | 1 | 1 | 0 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

Skips the next sequential word if the *OVF* flag of the floating point status register is 0.

Skip On No Overflow and No Zero Divide

FSNOD

| | | | | | | | | | | | | | | | |
|---|---|---|---|---|---|---|---|---|---|---|---|---|---|---|---|
| 1 | 1 | 1 | 0 | 1 | 1 | 1 | 0 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

Skips the next sequential word if both the *OVF* flag and the *DVZ* flag of the floating point status register are 0.

Skip On No Underflow

FSNU

| | | | | | | | | | | | | | | | |
|---|---|---|---|---|---|---|---|---|---|---|---|---|---|---|---|
| 1 | 1 | 0 | 1 | 0 | 1 | 1 | 0 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

Skips the next sequential word if the *UNF* flag of the floating point status register is 0

Skip On No Underflow And No Zero Divide

FSNUD

| | | | | | | | | | | | | | | | |
|---|---|---|---|---|---|---|---|---|---|---|---|---|---|---|---|
| 1 | 1 | 0 | 1 | 1 | 1 | 1 | 0 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

Skips the next sequential word if both the *UNF* flag and the *DVZ* flag of the floating point status register are 0.

Skip On No Underflow And No Overflow

FSNUO

| | | | | | | | | | | | | | | | |
|---|---|---|---|---|---|---|---|---|---|---|---|---|---|---|---|
| 1 | 1 | 1 | 1 | 0 | 1 | 1 | 0 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

Skips the next sequential word if both the *UNF* flag and the *OVF* flag of the floating point status register are 0.

Subtract Single (FPAC from FPAC)

FSS *facs,facd*

| 1 | FACS | FACD | 0 | 0 | 0 | 1 | 0 | 1 | 0 | 1 | 0 | 0 | 0 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Subtracts the 32-bit floating point number in bits 0-31 of FACS from the 32-bit floating point number in bits 0-31 of FACD. Places the normalized result in bits 0-31 of FACD. Sets bits 32-63 of FACD to 0. Updates the *Z* and *N* flags in the floating point status register to reflect the new contents of FACD. The contents of FACS remain unchanged.

Refer to Chapter 8 and Appendix G for more information about floating point manipulation.

Store Floating Point Status

FSST *[@]displacement[,index]*

| 1 | 0 | 0 | INDEX | 1 | 1 | 0 | 1 | 1 | 1 | 0 | 1 | 0 | 0 | 0 | @ | DISPLACEMENT |
|---|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16 | 17–31 |

Moves the contents of the narrow FPSR into memory.

Computes the effective address, *E*, of two sequential, 16-bit locations in memory. Stores the contents of the FPSR in these locations as follows:

- Stores bits 0-15 of the FPSR in the first memory word.
- If *ANY* is 0, the contents of the second memory word are undefined.
- If *ANY* is 1, the instruction stores bits 48-63 of the FPSR into the second memory word.

The 32-bit effective address generated by this instruction is constrained to be within the first 32 Kword of the current segment.

NOTE: *This instruction does not initiate a floating point trap under any conditions of the FPSR.*

See Chapter 8 and Appendix G for more information about floating point manipulation.

Store Floating Point Double

FSTD *fpac,[@]displacement[,index]*

| 1 | INDEX | FPAC | 1 | 0 | 0 | 1 | 1 | 1 | 0 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Stores the contents of a specified FPAC into a memory location.

Computes the effective address, *E*. Places the floating point number contained in FPAC in memory beginning at the location addressed by *E*. Destroys the previous contents of the addressed memory location. The contents of FPAC and the condition codes in the FPSR remain unchanged.

The 32-bit effective address generated by this instruction is constrained to be within the first 32 Kword of the current segment.

Store Floating Point Single

FSTS *fpac,[@]displacement[,index]*

| 1 | INDEX | FPAC | 1 | 0 | 0 | 1 | 0 | 1 | 0 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Stores the contents of a specified FPAC into a memory location.

Computes the effective address *E*. Places the 32 high-order bits of FPAC in memory beginning at the location addressed by *E*. Destroys the previous contents of the addressed memory location. The contents of FPAC and the condition codes in the FPSR remain unchanged.

The 32-bit effective address generated by this instruction is constrained to be within the first 32 Kword of the current segment.

Trap Disable

FTD

| 1 | 1 | 0 | 0 | 1 | 1 | 1 | 0 | 1 | 1 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Sets the trap enable (*TE*) bit of the FPSR to 0.

NOTE: *The I/O RESET instruction will also set this bit to 0.*

Trap Enable

FTE

| 1 | 1 | 0 | 0 | 0 | 1 | 1 | 0 | 1 | 1 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Sets the trap enable *TE* bit of the FPSR to 1. If *ANY* is 1 before execution of this instruction, signals a floating point trap. If *ANY* is 0 before execution of this instruction, execution continues normally at the end of this instruction.

NOTES: *When this instruction is used to cause a floating point trap, the FPPC portion of the FPSR will contain the address of the first instruction to cause a fault. Even if another instruction causes a second fault that occurs before the* FTE *instruction executes, the FPPC will still contain the address of the first instruction that caused a fault.*

*When a floating point fault occurs and* TE *is 1, the processor sets* TE *to 0 before transferring control to the floating point error handler.* TE *should be set to 1 before resuming normal processing.*

Fixed Point Trap Disable

FXTD

| 1 | 0 | 1 | 0 | 0 | 1 | 1 | 1 | 0 | 1 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Unconditionally sets the OVK flag to zero. This disables fixed point overflow traps. Carry is unchanged.

Fixed Point Trap Enable

FXTE

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 0 | 0 | 1 | 1 | 1 | 0 | 1 | 0 | 0 | 1 | 0 | 0 | 1 |

Unconditionally sets OVK to 1 and OVR to 0. This enables fixed point overflow traps. Carry is unchanged.

Halve

HLV *ac*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 0 | AC | | 1 | 1 | 0 | 1 | 1 | 1 | 1 | 1 | 0 | 0 | 0 |

Divides the contents of an accumulator by 2 and rounds the result toward zero.

The signed, 16-bit two's complement number contained in bits 16-31 of the specified accumulator is divided by 2 and rounded toward 0. The result is placed in bits 16-31 of the specified accumulator.

Bits 0-15 of the modified accumulator are undefined after completion of this instruction.

This instruction leaves carry unchanged; *overflow* is 0.

Hex Shift Left

HXL *n,ac*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | N | | AC | | 0 | 1 | 1 | 0 | 0 | 0 | 0 | 1 | 0 | 0 | 0 |

Shifts the contents of bits 16-31 of the specified accumulator left a number of hex digits depending upon the immediate field *N*. The number of digits shifted is equal to $N+1$. Bits shifted out are lost, and the vacated bit positions are filled with zeroes. If *N* is equal to 3, then bits 16-31 of the specified accumulator are shifted out and are set to 0. Leaves carry unchanged. *Overflow* is 0.

Bits 0-15 of the modified accumulator are undefined after completion of this instruction.

NOTE: *The assembler takes the coded value of* n *and subtracts one from it before placing it in the immediate field. Therefore, the programmer should code the exact number of hex digits that he wishes to shift.*

Hex Shift Right

HXR *n,ac*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | N | | AC | | 0 | 1 | 1 | 0 | 1 | 0 | 0 | 1 | 0 | 0 | 0 |

Shifts the contents of bits 16-31 of the specified accumulator right a number of hex digits depending upon the immediate field, *N*. The number of digits shifted is equal to $N+1$. Bits shifted out are lost, and the vacated bit positions are filled with zeroes. If *N* is equal to 3, then bits 16-31 of the specified accumulator are shifted out and are set to 0. Leaves carry unchanged. *Overflow* is 0.

Bits 0-15 of the modified accumulator are undefined after completion of this instruction.

NOTE: *The assembler takes the coded value of n and subtracts one from it before placing it in the immediate field. Therefore, the programmer should code the exact number of hex digits that he wishes to shift.*

Increment

INC*[c][sh][#] acs,acd[,skip]*

| 1 | ACS | ACD | 0 | 1 | 1 | SH | C | # | SKIP |
|---|---|---|---|---|---|---|---|---|---|
| 0 | 1-2 | 3-4 | 5 | 6 | 7 | 8-9 | 10-11 | 12 | 13-15 |

Increments the contents of bits 16-31 of an accumulator.

Initializes carry to the specified value. Increments the unsigned, 16-bit number in bits 16-31 of ACS by one and places the result in the shifter. If the incrementation produces a carry of 1 out of the high order bit, the instruction complements carry. Performs the specified shift operation, and loads the result of the shift into bits 16-31 of ACD if the no-load bit is 0. If the skip condition is true, the next sequential word is skipped.

If the load option is specified, bits 0-15 of ACD are undefined.

NOTE: *If the number in ACS is $177777_8$ the instruction complements carry.*

For this instruction, *overflow* is 0.

Inclusive OR

IOR *acs,acd*

| 1 | ACS | ACD | 0 | 0 | 1 | 0 | 0 | 0 | 0 | 1 | 0 | 0 | 0 |
|---|---|---|---|---|---|---|---|---|---|---|---|---|---|
| 0 | 1-2 | 3-4 | 5 | 6 | 7 | 8 | 9 | 10 | 11 | 12 | 13 | 14 | 15 |

Forms the logical inclusive OR of the contents of bits 16-31 of ACS and the contents of bits 16-31 of ACD and places the result in bits 16-31 of ACD. Sets a bit position in the result to 1 if the corresponding bit position in one or both operands contains a 1; otherwise, the instruction sets the result bit to 0. The contents of ACS remain unchanged. Carry remains unchanged. *Overflow* is 0.

Bits 0-15 of the modified accumulator are undefined after completion of this instruction.

Inclusive OR Immediate

IORI *i,ac*

| 1 | 0 | 0 | AC | 1 | 1 | 1 | 1 | 1 | 1 | 1 | 1 | 0 | 0 | 0 | IMMEDIATE FIELD |
|---|---|---|---|---|---|---|---|---|---|---|---|---|---|---|---|
| 0 | 1 | 2 | 3-4 | 5 | 6 | 7 | 8 | 9 | 10 | 11 | 12 | 13 | 14 | 15 | 16-31 |

Forms the logical inclusive OR of the contents of the immediate field and the contents of bits 16-31 of the specified accumulator and places the result in bits 16-31 of the specified accumulator. Carry remains unchanged and *overflow* is 0.

Bits 0-15 of the modified accumulator are undefined after completion of this instruction.

Increment And Skip If Zero

ISZ *[@]displacement[,index]*

| 0 | 0 | 0 | 1 | 0 | @ | INDEX | | DISPLACEMENT |
|---|---|---|---|---|---|---|---|---|
| 0 | 1 | 2 | 3 | 4 | 5 | 6 | 7 | 8 – 15 |

Increments the addressed word, then skips if the incremented value is zero.

Increments the word addressed by *E* and writes the result back into memory at that location. If the updated value of the location is zero, the instruction skips the next sequential word.

The 32-bit effective address generated by this instruction is constrained to be within the first 32 Kword of the current segment.

Carry remains unchanged and *overflow* is 0.

Increment the Word Addressed by WSP and Skip if Zero

ISZTS

| 1 | 1 | 0 | 0 | 0 | 1 | 1 | 1 | 1 | 1 | 0 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Uses the contents of WSP (the wide stack pointer) as the address of a double word. Increments the contents of the word addressed by WSP. If the incremented value is equal to zero, then the next sequential word is skipped. Carry is unchanged and *overflow* is 0.

NOTE: *The operation performed by this instruction is not indivisible.*

Jump

JMP

| 0 | 0 | 0 | 0 | 0 | @ | INDEX | | DISPLACEMENT |
|---|---|---|---|---|---|---|---|---|
| 0 | 1 | 2 | 3 | 4 | 5 | 6 | 7 | 8 – 15 |

Computes the effective address, *E*, and places it in the program counter. Sequential operation continues with the word addressed by the updated value of the program counter.

The 32-bit effective address generated by this instruction is constrained to be within the first 32 Kword of the current segment.

Carry remains unchanged and *overflow* is 0.

Jump To Subroutine

JSR *[@]displacement[,index]*

| 0 | 0 | 0 | 0 | 1 | @ | INDEX | | DISPLACEMENT |
|---|---|---|---|---|---|---|---|---|
| 0 | 1 | 2 | 3 | 4 | 5 | 6 | 7 | 8 – 15 |

Increments and stores the value of the program counter in AC3, and then places a new address in the program counter.

Computes the effective address, *E*; then places the address of the next sequential instruction in bits 16-31 of AC3. Places *E* in the program counter. Sequential operation continues with the word addressed by the updated value of the program counter.

The 32-bit effective address generated by this instruction is constrained to be within the first 32 Kword of the current segment.

Carry remains unchanged and *overflow* is 0.

NOTE: *The instruction computes* E *before it places the incremented program counter in AC3.*

Call Subroutine (Long Displacement)

LCALL *opcode,argument count,displacement*

| 1 | 0 | 1 | INDEX | 1 | 1 | 0 | 1 | 1 | 0 | 0 | 1 | 0 | 0 | 1 | @ | DISPLACEMENT |
|---|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 | 17 ... 47 |

| S | ARGUMENT COUNT |
|---|---|
| 48 | ... 63 |

Evaluates the address of a subroutine call.

If the target address specifies an outward ring crossing, a protection fault (code=7 in AC1) occurs. Note that the contents of the PC in the return block are undefined.

If the target address specifies an inward ring call, then the instruction assumes the target address has the following format:

| X | NEW RING | UNUSED | GATE |
|---|---|---|---|
| 0 | 1 ... 3 | 4 ... 15 | 16 ... 31 |

The instruction checks the gate field of the above format for a legal gate. If the specified gate is illegal, a protection fault (code=6 in AC1) occurs and no subroutine call is made. Note that the value of the PC in the return block is undefined.

If the specified gate is legal, or if the target address specifies an intra ring crossing, the instruction loads the contents of the PC, plus four, into AC3. The contents of AC3 always references the current ring. If bit 0 of the argument count is 0, the instruction creates a word with the following format:

| OVK | OVR | 0 | 0 | 0 | 0 | 0 | 0 | 0 | 0 | 0 | 0 | 0 | 0 | 0 | 0 | 0 | ARGUMENT COUNT |
|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 ... 31 |

The instruction pushes this word onto the wide stack. If a stack overflow occurs after this push, a stack fault occurs and no subroutine call is made. Note that the value of the PC in the return block is undefined. If bit 0 of the argument count is 1, then the instruction assumes the top word of the wide stack has the following format:

| DON'T CARE | 0 | ARGUMENT COUNT |
|---|---|---|
| 0 ... 15 | 16 | 17 ... 31 |

The instruction modifies this word to include the correct settings of OVK and OVR in bits 0 and 1.

Regardless of the setting of bit 0 of the argument count, the instruction next unconditionally sets OVR to 0 and loads the PC with the target address. Control then transfers to the word referenced by the PC.

Load CPU Identification

LCPID

| 1 | 0 | 0 | 0 | 0 | 1 | 1 | 1 | 0 | 1 | 0 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Loads a double word into AC0. Carry is unchanged and *overflow* is 0.

The double word has the format:

| MODEL NUMBER | MICROCODE REV | 0 | 0 | MEM SIZE |
|---|---|---|---|---|
| 0–15 | 16–23 | 24 | 25 | 26–31 |

where

*model #* is the binary representation of the machine's model number,
*microcode rev* indicates the microcode revision currently in use on this machine,
*mem size* indicates the amount of physical memory on this machine. A zero in this field indicates 256 Kbytes of memory; a one indicates 512 Kbytes, and so on.

Load Accumulator

LDA *ac,[@]displacement[,index]*

| 0 | 0 | 1 | AC | @ | INDEX | DISPLACEMENT |
|---|---|---|---|---|---|---|
| 0 | 1 | 2 | 3–4 | 5 | 6–7 | 8–15 |

Copies a word from memory to an accumulator.

Places the word addressed by the effective address, *E*, in bits 16-31 of the specified accumulator.

Bits 0-15 are undefined.

The 32-bit effective address generated by this instruction is constrained to be within the first 32 Kword of the current segment.

The previous contents of the location addressed by *E* and carry remain unchanged. *Overflow* is 0.

Load Accumulator with WFP

LDAFP *ac*

| 1 | 1 | 0 | AC | 1 | 1 | 0 | 0 | 1 | 1 | 0 | 1 | 0 | 0 | 1 |
|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 |

Loads the 32-bit contents of WFP (the wide frame pointer) into the specified 32-bit accumulator. Carry is unchanged and *overflow* is 0.

Load Accumulator with WSB

LDASB *ac*

| 1 | 1 | 0 | AC | 1 | 1 | 0 | 0 | 1 | 0 | 0 | 1 | 0 | 0 | 1 |
|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 |

Loads the 32-bit contents of WSB (the wide stack base) into the specified 32-bit accumulator. Carry is unchanged and *overflow* is 0.

Load Accumulator with WSL

LDASL *ac*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | AC | | 1 | 1 | 0 | 0 | 1 | 1 | 0 | 1 | 0 | 0 | 1 |

Loads the 32-bit contents of WSL (the wide stack limit) into the specified 32-bit accumulator. Carry is unchanged and *overflow* is 0.

Load Accumulator with WSP

LDASP *ac*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | AC | | 1 | 1 | 0 | 0 | 1 | 0 | 0 | 1 | 0 | 0 | 1 |

Loads the contents of WSP (the wide stack pointer) into the specified accumulator. Carry is unchanged and *overflow* is 0.

Load Accumulator with Double Word

LDATS *ac*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | AC | | 1 | 1 | 0 | 0 | 1 | 0 | 0 | 1 | 0 | 0 | 1 |

Uses the contents of WSP (the wide stack pointer) as the address of a double word. Loads the contents of the addressed double word into the specified accumulator. Carry is unchanged and *overflow* is 0.

Load Byte

LDB *acs,acd*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | ACS | | ACD | | 1 | 0 | 1 | 1 | 1 | 0 | 0 | 1 | 0 | 0 | 0 |

Moves a copy of the contents of a memory byte (as addressed by a byte pointer in one accumulator) into the second accumulator.

Places the 8-bit byte addressed by the byte pointer contained in bits 15-31 of ACS in bits 24–31 of ACD. Sets bits 16–23 of ACD to 0. The contents of ACS remain unchanged unless ACS and ACD are the same accumulator. Carry remains unchanged and *overflow* is 0.

The 32-bit effective address generated by this instruction is constrained to be within the first 64 Kbyte of the current segment.

Load Integer

LDI *fpac*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | FPAC | | 1 | 1 | 1 | 1 | 0 | 1 | 0 | 1 | 0 | 0 | 0 |

Translates a decimal integer from memory to (normalized) floating point format and places the result in a floating point accumulator.

Under the control of accumulators AC1 and AC3, converts a decimal integer to floating point form, normalizes it, and places it in the specified FPAC. The instruction updates the *Z* and *N* bits in the FPSR to describe the new contents of the specified FPAC. Leaves the decimal number unchanged in memory, and destroys the previous contents of the specified FPAC.

Bits 16-31 of AC1 must contain the data-type indicator describing the number.

Bits 16-31 of AC3 must contain a byte pointer which is the address of the high-order byte of the number in memory.

Numbers of data type 7 are not normalized after loading. By convention, the first byte of a number stored according to data type 7 must contain the sign and exponent of the floating point number. The exponent must be in "excess 64" representation. The instruction copies each byte (following the lead byte) directly to mantissa of the specified FPAC. It then sets to zero each low-order byte in the FPAC that does not receive data from memory.

Upon successful completion, the instruction leaves accumulators AC0 and AC1 unchanged. AC2 contains the original contents of AC3; the contents of AC3 are undefined. Carry remains unchanged and *overflow* is 0.

The 32-bit effective address generated by this instruction is constrained to be within the first 64 Kbyte of the current segment.

NOTE: *An attempt to load a minus 0 sets the specified FPAC to true zero.*

Load Integer Extended
LDIX

| 1 | 1 | 0 | 0 | 0 | 1 | 1 | 1 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Distributes a decimal integer of data type 0, 1, 2, 3, 4, or 5 into the four FPACs.

Extends the integer with high-order zeros until it is 32 digits long. Divides the integer into four units of 8 digits each and converts each unit to a floating point number. Places the number obtained from the 8 high-order digits into FAC0, the number obtained from the next 8 digits into FAC1, the number obtained from the next 8 digits into FAC2, and the number obtained from the low-order 8 bits into FAC3. The instruction places the sign of the integer in each FPAC unless that FPAC has received 8 digits of zeros, in which case the instruction sets FPAC to true zero. The *Z* and *N* flags in the floating point status register are unpredictable.

Bits 16-31 of AC1 must contain the data-type indicator describing the integer.

Bits 16-31 of AC3 must contain a byte pointer which is the address of the high-order byte of the integer.

Upon successful termination, the contents of AC0 and AC3 are undefined; the contents of AC1 remain unchanged; and AC2 contains the original contents of AC3. Carry remains unchanged and *overflow* is 0.

The 32-bit effective address generated by this instruction is constrained to be within the first 64 Kbyte of the current segment.

Dispatch (Long Displacement)

LDSP *ac,index,displacement*

| 1 | INDEX | AC | 1 | 0 | 1 | 1 | 1 | 1 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 … 47 |

Dispatches through a table of 28-bit self-relative addresses indexed by the 31-bit PC.

Computes the effective address $E$ . This is the address of a *dispatch table*. The dispatch table consists of a table of 28-bit self-relative addresses (bits 0-3 are ignored). Immediately before the table are two signed, two's complement limit words, $L$ and $H$. The last word of the table is in location $E + 2 \times (H - L)$. The instruction adds the 28-bit self-relative address in the table entry to the address of the table entry. The ring field of the fetched table entry is ignored.

Compares the signed, two's complement number contained in the accumulator to the limit words. If the number in the accumulator is less than $L$ or greater than $H$, sequential operation continues with the instruction immediately after the *Wide Dispatch* instruction.

If the number in AC is greater than or equal to $L$ and less than or equal to $H$, the instruction fetches the word at location $E - 2 \times (L - number)$. If the fetched word is equal to $37777777777_8$ (all 1's), sequential operation continues with the instruction immediately after the *Wide Dispatch* instruction. If the fetched word is not equal to $37777777777_8$, the instruction treats this word as the intermediate address in the effective address calculation. After the indirection chain, if any, has been followed, the instruction places the effective address in the program counter and sequential operation continues with the word addressed by the updated value of the program counter. Carry is unchanged and *overflow* is 0.

Wraparound occurs within the 28-bit offset. A ring crossing cannot occur. The effective address, $E$, references a table of self-relative addresses in the current segment. Thus, bits 1-3 of $E$ and bits 1-3 of any levels of indirection are always interpreted as the current segment.

The structure of the dispatch table is shown in the figure below.

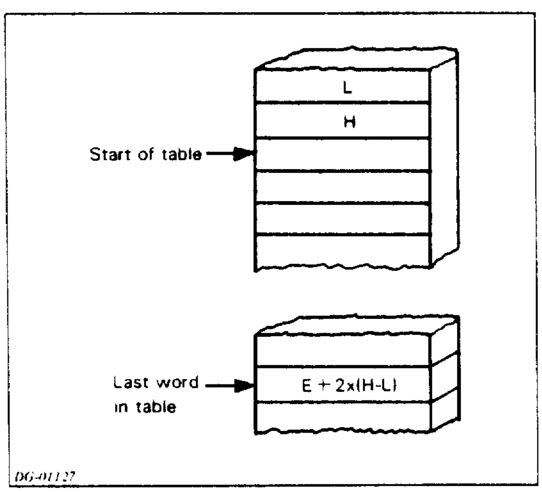

Load Effective Address

LEF *ac,[@]displacement[,index]*

| 0 | 1 | 1 | AC | @ | INDEX | DISPLACEMENT |
|---|---|---|---|---|---|---|
| 0 | 1 | 2 | 3–4 | 5 | 6–7 | 8–15 |

Computes the effective address, *E*, within the current segment and places it in the specified accumulator. Sets bit 0 of the accumulator to 0. The previous contents of the AC are lost.

The 32-bit effective address generated by this instruction is constrained to be within the first 32 Kword of the current segment.

> NOTES: *The* LEF *instruction can only be used in a mapped system while in the user mode. With the* LEF *mode bit set to 1, all I/O and* LEF *instructions will be interpreted as* LEF *instructions. With the* LEF *mode bit set to 0, all I/O and* LEF *instructions will be interpreted as I/O instructions.*
>
> *Be sure that I/O protection is enabled or the* LEF *mode bit is set to 1 before using the* LEF *instruction. If you issue a* LEF *instruction in the I/O mode, with protection disabled, the instruction will be interpreted and executed as an I/O instruction, with possibly undesirable results.*

Carry is unchanged and *overflow* is 0.

Add Double (Memory to FPAC) (Long Displacement)

LFAMD *fpac,[@]displacement[,index]*

| 1 | INDEX | FPAC | 0 | 0 | 0 | 1 | 1 | 0 | 1 | 1 | 0 | 0 | 1 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–47 |

Adds the 64-bit floating point number in the source location to the 64-bit floating point number in FPAC and places the normalized result in FPAC.

Computes the effective address, *E*. Uses *E* to address a double precision (four word) operand. Adds this 64-bit floating point number to the floating point number in the specified FPAC. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Add Single (Memory to FPAC) (Long Displacement)

LFAMS *fpac,[@]displacement[,index]*

| 1 | INDEX | FPAC | 0 | 0 | 0 | 1 | 1 | 0 | 0 | 1 | 0 | 0 | 1 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–47 |

Adds the 32-bit floating point number in the source location to the 32-bit floating point number in FPAC and places the normalized result in FPAC.

Computes the effective address, *E*. Uses *E* to address a single precision (double word) operand. Adds this 32-bit floating point number to the floating point number in bits 0-31 of the specified FPAC. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Divide Double (FPAC by Memory) (Long Displacement).

LFDMD *fpac,[@]displacement[,index]*

| 1 | INDEX | FPAC | 0 | 0 | 1 | 1 | 1 | 1 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 … 47 |

Divides the 64-bit floating point number in FPAC by the 64-bit floating point number in the source location and places the normalized result in FPAC.

Computes the effective address, *E*. Uses *E* to address a double precision (four word) operand. Divides the floating point number in the specified FPAC by this 64-bit floating point number. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Divide Single (FPAC by Memory) (Long Displacement)

LFDMS *fpac,[@]displacement[,index]*

| 1 | INDEX | FPAC | 0 | 0 | 1 | 1 | 1 | 1 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 … 47 |

Divides the 32-bit floating point number in bits 32-63 of FPAC by the 32-bit floating point number in the source location and places the normalized result in FPAC.

Computes the effective address, *E*. Uses *E* to address a single precision (double word) operand. Divides the floating point number in bits 0-31 of the specified FPAC by this 32-bit floating point number. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Load Floating Point Double (Long Displacement)

LFLDD *fpac,[@]displacement[,index]*

| 1 | INDEX | FPAC | 0 | 1 | 0 | 1 | 1 | 0 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 … 47 |

Moves four words out of memory and into a specified FPAC.

Computes the effective address, *E*. Fetches the double precision floating point number at the address specified by *E* and places it in FPAC. Updates the *Z* and *N* flags in the FPSR to reflect the new contents of FPAC.

NOTE: *This instruction will move unnormalized data without change.*

Floating Point Load Single (Long Displacement)

LFLDS *fpac,[@]displacement[,index]*

| 1 | INDEX | FPAC | 0 | 1 | 0 | 1 | 1 | 0 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 … 47 |

Moves two words out of memory into a specified FPAC.

Computes the effective address *E*. Fetches the single precision floating point number at the address specified by *E*. Places the number in the high-order bits of FPAC. Sets the low-order 32 bits of FPAC to 0. Updates the *Z* and *N* flags in the floating point status register to reflect the new contents of FPAC.

NOTE: *This instruction will move unnormalized or illegal data without change, but the Z and N flags will be undefined.*

Load Floating Point Status (Long Displacement)

LFLST *[@]displacement[,index]*

| 1 | 1 | 0 | INDEX | 1 | 1 | 0 | 1 | 1 | 0 | 1 | 1 | 0 | 0 | 1 | @ | DISPLACEMENT |
|---|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16 | 17–47 |

Moves the contents of two specified memory locations to the floating point status register.

Computes the effective address, *E*. Places the 32-bit operand addressed by *E* in the floating point status register as follows:

- Places bits 0-15 of the operand in bits 0-15 of the FPSR. Sets bits 16-32 of the FPSR to 0.
- If *ANY* is 0, bits 33-63 of the FPSR are undefined.
- If *ANY* is 1, the instruction places the value of the current segment in bits 33-35 of the FPSR, zeroes in bits 36-48, and bits 17-31 of the operand in bits 49-63 of the FPSR.

NOTES: *This instruction does not set the* ANY *flag from memory. If any of bits 1-4 are loaded as 1,* ANY *is set to 1; otherwise,* ANY *is 0.*

*Bits 12-15 of the FPSR are not set from memory. These bits are the floating point identification code an are read protected. In the MV/8000 they are set to 0111.*

*This instruction initiates a floating point trap if* ANY *and* TE *are both 1 after the FPPC is loaded.*

See Chapter 8 and Appendix G for more information about floating point manipulation.

Multiply Double (FPAC by Memory) (Long Displacement)

LFMMD *fpac,[@]displacement[,index]*

| 1 | INDEX | FPAC | 0 | 0 | 1 | 1 | 1 | 0 | 1 | 1 | 0 | 0 | 1 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–47 |

Multiplies the 64-bit floating point number in the source location by the 64-bit floating point number in FPAC and places the normalized result in FPAC.

Computes the effective address, *E*. Uses *E* to address a double precision (four word) operand. Multiplies this 64-bit floating point number by the floating point number in the specified FPAC. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Multiply Single (FPAC by Memory) (Long Displacement)

LFMMS *fpac,[@]displacement[,index]*

| 0 | 1-2 | 3-4 | 5 | 6 | 7 | 8 | 9 | 10 | 11 | 12 | 13 | 14 | 15 | 16 | 17-47 |
|---|---|---|---|---|---|---|---|---|---|---|---|---|---|---|---|
| 1 | INDEX | FPAC | 0 | 0 | 1 | 1 | 1 | 0 | 0 | 1 | 0 | 0 | 1 | @ | DISPLACEMENT |

Multiplies the 32-bit floating point number in the source location by the 32-bit floating point number in bits 0-31 of FPAC and places the normalized result in FPAC.

Computes the effective address, *E*. Uses *E* to address a single precision (double word) operand. Multiplies this 32-bit floating point number by the floating point number in bits 0-31 of the specified FPAC. Places the normalized result in bits 0-31 of the specified FPAC. Sets bits 32-63 of FPAC to 0. Leaves the contents of the source location unchanged and updates the *Z* and *N* flags in the floating point status register to reflect the new contents of FPAC.

See Chapter 8 and Appendix G for more information about floating point manipulation.

Subtract Double (Memory from FPAC) (Long Displacement)

LFSMD *fpac,[@]displacement[,index]*

| 0 | 1-2 | 3-4 | 5 | 6 | 7 | 8 | 9 | 10 | 11 | 12 | 13 | 14 | 15 | 16 | 17-47 |
|---|---|---|---|---|---|---|---|---|---|---|---|---|---|---|---|
| 1 | INDEX | FPAC | 0 | 0 | 0 | 1 | 1 | 1 | 1 | 1 | 0 | 0 | 1 | @ | DISPLACEMENT |

Subtracts the 64-bit floating point number in the source location from the 64-bit floating point number in FPAC and places the normalized result in FPAC.

Computes the effective address, *E*. Uses *E* to address a double precision (four word) operand. Subtracts this 64-bit floating point number from the floating point number in the specified FPAC. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Subtract Single (Memory from FPAC) (Long Displacement)

LFSMS *fpac,[@]displacement[,index]*

| 0 | 1-2 | 3-4 | 5 | 6 | 7 | 8 | 9 | 10 | 11 | 12 | 13 | 14 | 15 | 16 | 17-47 |
|---|---|---|---|---|---|---|---|---|---|---|---|---|---|---|---|
| 1 | INDEX | FPAC | 0 | 0 | 0 | 1 | 1 | 1 | 0 | 1 | 0 | 0 | 1 | @ | DISPLACEMENT |

Subtracts the 32-bit floating point number in the source location from the 32-bit floating point number in bits 0-31 of FPAC and places the normalized result in FPAC.

Computes the effective address, *E*. Uses *E* to address a single precision (double word) operand. Subtracts this 32-bit floating point number from the floating point number in bits 0-31 of the specified FPAC. Places the normalized result in the specified FPAC. Sets bits 32-63 of FPAC to 0. Leaves the contents of the source location unchanged and updates the *Z* and *N* flags in the floating point status register to reflect the new contents of FPAC.

See Chapter 8 and Appendix G for more information about floating point manipulation.

Store Floating Point Status (Long Displacement)

LFSST *[@]displacement[,index]*

| 0 | 1 | 2 | 3-4 | 5 | 6 | 7 | 8 | 9 | 10 | 11 | 12 | 13 | 14 | 15 | 16 | 17-47 |
|---|---|---|---|---|---|---|---|---|---|---|---|---|---|---|---|---|
| 1 | 1 | 0 | INDEX | 1 | 1 | 0 | 1 | 1 | 1 | 0 | 1 | 0 | 0 | 1 | @ | DISPLACEMENT |

Moves the contents of the FPSR to four specified memory locations.

Computes the effective address, *E*, of two sequential, 32-bit locations in memory. Stores the contents of the FPSR in these locations as follows:

- Stores bits 0-15 of the FPSR in the first memory word.
- Sets bits 16-31 of the first memory double word and bit 0 of the second memory double word to 0.
- If *ANY* is 0, the contents of bits 1-31 of the second memory double word are undefined.
- If *ANY* is 1, the instruction stores bits 33-63 of the FPSR into bits 1-31 of the second memory double word.

NOTE: *This instruction does not initiate a floating point trap under any conditions of the FPSR.*

See Chapter 8 and Appendix G for more information about floating point manipulation.

Store Floating Point Double (Long Displacement)

LFSTD *fpac,[@]displacement[,index]*

| 0 | 1-2 | 3-4 | 5 | 6 | 7 | 8 | 9 | 10 | 11 | 12 | 13 | 14 | 15 | 16 | 17-47 |
|---|---|---|---|---|---|---|---|---|---|---|---|---|---|---|---|
| 1 | INDEX | FPAC | 0 | 1 | 0 | 1 | 1 | 1 | 1 | 1 | 0 | 0 | 1 | @ | DISPLACEMENT |

Stores the contents of a specified FPAC into a memory location.

Computes the effective address, *E*. Places the floating point number contained in FPAC in memory beginning at the location addressed by *E*. Destroys the previous contents of the addressed memory location. The contents of FPAC and the condition codes in the FPSR remain unchanged.

NOTE: *This instruction moves unnormalized or illegal data without change.*

Store Floating Point Single (Long Displacement)

LFSTS *fpac,[@]displacement[,index]*

| 0 | 1-2 | 3-4 | 5 | 6 | 7 | 8 | 9 | 10 | 11 | 12 | 13 | 14 | 15 | 16 | 17-47 |
|---|---|---|---|---|---|---|---|---|---|---|---|---|---|---|---|
| 1 | INDEX | FPAC | 0 | 1 | 0 | 1 | 1 | 1 | 0 | 1 | 0 | 0 | 1 | @ | DISPLACEMENT |

Stores the contents of a specified FPAC into a memory location.

Computes the effective address *E*. Places the 32 high-order bits of FPAC in memory beginning at the location addressed by *E*. Destroys the previous contents of the addressed memory location. The contents of FPAC and the condition codes in the FPSR remain unchanged.

NOTE: *This instruction moves unnormalized or illegal data without change.*

Jump (Long Displacement)

LJMP *index,displacement*

| 1 | 0 | 1 | INDEX | 1 | 1 | 0 | 1 | 1 | 0 | 1 | 1 | 0 | 0 | 1 | @ | DISPLACEMENT |
|---|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16 | 17–47 |

Calculates the effective address *E*. Loads *E* into the PC. Carry is unchanged and *overflow* is 0.

NOTE: *The calculation of* E *is forced to remain within the current segment of execution.*

Jump to Subroutine (Long Displacement)

LJSR *index,displacement*

| 1 | 0 | 1 | INDEX | 1 | 1 | 0 | 1 | 1 | 1 | 0 | 1 | 0 | 0 | 1 | @ | DISPLACEMENT |
|---|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16 | 17–47 |

Loads AC3 with the current 31-bit value of the program counter plus three. Loads the PC with the effective address. Carry is unchanged and *overflow* is 0.

NOTE: *The calculation of* E *is forced to remain within the current segment of execution.*

Load Byte (Long Displacement)

LLDB *ac,index,displacement*

| 1 | INDEX | AC | 1 | 0 | 0 | 1 | 1 | 0 | 0 | 1 | 0 | 0 | 1 | DISPLACEMENT |
|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16–47 |

Calculates the effective byte address. Uses the byte address to reference a byte in memory. Loads the addressed byte into bits 24–31 of the specified accumulator, then zero extends the value to 32 bits. Carry is unchanged and *overflow* is 0.

Load Effective Address (Long Displacement)

LLEF *ac,index,displacement*

| 1 | INDEX | AC | 0 | 1 | 1 | 1 | 1 | 1 | 0 | 1 | 0 | 0 | 1 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–47 |

Calculates the effective address, *E*. Checks for segment crossing violation. If no violation occurs, loads *E* into the specified accumulator. If a violation occurs, issues a protection fault. Carry is unchanged and *overflow* is 0.

Load Effective Byte Address (Long Displacement)

LLEFB *ac,index,displacement*

| 1 | INDEX | AC | 1 | 0 | 0 | 1 | 1 | 1 | 0 | 1 | 0 | 0 | 1 | DISPLACEMENT |
|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16–47 |

Calculates a byte address. Checks for segment crossing violation. If no violation occurs, loads the byte address into the specified accumulator. If a violation occurs, issues a protection fault. Carry is unchanged and *overflow* is 0.

Load Modified and Referenced Bits

LMRF

| 1 | 0 | 0 | 0 | 0 | 1 | 1 | 1 | 1 | 1 | 0 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Loads the modified and referenced bits of a pageframe into AC0.

AC1 contains a pageframe number in bits 13–31.

The instruction loads the modified and referenced bits of the pageframe specified by AC1 into AC0. The bits are loaded right justified and zero filled. The instruction then resets the referenced bit just accessed to 0. Carry is unchanged and *overflow* is 0.

If the ATU is not enabled, undefined results will occur.

Specification of a non-existant pageframe results in an indeterminate data.

NOTE: *This is a privileged instruction.*

Narrow Add Memory Word to Accumulator (Long Displacement)

LNADD *ac,index,displacement*

| 1 | INDEX | AC | 0 | 1 | 0 | 0 | 0 | 0 | 1 | 1 | 0 | 0 | 0 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 … 47 |

Adds an integer in memory to an integer contained in an accumulator.

The instruction calculates the effective address, *E*. Adds the 16-bit integer contained in the location specified by *E* to the integer contained in bits 16–31 of the specified accumulator. Sign extends the 16-bit result to 32 bits and loads it into the specified accumulator. Sets carry to the value of ALU carry, and *overflow* to 1 if there is an ALU overflow. The contents of the referenced memory location remain unchanged.

Narrow Divide Memory Word (Long Displacement)

LNDIV *ac,index,displacement*

| 1 | INDEX | AC | 0 | 1 | 0 | 1 | 1 | 0 | 1 | 1 | 0 | 0 | 0 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 … 47 |

Divides an integer contained in an accumulator by an integer in memory.

The instruction calculates the effective address, *E*. Sign extends the integer contained in bits 16–31 of the specified accumulator to 32 bits and divides it by the 16-bit integer contained in the location specified by *E*. If the quotient is within the range -32,768 to +32,767 inclusive, sign extends the result to 32 bits and loads it into the specified accumulator. If the quotient is outside of this range, or the memory word is zero, the instruction sets *overflow* to 1 and leaves the specified accumulator unchanged. Otherwise, *overflow* is 0. The contents of the referenced memory location and carry remain unchanged.

Narrow Decrement and Skip if Zero (Long Displacement)

LNDSZ *index,displacement*

| | | | | | | | | | | | | | | | | |
|---|---|---|---|---|---|---|---|---|---|---|---|---|---|---|---|---|
| 1 | 0 | 0 | INDEX | 1 | 1 | 0 | 1 | 1 | 0 | 1 | 1 | 0 | 0 | 1 | @ | DISPLACEMENT |
| 0 | 1 | 2 | 3–4 | 5 | 6 | 7 | 8 | 9 | 10 | 11 | 12 | 13 | 14 | 15 | 16 | 17–47 |

Calculates the effective address *E*. Decrements by one the contents of the 16-bit memory location addressed by *E*. If the result is equal to zero, then the next sequential word is skipped. Carry is unchanged and *overflow* is 0.

NOTE: *This instruction is indivisible.*

Narrow Increment and Skip if Zero (Long Displacement)

LNISZ *index,displacement*

| | | | | | | | | | | | | | | | | |
|---|---|---|---|---|---|---|---|---|---|---|---|---|---|---|---|---|
| 1 | 0 | 0 | INDEX | 1 | 1 | 0 | 1 | 1 | 0 | 0 | 1 | 0 | 0 | 1 | @ | DISPLACEMENT |
| 0 | 1 | 2 | 3–4 | 5 | 6 | 7 | 8 | 9 | 10 | 11 | 12 | 13 | 14 | 15 | 16 | 17–47 |

Calculates the effective address, *E*. Increments by one the contents of the 16-bit memory location addressed by *E*. If the result is equal to zero, then the instruction skips the next sequential word. Carry is unchanged and *overflow* is 0.

NOTE: *This instruction is indivisible.*

Narrow Load Accumulator (Long Displacement)

LNLDA *ac,index,displacement*

| | | | | | | | | | | | | | | | |
|---|---|---|---|---|---|---|---|---|---|---|---|---|---|---|---|
| 1 | INDEX | AC | 0 | 1 | 1 | 1 | 1 | 0 | 0 | 1 | 0 | 0 | 1 | @ | DISPLACEMENT |
| 0 | 1–2 | 3–4 | 5 | 6 | 7 | 8 | 9 | 10 | 11 | 12 | 13 | 14 | 15 | 16 | 17–47 |

Calculates the effective address, *E*. Fetches the 16-bit fixed point integer contained in the location specified by *E*. Sign extends this integer to 32 bits and loads it into the specified accumulator. Carry is unchanged and *overflow* is 0.

Narrow Multiply Memory Word (Long Displacement)

LNMUL *ac,index,displacement*

| | | | | | | | | | | | | | | | |
|---|---|---|---|---|---|---|---|---|---|---|---|---|---|---|---|
| 1 | INDEX | AC | 0 | 1 | 0 | 1 | 0 | 0 | 1 | 1 | 0 | 0 | 0 | @ | DISPLACEMENT |
| 0 | 1–2 | 3–4 | 5 | 6 | 7 | 8 | 9 | 10 | 11 | 12 | 13 | 14 | 15 | 16 | 17–47 |

Multiplies an integer in memory by an integer in an accumulator.

Calculates the effective address, *E*. Multiplies the 16-bit, signed integer contained in the location referenced by *E* by the signed integer contained in bits 16–31 of the specified accumulator. If the result is outside the range of -32,768 to +32,767 inclusive, sets *overflow* to 1; otherwise, *overflow* is 0. Sign extends the result to 32 bits and places the result in the specified accumulator. The contents of the referenced memory location and carry remain unchanged.

Narrow Store Accumulator (Long Displacement)

LNSTA *ac,index,displacement*

| | | | | | | | | | | | | | | | |
|---|---|---|---|---|---|---|---|---|---|---|---|---|---|---|---|
| 1 | INDEX | AC | 0 | 1 | 1 | 1 | 1 | 0 | 1 | 1 | 0 | 0 | 1 | @ | DISPLACEMENT |
| 0 | 1 2 | 3 4 | 5 | 6 | 7 | 8 | 9 | 10 | 11 | 12 | 13 | 14 | 15 | 16 | 17 … 47 |

Computes the effective address, *E*. Stores the low-order 16 bits of the specified accumulator into the location specified by *E*. Carry is unchanged and *overflow* is 0.

Narrow Subtract Memory Word (Long Displacement)

LNSUB *ac,index,displacement*

| | | | | | | | | | | | | | | | |
|---|---|---|---|---|---|---|---|---|---|---|---|---|---|---|---|
| 1 | INDEX | AC | 0 | 1 | 0 | 0 | 1 | 0 | 1 | 1 | 0 | 0 | 0 | @ | DISPLACEMENT |
| 0 | 1 2 | 3 4 | 5 | 6 | 7 | 8 | 9 | 10 | 11 | 12 | 13 | 14 | 15 | 16 | 17 … 47 |

Subtracts an integer in memory from an integer in an accumulator.

Calculates the effective address, *E*. Subtracts the 16-bit integer contained in the location referenced by *E* from the integer contained in bits 16–31 of the specified accumulator. Sign extends the result to 32 bits and stores it in the specified accumulator. Sets carry to the value of ALU carry, and *overflow* to 1 if there is an ALU overflow. The contents of the specified memory location remain unchanged.

Locate Lead Bit

LOB *acs,acd*

| | | | | | | | | | | | | | |
|---|---|---|---|---|---|---|---|---|---|---|---|---|---|
| 1 | ACS | ACD | 1 | 0 | 1 | 0 | 0 | 0 | 0 | 1 | 0 | 0 | 0 |
| 0 | 1 2 | 3 4 | 5 | 6 | 7 | 8 | 9 | 10 | 11 | 12 | 13 | 14 | 15 |

Adds a number equal to the number of high-order zeroes in the contents of bits 16-31 of ACS to the signed, 16-bit, two's complement number contained in bits 16-31 of ACD. The contents of ACS and the state of carry remain unchanged. *Overflow* is 0.

Bits 0-15 of the modified accumulator are undefined after completion of this instruction.

NOTE: *If ACS and ACD are specified as the same accumulator, the instruction functions as described above, except that since ACS and ACD are the same accumulator, the contents of ACS will be changed.*

Push Address (Long Displacement)

LPEF *index, displacement*

| | | | | | | | | | | | | | | | | |
|---|---|---|---|---|---|---|---|---|---|---|---|---|---|---|---|---|
| 1 | 0 | 1 | INDEX | 1 | 1 | 0 | 1 | 1 | 1 | 1 | 1 | 0 | 0 | 1 | @ | DISPLACEMENT |
| 0 | 1 | 2 | 3 4 | 5 | 6 | 7 | 8 | 9 | 10 | 11 | 12 | 13 | 14 | 15 | 16 | 17 … 47 |

Pushes an effective address onto the wide stack. Carry is unchanged and *overflow* is 0.

Push Byte Address (Long Displacement)

LPEFB *index, displacement*

| | | | | | | | | | | | | | | | | |
|---|---|---|---|---|---|---|---|---|---|---|---|---|---|---|---|---|
| 1 | 1 | 0 | INDEX | 1 | 1 | 0 | 1 | 1 | 1 | 1 | 1 | 0 | 0 | 1 | @ | DISPLACEMENT |
| 0 | 1 | 2 | 3 4 | 5 | 6 | 7 | 8 | 9 | 10 | 11 | 12 | 13 | 14 | 15 | 16 | 17 … 47 |

Calculates an effective byte address. Pushes this byte address onto the wide stack. Carry is unchanged and *overflow* is 0.

Load Physical
LPHY

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 0 | 0 | 1 | 1 | 1 | 1 | 1 | 1 | 0 | 1 | 0 | 0 | 1 |

Translates the logical address contained in AC1 to a physical address.

AC1 contains a logical word address.

If the ATU is disabled, this instruction does nothing. The next word is executed.

If the ATU is enabled, then the actions described below occur.

The instruction compares the ring field of AC1 to the current ring. If AC1's ring field is less than or equal to the current ring field, then a protection fault (AC1 = 4) occurs.

If AC1's ring field is greater than the current ring, then the instruction references the SBR specified by AC1. If the SBR contents are invalid, then the instruction ends and the next instruction is executed. The contents of AC0 will be unchanged.

If the contents of the SBR are valid, the instruction loads AC0 with the last resident PTE. If the PTE indicates no page or validity faults, the instruction loads AC2 with the 32-bit physical word address of the logical address contained in AC1. The next sequential word is skipped.

If the PTE signals a page or validity fault, the contents of AC2 remain unchanged. The next sequential word is executed.

The instruction leaves carry unchanged; *overflow* is 0.

Push Jump (Long Displacement)

LPSHJ *index,displacement*

| 0 | 1 | 2 | 3–4 | 5 | 6 | 7 | 8 | 9 | 10 | 11 | 12 | 13 | 14 | 15 | 16 | 17–47 |
|---|---|---|---|---|---|---|---|---|---|---|---|---|---|---|---|---|
| 1 | 1 | 0 | INDEX | 1 | 1 | 0 | 1 | 1 | 0 | 0 | 1 | 0 | 0 | 1 | @ | DISPLACEMENT |

Saves a return address on the wide stack and jumps to a specified location.

Pushes the current 31-bit value of the program counter + 3 onto the wide stack. Calculates the effective address, *E*. Loads the PC with *E*. Sequential operation continues with the word addressed by the updated value of the program counter. Carry is unchanged and *overflow* is 0.

NOTE: *The value pushed onto the wide stack will always point to a location in the current ring.*

Load Processor Status Register into AC0
LPSR

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 1 | 0 | 0 | 1 | 1 | 1 | 1 | 0 | 0 | 1 | 1 | 0 | 0 | 1 |

Loads the contents of the PSR into AC0.

Loads the contents of OVK, OVR, and IRES into bits 0, 1, and 2 of AC0, respectively. Fills the rest of AC0 with zeroes. The contents of the PSR remain unchanged. Carry is unchanged and *overflow* is 0.

Locate and Reset Lead Bit

LRB *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 1 | 0 | 1 | 0 | 1 | 0 | 0 | 1 | 0 | 0 | 0 |

Performs a *Locate Lead Bit* instruction, and sets the lead bit to 0.

Adds a number equal to the number of high-order zeroes in the contents of bits 16-31 of ACS to the signed, 16-bit, two's complement number contained in bits 16-31 of ACD. Sets the leading 1 in bits 16-31 of ACS to 0. Carry remains unchanged and *overflow* is 0.

Bits 0-15 of the modified accumulator are undefined after completion of this instruction.

NOTE: *If ACS and ACD are specified to be the same accumulator, then the instruction sets the leading 1 in that accumulator to 0, and no count is taken.*

Load All Segment Base Registers

LSBRA

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 0 | 0 | 0 | 1 | 1 | 1 | 1 | 0 | 1 | 1 | 1 | 0 | 0 | 1 |

Loads the SBRs with new values.

AC0 contains the starting address of an 8 double word block.

The instruction loads a copy of the contents of these words into the SBRs as shown in the table below:

| Double Word in Block | Destination | Order Moved |
|---|---|---|
| 1 | SBR1 | First |
| 2 | SBR2 | Second |
| 3 | SBR3 | Third |
| 4 | SBR4 | Fourth |
| 5 | SBR5 | Fifth |
| 6 | SBR6 | Sixth |
| 7 | SBR7 | Seventh |
| 8 | SBR7 | Eighth |

After loading the SBRs, the instruction purges the ATU. If the ATU was disabled at the beginning of this instruction cycle, the processor enables it now.

If an invalid address is loaded into SBR0, the processor disables the ATU and a protection fault occurs (code = 3 in AC1). This means that logical addresses are identical to physical addresses, and the fault is processed in physical address space.

The instruction leaves AC0 and carry unchanged; *overflow* is 0.

NOTE: *This is a privileged instruction.*

Load Segment Base Registers 1-7
LSBRS

| 1 | 1 | 1 | 0 | 0 | 1 | 1 | 1 | 1 | 0 | 0 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Loads SBR1 through SBR7 with new values.

AC0 contains the starting address of a block of seven double words. The instruction loads a copy of the contents of these words into the SBRs as shown in the table below:

| Double Word in Block | Destination | Order Moved |
|---|---|---|
| 1 | SBR1 | First |
| 2 | SBR2 | Second |
| 3 | SBR3 | Third |
| 4 | SBR4 | Fourth |
| 5 | SBR5 | Fifth |
| 6 | SBR6 | Sixth |
| 7 | SBR7 | Seventh |

After loading the SBRs, the instruction purges the ATU. If the ATU was disabled at the beginning of this instruction cycle, the processor enables it now.

If SBR0 contains invalid information, then the processor disables the ATU and a protection fault occurs (code = 3 in AC1). This means that logical addresses are identical to physical addresses, and the fault is processed in physical address space.

The instruction leaves AC0 and carry unchanged; *overflow* is 0.

NOTE: *This is a privileged instruction.*

Logical Shift
LSH *acs,acd*

| 1 | ACS | | ACD | | 0 | 1 | 0 | 1 | 0 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Shifts the contents of bits 16-31 of ACD either left or right depending on the number contained in bits 24–31 of ACS. The signed, 8-bit two's complement number contained in bits 24–31 of ACS determines the direction of the shift and the number of bits to be shifted. If the number in bits 24–31 of ACS is positive, shifting is to the left; if the number in bits 24–31 of ACS is negative, shifting is to the right. If the number in bits 24–31 of ACS is zero, no shifting is performed. Bits 16–23 of ACS are ignored.

The number of bits shifted is equal to the magnitude of the number in bits 24–31 of ACS. Bits shifted out are lost, and the vacated bit positions are filled with zeroes. Carry and the contents of ACS remain unchanged. *Overflow* is 0.

Bits 0-15 of the modified accumulator are undefined after completion of this instruction.

NOTE: *If the magnitude of the number in bits 24–31 of ACS is greater than 15, all bits of ACD are set to 0. Carry and the contents of ACS remain unchanged.*

Load Sign
LSN

| 1 | 1 | 1 | 1 | 1 | 1 | 1 | 1 | 1 | 0 | 1 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Under the control of accumulators AC1 and AC3, evaluates a decimal number in memory and returns in AC1 a code that classifies the number as zero or nonzero and identifies its sign. The meaning of the returned code is as follows:

| Value of Number | Code |
|---|---|
| Positive non-zero | +1 |
| Negative non-zero | -1 |
| Positive zero | 0 |
| Negative zero | -2 |

Bits 16-31 of AC1 must contain the data type indicator describing the number.

Bits 16-31 of AC3 must contain a byte pointer which is the address of the high-order byte of the number.

Upon successful termination, the contents of AC0 remain unchanged; AC1 contains the value code; AC2 contains the original contents of AC3; and the contents of AC3 are unpredictable. Carry remains unchanged. The contents of the addressed memory locations remain unchanged. *Overflow* is 0.

The 32-bit effective address generated by this instruction is constrained to be within the first 64 Kbyte of the current segment.

Store Byte (Long Displacement)
LSTB *ac,index,displacement*

| 1 | INDEX | AC | 1 | 0 | 0 | 1 | 1 | 0 | 1 | 1 | 0 | 0 | 1 | DISPLACEMENT |
|---|---|---|---|---|---|---|---|---|---|---|---|---|---|---|
| 0 | 1-2 | 3-4 | 5 | 6 | 7 | 8 | 9 | 10 | 11 | 12 | 13 | 14 | 15 | 16-47 |

Stores the low-order byte of the specified accumulator in memory.

Calculates the effective byte address. Moves a copy of the contents of bits 24–31 of the specified accumulator into memory at the location specified by the byte address. Carry is unchanged and *overflow* is 0.

Wide Add Memory Word to Accumulator (Long Displacement)
LWADD *ac,index,displacement*

| 1 | INDEX | AC | 0 | 1 | 1 | 0 | 0 | 0 | 1 | 1 | 0 | 0 | 0 | @ | DISPLACEMENT |
|---|---|---|---|---|---|---|---|---|---|---|---|---|---|---|---|
| 0 | 1-2 | 3-4 | 5 | 6 | 7 | 8 | 9 | 10 | 11 | 12 | 13 | 14 | 15 | 16 | 17-47 |

Adds an integer in memory to an integer in an accumulator.

The instruction calculates the effective address, *E*. Adds the 32-bit integer contained in the location specified by *E* to the 32-bit integer contained in the specified accumulator. Loads the result into the specified accumulator. Sets carry to the value of ALU carry, and *overflow* to 1 if there is an ALU overflow. The contents of the referenced memory location remain unchanged.

Wide Divide From Memory (Long Displacement)

LWDIV *ac,index,displacement*

| 1 | INDEX | AC | 0 | 1 | 1 | 1 | 1 | 0 | 1 | 1 | 0 | 0 | 0 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 47 |

Divides an integer in an accumulator by an integer in memory.

The instruction calculates the effective address, *E*. Sign extends the 32-bit integer contained in the specified accumulator to 64 bits and divides it by the 32-bit integer contained in the location specified by *E*.

If the quotient is within the range of -2,147,483,648 to +2,147,483,647 inclusive, the instruction loads the quotient into the specified accumulator. *Overflow* is 0.

If the quotient is outside this range, or if the word in memory is zero, the instruction sets *overflow* to 1 and leaves the specified accumulator unchanged.

The contents of the referenced memory location and carry remain unchanged.

Wide Decrement and Skip if Zero (Long Displacement)

LWDSZ *index,displacement*

| 1 | 0 | 0 | INDEX | 1 | 1 | 0 | 1 | 1 | 1 | 1 | 1 | 0 | 0 | 1 | @ | DISPLACEMENT |
|---|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 | 17 47 |

Decrements the contents of a 32-bit memory location by one. If the result is equal to zero, then the instruction skips the next sequential word. Carry is unchanged and *overflow* is 0.

> NOTE: *This instruction executes in one indivisible memory cycle if the instruction is located on a double word boundary.*

Wide Increment and Skip if Zero (Long Displacement)

LWISZ *index,displacement*

| 1 | 0 | 0 | INDEX | 1 | 1 | 0 | 1 | 1 | 1 | 0 | 1 | 0 | 0 | 1 | @ | DISPLACEMENT |
|---|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 | 17 47 |

Increments the contents of a 32-bit memory location by one. If the result is equal to zero, then the instruction skips the next sequential word. Carry is unchanged and *overflow* is 0.

> NOTE: *This instruction executes in one indivisible memory cycle if the instruction is located on a double word boundary.*

Wide Load Accumulator (Long Displacement)

LWLDA *ac,index,displacement*

| 1 | INDEX | AC | 0 | 1 | 1 | 1 | 1 | 1 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 47 |

Loads the contents of a memory location into an accumulator.

Calculates the effective address, *E*. Fetches the 32-bit fixed point integer contained in the location specified by *E*. Loads this integer into the specified accumulator. Carry is unchanged and *overflow* is 0.

Wide Multiply From Memory (Long Displacement)

LWMUL *ac,index,displacement*

| 1 | INDEX | AC | 0 | 1 | 1 | 1 | 0 | 0 | 1 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–47 |

Multiplies an integer in an accumulator by an integer in memory.

The instruction calculates the effective address, *E*. Multiplies the 32-bit, signed integer contained in the location referenced by *E* by the 32-bit, signed integer contained in the specified accumulator. Places the 32 least significant bits of the result in the specified accumulator. The contents of the memory location and carry remain unchanged.

If the result is outside the range of -2,147,483,648 to +2,147,483,647 inclusive, sets *overflow* to 1; otherwise, *overflow* is 1. The specified accumulator will contain the 32 least significant bits of the result.

Wide Store Accumulator (Long Displacement)

LWSTA *ac,index,displacement*

| 1 | INDEX | AC | 1 | 0 | 0 | 1 | 1 | 1 | 1 | 1 | 0 | 0 | 1 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–47 |

Calculates the effective address, *E*. Stores the 32-bit contents of the specified accumulator in the location specified by *E*. Carry is unchanged and *overflow* is 0.

Wide Subtract Memory Word (Long Displacement)

LWSUB *ac,index,displacement*

| 1 | INDEX | AC | 0 | 1 | 1 | 0 | 1 | 0 | 1 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–47 |

Subtracts an integer in memory from an integer in an accumulator.

The instruction calculates the effective address, *E*. Subtracts the 32-bit integer contained in the location referenced by *E* from the 32-bit integer contained in the specified accumulator. Loads the result into the specified accumulator. Sets carry to the value of ALU carry, and *overflow* to 1 if there is an ALU overflow. The contents of the specified memory location remain unchanged.

Move

MOV*[c][sh][#]* *acs,acd[,skip]*

| 1 | ACS | ACD | 0 | 1 | 0 | SH | C | # | SKIP |
|---|---|---|---|---|---|---|---|---|---|
| 0 | 1–2 | 3–4 | 5 | 6 | 7 | 8–9 | 10–11 | 12 | 13–15 |

Moves the contents of bits 16-31 of an accumulator into another accumulator.

Initializes carry to the specified value. Places the contents of bits 16-31 of ACS in the shifter. Performs the specified shift operation and loads the result of the shift into bits 16-31 of ACD if the no-load bit is 0. If the skip condition is true, the instruction skips the next sequential word. *Overflow* is 0.

If the load option is specified, bits 0-15 of ACD are undefined.

Modify Stack Pointer

MSP *ac*

| | | | | | | | | | | | | | | |
|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 |
| 1 | 0 | 0 | AC | 1 | 1 | 0 | 1 | 1 | 1 | 1 | 1 | 0 | 0 | 0 |

Changes the value of the stack pointer and tests for potential overflow.

Adds the signed two's-complement number in bits 16-31 of the specified accumulator to the value of the stack pointer and places the result in location 40. The instruction then checks for overflow by comparing the result in location 40 with the value of the stack limit. If the result in location 40 is less than the stack limit, then the instruction ends.

If the result is greater than the stack limit, the instruction changes the value of location 40 back to its original contents before the add. The instruction pushes a standard return block. The program counter in the return block contains the address of the *Modify Stack Pointer* instruction.

After pushing the return block, the program counter contains the address of the stack fault routine. The stack pointer is updated with the value used to push the return block, and control transfers to the stack fault routine. Carry remains unchanged and *overflow* is 0.

Unsigned Multiply

MUL

| | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| 1 | 1 | 0 | 0 | 0 | 1 | 1 | 1 | 1 | 1 | 0 | 0 | 1 | 0 | 0 | 0 |

Multiplies the unsigned contents of two accumulators and adds the result to the unsigned contents of a third accumulator. The result is an unsigned 32-bit integer in two accumulators.

The unsigned, 16-bit number in bits 16-31 of AC1 is multiplied by the unsigned, 16-bit number in bits 16-31 of AC2 to yield an unsigned, 32-bit intermediate result. The unsigned, 16-bit number in bits 16-31 of AC0 is added to the intermediate result to produce the final result. The final result is an unsigned, 32-bit number and occupies bits 16-31 of both AC0 and AC1. Bit 16 of AC0 is the high-order bit of the result and bit 31 of AC1 is the low-order bit. The contents of AC2 remain unchanged.

Because the result is a double-length number, overflow cannot occur. Carry remains unchanged and *overflow* is 0.

Bits 0-15 of the modified accumulator are undefined after completion of this instruction.

Signed Multiply

MULS

| | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| 1 | 1 | 0 | 0 | 1 | 1 | 1 | 1 | 1 | 1 | 0 | 0 | 1 | 0 | 0 | 0 |

Multiplies the signed contents of two accumulators and adds the result to the signed contents of a third accumulator. The result is a signed 32-bit integer in two accumulators.

The signed, 16-bit two's complement number in bits 16-31 of AC1 is multiplied by the signed, 16-bit two's complement number in bits 16-31 of AC2 to yield a signed, 32-bit two's complement intermediate result. The signed, 16-bit two's complement number in bits 16-31 of AC0 is added to the intermediate result to produce the final result. The final result is a signed, 32-bit two's complement number which occupies bits 16-31 of both AC0 and AC1. Bit 16 of AC0 is the sign bit of the result and bit 31 of AC1 is the low-order bit. The contents of AC2 remain unchanged.

Because the result is a double-length number, overflow cannot occur. Carry remains unchanged and *overflow* is 0.

Bits 0-15 of the modified accumulator are undefined after completion of this instruction.

Narrow Add

NADD *acs,acd*

| 1 | ACS | ACD | 0 | 0 | 0 | 0 | 1 | 0 | 0 | 1 | 0 | 0 | 1 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Adds two integers contained in accumulators.

The instruction adds the 16-bit integer contained in bits 16–31 of ACS to the 16-bit integer contained in bits 16–31 of ACD. Stores the result in bits 16–31 of ACD. Sign extends ACD to 32 bits. Sets carry to the value of ALU carry, and sets *overflow* to 1 if there is an ALU overflow.

Narrow Extended Add Immediate

NADDI *n,ac*

| 1 | 1 | 0 | AC | 1 | 1 | 0 | 0 | 0 | 1 | 1 | 1 | 0 | 0 | 1 | IMMEDIATE FIELD |
|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 31 |

Adds an integer contained in an immediate field to an integer in an accumulator.

Adds the 16-bit value contained in the immediate field to bits 16-31 of the specified accumulator. Stores the result in the lower 16 bits of ACD. Sign extends ACD to 32 bits. Sets carry to ALU carry (16 bit operation). Sets *overflow* to 1 if there is an ALU overflow (16 bit operation).

Narrow Add Immediate

NADI *n,ac*

| 1 | N | AC | 1 | 0 | 1 | 1 | 0 | 0 | 1 | 1 | 0 | 0 | 1 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Adds an integer in the range of 1 to 4 to an integer contained in an accumulator.

The instruction adds the value $n+1$ to the 16-bit contents of the specified accumulator, where $n$ is an integer in the range of 0 to 3. Stores the result in the lower 16 bits of the specified accumulator. Sign extends the specified accumulator to 32 bits. Sets carry to the value of ALU carry (16-bit operation). Sets *overflow* to 1 if there is an ALU overflow (16 bit operation).

> NOTE: *The assembler takes the coded value of* n *and subtracts 1 from it before placing it in the immediate field. Therefore, the programmer should code the exact value that he wishes to add.*

Search Queue

*<width><direction>S<test condition>*

| 1 | 1 | 0 | 0 | 0 | 1 | 1 | 1 | 0 | 0 | 0 | 1 | 1 | 0 | 0 | 1 | RESERVED | W | TEST | D |
|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16–26 | 27 | 28–30 | 31 |

Searches a queue for the first data element containing information that meets a specified condition.

AC1 contains the effective address of the first queue data element to search.

AC3 contains a two's complement word offset. The instruction adds the offset to the address of the forward link of each data element to get the address of the location to test (called the test location).

The double word on the top of the wide stack contains a mask word.

Bits 11–15 of the second word of the search instruction specify the conditions of the search. The table below explains the meanings of these bits.

| Bits | Name of Field | Encoding | Mnemonic | Meaning |
|---|---|---|---|---|
| 11 | Width | 0 | N | Search field is 16 bits wide. |
| | | 1 | W | Search field is 32 bits wide. |
| 12–14 | Test | 000 | SS | Some of the bits specified by the mask in the test condition are one. |
| | | 001 | SC | Some of the bits specified by the mask in the test condition are zero. |
| | | 010 | AS | All of the bits specified by the mask in the test condition are one. |
| | | 011 | AC | All of the bits specified by the mask in the test condition are zero. |
| | | 100 | E* | The mask and test location are equal. |
| | | 101 | GE* | The mask is greater than or equal to the test location. |
| | | 110 | LE* | The mask is less than or equal to the test location. |
| | | 111 | NE* | The mask and the test location are not equal. |
| 15 | Direction | 0 | F | Search forward in the queue. |
| | | 1 | B | Search backward in the queue. |

NOTE: *The instruction treats the values contained in the mask and the test location as unsigned integers for these test conditions.*

The size of the field to search (bit 11) determines the size of the mask and the size of the offset. If you specify a narrow search, then bits 16–31 of the wide stack word contain the mask. AC3 specifies a relative word offset to the 16-bit test location. If you specify a wide search, then bits 0–31 of the wide stack word contain the mask. AC3 specifies the relative word offset to the 32-bit test location.

The instruction searches each data element in the queue from the element specified by AC1 to the head or tail of the queue (depending on the direction of the search). To perform the search on each element, the instruction adds the offset contained in AC3 to the address contained in AC1 to obtain an address of a location contained in some data element in the queue. Compares the mask field to the value contained in the calculated address.

If the search fails, AC1 contains the effective address of the last data element searched. Execution continues with the next sequential instruction. Interrupts are honored between the time the search fails and the time the next word executes.

If the search is interrupted, AC1 contains the effective address of the next data element to be examined. The next sequential word is skipped and execution continues with the second word. Interrupts are honored between the time the interrupt occurs and the time the second instruction executes.

If the search is successful, AC1 contains the address of the data element that met the specified condition. The next two sequential words are skipped and execution continues with the third word. Note that interrupts cannot occur between the time the search is successful and the time the third word executes.

For all returns, the contents of carry, WSP, AC0, AC2, and AC3 remain unchanged. *Overflow* is 0.

Narrow Search Queue Backward

NBSAC

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 0 | 1 | 1 | 1 |

See instruction entry "Search Queue".

Narrow Search Queue Backward

NBSAS

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 0 | 1 | 0 | 1 |

See instruction entry "Search Queue".

Narrow Search Queue Backward

NBSE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 1 | 0 | 0 | 1 |

See instruction entry "Search Queue".

Narrow Search Queue Backward

NBSGE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 1 | 0 | 1 | 1 |

See instruction entry "Search Queue".

Narrow Search Queue Backward

NBSLE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 1 | 1 | 0 | 1 |

See instruction entry "Search Queue".

Narrow Search Queue Backward

NBSNE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 1 | 1 | 1 | 1 |

See instruction entry "Search Queue".

Narrow Search Queue Backward

NBSSC

| | | | | | | | | | | | | | | | | | | | | | |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 0 | 0 | 1 | 1 |
| 0 | 1 | 2 | 3 | 4 | 5 | 6 | 7 | 8 | 9 | 10 | 11 | 12 | 13 | 14 | 15 | 16 – 26 | 27 | 28 | 29 | 30 | 31 |

See instruction entry "Search Queue".

Narrow Search Queue Backward

NBSSS

| | | | | | | | | | | | | | | | | | | | | | |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 0 | 0 | 0 | 1 |
| 0 | 1 | 2 | 3 | 4 | 5 | 6 | 7 | 8 | 9 | 10 | 11 | 12 | 13 | 14 | 15 | 16 – 26 | 27 | 28 | 29 | 30 | 31 |

See instruction entry "Search Queue".

Narrow Divide

NDIV *acs,acd*

| | | | | | | | | | | | | |
|---|---|---|---|---|---|---|---|---|---|---|---|---|
| 1 | ACS | ACD | 0 | 0 | 0 | 0 | 1 | 1 | 1 | 1 | 0 | 0 | 1 |
| 0 | 1 – 2 | 3 – 4 | 5 | 6 | 7 | 8 | 9 | 10 | 11 | 12 | 13 | 14 | 15 |

Divides an integer in an accumulator by an integer in another accumulator.

The instruction sign extends bits 16–31 of ACD to 32 bits. Divides this signed integer by the 16-bit signed integer contained in bits 16–31 of ACS. If the quotient is within the range -32,768 to +32,767 inclusive, sign extends the lower 16 bits of the result to 32 bits and places these 16 bits in ACD. If the quotient is outside of this range, or if ACS is zero, the instruction sets *overflow* to 1 and leaves ACD unchanged. Otherwise, *overflow* is 0. The contents of ACS and carry always remain unchanged.

Negate

NEG*[c][sh][#]* *acs,acd[,skip]*

| | | | | | | | | | |
|---|---|---|---|---|---|---|---|---|---|
| 1 | ACS | ACD | 0 | 0 | 1 | SH | C | # | SKIP |
| 0 | 1 – 2 | 3 – 4 | 5 | 6 | 7 | 8 – 9 | 10 – 11 | 12 | 13 – 15 |

Forms the two's complement of the contents of bits 16-31 of an accumulator.

Initializes carry to the specified value. Places the two's complement of the unsigned, 16-bit number in bits 16-31 of ACS in the shifter. If the negate operation produces a carry of 1 out of the high-order bit, the instruction complements carry. Performs the specified shift operation and places the result in bits 16-31 of ACD if the no-load bit is 0. If the skip condition is true, the instruction skips the next sequential word. *Overflow* is 0.

If the load option is specified, bits 0-15 of ACD are undefined.

NOTE: *If ACS contains 0, the instruction complements carry.*

Narrow Search Queue Forward

NFSAC

| | | | | | | | | | | | | | | | | | | | | | |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 0 | 1 | 1 | 0 |
| 0 | 1 | 2 | 3 | 4 | 5 | 6 | 7 | 8 | 9 | 10 | 11 | 12 | 13 | 14 | 15 | 16 – 26 | 27 | 28 | 29 | 30 | 31 |

See instruction entry "Search Queue".

Narrow Search Queue Forward
NFSAS

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 0 | 1 | 0 | 0 |

See instruction entry "Search Queue".

Narrow Search Queue Forward
NFSE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 1 | 0 | 0 | 0 |

See instruction entry "Search Queue".

Narrow Search Queue Forward
NFSGE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 1 | 0 | 1 | 0 |

See instruction entry "Search Queue".

Narrow Search Queue Forward
NFSLE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 1 | 1 | 0 | 0 |

See instruction entry "Search Queue".

Narrow Search Queue Forward
NFSNE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 1 | 1 | 1 | 0 |

See instruction entry "Search Queue".

Narrow Search Queue Forward
NFSSC

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 0 | 0 | 1 | 0 |

See instruction entry "Search Queue".

Narrow Search Queue Forward
NFSSS

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 0 | 0 | 0 | 0 | 0 |

See instruction entry "Search Queue".

Narrow Load Immediate

NLDAI *ac,immediate*

| 1 | 1 | 0 | AC | 1 | 1 | 0 | 0 | 0 | 1 | 0 | 1 | 0 | 0 | 1 | IMMEDIATE FIELD |
|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16–31 |

Sign extends the 16-bit, two's complement literal value contained in the immediate field to 32 bits. Loads the result of the sign extension into the specified accumulator. Carry is unchanged and *overflow* is 0.

Narrow Multiply

NMUL *acs,acd*

| 1 | ACS | ACD | 0 | 0 | 0 | 0 | 1 | 1 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Multiplies the signed integer contained in bits 16–31 of ACD by the signed integer contained in bits 16–31 of ACS. If the result is outside the range of -32,768 to +32,767 inclusive, sets *overflow* to 1; otherwise, *overflow* is 0. Sign extends the lower 16 bits of the result to 32 bits and places these 32 bits in ACD. The contents of ACS and carry remain unchanged.

Narrow Negate

NNEG *acs,acd*

| 1 | ACS | ACD | 1 | 0 | 1 | 1 | 1 | 1 | 1 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Negates the 16 least significant bits of ACS by performing a two's complement subtract from zero. Sign extends these 16 bits to 32 bits and loads the result in ACD. Sets carry to the value of ALU carry.

NOTE: *Negating the largest negative 16-bit integer, ($100000_8$) sets overflow to 1.*

Narrow Skip on All Bits Set in Accumulator

NSALA *ac,immediate*

| 1 | 1 | 1 | AC | 1 | 1 | 0 | 0 | 0 | 0 | 0 | 1 | 0 | 0 | 1 | IMMEDIATE FIELD |
|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16–31 |

Logically ANDs the value in the immediate field with the complement of the contents of an accumulator and skips depending on the result of the AND.

The instruction performs a logical AND on the contents of the immediate field and the complement of the least significant 16 bits contained in the specified accumulator. If the result of the AND is zero, then the next sequential word is skipped. If the result of the AND is nonzero, the next sequential word is executed. The contents of the specified accumulator remain unchanged. Carry is unchanged and *overflow* is 0.

Narrow Skip on All Bits Set in Memory Location

NSALM *ac,immediate*

| 1 | 1 | 1 | AC | 1 | 1 | 0 | 0 | 0 | 0 | 1 | 1 | 0 | 0 | 1 | IMMEDIATE FIELD |
|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16–31 |

Performs a logical AND on the contents of the immediate field and the complement of the word addressed by the specified accumulator. If the result of the AND is zero, then execution skips the next sequential word before continuing. If the result of the AND is nonzero, then execution continues with the next sequential word. The contents of the specified accumulator and memory location remain unchanged. Carry is unchanged and *overflow* is 0.

Narrow Skip on Any Bit Set in Accumulator

NSANA *ac,immediate*

| | | | | | | | | | | | | | | |
|---|---|---|---|---|---|---|---|---|---|---|---|---|---|---|
| 1 | 1 | 1 | ac | 1 | 1 | 0 | 0 | 0 | 1 | 0 | 1 | 0 | 0 | 1 | IMMEDIATE FIELD |
| 0 | 1 | 2 | 3–4 | 5 | 6 | 7 | 8 | 9 | 10 | 11 | 12 | 13 | 14 | 15 | 16–31 |

Logically ANDS the contents of an immediate field with the contents of an accumulator and skips, depending on the result.

The instruction performs a logical AND on the contents of the immediate field and the least significant 16 bits contained in the specified accumulator. If the result of the AND is nonzero, the next sequential word is skipped. If the result of the AND is zero, the next sequential word is executed. The contents of the specified accumulator remain unchanged. Carry is unchanged and *overflow* is 0.

Narrow Skip on Any Bit Set in Memory Location

NSANM *ac,immediate*

| | | | | | | | | | | | | | | | |
|---|---|---|---|---|---|---|---|---|---|---|---|---|---|---|---|
| 1 | 1 | 1 | AC | 1 | 1 | 0 | 0 | 0 | 1 | 1 | 1 | 0 | 0 | 1 | IMMEDIATE FIELD |
| 0 | 1 | 2 | 3–4 | 5 | 6 | 7 | 8 | 9 | 10 | 11 | 12 | 13 | 14 | 15 | 16–31 |

The instruction performs a logical AND on the contents of the immediate field and the contents of the word addressed by the specified accumulator. If the result of the AND is nonzero, then the next sequential word is skipped. If the result of the AND is zero, the next sequential word is executed. The contents of the specified accumulator and memory location remain unchanged. Carry is unchanged and *overflow* is 0.

Narrow Subtract Immediate

NSBI *n,ac*

| | | | | | | | | | | | | |
|---|---|---|---|---|---|---|---|---|---|---|---|---|
| 1 | N | AC | 1 | 0 | 1 | 1 | 0 | 1 | 0 | 1 | 0 | 0 | 1 |
| 0 | 1–2 | 3–4 | 5 | 6 | 7 | 8 | 9 | 10 | 11 | 12 | 13 | 14 | 15 |

Subtracts a value in the range of 1 to 4 from the value contained in an accumulator.

The instruction subtracts the value $n+1$ from the 16-bit value contained in the specified accumulator, where $n$ is an integer in the range of 0 to 3. Stores the result in bits 16–31 of the specified accumulator. Sign extends the specified accumulator to 32 bits. Sets carry to the value of ALU carry. Sets *overflow* to 1 if there is an ALU overflow.

NOTE: *The assembler takes the coded value of* n *and subtracts 1 from it before placing it in the immediate field. Therefore, the programmer should code the exact value that he wishes to subtract.*

Narrow Subtract

NSUB *acs,acd*

| | | | | | | | | | | | | | |
|---|---|---|---|---|---|---|---|---|---|---|---|---|---|
| 1 | ACS | ACD | 0 | 0 | 0 | 0 | 1 | 0 | 1 | 1 | 0 | 0 | 1 |
| 0 | 1–2 | 3–4 | 5 | 6 | 7 | 8 | 9 | 10 | 11 | 12 | 13 | 14 | 15 |

Subtracts the 16-bit integer contained in bits 16–31 of ACS from the 16-bit integer contained in bits 16–31 of ACD. Stores the result in bits 16–31 of ACD. Sign extends ACD to 32 bits. Sets carry to the value of ALU carry, and *overflow* to 1 if there is an ALU overflow.

OR Referenced Bits

ORFB

| 1 | 1 | 1 | 0 | 0 | 1 | 1 | 1 | 1 | 0 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

AC1 contains a page frame number in bits 13-31. Bits 30-31 of AC1 are a don't care. The two least significant bits of AC1 are treated as if they are both 0. AC0 contains an origin 0 word count. This count indicates the number of words to be ORed. The referenced bits of 16 contiguous page frames are grouped for ORing. AC2 contains a word address. The referenced bits of the grouped 16 page frames beginning at the number specified in AC1 (treating bits 30-31 as 0) are inclusive ORed with a word. This word is part of a word string. The starting address of the word string is contained in AC2. The result of this ORing is stored back in the word string. The referenced bits accessed are then reset to "0" upon completion of the ORing operation, AC0 is decremented by 1, AC1 is incremented by 16, and AC2 is incremented by 1. If the ATU is not enabled, undefined results will occur. Specification of a non-existant page frame number results in an indeterminate data.

Purge the ATU

PATU

| 1 | 1 | 1 | 0 | 0 | 1 | 1 | 1 | 1 | 0 | 0 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Purges the entire ATU of all entries. Carry is unchanged and *overflow* is 0.

NOTE: *This is a privileged instruction.*

Pop Block and Execute

PBX

| 1 | 0 | 0 | 0 | 0 | 1 | 1 | 1 | 0 | 1 | 0 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Saves a 16-bit instruction, pops a wide return block off the stack, and executes the saved instruction. Carry and *overflow* are indeterminate.

Bits 16–31 of AC0 contain a 16-bit instruction.

The instruction temporarily saves the instruction contained in bits 16–31 of AC0. Executes a WPOPB instruction, except that execution does not continue with the value loaded into the PC. After the wide return block is popped, the instruction executes the instruction that was temporarily saved. The executed instruction determines the value of the processor flags. The next instruction to be executed is addressed by the popped value of the PC + 1.

Note that the value popped off the stack and loaded into the PC must reference a BKPT instruction. If it does not, undefined results occur. If it does, then the instruction effectively substitutes the 16-bit instruction in AC0 for the BKPT instruction referenced by the PC after the pop.

Pop Multiple Accumulators

POP *acs,acd*

| 1 | ACS | | ACD | | 1 | 1 | 0 | 1 | 0 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Pops 1 to 4 words off the stack and places them in the indicated accumulators.

The set of accumulators from ACS through ACD, bits 16-31, is filled with words popped from the stack. Bits 16-31 of the accumulators are filled in descending order, starting with bits 16-31 of the accumulator specified by ACS and continuing down through bits 16-31 of the accumulator specified by ACD, wrapping around if necessary, with AC3 following AC0. If ACS is equal to ACD, only one word is popped and it is placed in ACS.

The stack pointer is decremented by the number of accumulators popped and the frame pointer is unchanged. A check for underflow is made only after the entire pop operation is done.

Bits 0-15 of the modified accumulator are undefined after completion of this instruction.

This instruction leaves carry unchanged; *overflow* is 0.

Pop Block

POPB

| 1 | 0 | 0 | 0 | 1 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Returns control from a *System Call* routine or an I/O interrupt handler that does not use the stack change facility of the *Vector* instruction.

Five words are popped off the stack and placed in predetermined locations. The words popped and their destinations are as follows:

| Word Popped | Destination |
|---|---|
| 1 | Bit 0 is loaded into carry<br>Bits 1-15 are loaded into the PC |
| 2 | AC3 |
| 3 | AC2 |
| 4 | AC1 |
| 5 | AC0 |

Sequential operation is continued with the word addressed by the updated value of the program counter. Carry remains unchanged and *overflow* is 0.

Bits 0-15 of the modified accumulator are undefined after completion of this instruction.

NOTE: *If the I/O handler uses the stack change facility of the* Vector on Interrupting Device Code *instruction, do not use the* Pop Block *instruction. Use the* Restore *instruction instead.*

Pop PC And Jump

POPJ

| 1 | 0 | 0 | 1 | 1 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Pops the top word off the stack and places it in the program counter. Sequential operation continues with the word addressed by the updated value of the program counter.

The 32-bit effective address generated by this instruction is constrained to be within the first 32 Kword of the current segment.

The stack pointer is decremented by one and the frame pointer is unchanged. A check for underflow occurs after the pop operation. Carry remains unchanged and *overflow* is 0.

Push Multiple Accumulators

PSH *acs,acd*

| 1 | ACS | ACD | 1 | 1 | 0 | 0 | 1 | 0 | 0 | 1 | 0 | 0 | 0 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Pushes the contents of 1 to 4 accumulators onto the stack.

Bits 16-31 of the set of accumulators from ACS through ACD are pushed onto the stack. The contents of bits 16-31 of the accumulators are pushed in ascending order, starting with bits 16-31 of the AC specified by ACS and continuing up through bits 16-31 of the AC specified by ACD, wrapping around if necessary, with AC0 following AC3. The contents of the accumulators remain unchanged. If ACS equals ACD, only ACS is pushed. Carry remains unchanged and *overflow* is 0.

The stack pointer is incremented by the number of accumulators pushed and the frame pointer is unchanged. A check for overflow is made only after the entire push operation finishes.

Push Jump

PSHJ *[@]displacement[,index]*

| 1 | 0 | 0 | 0 | 0 | 1 | INDEX | 1 | 0 | 1 | 1 | 1 | 0 | 0 | 0 | @ | DISPLACEMENT |
|---|---|---|---|---|---|---|---|---|---|---|---|---|---|---|---|---|
| 0 | 1 | 2 | 3 | 4 | 5 | 6–7 | 8 | 9 | 10 | 11 | 12 | 13 | 14 | 15 | 16 | 17–31 |

Pushes the address of the next sequential instruction onto the stack, computes the effective address, *E*, and places it in the program counter. Sequential operation continues with the word addressed by the updated value of the program counter.

The 32-bit effective address generated by this instruction is constrained to be within the first 32 Kword of the current segment.

Carry remains unchanged and *overflow* is 0.

Push Return Address

PSHR

| 1 | 0 | 0 | 0 | 0 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Pushes the address of this instruction + 2 onto the narrow stack. Carry remains unchanged and *overflow* is 0.

Reset Referenced Bit

RRFB

| 1 | 1 | 1 | 0 | 0 | 1 | 1 | 1 | 1 | 0 | 1 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Resets the specified referenced bits.

AC1 contains *p*, a pageframe number, in bits 13–31.

AC0 contains *c*, an origin 0 pageframe count (a count of 0 implies 1 page).

The instruction loads a zero into the referenced bits of *c* pageframes, beginning with the pageframe specified by AC1. The last pageframe whose referenced bit will be changed is pageframe number $p + c$. If the ATU is not enabled, undefined results will occur. Specification of a non-existent pageframe results in indeterminate data.

At the end of the instruction, AC1 contains the sum of the original contents of AC1 + the contents of AC0 plus 1. AC0 contains -1 (all ones). Carry is unchanged and *overflow* is 0.

NOTE: *This is a privileged instruction.*

Restore
RSTR

| 1 | 1 | 1 | 0 | 1 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Returns control from certain types of I/O interrupts.

Pops nine words off the stack and places them in predetermined locations. The words popped and their destinations are as follows:

| Word Popped | Destination |
|---|---|
| 1 | Bit 0 is loaded into carry<br>Bits 1-15 are loaded into the PC |
| 2 | AC3 |
| 3 | AC2 |
| 4 | AC1 |
| 5 | AC0 |
| 6 | Stack fault address |
| 7 | Stack limit |
| 8 | Frame pointer |
| 9 | Stack pointer |

Sequential operation continues with the word addressed by the updated value of the program counter.

Bits 0-15 of the modified accumulator are undefined after completion of this instruction.

Carry remains unchanged and *overflow* is 0.

NOTES: *Use the* Restore *instruction to return control to the program only if the I/O interrupt handler uses the stack change facility of the* Vector on Interrupting Device Code *instruction.*

*The* Restore *instruction does not check for stack underflow.*

Return
RTN

| 1 | 0 | 1 | 0 | 1 | 1 | 1 | 1 | 1 | 1 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Returns control from subroutines that issue a *Save* instruction at their entry points.

The *Save* instruction loads the current value of the stack pointer into the frame pointer. The *Return* instructions uses this value of the frame pointer to pop a standard return block off of the stack. The format of the return block is:

| Word Popped | Destination |
|---|---|
| 1 | Bit 0 is loaded into carry<br>Bits 1-15 are loaded into the PC |
| 2 | AC3 |
| 3 | AC2 |
| 4 | AC1 |
| 5 | AC0 |

After popping the return block, the *Return* instruction loads the decremented value of the frame pointer into the stack pointer and the popped value of AC3 into the frame pointer.

Bits 0-15 of the modified accumulator are undefined after completion of this instruction.

Carry remains unchanged and *overflow* is 0.

Save

SAVE *i*

| 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|
| 1 | 1 | 1 | 0 | 0 | 1 | 1 | 1 | 1 | 1 | 0 | 0 | 1 | 0 | 0 | 0 | IMMEDIATE FIELD |

Saves the information required by the *Return* instruction.

Saves the current value of the stack pointer in a temporary location. Adds 5 plus the unsigned, 16-bit integer contained in the immediate field to the current value of the stack pointer and loads the result into location 40. Compares this new value of the stack pointer to the stack limit to check for overflow. If no overflow condition exists, then the instruction places the current value of the frame pointer in bits 16-31 of AC3. Fetches the contents of the temporary location and loads them into the frame pointer. The instruction uses the value in the frame pointer to push a five-word return block. The formats and contents of the five-word return block is as follows:

| Word Pushed | Contents |
|---|---|
| 1 | Bits 16-31 of AC0 |
| 2 | Bits 16-31 of AC1 |
| 3 | Bits 16-31 of AC2 |
| 4 | Frame pointer before the *Save* |
| 5 | Bit 0 = carry<br>Bits 1-15 = bits 16-31 of AC3 |

After pushing the return block on the narrow stack, the instruction places the value of the frame pointer (which now contains the old value of the stack pointer + 5) in bits 16-31 of AC3. Carry remains unchanged and *overflow* is 0.

If an overflow condition exists, the *Save* instruction transfers control to the stack fault routine. The program counter in the fault return block contains the address of the *Save* instruction.

The *Save* instruction allocates a portion of the stack for use by the procedure which executed the *Save*. The value of the *frame size*, contained in the immediate field, determines the number of words in this stack area. This portion of the stack will not normally be accessed by push and pop operations, but will be used by the procedure for temporary storage of variables, counters, etc. The frame pointer acts as the reference point for this storage area.

The 32-bit effective address generated by this instruction is constrained to be within the first 32 Kword of the current segment.

Use the *Save* instruction with the *Jump to Subroutine* instruction. The *Jump to Subroutine* instruction places the return value of the program counter in bits 16-31 of AC3. *Save* then pushes the return value (contents of bits 16-31 of AC3) into bits 1–15 of the fifth word pushed.

Subtract Immediate

SBI *n,ac*

| 1 | N | ACD | 0 | 0 | 0 | 0 | 1 | 0 | 0 | 1 | 0 | 0 | 0 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Subtracts an unsigned integer in the range 1 to 4 from the contents of an accumulator.

The instruction subtracts the value $N+1$ from the unsigned 16-bit number contained in bits 16-31 of the specified accumulator and the result is placed in bits 16-31 of ACD. Carry remains unchanged. *Overflow* is 0.

Bits 0-15 of the modified accumulator are undefined after completion of this instruction.

NOTE: *The assembler takes the coded value of* n *and subtracts 1 from it before placing it in the immediate field. Therefore the programmer should code the exact value he wishes to subtract.*

Example

Assume that bits 16-31 of AC2 contains $000003_8$. After the instruction SBI 4,2 is executed, bits 16-31 of AC2 contains $177777_8$ and carry remains unchanged.

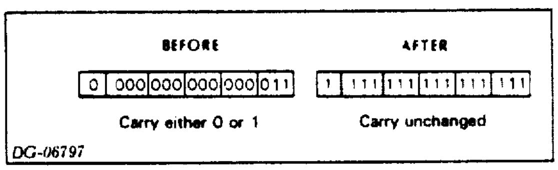

Sign Extend

SEX *acs,acd*

| 1 | ACS | ACD | 0 | 1 | 1 | 0 | 1 | 0 | 0 | 1 | 0 | 0 | 1 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Sign extends the 16-bit integer contained in ACS to 32 bits and loads the result into ACD. The contents of ACS remain unchanged, unless ACS and ACD are specified to be the same accumulator. Carry is unchanged and *overflow* is 0.

Skip If ACS Greater Than Or Equal to ACD

SGE *acs,acd*

| 1 | ACS | ACD | 0 | 1 | 0 | 0 | 1 | 0 | 0 | 1 | 0 | 0 | 0 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Compares two signed integers in two accumulators and skips if the first is greater than or equal to the second.

The signed two's complement numbers in bits 16-31 of ACS and ACD are algebraically compared. If the number in bits 16-31 of ACS is greater than or equal to the number in bits 16-31 of ACD, the next sequential word is skipped. The contents of ACS, ACD, and carry remain unchanged. *Overflow* is 0.

> NOTE: *The* Skip If ACS Greater Than ACD *and* Skip If ACS Greater Than Or Equal To ACD *instructions treat the contents of the specified accumulators as signed, two's complement integers. To compare unsigned integers, use the* Subtract and Add Complement *instruction.*

Skip If ACS Greater Than ACD

SGT *acs,acd*

| 1 | ACS | | ACD | | 0 | 1 | 0 | 0 | 0 | 0 | 0 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Compares two signed integers in two accumulators and skips if the first is greater than the second.

The signed, two's complement numbers in bits 16-31 of ACS and ACD are algebraically compared. If the number in bits 16-31 of ACS is greater than the number in bits 16-31 of ACD, the next sequential word is skipped. The contents of ACS, ACD, and carry remain unchanged.

> NOTE: *The* Skip If ACS Greater Than ACD *and* Skip If ACS Greater Than Or Equal To ACD *instructions treat the contents of the specified accumulators as signed, two's complement integers. To compare unsigned integers, use the* Subtract and Add Complement *instruction.*

Store Modified and Referenced Bits

SMRF

| 1 | 0 | 0 | 0 | 0 | 1 | 1 | 1 | 1 | 1 | 0 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Stores new values into the modified and referenced bits of a pageframe.

AC1 contains a pageframe number in bits 13 -31.
The instruction fetches the contents of the two least significant bits of AC0. Stores these values in the modified and referenced bits of the pageframe specified by AC1. Carry is unchanged and *overflow* is 0.

If the ATU is not enabled, undefined results will occur. If a nonexistent pageframe is specified, the instruction loads the appropriate modified and referenced bits with indeterminate data.

> NOTE: *This is a privileged instruction.*

Skip On Non-Zero Bit

SNB *acs,acd*

| 1 | ACS | | ACD | | 1 | 0 | 1 | 1 | 1 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

The two accumulators form a bit pointer. If the addressed bit is 1, the next sequential word is skipped.

Forms a 32-bit bit pointer from the contents of bits 16-31 of both ACS and ACD. Bits 16-31 of ACS contains the high-order 16 bits and bits 16-31 of ACD contains the low-order 16 bits of the bit pointer. If ACS and ACD are specified as the same accumulator, the instruction treats the accumulator contents as the low-order 16 bits of the bit pointer and assumes the high-order 16 bits are 0.

If the addressed bit in memory is 1, the next sequential word is skipped. The contents of ACS, ACD, and carry remain unchanged. *Overflow* is 0. The 32-bit effective address generated by this instruction is constrained to be within the first 32 Kword of the current segment.

NOTE: *The bit pointer formed by the two accumulators cannot make indirect memory references.*

Skip on OVR Reset

SNOVR

| 1 | 0 | 1 | 0 | 0 | 1 | 1 | 1 | 1 | 0 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Tests the value of OVR. If the flag has the value 0, the next sequential word is skipped. If the flag has the value 1, the next sequential word is executed. Carry is unchanged and *overflow* is 0.

Store Processor Status Register From AC0

SPSR

| 1 | 0 | 1 | 0 | 0 | 1 | 1 | 1 | 1 | 0 | 1 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Stores the contents of AC0 in the PSR.

Loads the contents of AC0 bits 0, 1, and 2 into OVK, OVR, and IRES, respectively. The contents of AC0 remain unchanged. Carry is unchanged and *overflow* is 0.

Store Accumulator

STA *ac,[@]displacement[,index]*

| 0 | 1 | 0 | AC | @ | INDEX | DISPLACEMENT |
|---|---|---|---|---|---|---|
| 0 | 1 | 2 | 3 4 | 5 | 6 7 | 8 15 |

Stores the contents of bits 16-31 of an accumulator into a memory location.

Places the contents of bits 16-31 of the specified accumulator in the word addressed by the effective address, *E*. The previous contents of the location addressed by *E* are lost.

The 32-bit effective address generated by this instruction is constrained to be within the first 32 Kword of the current segment.

The contents of carry and the specified accumulator remain unchanged. *Overflow* is 0.

Store Accumulator in WFP

STAFP *ac*

| 1 | 1 | 0 | AC | 1 | 1 | 0 | 0 | 1 | 1 | 1 | 1 | 0 | 0 | 1 |
|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 |

Stores a copy of the contents of the specified accumulator into WFP (the wide frame pointer). Carry is unchanged and *overflow* is 0.

Store Accumulator in WSB

STASB *ac*

| | | | | | | | | | | | | | | |
|---|---|---|---|---|---|---|---|---|---|---|---|---|---|---|
| 1 | 1 | 0 | AC | 1 | 1 | 0 | 0 | 1 | 0 | 1 | 1 | 0 | 0 | 1 |
| 0 | 1 | 2 | 3 4 | 5 | 6 | 7 | 8 | 9 | 10 | 11 | 12 | 13 | 14 | 15 |

Stores a copy of the contents of the specified accumulator into WSB (the wide stack base) as well as locations $26\text{–}27_8$ of the current segment. Carry is unchanged and *overflow* is 0.

Store Accumulator in WSL

STASL *ac*

| | | | | | | | | | | | | | | |
|---|---|---|---|---|---|---|---|---|---|---|---|---|---|---|
| 1 | 0 | 1 | AC | 1 | 1 | 0 | 0 | 1 | 1 | 1 | 1 | 0 | 0 | 1 |
| 0 | 1 | 2 | 3 4 | 5 | 6 | 7 | 8 | 9 | 10 | 11 | 12 | 13 | 14 | 15 |

Stores a copy of the contents of the specified accumulator into WSP (the wide stack pointer) as well as locations $24\text{–}25_8$ of the current segment. Carry is unchanged and *overflow* is 0.

Store Accumulator in WSP

STASP *ac*

| | | | | | | | | | | | | | | |
|---|---|---|---|---|---|---|---|---|---|---|---|---|---|---|
| 1 | 0 | 1 | AC | 1 | 1 | 0 | 0 | 1 | 0 | 1 | 1 | 0 | 0 | 1 |
| 0 | 1 | 2 | 3 4 | 5 | 6 | 7 | 8 | 9 | 10 | 11 | 12 | 13 | 14 | 15 |

Stores a copy of the contents of the specified accumulator into WSP (the wide stack pointer). Carry is unchanged and *overflow* is 0.

Store Accumulator into Stack Pointer Contents

STATS *ac*

| | | | | | | | | | | | | | | |
|---|---|---|---|---|---|---|---|---|---|---|---|---|---|---|
| 1 | 0 | 0 | AC | 1 | 1 | 0 | 0 | 1 | 0 | 1 | 1 | 0 | 0 | 1 |
| 0 | 1 | 2 | 3 4 | 5 | 6 | 7 | 8 | 9 | 10 | 11 | 12 | 13 | 14 | 15 |

Uses the contents of WSP (the wide stack pointer) as the address of a double word. Stores a copy of the contents of the specified accumulator at the address contained in WSP. Carry is unchanged and *overflow* is 0.

Store Byte

STB *acs,acd*

| | | | | | | | | | | | | | |
|---|---|---|---|---|---|---|---|---|---|---|---|---|---|
| 1 | ACS | ACD | 1 | 1 | 0 | 0 | 0 | 0 | 0 | 1 | 0 | 0 | 0 |
| 0 | 1 2 | 3 4 | 5 | 6 | 7 | 8 | 9 | 10 | 11 | 12 | 13 | 14 | 15 |

Moves the rightmost byte of ACD to a byte in memory. ACS contains the byte pointer.

Places bits 24–31 of ACD in the byte addressed by the byte pointer contained in bits 16-31 of ACS.

The 32-bit effective address generated by this instruction is constrained to be within the first 64 Kbyte of the current segment.

The contents of ACS, ACD, and carry remain unchanged. *Overflow* is 0.

Store Integer

STI *fpac*

| | | | | | | | | | | | | | | | |
|---|---|---|---|---|---|---|---|---|---|---|---|---|---|---|---|
| 1 | 0 | 1 | FPAC | | 1 | 1 | 1 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

Under the control of accumulators AC1 and AC3, translates the contents of the specified FPAC to an integer of the specified type and stores it, right-justified, in memory, beginning at the specified location. The instruction leaves the floating point number unchanged in the FPAC, and destroys the previous contents of memory at the specified location(s).

Bits 16-31 of AC1 must contain the data-type indicator describing the integer.

Bits 16-31 of AC3 must contain a byte pointer which is the address of the high-order byte of the number in memory.

Upon successful completion, the instruction leaves accumulators AC0 and AC1 unchanged. AC2 contains the original contents of AC3 and AC3 contains a byte pointer which is the address of the next byte after the destination field. *Overflow* is 0.

The 32-bit effective address generated by this instruction is constrained to be within the first 64 Kbyte of the current segment.

NOTES: *If the number in the specified FPAC has any fractional part, the result of the instruction is undefined. Use the* Integerize *instruction to clear any fractional part.*

*If the destination field cannot contain the entire number being stored, high-order digits are discarded until the number will fit into the destination. The remaining low-order digits are stored and carry is set to 1.*

*For data types 0, 1, 2, 3, 4, and 5, if the number being stored will not fill the destination field, the high-order bytes to the right of the sign are set to 0.*

*For data type 6, if the number being stored will not fill the destination field, the sign bit is extended to the left to fill the field.*

*For data type 7, if the number being stored will not fill the destination field, the low-order bytes are set to 0.*

Store Integer Extended

STIX

| | | | | | | | | | | | | | | | |
|---|---|---|---|---|---|---|---|---|---|---|---|---|---|---|---|
| 1 | 1 | 0 | 0 | 1 | 1 | 1 | 1 | 1 | 0 | 1 | 0 | 1 | 0 | 0 | 0 |
| 0 | 1 | 2 | 3 | 4 | 5 | 6 | 7 | 8 | 9 | 10 | 11 | 12 | 13 | 14 | 15 |

Converts the contents of the four FPAC's to integer form and uses the low-order 8 digits of each to form a 32-digit integer. The instruction stores this integer, right-justified, in memory beginning at the specified location. The sign of the integer is the logical OR of the signs of all four FPAC's. The previous contents of the addressed memory locations are lost. Sets carry to 0. The contents of the FPAC's remain unchanged. The condition codes in the FPSR are unpredictable.

Bits 16-31 of AC1 must contain the data-type indicator describing the form of the in memory.

Bits 16-31 of AC3 must contain a byte pointer which is the address of the high-order byte of the destination field in memory.

Upon successful termination, the contents of AC0 are undefined; the contents of AC1 remain unchanged; AC2 contains the original contents of AC3; and AC3 contains a byte pointer which is the address of the next byte after the destination field. *Overflow* is 0.

The 32-bit effective address generated by this instruction is constrained to be within the first 64 Kbyte of the current segment.

NOTES: *If the destination field is not large enough to contain the number being stored, the instruction disregards high-order digits until the number will fit in the destination. The instruction stores low-order digits remaining and sets carry to 1.*

*For data types 0, 1, 2, 3, 4, and 5, if the number being stored will not fill the destination field, the instruction sets the high-order bytes to 0.*

*For data type 6, if the number being stored will not fill the destination field, the instruction extends the sign bit to the left to fill the field.*

Subtract

SUB*[c][sh][#] acs,acd[,skip]*

| 1 | ACS | ACD | 1 | 0 | 1 | SH | C | # | SKIP |
|---|---|---|---|---|---|---|---|---|---|
| 0 | 1-2 | 3-4 | 5 | 6 | 7 | 8-9 | 10-11 | 12 | 13-15 |

Performs unsigned integer subtraction and complements carry if appropriate.

Initializes carry to its specified value. The instruction subtracts the unsigned, 16-bit number in bits 16-31 of ACS from the unsigned, 16-bit number in bits 16-31 of ACD by taking the two's complement of the number in ACS and adding it to the number in ACD. The instruction places the result of the addition in the shifter. If the operation produces a carry of 1 out of the high-order bit, the instruction complements carry. The instruction performs the specified shift operation and places the result of the shift in bits 16-31 of ACD if the no-load bit is 0. If the skip condition is true, the instruction skips the next sequential word.

If the load option is specified, bits 0-15 of ACD are undefined.

*Overflow* is 0 for this instruction.

NOTE: *If the number in ACS is less than or equal to the number in ACD, the instruction complements carry.*

System Call

SYC *acs,acd*

| 1 | ACS | ACD | 1 | 1 | 1 | 0 | 1 | 0 | 0 | 1 | 0 | 0 | 0 |
|---|---|---|---|---|---|---|---|---|---|---|---|---|---|
| 0 | 1-2 | 3-4 | 5 | 6 | 7 | 8 | 9 | 10 | 11 | 12 | 13 | 14 | 15 |

Pushes a return block and transfers control to the *system call handler*.

If a user map is enabled, the instruction disables it and pushes a return block onto the stack. The program counter in the return block points to the instruction immediately following the *System Call* instruction. After pushing the return block, the instruction executes a *Jump Indirect* to location 2, which contains the address of the *system call handler*.

If this instruction disables a user map, then I/O interrupts cannot occur between the time the *System Call* instruction is executed and the time the first instruction of the system call handler is executed.

If the ATU is enabled, a privileged instruction protection fault occurs.

This instruction leaves carry unchanged; *overflow* is 0.

NOTES: *If both accumulators are specified as AC0, the instruction does not push a return block onto the stack. The contents of AC0 remain unchanged.*

*The assembler recognizes the mnemonic* SCL *as equivalent to* SYC 1,1.

*The assembler recognizes the mnemonic* SVC *as equivalent to* SYC 0,0.

Skip On Zero Bit

SZB *acs,acd*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | ACS | | ACD | | 1 | 0 | 0 | 1 | 0 | 0 | 0 | 1 | 0 | 0 | 0 |

The two accumulators form a bit pointer. If the addressed bit is zero, the next sequential word is skipped.

Forms a 32-bit bit pointer from the contents of bits 16-31 of both ACS and ACD. Bits 16-31 of ACS contains the high-order 16 bits and bits 16-31 of ACD contains the low-order 16 bits of the bit pointer. If ACS and ACD are specified as the same accumulator, the instruction treats the accumulator contents as the low-order 16 bits of the bit pointer and assumes the high-order 16 bits are 0.

If the addressed bit in memory is 0, the next sequential word is skipped. The contents of ACS and ACD remain unchanged.

The 32-bit effective address generated by this instruction is constrained to be within the first 32 Kword of the current segment.

This instruction leaves carry unchanged; *overflow* is 0.

NOTE: *The bit pointer contained in ACS and ACD cannot make indirect memory references.*

Skip On Zero Bit And Set To One

SZBO *acs,acd*

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | ACS | | ACD | | 1 | 0 | 0 | 1 | 1 | 0 | 0 | 1 | 0 | 0 | 0 |

The two accumulators form a bit pointer. The instruction sets the addressed bit to 1. If the addressed bit was 0 before being set to 1, the instruction skips the next sequential word. The contents of ACS, ACD, and carry remain unchanged. *Overflow* is 0.

Forms a 32-bit bit pointer from the contents of bits 16-31 of ACS and ACD. Bits 16-31 of ACS contains the high-order 16 bits and bits 16-31 of ACD contains the low-order 16 bits of the bit pointer. If ACS and ACD are specified as the same accumulator, the instruction treats the accumulator contents as the low-order 16 bits of the bit pointer and assumes the high-order 16 bits are 0.

The 32-bit effective address generated by this instruction is constrained to be within the first 32 Kword of the current segment.

NOTES: *The bit pointer contained in ACS and ACD must not make indirect memory references*

*This instruction facilitates the use of bit maps for such purposes as allocation of facilities (memory blocks, I/O devices, etc.) to several processes, or tasks, that may interrupt one another, or in a multiprocessor environment. The bit is tested and set to 1 in one memory cycle.*

Skip on Valid Byte Pointer

VBP

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 0 | 0 | 0 | 1 | 1 | 1 | 1 | 0 | 0 | 1 | 1 | 0 | 0 | 1 |

Checks a byte pointer for valid reference, and skips or does not skip the next word depending on the outcome of the check. Carry is unchanged and *overflow* is 0.

AC1 contains a ring number in bits 1-3; all other bits contain zeroes.

AC0 contains a 32-bit byte pointer.

The instruction compares the ring field of AC1 to the ring field of AC0. If AC1's ring field is greater than AC0's ring field, the next sequential word is executed; otherwise, the next sequential word is skipped.

Skip on Valid Word Pointer

VWP

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 0 | 0 | 0 | 1 | 1 | 1 | 1 | 0 | 1 | 0 | 1 | 0 | 0 | 1 |

Checks a word pointer for valid reference, and skips or does not skip the next word depending on the outcome of the check.

AC1 contains a ring number in bits 1–3; all other bits contain zeroes.

AC0 contains a 31-bit word pointer (indirectable).

The instruction compares the ring field of AC1 to the ring field of AC0. If AC1's ring field is greater than AC0's ring field, the next sequential word is executed; otherwise, the next sequential word is skipped. Carry is unchanged and *overflow* is 0.

Wide Add Complement

WADC *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 1 | 0 | 0 | 1 | 0 | 0 | 1 | 0 | 0 | 1 |

Forms the logical complement of the 32-bit integer contained in ACS and adds it to the 32-bit integer contained in ACD. Stores the result in ACD. Sets carry to the value of ALU carry. Sets *overflow* to 1 if there is an ALU overflow.

Wide Add

WADD *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 0 | 1 | 0 | 1 | 0 | 0 | 1 | 0 | 0 | 1 |

Adds the 32-bit fixed point integer contained in ACS to the 32-bit fixed point integer contained in ACD. Stores the result in ACD. Sets carry to ALU carry. Sets *overflow* to 1 if there is an ALU overflow.

Wide Add With Wide Immediate

WADDI *ac,immediate*

| 0 | 1 | 2 | 3–4 | 5 | 6 | 7 | 8 | 9 | 10 | 11 | 12 | 13 | 14 | 15 | 16–47 |
|---|---|---|---|---|---|---|---|---|---|---|---|---|---|---|---|
| 1 | 0 | 0 | AC | 1 | 1 | 0 | 1 | 0 | 0 | 0 | 1 | 0 | 0 | 1 | IMMEDIATE |

Adds the 32-bit fixed point integer contained in the immediate field to the 32-bit fixed point integer contained in the specified accumulator. Stores the result in the specified accumulator. Sets *overflow* to 1 if there is an ALU overflow. Sets carry to the value of the ALU carry.

Wide Add Immediate

WADI *n,ac*

| 1 | N | AC | 1 | 0 | 0 | 1 | 0 | 1 | 1 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Adds the value $n+1$ to the 32-bit fixed point integer contained in the specified accumulator. Stores the result in the specified accumulator. Sets carry to the value of ALU carry. Sets *overflow* to 1 if there is an ALU overflow.

NOTE: *The assembler takes the coded value of* n *and subtracts one from it before placing it in the immediate field. Therefore, the programmer should code the exact value that he wishes to add.*

Wide AND with Complemented Source

WANC *acs,acd*

| 1 | ACS | ACD | 1 | 0 | 1 | 0 | 1 | 0 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Forms the one's complement of the 32 bits contained in ACS and logically ANDs it with the 32 bits contained in ACD. Stores the result in ACD. Carry is unchanged and *overflow* is 0.

Wide AND

WAND *acs,acd*

| 1 | ACS | ACD | 1 | 0 | 0 | 0 | 1 | 0 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Forms the logical AND between corresponding bits of ACS and ACD. Loads the 32-bit result into ACD. The contents of ACS remain unchanged. Carry is unchanged and *overflow* is 0.

Wide AND Immediate

WANDI *ac, immediate*

| 1 | 0 | 0 | AC | 1 | 1 | 0 | 1 | 0 | 0 | 1 | 1 | 0 | 0 | 1 | IMMEDIATE |
|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16–47 |

Forms the logical AND between corresponding bits of the specified accumulator and the value contained in the literal field. The instruction places the 32-bit result of the logical AND in the specified accumulator. Carry is unchanged and *overflow* is 0.

Wide Arithmetic Shift

WASH *acs,acd*

| 1 | ACS | ACD | 0 | 1 | 0 | 0 | 1 | 1 | 1 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Shifts the contents of ACD left or right.

Bits 24–31 of ACS specify the number of bits to shift and the direction of shifting.

If ACS contains a positive number, the instruction shifts the contents of ACD left; zeroes fill the vacated bit positions. If ACS contains a negative number, the instruction shifts the contents of ACD right; the sign bit fills the vacated bit positions. If ACS contains zero, no shifting occurs. The instruction ignores bits 0–23 of ACS.

If the instruction is to shift the contents of ACD to the right, it truncates the contents one bit position for each shift.

In shifting negative numbers to the right, rounding towards zero is performed. For instance, -3 shifted one position to the right results in -1.

The value of ACS and carry remain unchanged. If, while performing a left shift, you shift out a bit whose value is the complement of ACD's sign bit, *overflow* is set to 1. Otherwise, *overflow* is 0.

Wide Block Move

WBLM

| 1 | 1 | 1 | 0 | 0 | 1 | 1 | 1 | 0 | 1 | 0 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Moves words sequentially from one memory location to another, treating them as unsigned, 32-bit integers.

AC1 contains the two's complement of the number of words to be moved. If the contents of AC1 are positive, then data movement progresses from the lowest memory location to the highest (ascending). If the contents of AC1 are negative, then data movement progresses from the highest memory location to the lowest (descending).

Bits 1–31 of AC2 contain the address of the source location. Bits 1–31 of AC3 contain the address of the destination location. The address in bits 1–31 of AC2 or AC3 is an indirect address if bit 0 of that accumulator is 1. In that case, the instruction follows the indirection chain before placing the resultant effective address in the accumulator.

| AC | Contents |
|---|---|
| 0 | Unused |
| 1 | Number of words to be moved |
| 2 | Source address |
| 3 | Destination address |

For each word moved, the instruction decrements the count in AC1 by 1. If data movement is ascending, the instruction increments the source and destination addresses by 1 for each word moved. If data movement is descending, the instruction decrements the source and destination addresses by 1 for each word moved.

Upon completion of the instruction, AC1 contains zeroes, and AC2 and AC3 point to the word following (ascending) or preceding (descending) the last word in their respective fields. AC0 is unused. Carry is unchanged and *overflow* is 0.

NOTES: *Since this instruction may require a long time to execute, it is interruptable. When this instruction is interrupted, the processor saves the address of the* WBLM *instruction. This instruction updates addresses and word count after storing each word, so any interrupt service routine returning control via the saved address will correctly restart the* WBLM *instruction.*

*If data movement is descending and a ring crossing would occur, a protection trap occurs and this instruction does not execute. AC1 will contain the value 4.*

When updating the source and destination addresses, the *Wide Block Move* instruction forces bit 0 of the result to 0. This ensures that upon return from an interrupt, the *Wide Block Move* instruction will not try to resolve an indirect address in either AC2 or AC3.

Load PC

WBR *displacement*

| 1 | DISP 0-3 | 0 | DISP 4-7 | 1 | 1 | 1 | 0 | 0 | 0 |
|---|---|---|---|---|---|---|---|---|---|
| 0 | 1–4 | 5 | 6–9 | 10 | 11 | 12 | 13 | 14 | 15 |

Adds the 31-bit value contained in the PC to the value of the displacement and places the result in the PC. Carry is unchanged and *overflow* is 0.

NOTE: *The processor always forces the value loaded into the PC to reference a location in the current segment of execution.*

Wide Search Queue Backward
WBSAC

| 1 | 1 | 0 | 0 | 0 | 1 | 1 | 1 | 0 | 0 | 0 | 1 | 1 | 0 | 0 | 1 | RESERVED | 1 | 0 | 1 | 1 | 1 |
|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 26 | 27 | 28 | 29 | 30 | 31 |

See instruction entry "Search Queue".

Wide Search Queue Backward
WBSAS

| 1 | 1 | 0 | 0 | 0 | 1 | 1 | 1 | 0 | 0 | 0 | 1 | 1 | 0 | 0 | 1 | RESERVED | 1 | 0 | 1 | 0 | 1 |
|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 26 | 27 | 28 | 29 | 30 | 31 |

See instruction entry "Search Queue".

Wide Search Queue Backward
WBSE

| 1 | 1 | 0 | 0 | 0 | 1 | 1 | 1 | 0 | 0 | 0 | 1 | 1 | 0 | 0 | 1 | RESERVED | 1 | 1 | 0 | 0 | 1 |
|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 26 | 27 | 28 | 29 | 30 | 31 |

See instruction entry "Search Queue".

Wide Search Queue Backward
WBSGE

| 1 | 1 | 0 | 0 | 0 | 1 | 1 | 1 | 0 | 0 | 0 | 1 | 1 | 0 | 0 | 1 | RESERVED | 1 | 1 | 0 | 1 | 1 |
|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 26 | 27 | 28 | 29 | 30 | 31 |

See instruction entry "Search Queue".

Wide Search Queue Backward
WBSLE

| 1 | 1 | 0 | 0 | 0 | 1 | 1 | 1 | 0 | 0 | 0 | 1 | 1 | 0 | 0 | 1 | RESERVED | 1 | 1 | 1 | 0 | 1 |
|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 26 | 27 | 28 | 29 | 30 | 31 |

See instruction entry "Search Queue".

Wide Search Queue Backward
WBSNE

| 1 | 1 | 0 | 0 | 0 | 1 | 1 | 1 | 0 | 0 | 0 | 1 | 1 | 0 | 0 | 1 | RESERVED | 1 | 1 | 1 | 1 | 1 |
|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 26 | 27 | 28 | 29 | 30 | 31 |

See instruction entry "Search Queue".

Wide Search Queue Backward

WBSSC

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 0 | 0 | 1 | 1 |

See instruction entry "Search Queue".

Wide Search Queue Backward

WBSSS

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 0 | 0 | 0 | 1 |

See instruction entry "Search Queue".

Wide Set Bit to One

WBTO *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 1 | 0 | 1 | 0 | 0 | 1 | 1 | 0 | 0 | 1 |

Sets the specified bit to one. Carry is unchanged and *overflow* is 0.

ACS contains a 31-bit word address.

ACD contains a bit offset.

The instruction sets the bit specified by ACS and ACD to one. The contents of ACS and ACD remain unchanged.

If ACS and ACD are specified to be the same accumulator, then the processor assumes the word address is zero within the current segment. In this case, the specified accumulator contains a 32-bit bit pointer.

Wide Set Bit to Zero

WBTZ *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 1 | 0 | 1 | 0 | 1 | 0 | 1 | 0 | 0 | 1 |

Sets the specified bit to zero. Carry is unchanged and *overflow* is 0.

ACS contains a 31-bit word address.

ACD contains a bit offset.

The instruction sets the bit specified by ACS and ACD to zero. The contents of ACS and ACD remain unchanged.

If ACS and ACD are specified to be the same accumulator, then the processor assumes the word address is zero within the current segment. In this case, the specified accumulator contains a 32-bit bit pointer.

Wide Compare to Limits

WCLM *acs,acd*

| 1 | ACS | ACD | 1 | 0 | 1 | 0 | 1 | 1 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Compares a signed integer with two limit values and skips if the integer is between the limit values. The accumulators determine the location of the limit values. Carry is unchanged and *overflow* is 0.

Compares the signed, two's complement integer in ACS to two signed, two's complement integer limit values, *L* and *H*. If the number in ACS is greater than or equal to *L* and less than or equal to *H*, execution skips the next sequential word before continuing. If the number in ACS is less than *L* or greater than *H*, execution continues with the next sequential word.

If ACS and ACD are specified as different accumulators, bits 1–31 of ACD contain the address of the limit value *L*. The word following *L* contains the limit value *H*. Bit 0 of ACD is ignored.

If ACS and ACD are specified as the same accumulator, the integer to be compared must be in that accumulator and the limit values *L* and *H* must be in the two words following the instruction. The first word contains *L*, and the second contains *H*. The third word contains the next sequential word of the program.

Wide Character Compare

WCMP

| 1 | 0 | 1 | 0 | 0 | 1 | 1 | 1 | 0 | 1 | 0 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Under control of the four accumulators, compares two strings of bytes and returns a code in AC1 reflecting the results of the comparison.

The instruction compares the strings one byte at a time. Each byte is treated as an unsigned 8-bit binary quantity in the range $0\text{–}255_{10}$. If two bytes are not equal, the string whose byte has the smaller numerical value is, by definition, the *lower valued* string. Both strings remain unchanged. The four accumulators contain parameters passed to the instruction. Two accumulators specify the starting address, the number of bytes, and the direction of processing (ascending or descending addresses) for each string.

AC0 specifies the length and direction of comparison for string 2. If the string is to be compared from its lowest memory location to the highest, AC0 contains the unsigned value of the number of bytes in string 2. If the string is to be compared from its highest memory location to the lowest, AC0 contains the two's complement of the number of bytes in string 2.

AC1 specifies the length and direction of comparison for string 1. If the string is to be compared from its lowest memory location to the highest, AC0 contains the unsigned value of the number of bytes in string 1. If the string is to be compared from its highest memory location to the lowest, AC1 contains the two's complement of the number of bytes in string 1.

AC2 contains a byte pointer to the first byte compared in string 2. When the string is compared in ascending order, AC2 points to the lowest byte. When the string is compared in descending order, AC2 points to the highest byte.

AC3 contains a byte pointer to the first byte compared in string 1. When the string is compared in ascending order, AC3 points to the lowest byte. When the string is compared in descending order, AC3 points to the highest byte.

| Code | Comparison Result |
|---|---|
| - 1 | String 1 < String 2 |
| 0 | String 1 = String 2 |
| + 1 | String 1 > String 2 |

The strings may overlap in any way. Overlap will not effect the results of the comparison.

Upon completion, AC0 contains the number of bytes left to compare in string 2. AC1 contains the return code as shown in the table above. AC2 contains a byte pointer either to the failing byte in string 2 (if an inequality was found), or to the byte following string 2 (if string 2 was exhausted). AC3 contains a byte pointer either to the failing byte in string 1 (if an inequality was found), or to the byte following string 1 (if string 1 was exhausted). Carry is unchanged and *overflow* is 0.

If AC0 and AC1 both contain zero (both string 1 and string 2 have length zero), the instruction returns 0 in AC1.

If the two strings are of unequal length, the instruction *fakes* space characters $<040_8>$ in place of bytes from the exhausted string, and continues the comparison.

NOTE: *The original contents of AC2 and AC3 must be valid byte pointers to an area in the user's address space. If they are invalid a protection fault occurs, even if no bytes are to be compared. AC1 contains the code 4.*

Wide Character Move Until True
WCMT

| 1 | 0 | 1 | 0 | 0 | 1 | 1 | 1 | 0 | 1 | 0 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Under control of the four accumulators, moves a string of bytes from one area of memory to another until either a table-specified delimiter character is moved or the source string is exhausted.

The instruction copies the string one byte at a time. Before it moves a byte, the instruction uses that byte's value to determine if it is a delimiter. It treats the byte as an unsigned 8-bit binary integer (in the range $0\text{–}255_{10}$) and uses it as a bit index into a 256-bit delimiter table. If the indexed bit in the delimiter table is zero, the byte pending is not a delimiter, and the instruction copies it from the source string to the destination string. If the indexed bit in the delimiter table is 1, the byte pending is a delimiter; the instruction does not copy it, and the instruction terminates.

The instruction processes both strings in the same direction, either from lowest memory locations to highest (*ascending order*), or from highest memory locations to lowest (*descending order*). Processing continues until there is a delimiter or the source string is exhausted. The four accumulators contain parameters passed to the instruction.

AC0 contains the address (word address), possibly indirect, of the start of the 256-bit (16-word) delimiter table.

AC1 specifies the length of the strings and the direction of processing. If the source string is to be moved to the destination field in ascending order, AC1 contains the unsigned value of the number of bytes in the source string. If the source string is to be moved to the destination field in descending order, AC1 contains the two's complement of the number of bytes in the source string.

AC2 contains a byte pointer to the first byte to be written in the destination field. When the process is performed in ascending order, AC2 points to the lowest byte in the destination field. When the process is performed in descending order, AC2 points to the highest byte in the destination field.

AC3 contains a byte pointer to the first byte to be processed in the source string. When the process is performed in ascending order, AC3 points to the lowest byte in the source string. When the process is performed in descending order, AC3 points to the highest byte in the source string.

The fields may overlap in any way. However, the instruction moves bytes one at a time, so certain types of overlap may produce unusual side effects.

Upon completion, AC0 contains the resolved address of the translation table and AC1 contains the number of bytes that were not moved. AC2 contains a byte pointer to the byte following the last byte written in the destination field. AC3 contains a byte pointer either to the delimiter or to the first byte following the source string. The value of carry is indeterminate and *overflow* is 0.

> NOTE: *The original contents of AC0, AC2, and AC3 must be valid byte pointers to an area in the user's address space. If they are invalid a protection fault occurs, even if no bytes are to be stored. AC1 contains the code 4.*

Wide Character Move
WCMV

| 1 | 0 | 0 | 0 | 0 | 1 | 1 | 1 | 0 | 1 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Under control of the four 32-bit accumulators, moves a string of bytes from one area of memory to another and returns a value in carry reflecting the relative lengths of source and destination strings.

The instruction copies the source string to the destination field, one byte at a time. The four accumulators contain parameters passed to the instruction. Two accumulators specify the starting address, number of bytes to be copied, and the direction of processing (ascending or descending addresses) for each field.

AC0 specifies the length and direction of processing for the destination field. If the field is to be processed from its lowest memory location to the highest, AC0 contains the unsigned value of the number of bytes in the destination field. If the field is to be processed from its highest memory location to the lowest, AC0 contains the two's complement of the number of bytes in the destination field.

AC1 specifies the length and direction of processing for the source string. If the string is to be processed from its lowest memory location to the highest, AC1 contains the unsigned value of the number of bytes in the source string. If the field is to be processed from its highest memory location to the lowest, AC1 contains the two's complement of the number of bytes in the source string.

AC2 contains a byte pointer to the first byte to be written in the destination field. When the field is written in ascending order, AC2 points to the lowest byte. When the field is written in descending order, AC2 points to the highest byte.

AC3 contains a byte pointer to the first byte copied in the source string. When the field is copied in ascending order, AC3 points to the lowest byte. When the field is copied in descending order, AC3 points to the highest byte.

The fields may overlap in any way. However, the instruction moves bytes one at a time, so certain types of overlap may produce unusual side effects.

Upon completion, AC0 contains 0 and AC1 contains the number of bytes left to fetch from the source field. AC2 contains a byte pointer to the byte following the destination field; and AC3 contains a byte pointer to the byte following the last byte fetched from the source field. The value of carry is indeterminate and *overflow* is 0.

If the source field is shorter than the destination field, the instruction pads the destination field with space characters <$040_8$>. If the source field is longer than the destination field, the instruction terminates when the destination field is filled and returns the value 1 in carry; otherwise, the instruction returns the value 0 in carry.

> NOTES: *If AC0 contains the number 0 at the beginning of this instruction, no bytes are fetched and none are stored. If AC1 is 0 at the beginning of this instruction, the destination field is filled with space characters; note that AC3 must still contain a valid byte pointer.*
>
> *The original values of AC2 and AC3 must be valid byte pointers to an area in the user's address space. If they are invalid a protection fault occurs, even if no bytes are to be moved. AC1 contains the code 4.*

Wide Count Bits

WCOB *acs,acd*

| | | | | | | | | | | | | |
|---|---|---|---|---|---|---|---|---|---|---|---|---|
| 1 | ACS | ACD | 1 | 0 | 0 | 1 | 0 | 0 | 0 | 1 | 0 | 0 | 1 |
| 0 | 1 2 | 3 4 | 5 | 6 | 7 | 8 | 9 | 10 | 11 | 12 | 13 | 14 | 15 |

Counts the number of bits in ACS whose value is 1. Adds the count of non-zero bits to the 32-bit, signed contents of ACD. The contents of ACS remain unchanged, unless ACS and ACD are the same accumulator. Carry is unchanged and *overflow* is 0.

Wide Complement

WCOM *acs,acd*

| | | | | | | | | | | | | | |
|---|---|---|---|---|---|---|---|---|---|---|---|---|---|
| 1 | ACS | ACD | 1 | 0 | 0 | 0 | 1 | 0 | 1 | 1 | 0 | 0 | 1 |
| 0 | 1 2 | 3 4 | 5 | 6 | 7 | 8 | 9 | 10 | 11 | 12 | 13 | 14 | 15 |

Forms the one's complement of the 32-bit fixed point integer contained in ACS and loads the result into ACD. The contents of ACS remain unchanged, unless ACS equals ACD. Carry is unchanged and *overflow* is 0.

Wide Character Translate

WCTR

| | | | | | | | | | | | | | | | |
|---|---|---|---|---|---|---|---|---|---|---|---|---|---|---|---|
| 1 | 0 | 0 | 0 | 0 | 1 | 1 | 1 | 0 | 1 | 1 | 0 | 1 | 0 | 0 | 1 |
| 0 | 1 | 2 | 3 | 4 | 5 | 6 | 7 | 8 | 9 | 10 | 11 | 12 | 13 | 14 | 15 |

Under control of the four accumulators, translates a string of bytes from one data representation to another and either moves it to another area of memory or compares it to a second translated string.

The instruction operates in two modes: translate and move, and translate and compare.

When operating in translate and move mode, the instruction translates each byte in string 1 and places it in a corresponding position in string 2. Translation is performed by using each byte as an 8-bit index into a 256-byte translation table. The byte addressed by the index then becomes the translated value.

When operating in translate and compare mode, the instruction translates each byte in string 1 and string 2 as described above, and compares the translated values. Each translated byte is treated as an unsigned 8-bit binary quantity in the range $0–255_{10}$. If two translated bytes are not equal, the string whose byte has the smaller numerical value is, by definition the *lower valued* string. Both strings remain unchanged.

AC0 specifies the address, either direct or indirect, of a word which contains a byte pointer to the first byte in the 256-byte translation table.

AC1 specifies the length of the two strings and the mode of processing. If string 1 is to be processed in translate and move mode, AC1 contains the two's complement of the number of bytes in the strings. If the strings are to be processed in translate and compare mode, AC1 contains the unsigned value of the number of bytes in the strings. Both strings are processed from lowest memory address to highest.

AC2 contains a 32-bit byte pointer to the first byte in string 2.

AC3 contains a 32-bit byte pointer to the first byte in string 1.

Upon completion of a translate and move operation, AC0 contains the address of the word which contains the byte pointer to the translation table and AC1 contains 0. AC2 contains a byte pointer to the byte following string 2 and AC3 contains a byte pointer to the byte following string 1. The value of carry is unchanged and *overflow* is 0.

Upon completion of a translate and compare operation, AC0 contains the address of the word which contains the byte pointer to the translation table. AC1 contains a return code as calculated in the table below. AC2 contains a byte pointer to either the failing byte in string 2 (if an inequality was found) or the byte following string 2 if the strings were identical. AC3 contains a byte pointer to either the failing byte in string 1 (if an inequality was found) or the byte following string 1 if the strings were identical. The value of carry is unchanged and *overflow* is 0.

| Code | Result |
|---|---|
| -1 | Translated value of string 1 < Translated value of string 2 |
| 0 | Translated value of string 1 = Translated value of string 2 |
| +1 | Translated value of string 1 > Translated value of string 2 |

If the length of both string 1 and string 2 is zero, the compare option returns a 0 in AC1.

The fields may overlap in any way. However, processing is done one character at a time, so unusual side effects may be produced by certain types of overlap.

NOTE: *The original contents of AC0, AC2, and AC3 must be valid byte pointers to an area in the user's address space. If they are invalid a protection fault occurs, even if no bytes are to be moved or compared. AC1 contains the code 4.*

Wide Divide

WDIV *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 0 | 1 | 0 | 1 | 1 | 1 | 1 | 0 | 0 | 1 |

Divides an integer contained in an accumulator by an integer contained in another accumulator.

The instruction sign extends the signed, 32-bit integer contained in ACD to 64 bits. Divides this integer by the signed, 32-bit integer contained in ACS. If the quotient is within the range -2,147,483,648 to +2,147,483,647 inclusive, loads the quotient in ACD. If the result is not within this range, or if ACS is zero, sets *overflow* to 1 and does not load the quotient into ACD; otherwise, *overflow* is 0. The contents of ACS and carry remain unchanged.

Wide Signed Divide

WDIVS

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 1 | 0 | 0 | 1 | 1 | 1 | 0 | 1 | 1 | 0 | 1 | 0 | 0 | 1 |

Divides an integer contained in AC0 and AC1 by an integer contained in AC2.

AC0 and AC1 contain a 64-bit, signed integer. AC0 contains the high order bits.

The instruction divides the 64-bit, signed integer contained in AC0 and AC1 by the 32-bit, signed integer contained in AC2. If the quotient is within the range -2,147,483,648 to +2,147,483,647 inclusive, then places the 32-bit quotient in AC1 and the remainder in AC0. If the quotient is not within this range, or AC2 is zero, AC0 and AC1 remain unchanged and *overflow* is 1; otherwise, *overflow* is 0. AC2 and carry will always remain unchanged.

NOTE: *Zero remainders are always positive. All other remainders have the same sign as the dividend.*

Pop MV/8000 Context Block
WDPOP

| 1 | 0 | 0 | 0 | 0 | 1 | 1 | 1 | 1 | 1 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Restores the state of the machine to what it was at the time of the last page fault.

The instruction uses the information pointed to by page zero locations $32–33_8$ of Segment 0 to restore the state of the CPU to that of the time of the last page fault. Execution of the interrupted program resumes before, during, or after the instruction that caused the fault, depending on the instruction type and how far it had proceeded before the fault. Carry is unchanged and *overflow* is 0.

NOTE: *This is a privileged instruction.*

Wide Edit
WEDIT

| 1 | 0 | 1 | 0 | 0 | 1 | 1 | 1 | 0 | 1 | 1 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Converts a decimal source number from either packed or unpacked form to a string of bytes under the control of an edit subprogram. This subprogram can perform many different operations on the number and its destination field including leading zero suppression, leading or trailing signs, floating fill characters, punctuation control, and insertion of text into the destination field. The instruction also performs operations on alphanumeric data if you specify data type 4.

Upon entry to the *Edit* instruction, the accumulators contain the following data:

- AC0 contains a 32-bit byte pointer to the first opcode of the *Edit* subprogram,
- AC1 contains a data-type indicator describing the number to be processed,
- AC2 contains a 32-bit byte pointer to the first byte of the destination field,
- AC3 contains a 32-bit byte pointer to the first byte of the source field.

The fields may overlap in any way. However, the instruction processes characters one at a time, so unusual side effects may be produced by certain types of overlap.

The instruction maintains two flags and three indicators or pointers. The flags are the Significance Trigger (*T*) and the Sign flag (*S*). The three indicators are the Source Indicator (SI), the Destination Indicator (DI), and the op-code Pointer (P).

At the start of execution, the *Edit* instruction sets *T* to 0. When the instruction manipulates the first non-zero digit, it sets *T* to 1 (unless an edit op-code specifies otherwise).

The instruction sets *S* to reflect the sign of the number currently being processed. If the number is positive, the instruction sets *S* to 0. If the number is negative, the instruction sets *S* to 1.

Each of the three indicators is 16 bits wide and contains a byte pointer to the *current* byte in each respective area. At the start of execution, the *Edit* instruction sets SI to the value contained in AC3 (the starting address of the source string). It also sets DI to the value contained in AC2 (the starting address of the destination string), and P to the value contained in AC0 (a pointer to the first *Edit* opcode).

During execution, the subprogram can test and modify *S* and *T*, as well as modify SI, DI and P.

When execution begins, the instruction checks the sign of the source number for validity. If the sign is invalid, the instruction ends. If the sign is valid, execution continues with the *Edit* sub-program.

The sub-program is made up of 8-bit op-codes followed by one or more 8-bit operands. The byte pointer contained in P acts as the *program counter* for the subprogram. The subprogram proceeds sequentially until a branching operation occurs — much the same way programs are processed. Unless instructed to do otherwise, the *Edit* instruction updates P after each operation to point to the next sequential op-code. The instruction continues to process 8-bit opcodes until directed to stop by the DEND op-code. Note that all 8-bit opcodes must be contained in the current segment.

Upon successful termination, carry contains *T*; AC0 contains P, which points to the next opcode to be processed; AC1 is undefined; AC2 contains DI, which points to the next destination byte; and AC3 contains SI, which points to the next source byte. The value of carry is indeterminate and *overflow* is 0.

> NOTES: *If SI references bytes not contained in the source number, then the instruction supplies zeroes for future manipulations. The instruction will use these zeroes for all subsequent operations, even if SI later references bytes contained by the source number.*
>
> *Opcodes that move numeric data may perform special actions. Opcodes that move non-numeric data copy characters exactly into the destination string.*
>
> *The* Edit *instruction places information on the wide stack. Therefore, the stack must be set up and have at least 16 words available for use.*
>
> *If an interrupt occurs during the* Edit *instruction, the instruction places restart information on the stack and in the accumulators and sets bit 2 of the PSR to 1.*
>
> *If bit 2 of the PSR contains a 1, then the* Edit *instruction assumes it is restarting from an interrupt. Make sure you do not set this bit under any other circumstances.*

Many of the *Edit* opcodes use the symbol *j*. This symbol represents a number; when *j* is greater than or equai to zero, it specifies the number of characters the instruction should process. When *j* is less than zero, it represents a pointer into the wide stack. The pointer references a stack word that denotes the number of characters the instruction should process. The number on the stack is at address:

$$WSP + 2 + 2*j.$$

An *Edit* operation that processes numeric data (e.g., DMVN) skips a leading or trailing sign code it encounters; similarly, such an operation converts a high-order or low-order sign to its correct numeric equivalent.

Add To DI

DADI *p0*

| | | | | | | | | |
|---|---|---|---|---|---|---|---|---|
| 0 | 0 | 0 | 1 | 0 | 0 | 1 | 0 | p0 |
| 0 | 1 | 2 | 3 | 4 | 5 | 6 | 7 | 8 … 15 |

Adds the 8-bit two's complement integer specified by *p0* to the Destination Indicator (DI).

Add To P Depending On S

DAPS *p0*

| | | | | | | | | |
|---|---|---|---|---|---|---|---|---|
| 0 | 0 | 0 | 0 | 1 | 1 | 1 | 1 | p0 |
| 0 | 1 | 2 | 3 | 4 | 5 | 6 | 7 | 8 … 15 |

If *S* is 0, the instruction adds the 8-bit two's complement integer specified by *p0* to the op-code Pointer (P). Before the add is performed, P is pointing to the byte containing the DAPS op-code.

Add To P Depending On T

DAPT *p0*

| | | | | | | | | |
|---|---|---|---|---|---|---|---|---|
| 0 | 0 | 0 | 0 | 1 | 0 | 1 | 1 | p0 |
| 0 | 1 | 2 | 3 | 4 | 5 | 6 | 7 | 8 … 15 |

If *T* is one, the instruction adds the 8-bit two's complement integer specified by *p0* to the op-code Pointer (P). Before the add is performed, P is pointing to the byte containing the DAPT op-code.

Add To P

DAPU *p0*

| | | | | | | | | |
|---|---|---|---|---|---|---|---|---|
| 0 | 0 | 0 | 1 | 0 | 1 | 1 | 1 | p0 |
| 0 | 1 | 2 | 3 | 4 | 5 | 6 | 7 | 8 … 15 |

Adds the 8-bit two's complement integer specified by *p0* to the op-code Pointer (P). Before the add is performed, P is pointing to the byte containing the DAPU op-code.

Add To SI

DASI *p0*

| | | | | | | | | |
|---|---|---|---|---|---|---|---|---|
| 0 | 0 | 0 | 1 | 0 | 0 | 1 | 1 | p0 |
| 0 | 1 | 2 | 3 | 4 | 5 | 6 | 7 | 8 … 15 |

Adds the 8-bit two's complement integer specified by *p0* to the Source Indicator (SI).

Decrement And Jump If Non-Zero

DDTK *k,p0*

| | | | | | | | | | |
|---|---|---|---|---|---|---|---|---|---|
| 0 | 0 | 0 | 0 | 0 | 0 | 1 | 1 | k | p0 |
| 0 | 1 | 2 | 3 | 4 | 5 | 6 | 7 | 8 … 15 | 16 … 23 |

Decrements a word in the stack by one. If the decremented value of the word is non-zero, the instruction adds the 8-bit two's complement integer specified by *p0* to the op-code Pointer (P). Before the add is performed, P is pointing to the byte containing the DDTK op-code. If the 8-bit two's complement integer specified by *k* is negative, the word decrement is at the address (WSP + 2 + (2*)*k*). If *k* is positive, the word decremented is at the address (WFP + 2 + (2*)*k*).

End Edit

DEND

| 0 | 1 | 2 | 3 | 4 | 5 | 6 | 7 |
|---|---|---|---|---|---|---|---|
| 0 | 0 | 0 | 0 | 0 | 0 | 0 | σ |

Terminates the EDIT sub-program.

Insert Characters Immediate

DICI *n,p0,p1,...,p(n-1)*

| 0 | 1 | 2 | 3 | 4 | 5 | 6 | 7 | 8–15 | 16–23 | 24–31 | 40–47 |
|---|---|---|---|---|---|---|---|---|---|---|---|
| 0 | 0 | 0 | 1 | 0 | 0 | 0 | 1 | n | p0 | p1 | p(n-1) |

Inserts *n* characters from the op-code stream into the destination field beginning at the position specified by DI. Increases P by $(n+2)$, and increases DI by *n*.

Insert Character J Times

DIMC *j,p0*

| 0 | 1 | 2 | 3 | 4 | 5 | 6 | 7 | 8–15 | 16–23 |
|---|---|---|---|---|---|---|---|---|---|
| 0 | 0 | 0 | 1 | 0 | 1 | 0 | 1 | j | p0 |

Inserts the character specified by *p0* into the destination field a number of times equal to *j* beginning at the position specified by DI. Increases DI by *j*.

Insert Character Once

DINC *p0*

| 0 | 1 | 2 | 3 | 4 | 5 | 6 | 7 | 8–15 |
|---|---|---|---|---|---|---|---|---|
| 0 | 0 | 0 | 1 | 0 | 0 | 0 | 0 | p0 |

Inserts the character specified by *p0* in the destination field at the position specified by DI. Increments DI by 1.

Insert Sign

DINS *p0,p1*

| 0 | 1 | 2 | 3 | 4 | 5 | 6 | 7 | 8–15 | 16–23 |
|---|---|---|---|---|---|---|---|---|---|
| 0 | 0 | 0 | 0 | 1 | 1 | 1 | 0 | p0 | p1 |

If the Sign flag (S) is 0, the instruction inserts the character specified by *p0* in the destination field at the position specified by DI. If *S* is 1, the instruction inserts the character specified by *p1* in the destination field at the position specified by DI. Increments DI by 1.

Insert Character Suppress

DINT *p0,p1*

| 0 | 1 | 2 | 3 | 4 | 5 | 6 | 7 | 8–15 | 16–23 |
|---|---|---|---|---|---|---|---|---|---|
| 0 | 0 | 0 | 0 | 1 | 0 | 1 | 0 | p0 | p1 |

If the significance Trigger *(T)* is 0, the instruction inserts the character specified by *p0* in the destination field at the position specified by DI. If *T* is 1, the instruction inserts the character specified by *p1* in the destination field at the position specified by DI. Increments DI by 1.

Move Alphabetics

DMVA *j*

| 0 | 1 | 2 | 3 | 4 | 5 | 6 | 7 | 8–15 |
|---|---|---|---|---|---|---|---|---|
| 0 | 0 | 0 | 0 | 1 | 1 | 0 | 1 | j |

Moves *j* characters from the source field beginning at the position specified by SI to the destination field beginning at the position specified by DI. Increases both SI and DI by *j*. Sets *T* to 1.

Initiates a commercial fault if the attribute specifier word indicates that the source field is data type 5 (packed). Initiates a commercial fault if any of the characters moved is not an alphabetic (A-Z, a-z, or space).

Move Characters

DMVC *j*

| 0 | 1 | 2 | 3 | 4 | 5 | 6 | 7 | 8–10 | 11 |
|---|---|---|---|---|---|---|---|---|---|
| 0 | 0 | 0 | 0 | 1 | 1 | 0 | 0 | | j |

Increments SI if the source data type is 3 and $j>0$. The instruction then moves *j* characters from the source field beginning at the position specified by SI to the destination field beginning at the position specified by DI. Increases both SI and DI by *j*. Sets *T* to 1.

Initiates a commercial fault if the attribute specifier word indicates that the source is data type 5 (packed). Performs no validation of the characters.

Move Float

DMVF *j,p0,p1,p2*

| 0 | 1 | 2 | 3 | 4 | 5 | 6 | 7 | 8–15 | 16–23 | 24–31 | 32–39 |
|---|---|---|---|---|---|---|---|---|---|---|---|
| 0 | 0 | 0 | 1 | 0 | 1 | 0 | 0 | j | p0 | p1 | p2 |

If the source data type is 3, $j>0$, and SI points to the sign of the source number, the instruction increments SI. Then for *j* characters, the instruction either places a digit substitute in the destination field beginning at the position specified by DI, or it moves a digit from the source field beginning at the position specified by SI to the destination field beginning at the position specified by DI. When *T* changes from 0 to 1, the instruction places both the digit substitute and the digit in the destination field, and compares *j* to the number of digits left to move. Increments SI by the smaller of the two values.

Move Numerics j\8") Increments SI if the source data type is 3 and $j>0$. Moves $j$ characters from the source field beginning at the position specified by SI to the destination field beginning at the position specified by DI. Increases DI by $j$. Compares $j$ to the number of source characters left to move, and increments SI by the smaller of the two values. Sets $T$ to 1.

Initiates a commercial fault if any of the characters moved is not valid for the specified data type.

Move Digit With Overpunch

DMVO *p0,p1,p2,p3*

| | | | | | | | | | | | |
|---|---|---|---|---|---|---|---|---|---|---|---|
| 0 | 0 | 0 | 0 | 0 | 1 | 1 | 1 | p0 | p1 | p2 | p3 |
| 0 | 1 | 2 | 3 | 4 | 5 | 6 | 7 | 8–15 | 16–23 | 24–31 | 32–39 |

Increments SI if the source data type is 3 and SI points to the sign of the source number. The instruction then either places a digit substitute in the destination field at the position specified by DI, or it moves a digit plus overpunch the source field at the position specified by SI to the destination field at the position specified by DI. Increases DI by 1. Compares the number of digits left to move with 1 and increments SI by the smaller of the two values.

If the digit is a zero or space and $S$ is 0, then the instruction places *p0* in the destination field. If the digit is a zero or space and $S$ is 1, then the instruction places *p1* in the destination field. If the digit is a non-zero and $S$ is 0, the instruction adds *p2* to the digit and places the result in the destination field. If the digit is a non-zero and $S$ is 1, the instruction adds *p3* to the digit and places the result in the destination field. If the digit is a non-zero the instruction sets $T$ to 1. The instruction assumes *p2* and *p3* are ASCII characters.

The instruction initiates a commercial fault if the character is not valid for the specified data type.

Move Numeric With Zero Suppression

DMVS *j,p0*

| | | | | | | | | | |
|---|---|---|---|---|---|---|---|---|---|
| 0 | 0 | 0 | 1 | 0 | 1 | 1 | 0 | j | p0 |
| 0 | 1 | 2 | 3 | 4 | 5 | 6 | 7 | 8–15 | 16–23 |

Increments SI if the source data type is 3 and $j>0$, and SI points to the sign of the source number. The instruction then moves $j$ characters from the source field beginning at the position specified by SI to the destination field beginning at the position specified by DI. Moves the digit from the source to the destination if $T$ is 1. Replaces all zeros and spaces with *p0* as long as $T$ is 0. Sets $T$ to 1 when the first non-zero digit is encountered. Increases DI by $j$. Compares $j$ to the number of source characters left to move, and increments SI by the smaller of the two values.

Initiates a commercial fault if any of the characters moved is not a numeric (0-9 or space).

End Float

DNDF *p0,p1*

| | | | | | | | | | |
|---|---|---|---|---|---|---|---|---|---|
| 0 | 0 | 0 | 0 | 0 | 0 | 0 | 1 | p0 | p1 |
| 0 | 1 | 2 | 3 | 4 | 5 | 6 | 7 | 8–15 | 16–23 |

**If *T* is 1, the instruction places nothing in the destination field and leaves DI unchanged. If *T* is 0 and *S* is 0, the instruction places *p0* in the destination field at the position specified by DI. If *T* is 0 and *S* is 1, the instruction places *p1* in the destination field at the position specified by DI. Increases DI by 1, and sets *T* to 1.**

Set S To One

DSSO

| 0 | 0 | 0 | 0 | 0 | 1 | 0 | 1 |
|---|---|---|---|---|---|---|---|
| 0 | 1 | 2 | 3 | 4 | 5 | 6 | 7 |

Sets the Sign flag *(S)* to 1.

Set S To Zero

DSSZ

| 0 | 0 | 0 | 0 | 0 | 1 | 0 | 0 |
|---|---|---|---|---|---|---|---|
| 0 | 1 | 2 | 3 | 4 | 5 | 6 | 7 |

Sets the Sign flag *(S)* to 0.

Store In Stack

DSTK *k,p0*

| 0 | 0 | 0 | 0 | 0 | 0 | 1 | 0 | k | p0 |
|---|---|---|---|---|---|---|---|---|---|
| 0 | 1 | 2 | 3 | 4 | 5 | 6 | 7 | 8–15 | 16–23 |

Stores the byte specified by *p0* in bits 24-31 of a word in the wide stack. Sets bits 0-23 of the word that receives *p0* to 0. If the 8-bit two's complement integer specified by *k* is negative, the instruction addresses the word receiving *p0* by (WSP + 2 + (2*)*k*). If *k* is positive then the instruction stores *p0* at the address (WFP + 2 + (2*)*k*).

Set T To One

DSTO

| 0 | 0 | 0 | 0 | 1 | 0 | 0 | 1 |
|---|---|---|---|---|---|---|---|
| 0 | 1 | 2 | 3 | 4 | 5 | 6 | 7 |

Sets the significance Trigger *(T)* to 1.

Set T To Zero

DSTZ

| 0 | 0 | 0 | 0 | 0 | 1 | 1 | 0 |
|---|---|---|---|---|---|---|---|
| 0 | 1 | 2 | 3 | 4 | 5 | 6 | 7 |

Sets the significance Trigger *(T)* to 0.

Wide Fix from Floating Point Accumulator

WFFAD *ac,fpac*

| | | | | | | | | | | | | | |
|---|---|---|---|---|---|---|---|---|---|---|---|---|---|
| 1 | AC | FPAC | 1 | 0 | 0 | 1 | 0 | 0 | 1 | 1 | 0 | 0 | 1 |
| 0 | 1–2 | 3–4 | 5 | 6 | 7 | 8 | 9 | 10 | 11 | 12 | 13 | 14 | 15 |

Converts the integer portion of the floating point number contained in the specified FPAC to a 32-bit, signed, two's complement integer. Places the result in an accumulator.

If the integer portion of the number contained in FPAC is less than -2,147,483,649 or greater than +2,147,483,648, the instruction sets *MOF* in the FPSR to 1. Takes the absolute value of the integer portion of the number contained in the FPAC. Takes the 31 least significant bits of the absolute value and appends a 0 onto the leftmost bit to give a 32-bit number. If the sign of the number is negative, formes the two's complement of the 32-bit result. Places the 32-bit integer in the specified accumulator.

If the integer portion is within the range of -2,147,483,648 to +2,147,483,647 inclusive, the instruction places the 32-bit, two's complement of the integer portion of the number contained in the FPAC in the specified accumulator.

The instruction leaves the FPAC and the *Z* and *N* flags of the FPSR unchanged.

Wide Float from Fixed Point Accumulator

WFLAD *ac,fpac*

| | | | | | | | | | | | | | |
|---|---|---|---|---|---|---|---|---|---|---|---|---|---|
| 1 | AC | FPAC | 1 | 0 | 0 | 1 | 0 | 1 | 0 | 1 | 0 | 0 | 1 |
| 0 | 1–2 | 3–4 | 5 | 6 | 7 | 8 | 9 | 10 | 11 | 12 | 13 | 14 | 15 |

Converts the contents of a 32-bit accumulator to floating point format and places the result in a specified FPAC.

Converts the 32-bit, signed, two's complement number contained in the specified accumulator to a double precision floating point number. Places the result in the specified FPAC. Updates the *Z* and *N* flags in the floating point status register to reflect the new contents of the FPAC.

The range of numbers that can be converted is -2,147,483,648 to +2,147,483,647 inclusive.

Wide Floating Point Pop

WFPOP

| | | | | | | | | | | | | | | | |
|---|---|---|---|---|---|---|---|---|---|---|---|---|---|---|---|
| 1 | 0 | 1 | 0 | 0 | 1 | 1 | 1 | 1 | 0 | 0 | 0 | 1 | 0 | 0 | 1 |
| 0 | 1 | 2 | 3 | 4 | 5 | 6 | 7 | 8 | 9 | 10 | 11 | 12 | 13 | 14 | 15 |

Pops the state of the floating point unit off the wide stack.

Pops a 20-word block off the wide stack and loads the contents into the FPSR and the four FPACs. The format of the 20-word block is shown below.

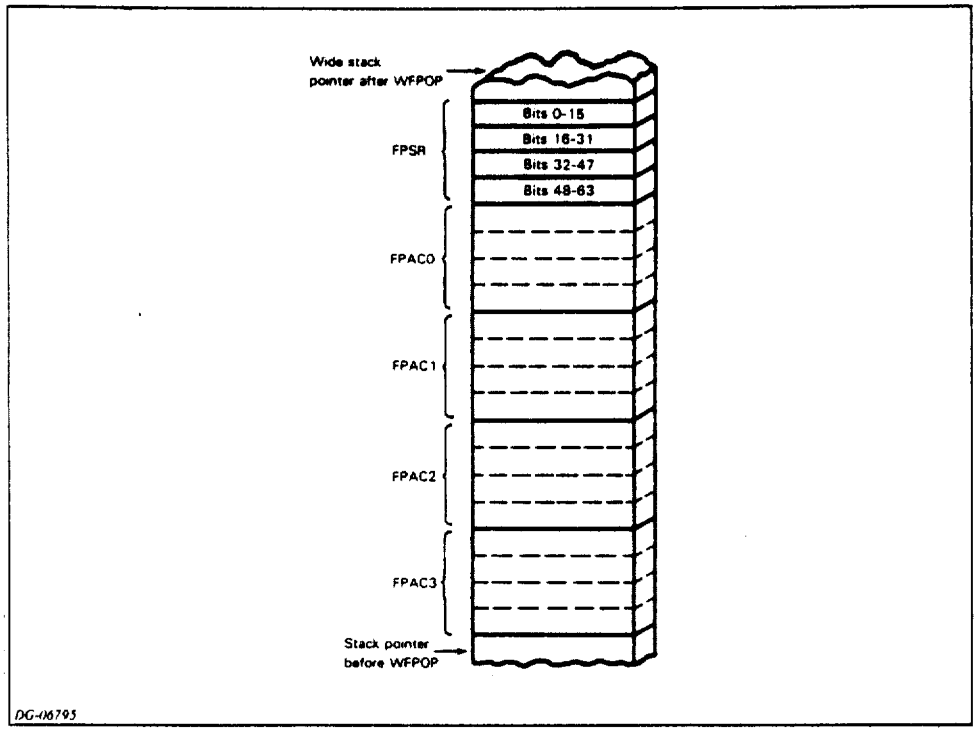

This instruction loads the FPSR as follows:

- Places bits 0-15 of the operand in bits 0-15 of the FPSR. Sets bits 16-32 of the FPSR to 0.
- If *ANY* is 0, bits 33-63 of the FPSR are undefined.
- If *ANY* is 1, the instruction places the value of the current segment in bits 33-35 of the FPSR, zeroes in bits 36-48, and bits 17-31 of the operand in bits 49-63 of the FPSR.

NOTES: *This instruction moves unnormalized data without change.*

*This instruction does not set the* ANY *flag from memory. If any of bits 1-4 are loaded as 1,* ANY *is set to 1; otherwise,* ANY *is 0.*

*Bits 12-15 of the FPSR are not set from memory. These bits are the floating point identification code an are read protected. In the MV/8000 they are set to 0111.*

*This instruction does not initiate a floating point trap under any conditions of the FPSR.*

See Chapter 8 and Appendix G for more information about floating point manipulation.

Wide Floating Point Push

WFPSH

| 1 | 0 | 0 | 0 | 0 | 1 | 1 | 1 | 1 | 0 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Pushes the state of the floating point unit onto the wide stack.

Pushes a 20-word block onto the wide stack. The block contains the contents of the FPSR and the contents of the four FPACs, as shown in the figure below:

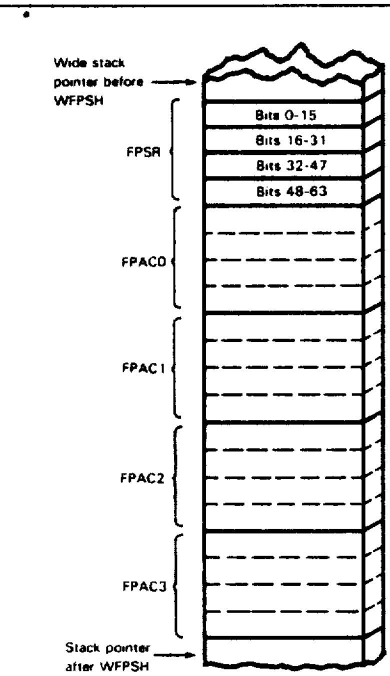

The instruction pushes the FPSR onto the stack as follows:

- Stores bits 0-15 of the FPSR in the first memory word.
- Sets bits 16-31 of the first memory double word and bit 0 of the second memory double word to 0.
- If *ANY* is 0, the contents of bits 1-31 of the second memory double word are undefined.
- If *ANY* is 1, the instruction stores bits 33-63 of the FPSR into bits 1-31 of the second memory double word.

The rest of the block is pushed onto the stack after the FPSR has been pushed.

NOTES: *This instruction moves unnormalized data without change.*

*This instruction does not initiate a floating point trap under any conditions of the FPSR.*

See Chapter 8 and Appendix G for more information about floating point manipulation.

Wide Search Queue Forward

WFSAC

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 0 | 1 | 1 | 0 |

See instruction entry "Search Queue".

Wide Search Queue Forward

WFSAS

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 0 | 1 | 0 | 0 |

See instruction entry "Search Queue".

Wide Search Queue Forward

WFSE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 1 | 0 | 0 | 0 |

See instruction entry "Search Queue".

Wide Search Queue Forward

WFSGE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 1 | 0 | 1 | 0 |

See instruction entry "Search Queue".

Wide Search Queue Forward

WFSLE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 1 | 1 | 0 | 0 |

See instruction entry "Search Queue".

Wide Search Queue Forward

WFSNE

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 1 | 1 | 1 | 0 |

See instruction entry "Search Queue".

Wide Search Queue Forward

WFSSC

| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 0 | 0 | 1 | 0 |

See instruction entry "Search Queue".

Wide Search Queue Forward

WFSSS

| | | | | | | | | | | | | | | | | | | | | | |
|---|---|---|---|---|---|---|---|---|---|---|---|---|---|---|---|---|---|---|---|---|---|
| 1 | 1 | 0 | 0 | 0 | 1 | 1 | 1 | 0 | 0 | 0 | 1 | 1 | 0 | 0 | 1 | RESERVED | 1 | 0 | 0 | 0 | 0 |
| 0 | 1 | 2 | 3 | 4 | 5 | 6 | 7 | 8 | 9 | 10 | 11 | 12 | 13 | 14 | 15 | 16–26 | 27 | 28 | 29 | 30 | 31 |

See instruction entry "Search Queue".

Wide Halve

WHLV *ac*

| | | | | | | | | | | | | | |
|---|---|---|---|---|---|---|---|---|---|---|---|---|---|
| 1 | 1 | 1 | AC | 1 | 1 | 0 | 0 | 1 | 0 | 1 | 1 | 0 | 0 | 1 |
| 0 | 1 | 2 | 3–4 | 5 | 6 | 7 | 8 | 9 | 10 | 11 | 12 | 13 | 14 | 15 |

Divides the 32-bit contents of the specified accumulator by 2 and rounds the result toward 0.

The signed, 32-bit two's complement number contained in the specified accumulators divided by 2 and rounded toward 0. The result is placed in the specified accumulator.

This instruction leaves carry unchanged; *overflow* is 0.

Wide Increment

WINC *acs,acd*

| | | | | | | | | | | | | | |
|---|---|---|---|---|---|---|---|---|---|---|---|---|---|
| 1 | ACS | ACD | 0 | 1 | 0 | 0 | 1 | 0 | 1 | 1 | 0 | 0 | 1 |
| 0 | 1–2 | 3–4 | 5 | 6 | 7 | 8 | 9 | 10 | 11 | 12 | 13 | 14 | 15 |

Increments an integer contained in an accumulator.

The instruction increments the 32-bit contents of ACS by 1 and loads the result into ACD. Sets carry to the value of ALU carry. Sets *overflow* to 1 if there is an ALU overflow. The contents of ACS remain unchanged, unless ACS equals ACD.

Wide Inclusive OR

WIOR *acs,acd*

| | | | | | | | | | | | | | |
|---|---|---|---|---|---|---|---|---|---|---|---|---|---|
| 1 | ACS | ACD | 1 | 0 | 0 | 0 | 1 | 1 | 0 | 1 | 0 | 0 | 1 |
| 0 | 1–2 | 3–4 | 5 | 6 | 7 | 8 | 9 | 10 | 11 | 12 | 13 | 14 | 15 |

Performs an inclusive OR between two accumulators.

Forms the logical inclusive OR between corresponding bits of ACS and ACD. Loads the 32-bit result into ACD. The contents of ACS remain unchanged. Carry is unchanged and *overflow* is 0.

Wide Inclusive OR Immediate

WIORI *ac, immediate*

| | | | | | | | | | | | | | | |
|---|---|---|---|---|---|---|---|---|---|---|---|---|---|---|---|
| 1 | 0 | 0 | AC | 1 | 1 | 0 | 1 | 0 | 1 | 0 | 1 | 0 | 0 | 1 | IMMEDIATE |
| 0 | 1 | 2 | 3–4 | 5 | 6 | 7 | 8 | 9 | 10 | 11 | 12 | 13 | 14 | 15 | 16–47 |

Performs an inclusive OR.

The instruction forms the logical inclusive OR between corresponding bits of the specified accumulator and the value contained in the literal field. The instruction places the result of the inclusive OR in the specified accumulator. Carry is unchanged and *overflow* is 0.

Wide Load with Wide Immediate

WLDAI *ac,immediate*

| 1 | 1 | 0 | AC | 1 | 1 | 0 | 1 | 0 | 0 | 0 | 1 | 0 | 0 | 1 | IMMEDIATE |
|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 … 47 |

Loads the 32-bit value contained in the immediate field into the specified accumulator. Carry is unchanged and *overflow* is 0.

Wide Load Byte

WLDB *acs,acd*

| 1 | ACS | ACD | 1 | 0 | 1 | 0 | 0 | 1 | 0 | 1 | 0 | 0 | 1 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Uses the 32-bit byte address contained in ACS to load a byte into ACD. Sets bits 0–23 of ACD to zero. Bits 24–31 of ACD contain a copy of the contents of the addressed byte. The contents of ACS remain unchanged, unless ACS and ACD are the same accumulator. Carry is unchanged and *overflow* is 0.

Wide Load Integer

WLDI *fpac*

| 1 | 1 | 1 | FPAC | 1 | 1 | 1 | 1 | 0 | 1 | 0 | 1 | 0 | 0 | 0 |
|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 |

Translates a decimal integer from memory to floating point format and places the result in a floating point accumulator.

AC1 must contain the data-type indicator describing the integer.

AC3 must contain a 32-bit byte pointer pointing to the high-order byte of the integer in memory.

Uses AC1 and AC3 to convert a decimal integer to floating point form. Normalizes the result and places it in the specified FPAC. Updates the *Z* and *N* flags in the FPSR to describe the new contents of the specified FPAC. Leaves the decimal number unchanged in memory.

By convention, the first byte of a number stored according to data type 7 contains the sign and exponent of the floating point number. The instruction copies each byte (following the lead byte) directly to the mantissa of the specified FPAC. It then sets to zero each low-order byte in the FPAC that does not receive data from memory.

Upon successful completion, AC0 and AC1 remain unchanged. AC2 contains the original contents of AC3. AC3 points to the first byte following the integer field. Carry is unchanged and *overflow* is 0.

Wide Load Integer Extended

WLDIX

| 1 | 1 | 0 | 0 | 0 | 1 | 1 | 1 | 0 | 1 | 0 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Distributes a decimal integer of data type 0, 1, 2, 3, 4, or 5 into the four FPACs.

AC1 must contain the data-type indicator describing the integer.

AC3 must contain a 32-bit byte pointer which is the address of the high-order byte of the integer.

The instruction uses the contents of AC3 to reference the integer. Extends the integer with high-order zeros until it is 32 digits long. Divides the integer into 4 units of 8 digits each and converts each unit to a floating point number. Places the number obtained from the 8 high-order digits into FAC0. Places the number obtained from the next 8 digits into FAC1. Places the number obtained from the next 8 digits into FAC2. Places the number obtained from the low-order 8 bits into FAC3. Sets the sign of each FPAC by checking the number just loaded into the FPAC. If the FPAC contains a nonzero number, then sets the sign of the FPAC to be the sign of the integer. If the FPAC contains an 8-digit zero, sets the FPAC to true zero. The *Z* and *N* flags in the floating point status register are unpredictable.

Upon successful termination, the contents of AC0 and AC1 remain unchanged. AC2 contains the original contents of AC3. AC3 points to the first byte following the integer field. Carry is unchanged and *overflow* is 0.

Wide Locate Lead Bit

WLOB *acs,acd*

| 1 | ACS | ACD | 0 | 1 | 1 | 1 | 0 | 1 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Counts the number of high-order zeroes in ACS. Adds the count of high-order zeroes to the 32-bit, signed contents of ACD. Stores the result of the add in ACD. The contents of ACS remain unchanged, unless ACS and ACD are the same accumulator. Carry is unchanged and *overflow* is 0.

Wide Locate and Reset Lead Bit

WLRB *acs,acd*

| 1 | ACS | ACD | 0 | 1 | 1 | 1 | 0 | 1 | 1 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Counts the number of high-order zeroes in ACS.

The instruction counts the high order zeroes in ACS. Adds the count of high-order zeroes to the 32-bit, signed contents of ACD. Stores the result in ACD. Sets the leading bit of ACS to 0. Carry is unchanged and *overflow* is 0.

If ACS equals ACD, then sets the leading bit to 0 and adds nothing to the contents of the specified accumulator.

Wide Logical Shift

WLSH *acs,acd*

| 1 | ACS | | ACD | | 1 | 0 | 1 | 0 | 1 | 0 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Shifts the 32-bit contents of ACD either left or right.

Bits 24–31 of ACS specify the number of bits to shift ACD. If this number is positive, then the instruction shifts the contents of ACD the appropriate number of bits to the left. If this number is negative, then the instruction shifts the contents of ACD the appropriate number of bits to the right. If ACS contains zero, then no shifting occurs. The instruction ignores bits 0–23 of ACS.

Bits shifted out during this instruction are lost. Zeroes fill the vacated bit positions. The contents of ACS remain unchanged, unless ACD equals ACS. Carry is unchanged and *overflow* is 0.

Wide Logical Shift Immediate

WLSI *n,ac*

| 1 | N | | AC | | 1 | 0 | 1 | 1 | 0 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Shifts the contents of the specified accumulator to the left $n+1$ positions, where $n$ is in the range 0 to 3. Carry is unchanged and *overflow* is 0.

NOTE: *The assembler takes the coded value of* n *and subtracts one from it before placing it in the immediate field. Therefore, the programmer should code the exact value that he wishes to shift.*

Wide Load Sign

WLSN

| 1 | 1 | 0 | 0 | 0 | 1 | 1 | 1 | 0 | 1 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Evaluates a decimal number as zero or nonzero, and the sign as positive or negative.

AC1 must contain the data type indicator describing the number.

AC3 must contain a byte pointer which is the address of the high-order byte of the number.

The instruction evaluates a decimal number in memory and returns in AC1 a code that classifies the number as zero or nonzero and identifies its sign. The meaning of the returned code is as follows:

| Value of Number | Code |
|---|---|
| Positive non-zero | +1 |
| Negative non-zero | -1 |
| Positive zero | 0 |
| Negative zero | -2 |

Upon successful termination, the contents of AC0 remain unchanged; AC1 contains the value code; AC2 contains the original contents of AC3; and the contents of AC3 are unpredictable. The contents of the addressed memory locations remain unchanged.

Carry is unchanged and *overflow* is 0.

Wide Move

WMOV *acs,acd*

| 1 | ACS | | ACD | | 0 | 1 | 1 | 0 | 1 | 1 | 1 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Moves a copy of the 32-bit contents of ACS into ACD. The contents of ACS remain unchanged. Carry is unchanged and *overflow* is 0.

Wide Modify Stack Pointer

WMSP *ac*

| 1 | 0 | 0 | AC | | 1 | 1 | 0 | 1 | 1 | 1 | 1 | 1 | 0 | 0 | 0 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Changes the value of the stack pointer and tests for potential overflow.

Shifts the contents of the specified accumulator left one bit. Adds the shifted value to the contents of the WSP and temporarily saves the result. Checks for fixed point overflow. If overflow occurs, the processor does not alter WSP and treats the overflow as a stack fault. AC1 contains the code 1.

If no overflow occurs, the instruction checks the value of the result. If the result is positive, the processor checks it against the stack limit for stack overflow; if negative, against the stack limit for stack underflow. If underflow or overflow does not occur, the instruction loads WSP with the saved value.

If either overflow or underflow occurs, the instruction does not alter WSP and a stack fault occurs. AC1 contains the code 1. The PC in the return block points to this instruction.

This instruction does not change carry; *overflow* is 0.

Wide Multiply

WMUL *acs,acd*

| 1 | ACS | | ACD | | 0 | 0 | 1 | 0 | 1 | 1 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Multiplies two integers contained in accumulators.

The instruction multiplies the 32-bit, signed integer contained in ACD by the 32-bit, signed integer contained in ACS. Places the 32 least significant bits of the result in ACD. The contents of ACS and carry remain unchanged. *Overflow* is 0.

If the result is outside the range of -2,147,483,648 to +2,147,483,647 inclusive, sets *overflow* to 1; otherwise, *overflow* is 0. ACD will contain the 32 least significant bits of the result.

Wide Signed Multiply
WMULS

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 1 | 0 | 0 | 1 | 1 | 1 | 0 | 1 | 0 | 1 | 1 | 0 | 0 | 1 |

Multiplies two integers contained in accumulators.

The instruction multiplies the 32-bit, signed integer contained in AC1 by the 32-bit, signed integer contained in AC2. Adds the 32-bit signed integer contained in AC0 to the 64-bit result. Loads the 64-bit result into AC0 and AC1. AC0 contains the 32 high-order bits. AC2 and carry remain unchanged. *Overflow* is 0.

Wide Add with Narrow Immediate
WNADI *ac,immediate*

| 0 | 1 | 2 | 3–4 | 5 | 6 | 7 | 8 | 9 | 10 | 11 | 12 | 13 | 14 | 15 | 16–31 |
|---|---|---|---|---|---|---|---|---|---|---|---|---|---|---|---|
| 1 | 1 | 1 | AC | 1 | 1 | 0 | 1 | 1 | 1 | 1 | 1 | 0 | 0 | 1 | IMMEDIATE |

Adds an immediate value to an integer contained in an accumulator.

The instruction sign extends the two's complement literal value contained in the immediate field to 32 bits. Adds the sign extended value to the 32-bit integer contained in the specified accumulator. Loads the result into the specified accumulator. Sets carry to the value of ALU carry. Sets *overflow* to 1 if there is an ALU overflow.

Wide Negate
WNEG *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 1 | 0 | 0 | 1 | 1 | 0 | 1 | 0 | 0 | 1 |

Negates the contents of an accumulator.

The instruction forms the two's complement of the 32-bit contents of ACS. Loads the result into ACD. Sets carry to the value of ALU carry. Sets *overflow* to 1 if there is an ALU overflow. The contents of ACS remain unchanged, unless ACS equals ACD.

Wide Pop Accumulators
WPOP *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 0 | 0 | 1 | 0 | 0 | 0 | 1 | 0 | 0 | 1 |

Pops up to 4 double words off the top of the wide stack and places them in the specified 32-bit accumulators.

Pops the top double word off the wide stack and places it in ACS. Pops the next double word off the wide stack and places it in ACS-1, and so on, until all specified accumulators have been loaded. If necessary, the accumulators wrap around, with AC3 following AC0, until all specified accumulators have been loaded. If ACS equals ACD, then the instruction pops only one double word off of the wide stack and places it in the specified accumulator.

The instruction decrements the contents of WSP by twice the number of double words popped. Carry is unchanged and *overflow* is 0.

Wide Pop Block

WPOPB

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 1 | 0 | 0 | 1 | 1 | 1 | 0 | 1 | 1 | 1 | 1 | 0 | 0 | 1 |

Pops six double words off the wide stack and places them in the appropriate locations.

The popped words and their destinations are as follows:

| Double Word Popped | Destination |
|---|---|
| 1 | Bit 0 to carry; bits 1-31 to PC |
| 2 | AC3 |
| 3 | AC2 |
| 4 | AC1 |
| 5 | AC0 |
| 6 | Bit 0 to OVK; bit 1 to OVR; bit 2 to IRES; bits 17-31 are multiplied by 2 and incremented by 12. This number is subtracted from WSP. WSP is loaded with the result. |

If the instruction specifies an inward ring crossing, then a protection fault occurs and the current wide stack remains unchanged. Note that the return block pushed as a result of the protection fault will contain undefined information. After the fault return block is pushed, AC0 contains the contents of the PC (which point to the instruction that caused the fault) and AC1 contains the code 8.

If the instruction specifies an intra-ring address, it pops the six-double-word block, then checks for stack underflow. If underflow has occurred, a stack underflow fault occurs. Note that the return block pushed as a result of the stack underflow will contain undefined information. After the fault return block is pushed, AC0 contains the contents of the PC (which point to the instruction that caused the fault) and AC1 contains the code 3. If there is no underflow, execution continues with the location addressed by the program counter.

If the instruction specifies an outward ring crossing, it pops the six-double-word return block and checks for stack underflow. If underflow has occurred, a stack underflow fault occurs. Note that the return block pushed as a result of the stack underflow will contain undefined information. After the fault return block is pushed, AC0 contains the contents of the PC (which point to the instruction that caused the fault) and AC1 contains the code 3. If there is no underflow, the instruction stores WSP and WFP in the appropriate page zero locations of the current segment. It then performs the outward ring crossing and loads the wide stack registers with the contents of the appropriate page zero locations of the new ring. Loads WSP with the value:

(*current contents of WSP*) - (2 x (*argument count*))

Checks for stack underflow. If underflow has occurred, a stack underflow fault occurs. Note that the return block pushed as a result of the stack underflow will contain undefined information. After the fault return block is pushed, AC0 contains the contents of the PC (which point to the instruction that caused the fault) and AC1 contains the code 3. If there is no underflow, execution continues with the location addressed by the program counter.

Pop PC and Jump

WPOPJ

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 0 | 0 | 1 | 1 | 1 | 1 | 0 | 0 | 0 | 1 | 0 | 0 | 1 |

Pops the top 31-bit value off the wide stack, loads it into the PC, then checks for stack overflow. Carry is unchanged and *overflow* is 0.

Push Accumulators

WPSH *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 1 | 0 | 1 | 0 | 1 | 1 | 1 | 1 | 0 | 0 | 1 |

Pushes the contents of the specified 32-bit accumulators onto the top of the wide stack.

Pushes the contents of ACS onto the top of the wide stack, then pushes the contents of next sequential accumulators up to and including ACD. If necessary, the accumulators wrap around, with AC0 following AC3, until the contents of all specified accumulators have been pushed. If ACS equals ACD, then the instruction pushes the contents of only one accumulator onto the wide stack.

Note that the instruction increments the contents of WSP by two times the number of accumulators pushed (32-bit accumulators). Carry is unchanged and *overflow* is 0.

Wide Restore

WRSTR

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 0 | 0 | 1 | 1 | 1 | 1 | 0 | 0 | 1 | 1 | 0 | 0 | 1 |

Returns control from an interrupt.

When this instruction is used, the wide stack should contain the following information, in the given order:

| Contents | Size of Word | Notes |
|---|---|---|
| WFP | (32 bits) | |
| WSP | (32 bits) | |
| WSL | (32 bits) | |
| WSB | (32 bits) | |
| SFA | (Lower 16 bits) | Stack fault address |
| OVK, OVR | (Bits 0 and 1) | |
| AC0 | (32 bits) | |
| AC1 | (32 bits) | |
| AC2 | (32 bits) | |
| AC3 | (32 bits) | |
| Carry, PC | (32 bits) | This is the top of the wide stack. |

The instruction checks to see if the ring crossing specified is inward. If the crossing is inward, a protection fault occurs (code=8 in AC1).

If the crossing is not inward, the instruction pops the return block on top of the wide stack and places the block contents in the appropriate registers. Next, the instruction pops the stack registers and the stack fault address, temporarily saves them, and checks for stack underflow. If no underflow occurs, further actions depend upon the type of ring call.

If the restore is to be to the same ring, the instruction places the temporarily saved stack management information in the four stack registers. Stores the stack fault address in location $14_8$ of the current segment. Checks for stack underflow. If underflow has occurred, a stack underflow fault occurs (code=3 in AC1). If underflow has not occurred, execution continues with the location specified by the PC.

If the ring crossing is outward, the instruction stores the stack management information held internally into the appropriate page zero locations of the current segment. Performs the outward ring crossing. Loads the stack registers with the contents of the appropriate page zero locations of the new segment. Checks for stack underflow. If underflow has occurred, a stack underflow fault occurs (code=3 in AC1). If underflow has not occurred, execution continues with the location specified by the PC.

Wide Return

WRTN

| 1 | 0 | 0 | 0 | 0 | 1 | 1 | 1 | 1 | 0 | 1 | 0 | 1 | 0 | 0 | 1 |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Returns control from subroutines that issue a WSAVS or a WSAVR instruction at their entry point. Places the contents of WFP in WSP and executes a WPOPB instruction. Places the popped value of AC3 in WFP.

Wide Skip on All Bits Set in Accumulator

WSALA *ac,immediate*

| 1 | 0 | 1 | AC | 1 | 1 | 0 | 1 | 0 | 0 | 1 | 1 | 0 | 0 | 1 | IMMEDIATE |
|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 16 | 16 … 47 |

Performs a logical AND between an immediate value and the contents of an accumulator. Skips depending on the result of the AND.

The instruction performs a logical AND on the contents of the immediate field and the complement of the contents of the specified accumulator. If the result of the AND is zero, then execution skips the next sequential word before continuing. If the result of the AND is nonzero, then execution continues with the next sequential word. The contents of the specified accumulator remain unchanged. Carry is unchanged and *overflow* is 0.

Wide Skip on All Bits Set in Double-word Memory Location

WSALM *ac,immediate*

| 1 | 0 | 1 | AC | 1 | 1 | 0 | 1 | 0 | 1 | 1 | 1 | 0 | 0 | 1 | IMMEDIATE |
|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 … 47 |

Performs a logical AND between an immediate value and the complement of a memory word. Skips depending on the result of the AND.

The instruction performs a logical AND on the contents of the immediate field and the complement of the double word addressed by the specified accumulator. If the result of the AND is zero, then execution skips the next sequential word before continuing. If the result of the AND is nonzero, then execution continues with the next sequential word. The contents of the specified accumulator and memory location remain unchanged. Carry is unchanged and *overflow* is 0.

Wide Skip on Any Bit Set in Accumulator

WSANA *ac,immediate*

| 1 | 0 | 1 | AC | 1 | 1 | 0 | 1 | 0 | 0 | 0 | 1 | 0 | 0 | 1 | IMMEDIATE |
|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 ... 47 |

Performs a logical AND between an immediate value and the contents of an accumulator. Skips depending on the result of the AND.

The instruction performs a logical AND on the contents of the immediate field and the contents of the specified accumulator. If the result of the AND is nonzero, then execution skips the next sequential word before continuing. If the result of the AND is zero, then execution continues with the next sequential word. The contents of the specified accumulator remain unchanged. Carry is unchanged and *overflow* is 0.

Wide Skip on Any Bit Set in Double-word Memory Location

WSANM *ac,immediate*

| 1 | 0 | 1 | AC | 1 | 1 | 0 | 1 | 0 | 1 | 0 | 1 | 0 | 0 | 1 | IMMEDIATE |
|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 ... 47 |

Performs a logical AND between an immediate value and the contents of a memory word. Skips depending on the result of the AND.

The instruction performs a logical AND on the contents of the immediate field and the contents of the double word addressed by the specified accumulator. If the result of the AND is nonzero, then execution skips the next sequential word before continuing. If the result of the AND is zero, then execution continues with the next sequential word. The contents of the specified accumulator and memory location remain unchanged. Carry is unchanged and *overflow* is 0.

Wide Save/Reset Overflow Mask

WSAVR

| 1 | 0 | 1 | 0 | 0 | 1 | 1 | 1 | 0 | 0 | 1 | 0 | 1 | 0 | 0 | 1 | FRAME SIZE IN DOUBLE WORDS |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 ... 31 |

Pushes a return block onto the wide stack and resets OVK.

The instruction checks for stack overflow. If an overflow would occur, then control transfers to the wide stack fault routine. If no overflow would occur, then the instruction pushes five double words of a wide six-double word return block onto the wide stack. The words pushed have the following contents:

| Double Word Pushed | Contents |
|---|---|
| 1 | AC0 |
| 2 | AC1 |
| 3 | AC2 |
| 4 | AC3 |
| 5 | carry and PC |

Note that the five words described above do not make up the entire return block. Either the LCALL or the XCALL instruction pushes the first double word of the return block onto the wide stack. This word has the following format:

| | | | | | | | | | | | | | | | | | |
|---|---|---|---|---|---|---|---|---|---|---|---|---|---|---|---|---|---|
| OVK | OVR | IRES | 0 | 0 | 0 | 0 | 0 | 0 | 0 | 0 | 0 | 0 | 0 | 0 | 0 | 0 | ARGUMENT COUNT |
| 0 | | | | | | | | | | | | | | | | | 31 |

After pushing the return block, the instruction places the value of the stack pointer in WFP and AC3. Multiplies the 16-bit, unsigned integer contained in the second instruction word by 2. Adds the result to WSP. Sets OVK to 0, disabling integer overflow.

Wide Save/Set Overflow Mask

WSAVS

| | | | | | | | | | | | | | | | | |
|---|---|---|---|---|---|---|---|---|---|---|---|---|---|---|---|---|
| 1 | 0 | 1 | 0 | 0 | 1 | 1 | 1 | 0 | 0 | 1 | 1 | 1 | 0 | 0 | 1 | FRAME SIZE IN DOUBLE WORDS |
| 0 | 1 | 2 | 3 | 4 | 5 | 6 | 7 | 8 | 9 | 10 | 11 | 12 | 13 | 14 | 15 | 16 … 31 |

Pushes a return block onto the wide stack, resets WSP and WFP, and sets OVK to 1.

The instruction checks for stack overflow. If an overflow would occur, then control transfers to the wide stack fault routine. If no overflow would occur, then the instruction pushes five double words of a wide six-double word return block onto the stack. The words pushed have the following contents:

| Double Word Pushed | Contents |
|---|---|
| 1 | AC0 |
| 2 | AC1 |
| 3 | AC2 |
| 4 | AC3 |
| 5 | carry and PC |

Note that the five double words described above do not make up the entire return block. Either the LCALL or the XCALL instruction pushes the first double word of the return block onto the wide stack. This word has the following format:

| | | | | | | | | | | | | | | | | |
|---|---|---|---|---|---|---|---|---|---|---|---|---|---|---|---|---|
| OVK | OVR | IRES | 0 | 0 | 1 | 1 | 1 | 0 | 0 | 1 | 1 | 1 | 0 | 0 | 1 | FRAME SIZE IN DOUBLE WORDS |
| 0 | 1 | 2 | 3 | 4 | 5 | 6 | 7 | 8 | 9 | 10 | 11 | 12 | 13 | 14 | 15 | 16 … 31 |

After pushing the return block, the instruction places the value of WSP in WFP and AC3. Multiplies the 16-bit, unsigned integer contained in the second instruction word by 2. Adds the result to WSP. Sets OVK to 1, enabling integer overflow.

Wide Subtract Immediate

WSBI *n,ac*

| | | | | | | | | | | | | | |
|---|---|---|---|---|---|---|---|---|---|---|---|---|---|
| 1 | N | AC | 1 | 0 | 1 | 1 | 0 | 0 | 0 | 1 | 0 | 0 | 1 |
| 0 | 1 2 | 3 4 | 5 | 6 | 7 | 8 | 9 | 10 | 11 | 12 | 13 | 14 | 15 |

Subtracts an integer in the range 1 to 4 from an integer contained in an accumulator.

The instruction subtracts the value $n+1$ from the value contained in the specified accumulator. Stores the result in the specified accumulator. Sets carry to the value of ALU carry. Sets *overflow* to 1 if there is an ALU overflow.

NOTE: *The assembler takes the coded value of* n *and subtracts 1 from it before placing it in the immediate field. Therefore, the programmer should code the exact value that he wishes to subtract.*

Wide Skip If Equal To

WSEQ *acs,acd*

| | | | | | | | | | | | | | |
|---|---|---|---|---|---|---|---|---|---|---|---|---|---|
| 1 | ACS | ACD | 0 | 0 | 0 | 1 | 0 | 1 | 1 | 1 | 0 | 0 | 1 |
| 0 | 1 2 | 3 4 | 5 | 6 | 7 | 8 | 9 | 10 | 11 | 12 | 13 | 14 | 15 |

Compares one integer to another and skips if the two integers are equal. Carry is unchanged and *overflow* is 0.

The instruction compares the 32-bit integer contained in ACS to the 32-bit integer in ACD. If the integer contained in ACS is equal to the integer contained in ACD, the next 16-bit word is skipped; otherwise, the next word is executed.

If ACS and ACD are the same accumulator, then the instruction compares the integer contained in the accumulator to zero. The skip will occur if the integer equals zero.

Wide Signed Skip If Greater Than Or Equal To

WSGE *acs,acd*

| | | | | | | | | | | | | | |
|---|---|---|---|---|---|---|---|---|---|---|---|---|---|
| 1 | ACS | ACD | 0 | 0 | 1 | 1 | 0 | 0 | 1 | 1 | 0 | 0 | 1 |
| 0 | 1 2 | 3 4 | 5 | 6 | 7 | 8 | 9 | 10 | 11 | 12 | 13 | 14 | 15 |

Compares one integer to another and skips if the first is greater than or equal to the second. Carry is unchanged and *overflow* is 0.

The instruction compares the signed, 32-bit integer contained in ACS to the signed, 32-bit integer in ACD. If the integer contained in ACS is greater than or equal to the integer contained in ACD, then the next word is skipped; otherwise, the next instruction is executed.

If ACS and ACD are the same accumulator, then the instruction compares the integer contained in the accumulator to zero. The skip will occur if the integer is greater than or equal to zero.

Wide Signed Skip If Greater Than

WSGT *acs,acd*

| | | | | | | | | | | | | | |
|---|---|---|---|---|---|---|---|---|---|---|---|---|---|
| 1 | ACS | ACD | 0 | 0 | 1 | 1 | 0 | 1 | 1 | 1 | 0 | 0 | 1 |
| 0 | 1 2 | 3 4 | 5 | 6 | 7 | 8 | 9 | 10 | 11 | 12 | 13 | 14 | 15 |

Compares one integer to another and skips if the first is greater than the second. Carry is unchanged and *overflow* is 0.

The instruction compares the signed, 32-bit integer contained in ACS to the signed 32-bit integer in ACD. If the integer contained in ACS is greater than the integer contained in ACD, the next word is skipped; otherwise, the next word is executed.

If ACS and ACD are the same accumulator, then the instruction compares the integer contained in the accumulator to zero. The skip will occur if the integer is greater than zero.

Wide Skip on Bit Set to One

WSKBO *bit number*

| | | | | | | | | | | | | |
|---|---|---|---|---|---|---|---|---|---|---|---|---|
| 1 | BITS | 1 | 1 | 1 | 1 | 0 | 1 | BITS | 1 | 0 | 0 | 1 |
| 0 | 1 3 | 4 | 5 | 6 | 7 | 8 | 9 | 10 11 | 12 | 13 | 14 | 15 |

Tests a specified bit in AC0 and skips if the bit is one.

The instruction uses the bits specified in bits 1-3 and 10–11 to specify a bit position in the range 0–31. This number specifies one bit in AC0; the value 0 specifies the highest-order bit, and the value 31 specifies the lowest-order bit. If the specified bit has the value 1, then the next sequential word is skipped. If the bit has the value 0, then the next sequential word is executed. The contents of AC0 remain unchanged. Carry is unchanged and *overflow* is 0.

Wide Skip on Bit Set to Zero

WSKBZ *bit number*

| 1 | BITS | 1 | 1 | 1 | 1 | 1 | 0 | BITS | 1 | 0 | 0 | 1 |
|---|---|---|---|---|---|---|---|---|---|---|---|---|
| 0 | 1–3 | 4 | 5 | 6 | 7 | 8 | 9 | 10–11 | 12 | 13 | 14 | 15 |

Tests a specified bit in AC0 and skips if the bit is 0.

The instruction uses the bits specified in bits 1–3 and 10–11 to specify an a bit position in the range 0–31. This number specifies one bit in AC0; the value 0 specifies the highest-order bit, and the value 31 specifies the lowest-order bit. If the specified bit has the value 0, then the next sequential word is skipped. If the bit has the value 1, then the next sequential word is executed. The contents of AC0 remain unchanged. Carry is unchanged and *overflow* is 0.

Wide Signed Skip If Less Than Or Equal To

WSLE *acs,acd*

| 1 | ACS | ACD | 0 | 0 | 1 | 1 | 0 | 1 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Compares one integer to another and skips if the first is less than or equal to the second. Carry is unchanged and *overflow* is 0.

The instruction compares the signed, 32-bit integer contained in ACS to the signed, 32-bit integer in ACD. If the integer contained in ACS is less than or equal to the integer contained in ACD, the next word is skipped; otherwise, the next sequential word is executed.

If ACS and ACD are the same accumulator, then the instruction compares the integer contained in the accumulator to zero. The skip will occur if the integer is less than or equal to zero.

Wide Signed Skip If Less Than

WSLT *acs,acd*

| 1 | ACS | ACD | 0 | 1 | 0 | 1 | 0 | 0 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Compares one integer to another and skips if the first is less than the second. Carry is unchanged and *overflow* is 0.

The instruction compares the signed, 32-bit integer contained in ACS to the signed, 32-bit integer in ACD. If the integer contained in ACS is less than the integer contained in ACD, the next word is skipped; otherwise, the next sequential word is executed.

If ACS and ACD are the same accumulator, then the instruction compares the integer contained in the accumulator to zero. The skip will occur if the integer is less than zero.

Wide Skip on Nonzero Bit

WSNB *acs,acd*

| 1 | ACS | ACD | 0 | 1 | 1 | 1 | 0 | 0 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Tests the value of an addressed bit and skips if the bit is one. Carry is unchanged and *overflow* is 0.

The instruction forms a bit pointer from the contents of ACS and ACD. ACS contains the high-order bits of the bit pointer; ACD contains the low-order bits. ACS and ACD can be specified to be the same accumulator; in this case, the specified accumulator supplies the low-order bits of the bit pointer. The high-order bits are treated as if they were zero in the current segment.

The instruction checks the value of the bit referenced by the bit pointer. If the bit has the value 1, the next sequential word is skipped. If the bit has the value 0, the next sequential instruction is executed.

Wide Skip If Not Equal To

WSNE *acs,acd*

| 1 | ACS | ACD | 0 | 0 | 1 | 1 | 0 | 0 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Compares one integer to another and skips if the two are not equal. Carry is unchanged and *overflow* is 0.

The instruction compares the 32-bit integer contained in ACS to the 32-bit integer in ACD. If the integer contained in ACS is not equal to the integer contained in ACD, then execution skips the next word; otherwise, execution proceeds with the next sequential word.

If ACS and ACD are the same accumulator, then the instruction compares the integer contained in the accumulator to zero. The skip will occur if the integer does not equal zero.

Wide Special Save/Set Overflow Mask

WSSVR

| 1 | 0 | 0 | 0 | 0 | 1 | 1 | 1 | 0 | 0 | 1 | 0 | 1 | 0 | 0 | 1 | FRAME SIZE IN DOUBLE WORDS |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16–31 |

Pushes a wide return block onto the wide stack and sets OVK to 0.

The instruction checks for stack overflow. If executing the instruction would cause an overflow, the instruction transfers control to the wide stack fault handler. The PC in the fault return block will contain the address of the WSSVR instruction.

Pushes a wide return block onto the wide stack. After pushing the sixth double word, places the value of WSP in WFP and AC3. Increments WSP by twice the frame size. The frame size is a 16-bit, unsigned integer contained in the second word of this instruction. Sets OVK to 0, which disables integer overflow. Sets OVR to 0.

The structure of the wide return block pushed is as follows:

| Word in Block | Contents |
|---|---|
| 1-2 | OVK, OVR, IRES, 29 zeroes |
| 3-4 | AC0 |
| 5-6 | AC1 |
| 7-8 | AC2 |
| 9-10 | AC3 |
| 11-12 | Previous WFP |
| 13-14 | Carry, return PC value |
| 15-18 | Stack frame |

NOTE: *This instruction saves the information required by the* WRTN *instruction.*

This instruction is typically executed after an XJSR or LJSR instruction. Note that neither of these jump instructions can perform a cross ring call. However, they may be used with WSSVS to perform an intra-ring transfer to a subroutine that requires no parameters, and that uses WRTN to return control back to the calling sequence.

Wide Special Save/Set Overflow Mask

WSSVS

| 0 | 1 | 2 | 3 | 4 | 5 | 6 | 7 | 8 | 9 | 10 | 11 | 12 | 13 | 14 | 15 | 16–31 |
|---|---|---|---|---|---|---|---|---|---|---|---|---|---|---|---|---|
| 1 | 0 | 0 | 0 | 0 | 1 | 1 | 1 | 0 | 0 | 1 | 1 | 1 | 0 | 0 | 1 | FRAME SIZE IN DOUBLE WORDS |

Pushes a wide return block onto the wide stack and sets OVK to 1.

The instruction checks for stack overflow. If executing the instruction would cause an overflow, the instruction transfers control to the wide stack fault handler. The PC in the fault return block will contain the address of the WSSVS instruction.

If no overflow would occur, the instruction pushes a wide return block onto the wide stack. After pushing the sixth double word, places the value of WSP in WFP and AC3. Increments WSP by twice the frame size (a 16-bit, unsigned integer contained in the second word of this instruction). Sets OVK to 1, which enables integer overflow. Sets OVR to 0.

The structure of the wide return block pushed is as follows:

| Word in Block | Contents |
|---|---|
| 1-2 | OVK, OVR, IRES , 29 zeroes |
| 3-4 | AC0 |
| 5-6 | AC1 |
| 7-8 | AC2 |
| 9-10 | AC3 |
| 11-12 | Previous WFP |
| 13-14 | Carry, return PC value |
| 15-18 | Stack frame |

NOTE: *This instruction saves the information required by the* WRTN *instruction.*

This instruction is typically executed after an XJSR or LJSR instruction. Note that neither of these jump instructions can perform a cross ring call. However, they may be used with WSSVR to perform an intra-ring transfer to a subroutine that requires no parameters, and that uses WRTN to return control back to the calling sequence.

Wide Store Byte

WSTB *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 1 | 0 | 1 | 0 | 0 | 1 | 1 | 1 | 0 | 0 | 1 |

Stores a copy of the rightmost byte of ACD into memory at the address specified by ACS.

ACS contains a 32-bit byte address of some location of memory.

The instruction stores a copy of ACD's bits 24–31 at the locations specified by ACS. The contents of ACS and ACD remain unchanged. Carry is unchanged and *overflow* is 0.

Wide Store Integer

WSTI *fpac*

| 0 | 1 | 2 | 3–4 | 5 | 6 | 7 | 8 | 9 | 10 | 11 | 12 | 13 | 14 | 15 |
|---|---|---|---|---|---|---|---|---|---|---|---|---|---|---|
| 1 | 1 | 1 | FPAC | 1 | 1 | 0 | 1 | 0 | 1 | 1 | 1 | 0 | 0 | 1 |

Converts a floating point number to an integer and stores it into memory.

AC1 contains the data-type indicator that describes the integer.

AC3 contains a 32-bit byte pointer to a byte in memory. The instruction will store the high order byte of the number in this location, with the low order bytes following in subsequent locations.

Under the control of accumulators AC1 and AC3, the instruction translates the contents of the specified FPAC to an integer of the specified type and stores it, right-justified, in memory beginning at the specified location. The instruction leaves the floating point number unchanged in the FPAC, and destroys the previous contents of memory at the specified location(s).

Upon successful completion, the instruction leaves accumulators AC0 and AC1 unchanged. AC2 contains the original contents of AC3. AC3 contains a byte pointer to the first byte following the destination field. The value of carry is indeterminate and *overflow* is 0.

NOTES: *If the number in the specified FPAC has any fractional part, the result of the instruction is undefined. Use the* Integerize *instruction to clear any fractional part.*

*If the number to be stored is too large to fit in the destination field, this instruction discards high-order digits until the number fits. This instruction stores the remaining low-order digits and sets carry to 1.*

*If the number to be stored does not completely fill the destination field, the data type of the number determines the instruction's actions. If the number is data type 0, 1, 2, 3, 4, or 5, the instruction sets the high-order bytes to 0. If the number is data type 6, the instruction sign extends it to fill the gap. If the number is data type 7, the instruction sets the low-order bytes to 0.*

Wide Store Integer Extended

WSTIX

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 1 | 0 | 0 | 0 | 1 | 1 | 1 | 0 | 1 | 1 | 0 | 1 | 0 | 0 | 1 |

Converts a floating point number to an integer and stores it in memory.

AC1 must contain the data-type indicator describing the integer.

AC3 must contain a 32-bit byte pointer pointing to the high-order byte of the destination field in memory.

Using the information in AC1, the instruction converts the contents of each of the FPACs to integer form. Forms a 32-bit integer from the low-order 8 digits of each FPAC. Right justifies the integer and stores it in memory beginning at the location specified by AC3. The sign of the integer is the logical OR of the signs of all four FPAC's. The previous contents of the addressed memory locations are lost. Sets carry to 0. The contents of the FPACs remain unchanged. The condition codes in the FPSR are unpredictable.

Upon successful termination, the contents of AC0 and AC1 remain unchanged; AC2 contains the original contents of AC3; and AC3 contains a byte pointer pointing to the first byte following the destination field. The contents of carry are indeterminate and *overflow* is 0.

NOTES: *If the integer is too large to fit in the destination field, the instruction discards high-order digits until the integer fits. The instruction stores remaining low-order digits and sets carry to 1.*

*If the integer does not completely fill the destination field, the data type of the integer determines the instruction's actions. If the data type is 0, 1, 2, 3, 4, or 5, the instruction sets the high-order bytes to 0. Data types 6 and 7 are illegal and will cause a commercial fault.*

Wide Subtract
WSUB *acs,acd*

| 1 | ACS | ACD | 0 | 0 | 1 | 0 | 1 | 0 | 1 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Subtracts the 32-bit integer contained in ACS from the 32-bit integer contained in ACD. Stores the result in ACD. Sets carry to the value of ALU carry. Sets *overflow* to 1 if there is an ALU overflow. The contents of ACS remain unchanged. Carry is unchanged and *overflow* is 0.

Wide Skip on Zero Bit
WSZB *acs,acd*

| 1 | ACS | ACD | 0 | 1 | 0 | 1 | 0 | 1 | 1 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Tests a bit and skips if the bit is zero. Carry is unchanged and *overflow* is 0.

The instruction forms a bit pointer from the contents of ACS and ACD. ACS contains the high-order bits of the bit pointer; ACD contains the low-order bits. ACS and ACD can be specified to be the same accumulator; in this case, the specified accumulator supplies the low-order bits of the bit pointer. The high-order bits are treated as if they were zero in the current ring.

The instruction checks the value of the bit referenced by the bit pointer. If the bit has the value 0, the next sequential word is skipped. If the bit has the value 1, the next sequential word is executed.

Wide Skip on Zero Bit and Set Bit To One
WSZBO *acs,acd*

| 1 | ACS | ACD | 0 | 1 | 1 | 1 | 0 | 0 | 1 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Tests a bit. Sets the tested bit to 1 and skips if the tested value was zero. Carry is unchanged and *overflow* is 0.

The instruction forms a bit pointer from the contents of ACS and ACD. ACS contains the high-order bits of the bit pointer; ACD contains the low-order bits. ACS and ACD can be specified to be the same accumulator; in this case, the specified accumulator supplies the low-order bits of the bit pointer. The high-order bits are treated as if they were zero.

The instruction checks the value of the bit referenced by the bit pointer. If the bit has the value 0, then the instruction sets the bit to one and skips the next sequential word. If the bit has the value 1, then no skip occurs.

Wide Unsigned Skip If Greater Than Or Equal To

WUSGE *acs,acd*

| 1 | ACS | ACD | 0 | 0 | 0 | 1 | 0 | 0 | 1 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Compares one integer to another and skips if the first is greater than or equal to the second. Carry is unchanged and *overflow* is 0.

The instruction compares the unsigned, 32-bit integer contained in ACS to the unsigned 32-bit integer in ACD. If the integer contained in ACS is greater than or equal to the integer contained in ACD, the next sequential word is skipped; otherwise, the next sequential word is executed.

If ACS and ACD are the same accumulator, then the instruction compares the integer contained in the accumulator to zero. The skip will occur if the integer is greater than or equal to zero.

Wide Unsigned Skip If Greater Than

WUSGT *acs,acd*

| 1 | ACS | ACD | 0 | 0 | 0 | 1 | 0 | 1 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Compares one integer to another and skips if the first is greater than the second. Carry is unchanged and *overflow* is 0.

The instruction compares the unsigned, 32-bit integer contained in ACS to the unsigned 32-bit integer in ACD. If the integer contained in ACS is greater than the integer contained in ACD, the next sequential word is skipped; otherwise, the next sequential word is executed.

If ACS and ACD are the same accumulator, then the instruction compares the integer contained in the accumulator to zero. The skip will occur if the integer is greater than zero.

Wide Exchange

WXCH *acs,acd*

| 1 | ACS | ACD | 0 | 1 | 1 | 0 | 1 | 1 | 0 | 1 | 0 | 0 | 1 |
|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 |

Exchanges the 32-bit contents of ACS and ACD. Carry is unchanged and *overflow* is 0.

Wide Extended Operation

WXOP *acs,acd,operation #*

| 0 | 1 | 2 | 3 | 4 | 5 | 6 | 7 | 8 | 9 | 10 | 11 | 12 | 13 | 14 | 15 | 16–17 | 18–19 | 20 | 21 | 22 | 23 | 24 | 25 | 26–30 | 31 |
|---|---|---|---|---|---|---|---|---|---|---|---|---|---|---|---|---|---|---|---|---|---|---|---|---|---|
| 1 | 0 | 1 | 0 | 0 | 1 | 1 | 1 | 0 | 0 | 0 | 0 | 1 | 0 | 0 | 1 | ACS | ACD | 0 | 0 | 0 | 0 | 0 | 0 | OP # | 0 |

Pushes a return block onto the wide stack and transfers control to an extended operation procedure. Carry is unchanged and *overflow* is 0.

The instruction pushes a return block onto the wide stack. Places the address in the wide stack of ACS into AC2; places the address in the wide stack of ACD into AC3. Memory locations $12-13_8$ must contain the WXOP origin address, the starting address of a $40_8$ word table of addresses. These addresses are the starting location of the various WXOP operations.

The instruction adds the operation number in the WXOP instruction to the WXOP origin address to produce the address of a double word in the WXOP table. Fetches that word and treats it as the intermediate address in the effective address calculation. After the indirection chain, if any, has been followed, the instruction places the effective address in the program counter. The contents of AC0, AC1, and the WXOP origin address remain unchanged. All addresses must be in the current segment.

The format of the return block pushed by the instruction is as follows:

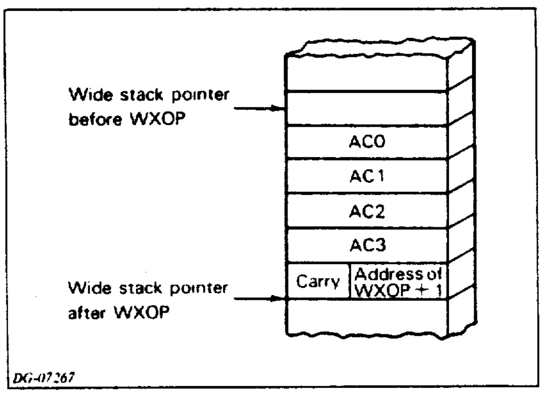

This return block is designed so that the WXOP procedure can return control to the calling program via the WPOP instruction.

Wide Alternate Extended Operation

WXOP1 *acs,acd,operation #*

| 0 | 1 | 2 | 3 | 4 | 5 | 6 | 7 | 8 | 9 | 10 | 11 | 12 | 13 | 14 | 15 | 16–17 | 18–19 | 20 | 21 | 22 | 23 | 24 | 25 | 26 | 27–30 | 31 |
|---|---|---|---|---|---|---|---|---|---|---|---|---|---|---|---|---|---|---|---|---|---|---|---|---|---|---|
| 1 | 0 | 1 | 0 | 0 | 1 | 1 | 1 | 0 | 0 | 0 | 1 | 1 | 0 | 0 | 1 | ACS | ACD | 0 | 0 | 0 | 0 | 0 | 1 | 0 | OP # | 0 |

Pushes a return block and transfers control to an extended operation procedure. Carry is unchanged and *overflow* is 0.

The instruction operates in exactly the same way as WXOP except that it adds $40_8$ to the entry number before it adds the entry number to the WXOP origin address. In addition, it can specify only 16 entry locations.

Wide Exclusive OR

WXOR *acs,acd*

| 0 | 1–2 | 3–4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 1 | 0 | 0 | 0 | 1 | 1 | 1 | 1 | 0 | 0 | 1 |

Forms the logical exclusive OR between corresponding bits of ACS and ACD. Loads the 32-bit result into ACD. The contents of ACS remain unchanged, unless ACS equals ACD. Carry is unchanged and *overflow* is 0.

Wide Exclusive OR Immediate

WXORI *ac,immediate*

| 1 | 0 | 0 | AC | 1 | 1 | 0 | 1 | 0 | 1 | 1 | 1 | 0 | 0 | 1 | IMMEDIATE |
|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16–47 |

Forms a logical OR between two values.

The instruction forms the logical exclusive OR between corresponding bits of the specified accumulator and the value contained in the literal field. The instruction places the result of the exclusive OR in the specified accumulator. Carry is unchanged and *overflow* is 0.

Call Subroutine (Extended Displacement)

XCALL *opcode,argument count,displacement*

| 1 | 0 | 0 | INDEX | 1 | 1 | 0 | 0 | 0 | 0 | 0 | 1 | 0 | 0 | 1 | @ | DISPLACEMENT | S | ARGUMENT COUNT |
|---|---|---|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16 | 17–31 | 32 | 33–47 |

Evaluates the address of a subroutine call.

If the target address specifies an outward ring crossing, a protection fault (code=7 in AC1) occurs. Note that the contents of the PC in the return block are undefined.

If the target address specifies an inward ring call, then the instruction assumes the target address has the following format:

| X | NEW RING | UNUSED | GATE |
|---|---|---|---|
| 0 | 1–3 | 4–15 | 16–31 |

The instruction checks the gate field of the above format for a legal gate. If the specified gate is illegal, a protection fault (code = 6 in AC1) occurs and call is made. Note that the contents of the PC in the return block are undefined.

If the specified gate is legal, or if the target address specifies an intra-ring crossing, then the instruction loads the contents of the PC, + 3, into AC3. The contents of AC3 will always reference the current segment. If bit 0 of the argument count is 0, then the instruction creates a word with the following format:

| OVK | OVR | IRES | 0 | 0 | 0 | 0 | 0 | 0 | 0 | 0 | 0 | 0 | 0 | 0 | 0 | 0 | ARGUMENT COUNT |
|---|---|---|---|---|---|---|---|---|---|---|---|---|---|---|---|---|---|
| 0 | | | | | | | | | | | | | | | | | 31 |

The instruction pushes this word onto the wide stack. If a stack overflow occurs after this push, a stack fault occurs and no call is made. Note that the value of the PC in the return block is undefined. If bit 0 of the argument count is 1, then the instruction assumes the top word of the wide stack has the following format:

| DON'T CARE | 0 | ARGUMENT COUNT |
|---|---|---|
| 0–15 | 16 | 17–31 |

The instruction modifies this word to include the correct settings of OVK and OVR in bits 0 and 1.

Regardless of the setting of the argument count's bit 0, the instruction next unconditionally sets OVR to 0 and loads the PC with the target address. Execution continues with the word referenced by the PC.

Exchange Accumulators

XCH *acs,acd*

| 1 | ACS | ACD | 0 | 0 | 1 | 1 | 1 | 0 | 0 | 1 | 0 | 0 | 0 |
|---|---|---|---|---|---|---|---|---|---|---|---|---|---|
| 0 | 1-2 | 3-4 | 5 | 6 | 7 | 8 | 9 | 10 | 11 | 12 | 13 | 14 | 15 |

Exchanges the contents of two accumulators.

Places the original contents of bits 16-31 of ACS into bits 16-31 of ACD and the original contents of bits 16-31 of ACD in bits 16-31 of ACS. Carry remains unchanged and *overflow* is 0.

Bit 0-15 of the modified accumulator are undefined after completion of this instruction.

Execute

XCT *ac*

| 1 | 0 | 1 | AC | 1 | 1 | 0 | 1 | 1 | 1 | 1 | 1 | 0 | 0 | 0 |
|---|---|---|---|---|---|---|---|---|---|---|---|---|---|---|
| 0 | 1 | 2 | 3-4 | 5 | 6 | 7 | 8 | 9 | 10 | 11 | 12 | 13 | 14 | 15 |

Executes the instruction contained in bits 16-31 of the specified accumulator as if it were in main memory in the location occupied by the *Execute* instruction. If the instruction in bits 16-31 of the specified accumulator is an *Execute* instruction that specifies the same accumulator, the processor is placed in a one-instruction loop.

This instruction leaves carry unchanged; *overflow* is 0.

Because of the possibility of bits 16-31 of the specified accumulator containing an *Execute* instruction, this instruction is interruptible. An I/O interrupt can occur immediately prior to each time the instruction in accumulator is executed. If an I/O interrupt does occur, the program counter in the return block pushed on the system stack points to the *Execute* instruction in main memory. This capability to execute an *Execute* instruction gives you a *wait for I/O interrupt* instruction.

> NOTES: *If bits 16-31 of the specified accumulator contains the first word of a two-word instruction, the word following the* XCT *instruction is used as the second word. Normal sequential operation then continues from the second word after the* XCT *instruction.*
>
> *Do not use the* XCT *instruction to execute an instruction that requires all four accumulators, such as* CMV, CMT, CMP, CTR, *or* BAM.

The results of XCT are undefined if bits 16-31 of the specified accumulator contains an instruction that modifies that same accumulator. For example:")

```
        LDA     0,TOT
        XCT     0               ;UNDEFINED
        JMP     ON
TOT:    ADD     1,0
```

Add Double (Memory to FPAC) (Extended Displacement

XFAMD *fpac,[@]displacement[,index]*

| 1 | INDEX | FPAC | 0 | 0 | 0 | 0 | 0 | 0 | 1 | 1 | 0 | 0 | 1 | @ | DISPLACEMENT |
|---|---|---|---|---|---|---|---|---|---|---|---|---|---|---|---|
| 0 | 1-2 | 3-4 | 5 | 6 | 7 | 8 | 9 | 10 | 11 | 12 | 13 | 14 | 15 | 16 | 17-31 |

Adds the 64-bit floating point number in the source location to the 64-bit floating point number in FPAC and places the normalized result in FPAC.

Computes the effective address, *E*. Uses *E* to address a double precision (four word) operand. Adds this 64-bit floating point number to the floating point number in the specified FPAC. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Add Single (Memory to FPAC) (Extended Displacement)

XFAMS *fpac,[@]displacement[,index]*

| 1 | INDEX | FPAC | 0 | 0 | 0 | 0 | 0 | 0 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Adds the 32-bit floating point number in the source location to the 32-bit floating point number in FPAC and places the normalized result in FPAC.

Computes the effective address, *E*. Uses *E* to address a single precision (double word) operand. Adds this 32-bit floating point number to the floating point number in bits 0-31 of the specified FPAC. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Divide Double (FPAC by Memory) (Extended Displacement)

XFDMD *fpac,[@]displacement[,index]*

| 1 | INDEX | FPAC | 0 | 0 | 1 | 0 | 0 | 1 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Divides the 64-bit floating point number in FPAC by the 64-bit floating point number in the source location and places the normalized result in FPAC.

Computes the effective address, *E*. Uses *E* to address a double precision (four word) operand. Divides the floating point number in the specified FPAC by this 64-bit floating point number. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Divide Single (FPAC by Memory) (Extended Displacement)

XFDMS *fpac,[@]displacement[,index]*

| 1 | INDEX | FPAC | 0 | 0 | 1 | 0 | 0 | 1 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Divides the 32-bit floating point number in bits 0-31 of FPAC by the 32-bit floating point number in the source location and places the normalized result in FPAC.

Computes the effective address, *E*. Uses *E* to address a single precision (double word) operand. Divides the floating point number in bits 0-31 of the specified FPAC by this 32-bit floating point number. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Extended Load Floating Point Double

XFLDD *fpac,[@]displacement[,index]*

| 1 | INDEX | FPAC | 0 | 1 | 0 | 0 | 0 | 0 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Moves four words out of memory and into a specified FPAC.

Computes the effective address, *E*. Fetches the double precision floating point number at the address specified by *E* and places it in FPAC. Updates the *Z* and *N* flags in the FPSR to reflect the new contents of FPAC.

> NOTE: *This instruction will move unnormalized data without change, but the Z and N flags will be undefined.*

Extended Load Floating Point Single

XFLDS *fpac,[@]displacement[,index]*

| 1 | INDEX | FPAC | 0 | 1 | 0 | 0 | 0 | 0 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Moves two words out of memory into a specified FPAC.

Computes the effective address, *E*. Fetches the single precision floating point number at the address specified by *E*. Places the number in the high-order bits of FPAC. Sets the low-order 32 bits of FPAC to 0. Updates the *Z* and *N* flags in the floating point status register to reflect the new contents of FPAC.

> NOTE: *This instruction will move unnormalized or illegal data without change, but the Z and N flags will be undefined.*

Multiply Double (FPAC by Memory) (Extended Displacement)

XFMMD *fpac,[@]displacement[,index]*

| 1 | INDEX | FPAC | 0 | 0 | 0 | 0 | 0 | 1 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Multiplies the 64-bit floating point number in the source location by the 64-bit floating point number in FPAC and places the normalized result in FPAC.

Computes the effective address, *E*. Uses *E* to address a double precision (four word) operand. Multiplies this 64-bit floating point number by the floating point number in the specified FPAC. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation.

Multiply Single (FPAC by Memory) (Extended Displacement)

XFMMS *fpac,[@]displacement[,index]*

| 1 | INDEX | FPAC | 0 | 0 | 0 | 0 | 0 | 1 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Multiplies the 32-bit floating point number in the source location by the 32-bit floating point number in bits 0-31 of FPAC and places the normalized result in FPAC.

Computes the effective address, *E*. Uses *E* to address a single precision (double word) operand. Multiplies this 32-bit floating point number by the floating point number in bits 0-31 of the specified FPAC. Places the normalized result in bits 0-31 of the specified FPAC. Sets bits 32-63 of FPAC to 0. Leaves the contents of the source location unchanged and updates the *Z* and *N* flags in the floating point status register to reflect the new contents of FPAC.

See Chapter 8 and Appendix G for more information about floating point manipulation.

Subtract Double (Memory from FPAC) (Extended Displacement)

XFSMD *fpac,[@]displacement[,index]*

| 1 | INDEX | FPAC | 0 | 0 | 1 | 0 | 0 | 0 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Subtracts the 64-bit floating point number in the source location from the 64-bit floating point number in FPAC and places the normalized result in FPAC.

Computes the effective address, *E*. Uses *E* to address a double precision (four word) operand. Subtracts this 64-bit floating point number from the floating point number in the specified FPAC. Places the normalized result in the specified FPAC. Leaves the contents of the source location unchanged and updates the *Z* and *N* flags in the floating point status register to reflect the new contents of FPAC.

See Chapter 8 and Appendix G for more information about floating point manipulation..

Subtract Single (Memory from FPAC) (Extended Displacement)

XFSMS *fpac,[@]displacement[,index]*

| 1 | INDEX | FPAC | 0 | 0 | 1 | 0 | 0 | 0 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Subtracts the 32-bit floating point number in the source location from the 32-bit floating point number in bits 0-31 of FPAC and places the normalized result in FPAC.

Computes the effective address, *E*. Uses *E* to address a single precision (double word) operand. Subtracts this 32-bit floating point number from the floating point number in bits 0-31 of the specified FPAC. Places the normalized result in the specified FPAC. Sets bits 32-63 of FPAC to 0. Leaves the contents of the source location unchanged and updates the *Z* and *N* flags in the floating point status register to reflect the new contents of FPAC.

See Chapter 8 and Appendix G for more information about floating point manipulation.

Store Floating Point Double (Extended Displacement)

XFSTD *fpac,[@]displacement[,index]*

| 1 | INDEX | FPAC | 0 | 1 | 0 | 0 | 0 | 1 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Stores the contents of a specified FPAC into a memory location.

Computes the effective address, *E*. Places the floating point number contained in FPAC in memory beginning at the location addressed by *E*. Destroys the previous contents of the addressed memory location. The contents of FPAC and the condition codes in the FPSR remain unchanged.

NOTE: *This instruction moves unnormalized or illegal data without change.*

Store Floating Point Single (Extended Displacement)

XFSTS *fpac,[@]displacement[,index]*

| 1 | INDEX | FPAC | 0 | 1 | 0 | 0 | 0 | 1 | 0 | 1 | 0 | 0 | 1 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Stores the contents of a specified FPAC into a memory location.

Computes the effective address, *E*. Places the 32 high-order bits of FPAC in memory beginning at the location addressed by *E*. Destroys the previous contents of the addressed memory location. The contents of FPAC and the condition codes in the FPSR remain unchanged.

NOTE: *This instruction moves unnormalized or illegal data without change.*

Jump (Extended Displacement)

XJMP *index,displacement*

| 1 | 1 | 0 | INDEX | 1 | 1 | 0 | 0 | 0 | 0 | 0 | 1 | 0 | 0 | 1 | @ | DISPLACEMENT |
|---|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16 | 17–31 |

Calculates the effective address, *E*. Loads *E* into the PC. Carry is unchanged and *overflow* is 0.

NOTE: *The calculation of* E *is forced to remain within the current segment of execution.*

Jump to Subroutine (Extended Displacement)

XJSR *index,displacement*

| 1 | 1 | 0 | INDEX | 1 | 1 | 0 | 0 | 0 | 0 | 1 | 1 | 0 | 0 | 1 | @ | DISPLACEMENT |
|---|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16 | 17–31 |

Calculates the effective address, *E*. Loads the current value of the PC, plus two, into AC3. Loads *E* into the PC. Carry is unchanged and *overflow* is 0.

NOTE: *The calculation of* E *is forced to remain within the current segment of execution.*

Load Effective Address (Extended Displacement)

XLEF *ac,index,displacement*

| 1 | INDEX | AC | 1 | 0 | 0 | 0 | 0 | 0 | 0 | 1 | 0 | 0 | 1 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Loads an effective address into an accumulator.

The instruction calculates the effective address, *E*. Checks *E* for ring crossing errors. If no errors occur, loads *E* into the specified accumulator. If errors occur, issues a protection fault. Carry is unchanged and *overflow* is 0.

Load Effective Byte Address (Extended Displacement)

XLEFB *ac,index,displacement*

| 1 | INDEX | AC | 1 | 0 | 0 | 0 | 0 | 1 | 1 | 1 | 0 | 0 | 1 | DISPLACEMENT |
|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16–31 |

Loads an effective byte address into an accumulator. Carry is unchanged and *overflow* is 0.

The instruction calculates the effective byte address. Checks the byte address for ring crossing errors. If no errors occur, loads the byte address into the specified accumulator. If errors occur, issues a protection fault.

NOTE: *Index bits of 00 force the first address in the effective address calculation to be in the current segment of execution.*

Narrow Add Accumulator to Memory Word (Extended Displacement)

XNADD *ac,index,displacement*

| 1 | INDEX | AC | 0 | 0 | 0 | 0 | 0 | 0 | 1 | 1 | 0 | 0 | 0 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Adds an integer in a memory location to an integer in an accumulator.

The instruction calculates the effective address, *E*. Adds the 16-bit integer contained in the location specified by *E* to the integer contained in bits 16–31 of the specified accumulator. Sign extends the 16-bit result to 32 bits and loads it into the specified accumulator. Sets carry to the value of ALU carry, and *overflow* to 1 if there is an ALU overflow. The contents of the referenced memory location remain unchanged.

Narrow Divide Memory Word (Extended Displacement)

XNDIV *ac,index,displacement*

| 1 | INDEX | AC | 0 | 0 | 0 | 1 | 1 | 0 | 1 | 1 | 0 | 0 | 0 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Divides an integer contained in an accumulator by an integer in memory.

The instruction calculates the effective address, *E*. Sign extends the integer contained in bits 16–31 of the specified accumulator to 32 bits and divides it by the 16-bit integer contained in the location specified by *E*. If the quotient is within the range -32,768 to +32,767 inclusive, sign extends the result to 32 bits and loads it into the specified accumulator. If the quotient is outside of this range, or if the divisor is zero, the instruction sets *overflow* to 1 and leaves the specified accumulator unchanged. Otherwise, *overflow* is 0. The contents of the referenced memory location and carry remain unchanged.

Narrow Decrement and Skip if Zero (Extended Displacement)

XNDSZ *index,displacement*

| 1 | 0 | 1 | INDEX | 1 | 1 | 0 | 0 | 0 | 0 | 0 | 1 | 0 | 0 | 1 | @ | DISPLACEMENT |
|---|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 | 17 31 |

Calculates the effective address, *E*. Decrements the 16-bit contents of the location addressed by *E*. If the decremented result is equal to zero, then the instruction skips the next sequential word. Carry is unchanged and *overflow* is 0.

NOTE: *This instruction is indivisible.*

Narrow Increment and Skip if Zero (Extended Displacement)

XNISZ *index,displacement*

| | | | | | | | | | | | | | | | | |
|---|---|---|---|---|---|---|---|---|---|---|---|---|---|---|---|---|
| 1 | 0 | 0 | INDEX | 1 | 1 | 0 | 0 | 0 | 1 | 1 | 1 | 0 | 0 | 1 | @ | DISPLACEMENT |
| 0 | 1 | 2 | 3–4 | 5 | 6 | 7 | 8 | 9 | 10 | 11 | 12 | 13 | 14 | 15 | 16 | 17–31 |

Calculates the effective address, *E*. Increments the 16-bit contents of the location specified by *E*. If the incremented result is equal to zero, then the instruction skips the next sequential word. Carry is unchanged and *overflow* is 0.

NOTE: *This instruction is indivisible.*

Narrow Load Accumulator (Extended Displacement)

XNLDA *ac,index,displacement*

| | | | | | | | | | | | | | | | |
|---|---|---|---|---|---|---|---|---|---|---|---|---|---|---|---|
| 1 | INDEX | AC | 0 | 1 | 1 | 0 | 0 | 0 | 0 | 1 | 0 | 0 | 1 | @ | DISPLACEMENT |
| 0 | 1–2 | 3–4 | 5 | 6 | 7 | 8 | 9 | 10 | 11 | 12 | 13 | 14 | 15 | 16 | 17–31 |

Loads a value into an accumulator.

The instruction calculates the effective address, *E*. Uses *E* as the address of a 16-bit value. Loads this 16-bit value into the specified accumulator, then sign extends the value to 32 bits. Carry is unchanged and *overflow* is 0.

Narrow Multiply Memory Word (Extended Displacement)

XNMUL *ac,index,displacement*

| | | | | | | | | | | | | | | | |
|---|---|---|---|---|---|---|---|---|---|---|---|---|---|---|---|
| 1 | INDEX | AC | 0 | 0 | 0 | 1 | 0 | 0 | 1 | 1 | 0 | 0 | 0 | @ | DISPLACEMENT |
| 0 | 1–2 | 3–4 | 5 | 6 | 7 | 8 | 9 | 10 | 11 | 12 | 13 | 14 | 15 | 16 | 17–31 |

Multiplies an integer in an accumulator by an integer in memory.

The instruction calculates the effective address, *E*. Multiplies the 16-bit, signed integer contained in the location referenced by *E* by the signed integer contained in bits 16–31 of the specified accumulator. If the result is outside the range of -32,768 to +32,767 inclusive, sets *overflow* to 1; otherwise, *overflow* is 0. Sign extends the result to 32 bits and places the result in the specified accumulator. The contents of the referenced memory location and carry remain unchanged.

Narrow Store Accumulator (Extended Displacement)

XNSTA *ac,index,displacement*

| | | | | | | | | | | | | | | | |
|---|---|---|---|---|---|---|---|---|---|---|---|---|---|---|---|
| 1 | INDEX | AC | 0 | 1 | 1 | 0 | 0 | 0 | 1 | 1 | 0 | 0 | 1 | @ | DISPLACEMENT |
| 0 | 1–2 | 3–4 | 5 | 6 | 7 | 8 | 9 | 10 | 11 | 12 | 13 | 14 | 15 | 16 | 17–31 |

Stores the contents of an accumulator into memory.

The instruction calculates the effective address, *E*. Stores a copy of the 16-bit contents of the specified accumulator in the location specified by *E*. Carry is unchanged and *overflow* is 0.

Narrow Subtract Memory Word (Extended Displacement)

XNSUB *ac,index,displacement*

| 1 | INDEX | AC | 0 | 0 | 0 | 0 | 1 | 0 | 1 | 1 | 0 | 0 | 0 | @ | DISPLACEMENT |
|---|---|---|---|---|---|---|---|---|---|---|---|---|---|---|---|
| 0 | 1-2 | 3-4 | 5 | 6 | 7 | 8 | 9 | 10 | 11 | 12 | 13 | 14 | 15 | 16 | 17-31 |

Subtracts an integer in memory from an integer in an accumulator.

The instruction calculates the effective address, *E*. Subtracts the 16-bit integer contained in the location referenced by *E* from the integer contained in bits 16–31 of the specified accumulator. Sign extends the result to 32 bits and stores it in the specified accumulator. Sets carry to the value of ALU carry, and *overflow* to 1 if there is an ALU overflow. The contents of the specified memory location remain unchanged.

Extended Operation

XOP0 *acs,acd,operation #*

| 1 | ACS | ACD | 1 | 1 | 0 | 1 | 1 | 0 | 0 | 1 | 0 | 0 | 0 | 0 | 0 | 0 | 0 | 0 | 0 | 0 | 0 | 0 | 0 | 0 | op# |
|---|---|---|---|---|---|---|---|---|---|---|---|---|---|---|---|---|---|---|---|---|---|---|---|---|---|
| 0 | 1-2 | 3-4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27-31 |

Pushes a return block onto the narrow stack and transfers control to an extended operation procedure.

The instruction pushes a return block onto the narrow stack. Places the address in the narrow stack of ACS into AC2; places the address in the narrow stack of ACD into AC3. Memory location $44_8$ must contain the XOP0 origin address, the starting address of a $40_8$ word table of addresses. These addresses are the starting location of the various XOP0 operations.

The instruction adds the operation number in the XOP0 instruction to the XOP0 origin address to produce the address of a double word in the XOP0 table. Fetches that word and treats it as the intermediate address in the effective address calculation. After the indirection chain, if any, has been followed, the instruction places the effective address in the program counter. The contents of carry, AC0, AC1, and the XOP0 origin address remain unchanged. *Overflow* is 0.

The format of the return block pushed by the instruction is as follows:

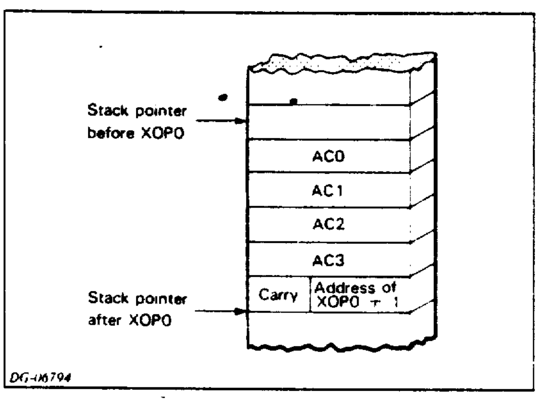

This return block is designed so that the XOP0 procedure can return control to the calling program via the *Pop Block* instruction.

Exclusive OR

XOR *acs,acd*

| 0 | 1-2 | 3-4 | 5 | 6 | 7 | 8 | 9 | 10 | 11 | 12 | 13 | 14 | 15 |
|---|---|---|---|---|---|---|---|---|---|---|---|---|---|
| 1 | ACS | ACD | 0 | 0 | 1 | 0 | 1 | 0 | 0 | 1 | 0 | 0 | 0 |

Forms the logical exclusive OR of the contents of bits 16-31 of ACS and the contents of bits 16-31 of ACD and places the result in bits 16-31 of ACD. Sets a bit position in the result to 1 if the corresponding bit positions in the two operands are unlike; otherwise, the instruction sets result bit to 0. The contents of ACS and carry remain unchanged. *Overflow* is 0.

Bits 0-15 of the modified accumulator are undefined after completion of this instruction.

Exclusive OR Immediate

XORI *i,ac*

| 0 | 1 | 2 | 3-4 | 5 | 6 | 7 | 8 | 9 | 10 | 11 | 12 | 13 | 14 | 15 | 16-31 |
|---|---|---|---|---|---|---|---|---|---|---|---|---|---|---|---|
| 1 | 0 | 1 | AC | 1 | 1 | 1 | 1 | 1 | 1 | 1 | 1 | 0 | 0 | 0 | IMMEDIATE |

Forms the logical exclusive OR of the contents of the immediate field and the contents of bits 16-31 of the specified accumulator and places the result in bits 16-31 of the specified accumulator. Carry remains unchanged and *overflow* is 0.

Bits 0-15 of the modified accumulator are undefined after completion of this instruction.

Push Address (Extended Displacement)

XPEF *index, displacement*

| 0 | 1 | 2 | 3-4 | 5 | 6 | 7 | 8 | 9 | 10 | 11 | 12 | 13 | 14 | 15 | 16 | 17-31 |
|---|---|---|---|---|---|---|---|---|---|---|---|---|---|---|---|---|
| 1 | 0 | 0 | INDEX | 1 | 1 | 0 | 0 | 0 | 1 | 0 | 1 | 0 | 0 | 1 | @ | DISPLACEMENT |

Calculates the effective address, *E*. Pushes *E* onto the wide stack, then checks for stack overflow. Carry is unchanged and *overflow* is 0.

Push Byte Address (Extended Displacement)

XPEFB *index, displacement*

| 0 | 1 | 2 | 3-4 | 5 | 6 | 7 | 8 | 9 | 10 | 11 | 12 | 13 | 14 | 15 | 16 | 17-31 |
|---|---|---|---|---|---|---|---|---|---|---|---|---|---|---|---|---|
| 1 | 0 | 1 | INDEX | 1 | 1 | 0 | 0 | 0 | 1 | 0 | 1 | 0 | 0 | 1 | @ | DISPLACEMENT |

Calculates a 32-bit byte address. Pushes this byte address onto the wide stack, then checks for stack overflow. Carry is unchanged and *overflow* is 0.

Push Jump (Extended Displacement)

XPSHJ *index,displacement*

| 0 | 1 | 2 | 3-4 | 5 | 6 | 7 | 8 | 9 | 10 | 11 | 12 | 13 | 14 | 15 | 16 | 17-31 |
|---|---|---|---|---|---|---|---|---|---|---|---|---|---|---|---|---|
| 1 | 0 | 0 | INDEX | 1 | 1 | 0 | 0 | 0 | 0 | 1 | 1 | 0 | 0 | 1 | @ | DISPLACEMENT |

Calculates the effective address, *E*. Pushes the current 31-bit current value of the PC plus two onto the wide stack. Loads the PC with *E*. Checks for stack overflow. Carry is unchanged and *overflow* is 0.

NOTE: *The address pushed onto the wide stack will always reference the current segment.*

Vector on Interrupting Device (Extended Displacement)

XVCT

| 1 | 1 | 0 | 0 | 0 | 1 | 1 | 1 | 0 | 0 | 0 | 0 | 1 | 0 | 0 | 1 | @ | DISPLACEMENT |
|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17–31 |

When a device requests an interrupt, transfers control to the appropriate interrupt sequence. Carry is unchanged and *overflow* is 0.

The instruction interprets the displacement field as an absolute address in the current segment. See the chapter on interrupt processing for a complete description of this instruction.

NOTE: *This is a privileged instruction.*

Wide Add Accumulator to Memory Word (Extended Displacement)

XWADD *ac,index,displacement*

| 1 | INDEX | AC | 0 | 0 | 1 | 0 | 0 | 0 | 1 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Adds an integer contained in memory to an integer contained in an accumulator.

The instruction calculates the effective address, *E*. Adds the 32-bit integer contained in the location specified by *E* to the 32-bit integer contained in the specified accumulator. Loads the result into the specified accumulator. Sets carry to the value of ALU carry, and *overflow* to 1 if there is an ALU overflow. The contents of the referenced memory location remain unchanged.

Wide Divide Memory Word (Extended Displacement)

XWDIV *ac,index,displacement*

| 1 | INDEX | AC | 0 | 0 | 1 | 1 | 1 | 0 | 1 | 1 | 0 | 0 | 0 | @ | DISPLACEMENT |
|---|---|---|---|---|---|---|---|---|---|---|---|---|---|---|---|
| 0 | 1–2 | 3–4 | 5 | 6 | 7 | 8 | 9 | 10 | 11 | 12 | 13 | 14 | 15 | 16 | 17–31 |

Divides an integer in an accumulator by an integer in memory.

The instruction calculates the effective address, *E*. Sign extends the 32-bit integer contained in the specified accumulator and divides it by the 32-bit integer contained in the location specified by *E*. If the quotient is within the range of -2,147,483,648 to +2,147,483,647 inclusive, the instruction loads it into the specified accumulator. If the quotient is outside this range, the instruction does not load it into the specified accumulator. The contents of the referenced memory loaction and carry remain unchanged.

If the divisor in memory is zero, or if the dividend is the largest negative number and the divisor is -1, the instruction sets *overflow* to 1 and leaves the specified accumulator unchanged. Otherwise, *overflow* is 0.

Wide Decrement and Skip if Zero (Extended Displacement)

XWDSZ *index,displacement*

| 1 | 0 | 1 | INDEX | 1 | 1 | 0 | 0 | 0 | 1 | 1 | 1 | 0 | 0 | 1 | @ | DISPLACEMENT |
|---|---|---|---|---|---|---|---|---|---|---|---|---|---|---|---|---|
| 0 | 1 | 2 | 3–4 | 5 | 6 | 7 | 8 | 9 | 10 | 11 | 12 | 13 | 14 | 15 | 16 | 17–31 |

Calculates the effective address, *E*. Decrements the 32-bit contents of the location addressed by *E* by one. If the decremented result is equal to zero, then the instruction skips the next sequential word. Carry is unchanged and *overflow* is 0.

NOTE: *This instruction executes in one indivisible memory cycle if the word to be decremented is located on a double word boundary.*

Wide Increment and Skip if Zero (Extended Displacement)
XWISZ *index,displacement*

| 1 | 0 | 1 | INDEX | 1 | 1 | 0 | 0 | 0 | 0 | 1 | 1 | 0 | 0 | 1 | @ | DISPLACEMENT |
|---|---|---|---|---|---|---|---|---|---|---|---|---|---|---|---|---|
| 0 | 1 | 2 | 3 4 | 5 | 6 | 7 | 8 | 9 | 10 | 11 | 12 | 13 | 14 | 15 | 16 | 17 31 |

Calculates the effective address, *E*. Increments the 32-bit contents of the location addressed by *E* by one. If the incremented result is equal to zero, then the instruction skips the next sequential word. Carry is unchanged and *overflow* is 0.

NOTE: *This instruction executes in one indivisible memory cycle if the word to be incremented is located on a double word boundary.*

Wide Load Accumulator (Extended Displacement)
XWLDA *ac,index,displacement*

| 1 | INDEX | AC | 0 | 1 | 1 | 0 | 0 | 0 | 0 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Calculates the effective address, *E*. Loads a copy of the 32-bit word addressed by *E* into the specified accumulator. Carry is unchanged and *overflow* is 0.

Wide Multiply Memory Word (Extended Displacement)
XWMUL *ac,index,displacement*

| 1 | INDEX | AC | 0 | 0 | 1 | 1 | 0 | 0 | 1 | 1 | 0 | 0 | 0 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Multiplies an integer in an accumulator by an integer in memory.

The instruction calculates the effective address, *E*. Multiplies the 32-bit, signed integer contained in the location referenced by *E* by the 32-bit, signed integer contained in the specified accumulator. Loads the 32 least significant bits of the result into the specified accumulator.

If the result is within the range of -2,147-483,648 to +2,147,483,647 inclusive, the instruction sets *overflow* to 0; otherwise, *overflow* is 1. The contents of the referenced memory location and carry remain unchanged.

Wide Store Accumulator (Extended Displacement)
XWSTA *ac,index,displacement*

| 1 | INDEX | AC | 0 | 1 | 1 | 0 | 0 | 0 | 1 | 1 | 0 | 0 | 1 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Calculates the effective address, *E*. Stores a copy of the 32-bit contents of the specified accumulator in the memory location specified by *E*. Carry is unchanged and *overflow* is 0.

Wide Subtract Memory Word (Extended Displacement)
XWSUB *ac,index,displacement*

| 1 | INDEX | AC | 0 | 0 | 1 | 0 | 1 | 0 | 1 | 1 | 0 | 0 | 0 | @ | DISPLACEMENT |
|---|---|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 | 16 | 17 31 |

Subtracts an integer contained in memory from an integer contained in an accumulator.

The instruction calculates the effective address, *E*. Subtracts the 32-bit integer contained in the location referenced by *E* from the 32-bit integer contained in the specified accumulator. Loads the result into the specified accumulator. Sets carry to the value of ALU carry, and *overflow* to 1 if thee is an ALU overflow. The contents of the specified memory location remain unchanged.

Zero Extend

ZEX *acs,acd*

| 1 | ACS | ACD | 0 | 1 | 1 | 0 | 1 | 0 | 1 | 1 | 0 | 0 | 1 |
|---|---|---|---|---|---|---|---|---|---|---|---|---|---|
| 0 | 1 2 | 3 4 | 5 | 6 | 7 | 8 | 9 | 10 | 11 | 12 | 13 | 14 | 15 |

Zero extends the 16-bit integer contained in ACS to 32 bits and loads the result into ACD. The contents of ACS remain unchanged, unless ACS equals ACD. Carry is unchanged and *overflow* is 0.

APPENDIX C

```
ALU TESTS
---------

Mnem   | Value | Description
-------+-------+------------
CARRY  |  10   | CARRY = 1
LINK   |  11   | LINK = 1
RND    |  12   | FPSR8 = 1
TE     |  13   | FPSR5 = 1
CRY    |  14   | CRY0 = 1 if FLAG0 = 1; CRY16 = 1 if FLAG0 = 0
OVFL   |  15   | OVR0 = 1 if FLAG0 = 1; OVR16 = 1 if FLAG0 = 0
ALUNZ  |  16   | ALU<0-31> <> 0
SEQG   |  17   | SIGN xor OVFL.  For SUB, tests  S < R.
       |       |  For RSB, tests  R < S.
D0     |  18   | D<0> = 1
D28    |  19   | D<28> = 1
D29    |  1A   | D<29> = 1
D30    |  1B   | D<30> = 1
D31    |  1C   | D<31> = 1
COM1   |  1D   | Commercial test - Validates data types.
SEX    |  1E   | IF D2ND = PMD previous cycle,
       |       |  Test (FAU16 or FAU0) equal to 0 if the most
       |       |  previous memory start was a (word or double word
       |       | IF D2ND = NSHL &  SHFT = SEX, Test TLCH16=0
       |       | ELSE always true.
TL31   |  1F   | TLCH31 = 1
FNOP   |  20   | Result of floating compare if CMPX coded previous:
       |       |  single precision (FLAGS = 0): tests BEXP-AEXP > 7
       |       |  double precision (FLAGS = 1): ABS(BEXP-AEXP) > 15
       |       | else tests for normalized mantissa on ALU<0-31>
D24    |  21   | D<24> = 1
       |  22   | Unassigned
IOSKP  |  23   | Comercial test - used to detect I/O skips.
COM2   |  24   | Commercial tests - Validates data types.
SIGN   |  25   | ALU0 = 1 if FLAG0 = 1; ALU16 = 1 if FLAG0 = 0
MR30   |  26   | MREG<30> = 1
COMP   |  27   | ACSR<2,3> = ACDR<2,3> (After any inc or dec)
       |  28   | Unassigned
       |  29   |    "

NOTE:

Conditions reflect state at the conclusion of the previous micro-
instruction unless stated differently. Exception: Since ZLCH and
TOVR LATCH hold data the second half for split cycle modes, then
SIGN, CRY, OVFL and ALUNZ are effectively tested at the conclusion
of the first half cycle during these modes.
```

ATU, INSTRUCTION PROCESSOR, and IOC TESTS

| Mnem | Value | Description |
|---|---|---|
| VWP | 30 | LA<1-3> < ESR |
| CBLK | 31 | LA<29,30,31> <> 7 |
| MMPU | 32 | MMPU on |
| ATU | 33 | ATU on |
| PURGE | 34 | ATU busy purging |
| PGVLD | 35 | Page valid, resident, not protected (previous start) |
| PGEXT | 36 | Page invalid, non-resident, or execute not allowed. |
| PTVLD | 37 | Page Table invalid. |
| PROT | 38 | A protection fault has occurred |
| SBVLD | 39 | SBR valid, and page table depth ok. |
| GTCRE | 3A | bits 1-3 of LA greater than CRE |
| EQCRE | 3B | bits 1-3 of LA equal to CRE |
| LTCRE | 3C | bits 1-3 of LA less than CRE |
| | 3D | Reserved |
| | 3E | Reserved |
| RING0 | 3F | CRE <> 0 |

U-SEQUENCER TESTS

| Mnem | Value | Description |
|---|---|---|
| TRUE | 0 | Always true |
| INTR | 1 | Interrupt pending |
| CPD31 | 2 | CPD31 = 0 |
| IOB | 3 | IO not busy. Test the 3rd cycle after the command IOB<br>Continue testing (and reading if data in) until true. |
| FLAG0 | 4 | FLAG0 = 1 |
| FLAG1 | 5 | FLAG1 = 1 |
| FLAG2 | 6 | FLAG2 = 1 |
| FLAG3 | 7 | FLAG3 = 1 |
| FLAG4 | 8 | FLAG4 = 1 |
| FLAG5 | 9 | FLAG5 = 1 |
| FLAG6 | A | FLAG6 = 1 |
| FLAG7 | B | FLAG7 = 1 |
| TFLG6 | C | Test FLAG6 = 1, then Toggle FLAG 6 |
| TFLG7 | D | Test FLAG7 = 1, then Toggle FLAG 7 |
| LCTR | E | Test CNTR<2-5> <> 0; then CNTR<2-5> := CNTR<2-5> - 1;<br>If LCNT is coded, this test is on the value loaded<br>and no decrement occurs. |
| USMT | F | microstack empty |

APPENDIX D

Absolute Address Conditional

```
 0       2         3          4        9 10     19
+--------+------------------+---------+--------+
| MODE(3) | POLARITY(1) | TEST(6) | AA(10) |
+--------+------------------+---------+--------+
```

NOTE: The Absolute Address Field (AA) is extended to a full 12 bit address by concatenating the most significant 2 bits of the current PC (termed the Page bits) to the most significant side (left) of the AA:

```
 0      1 2     11
+--------+--------+
| PAGE(2) | AA(10) |
+--------+--------+
```

Instructions:

| Mode | Mnem. | Explanation | True Action | False Action |
|---|---|---|---|---|
| 000 | CJMP | Conditional Jump | PC <-- AA(10) | PC <-- PC+1 |
| 001 | CJSR | Cond. Jump Subroutine | PC <-- AA(10) Push PC+1 | PC <-- PC+1 |
| 010 | CRTN | Conditional Return | PC <-- TOS Pop | PC <-- AA(10) |
| 011 | TWB | Two way branch | PC <-- AA(10) Pop | PC <-- TOS Pop |
| 100 | CPD | Load stack from CPD and Jump if True.** *primarily used for stack restore after context save. | PC <-- AA(10) Push CPD* | PC <-- PC+1 Push CPD |

LCNT, CPOP and LOOP

```
 0    2          3        4        9 10        11 12      19
+-----+-----------+---------+-----------------+---------+
| 110 | POLARITY(1) | TEST(6) |   Mod2(2) | OTHER(5)|
+-----+-----------+---------+-----------------+---------+
```

Instructions:

| Mod2 | Mnem. | Explanation | True Action | False Action |
|---|---|---|---|---|
| 00 | LCNT | Load the 4 bit loop Counter with the ones complement of the 4 least significant bits of the the OTHER field | PC <-- PC+1 | PC <-- TOS pop stack |
| 01 | CPOP | Conditional Pop; OTHER field may be used for loading the SPAR (Scratch Pad Addr. Reg.) | PC <-- PC+1 | PC <-- TOS pop stack |
| 10 | LOOP | Conditionally Jump to TOS or continue and pop. OTHER field used as in CPOP. | PC <-- PC+1 pop stack | PC <-- TOS |

Flag Controls

Instructions:

| POP | SET | Mnem. | Explanation | True Action | False Action |
|---|---|---|---|---|---|
| 0 | 00 | F01 | Control Flag Set 0-1: FLAG 0 and FLAG 1 using CNTL field | PC <-- PC+1 | PC <-- TOS pop stack |

| | | | | | |
|---|---|---|---|---|---|
| 0 | 01 | F23 | Control Flag Set 2-3: FLAG 2 and FLAG 3 using CNTL field | PC <-- PC+1 | PC <-- TOS pop stack |
| 0 | 10 | F45 | Control Flag Set 4-5: FLAG 4 and FLAG 5 using CNTL field | PC <-- PC+1 | PC <-- TOS pop stack |
| 0 | 11 | F67 | Control Flag Set 6-7: FLAG 6 and FLAG 7 using CNTL field | PC <-- PC+1 | PC <-- TOS pop stack |
| 1 | 00 | FP01 | Control Flag Set 0-1: FLAG 0 and FLAG 1 using CNTL field | PC <-- PC+1 pop stack | PC <-- TOS pop stack |
| 1 | 01 | FP23 | Control Flag Set 2-3: FLAG 2 and FLAG 3 using CNTL field | PC <-- PC+1 pop stack | PC <-- TOS pop stack |
| 1 | 10 | FP45 | Control Flag Set 4-5: FLAG 4 and FLAG 5 using CNTL field | PC <-- PC+1 pop stack | PC <-- TOS pop stack |
| 1 | 11 | FP67 | Control Flag Set 6-7: FLAG 6 and FLAG 7 using CNTL field | PC <-- PC+1 pop stack | PC <-- TOS pop stack |

SPLIT

| Mod3 | FS | Mnem. | Explanation | True Action | False Action |
|---|---|---|---|---|---|
| 00 | 0 | SPLT01 | Conditional branch to TOS pop without pop; also, control flag set 0-1 with CNTL field (see 1.4) | PC <-- PC+1 | PC <-- TOS |
| 00 | 1 | SPLT23 | Conditional branch to TOS pop without pop; also, control flag set 2-3 with CNTL field (see 1.4) | PC <-- PC+1 | PC <-- TOS |

Context Restore Instructions:

| Mod3 | Mnem. | Explanation | True Action | False Action |
|---|---|---|---|---|
| 01 | RCF | Restore 6 bit loop counter and all 6 flags from LPD bits 26-31 for counter; bits 8-15,24,25 for Flags | PC <-- PC+1 | PC <-- TOS pop stack |
| 10 | REST | If FALSE; Restore after context (sets REST FF) | PC <-- PC+1 | PC <-- TOS pop stack |

Unconditional Instructions:

Unconditional with 12 bit AA:

```
 0   2 3             5 6  7 8      19
+-----+-------------+----+--------+
| 111 | Ext. Mode(3) | XX | AA(12) |
+-----+-------------+----+--------+
```

Instructions:

| Ext. Mode | MNEM | Description | Actions |
|---|---|---|---|
| 000 | LEAP | 12 Bit Jump | PC <-- AA(12) |
| 001 | LSR | Leap to subroutine | PC <-- AA(12); Push PC+1 |
| 010 | PUSH | Push 12 Bit AA | PC <-- PC+1; Push AA(12) |
| 011 | LPOP | Leap and Pop | PC <-- AA(12); Pop (STOS is loaded) |
| 100 | LPSH | Leap and Push | PC <-- AA(12); Push AA(12) |
| 101 | CTXL | Context Leap | PC <-- AA(12); Push SAVE |

Unconditional Dispatches:

```
 0   2 3             5 6  7 8    16 17  18      19
+-----+-------------+----+-------+---+---------+
| 111 | Ext. Mode(3) | XX | AA(9) | X | DSRC(2) |
+-----+-------------+----+-------+---+---------+
```

NOTE: The Absolute Address Field (AA) is extended to a full 12 bit address by concatenating 3 zeros to the least significant (right hand) side of the AA:

```
Formed AA:  0      8 9  11
           +-------+-----+
           | AA(9) | 000 |
           +-------+-----+
```

Instructions:

| Ext. Mode | MNEM | Description | Actions |
|---|---|---|---|
| 110 | DSPA | Unconditional Dispatch | PC <-- Dispatch* |
| 111 | DSPR | Dispatch to Subroutine | PC <-- Dispatch*; Push PC+1 |

APPENDIX E

Description of special modes:

MPY mode: Code ALUS = DZ, ALUOP = RSB. The following values will be forced:

| Previous half cycle PMR<30,31> | MLTC | forced this cycle ALUS | ALUOP |
|---|---|---|---|
| 00 | 0 | DZ | ADD |
| 00 | 1 | DA | ADD |
| 01 | 0 | DA | ADD |
| 01 | 1 | DQ | ADD |

| | | | |
|---|---|---|---|
| 10 | 0 | DQ | RSB |
| 10 | 1 | DA | RSB |
| 11 | 0 | DA | RSB |
| 11 | 1 | DZ | RSB |

In both unsigned and signed multiply, the first operand (D bus) is sign-extended two bits to 34 bits (Except when CRYINS = 0 and DBUS <> MACC, in which case it is zero-extended) The second operand (A, Z, or Q) is zero-extended to 34 bits for unsigned multiply and sign-extended for signed multiply. (The extension of the second operand is made either from the 32 bit AREG, 0, or from the 33 bit QBIT,QREG). Thus, the result has 34 bits, with DS<X,Y> the two MSB's.

MLTC and PMR are clocked both half cycles in MPY mode.

DIV mode: The forced value of ALUOP is dependent upon TCRYY (loaded with the divide carry) as shown below. For all other modes, TCRYY gets 0. ALUOP should be coded as SUB.

| TCRYY | ALUOP |
|---|---|
| 0 | ADD |
| 1 | SUB |

The first operand, the dividend, is in BREG. It is extended one bit by LINK. The second operand, the divisor in AREG, is zero-extended one bit. Thus, the result has 33 bits with DS<Y> the MSB.

PRESC mode: To get prescaled mantissa into QREG, code BREG - AREG -> ALU and CMPX during the previous u-instruction to set up prescale hardware, and code + PASS - DZ OR QREG + this cycle. PRESC hardware forces ZA if FACD >= FACS, else ZB, and right shifts the # of nibbles equal to ABS(BX - AX)mod 8.

NORM mode: Code ADNM (MATH:FPOP random) for proper adjustment of the exponent.

Code PASS second half for proper shifting of the mantissa. Shift is RSHN, PASS, LSH1,LSH2, LSH3, LSH4, for MOF, 0, 1, 2, 3, 4 leading nibbles of zero.

All SPLIT CYCLE modes: TUVR latch, ZLCH, and TLCH latch and hold data during the 2nd cycle.

APPENDIX F

SHFT FIELD

The SHFT field has two basic functions: 1) Control of the inputs for bit shifts into QREG or BREG, and 2) Control of the nibble shift hardware which operates upon TLCH and outputs to the D buss. Which function the SHFT field specifies is also governed by the D2ND field.

3.6.1 NSHR type shifts

If the D2ND field contains NSHR, then the bit inputs are all one, and the nibble hardware is controled by the SHFT field as shown in the following chart:

| SHFT Field Mnem | Value | TLCH loaded 1st half: A | B | C | D | E | F | G | H |
|---|---|---|---|---|---|---|---|---|---|
| | | D Bus source during second half: | | | | | | | |
| RSH1 | 0 | 0 | A | B | C | D | E | F | G |
| RSH2 | 1 | 0 | 0 | A | B | C | D | E | F |
| RSH3 | 2 | 0 | 0 | 0 | A | B | C | D | E |
| RSH4 | 3 | 0 | 0 | 0 | 0 | A | B | C | D |
| RSH5 | 4 | 0 | 0 | 0 | 0 | 0 | A | B | C |
| RSH6 | 5 | 0 | 0 | 0 | 0 | 0 | 0 | A | B |
| RSH7 | 6 | 0 | 0 | 0 | 0 | 0 | 0 | 0 | A |
| BEN6 | 7 | 0 | 0 | 0 | 0 | 0 | 0 | G | H |
| BEN5 | 8 | 0 | 0 | 0 | 0 | 0 | 0 | F | G |
| BEN4 | 9 | 0 | 0 | 0 | 0 | 0 | 0 | E | F |
| BEN3 | A | 0 | 0 | 0 | 0 | 0 | 0 | D | E |
| BEN2 | B | 0 | 0 | 0 | 0 | 0 | 0 | C | D |
| BEN1 | C | 0 | 0 | 0 | 0 | 0 | 0 | B | C |
| RSHN | D | 1 | A | B | C | D | E | F | G |
| EXP | E | (S & EXP) | A | B | C | D | E | F | |
| @ACS | F | RIGHT SHIFT (ACSR<2,3> + 1) | | | | | | | |

Notes: EXP - D0 := Fsign, D1 := EXP1', D<2-7> := EX<2-7>, and D<8-31> gets TLCH right shifted two nibbles.

@ACS - D<0-31> gets TLCH shifted right the number of times indicated by ACSR<2,3> + 1 with zeroes shifted in.

RSHN only works for split cycles. In Fxxx modes, it will act like RSH1.

NSHL type shifts

If the D2ND field contains NSHL, then the bit inputs are all one, and the nibble hardware is controlled by the SHFT field as shown in the table below:

| SHFT Field Mnem | Value | TLCH loaded 1st half: A | B | C | D | E | F | G | H |
|---|---|---|---|---|---|---|---|---|---|
| | | D Bus source during second half: | | | | | | | |
| LSH1 | 0 | B | C | D | E | F | G | H | 0 |
| LSH2 | 1 | C | D | E | F | G | H | 0 | 0 |
| LSH3 | 2 | D | E | F | G | H | 0 | 0 | 0 |
| LSH4 | 3 | E | F | G | H | 0 | 0 | 0 | 0 |
| SWPB | 4 | C | D | A | B | G | H | E | F |
| SWPW | 5 | E | F | G | H | A | B | C | D |
| ZEXT | 6 | 0 | 0 | 0 | 0 | E | F | G | H |
| SEX | 7 | S | S | S | S | E | F | G | H |
| BSEX | 8 | S | S | S | S | S | S | G | H |
| ROTL | 9 | C | D | E | F | G | H | A | B |
| reserved | A | | | | | | | | |
| reserved | B | | | | | | | | |
| FPSR | C | (FPSR 0 - 15) | | | | 0 | 0 | 0 | 0 |
| DECC | D | 0 | 0 | 0 | 0 | 0 | 0 | 0 | H' |
| @FLG4 | E | @ACS; LEFT,RIGHT FOR FLAG4 = 0,1 | | | | | | | |
| @ACS | F | LEFT SHIFT (ACSR<2,3> + 1) | | | | | | | |

Notes: @FLG4 - Does a right or left shift depending upon the value of FLAG4, and shifts the number of nibbles indicated by ACSR<2,3> + 1.

FPSR - The upper 16 bits of the Floating Point Status Register is placed on D<0-15>, and D<16-31> gets zeroes.

DECC produces a decimal correct on the least significant nibble.

BIT SHIFTS
----------

If the D2ND field contains any value except NSHR or NSHL, then the SHFT field controls the bit shift inputs as per the following chart. If D2ND contains NSHR or NSHL then the bit inputs are as specified by the "ONE" mnemonic in the following chart.

| | | FLAG0 = 1 Wide operation | | | | FLAG0 = 0 Narrow operation | | | |
|---|---|---|---|---|---|---|---|---|---|
| ALUD field: | | RSH8 or RSQ8 | RSQ8 | LSH8 or LSQ8 | LSQ8 | RSH8 or RSQ8 | RSQB | LSH8 or LSQ8 | LSQ8 |
| SHFT mnem | val | R0IO | Q0IO | R31IO | Q31IO | R16IO | Q16IO | R31IO | Q31IO |
| ZZ | 0 | 0 | 0 | 0 | 0 | 0 | 0 | 0 | 0 |
| SSH | 1 | 0 | ALU31 | 0 | ALU0 | 0 | ALU31 | 0 | ALU16 |
| DRT | 2 | Q31 | ALU31 | Q0 | ALU0 | NVACRY | ALU31 | NVACRY | ALU16 |
| DSH | 3 | ALU0 | ALU31 | Q0 | 0 | ALU16 | ALU31 | Q16 | 0 |
| LNK | 4 | LINK | ALU31 | LINK | ALU0 | LINK | ALU31 | LINK | ALU16 |
| CAR | 5 | CARRY | ALU31 | CARRY | ALU0 | CARRY | ALU31 | CARRY | ALU16 |
| SRT | 6 | ALU31 | ALU31 | ALU0 | Q0 | ALU31 | ALU31 | ALU16 | Q15 |
| CRY | 7 | CRY0 | ALU31 | Q0 | CRY0 | CRY16 | ALU31 | Q16 | CRY16 |
| ONE | 8 | 1 | 1 | 1 | 1 | 1 | 1 | 1 | 1 |
| | 9,A | | Reserved | | | | | | |
| CRYY | B | 1 | ALU31 | Q0 | CRYY | 1 | ALU31 | Q16 | CRYY |
| | C-F | | Reserved | | | | | | |

Note: ALC's code DRT in the SHFT field. NVACRY = ALCCRY XOR TCRY16

APPENDIX G

CRYINS FIELD
------------

ALU carry input select field. The use of this field is governed by the CSM RAND fields. There are 4 types of usage.

Type0

All modes except SFIXP, FFIXP, MPY, and DIV are type 0.

| Mnem | Value | Description |
|---|---|---|
| Z | 0 | CRYIN = 0 |
| H | 1 | CRYIN = 1 |

Type1

Modes SFIXP and FFIXP. This field combines with bit 0 of the rand field. Rand type FIXP is used with type1 CRYINS.

| CRYINS Mnem | CRYINS Value | CEXT Mnem | CEXT (RAND<0>) value | Description |
|---|---|---|---|---|
| Z | 0 | N | 0 | CRYIN = 0 |
| H | 1 | N | 0 | CRYIN = 1 |
| Z,C | 0 | CARRY | 1 | CRYIN = CARRY |
| H,B | 1 | CARRY | 1 | CRYIN = CARRY' |

Type2

MPY mode.

CRYIN = MLTC

| Mnem | Value | Description |
|---|---|---|
| U | 0 | Unsigned multiplication |
| S | 1 | Signed multiplication |

Type3

DIV mode.

CRYIN = TCRYY

| Mnem | Value | Description |
|---|---|---|
| | 0 | Unassigned |
| | 1 | Unassigned |

APPENDIX H

Type Math

ROUND - Floating point Round control.

| Mnem | Value | Description |
|---|---|---|
| NOP | 0 | |
| FRND | 1 | Add the ROUND BIT to the ALU result by forcing CRY24, and force 0's into bits 24-31 of NSHL, NSHR, or PASS |

Note: FRND overides TRNC. Do not code FRND with PASS in a full cycle mode. Do not code FRND with NSHR: BEN<1-6>, or NSHL: ZEXT, SEX, BSEX, FPSR, or DECC.

FPOP - Floating Point exponent, multiplication, and truncation.

| Mnem | Value | Description |
|---|---|---|
| NOP | 0 | |
| | 1 | Unassigned |
| LDQB | 2 | QBIT := TCRY0 |
| TRNC | 3 | Truncate. Force 0's into bits 28-31 of PASS if FPSR<8> = 0. (Only code with PASS & Split cycle) |
| SHMR | 4 | Shift MREG right 2 bits each half-cycle. MLTC and PMR are clocked both half cycles. |
| MSHQ | 5 | LDQB and SHMR |
| MRAX | 6 | LDMR and ADDX |
| LDMR | 7 | Load MREG each half for split cycle, once for full cycle. Do not read MREG concurrently. |
| LDEX | 8 | Load exp. BX<0-1> := EXP<0-1> = TLCH1' BX<2-7> := EXP<2-7> = TLCH<2-7> |
| ADDX | 9 | Add exp. BX<0-7> := EXP<0-7> = BX<0-7> + AX<0-7> |
| SUBX | A | Sub " BX<0-7> := EXP<0-7> = BX<0-7> - AX<0-7> |
| CMPX | B | Compare " EXP<0-7> = BX<0-7> - AX<0-7> |

```
MOVX   |    C    | Move exp.    BX<0-7> := EXP<0-7> = AX<0-7>
ADCN   |    D    | Add const. BX<0-7> := AX<0-7> + NAC<12-19>,
       |         |       EXP<0-7> = AX<0-7>
ADNM   |    E    | Add norm.    BX<0-7> := AX<0-7> + NORM OFFSET<0-7>
       |         |       EXP<0-7> = AX<0-7>
LDCN   |    F    | BX<0-7> := NAC<12-19>, EXP<0-7> := AX<0-7>
Notes:   EXP<0-7> defaults to AX if no exponent u-order is coded.
         NORM OFFSET is 1, 0,-1,-2,-3,-4, for MOF, 0,1,2,3, or 4
         leading nibbles of zeroes of ALU<0-31>. (MOF can not occur
         during logical operations).
```

Type Math cont.

MISC - Scratchpad, Sign, Normalization and SPAR operations.

```
Mnem   | Value | Description
------+-------+------------
NOP    |   0   |
RDAA   |   1   | SPAD addressed by NAC<12-19>.
RACS   |   2   | SPAD addressed by 111000, OP1<2-3>   Used to address

RACD   |   3   | SPAD addressed by 111000, OP2<2-3>  Used to address
       |       | low order half of double precision FPAC's.
WRSP   |   4   | SPAD addressed by SPAR<0-7>; SPAD<0-31> := CPD<0-31>
WRAA   |   5   | SPAD addressed by NAC<12-19>; SPAD<0-31> := CPD<0-31>
WANC   |   6   | WRAA*NOCR
WACD   |   7   | SPAD addressed by 111000, OP2<2-3> ;
       |       | SPAD<0-31> := CPD<0-31>  Used to write low-order
       |       | half of double precision FPAC's.
RSBR   |   8   | SPAD addressed by 11101, LAR<1-3>, no load LAR
LDOP   |   9   | ATU OP1<2-3> := CPD<30-31>, OP2<2-3> := CPD<26-27>
       | A - F | Unassigned
LDSN   |  10   | Load sign   Sign(BREG) := FSIGN = TLCHO
XORS   |  11   | Sign(BREG) := FSIGN = Sign(BREG) XOR Sign(AREG))
SMOV   |  12   | Move sign   Sign(BREG) := FSIGN = Sign(AREG)
SCOM   |  13   | Move complement of sign  Sign(BREG) := FSIGN =
       |       |  Sign(AREG)'
NOCR   |  14   | Force a zero to the carry input of the
       |       | normalization prom.
       |  15   | Unassigned
SMNC   |  16   | SMOV and NOCR
SCNC   |  17   | SCOM and NOCR
LDFS   |  18   | FPSR1 := (FPSR1 OR OVF); FPSR2 := (FPSR2 OR UNF);LDZN
XSFS   |  19   | LDFS and XORS
SMFS   |  1A   | LDFS and SMOV
SCFS   |  1B   | LDFS and SCOM
LDSS   |  1C   | LDSN and LDZN
LDZN   |  1D   | FPSR7 := FSIGN;  FPSR6 := 1 if ALU = 0, else := 0
       |  1E   | Unassigned
       |  1F   | Unassigned
```

APPENDIX I

Type Fixo

MISC1 - ALU loading control

```
Mnem   | Value | Description
------+-------+------------
NOP    |   0   | Unassigned
DEC1   |   1   | Force loading of least significant nibble of BREG if
       |       |  ALUD = NLD. (By forcing bit 1 of ALUD field to 1)
LALC   |   2   | ALC conditional load.
ABSV   |   3   | Conditional loading of BREG and QREG
```

| | | |
|---|---|---|
| | | a) FLAG0 = 1 loading enabled iff ALU0 = 0 |
| | | b) FLAG0 = 0 loading enabled iff ALU16 = 0 |
| NAR0 | 4 | Override FLAG0 ( wide up ) and force narrow ALU Status. Effects CRY, SIGN, OVFL, SEGG, ALUNZ tests, and LOVC, LDCY, & LCRY randoms. Does not effect loading BREG or bit shifts. |
| | 5-F | Unassigned |

MISC2 - Carry, Overflow and Status randoms. (5 bits).
-----

| Mnem | Value | Description |
|---|---|---|
| NOP | 0 | |
| RDAA | 1 | SPAD addressed by NAC<12-19> |
| RACS | 2 | SPAD addressed by 111000, OP1<2-3> Used to address low order half of double precision FPAC's. |
| RACD | 3 | SPAD addressed by 111000, OP2<2-3> Used to address low order half of double precision FPAC's. |
| WRSP | 4 | SPAD addressed by SPAR<0-7>; SPAD<0-31> := CPD<0-31> |
| WRAA | 5 | SPAD addressed by NAC<12-19>; SPAD<0-31> := CPD<0-31> |
| | 6 | WRAA |
| WACD | 7 | SPAD addressed by 111000, OP2<2-3> ; SPAD<0-31> := CPD<0-31> Used to write low-order half of double precision FPAC's. |
| RSBR | 8 | SPAD addressed by 11101, LAR<1-3>, no load LAR |
| LDOP | 9 | OP1<2-3> := CPD<30-31>, OP2<2-3> := CPD<26-27> |
| | A - F | Unassigned |
| LPSR | 10 | PSR<0-2> := D<0-2>, Do not have uncompleted memory operation, because the next cylce may trap. |
| COVR | 11 | PSR1 := 0, Clear OVR |
| SOVR | 12 | PSR1 := 1, Set OVR (see note) |
| LOVC | 13 | If FLAG0 = 0, PSR1 := OVR16 + PSR1; CARRY := CRY16<br>If FLAG0 = 1, PSR1 := OVR0 + PSR1; CARRY := CRY0 |
| COVK | 14 | PSR0 := 0 Clear OVK |
| SOVK | 15 | PSR0 := 1 Set OVK |
| LDCY | 16 | CARRY := D0, D16 for FLAG0 = 1,0 |
| LCRY | 17 | CARRY := CRY |
| | 18 | Unassigned |
| LFPS | 19 | FPSR<1-4> := DS<1-4> |
| SMOF | 1A | Set mantissa overflow FPSR4 := 1 |
| SDVZ | 1B | Set divide by zero FPSR3 := 1 |
| DCRY | 1C | CARRY := Decimal carry, code NSHL DECC concurrently |
| ALC | 1D | CARRY := ALC shift; Enable ALC skip logic. |
| CLRC | 1E | CARRY := 0 Clear CARRY |
| SETC | 1F | CARRY := 1 Set CARRY |

NOTE: If LSPR, SOVR, LOVC, or SOVK cause both OVR and OVK to be 1, a fixed point overflow trap will occur to uloc 10. At the end of the cycle at uloc 10, OVR will be set to 0.

APPENDIX J

Type Gen
REGS - General and ACS, ACD operations
----

| Mnem | Value | Description |
|---|---|---|
| NOP | 0 | Unassigned |
| | 1 | Unassigned |
| | 2 | Unassigned |
| LDMR | 3 | MREG<0-31> := D<0-31>; Do not read MREG |
| | 4 | Unassigned |
| NCPDR | 5 | No-load CPDR |
| FCY | 6 | Force CARRY into CPDR if CPDR is loaded.<br>If FLAG1 = 0 CPDR<16> = CARRY<br>If FLAG1 = 1 CPDR<0> = CARRY |
| RPSR | 7 | CPDR<0-2> = PSR<0-2> if CPDR is loaded. |
| SGR7 | 8 | ACSR := GR7 |

```
   LACS  |   9    | ACSR<0-3> := D<28-31>, SRC = D<28-31>
   LACD  |   A    | ACDR<0-3> := D<24-27>, DES = D<24-27>
   LREG  |   B    | LACS & LACD
   INCS  |   C    | Inc ACSR.  ACSR<0-3> := ACSR<0-3> + 1 mod 4
   DECS  |   D    | Dec ACSR.  ACSR<0-3> := ACSR<0-3> - 1 mod 4
   INCD  |   E    | Inc ACDR.  ACDR<0-3> := ACDR<0-3> + 1 mod 4
   DECD  |   F    | Dec ACDR.  ACDR<0-3> := ACDR<0-1> - 1 mod 4
```

```
 SPAR - SPAR operations
 ----

   Mnem   | Value | Description
   ------+-------+-----------
   NOP *  |   0    |
   APCRE  |   1    | LA<1-3> = CRE   Append CRE
   SCPD   |   2    | SPAR<0-7> := CPD<24-31>
   SPAA   |   3    | SPAR<0-7> := NAC<12-19>
```

```
SPAD - Scratchpad operations
----

  Mnem   | Value | Description
  ------+-------+-----------
  NOP    |   0    |
  RDAA   |   1    | SPAD addressed by NAC<12-19>
  RACS   |   2    | SPAD addressed by 111000, DP1<2-3>   used to address
         |        | low-order half of double precision FPAC's.
  RACD   |   3    | SPAD addressed by 111000, DP2<2-3>   used to address
         |        | low order half of double precision FPAC's.
  WRSP   |   4    | SPAD addressed by SPAR<0-7> ; SPAD<0-31> := CPD<0-31>
  WRAA   |   5    | SPAD addressed by NAC<12-19>; SPAD<0-31> := CPD<0-31>
         |   6    | unassigned
  WACD   |   7    | SPAD addressed by 111000, DP1<2-3> ,
         |        | SPAD<0-31> := CPD<0-31>  used to write low-order
         |        | half of double precision FPAC's.
  RSBR   |   8    | SPAD addressed by 11101, LAR<1-3>, no load [illegible]
  LDDP   |   9    | DP1<2-3> := CPD<30-31>, DP2<2-3> := CPD<26-27>
         |   A    | unassigned
         |   B    | unassigned
         |   C    | unassigned
         |   D    | unassigned
         |   E    | unassigned
         |   F    | unassigned
```

APPENDIX K

```
ATU0 - ATU operations
----

  Mnem   | Value | Description
  ------+-------+-----------
  NOP    |   0    |
  AON    |   1    | ATU on.  Do not code IPOP concurrently
  AOFF   |   2    | ATU off.  Do not code IPOP concurrently
  LDCR   |   3    | CRE<1-3> & ESR<1-3> := LA<1-3>. Don't start memory.
         |        |  Code RSBR next cycle to read IO & LEF bits to ATU
  PRGA   |   4    | Purge the ATU translation buffer.
  LATUS  |   5    | Restore ATU context from CPD bus.  See note next pg.
  RESR   |   6    | ESR<1-3> := CRE<1-3>, Reset the ESR after DFR loops.
  RMAX   |   7    | Ring maximiztion check on LA (mem start not nec.)
  LPTA   |   8    | Low order page table addresses memory
         |        | Previous read (MD<18-31>),LAR<13-21> -> PHY<8-31>
  OPAD   |   9    | Object page table addresses memory
         |        | Previous read (MD<18-31>),LAR<22-31> -> PHY<8-31>
         |        | If test condition true,  load ATU Translation buffer
         |        |   Protection<0-2>,Translation<8-21> <- MD<2-4,18-31>;
         |        |   Set valid; Tag<2-14> <- LAR<2-14>; Buffer addressed
         |        |   by LA<1,15-21>.  Use only during LAI trap.
  SIO    |   A    | Send IO Command or Data
  LMAP   |   B    | Protection<0-2>,Translation<8-21> <- CPD<2-4,18-31>
         |        |  Valid <- CPD0. Buffer addressed by LA<1,15-21>
  WRRF   |   C    | CPD<26-27> -> Mod,Ref bits addressed last cycle.
         |   D    | Unassinged
```

```
DMAP   |   E    | DOA MAP; Loads the MMPU data from the CPD bus.
CDR    |   F    | CCP data; CDR<0-15> := CPD<16-31>.
MMPON  |  10    | If user mode enabled, turn on ATU.
       |  11    | Unassigned
       |  12    | Unassigned
       |  13    | Unassigned
FHLT   |  14    | Force the IP to halt state to allow single step or
       |        |  continue.  CCP halt flag must be set.
IPRS   |  15    | Parse IDR; Used after XCT or to clear an EFA after trap.
IPLD   |  16    | ICP<1-31> := LA<1-31>, LENGTH := CPD<30,31>
PICXT  |  17    | XCT and inhibit LEF mode for XCTed opcode.
IPST   |  18    | IP STRT: LA -> PC; CPA -> IP Physical Page, APCRE
IPCN   |  19    | IP CANCEL
ICAT   |  1A    | ICP -> LA; CPA -> IP Physical Page register
DISI   |  1B    | Disable interrupts one instruction
       |        |   Do not code an IPOP concurrently with DISI
IOFF   |  1C    | ION off.  (Do not code IPOP concurrently)
ION    |  1D    | ION on, DISI. (Do not code IPOP)
XCT    |  1E    | CPD<16-31> is inserted into the instruction stream.
       |        |   Code IPRS next cycle and IPOP the next.  The IP
       |        |   decode prom must contain 0 instruction length.
SKIP   |  1F    | Skip the next instruction. Takes 1 cycle to do.
       |        |   Do not code SKIP after an IPST.  Do not code a
       |        |   memory operation after a skip.
```

ATU1 - More ATU operations
----

```
Mnem  | Value | Description
------+-------+------------
NOP   |   0   |
APCRE |   1   | LA<1-3> = CRE     Append CRE to LA
DFR   |   2   | Increment Defer counter,  ESR := LA<1-3>
SPAA  |   3   | SPAR<0-7> := NAC<12-19>
```

ATU2 - General
----

```
Mnem  | Value | Description
------+-------+------------
NOP   |   0   |
BYLCH |   1   | Force BYLCH regardless of memory start type
RDAA  |   2   | SPAD addressed by NAC<12-19>
LDOP  |   3   | OP1 := CPD<30-31>, OP2 := CPD<26-27>
WRSP  |   4   | SPAD addressed by SPAR<0-7>; SPAD<0-31> := CPD<0-31>
WRAA  |   5   | SPAD addressed by NAC<12-19>; SPAD<0-31> := CPD<0-31>
      |   6   | Unassigned
      |   7   | Unassigned
```

```
Note:   ATU state for ATU0:LATUS and CPU Source:ATU0

          Bits                          bits

           0       Was IPST*            13       Was single reference
          1-3      0                    14-15    0
           4       Was PC Ref           16       EFA*
           5       Was IC Ref           17-19    ESR<1-3>*
           6       Enable Split*        20-22    0
           7       0                    23       Usr md intr
           8       Write *              24,25    0
          9-10     Mode<0-1>            26       Mod*
          11,12    0                    27       Ref*
      * ATU0 only                       28-31    RF<0-3>*
```

APPENDIX L

CPDS FIELD
----------

```
Mnem  | Value | Description
------+-------+------------
NOP   |   0   | CPD<0-31> = 0, No load CPDR
```

```
ZERO   |    1   | CPDR<0-31> := CPD<0-31> = 0
FPU1   |    2   | Reserved for future use by Floating Point hardware.
FPU2   |    3   | Reserved for future use by Floating Point hardware.
MSB    |    4   | ALU Status Buffer
       |        | CPDR<0-31> := CPD<0-31>. CPD<0-23> = 0,
       |        | CPD<24-27> = ACDR<0-3>, CPD<28-31> = ACSR<0-3>
DSPCH  |    5   | No load CPDR. Used for dispatches.
       |        | CPD<0-3> = 0's , PRE<0-3>, DE<24-31>
IPS    |    6   | CPDR<0-31> := CPD<0-31>; CPD<0-25,28,29> = 0;
       |        |  CPD<26-27> = Length'; CPD31 = IUN, CPD30 = IDRA_VALID
DSR    |    7   | CPDR<0-31> := CPD<0-31> = DSR<0-31>
DISP   |    8   | CPDR<0-31> := CPD<0-31> = DISP<0-31>
       |        |  only valid during IPOP.
SPAD   |    9   | CPDR<0-31> := CPD<0-31> = Scratch pad<0-31>.
PC     |    A   | CPDR<0-31> := CPD<0-31> = 0,CRE<0-2>,PC<4-31>
IOC    |    B   | I/O Channel Data Register
       |        | CPDR<0-31> := CPD<0-31> = 0, IOC<0-15>
LAR    |    C   | ATU Logical Address Register
       |        | CPDR<0-31> := CPD<0-31> = LAR<0-31>
PHY    |    D   | CPDR<0-31> := CPD<0-31>. CDP0 = Validity, 1 = Hit
       |        |  2-4 = PROT<1-3>, 5-17 = TAG<2-14>, 18-31 = PHY<8-21>
ATUF   |    E   | CPDR<0-31> := CPD<0-31> := ATU fault
       |        |  codes & SPAR. Clears faults
ATUO   |    F   | CPDR<0-31> := CPD<0-31> := R&M bits of page addressed
       |        |   by LA & ATU state. See note under ATU randoms.
CIR    |   10   | CPDR<0-31> := CPD<0-31> = CCP Command
       |        |  bits 0-17 = 0, 18-30 = CIR<18-30> 31 = con request
WIDE   |   11   | CPDR<0-31> := CPD<0-31> = CCP Data
       |        |  bits 0-15 = 0, 16-31 = WIDE<16-31>
       |   12   | Unassigned
RACS   |   13   | CPDR<0-31> := CPD<0-31> = 0's, ACSR<0-3>
UCTR   |   14   | Microsequencer Loop Counter. CPDR<0-31> := CPD<0-31>
       |        |  bits 0-7,16-19 undefined, 8-13 = FLAGS<0-5>'
       |        |  14 = 1, 15 = TUS<0>, 20-23 = TUS<4-7>,
       |        |  24-25 = FLAGS<6-7>', 26-27 = 0, 28-31 = CNTR<2-5>'
UTOS   |   15   | Microsequencer Top of Stack. CPDR<0-31> := CPD<0-31>
       |        |  bits 0-7,16-19 undefined, 8-13 = FLAGS<0-5>'
       |        |  14 = 1, 15 = TUS<0>', 20-31 = TUS<4-15>'
       | 16-1E  | Unassigned

Note:   The last u-instruction of each routine must code DISP in CPDS
        to load CPDR with the displacement for the next instruction.
```

What is claimed is:

1. A data processing system having a processor unit which includes means for supplying instructions and a main memory containing a plurality of segment storage regions, said system including a plurality of segment identification registers each associated with one of said segment storage regions and capable of storing a 32-bit double word which points to a memory management table related to said region, said segment identification registers being located externally of said main memory;

accumulator storage means for storing a starting address of a block of double words stored in main memory;

instruction decode means connected to said instruction supplying means and responsive to an instruction therefrom requiring the storage of said block of data words into said segment identification registers for providing selected control signals;

means connected to said instruction decode means, to said accumulator storage means, to said main memory and to said segment identification registers and responsive to said selected control signals for accessing the first word of said block of double words at said starting address in said main memory and for loading the double words in said block into said plurality of memory management registers, said double words being loaded sequentially into said registers in a preselected order.

2. A data processing system having a main memory containing a plurality of segment storage regions, said system including an instruction processor unit comprising a program counter register, said program counter register containing a 32-bit double word representing the current program count in a sequence of instruction operations being performed by said data processing system;

instruction decode means responsive to an instruction occurring in said sequence of instruction operations for requiring a program counter relative jump operation, said decode means providing a plurality of decoded bits, a selected number of which form a displacement value; and means connected to said instruction decode means and to said program counter register for adding said displacement bits to the current double word in said program counter register and for placing the result into only the lower portion of said program counter register so that the result provides a reference to a specified location only in the currently used segment storage region of said main memory which is displaced relative to the location specified by the current program count.

3. A data processing system for handling first data words having thirty-two bits and second data words having sixteen bits;

a plurality of accumulator storage means capable of storing said first or said second data words;

means connected to said accumulator storage means and responsive to a second data word in a source accumulator storage means of said plurality of accumulator storage means for extending the number of bits thereof so that said extended second data word has thirty-two bits, said extended second data word having the same value as said second data word prior to its extension and being capable of storage in a destination accumulator storage means of said plurality of accumulator storage means;

instruction decode means responsive to an instruction requiring the extending of a second data word for providing first selected bits of an instruction word for identifying said source accumulator storage means and second selected bits of an instruction word for identifying said destination accumulator storage means and for providing control signals; and means connected to said instruction decode means and responsive to said control signals for extending said second data word and for storing said extended second data word in said destination accumulator storage means.

4. A data processing system in accordance with claim 3 wherein said extending means includes means for zero-extending said second data word.

5. A data processing system in accordance with claim 4 wherein said extending means includes means for sign-extending said second data word.

6. A data processing system having means for supplying instructions and comprising a destination accumulator storage means capable of storing thirty-two bits of which only a first word having sixteen bits is required for an arithmetic operation;

a source accumulator storage means capable of storing thirty-two bits of which only a second word having sixteen bits is required for said arithmetic operation;

instruction decode means connected to said instruction supplying means and to said destination and source accumulator storage means and responsive to an instruction requiring multiplication of said first and second words for providing control signals for multiplying the sixteen lower bits of said destination accumulator storage means and the sixteen lower bits of said source accumulator storage means to produce a result having sixteen bits, for sign-extending said result to form a double word having thirty-two bits, and storing said sign extended double word in said destination accumulator storage means without changing the contents of said source accumulator storage means.

7. A data processing system capable of use with one or more external devices, said system comprising memory means including a first storage region containing a plurality of instruction routines, each routine for performing one of a plurality of selectable interrupt operations;

a second storage region containing a plurality of device control tables, each said table being associated with one of said external devices and including an interrupt routine address pointing to a selected one of said interrupt routines in said first storage region;

a third storage region containing a plurality of device control table addresses each of said addresses being associated with one of said external devices and pointing to a selected one of said device control tables in said second storage region;

a fourth storage region having a first selected location capable of storing information defining an instruction for transferring control of said system to a desired one of said plurality of interrupt routines associated with an external device and a second selected location containing an address pointing to a selected location in said third storage region;

means connected to said external device and to said memory means and responsive to an interrupt request from an external device for examining the first selected location of said fourth storage region to determine whether or not the information defining said transfer instruction is present therein and for supplying the address in said second selected location where said information is present and means connected to said external device and to said memory means and responsive to coded information from said external device requesting said interrupt for providing to said third storage region an address offset from said selected location in said third storage region, the address at said offset location being the address pointing to said selected one of said device control tables in said second storage region.

8. A data processing system in accordance with claim 7 wherein the device control table in said second storage region includes coded masking information for preventing other external devices from requesting interrupts when an interrupt has already been requested by said external device and processor status information as to whether or not a fixed point overflow condition is to be enabled.

* * * * *